US010209884B2

(12) United States Patent
Dascola et al.

(10) Patent No.: US 10,209,884 B2
(45) Date of Patent: Feb. 19, 2019

(54) DEVICES, METHODS, AND GRAPHICAL USER INTERFACES FOR MANIPULATING USER INTERFACE OBJECTS WITH VISUAL AND/OR HAPTIC FEEDBACK

(71) Applicant: Apple Inc., Cupertino, CA (US)

(72) Inventors: Jonathan R. Dascola, San Francisco, CA (US); Richard R. Dellinger, San Jose, CA (US); Christopher P. Foss, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 314 days.

(21) Appl. No.: 15/272,327

(22) Filed: Sep. 21, 2016

(65) Prior Publication Data

US 2017/0046025 A1 Feb. 16, 2017

Related U.S. Application Data

(63) Continuation of application No. 15/231,745, filed on Aug. 8, 2016, now Pat. No. 9,880,735.

(Continued)

(51) Int. Cl.
*G06F 3/0488* (2013.01)
*G06F 3/041* (2006.01)

(Continued)

(52) U.S. Cl.
CPC .......... *G06F 3/04883* (2013.01); *G06F 3/016* (2013.01); *G06F 3/0233* (2013.01);

(Continued)

(58) Field of Classification Search
CPC .... G06F 3/0482; G06F 3/04883; G06F 17/24; G06F 3/016
See application file for complete search history.

(56) References Cited

U.S. PATENT DOCUMENTS 4,864,520 A 9/1989 Setoguchi et al.
5,184,120 A 2/1993 Schultz (Continued)

FOREIGN PATENT DOCUMENTS

AU 2016100649 A4 6/2016
CN 1808362 A 7/2006

(Continued)

OTHER PUBLICATIONS

"Everything you can do with Force Touch on Apple Watch", Caitlin McGarry, Macworld, May 6, 2015, www.macworld.com (Year: 2015).*

(Continued)

*Primary Examiner* — Li P Sun
(74) *Attorney, Agent, or Firm* — Morgan, Lewis & Bockius LLP

(57) ABSTRACT

A device displays a user interface that includes a plurality of application icons. While displaying the user interface, the device detects an input that a contact at a location that corresponds to an application icon associated with an application. In response to detecting the input: when an intensity of the contact does not meet an intensity threshold, the device launches the application and replaces display of the user interface that includes the plurality of application icons with a user interface of the application; and when the characteristic intensity of the contact meets the intensity threshold, the device concurrently displays a content object and an affordance that is associated with the content object. The content object includes content automatically selected from the application based on a current context of the electronic device. The affordance is configured to add the content object to a user interface that includes information for multiple applications.

72 Claims, 364 Drawing Sheets

Related U.S. Application Data

(60) Provisional application No. 62/349,096, filed on Jun. 12, 2016, provisional application No. 62/215,722, filed on Sep. 8, 2015, provisional application No. 62/213,609, filed on Sep. 2, 2015, provisional application No. 62/203,387, filed on Aug. 10, 2015.

(51) Int. Cl.

| | |
|---|---|
| ***G06F 3/0482*** | (2013.01) |
| ***G06F 3/0485*** | (2013.01) |
| ***G06F 3/01*** | (2006.01) |
| ***G06F 3/0484*** | (2013.01) |
| ***G06F 3/0481*** | (2013.01) |
| ***G06F 3/16*** | (2006.01) |
| ***G06F 17/24*** | (2006.01) |
| ***G06F 3/023*** | (2006.01) |
| ***H04M 1/725*** | (2006.01) |

(52) U.S. Cl.

CPC .......... *G06F 3/0414* (2013.01); *G06F 3/0416* (2013.01); *G06F 3/0482* (2013.01); *G06F 3/0485* (2013.01); *G06F 3/0488* (2013.01); *G06F 3/04817* (2013.01); *G06F 3/04845* (2013.01); *G06F 3/04886* (2013.01); *G06F 3/167* (2013.01); *G06F 17/24* (2013.01); *H04M 1/72522* (2013.01); *H04M 1/72552* (2013.01); *G06F 2203/04104* (2013.01); *G06F 2203/04105* (2013.01); *G06F 2203/04803* (2013.01); *H04M 2250/22* (2013.01)

(56) References Cited

U.S. PATENT DOCUMENTS 5,374,787 A 12/1994 Miller et al.
5,428,730 A 6/1995 Baker et al.
5,463,722 A 10/1995 Venolia
5,510,813 A 4/1996 Makinwa et al.
5,555,354 A 9/1996 Strasnick et al.
5,559,301 A 9/1996 Bryan, Jr. et al.
5,710,896 A 1/1998 Seidl
5,717,438 A 2/1998 Kim et al.
5,793,360 A 8/1998 Fleck et al.
5,793,377 A 8/1998 Moore
5,801,692 A 9/1998 Muzio et al.
5,805,144 A 9/1998 Scholder et al.
5,805,167 A 9/1998 Van Cruyningen
5,809,267 A 9/1998 Moran et al.
5,819,293 A 10/1998 Comer et al.
5,825,352 A 10/1998 Bisset et al.
5,844,560 A 12/1998 Crutcher et al.
5,872,922 A 2/1999 Hogan et al.
5,946,647 A 8/1999 Miller et al.
6,002,397 A 12/1999 Jaaskelainen, Jr.
6,031,989 A 2/2000 Cordell
6,088,019 A 7/2000 Rosenberg
6,088,027 A 7/2000 Konar et al.
6,111,575 A 8/2000 Martinez et al.
6,121,960 A 9/2000 Carroll et al.
6,208,329 B1 3/2001 Ballare
6,208,340 B1 3/2001 Amin et al.
6,219,034 B1 4/2001 Elbing et al.
6,243,080 B1 6/2001 Molne
6,252,594 B1 6/2001 Xia et al.
6,396,523 B1 5/2002 Segal et al.
6,429,846 B2 8/2002 Rosenberg et al.
6,448,977 B1 9/2002 Braun et al.
6,459,442 B1 10/2002 Edwards et al.
6,489,978 B1 12/2002 Gong et al.
6,512,530 B1 1/2003 Rzepkowski et al.
6,563,487 B2 5/2003 Martin et al.
6,567,102 B2 5/2003 Kung
6,583,798 B1 6/2003 Hoek et al.
6,590,568 B1 7/2003 Astala et al.
6,661,438 B1 12/2003 Shiraishi et al.
6,735,307 B1 5/2004 Volckers
6,750,890 B1 6/2004 Sugimoto
6,822,635 B2 11/2004 Shahoian et al.
6,906,697 B2 6/2005 Rosenberg
6,919,927 B1 7/2005 Hyodo
7,138,983 B2 11/2006 Wakai et al.
7,312,791 B2 12/2007 Hoshino et al.
7,411,575 B2 8/2008 Hill et al.
7,471,284 B2 12/2008 Bathiche et al.
7,479,949 B2 1/2009 Jobs et al.
7,533,352 B2 5/2009 Chew et al.
7,552,397 B2 6/2009 Holecek et al.
7,577,530 B2 8/2009 Vignalou-Marche
7,614,008 B2 11/2009 Ording
7,619,616 B2 11/2009 Rimas Ribikauskas et al.
7,629,966 B2 12/2009 Anson
7,656,413 B2 2/2010 Khan et al.
7,683,889 B2 3/2010 Rimas Ribikauskas et al.
7,743,348 B2 6/2010 Robbins et al.
7,760,187 B2 7/2010 Kennedy
7,787,026 B1 8/2010 Flory et al.
7,797,642 B1 9/2010 Karam et al.
7,801,950 B2 9/2010 Eisenstadt et al.
7,812,826 B2 10/2010 Ording et al.
7,890,862 B2 2/2011 Kompe et al.
7,903,090 B2 3/2011 Soss et al.
7,952,566 B2 5/2011 Poupyrev et al.
7,956,847 B2 6/2011 Christie
7,973,778 B2 7/2011 Chen
8,040,142 B1 10/2011 Bokma et al.
8,059,104 B2 11/2011 Shahoian et al.
8,106,856 B2 1/2012 Matas et al.
8,125,440 B2 2/2012 Guyot-Sionnest et al.
8,125,492 B1 2/2012 Wainwright et al.
RE43,448 E 6/2012 Kimoto et al.
8,209,628 B1 6/2012 Davidson
8,271,900 B2 9/2012 Walizaka et al.
8,325,398 B2 12/2012 Satomi et al.
8,363,020 B2 1/2013 Li et al.
8,390,583 B2 3/2013 Forutanpour et al.
8,423,089 B2 4/2013 Song et al.
8,446,376 B2 5/2013 Levy et al.
8,453,057 B2 5/2013 Stallings et al.
8,456,431 B2 6/2013 Victor
8,466,889 B2 6/2013 Tong et al.
8,482,535 B2 7/2013 Pryor
8,508,494 B2 8/2013 Moore
8,542,205 B1 9/2013 Keller
8,553,092 B2 10/2013 Tezuka et al.
8,581,870 B2 11/2013 Bokma et al.
8,587,542 B2 11/2013 Moore
8,593,415 B2 11/2013 Han et al.
8,593,420 B1 11/2013 Buuck
8,625,882 B2 1/2014 Backlund et al.
8,638,311 B2 1/2014 Kang et al.
8,665,227 B2 3/2014 Gunawan
8,669,945 B2 3/2014 Coddington
8,698,765 B1 4/2014 Keller
8,717,305 B2 5/2014 Williamson et al.
8,743,069 B2 6/2014 Morton et al.
8,769,431 B1 7/2014 Prasad
8,773,389 B1 7/2014 Freed
8,788,964 B2 7/2014 Shin et al.
8,793,577 B2 7/2014 Schellingerhout et al.
8,799,816 B2 8/2014 Wells et al.
8,816,989 B2 8/2014 Nicholson et al.
8,854,316 B2 10/2014 Shenfield
8,872,729 B2 10/2014 Lyons et al.
8,872,773 B2 10/2014 Mak et al.
8,875,044 B2 10/2014 Ozawa et al.
8,881,062 B2 11/2014 Kim et al.
8,914,732 B2 12/2014 Jun et al.
8,952,987 B2 2/2015 Momeyer et al.
8,959,430 B1 2/2015 Spivak et al.
8,976,128 B2 3/2015 Moore
9,026,932 B1 5/2015 Dixon
9,030,419 B1 5/2015 Freed

(56) References Cited

U.S. PATENT DOCUMENTS 9,030,436 B2 5/2015 Ikeda
9,032,321 B1 5/2015 Cohen et al.
9,046,999 B1 6/2015 Teller et al.
9,063,563 B1 6/2015 Gray et al.
9,069,460 B2 6/2015 Moore
9,086,755 B2 7/2015 Cho et al.
9,092,058 B2 7/2015 Kasahara et al.
9,098,188 B2 8/2015 Kim
9,116,571 B2 8/2015 Zeliff et al.
9,122,364 B2 9/2015 Kuwabara et al.
9,146,914 B1 9/2015 Dhaundiyal
9,148,618 B2 9/2015 Matas et al.
9,164,779 B2 10/2015 Brakensiek et al.
9,170,607 B2 10/2015 Bose et al.
9,170,649 B2 10/2015 Ronkainen
9,218,105 B2 12/2015 Mansson et al.
9,244,562 B1 1/2016 Rosenberg et al.
9,244,576 B1 1/2016 Vadagave et al.
9,244,601 B2 1/2016 Kim et al.
9,246,487 B2 1/2016 Casparian et al.
9,262,002 B2 2/2016 Momeyer et al.
9,304,668 B2 4/2016 Rezende et al.
9,307,112 B2 4/2016 Molgaard et al.
9,349,552 B2 5/2016 Huska et al.
9,361,018 B2 6/2016 Defazio et al.
9,389,718 B1 7/2016 Letourneur
9,389,722 B2 7/2016 Matsuki et al.
9,400,581 B2 7/2016 Bokma et al.
9,405,367 B2 8/2016 Jung et al.
9,417,754 B2 8/2016 Smith
9,423,938 B1 8/2016 Morris
9,436,344 B2 9/2016 Kuwabara et al.
9,448,694 B2 9/2016 Sharma et al.
9,451,230 B1 9/2016 Henderson et al.
9,471,145 B2 10/2016 Langlois et al.
9,477,393 B2 10/2016 Zambetti et al.
9,542,013 B2 1/2017 Dearman et al.
9,547,525 B1 1/2017 Trainor et al.
9,569,093 B2 2/2017 Lipman et al.
9,600,114 B2 3/2017 Milam et al.
9,600,116 B2 3/2017 Tao et al.
9,612,741 B2 4/2017 Brown et al.
9,619,076 B2 4/2017 Bernstein et al.
9,671,943 B2 6/2017 Van der Velden
9,733,716 B2 8/2017 Shaffer
9,760,241 B1 9/2017 Lewbel
2001/0024195 A1 9/2001 Hayakawa et al.
2001/0045965 A1 11/2001 Orbanes et al.
2002/0008691 A1 1/2002 Hanajima et al.
2002/0015064 A1 2/2002 Robotham et al.
2002/0109678 A1 8/2002 Marmolin et al.
2002/0140680 A1 10/2002 Lu
2002/0140740 A1 10/2002 Chen
2002/0180763 A1 12/2002 Kung
2002/0186257 A1 12/2002 Cadiz et al.
2003/0001869 A1 1/2003 Nissen
2003/0086496 A1 5/2003 Zhang et al.
2003/0112269 A1 6/2003 Lentz et al.
2003/0117440 A1 6/2003 Hellyar et al.
2003/0122779 A1 7/2003 Martin et al.
2003/0151589 A1 8/2003 Bensen et al.
2003/0184574 A1 10/2003 Phillips et al.
2003/0189552 A1 10/2003 Chuang et al.
2003/0189647 A1 10/2003 Kang
2003/0206169 A1 11/2003 Springer et al.
2003/0222915 A1 12/2003 Marion et al.
2004/0015662 A1 1/2004 Cummings
2004/0021643 A1 2/2004 Hoshino et al.
2004/0056849 A1 3/2004 Lohbihler et al.
2004/0108995 A1 6/2004 Hoshino et al.
2004/0138849 A1 7/2004 Schmidt et al.
2004/0150631 A1 8/2004 Fleck et al.
2004/0150644 A1 8/2004 Kincaid et al.
2004/0174399 A1 9/2004 Wu et al.
2004/0219969 A1 11/2004 Casey et al.
2004/0267877 A1 12/2004 Shiparo et al.
2005/0012723 A1 1/2005 Pallakoff
2005/0039141 A1 2/2005 Burke et al.
2005/0091604 A1 4/2005 Davis
2005/0110769 A1 5/2005 DaCosta et al.
2005/0114785 A1 5/2005 Finnigan et al.
2005/0125742 A1 6/2005 Grotjohn et al.
2005/0132297 A1 6/2005 Milic-Frayling et al.
2005/0134578 A1 6/2005 Chambers et al.
2005/0183017 A1 8/2005 Cain
2005/0190280 A1 9/2005 Haas et al.
2005/0204295 A1 9/2005 Voorhees et al.
2005/0223338 A1 10/2005 Partanen
2005/0229112 A1 10/2005 Clay et al.
2005/0289476 A1 12/2005 Tokkonen
2006/0001650 A1 1/2006 Robbins et al.
2006/0001657 A1 1/2006 Monney et al.
2006/0022955 A1 2/2006 Kennedy
2006/0022956 A1 2/2006 Lengeling et al.
2006/0026536 A1 2/2006 Hotelling et al.
2006/0031776 A1 2/2006 Glein et al.
2006/0036971 A1 2/2006 Mendel et al.
2006/0059436 A1 3/2006 Nurmi
2006/0067677 A1 3/2006 Tokiwa et al.
2006/0101347 A1 5/2006 Runov et al.
2006/0109252 A1 5/2006 Kolmykov-Zotov et al.
2006/0109256 A1 5/2006 Grant et al.
2006/0119586 A1 6/2006 Grant et al.
2006/0132455 A1 6/2006 Rimas-Ribikauskas et al.
2006/0132456 A1 6/2006 Anson
2006/0132457 A1 6/2006 Rimas-Ribikauskas et al.
2006/0136834 A1 6/2006 Cao et al.
2006/0136845 A1 6/2006 Rimas-Ribikauskas et al.
2006/0161861 A1 7/2006 Holecek et al.
2006/0161870 A1 7/2006 Hotelling et al.
2006/0190834 A1 8/2006 Marcjan
2006/0195438 A1 8/2006 Galuten
2006/0197753 A1 9/2006 Hotelling
2006/0212812 A1 9/2006 Simmons et al.
2006/0213754 A1 9/2006 Jarrett et al.
2006/0224989 A1 10/2006 Pettiross et al.
2006/0233248 A1 10/2006 Rynderman et al.
2006/0274042 A1 12/2006 Krah et al.
2006/0274086 A1 12/2006 Forstall et al.
2006/0277469 A1 12/2006 Chaudhri et al.
2006/0282778 A1 12/2006 Barsness et al.
2006/0284858 A1 12/2006 Rekimoto
2006/0290681 A1 12/2006 Ho et al.
2007/0024595 A1 2/2007 Baker et al.
2007/0024646 A1 2/2007 Saarinen et al.
2007/0080953 A1 4/2007 Lii
2007/0113681 A1 5/2007 Nishimura et al.
2007/0120835 A1 5/2007 Sato
2007/0124699 A1 5/2007 Michaels
2007/0152959 A1 7/2007 Peters
2007/0157173 A1 7/2007 Klein et al.
2007/0168369 A1 7/2007 Bruns
2007/0168890 A1 7/2007 Zhao et al.
2007/0176904 A1 8/2007 Russo
2007/0182999 A1 8/2007 Anthony et al.
2007/0186178 A1 8/2007 Schiller
2007/0222768 A1 9/2007 Geurts et al.
2007/0229455 A1 10/2007 Martin et al.
2007/0229464 A1 10/2007 Hotelling et al.
2007/0236450 A1 10/2007 Colgate et al.
2007/0236477 A1 10/2007 Ryu et al.
2007/0245241 A1 10/2007 Bertram et al.
2007/0257821 A1 11/2007 Son et al.
2007/0270182 A1 11/2007 Gulliksson et al.
2007/0294295 A1 12/2007 Finkelstein et al.
2007/0299923 A1 12/2007 Skelly et al.
2008/0001924 A1 1/2008 dos los Reyes et al.
2008/0024459 A1 1/2008 Poupyrev et al.
2008/0034306 A1 2/2008 Ording
2008/0034331 A1 2/2008 Josephsoon et al.
2008/0036743 A1 2/2008 Westerman et al.
2008/0051989 A1 2/2008 Welsh
2008/0052945 A1 3/2008 Matas et al.
2008/0066010 A1 3/2008 Brodersen et al.

(56) References Cited

U.S. PATENT DOCUMENTS

| | | | |
|---|---|---|---|
| 2008/0094367 | A1 | 4/2008 | Van De Ven et al. |
| 2008/0094398 | A1 | 4/2008 | Ng et al. |
| 2008/0106523 | A1 | 5/2008 | Conrad |
| 2008/0109753 | A1 | 5/2008 | Karstens |
| 2008/0136790 | A1 | 6/2008 | Hio |
| 2008/0155415 | A1 | 6/2008 | Yoon et al. |
| 2008/0163119 | A1 | 7/2008 | Kim et al. |
| 2008/0168395 | A1 | 7/2008 | Ording et al. |
| 2008/0168403 | A1 | 7/2008 | Westerman et al. |
| 2008/0168404 | A1 | 7/2008 | Ording |
| 2008/0202824 | A1 | 8/2008 | Philipp et al. |
| 2008/0204427 | A1 | 8/2008 | Heesemans et al. |
| 2008/0219493 | A1 | 9/2008 | Tadmor |
| 2008/0222569 | A1 | 9/2008 | Champion et al. |
| 2008/0244448 | A1 | 10/2008 | Goering et al. |
| 2008/0259046 | A1 | 10/2008 | Carsanaro |
| 2008/0263452 | A1 | 10/2008 | Tomkins |
| 2008/0284866 | A1 | 11/2008 | Mizutani |
| 2008/0294984 | A1 | 11/2008 | Ramsay et al. |
| 2008/0297475 | A1 | 12/2008 | Woolf et al. |
| 2008/0303795 | A1 | 12/2008 | Lowles et al. |
| 2008/0303799 | A1 | 12/2008 | Schwesig et al. |
| 2008/0307335 | A1 | 12/2008 | Chaudhri et al. |
| 2008/0307359 | A1 | 12/2008 | Louch et al. |
| 2008/0317378 | A1 | 12/2008 | Steinberg et al. |
| 2008/0320419 | A1 | 12/2008 | Matas et al. |
| 2009/0007017 | A1 | 1/2009 | Anzures et al. |
| 2009/0037846 | A1 | 2/2009 | Spalink et al. |
| 2009/0046110 | A1 | 2/2009 | Sadler et al. |
| 2009/0058828 | A1 | 3/2009 | Jiang et al. |
| 2009/0061837 | A1 | 3/2009 | Chaudhri et al. |
| 2009/0066668 | A1 | 3/2009 | Kim et al. |
| 2009/0073118 | A1 | 3/2009 | Yamaji et al. |
| 2009/0083665 | A1 | 3/2009 | Anttila et al. |
| 2009/0085878 | A1 | 4/2009 | Heubel et al. |
| 2009/0085881 | A1 | 4/2009 | Keam |
| 2009/0085886 | A1 | 4/2009 | Huang et al. |
| 2009/0089293 | A1 | 4/2009 | Garritano et al. |
| 2009/0100343 | A1 | 4/2009 | Lee et al. |
| 2009/0102804 | A1 | 4/2009 | Wong et al. |
| 2009/0102805 | A1 | 4/2009 | Meijer et al. |
| 2009/0140985 | A1 | 6/2009 | Liu |
| 2009/0158198 | A1 | 6/2009 | Hayter et al. |
| 2009/0160793 | A1 | 6/2009 | Rekimoto |
| 2009/0160814 | A1 | 6/2009 | Li et al. |
| 2009/0167507 | A1 | 7/2009 | Maenpaa |
| 2009/0167508 | A1 | 7/2009 | Fadell et al. |
| 2009/0167704 | A1 | 7/2009 | Terlizzi et al. |
| 2009/0169061 | A1 | 7/2009 | Anderson et al. |
| 2009/0187824 | A1 | 7/2009 | Hinckley et al. |
| 2009/0198767 | A1 | 8/2009 | Jakobson et al. |
| 2009/0219294 | A1 | 9/2009 | Young et al. |
| 2009/0225037 | A1 | 9/2009 | Williamson et al. |
| 2009/0228842 | A1 | 9/2009 | Westerman et al. |
| 2009/0237374 | A1 | 9/2009 | Li et al. |
| 2009/0247112 | A1 | 10/2009 | Lundy et al. |
| 2009/0247230 | A1 | 10/2009 | Lundy et al. |
| 2009/0256947 | A1 | 10/2009 | Ciurea et al. |
| 2009/0259975 | A1 | 10/2009 | Asai et al. |
| 2009/0267906 | A1 | 10/2009 | Schroderus |
| 2009/0276730 | A1 | 11/2009 | Aybes et al. |
| 2009/0280860 | A1 | 11/2009 | Dahlke |
| 2009/0282360 | A1 | 11/2009 | Park et al. |
| 2009/0288032 | A1 | 11/2009 | Chang et al. |
| 2009/0293009 | A1 | 11/2009 | Meserth et al. |
| 2009/0295739 | A1 | 12/2009 | Nagara |
| 2009/0303187 | A1 | 12/2009 | Pallakoff |
| 2009/0307633 | A1 | 12/2009 | Haughay, Jr. et al. |
| 2009/0322893 | A1 | 12/2009 | Stallings et al. |
| 2010/0007926 | A1 | 1/2010 | Imaizumi et al. |
| 2010/0011304 | A1 | 1/2010 | Van Os |
| 2010/0013613 | A1 | 1/2010 | Weston |
| 2010/0013777 | A1 | 1/2010 | Baudisch et al. |
| 2010/0017710 | A1 | 1/2010 | Kim et al. |
| 2010/0026640 | A1 | 2/2010 | Kim et al. |
| 2010/0026647 | A1 | 2/2010 | Abe et al. |
| 2010/0039446 | A1 | 2/2010 | Hillis et al. |
| 2010/0044121 | A1 | 2/2010 | Simon et al. |
| 2010/0045619 | A1 | 2/2010 | Birnbaum et al. |
| 2010/0057235 | A1 | 3/2010 | Wang et al. |
| 2010/0058231 | A1 | 3/2010 | Duarte et al. |
| 2010/0061637 | A1 | 3/2010 | Mochizuki et al. |
| 2010/0070908 | A1 | 3/2010 | Mori et al. |
| 2010/0073329 | A1 | 3/2010 | Raman et al. |
| 2010/0083116 | A1 | 4/2010 | Akifusa et al. |
| 2010/0085302 | A1 | 4/2010 | Fairweather et al. |
| 2010/0085314 | A1 | 4/2010 | Kwok |
| 2010/0085317 | A1 | 4/2010 | Park et al. |
| 2010/0088596 | A1 | 4/2010 | Griffin et al. |
| 2010/0088639 | A1 | 4/2010 | Yach et al. |
| 2010/0110082 | A1 | 5/2010 | Myrick et al. |
| 2010/0111434 | A1 | 5/2010 | Madden |
| 2010/0127983 | A1 | 5/2010 | Irani et al. |
| 2010/0128002 | A1 | 5/2010 | Stacy et al. |
| 2010/0138776 | A1 | 6/2010 | Korhonen |
| 2010/0146507 | A1 | 6/2010 | Kang et al. |
| 2010/0148999 | A1 | 6/2010 | Casparian et al. |
| 2010/0149096 | A1 | 6/2010 | Migos et al. |
| 2010/0153879 | A1 | 6/2010 | Rimas-Ribikauskas et al. |
| 2010/0156813 | A1 | 6/2010 | Duarte et al. |
| 2010/0156818 | A1 | 6/2010 | Burrough et al. |
| 2010/0156823 | A1 | 6/2010 | Paleczny et al. |
| 2010/0156825 | A1 | 6/2010 | Sohn et al. |
| 2010/0171713 | A1 | 7/2010 | Kwok et al. |
| 2010/0175023 | A1 | 7/2010 | Gatlin et al. |
| 2010/0180225 | A1 | 7/2010 | Chiba et al. |
| 2010/0199227 | A1 | 8/2010 | Xiao et al. |
| 2010/0211872 | A1 | 8/2010 | Rolston et al. |
| 2010/0214239 | A1 | 8/2010 | Wu |
| 2010/0225604 | A1 | 9/2010 | Homma et al. |
| 2010/0231534 | A1 | 9/2010 | Chaudhri et al. |
| 2010/0235726 | A1 | 9/2010 | Ording et al. |
| 2010/0235746 | A1 | 9/2010 | Anzures |
| 2010/0251168 | A1 | 9/2010 | Fujita et al. |
| 2010/0271312 | A1 | 10/2010 | Alameh et al. |
| 2010/0271500 | A1 | 10/2010 | Park et al. |
| 2010/0277419 | A1 | 11/2010 | Ganey et al. |
| 2010/0277496 | A1 | 11/2010 | Kawanishi et al. |
| 2010/0281379 | A1 | 11/2010 | Meaney et al. |
| 2010/0281385 | A1 | 11/2010 | Meaney et al. |
| 2010/0289807 | A1 | 11/2010 | Yu et al. |
| 2010/0302177 | A1 | 12/2010 | Kim et al. |
| 2010/0302179 | A1 | 12/2010 | Ahn et al. |
| 2010/0306702 | A1 | 12/2010 | Warner |
| 2010/0308983 | A1 | 12/2010 | Conte et al. |
| 2010/0309147 | A1 | 12/2010 | Fleizach et al. |
| 2010/0313124 | A1 | 12/2010 | Privault et al. |
| 2010/0313156 | A1 | 12/2010 | Louch et al. |
| 2010/0313158 | A1 | 12/2010 | Lee et al. |
| 2010/0313166 | A1 | 12/2010 | Nakayama et al. |
| 2010/0315417 | A1 | 12/2010 | Cho et al. |
| 2010/0315438 | A1 | 12/2010 | Horodezky et al. |
| 2010/0321301 | A1 | 12/2010 | Casparian et al. |
| 2010/0325578 | A1 | 12/2010 | Mital et al. |
| 2011/0010626 | A1 | 1/2011 | Fino et al. |
| 2011/0012851 | A1 | 1/2011 | Ciesla et al. |
| 2011/0018695 | A1 | 1/2011 | Bells et al. |
| 2011/0035145 | A1 | 2/2011 | Yamasaki |
| 2011/0050576 | A1 | 3/2011 | Forutanpour et al. |
| 2011/0050588 | A1 | 3/2011 | Li et al. |
| 2011/0050591 | A1 | 3/2011 | Kim et al. |
| 2011/0050594 | A1 | 3/2011 | Kim et al. |
| 2011/0050629 | A1 | 3/2011 | Homma et al. |
| 2011/0050630 | A1 | 3/2011 | Ikeda |
| 2011/0050653 | A1 | 3/2011 | Miyazawa et al. |
| 2011/0054837 | A1 | 3/2011 | Ikeda |
| 2011/0055135 | A1 | 3/2011 | Dawson et al. |
| 2011/0055741 | A1 | 3/2011 | Jeon et al. |
| 2011/0057886 | A1 | 3/2011 | Ng et al. |
| 2011/0057903 | A1 | 3/2011 | Yamano et al. |
| 2011/0061029 | A1 | 3/2011 | Yeh et al. |
| 2011/0063248 | A1 | 3/2011 | Yoon |
| 2011/0069012 | A1 | 3/2011 | Martensson |
| 2011/0069016 | A1 | 3/2011 | Victor |

(56) References Cited

U.S. PATENT DOCUMENTS

2011/0070342 A1 3/2011 Wilkens
2011/0074697 A1 3/2011 Rapp et al.
2011/0080350 A1 4/2011 Almalki et al.
2011/0084910 A1 4/2011 Almalki et al.
2011/0087982 A1 4/2011 McCann et al.
2011/0087983 A1 4/2011 Shim
2011/0093815 A1 4/2011 Gobeil
2011/0093817 A1 4/2011 Song et al.
2011/0102340 A1 5/2011 Martin et al.
2011/0102829 A1 5/2011 Jourdan
2011/0107272 A1 5/2011 Aquilar
2011/0116716 A1 5/2011 Kwon et al.
2011/0126139 A1 5/2011 Jeong et al.
2011/0138295 A1 6/2011 Momchilov et al.
2011/0141031 A1 6/2011 McCullough et al.
2011/0141052 A1 6/2011 Bernstein et al.
2011/0144777 A1 6/2011 Firkins et al.
2011/0145752 A1 6/2011 Fagans
2011/0145753 A1 6/2011 Prakash
2011/0145759 A1 6/2011 Leffert et al.
2011/0145764 A1 6/2011 Higuchi et al.
2011/0149138 A1 6/2011 Watkins
2011/0163971 A1 7/2011 Wagner et al.
2011/0163978 A1 7/2011 Park et al.
2011/0164042 A1 7/2011 Chaudhri
2011/0167369 A1 7/2011 van Os
2011/0169765 A1 7/2011 Aono
2011/0175826 A1 7/2011 Moore et al.
2011/0175830 A1 7/2011 Miyazawa et al.
2011/0179368 A1 7/2011 King et al.
2011/0179381 A1 7/2011 King
2011/0181538 A1 7/2011 Aono
2011/0181751 A1 7/2011 Mizumori
2011/0185299 A1 7/2011 Hinckley et al.
2011/0185300 A1 7/2011 Hinckley et al.
2011/0185316 A1 7/2011 Reid et al.
2011/0193788 A1 8/2011 King et al.
2011/0193809 A1 8/2011 Walley et al.
2011/0193881 A1 8/2011 Rydenhag
2011/0197160 A1 8/2011 Kim et al.
2011/0201387 A1 8/2011 Paek et al.
2011/0202834 A1 8/2011 Mandryk et al.
2011/0202853 A1 8/2011 Mujkic
2011/0202879 A1 8/2011 Stovicek et al.
2011/0205163 A1 8/2011 Hinckley et al.
2011/0209088 A1 8/2011 Hinckley et al.
2011/0209093 A1 8/2011 Hinckley et al.
2011/0209097 A1 8/2011 Hinckley et al.
2011/0209099 A1 8/2011 Hinckley et al.
2011/0209104 A1 8/2011 Hinckley et al.
2011/0210931 A1 9/2011 Shai
2011/0215914 A1 9/2011 Edwards
2011/0221684 A1 9/2011 Rydenhag
2011/0221776 A1 9/2011 Shimotani et al.
2011/0231789 A1 9/2011 Bukurak et al.
2011/0238690 A1 9/2011 Arrasvouri et al.
2011/0239110 A1 9/2011 Garrett et al.
2011/0242029 A1 10/2011 Kasahara et al.
2011/0246877 A1 10/2011 Kwak et al.
2011/0248916 A1 10/2011 Griffin et al.
2011/0248948 A1 10/2011 Griffin et al.
2011/0252346 A1 10/2011 Chaudhri
2011/0252357 A1 10/2011 Chaudhri
2011/0252362 A1 10/2011 Cho et al.
2011/0258537 A1 10/2011 Rives et al.
2011/0263298 A1 10/2011 Park
2011/0267530 A1 11/2011 Chun
2011/0279381 A1 11/2011 Tong et al.
2011/0279395 A1 11/2011 Kuwabara et al.
2011/0279852 A1 11/2011 Oda et al.
2011/0285656 A1 11/2011 Yaksick et al.
2011/0285659 A1 11/2011 Kuwabara et al.
2011/0291945 A1 12/2011 Ewing, Jr. et al.
2011/0291951 A1 12/2011 Tong
2011/0296334 A1 12/2011 Ryu et al.
2011/0296351 A1 12/2011 Ewing, Jr. et al.
2011/0304559 A1 12/2011 Pasquero
2011/0304577 A1 12/2011 Brown et al.
2011/0310049 A1 12/2011 Homma et al.
2012/0005622 A1 1/2012 Park et al.
2012/0011437 A1 1/2012 James et al.
2012/0013541 A1 1/2012 Boka et al.
2012/0013542 A1 1/2012 Shenfield
2012/0019448 A1 1/2012 Pitkanen et al.
2012/0026110 A1 2/2012 Yamano
2012/0036441 A1 2/2012 Basir et al.
2012/0036556 A1 2/2012 LeBeau et al.
2012/0038580 A1 2/2012 Sasaki
2012/0044153 A1 2/2012 Arrasvouri et al.
2012/0056837 A1 3/2012 Park et al.
2012/0056848 A1 3/2012 Yamano et al.
2012/0062564 A1 3/2012 Miyashita et al.
2012/0062604 A1 3/2012 Lobo
2012/0062732 A1 3/2012 Marman et al.
2012/0066630 A1 3/2012 Kim et al.
2012/0066648 A1 3/2012 Rolleston et al.
2012/0081375 A1 4/2012 Robert et al.
2012/0084689 A1 4/2012 Ledet et al.
2012/0084713 A1 4/2012 Desai et al.
2012/0089932 A1 4/2012 Kano et al.
2012/0089942 A1 4/2012 Gammon
2012/0089951 A1 4/2012 Cassidy
2012/0096393 A1 4/2012 Shim et al.
2012/0096400 A1 4/2012 Cho
2012/0098780 A1 4/2012 Fujisawa et al.
2012/0102437 A1 4/2012 Worley et al.
2012/0105358 A1 5/2012 Momeyer et al.
2012/0105367 A1 5/2012 Son et al.
2012/0106852 A1 5/2012 Khawand et al.
2012/0113007 A1 5/2012 Koch et al.
2012/0113023 A1 5/2012 Koch et al.
2012/0126962 A1 5/2012 Ujii et al.
2012/0131495 A1 5/2012 Goossens et al.
2012/0139864 A1 6/2012 Sleeman et al.
2012/0146945 A1 6/2012 Miyazawa et al.
2012/0147052 A1 6/2012 Homma et al.
2012/0154328 A1 6/2012 Kono
2012/0159380 A1 6/2012 Kocienda et al.
2012/0169646 A1 7/2012 Berkes et al.
2012/0169716 A1 7/2012 Mihara
2012/0176403 A1 7/2012 Cha et al.
2012/0179967 A1 7/2012 Hayes
2012/0180001 A1 7/2012 Griffin et al.
2012/0182226 A1 7/2012 Tuli
2012/0183271 A1 7/2012 Forutanpour et al.
2012/0206393 A1 8/2012 Hillis et al.
2012/0216114 A1 8/2012 Privault et al.
2012/0218203 A1 8/2012 Kanki
2012/0235912 A1 9/2012 Laubach
2012/0240044 A1 9/2012 Johnson et al.
2012/0249575 A1 10/2012 Krolczyk et al.
2012/0249853 A1 10/2012 Krolczyk et al.
2012/0256846 A1 10/2012 Mak
2012/0256847 A1 10/2012 Mak et al.
2012/0256857 A1 10/2012 Mak
2012/0257071 A1 10/2012 Prentice
2012/0260220 A1 10/2012 Griffin
2012/0274591 A1 11/2012 Rimas-Ribikauskas et al.
2012/0274662 A1 11/2012 Kim et al.
2012/0284673 A1 11/2012 Lamb et al.
2012/0293449 A1 11/2012 Dietz
2012/0293551 A1 11/2012 Momeyer et al.
2012/0297041 A1 11/2012 Momchilov
2012/0304108 A1 11/2012 Jarrett et al.
2012/0304132 A1 11/2012 Sareen et al.
2012/0304133 A1 11/2012 Nan et al.
2012/0306748 A1 12/2012 Fleizach et al.
2012/0306764 A1 12/2012 Kamibeppu
2012/0306765 A1 12/2012 Moore
2012/0306766 A1 12/2012 Moore
2012/0306772 A1 12/2012 Tan et al.
2012/0306778 A1 12/2012 Wheeldreyer et al.
2012/0306927 A1 12/2012 Lee et al.
2012/0311429 A1 12/2012 Decker et al.

(56) References Cited

U.S. PATENT DOCUMENTS

| | | | |
|---|---|---|---|
| 2012/0311437 | A1 | 12/2012 | Weeldreyer et al. |
| 2012/0311498 | A1 | 12/2012 | Kluttz et al. |
| 2013/0002561 | A1 | 1/2013 | Wakasa |
| 2013/0016042 | A1 | 1/2013 | Makinen et al. |
| 2013/0016122 | A1 | 1/2013 | Bhatt et al. |
| 2013/0019158 | A1 | 1/2013 | Watanabe |
| 2013/0019174 | A1 | 1/2013 | Gil et al. |
| 2013/0031514 | A1 | 1/2013 | Gabbert |
| 2013/0036386 | A1 | 2/2013 | Park et al. |
| 2013/0044062 | A1 | 2/2013 | Bose et al. |
| 2013/0047100 | A1 | 2/2013 | Kroeger et al. |
| 2013/0050131 | A1 | 2/2013 | Lee et al. |
| 2013/0050143 | A1 | 2/2013 | Kim et al. |
| 2013/0061172 | A1 | 3/2013 | Huang et al. |
| 2013/0063389 | A1 | 3/2013 | Moore |
| 2013/0067383 | A1 | 3/2013 | Kataoka et al. |
| 2013/0067513 | A1 | 3/2013 | Takami |
| 2013/0067527 | A1 | 3/2013 | Ashbook et al. |
| 2013/0074003 | A1 | 3/2013 | Dolenc |
| 2013/0077804 | A1 | 3/2013 | Glebe et al. |
| 2013/0082824 | A1 | 4/2013 | Colley |
| 2013/0086056 | A1 | 4/2013 | Dyor et al. |
| 2013/0093691 | A1 | 4/2013 | Moosavi |
| 2013/0093764 | A1 | 4/2013 | Andersson et al. |
| 2013/0097520 | A1 | 4/2013 | Lewin et al. |
| 2013/0097521 | A1 | 4/2013 | Lewin et al. |
| 2013/0097534 | A1 | 4/2013 | Lewin et al. |
| 2013/0097539 | A1 | 4/2013 | Mansson et al. |
| 2013/0097556 | A1 | 4/2013 | Louch |
| 2013/0097562 | A1 | 4/2013 | Kermoian et al. |
| 2013/0111398 | A1 | 5/2013 | Lu et al. |
| 2013/0113715 | A1 | 5/2013 | Grant et al. |
| 2013/0113720 | A1 | 5/2013 | Van Eerd et al. |
| 2013/0120278 | A1 | 5/2013 | Cantrell |
| 2013/0120295 | A1 | 5/2013 | Kim et al. |
| 2013/0120306 | A1 | 5/2013 | Furukawa |
| 2013/0125039 | A1 | 5/2013 | Murata |
| 2013/0135243 | A1 | 5/2013 | Hirsch et al. |
| 2013/0135499 | A1 | 5/2013 | Song |
| 2013/0141364 | A1 | 6/2013 | Lynn et al. |
| 2013/0141396 | A1 | 6/2013 | Lynn et al. |
| 2013/0145313 | A1 | 6/2013 | Roh et al. |
| 2013/0154948 | A1 | 6/2013 | Schediwy et al. |
| 2013/0154959 | A1 | 6/2013 | Lindsay et al. |
| 2013/0155018 | A1 | 6/2013 | Dagdeviren |
| 2013/0159893 | A1 | 6/2013 | Lewis et al. |
| 2013/0162603 | A1 | 6/2013 | Peng et al. |
| 2013/0162667 | A1 | 6/2013 | Eskolin et al. |
| 2013/0169549 | A1 | 7/2013 | Seymour et al. |
| 2013/0174049 | A1 | 7/2013 | Townsend et al. |
| 2013/0174089 | A1 | 7/2013 | Ki |
| 2013/0174094 | A1 | 7/2013 | Heo et al. |
| 2013/0174179 | A1 | 7/2013 | Park et al. |
| 2013/0179840 | A1 | 7/2013 | Fisher et al. |
| 2013/0191791 | A1 | 7/2013 | Rydenhag et al. |
| 2013/0194217 | A1 | 8/2013 | Lee et al. |
| 2013/0194480 | A1 | 8/2013 | Fukata et al. |
| 2013/0198690 | A1 | 8/2013 | Barsoum et al. |
| 2013/0212515 | A1 | 8/2013 | Eleftheriou |
| 2013/0212541 | A1 | 8/2013 | Dolenc et al. |
| 2013/0215079 | A1 | 8/2013 | Johnson et al. |
| 2013/0222274 | A1 | 8/2013 | Mori et al. |
| 2013/0222333 | A1 | 8/2013 | Miles et al. |
| 2013/0222671 | A1 | 8/2013 | Tseng et al. |
| 2013/0227419 | A1 | 8/2013 | Lee et al. |
| 2013/0227450 | A1 | 8/2013 | Na et al. |
| 2013/0232402 | A1 | 9/2013 | Lu et al. |
| 2013/0234929 | A1 | 9/2013 | Libin |
| 2013/0239057 | A1 | 9/2013 | Ubillos et al. |
| 2013/0249814 | A1 | 9/2013 | Zeng |
| 2013/0257793 | A1 | 10/2013 | Zeliff et al. |
| 2013/0257817 | A1 | 10/2013 | Yliaho |
| 2013/0265246 | A1 | 10/2013 | Tae |
| 2013/0268875 | A1 | 10/2013 | Han et al. |
| 2013/0278520 | A1 | 10/2013 | Weng et al. |
| 2013/0293496 | A1 | 11/2013 | Takamoto |
| 2013/0305184 | A1 | 11/2013 | Kim et al. |
| 2013/0307792 | A1 | 11/2013 | Andres et al. |
| 2013/0314434 | A1 | 11/2013 | Shetterly et al. |
| 2013/0321340 | A1 | 12/2013 | Seo et al. |
| 2013/0321457 | A1 | 12/2013 | Bauermeister et al. |
| 2013/0325342 | A1 | 12/2013 | Pylappan et al. |
| 2013/0326420 | A1 | 12/2013 | Liu et al. |
| 2013/0326421 | A1 | 12/2013 | Jo |
| 2013/0328770 | A1 | 12/2013 | Parham |
| 2013/0332836 | A1 | 12/2013 | Cho |
| 2013/0332892 | A1 | 12/2013 | Matsuki |
| 2013/0335373 | A1 | 12/2013 | Tomiyasu |
| 2013/0339909 | A1 | 12/2013 | Ha |
| 2014/0002355 | A1 | 1/2014 | Lee et al. |
| 2014/0002374 | A1 | 1/2014 | Hunt et al. |
| 2014/0002386 | A1 | 1/2014 | Rosenberg et al. |
| 2014/0026098 | A1 | 1/2014 | Gilman |
| 2014/0028571 | A1 | 1/2014 | St. Clair |
| 2014/0028601 | A1 | 1/2014 | Moore |
| 2014/0049491 | A1 | 2/2014 | Nagar et al. |
| 2014/0055367 | A1 | 2/2014 | Dearman et al. |
| 2014/0055377 | A1 | 2/2014 | Kim |
| 2014/0059460 | A1 | 2/2014 | Ho |
| 2014/0059485 | A1 | 2/2014 | Lehrian et al. |
| 2014/0062956 | A1 | 3/2014 | Ishizone et al. |
| 2014/0063316 | A1 | 3/2014 | Lee et al. |
| 2014/0063541 | A1 | 3/2014 | Yamazaki |
| 2014/0072281 | A1 | 3/2014 | Cho et al. |
| 2014/0072283 | A1 | 3/2014 | Cho et al. |
| 2014/0078318 | A1 | 3/2014 | Alameh |
| 2014/0078343 | A1 | 3/2014 | Dai et al. |
| 2014/0082536 | A1 | 3/2014 | Costa et al. |
| 2014/0092025 | A1 | 4/2014 | Pala et al. |
| 2014/0092030 | A1 | 4/2014 | Van der Velden |
| 2014/0108936 | A1 | 4/2014 | Khosropour et al. |
| 2014/0109016 | A1 | 4/2014 | Ouyang et al. |
| 2014/0111456 | A1 | 4/2014 | Kashiwa et al. |
| 2014/0111480 | A1 | 4/2014 | Kim et al. |
| 2014/0111670 | A1 | 4/2014 | Lord et al. |
| 2014/0118268 | A1 | 5/2014 | Kuscher |
| 2014/0123080 | A1 | 5/2014 | Gan |
| 2014/0139456 | A1 | 5/2014 | Wigdor et al. |
| 2014/0139471 | A1 | 5/2014 | Matsuki |
| 2014/0152581 | A1 | 6/2014 | Case et al. |
| 2014/0157203 | A1 | 6/2014 | Jeon et al. |
| 2014/0160063 | A1 | 6/2014 | Yairi et al. |
| 2014/0160073 | A1 | 6/2014 | Matsuki |
| 2014/0164955 | A1 | 6/2014 | Thiruvidam et al. |
| 2014/0164966 | A1 | 6/2014 | Kim et al. |
| 2014/0165006 | A1 | 6/2014 | Chaudhri et al. |
| 2014/0168093 | A1 | 6/2014 | Lawrence |
| 2014/0168153 | A1 | 6/2014 | Deichmann et al. |
| 2014/0173517 | A1 | 6/2014 | Chaudhri |
| 2014/0179377 | A1 | 6/2014 | Song et al. |
| 2014/0184526 | A1 | 7/2014 | Cho |
| 2014/0201660 | A1 | 7/2014 | Clausen et al. |
| 2014/0208271 | A1 | 7/2014 | Bell et al. |
| 2014/0210753 | A1 | 7/2014 | Lee et al. |
| 2014/0210758 | A1 | 7/2014 | Park et al. |
| 2014/0210760 | A1 | 7/2014 | Aberg et al. |
| 2014/0210798 | A1 | 7/2014 | Wilson |
| 2014/0223376 | A1 | 8/2014 | Tarvainen et al. |
| 2014/0229888 | A1 | 8/2014 | Ko et al. |
| 2014/0237408 | A1 | 8/2014 | Ohlsson et al. |
| 2014/0245202 | A1 | 8/2014 | Yoon et al. |
| 2014/0245367 | A1 | 8/2014 | Sasaki et al. |
| 2014/0267114 | A1 | 9/2014 | Lisseman et al. |
| 2014/0267135 | A1 | 9/2014 | Chhabra |
| 2014/0267362 | A1 | 9/2014 | Kocienda et al. |
| 2014/0282084 | A1 | 9/2014 | Murarka et al. |
| 2014/0282214 | A1 | 9/2014 | Shirzadi et al. |
| 2014/0300569 | A1 | 10/2014 | Matsuki et al. |
| 2014/0304651 | A1 | 10/2014 | Johansson et al. |
| 2014/0306897 | A1 | 10/2014 | Cueto |
| 2014/0306899 | A1 | 10/2014 | Hicks |
| 2014/0310638 | A1 | 10/2014 | Lee et al. |
| 2014/0313130 | A1 | 10/2014 | Yamano et al. |
| 2014/0333551 | A1 | 11/2014 | Kim et al. |

(56) References Cited

U.S. PATENT DOCUMENTS

2014/0333561 A1 11/2014 Bull et al.
2014/0344765 A1 11/2014 Hicks et al.
2014/0354845 A1 12/2014 Molgaard et al.
2014/0354850 A1 12/2014 Kosaka et al.
2014/0359438 A1 12/2014 Matsuki
2014/0359528 A1 12/2014 Murata
2014/0365945 A1 12/2014 Karunamuni et al.
2014/0380247 A1 12/2014 Tecarro et al.
2015/0015763 A1 1/2015 Lee et al.
2015/0020036 A1 1/2015 Kim et al.
2015/0026584 A1 1/2015 Kobayakov et al.
2015/0026592 A1 1/2015 Mohammed et al.
2015/0029149 A1 1/2015 Andersson et al.
2015/0033184 A1 1/2015 Kim et al.
2015/0042588 A1 2/2015 Park
2015/0046876 A1 2/2015 Goldenberg
2015/0049033 A1 2/2015 Kim et al.
2015/0058723 A1 2/2015 Cieplinski et al.
2015/0067559 A1 2/2015 Missig et al.
2015/0062046 A1 3/2015 Cho et al.
2015/0062052 A1* 3/2015 Bernstein .............. G06F 3/0416 345/173
2015/0062068 A1 3/2015 Shih et al.
2015/0067495 A1 3/2015 Bernstein et al.
2015/0067496 A1 3/2015 Missig et al.
2015/0067497 A1 3/2015 Cieplinski et al.
2015/0067513 A1 3/2015 Zambetti et al.
2015/0067519 A1 3/2015 Missig et al.
2015/0067534 A1 3/2015 Choi et al.
2015/0067560 A1 3/2015 Cieplinski et al.
2015/0067596 A1 3/2015 Brown et al.
2015/0067601 A1 3/2015 Bernstein et al.
2015/0067602 A1 3/2015 Bernstein et al.
2015/0067605 A1 3/2015 Zambetti et al.
2015/0071547 A1 3/2015 Keating et al.
2015/0116205 A1 4/2015 Westerman et al.
2015/0121218 A1 4/2015 Kim et al.
2015/0121225 A1 4/2015 Somasundaram et al.
2015/0067563 A1 5/2015 Bernstein et al.
2015/0128092 A1 5/2015 Lee et al.
2015/0135109 A1 5/2015 Zambetti et al.
2015/0138126 A1 5/2015 Westerman
2015/0138155 A1 5/2015 Bernstein et al.
2015/0139605 A1 5/2015 Wiklof
2015/0143273 A1 5/2015 Bernstein et al.
2015/0143284 A1 5/2015 Bennett et al.
2015/0149899 A1* 5/2015 Bernstein ................ G06F 3/016 715/702
2015/0149964 A1 5/2015 Bernstein et al.
2015/0149967 A1 5/2015 Bernstein et al.
2015/0153897 A1 6/2015 Huang et al.
2015/0153929 A1 6/2015 Bernstein et al.
2015/0160729 A1 6/2015 Nakagawa
2015/0185840 A1 7/2015 Golyshko et al.
2015/0193099 A1 7/2015 Murphy
2015/0193951 A1 7/2015 Lee et al.
2015/0205495 A1 7/2015 Koide et al.
2015/0234446 A1 8/2015 Nathan et al.
2015/0234493 A1 8/2015 Parivar et al.
2015/0253866 A1 9/2015 Amm et al.
2015/0268786 A1 9/2015 Kitada
2015/0268813 A1 9/2015 Bos
2015/0321607 A1 11/2015 Cho et al.
2015/0332107 A1 11/2015 Paniaras
2015/0378519 A1 12/2015 Brown et al.
2015/0378982 A1 12/2015 McKenzie et al.
2015/0381931 A1 12/2015 Uhma et al.
2016/0004373 A1 1/2016 Huang
2016/0004393 A1 1/2016 Faaborg et al.
2016/0004427 A1 1/2016 Zambetti et al.
2016/0004428 A1 1/2016 Bernstein et al.
2016/0004429 A1 1/2016 Bernstein et al.
2016/0004430 A1 1/2016 Missig et al.
2016/0004431 A1 1/2016 Bernstein et al.
2016/0004432 A1 1/2016 Bernstein et al.
2016/0011771 A1 1/2016 Cieplinski
2016/0019718 A1 1/2016 Mukkamala et al.
2016/0021511 A1 1/2016 Jin et al.
2016/0041750 A1 2/2016 Cieplinski et al.
2016/0048326 A1 2/2016 Kim et al.
2016/0062466 A1 3/2016 Moussette et al.
2016/0062619 A1 3/2016 Reeve et al.
2016/0070401 A1 3/2016 Kim et al.
2016/0132139 A1 5/2016 Du et al.
2016/0188181 A1 6/2016 Smith
2016/0196028 A1 7/2016 Kenney et al.
2016/0210025 A1 7/2016 Bernstein et al.
2016/0224220 A1 8/2016 Ganguly
2016/0259412 A1 9/2016 Flint et al.
2016/0259413 A1 9/2016 Anzures et al.
2016/0259495 A1 9/2016 Butcher et al.
2016/0259496 A1 9/2016 Butcher et al.
2016/0259497 A1 9/2016 Foss et al.
2016/0259498 A1 9/2016 Foss et al.
2016/0259499 A1 9/2016 Kocienda et al.
2016/0259516 A1 9/2016 Kudurshian et al.
2016/0259517 A1 9/2016 Butcher et al.
2016/0259518 A1 9/2016 King et al.
2016/0259519 A1 9/2016 Foss et al.
2016/0259527 A1 9/2016 Kocienda et al.
2016/0259528 A1 9/2016 Foss et al.
2016/0259536 A1 9/2016 Kudurshian et al.
2016/0259548 A1 9/2016 Ma
2016/0274686 A1 9/2016 Ruiz et al.
2016/0274728 A1 9/2016 Luo et al.
2016/0274761 A1 9/2016 Ruiz et al.
2016/0283054 A1 9/2016 Suzuki
2016/0320906 A1 11/2016 Bokma et al.
2016/0334960 A1 11/2016 Brown et al.
2016/0357305 A1 12/2016 Wells et al.
2016/0357368 A1 12/2016 Federighi et al.
2016/0357387 A1 12/2016 Penha et al.
2016/0357389 A1 12/2016 Dakin et al.
2016/0357390 A1 12/2016 Federighi et al.
2016/0357400 A1 12/2016 Penha et al.
2016/0357404 A1 12/2016 Alonso Ruiz et al.
2016/0360097 A1 12/2016 Penha et al.
2016/0360098 A1 12/2016 King et al.
2016/0360116 A1 12/2016 Penha et al.
2017/0045981 A1 2/2017 Karunamuni et al.
2017/0046039 A1 2/2017 Karunamuni et al.
2017/0046058 A1 2/2017 Karunamuni et al.
2017/0046059 A1 2/2017 Karunamuni et al.
2017/0046060 A1 2/2017 Karunamuni et al.
2017/0075520 A1 3/2017 Bauer et al.
2017/0075562 A1 3/2017 Bauer et al.
2017/0075563 A1 3/2017 Bauer et al.
2017/0109011 A1 4/2017 Jiang
2017/0124699 A1 5/2017 Lane
2017/0139565 A1 5/2017 Choi
2018/0024681 A1 1/2018 Bernstein et al.
2018/0188920 A1 7/2018 Bernstein et al.
2018/0275862 A1 9/2018 Khoe et al.

FOREIGN PATENT DOCUMENTS

CN 101118469 A 2/2008
CN 101202866 A 6/2008
CN 101222704 A 7/2008
CN 101241397 A 8/2008
CN 101320303 A 12/2008
CN 100524183 8/2009
CN 101593077 A 12/2009
CN 101650615 A 2/2010
CN 101809526 A 8/2010
CN 102004593 A 4/2011
CN 102112946 A 6/2011
CN 102160021 A 8/2011
CN 102214038 A 10/2011
CN 102349038 A 2/2012
CN 102385478 A 3/2012
CN 102438092 A 5/2012
CN 102483677 A 5/2012
CN 102646013 A 8/2012

(56) References Cited

FOREIGN PATENT DOCUMENTS

| | | | |
|---|---|---|---|
| CN | 102662573 | A | 9/2012 |
| CN | 102841677 | A | 12/2012 |
| CN | 103097992 | A | 5/2013 |
| CN | 103186345 | A | 7/2013 |
| CN | 103518176 | A | 1/2014 |
| DE | 100 59 906 | A1 | 6/2002 |
| EP | 0 859 307 | A1 | 3/1998 |
| EP | 0 880 090 | A2 | 11/1998 |
| EP | 1 028 583 | A1 | 8/2000 |
| EP | 1 406 150 | A1 | 4/2004 |
| EP | 1 674 977 | A2 | 6/2006 |
| EP | 1 882 902 | A1 | 1/2008 |
| EP | 2 000 896 | A2 | 12/2008 |
| EP | 2 017 701 | A1 | 1/2009 |
| EP | 2 028 583 | A2 | 2/2009 |
| EP | 2 141 574 | A2 | 1/2010 |
| EP | 2 175 357 | A1 | 4/2010 |
| EP | 2 196 893 | A2 | 6/2010 |
| EP | 2 214 087 | A1 | 8/2010 |
| EP | 2 226 715 | A2 | 9/2010 |
| EP | 2 299 351 | A2 | 3/2011 |
| EP | 2 302 496 | A1 | 3/2011 |
| EP | 2 375 309 | A1 | 10/2011 |
| EP | 2 375 314 | A1 | 10/2011 |
| EP | 2 386 935 | A1 | 11/2011 |
| EP | 2 407 868 | A1 | 1/2012 |
| EP | 2 420 924 | A2 | 2/2012 |
| EP | 2 426 580 | A2 | 3/2012 |
| EP | 2 447 818 | A1 | 5/2012 |
| EP | 2 527 966 | A2 | 11/2012 |
| EP | 2 530 677 | A2 | 12/2012 |
| EP | 2 541 376 | A1 | 1/2013 |
| EP | 2 555 500 | A1 | 2/2013 |
| EP | 2 615 535 | A1 | 7/2013 |
| EP | 2 631 737 | A1 | 8/2013 |
| EP | 2 674 846 | A2 | 12/2013 |
| EP | 2 708 985 | A1 | 3/2014 |
| EP | 2 733 578 | A2 | 5/2014 |
| EP | 2 808 764 | A1 | 12/2014 |
| EP | 2 809 058 | A1 | 12/2014 |
| EP | 2 813 938 | A1 | 12/2014 |
| GB | 2 402 105 | A | 12/2004 |
| JP | 58-182746 | | 10/1983 |
| JP | H06-161647 | A | 6/1994 |
| JP | H07-98769 | A | 4/1995 |
| JP | H07-104915 | | 4/1995 |
| JP | H07-151512 | A | 6/1995 |
| JP | H08-227341 | A | 9/1996 |
| JP | H09-269883 | A | 10/1997 |
| JP | H09-330175 | A | 12/1997 |
| JP | H11-203044 | A | 7/1999 |
| JP | 2001-202192 | A | 7/2001 |
| JP | 2001-306207 | A | 11/2001 |
| JP | 2002-149312 | A | 5/2002 |
| JP | 2003-157131 | A | 5/2003 |
| JP | 2003-186597 | A | 7/2003 |
| JP | 2004-054861 | A | 2/2004 |
| JP | 2004-062648 | A | 2/2004 |
| JP | 2004-070492 | A | 3/2004 |
| JP | 2004-086733 | A | 3/2004 |
| JP | 2005-031786 | A | 2/2005 |
| JP | 2005-092386 | A | 4/2005 |
| JP | 2005-135106 | A | 5/2005 |
| JP | 2005-157842 | A | 6/2005 |
| JP | 2005-196810 | A | 7/2005 |
| JP | 2006-185443 | A | 7/2006 |
| JP | 2007-116384 | A | 5/2007 |
| JP | 2007-264808 | A | 10/2007 |
| JP | 2008-009759 | A | 1/2008 |
| JP | 2008-015890 | A | 1/2008 |
| JP | 2008-033739 | A | 2/2008 |
| JP | 2008-516348 | A | 5/2008 |
| JP | 2008-146453 | A | 6/2008 |
| JP | 2008-537615 | | 9/2008 |
| JP | 2008 305174 | A | 12/2008 |
| JP | 2009-500761 | | 1/2009 |
| JP | 2009-110243 | A | 5/2009 |
| JP | 2009-129171 | A | 6/2009 |
| JP | 2009-211704 | A | 9/2009 |
| JP | 2009-217543 | A | 9/2009 |
| JP | 2009-294688 | A | 12/2009 |
| JP | 2010-009321 | A | 1/2010 |
| JP | 2010-503130 | A | 1/2010 |
| JP | 2010-055274 | A | 3/2010 |
| JP | 2010-097353 | A | 4/2010 |
| JP | 2010-146507 | A | 7/2010 |
| JP | 2010-152716 | A | 7/2010 |
| JP | 2010-176174 | A | 8/2010 |
| JP | 2010-176337 | A | 8/2010 |
| JP | 2010-181934 | A | 8/2010 |
| JP | 2010-541071 | A | 12/2010 |
| JP | 2011-501307 | A | 1/2011 |
| JP | 2011-048666 | A | 3/2011 |
| JP | 2011-048686 | A | 3/2011 |
| JP | 2011-048762 | A | 3/2011 |
| JP | 2011-048832 | A | 3/2011 |
| JP | 2011-053831 | A | 3/2011 |
| JP | 2011-053972 | A | 3/2011 |
| JP | 2011-053973 | A | 3/2011 |
| JP | 2011-053974 | A | 3/2011 |
| JP | 2011-059821 | A | 3/2011 |
| JP | 2011-070342 | A | 4/2011 |
| JP | 2011-100290 | A | 5/2011 |
| JP | 2011-107823 | A | 6/2011 |
| JP | 2011-123773 | A | 6/2011 |
| JP | 2011-141868 | A | 7/2011 |
| JP | 2011-192179 | A | 9/2011 |
| JP | 2011-192215 | A | 9/2011 |
| JP | 2011-197848 | A | 10/2011 |
| JP | 2011-221640 | A | 11/2011 |
| JP | 2011-242386 | A | 12/2011 |
| JP | 2011-253556 | A | 12/2011 |
| JP | 2011-257941 | A | 12/2011 |
| JP | 2011-530101 | A | 12/2011 |
| JP | 2012-027940 | A | 2/2012 |
| JP | 2012-043266 | A | 3/2012 |
| JP | 2012-043267 | A | 3/2012 |
| JP | 2012-053754 | | 3/2012 |
| JP | 2012-053926 | A | 3/2012 |
| JP | 2012-073873 | A | 4/2012 |
| JP | 2012-509605 | A | 4/2012 |
| JP | 2012-093820 | A | 5/2012 |
| JP | 2012-118993 | A | 6/2012 |
| JP | 2012-123564 | A | 6/2012 |
| JP | 2012-128825 | A | 7/2012 |
| JP | 2013-030050 | A | 2/2013 |
| JP | 2013-058149 | A | 3/2013 |
| JP | 2013-080521 | A | 5/2013 |
| JP | 2013-529339 | A | 7/2013 |
| JP | 2013-542488 | A | 11/2013 |
| JP | 2014-130567 | A | 7/2014 |
| JP | 2014-140112 | A | 7/2014 |
| JP | 2014-519109 | A | 8/2014 |
| JP | 2014-529137 | A | 10/2014 |
| JP | 2015-153420 | A | 8/2015 |
| KR | 2006-0071353 | A | 6/2006 |
| KR | 2008-0045143 | A | 4/2008 |
| KR | 2008-0054346 | A | 6/2008 |
| KR | 2010-0014095 | A | 2/2010 |
| KR | 2010 0133246 | A | 12/2010 |
| KR | 2011 0086501 | A | 7/2011 |
| KR | 20120103670 | A | 9/2012 |
| KR | 2013 0099647 | A | 9/2013 |
| KR | 2014 0016495 | A | 2/2014 |
| KR | 2014 0043760 | A | 4/2014 |
| KR | 2014 0079110 | A | 6/2014 |
| KR | 20150021977 | A | 3/2015 |
| RU | 2007145218 | A | 7/2009 |
| WO | WO 2005/106637 | A2 | 11/2005 |
| WO | WO 2006/013485 | A2 | 2/2006 |
| WO | WO 2006/042309 | A1 | 4/2006 |
| WO | WO 2006/094308 | A2 | 9/2006 |
| WO | WO 2007/121557 | A1 | 11/2007 |
| WO | WO 2008/030976 | A2 | 3/2008 |

(56) References Cited

FOREIGN PATENT DOCUMENTS

| | | | |
|---|---|---|---|
| WO | WO 2008/064142 | A2 | 5/2008 |
| WO | WO 2009/155981 | A1 | 12/2009 |
| WO | WO 2009/158549 | A2 | 12/2009 |
| WO | WO 2010/013876 | A1 | 2/2010 |
| WO | WO 2010/032598 | A1 | 2/2010 |
| WO | WO 2010/090010 | A1 | 8/2010 |
| WO | WO 2010/122813 | A1 | 10/2010 |
| WO | WO 2011/024389 | A1 | 3/2011 |
| WO | WO 2011/024465 | A1 | 3/2011 |
| WO | WO 2011/093045 | A1 | 8/2011 |
| WO | WO 2011/105009 | A1 | 9/2011 |
| WO | WO 2011/108190 | A1 | 9/2011 |
| WO | WO 2011/115187 | A1 | 9/2011 |
| WO | WO 2011/121375 | A1 | 10/2011 |
| WO | WO 2012/021417 | A1 | 2/2012 |
| WO | WO 2012/037664 | | 3/2012 |
| WO | WO 2012/096804 | A2 | 7/2012 |
| WO | WO 2012/108213 | A1 | 8/2012 |
| WO | WO 2012/114760 | A1 | 8/2012 |
| WO | WO 2012/150540 | A2 | 11/2012 |
| WO | WO 2012/153555 | A1 | 11/2012 |
| WO | WO 2013/169299 | A1 | 11/2013 |
| WO | WO 2013/169300 | A1 | 11/2013 |
| WO | WO 2013/169302 | A1 | 11/2013 |
| WO | WO 2013/169845 | A1 | 11/2013 |
| WO | WO 2013/169849 | A2 | 11/2013 |
| WO | WO 2013/169851 | A2 | 11/2013 |
| WO | WO 2013/169853 | A1 | 11/2013 |
| WO | WO 2013/169854 | A2 | 11/2013 |
| WO | WO 2013/169870 | A1 | 11/2013 |
| WO | WO 2013/169875 | A2 | 11/2013 |
| WO | WO 2013/169877 | A2 | 11/2013 |
| WO | WO 2013/169882 | A2 | 11/2013 |
| WO | WO 2013/173838 | A2 | 11/2013 |
| WO | WO 2014/105275 | A1 | 7/2014 |
| WO | WO 2014/105276 | A1 | 7/2014 |
| WO | WO 2014/105277 | A1 | 7/2014 |
| WO | WO 2014/105278 | A1 | 7/2014 |
| WO | WO 2014/105279 | A1 | 7/2014 |
| WO | WO 2014/129655 | A1 | 8/2014 |
| WO | WO 2014/149473 | A1 | 9/2014 |
| WO | WO 2014/200733 | A1 | 12/2014 |
| WO | WO 2016/200584 | A2 | 12/2016 |

OTHER PUBLICATIONS

Anonymous, "Google Android 5.0 Release Date, Specs and Editors Hands on Review—CNET", http://www.cnet.com/products/google-an-android-5-0-lollipop/, Mar. 12, 2015, 10 pages.

Sood, "MultitaskingGestures", http://cydia.saurik.com/package/org.thebigboxx.multitaskinggestures/, Mar. 3, 2014, 2 pages.

YouTube, "Multitasking Gestures: Zephyr Like Gestures on iOS", https://www.youtube.com/watch?v=Jcod-f7Lw0I, Jan. 27, 2014, 3 pages.

YouTube, "Recentz—Recent Apps in a Tap", https://www.youtube.com/watch?v=qailSHRgsTo, May 15, 2015, 1 page.

Certificate of Grant, dated Apr. 29, 2017, received in Australian Patent Application No. 2013368440, which corresponds with U.S. Appl. No. 14/536,426, 3 pages.

Office Action, dated Nov. 6, 2017, received in Chinese Patent Application No. 201380068493.6, which corresponds with U.S. Appl. No. 14/608,895, 5 pages.

Office Action, dated Sep. 19, 2017, received in Chinese Patent Application No. 201380035982.1, which corresponds with U.S. Appl. No. 14/536,426, 5 pages.

Office Action, dated Sep. 20, 2017, received in Chinese Patent Application No. 201510566550.4, which corresponds with U.S. Appl. No. 14/536,426, 11 pages.

Office Action, dated Aug. 21, 2017, received in European Patent Application No. 15183980.0, which corresponds with U.S. Appl. No. 14/536,426, 3 pages.

Final Office Action, dated Aug. 25, 2017, received in U.S. Appl. No. 14/536,464, 30 pages.

Office Action, dated Sep. 25, 2017, received in U.S. Appl. No. 14/536,644, 29 pages.

Office Action, dated Oct. 19, 2017, received in U.S. Appl. No. 14/608,926, 14 pages.

Office Action, dated Aug. 22, 2017, received in Korean Patent Application No. 2017-7018250, which corresponds with U.S. Appl. No. 14/608,926, 2 pages.

Notice of Allowance, dated Oct. 9, 2017, received in Chinese Patent Application No. 2013800362059, which corresponds with U.S. Appl. No. 14/536,646, 3 pages.

Office Action, dated Oct. 19, 2017, received in U.S. Appl. No. 14/536,646, 21 pages.

Notice of Allowance, dated Sep. 20, 2017, received in U.S. Appl. No. 14/536,141, 10 pages.

Patent, dated Jul. 28, 2017, received in Japanese Patent Application No. 2015-511646, which corresponds with U.S. Appl. No. 14/536,141, 3 pages.

Office Action, dated Oct. 25, 2017, received in Chinese Patent Application No. 201380035977.0, which corresponds with U.S. Appl. No. 14/536,203, 5 pages.

Notice of Allowance, dated Oct. 30, 2017, received in Korean Patent Application No. 2016-7033834, which correponds with U.S. Appl. No. 14/536,203, 5 pages.

Office Action, dated Oct. 20, 2017, received in U.S. Appl. No. 14/608,965, 14 pages.

Office action, dated Oct. 11, 2017, received in Chinese Patent Application No. 201380074060.1, which corresponds with U.S. Appl. No. 14/608,965, 5 pages.

Notice of Allowance, dated Nov. 9, 2017, received in U.S. Appl. No. 14/536,267, 8 pages.

Office Action, dated Sep. 13, 2017, received in European Patent Application No. 16177863.4, which corresponds with U.S. Appl. No. 14/536,267, 6 pages.

Notice of Allowance, dated Sep. 1, 2017, received in Korean Patent Application No. 2016-7029533, which corresponds with U.S. Appl. No. 14/536,267, 4 pages.

Office Action, dated Oct. 23, 2017, received in Chinese Patent Application No. 201380035986.X, which corresponds with U.S. Appl. No. 14/536,291, 9 pages.

Office Action, dated Oct. 19, 2017, received in U.S. Appl. No. 14/608,985, 13 pages.

Notice of Allowance, dated Sep. 19, 2017, received in Chinese Patent Application No. 201380068399.0, which corresponds with U.S. Appl. No. 14/608,985, 3 pages.

Summons, dated Oct. 6, 2017, received in European Patent Application No. 13811032.5, which corresponds with U.S. Appl. No. 14/608,985, 6 pages.

Notice of Allowance, dated Sep. 19, 2017, received in Korean Patent Application No. 2015-7019984, which corresponds with U.S. Appl. No. 14/608,985, 4 pages.

Final Office Action, dated Sep. 21, 2017, received in U.S. Appl. No. 14/609,006, 17 pages.

Final Office Action, dated Nov. 2, 2017, received in U.S. Appl. No. 14/536,296, 13 pages.

Office Action, dated Nov. 1, 2017, received in U.S. Appl. No. 14/536,648, 22 pages.

Patent, dated Jul. 28, 2017, received in Japanese Patent Application No. 2016-558331, which corresponds with U.S. Appl. No. 14/864,737, 3 pages.

Patent, dated Jul. 12, 2017, received in Dutch Patent Application No. 2016452, which corresponds with U.S. Appl. No. 14/864,737, 2 pages.

Patent, dated Sep. 7, 2017, received in Dutch Patent Application No. 2016377, which corresponds with U.S. Appl. No. 14/866,159, 4 pages.

Office Action, dated Oct. 6, 2017, received in U.S. Appl. No. 14/868,078, 40 pages.

Notice of Allowance, dated Sep. 1, 2017, received in Australian Patent Application No. 2016229421, which corresponds with U.S. Appl. No. 14/868,078, 3 pages.

(56) References Cited

OTHER PUBLICATIONS

Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Patent, dated Aug. 18, 2017, received in Japanese Patent Application No. 2016558214, which corresponds with U.S. Appl. No. 14/866,511, 3 pages.
Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Final Office Action, dated Nov. 15, 2017, received in U.S. Appl. No. 14/856,519, 31 pages.
Office Action, dated Sep. 22, 2017, received in Japanese Patent Application No. 2017-029201, which corresponds with U.S. Appl. No. 14/857,636 8 pages.
Final Office Action, dated Oct. 11, 2017, received in U.S. Appl. No. 14/857,700, 13 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Sep. 1, 2017, received in U.S. Appl. No. 14/870,754, 22 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Sep. 1, 2017, received in U.S. Appl. No. 14/870,988, 14 pages.
Office Action, dated Oct. 16, 2017, received in Australian Patent Application No. 2016203040, which corresponds with U.S. Appl. No. 14/871,227, 5 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Final Office Action, dated Aug. 18, 2017, received in U.S. Appl. No. 14/869,873, 20 pages.
Office Action, dated Aug. 29, 2017, received in Korean Patent Application No. 2017-7014536, which corresponds with U.S. Appl. No. 15/081,771, 5 pages.
Notice of Allowance, dated Oct. 20, 2017, received in U.S. Appl. No. 15/136,782, 9 pages.
Notice of Allowance, dated Jul. 6, 2017, received in U.S. Appl. No. 15/231,745, 18 pages.
Patent, dated Oct. 30, 2017, received in Danish Patent Application No. 201670593, which corresponds with U.S. Appl. No. 15/231,745, 3 pages.
Office Action, dated Oct. 16, 2017, received in Danish Patent Application No. 201770710, 10 pages.
Office Action, dated Aug. 30, 2017, received in U.S. Appl. No. 15/655,749, 22 pages.
Office Action, dated Oct. 31, 2017, received in U.S. Appl. No. 15/723,069, 7 pages.
Search Report, dated Apr. 13, 2017, received in Dutch Patent Application No. 2016452, which corresponds with U.S. Appl. No. 14/864,737, 22 pages.
Extended European Search Report, dated Oct. 17, 2017, received in European Patent Application No. 17184437.6, Which corresponds with U.S. Appl. No. 14/868,078, 8 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Oct. 10, 2017, received in European Patent Application No. 17188507.2, which corresponds with U.S. Appl. No. 14/866,361, 9 pages.
Extended European Search Report, dated Sep. 11, 2017, received in European Patent Application No. 17163309.2, which corresponds with U.S. Appl. No. 14/866,987, 8 pages.
MacKenzie et al., "The Tactile Touchpad", Chi '97 Extended Abstracts on Human Factors in Computing Systems Looking to the Future, Chi '97, Mar. 22, 1997, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "Android Lollipop Lock-Screen Notification Tips", https://www.youtube.com/watch?v=LZTxHBOwzIU, Nov. 13, 2014, 3 pages.
YouTube, "HTC One Favorite Camera Features", http://www.youtube.com/watch?v=sUYHfcjI4RU, Apr. 28, 2013, 3 pages.
Office Action, dated Nov. 30, 2017, received in U.S. Appl. No. 14/535,671, 21 pages.
Final Office Action, dated Feb. 22, 2018, received in U.S. Appl. No. 14/608,895, 20 pages.
Office Action, dated Mar. 9, 2018, received in European Patent Application No. 13795391.5, which corresponds with U.S. Appl. No. 14/536,426, 4 pages.
Final Office Action, dated Feb. 26, 2018, received in U.S. Appl. No. 14/536,235, 13 pages.
Notice of Allowance, dated Nov. 30, 2017, received in U.S. Appl. No. 14/536,367, 9 pages.
Office Action, dated Mar. 9, 2018, received in European Patent Application No. 15183980.0, which corresponds with U.S. Appl. No. 14/536,426, 5 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Feb. 12, 2018, received in U.S. Appl. No. 14/536,464, 33 pages.
Notice of Acceptance, dated Dec. 20, 2017, received in Australian Patent Application No. 2016201451, which corresponds with U.S. Appl. No. 14/608,926, 3 pages.

(56) References Cited

OTHER PUBLICATIONS

Notice of Allowance, dated Feb. 8, 2018, received in Chinese Patent Application No. 201380068414.1, which corresponds with U.S. Appl. No. 14/608,926, 2 pages.
Oral Summons, dated Feb. 13, 2017, received in European Patent Application No. 13795392.3, which corresponds with U.S. Appl. No. 14/608,926, 11 pages.
Notice of Allowance, dated Dec. 29, 2017, received in Korean Patent Application No. 2017-7018250, which corresponds with U.S. Appl. No. 14/608,926, 3 pages.
Office Action, dated Feb. 2, 2018, received in Chinese Patent Application No. 201380035893.7, which corresponds with U.S. Appl. No. 14/536,141, 5 pages.
Office Action, dated Mar. 7, 2018, received in Australian patent Application No. 2016201303, which corresponds with U.S. Appl. No. 14/608,942, 3 pages.
Notice of Allowance, dated Feb. 28, 2018, received in U.S. Appl. No. 14/536,166, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Feb. 16, 2018, received in Japanese Patent Application No. 2016173113, which corresponds with U.S. Appl. No. 14/536,203, 3 pages.
Patent, dated Jan. 23, 2018, received in Korean Patent Application No. 2016-7033834, which corresponds with U.S. Appl. No. 14/536,203, 4 pages.
Notice of Allowance, dated Nov. 22, 2017, received in U.S. Appl. No. 14/536,247, 6 pages.
Notice of Acceptance, dated Feb. 27, 2018, received in Australian Patent Application No. 2016204411, which corresponds with U.S. Appl. No. 14/536,267, 3 pages.
Notice of Allowance, dated Jan. 29, 2018, received in Chinese Patent Application No. 201380035968.1, which corresponds with U.S. Appl. No. 14/536,267, 3 pages.
Office Action, dated Jan. 25, 2018, received in European Patent Application No. 13724106.3, which corresponds with U.S. Appl. No. 14/536,267, 5 pages.
Notice of Allowance, dated Nov. 17, 2017, received in Japanese Patent Application No. 2016-125839, which corresponds with U.S. Appl. No. 14/536,267, 5 pages.
Patent, dated Dec. 1, 2017, received in Korean Patent Application No. 2016-7029533, which corresponds with U.S. Appl. No. 14/536,267, 2 pages.
Notice of Allowance, dated Dec. 1, 2017, received in U.S. Appl. No. 14/536,291, 19 pages.
Patent, dated Dec. 8, 2017, received in Chinese Patent Application No. 201380068399.0, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Office Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Office Action, dated Jan. 10, 2018, received in Danish Patent Application No. 201500574, which corresponds with U.S. Appl. No. 14/866,159, 2 pages.
Notice of Allowance, dated Mar. 21, 2018, received in Danish Patent Application No. 201500574, which corresponds with U.S. Appl. No. 14/866,159, 2 pages.
Certificate of Grant, dated Jan. 3, 2018, received in Australian Patent Application No. 2016229421, which corresponds with U.S. Appl. No. 14/868,078, 1 page.
Office Action, dated Nov. 24, 2017, received in European Patent Application No. 16727900.9, which corresponds with U.S. Appl. No. 14/866,511, 5 pages.
Office Action, dated Jan. 29, 2018, received in Danish Patent Application No. 201500592, which corresponds with U.S. Appl. No. 14/869,899, 2 pages.
Office Action, dated Dec. 14, 2017, received in Danish Patent Application No. 201670594, which corresponds with U.S. Appl. No. 14/869,899, 3 pages.
Office Action, dated Jan. 29, 2018, received in U.S. Appl. No. 14/866,992, 44 pages.
Office Action, dated Jan. 19, 2018, received in Australian Patent Application No. 201761478, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 Pages.
Office Action, dated Mar. 13, 2018, received in U.S. Appl. No. 15/009,688, 10 pages.
Notice of Allowance, dated Jan. 31, 2018, received in U.S. Appl. No. 14/856,519, 9 pages.
Final Office Action, dated Nov. 16, 2017, received in U.S. Appl. No. 14/856,520, 41 pages.
Notice of Allowance, dated Feb. 9, 2018, received in U.S. Appl. No. 14/856,522, 9 pages.
Office Action, dated Nov. 30, 2017, received in U.S. Appl. No. 14/857,636, 19 pages.
Office Action, dated Jan. 17, 2018, received in Australian Patent Application No. 2017202816, which corresponds with U.S. Appl. No. 14/857,636, 3 pages.
Office Action, dated Dec. 1, 2017, received in U.S. Appl. No. 14/857,663, 15 pages.
Notice of Allowance, dated Feb. 12, 2018, received in U.S. Appl. No. 14/857,700, 13 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Notice of Allowance, dated Mar. 16, 2018, received in Danish Patent Application No. 201500579, which corresponds with U.S. Appl. No. 14/866,361, 2 pages.
Office Action, dated Jan. 22, 2018, received in U.S. Appl. No. 14/866,987, 22 pages.
Notice of Allowance, dated Mar. 6, 2018, received in Japanese Patent Application No. 2017-126445, which corresponds with U.S. Appl. No. 14/866,987, 5 pages.
Office Action, dated Nov. 29, 2017, received in U.S. Appl. No. 14/866,989, 31 pages.
Office Action, dated Feb. 26, 2018, received in Australian Patent Application No. 2017201079, which corresponds with U.S. Appl. No. 14/866,989, 6 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.

(56) References Cited

OTHER PUBLICATIONS

Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Office Action, dated Nov. 22, 2017, received in U.S. Appl. No. 14/871,227, 24 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Final Office Action, dated Mar. 15, 2018, received in U.S. Appl. No. 14/871,336, 23 pages.
Patent, dated Oct. 30, 2017, Danish Patent Application No. 201500601, which corresponds with U.S. Appl. No. 14/871,336, 5 pages.
Office Action, dated Nov. 13, 2017, received in Japanese Patent Application No. 2016-183289, which corresponds with U.S. Appl. No. 14/871,462, 5 pages.
Final Office Action, dated Nov. 29, 2017, received in U.S. Appl. No. 14/867,823, 47 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,261, 26 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Feb. 19, 2018, received in Danish Patent Application No. 201500581, which corresponds with U.S. Appl. No. 14/867,990, 4 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Jan. 8, 2018, received in Danish Patent Application No. 201770190, which corresponds with U.S. Appl. No. 15/136,782, 2 pages.
Notice of Allowance, dated Mar. 19, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Jan. 10, 2018, received in Danish Patent Application No. 201670590, which corresponds with U.S. Appl. No. 15/231,745, 2 pages.
Office Action, dated Jan. 30, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Feb. 7, 2018, received in Danish Patent Application No. 201770709, 2 pages.
Office Action, dated Mar. 7, 2018, received in U.S. Appl. No. 15/482,618, 7 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated Mar. 2, 2018, received in European Patent Application No. 17206374.5, which corresponds with U.S. Appl. No. 15/272,343, 11 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
Kiener, "Force Touch on iPhone", https://www.youtube.com/watch?v=CEMmnsU5fC8, Aug. 4, 2015, 4 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Phonebuff, "How to Pair Bluetooth on the iPhone", https://www.youtube.com/watch?v=LudNwEar9A8, Feb. 8, 2012, 3 pages.
Notice of Allowance, dated Dec. 20, 2016, received in Australian Patent Application No. 2013368440, which corresponds with U.S. Appl. No. 14/536,426, 3 pages.
Office Action, dated Jan. 3, 2017, received in Australian Patent Application No. 2016201451, which corresponds with U.S. Appl. No. 14/608,926, 3 pages.
Office Action, dated Nov. 11, 2016, received in European Patent Application No. 13795392.3, which corresponds with U.S. Appl. No. 14/608,926, 6 pages.
Notice of Allowance, dated Dec. 22, 2016, received in Japanese Patent Application No. 2015-511645, which corresponds with U.S. Appl. No. 14/536,646, 2 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Office Action, dated Dec. 9, 2016, received in Chinese Patent Application No. 2016120601564130, which corresponds with U.S. Appl. No. 14/536,267, 4 pages.
Office Action, dated Jan. 5, 2017, received in Korean Patent Application No. 2016-7029533, which corresponds with U.S. Appl. No. 14/536,267, 2 pages.

(56) References Cited

OTHER PUBLICATIONS

Final Office Action, dated Dec. 22, 2016, received in Japanese Patent Application No. 2015-511655, which corresponds with U.S. Appl. No. 14/536,291, 3 pages.
Office Action, dated Nov. 4, 2016, received in Korean Patent Application No. 10-2015-7019984, which corresponds with U.S. Appl. No. 14/608,985, 8 pages.
Patent, dated Nov. 2, 2016, received in Australian Patent Application No. 2016100254, which corresponds with U.S. Appl. No. 14/866,981, 1 page.
Office Action, dated Dec. 5, 2016, received in Danish Patent Application No. 201500575, which corresponds with U.S. Appl. No. 14/866,981, 3 pages.
Notice of Allowance, dated Nov. 14, 2016, received in U.S. Appl. No. 14/863,432, 7 pages.
Office Action, dated Nov. 22, 2016, received in Danish Patent Application No. 201670594, which corresponds with U.S. Appl. No. 14/869,899, 9 pages.
Office Action, dated Nov. 22, 2016, received in Australian Patent Application No. 2016101418, which corresponds with U.S. Appl. No. 14/866,992, 7 pages.
Notice of Allowance, dated Jan. 4, 2017, received in U.S. Appl. No. 14/845,217, 5 pages.
Notice of Allowance, dated Dec. 28, 2016, received in U.S. Appl. No. 14/864,580, 8 pages.
Notice of Allowance, dated Nov. 8, 2016, received in Chinese Patent Application No. 201620470247.4, which corresponds with U.S. Appl. No. 14/864,580, 3 pages.
Notice of Allowance, dated Nov. 23, 2016, received in U.S. Appl. No. 14/864,601, 12 pages.
Certificate of Examination, dated Dec. 8, 2016, received in Australian Patent Application No. 2016100292, which corresponds with U.S. Appl. No. 14/866,361, 1 page.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Notice of Allowance, dated Nov. 1, 2016, received in Danish Patent Application No. 201500587, which corresponds with U.S. Appl. No. 14/866,987, 2 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Office Action, dated Oct. 31, 2016, received in Australian Patent Application No. 2016101438, which corresponds with U.S. Appl. No. 14/871,236, 6 pages.
Final Office Action, dated Nov. 2, 2016, received in U.S. Appl. No. 14/867,892, 48 pages.
Office Action, dated Oct. 25, 2016, received in Chinese Patent Application No. 201620176221.9, which corresponds with U.S. Appl. No. 14/867,990, 7 pages.
Office Action, dated Nov. 25, 2016, received in U.S. Appl. No. 15/081,771, 17 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Dec. 15, 2016, received in International Patent Application No. PCT/US2016/046403, which corresponds with U.S. Appl. No. 15/009,661, 17 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Brownlee, "Android 5.0 Lollipop Feature Review!", https//www.youtube.com/watch?v=pEDQ1z1-PvU, Oct. 27, 2014, 5 pages.
Elliot, "Mac System 7", YouTube. Web. Mar. 8, 2017, http://www.youtube.com/watch?v=XLv22hfuuik, Aug. 3, 2011, 1 page.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Microsoft, "Lumia—How to Personalize Your Start Screen", https://www.youtube.com/watch?v=6Gl5Z3TrSEs, Nov. 11, 2014, 3 pages.
Office Action, dated Mar. 15, 2017, received in U.S. Appl. No. 14/535,671, 13 pages.
Patent, dated May 12, 2017, received in Japanese Patent Application No. 2015547948, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Apr. 5, 2017, received in U.S. Appl. No. 14/536,367, 16 pages.
Office Action, dated May 15, 2017, received in Australian Patent Application No. 2016216580, which corresponds with U.S. Appl. No. 14/536,426, 3 pages.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated May 4, 2017, received in Chinese Patent Application No. 201380068414.1, which corresponds with U.S. Appl. No. 14/608,926, 5 pages.
Notice of Allowance, dated Jan. 17, 2017, received in Japanese Patent Application No. 2015-549392, which corresponds with U.S. Appl. No. 14/608,926, 2 pages.

(56) References Cited

OTHER PUBLICATIONS

Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Patent, dated May 26, 2017, received in European Patent Application No. 13724102.2, which corresponds with U.S. Appl. No. 14/536,646, 1 page.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Notice of Allowance, dated May 12, 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.
Notice of Allowance, dated May 12, 2017, received in Japanese Patent Application No. 2015-549393, which corresponds with U.S. Appl. No. 14/608,942, 5 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Mar. 3, 2017, received in Japanese Patent Application No. 2016-125839, which corresponds with U.S. Appl. No. 14/536,267, 6 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Notice of Allowance, dated Jan. 18, 2017, received in Australian Patent Application No. 2013368445, which corresponds with U.S. Appl. No. 14/608,985, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Jun. 19, 2017, received in U.S. Appl. No. 14/864,737, 8 pages.
Office Action, dated May 15, 2017, received in Japanese Patent Application No. 2016558331, which corresponds with U.S. Appl. No. 14/864,737, 5 pages.
Office Action, dated May 18, 2017, received in Dutch Patent Application No. 2016452, which corresponds with U.S. Appl. No. 14/864,737, 22 pages.
Notice of Allowance, dated Feb. 10, 2017, received in U.S. Appl. No. 14/866,981, 5 pages.
Office Action, dated Mar. 14, 2017, received in Danish Patent Application No. 201500574, which corresponds with U.S. Appl. No. 14/866,159, 5 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Office Action, dated May 18, 2017, received in Dutch Patent Application No. 2016376, which corresponds with U.S. Appl. No. 14/868,078, 15 pages.
Notice of Allowance, dated Apr. 27, 2017, received in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Office Action, dated Jun. 12, 2017, received in Danish Patent Application No. 201500582, which corresponds with U.S. Appl. No. 14/863,432, 5 pages.
Office Action, dated May 18, 2017, received in Dutch Patent Application No. 2016801, which corresponds with U.S. Appl. No. 14/863,432, 34 pages.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Office Action, dated Jun. 9, 2017, received in Japanese Patent Application No. 2016558214, which corresponds with U.S. Appl. No. 14/866,511, 6 pages.
Notice of Allowance, dated Apr. 27, 2017, received in U.S. Appl. No. 16/866,489, 27 pages.
Notice of Allowance, dated Feb. 28, 2017, received in U.S. Appl. No. 14/869,899, 9 pages.
Office Action, dated Apr. 13, 2017, received in U.S. Appl. No. 14/866,992, 34 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Notice of Allowance, dated Jun. 16, 2017, received in in U.S. Appl. No. 14/857,645, 5 pages.

(56) References Cited

OTHER PUBLICATIONS

Office Action, dated Mar. 31, 2017, received in U.S. Appl. No. 14/857,700, 14 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Office Action, dated May 4, 2017, received in Danish Patent Application No. 201500585, which corresponds with U.S. Appl. No. 14/864,627, 4 pages.
Office Action, dated Jun. 15, 2017, received in Danish Patent Application No. 201500579, which corresponds with U.S. Appl. No. 14/866,361, 2 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Office Action, dated Jun. 16, 2017, received in Japanese Patent Application No. 2016-233450, which corresponds with U.S. Appl. No. 14/866,989, 6 pages.
Notice of Allowance, dated Feb. 28, 2017, received in U.S. Appl. No. 14/871,236, 9 pages.
Office Action, dated Jun. 15, 2017, received in Danish Patent Application No. 201500595, which corresponds with U.S. Appl. No. 14/871,236, 4 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Apr. 20, 2017, received in Chinese Patent Application No. 201621044346.2, which corresponds with U.S. Appl. No. 14/871,462, 3 pages.
Office Action, dated Mar. 13, 2017, received in Japanese Patent Application No. 2016-183289, which corresponds with U.S. Appl. No. 14/871,462, 5 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated May 3, 2017, received in Danish Patent Application No. 201500581, which corresponds with U.S. Appl. No. 14/867,990, 5 pages.
Final Office Action, dated Jun. 2, 2017, received in U.S. Appl. No. 15/081,771, 17 pages.
Final Office Action, dated May 1, 2017, received in U.S. Appl. No. 15/136,782, 18 pages.
Office Action, dated May 23, 2017, received in Danish Patent Application No. 201770190, which corresponds with U.S. Appl. No. 15/136,782, 7 pages.
Office Action, dated Jan. 20, 2017, received in U.S. Appl. No. 15/231,745, 21 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Azundris, "A Fire in the Sky," http://web.archive.org/web/20140722062639/http://blog.azundrix.com/archives/168-A-fire-in-the-sky.html, Jul. 22, 2014, 8 pages.
b-log—betriebsraum weblog, "Extremely Efficient Menu Selection: Marking Menus for the Flash Platform," http://www.betriebsraum.de/blog/2009/12/11/extremely-efficient-menu-selection-marking -for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gestures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.

(56) References Cited

OTHER PUBLICATIONS

Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
IBM et al., "Pressure-Sensitive Icons", IBM Technical Disclosure Bulletin, vol. 33, No. 1B, Jun. 1, 1990, 3 pages.
iCIMS Recruiting Software, "Blackberry Playbook Review," http://www.tested.com/tech.tablets/5749-blackberry-playbook-review/, 2015, 11 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics the *Sandpaper* System for Synthesizing Texture for a Force-Feedback Display," Massachusetts Institute of Technology, Jun. 1978, 217 pages.
Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
O'Hara, et al., "Pressure-Sensitive Icons", ip.com Journal, ip.com Inc., West Henrietta, NY, US, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
VGJFeliz, "How to Master Android Lollipop Notifications in Four Minutes!", https://www.youtube.com/watch?v=S-zBRG7GJgs, Feb. 8, 2015, 5 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
YouTube, "Blackberry Playbook bezel interaction," https://www.youtube.com/watch?v=YGkzFqnOwXl, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Oct. 18, 2016, received in Australian Patent Application No. 2013368440, which corresponds with U.S. Appl. No. 14/536,426, 3 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.

(56) References Cited

OTHER PUBLICATIONS

Final Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Office Action, dated Nov. 18, 2015, received in Australian Patent Application No. 2015101231, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Notice of Allowance, dated Aug. 15, 2016, received in Australian Patent Application No. 2013259614, which corresponds with U.S. Appl. No. 14/536,141, 1 page.
Office Action, dated Jan. 7, 2016, received in European Patent Application No. 13726053.5, which corresponds with U.S. Appl. No. 14/536,141, 10 pages.
Office Action, dated Aug. 31, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Certificate of Grant, dated Jul. 7, 2016, received in Australian Patent Application No. 2013368443, which corresponds with U.S. Appl. No. 14/536,141, 3 pages.
Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/536,141, 4 pages.
Office Action, dated Apr. 5, 2016, received in Korean Patent Application No. 10-2015-7018448, which corresponds with U.S. Appl. No. 14/536,141, 6 pages.
Office Action, dated Aug. 1, 2016, received in U.S. Appl. No. 14/536,203, 14 pages.
Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Office Action, dated Dec. 4, 2015, received in Korean Patent Application No. 2014-7034520, which corresponds with U.S. Appl. No. 14/536,203, 4 pages.
Notice of Allowance, dated Sep. 1, 2016, received in Korean Patent Application No. 2014-7034520, which corresponds with U.S. Appl. No. 14/536,203, 5 pages.
Office Action, dated Jul. 22, 2016, received in European Office Action No. 13798465.4, which corresponds with U.S. Appl. No. 14/608,965, 8 pages.
Office Action, dated Oct. 20, 2016, received in U.S. Appl. No. 14/536,247, 10 pages.
Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.

(56) References Cited

OTHER PUBLICATIONS

Office Action, dated Jan. 29, 2016, received in Japanese Patent Application No. 2015-511652, which corresponds with U.S. Appl. No. 14/536,267, 3 pages.
Notice of Allowance, dated Sep. 26, 2016, eceived in Japanese Patent Application No. 2015-511652, which corresponds with U.S. Appl. No. 14/536,267, 5 pages.
Office Action, dated Dec. 4, 2015, received in Korean Patent Application No. 2014-7034530, which corresponds with U.S. Appl. No. 14/536,267, 3 pages.
Notice of Allowance, dated Sep. 1, 2016, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Jan. 7, 2016, received in European Patent Application No. 13724107.1, which corresponds with U.S. Appl. No. 14/536,291, 11 pages.
Office Action, dated Aug. 22, 2016, received in European Patent Application No. 13724107.1, which corresponds with U.S. Appl. No. 14/536,291, 7 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015550384, which corresponds with U.S. Appl. No. 14/608,985, 4 pages.
Office Action, dated Mar. 31, 2016, received in U.S. Appl. No. 14/864,737, 17 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action (Search Report), dated Mar. 30, 2016, received in Australian Patent Application No. 201500588, which corresponds with U.S. Appl. No. 14/868,078, 9 pages.
Office Action, dated Sep. 2, 2016, received in Australian Patent Application No. 201500588, which corresponds with U.S. Appl. No. 14/868,078, 4 pages.
Office Action, dated May 9, 2016, received in U.S. Appl. No. 14/863,432, 26 pages.
Office Action, dated Aug. 19, 2016, received in Australian Patent Application No. 2016100647, which corresponds with U.S. Appl. No. 14/863,432, 5 pages.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Patent, dated Aug. 8, 2016, received in Australian Patent Application 2016100653, corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.

(56) References Cited

OTHER PUBLICATIONS

Final Office Action, dated Sep. 16, 2016, received in U.S. Appl. No. 14/866,489, 24 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Innovation Patent, dated Sep. 22, 2016, received in Australian Patent Application No. 2016101418, which corresponds with U.S. Appl. No. 14/866,992, 1 page.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Notice of Allowance, dated Aug. 26, 2016, received in U.S. Appl. No. 14/845,217, 5 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Office Action, dated Jan. 25, 2016, received in U.S. Appl. No. 14/864,580, 29 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Certificate of Registration, dated Oct. 14, 2016, received in German Patent Application No. 20201600003234.9, which corresponds with U.S. Appl. No. 14/864,580, 3 pages.
Office Action (Search Report), dated Apr. 8, 2016, received in Danish Patent Application No. 201500584, which corresponds with U.S. Appl. No. 14/864,580, 9 pages.
Office Action, dated Oct. 7, 2016, received in Danish Patent Application No. 201500584, which corresponds with U.S. Appl. No. 14/864,580, 3 pages.
Office Action, dated Apr. 19, 2016, received in U.S. Appl. No. 14/864,627, 9 pages.
Office Action (Search Report), dated Apr. 8, 2016, received in Danish Patent Application No. 201500585, which corresponds with U.S. Appl. No. 14/864,627, 9 pages.
Office Action, dated Oct. 7, 2016, received in Danish Patent Application No. 201500585, which corresponds with U.S. Appl. No. 14/864,627, 3 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action (Search Report), dated Apr. 7, 2016, received in Danish Patent Application No. 201500579, which corresponds with U.S. Appl. No. 14/866,361, 10 pages.
Patent, dated Aug. 8, 2016, received in Australian Patent Application No. 2016100649, which corresponds with U.S. Appl. No. 14/866,987, 1 page.
Office Action and Search Report, dated Mar. 22, 2016, received in Danish Patent Application No. 201500587, which corresponds with U.S. Appl. No. 14/866,987, 8 pages.
Intention to Grant, dated Jun. 10, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Certificate of Exam, dated Jul. 21, 2016, received in Australian Patent Application No. 2016100652, which corresponds with U.S. Appl. No. 14/866,989, 1 page.
Office Action and Search Report, dated Apr. 1, 2016, received in Danish Patent Application No. 201500589, which corresponds with U.S. Appl. No. 14/866,989, 8 pages.
Intention to Grant, dated Jun. 10, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action (Search Report), dated Apr. 8, 2016, received in Danish Patent Application No. 201500595, which corresponds with U.S. Appl. No. 14/871,236, 12 pages.
Office Action and Search Report, dated May 26, 2016, received in Danish Patent Application No. 201500595, which corresponds with U.S. Appl. No. 14/871,236, 14 pages.
Office Action and Additional Search Report, dated Sep. 30, 2016, received in Danish Patent Application No. 201500595, which corresponds with U.S. Appl. No. 14/871,236, 10 pages.

(56) References Cited

OTHER PUBLICATIONS

Innovation (Unexamined) Patent, dated Aug. 25, 2016, received in Australian Patent Application No. 2016101436, which corresponds with U.S. Appl. No. 14/871,236, 1 pages.
Office Action and Search Report, dated Apr. 6, 2016, received in Danish Patent Application No. 201500596, which corresponds with U.S. Appl. No. 14/870,882, 7 pages.
Office Action and Search Report, dated Jun. 9, 2016, received in Danish Patent Application No. 201500596, which corresponds with U.S. Appl. No. 14/870,882, 9 pages.
Office Action, dated Oct. 17, 2016, received in Australian Patent Application No. 2016203040, which corresponds with U.S. Appl. No. 14/871,227, 7 pages.
Oct. 18, 2016, received in Australian Patent Application No. 2016101431, which corresponds with U.S. Appl. No. 14/871,227, 3 pages.
Intention to Grant, dated Apr. 7, 2016, received in Danish Patent Application No. 201500597, which corresponds with U.S. Appl. No. 14/871,227, 7 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action (Search Report), dated Apr. 18, 2016, received in Danish Patent Application No. 201500601, which corresponds with U.S. Appl. No. 14/871,336, 8 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Intention to Grant, dated Apr. 18, 2016, received in Danish Patent Application No. 201500600, which corresponds with U.S. Appl. No. 14/871,462, 7 pages.
Grant, dated Aug. 30, 2016, received in Danish Patent Application No. 201500600, which corresponds with U.S. Appl. No. 14/871,462, 2 pages.
Office Action, dated Apr. 29, 2016, received in U.S. Appl. No. 14/867,823, 28 pages.
Final Office Action, dated Sep. 28, 2016, received in U.S. Appl. No. 14/867,823, 31 pages.
Office Action and Search Report, dated Mar. 18, 2016, received in Danish Patent Application No. 201500594, which corresponds with U.S. Appl. No. 14/867,823, 10 pages.
Office Action, dated Sep. 7, 2016, received in Danish Patent Application No. 201500594, which corresponds with U.S. Appl. No. 14/867,823, 4 pages.
Office Action, dated May 10, 2016, received in U.S. Appl. No. 14/867,892, 28 pages.
Office Action (Search Report), dated Mar. 21, 2016, received in Danish Patent Application No. 201500598, which corresponds with U.S. Appl. No. 14/867,892, 9 pages.
Office Action, Sep. 14, 2016, received in Danish Patent Application No. 201500598, which corresponds with U.S. Appl. No. 14/867,892, 4 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Certificate of Registration, dated Jun. 16, 2016, received in German Patent No. 202016001489.8, which corresponds with U.S. Appl. No. 14/867,990, 3 pages.
Office Action (Search Report), dated Mar. 18, 2016, received in Danish Patent Application No. 201500581, which corresponds with U.S. Appl. No. 14/867,990, 9 pages.
Office Action, dated Sep. 26, 2016, received in Danish Patent Application No. 201500581, which corresponds with U.S. Appl. No. 14/867,990, 5 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.

(56) References Cited

OTHER PUBLICATIONS

International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Extended European Search Report, dated Oct. 7, 2016, received in European Patent Application No. 16177863.4, which corresponds with U.S. Appl. No. 14/536,267, 12 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Aug. 29, 2016, received in International Patent Application No. PCT/US2016/021400, which corresponds with U.S. Appl. No. 14/869,899, 48 pages.
Easton-Ellett, "Three Free Cydia Utilies to Remove iOS Notification Badges", http://www.ijailbreak.com/cydia/three-free-cydia-utilies-to-remove-ios-notification-badges, Apr. 14, 2012, 2 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mahdi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Final Office Action, dated May 3, 2018, received in U.S. Appl. No. 14/536,644, 28 pages.
Office Action, dated Apr. 9, 2018, received in European Patent Application No. 13726053.5, which corresponds with U.S. Appl. No. 14/536,141, 9 pages.
Office Action, dated Mar. 28, 2018, received in Chinese Patent Application No. 201380068295.X, which corresponds with U.S. Appl. No. 14/608,942, 5 pages.
Notice of Allowance, dated Apr. 4, 2018, received in Chinese Patent Application No. 201380035977.0, which corresdponds with U.S. Appl. No. 14/536,203, 3 pages.
Patent, dated Apr. 20, 2018, received in Chinese Patent Application No. 201380035968.1, which corresponds with U.S. Appl. No. 14/536,267, 4 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Office Action, dated Apr. 25, 2018, received in European Patent Application No. 16708916.8, which corresponds with U.S. Appl. No. 14/868,078, 6 pages.
Notice of Allowance, dated Apr. 24, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Notice of Allowance, dated May 2, 2018, received in U.S. Appl. No. 14/856,519, 10 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.

(56) References Cited

OTHER PUBLICATIONS

Patent, dated Apr. 6, 2018, received in Japanese Patent Application No. 2017-126445, which corresponds with U.S. Appl. No. 14/866,987, 3 pages.
Patent, dated Mar. 9, 2018, received in Japanese Patent Application No. 2016-233450, which corresponds with U.S. Appl. No. 14/866,989, 4 pages.
Notice of Allowance, dated Apr. 26, 2018, received in Danish Patent Application No. 201500595, which corresponds with U.S. Appl. No. 14/871,236, 2 pages.
Office Action, dated Apr. 2, 2018, received in Japanese Patent Application No. 2018-020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Office Action, dated Apr. 19, 2018, received in U.S. Appl. No. 14/869,703, 19 pages.
Office Action, dated Apr. 11, 2018, received in anish Patent Application No. 201670591, which corresponds with U.S. Appl. No. 15/231,745, 3 pages.
Office Action, dated Apr. 20, 2018, received in European Patent Application No. 16756862.5, which corresponds with U.S. Appl. No. 15/272,345, 15 pages.
Office Action, dated Apr. 23, 2018, received in U.S. Appl. No. 15/499,691, 29 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
Office Action, dated Jun. 29, 2017, received in U.S. Appl. No. 14/608,895, 30 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Office Action, dated Jun. 16, 2017, received in Chinese Patent Application No. 201380068295.X, which corresponds with U.S. Appl. No. 14/608,942, 6 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Office Action, dated Jul. 21, 2017, received in Australian Patent Application No. 2016216658, which corresponds with U.S. Appl. No. 14/536,291, 3 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Notice of Allowance, dated Jun. 23, 2017, received in Japanese Patent Application No. 2016-558331, which corresponds with U.S. Appl. No. 14/864,737, 5 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Grant, dated Jul. 21, 2016, received in Dutch Patent Application No. 2016801, which corresponds with U.S. Appl. No. 14/871,227, 8 pages.
Notice of Allowance, dated Jul. 14, 2017, received in Japanese Patent Application No. 2016558214, which corresponds with U.S. Appl. No. 14/866,511, 5 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated Jun. 30, 2017, received in U.S. Appl. No. 14/856,522, 22 pages.
Office Action, dated Jul. 31, 2017, received in Japanese Patent Application No. 2017126445, which corresponds with U.S. Appl. No. 14/866,987, 6 pages.
Office Action, dated Aug. 4, 2017, received in Japanese Patent Application No. 2016-533201, which corresponds with U.S. Appl. No. 14/871,227, 6 pages.
Office Action, dated Jul. 6, 2017, received in U.S. Appl. No. 14/867,892, 55 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014. 6 pages.
Anonymous, "Android—What Should Status Bar Toggle Button Behavior Be?", https://ux.stackechange.com/questions/34814, Jan. 15, 2015, 2 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.

(56) References Cited

OTHER PUBLICATIONS

Oh, et al., "Moving Objects with 2D Input Devices in CAD Systems and Destop Virtual Environments", Proceedings of Graphics Interface 2005, 8 pages, May 2005.
Stewart, et al., "Characteristics of Pressure-Based Input for Mobile Devices", Proceedings of the SIGCHI Conference on Human Factors in Computing Systems, Apr. 2010, 10 pages.
Notice of Allowance, dated Jun. 26, 2018, received in U.S. Appl. No. 14/608,895, 9 pages.
Intention to Grant, dated Jul. 6, 2018, received in European Patent Application No. 13795391.5, which corresponds with U.S. Appl. No. 14/536,426, 5 pages.
Notice of Allowance, dated Aug. 15, 2018, received in U.S. Appl. No. 14/536,235, 5 pages.
Notice of Allowance, dated May 16, 2018, received in U.S. Appl. No. 14/536,367, 5 pages.
Office Action, dated May 8, 2018, received in Australian Patent Application No. 20162165780, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Notice of Allowance, dated May 10, 2018, received in Chinese Patent Application No. 201380035982.1, which corresponds with U.S. Appl. No. 14/536,426, 2 pages.
Intention to Grant, dated Aug. 14, 2018, received in European Patent Application No. 15183980.0, which corresponds with U.S. Appl. No. 14/536,426, 5 pages.
Final Office Action, dated Jun. 22, 2018, received in U.S. Appl. No. 14/536,464, 32 pages.
Final Office Action, dated Jun. 6, 2018, received in U.S. Appl. No. 14/608,926, 19 pages.
Certificate of Grant, dated May 3, 2018, received in Australian Patent Application No. 2016201541, which corresponds with U.S. Appl. No. 14/608,926, 1 page.
Patent, dated May 4, 2018, received in Chinese Patent Application No. 201380068414.1, which corresponds with U.S. Appl. No. 14/608,926, 4 pages.
Patent, dated Apr. 27, 2018, received in Japanese Patent Application No. 2017-024234, which corresponding with U.S. Appl. No. 14/608,926, 3 pages.
Notice of Allowance, dated Aug. 9, 2018, received in U.S. Appl. No. 14/536,646, 5 pages.
Notice of Acceptance, dated Jul. 19, 2018, received in Australian Patent Application No. 2016262773, which corresponds with U.S. Appl. No. 14/536,141, 3 pages.
Office Action, dated Aug. 13, 2018, received in Japanese Patent Application No. 2017-141953, which corresponds with U.S. Appl. No. 14/536,141, 6 pages.
Certificate of Grant, dated Jul. 5, 2018, received in Australian patent Application No. 2016201303, which corresponds with U.S. Appl. No. 14/608,942, 4 pages.
Notice of Acceptance, dated Jul. 19, 2018, received in Australian Patent Application No. 2016238917, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Office Action, dated Jul. 2, 2018, received in U.S. Appl. No. 14/608,965, 16 pages.
Office action, dated Aug. 1, 2018, received in Chinese Patent Application No. 201380074060.1, which corresponds with U.S. Appl. No. 14/608,965, 5 pages.
Notice of Allowance, dated Jun. 1, 2018, received in U.S. Appl. No. 14/536,267, 5 pages.
Certificate of Grant, dated Jun. 28, 2018, received in Australian Patent Application No. 2016204411, which corresponds with U.S. Appl. No. 14/536,267, 4 pages.
Office Action, dated Jun. 13, 2018, received in Chinese Patent Application No. 201810332044.2, which corresponds with U.S. Appl. No. 14/536,267, 2 pages.
Intention to Grant, dated Jun. 27, 2018, received in European Patent Application No. 13724106.3, which corresponds with U.S. Appl. No. 14/536,267, 5 pages.
Notice of Allowance, dated Mar. 20, 2018, received in U.S. Appl. No. 14/536,291, 5 pages.
Notice of Acceptance, dated Jul. 19, 2018, received in Australian Patent Application No. 2016216658, which corresponds with U.S. Appl. No. 14/536,291, 3 pages.
Office Action, dated Jun. 29, 2018, received in Japanese Patent Application No. 2017-083027, which corresponds with U.S. Appl. No. 14/536,291, 5 pages.
Notice of Allowance, dated Apr. 20, 2018, received in U.S. Appl. No. 14/608,985, 5 pages.
Certificate of Grant, dated Jun. 29, 2018, received in Hong Kong Patent Application No. 15112851.6, which corresponds with U.S. Appl. No. 14/608,985, 2 pages.
Final Office Action, dated Aug. 7, 2018, received in U.S. Appl. No. 14/536,648, 14 pages.
Notice of Acceptance, dated Jul. 19, 2018, received in Australian Patent Application No. 2016247194, which corresponds with U.S. Appl. No. 14/536,648, 3 pages.
Grant Certificate, dated Apr. 25, 2018, received in European Patent Application No. 16710871.1, which corresponds with U.S. Appl. No. 14/864,737, 2 pages.
Notice of Allowance, dated May 18, 2018, received in U.S. Appl. No. 14/866,159, 8 pages.
Office Action, dated Jun. 5, 2018, received in Chinese Patent Application No. 201610137839.9, which corresponds with U.S. Appl. No. 14/866,159, 11 pages.
Patent, dated May 22, 2018, received in Danish patent Application No. 201500574, which corresponds with U.S. Appl. No. 14/866,159, 2 pages.
Notice of Allowance, dated May 24, 2018, received in U.S. Appl. No. 14/868,078, 6 pages.
Office Action, dated May 24, 2018, received in European Patent Application No. 16727900.9, which corresponds with U.S. Appl. No. 14/866,511, 7 pages.
Patent, dated May 28, 2018, received in Danish Patent Application No. 201500592, which corresponds with U.S. Appl. No. 14/869,899, 2 pages.
Notice of Allowance, dated Aug. 3, 2018, received in U.S. Appl. No. 15/009,676, 6 pages.
Notice of Allowance, dated Jun. 29, 2018, received in U.S. Appl. No. 14/856,517, 11 pages.
Office Action, dated Jun. 25, 2018, received in Japanese Patent Application No. 2017-029201, which corresponds with U.S. Appl. No. 14/857,636, 4 pages.
Patent, dated May 22, 2018, received in Danish Patent Application No. 201500579, which corresponds with U.S. Appl. No. 14/866,361 2 pages.
Office Action, dated Jun. 11, 2018, received in European Patent Application No. 17188507.2, which corresponds with U.S. Appl. No. 14/866,361, 10 pages.
Office Action, dated May 7, 2018, received in European Patent Application No. 16189421.7, which corresponds with U.S. Appl. No. 14/866,987, 5 pages.
Final Office Action, dated Jul. 3, 2018, received in U.S. Appl. No. 14/866,989, 17 pages.
Patent, dated Jun. 18, 2018, received in Danish Patent Application No. 201500595, which corresponds with U.S. Appl. No. 14/871,236, 3 pages.
Office Action, dated Jul. 19, 2018, received in Russian Patent Application No. 2017131408, which corresponds with U.S. Appl. No. 14/871,236, 8 pages.
Notice of Allowance, dated Jul. 2, 2018, received in U.S. Appl. No. 14/870,754, 9 pages.
Final Office Action, dated Apr. 20, 2018, received in U.S. Appl. No. 14/870,682, 7 pages.
Notice of Allowance, dated Jul. 12, 2018, received in U.S. Appl. No. 14/870,882, 5 pages.

(56) References Cited

OTHER PUBLICATIONS

Notice of Allowance, dated Jun. 11, 2018, received in U.S. Appl. No. 14/871,227, 11 pages.
Notice of Allowance, dated Aug. 7, 2018, received in U.S. Appl. No. 14/867,823, 8 pages.
Notice of Allowance, dated May 31, 2018, received in U.S. Appl. No. 14/869,855, 10 pages.
Final Office Action, dated May 23, 2018, received in U.S. Appl. No. 14/869,873, 18 pages.
Notice of Allowance, dated Jul. 30, 2018, received in U.S. Appl. No. 14/869,873, 8 pages.
Final Office Action, dated Jul. 3, 2018, received in U.S. Appl. No. 15/009,668, 19 pages.
Notice of Allowance, dated Jun. 28, 2018, received in Korean Patent Application No. 2017-7014536, which corresponds with U.S. Appl. No. 15/031,771, 4 pages.
Office Action, dated May 4, 2018, received in Australian Patent Application No. 2018202855, which corresponds with U.S. Appl. No. 15/136,782, 3 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018-062161, which corresponds with U.S. Appl. No. 15/136,782, 5 pages.
Patent, dated May 28, 2018, received in Danish Patent Application No. 201670590, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Certificate of Grant, dated Jun. 28, 2018, received in Australian Patent Application No. 2018200705, which corresponds with U.S. Appl. No. 15/272,327, 4 pages.
Notice of Allowance, dated Jul. 30, 2018, received in Japanese Patent Application No. 2018-506989, which corresponds with U.S. Appl. No. 15/272,327, 4 pages.
Certificate of Grant, dated Jun. 28, 2018, received in Australian Patent Application No. 2016304832, which corresponds with U.S. Appl. No. 15/272,345, 4 pages
Notice of Allowance, dated Aug. 15, 2018, received in U.S. Appl. No. 15/482,618, 7 pages.
Final Office Action, dated May 10, 2018, received in U.S. Appl. No. 15/655,749, 19 pages.
Extended European Search Report, dated Jul. 30, 2018, received in European Patent Application No. 18180503.7, which corresponds with U.S. Appl. No. 14/536,426, 7 pages.
Extended European Search Report, dated Aug. 17, 2018, received in European Patent Application No. 18175195.9, which correpsponds with U.S. Appl. No. 14/869,899, 13 pages.
International Preliminary Report on Patentability, dated Sep. 12, 2017, received in International Patent Application No. PCT/US2016/021400, which corresponds with U.S. Appl. No. 14/869,899, 39 pages.
International Preliminary Report on Patentability, dated Feb. 13, 2018, received in International Patent Application No. PCT/US2016/046407, which corresponds with U.S. Appl. No. 15/009,688, 20 pages.
Extended European Search Report, dated Aug. 2, 2018, received in European Patent Application No. 18168941.5, which corresponds with U.S. Appl. No. 14/871,236, 11 pages.
Extended European Search Report, dated May 30, 2018, received in European Patent Application No. 18155939.4, which corresponds with U.S. Appl. No. 15/272,327, 8 pages.
Bilibili, "Android 5.0 Lollipop", https://www.bilibili.com/video/av1636064?from=search&seid=3128140235778895126, Oct. 19, 2014, 3 pages.
Dachis, "All the Awesome Things You Can Do With a Long Press on Your iPhone, iPad, or iPad Touch", www.lifehacker.com, Jan. 25, 2012, 4 pages.
YouTube, "How to Use 3D Touch Multitasking on iPhone", https://www.youtube.com/watch?v=kDq05uRdrCg, Sep. 29, 2015, 1 page.
Notice of Allowance, dated Sep. 5, 2018, received in U.S. Appl. No. 14/535,671, 5 pages.
Patent, dated Aug. 17, 2018, received in Chinese Patent Application No. 201380035982.1, which corresponds with U.S. Appl. No. 14/536,426, 4 pages.
Notice of Allowance, dated Aug. 8, 2018, received in Chinese Patent Application No. 201510566550.4, which corresponds with U.S. Appl. No. 14/536,426, 3 pages.
Notice of Allowance, dated Aug. 31, 2018, received in Chinese Patent Application No. 201380035893.7, which corresponds with U.S. Appl. No. 14/536,141, 6 pages.
Decision to Grant, dated Sep. 13, 2018, received in European Patent Application No. 13798464.7, which corresponds with U.S. Appl. No. 14/608,942, 2 pages.
Decision to Grant, dated Sep. 6, 2018, received in European Office Action No. 13798465.4, which corresponds with U.S. Appl. No. 14/608,965, 2 pages.
Office Action, dated Aug. 24, 2018, received in Japanese Patent Application No. 2017-113598, which corresponds with U.S. Appl. No. 14/609,042, 6 pages.
Office Action, dated Sep. 11, 2018, received in Chinese Patent Application No. 201610159295.6, which corresponds with U.S. Appl. No. 14/864,737, 6 pages.
Office Action, dated Aug. 20, 2018, received in Chinese Patent Application No. 01610130348.1, which corresponds with U.S. Appl. No. 14/868,078, 6 pages.
Notice of Acceptance, dated Aug. 23, 2018, received in Australian Patent Application No. 2018204611, which corresponds with U.S. Appl. No. 14/869,899, 3 pages.
Office Action, dated Sep 21, 2018, received in Japanese Patent Application No. 2018-100827, which corresponds with U.S. Appl. No. 14/869,899, 4 pages.
Final Office Action, dated Aug. 28, 2018, received in U.S. Appl. No. 14/866,992, 52 pages.
Final Office Action, dated Sep. 19, 2018, received in U.S. Appl. No. 15/009,661, 28 pages.
Notice of Allowance, dated Aug. 16, 2018, received in U.S. Appl. No. 14/857,636, 5 pages.
Notice of Allowance, dated Aug. 16, 2018, received in U.S. Appl. No. 14/857,663, 5 pages.
Office Action, dated Aug. 31, 2018, received in Australian Patent Application No. 2016276030, which corresponds with U.S. Appl. No. 14/864,601, 3 pages.
Office Action, dated Sep. 14, 2018, received in Korean Patent Application No. 2018-7013039, which corresponds with U.S. Appl. No. 14/866,361, 2 pages.
Office Action, dated Sep. 19, 2018, received in Chinese Patent Application No. 201610342314.9, which corresponds wtih U.S. Appl. No. 14/866,989, 6 pages.
Notice of Allowance, dated Aug. 27, 2018, received in U.S. Appl. No. 14/870,988, 11 pages.
Intent to Grant, dated Sep. 17, 2018, received in European Patent No. 16711743.1, which corresponds with U.S. Appl. No. 14/871,277, 5 pages.
Office Action, dated Sep. 7, 2018, received in U.S. Appl. No. 14/869,997, 23 pages.
Notice of Acceptance, dated Sep. 10, 2018, received in Australian Patent Application No. 2018202855, which corresponds with U.S. Appl. No. 15/136,782, 3 pages.
Office Action, dated Sep. 14, 2018, received in European Patent Application No. 15155939.4, which corresponds with U.S. Appl. No. 15/272,327, 5 pages.
Patent, dated Aug. 31, 2018, received in Japanese Patent Application No. 2018-506989, which corresponds with U.S. Appl. No. 15/272,327, 3 pages.
Notice of Allowance, dated Sep. 20, 2018, received in U.S. Appl. No. 15/272,343, 44 pages.
Extended European Search Report, dated Aug. 24, 2018, received in European Patent Application No. 18171453.6, which corresponds with U.S. Appl. No. 15/136,782, 9 pages.

(56) References Cited

OTHER PUBLICATIONS

Anonymous, “Event Handling Guide for iOS”, https://github.com/lonfee88/iOSDevelopeLibrary/raw/master/EventHandlingiPhoneOS.pdf, Mar. 9, 2015, 74 pages.
Anonymous, “Event Handling Guide for iOS—GitHub”, https://github.com/lonfee88/iOSDevelopeLibrary/blob/master/EventHandlingiPhoneOS.pdf, Apr. 15, 2015, 3 pages.
McGarry, “Everything You Can Do With Force Touch on Apple Watch”, Macworld, www.macworld.com, May 6, 2015, 4 pages.
Office Action, dated Oct. 9, 2018, received in Chinese Patent Application No. 201380068493.6, which corresponds with U.S. Appl. No. 14/608,895, 3 pages.
Office Action, dated Oct. 5, 2018, received in Korean Patent Application No. 20187028236, which corresponds with U.S. Appl. No. 14/608,895, 6 pages.
Certificate of Grant, dated Sep. 13, 2018, received in Australian Patent Application No. 2016216580, which corresponds with U.S. Appl. No. 14/536,426, 1 page.
Office Action, dated Oct. 8, 2018, received in Chinese Patent Application No. 201380068295.X, which corresponds with U.S. Appl. No. 14/608,942, 3 pages.
Office Action, dated Oct. 19, 2018, received in Japanese Patent Application No. 2018-022394, which corresponds with U.S. Appl. No. 14/536,203, 4 pages.
Decision to Grant, dated Oct. 18, 2018, received in European Patent Application No. 13724106.3, which corresponds with U.S. Appl. No. 14/536,267, 3 pages.
Office Action, dated Oct. 9, 2018, received in Danish Patent Application No. 201670594, which corresponds with U.S. Appl. No. 14/869,899, 2 pages.
Office Action, dated Oct. 5, 2018, received in Korean Patent Application No. 20187017213, which corresponds with U.S. Appl. No. 14/869,899, 3 pages.
Office Action, dated Oct. 12, 2018, received in European Patent Application No. 16758008.3, which corresponds with U.S. Appl. No. 14/866,992, 11 pages.
Office Action, dated Oct. 12, 2018, received in Japanese Patent Application No. 2017-141962, which corresponds with U.S. Appl. No. 14/866,361, 6 pages.
Office Action, dated Oct. 11, 2018, received in Australian Patent Application No. 2017245442, which corresponds with U.S. Appl. No. 14/871,227, 4 pages.
Notice of Allowance, dated Oct. 1, 2018, received in Korean Patent Application No. 2016-7019816, which corresponds with U.S. Appl. No. 14/871,227, 6 pages.
Notice of Allowance, dated Oct. 12, 2018, received in Japanese Patent Application No. 2018-020324, which corresponds with U.S. Appl. No. 14/871,336, 5 pages.
Notice of Allowance, dated Oct. 12, 2018, received in Japanese Patent Application No. 2017-086460, which corresponds with U.S. Appl. No. 15/081,771, 5 pages.
Patent, dated Sep. 28, 2018, received in Korean Patent Application No. 20177014536, which corresponds with U.S. Appl. No. 15/081,771, 3 pages.
Office Action, dated Oct. 11, 2018, received in U.S. Appl. No. 14/609,006, 12 pages.
Notice of Allowance, dated Oct. 9, 2018, received in U.S. Appl. No. 14/864,529, 11 pages.
Final Office Action, dated Oct. 11, 2018, received in U.S. Appl. No. 14/866,987, 20 pages.
Final Office Action, dated Oct. 17, 2018, received in U.S. Appl. No. 14/867,892, 48 pages.
Final Office Action, dated Oct. 4, 2018, received in U.S. Appl. No. 14/869,361, 28 pages.
Office Action, dated Oct. 15, 2018, received in U.S. Appl. No. 15/272,345, 31 pages.
Notice of Allowance, dated Oct. 12, 2018, received in U.S. Appl. No. 15/499,693, 8 pages.

* cited by examiner

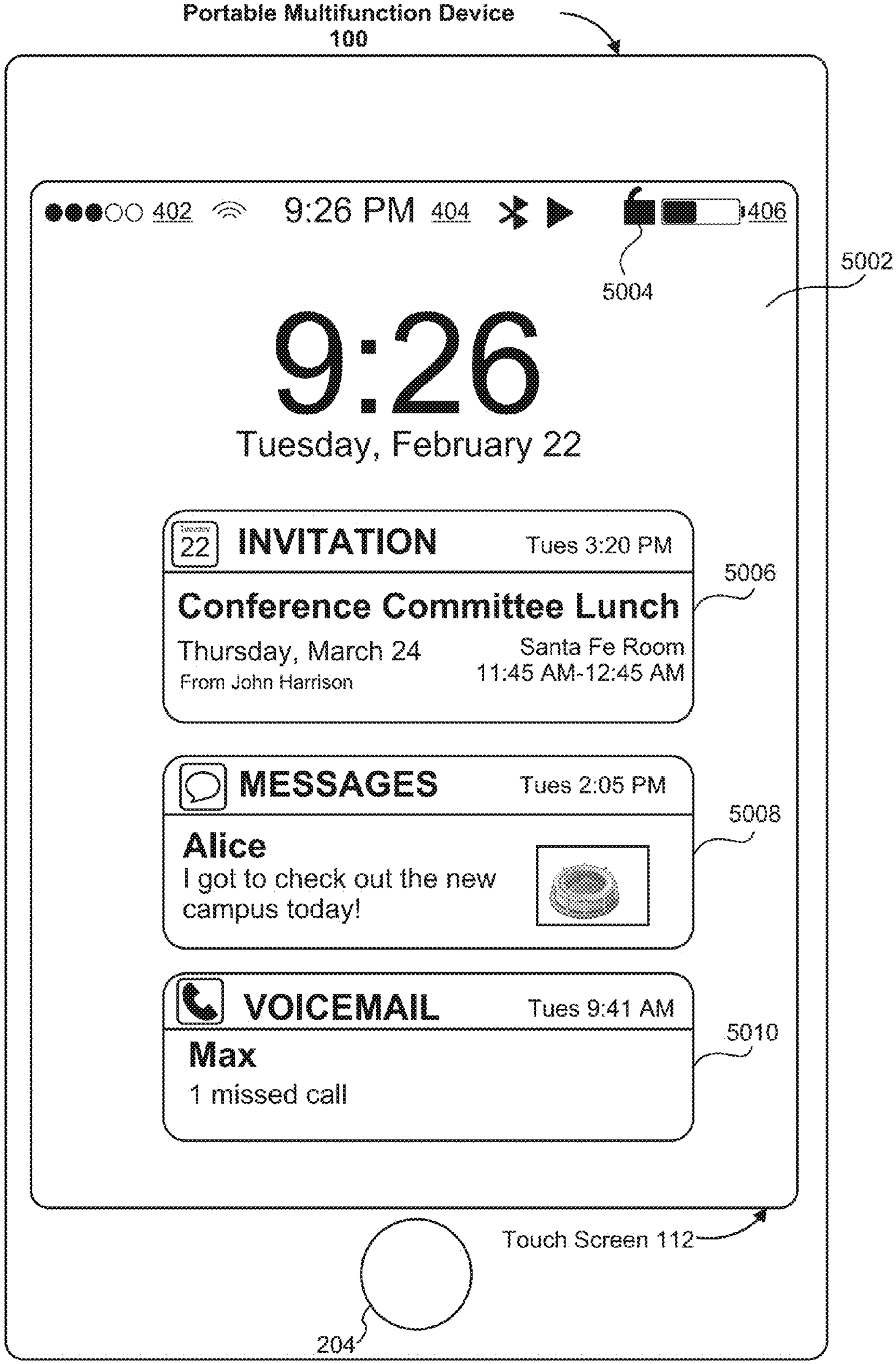
Figure 5A1

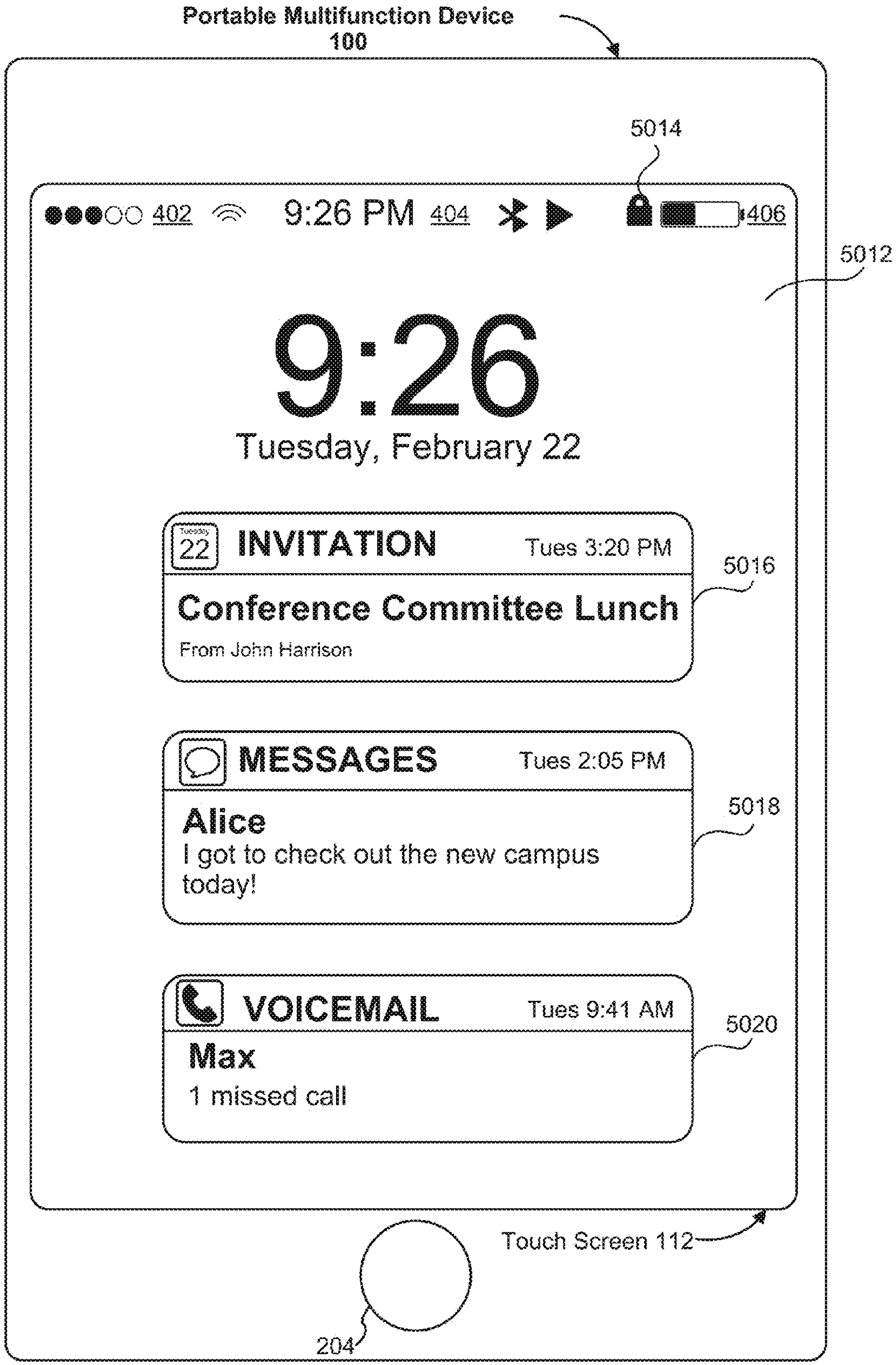
Figure 5A2

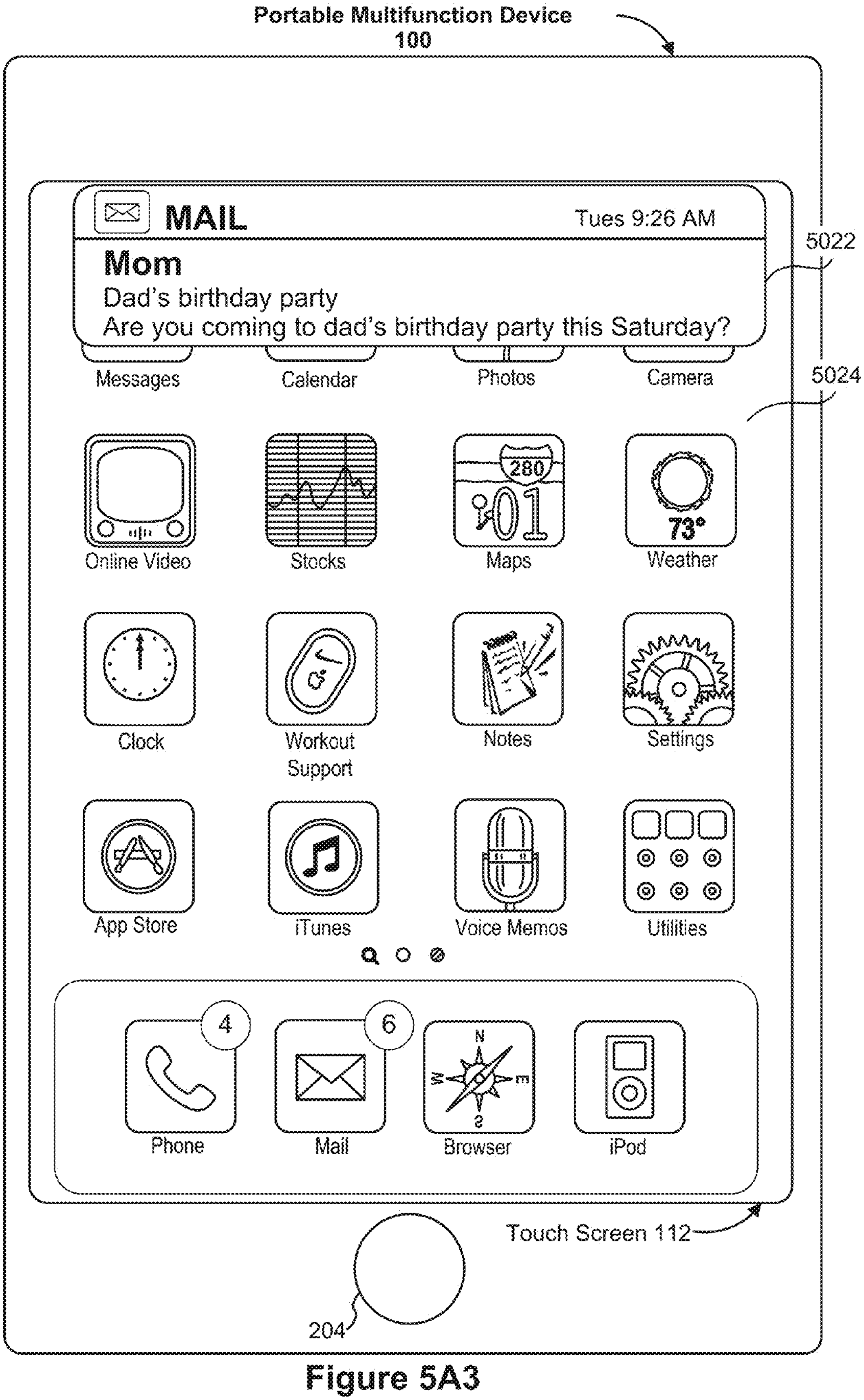
Figure 5A3

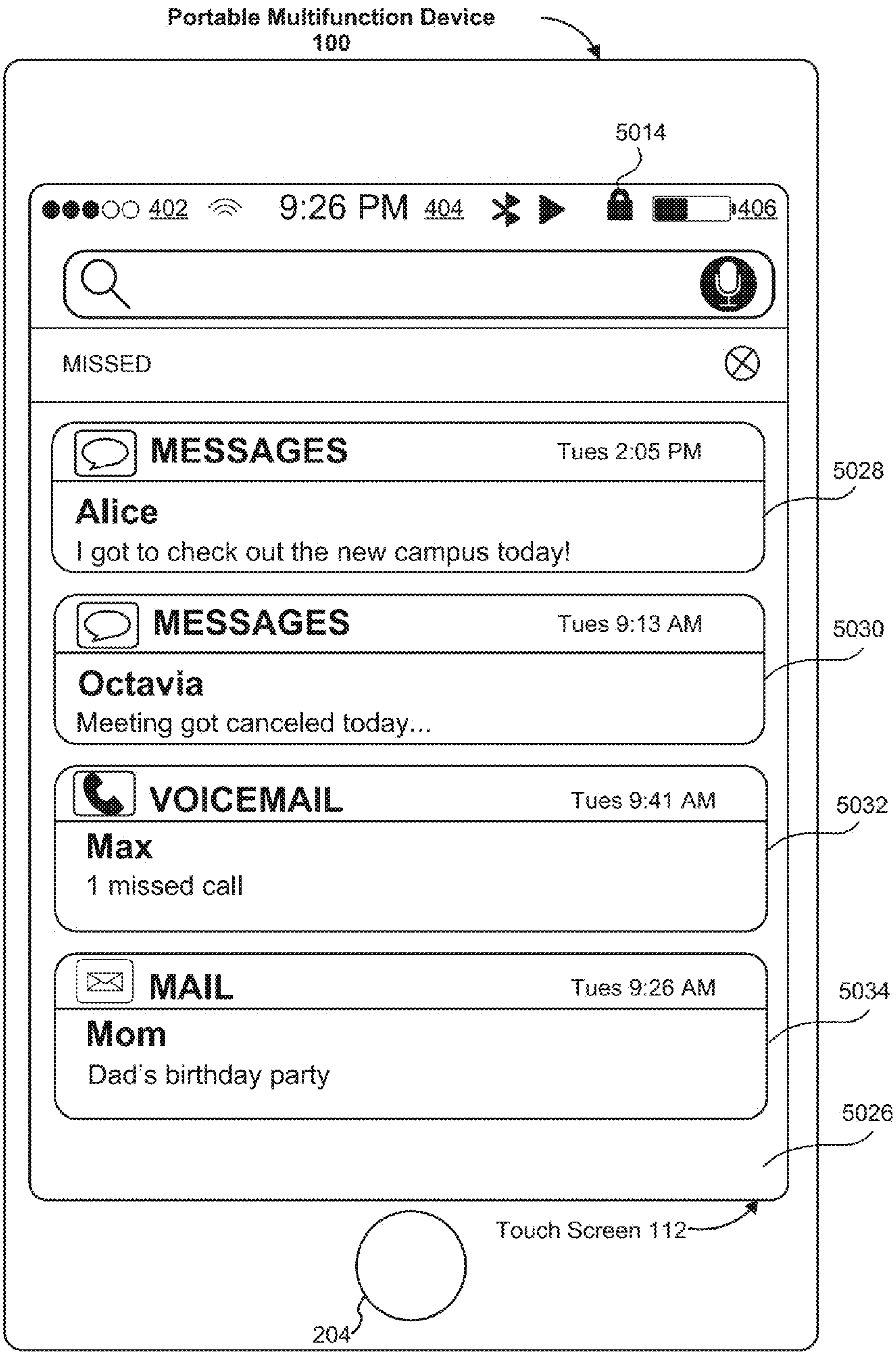
Figure 5A4

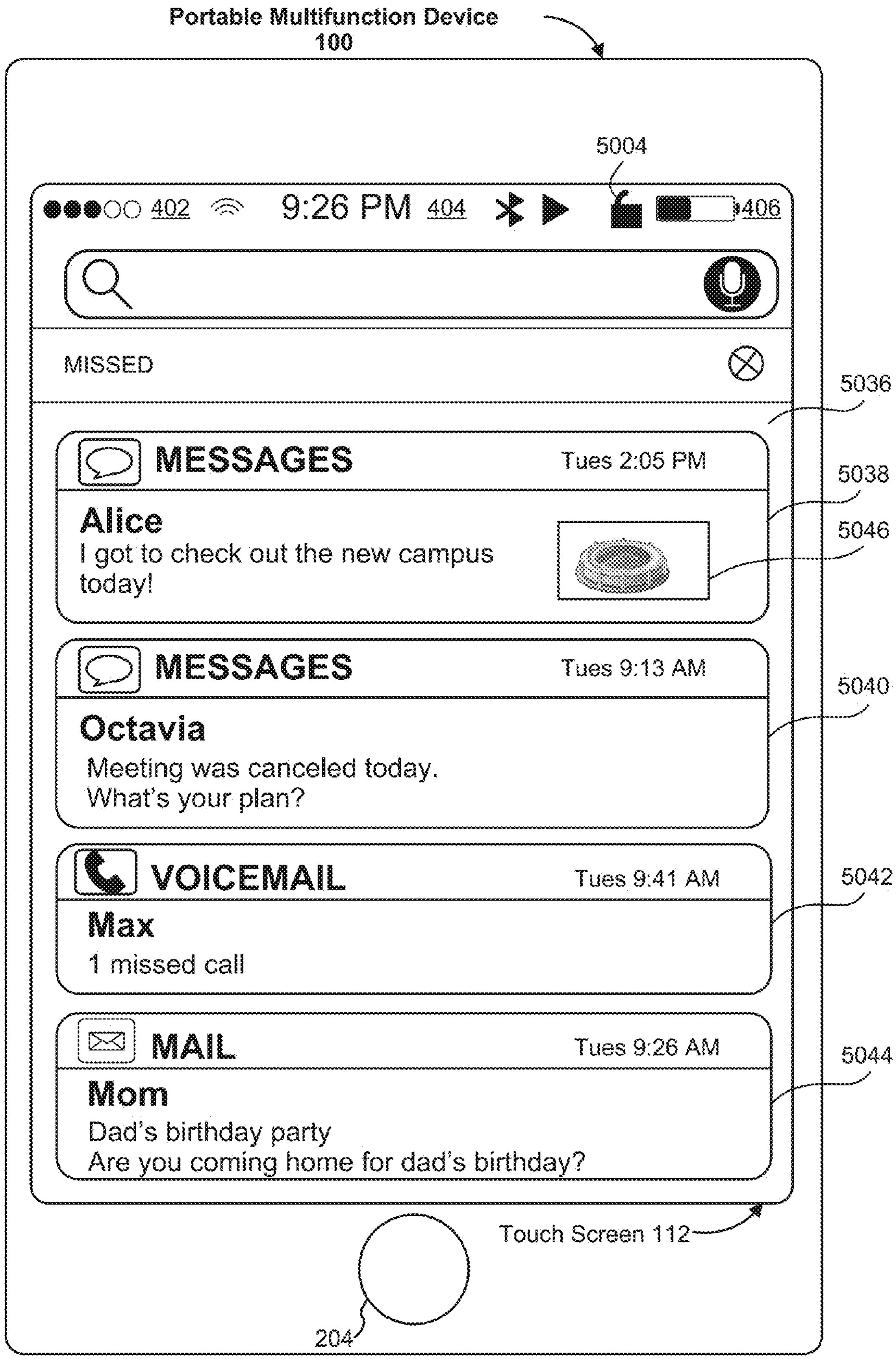
Figure 5A5

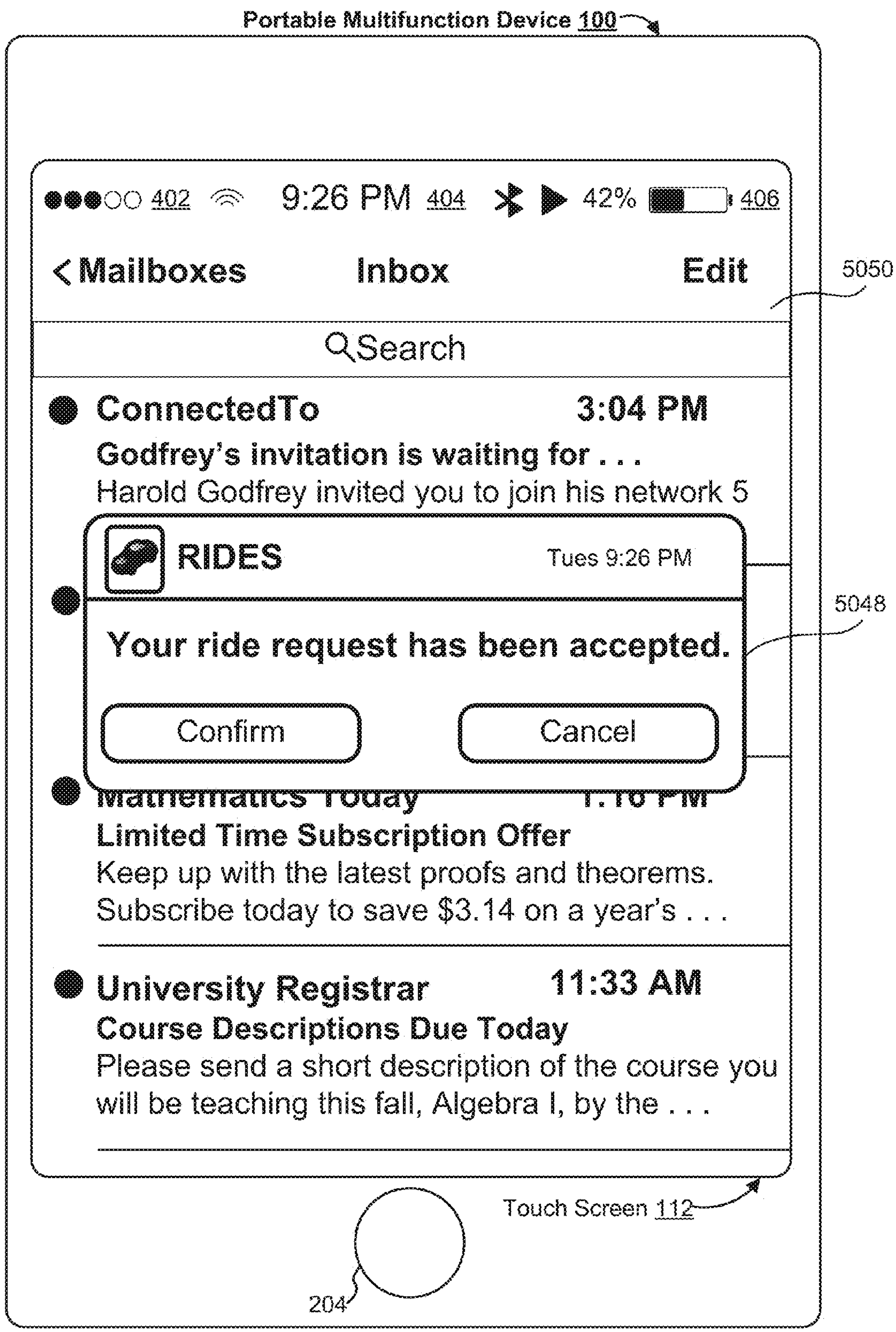
Figure 5A6

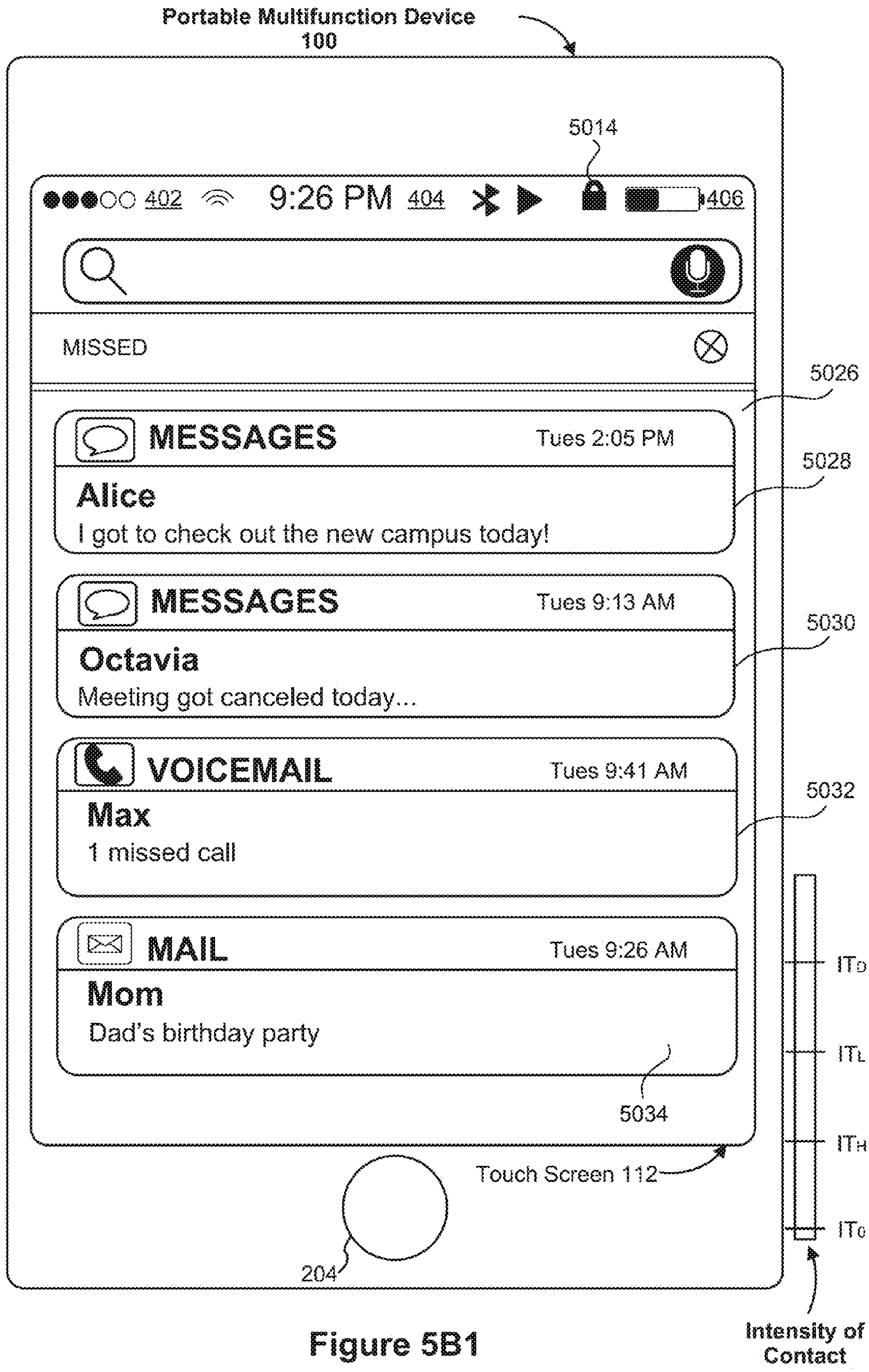
Figure 5B1

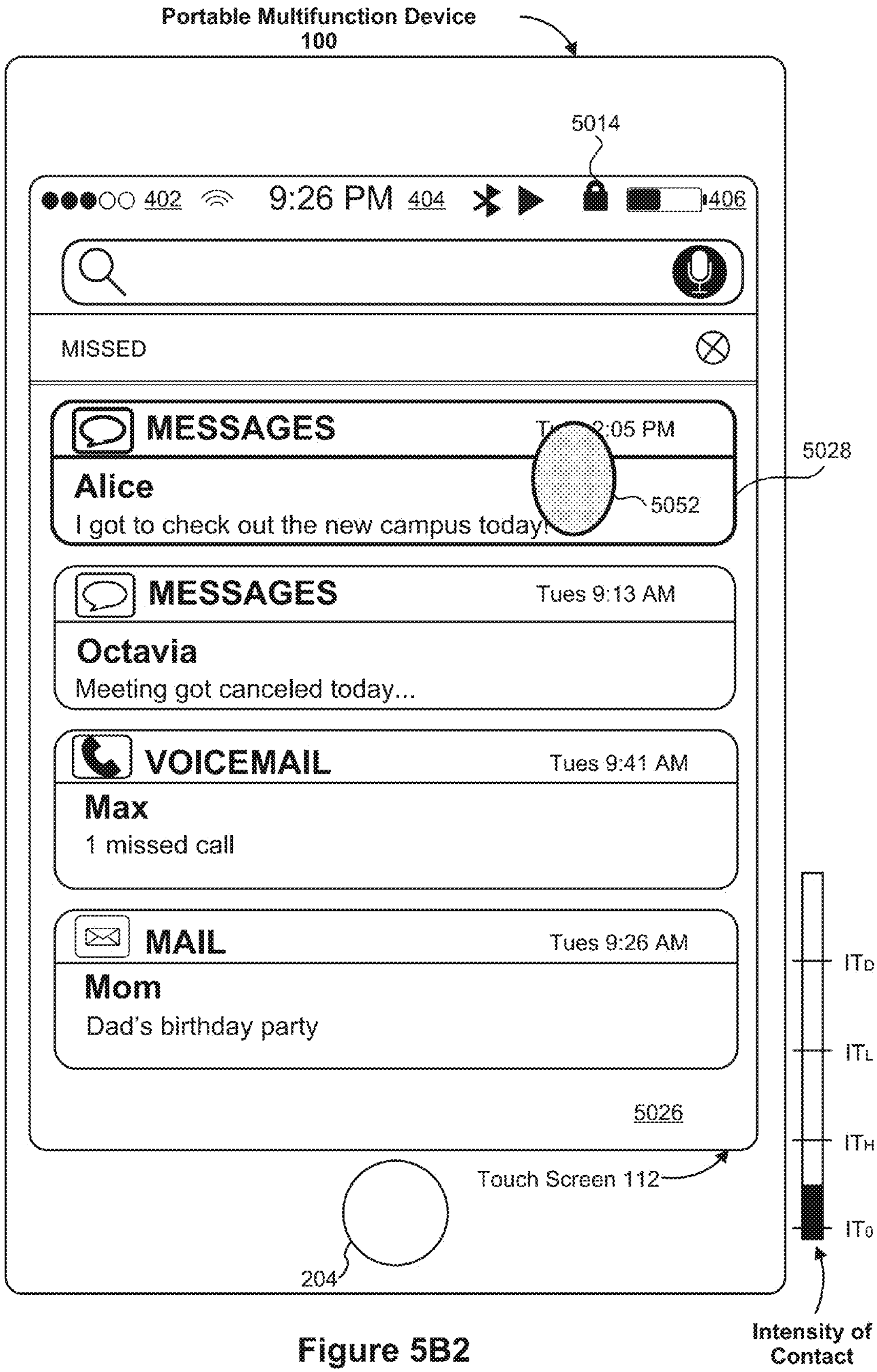
Figure 5B2

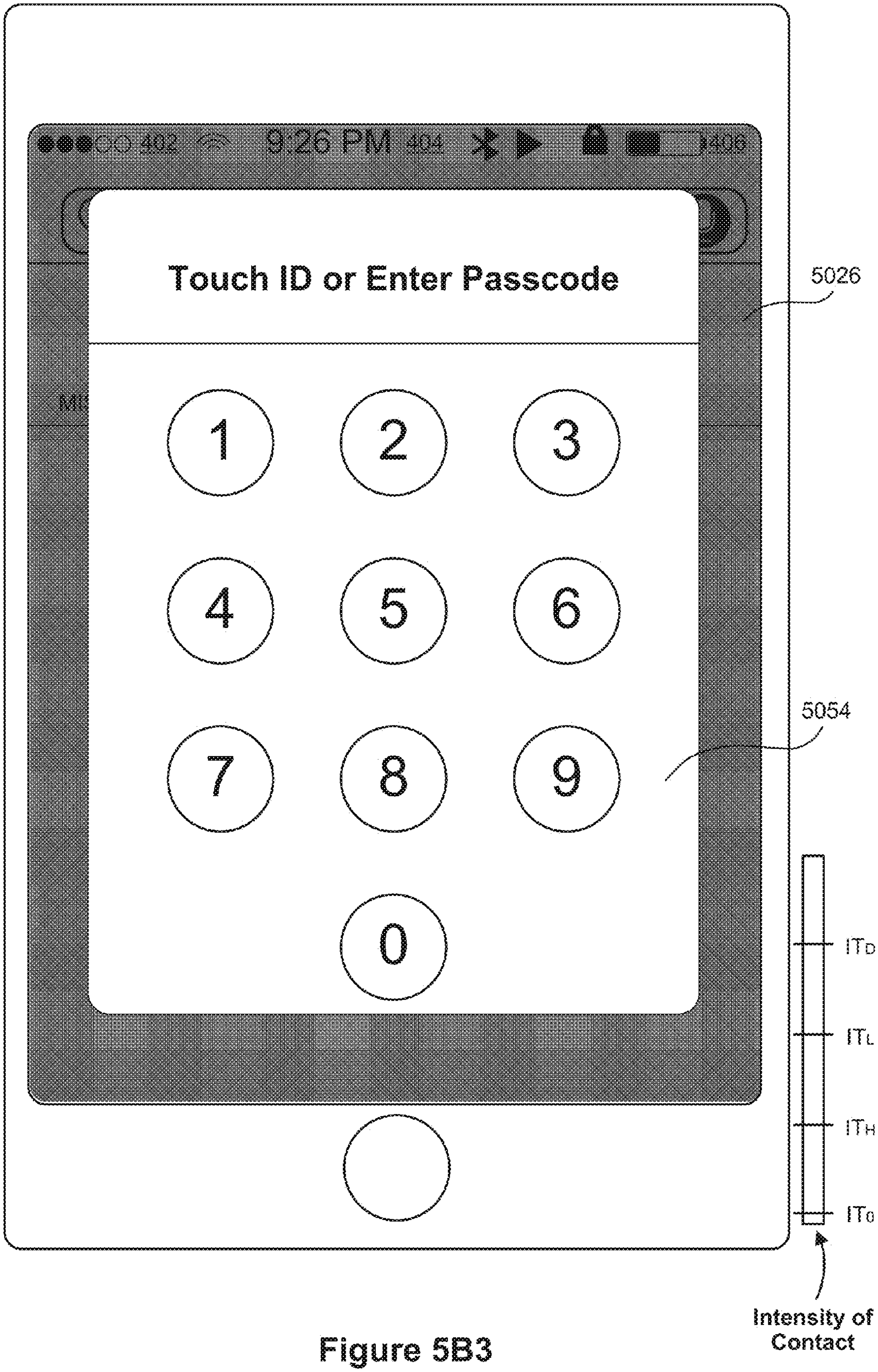
Figure 5B3

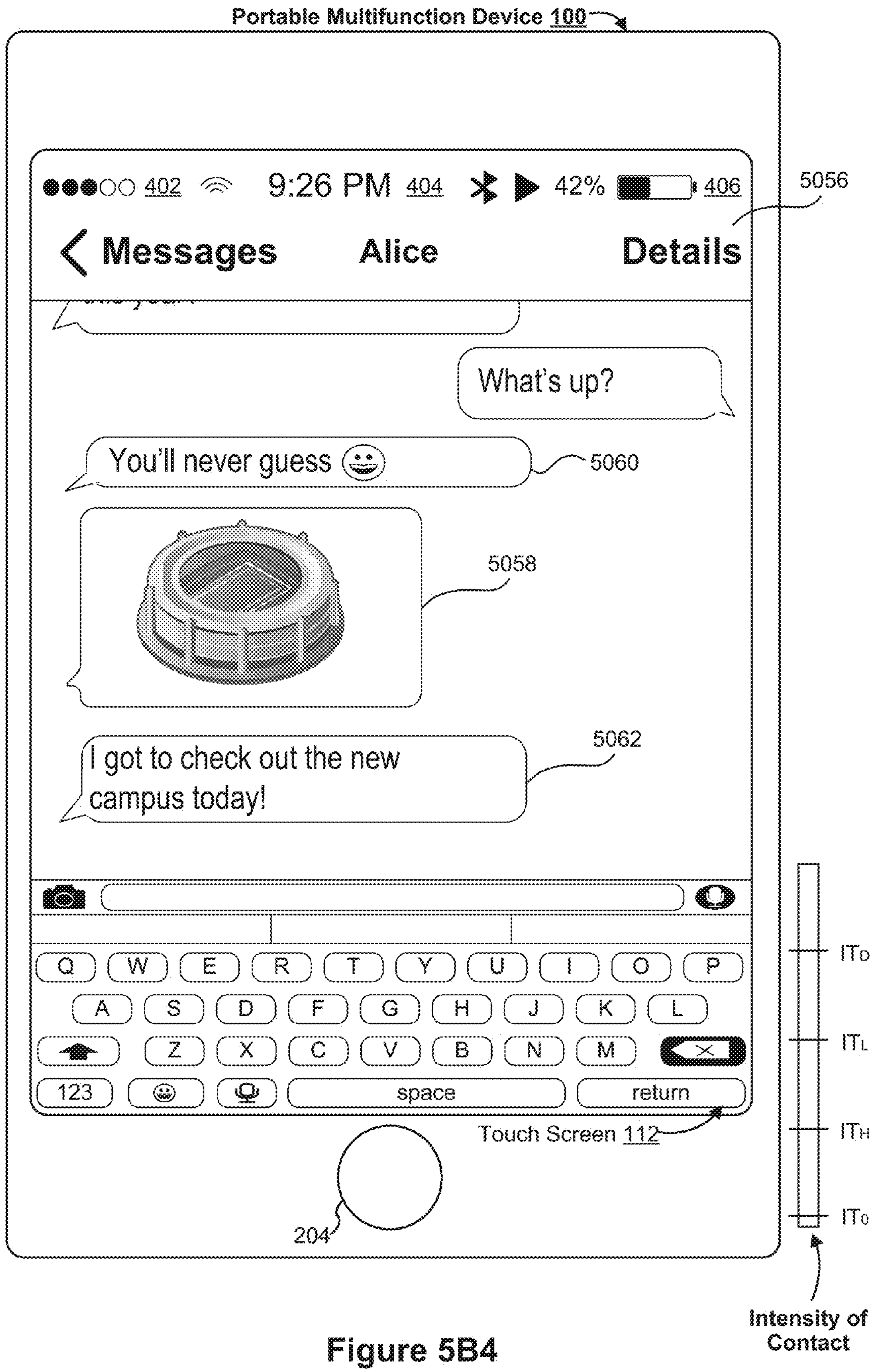
Figure 5B4

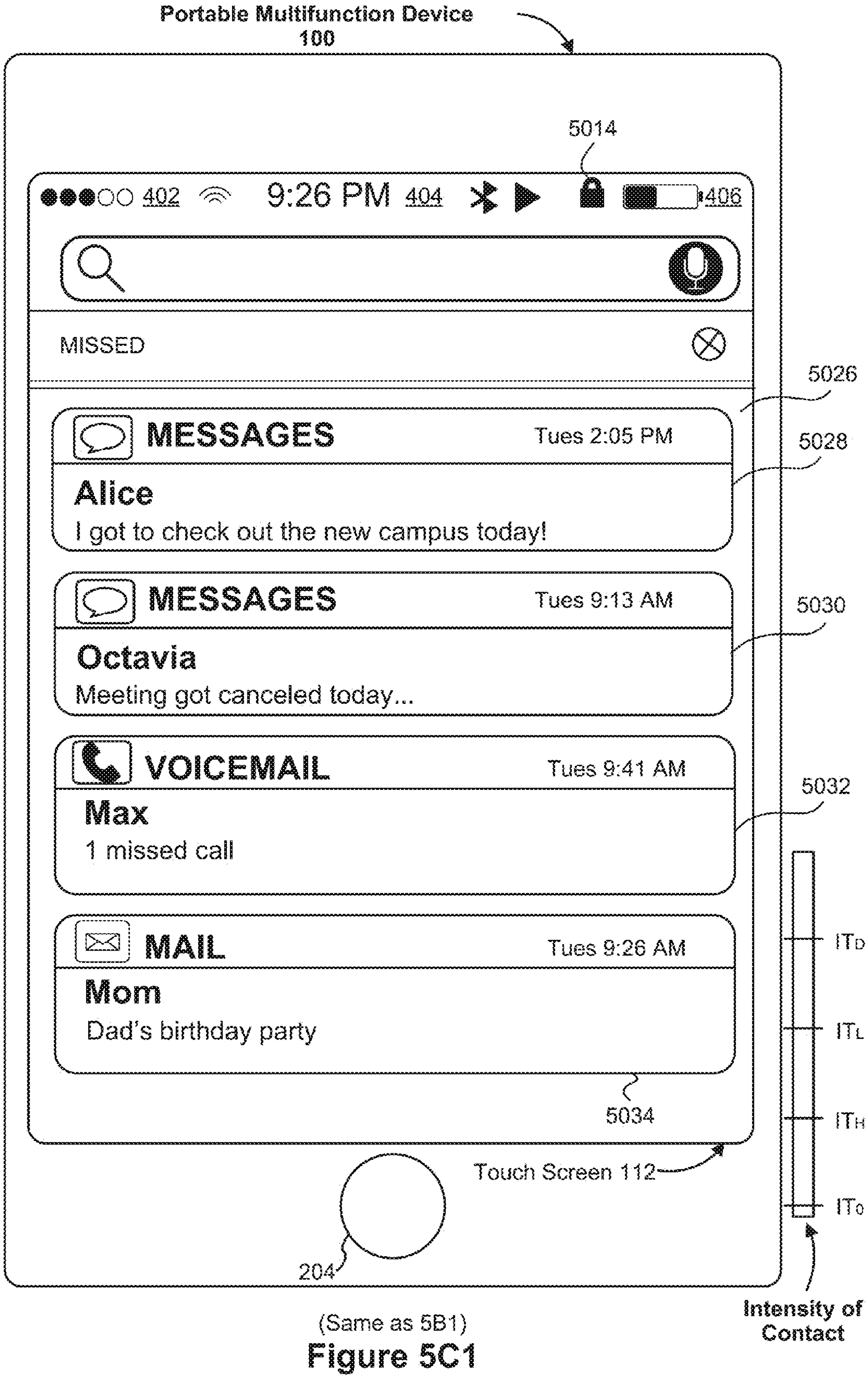
(Same as 5B1)
Figure 5C1

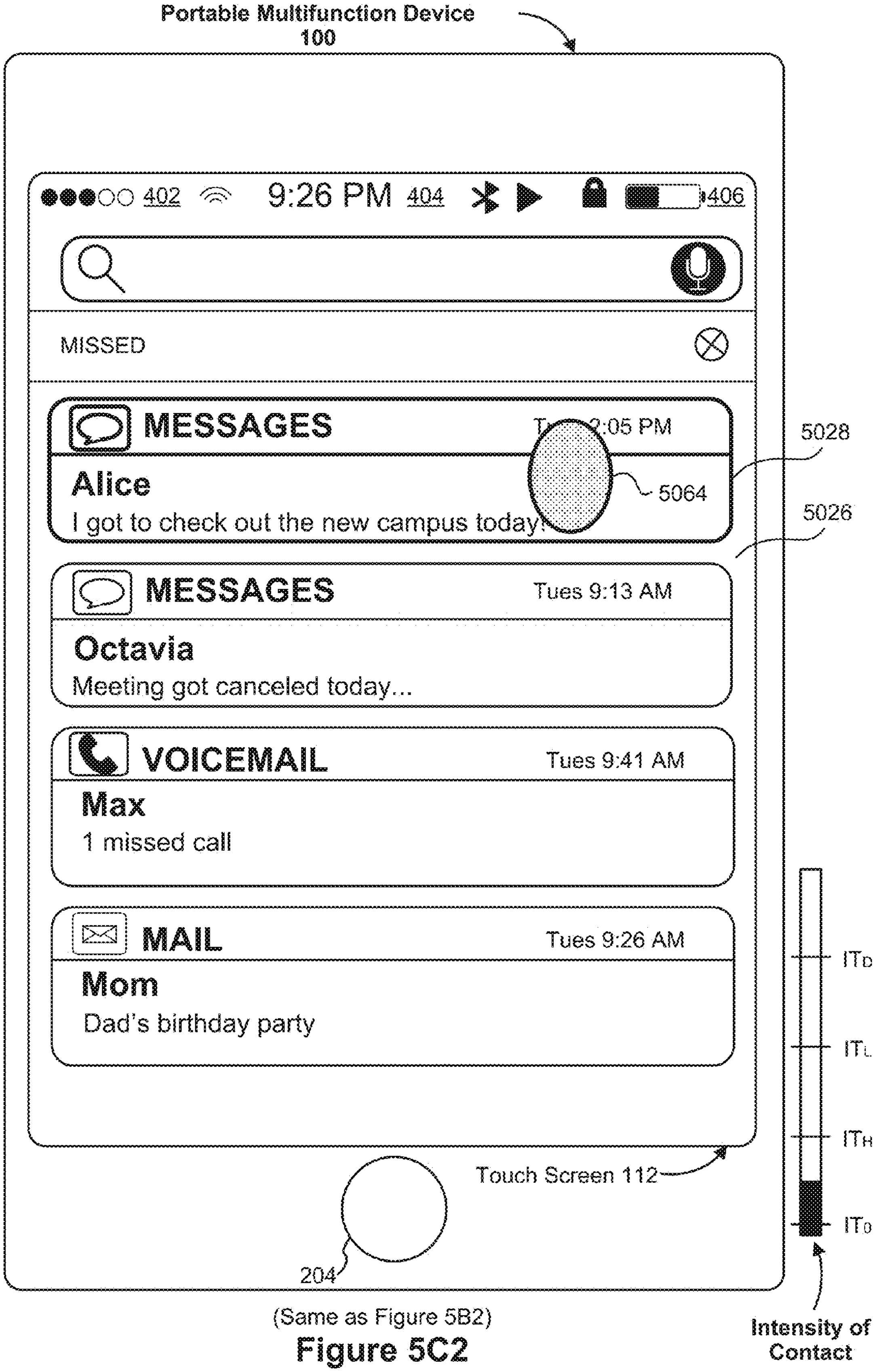
(Same as Figure 5B2)
Figure 5C2

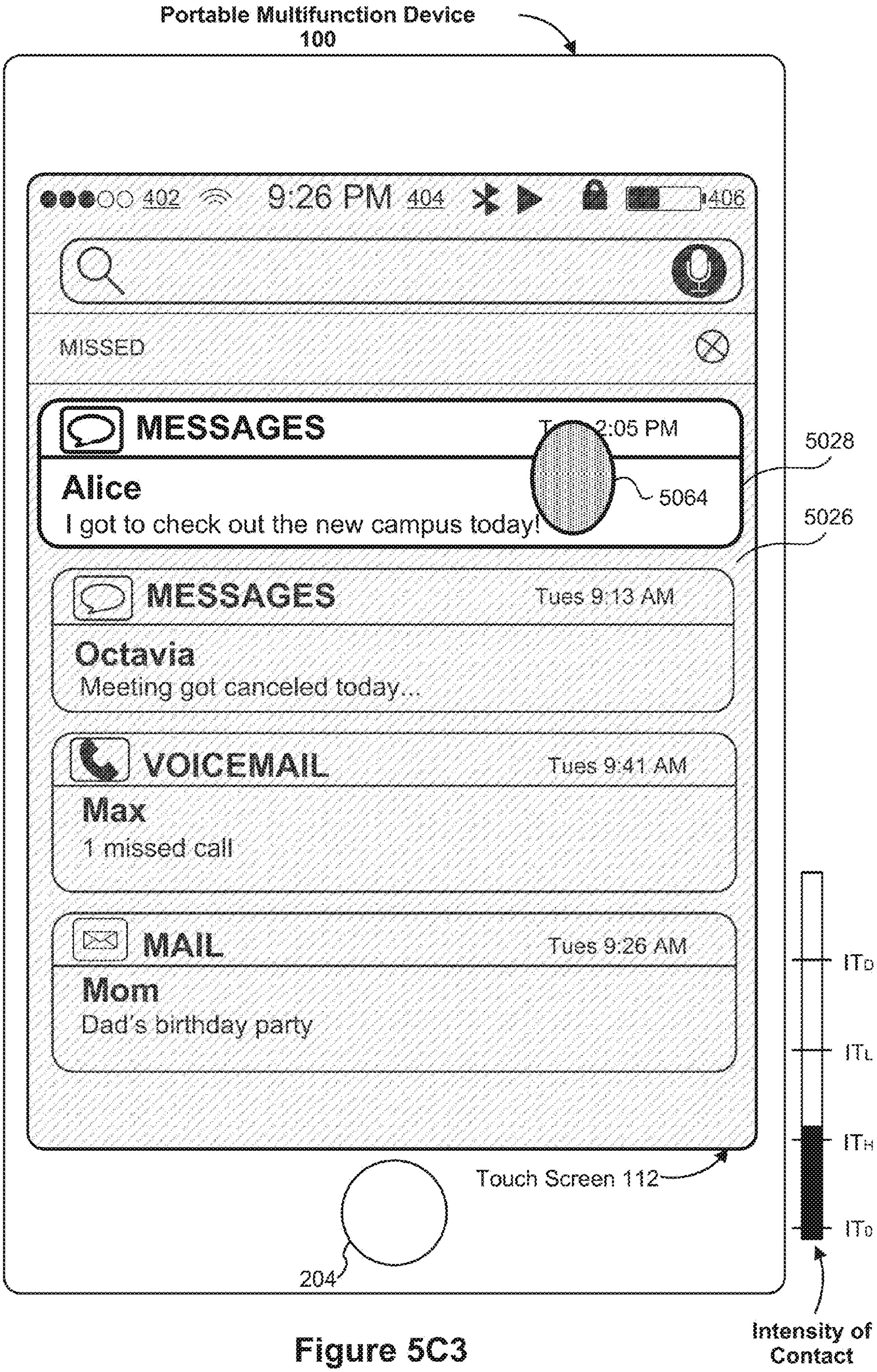
Figure 5C3

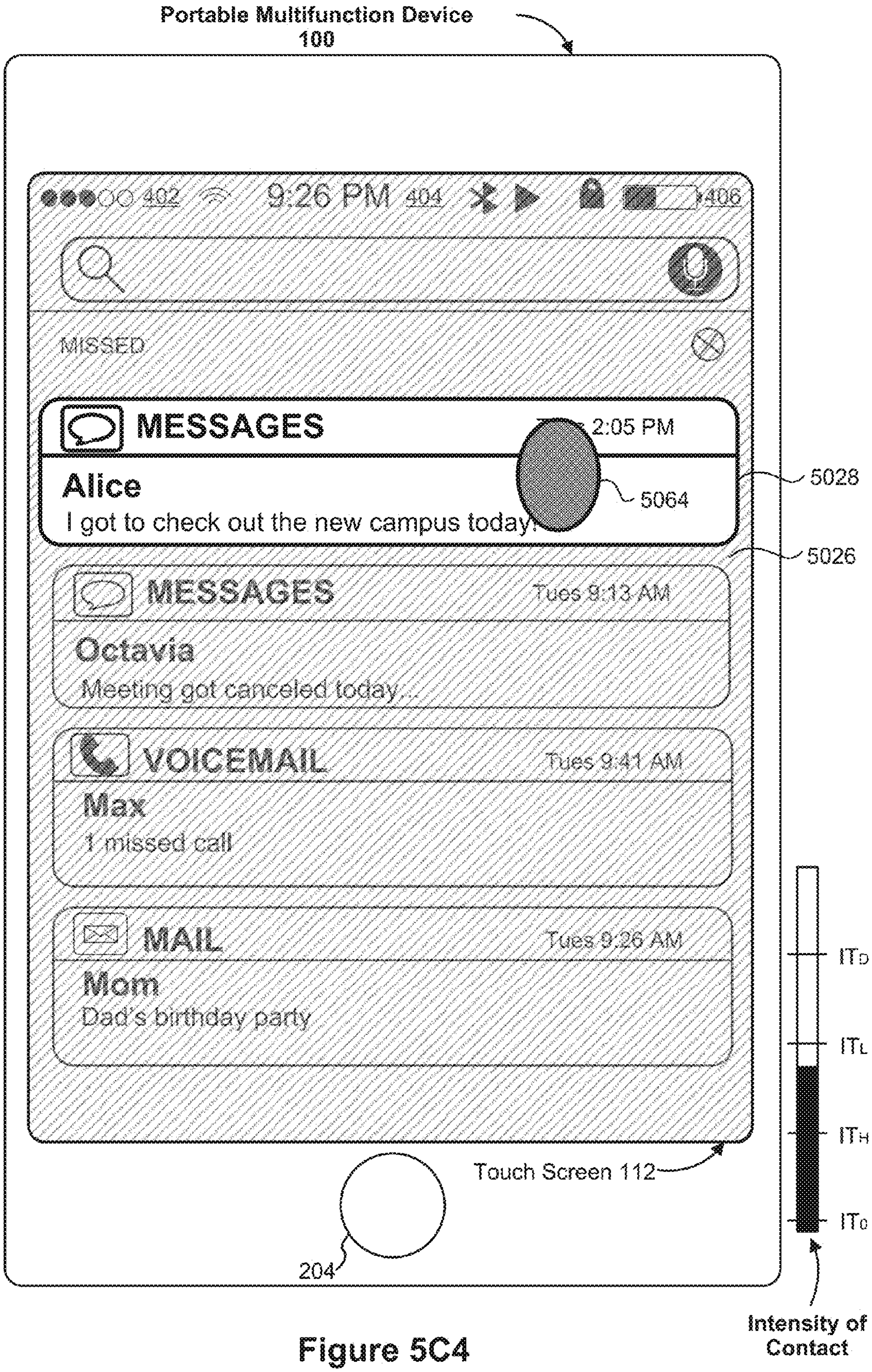
Figure 5C4

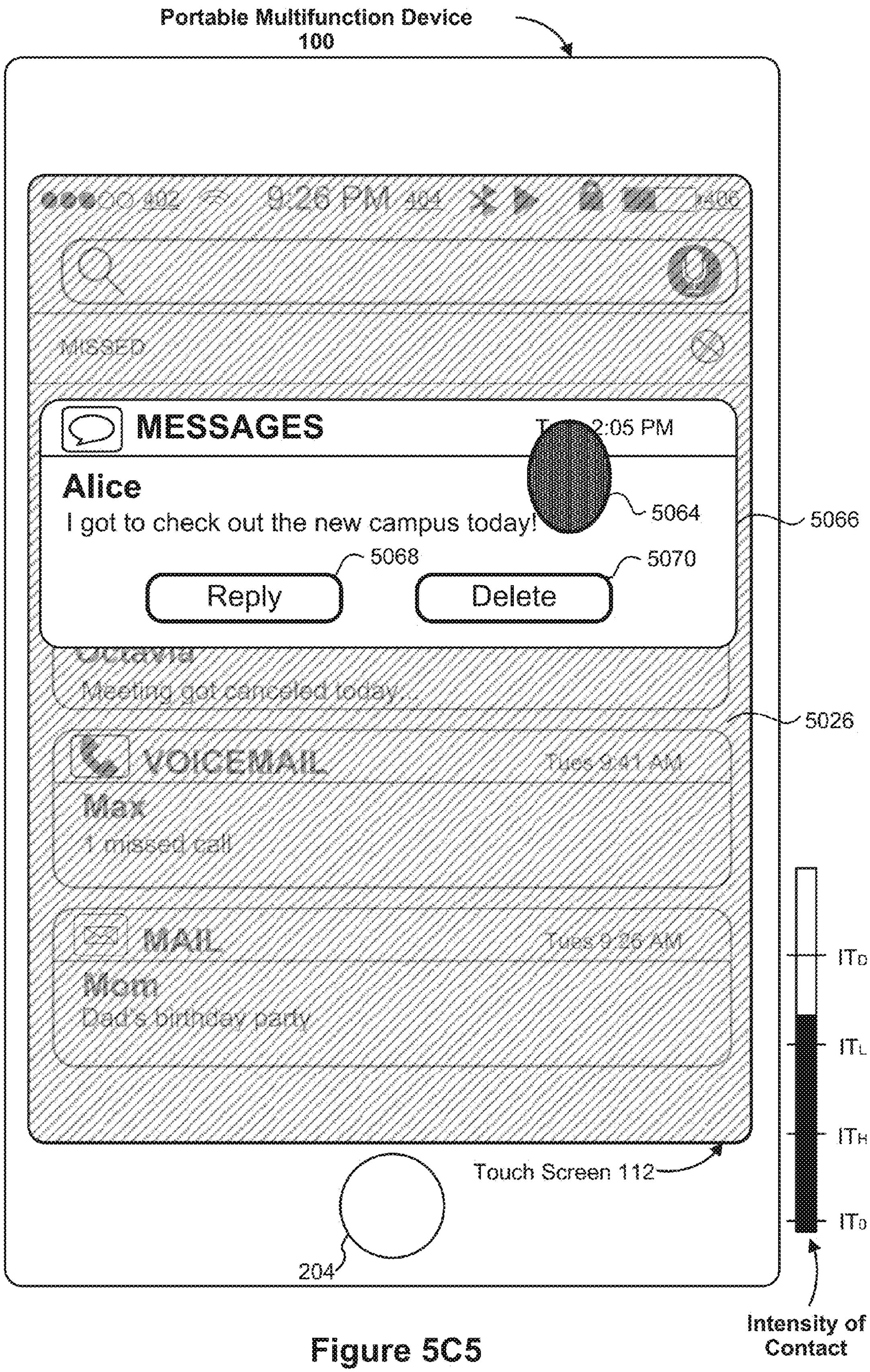
Figure 5C5

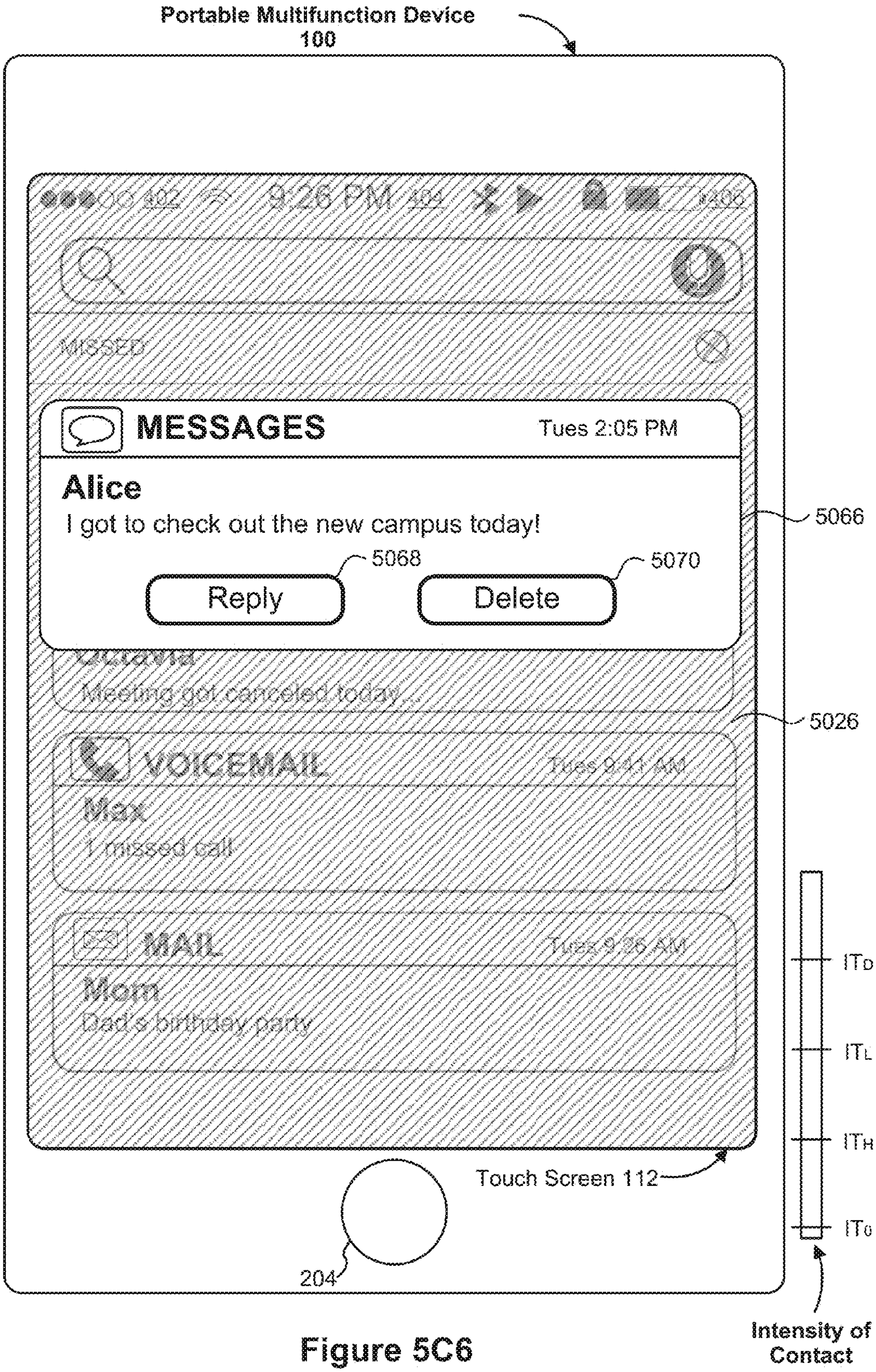
Figure 5C6

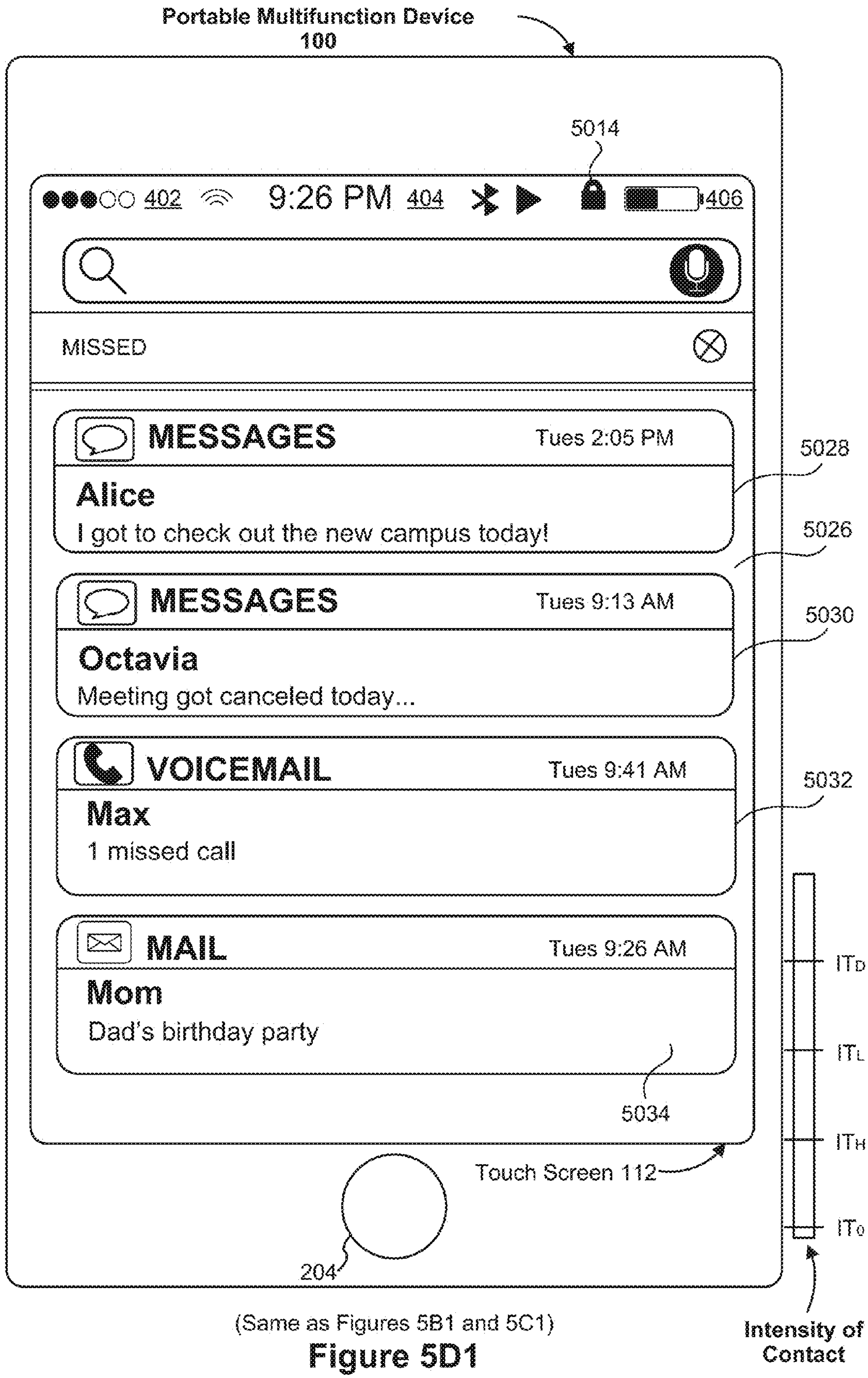
(Same as Figures 5B1 and 5C1)
Figure 5D1

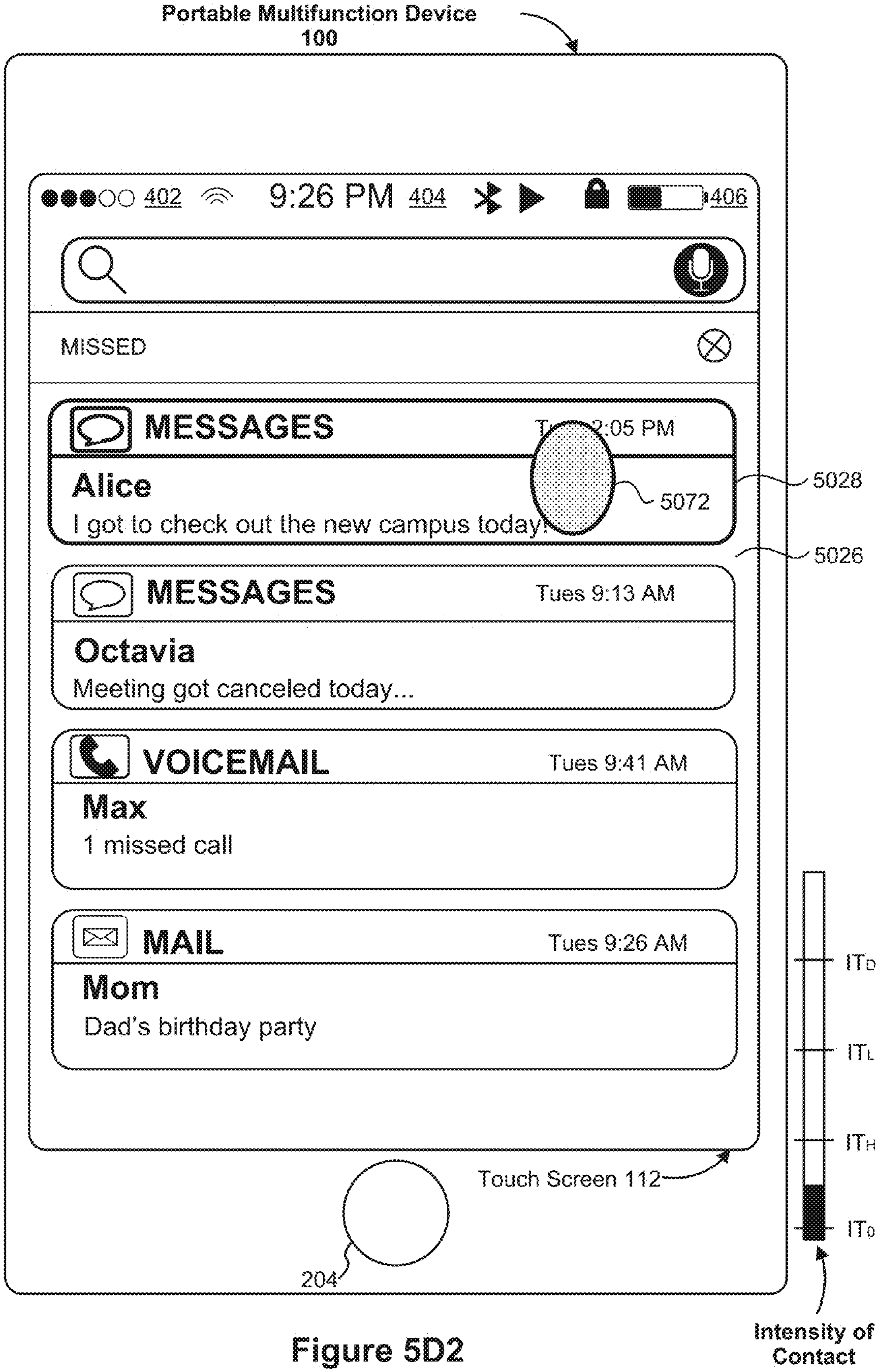
Figure 5D2

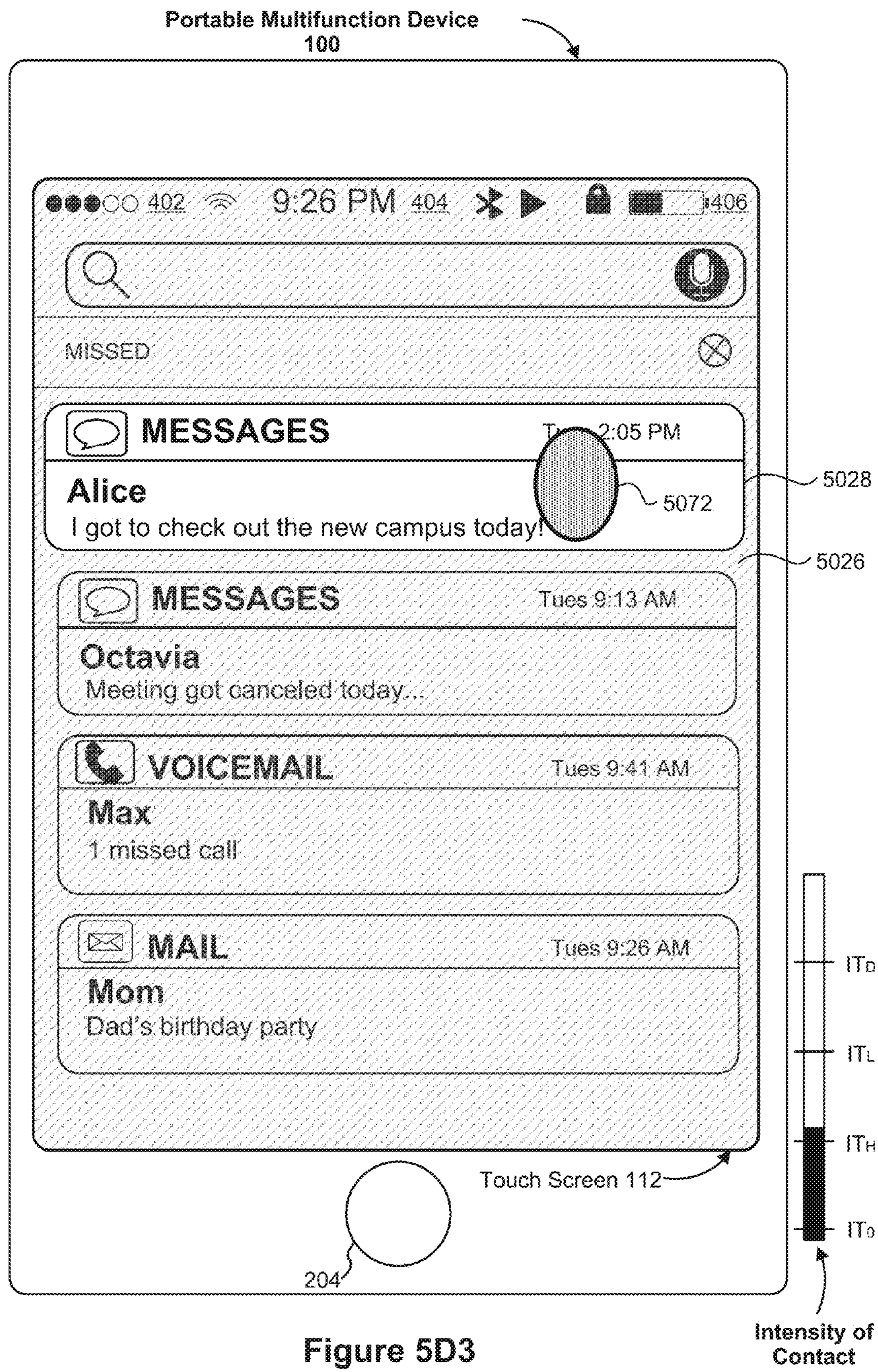
Figure 5D3

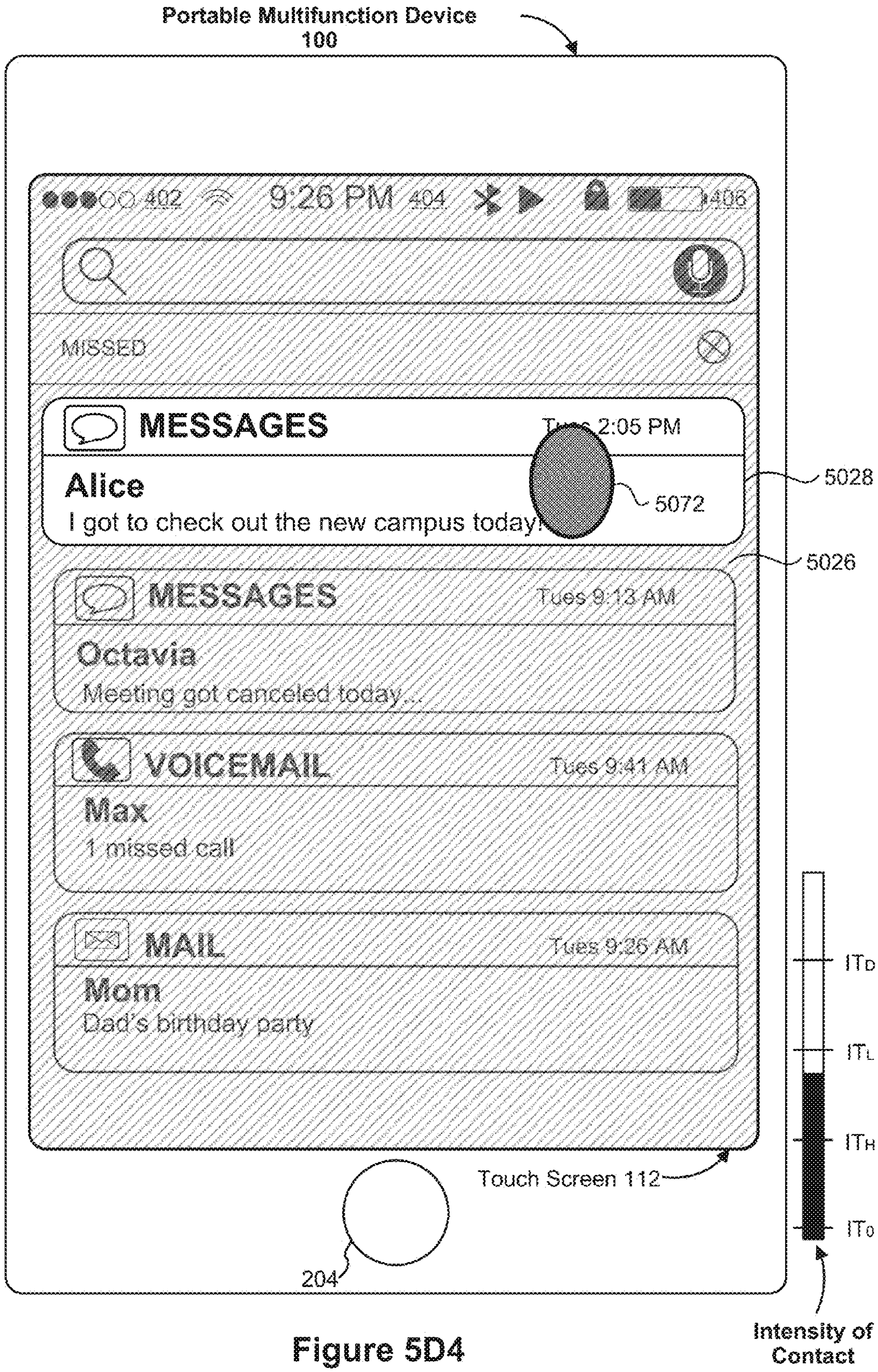
Figure 5D4

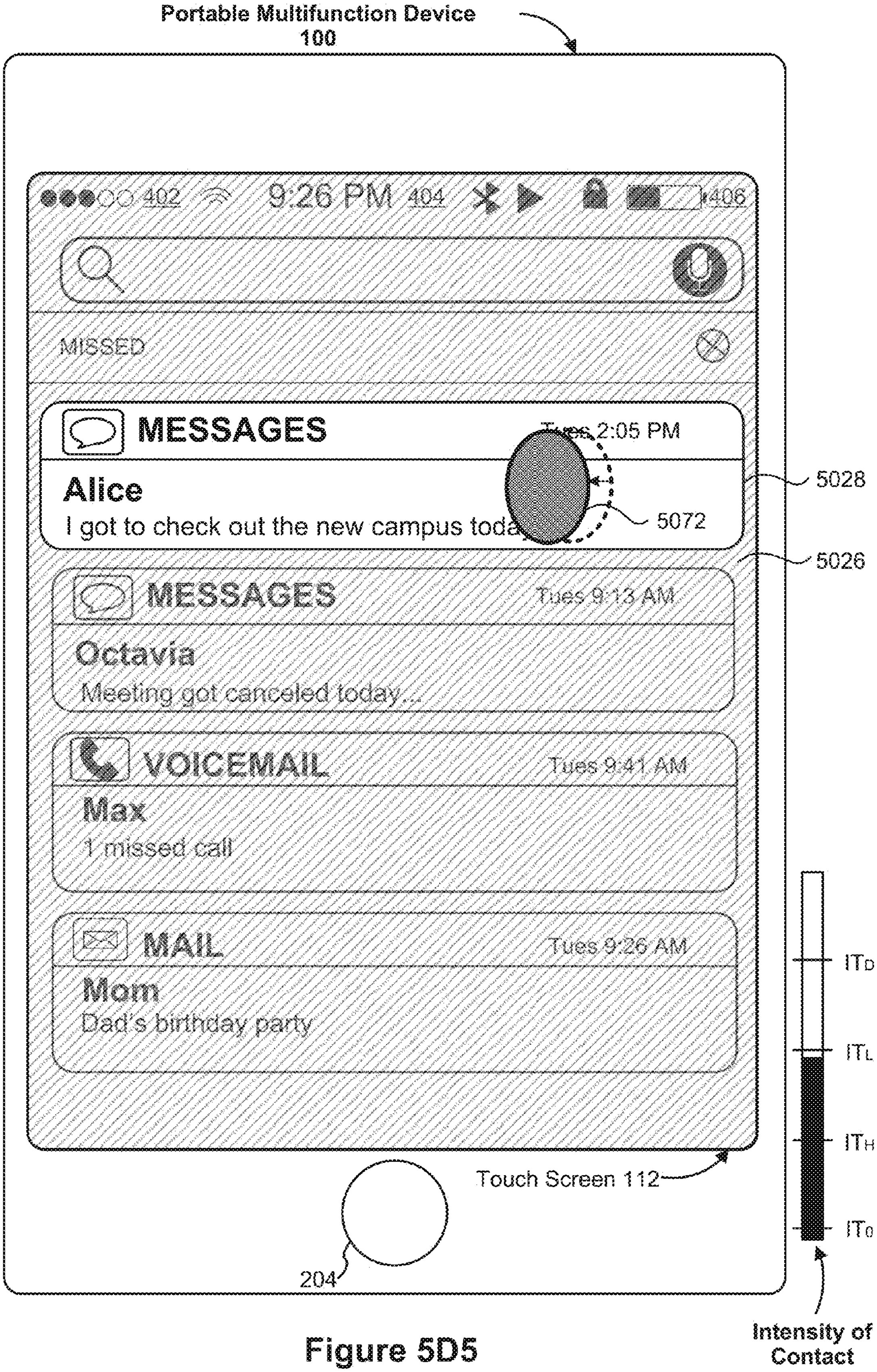
Figure 5D5

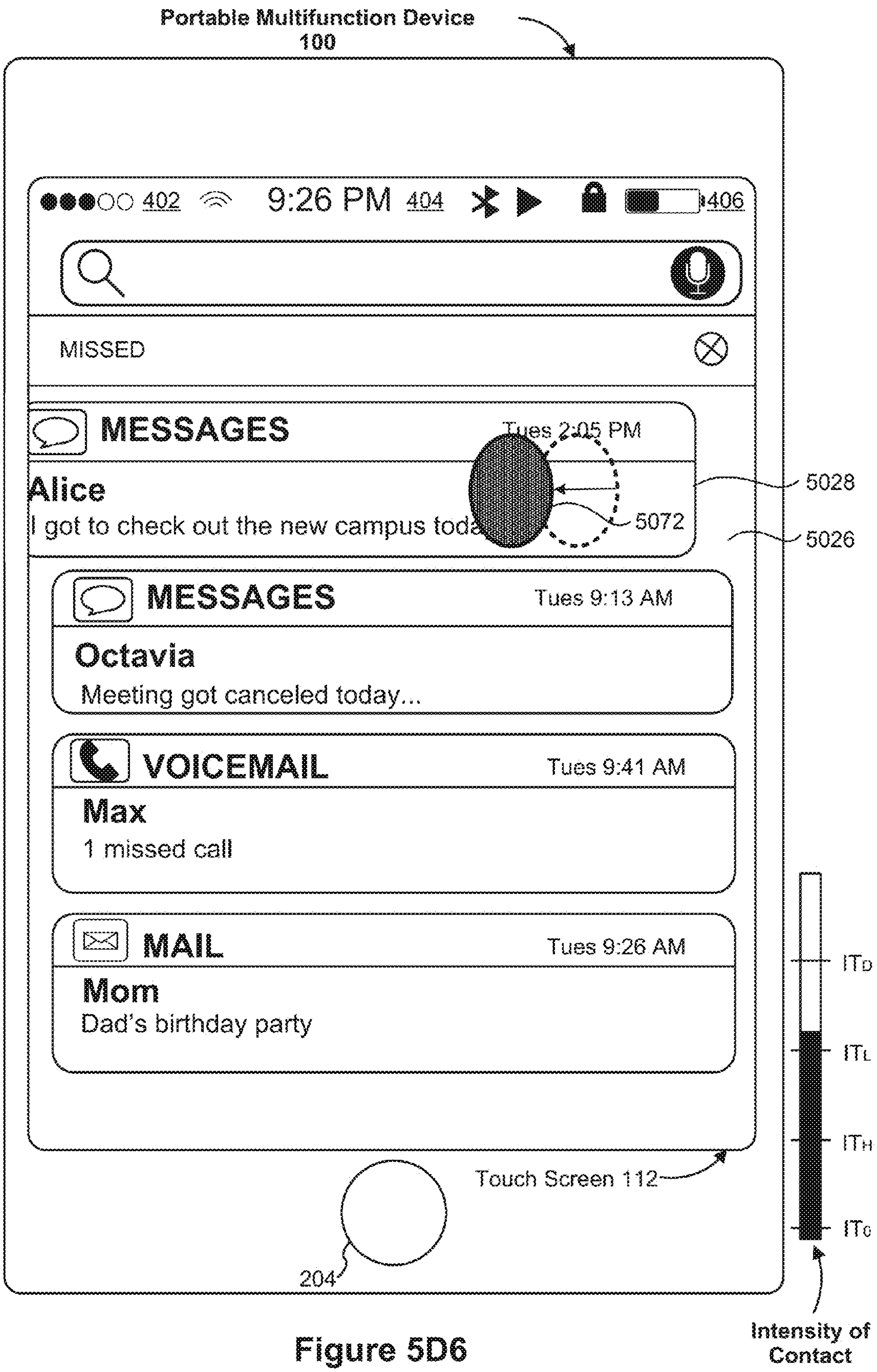
Figure 5D6

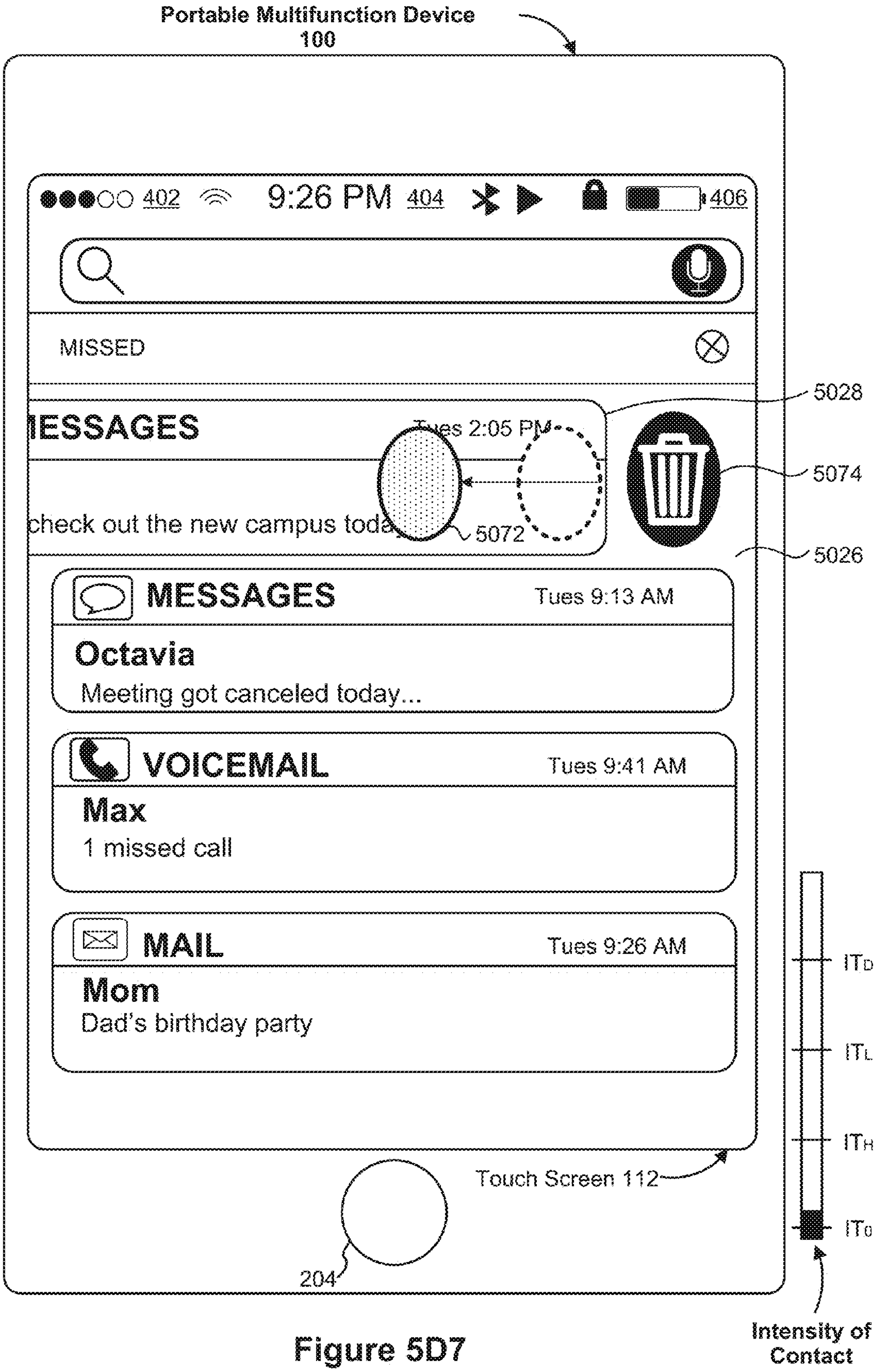
Figure 5D7

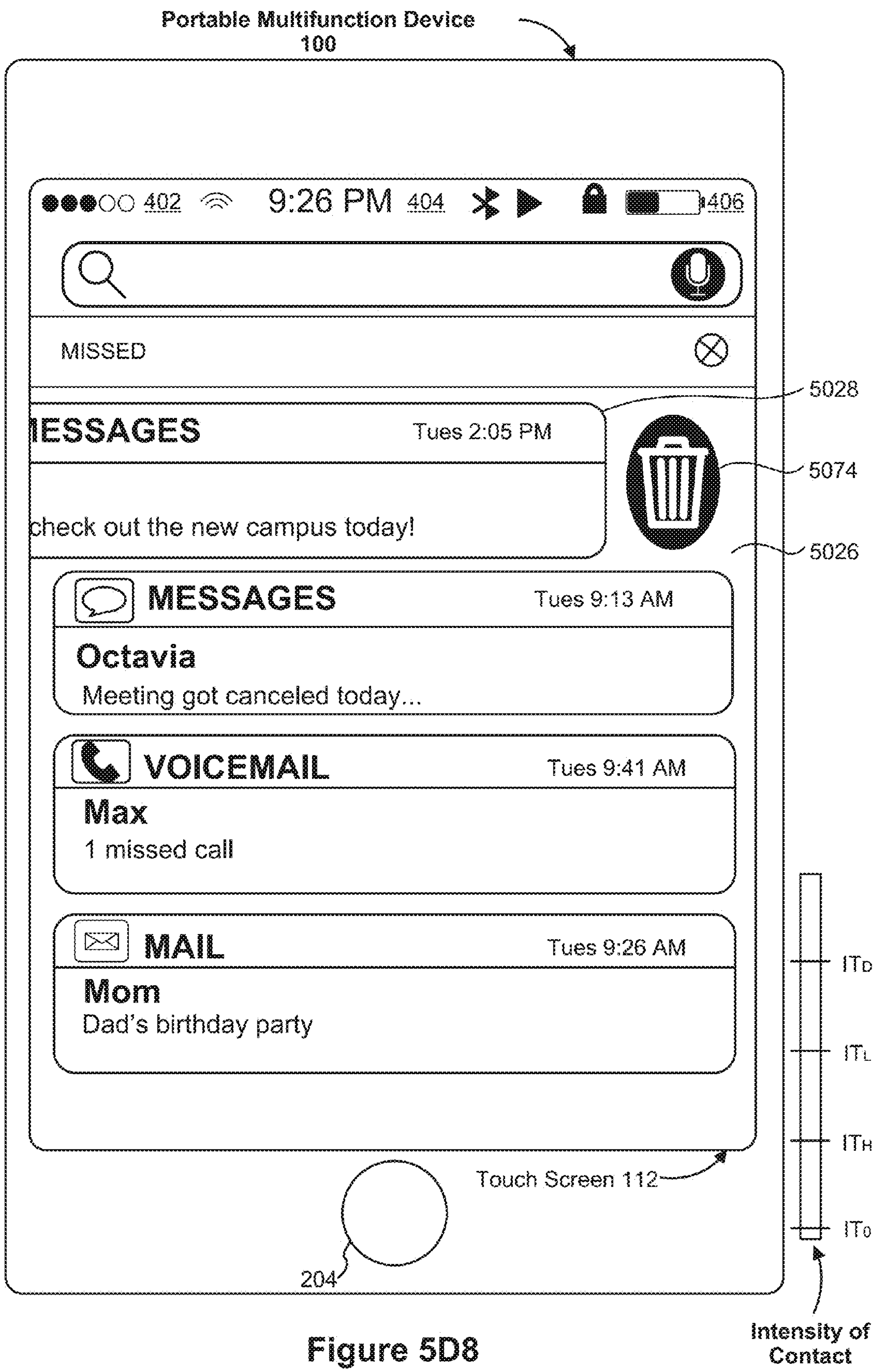
Figure 5D8

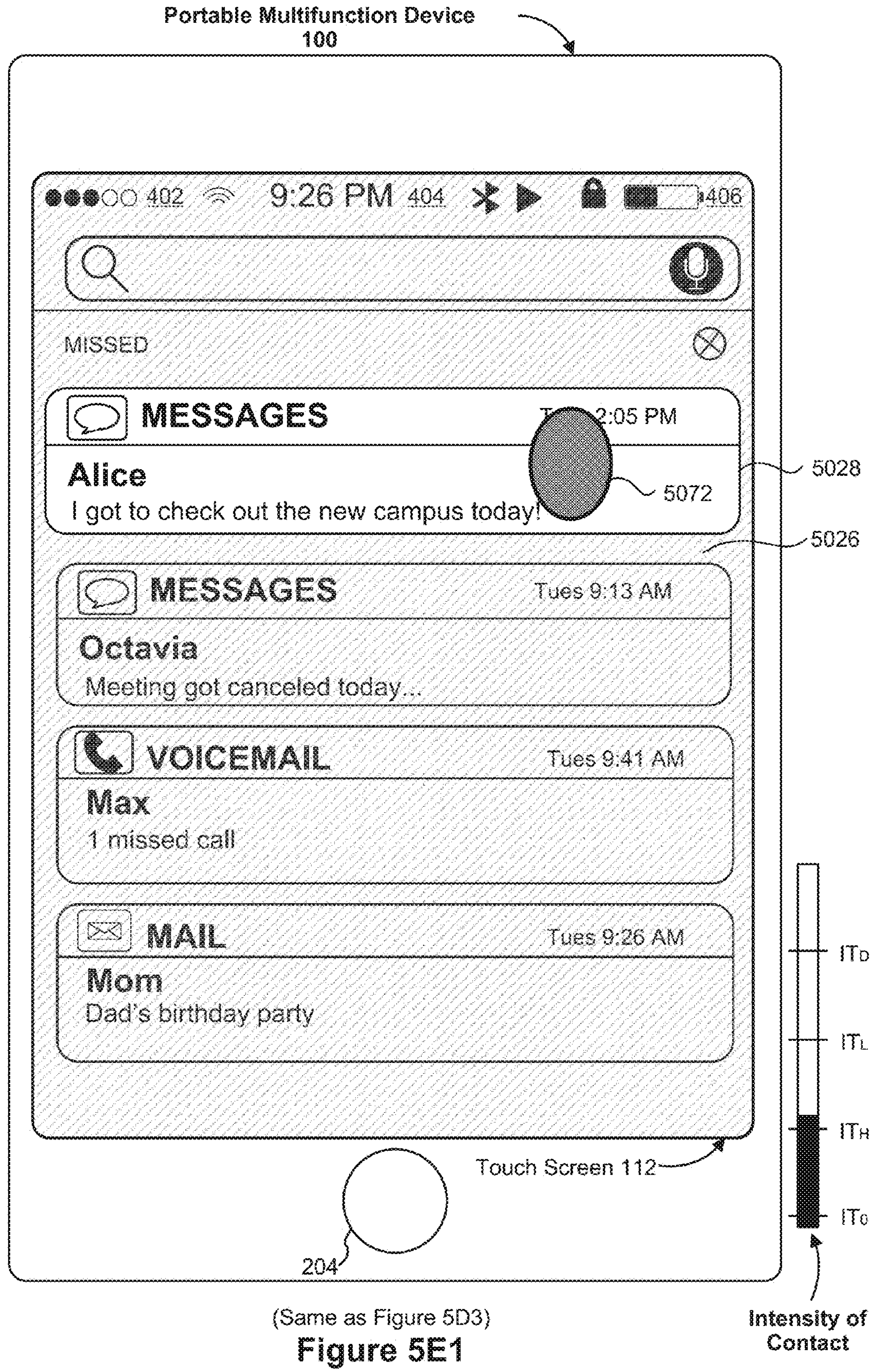
(Same as Figure 5D3)
Figure 5E1

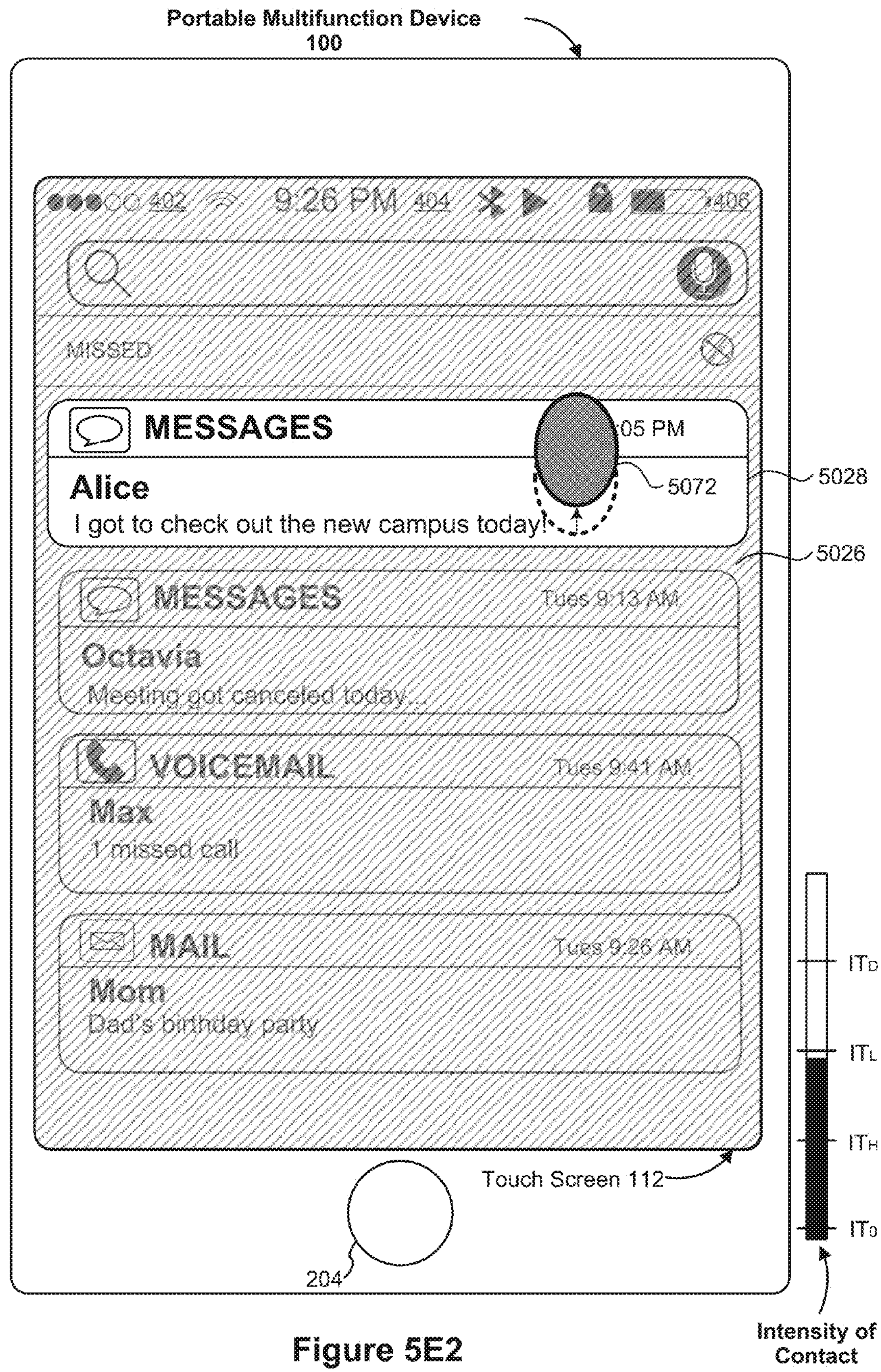
Figure 5E2

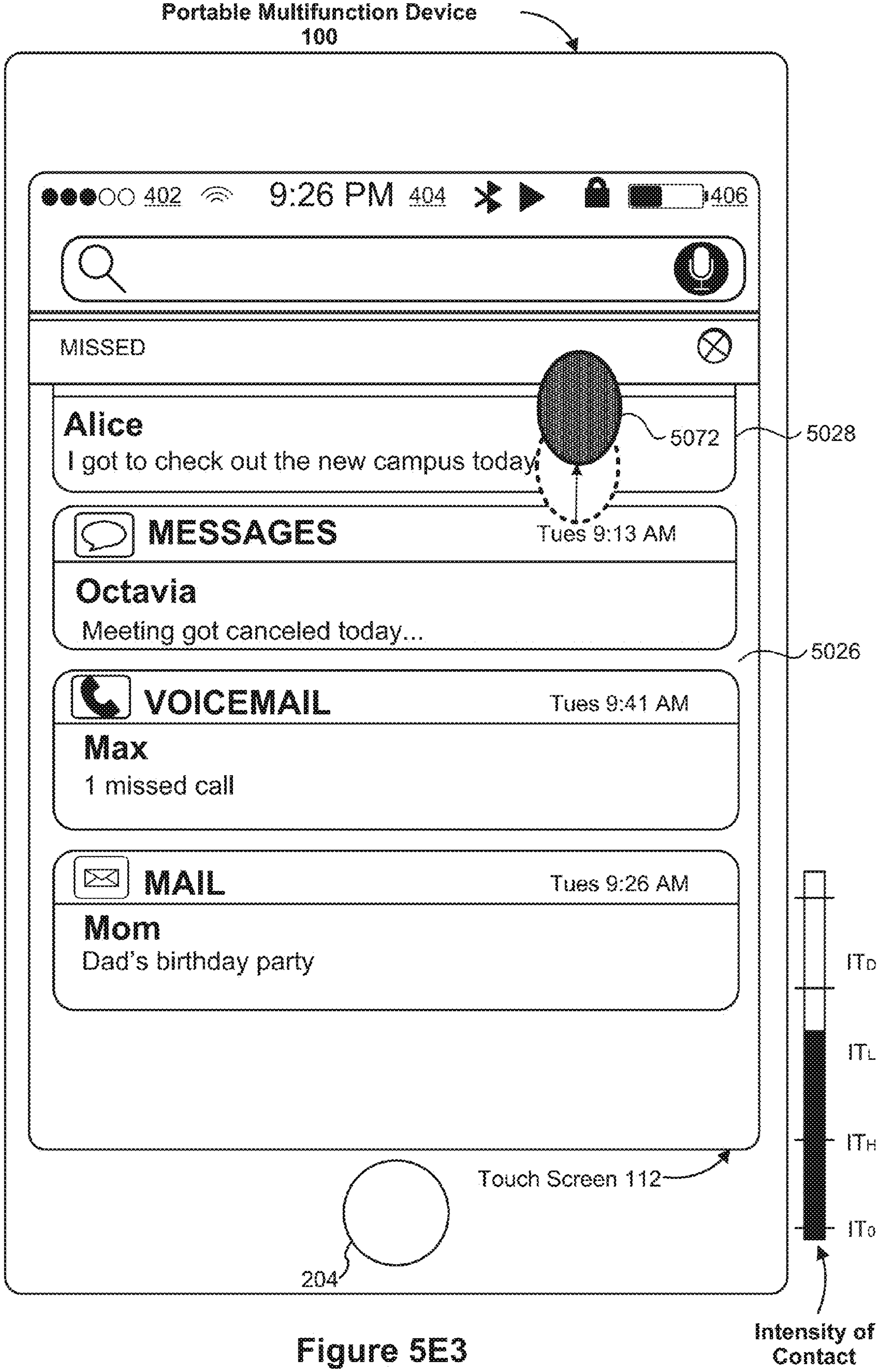
Figure 5E3

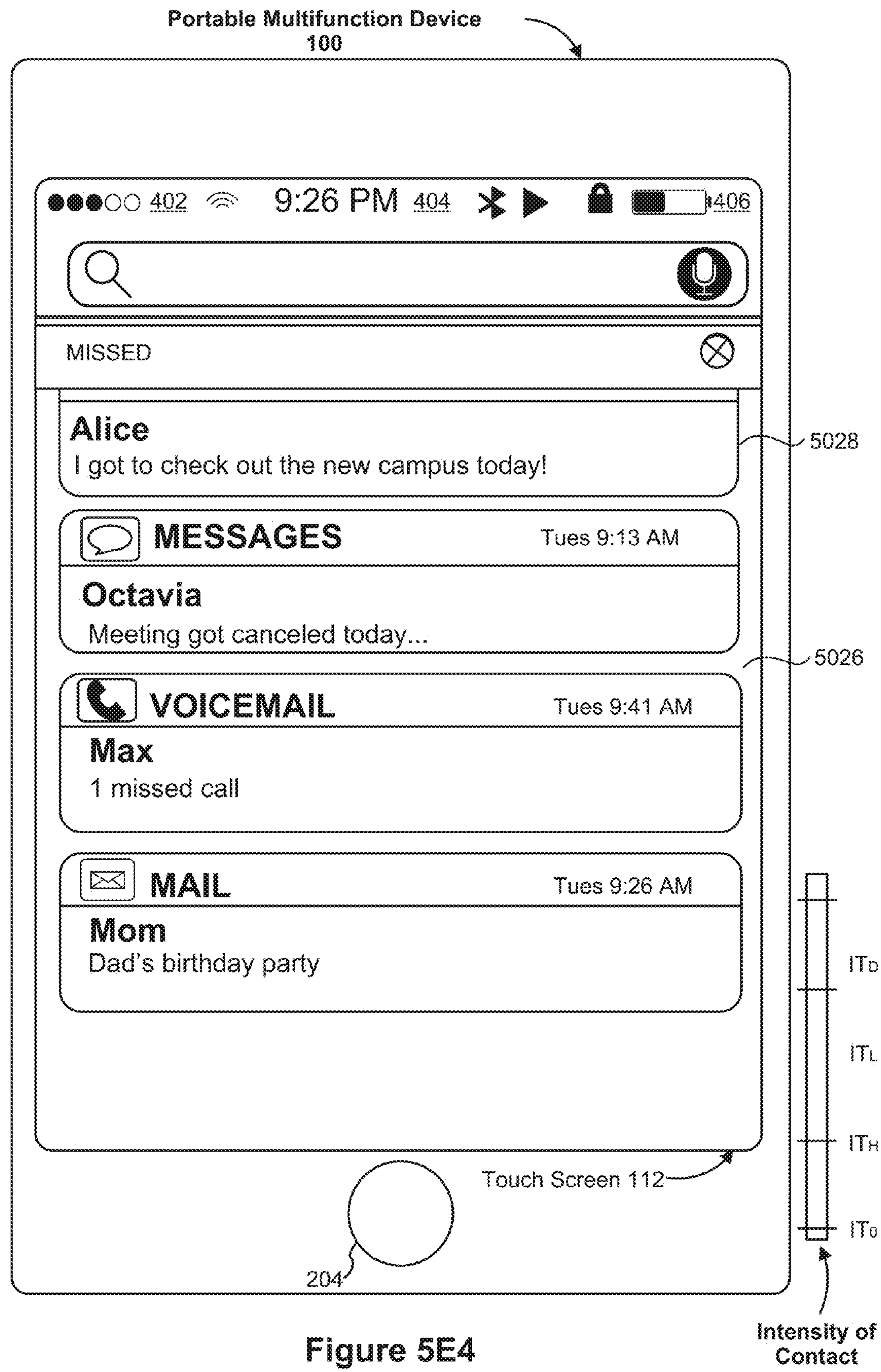
Figure 5E4

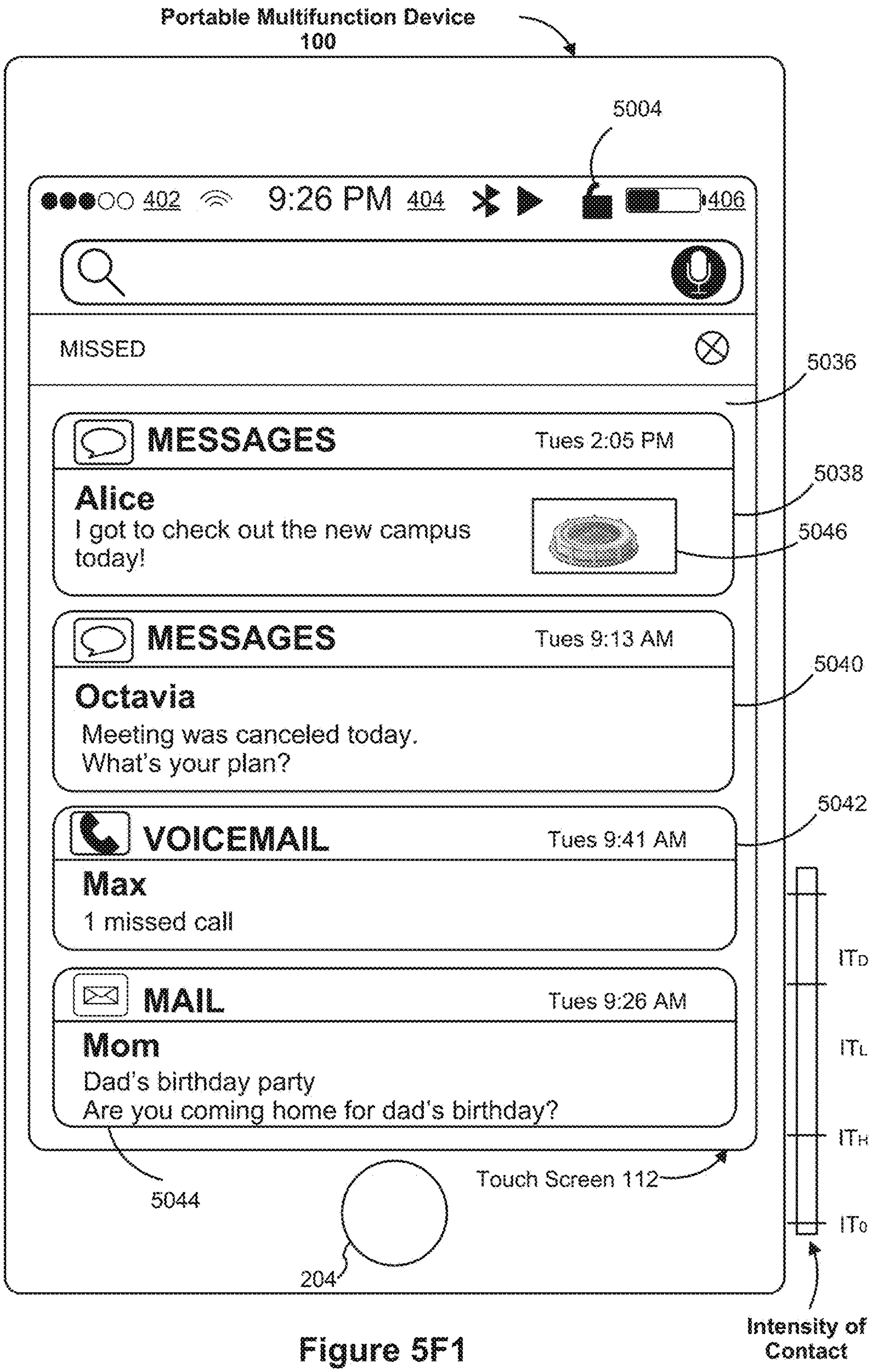
Figure 5F1

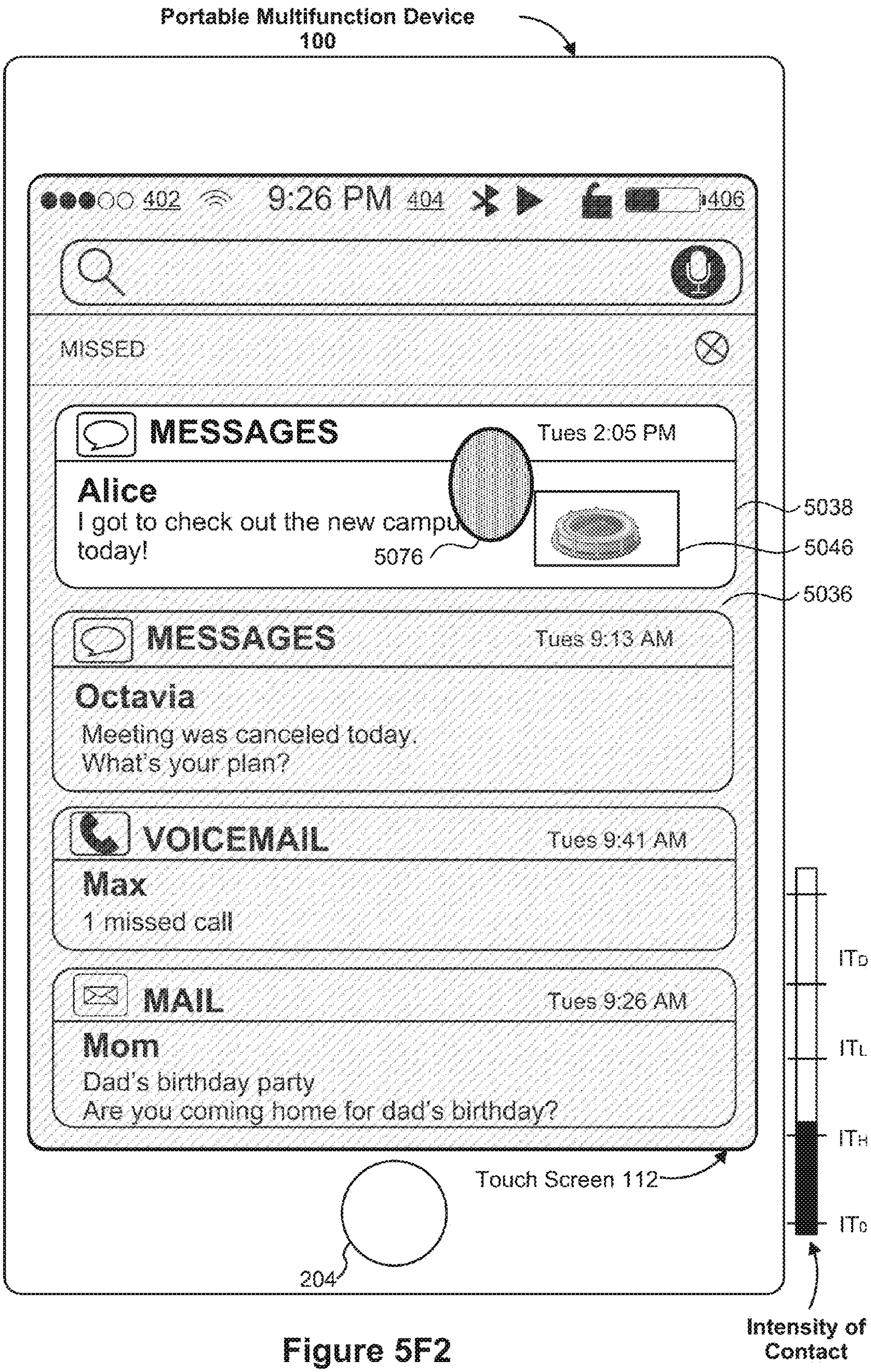
Figure 5F2

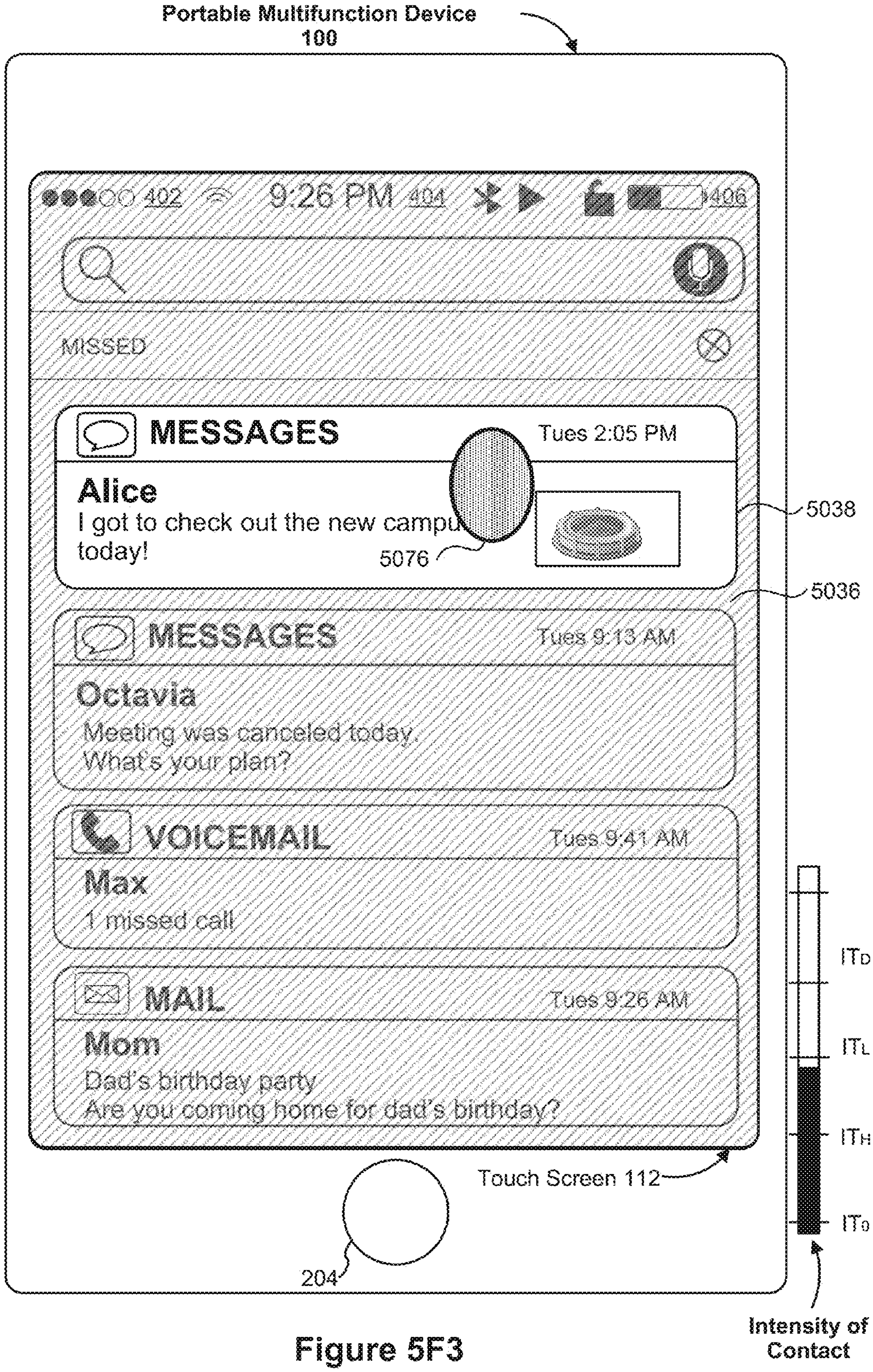
Figure 5F3

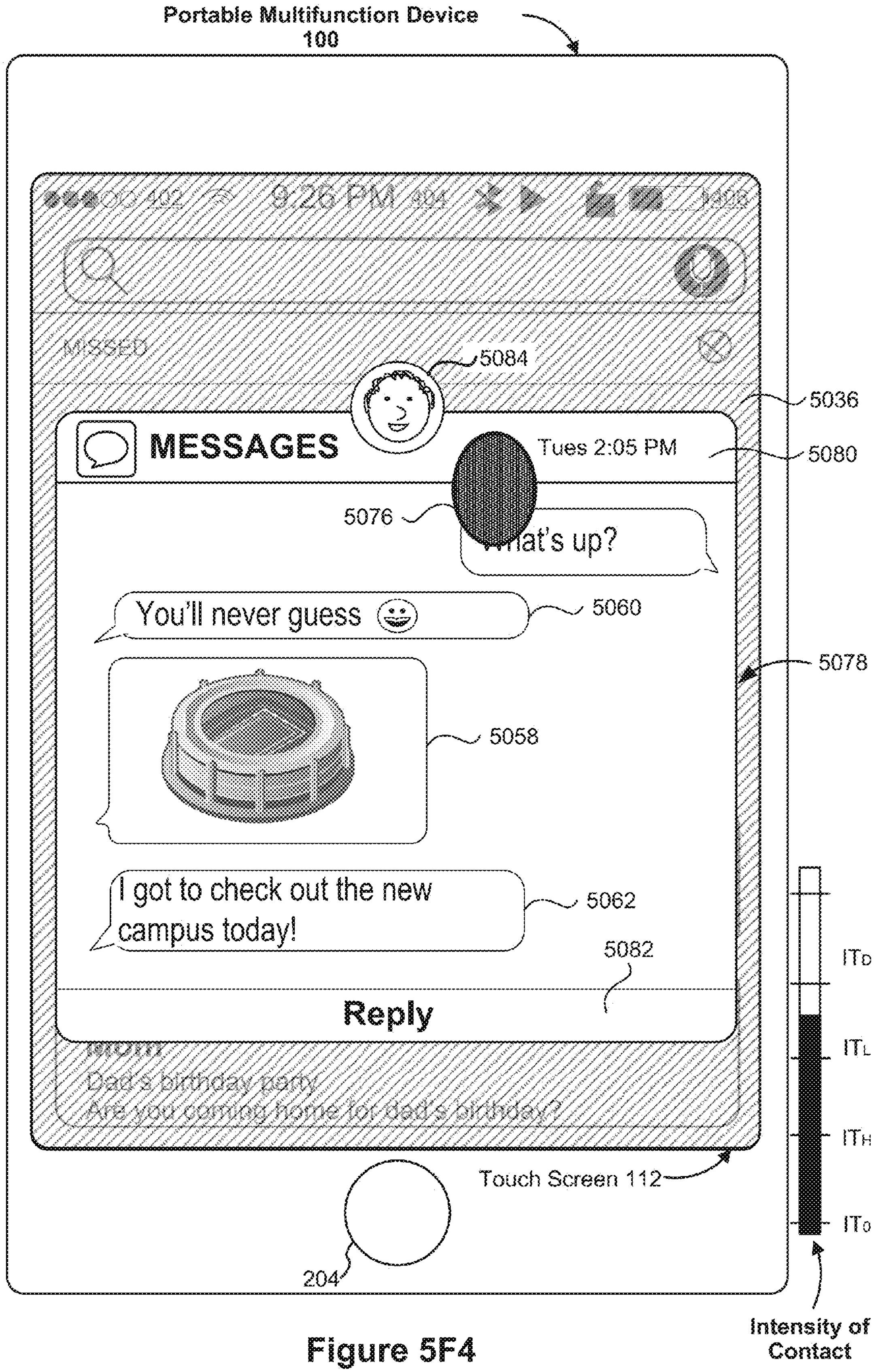
Figure 5F4

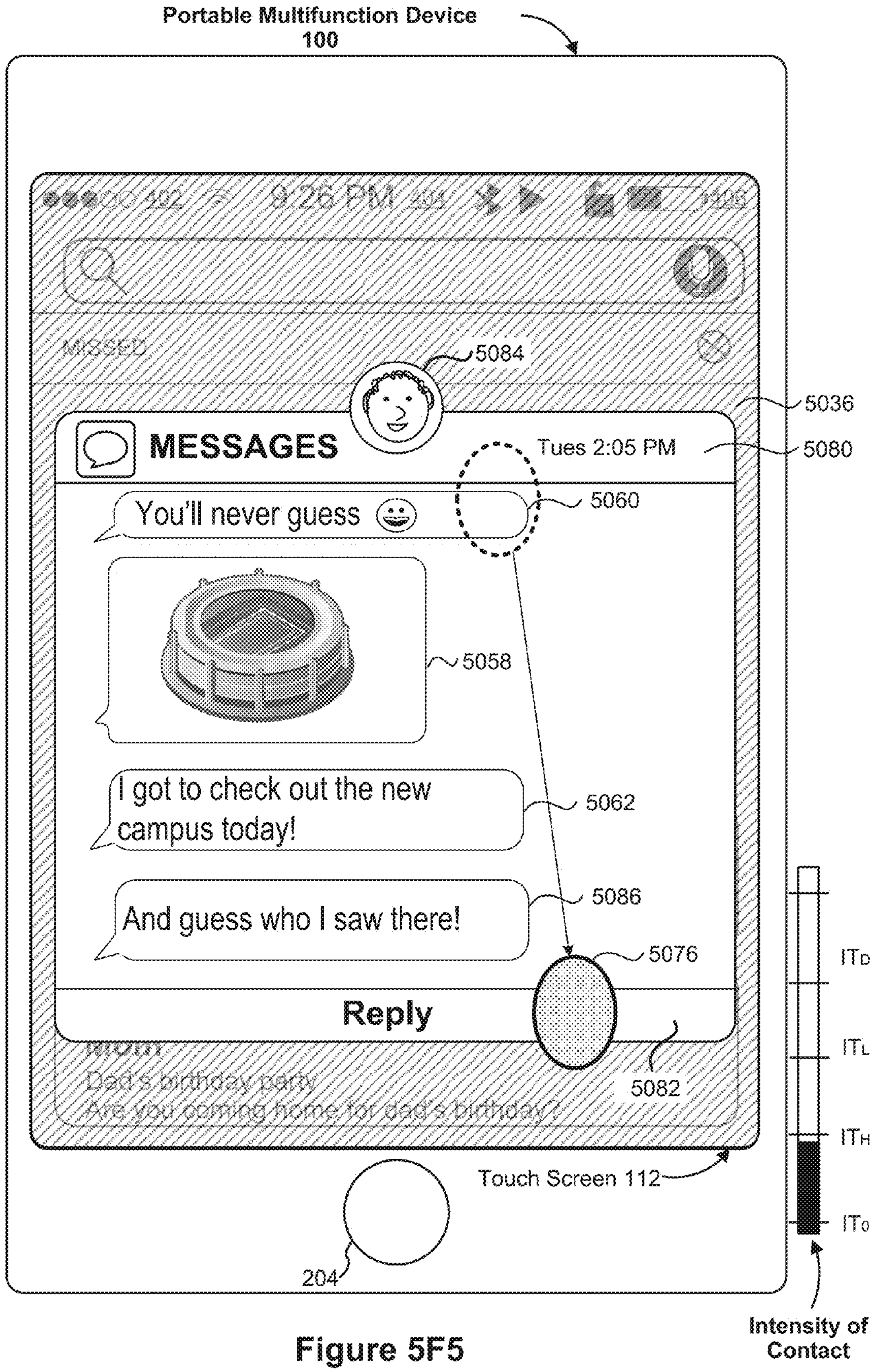
Figure 5F5

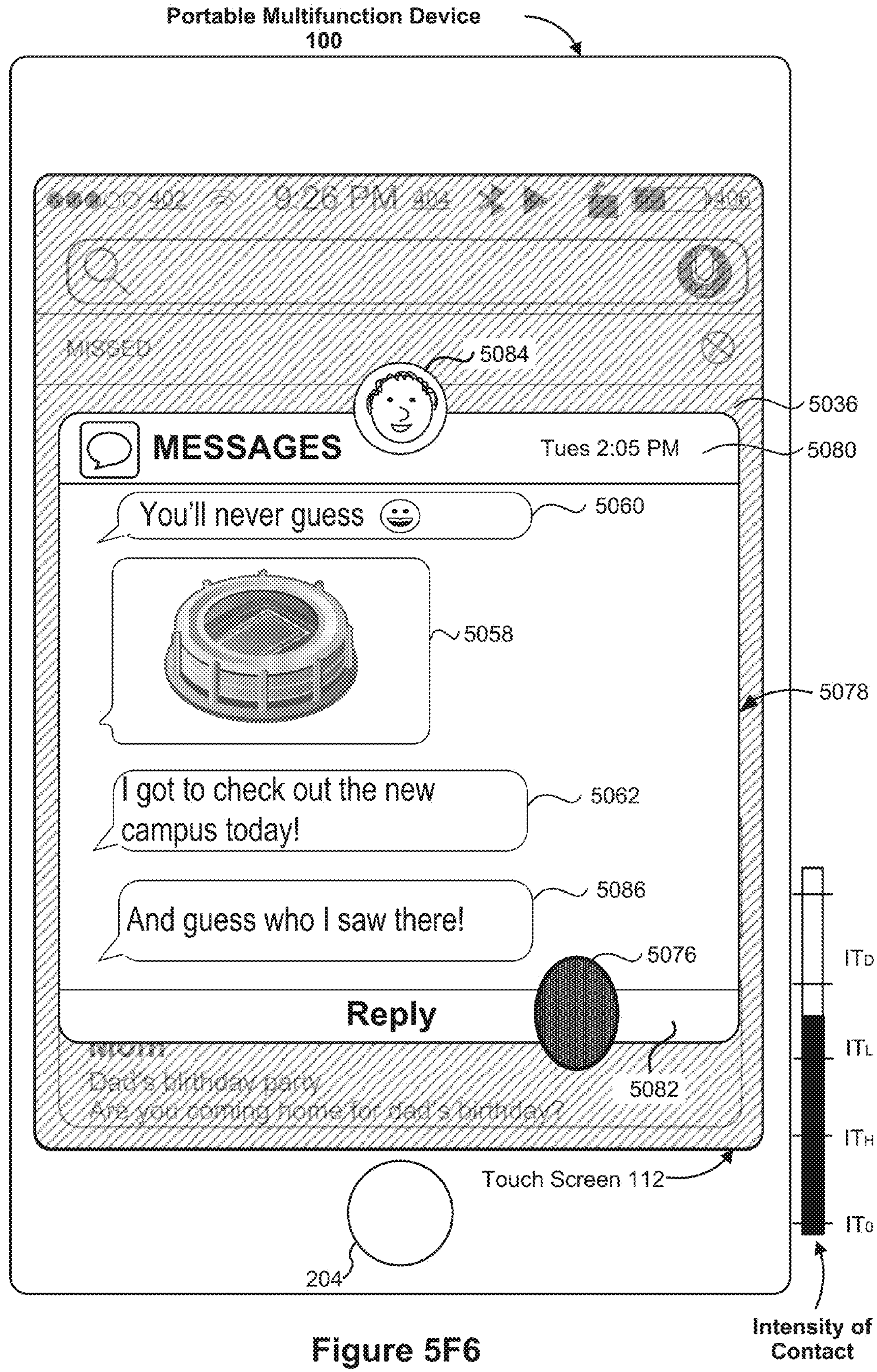
Figure 5F6

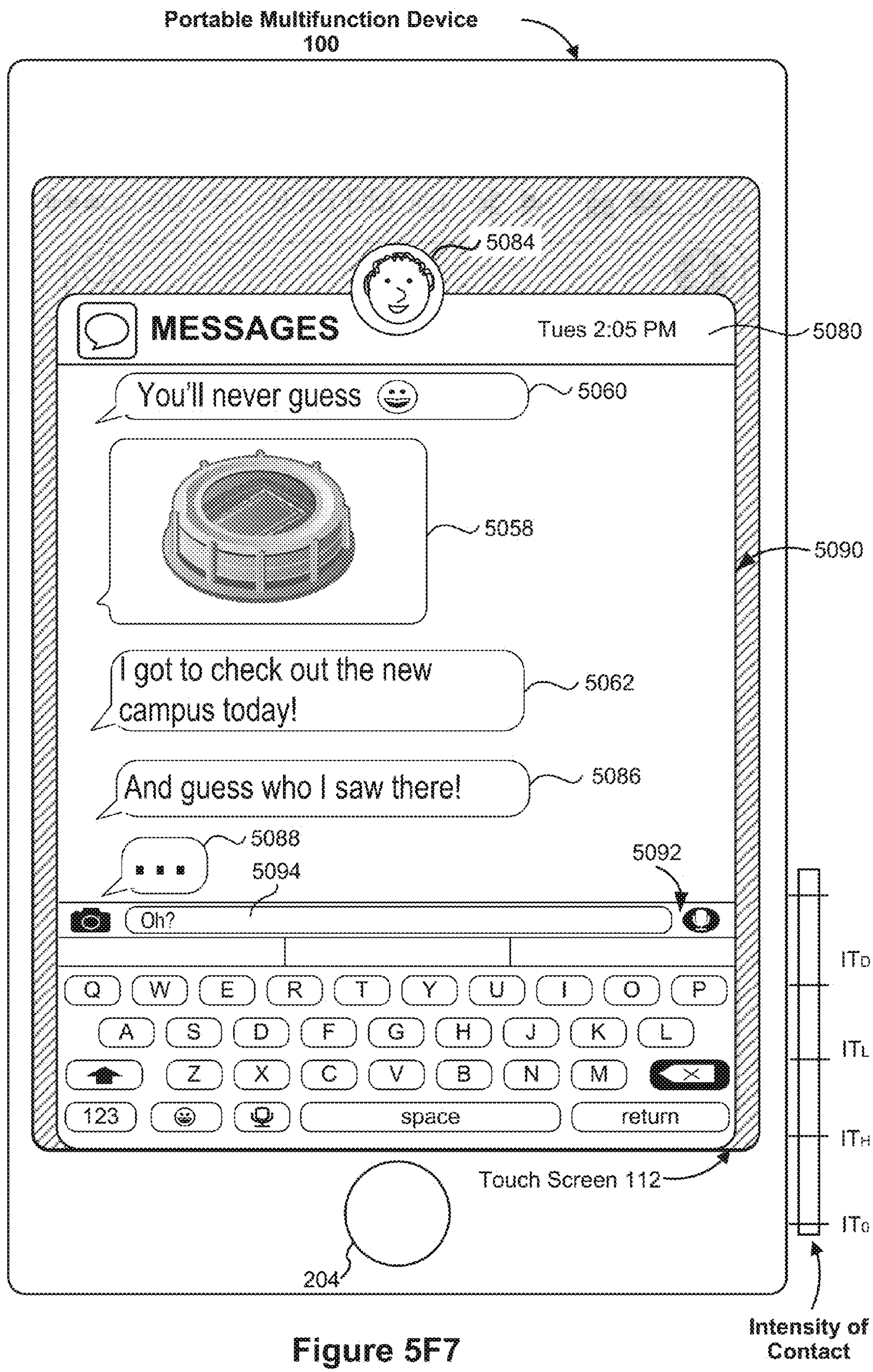
Figure 5F7

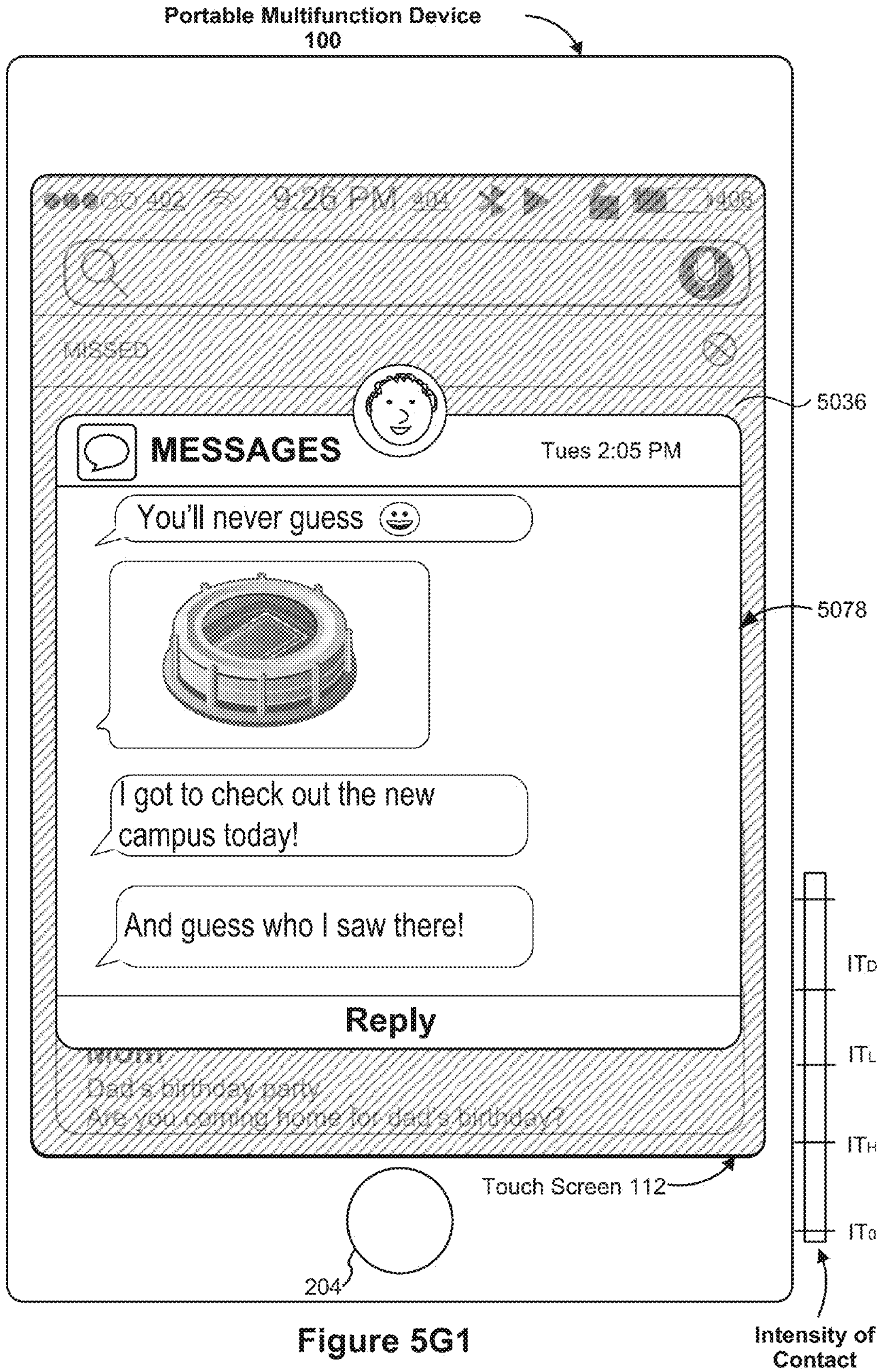
Figure 5G1

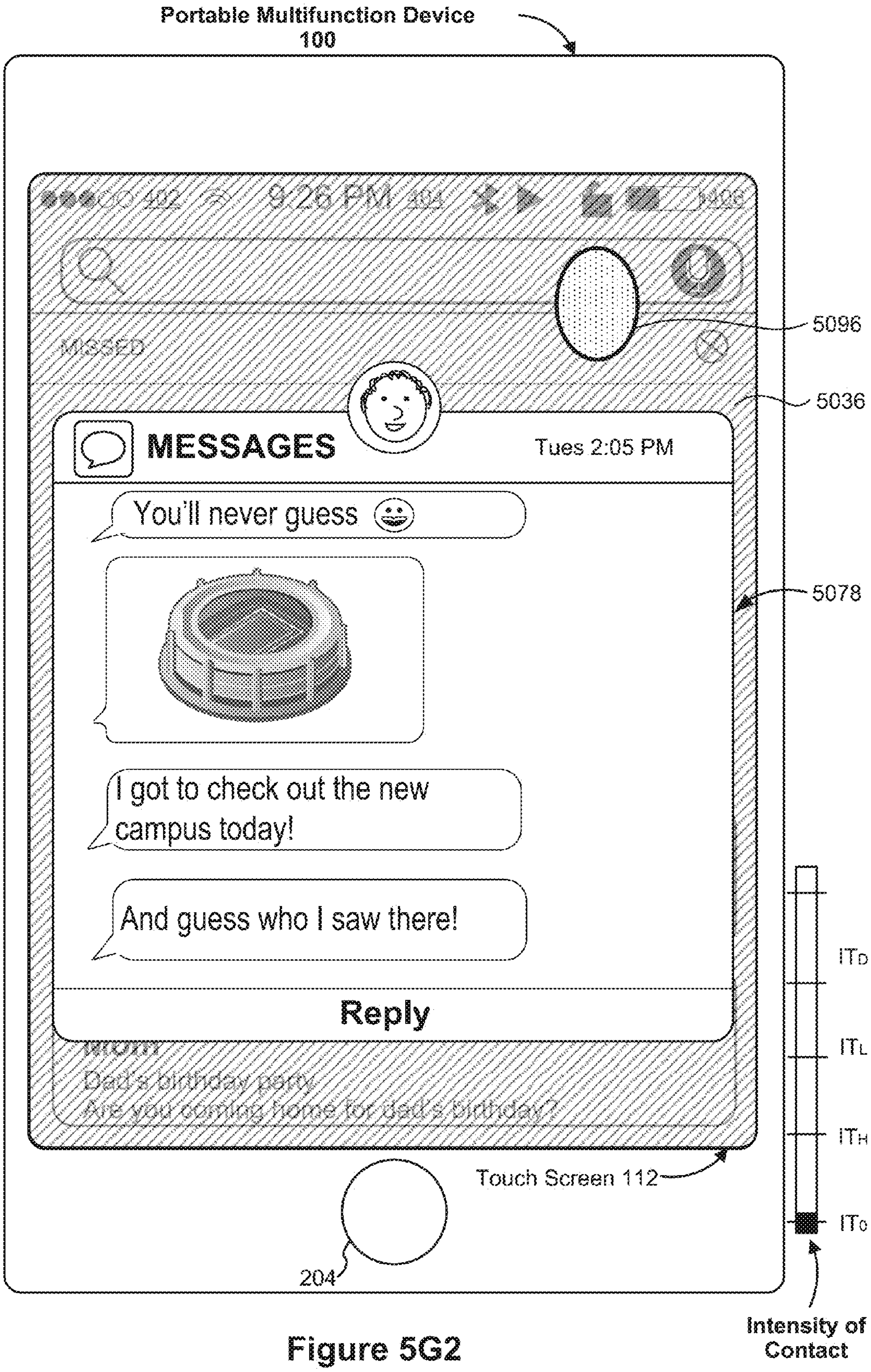
Figure 5G2

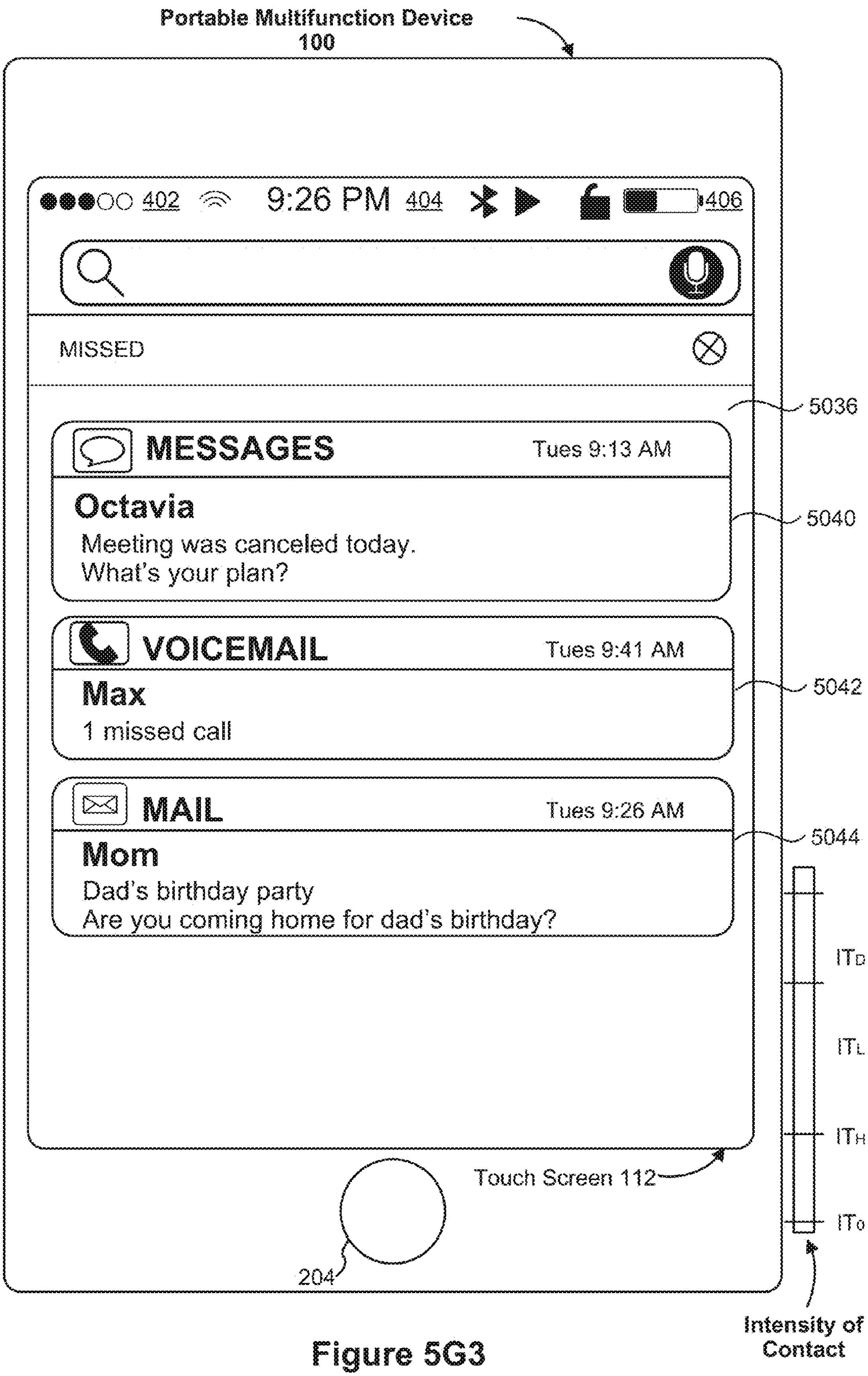
Figure 5G3

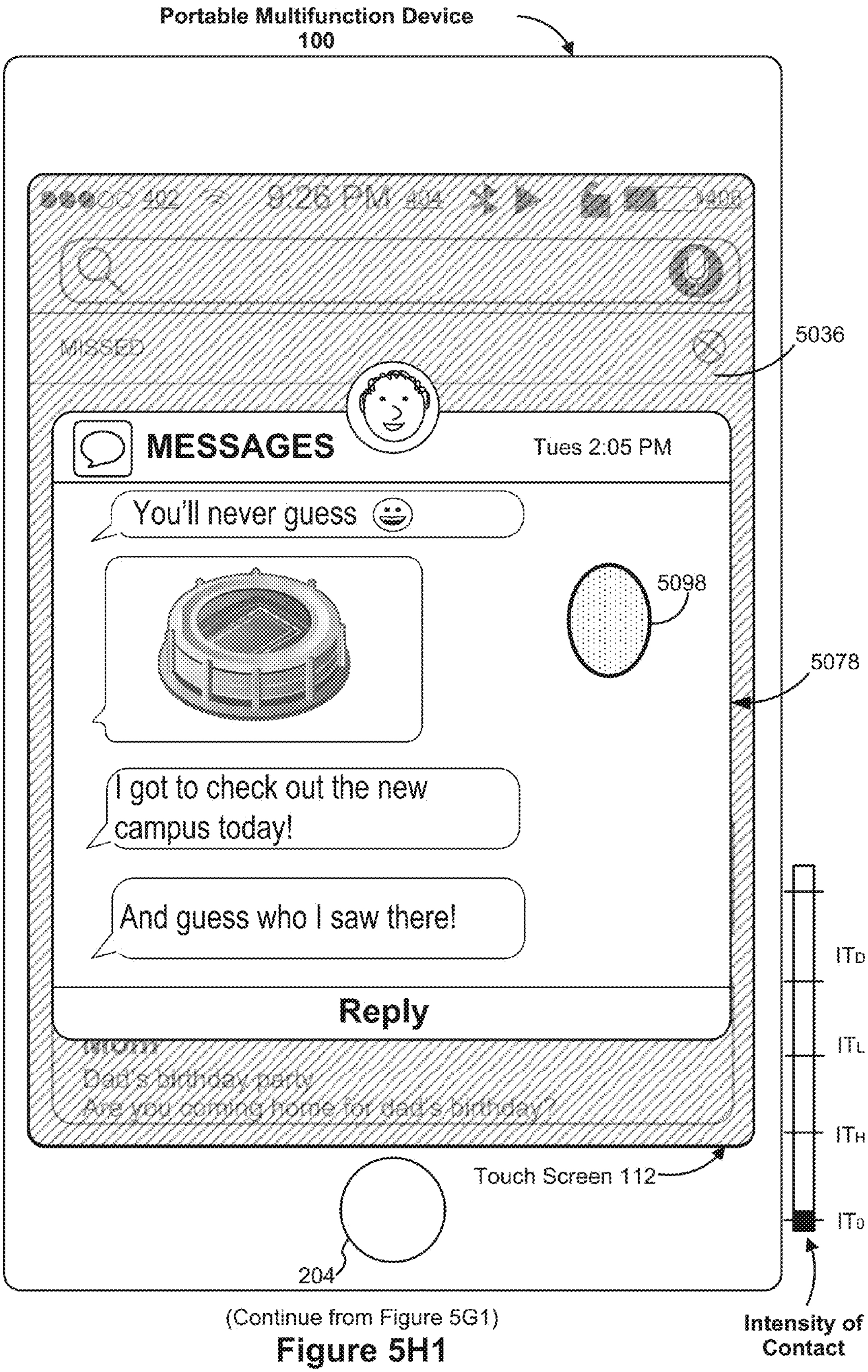
(Continue from Figure 5G1)
Figure 5H1

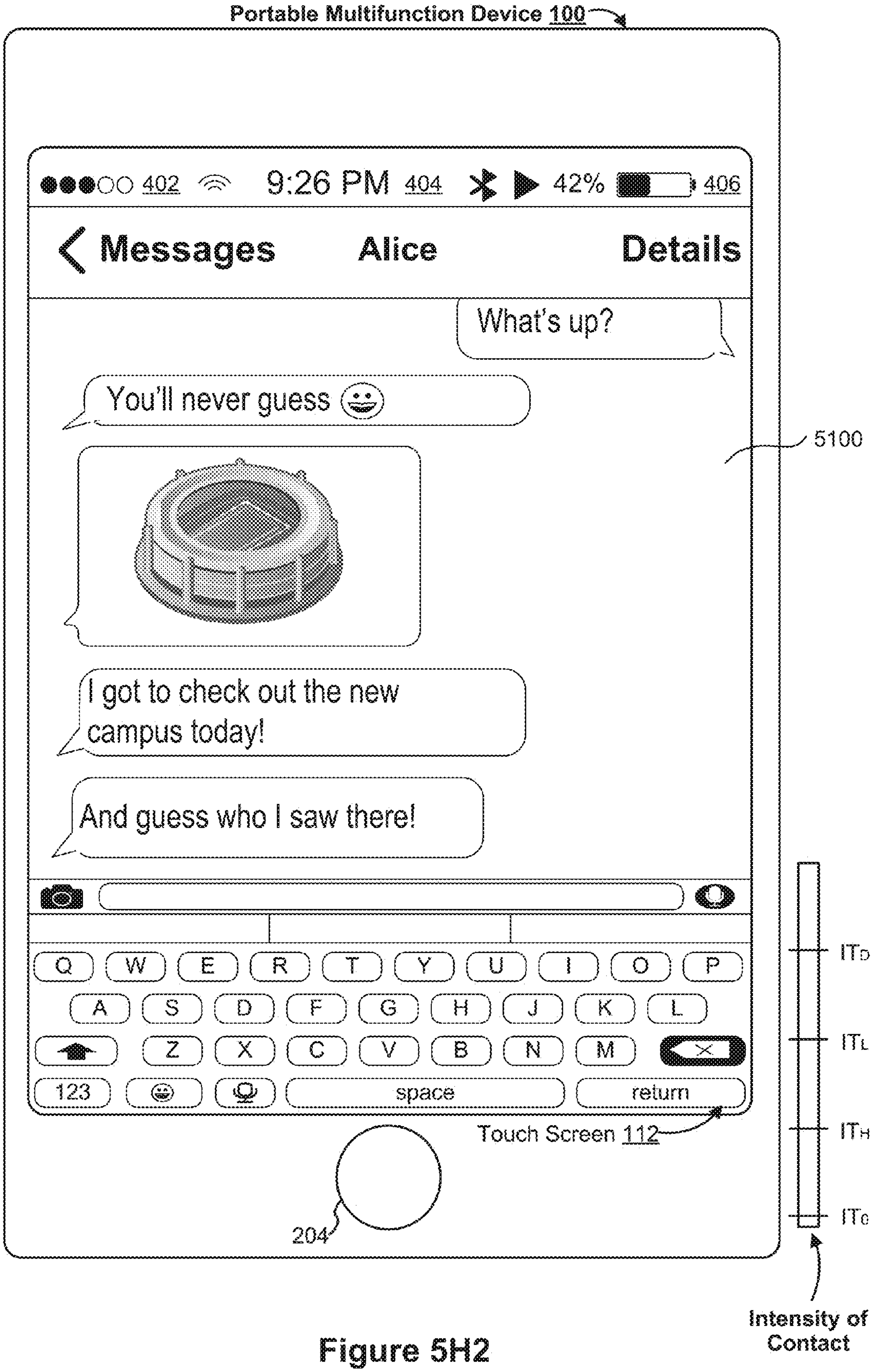
Figure 5H2

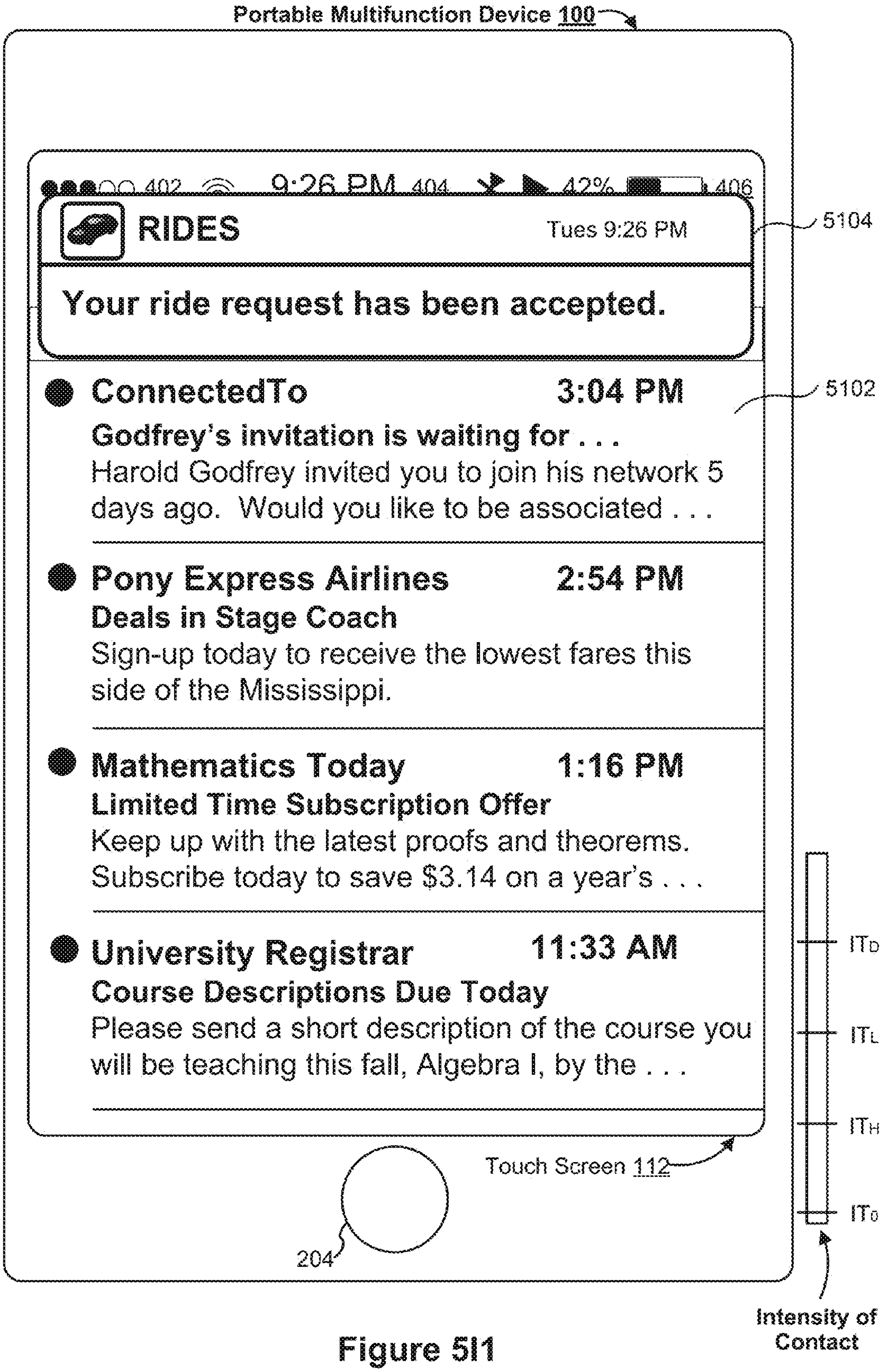
Figure 5I1

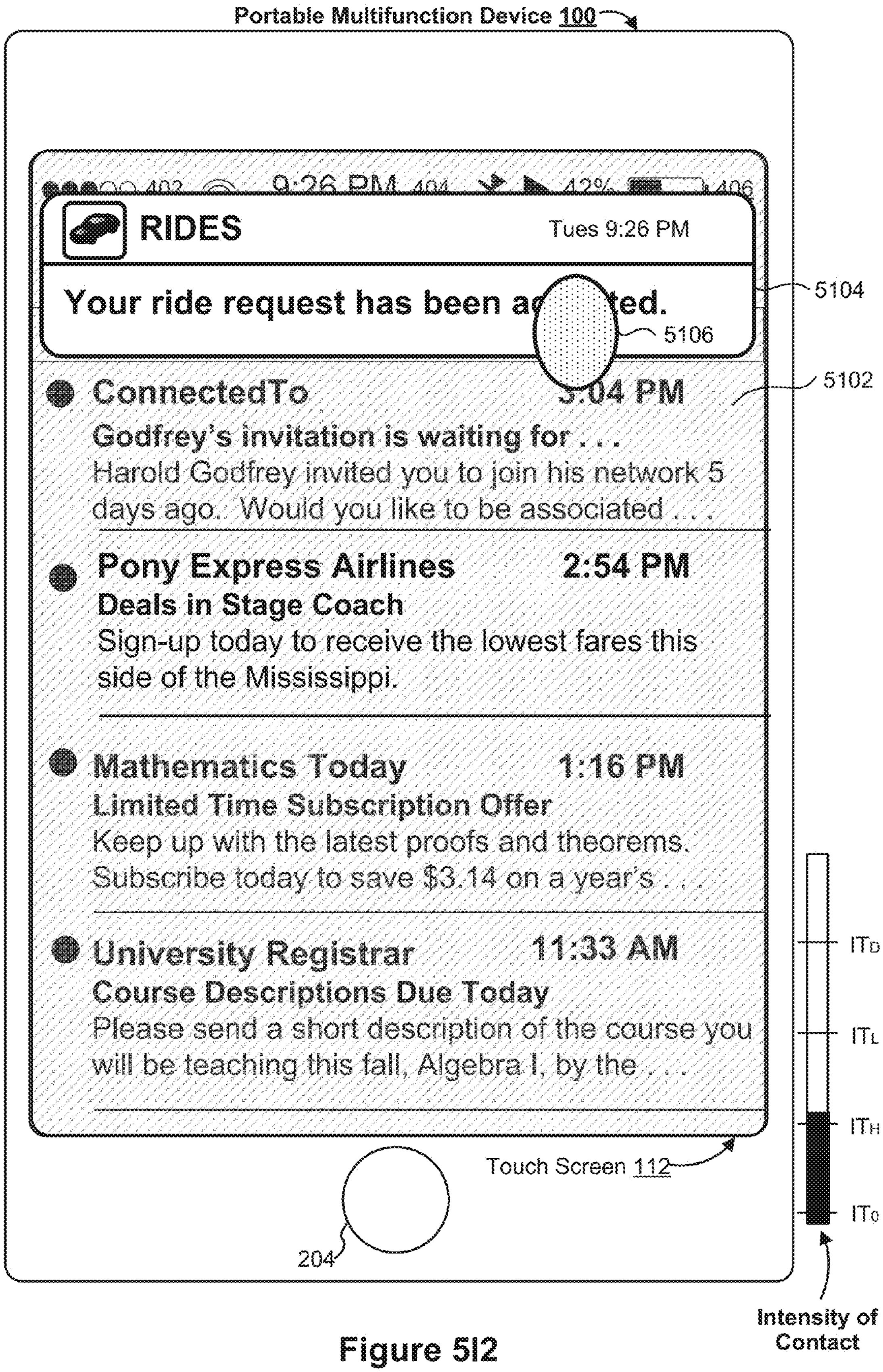
Figure 5I2

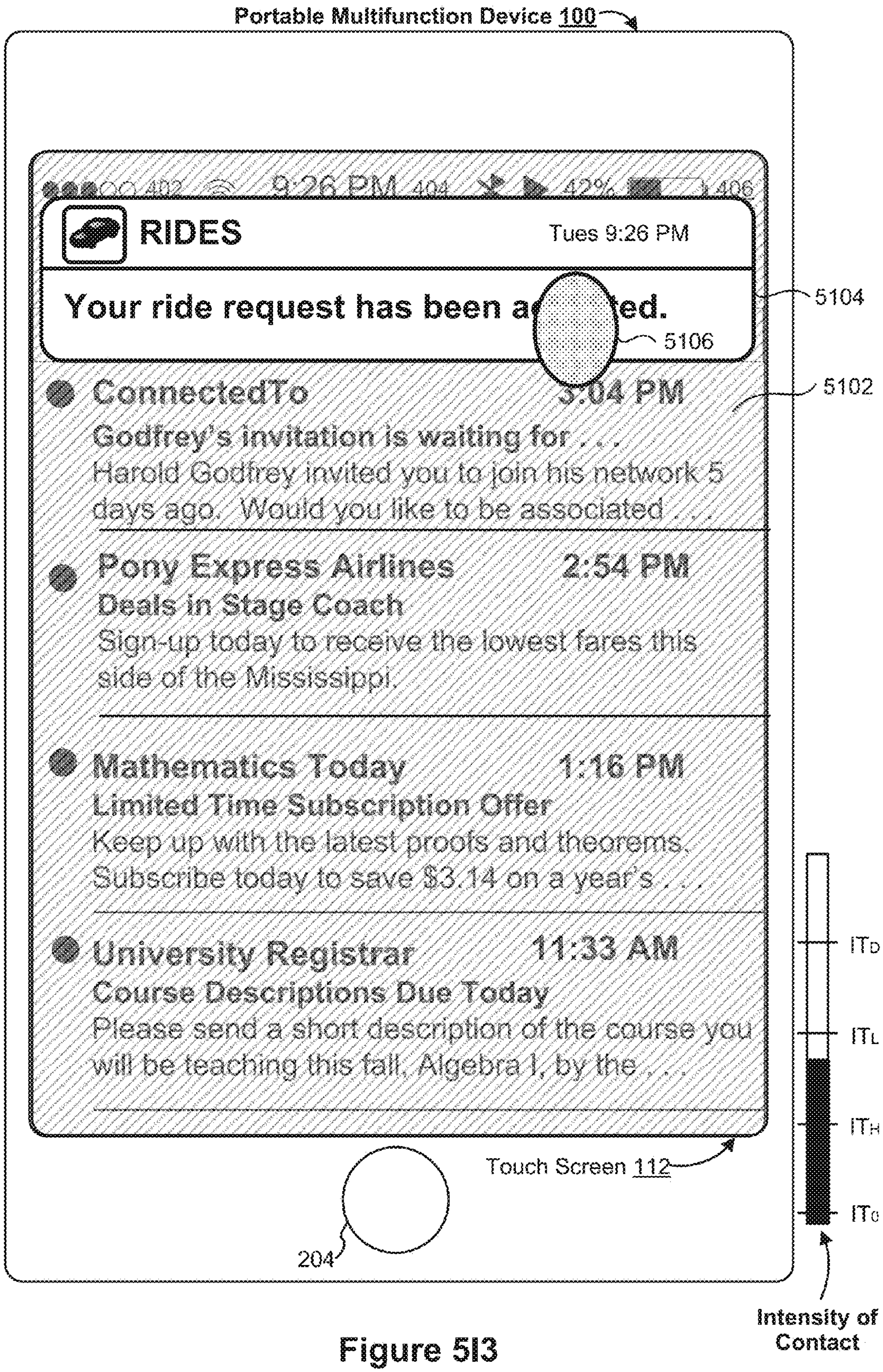
Figure 5I3

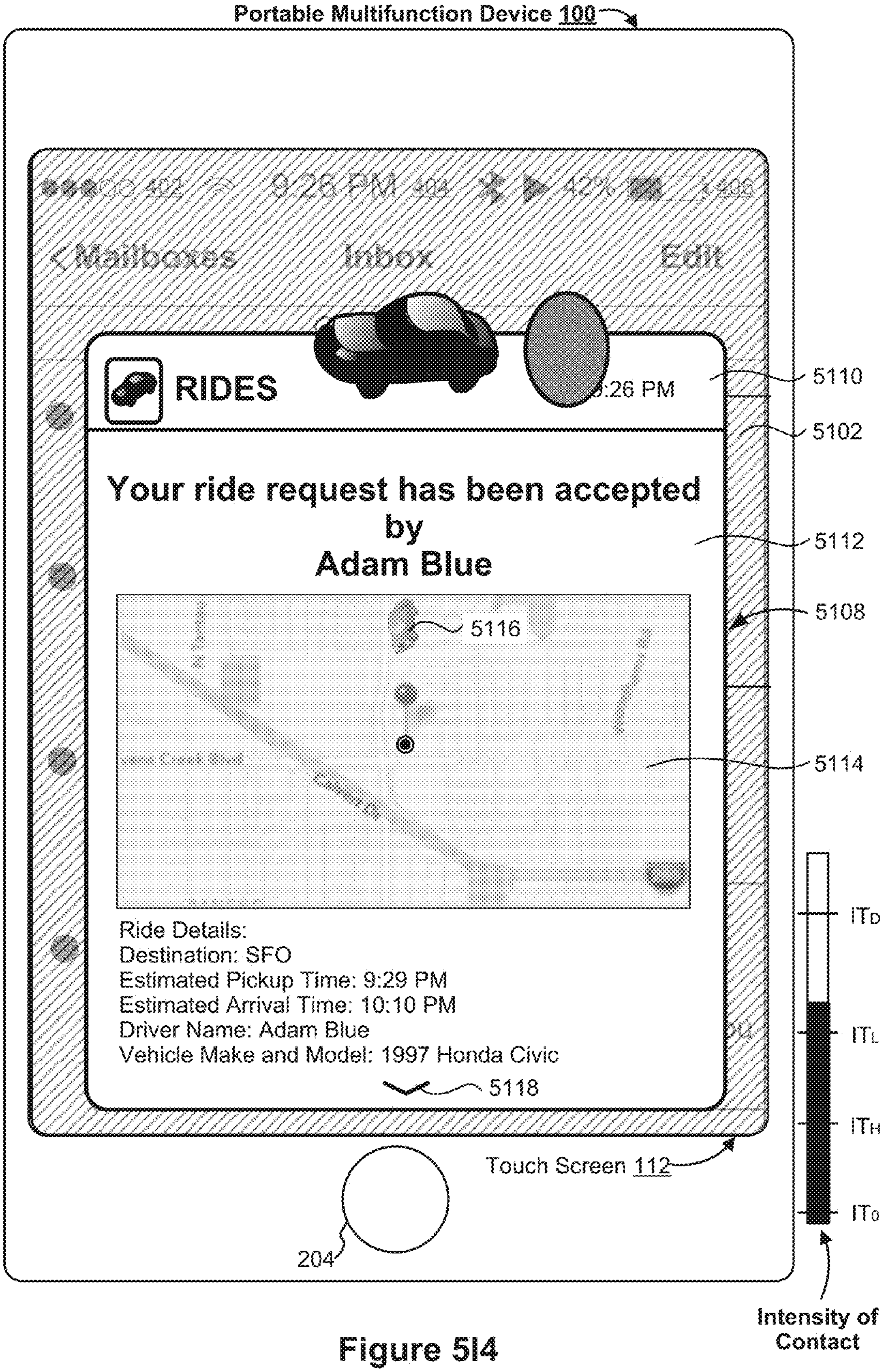
Figure 5I4

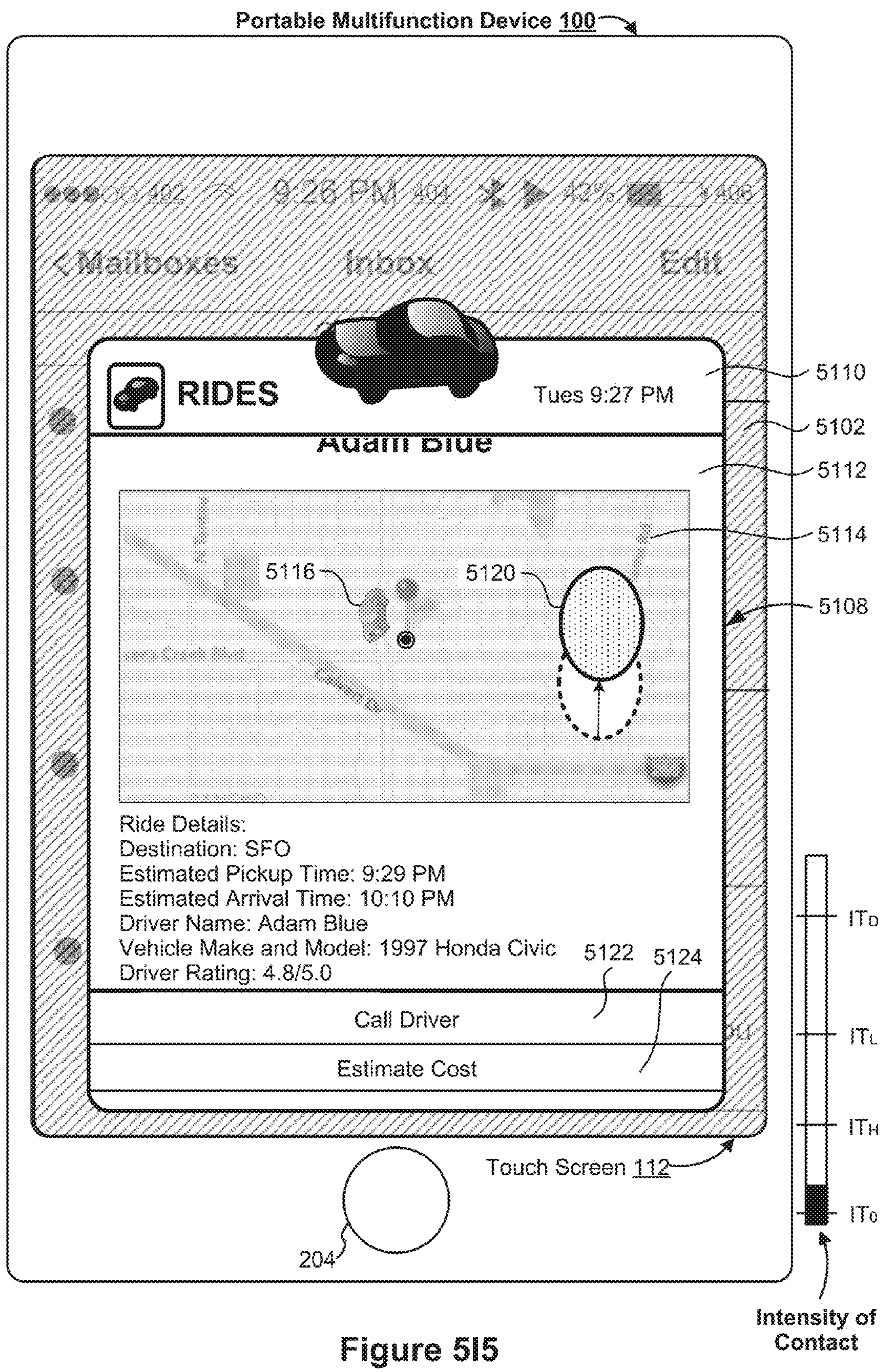
Figure 5I5

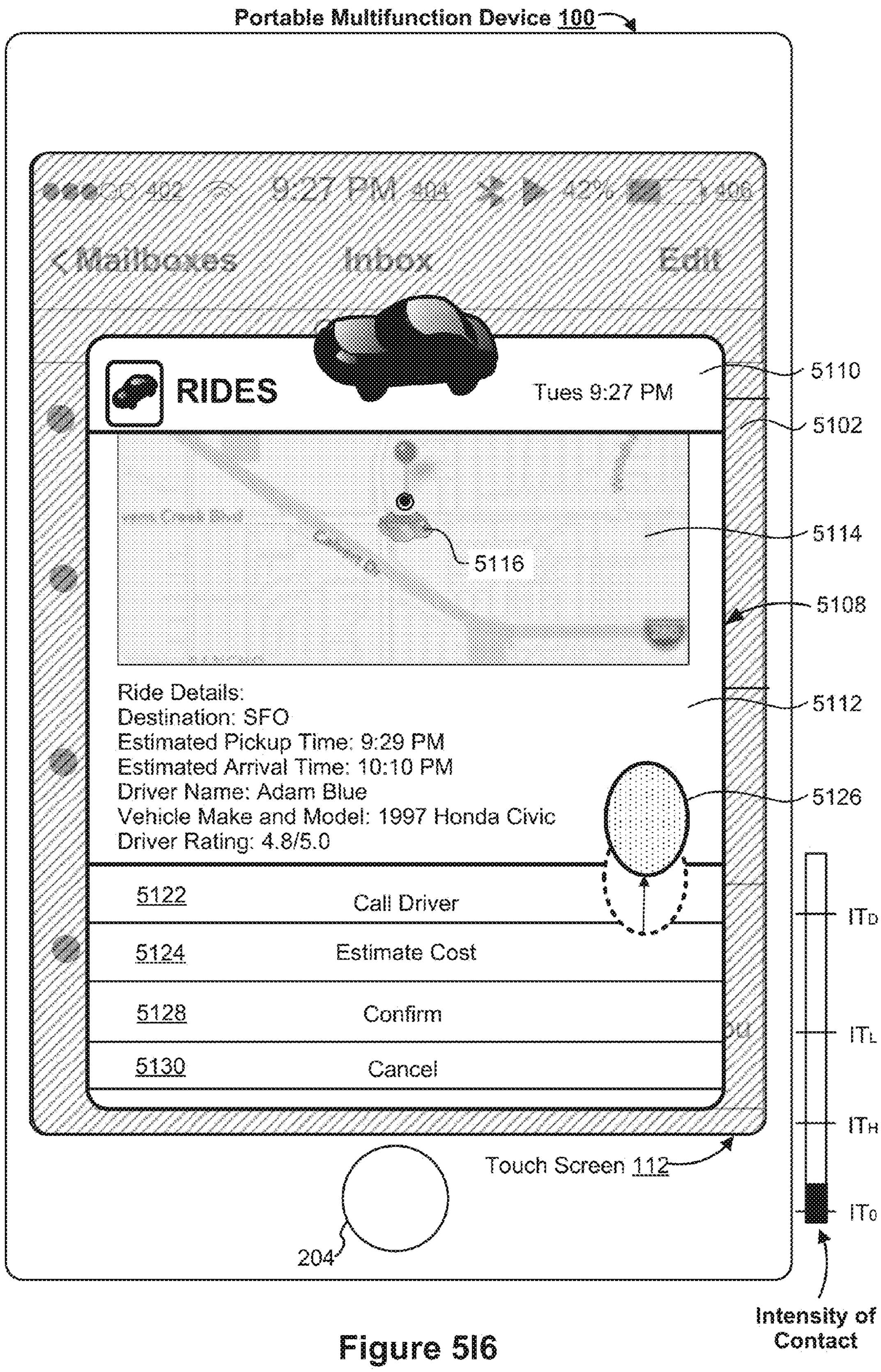
Figure 5I6

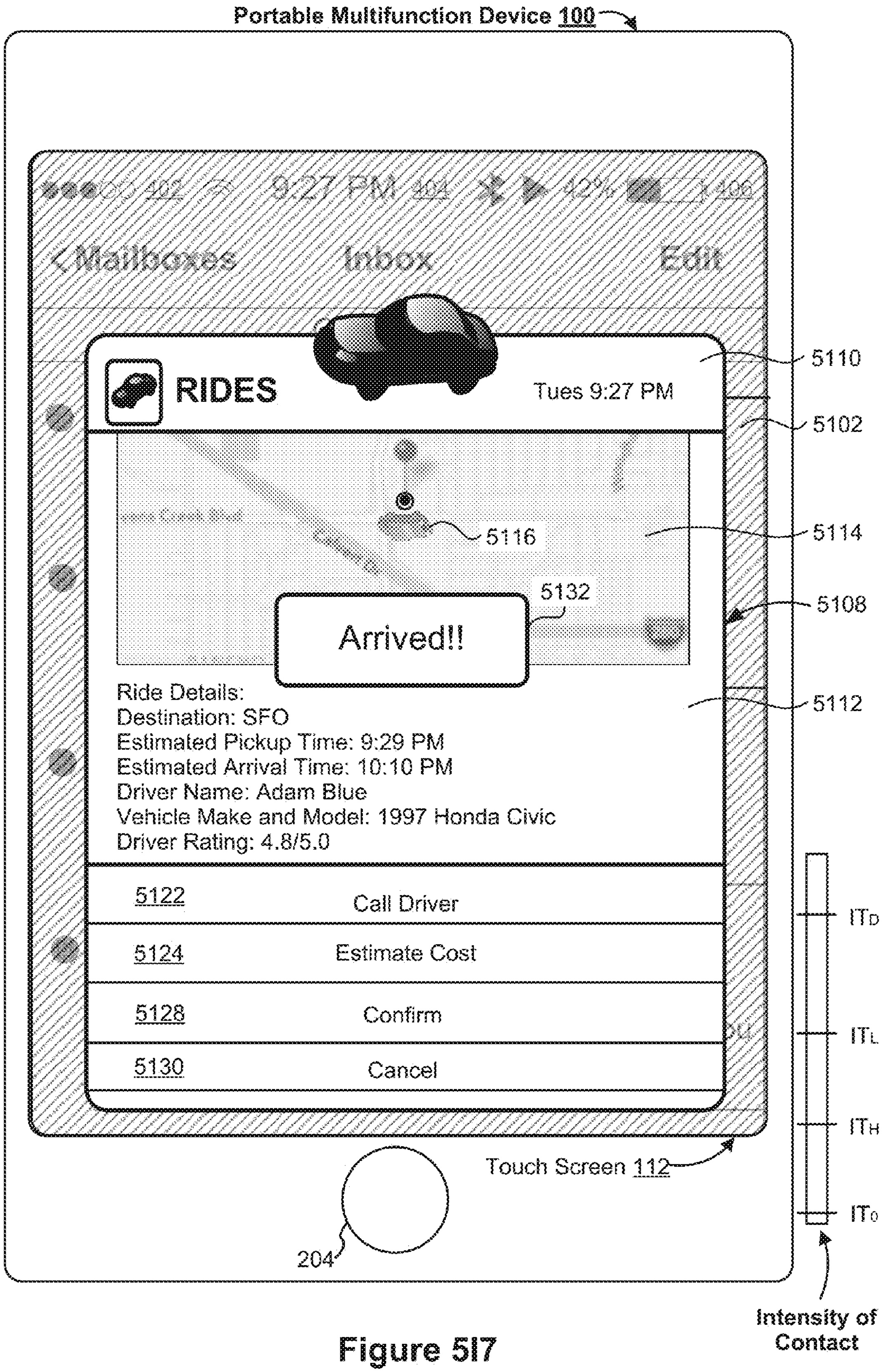
Figure 5I7

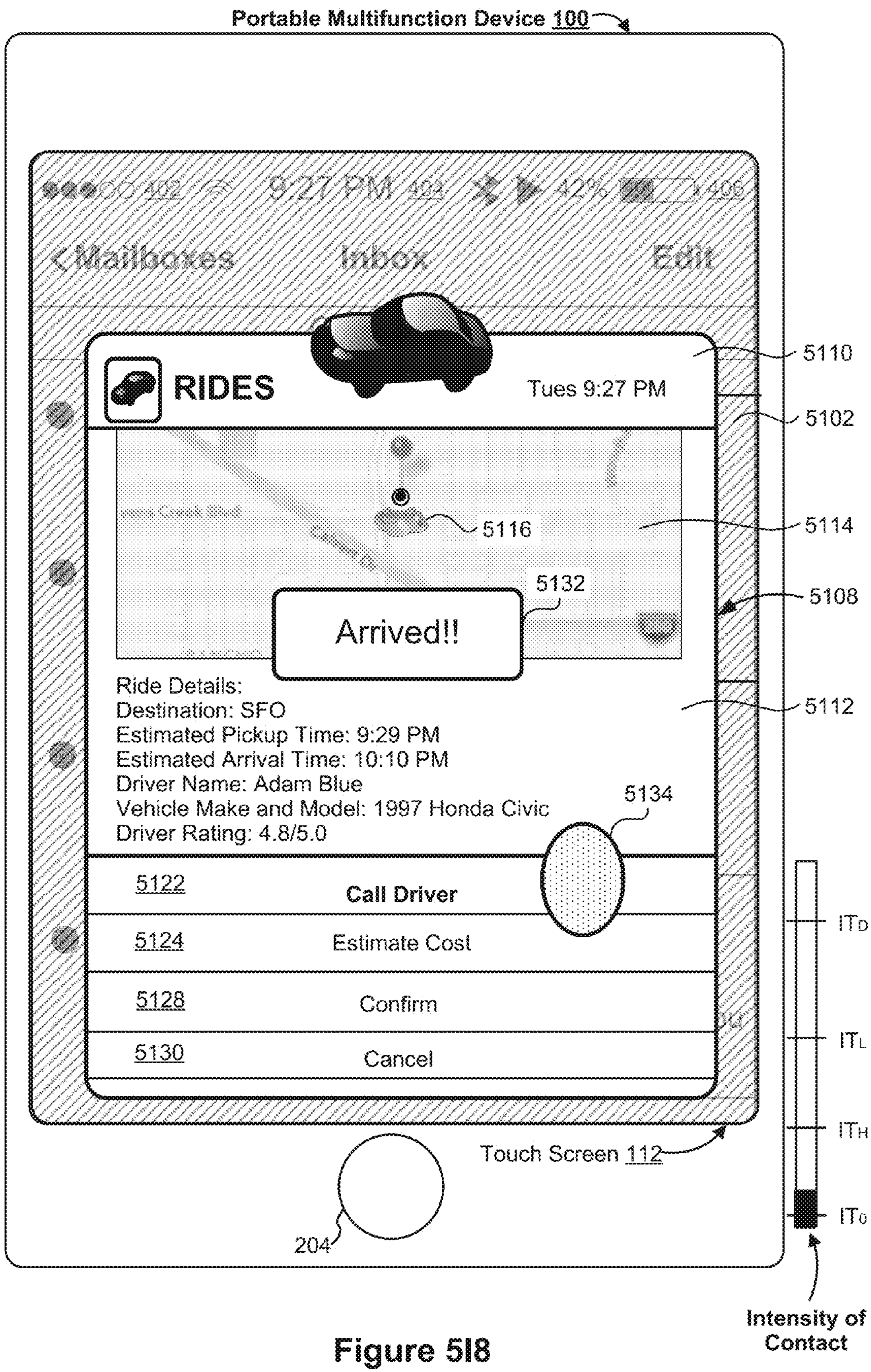
Figure 5I8

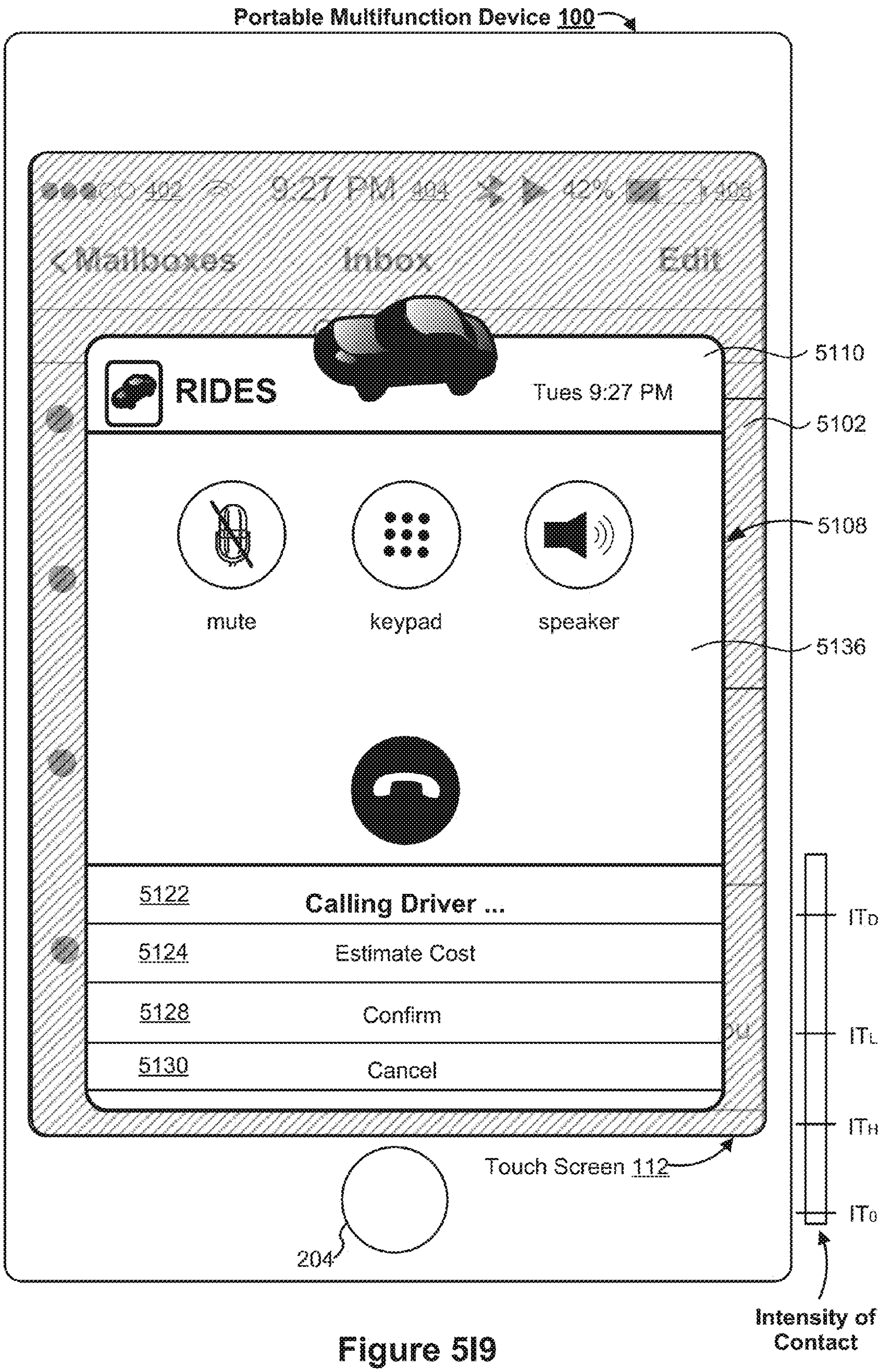
Figure 5I9

Figure 5J1

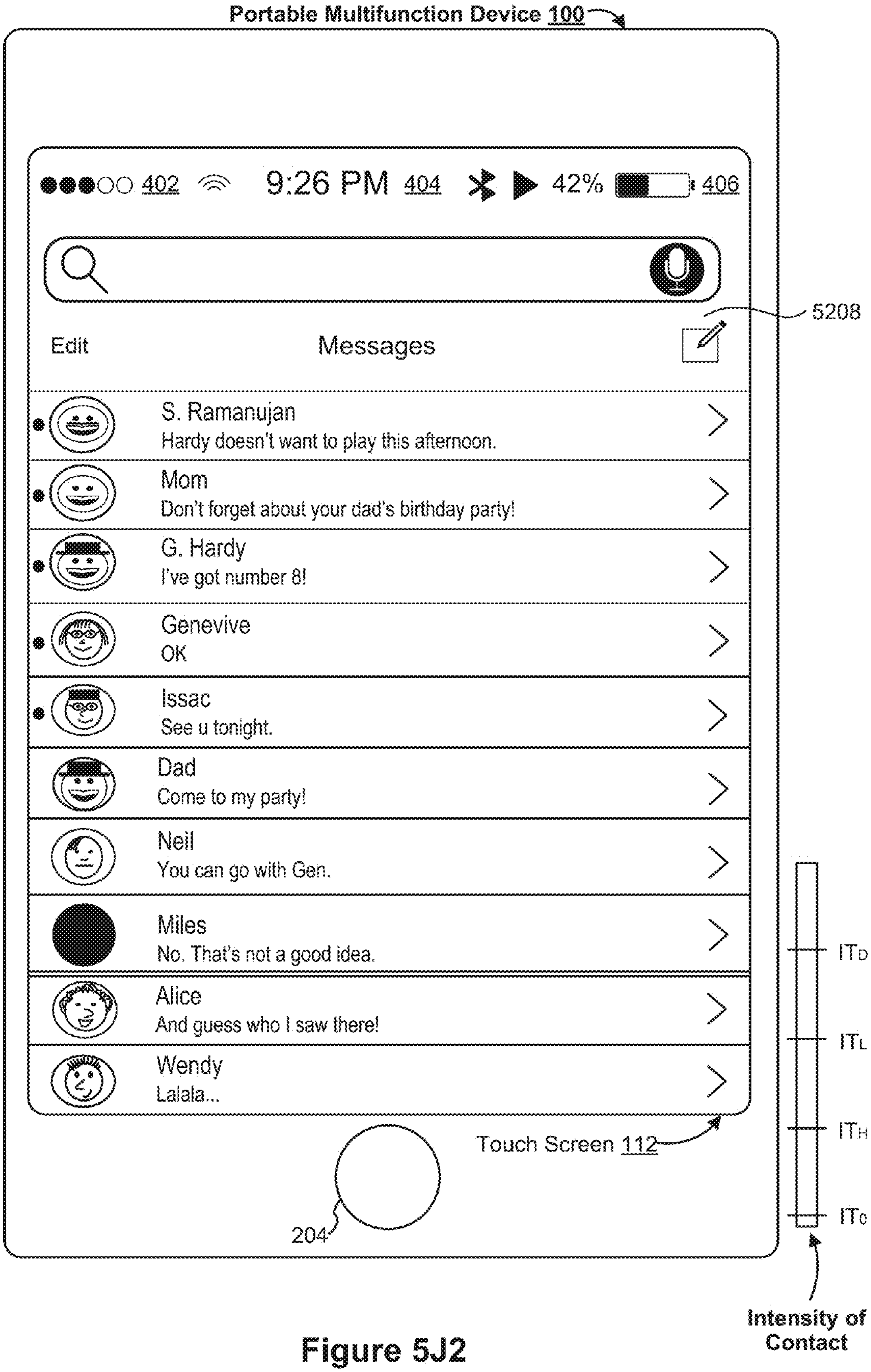
Figure 5J2

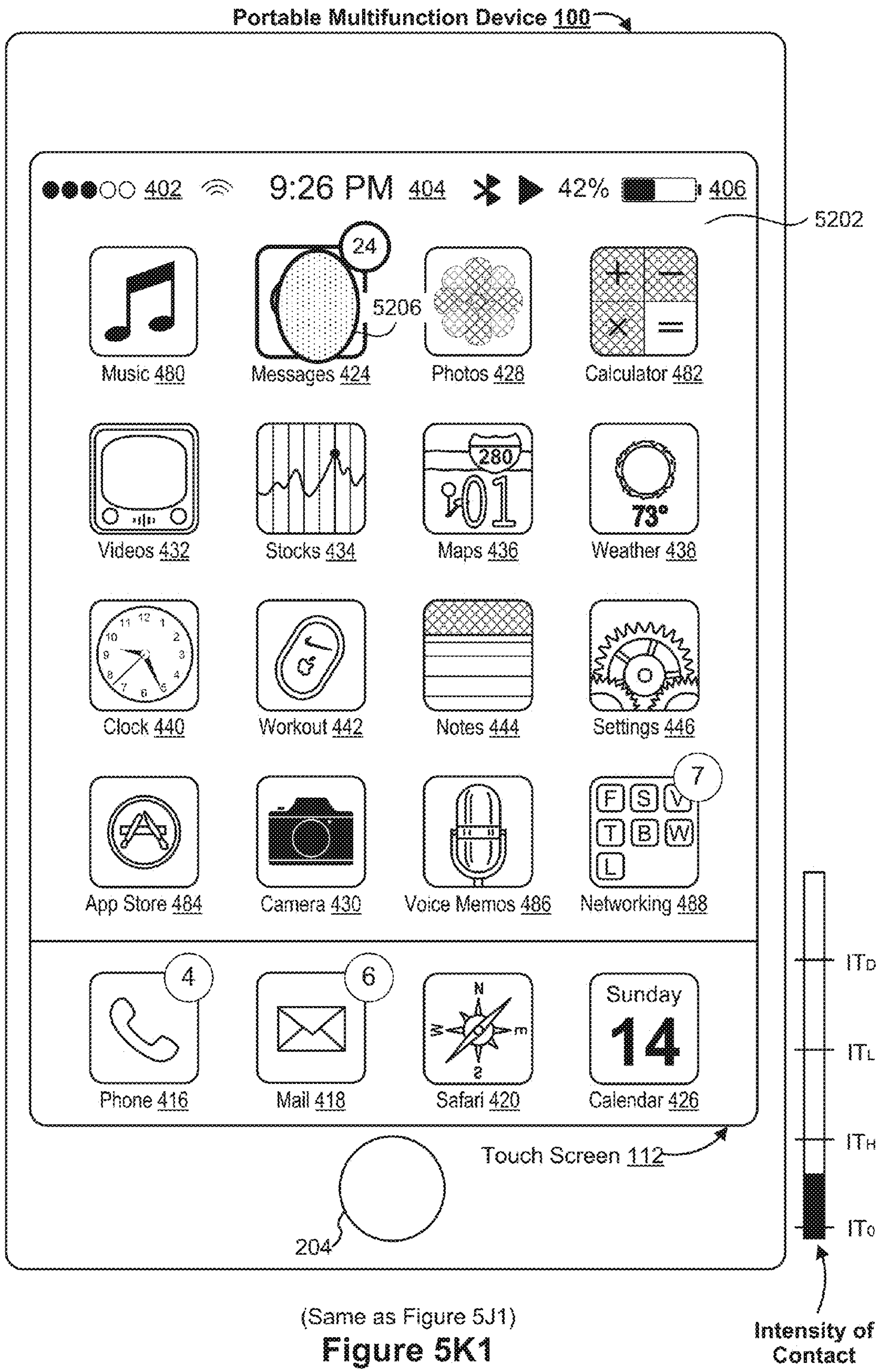
(Same as Figure 5J1)
Figure 5K1

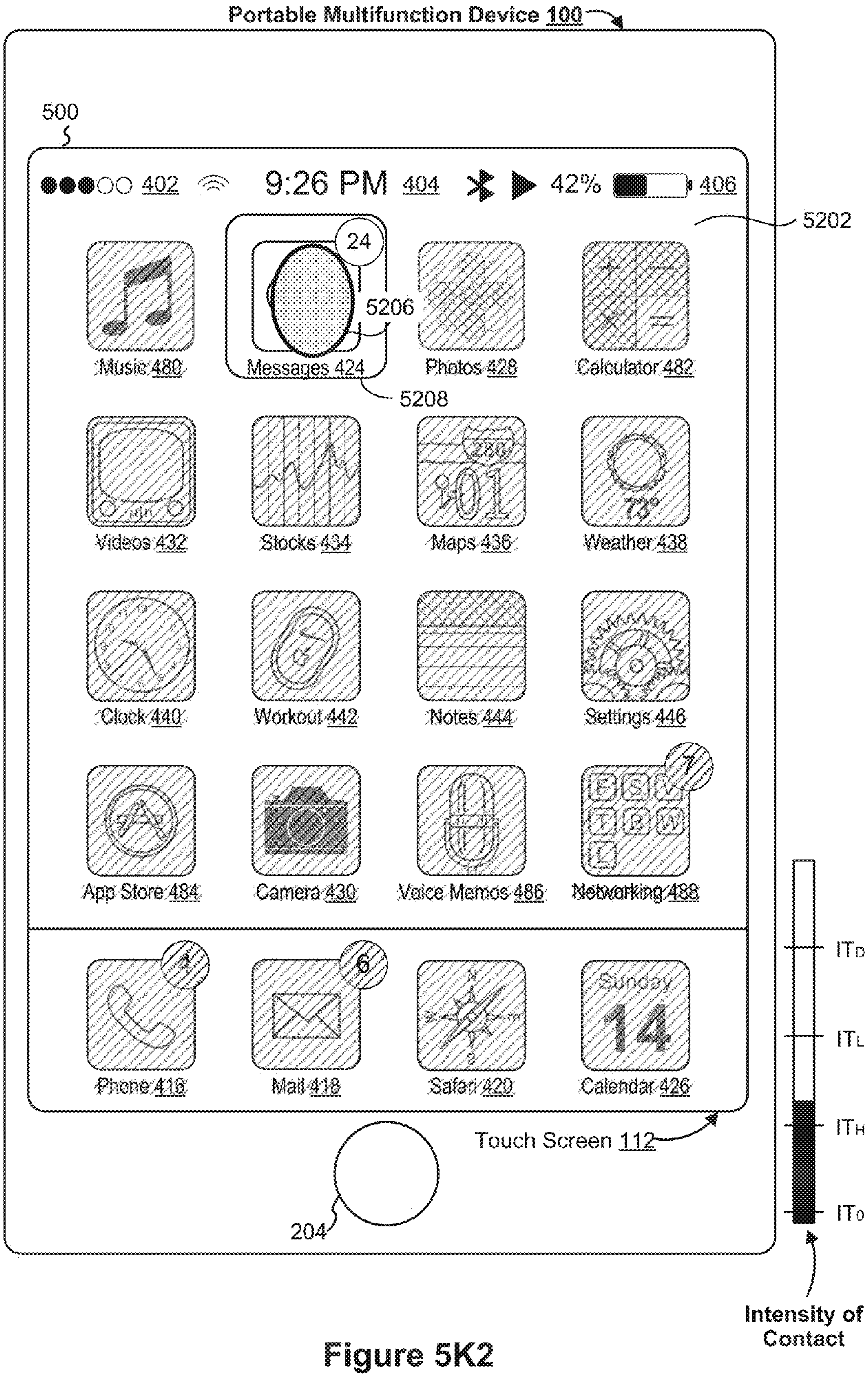
Figure 5K2

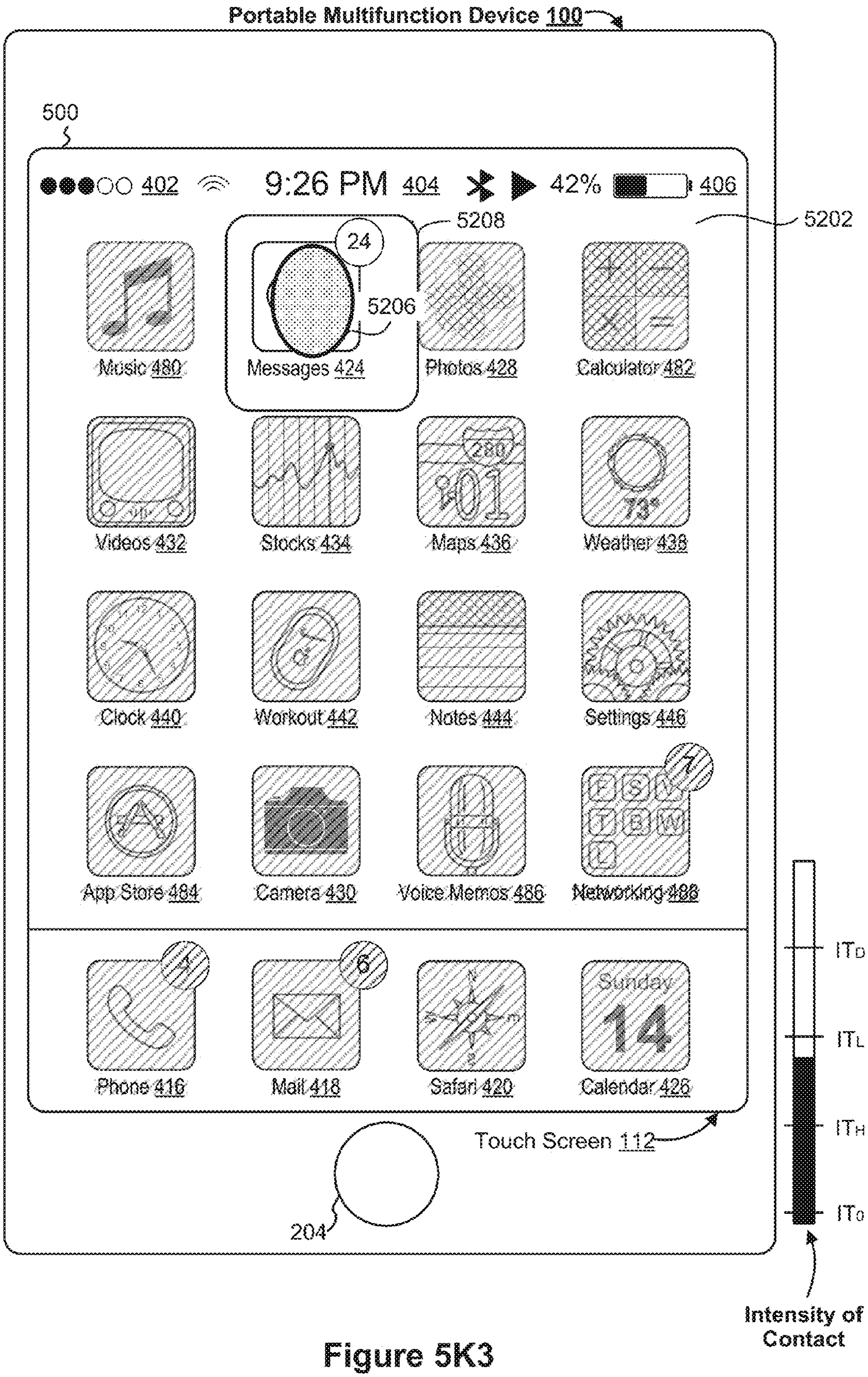
Figure 5K3

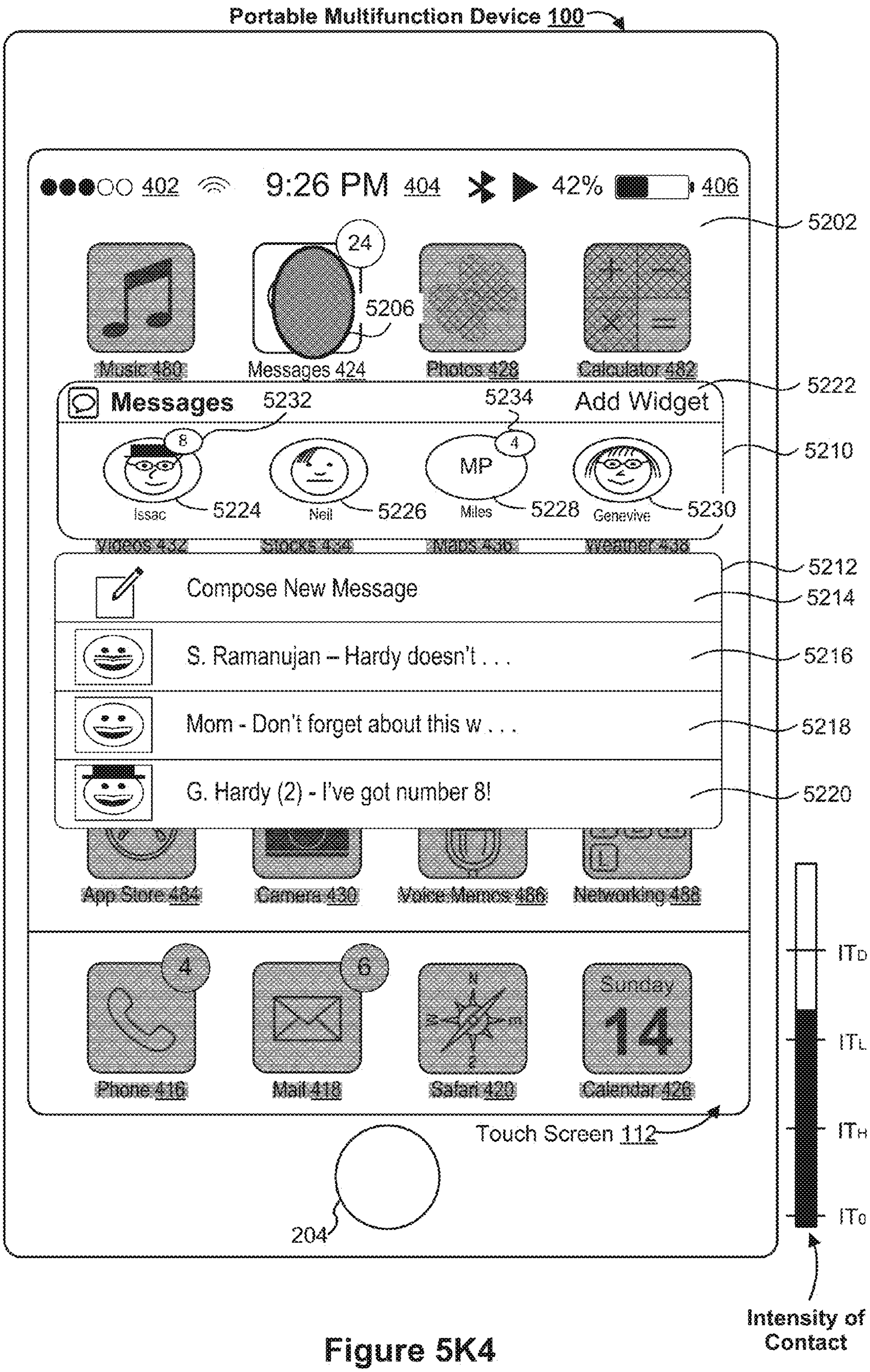
Figure 5K4

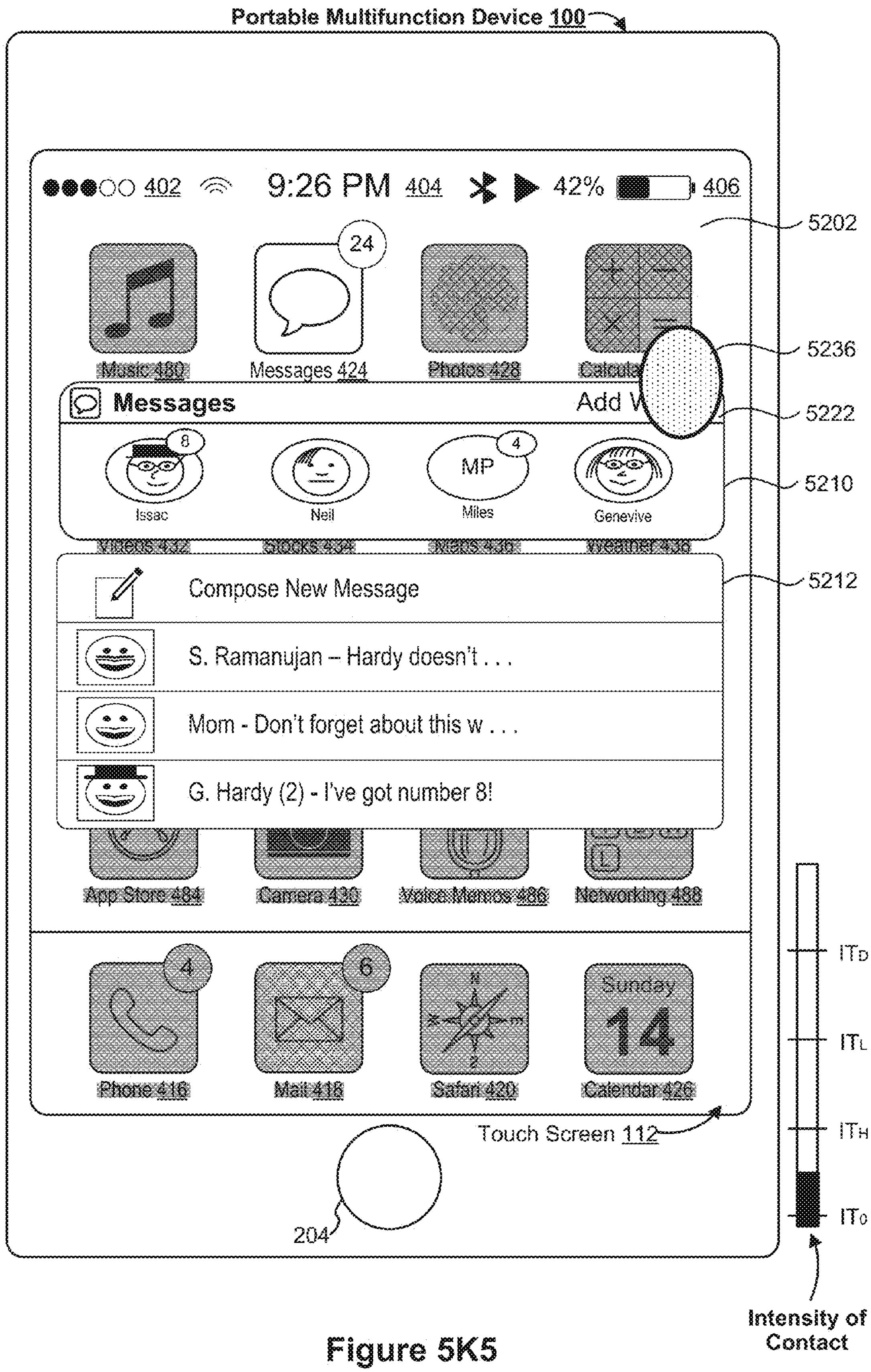
Figure 5K5

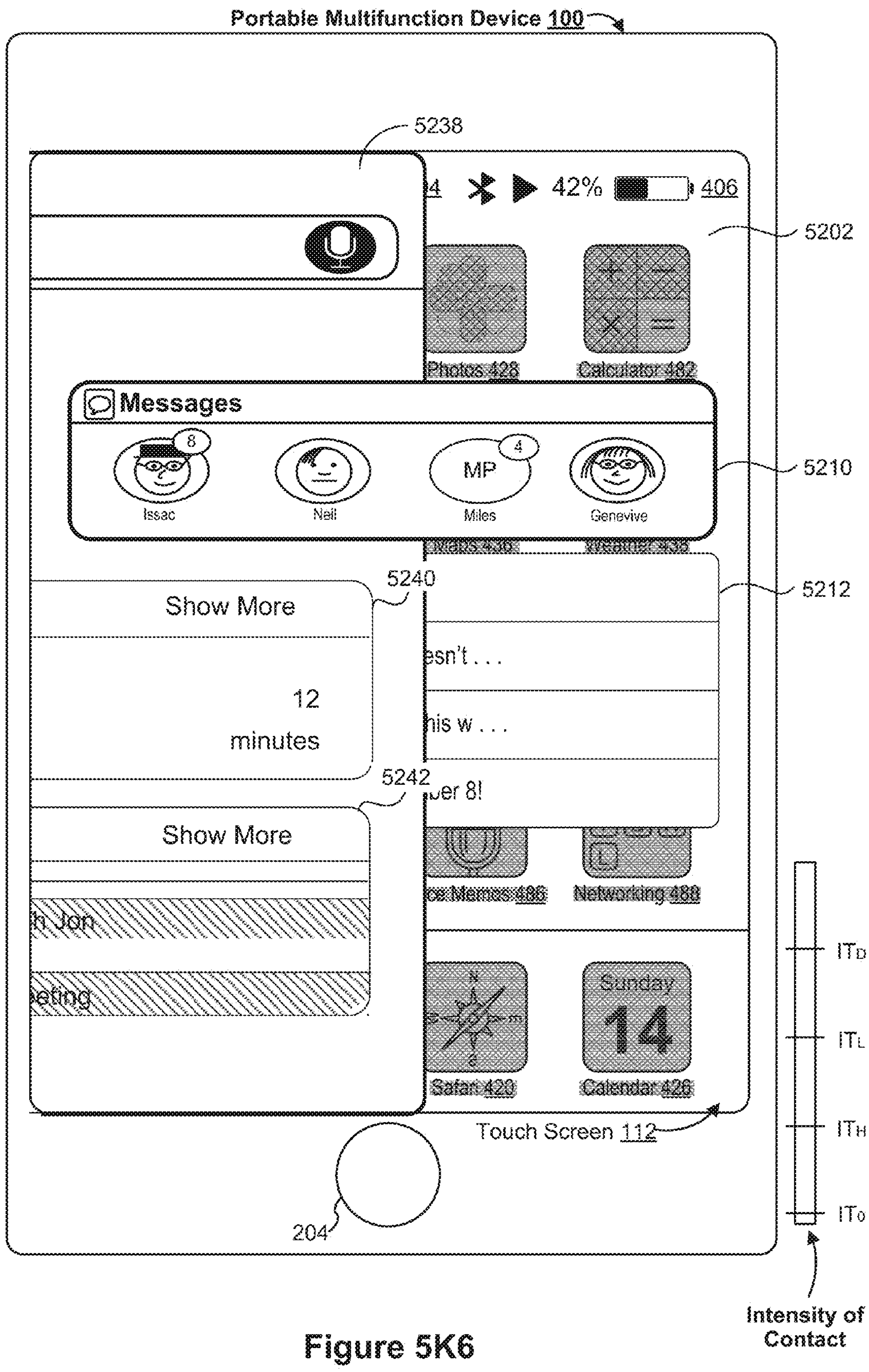
Figure 5K6

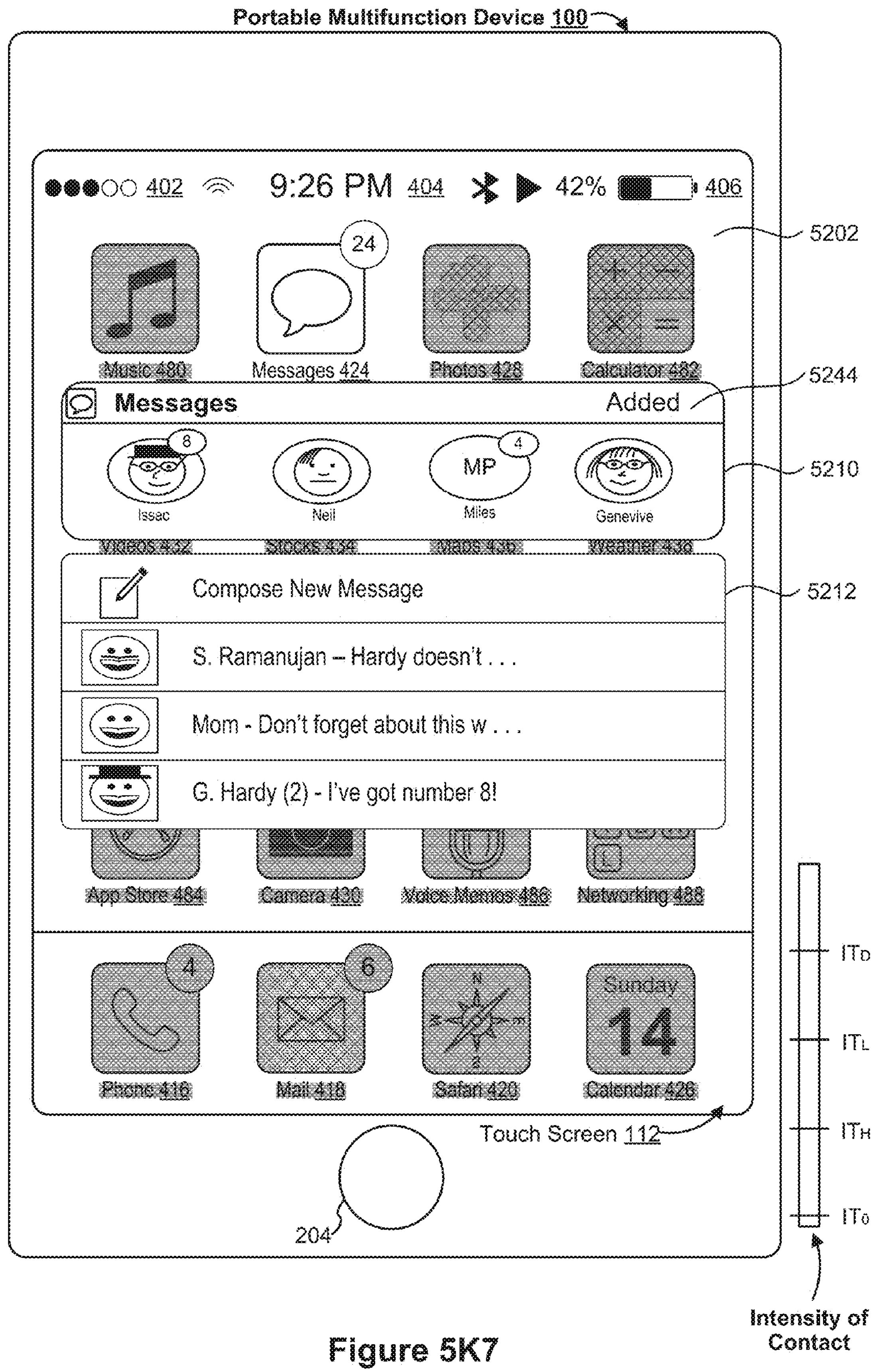
Figure 5K7

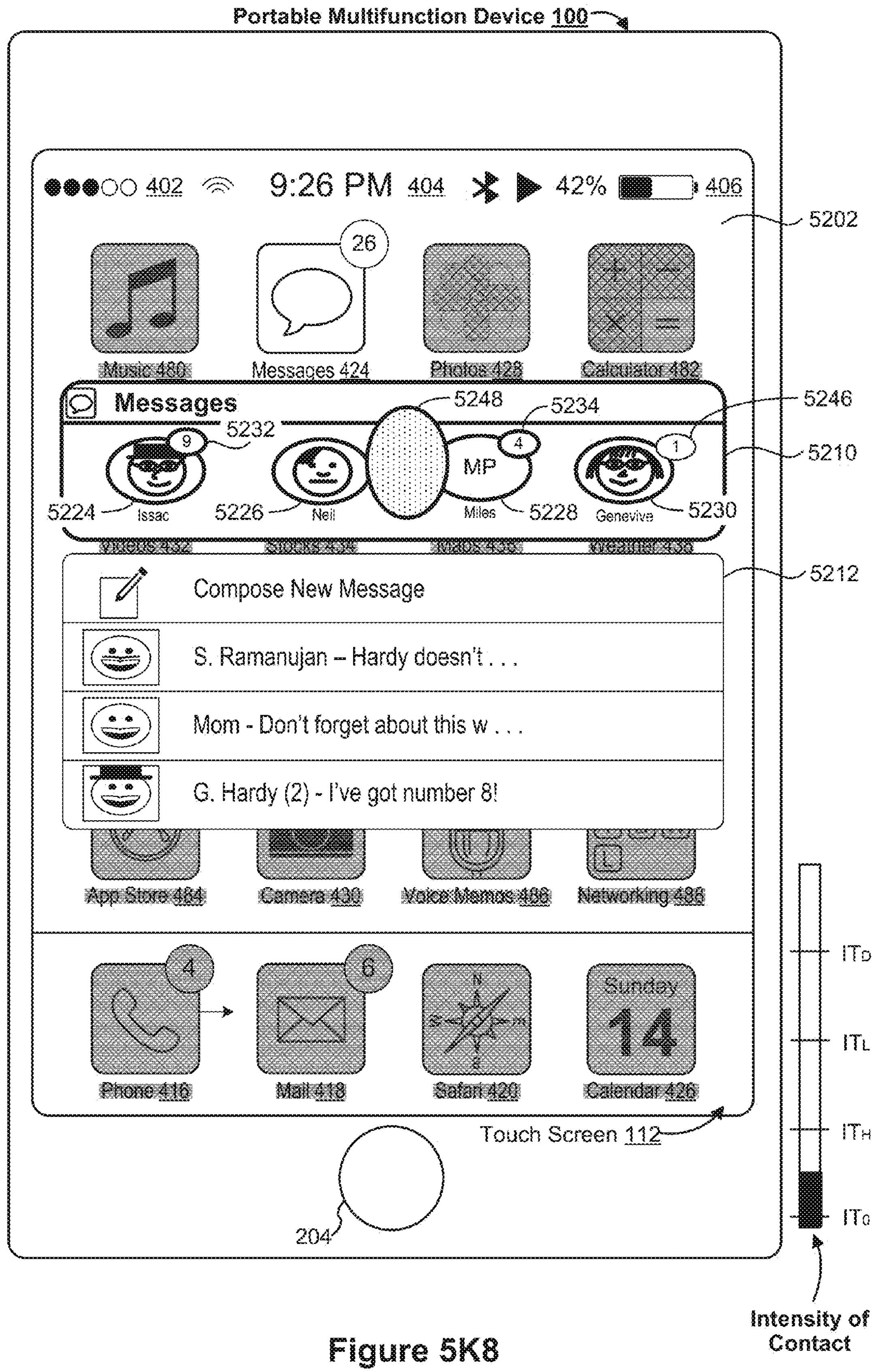
Figure 5K8

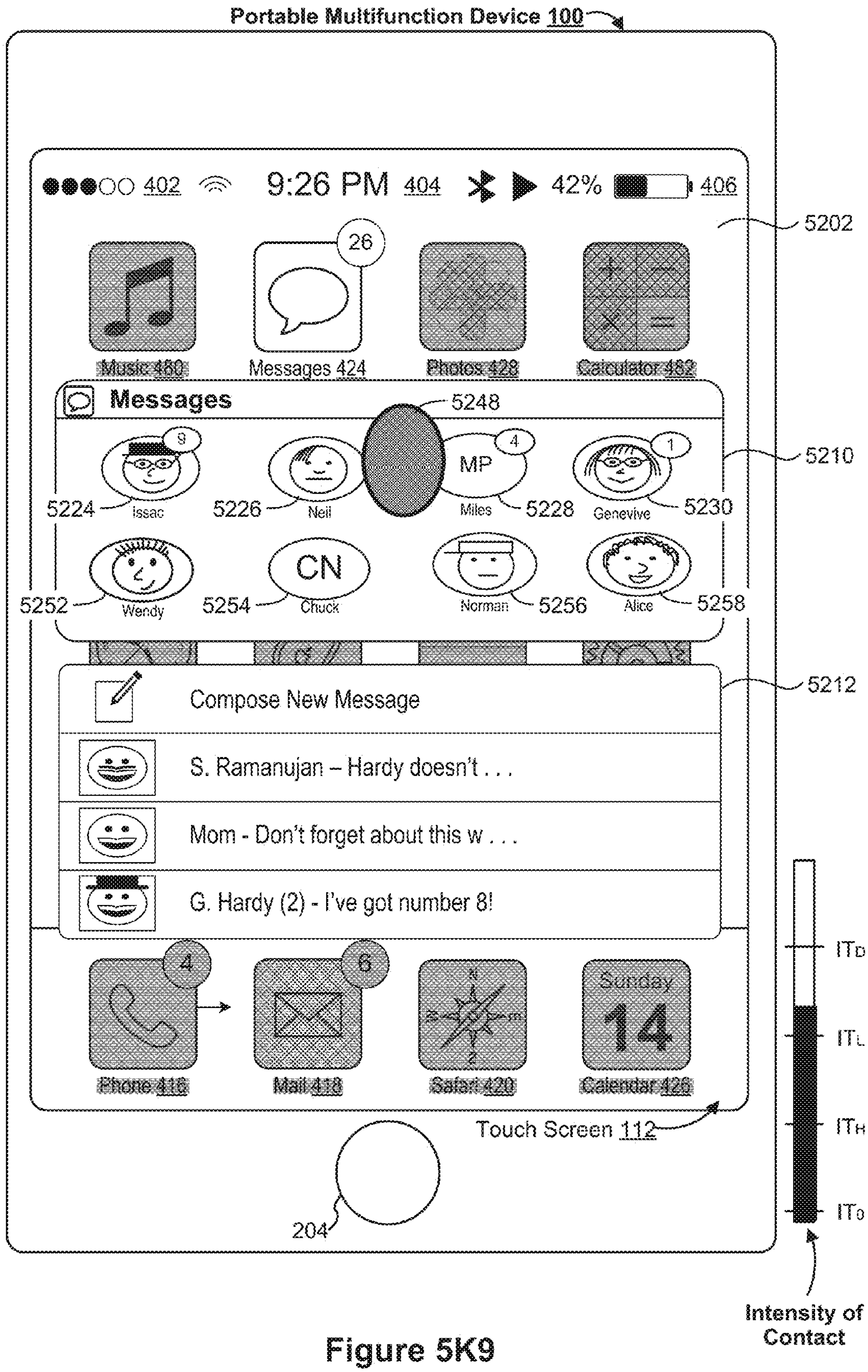
Figure 5K9

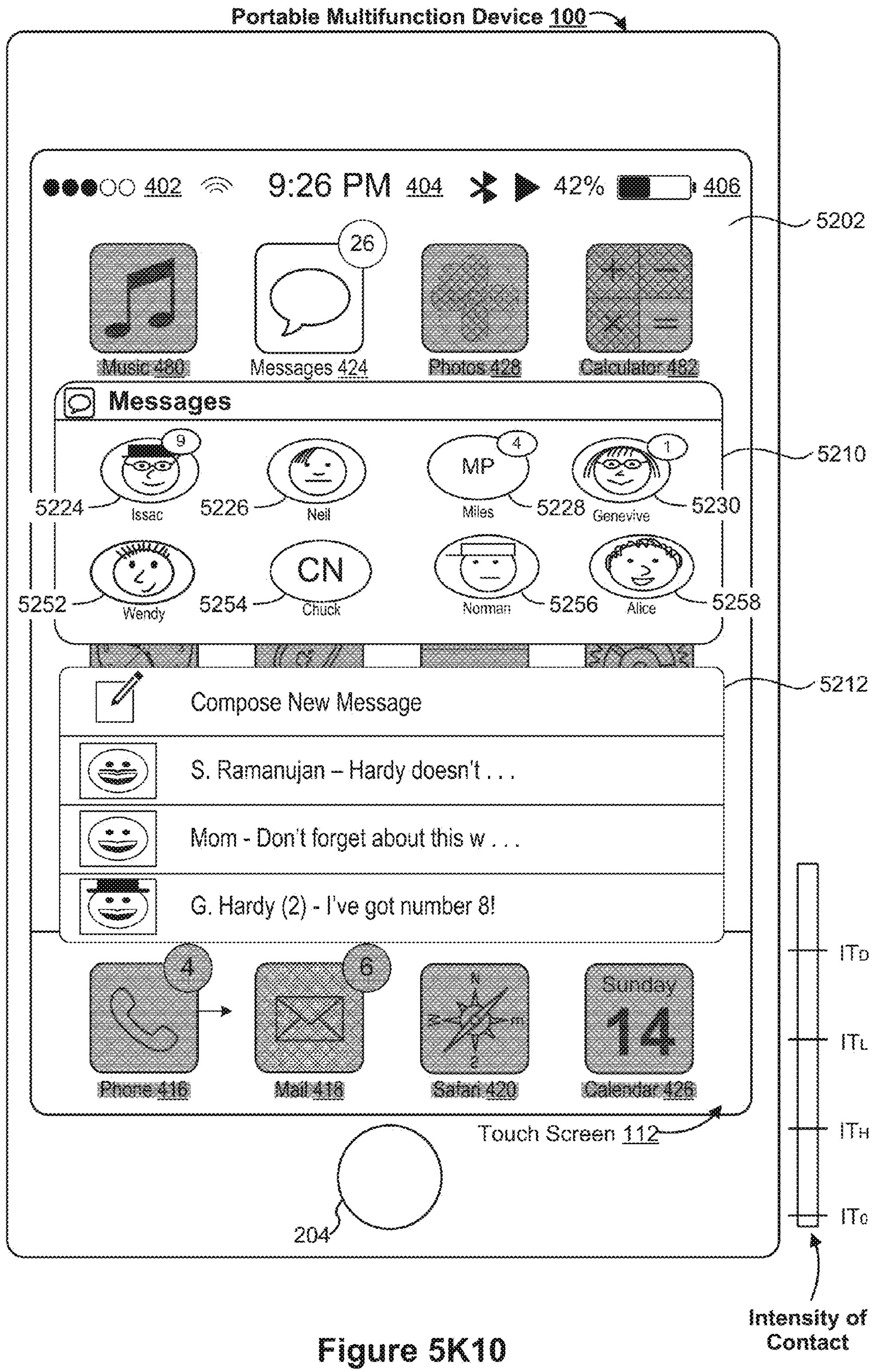
Figure 5K10

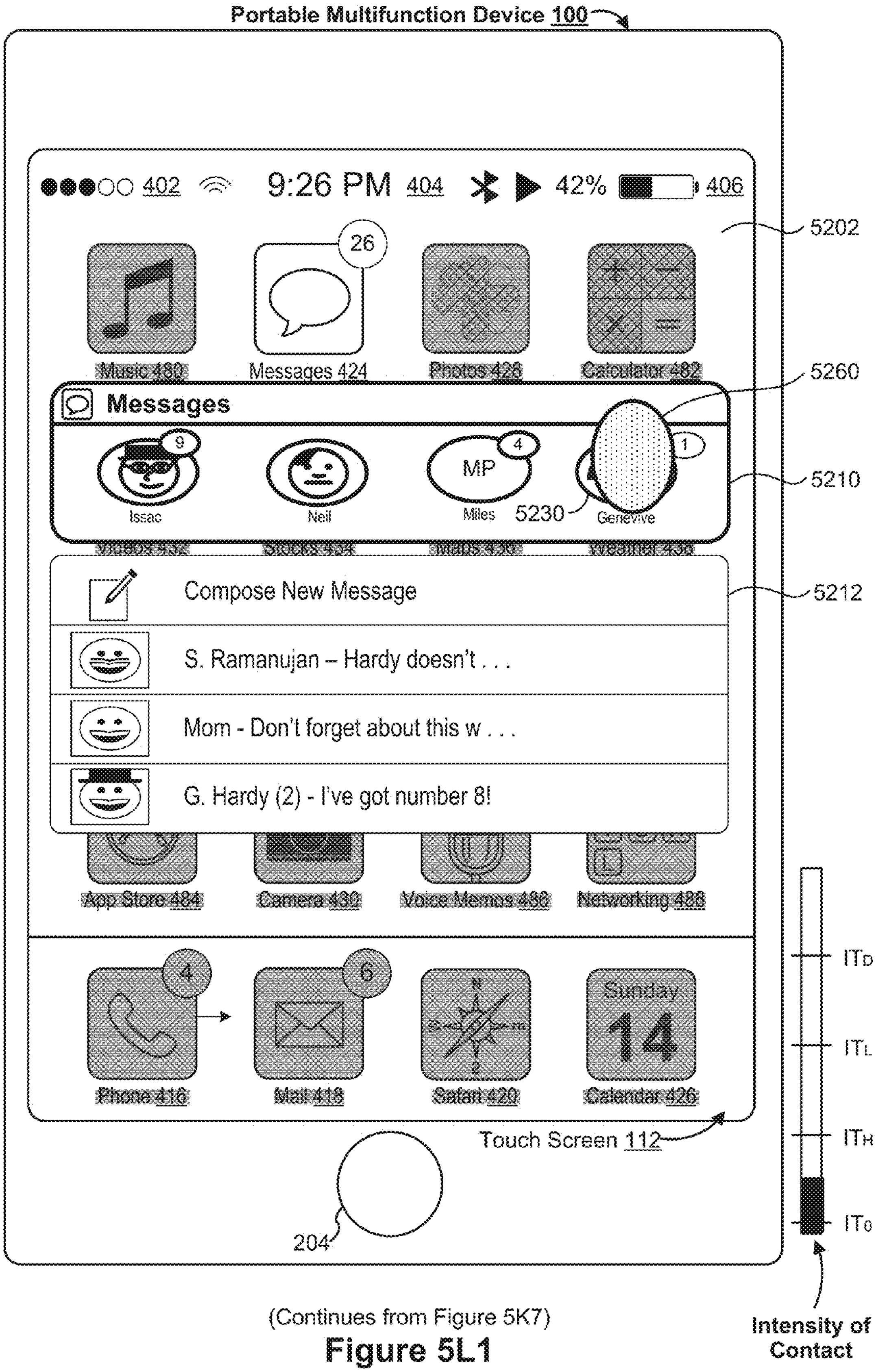
(Continues from Figure 5K7)
Figure 5L1

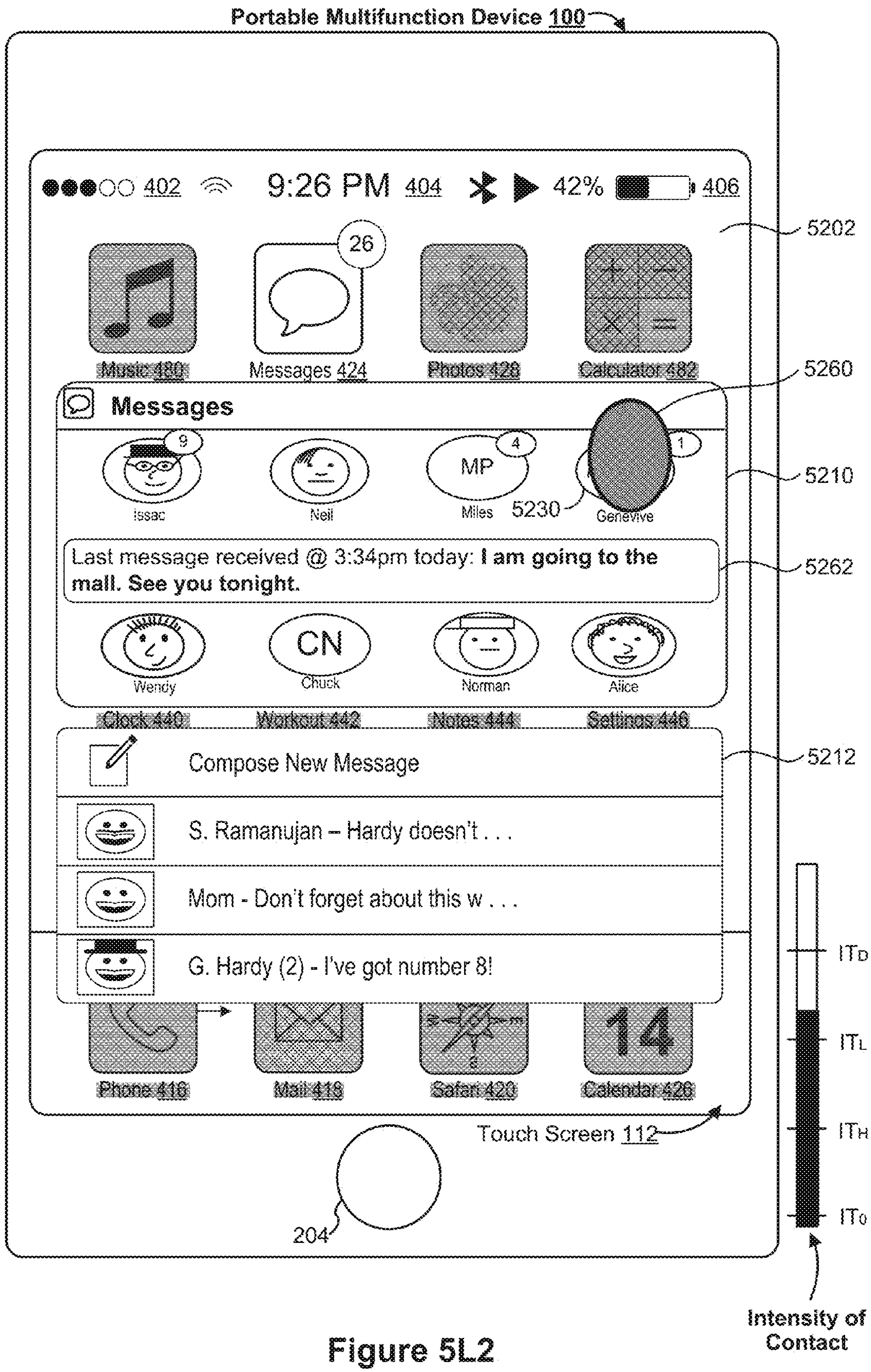
Figure 5L2

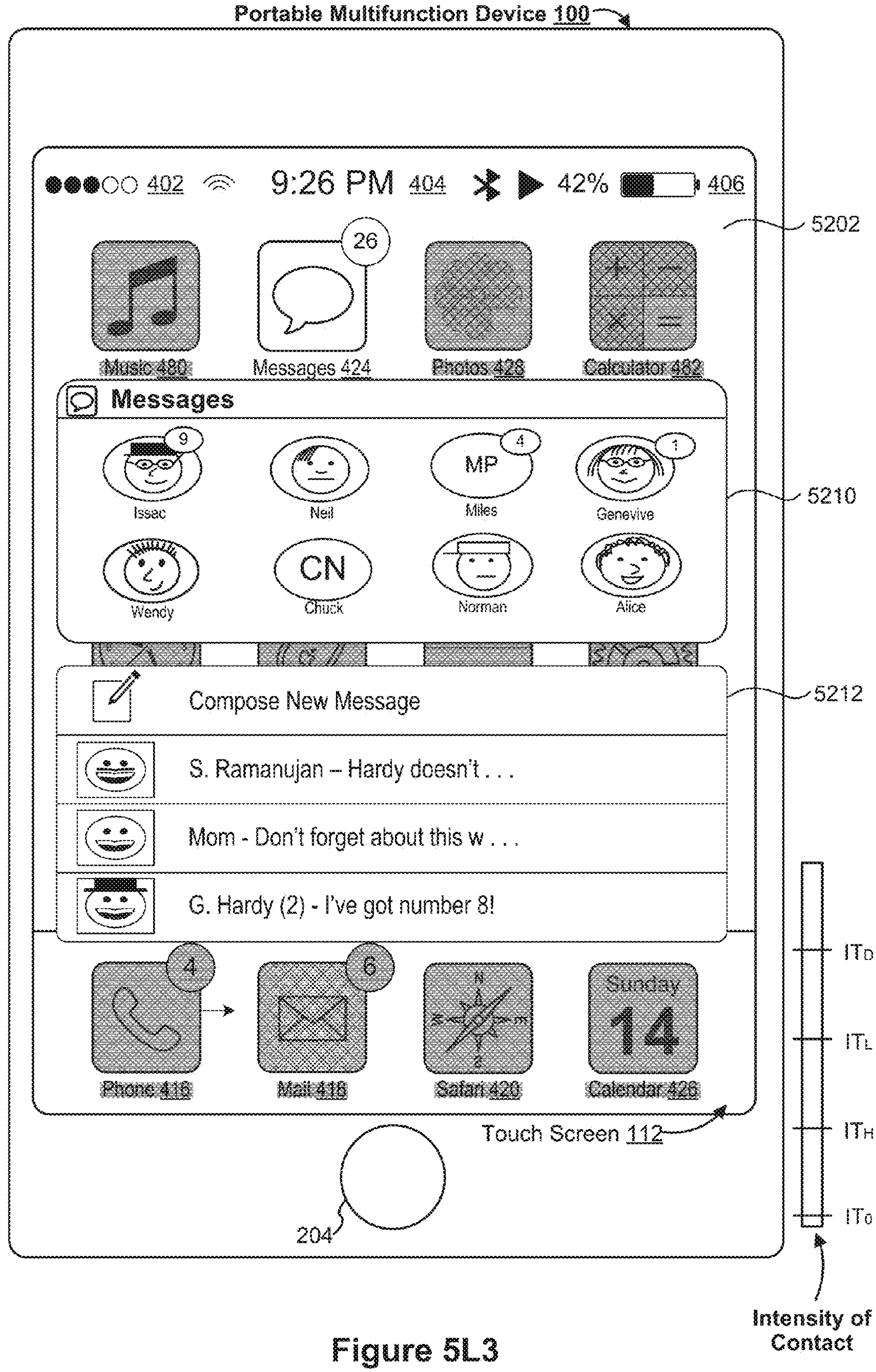
Figure 5L3

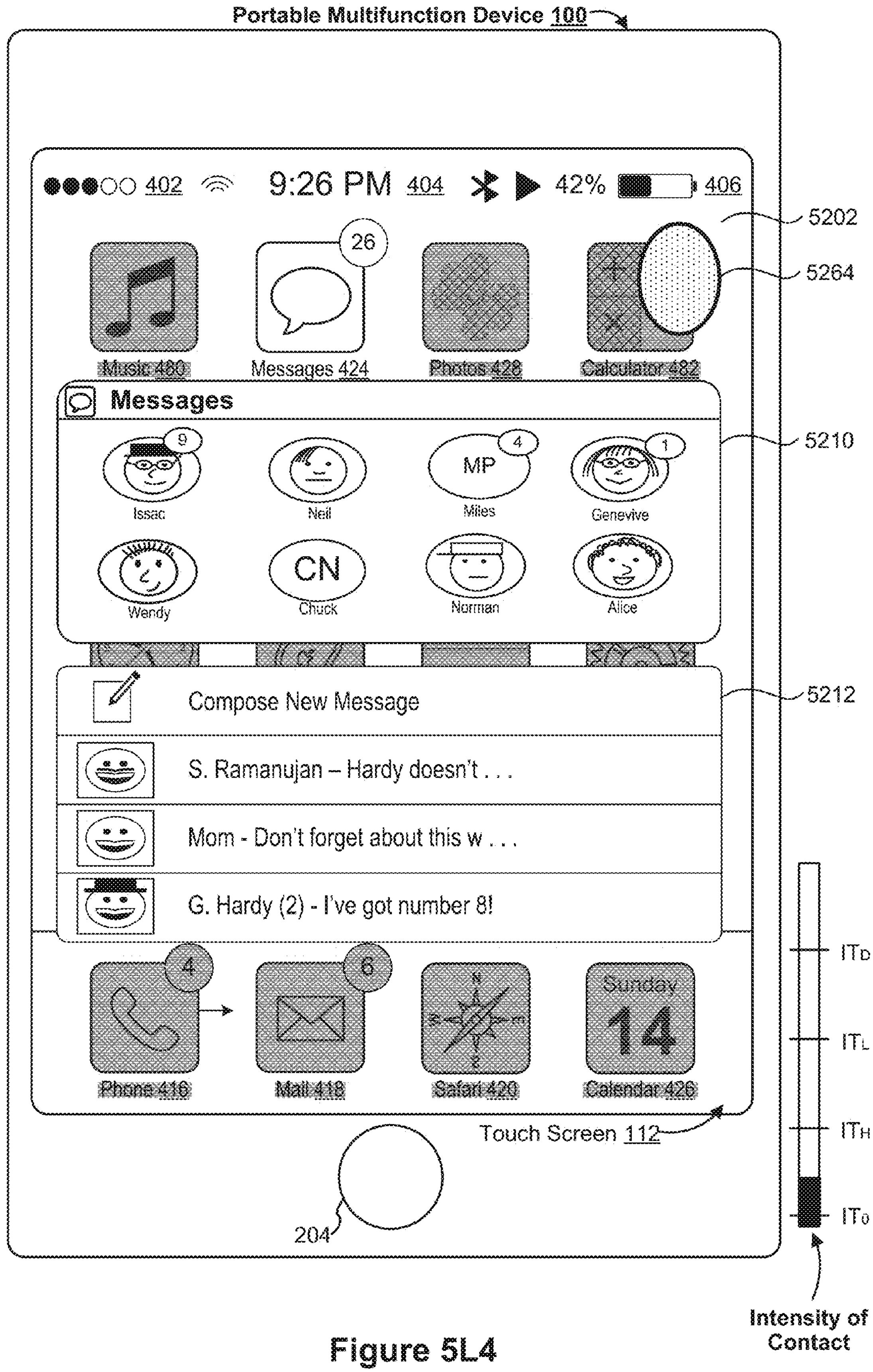
Figure 5L4

Figure 5L5

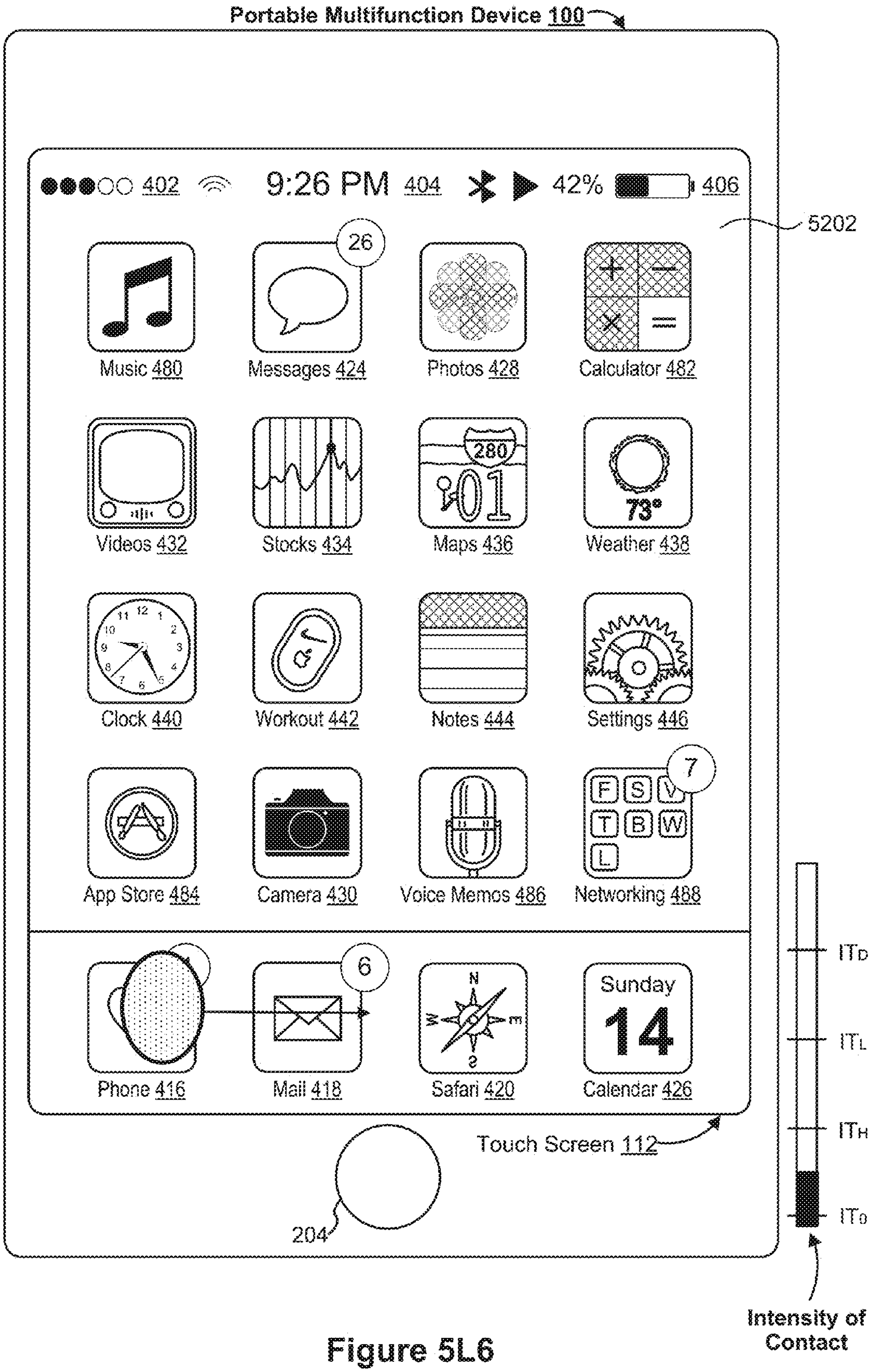
Figure 5L6

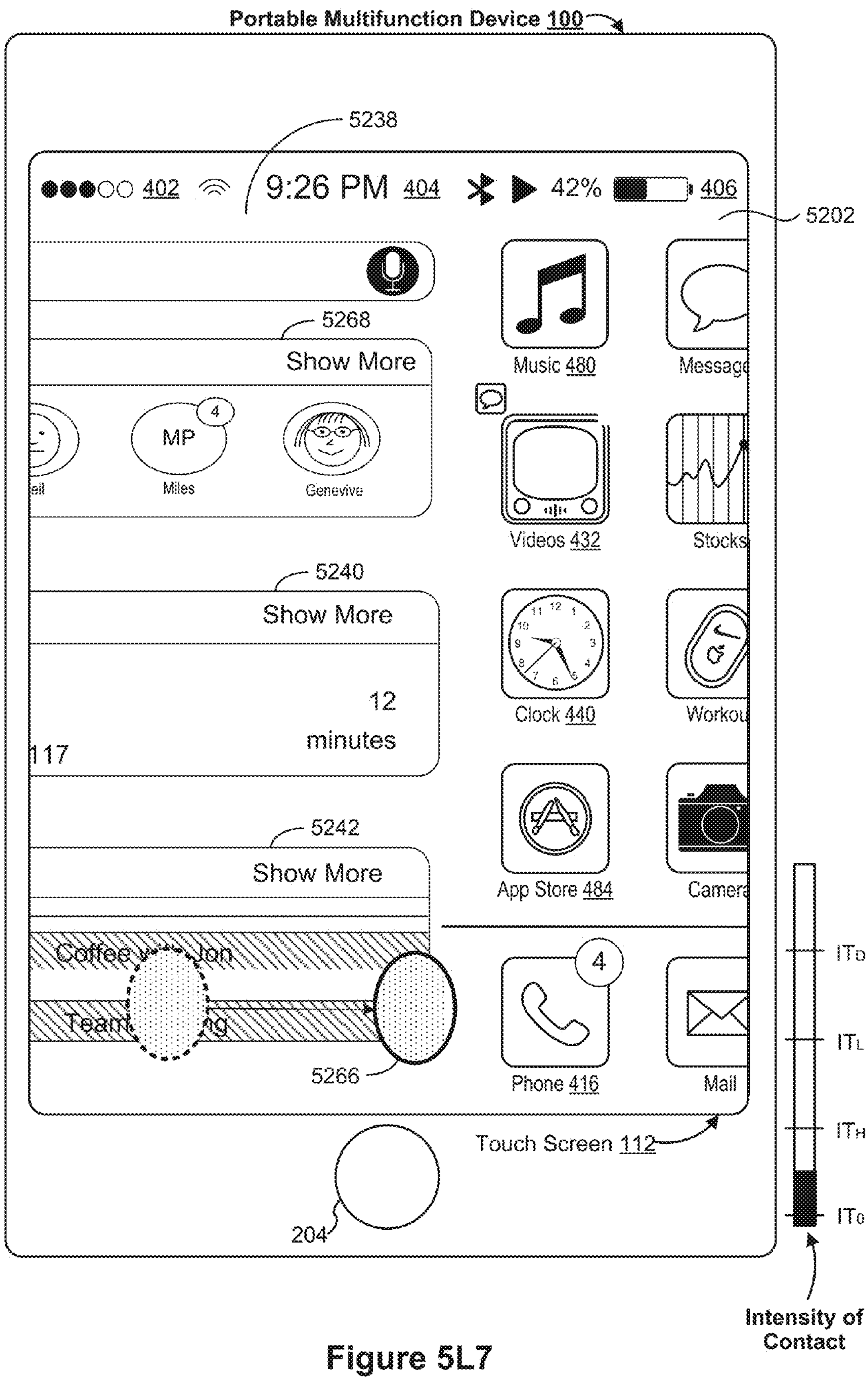
Figure 5L7

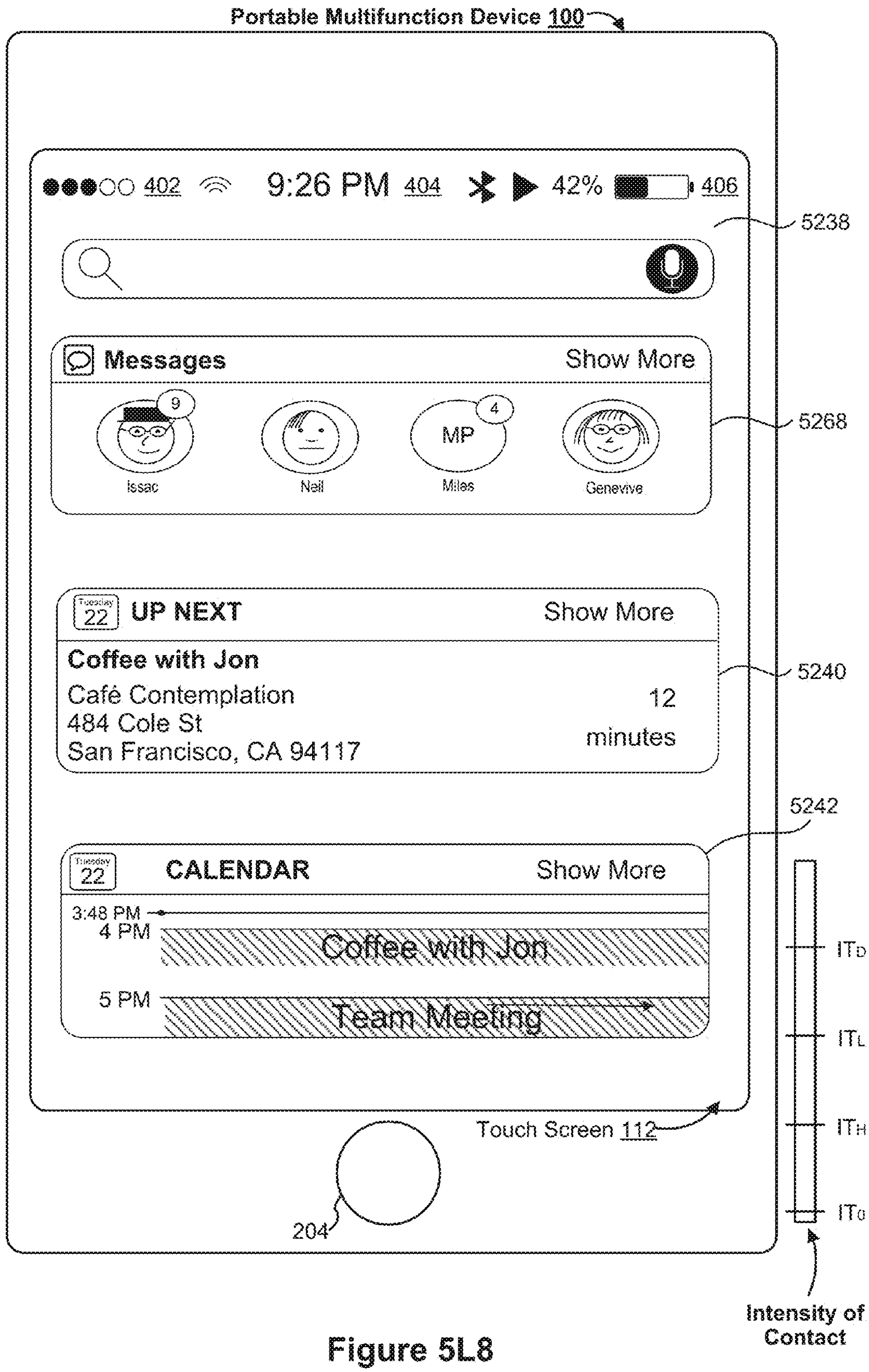
Figure 5L8

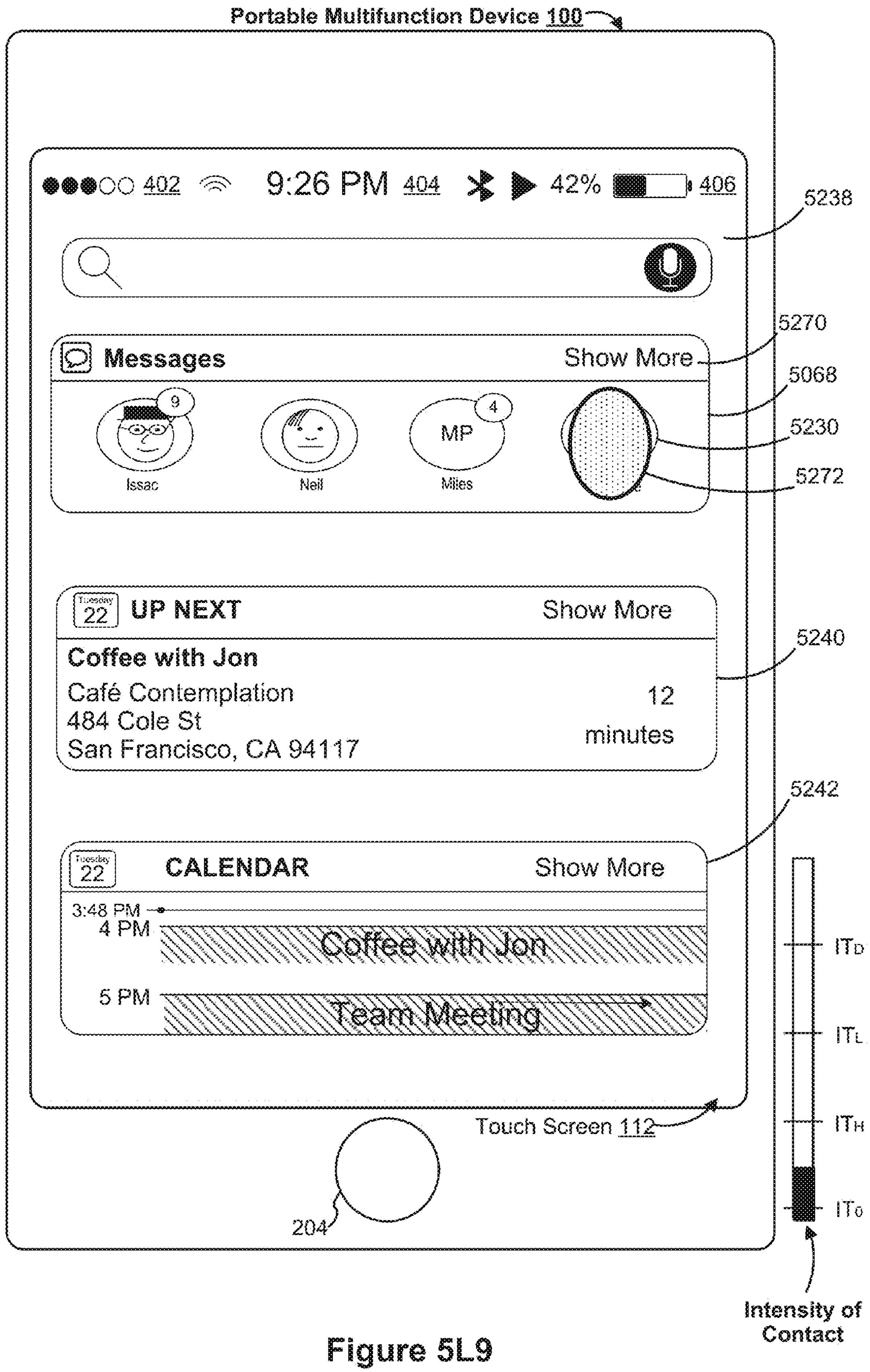
Figure 5L9

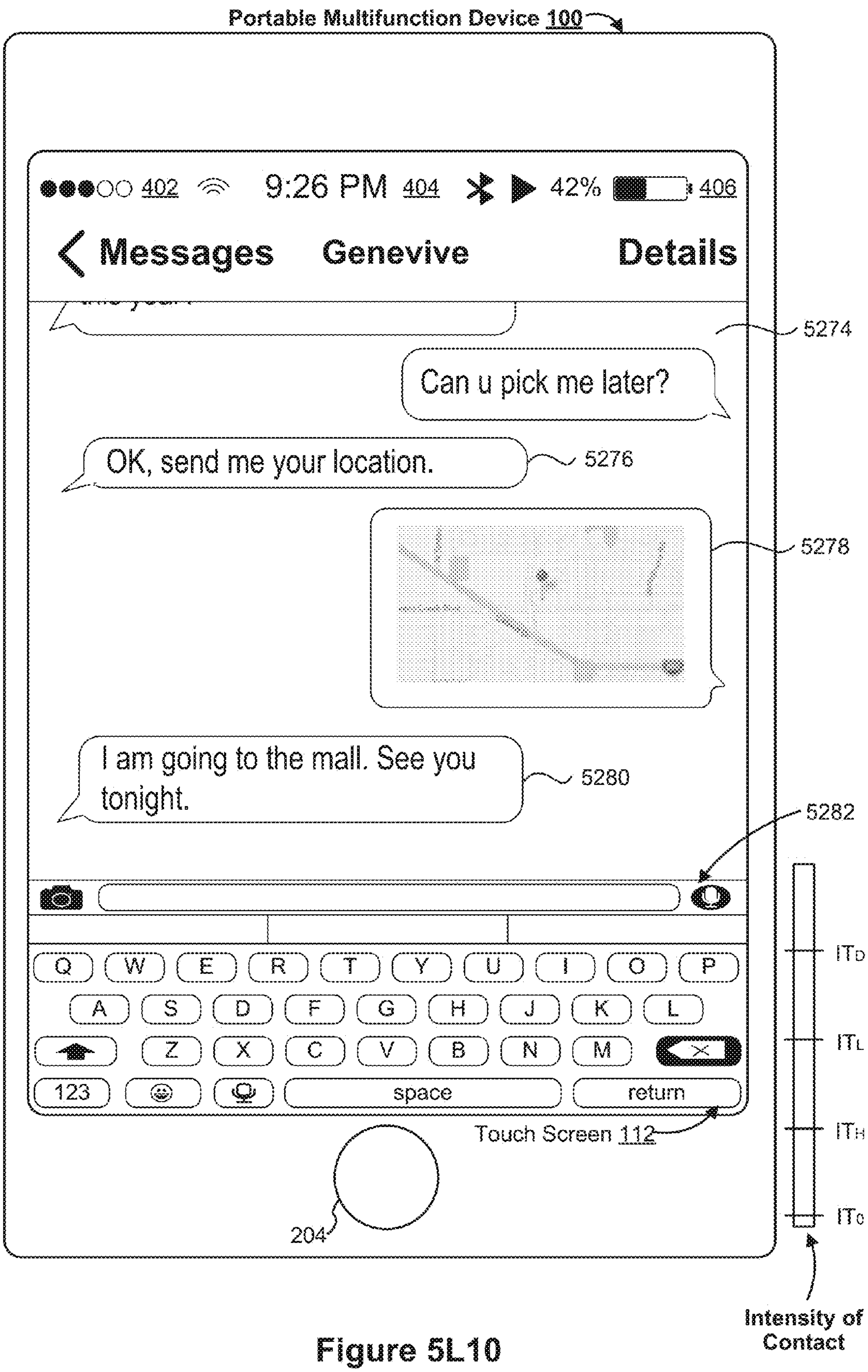
Figure 5L10

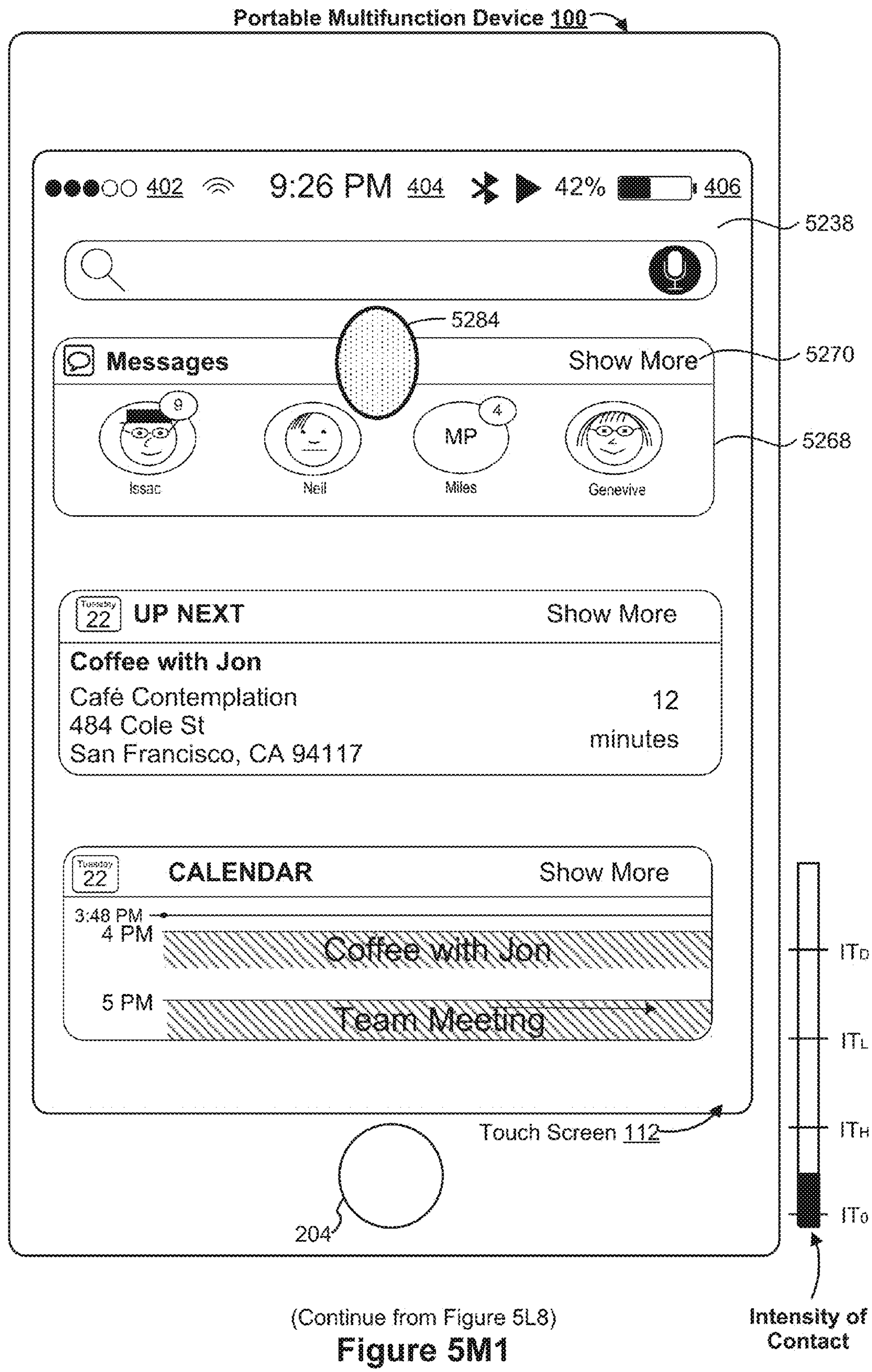
(Continue from Figure 5L8)
Figure 5M1

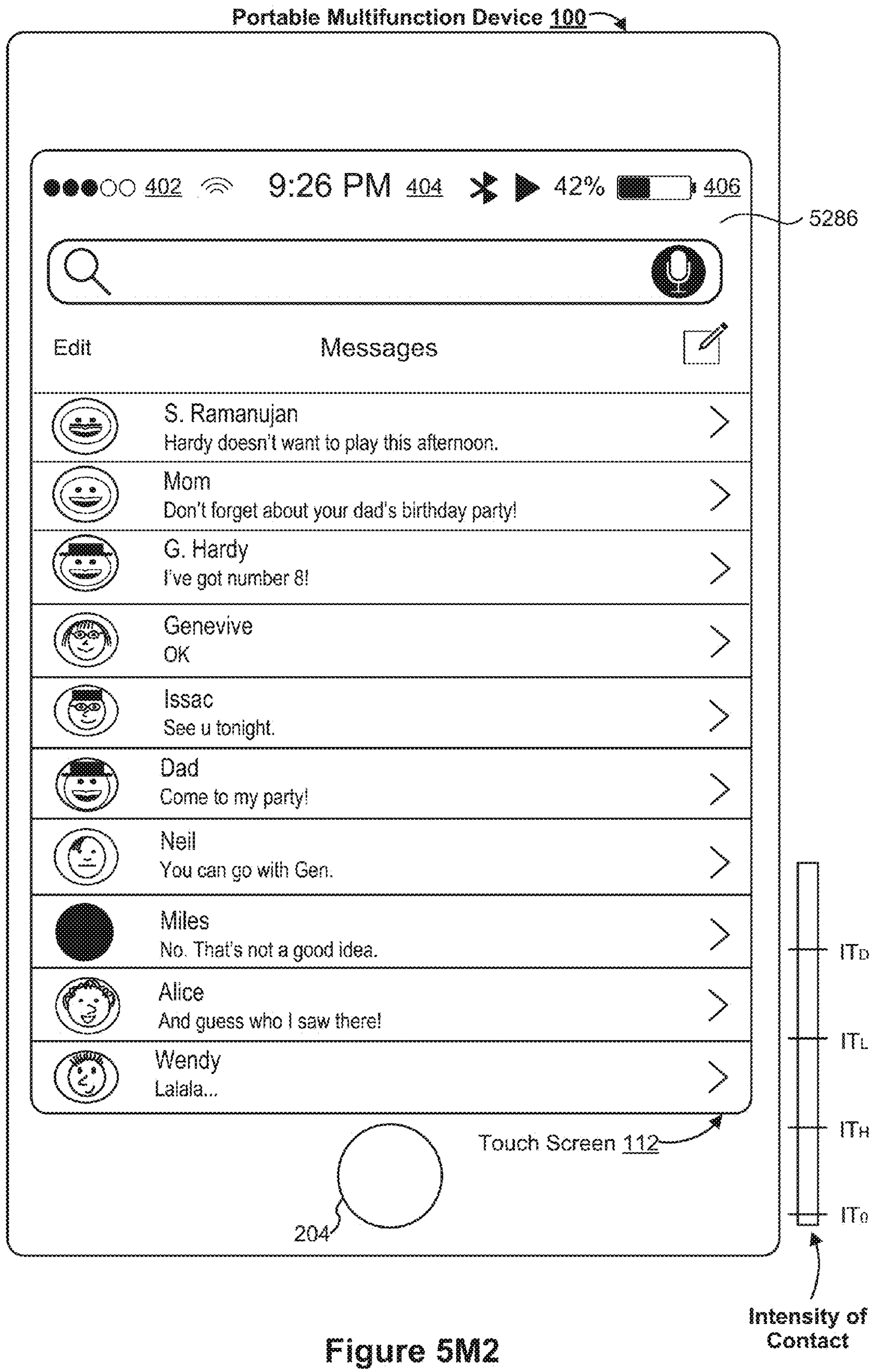
Figure 5M2

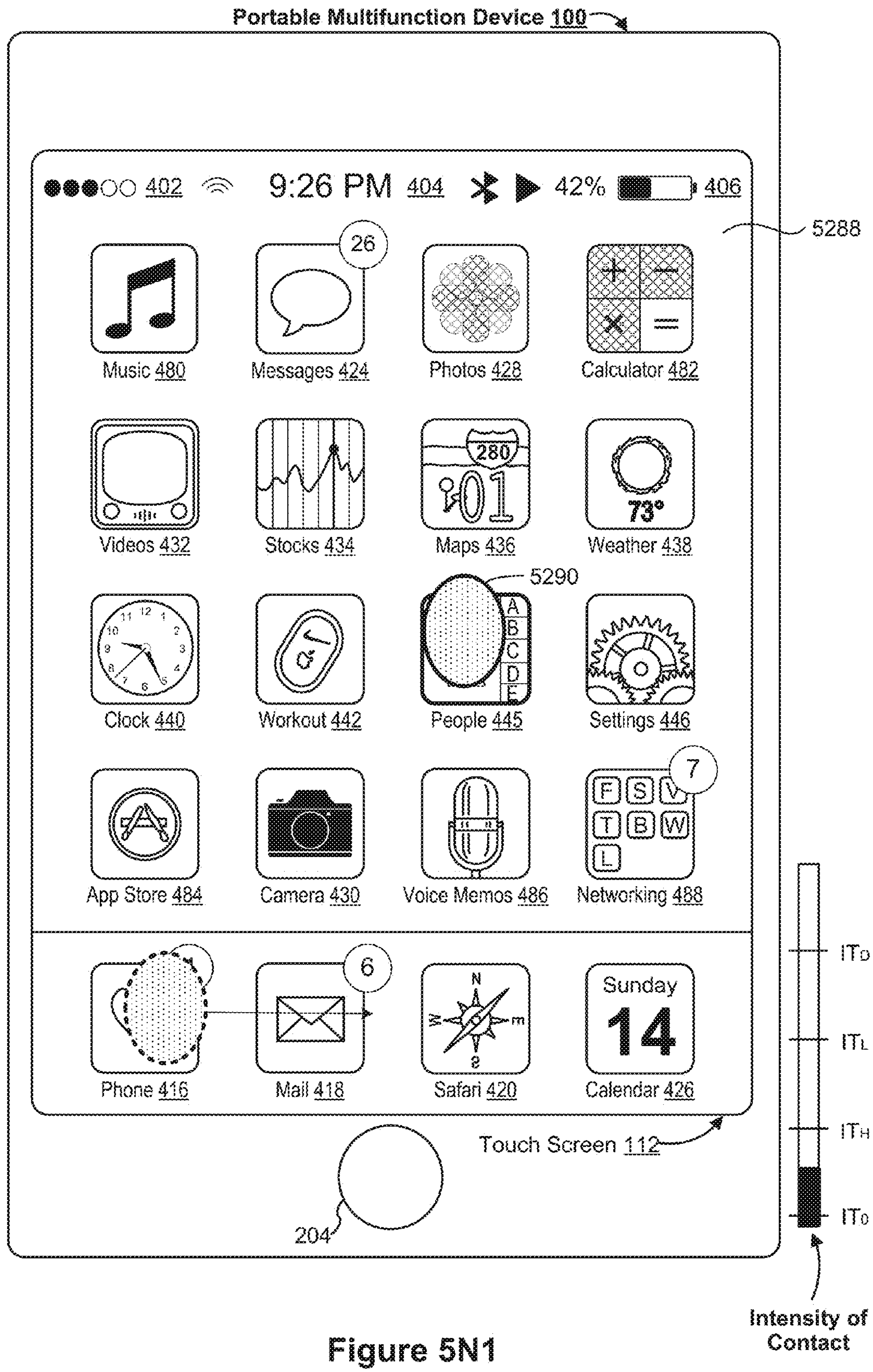
Figure 5N1

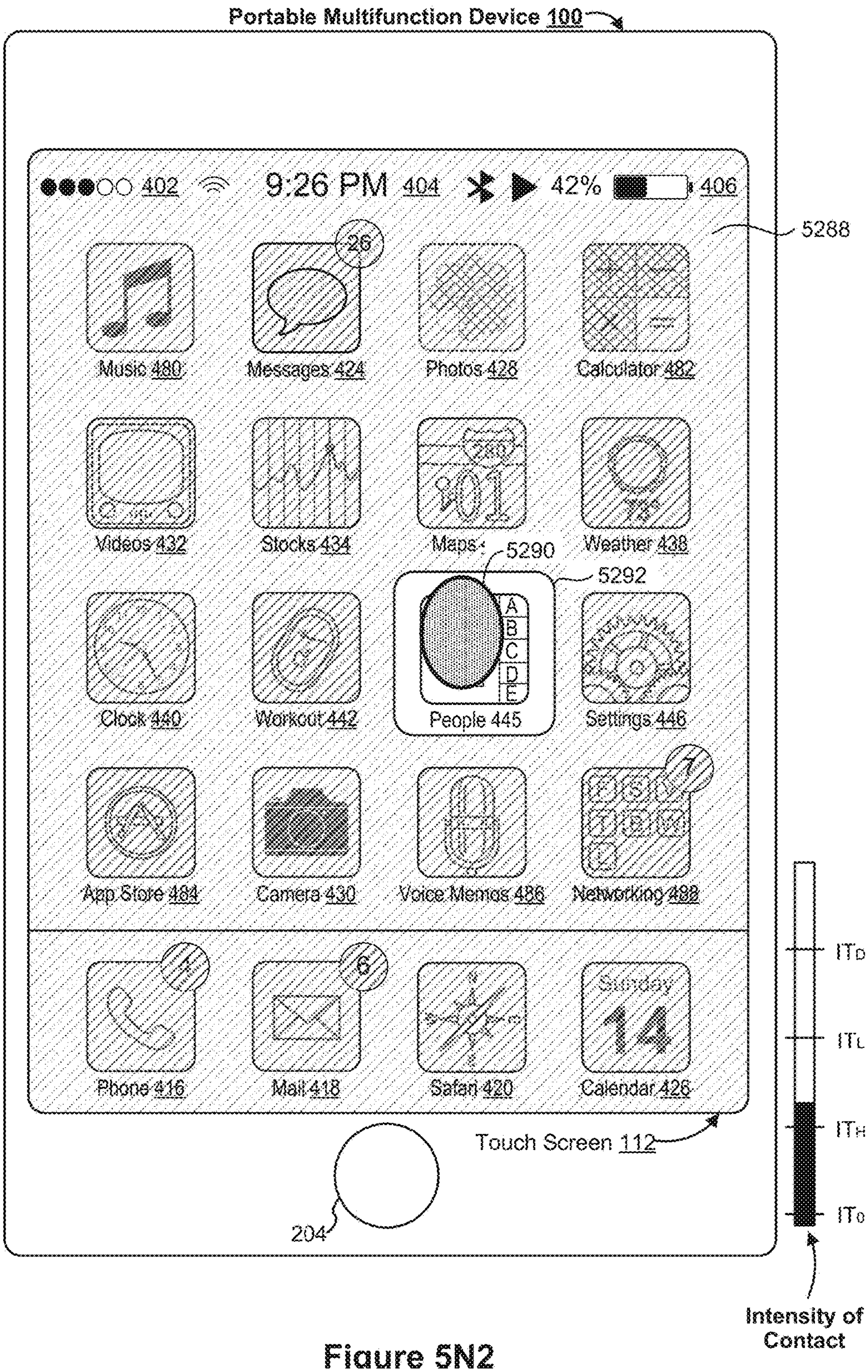
Figure 5N2

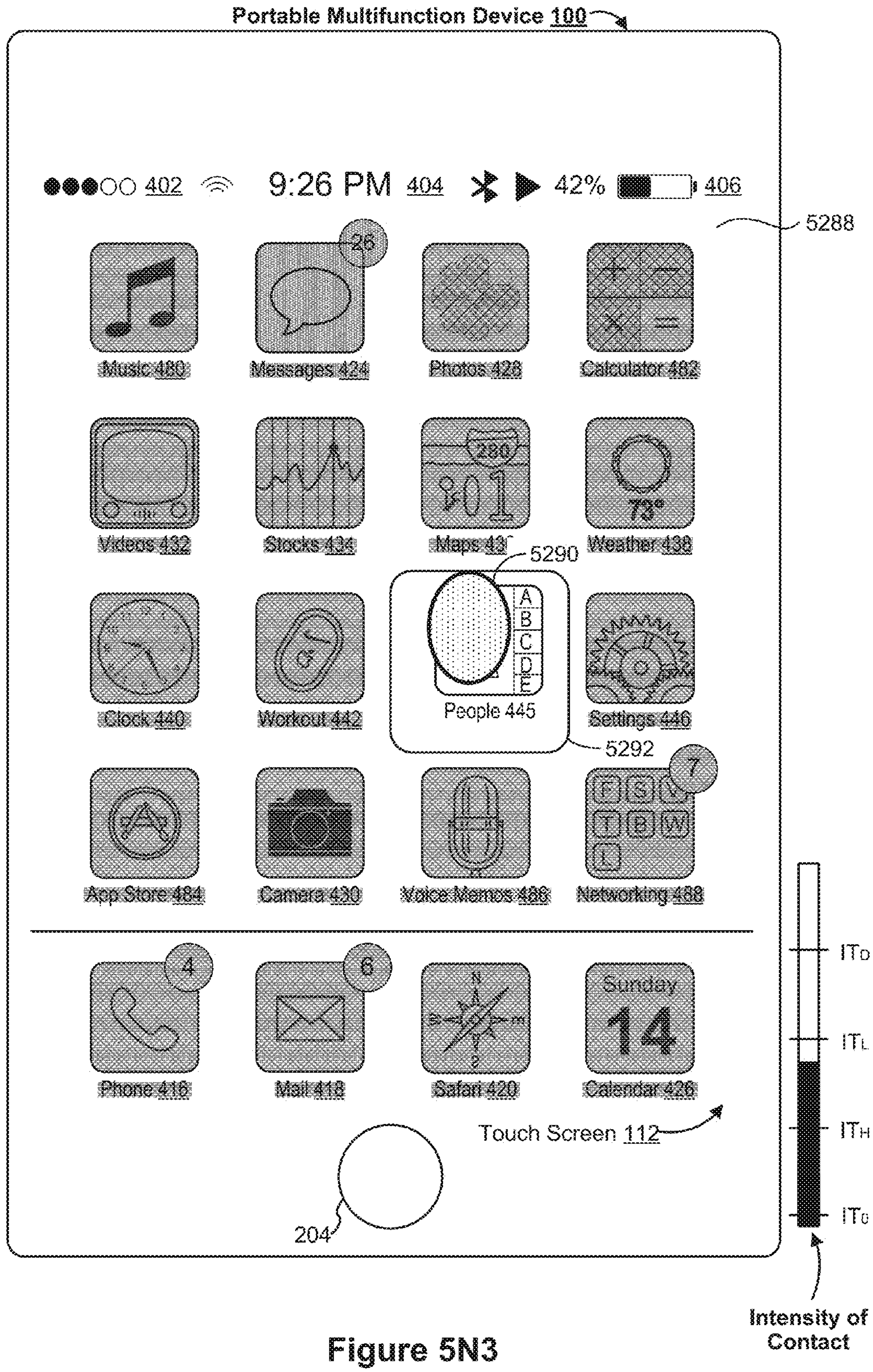
Figure 5N3

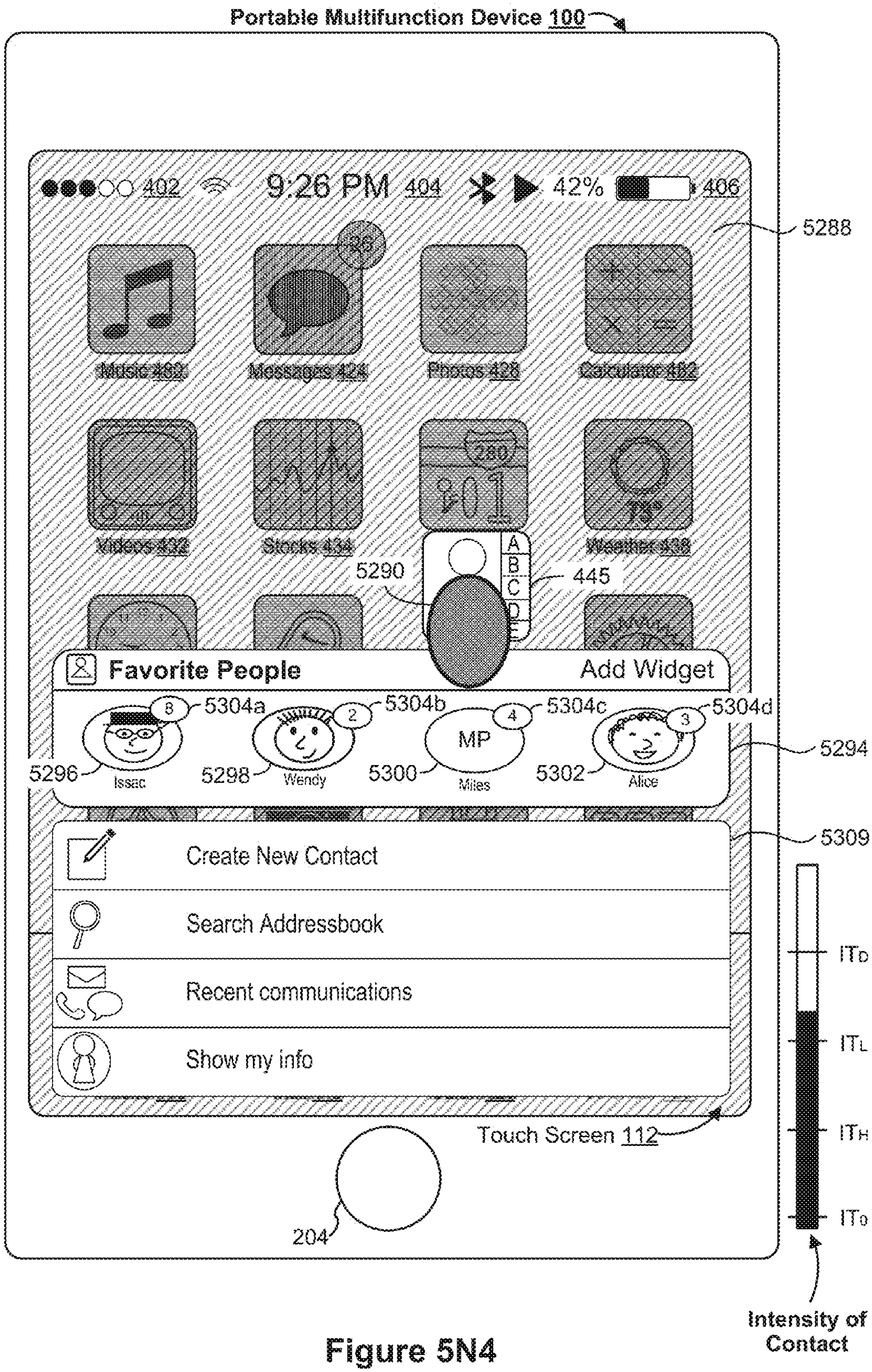
Figure 5N4

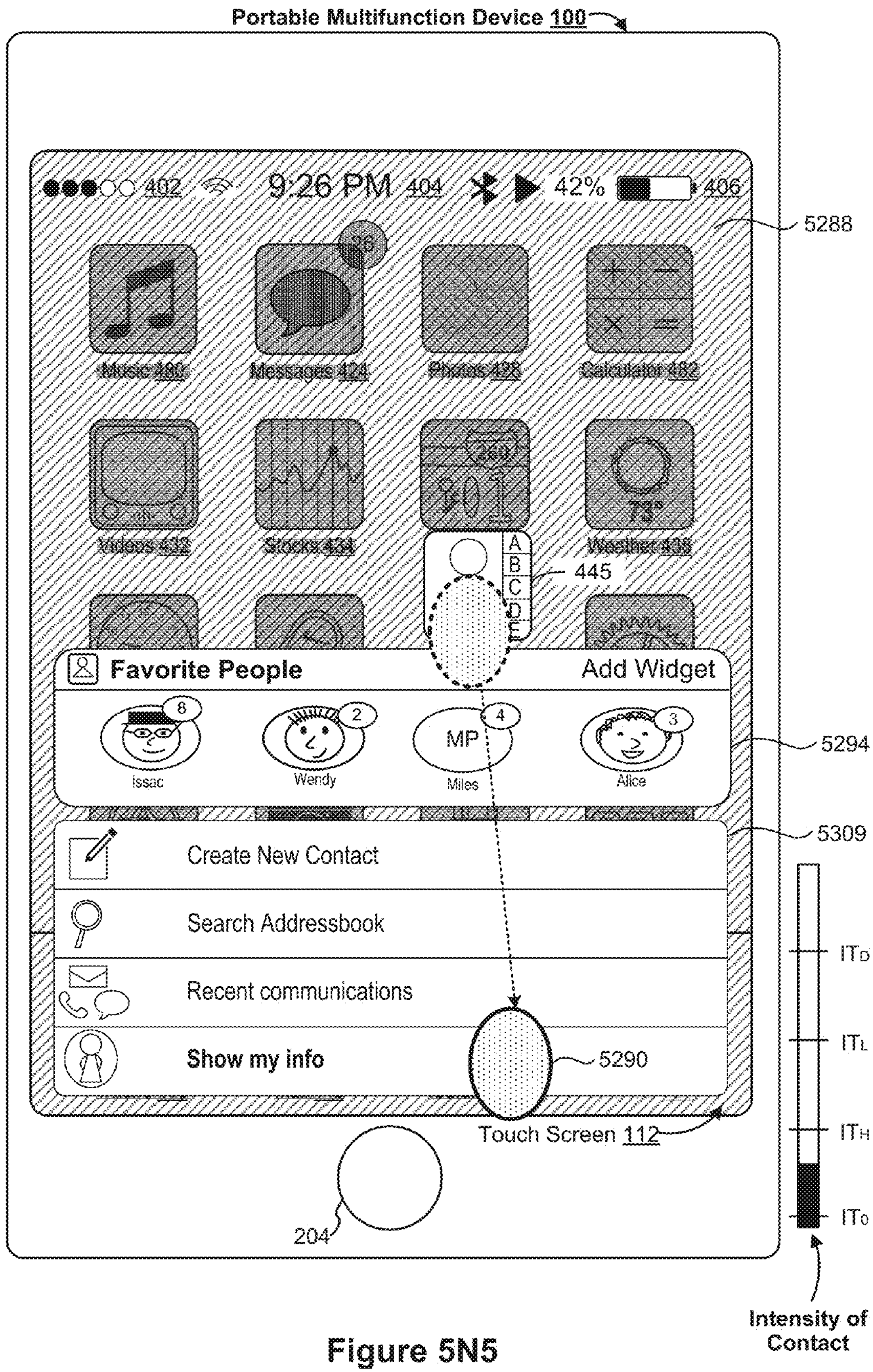
Figure 5N5

Figure 5N6

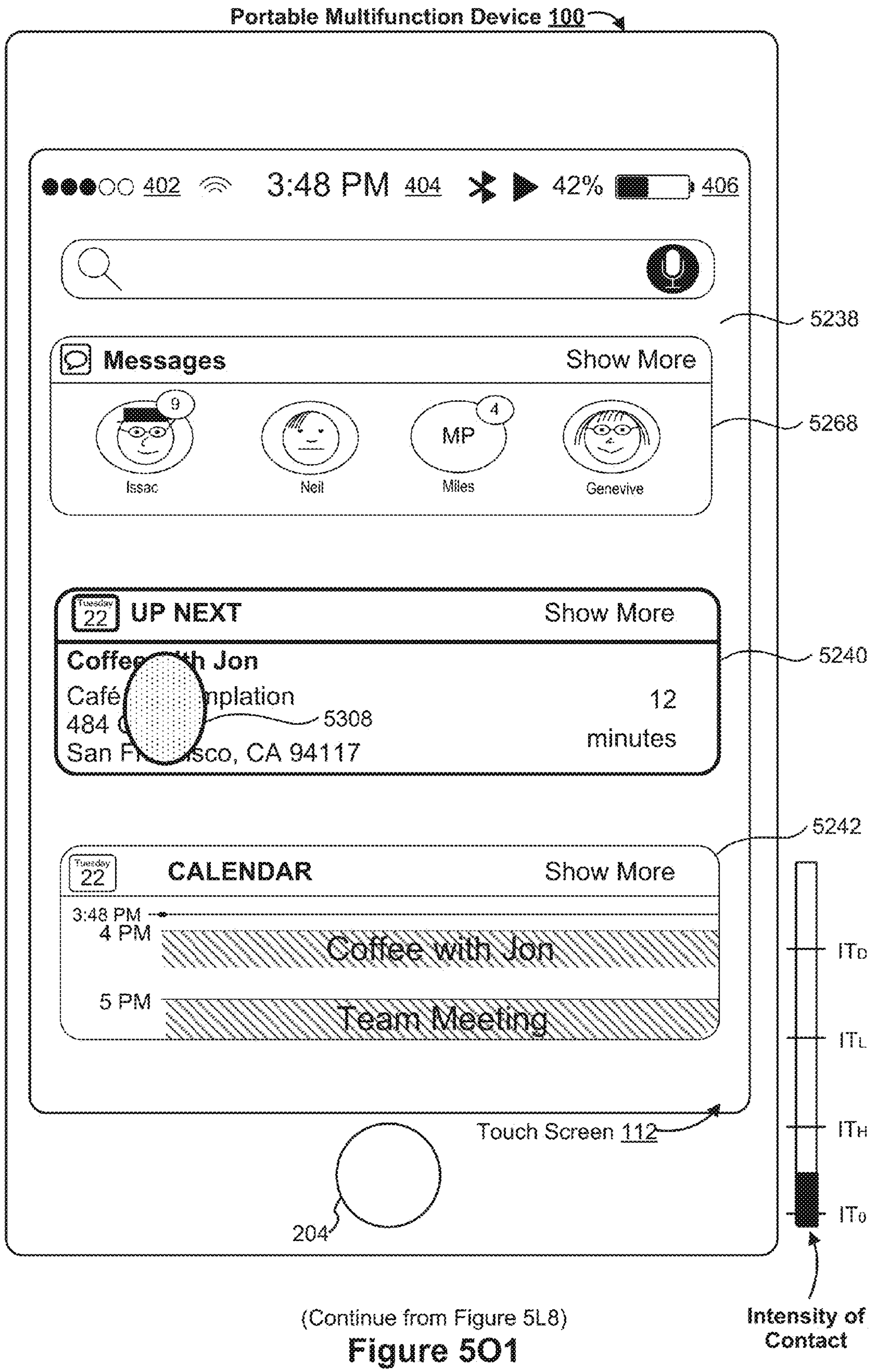
(Continue from Figure 5L8)
Figure 5O1

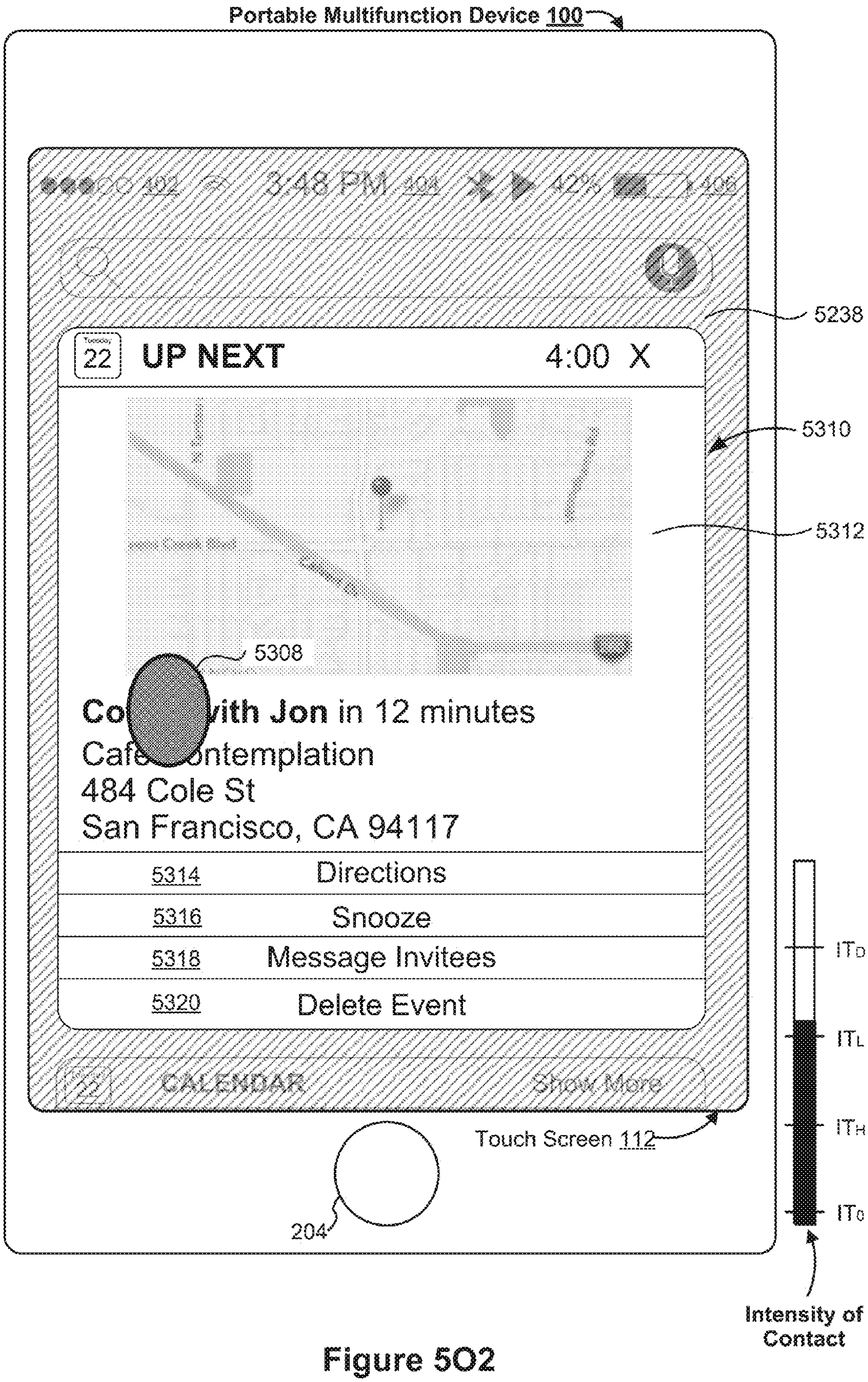
Figure 5O2

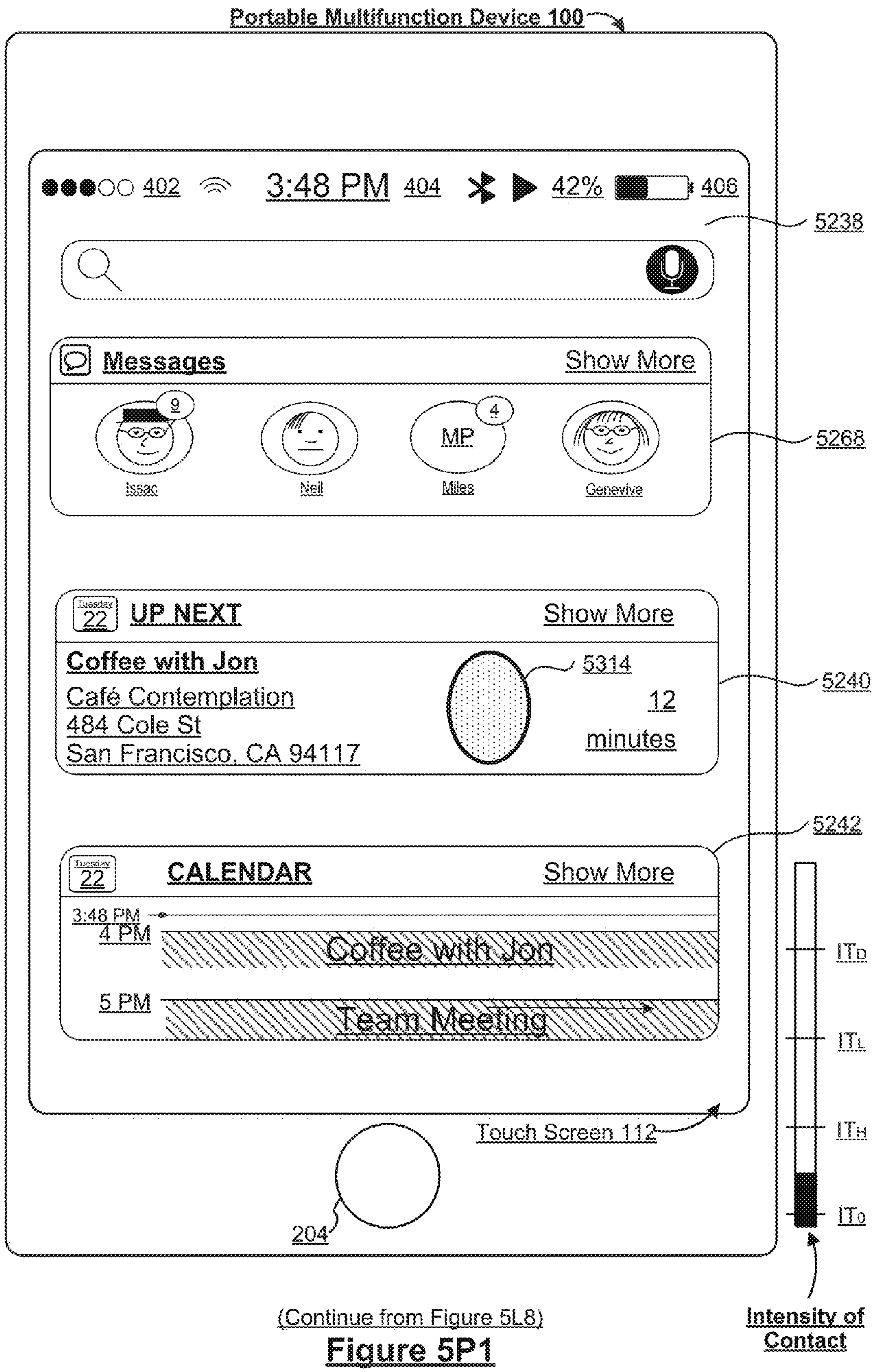
(Continue from Figure 5L8)
Figure 5P1

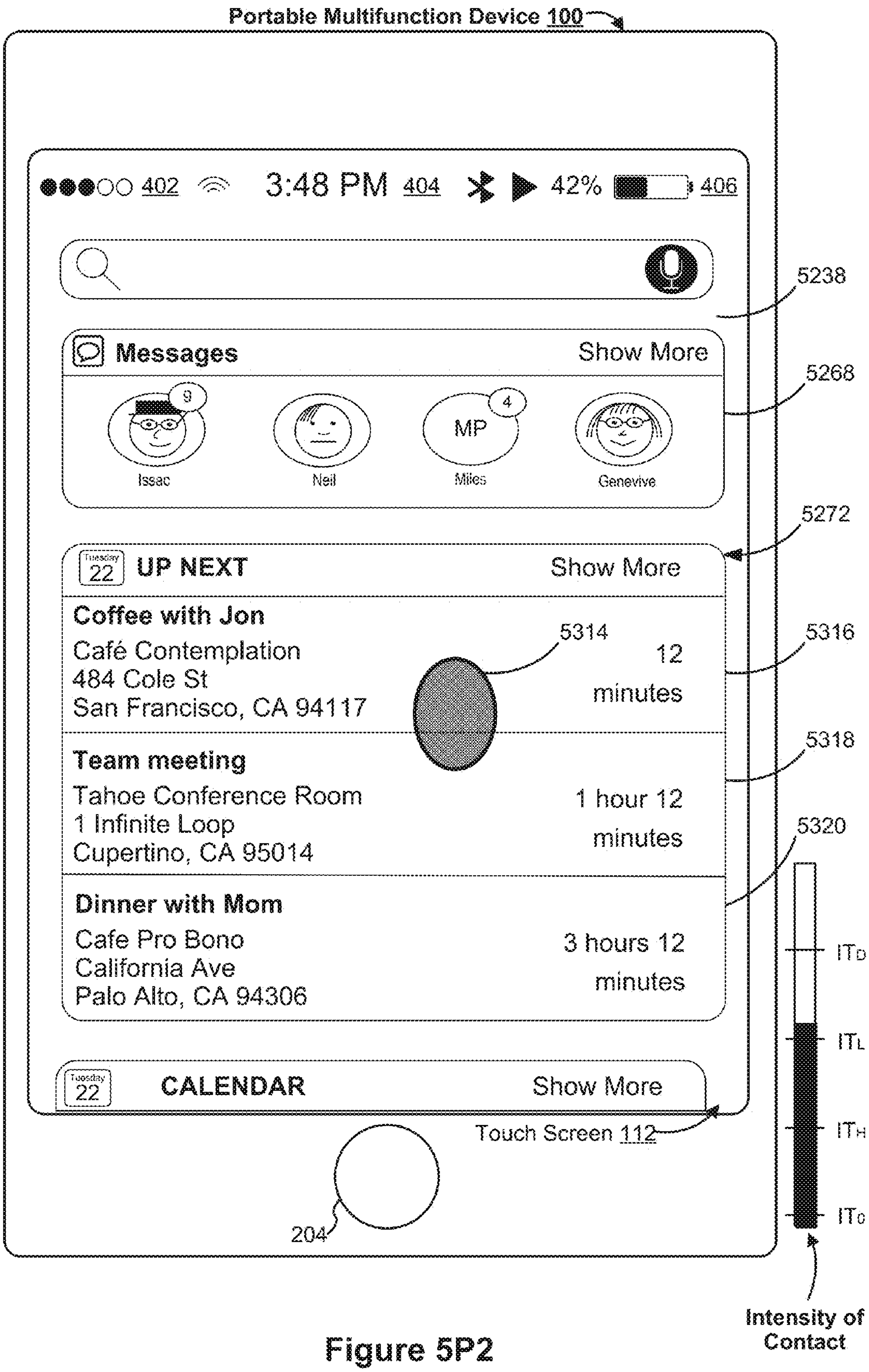
Figure 5P2

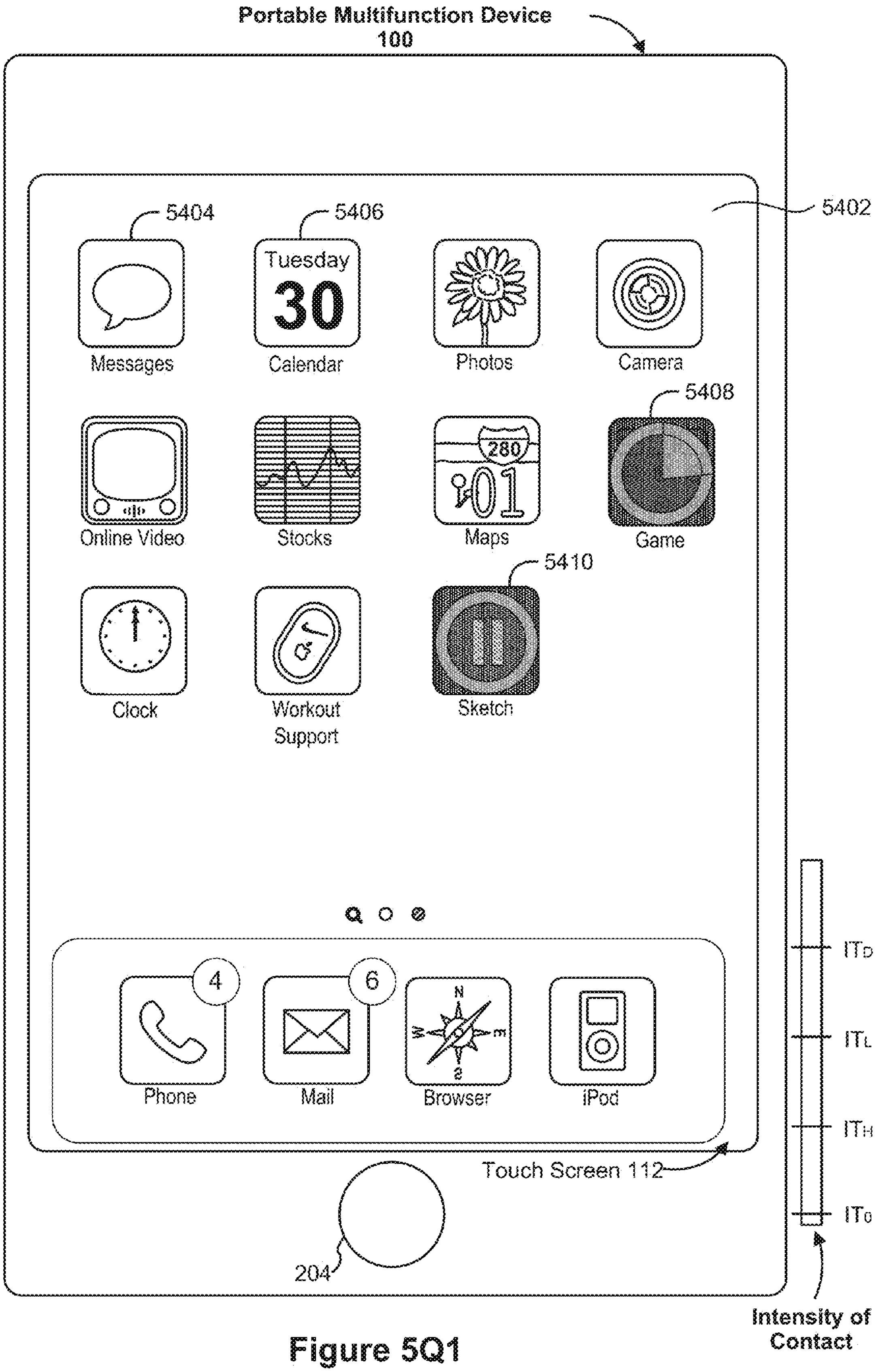
Figure 5Q1

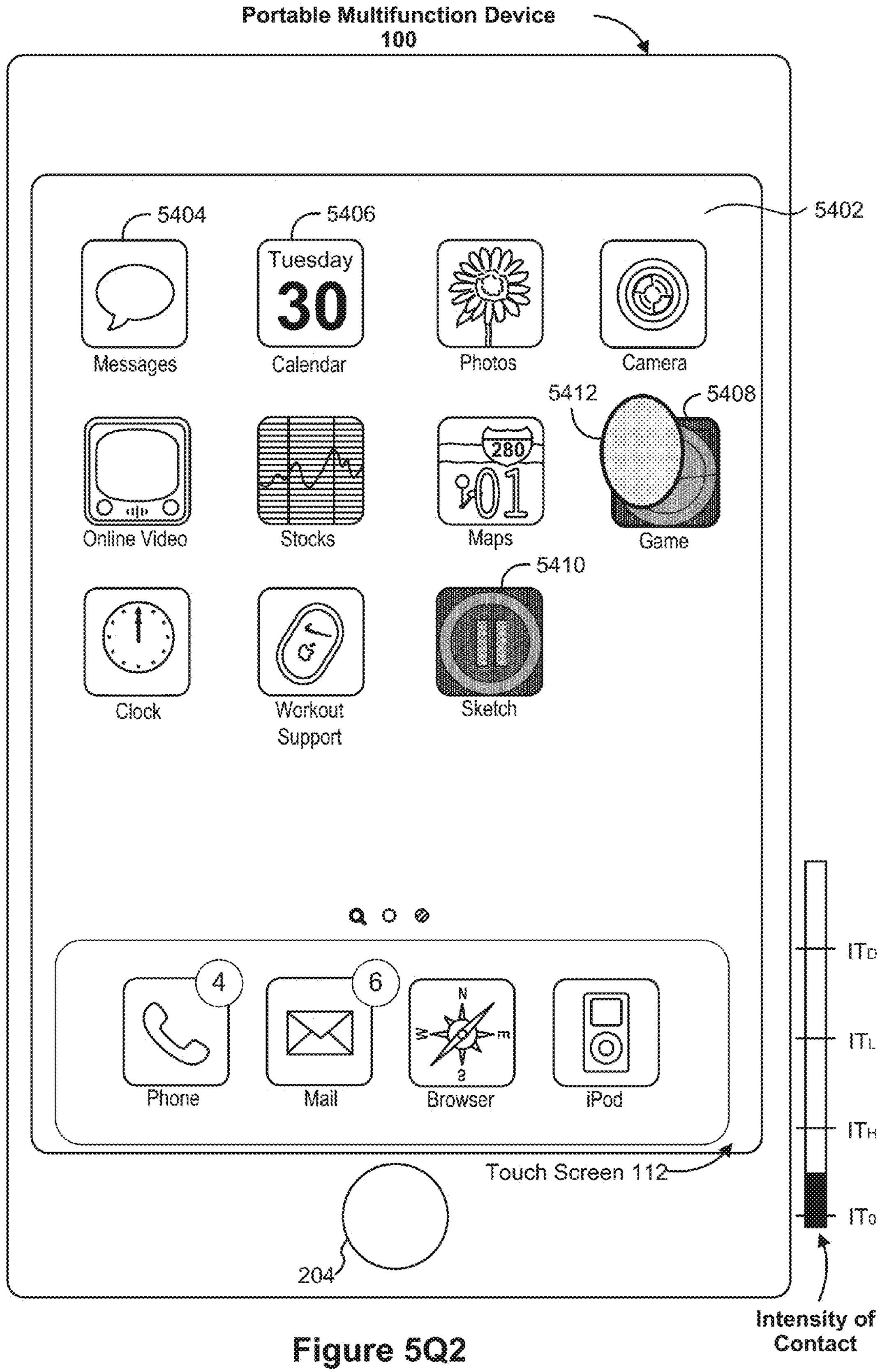
Figure 5Q2

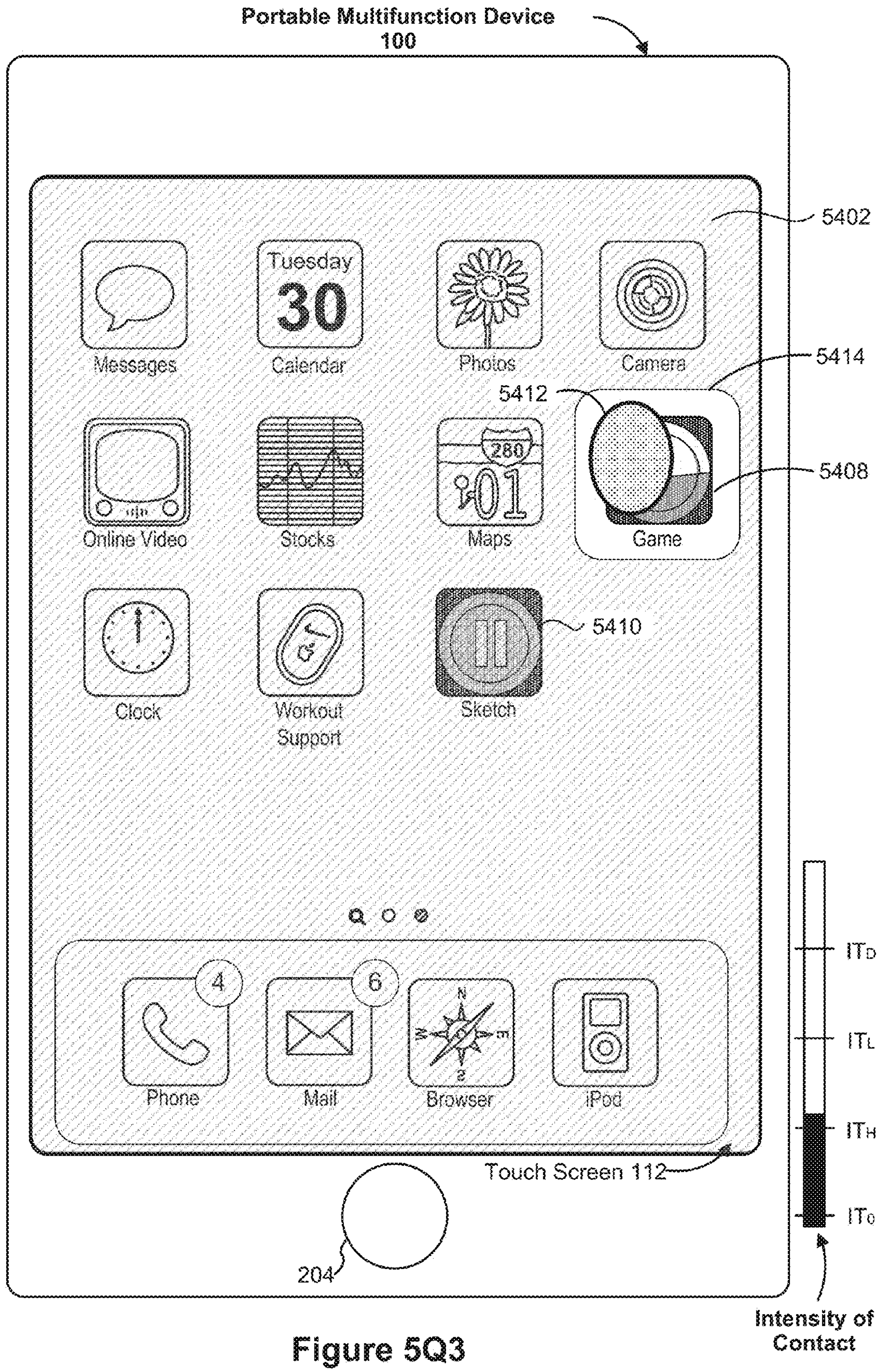
Figure 5Q3

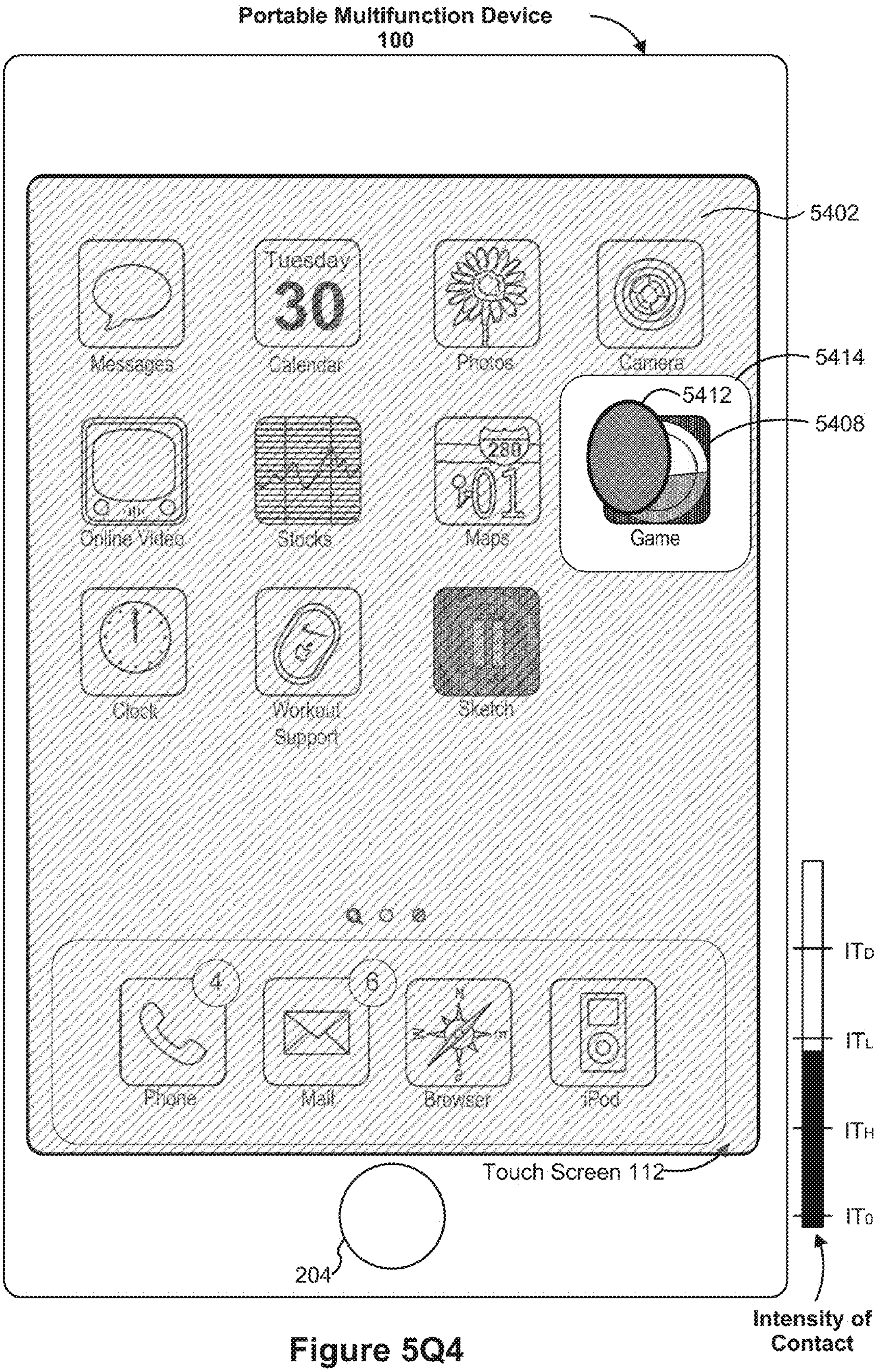
Figure 5Q4

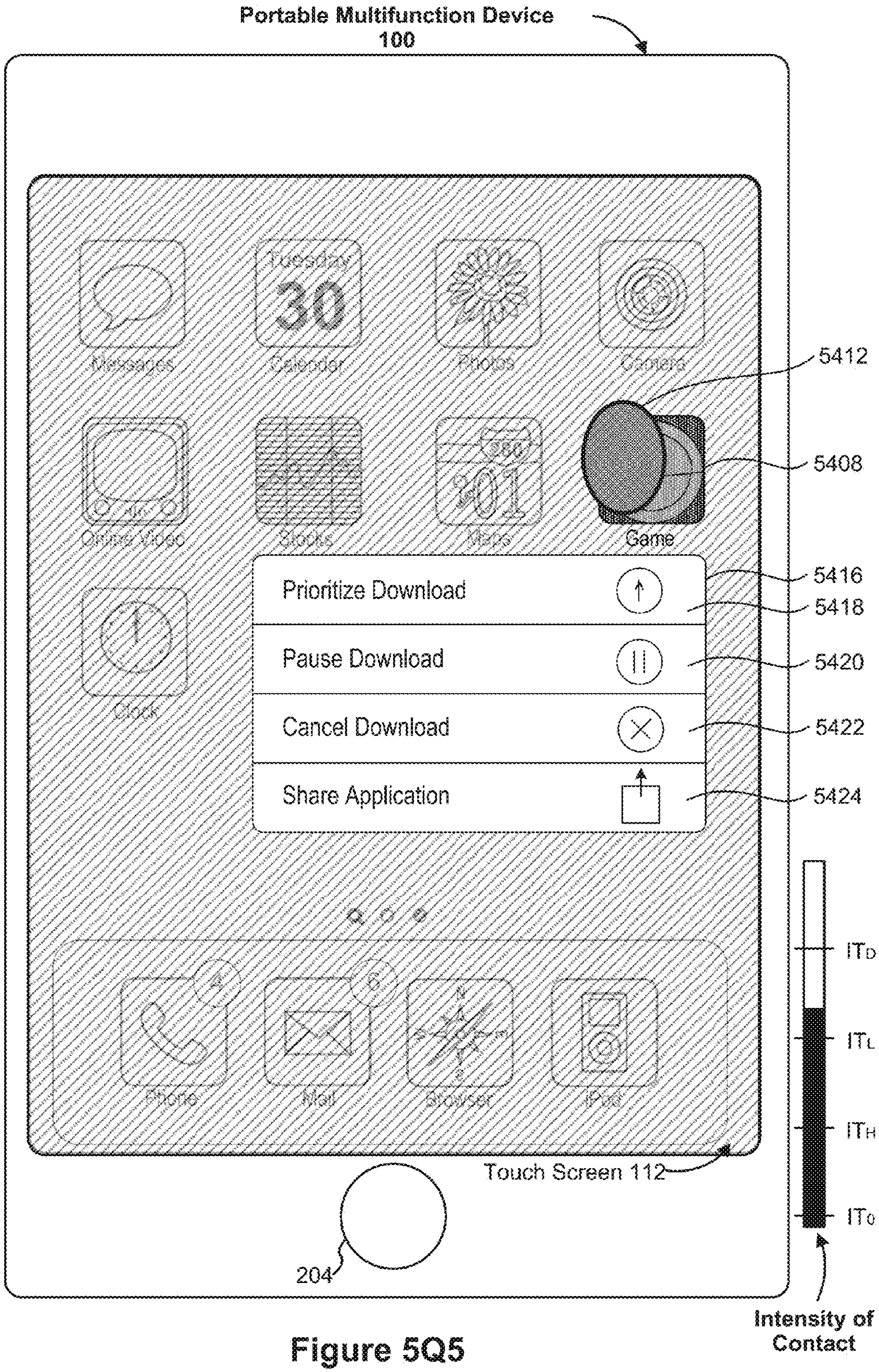
Figure 5Q5

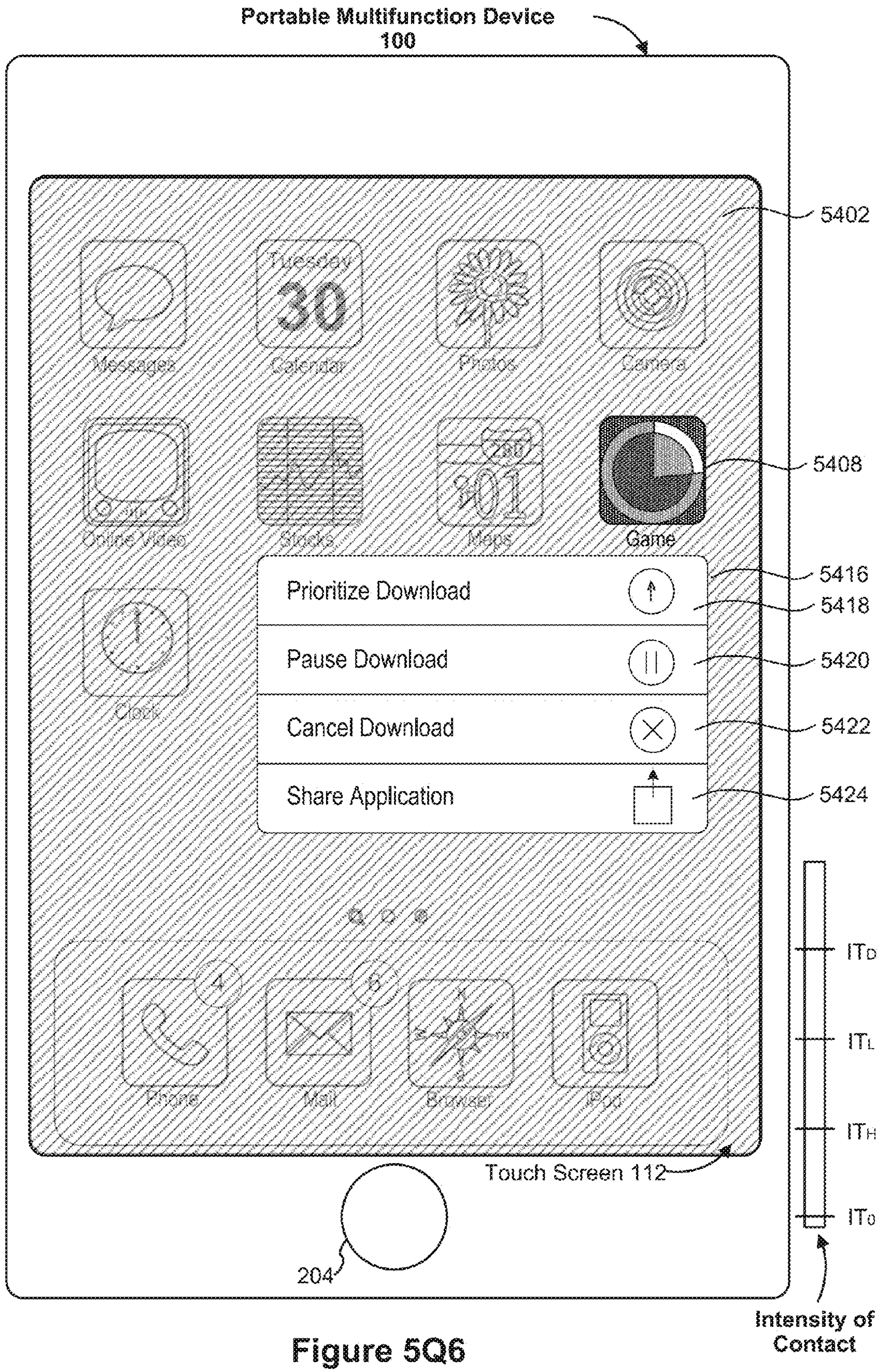
Figure 5Q6

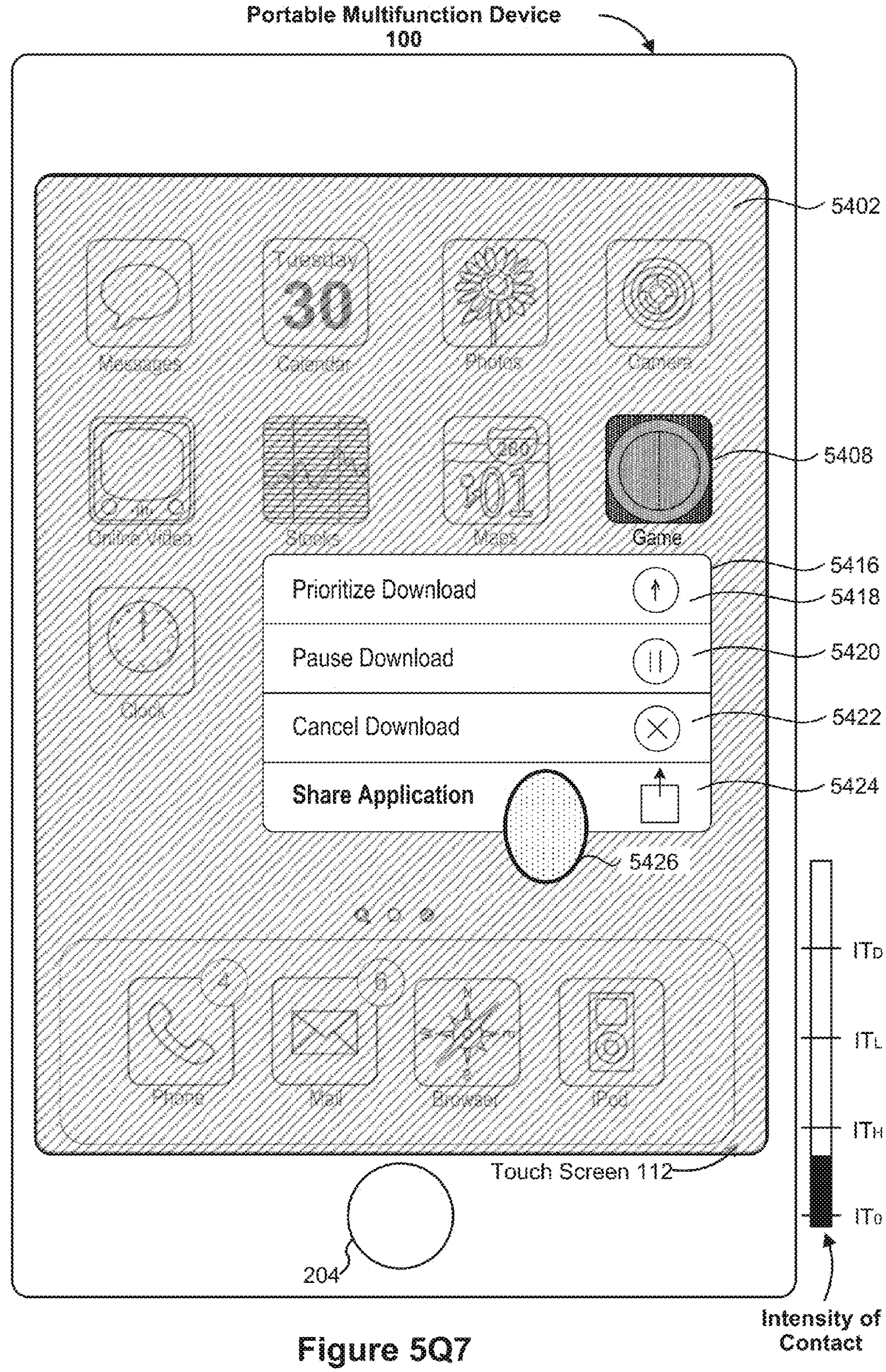
Figure 5Q7

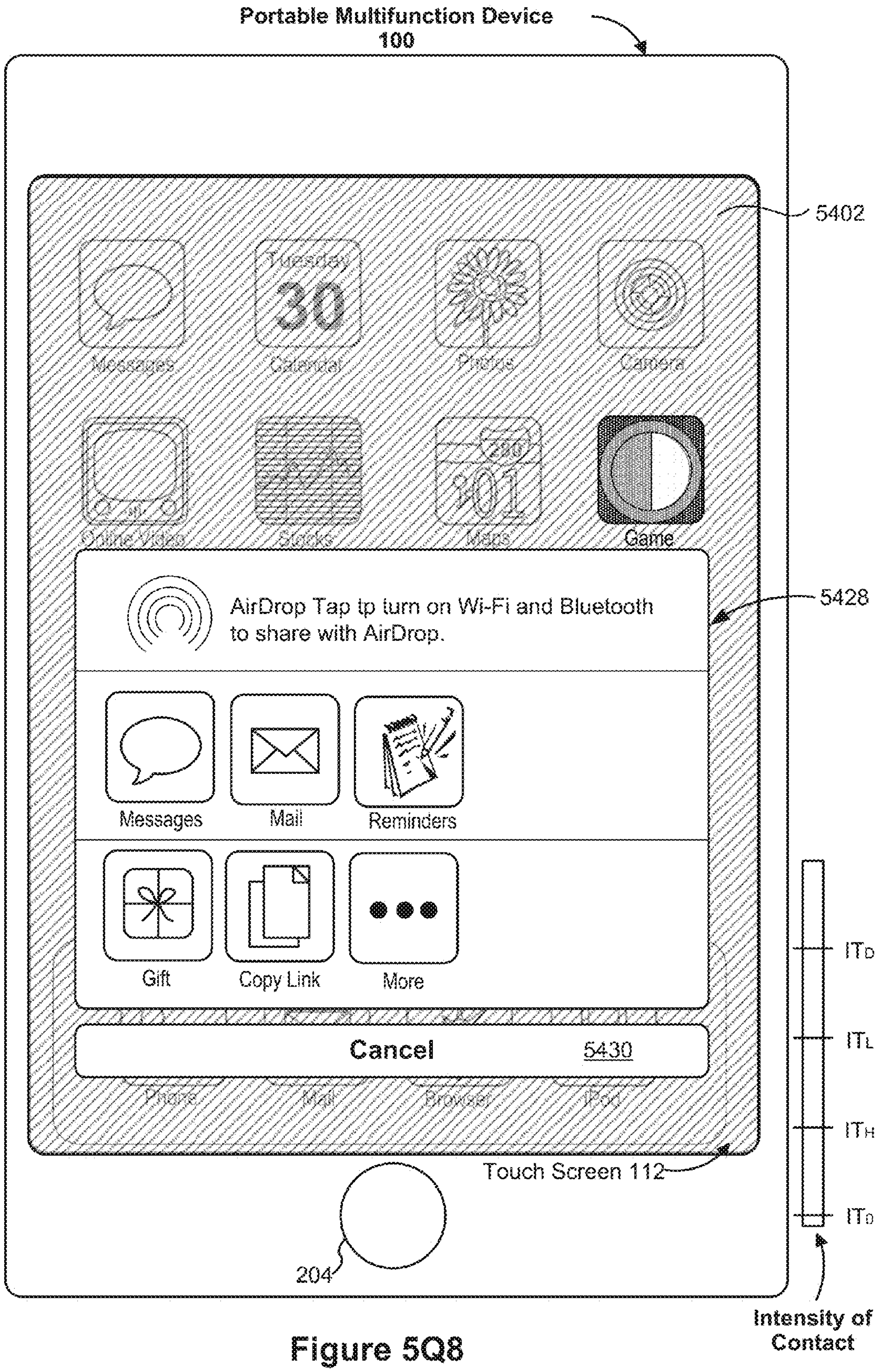
Figure 5Q8

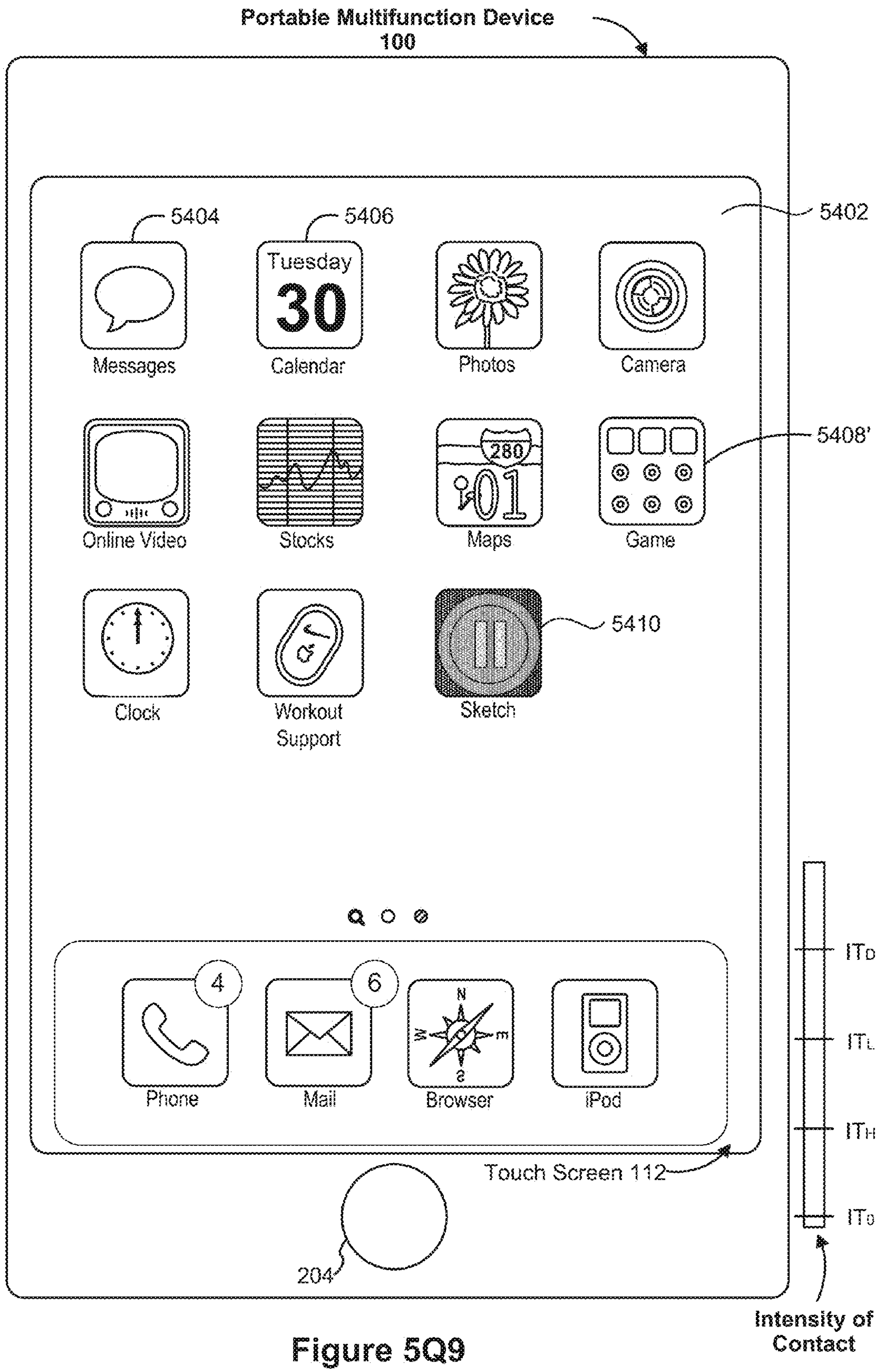
Figure 5Q9

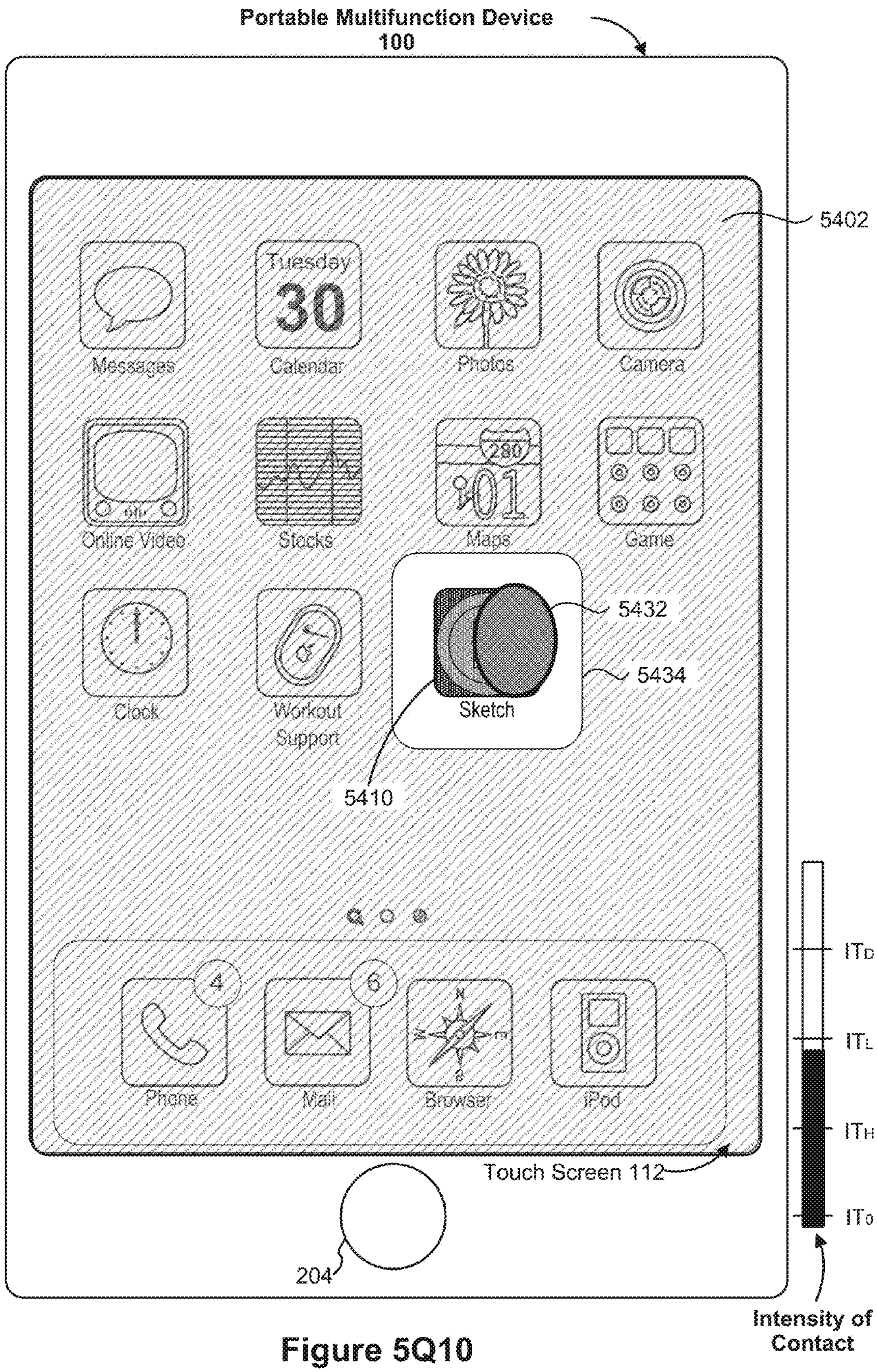
Figure 5Q10

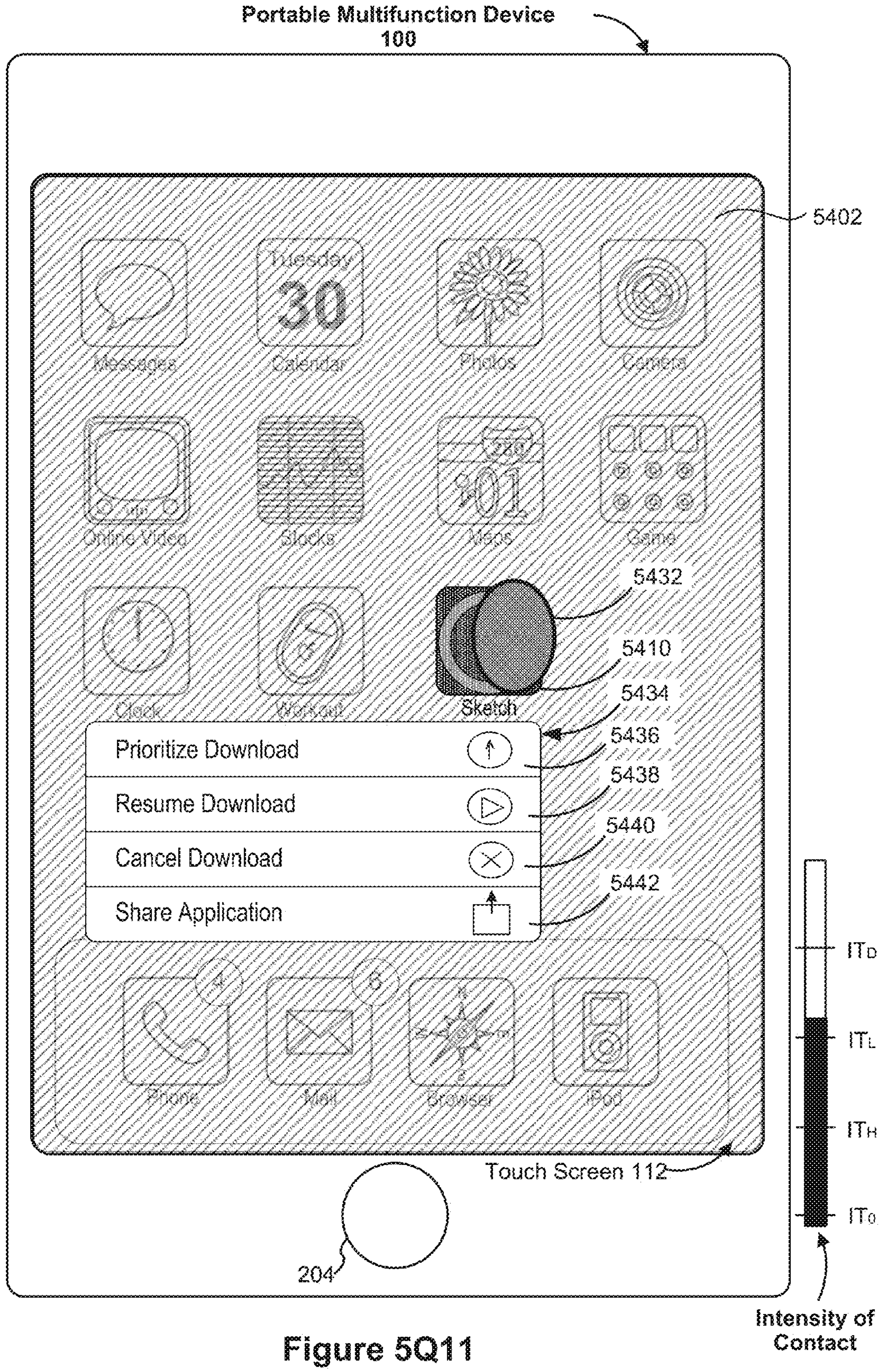
Figure 5Q11

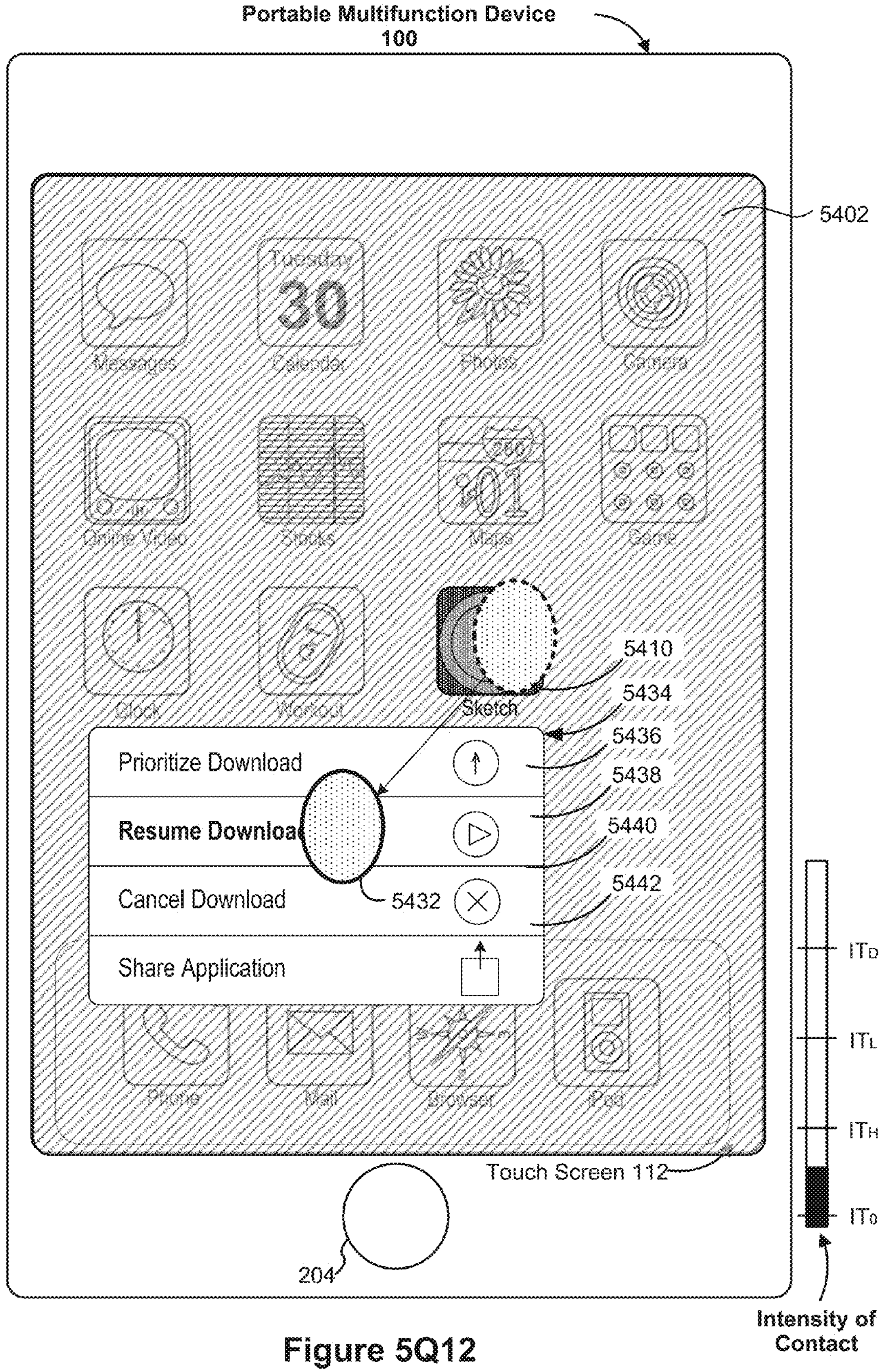
Figure 5Q12

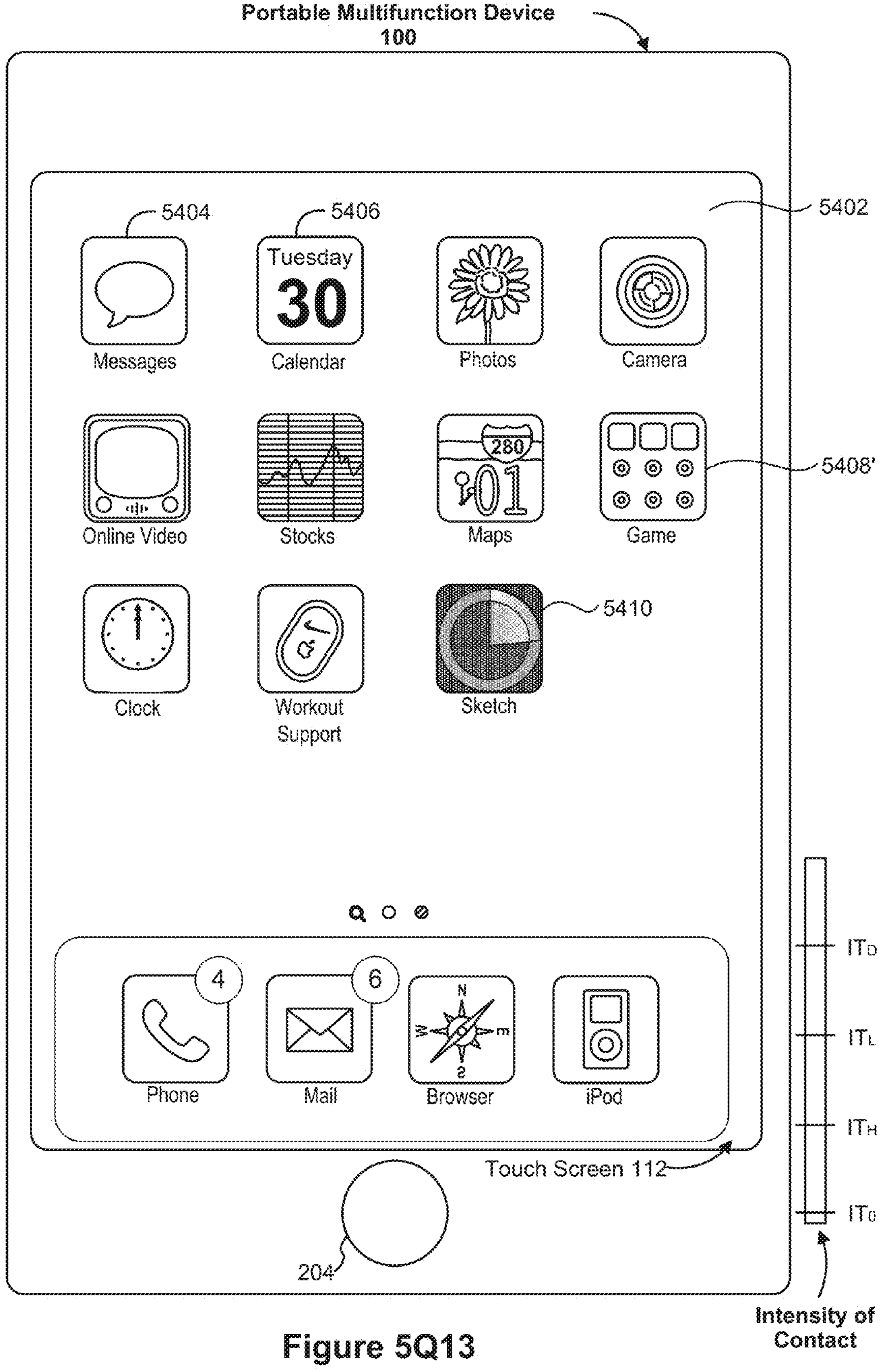
Figure 5Q13

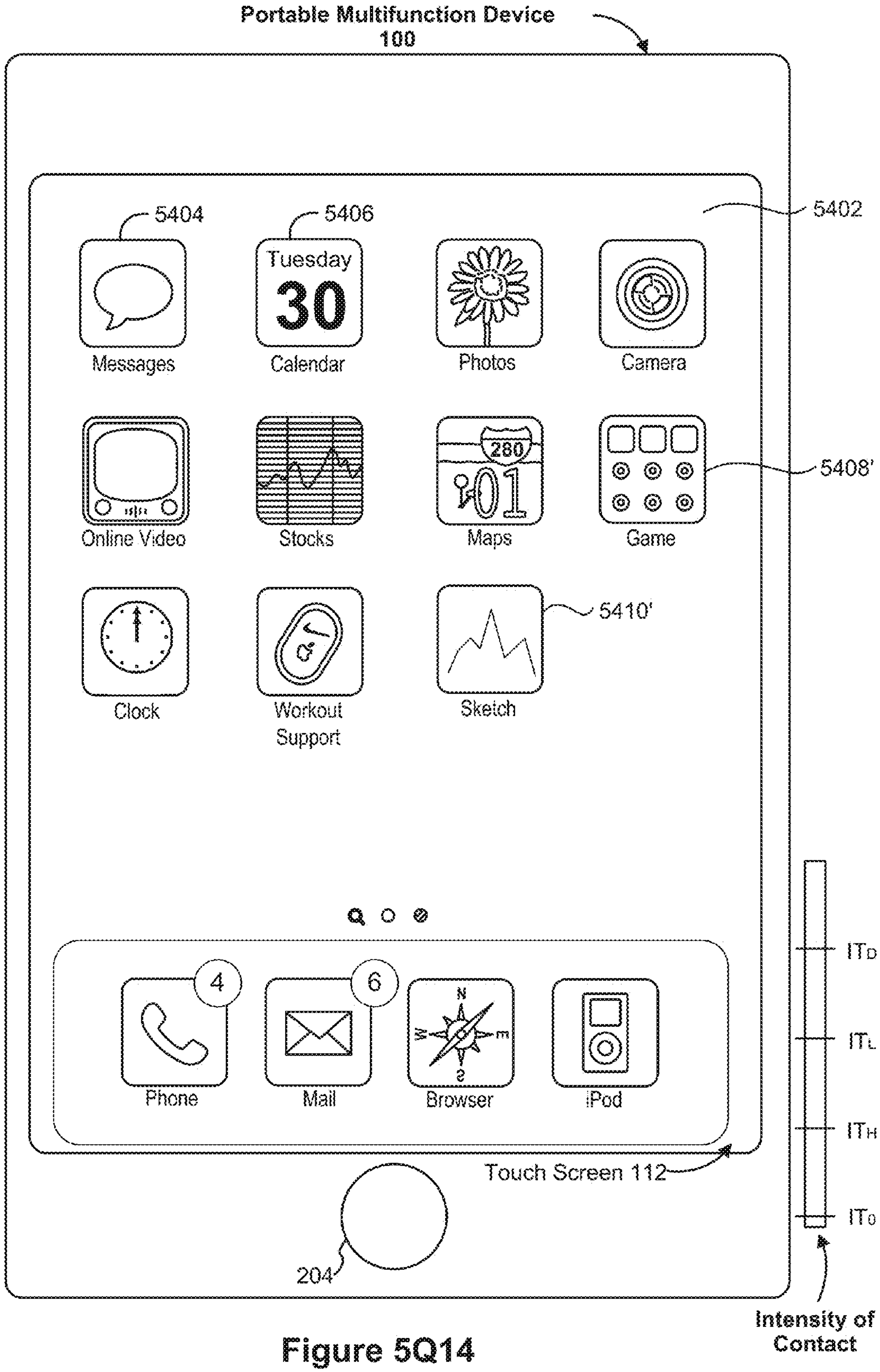
Figure 5Q14

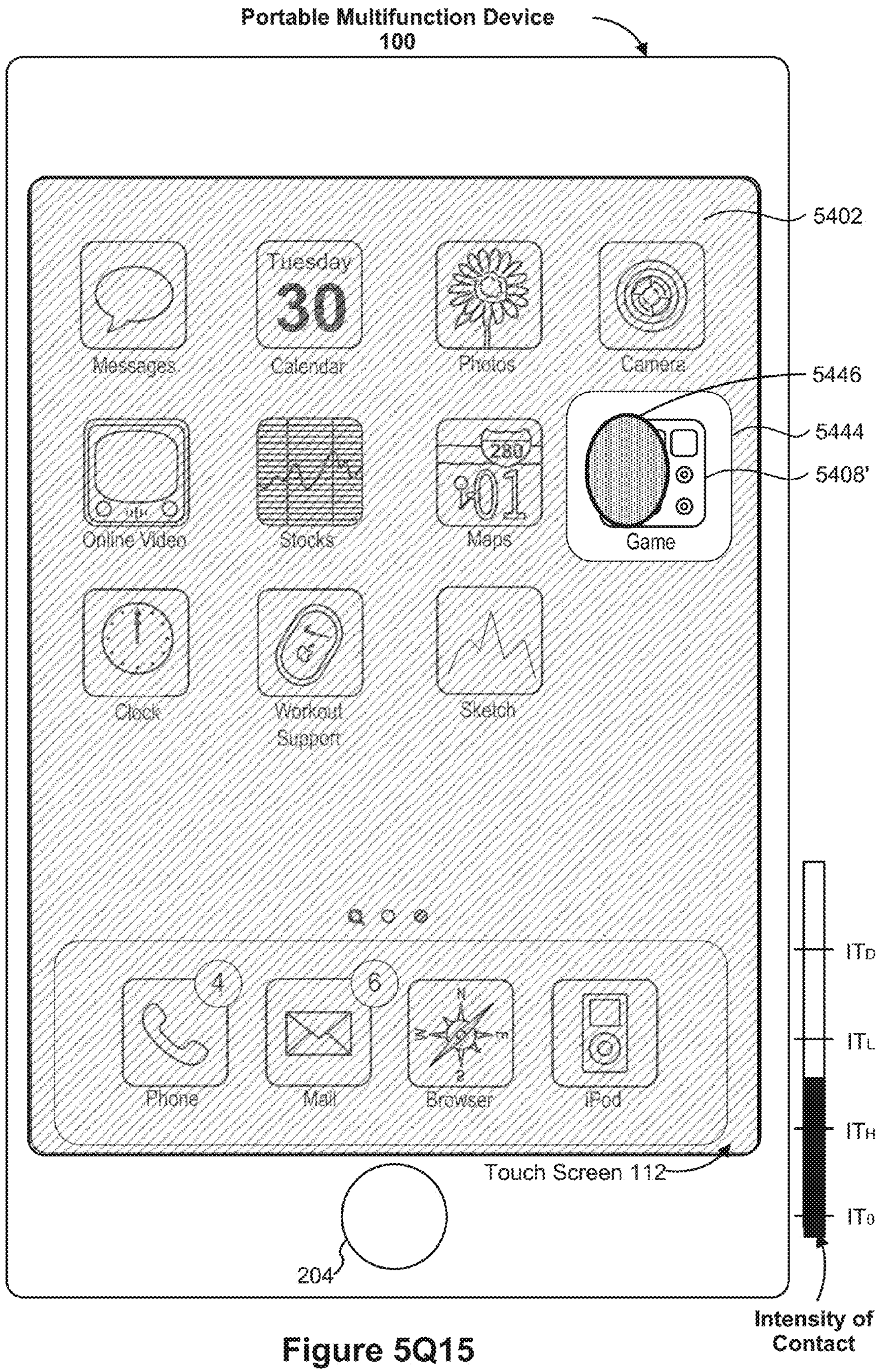
Figure 5Q15

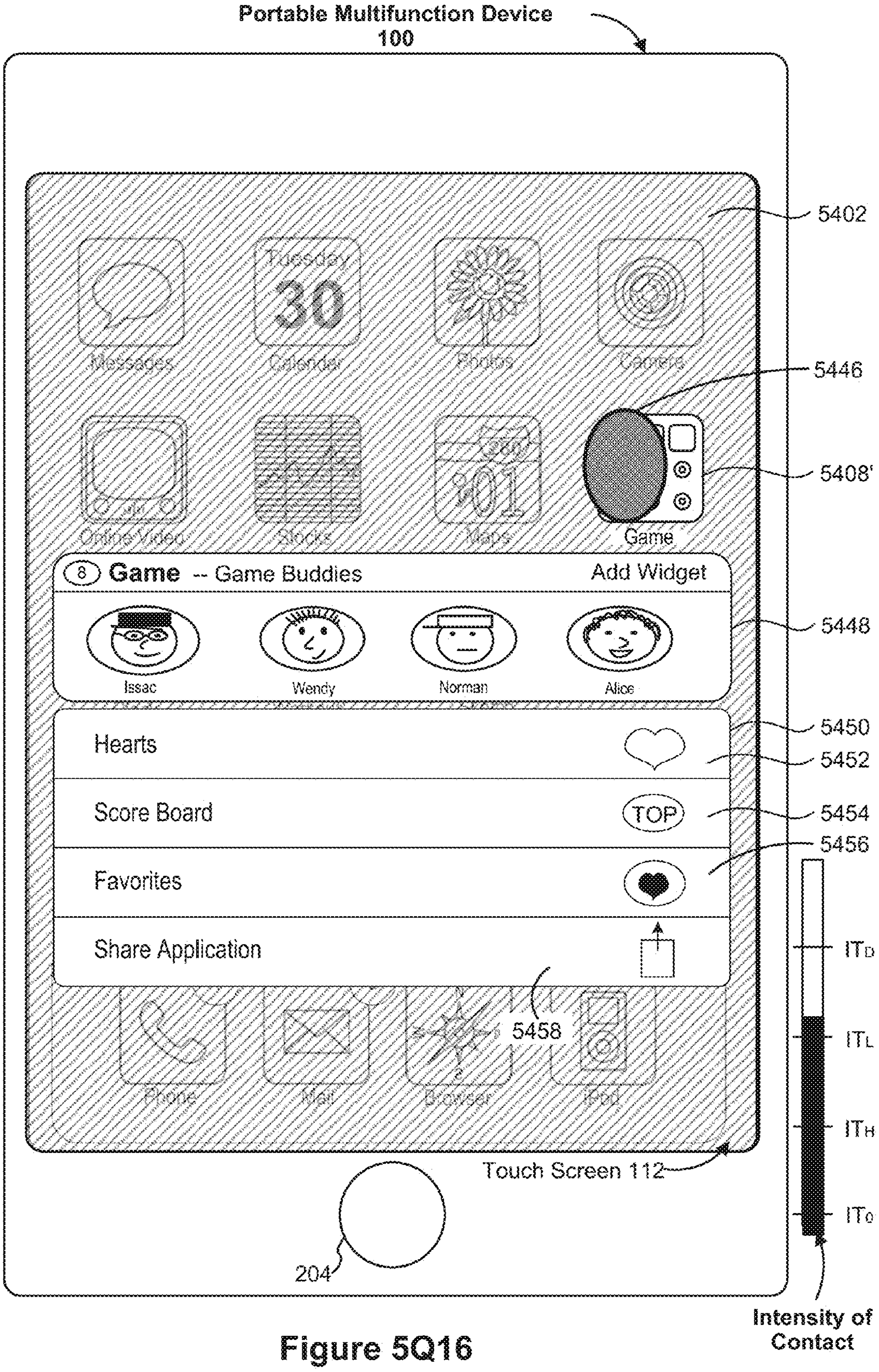
Figure 5Q16

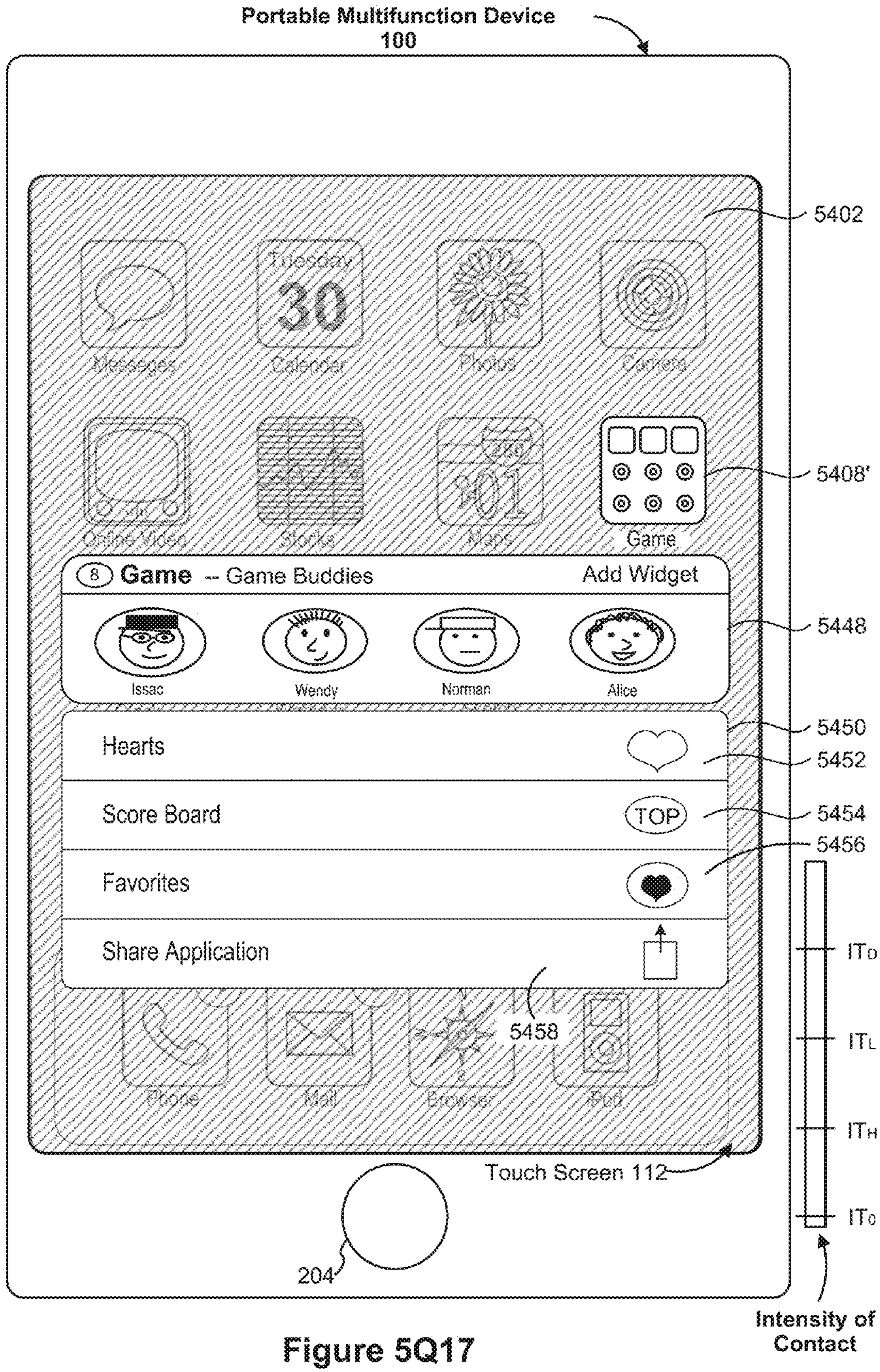
Figure 5Q17

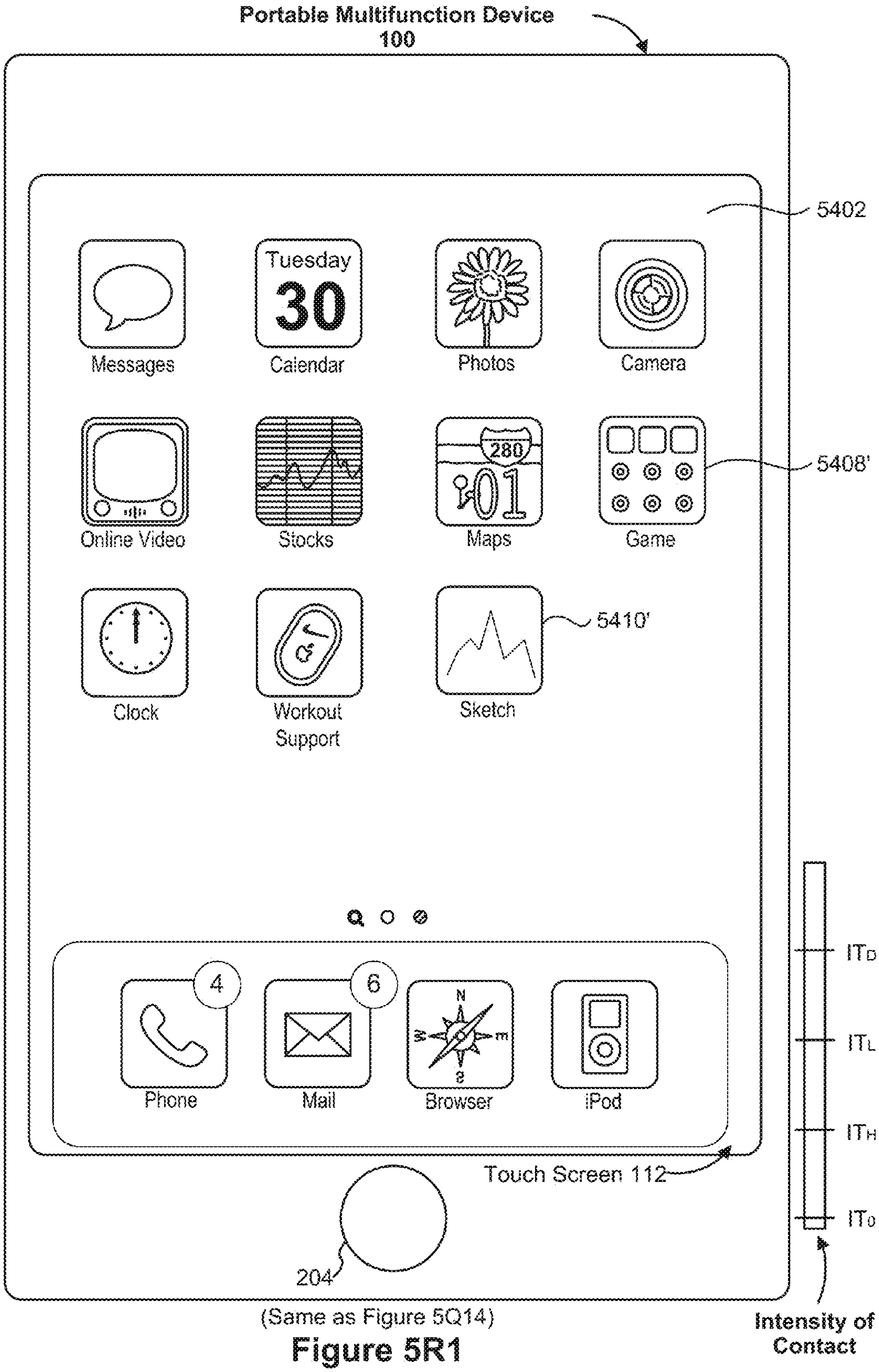
(Same as Figure 5Q14)
Figure 5R1

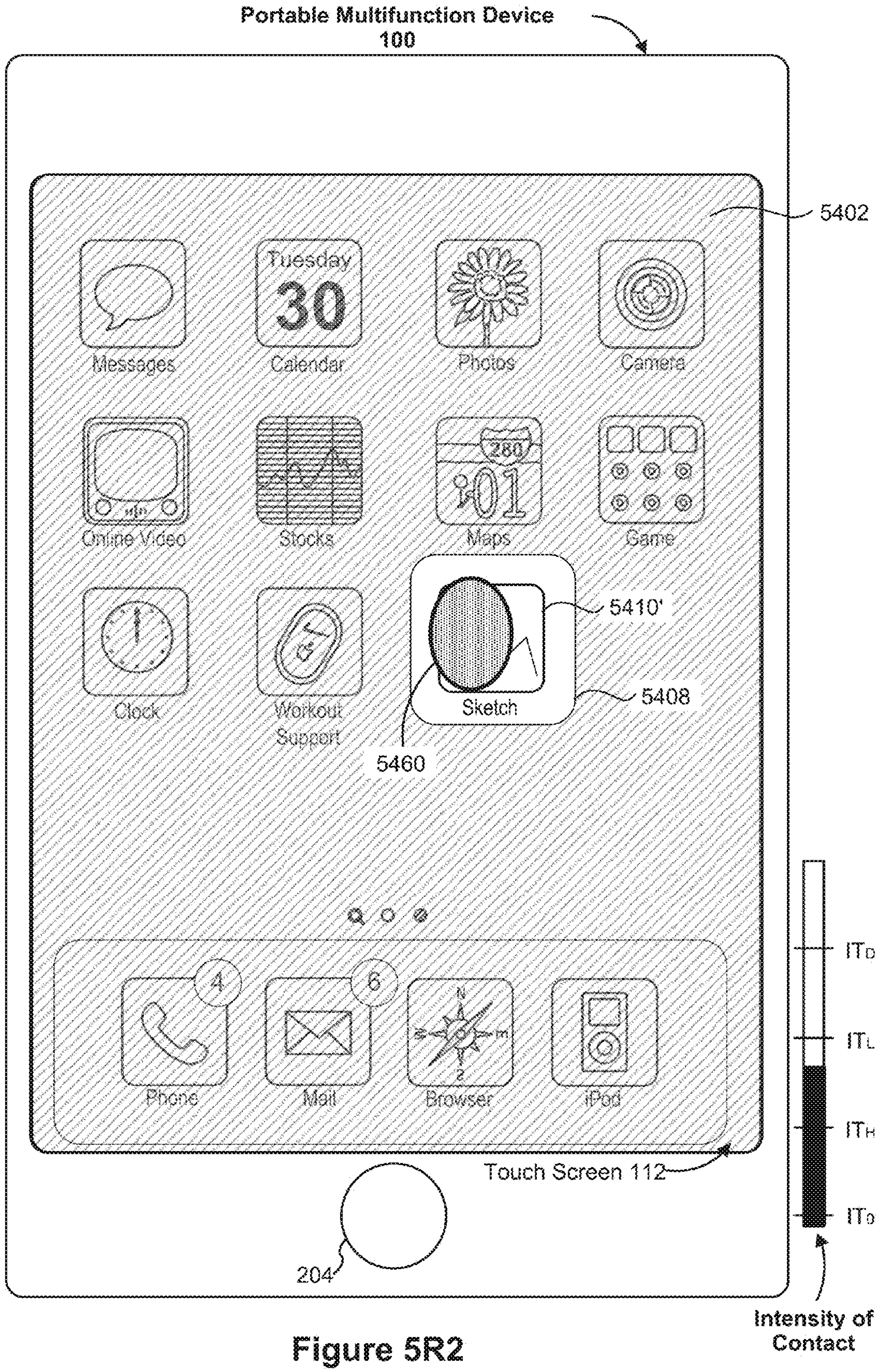
Figure 5R2

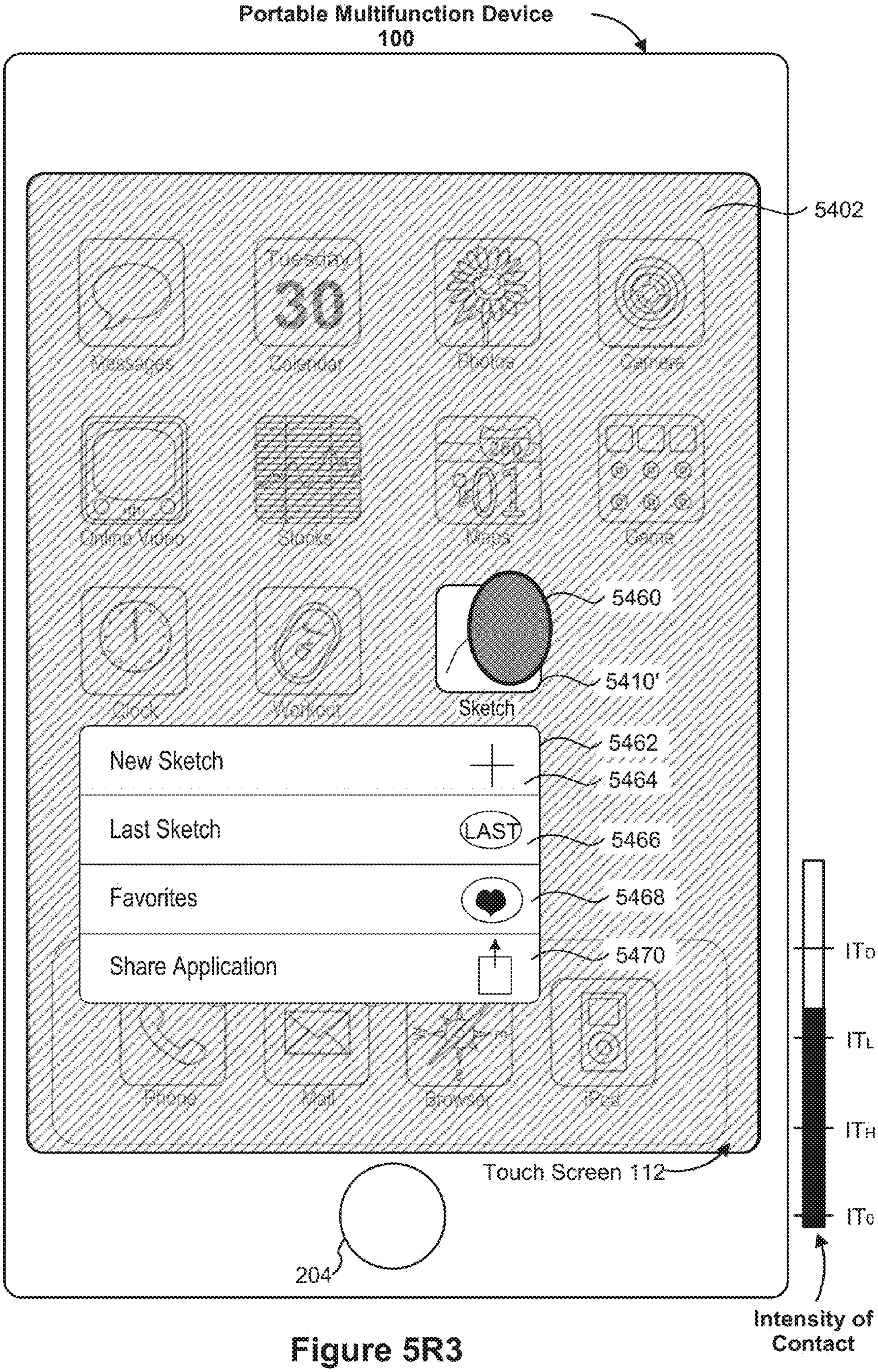
Figure 5R3

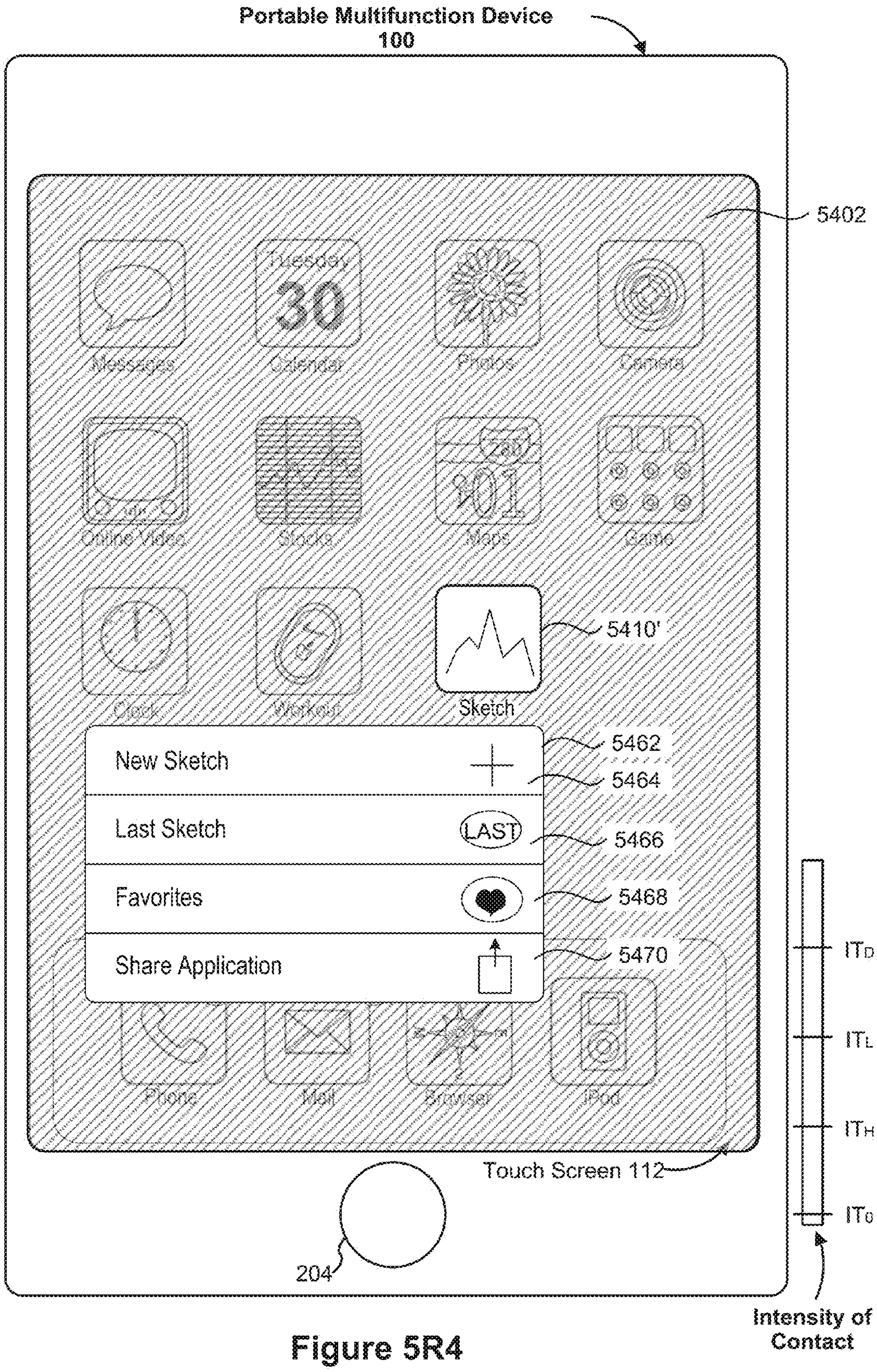
Figure 5R4

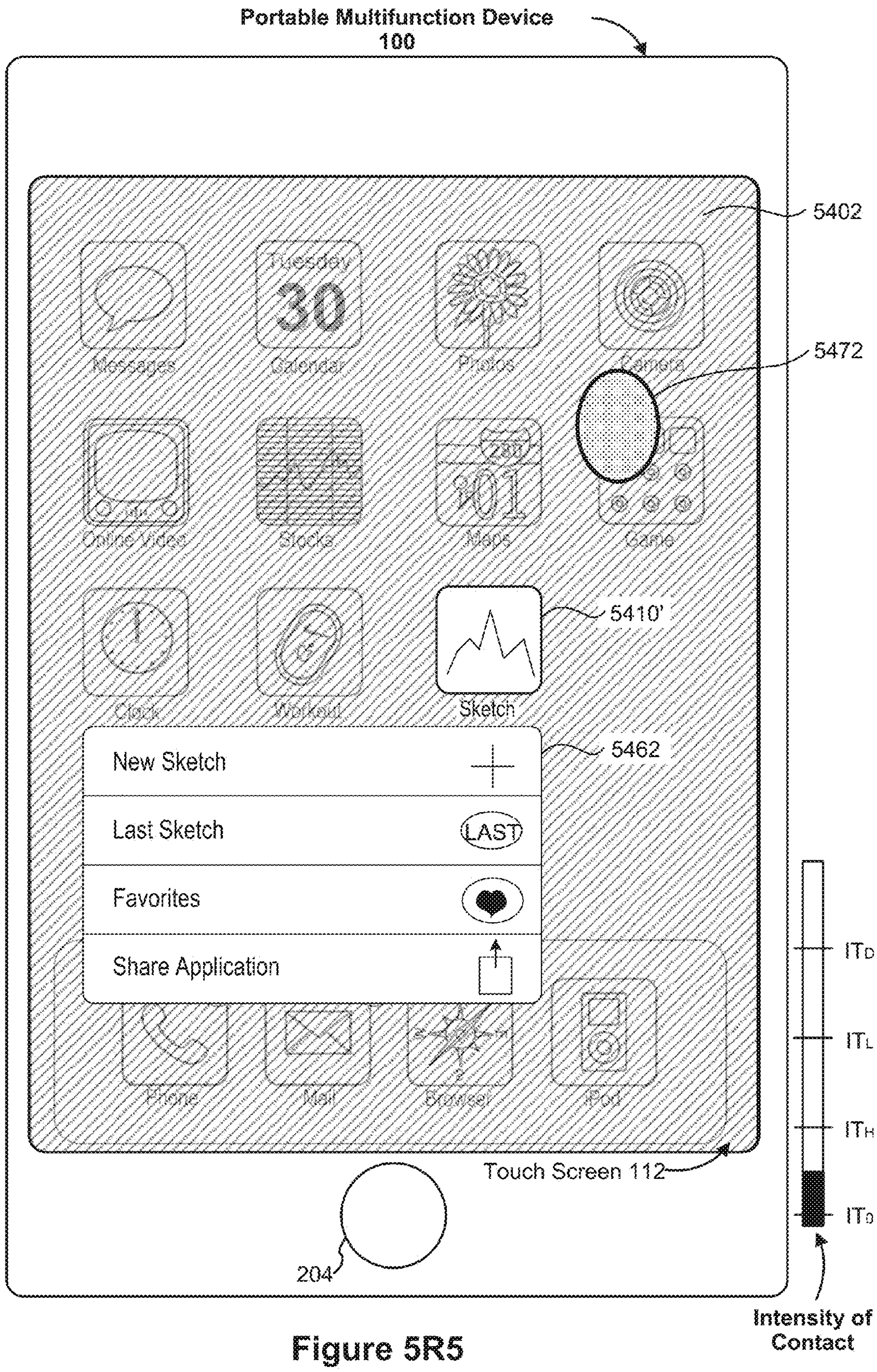
Figure 5R5

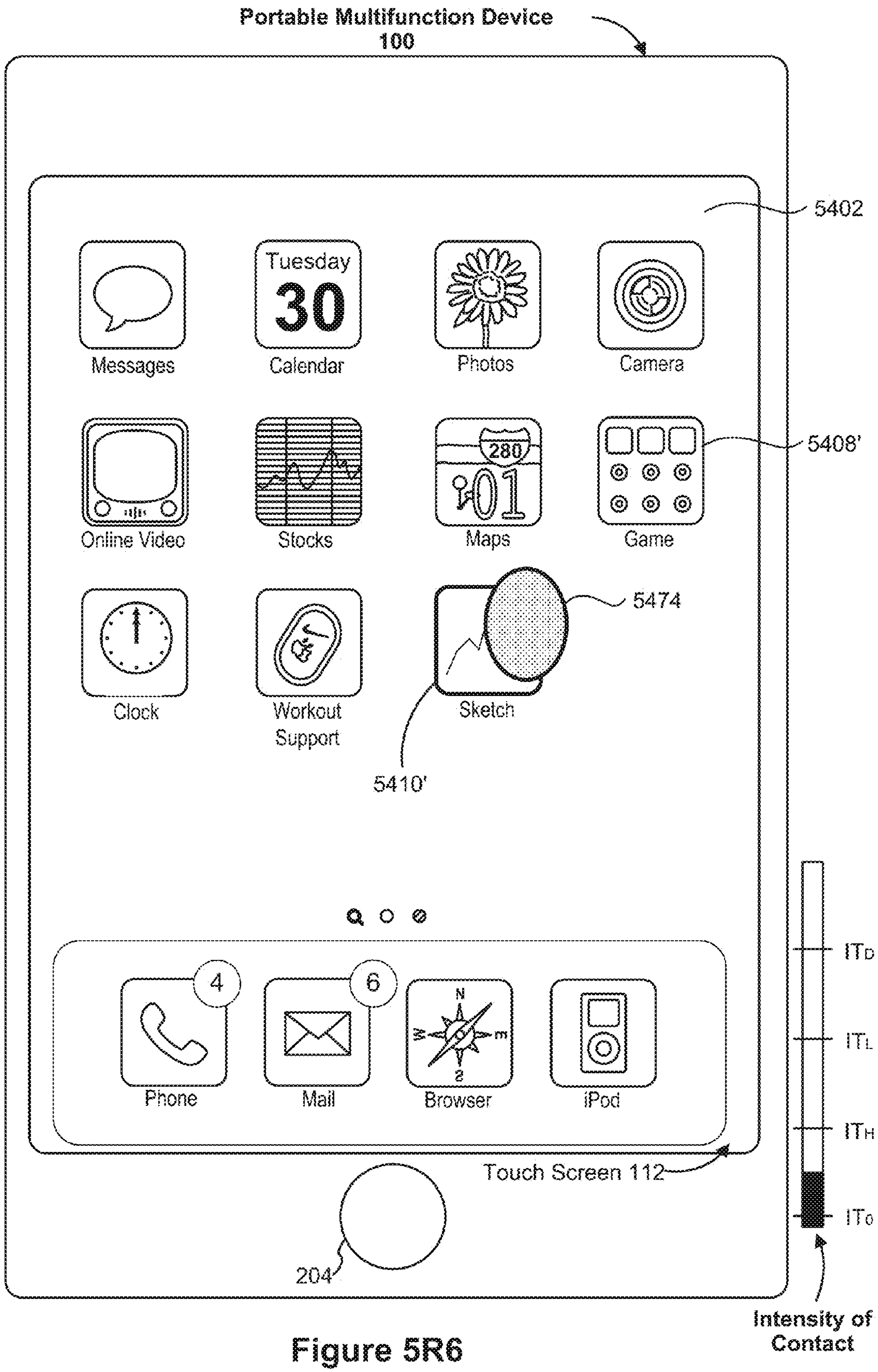
Figure 5R6

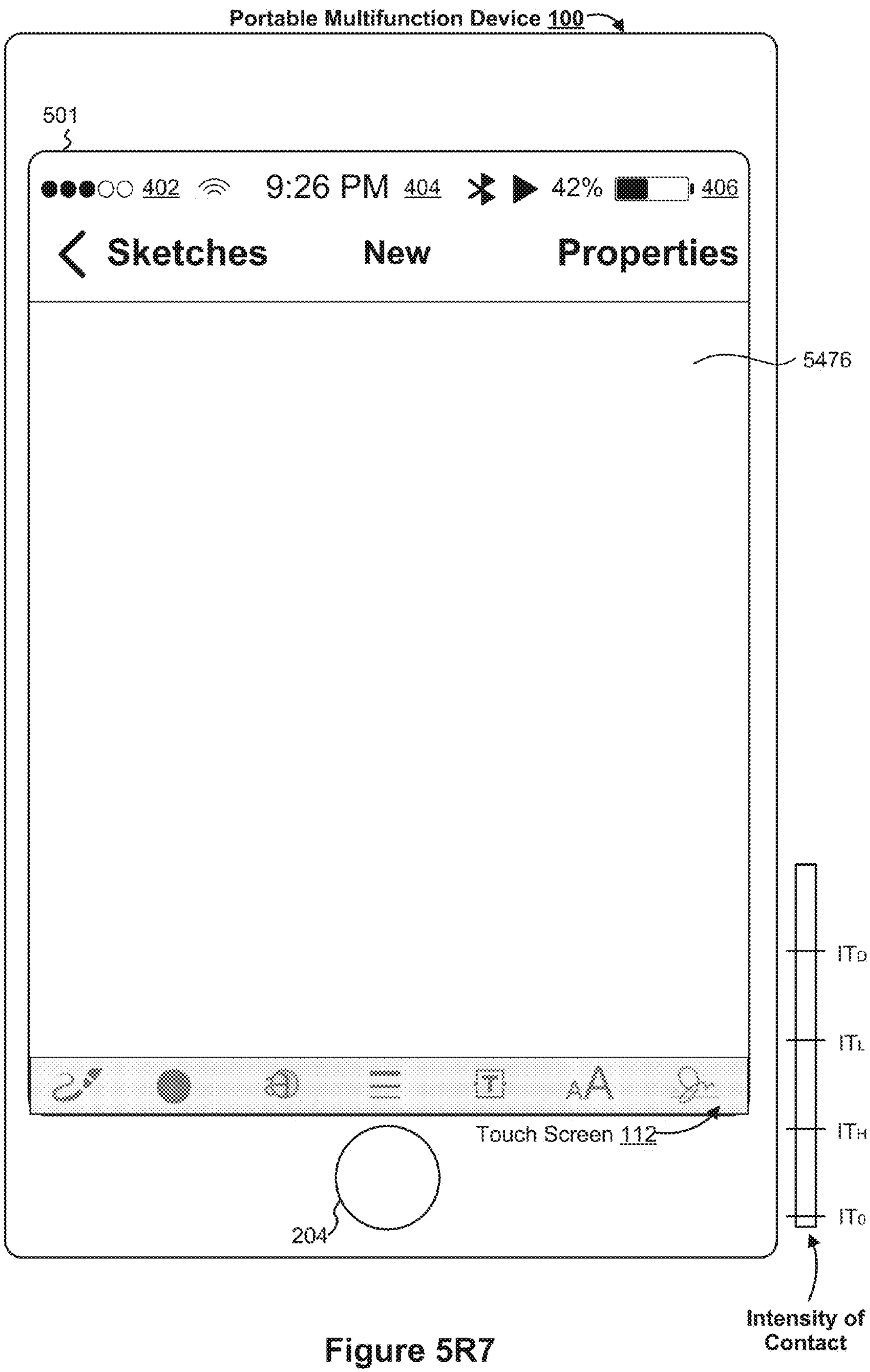
Figure 5R7

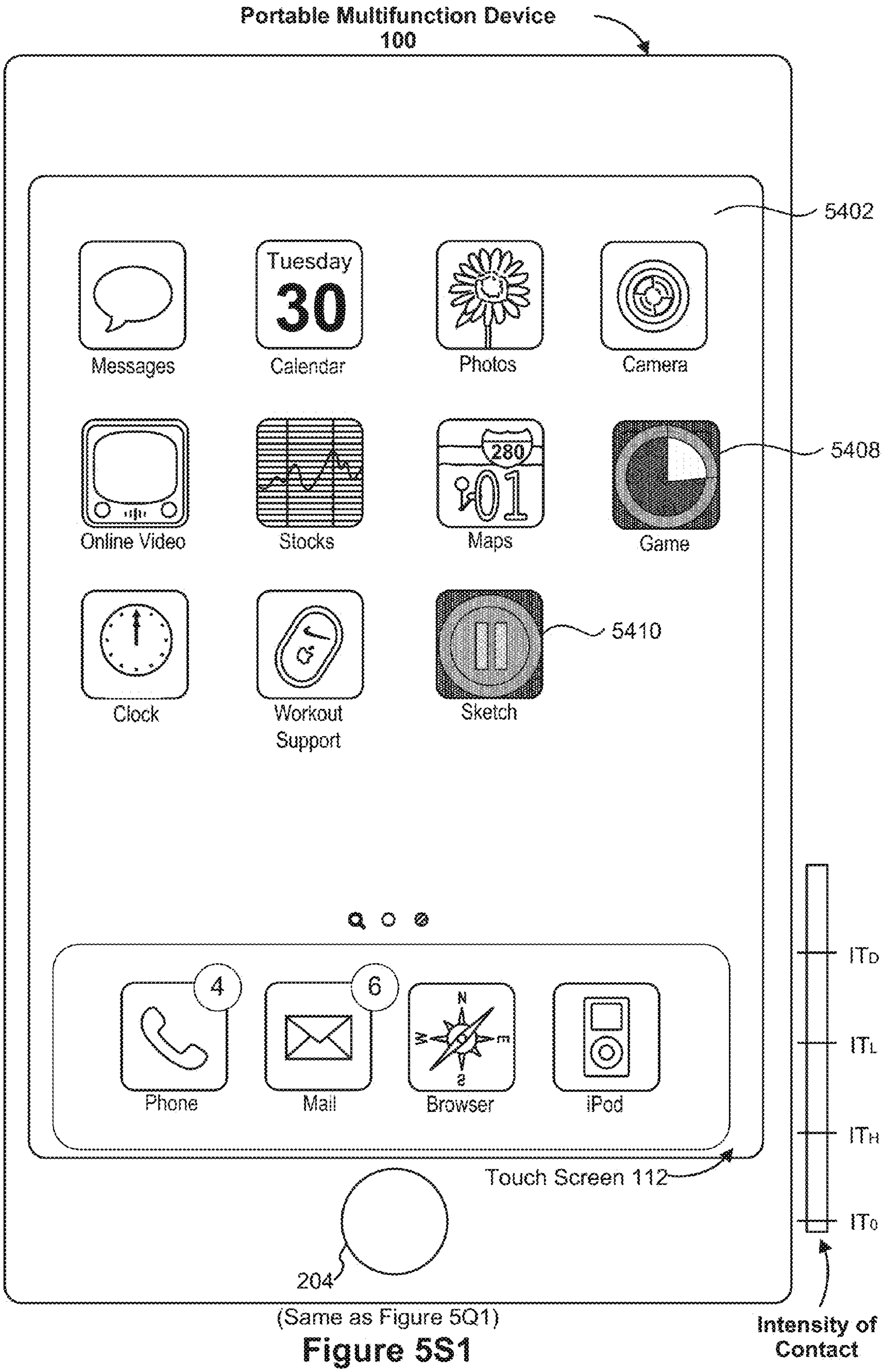
(Same as Figure 5Q1)
Figure 5S1

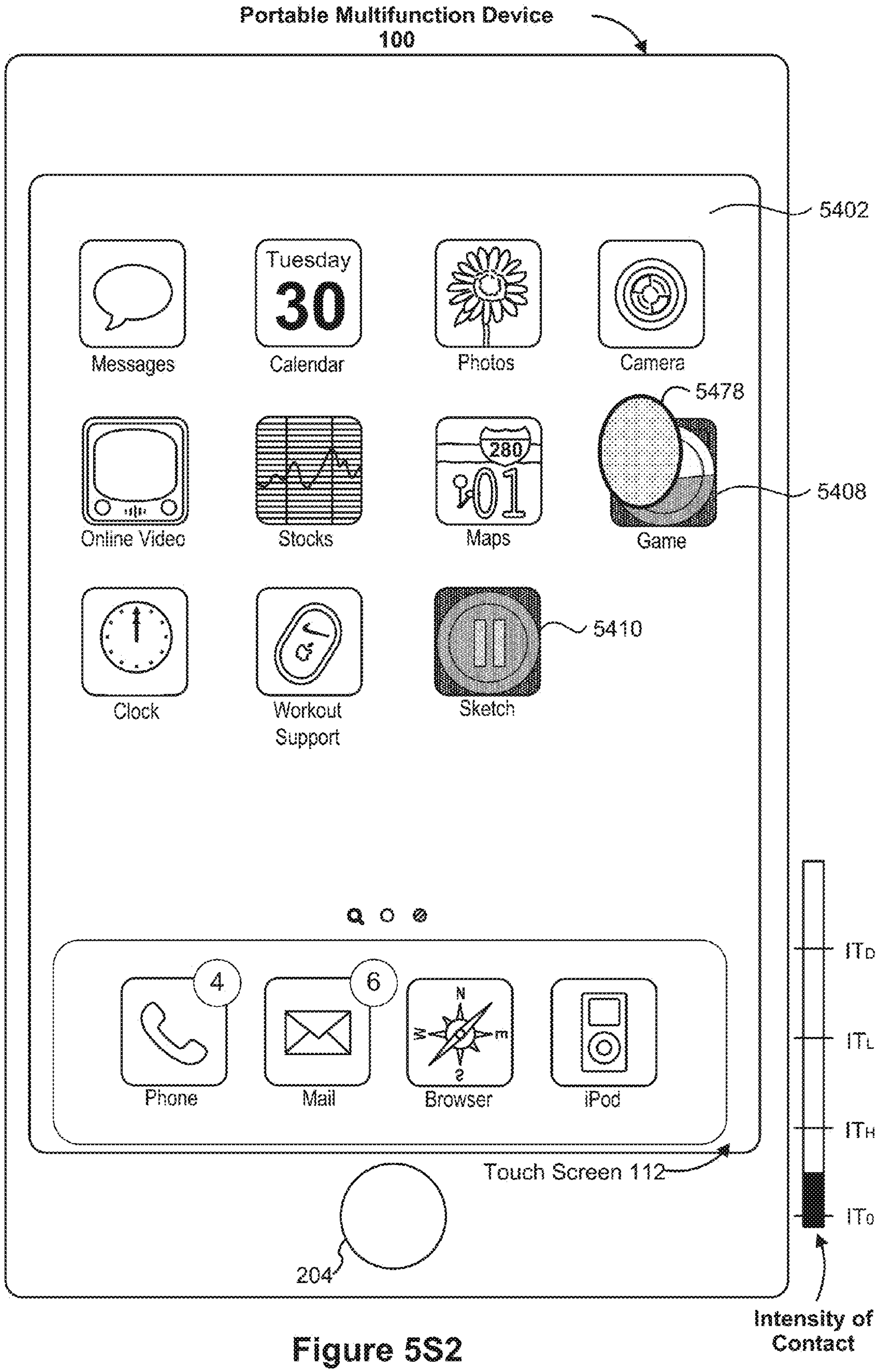
Figure 5S2

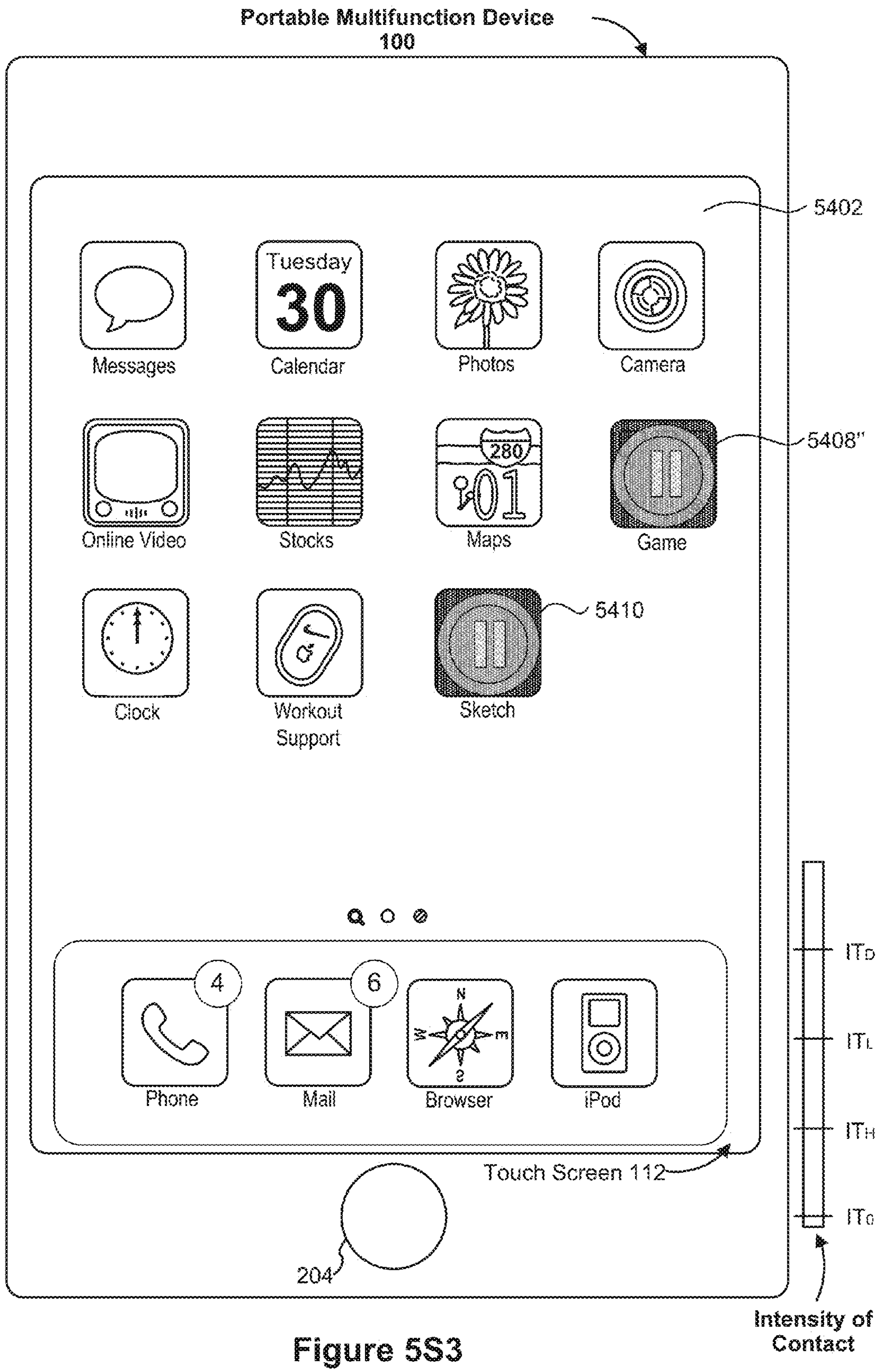
Figure 5S3

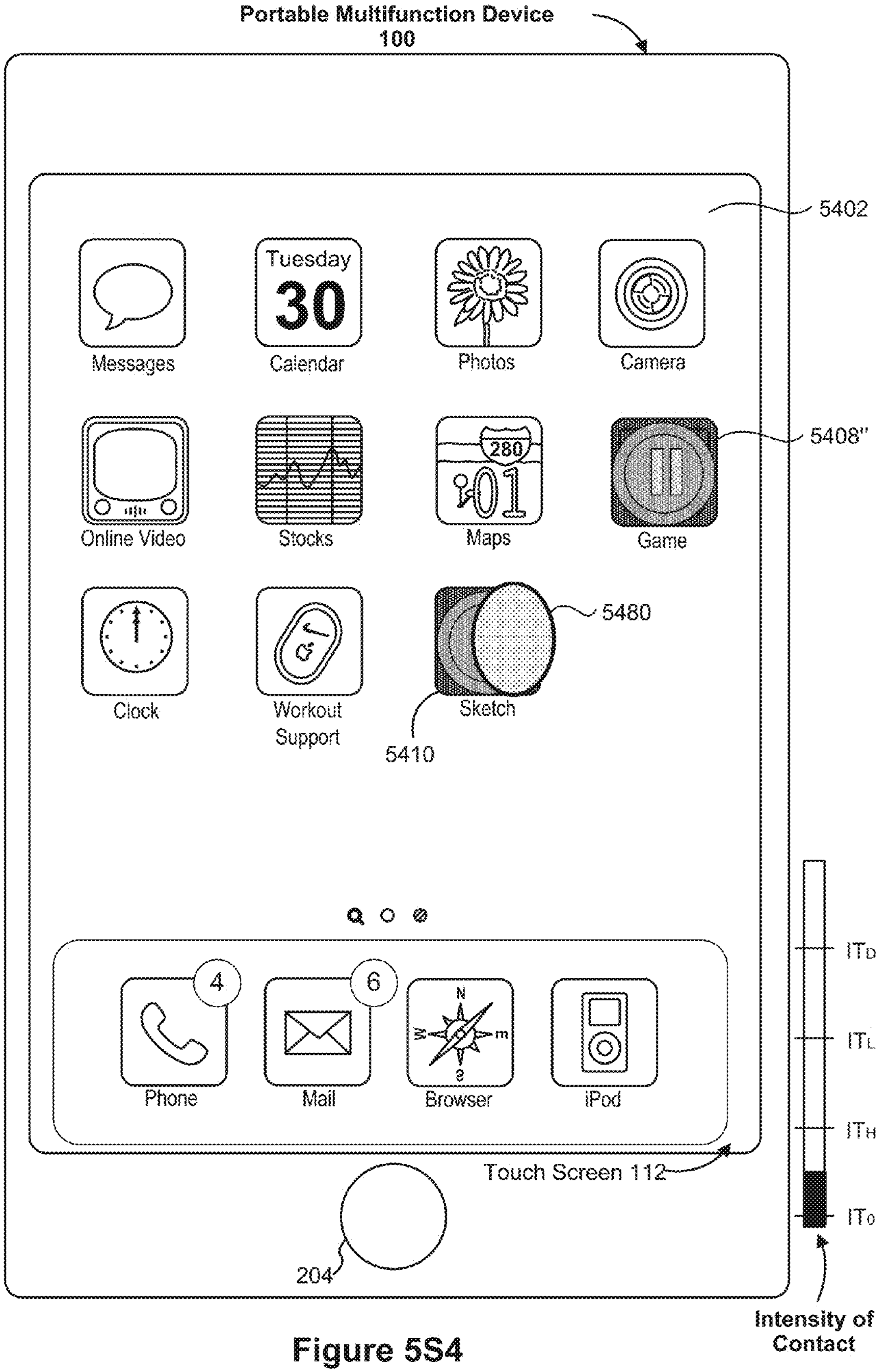
Figure 5S4

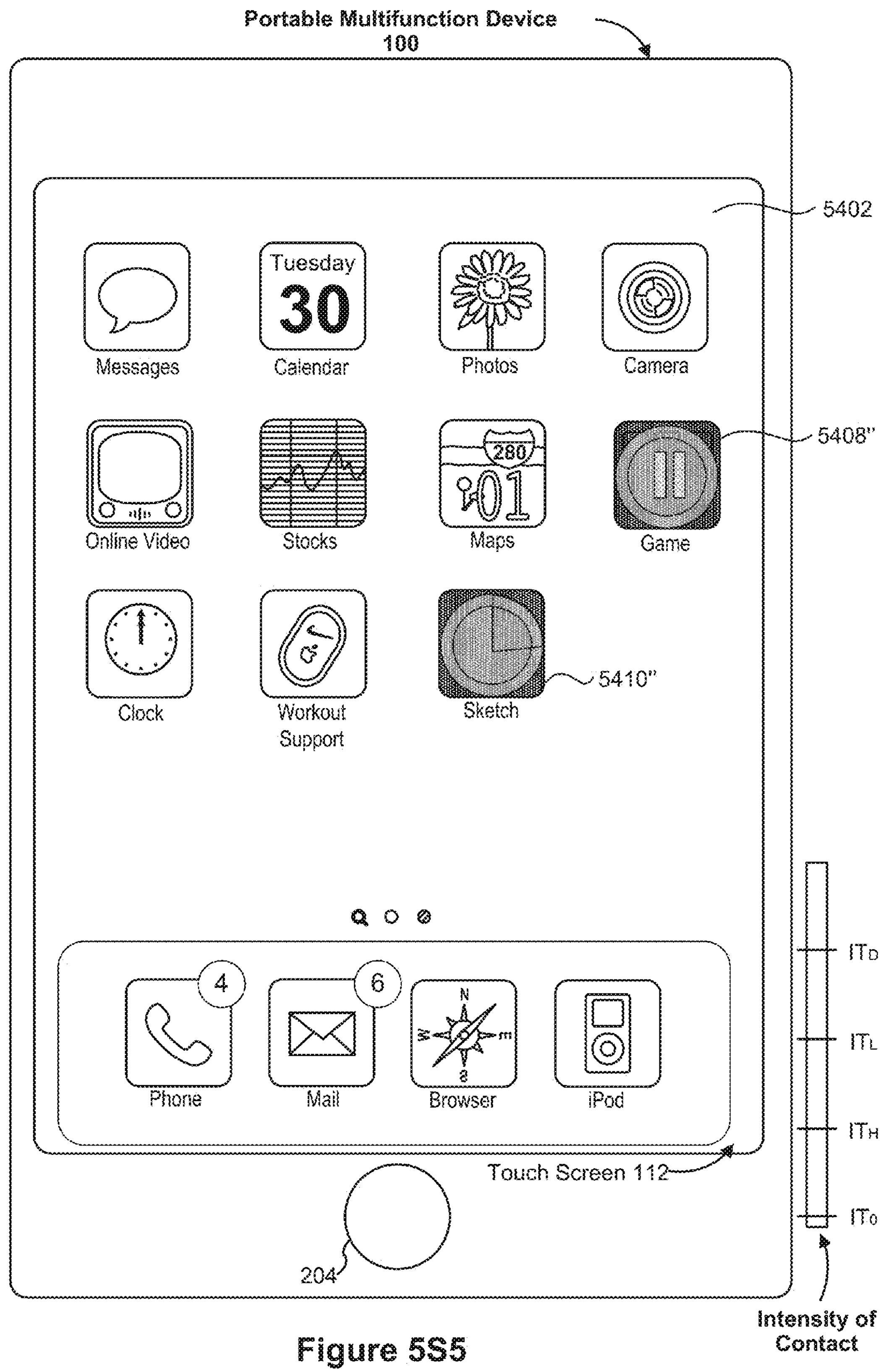
Figure 5S5

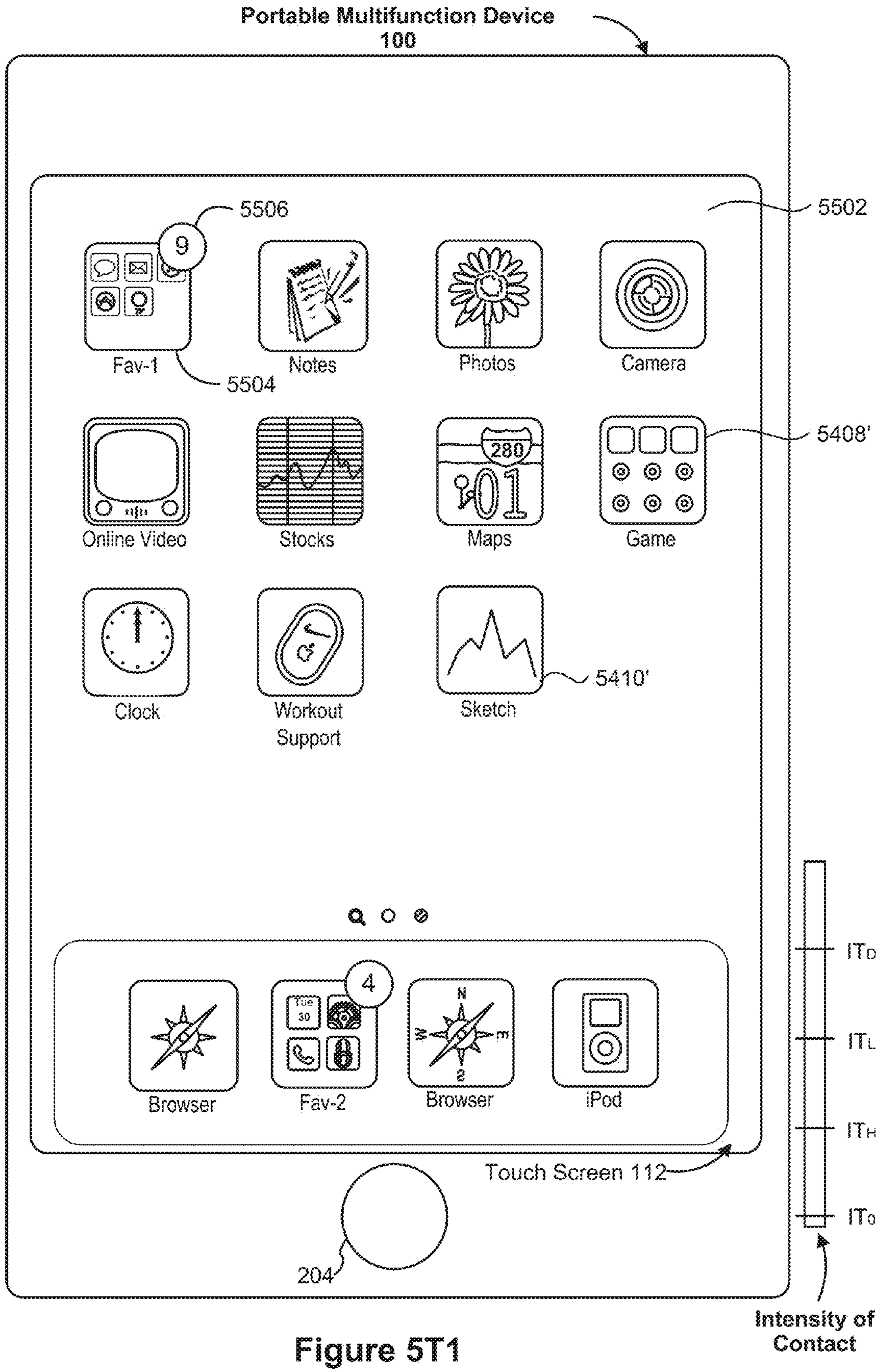
Figure 5T1

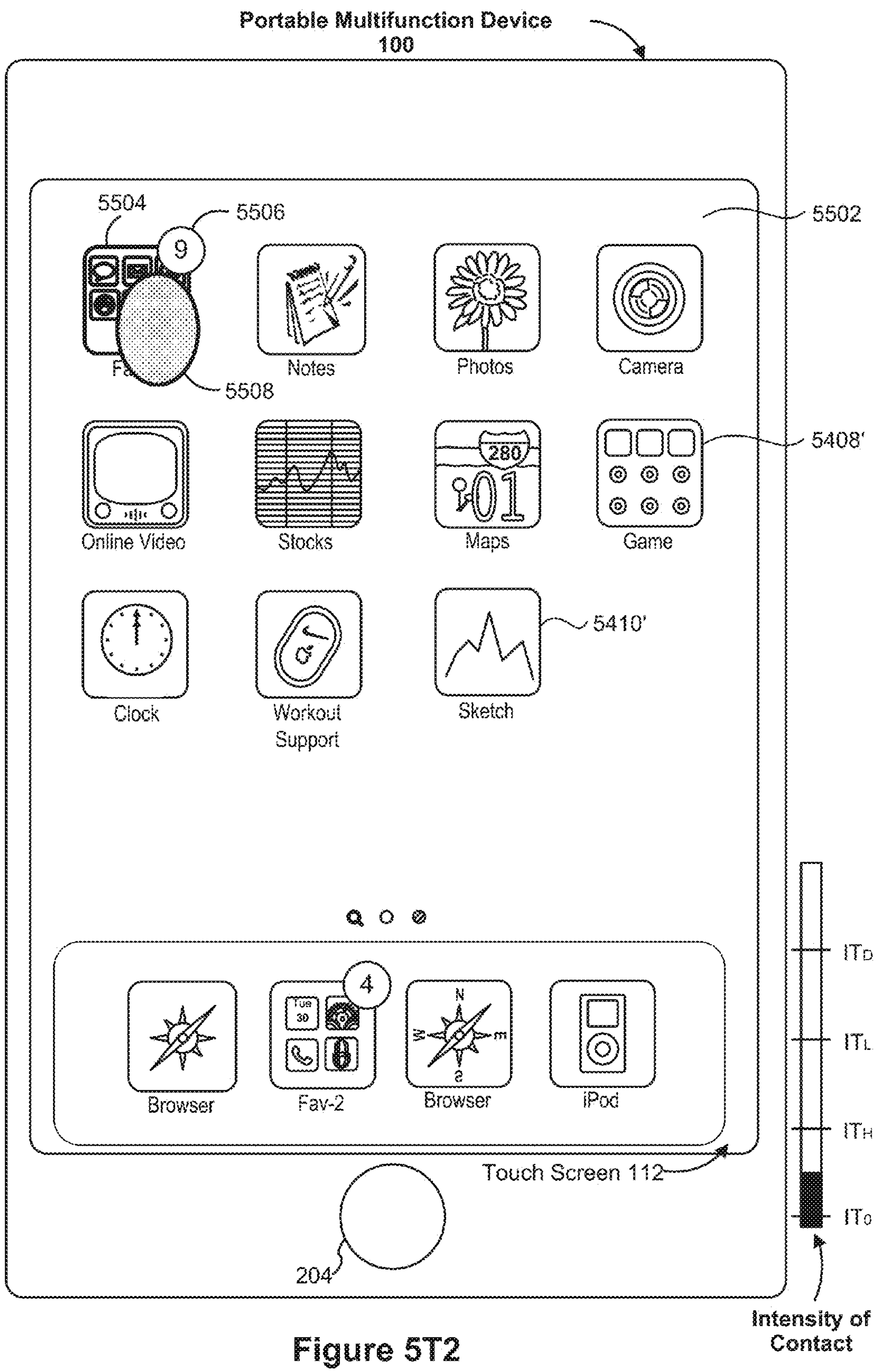
Figure 5T2

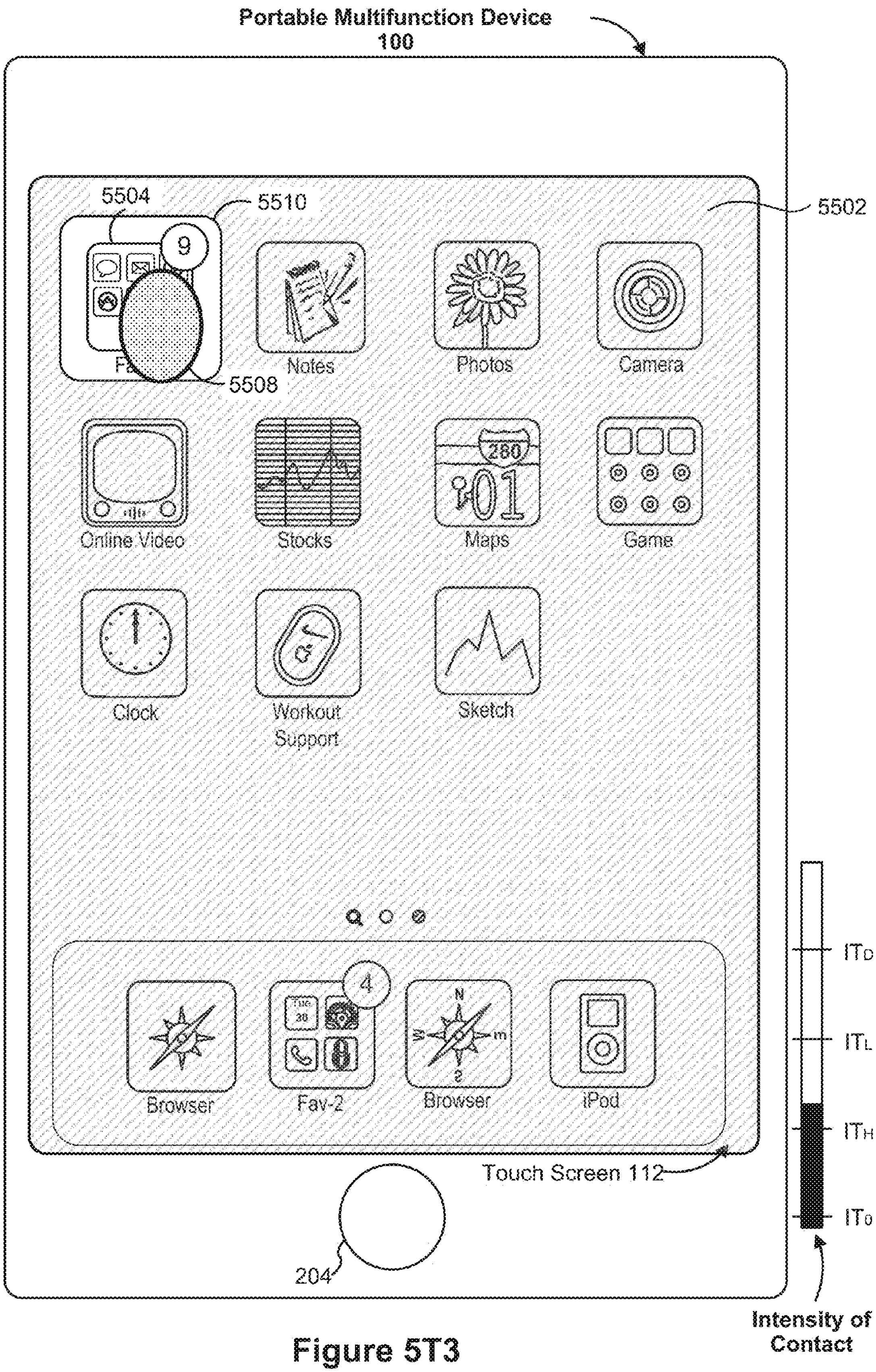
Figure 5T3

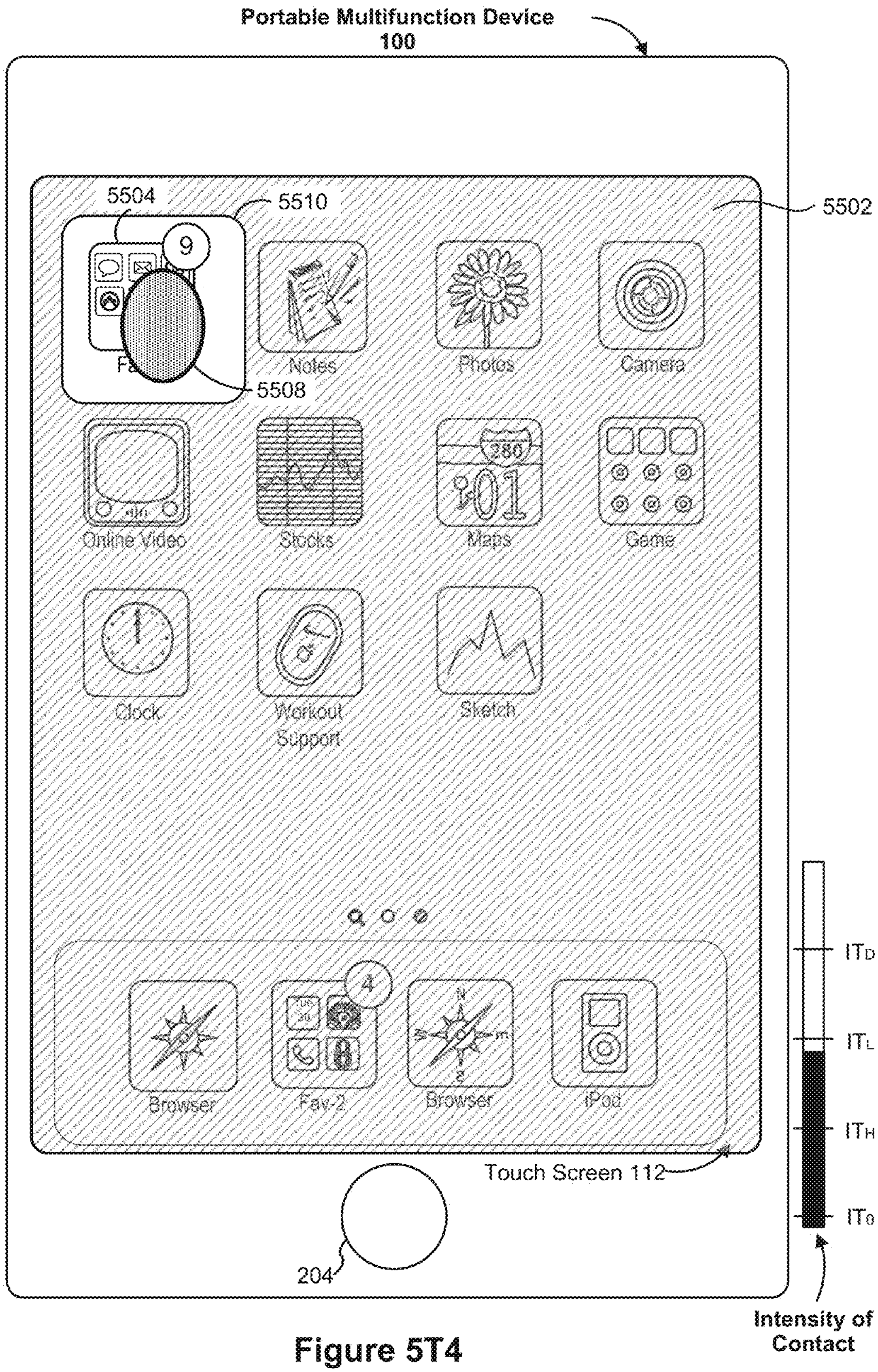
Figure 5T4

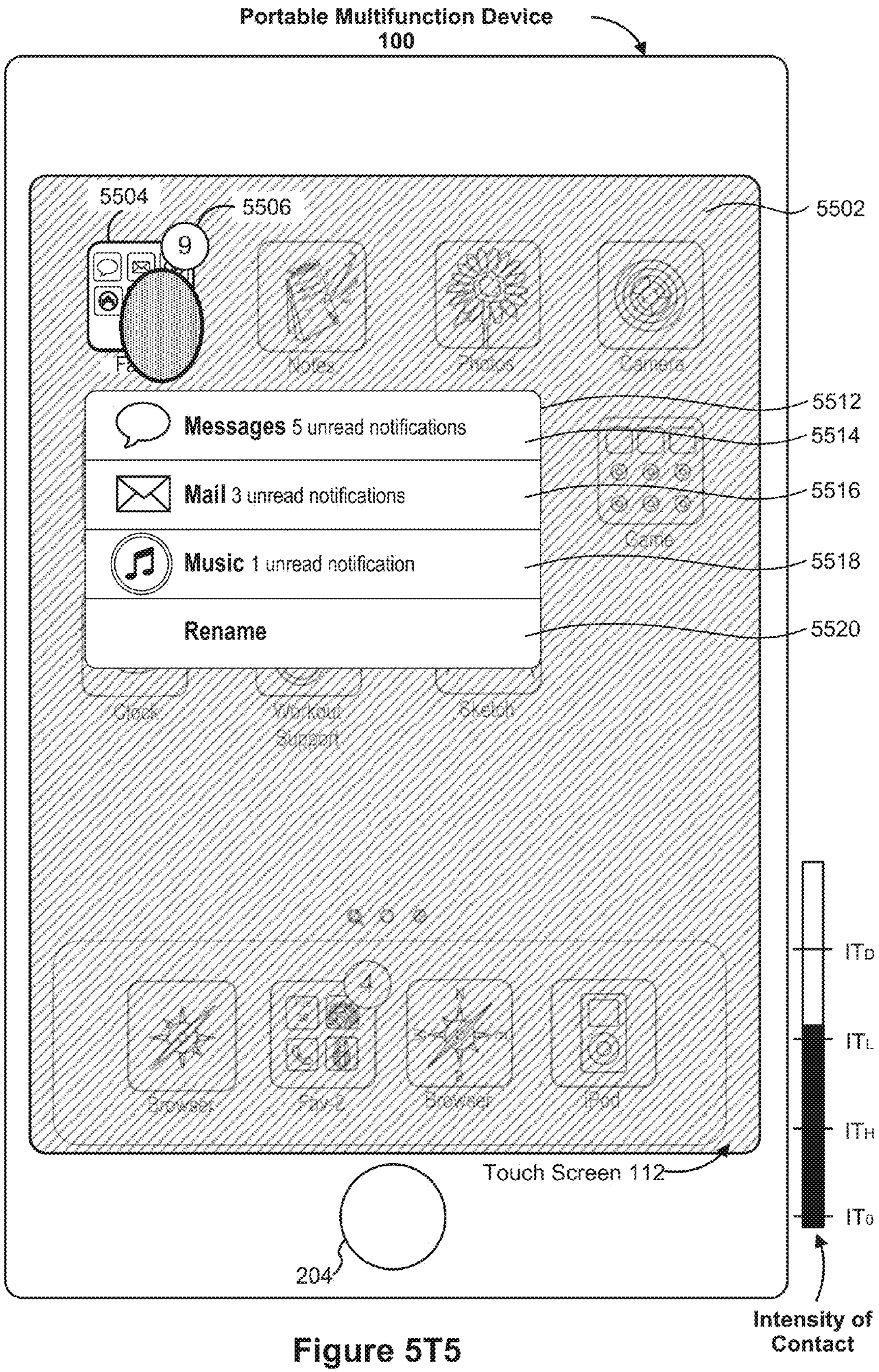
Figure 5T5

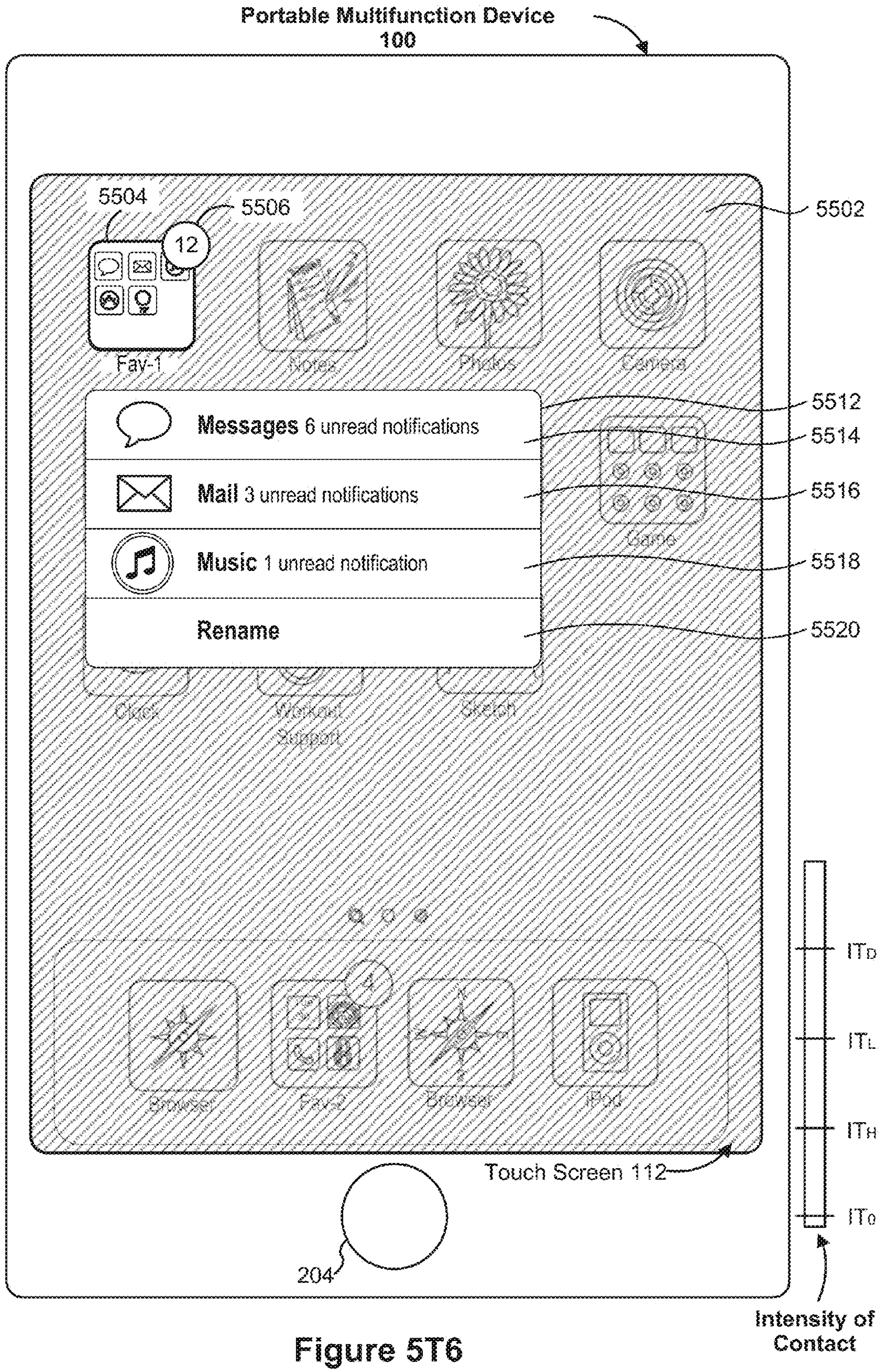
Figure 5T6

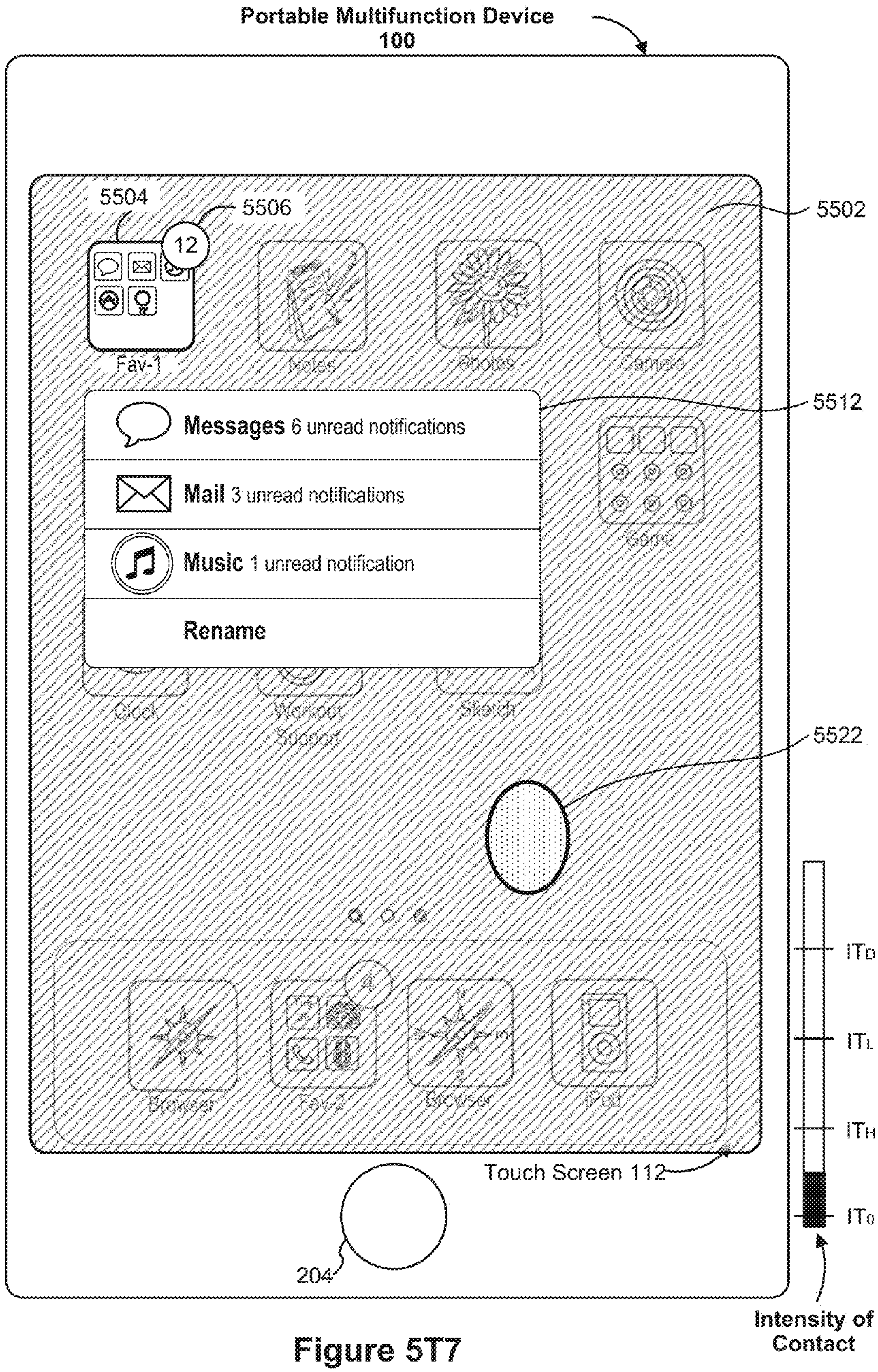
Figure 5T7

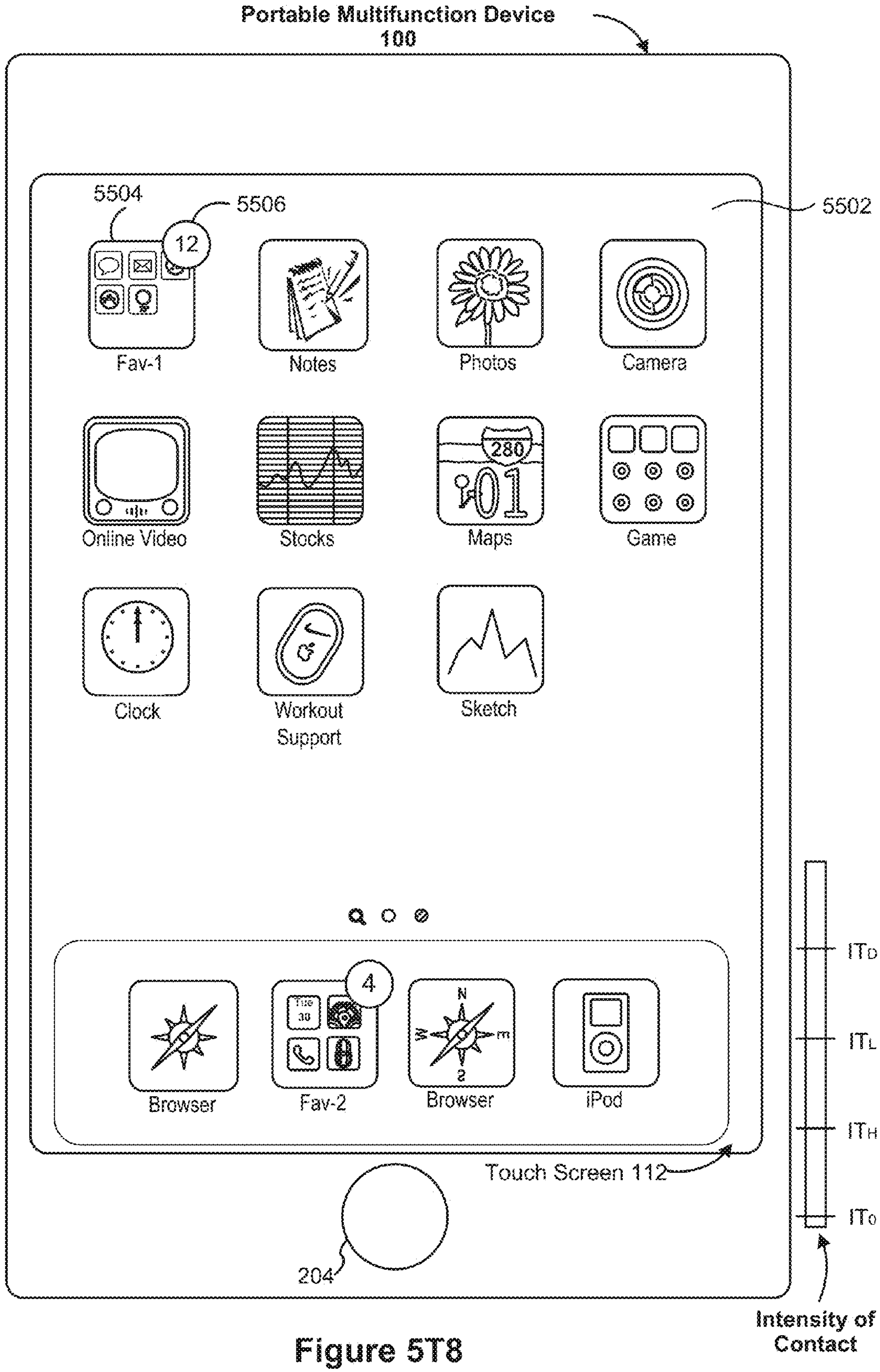
Figure 5T8

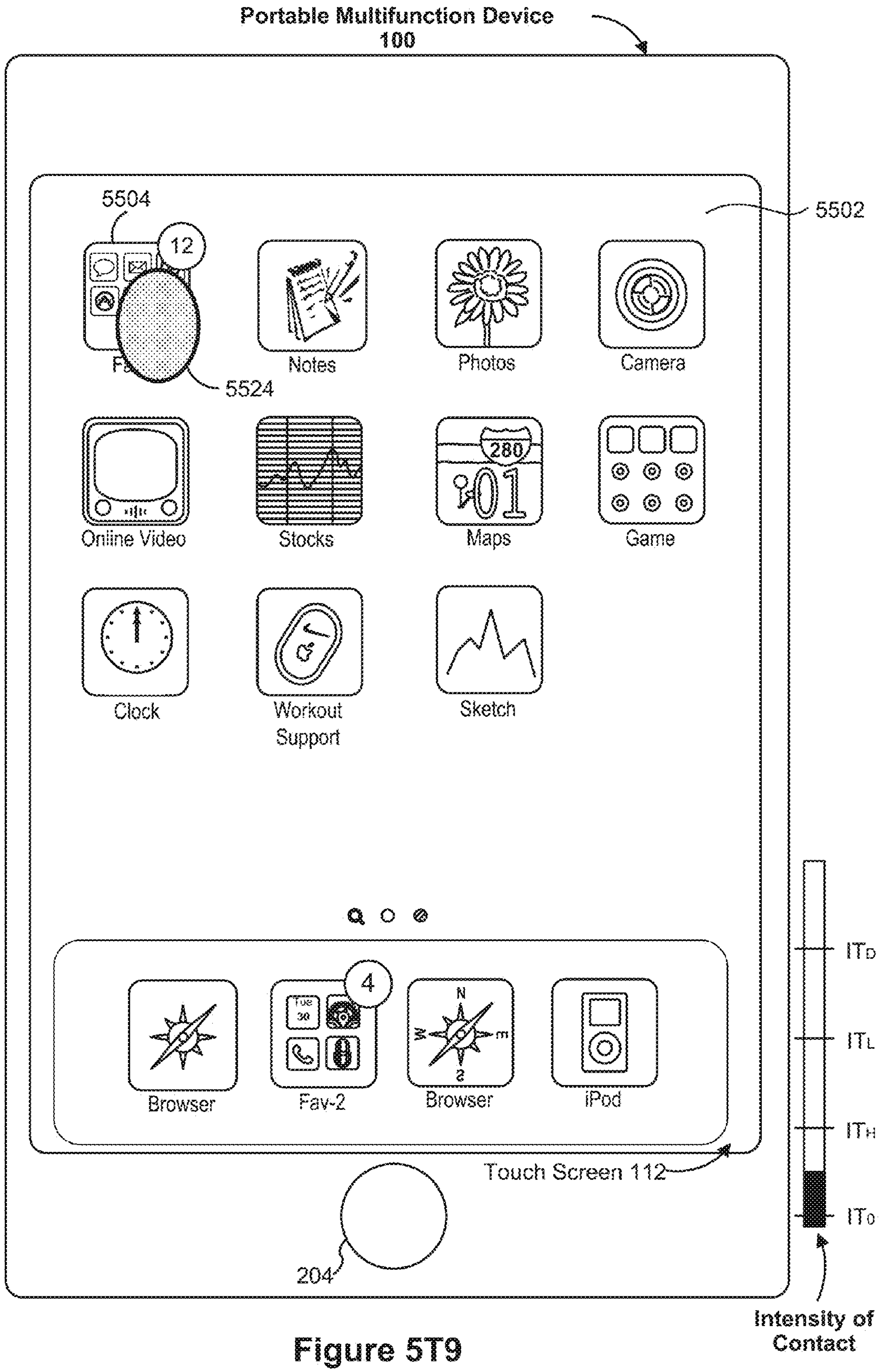
Figure 5T9

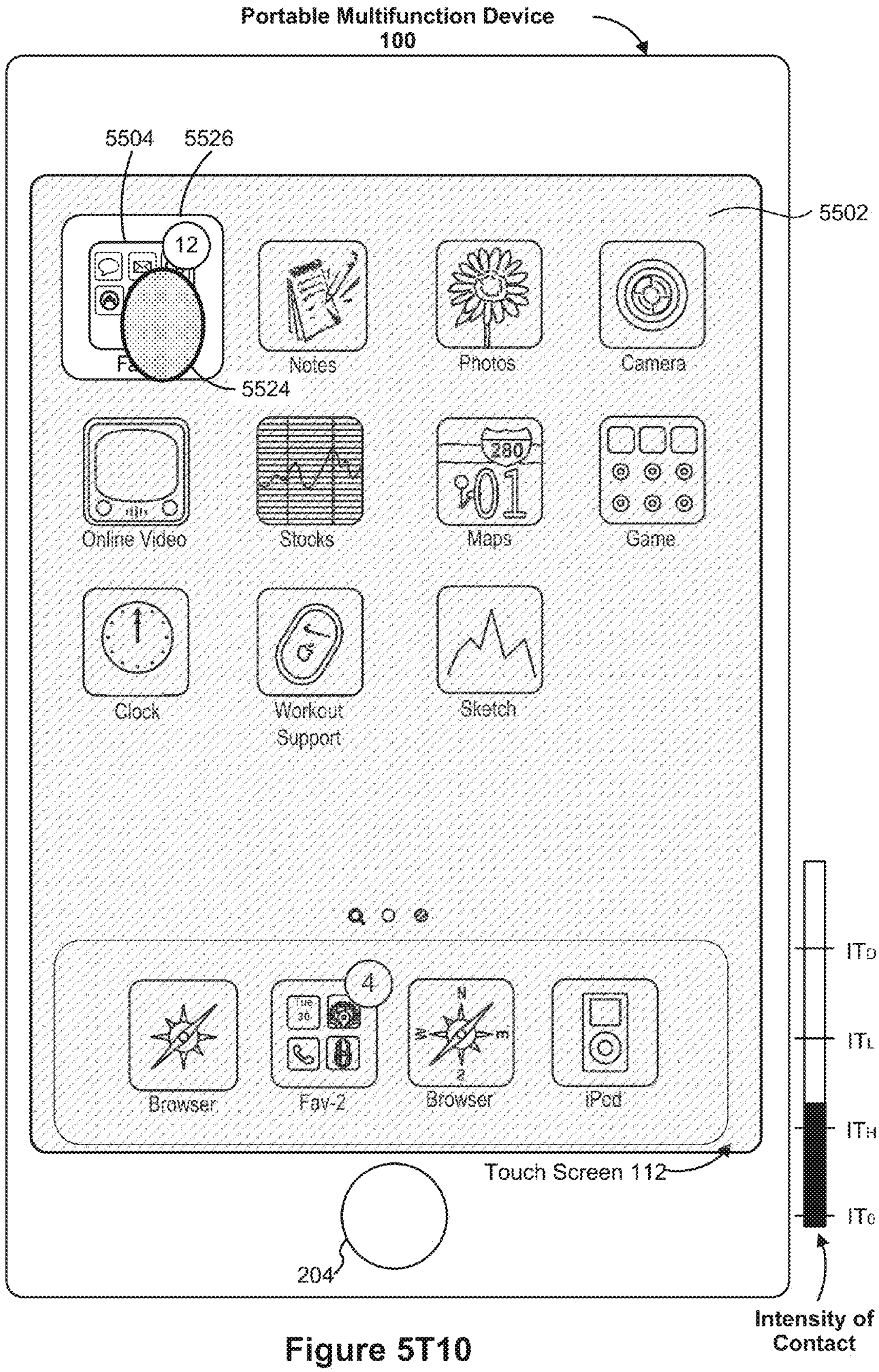
Figure 5T10

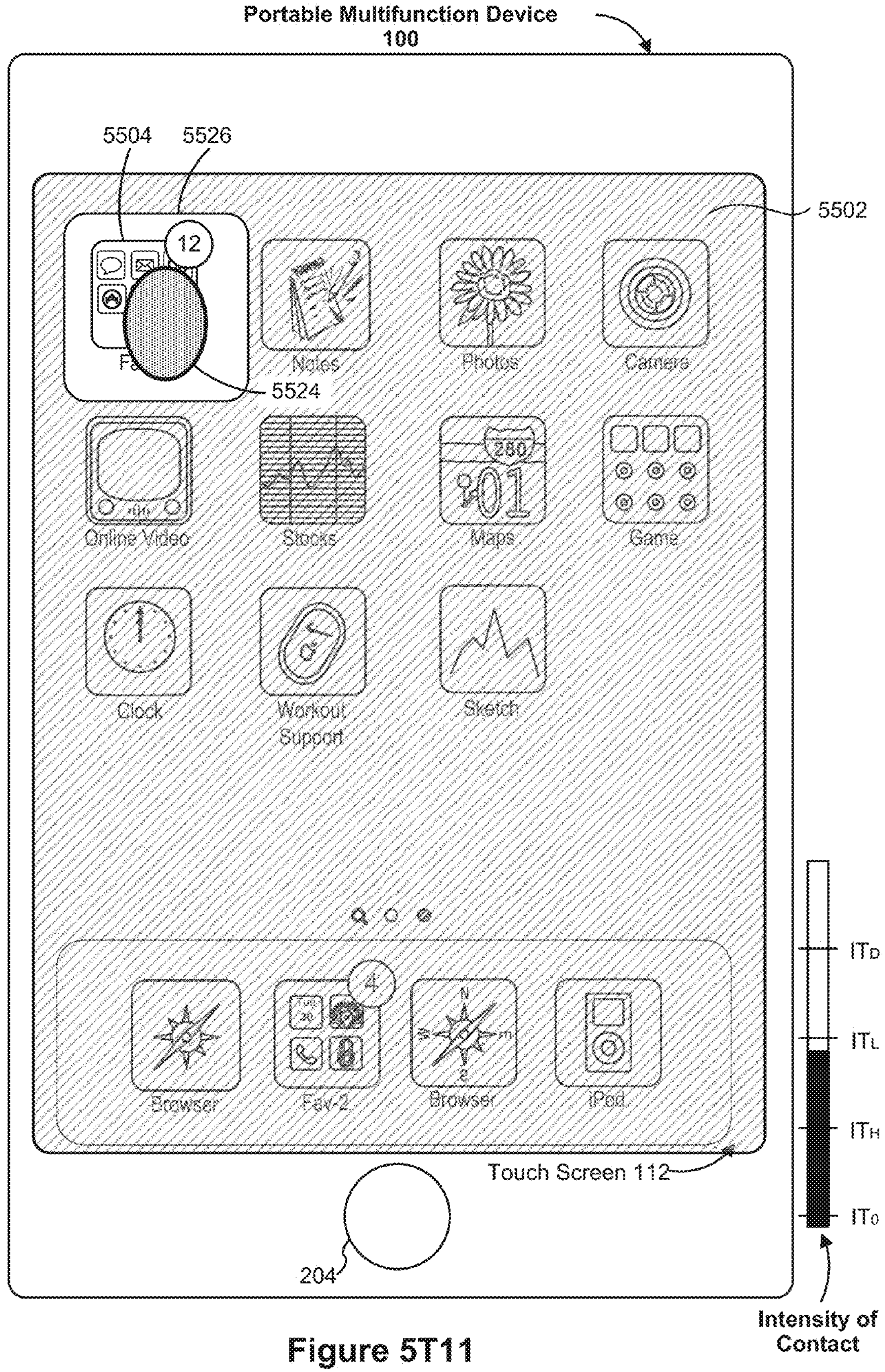
Figure 5T11

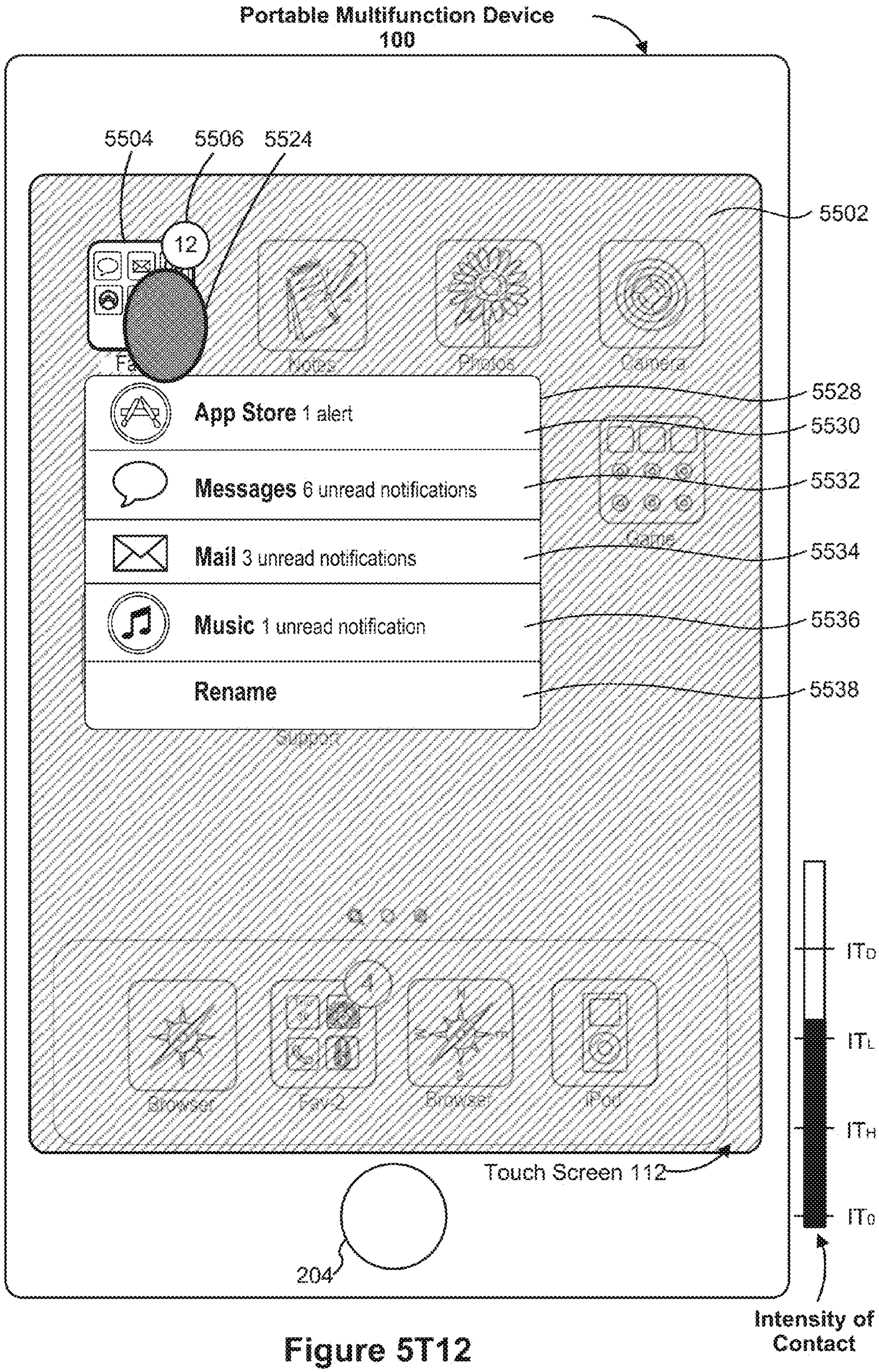
Figure 5T12

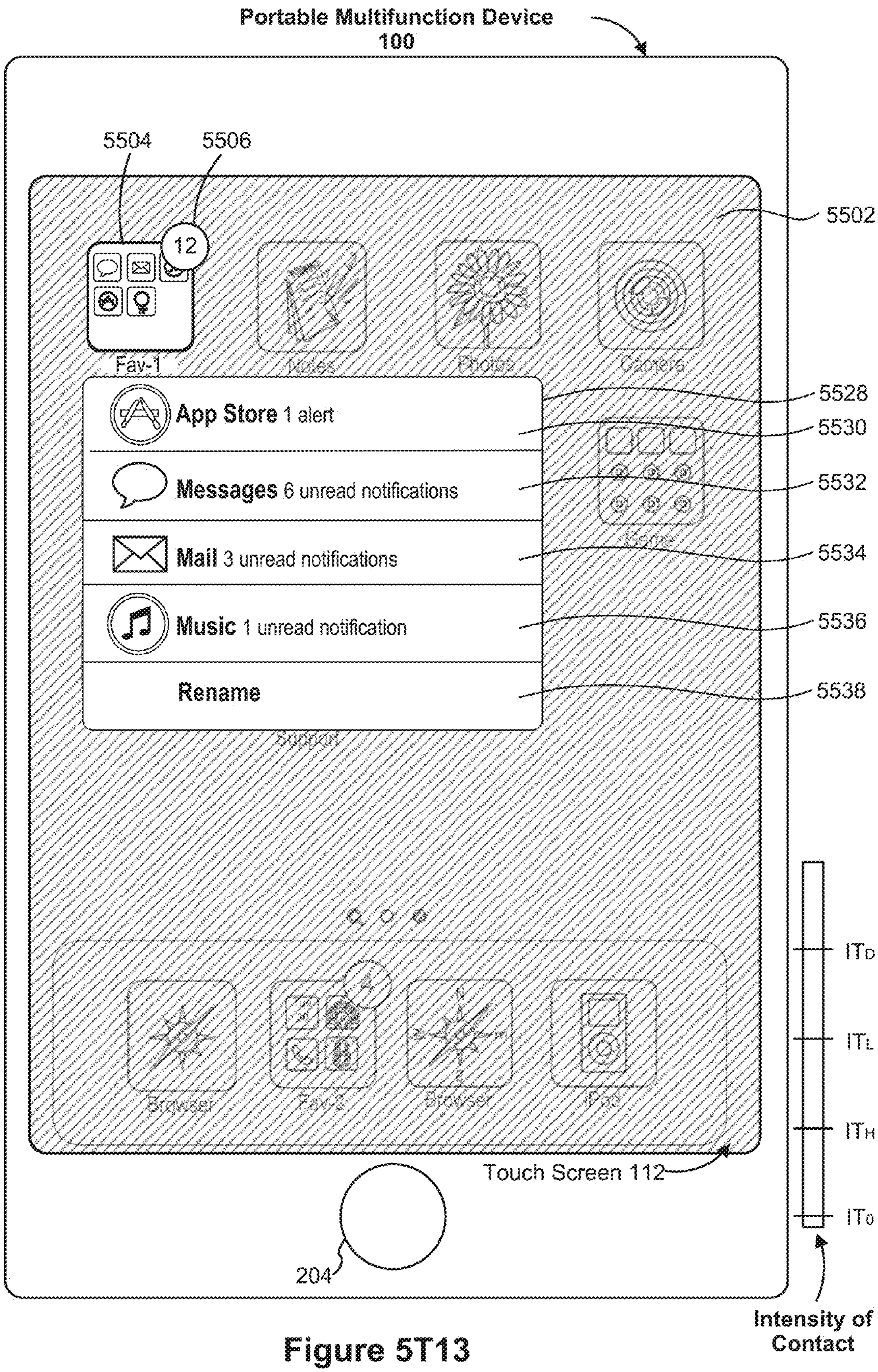
Figure 5T13

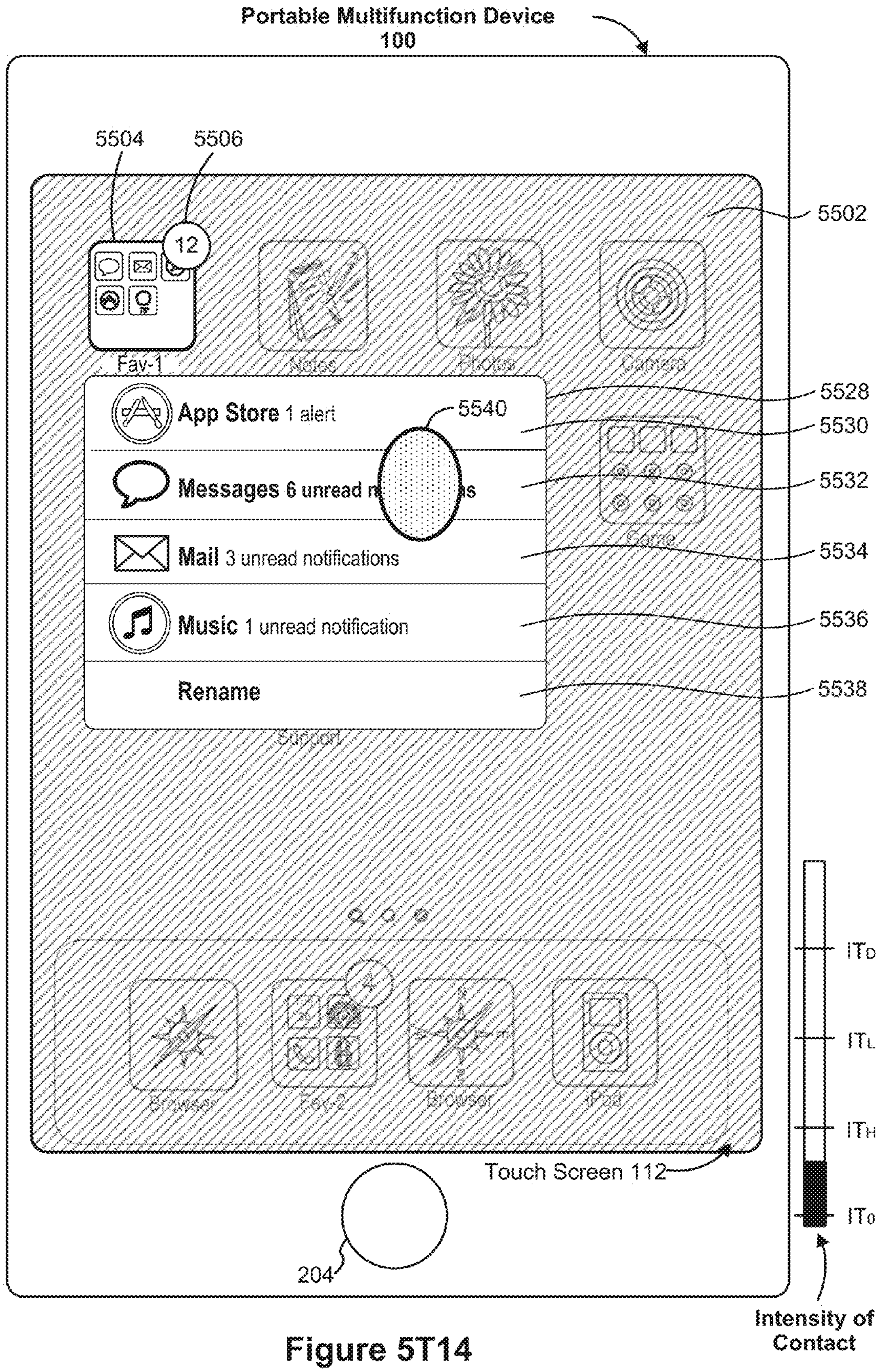
Figure 5T14

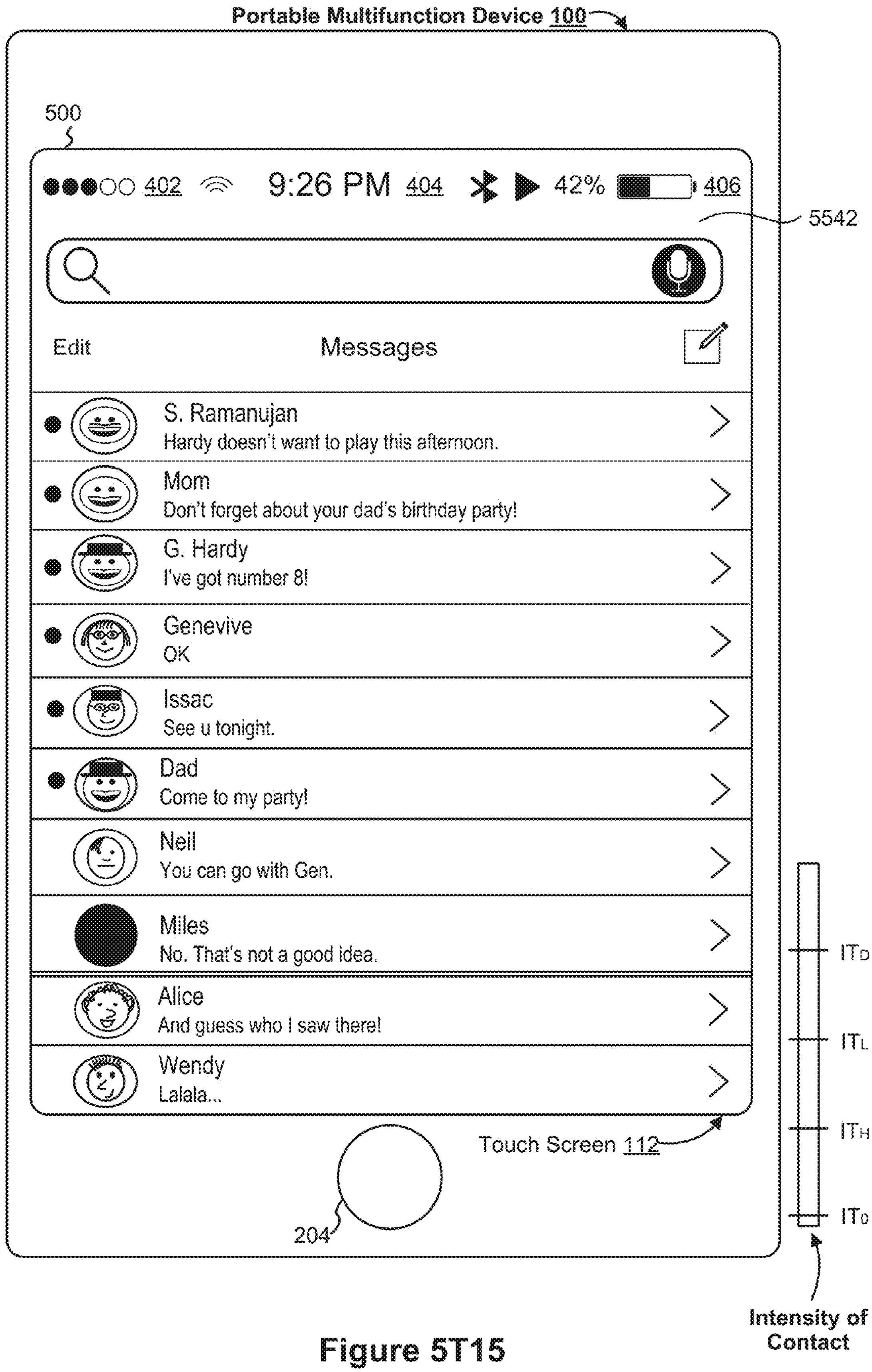
Figure 5T15

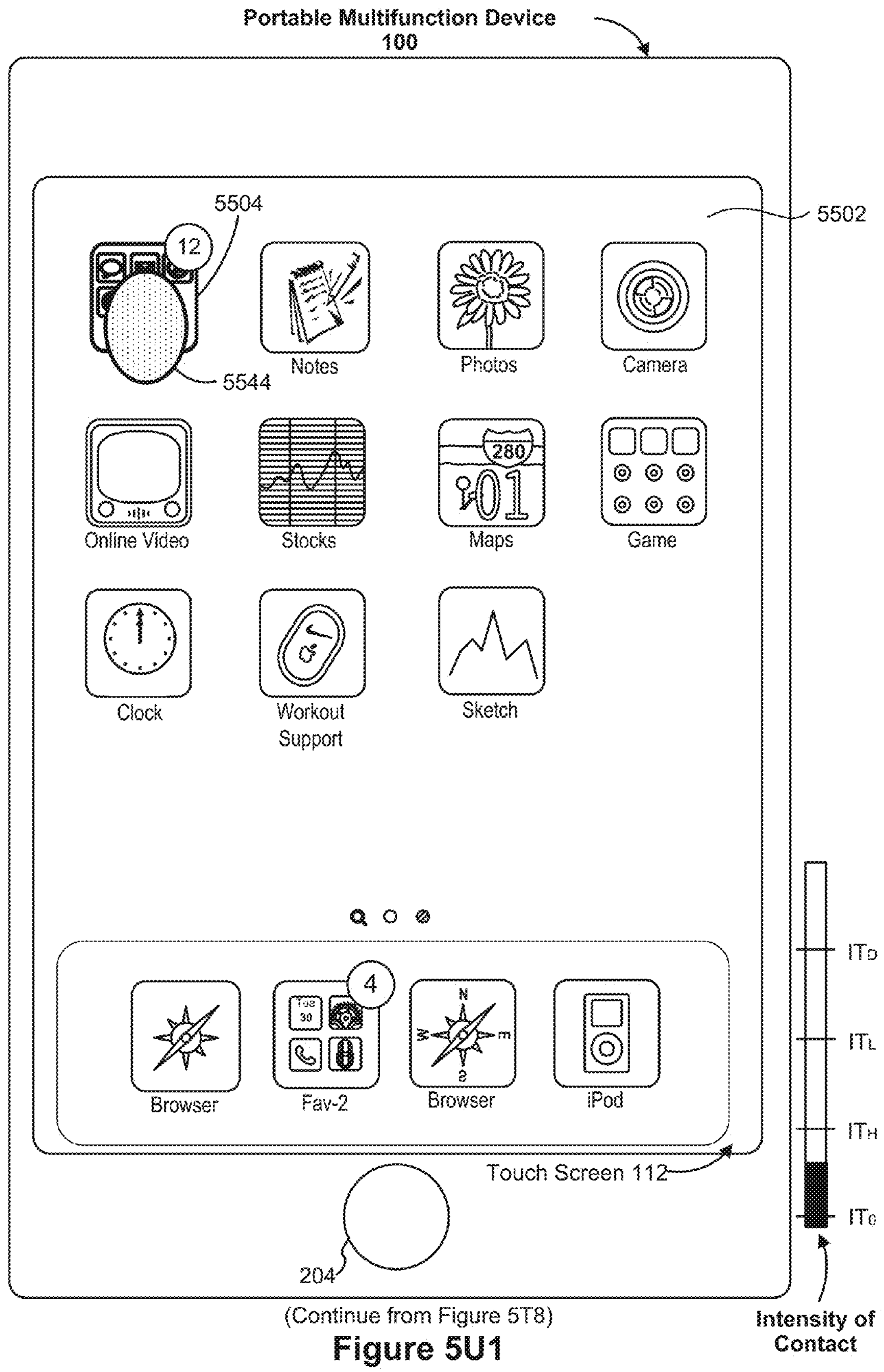
(Continue from Figure 5T8)
Figure 5U1

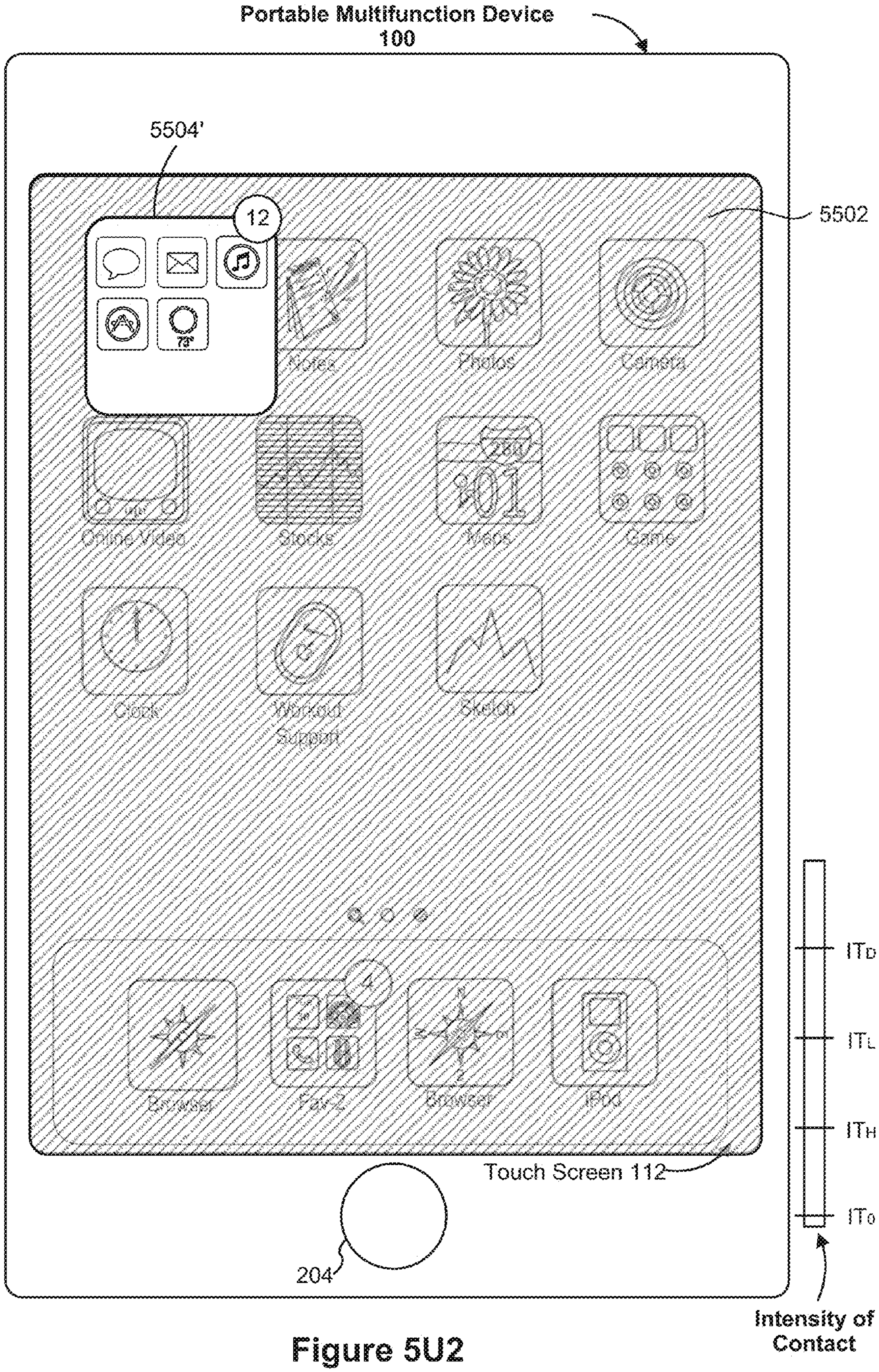
Figure 5U2

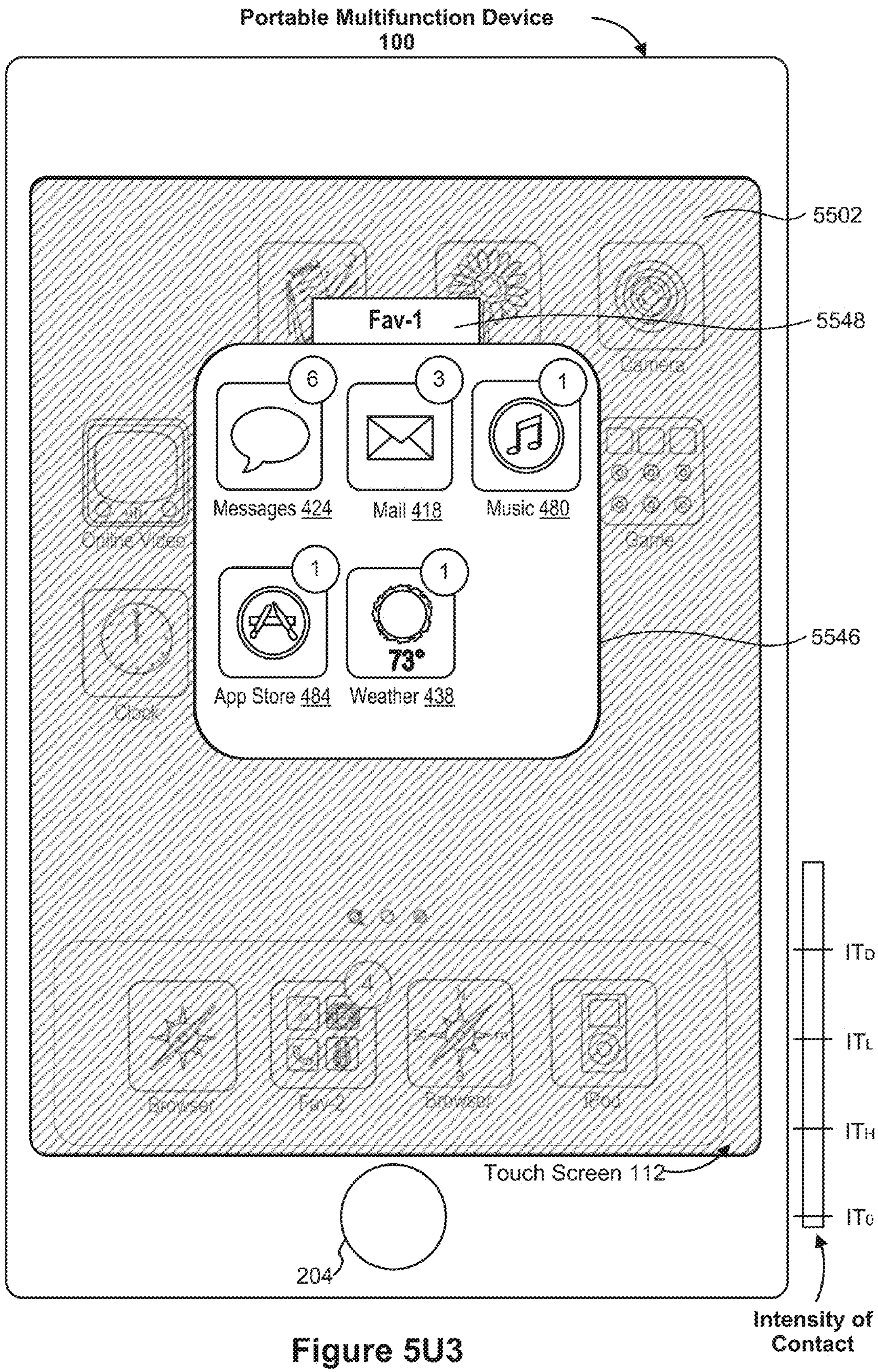
Figure 5U3

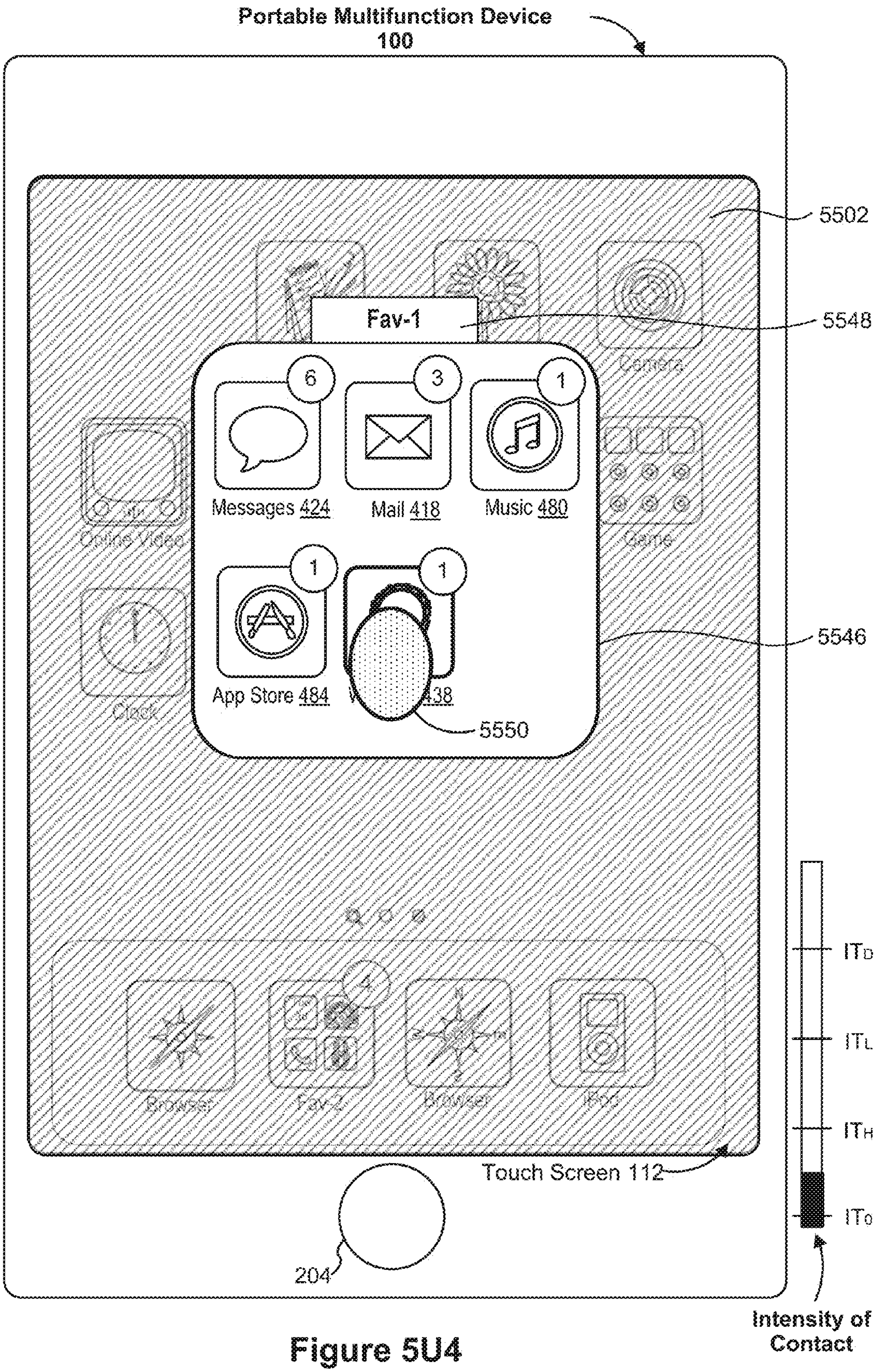
Figure 5U4

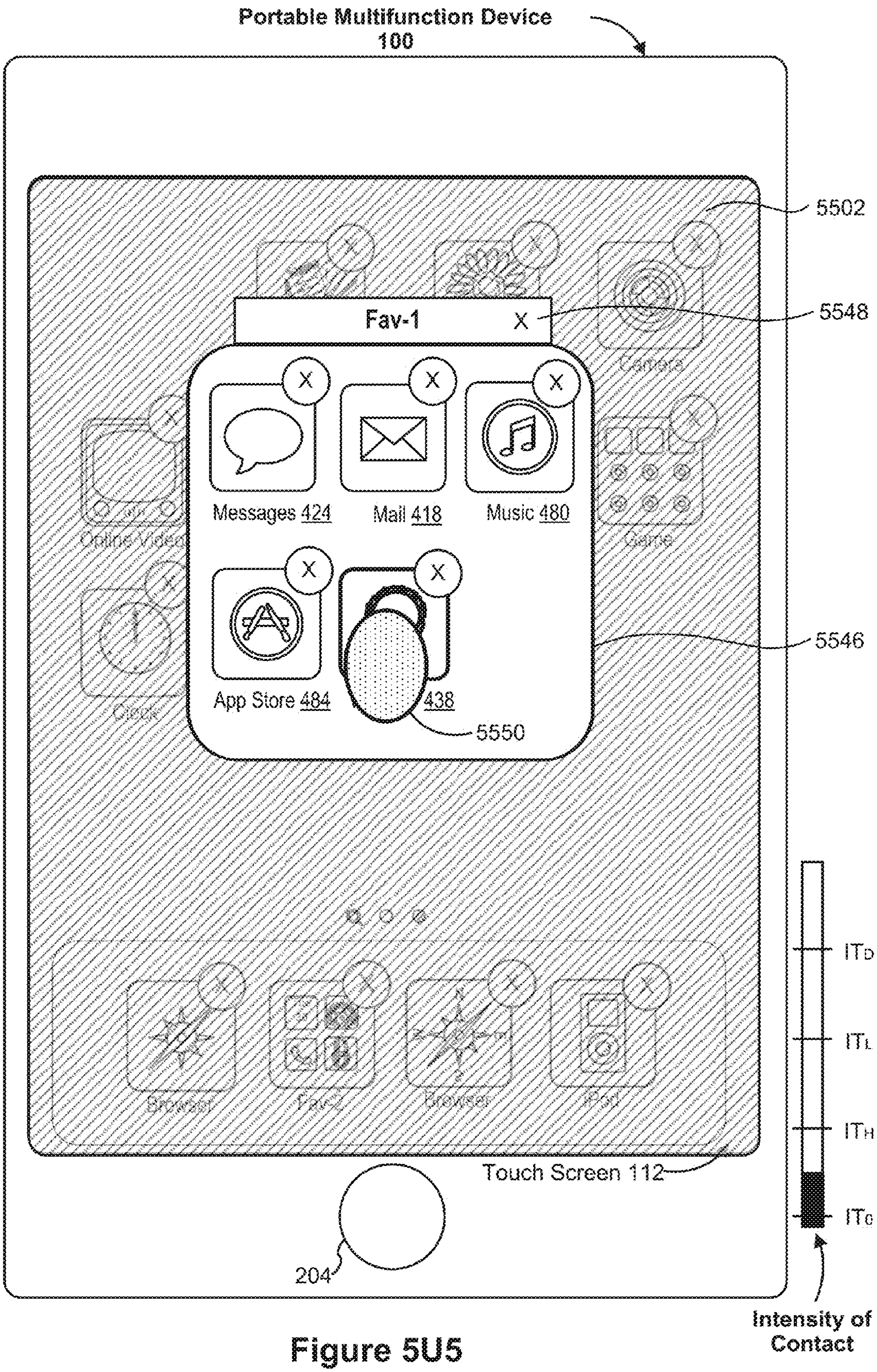
Figure 5U5

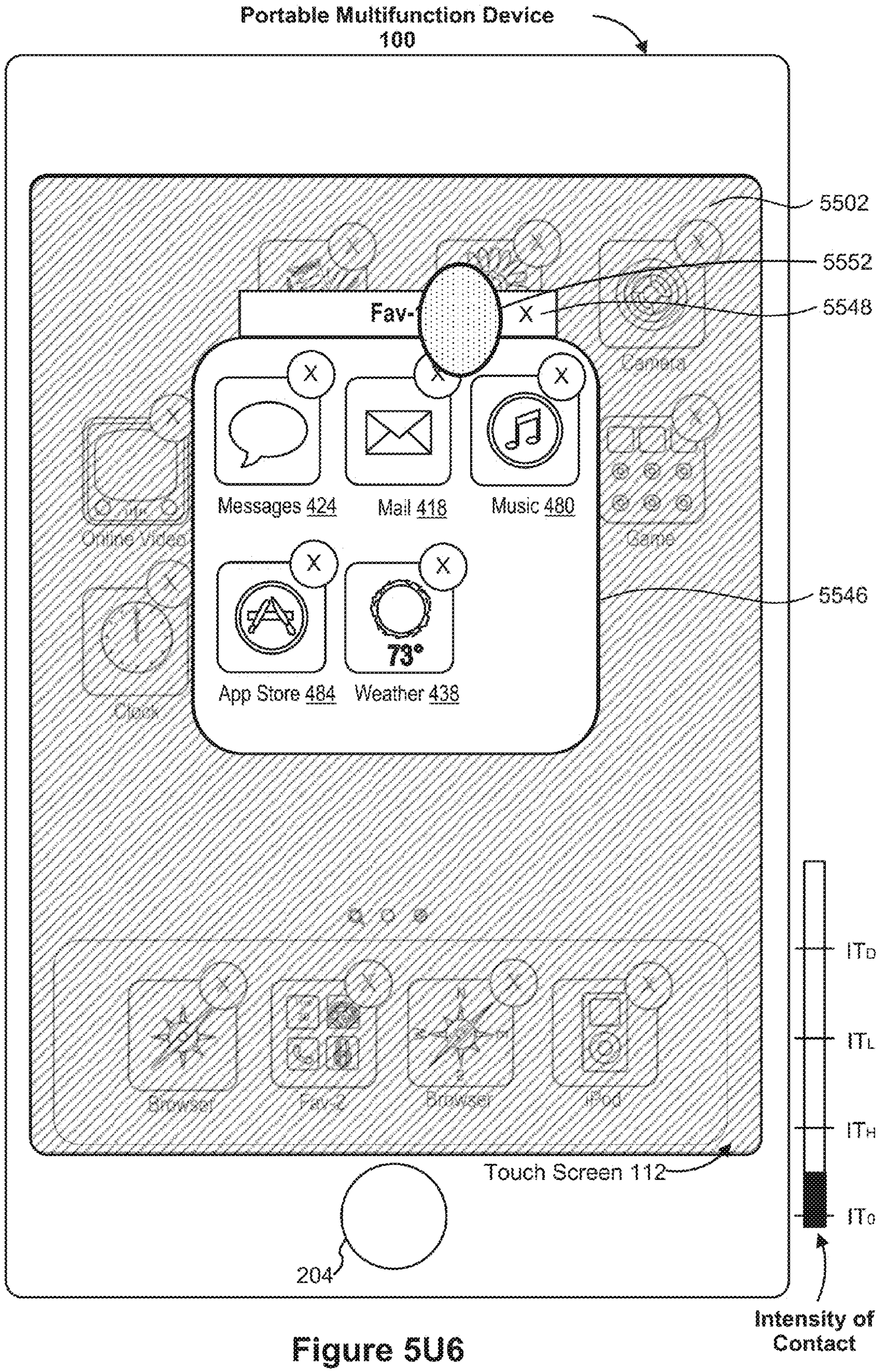
Figure 5U6

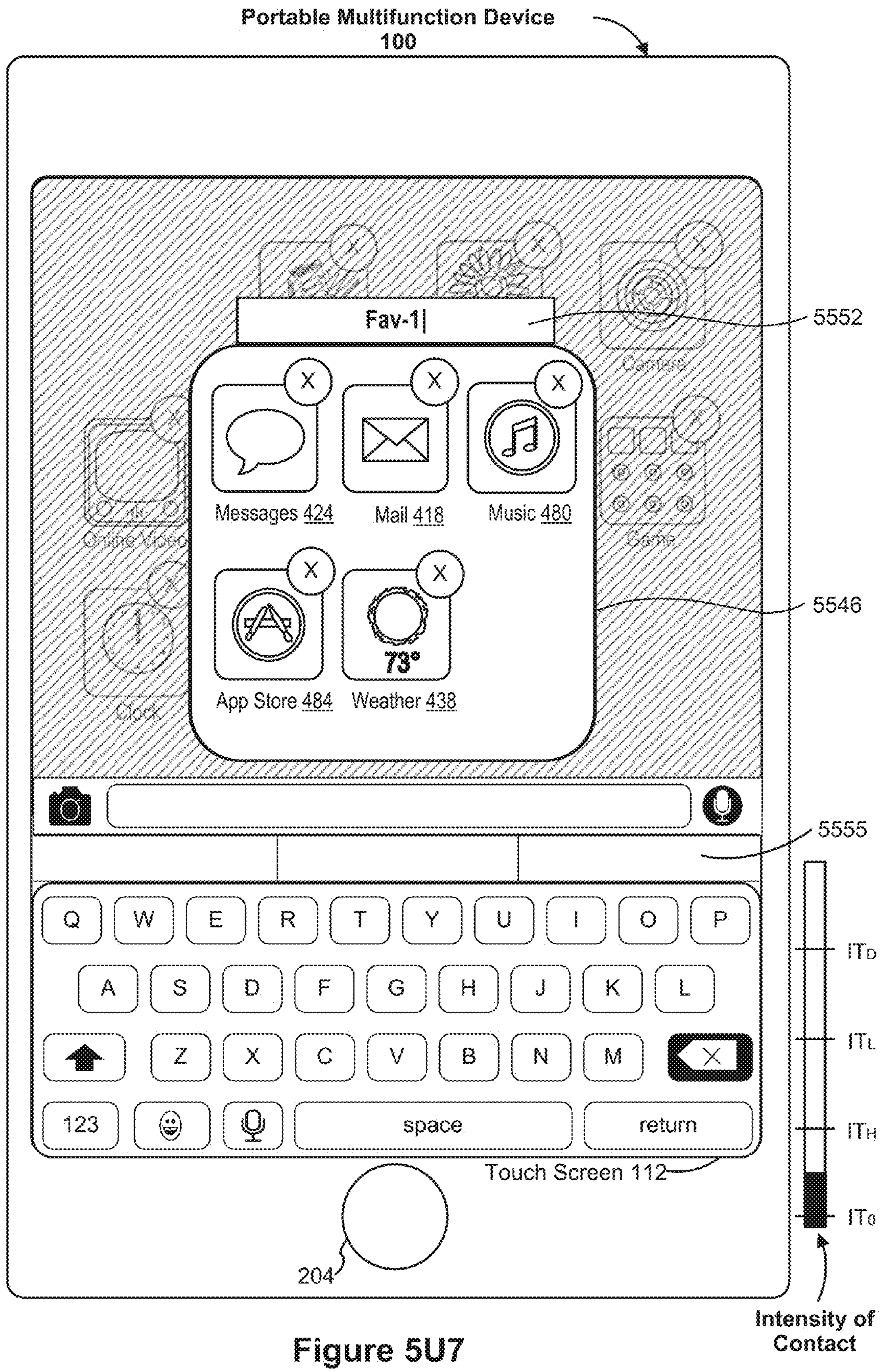
Figure 5U7

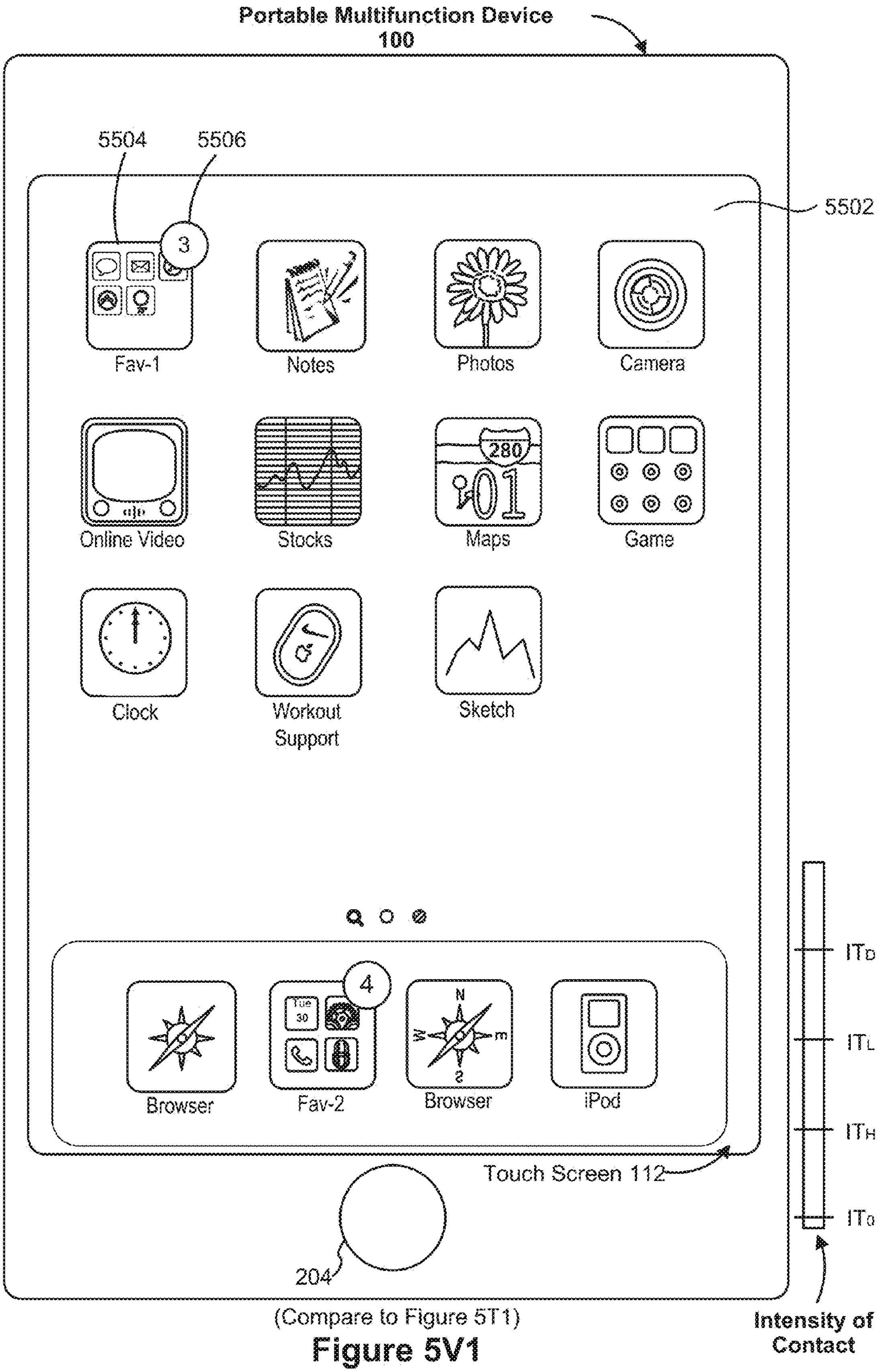
(Compare to Figure 5T1)
Figure 5V1

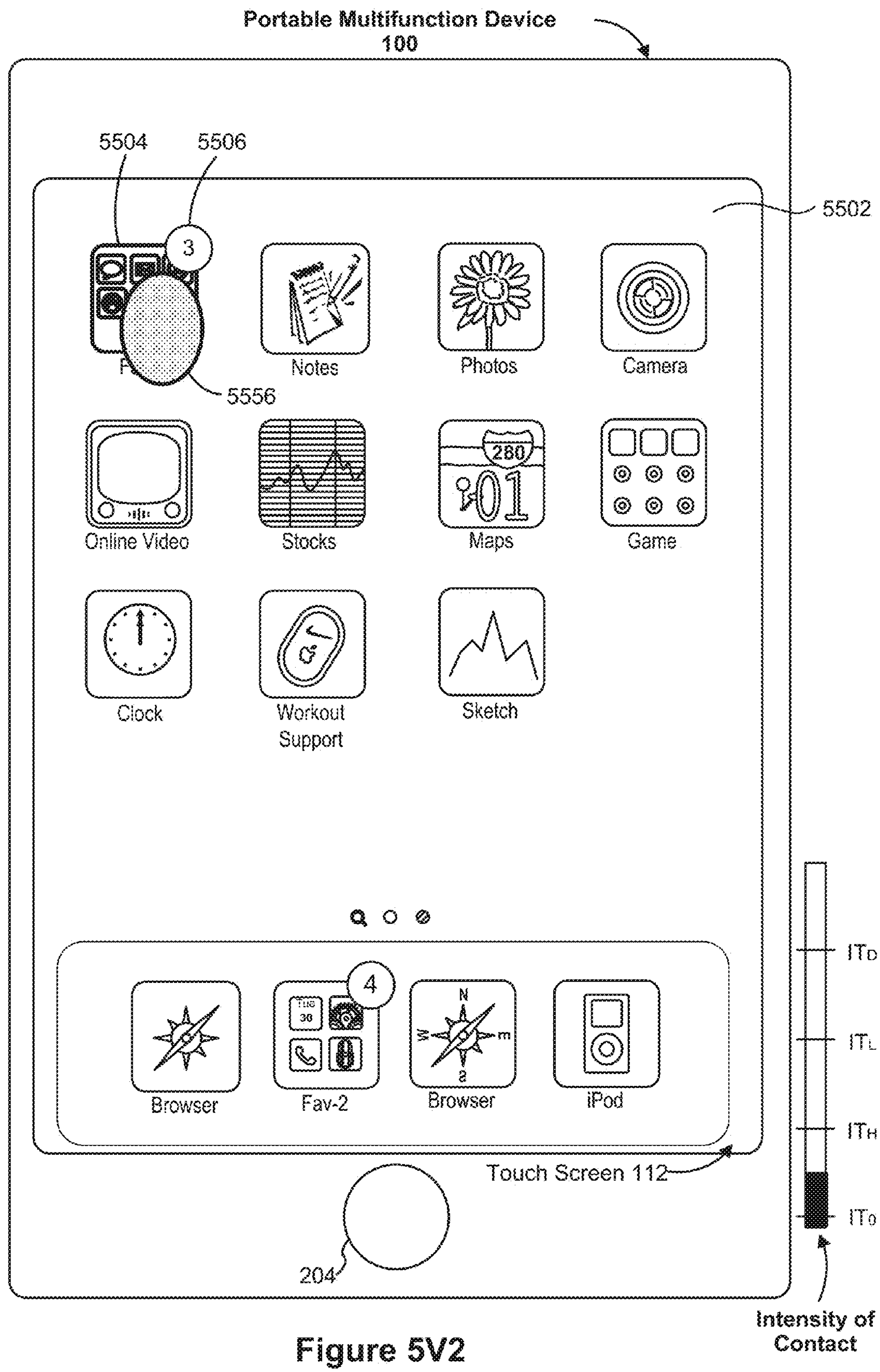
Figure 5V2

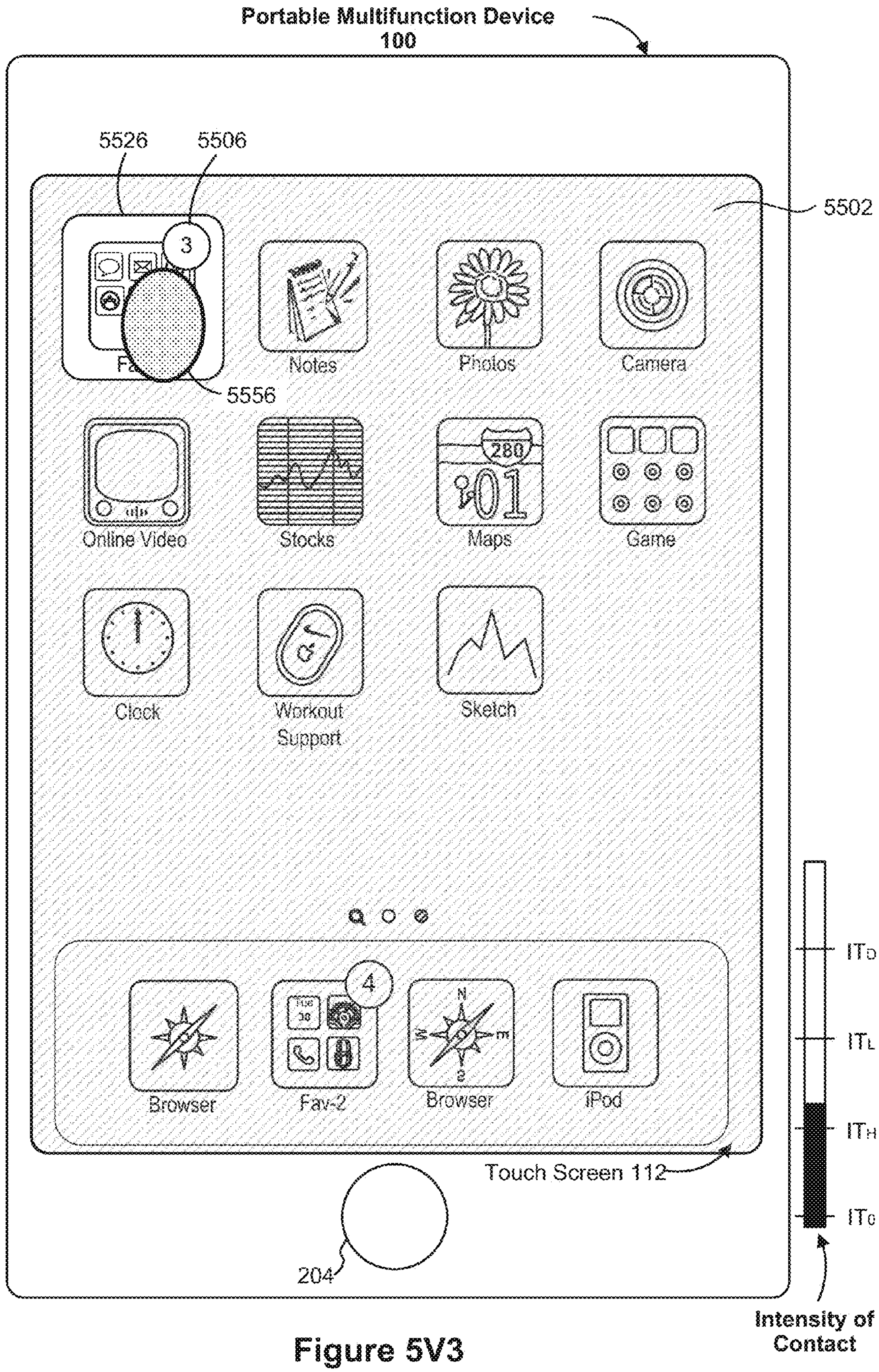
Figure 5V3

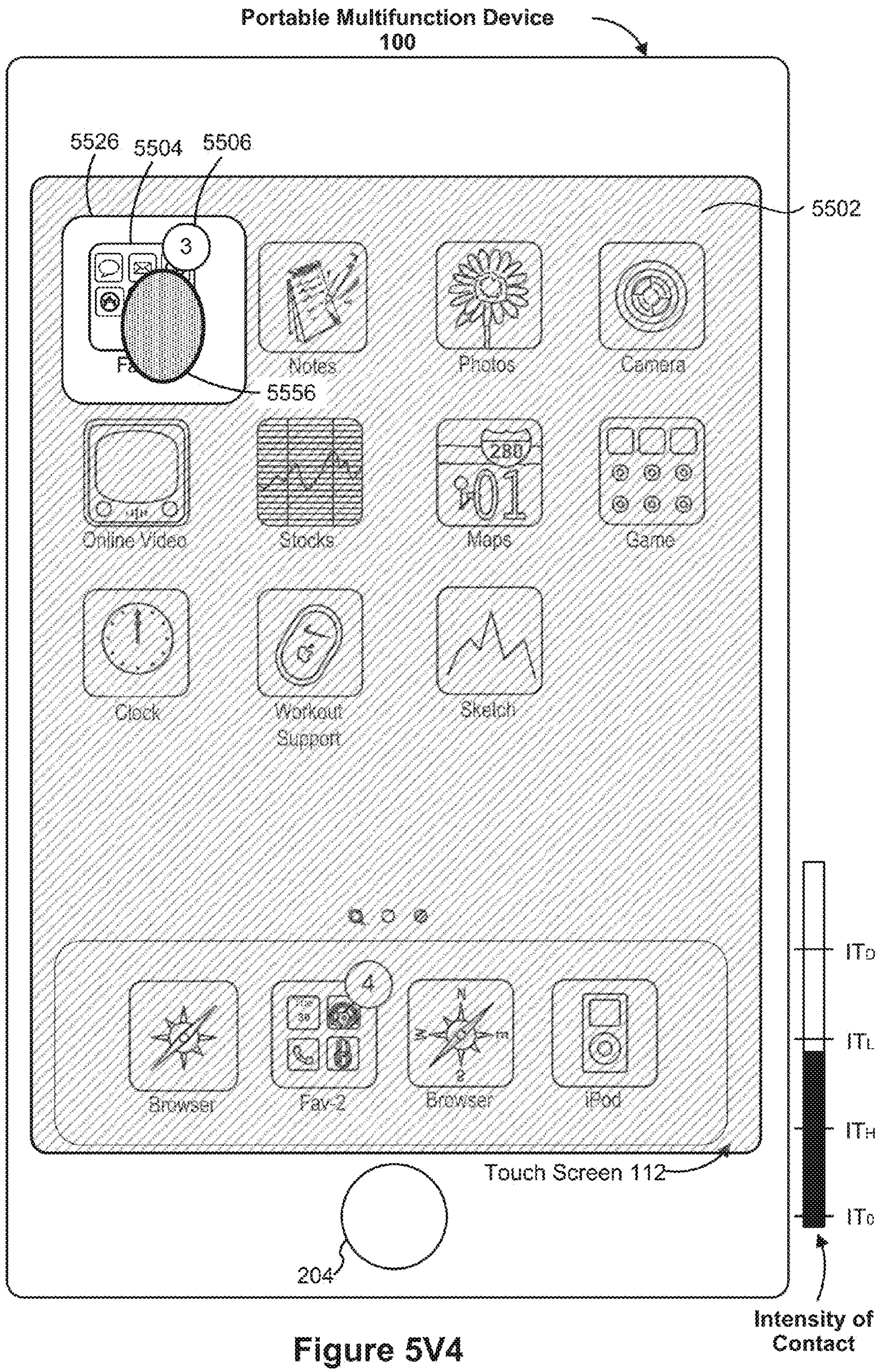
Figure 5V4

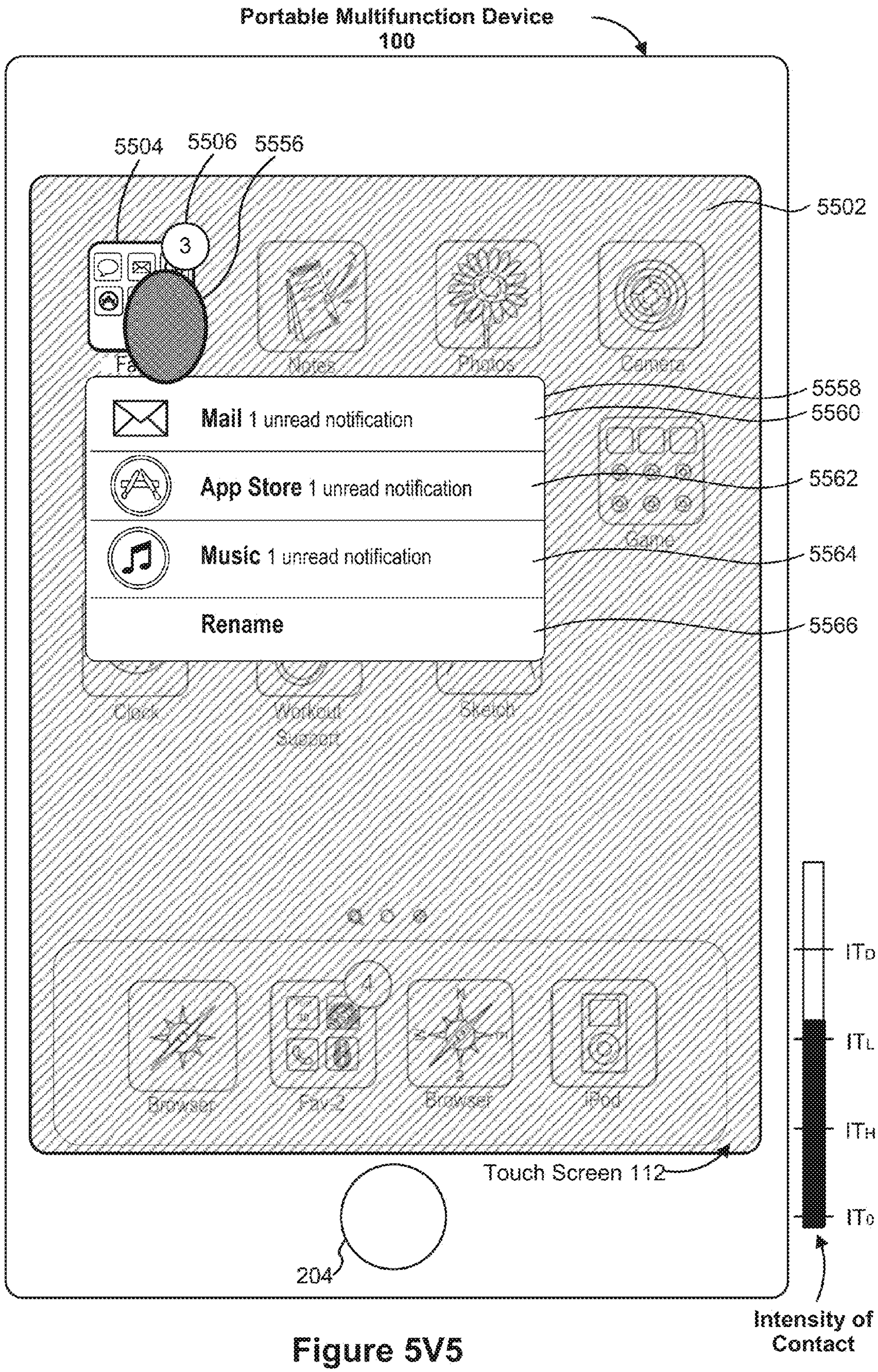
Figure 5V5

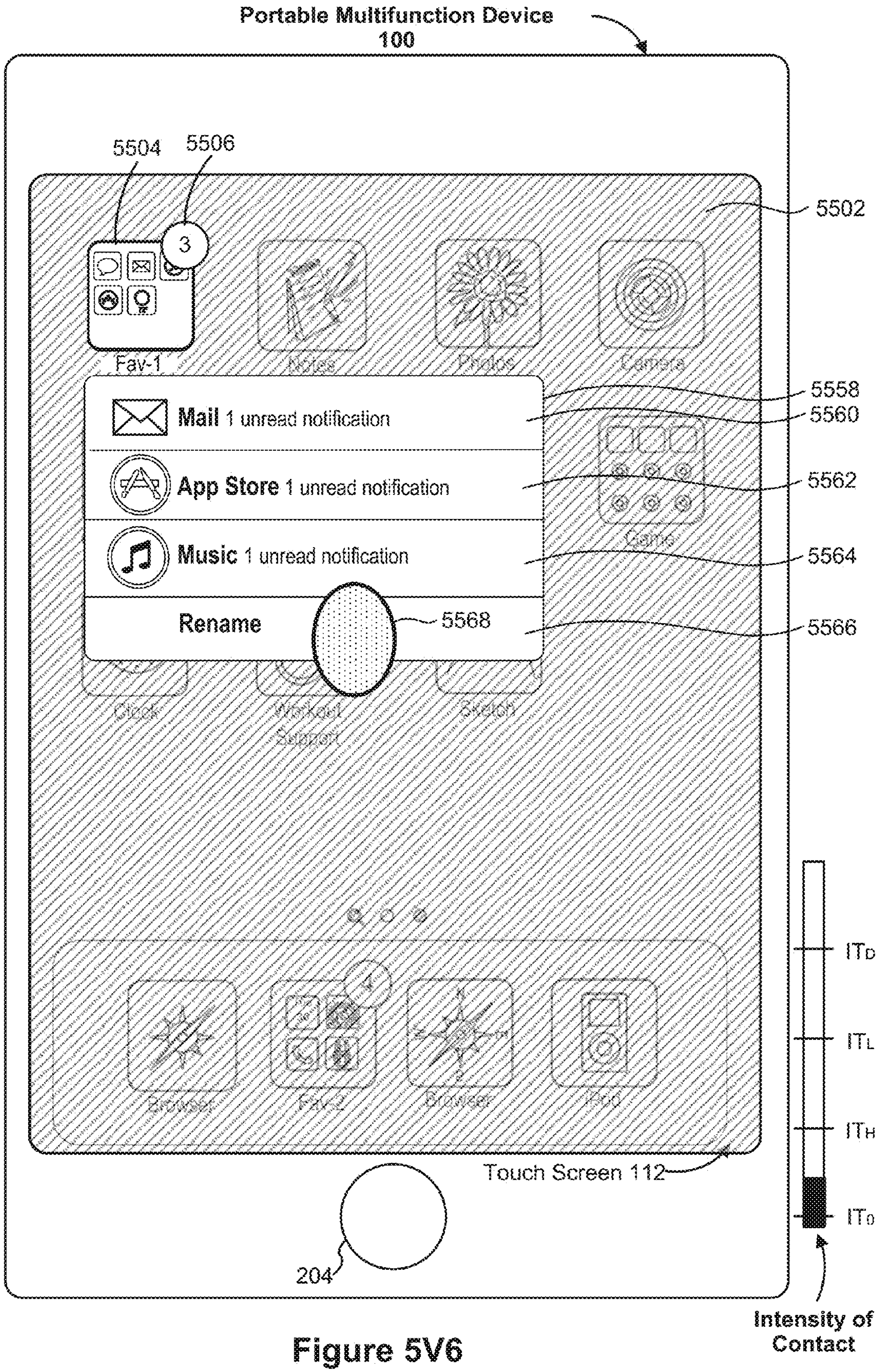
Figure 5V6

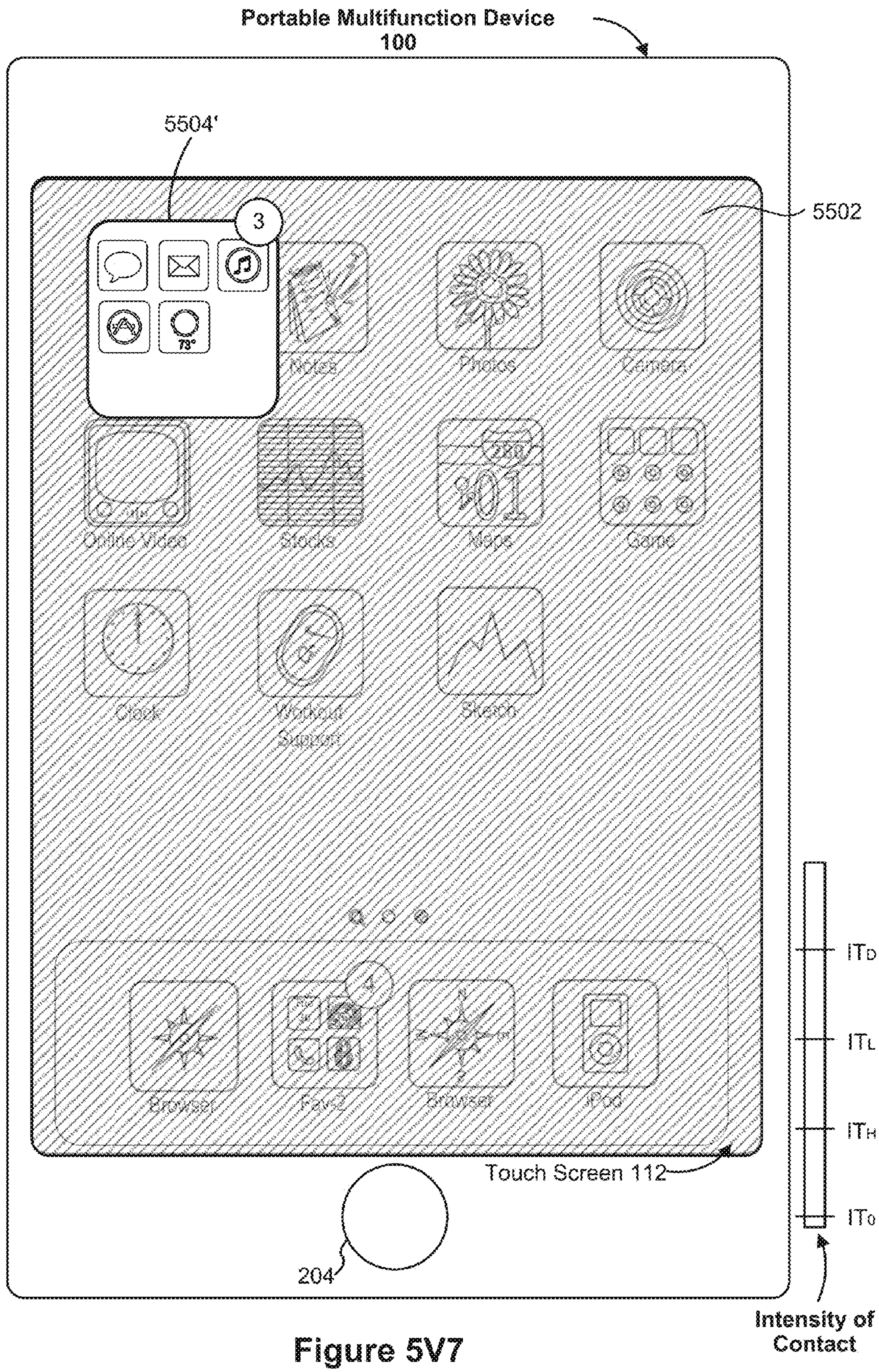
Figure 5V7

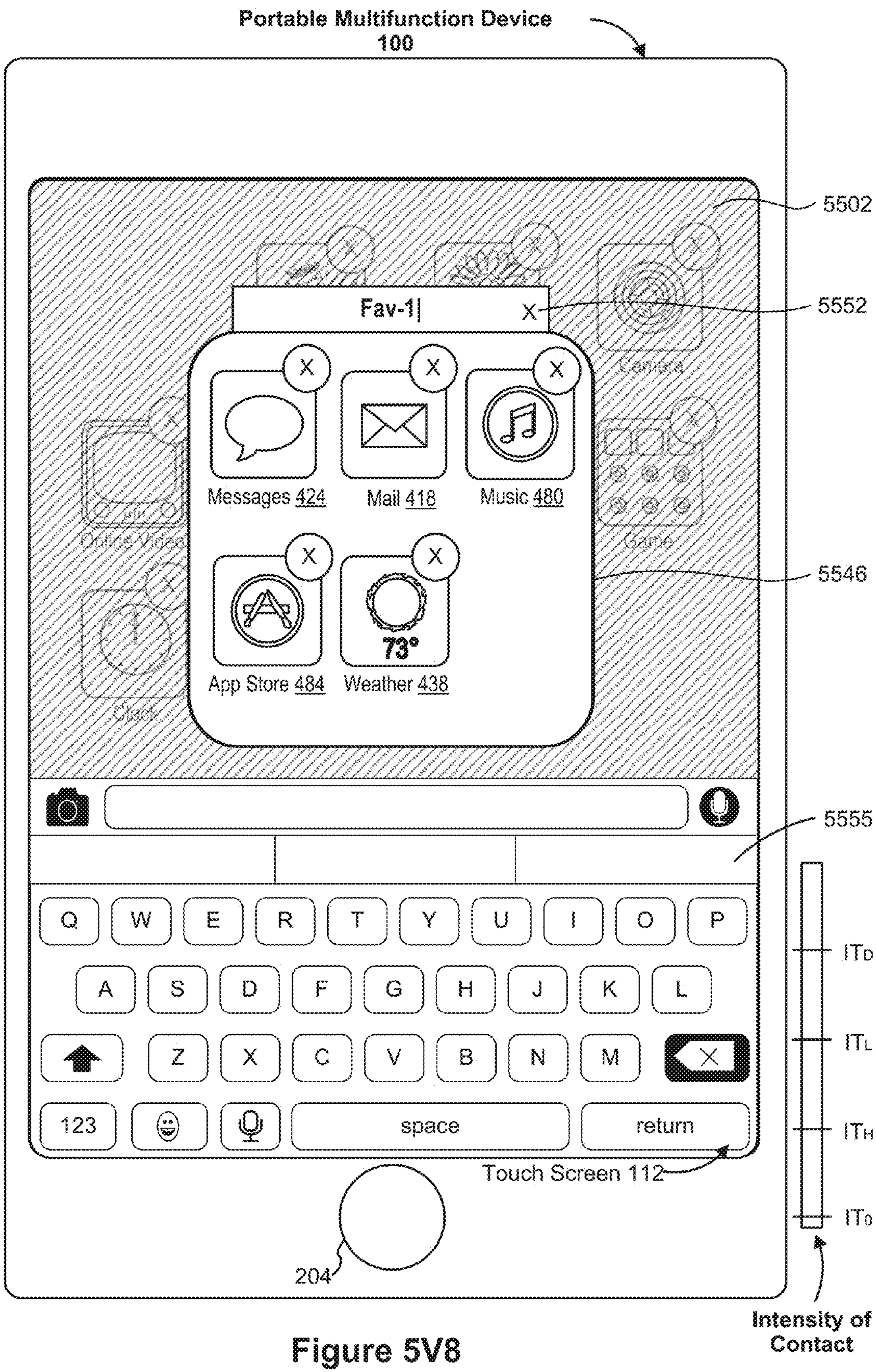
Figure 5V8

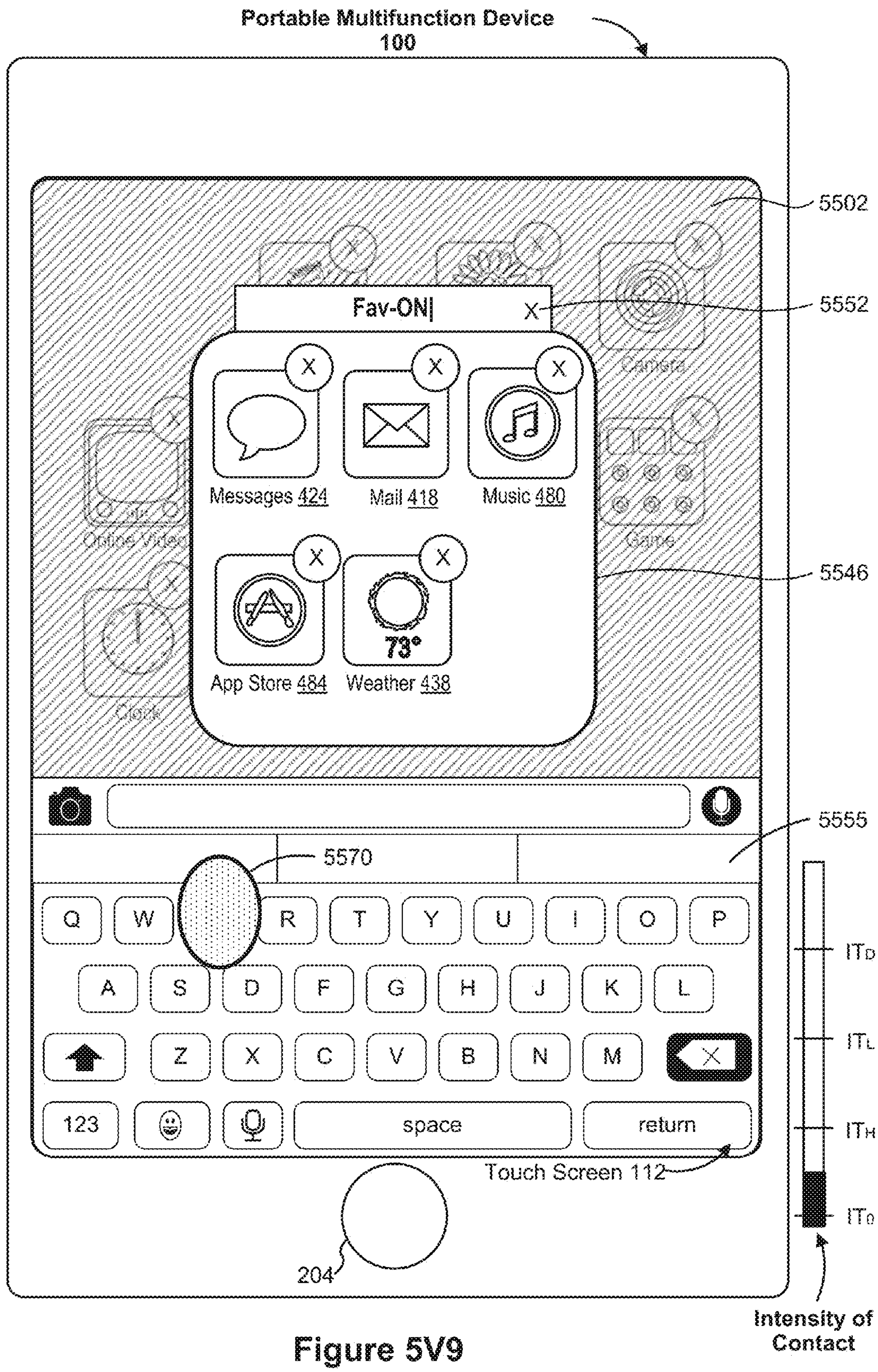
Figure 5V9

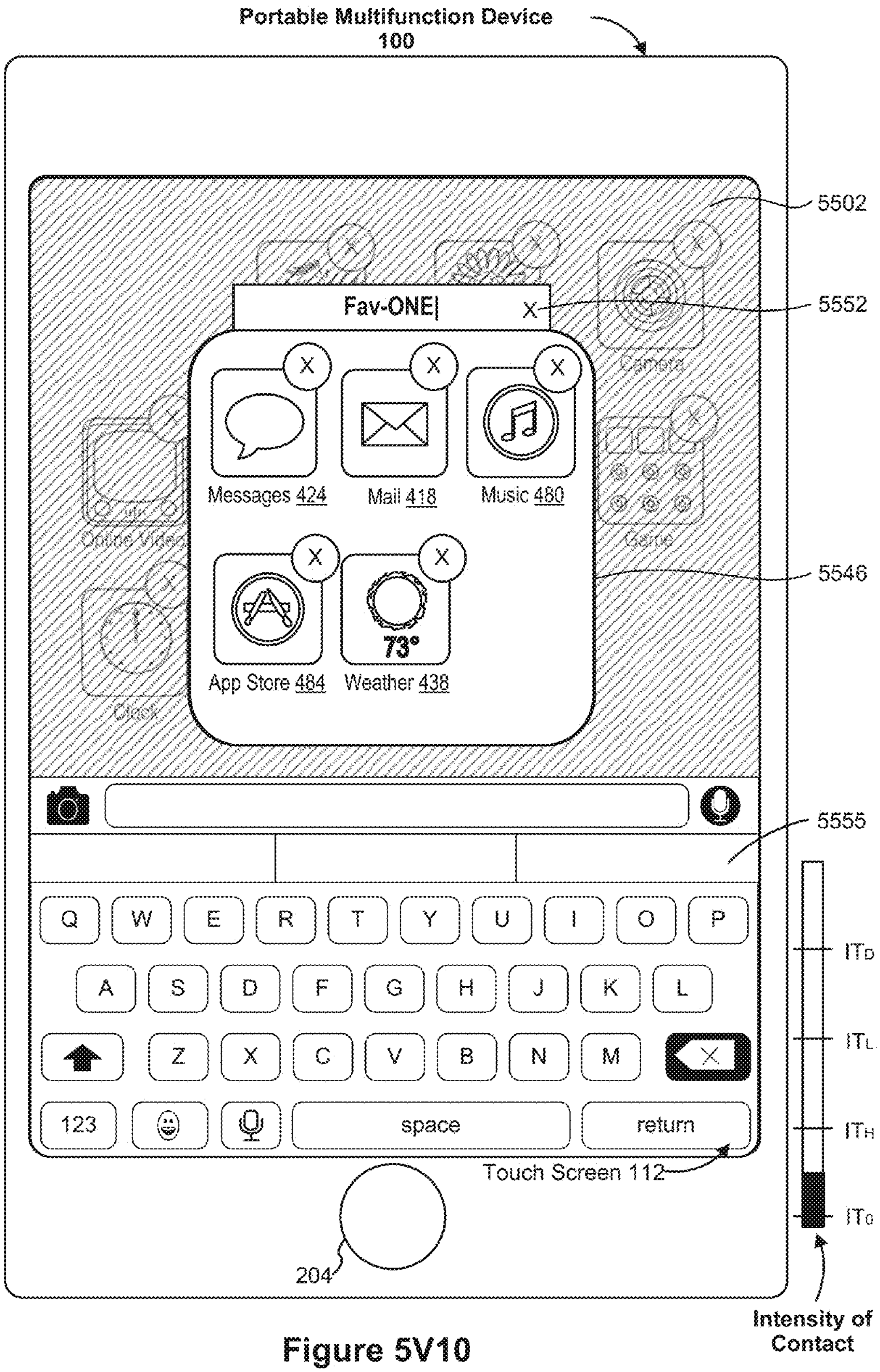
Figure 5V10

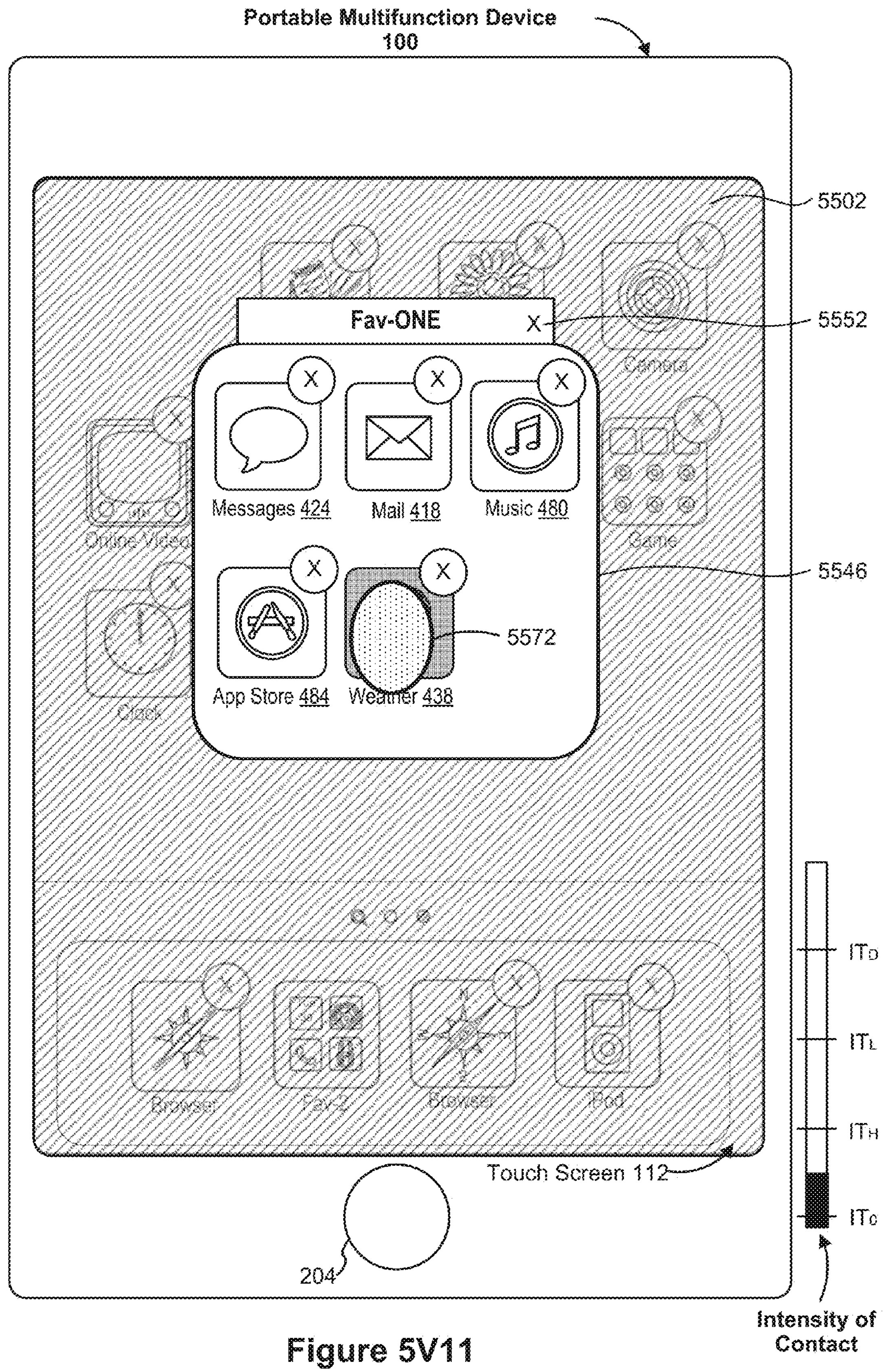
Figure 5V11

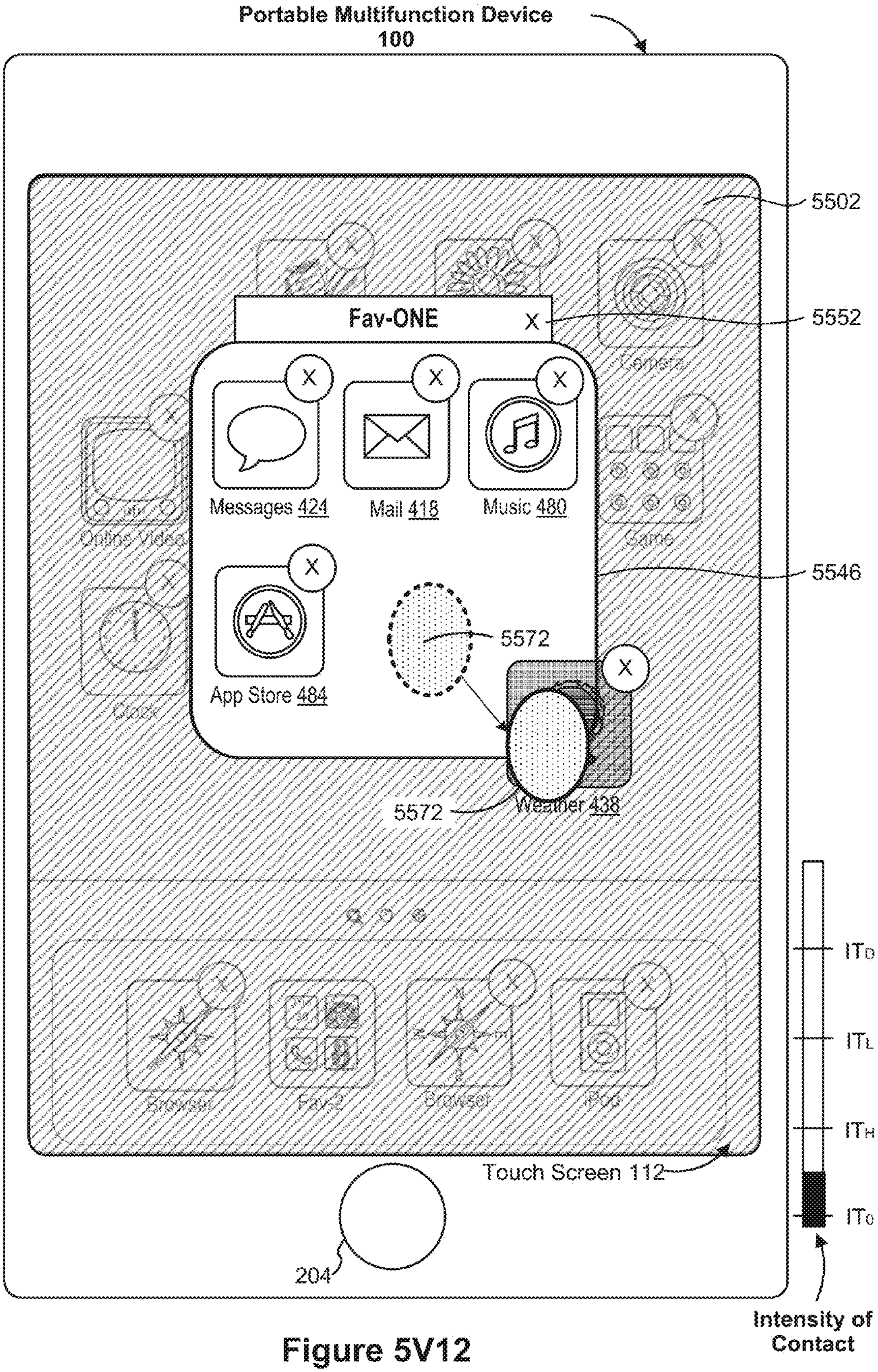
Figure 5V12

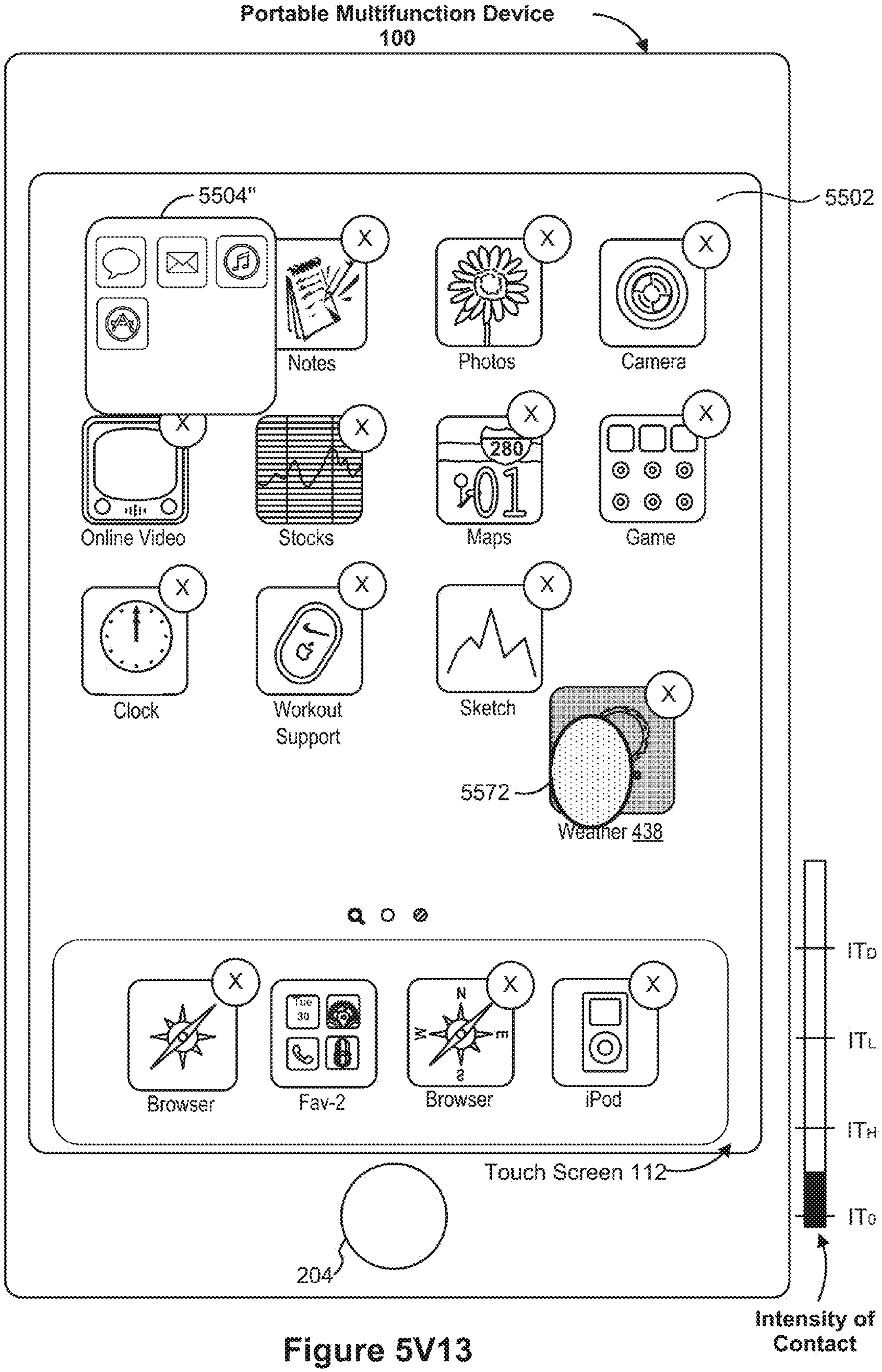
Figure 5V13

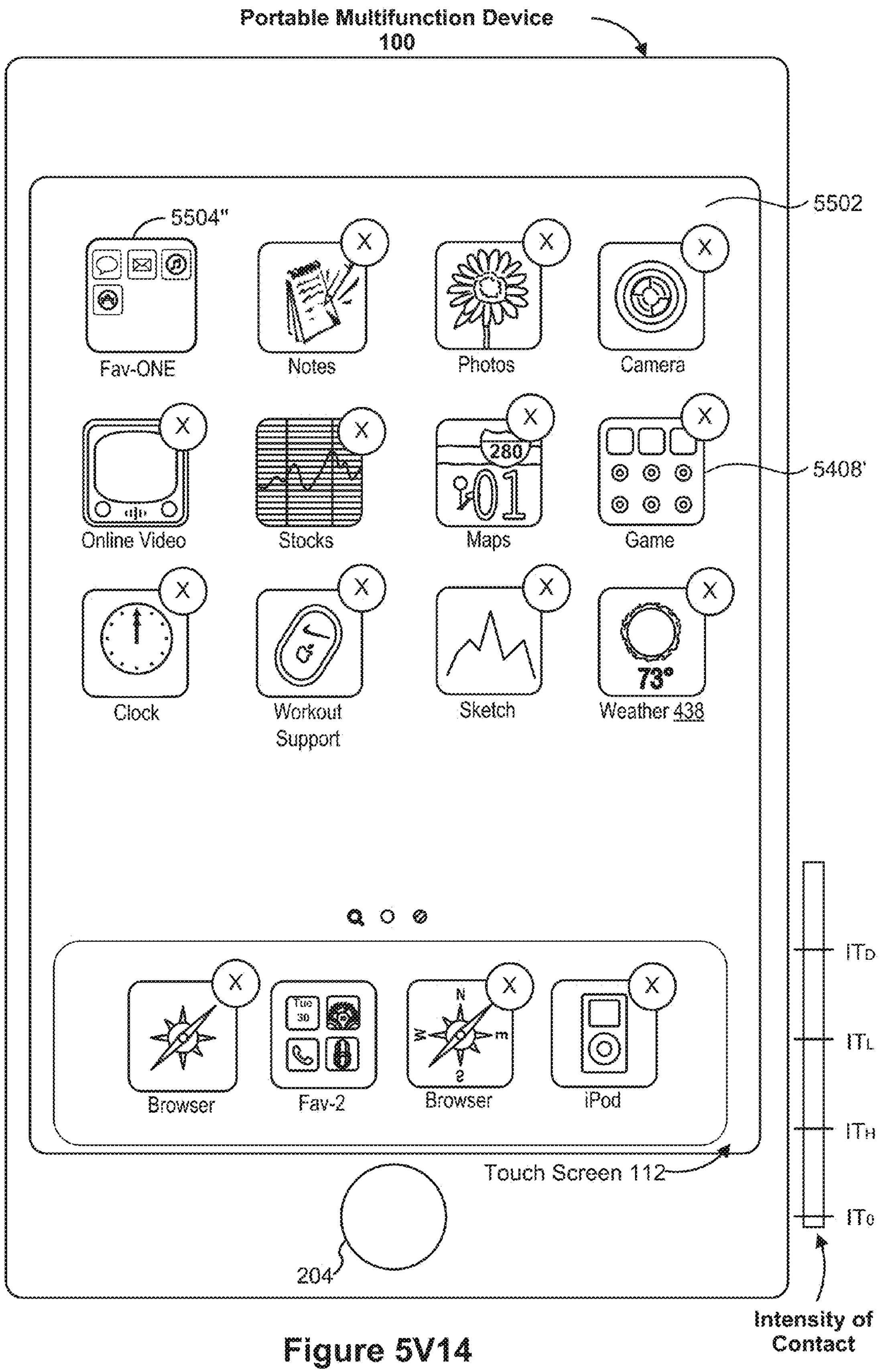
Figure 5V14

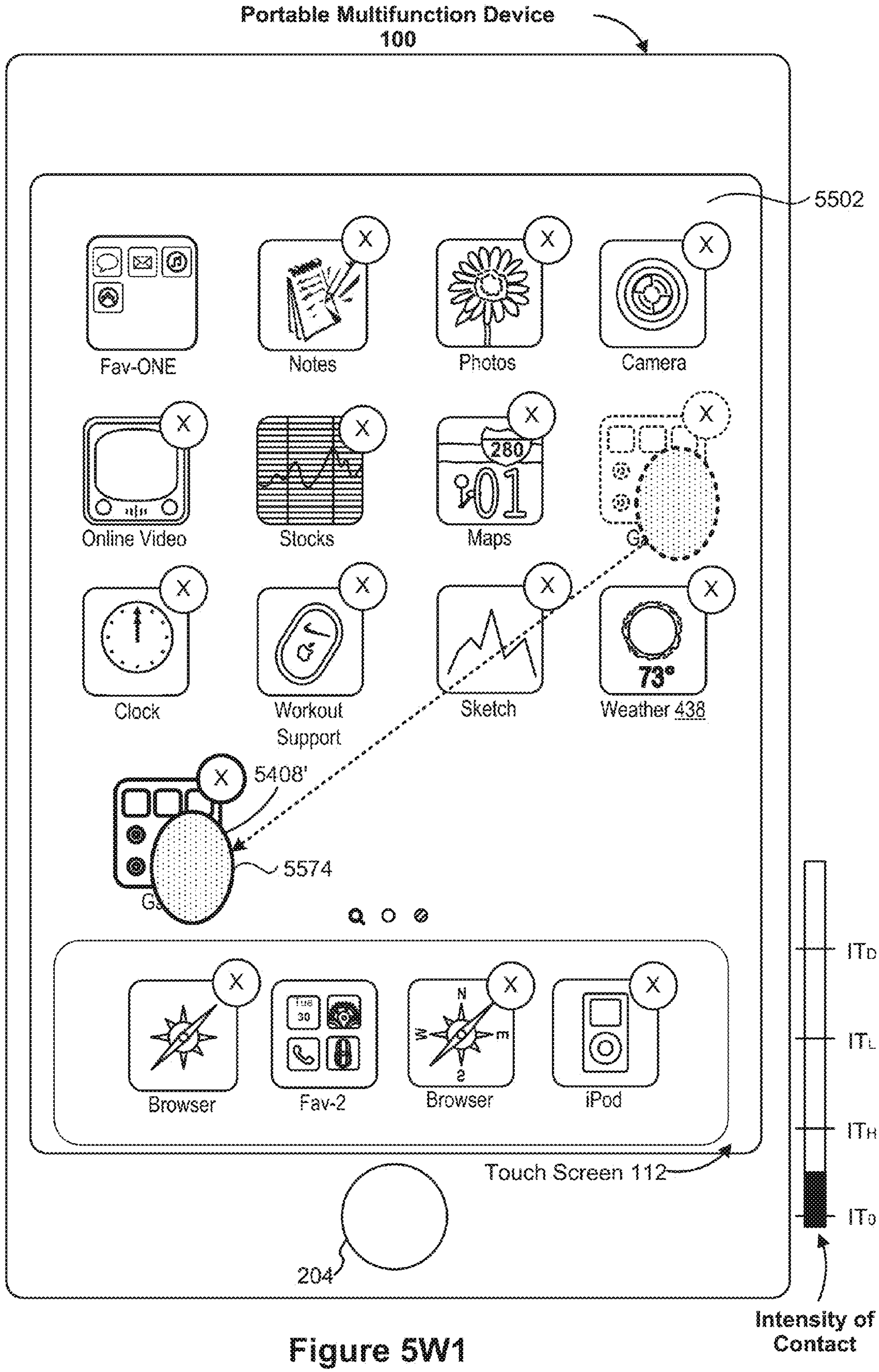
Figure 5W1

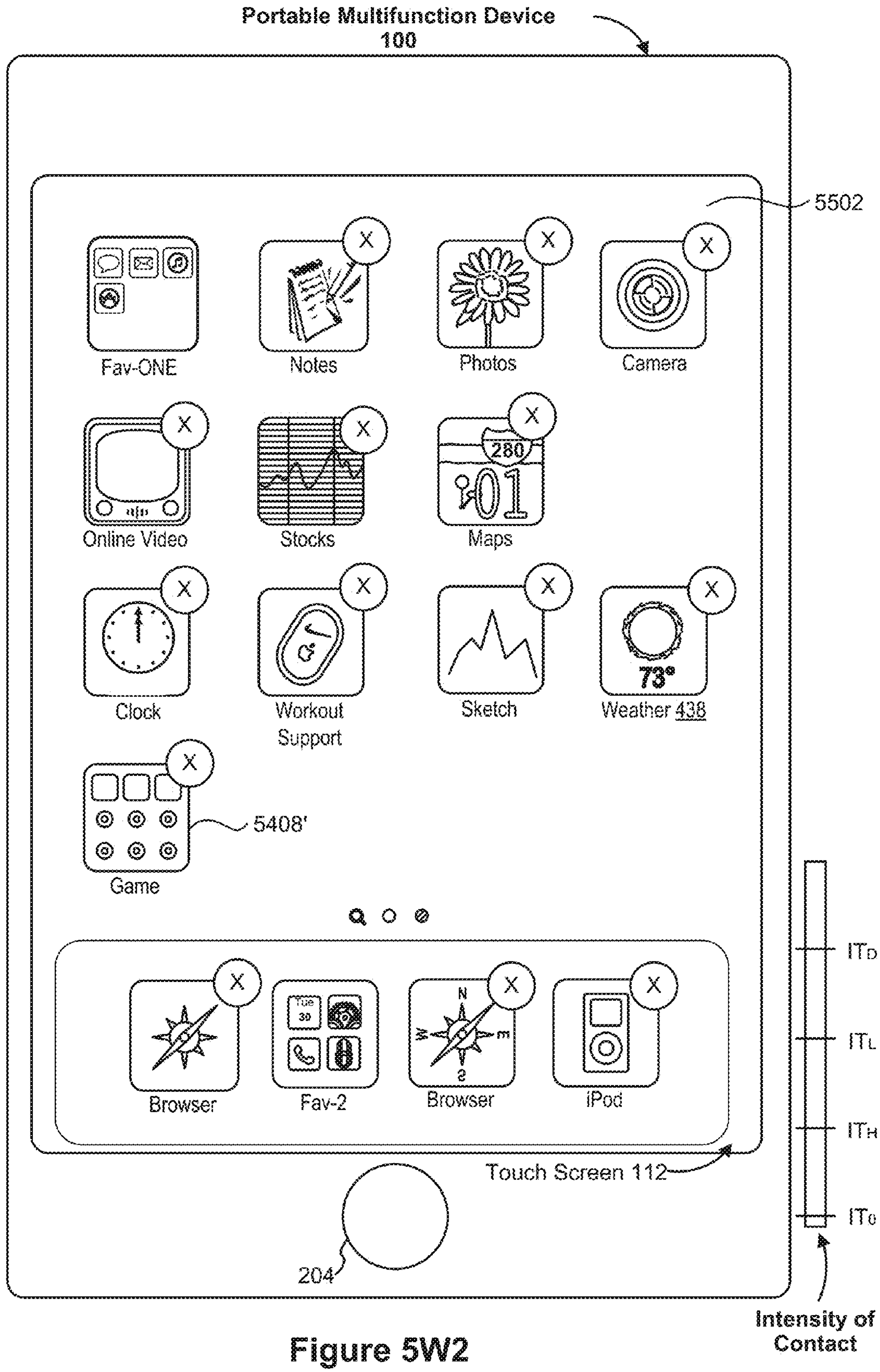
Figure 5W2

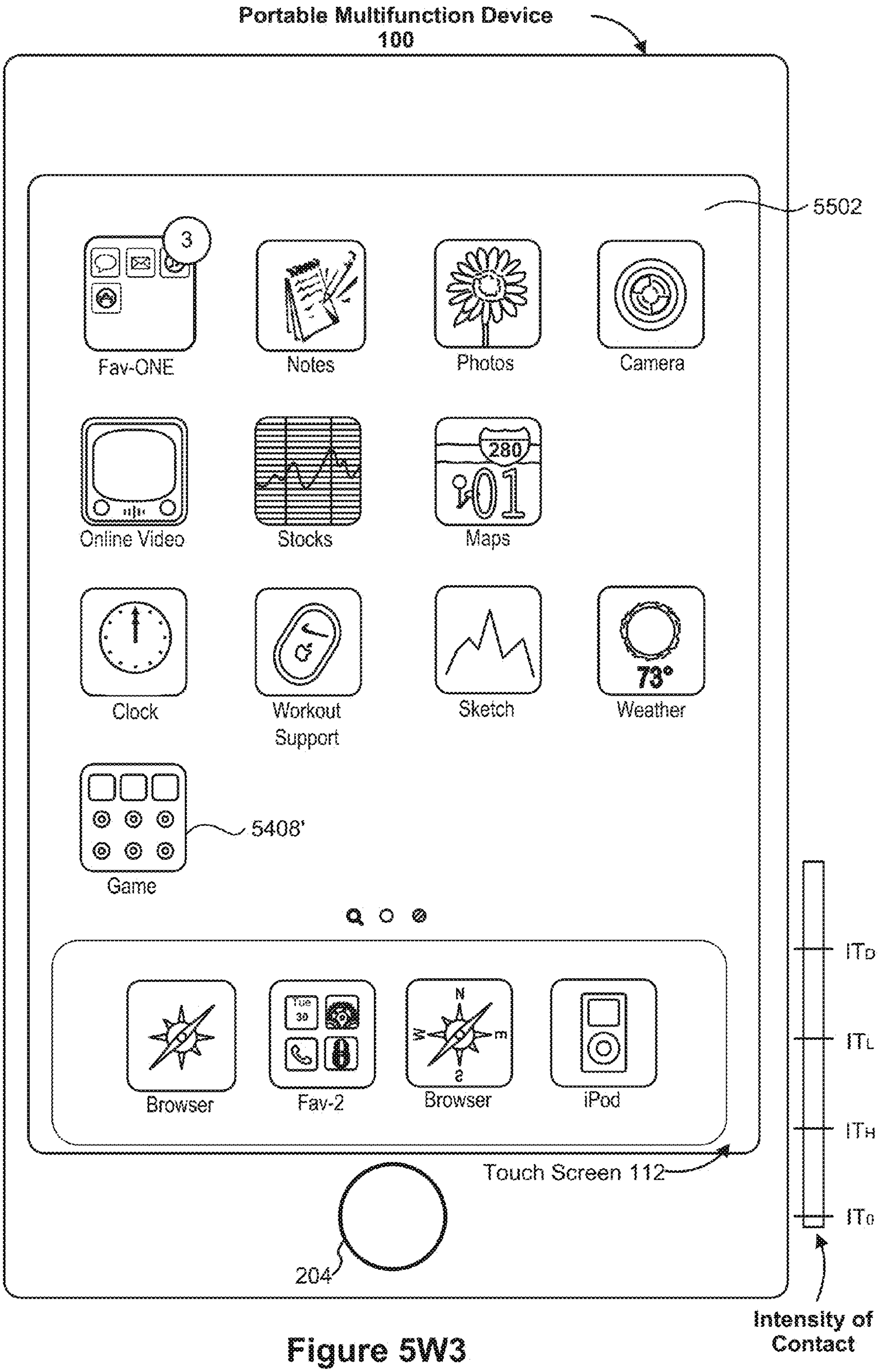
Figure 5W3

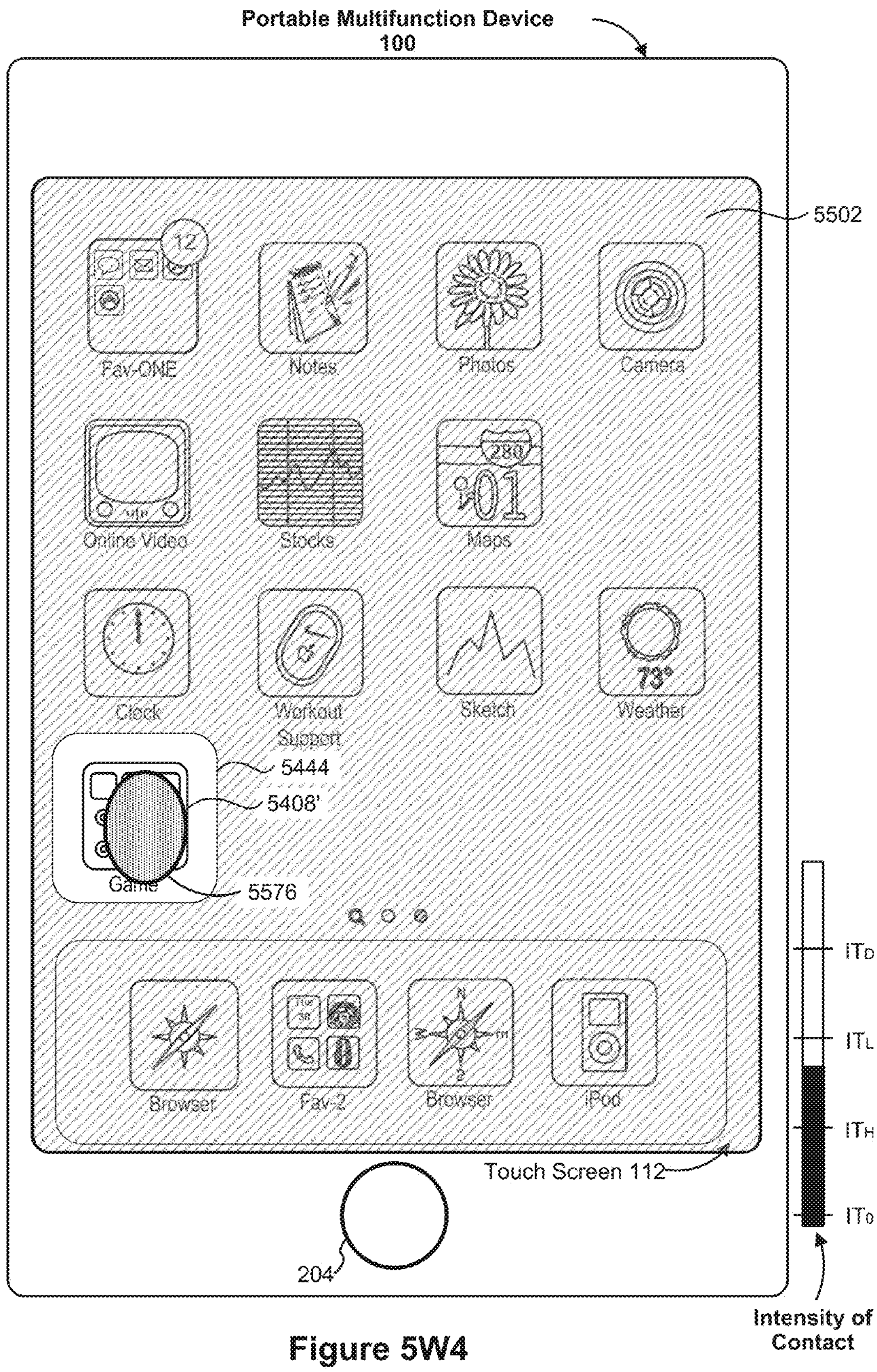
Figure 5W4

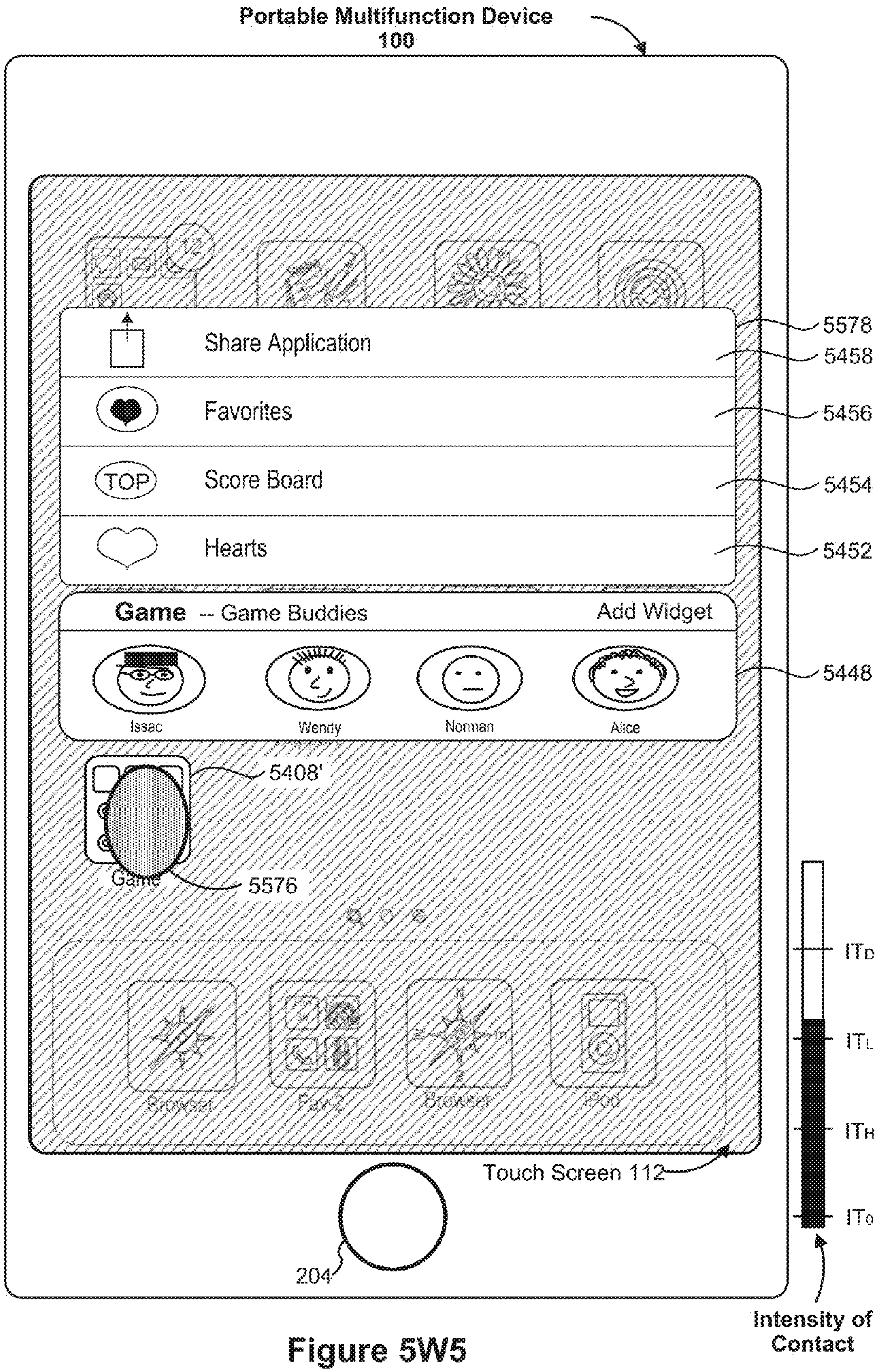
Figure 5W5

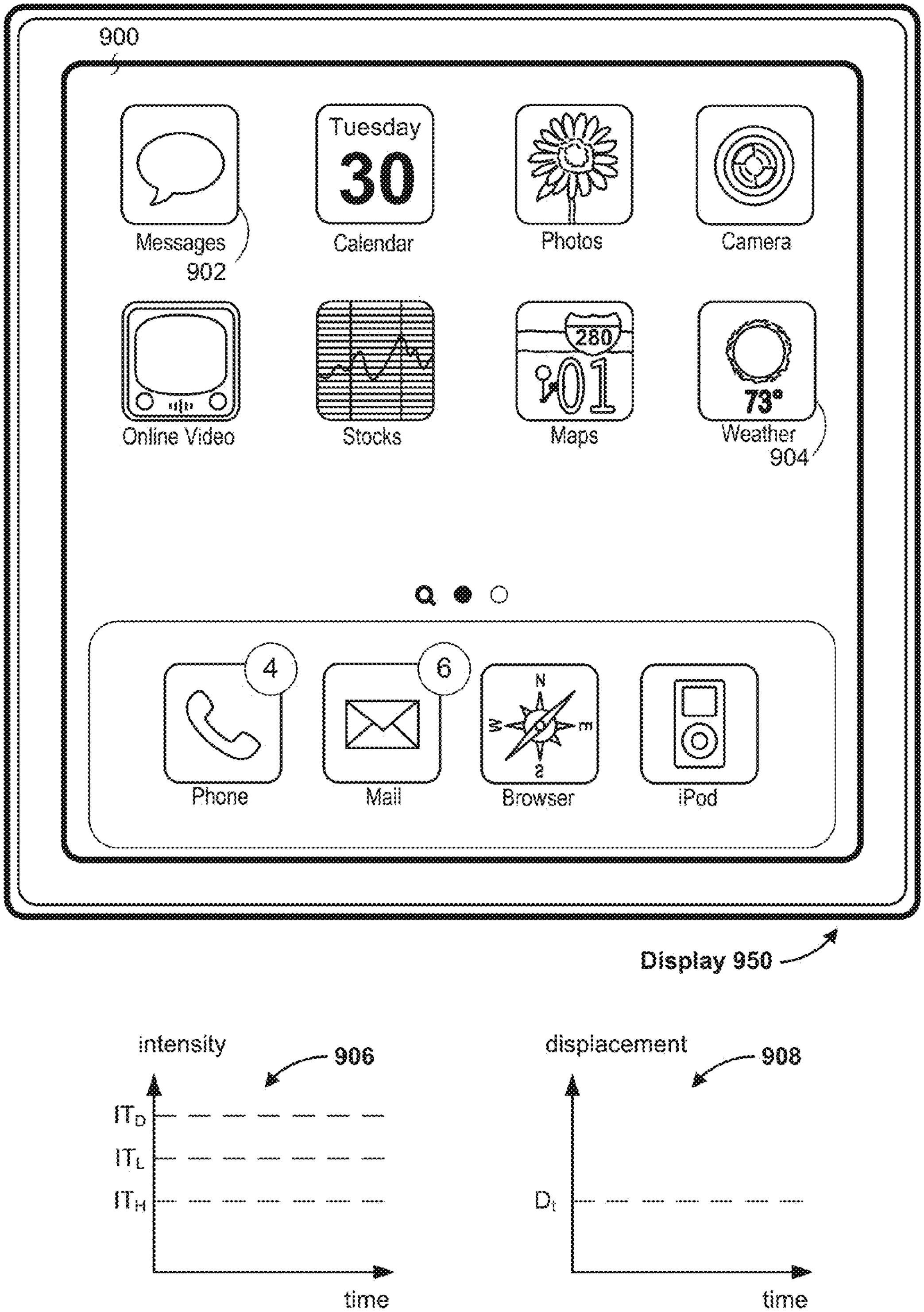
Figure 9A1

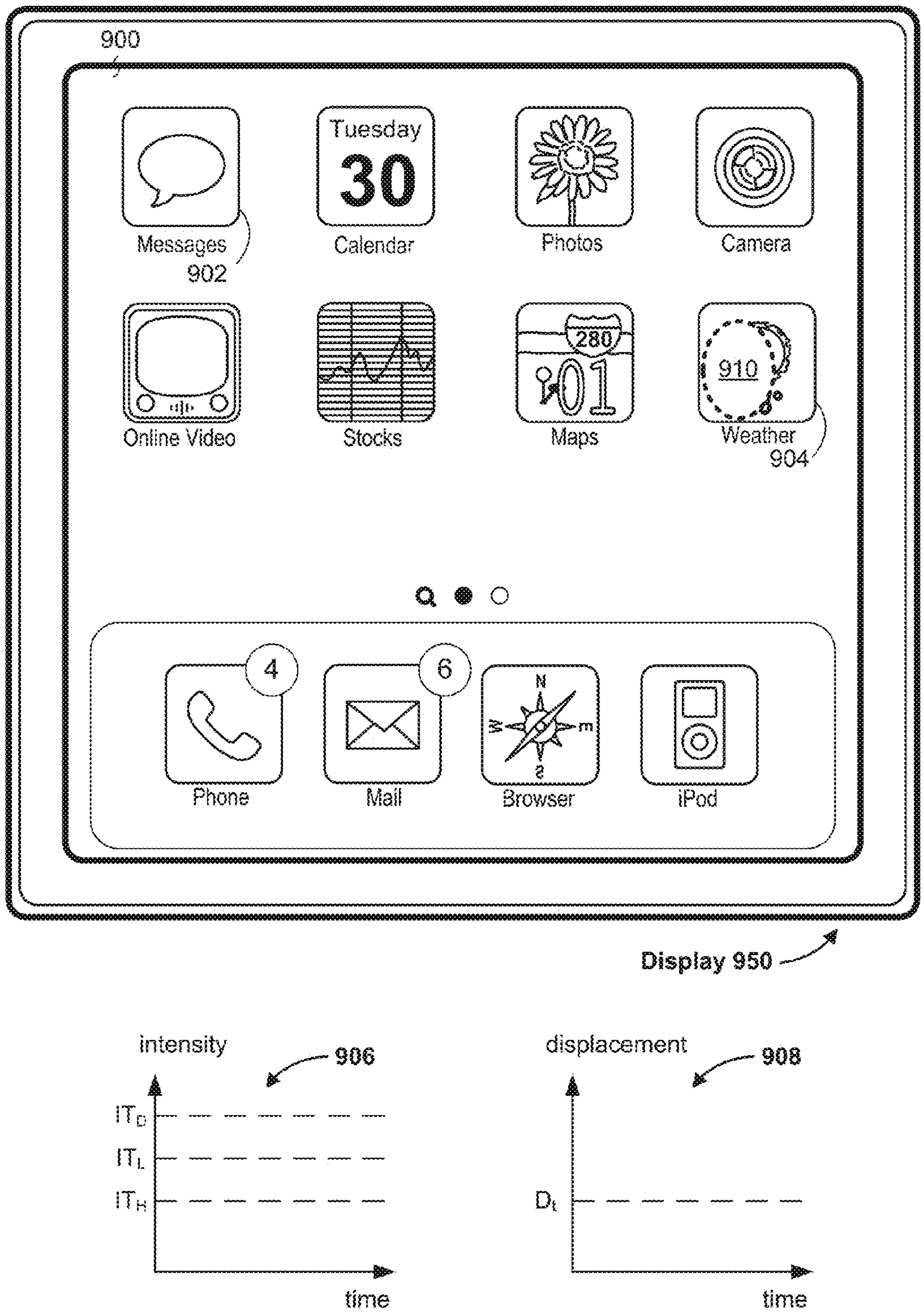
Figure 9A2

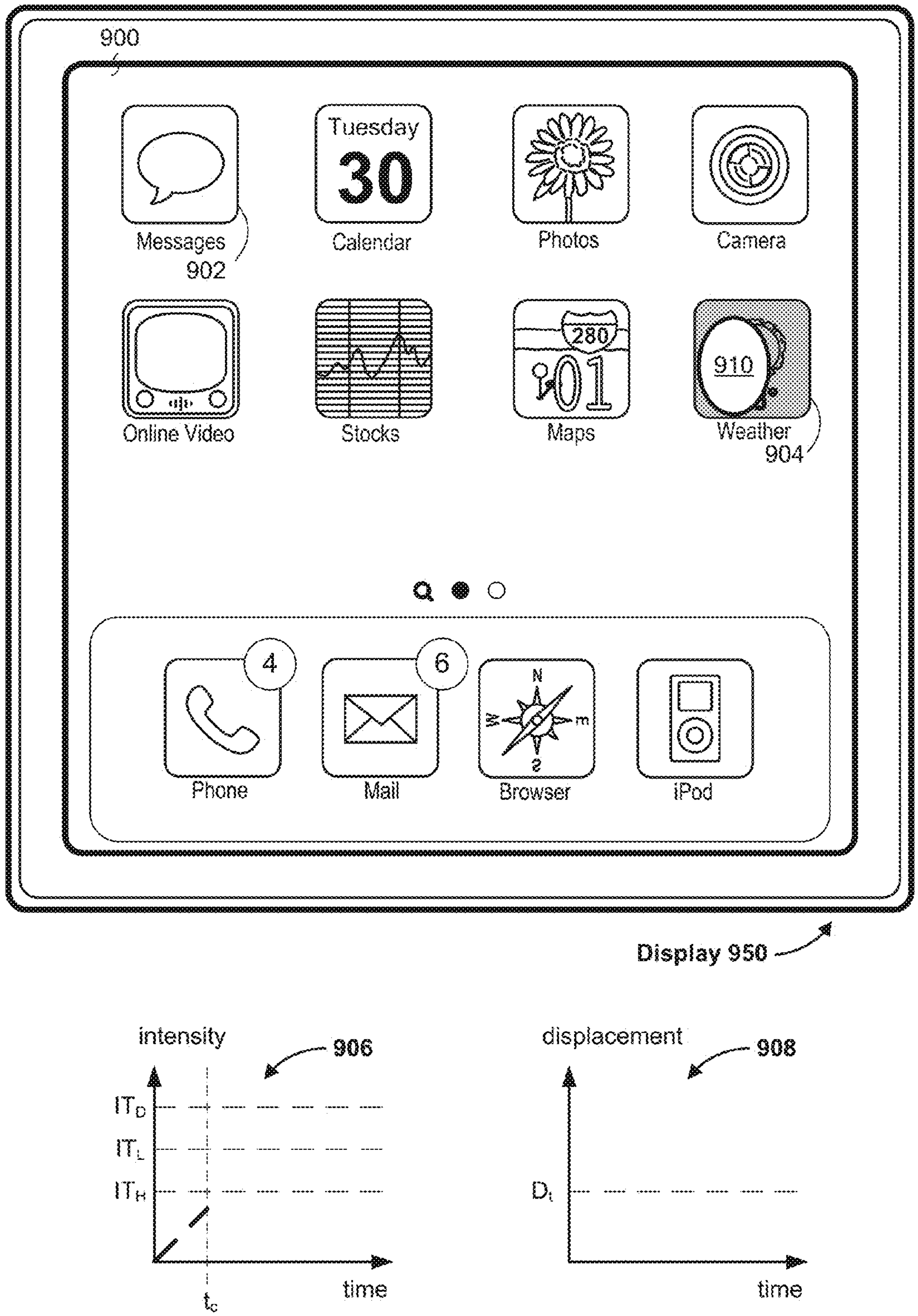
Figure 9A3

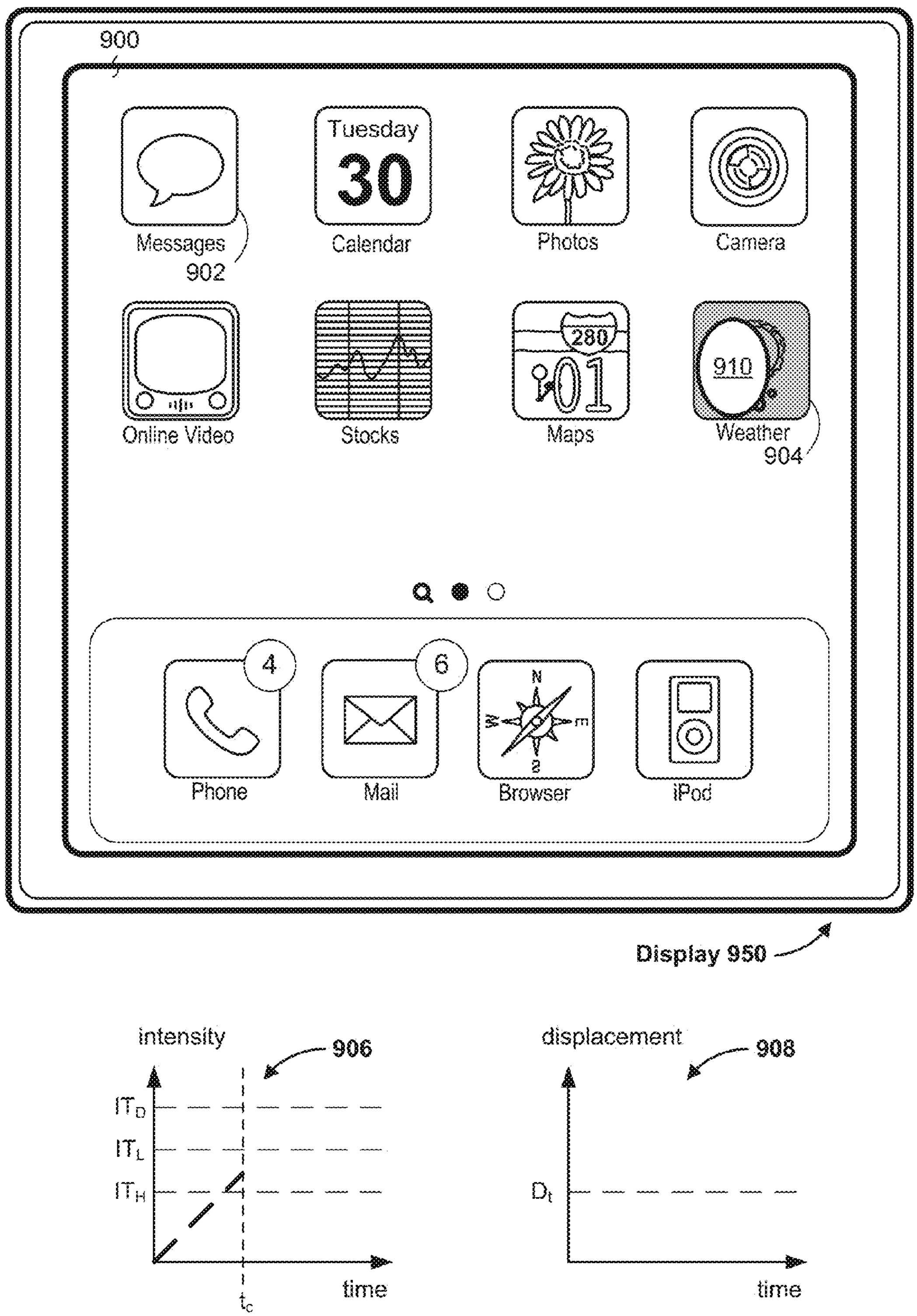
Figure 9A4

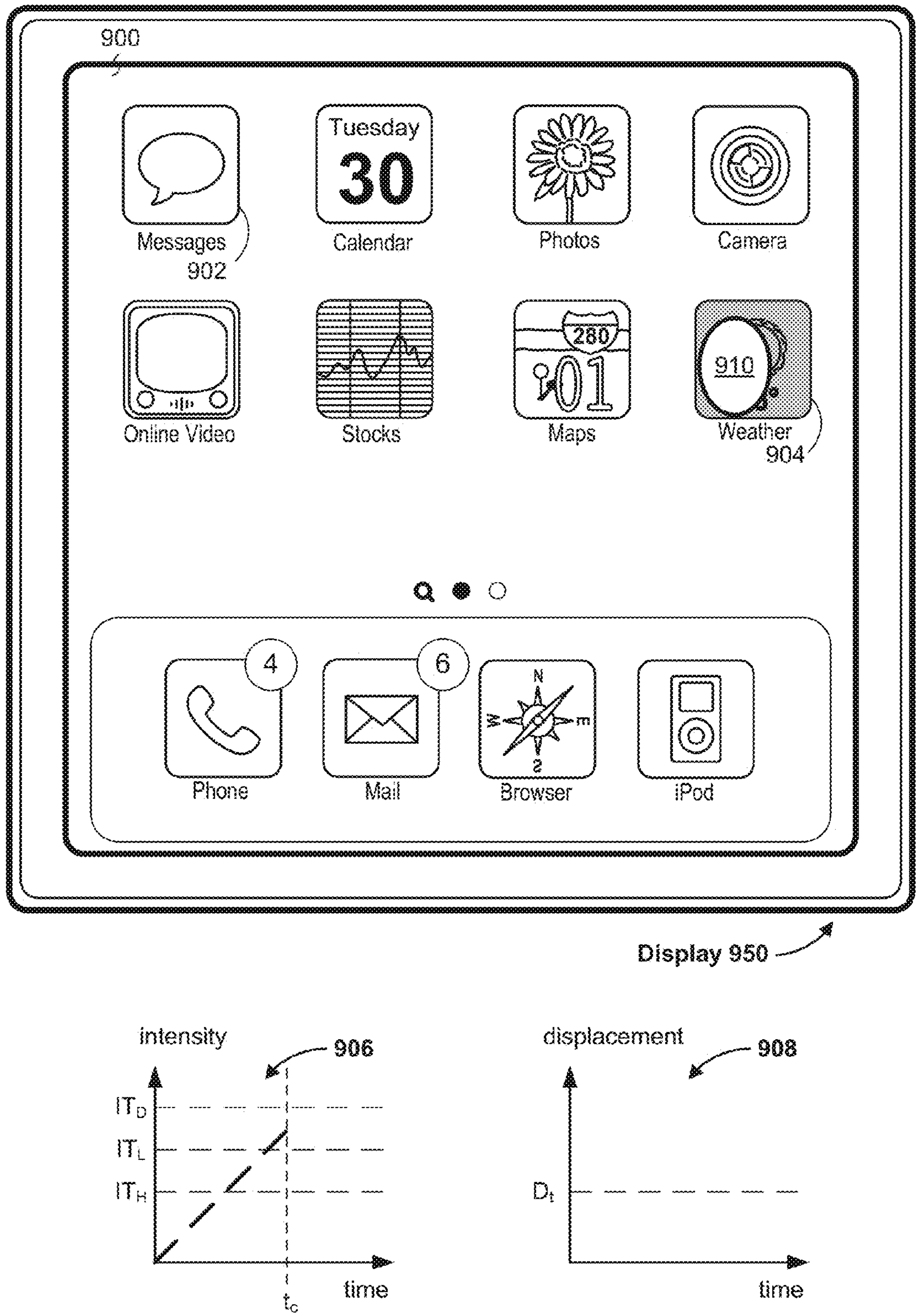
Figure 9A5

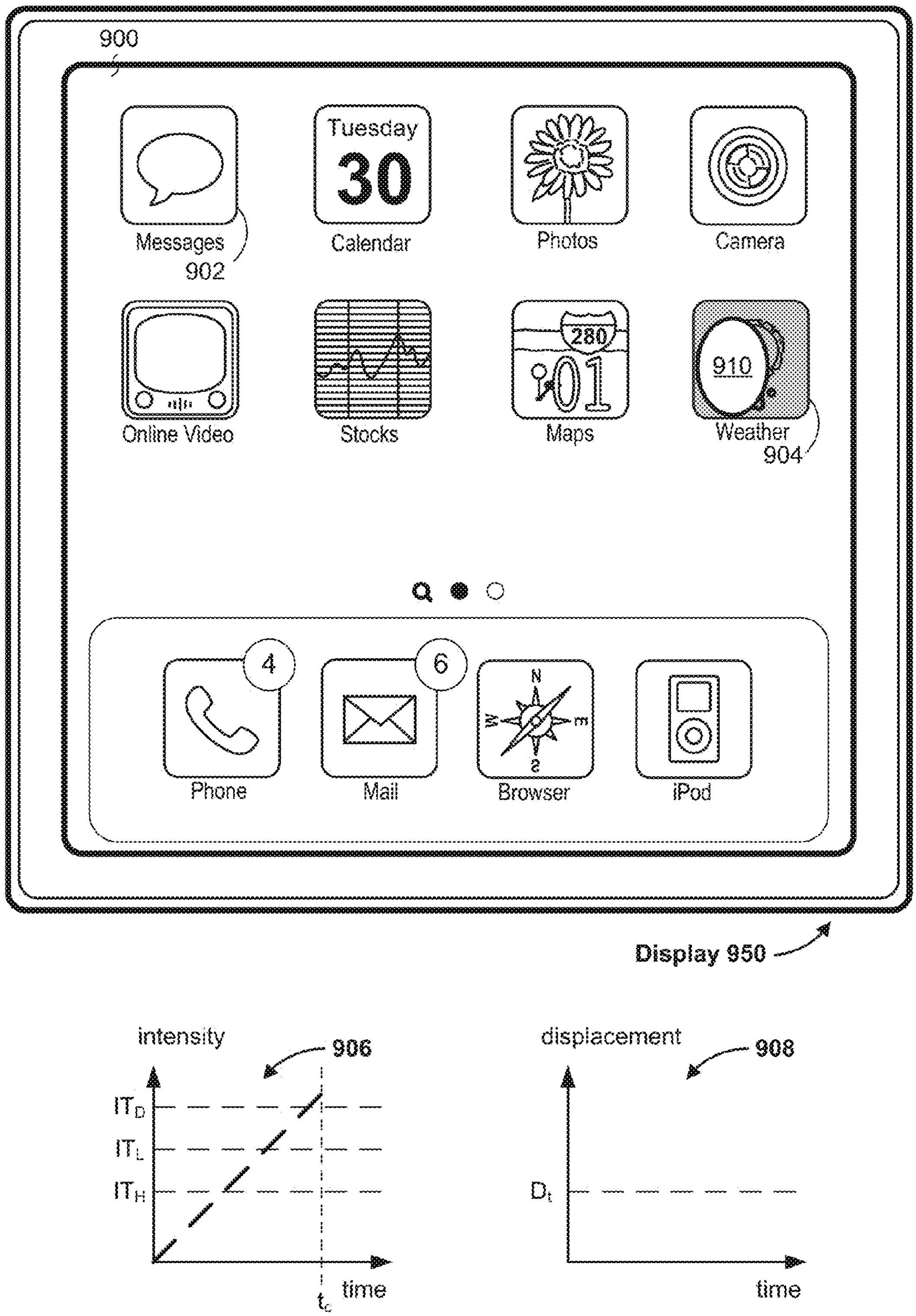
Figure 9A6

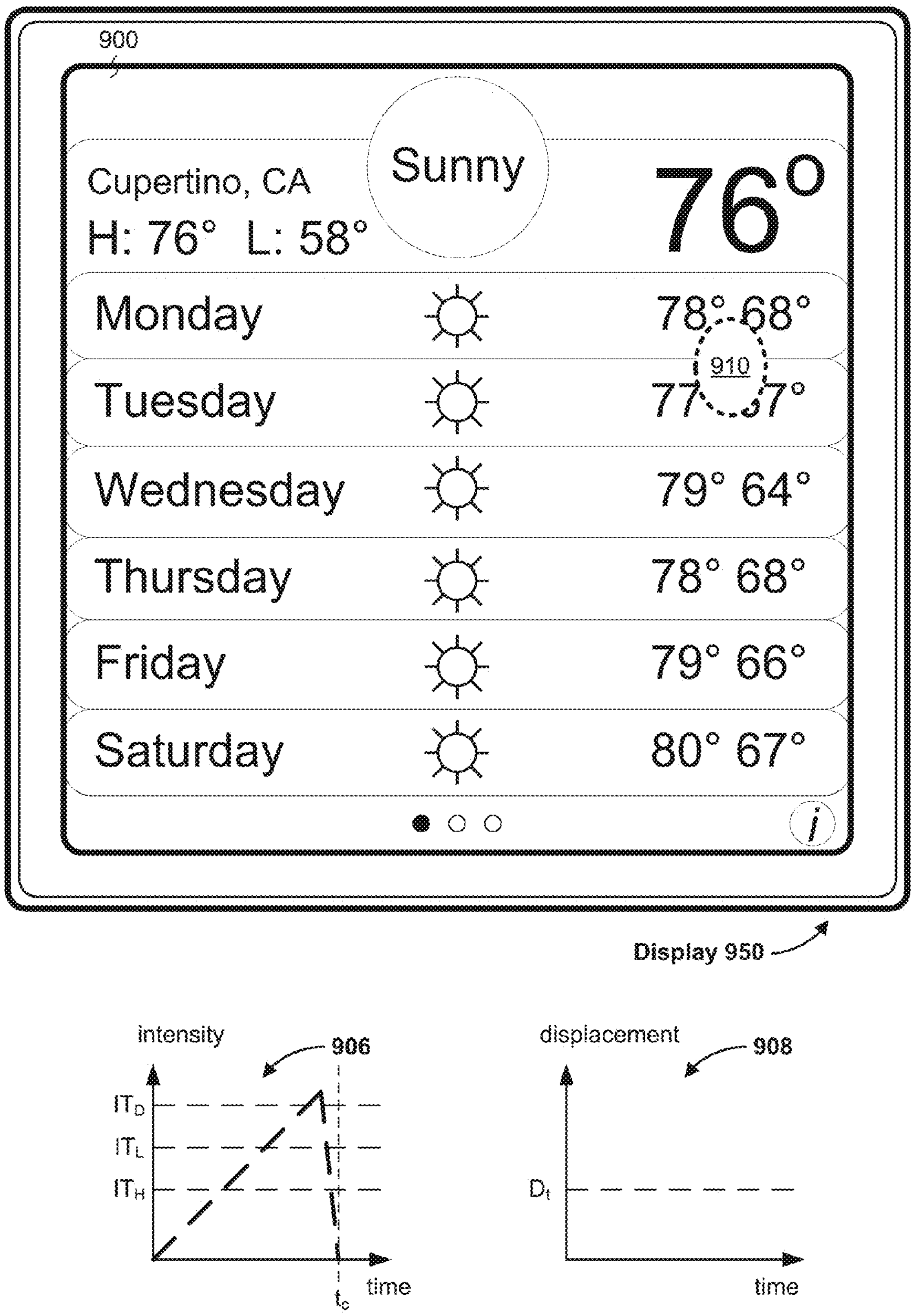
Figure 9A7

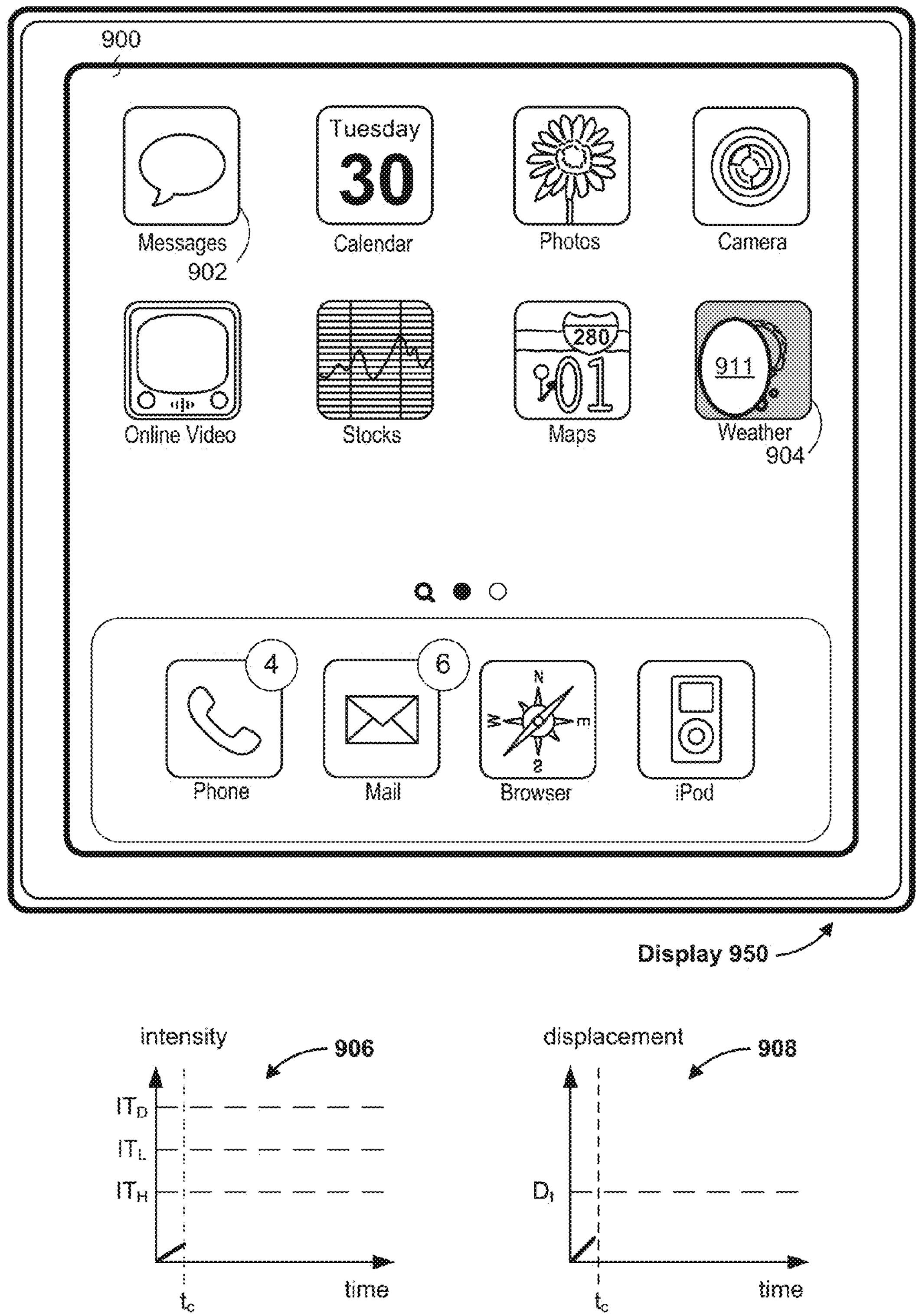
Figure 9A8

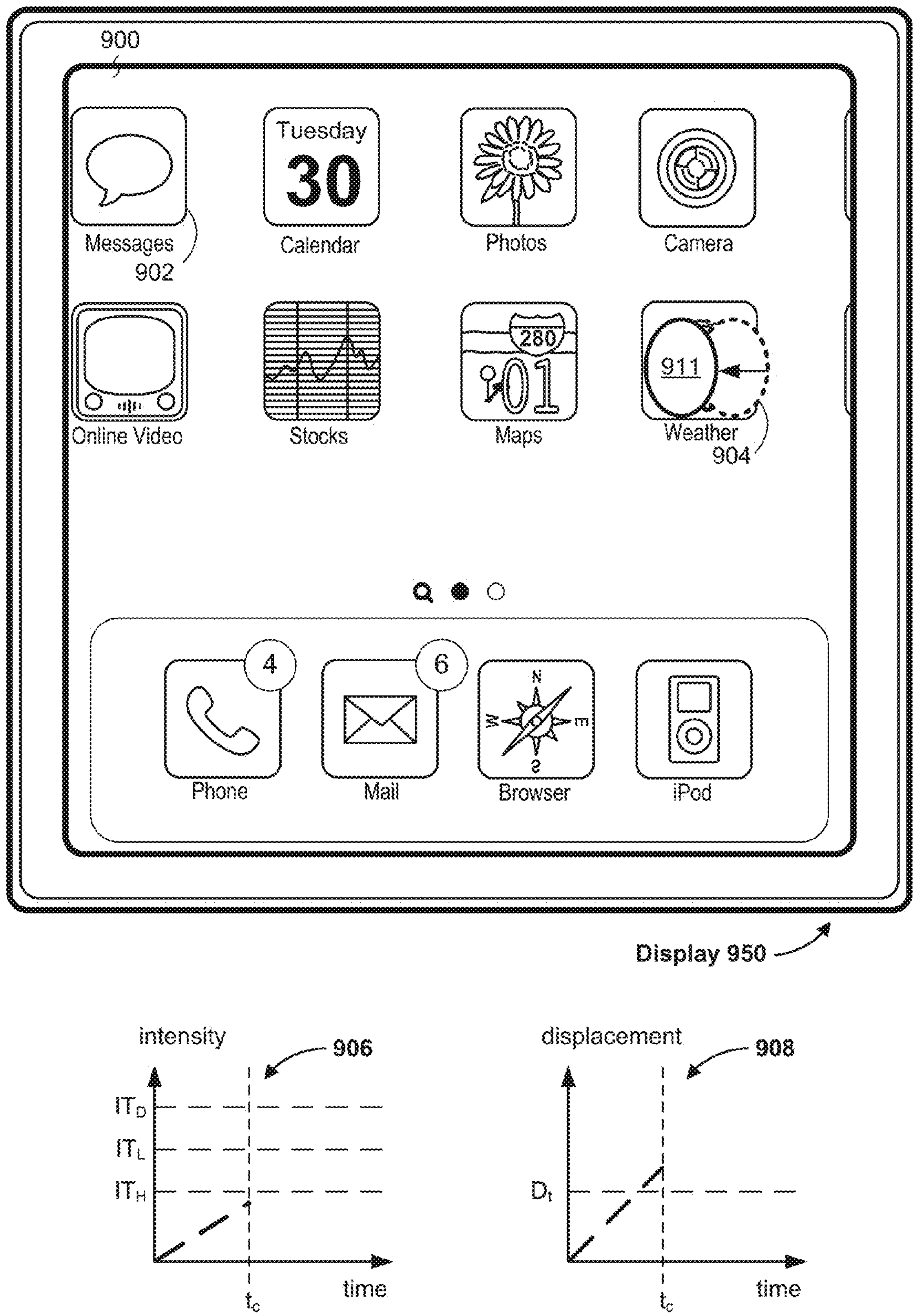
Figure 9A9

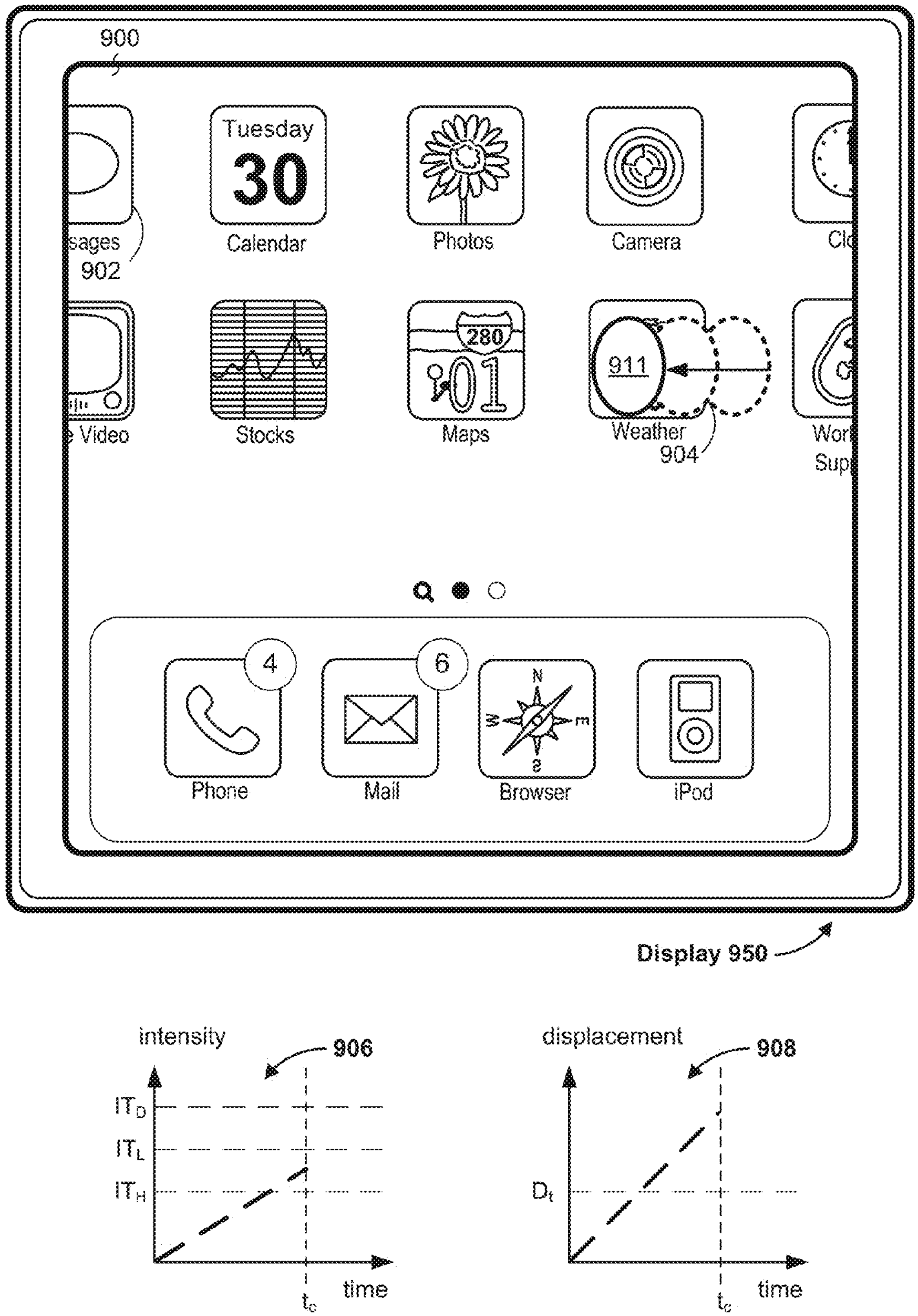
Figure 9A10

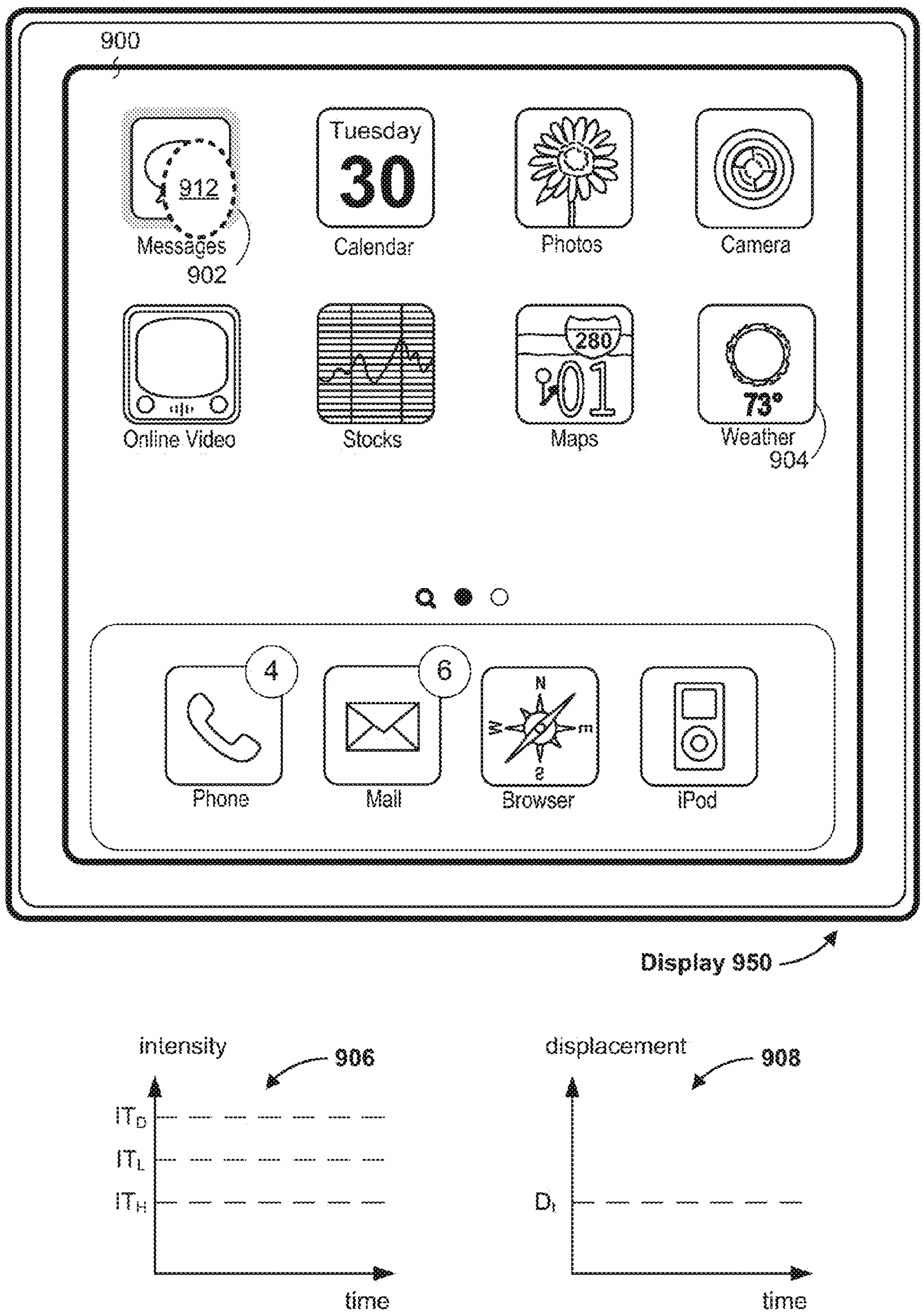
Figure 9A11

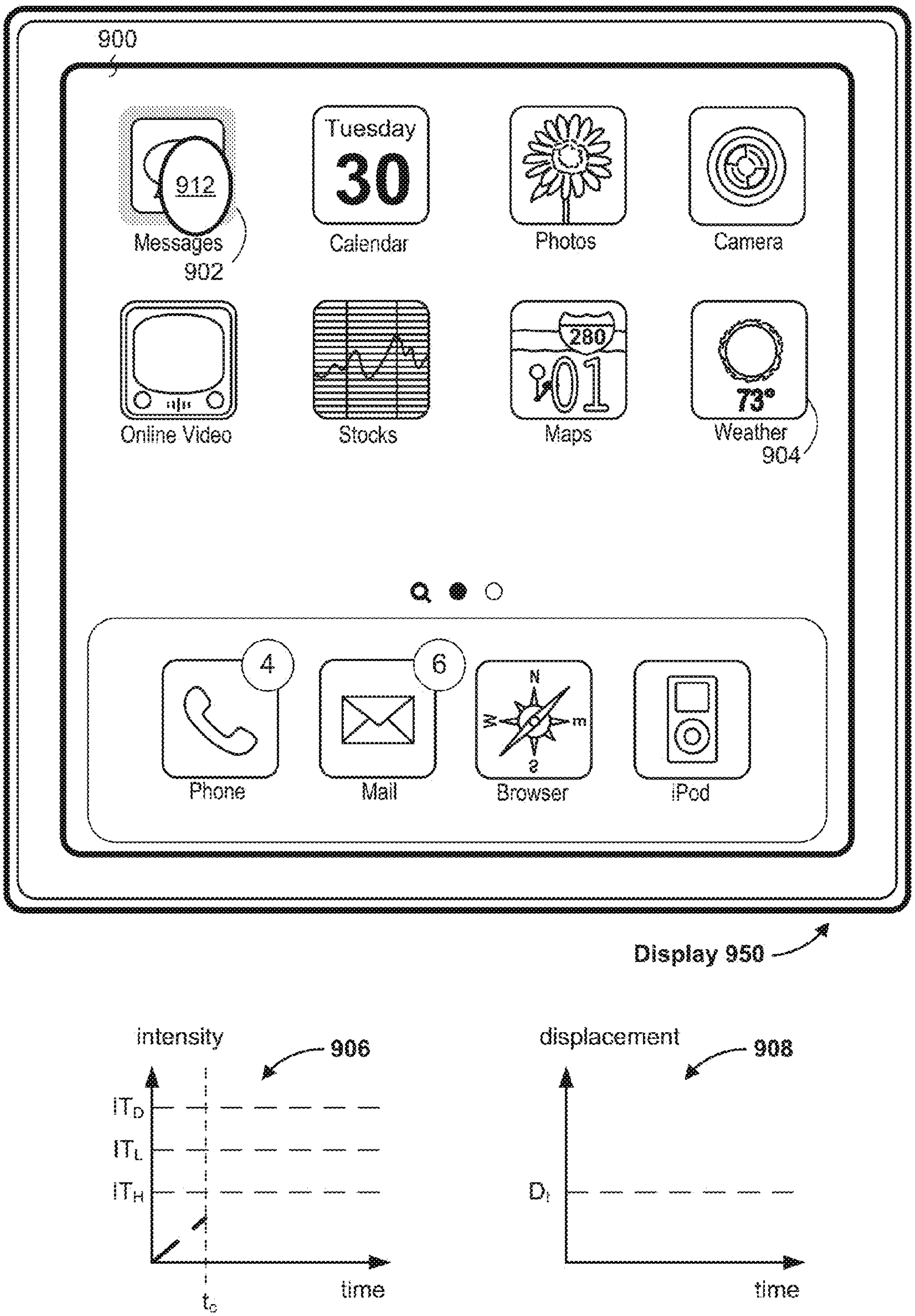
Figure 9A12

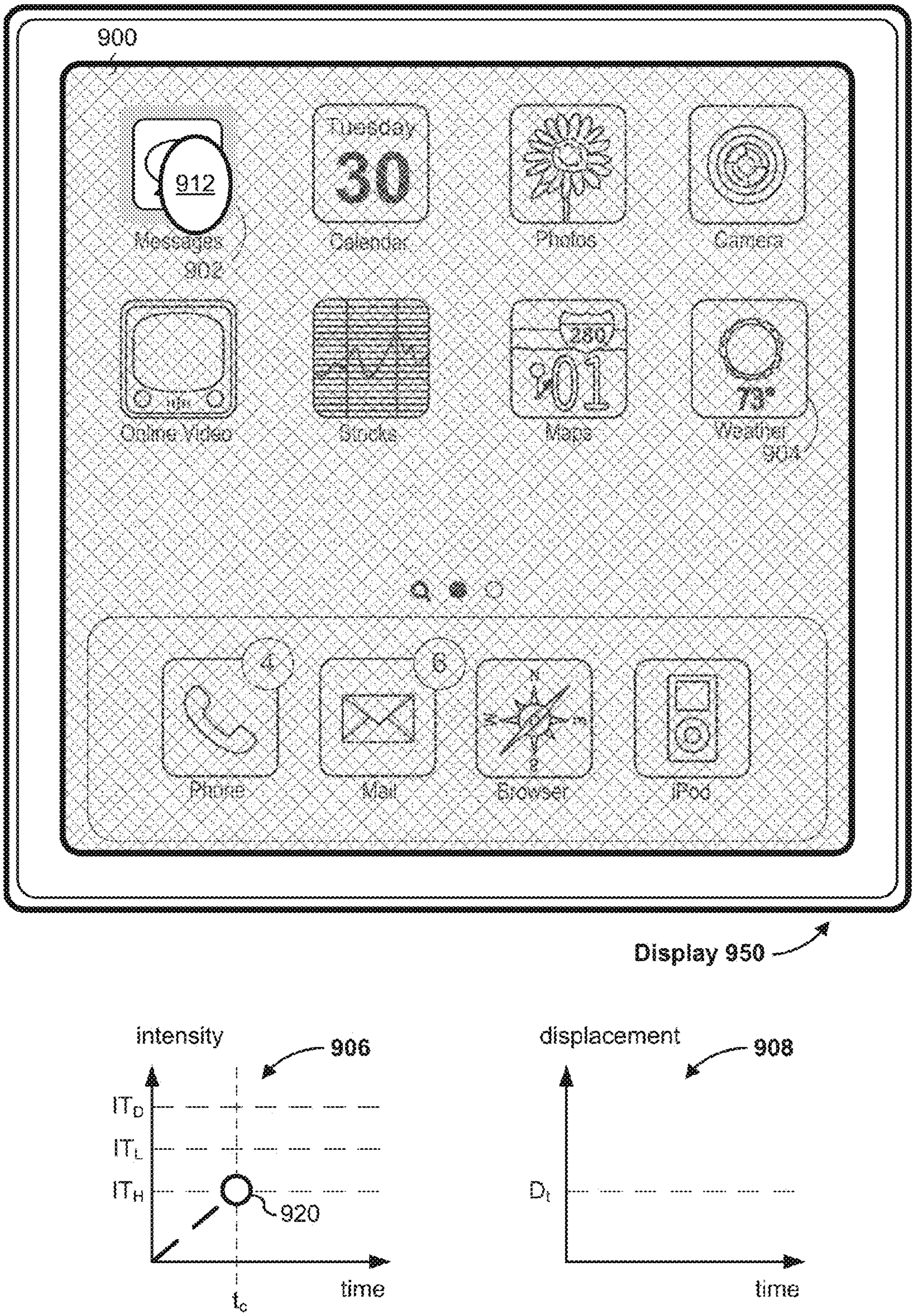
Figure 9A13

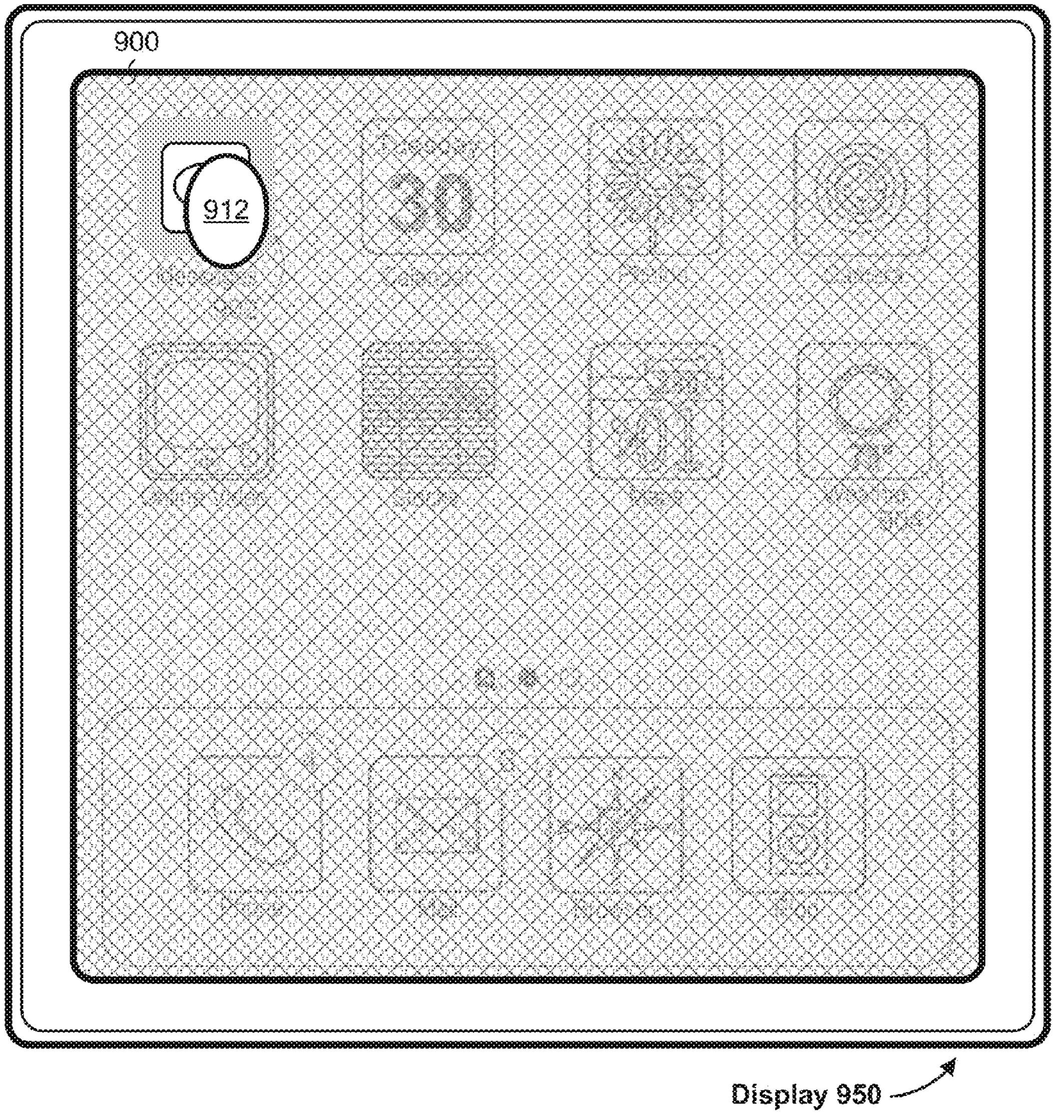
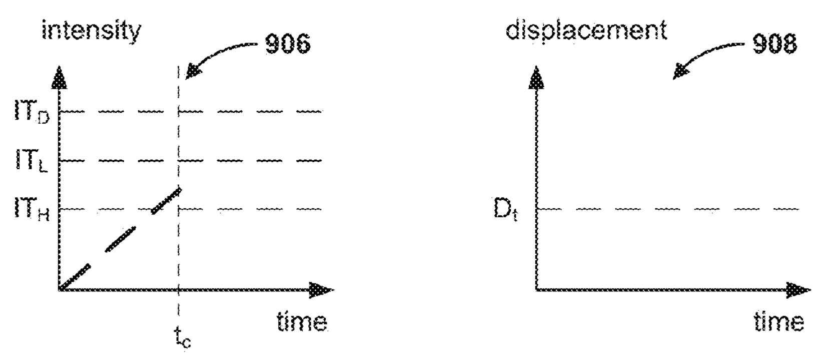
Figure 9A14

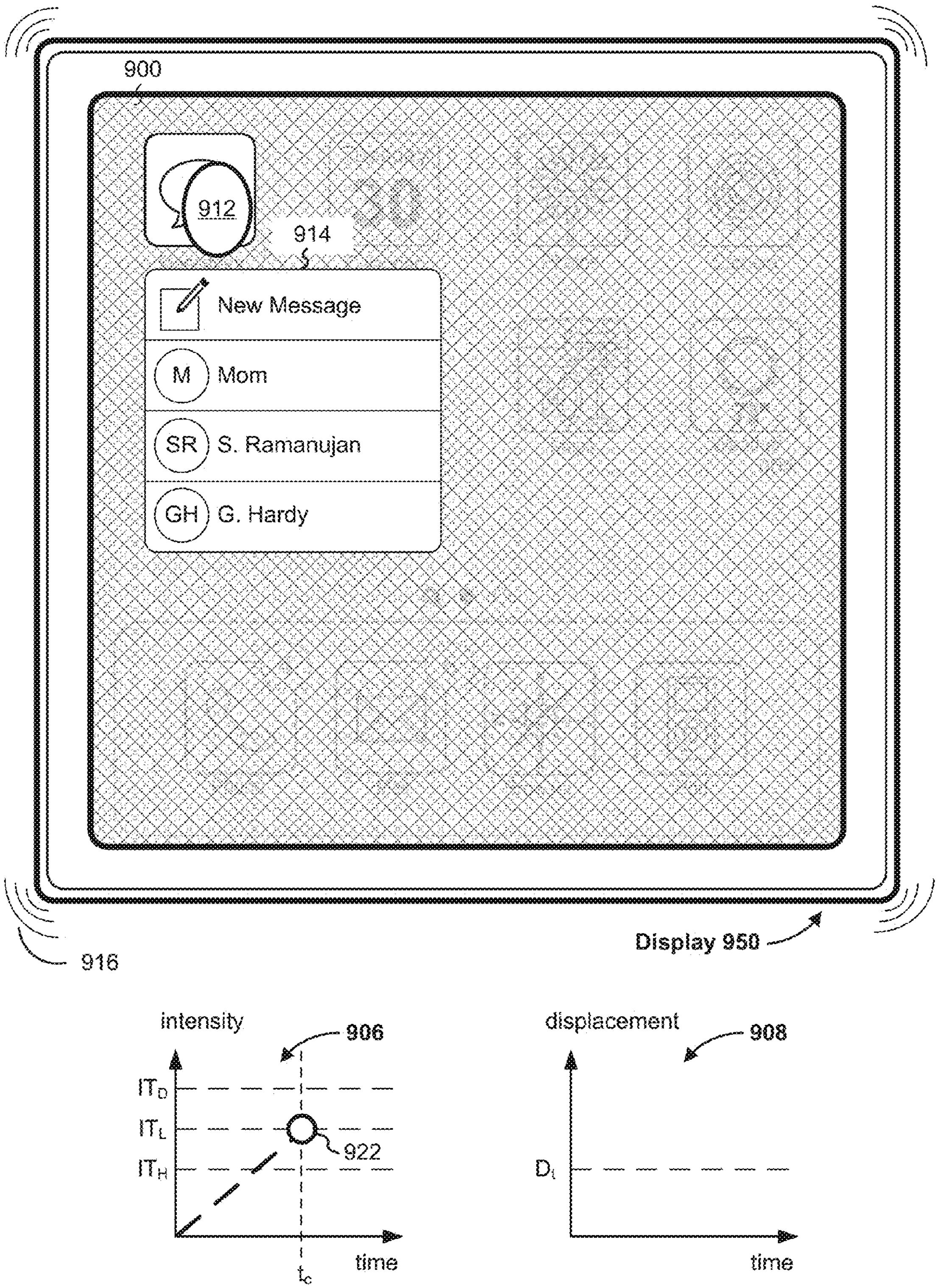
Figure 9A15

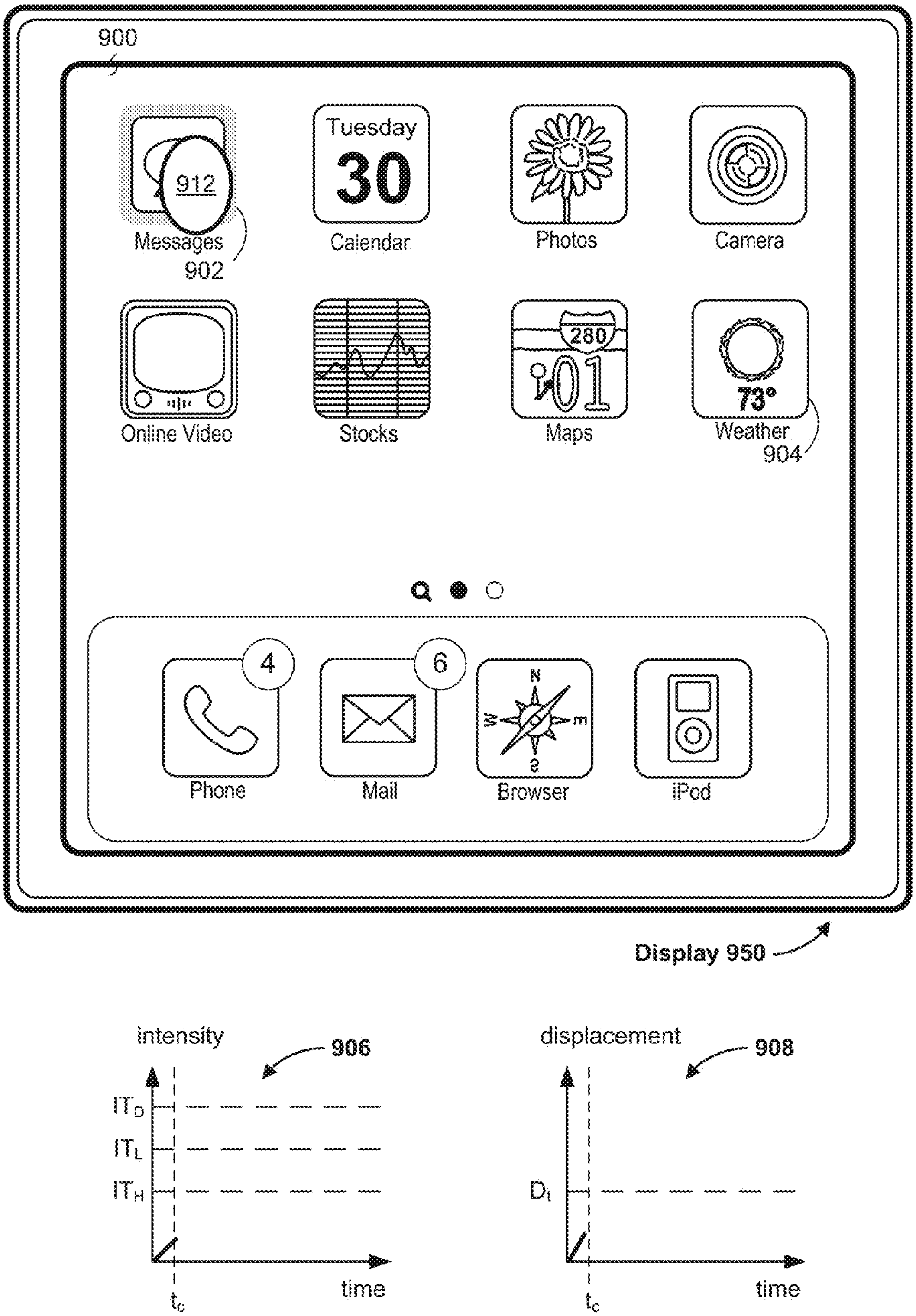
Figure 9A16

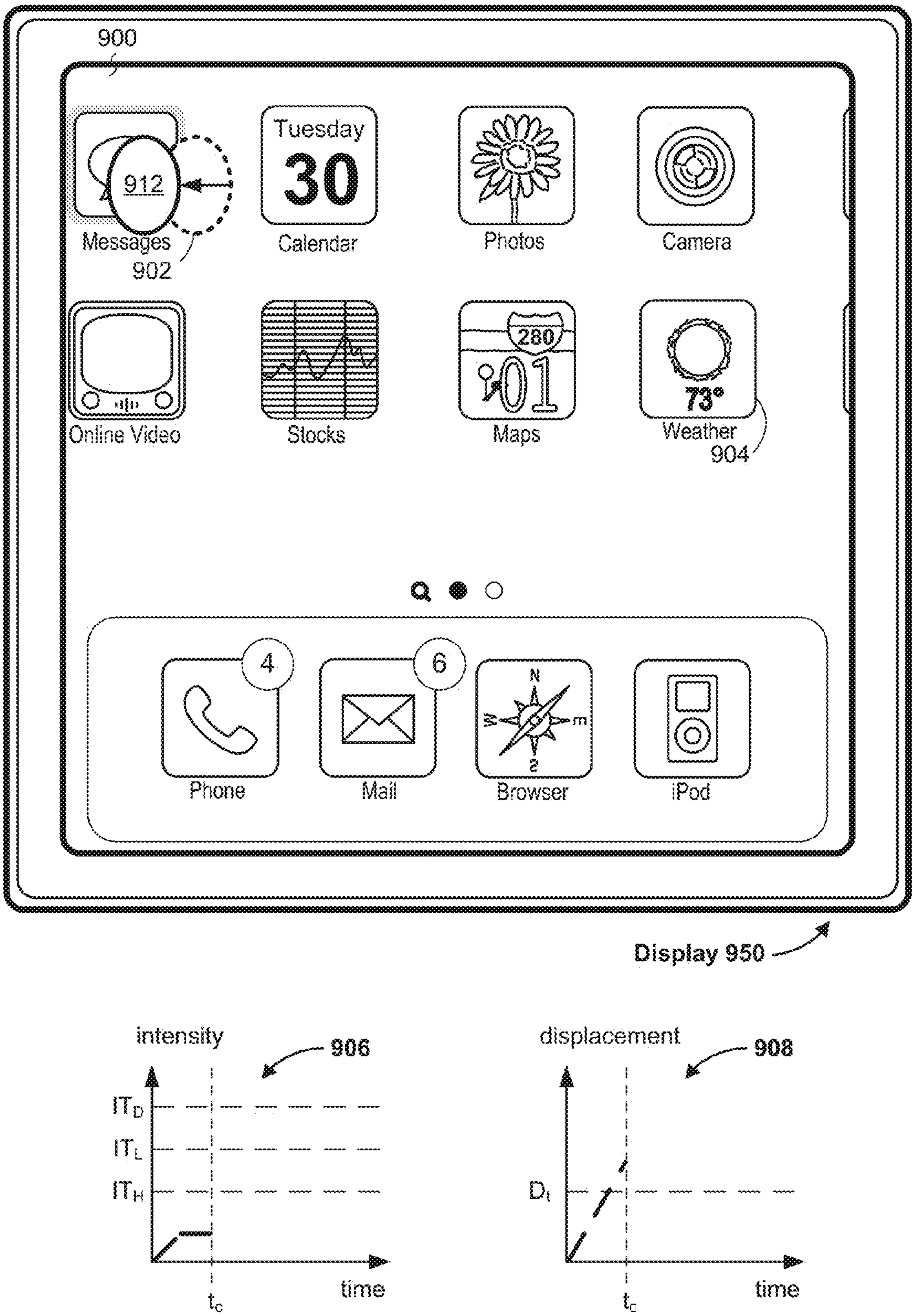
Figure 9A17

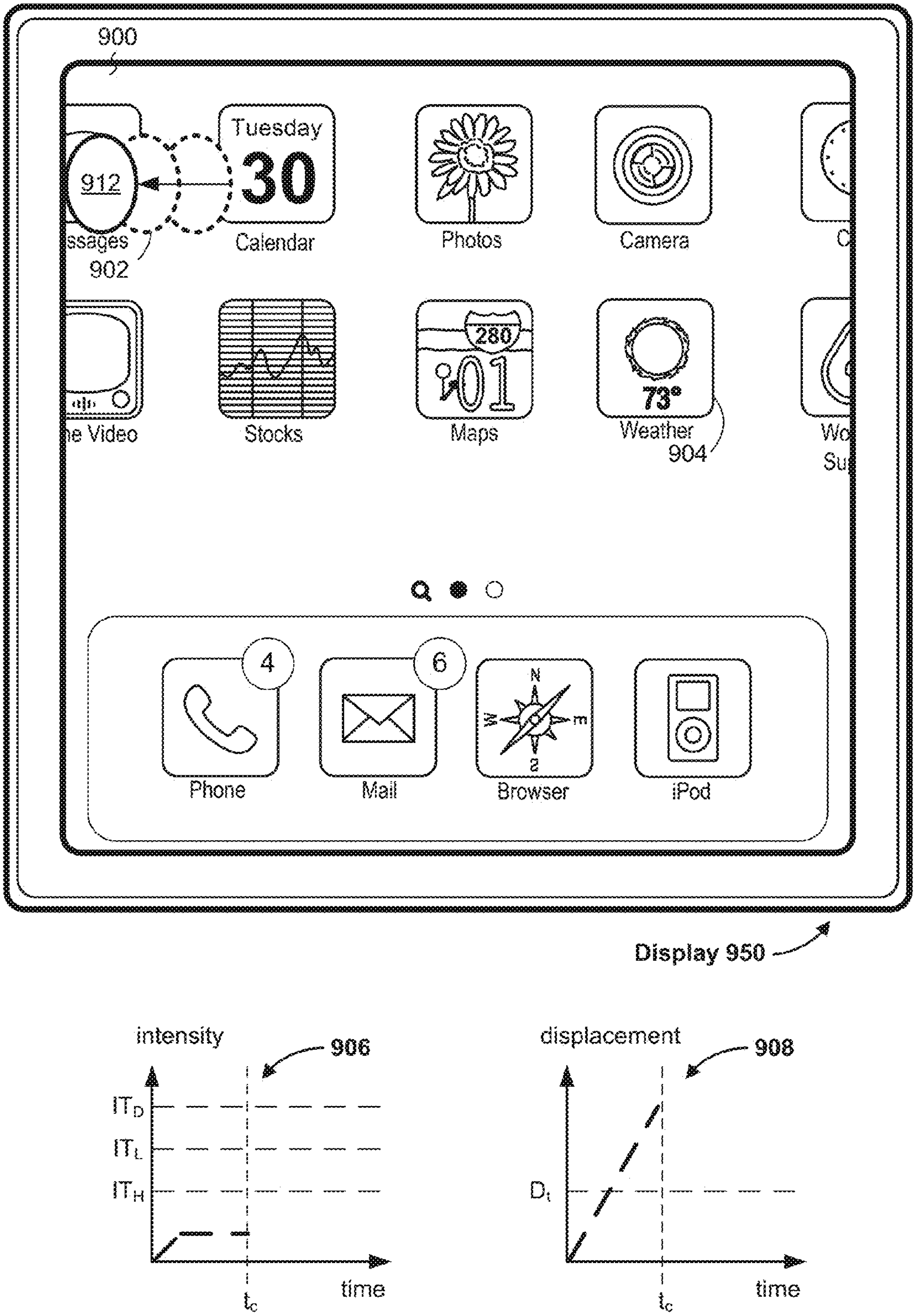
Figure 9A18

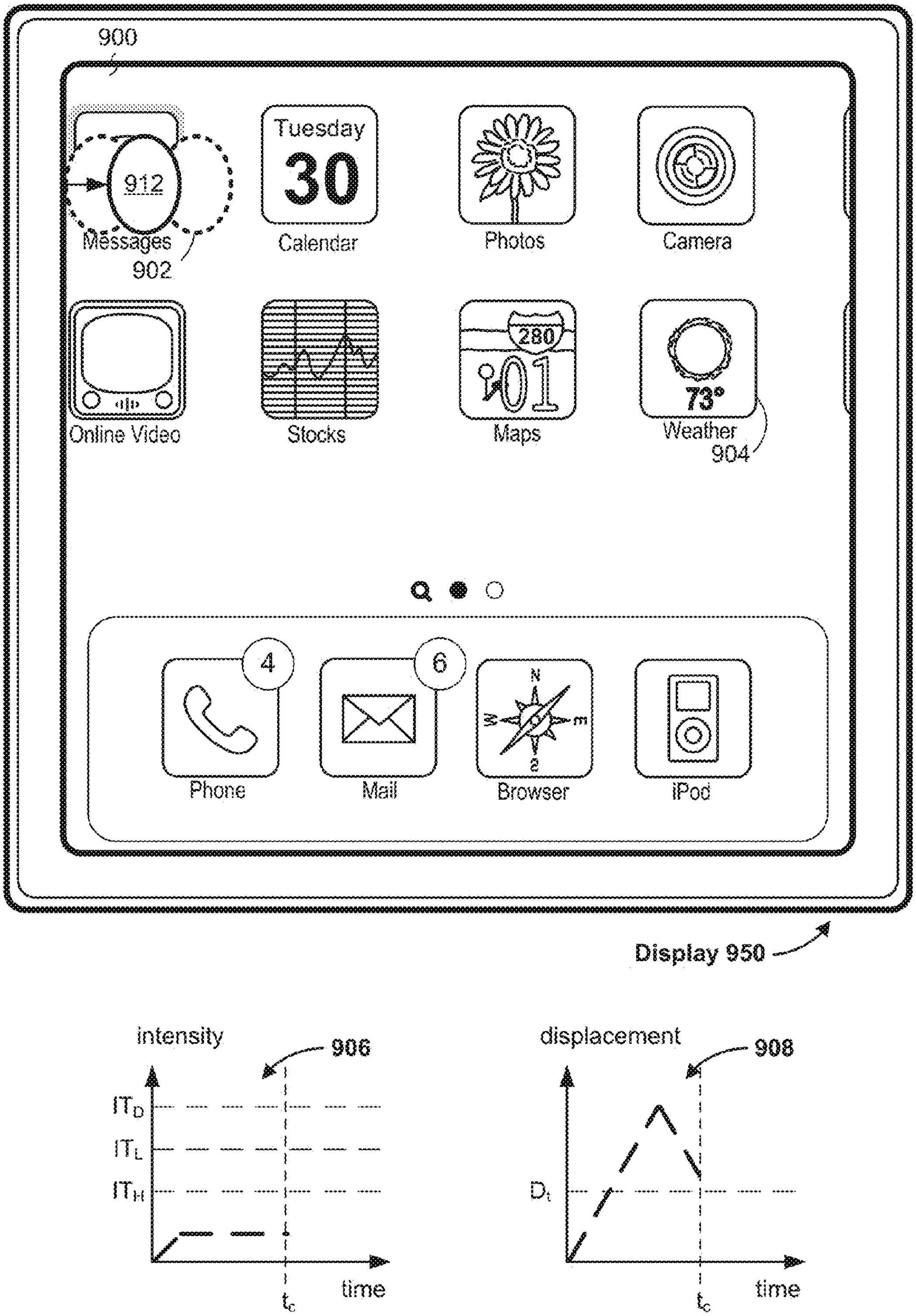
Figure 9A19

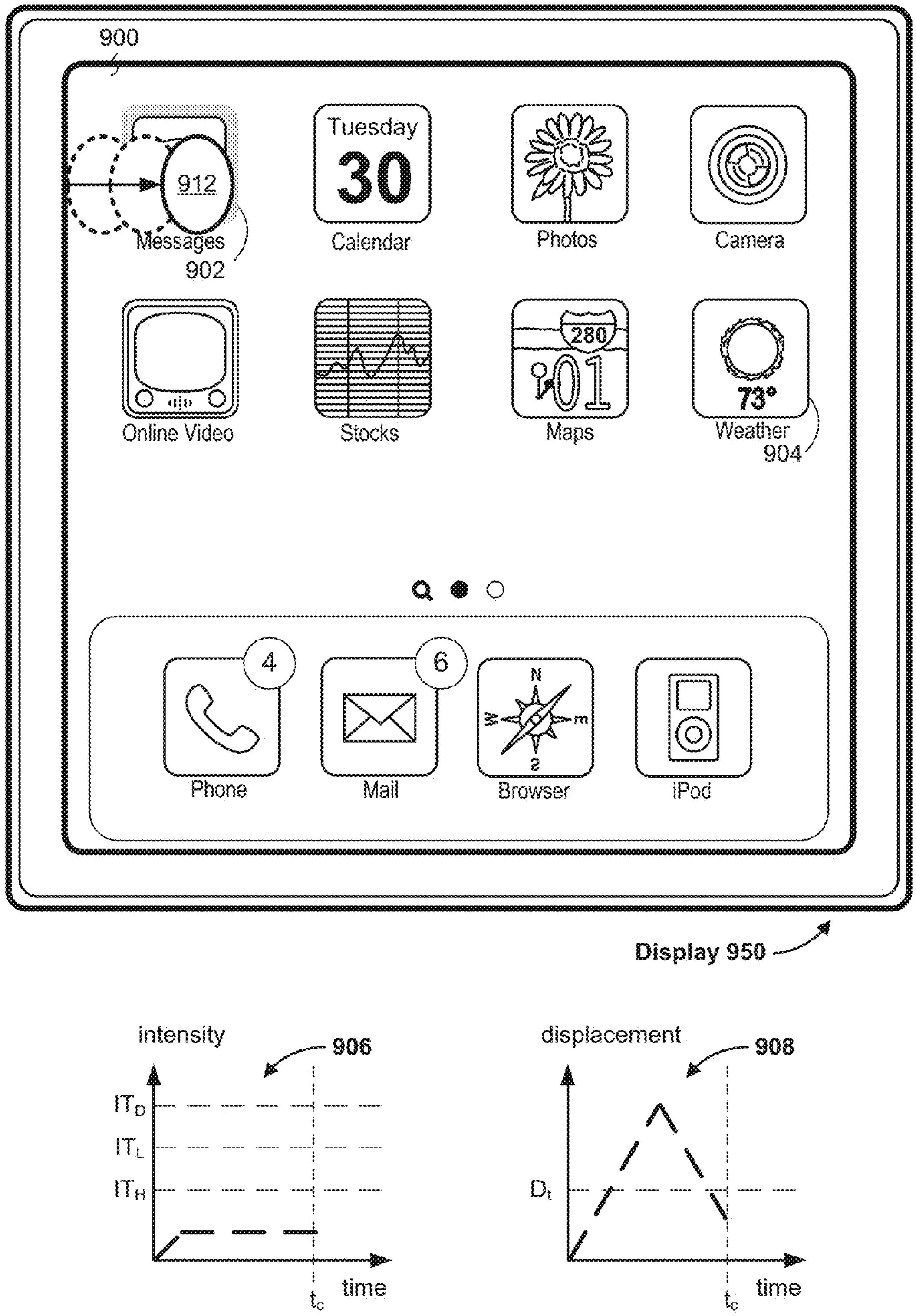
Figure 9A20

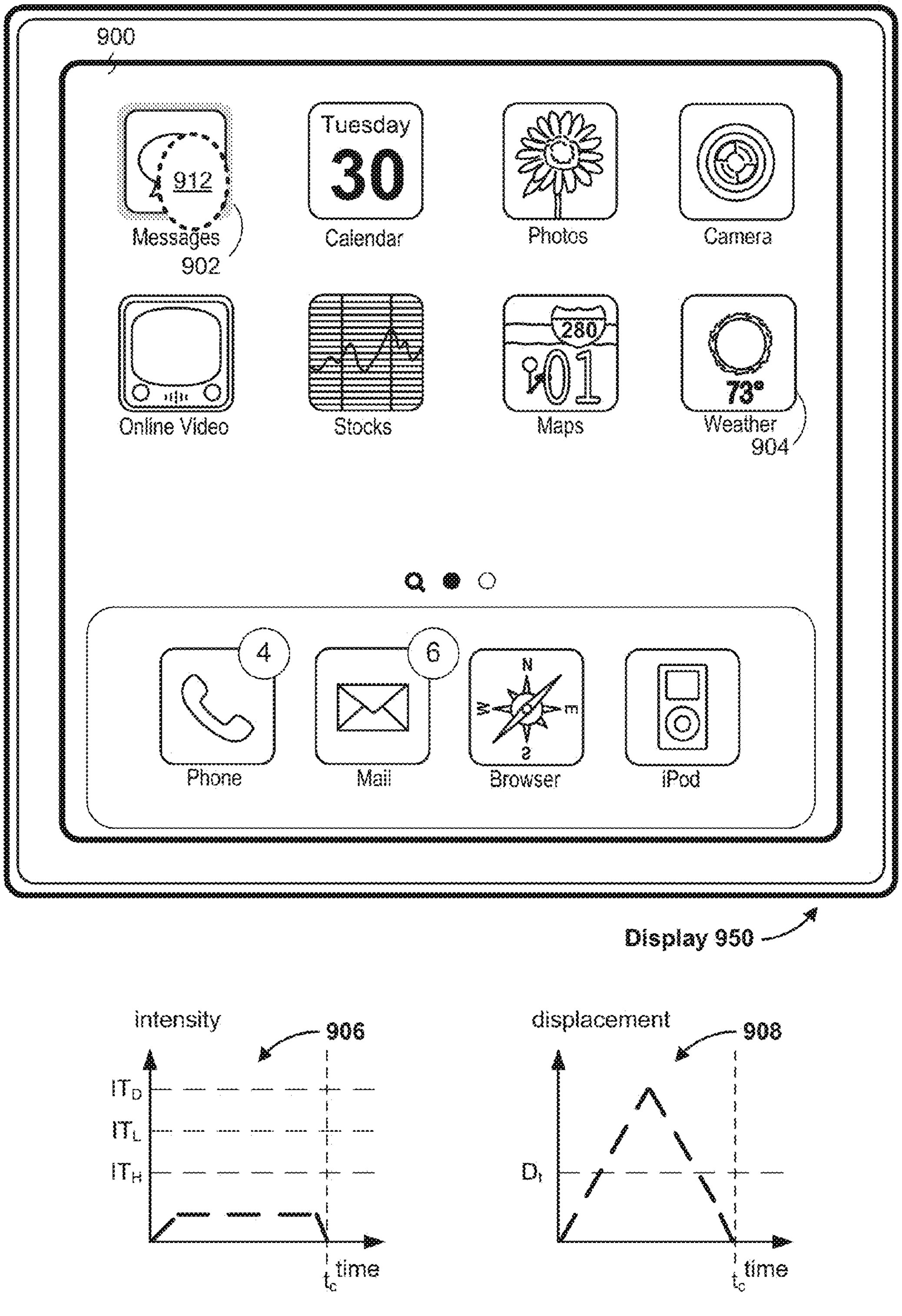
Figure 9A21

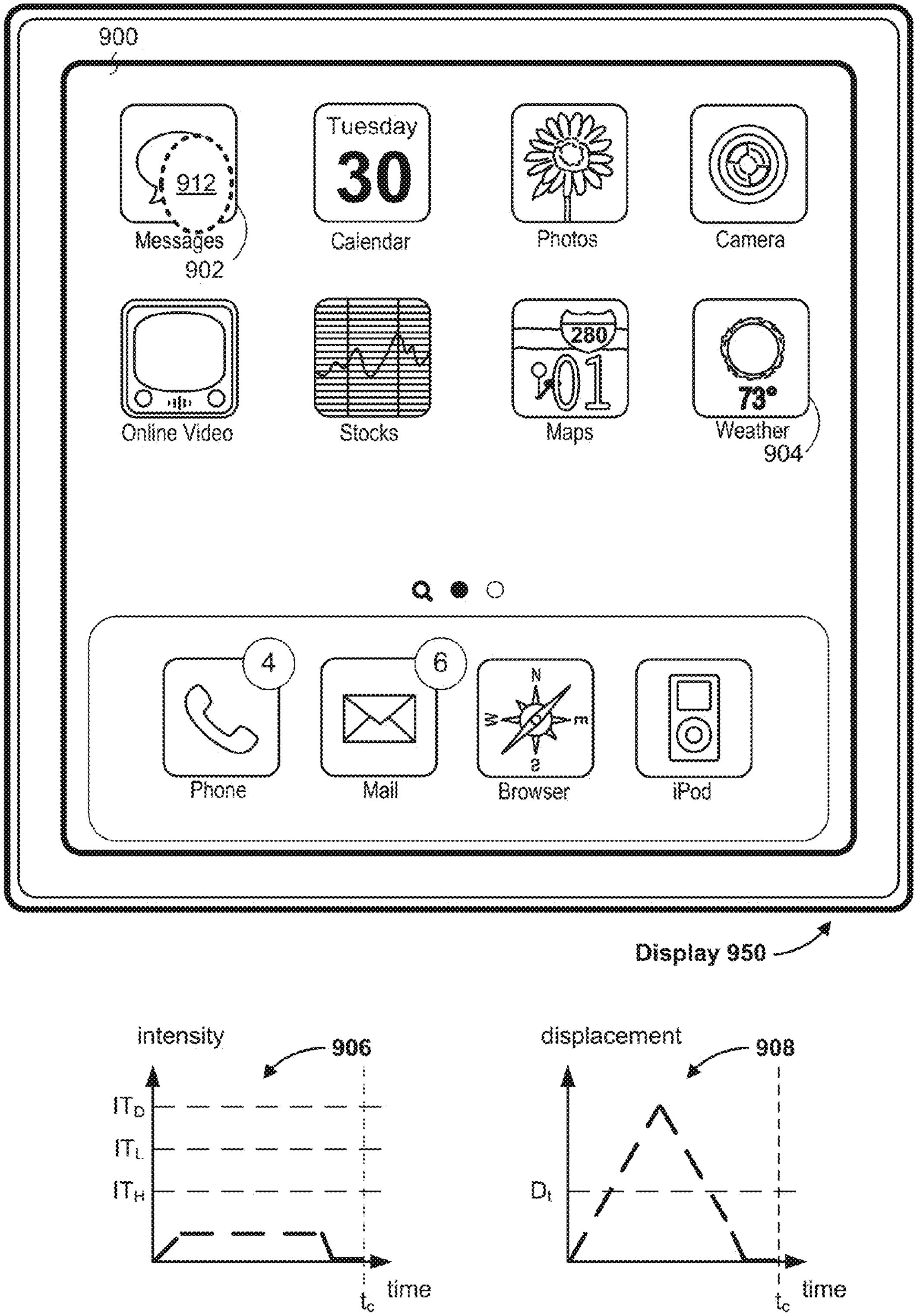
Figure 9A22

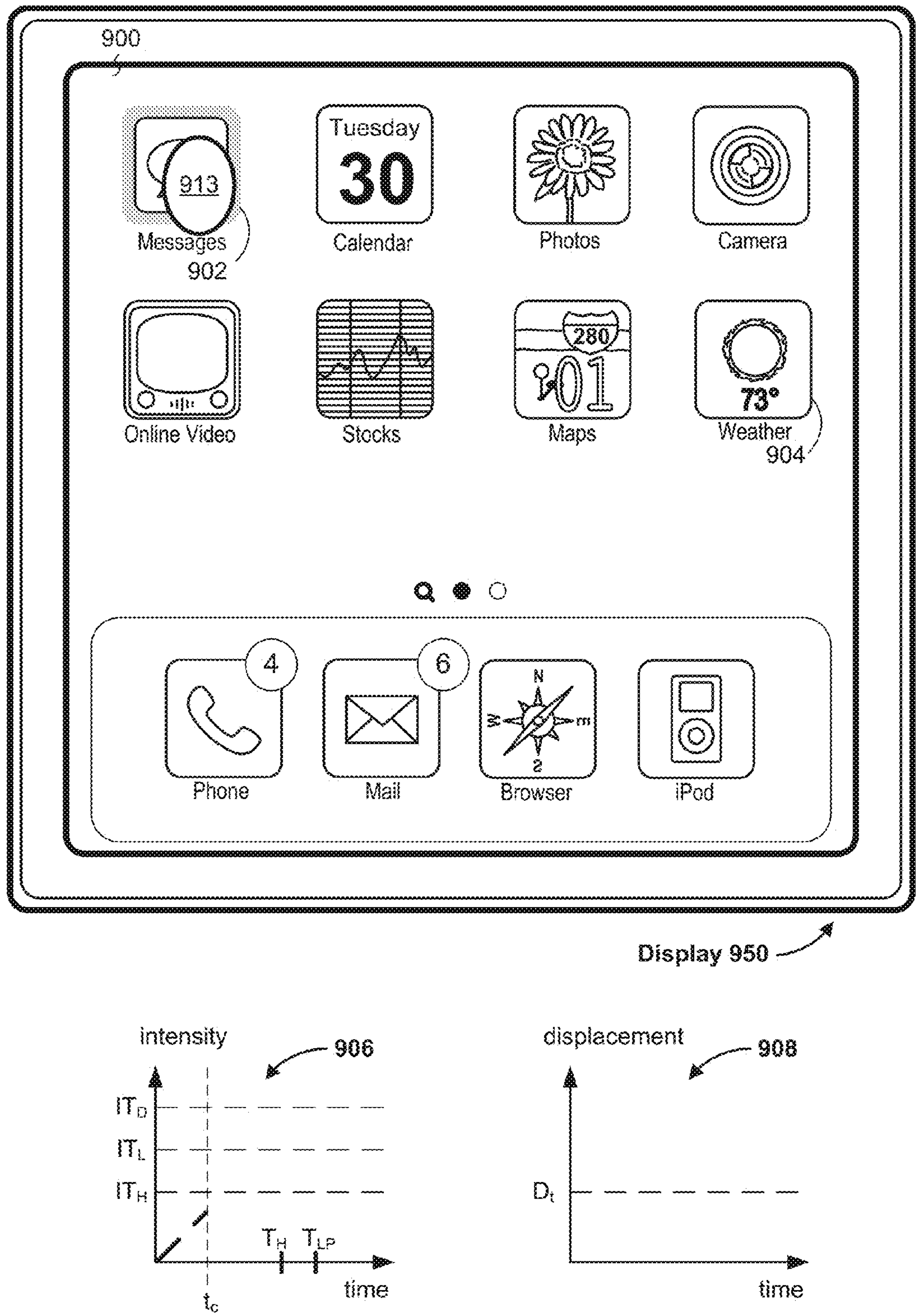
Figure 9A23

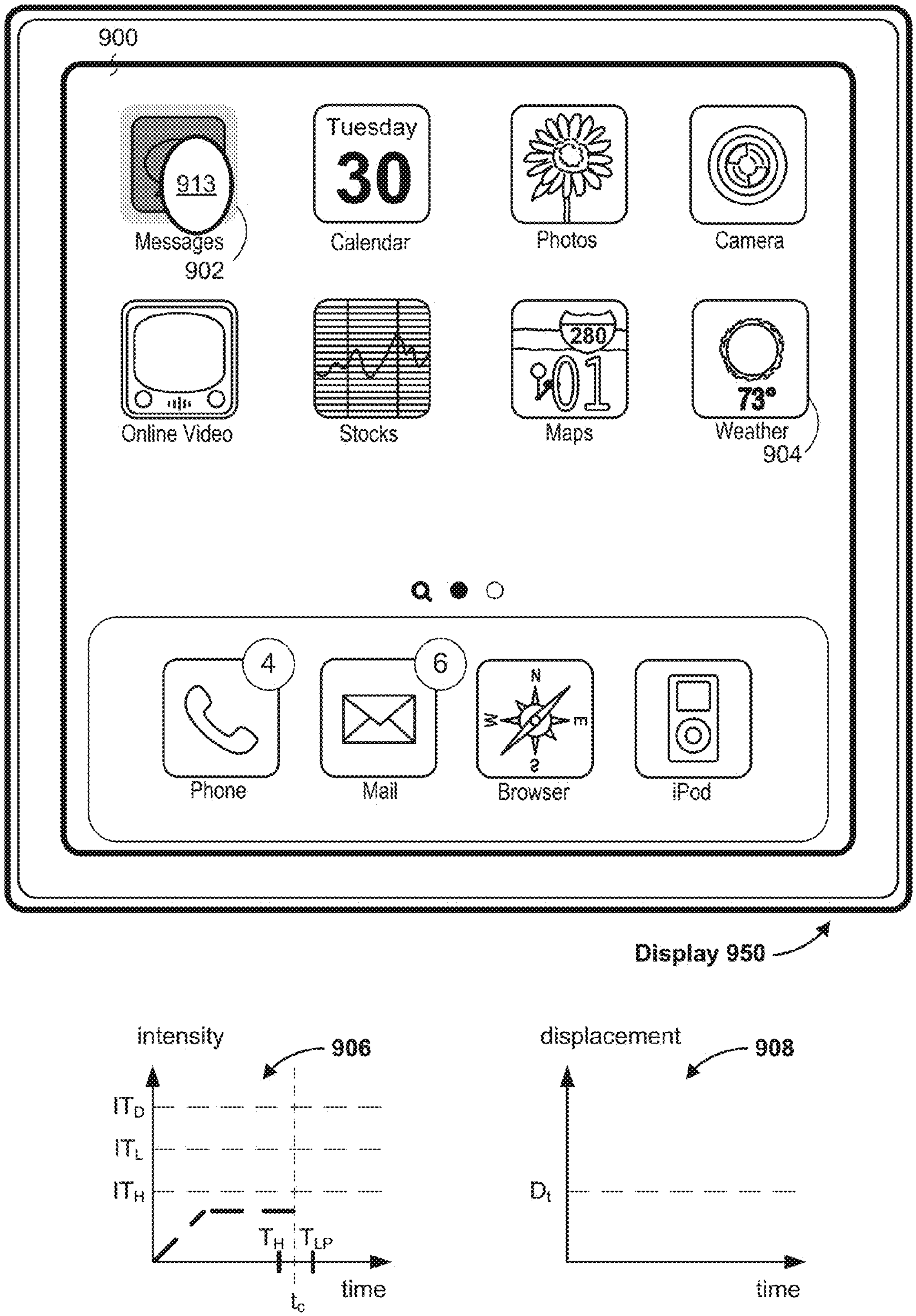
Figure 9A24

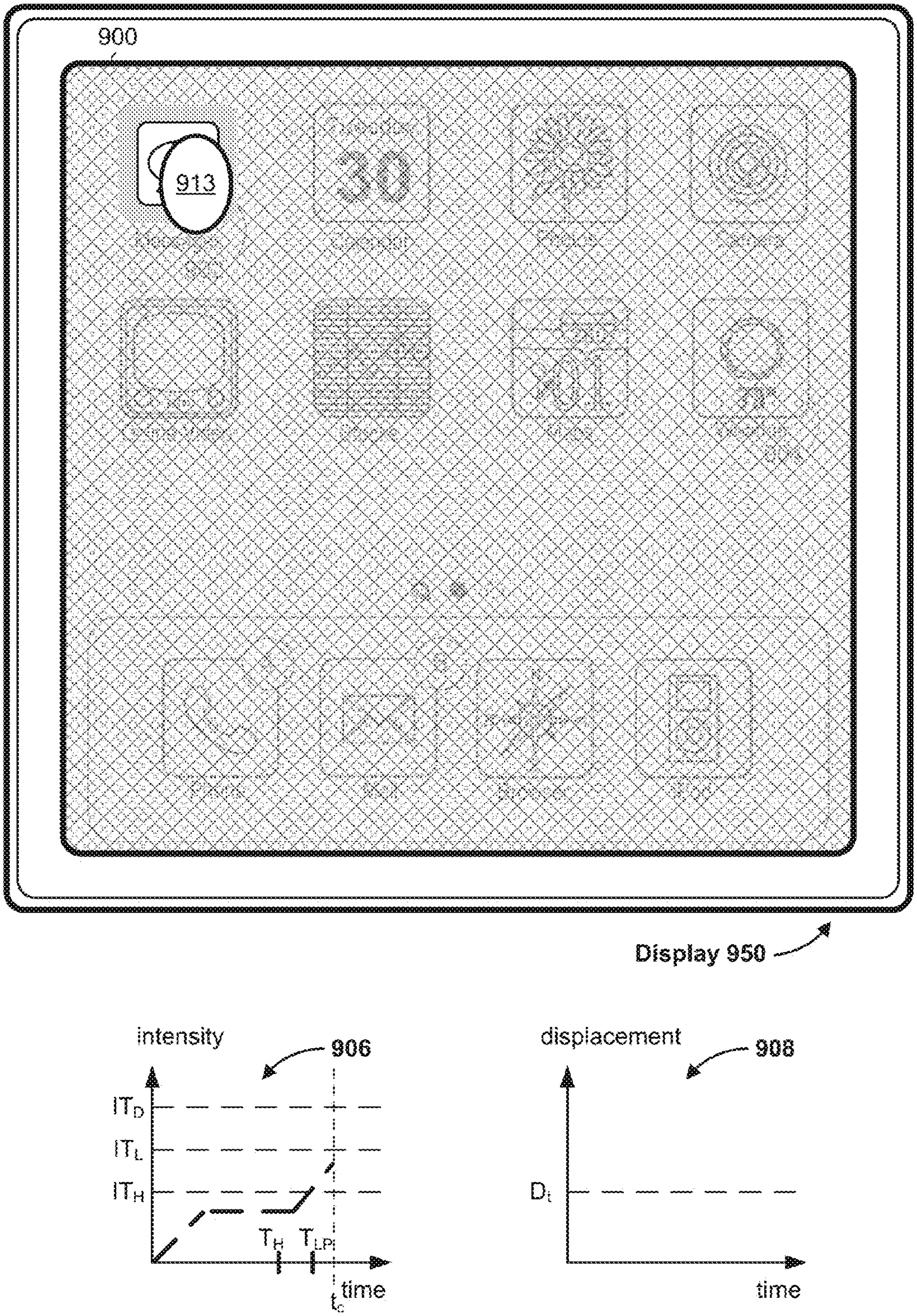
Figure 9A25

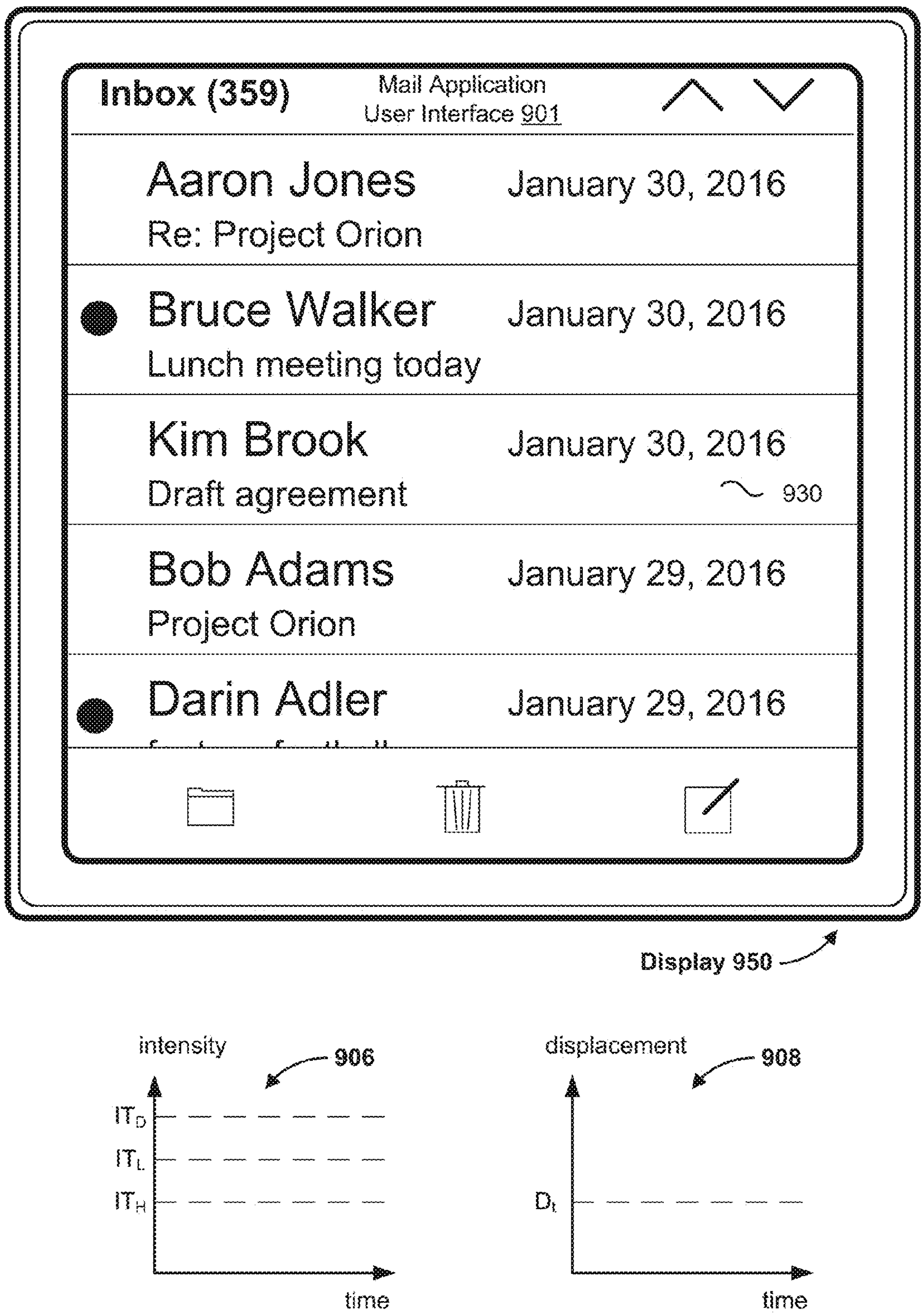
Figure 9B1

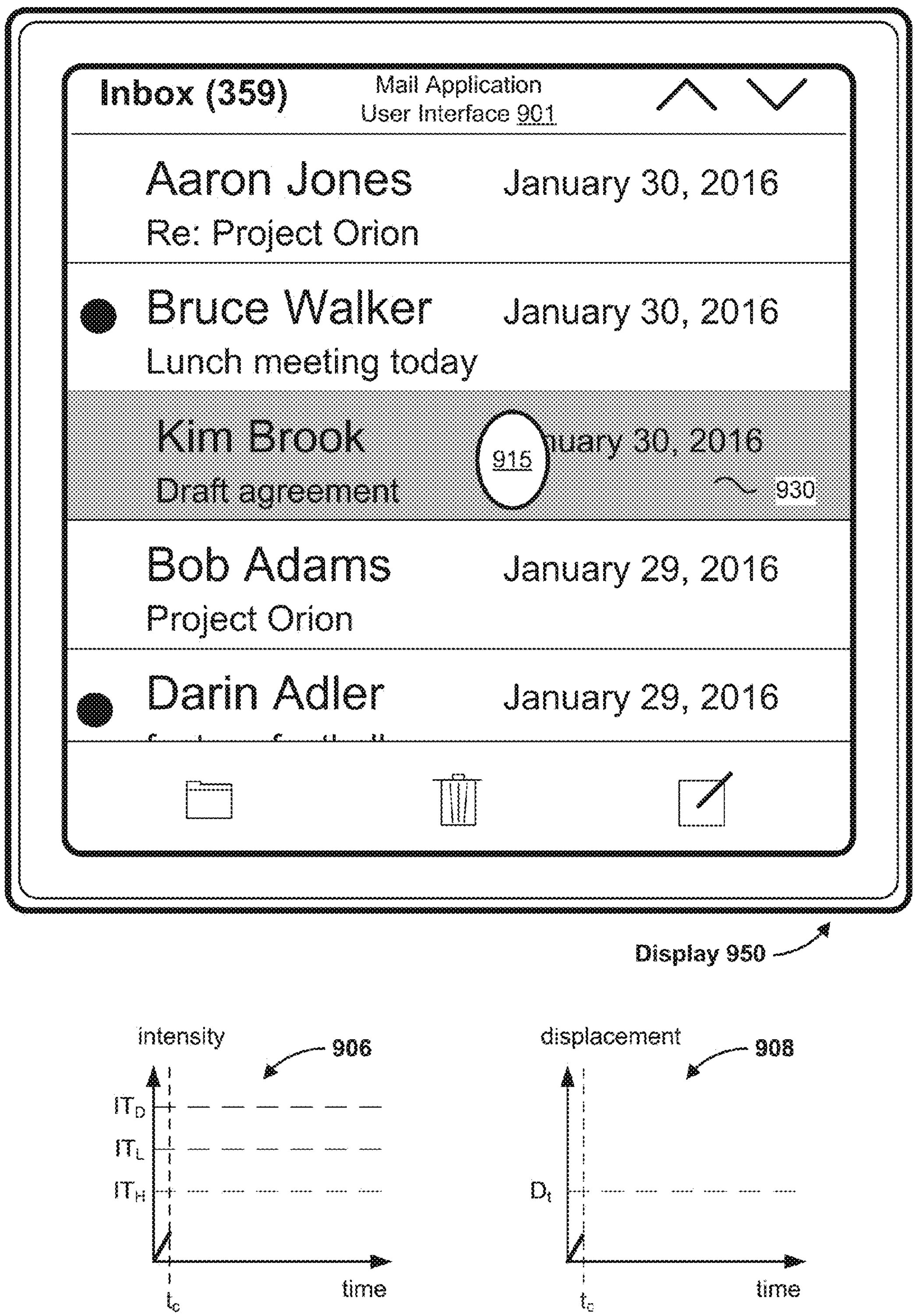
Figure 9B2

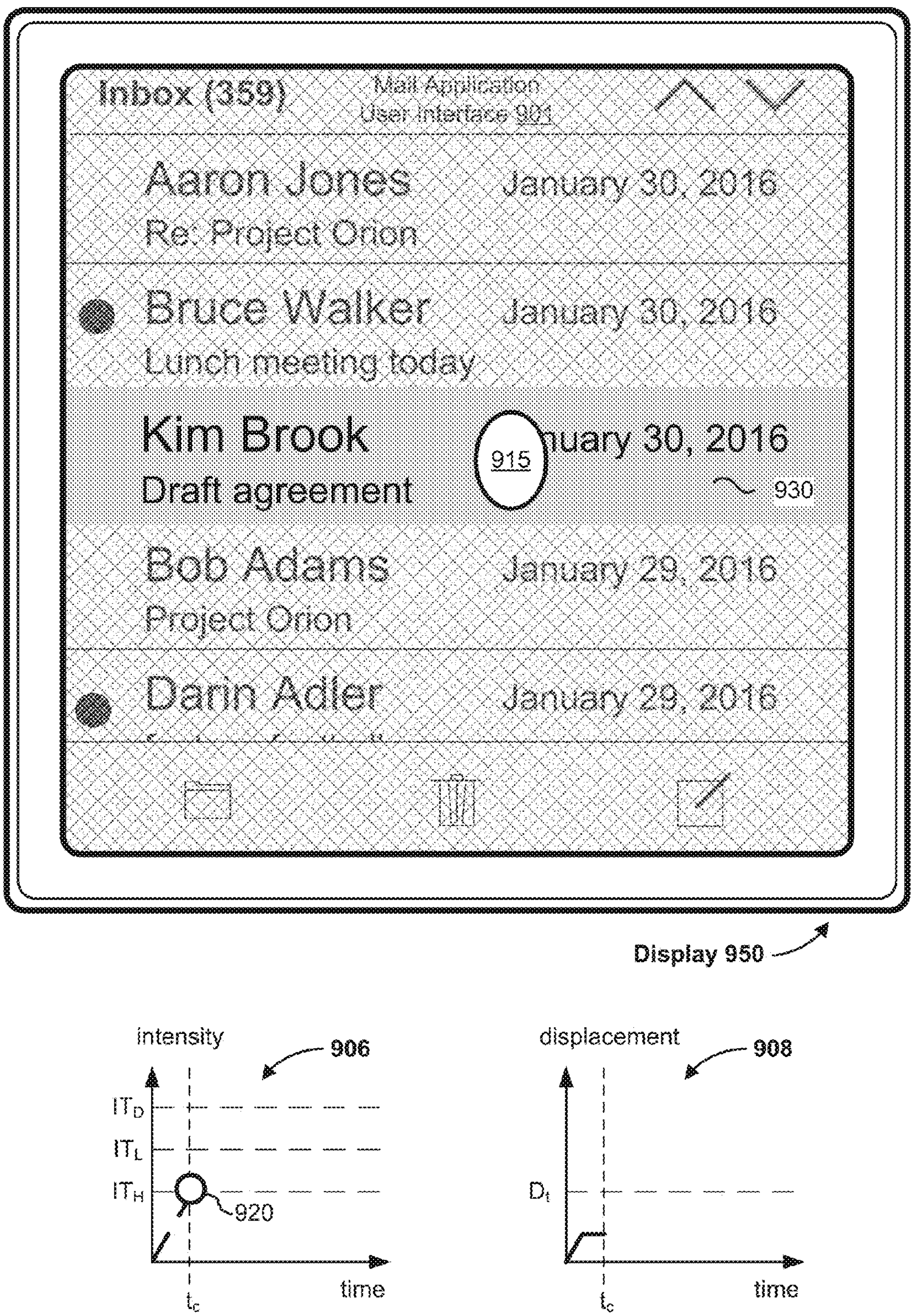
Figure 9B3

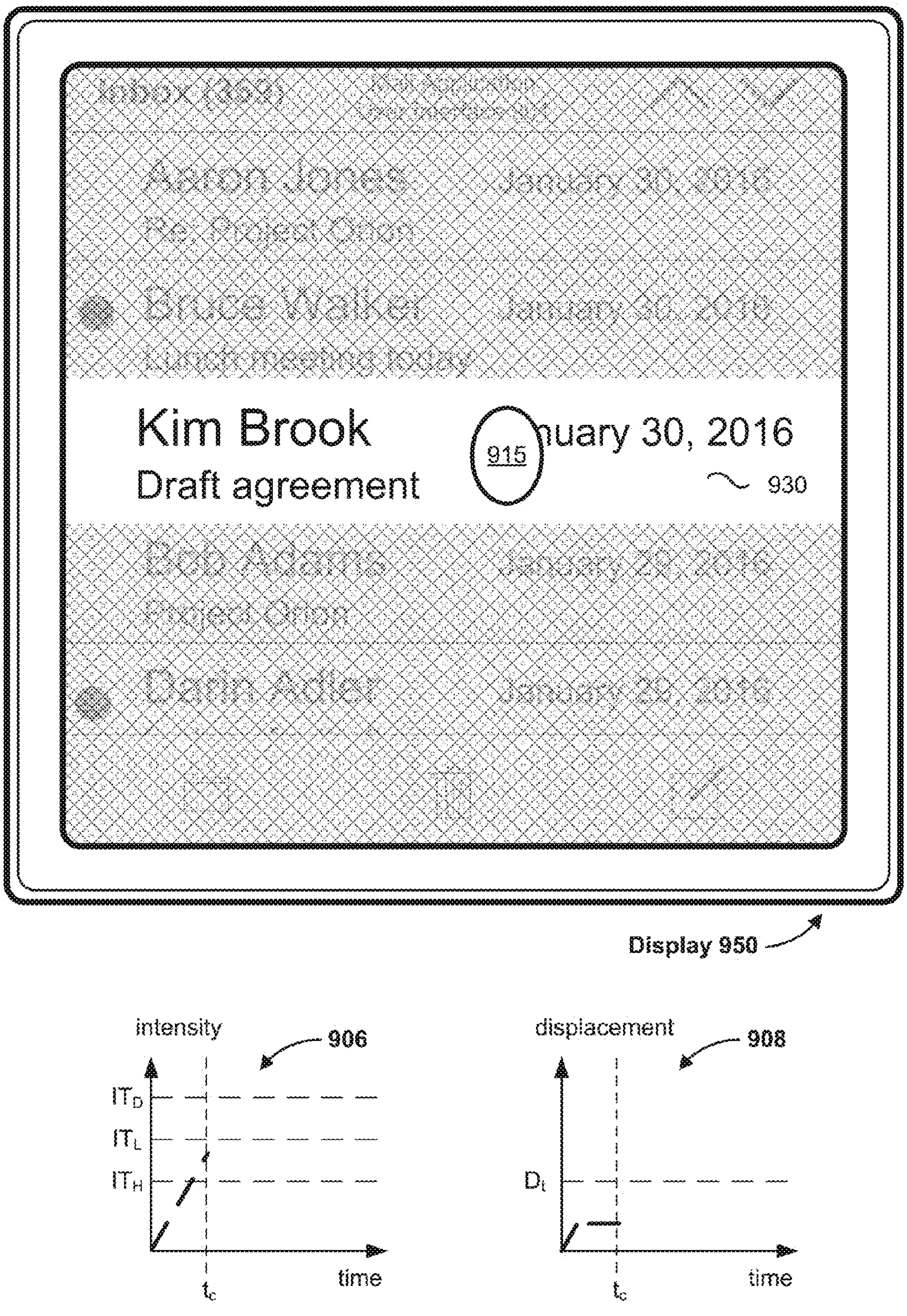
Figure 9B4

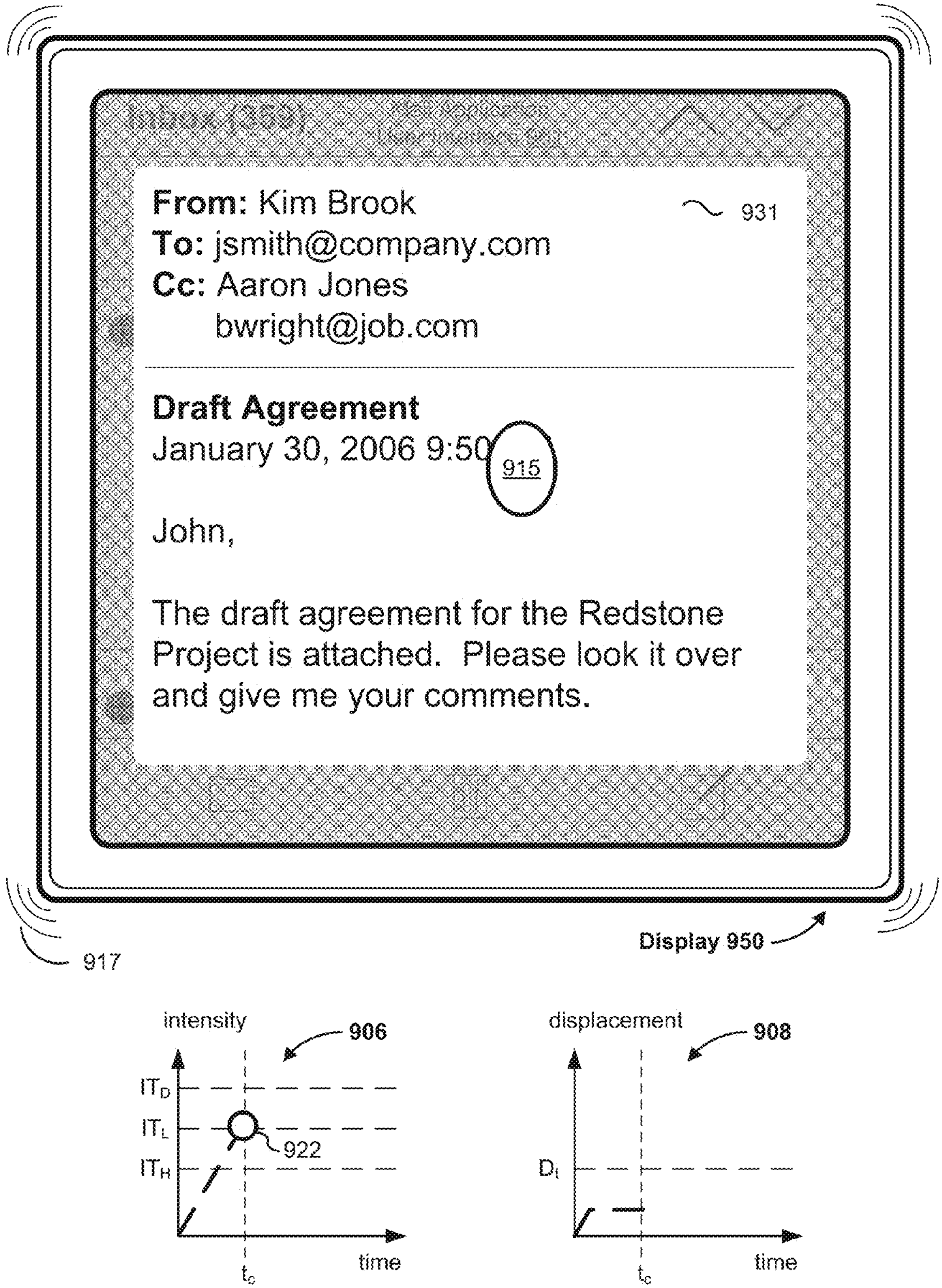
Figure 9B5

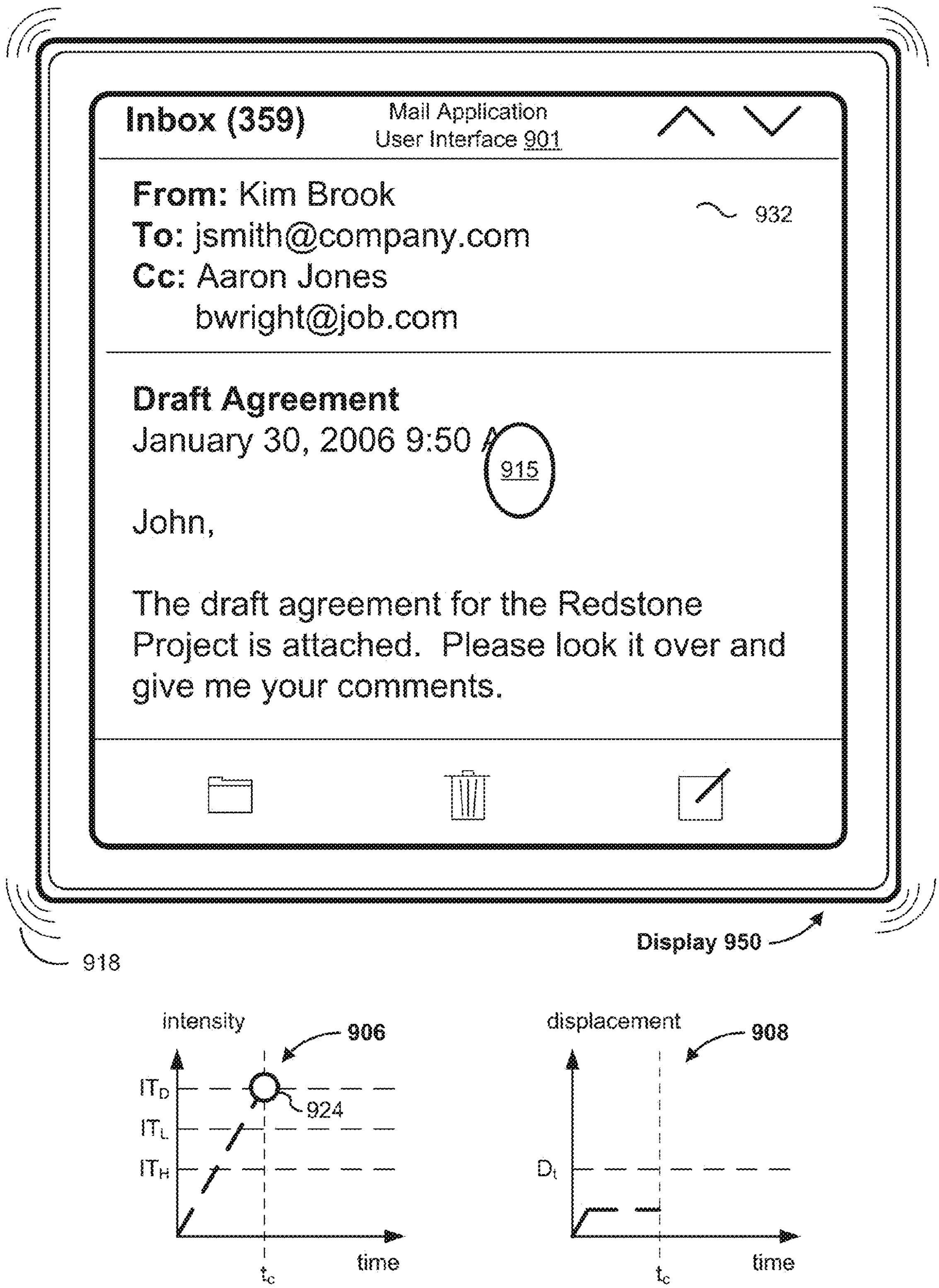
Figure 9B6

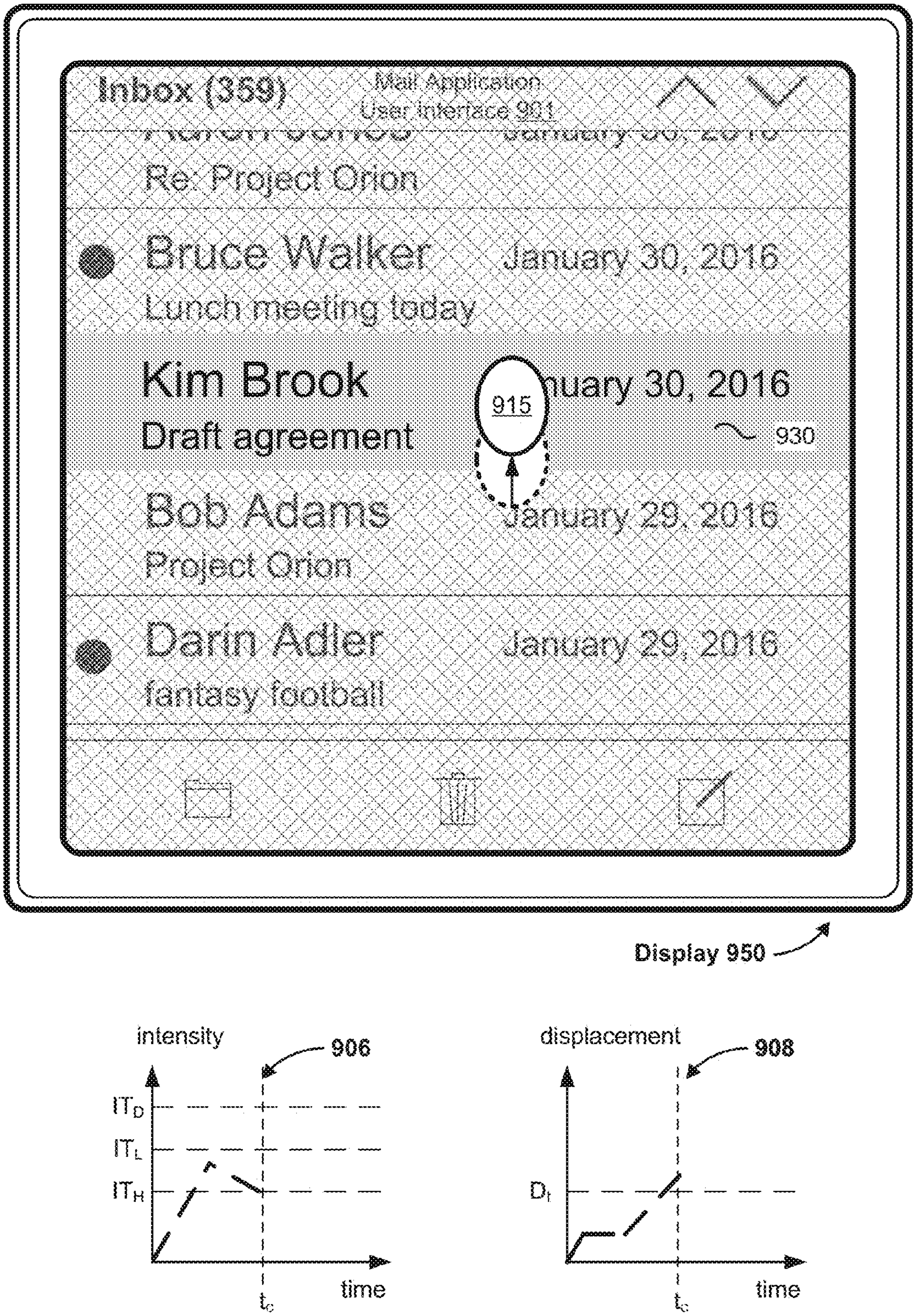
Figure 9B7

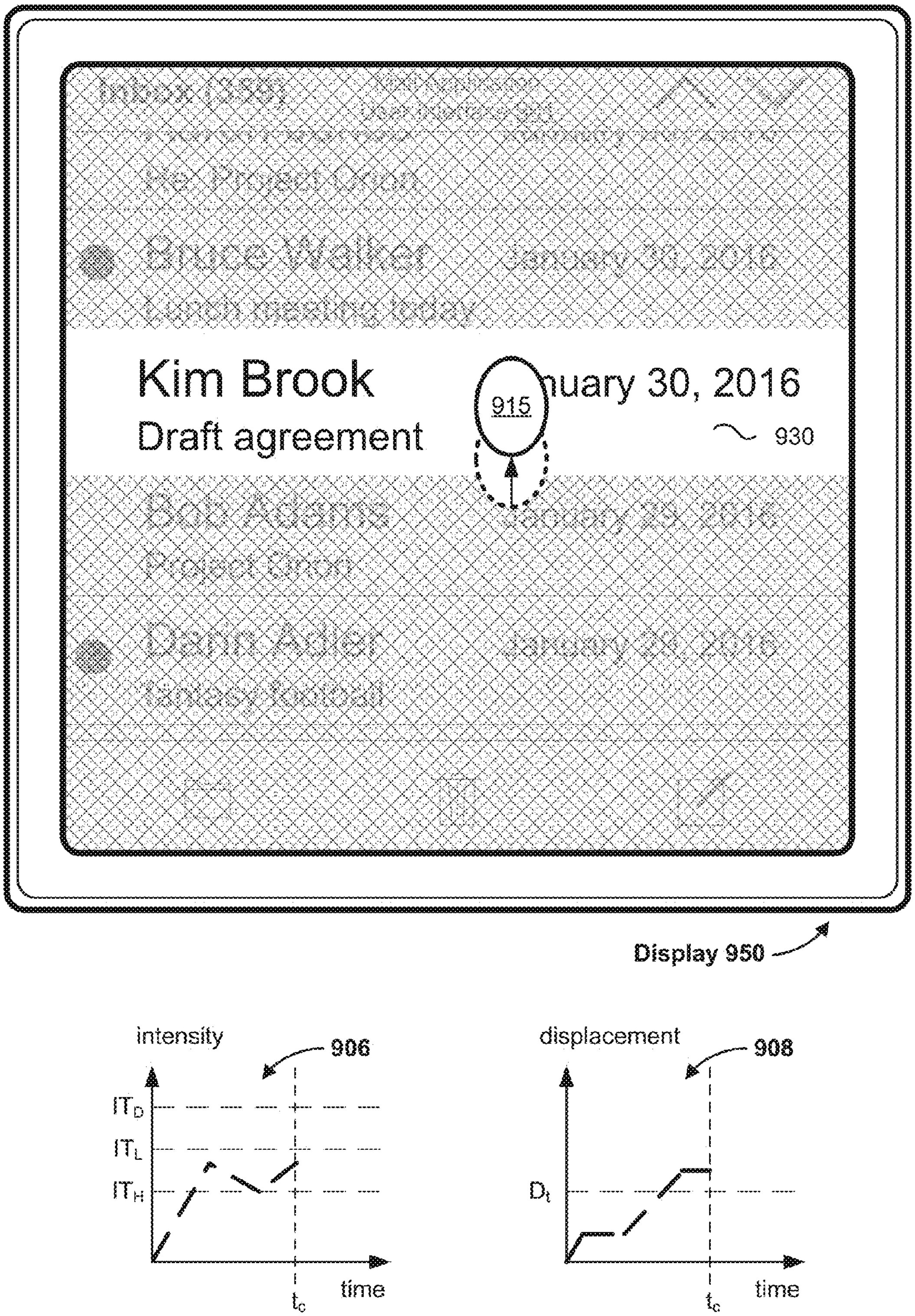
Figure 9B8

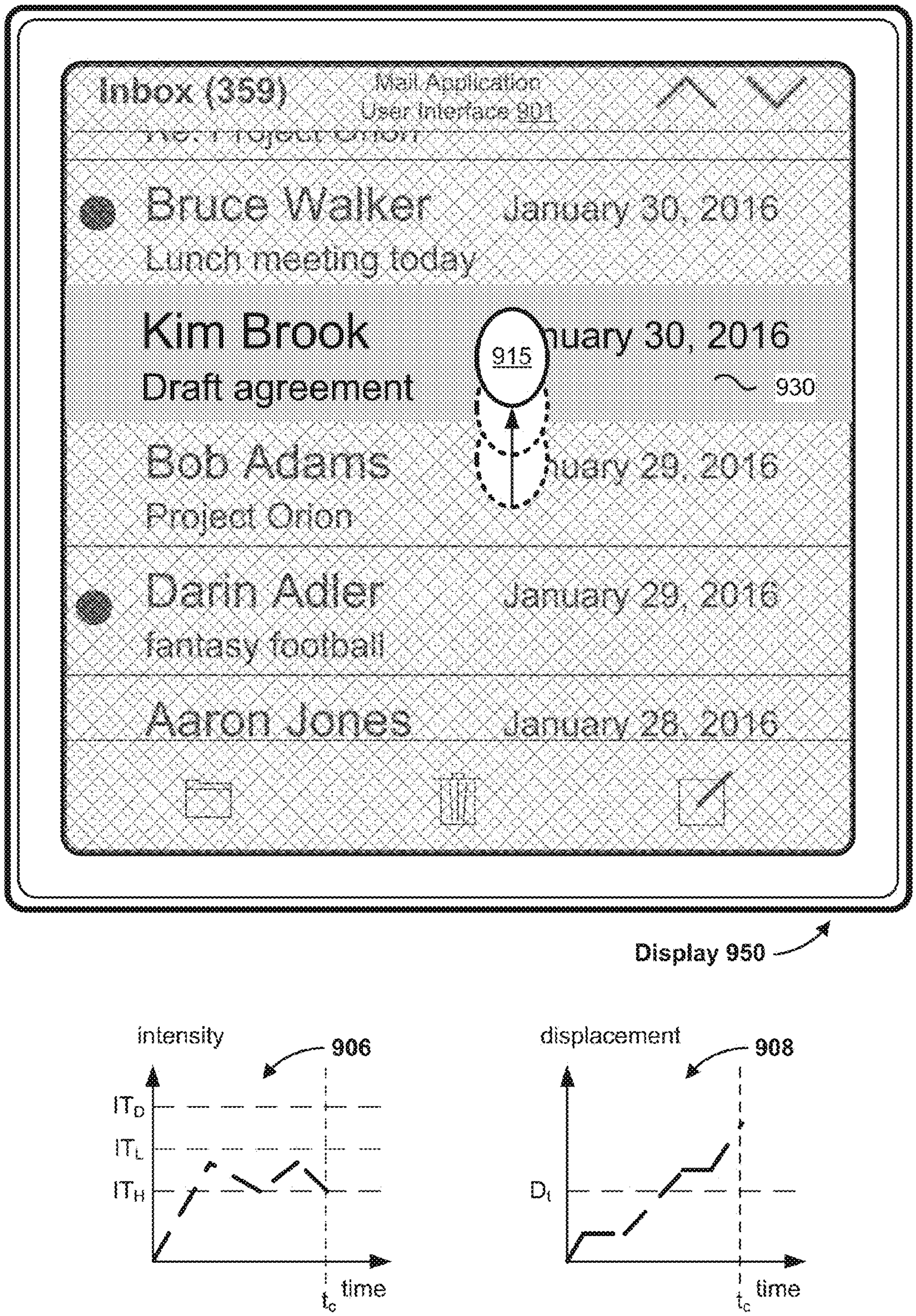
Figure 9B9

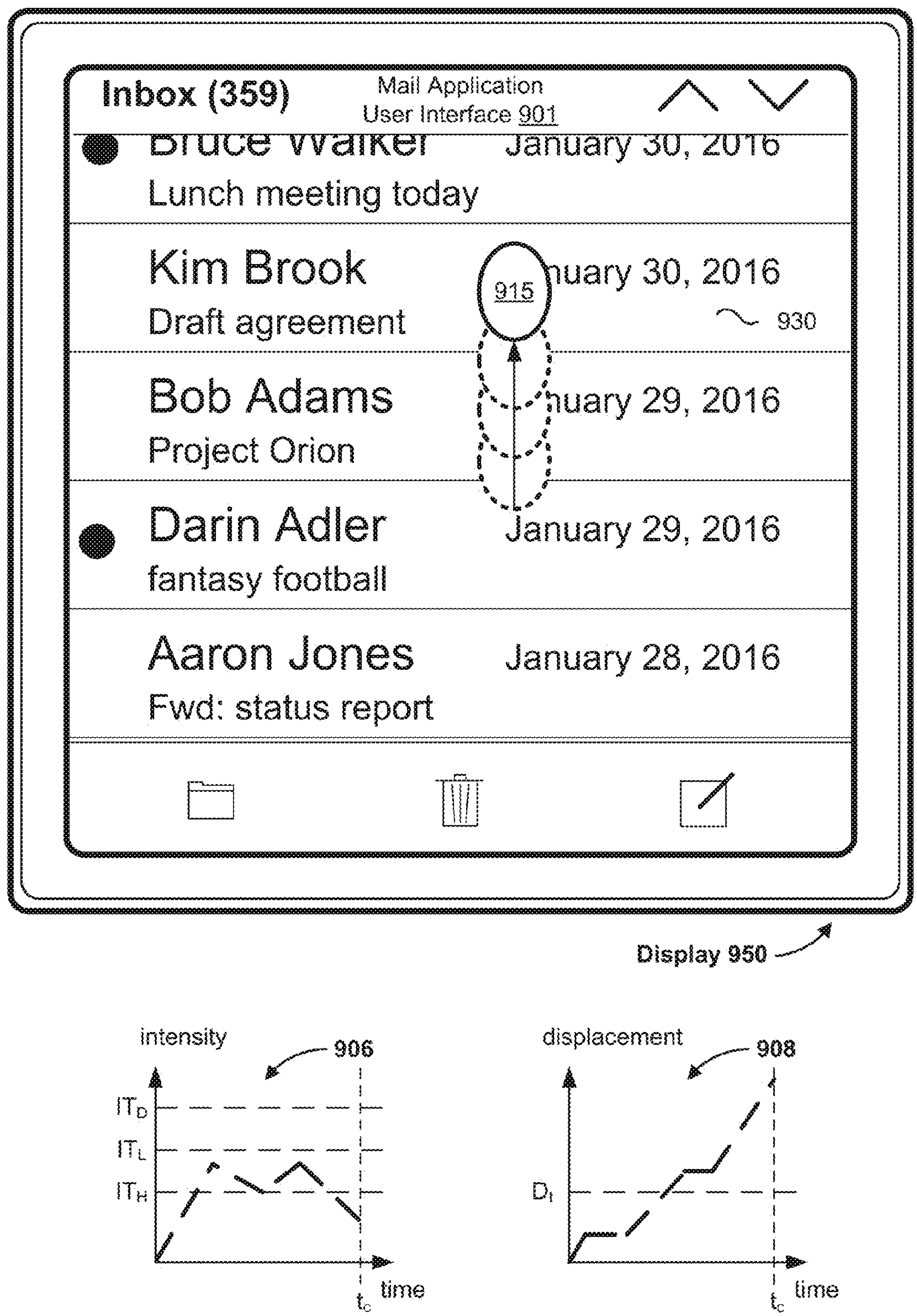
Figure 9B10

Figure 9C1

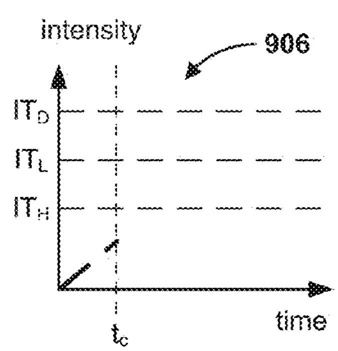
Figure 9C2

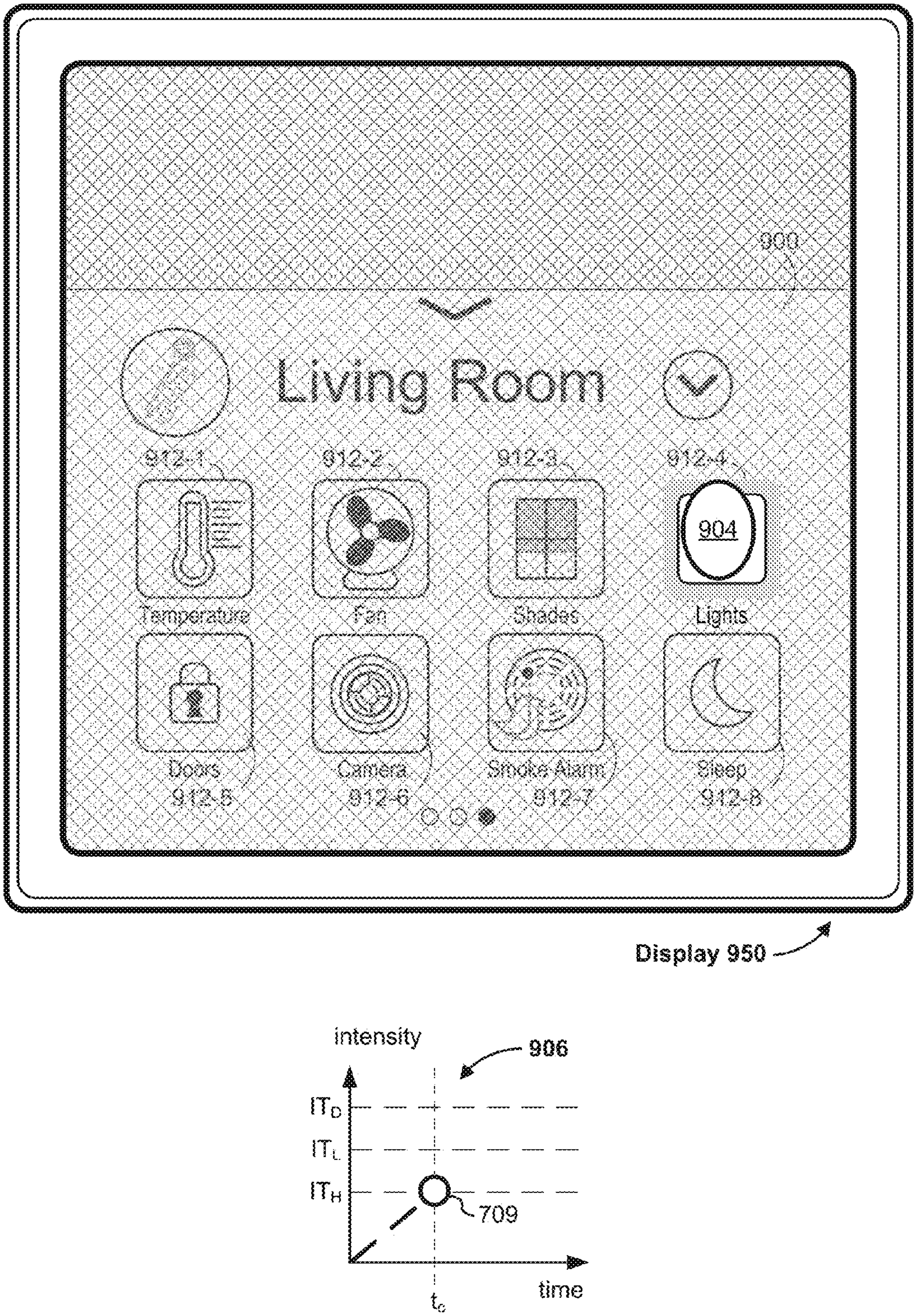
Figure 9C3

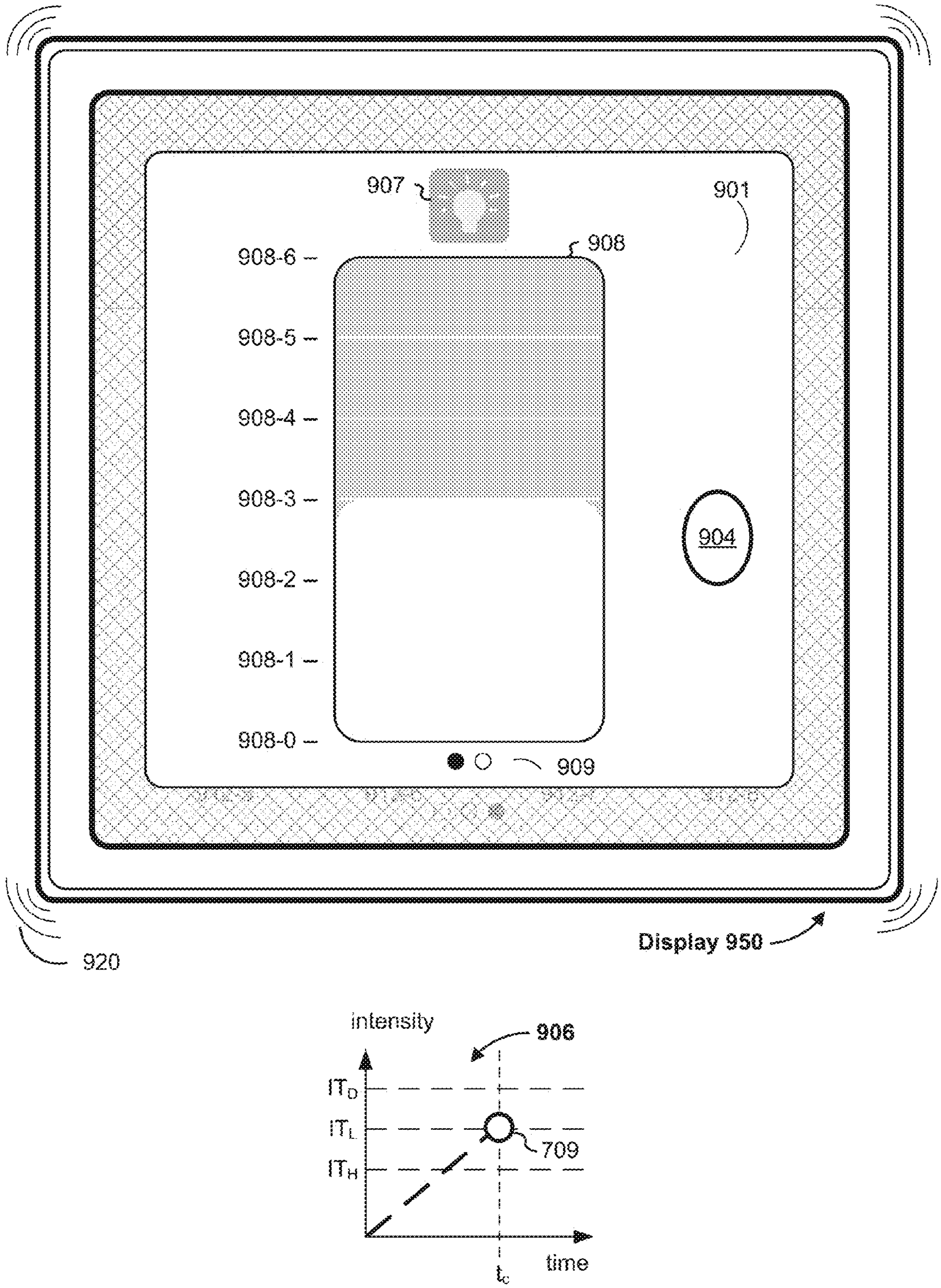
Figure 9C4

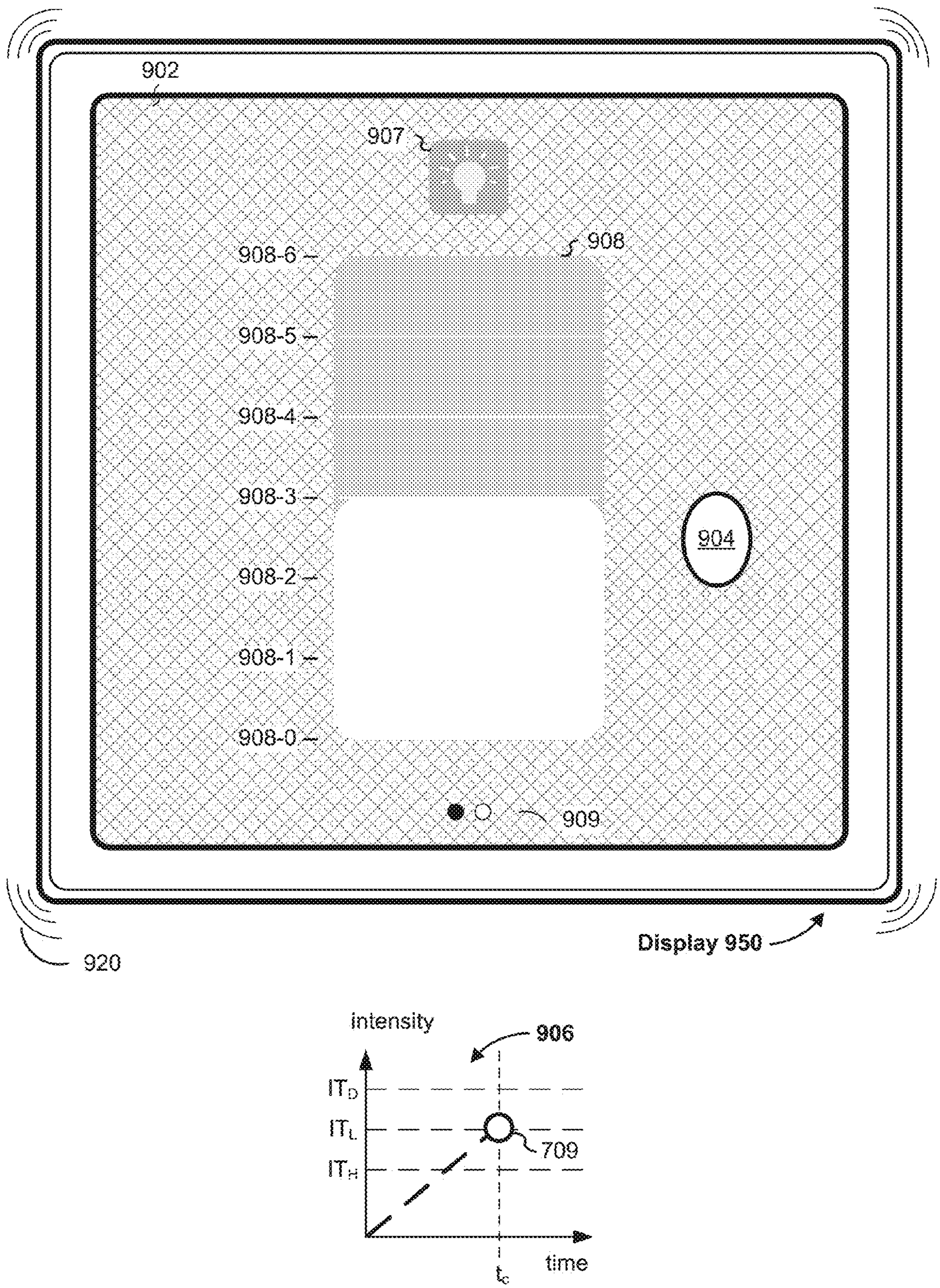
Figure 9C5

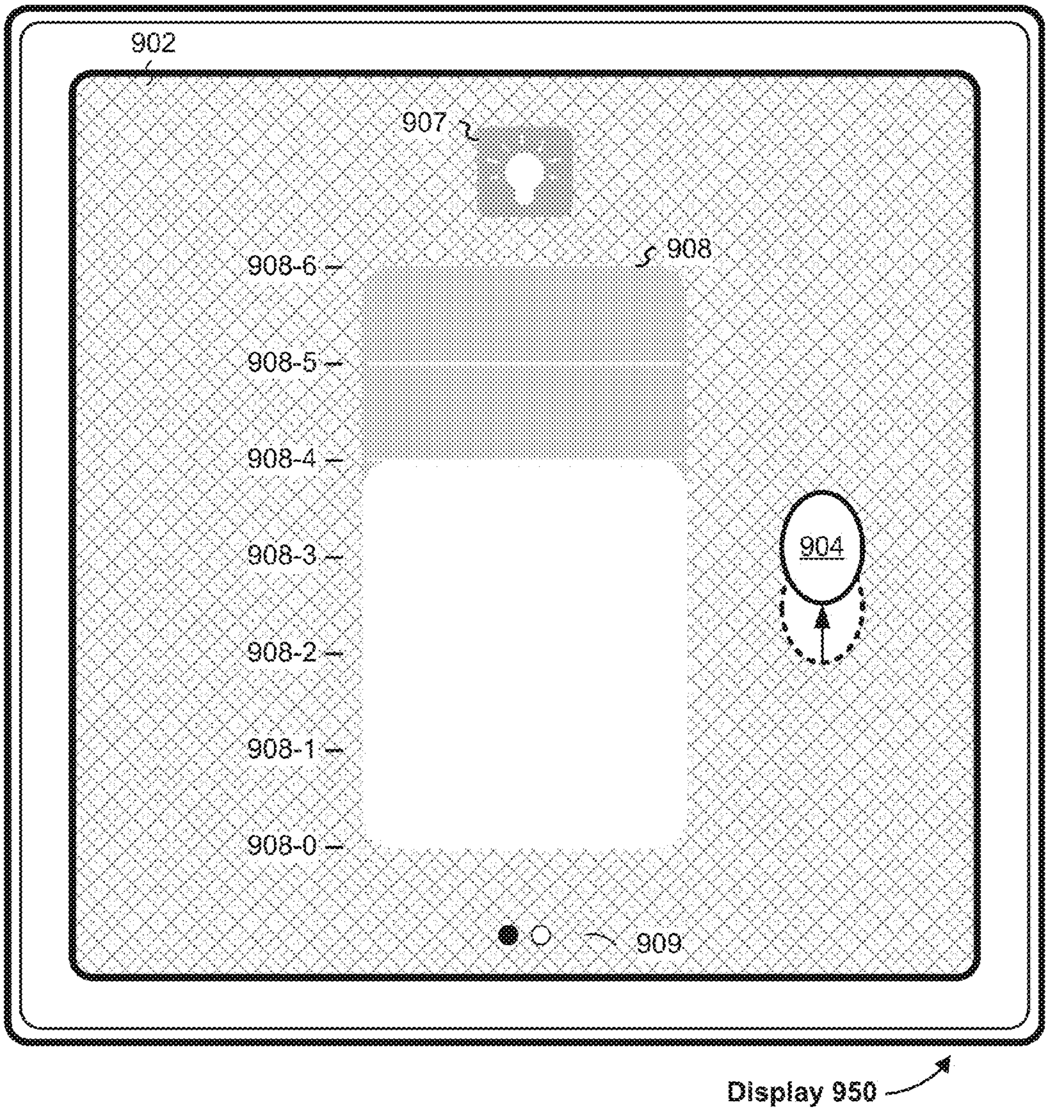
Figure 9C6

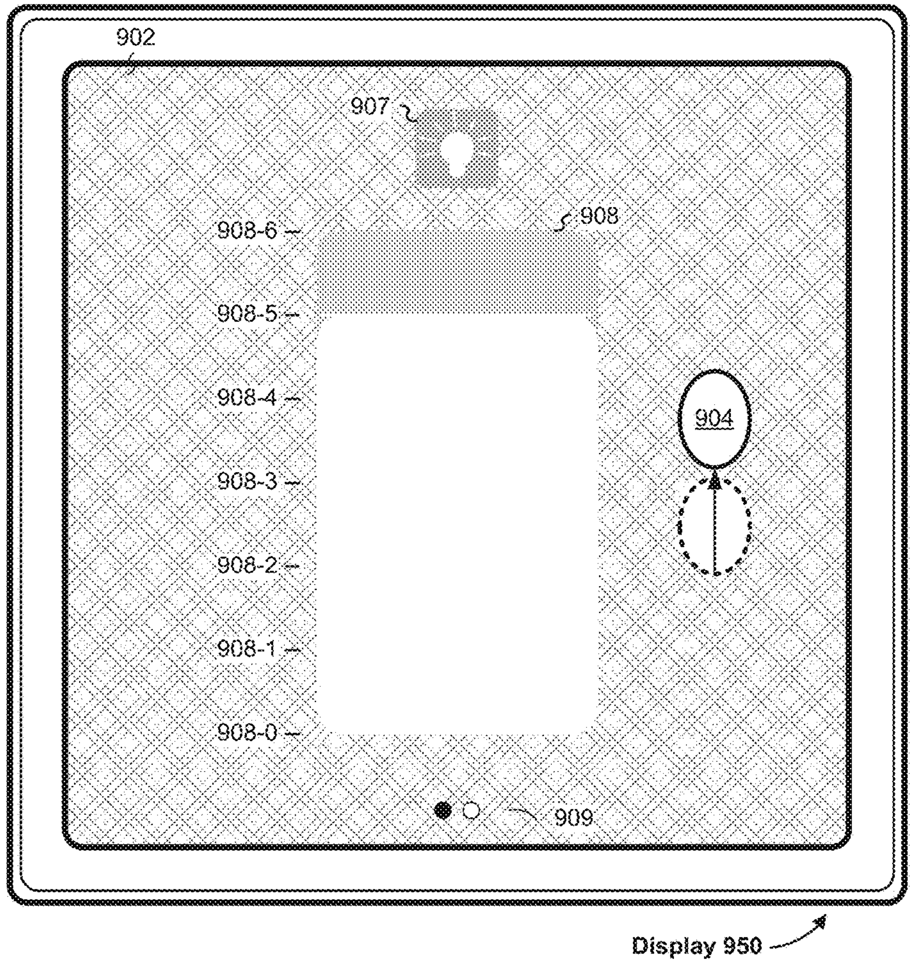
Figure 9C7

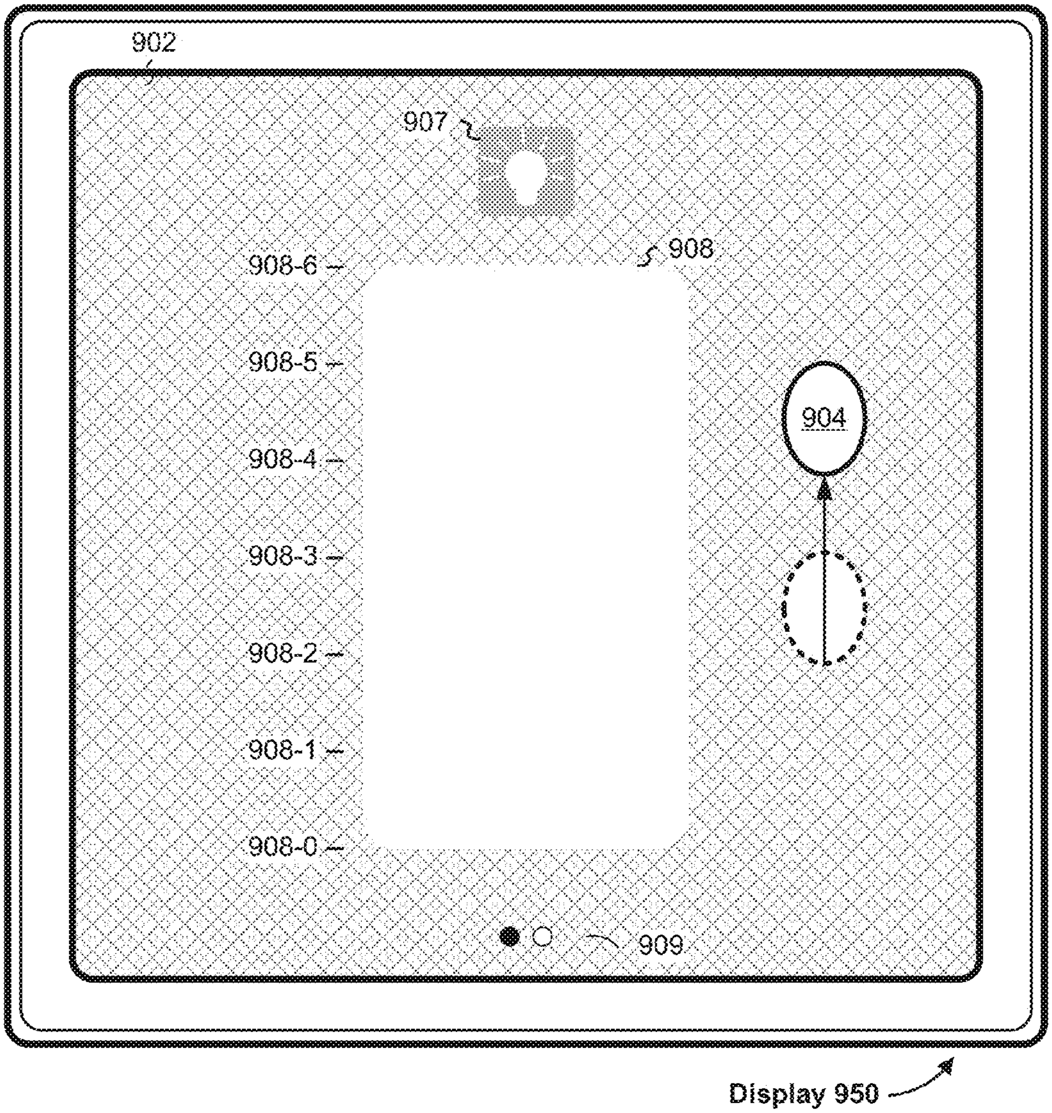
Figure 9C8

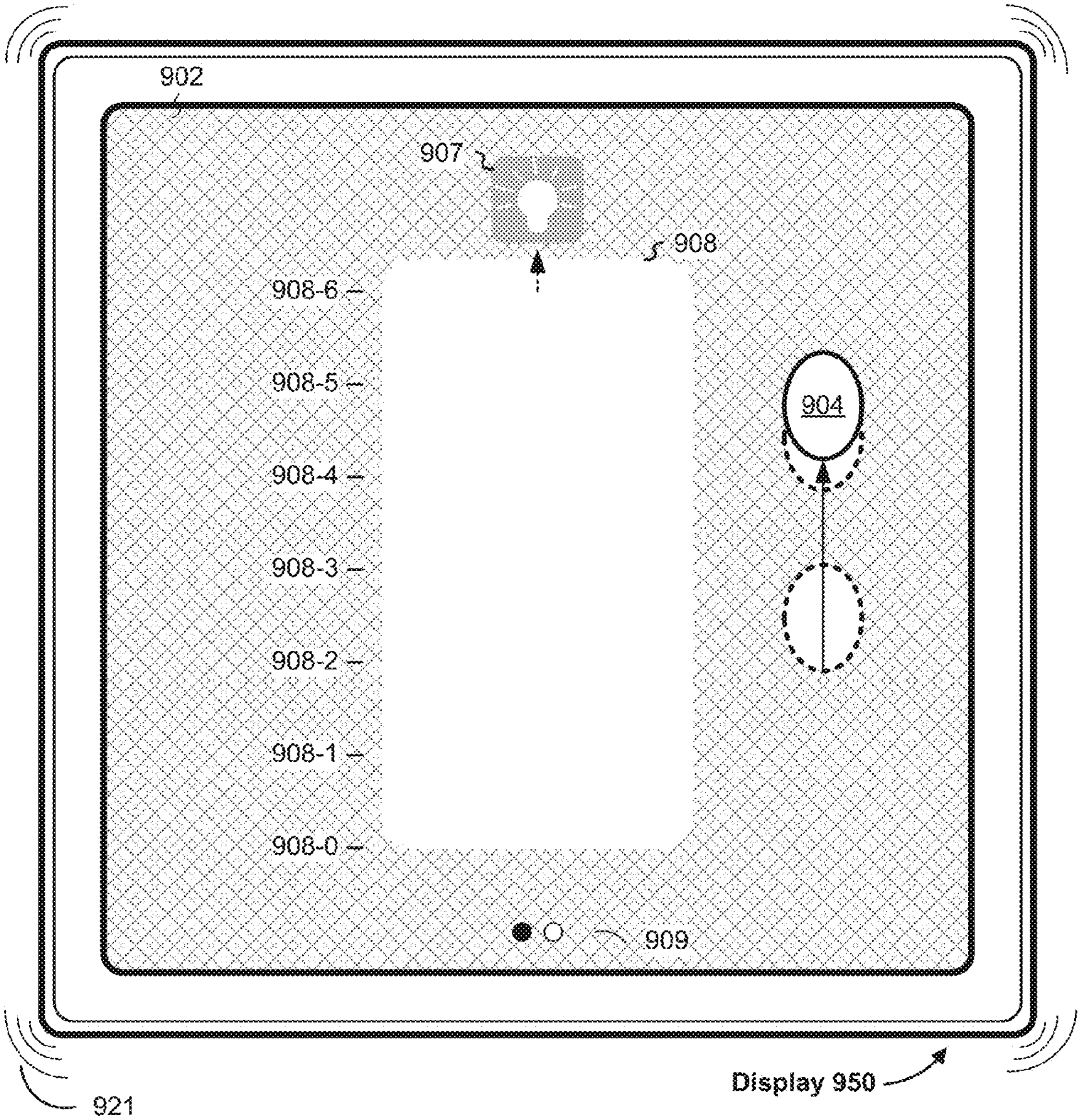
Figure 9C9

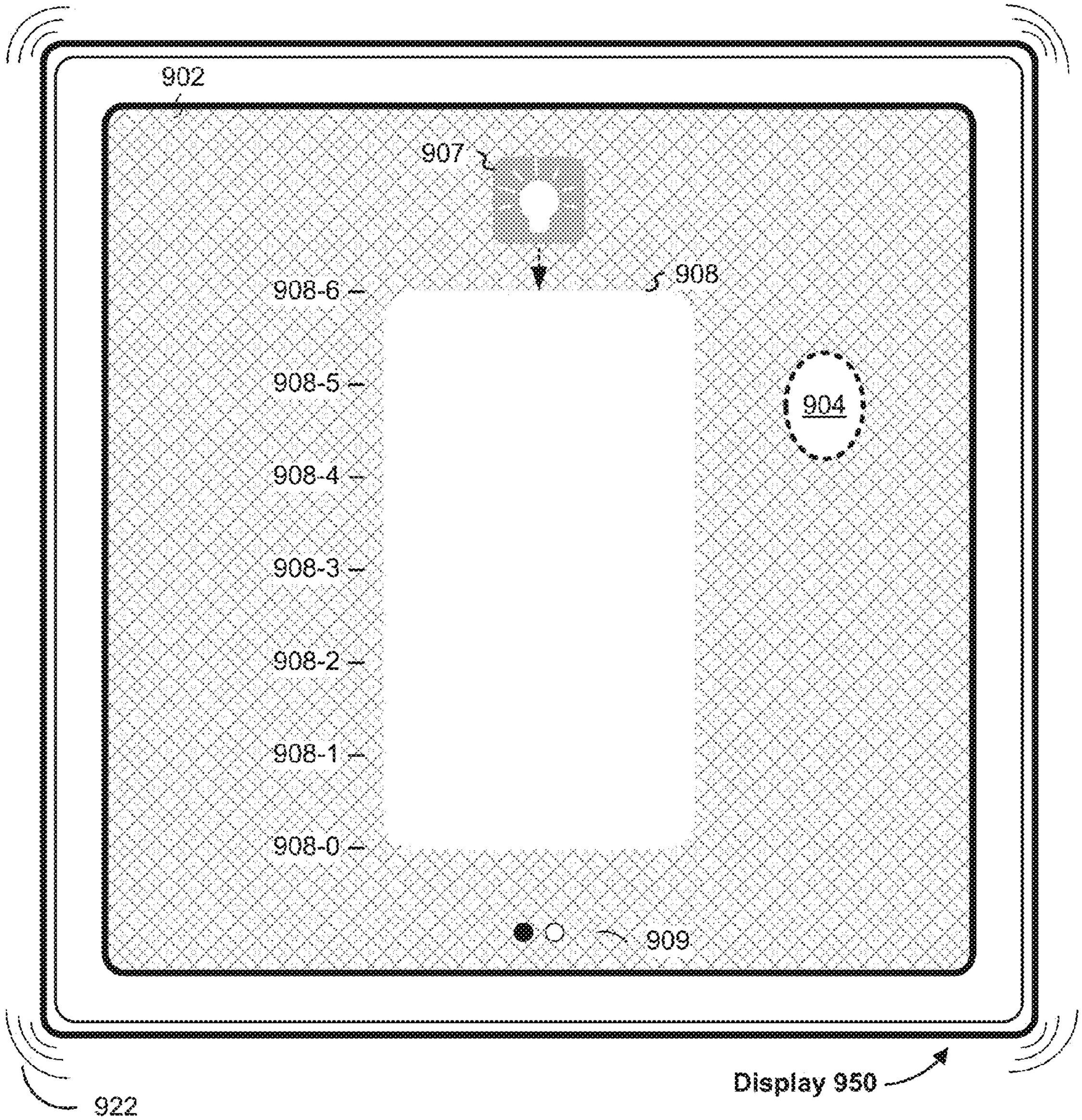
Figure 9C10

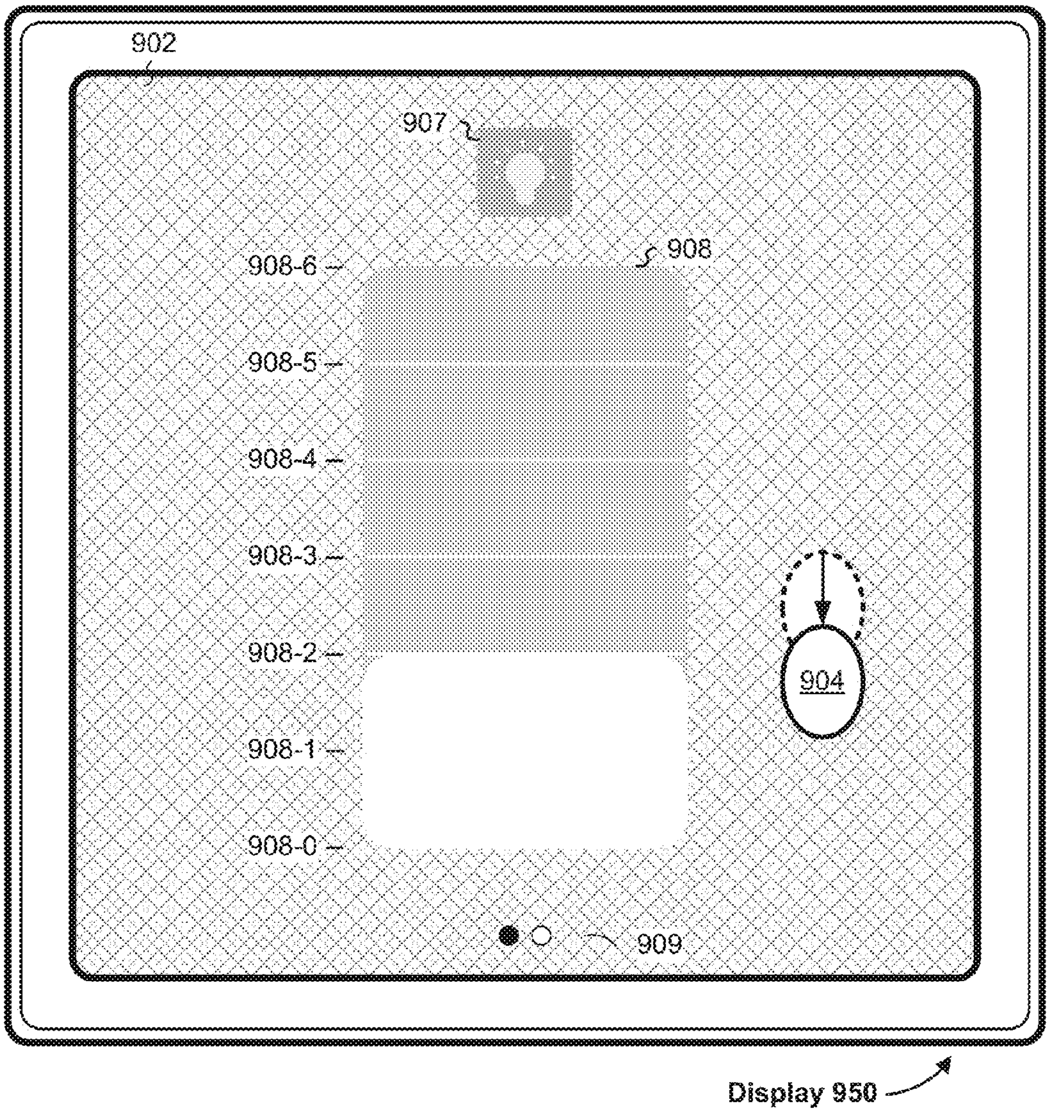
Figure 9C11

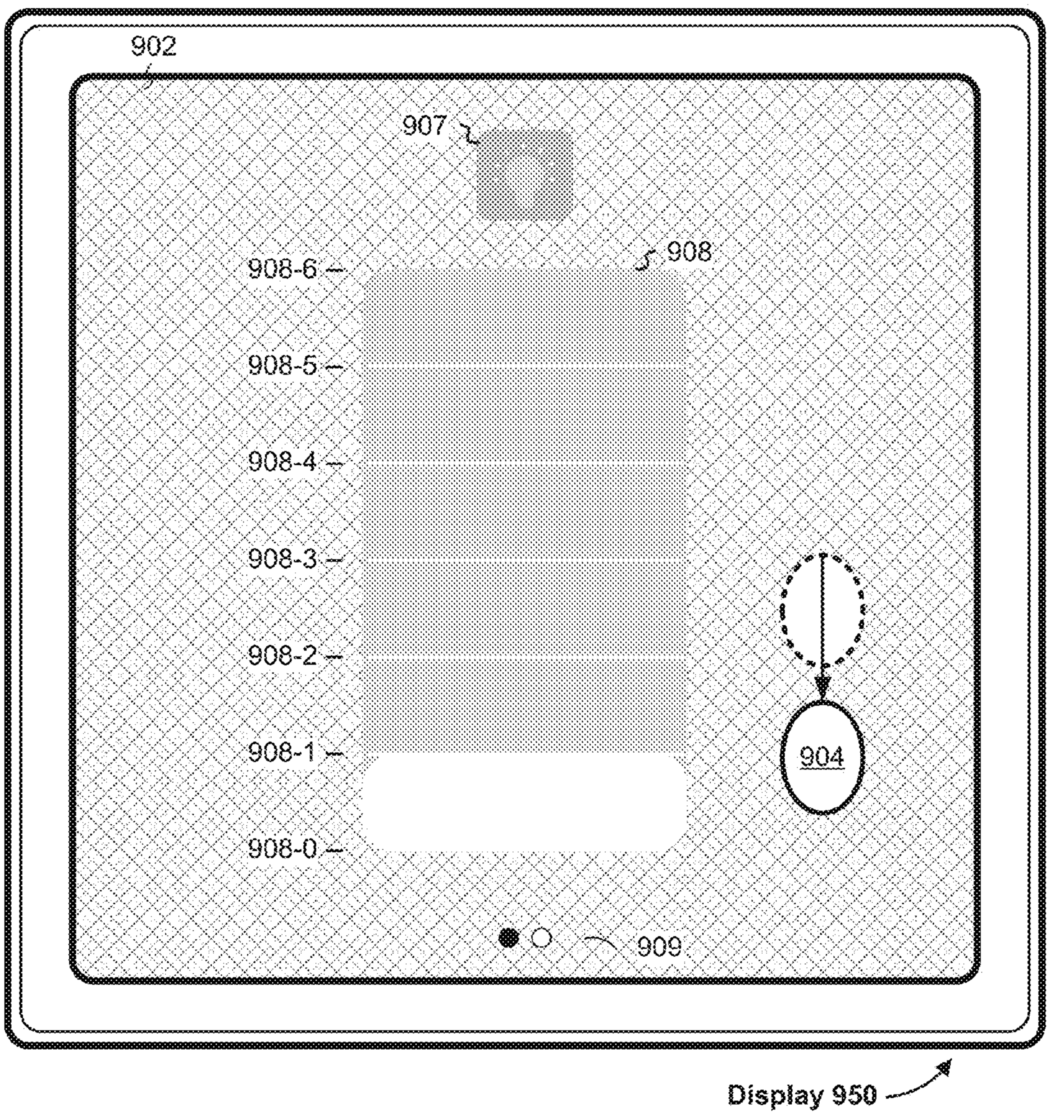
Figure 9C12

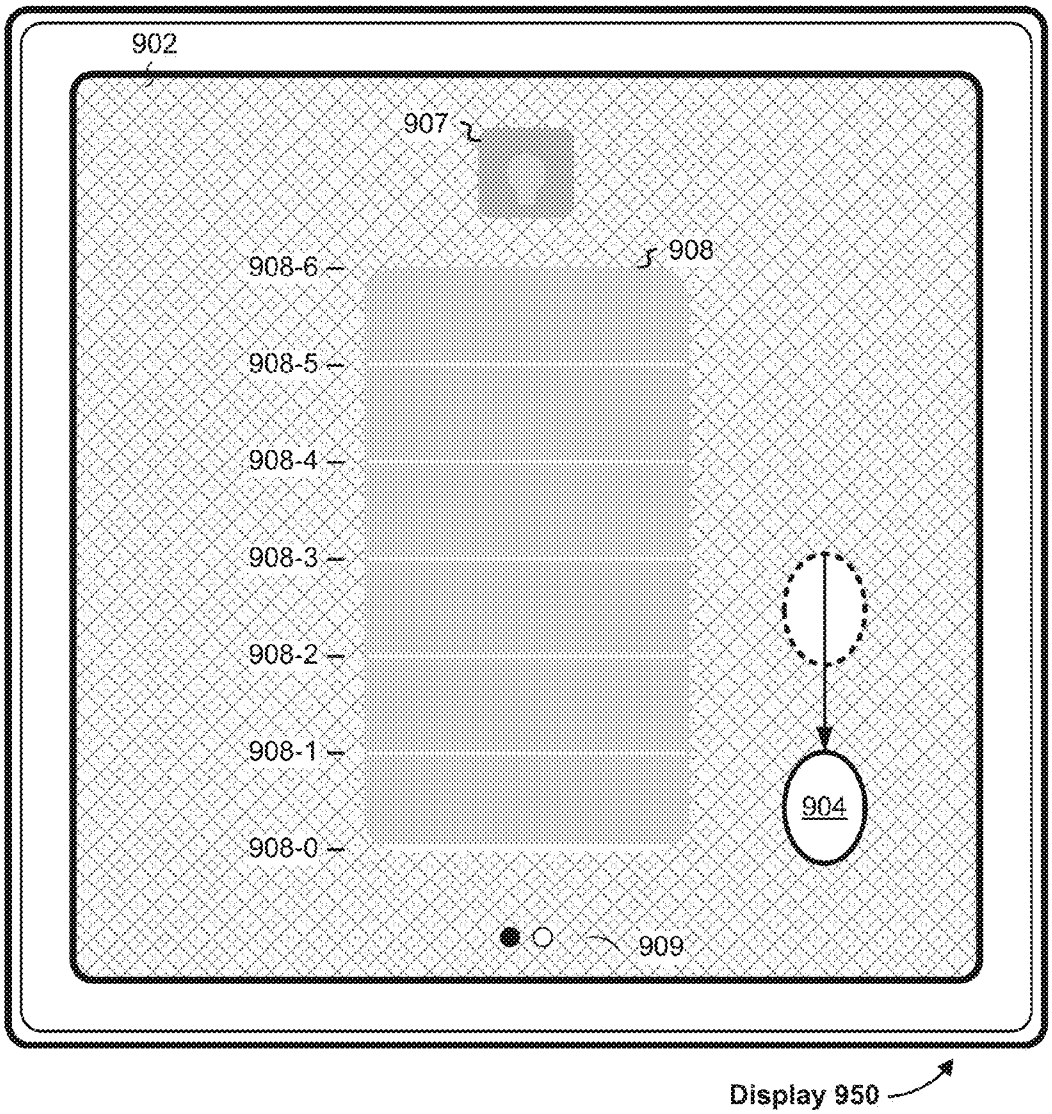
Figure 9C13

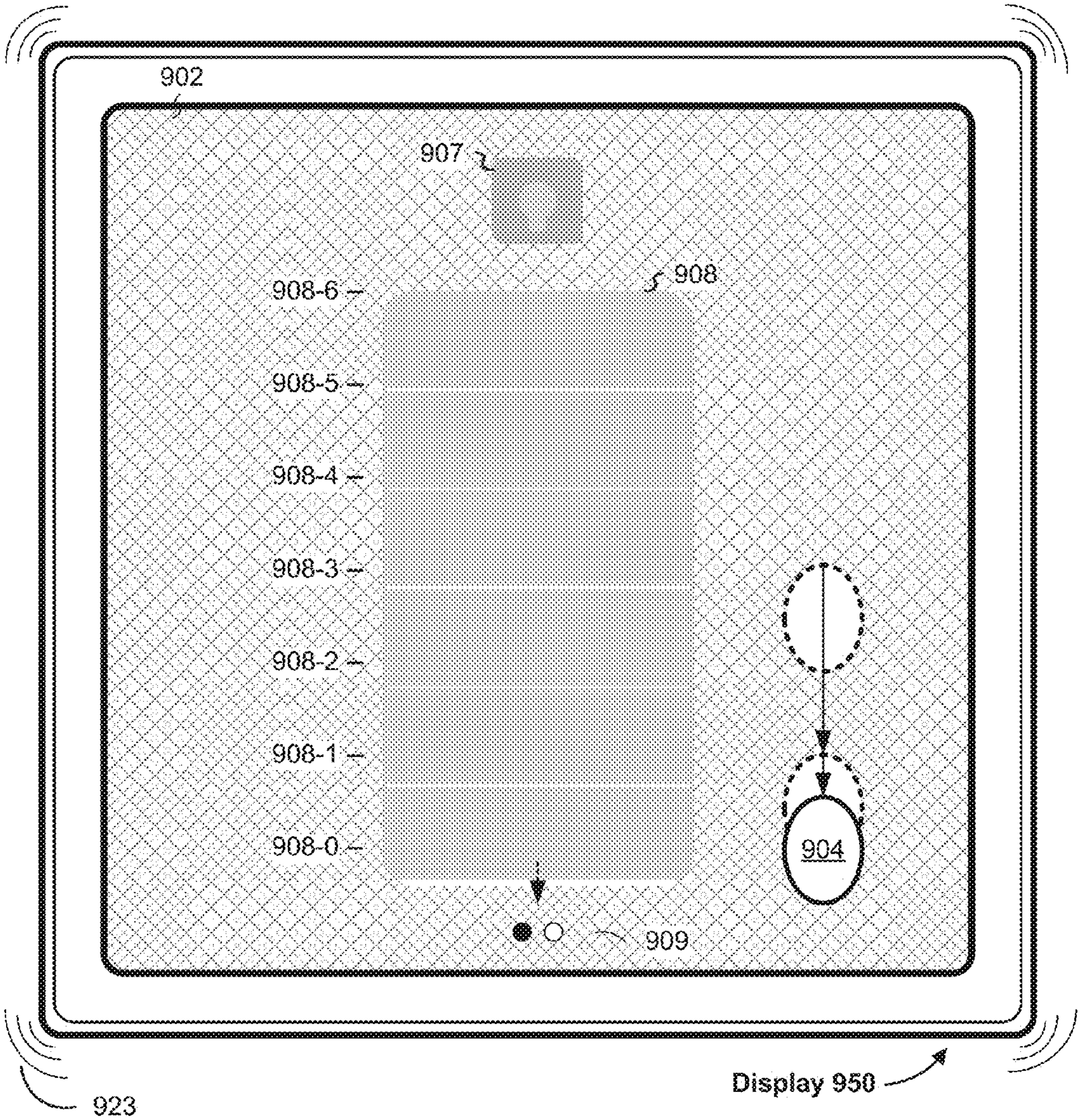
Figure 9C14

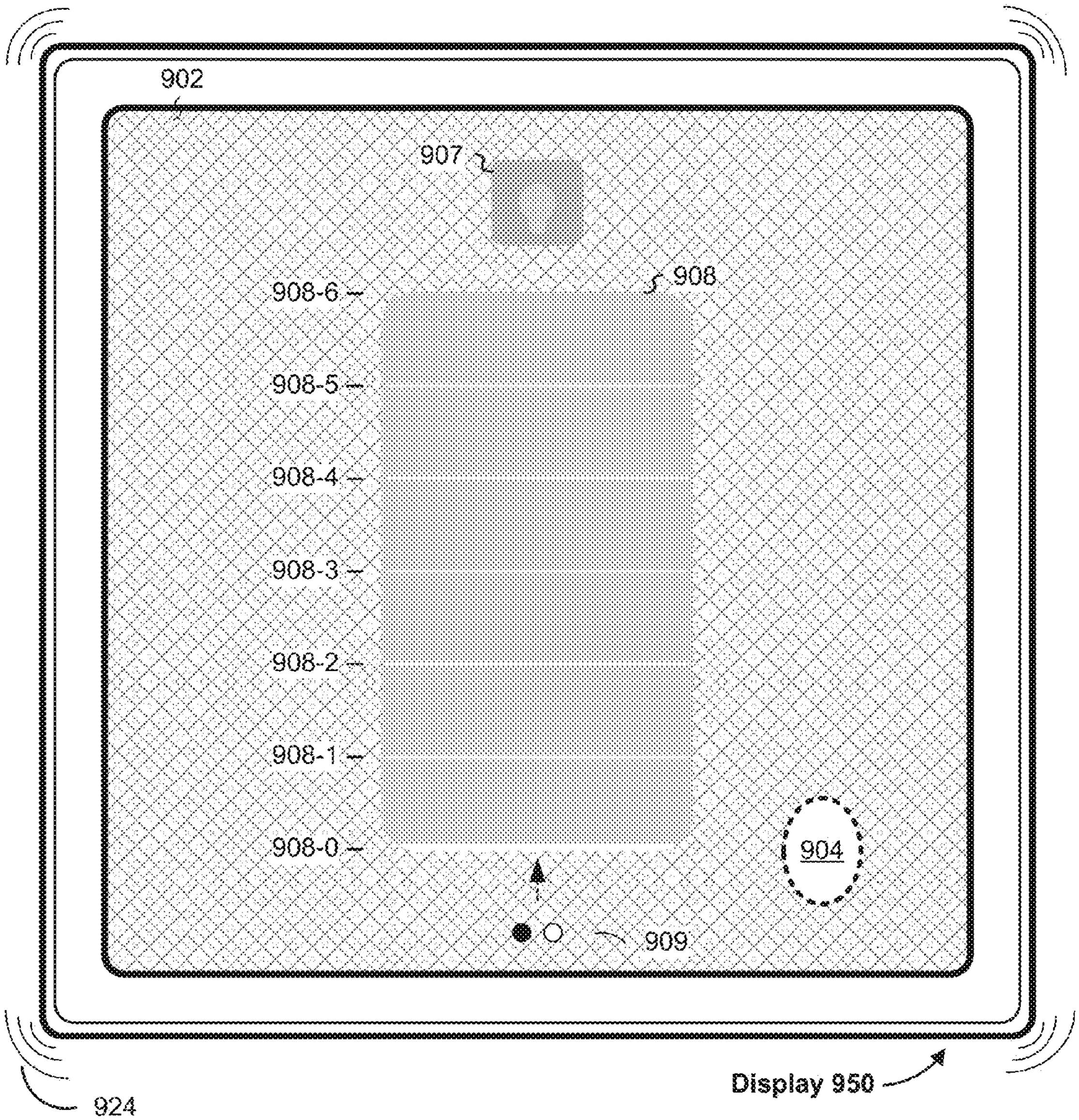
Figure 9C15

Figure 9C16

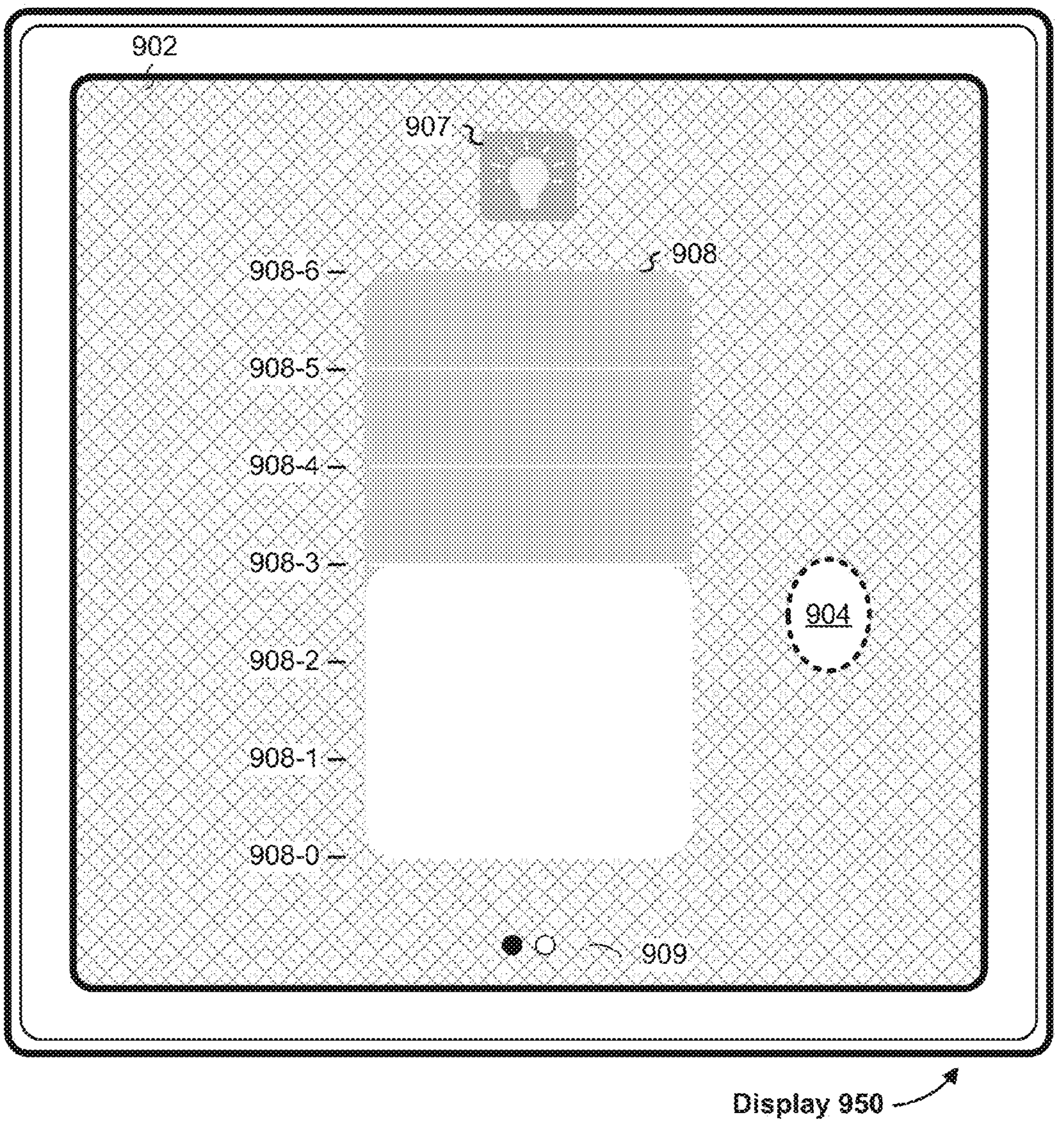
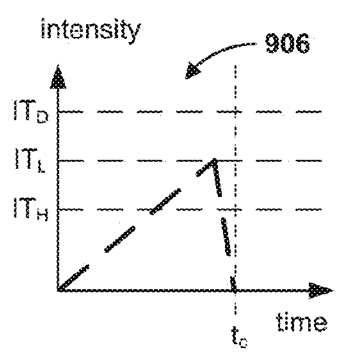
Figure 9C17

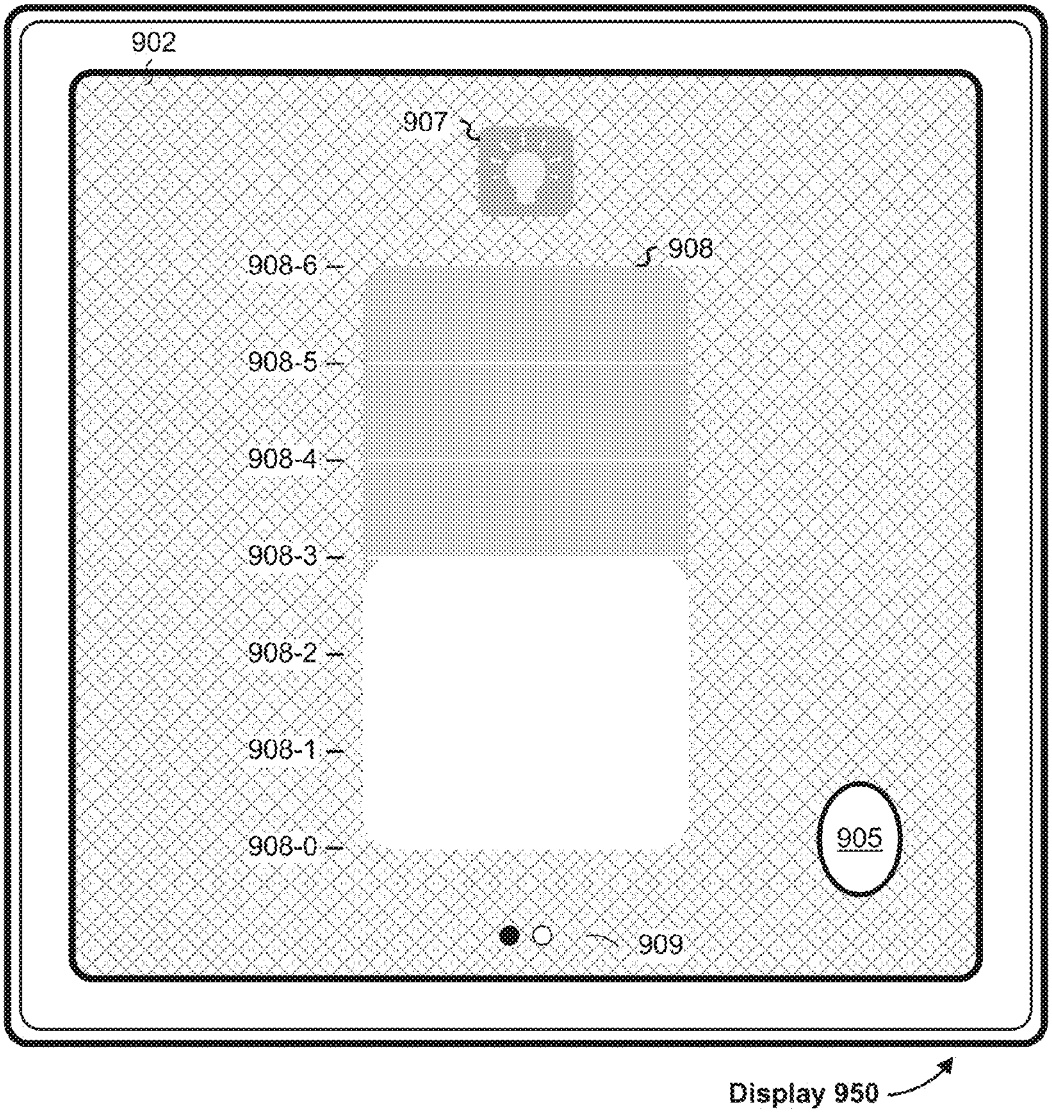
Figure 9C18

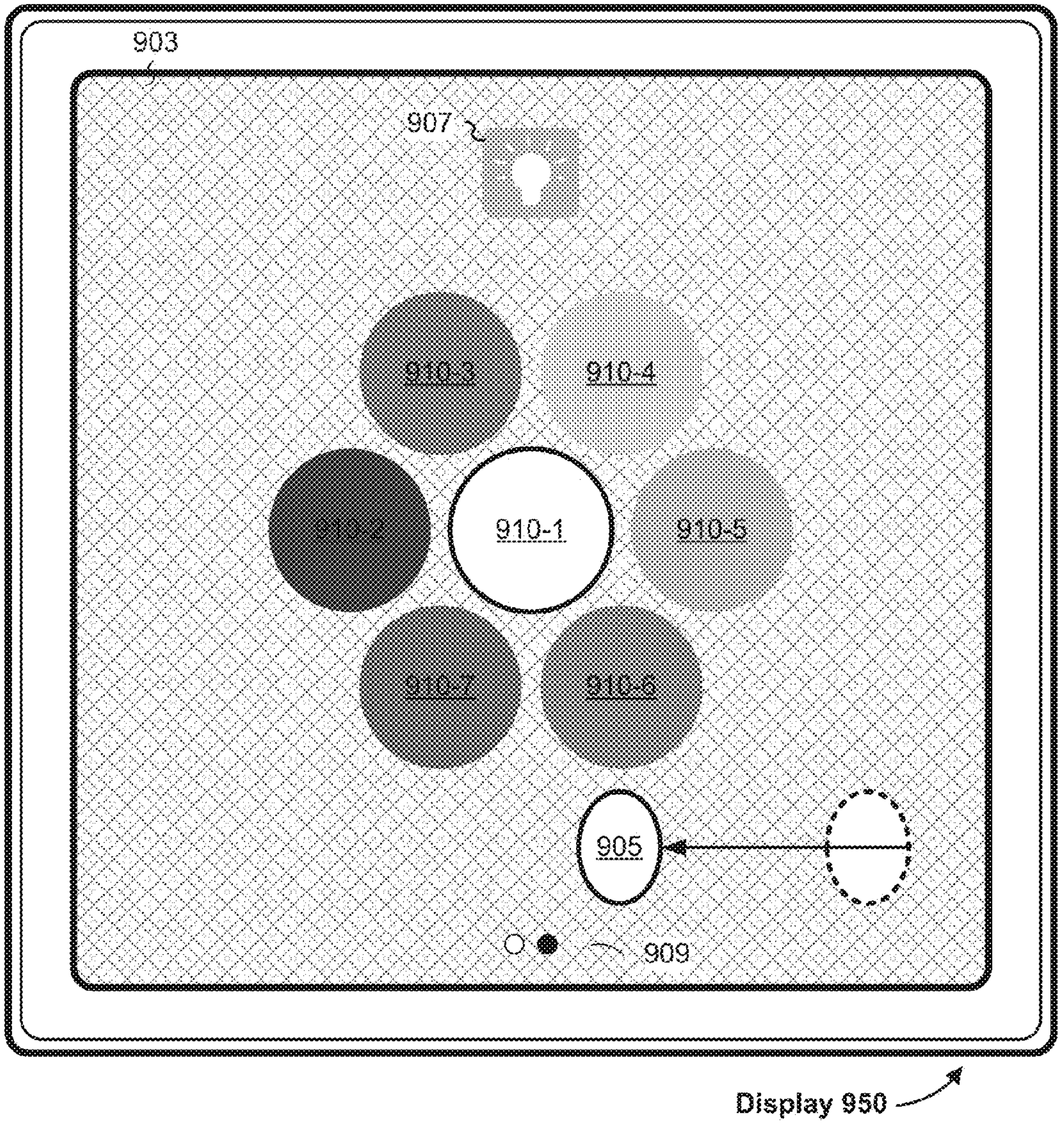
Figure 9C19

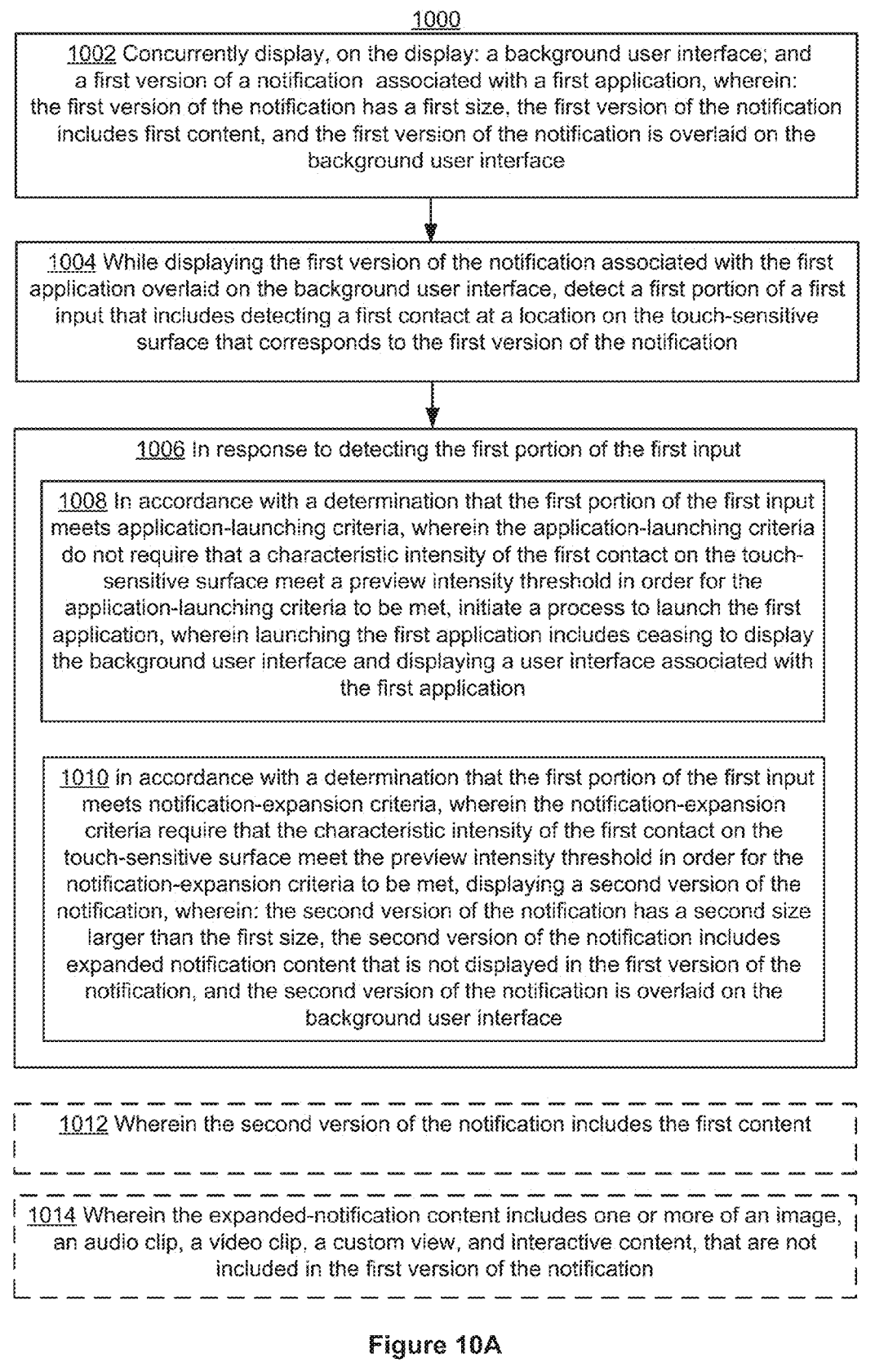

1000

1002 Concurrently display, on the display: a background user interface; and a first version of a notification associated with a first application, wherein: the first version of the notification has a first size, the first version of the notification includes first content, and the first version of the notification is overlaid on the background user interface 1004 While displaying the first version of the notification associated with the first application overlaid on the background user interface, detect a first portion of a first input that includes detecting a first contact at a location on the touch-sensitive surface that corresponds to the first version of the notification 1006 In response to detecting the first portion of the first input 1008 In accordance with a determination that the first portion of the first input meets application-launching criteria, wherein the application-launching criteria do not require that a characteristic intensity of the first contact on the touch-sensitive surface meet a preview intensity threshold in order for the application-launching criteria to be met, initiate a process to launch the first application, wherein launching the first application includes ceasing to display the background user interface and displaying a user interface associated with the first application 1010 in accordance with a determination that the first portion of the first input meets notification-expansion criteria, wherein the notification-expansion criteria require that the characteristic intensity of the first contact on the touch-sensitive surface meet the preview intensity threshold in order for the notification-expansion criteria to be met, displaying a second version of the notification, wherein: the second version of the notification has a second size larger than the first size, the second version of the notification includes expanded notification content that is not displayed in the first version of the notification, and the second version of the notification is overlaid on the background user interface 1012 Wherein the second version of the notification includes the first content 1014 Wherein the expanded-notification content includes one or more of an image, an audio clip, a video clip, a custom view, and interactive content, that are not included in the first version of the notification

Figure 10A

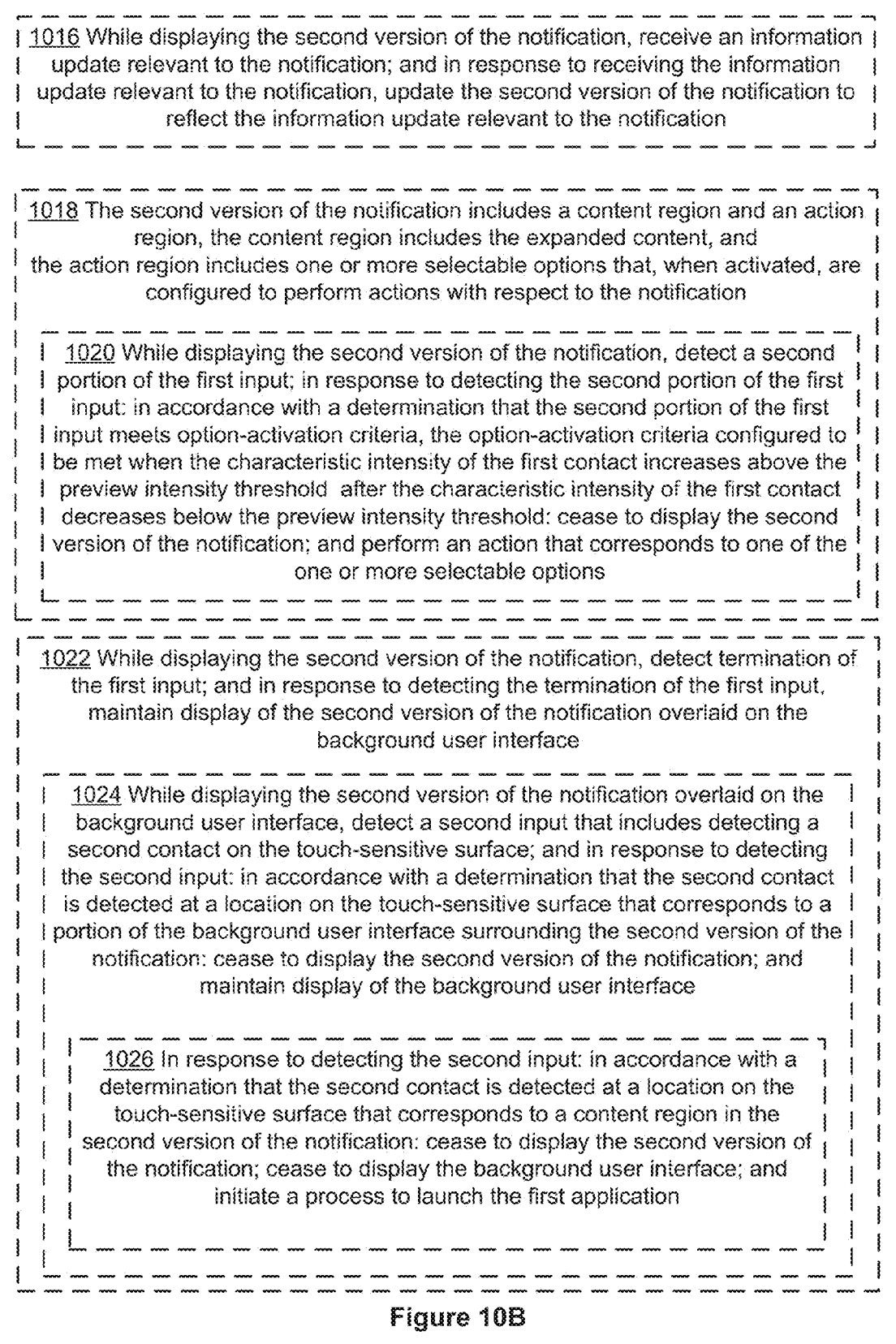

1016 While displaying the second version of the notification, receive an information update relevant to the notification; and in response to receiving the information update relevant to the notification, update the second version of the notification to reflect the information update relevant to the notification 1018 The second version of the notification includes a content region and an action region, the content region includes the expanded content, and the action region includes one or more selectable options that, when activated, are configured to perform actions with respect to the notification 1020 While displaying the second version of the notification, detect a second portion of the first input; in response to detecting the second portion of the first input: in accordance with a determination that the second portion of the first input meets option-activation criteria, the option-activation criteria configured to be met when the characteristic intensity of the first contact increases above the preview intensity threshold after the characteristic intensity of the first contact decreases below the preview intensity threshold: cease to display the second version of the notification; and perform an action that corresponds to one of the one or more selectable options 1022 While displaying the second version of the notification, detect termination of the first input; and in response to detecting the termination of the first input, maintain display of the second version of the notification overlaid on the background user interface 1024 While displaying the second version of the notification overlaid on the background user interface, detect a second input that includes detecting a second contact on the touch-sensitive surface; and in response to detecting the second input: in accordance with a determination that the second contact is detected at a location on the touch-sensitive surface that corresponds to a portion of the background user interface surrounding the second version of the notification: cease to display the second version of the notification; and maintain display of the background user interface 1026 In response to detecting the second input: in accordance with a determination that the second contact is detected at a location on the touch-sensitive surface that corresponds to a content region in the second version of the notification: cease to display the second version of the notification; cease to display the background user interface; and initiate a process to launch the first application

Figure 10B

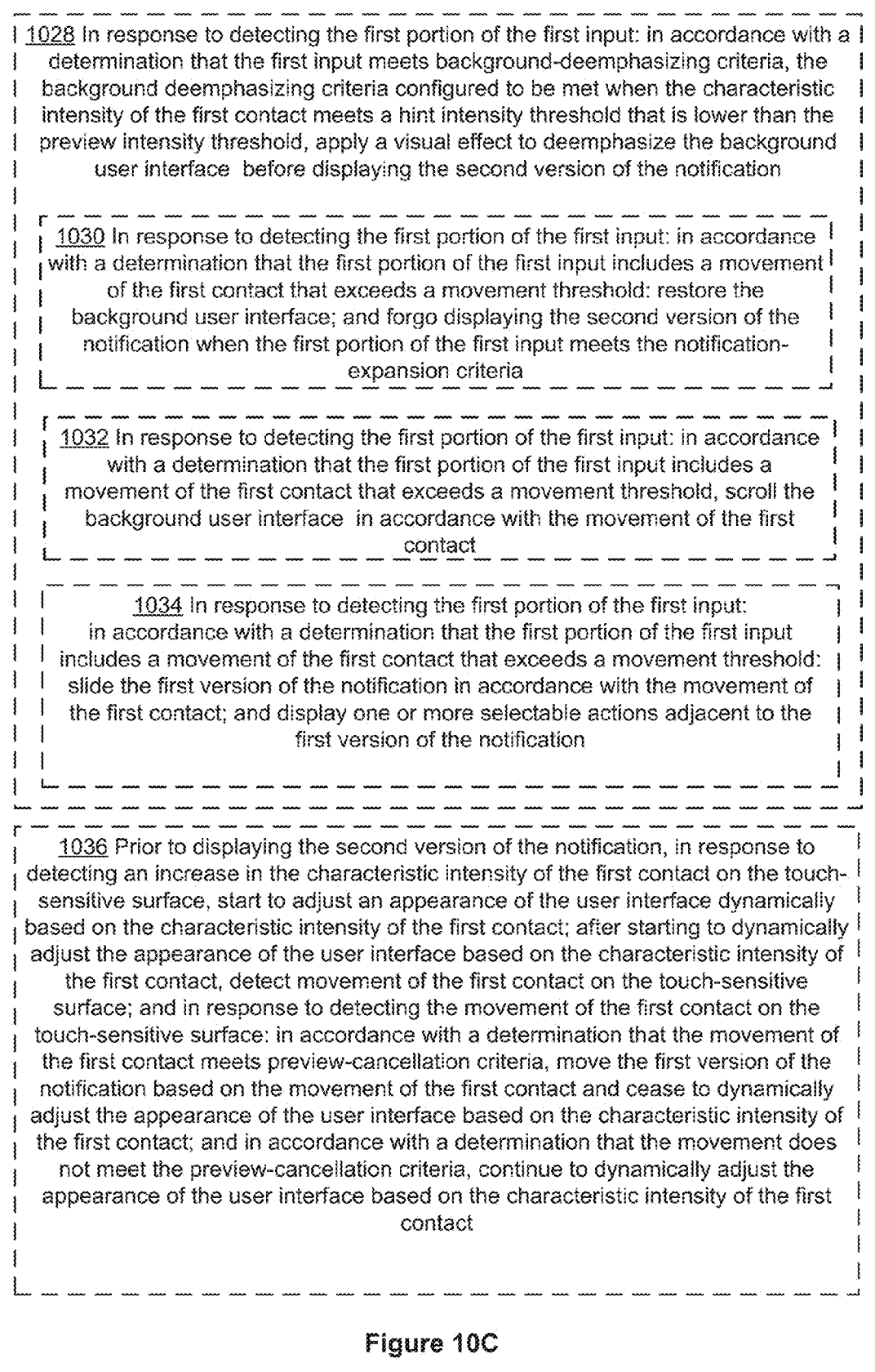

1028 In response to detecting the first portion of the first input: in accordance with a determination that the first input meets background-deemphasizing criteria, the background deemphasizing criteria configured to be met when the characteristic intensity of the first contact meets a hint intensity threshold that is lower than the preview intensity threshold, apply a visual effect to deemphasize the background user interface before displaying the second version of the notification 1030 In response to detecting the first portion of the first input: in accordance with a determination that the first portion of the first input includes a movement of the first contact that exceeds a movement threshold: restore the background user interface; and forgo displaying the second version of the notification when the first portion of the first input meets the notification-expansion criteria 1032 In response to detecting the first portion of the first input: in accordance with a determination that the first portion of the first input includes a movement of the first contact that exceeds a movement threshold, scroll the background user interface in accordance with the movement of the first contact 1034 In response to detecting the first portion of the first input: in accordance with a determination that the first portion of the first input includes a movement of the first contact that exceeds a movement threshold: slide the first version of the notification in accordance with the movement of the first contact; and display one or more selectable actions adjacent to the first version of the notification 1036 Prior to displaying the second version of the notification, in response to detecting an increase in the characteristic intensity of the first contact on the touch-sensitive surface, start to adjust an appearance of the user interface dynamically based on the characteristic intensity of the first contact; after starting to dynamically adjust the appearance of the user interface based on the characteristic intensity of the first contact, detect movement of the first contact on the touch-sensitive surface; and in response to detecting the movement of the first contact on the touch-sensitive surface: in accordance with a determination that the movement of the first contact meets preview-cancellation criteria, move the first version of the notification based on the movement of the first contact and cease to dynamically adjust the appearance of the user interface based on the characteristic intensity of the first contact; and in accordance with a determination that the movement does not meet the preview-cancellation criteria, continue to dynamically adjust the appearance of the user interface based on the characteristic intensity of the first contact

Figure 10C

Figure 10D:
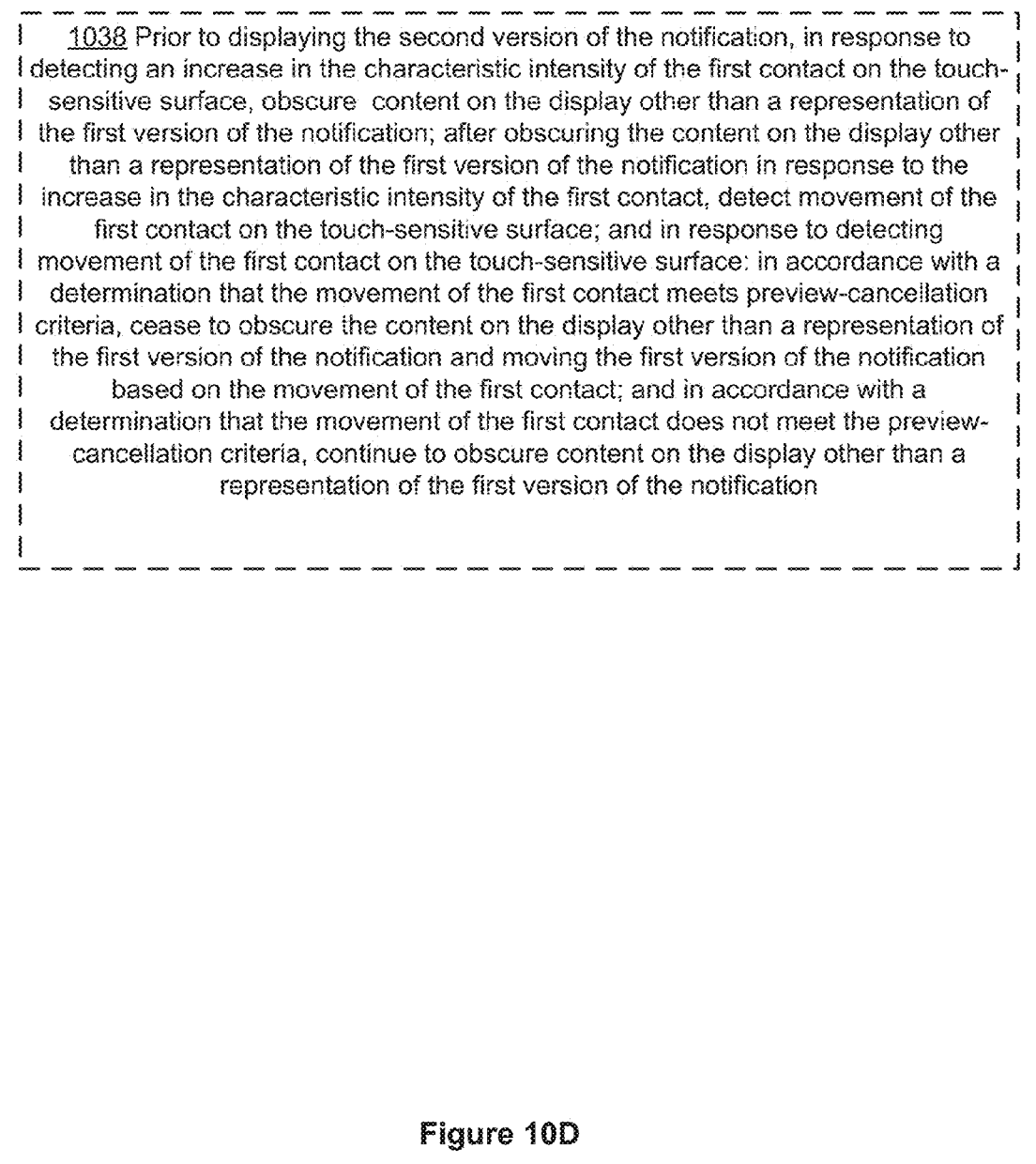

1038 Prior to displaying the second version of the notification, in response to detecting an increase in the characteristic intensity of the first contact on the touch-sensitive surface, obscure content on the display other than a representation of the first version of the notification; after obscuring the content on the display other than a representation of the first version of the notification in response to the increase in the characteristic intensity of the first contact, detect movement of the first contact on the touch-sensitive surface; and in response to detecting movement of the first contact on the touch-sensitive surface: in accordance with a determination that the movement of the first contact meets preview-cancellation criteria, cease to obscure the content on the display other than a representation of the first version of the notification and moving the first version of the notification based on the movement of the first contact; and in accordance with a determination that the movement of the first contact does not meet the preview-cancellation criteria, continue to obscure content on the display other than a representation of the first version of the notification

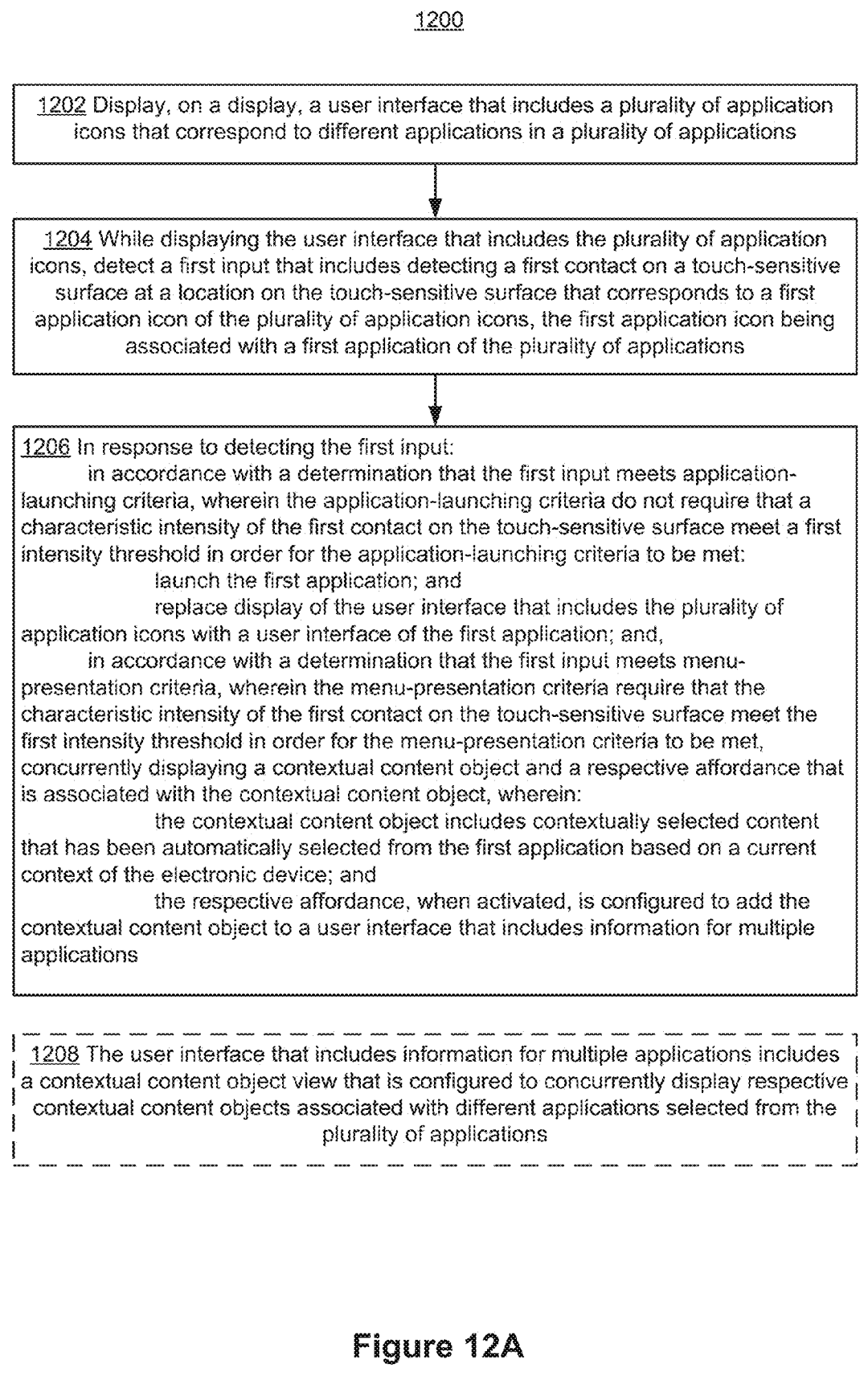

1202 Display, on a display, a user interface that includes a plurality of application icons that correspond to different applications in a plurality of applications

↓

1204 While displaying the user interface that includes the plurality of application icons, detect a first input that includes detecting a first contact on a touch-sensitive surface at a location on the touch-sensitive surface that corresponds to a first application icon of the plurality of application icons, the first application icon being associated with a first application of the plurality of applications

↓

1206 In response to detecting the first input:

in accordance with a determination that the first input meets application-launching criteria, wherein the application-launching criteria do not require that a characteristic intensity of the first contact on the touch-sensitive surface meet a first intensity threshold in order for the application-launching criteria to be met:

launch the first application; and replace display of the user interface that includes the plurality of application icons with a user interface of the first application; and, in accordance with a determination that the first input meets menu-presentation criteria, wherein the menu-presentation criteria require that the characteristic intensity of the first contact on the touch-sensitive surface meet the first intensity threshold in order for the menu-presentation criteria to be met, concurrently displaying a contextual content object and a respective affordance that is associated with the contextual content object, wherein:

the contextual content object includes contextually selected content that has been automatically selected from the first application based on a current context of the electronic device; and the respective affordance, when activated, is configured to add the contextual content object to a user interface that includes information for multiple applications 1208 The user interface that includes information for multiple applications includes a contextual content object view that is configured to concurrently display respective contextual content objects associated with different applications selected from the plurality of applications

Figure 12A

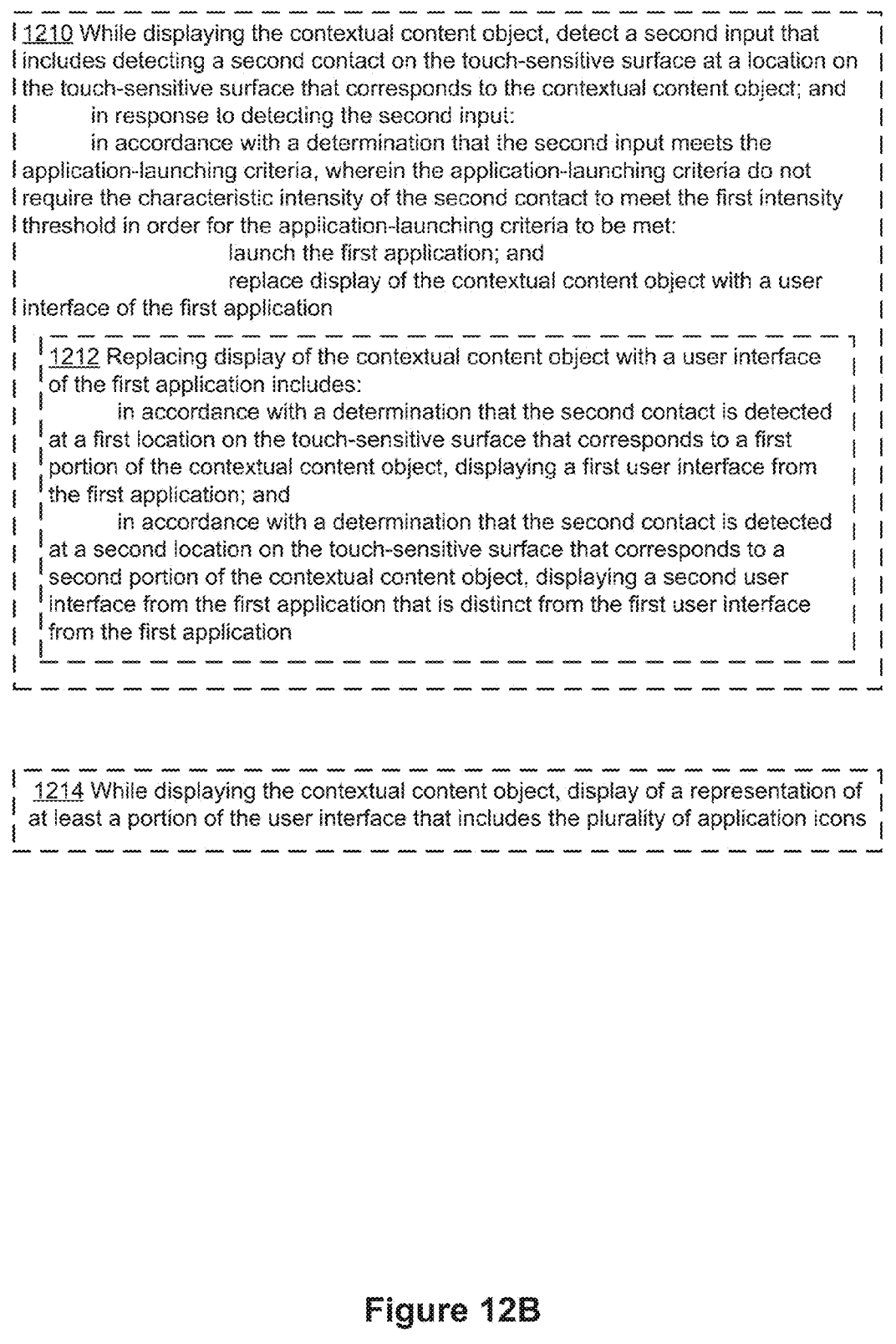

1210 While displaying the contextual content object, detect a second input that includes detecting a second contact on the touch-sensitive surface at a location on the touch-sensitive surface that corresponds to the contextual content object; and in response to detecting the second input:

in accordance with a determination that the second input meets the application-launching criteria, wherein the application-launching criteria do not require the characteristic intensity of the second contact to meet the first intensity threshold in order for the application-launching criteria to be met:

launch the first application; and replace display of the contextual content object with a user interface of the first application 1212 Replacing display of the contextual content object with a user interface of the first application includes:

in accordance with a determination that the second contact is detected at a first location on the touch-sensitive surface that corresponds to a first portion of the contextual content object, displaying a first user interface from the first application; and in accordance with a determination that the second contact is detected at a second location on the touch-sensitive surface that corresponds to a second portion of the contextual content object, displaying a second user interface from the first application that is distinct from the first user interface from the first application 1214 While displaying the contextual content object, display of a representation of at least a portion of the user interface that includes the plurality of application icons

Figure 12B

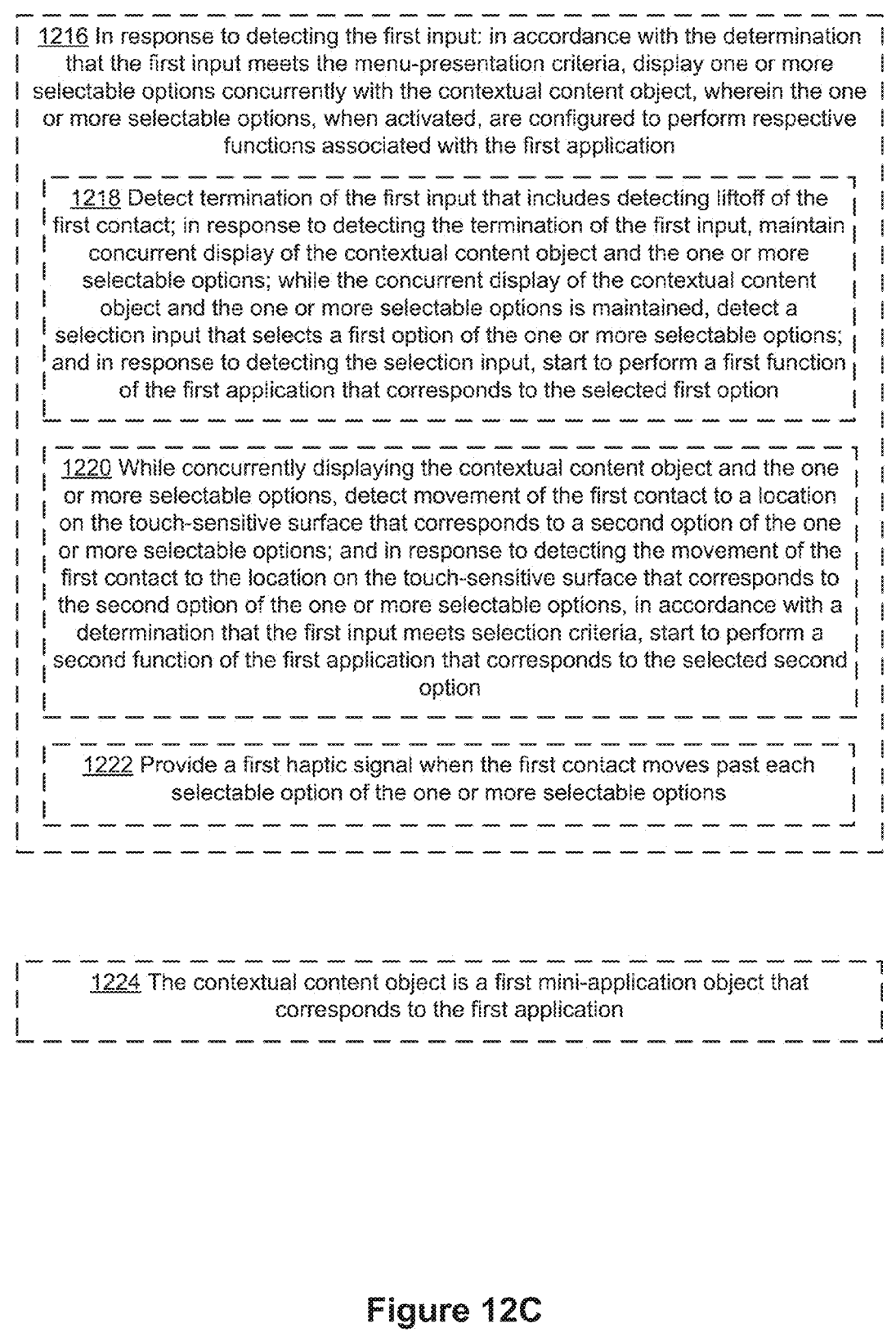

1216 In response to detecting the first input: in accordance with the determination that the first input meets the menu-presentation criteria, display one or more selectable options concurrently with the contextual content object, wherein the one or more selectable options, when activated, are configured to perform respective functions associated with the first application 1218 Detect termination of the first input that includes detecting liftoff of the first contact; in response to detecting the termination of the first input, maintain concurrent display of the contextual content object and the one or more selectable options; while the concurrent display of the contextual content object and the one or more selectable options is maintained, detect a selection input that selects a first option of the one or more selectable options; and in response to detecting the selection input, start to perform a first function of the first application that corresponds to the selected first option 1220 While concurrently displaying the contextual content object and the one or more selectable options, detect movement of the first contact to a location on the touch-sensitive surface that corresponds to a second option of the one or more selectable options; and in response to detecting the movement of the first contact to the location on the touch-sensitive surface that corresponds to the second option of the one or more selectable options, in accordance with a determination that the first input meets selection criteria, start to perform a second function of the first application that corresponds to the selected second option 1222 Provide a first haptic signal when the first contact moves past each selectable option of the one or more selectable options 1224 The contextual content object is a first mini-application object that corresponds to the first application

Figure 12C

Figure 12D:
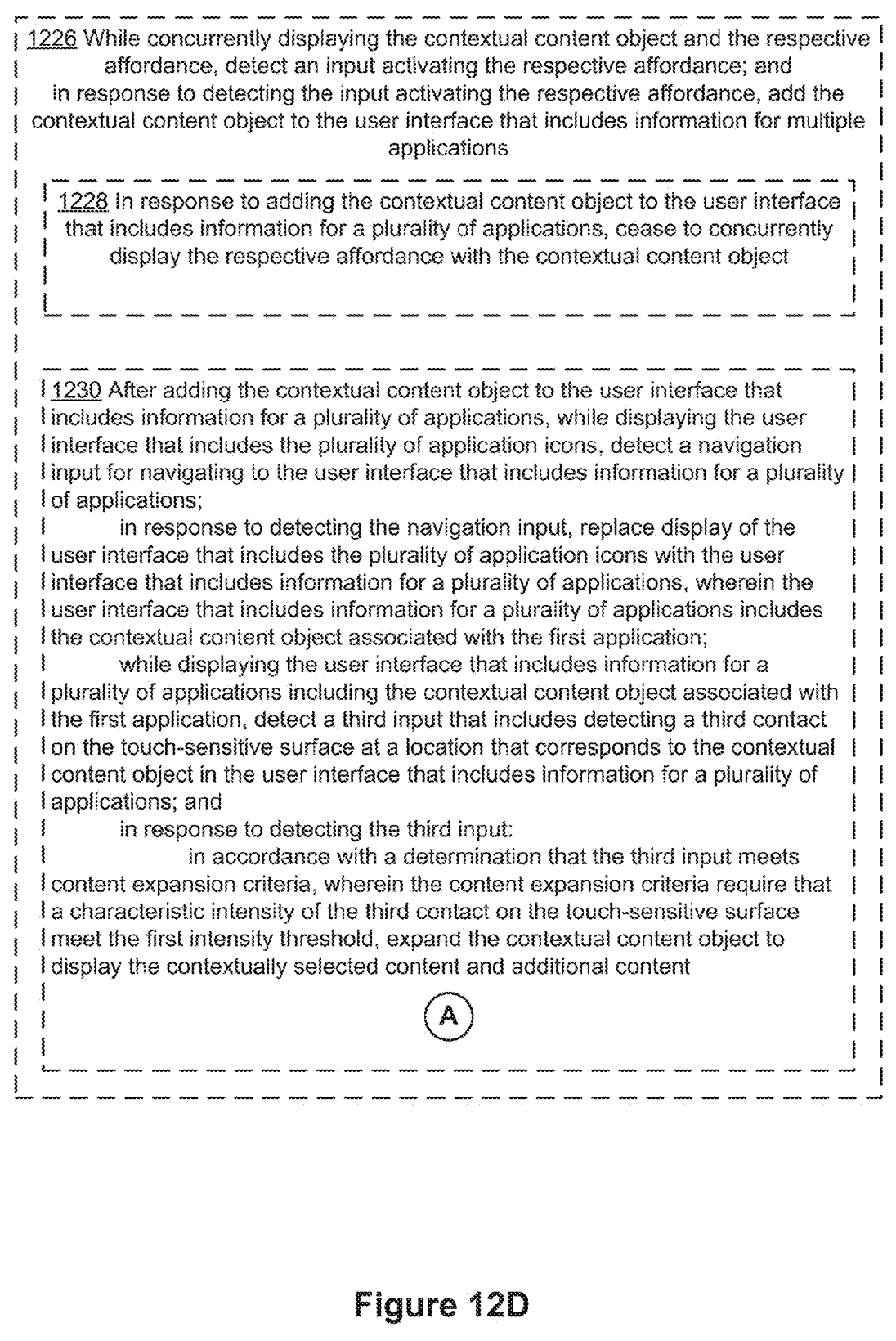

1226 While concurrently displaying the contextual content object and the respective affordance, detect an input activating the respective affordance; and
in response to detecting the input activating the respective affordance, add the contextual content object to the user interface that includes information for multiple applications 1228 In response to adding the contextual content object to the user interface that includes information for a plurality of applications, cease to concurrently display the respective affordance with the contextual content object 1230 After adding the contextual content object to the user interface that includes information for a plurality of applications, while displaying the user interface that includes the plurality of application icons, detect a navigation input for navigating to the user interface that includes information for a plurality of applications;

in response to detecting the navigation input, replace display of the user interface that includes the plurality of application icons with the user interface that includes information for a plurality of applications, wherein the user interface that includes information for a plurality of applications includes the contextual content object associated with the first application;

while displaying the user interface that includes information for a plurality of applications including the contextual content object associated with the first application, detect a third input that includes detecting a third contact on the touch-sensitive surface at a location that corresponds to the contextual content object in the user interface that includes information for a plurality of applications; and in response to detecting the third input:

in accordance with a determination that the third input meets content expansion criteria, wherein the content expansion criteria require that a characteristic intensity of the third contact on the touch-sensitive surface meet the first intensity threshold, expand the contextual content object to display the contextually selected content and additional content

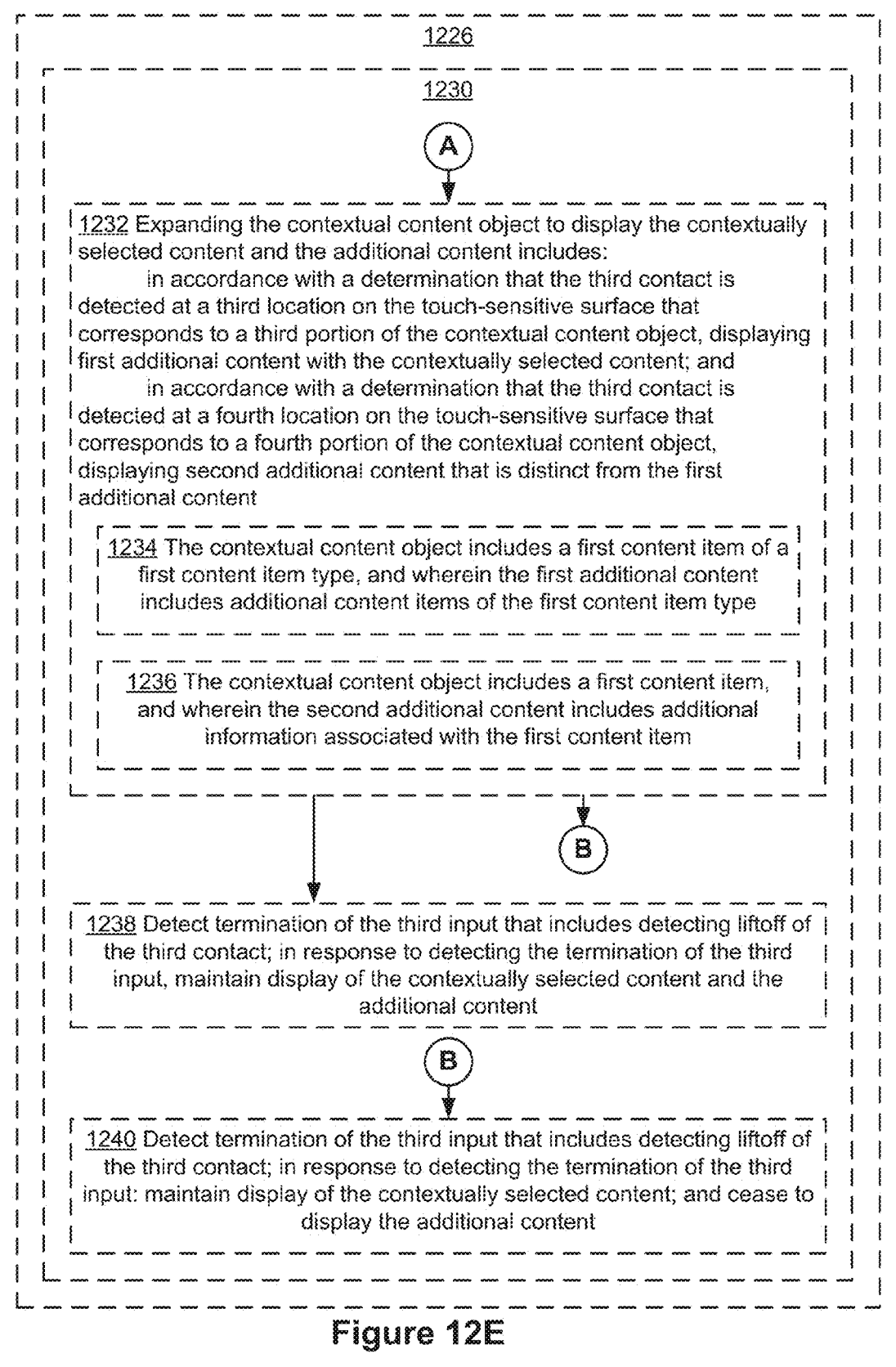

1232 Expanding the contextual content object to display the contextually selected content and the additional content includes:
in accordance with a determination that the third contact is detected at a third location on the touch-sensitive surface that corresponds to a third portion of the contextual content object, displaying first additional content with the contextually selected content; and
in accordance with a determination that the third contact is detected at a fourth location on the touch-sensitive surface that corresponds to a fourth portion of the contextual content object, displaying second additional content that is distinct from the first additional content 1234 The contextual content object includes a first content item of a first content item type, and wherein the first additional content includes additional content items of the first content item type 1236 The contextual content object includes a first content item, and wherein the second additional content includes additional information associated with the first content item (B)

1238 Detect termination of the third input that includes detecting liftoff of the third contact; in response to detecting the termination of the third input, maintain display of the contextually selected content and the additional content (B)

1240 Detect termination of the third input that includes detecting liftoff of the third contact; in response to detecting the termination of the third input: maintain display of the contextually selected content; and cease to display the additional content

Figure 12E

Figure 12F:
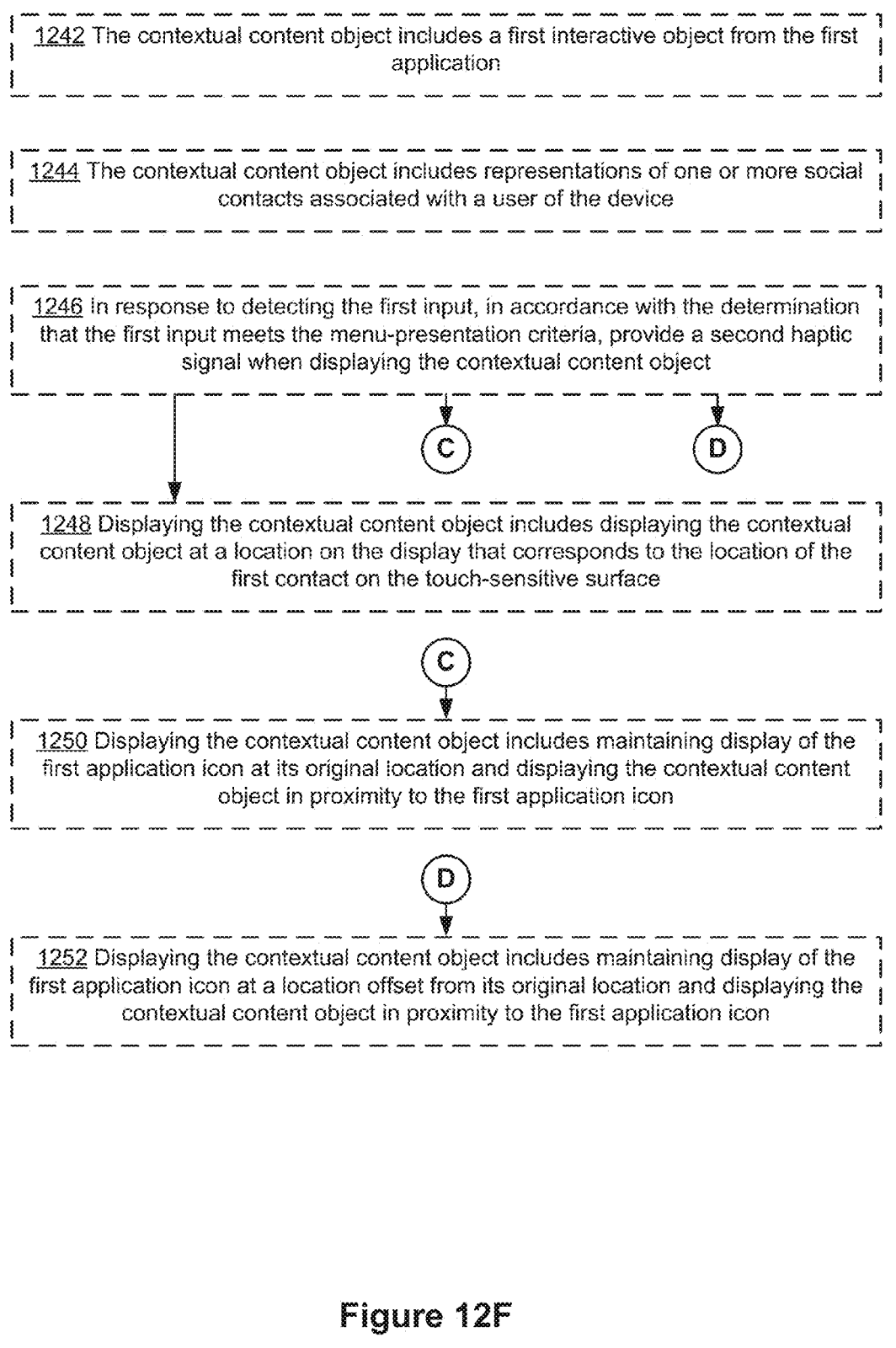

1242 The contextual content object includes a first interactive object from the first application 1244 The contextual content object includes representations of one or more social contacts associated with a user of the device 1246 In response to detecting the first input, in accordance with the determination that the first input meets the menu-presentation criteria, provide a second haptic signal when displaying the contextual content object

C

D

1248 Displaying the contextual content object includes displaying the contextual content object at a location on the display that corresponds to the location of the first contact on the touch-sensitive surface

C

1250 Displaying the contextual content object includes maintaining display of the first application icon at its original location and displaying the contextual content object in proximity to the first application icon

D

1252 Displaying the contextual content object includes maintaining display of the first application icon at a location offset from its original location and displaying the contextual content object in proximity to the first application icon

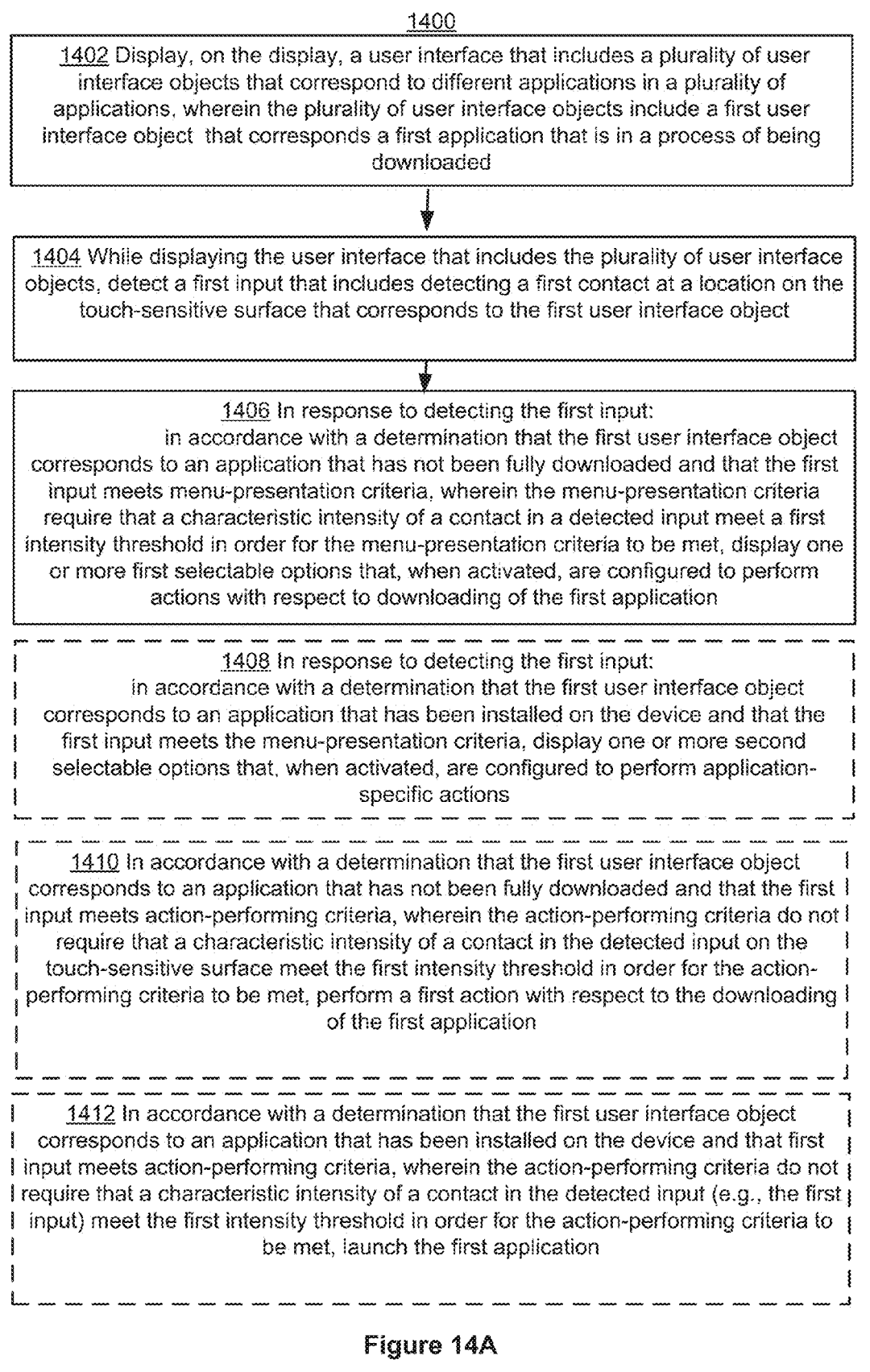

1402 Display, on the display, a user interface that includes a plurality of user interface objects that correspond to different applications in a plurality of applications, wherein the plurality of user interface objects include a first user interface object that corresponds a first application that is in a process of being downloaded

↓

1404 While displaying the user interface that includes the plurality of user interface objects, detect a first input that includes detecting a first contact at a location on the touch-sensitive surface that corresponds to the first user interface object

↓

1406 In response to detecting the first input:
in accordance with a determination that the first user interface object corresponds to an application that has not been fully downloaded and that the first input meets menu-presentation criteria, wherein the menu-presentation criteria require that a characteristic intensity of a contact in a detected input meet a first intensity threshold in order for the menu-presentation criteria to be met, display one or more first selectable options that, when activated, are configured to perform actions with respect to downloading of the first application 1408 In response to detecting the first input:
in accordance with a determination that the first user interface object corresponds to an application that has been installed on the device and that the first input meets the menu-presentation criteria, display one or more second selectable options that, when activated, are configured to perform application-specific actions 1410 In accordance with a determination that the first user interface object corresponds to an application that has not been fully downloaded and that the first input meets action-performing criteria, wherein the action-performing criteria do not require that a characteristic intensity of a contact in the detected input on the touch-sensitive surface meet the first intensity threshold in order for the action-performing criteria to be met, perform a first action with respect to the downloading of the first application 1412 In accordance with a determination that the first user interface object corresponds to an application that has been installed on the device and that first input meets action-performing criteria, wherein the action-performing criteria do not require that a characteristic intensity of a contact in the detected input (e.g., the first input) meet the first intensity threshold in order for the action-performing criteria to be met, launch the first application

Figure 14A

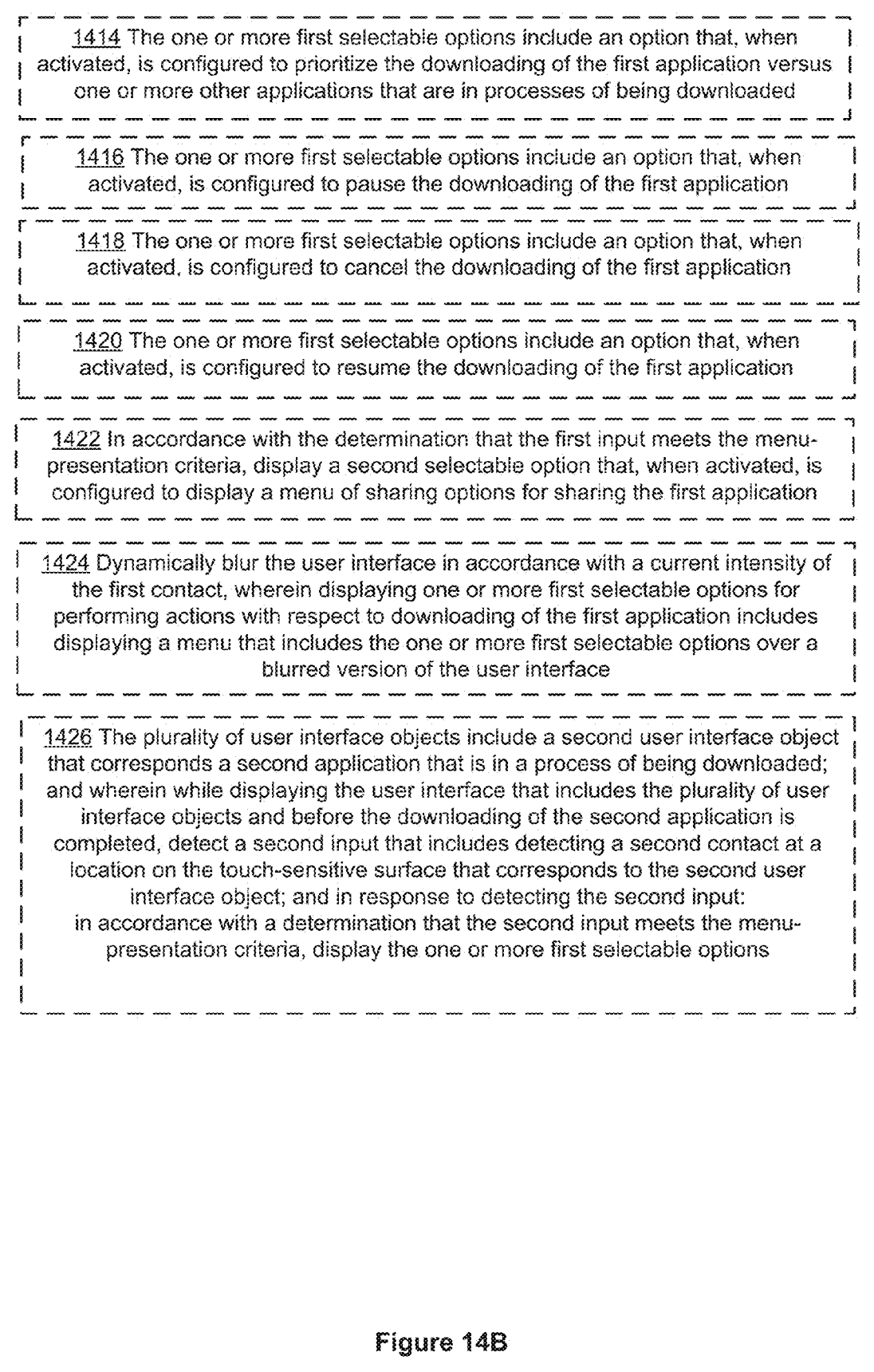

1414 The one or more first selectable options include an option that, when activated, is configured to prioritize the downloading of the first application versus one or more other applications that are in processes of being downloaded 1416 The one or more first selectable options include an option that, when activated, is configured to pause the downloading of the first application 1418 The one or more first selectable options include an option that, when activated, is configured to cancel the downloading of the first application 1420 The one or more first selectable options include an option that, when activated, is configured to resume the downloading of the first application 1422 In accordance with the determination that the first input meets the menu-presentation criteria, display a second selectable option that, when activated, is configured to display a menu of sharing options for sharing the first application 1424 Dynamically blur the user interface in accordance with a current intensity of the first contact, wherein displaying one or more first selectable options for performing actions with respect to downloading of the first application includes displaying a menu that includes the one or more first selectable options over a blurred version of the user interface 1426 The plurality of user interface objects include a second user interface object that corresponds a second application that is in a process of being downloaded; and wherein while displaying the user interface that includes the plurality of user interface objects and before the downloading of the second application is completed, detect a second input that includes detecting a second contact at a location on the touch-sensitive surface that corresponds to the second user interface object; and in response to detecting the second input:
in accordance with a determination that the second input meets the menu-presentation criteria, display the one or more first selectable options

Figure 14B

Figure 14C:
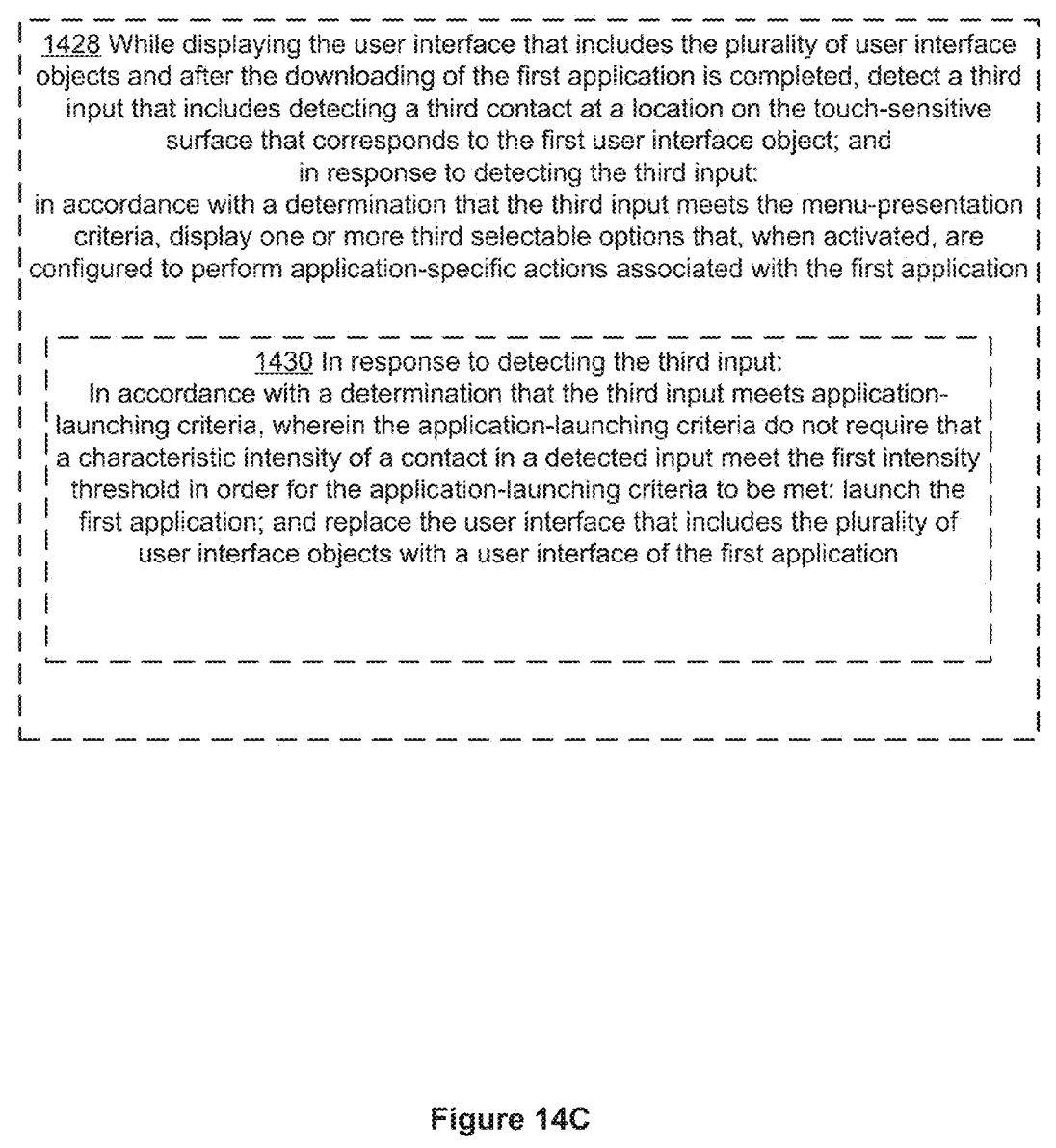

1428 While displaying the user interface that includes the plurality of user interface objects and after the downloading of the first application is completed, detect a third input that includes detecting a third contact at a location on the touch-sensitive surface that corresponds to the first user interface object; and
in response to detecting the third input:
in accordance with a determination that the third input meets the menu-presentation criteria, display one or more third selectable options that, when activated, are configured to perform application-specific actions associated with the first application 1430 In response to detecting the third input:
In accordance with a determination that the third input meets application-launching criteria, wherein the application-launching criteria do not require that a characteristic intensity of a contact in a detected input meet the first intensity threshold in order for the application-launching criteria to be met: launch the first application; and replace the user interface that includes the plurality of user interface objects with a user interface of the first application

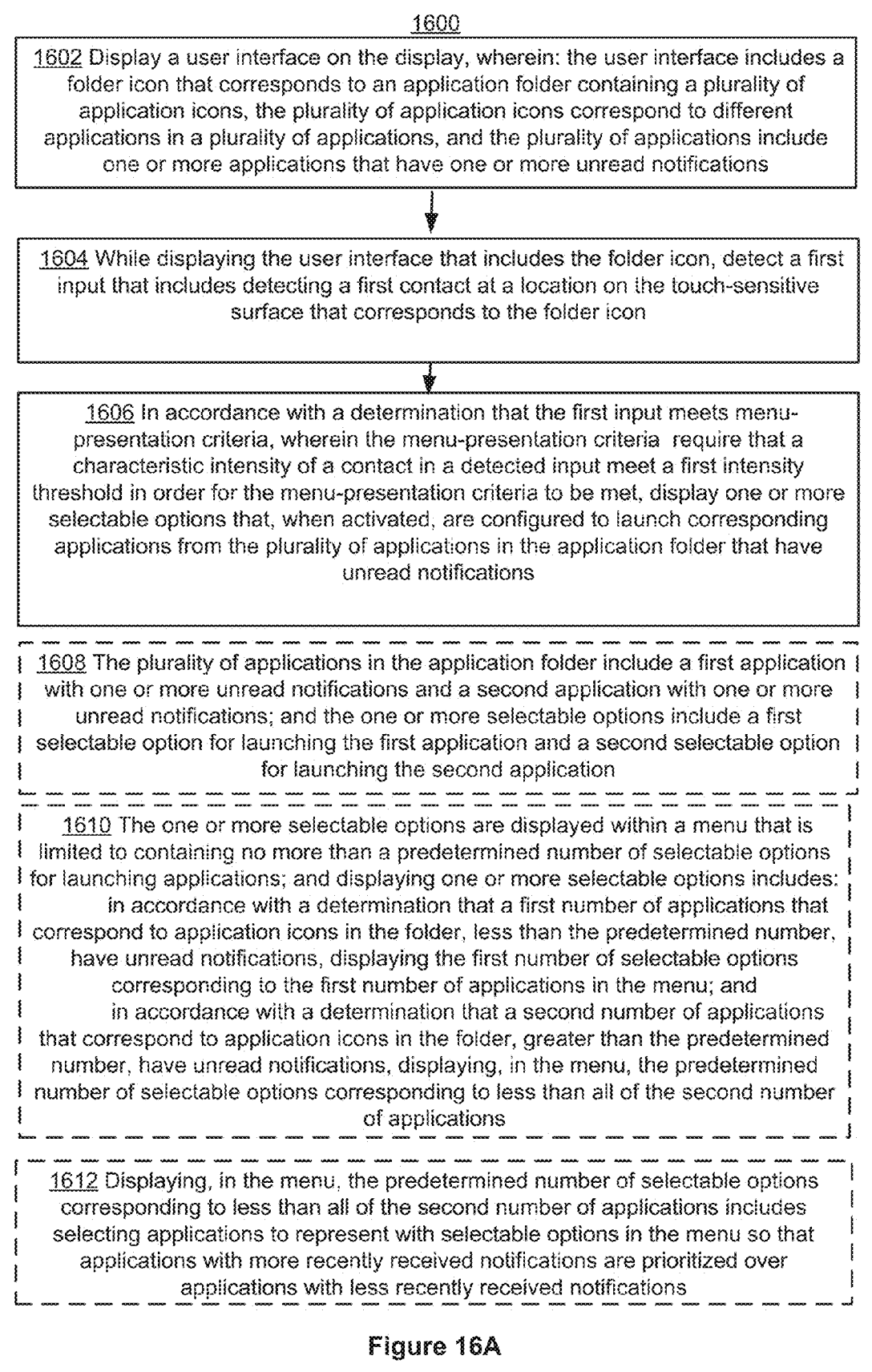

1602 Display a user interface on the display, wherein: the user interface includes a folder icon that corresponds to an application folder containing a plurality of application icons, the plurality of application icons correspond to different applications in a plurality of applications, and the plurality of applications include one or more applications that have one or more unread notifications

↓

1604 While displaying the user interface that includes the folder icon, detect a first input that includes detecting a first contact at a location on the touch-sensitive surface that corresponds to the folder icon

↓

1606 In accordance with a determination that the first input meets menu-presentation criteria, wherein the menu-presentation criteria require that a characteristic intensity of a contact in a detected input meet a first intensity threshold in order for the menu-presentation criteria to be met, display one or more selectable options that, when activated, are configured to launch corresponding applications from the plurality of applications in the application folder that have unread notifications 1608 The plurality of applications in the application folder include a first application with one or more unread notifications and a second application with one or more unread notifications; and the one or more selectable options include a first selectable option for launching the first application and a second selectable option for launching the second application 1610 The one or more selectable options are displayed within a menu that is limited to containing no more than a predetermined number of selectable options for launching applications; and displaying one or more selectable options includes:
in accordance with a determination that a first number of applications that correspond to application icons in the folder, less than the predetermined number, have unread notifications, displaying the first number of selectable options corresponding to the first number of applications in the menu; and
in accordance with a determination that a second number of applications that correspond to application icons in the folder, greater than the predetermined number, have unread notifications, displaying, in the menu, the predetermined number of selectable options corresponding to less than all of the second number of applications 1612 Displaying, in the menu, the predetermined number of selectable options corresponding to less than all of the second number of applications includes selecting applications to represent with selectable options in the menu so that applications with more recently received notifications are prioritized over applications with less recently received notifications

Figure 16A

Figure 16B:
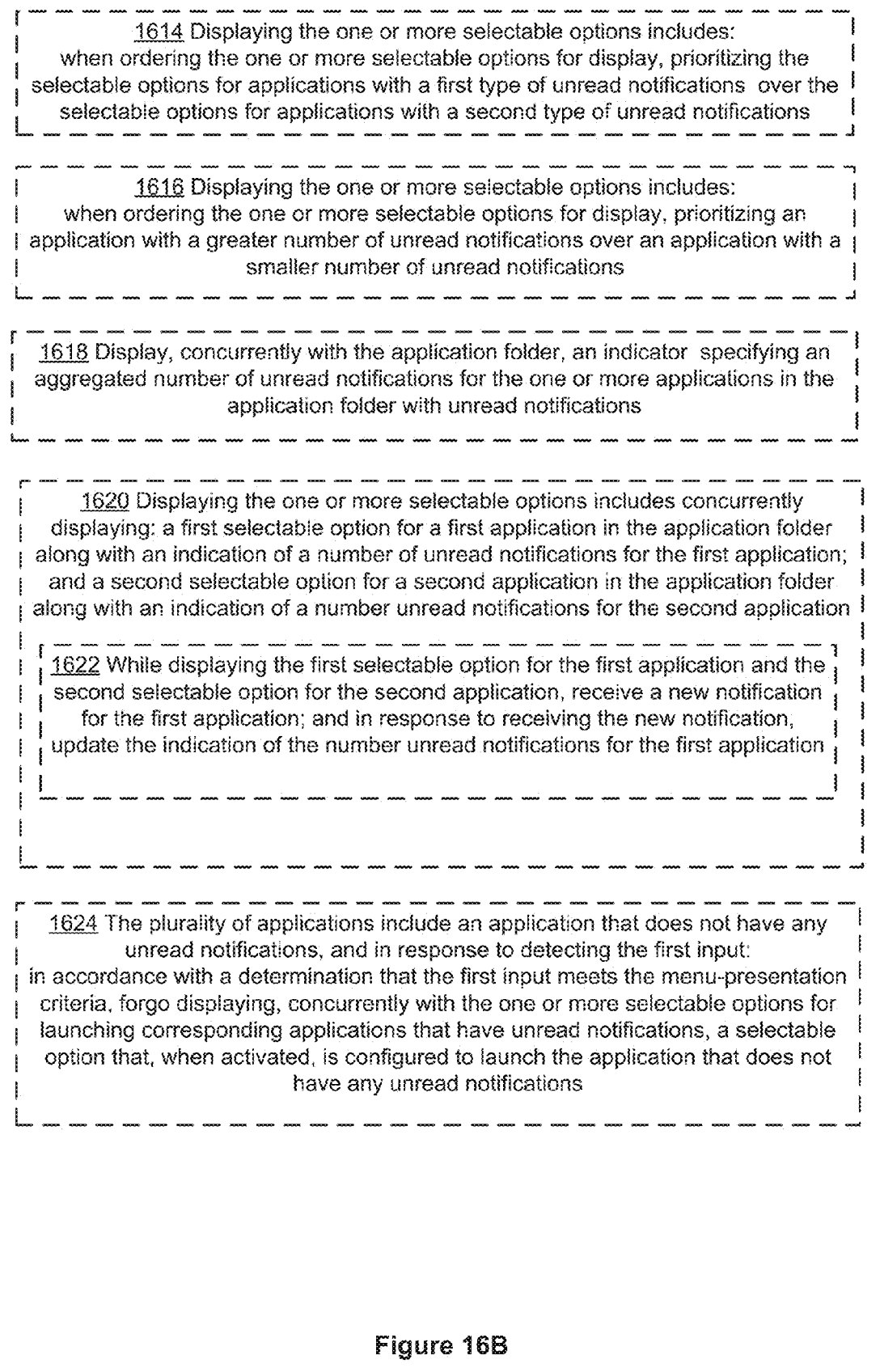

1614 Displaying the one or more selectable options includes: when ordering the one or more selectable options for display, prioritizing the selectable options for applications with a first type of unread notifications over the selectable options for applications with a second type of unread notifications 1616 Displaying the one or more selectable options includes: when ordering the one or more selectable options for display, prioritizing an application with a greater number of unread notifications over an application with a smaller number of unread notifications 1618 Display, concurrently with the application folder, an indicator specifying an aggregated number of unread notifications for the one or more applications in the application folder with unread notifications 1620 Displaying the one or more selectable options includes concurrently displaying: a first selectable option for a first application in the application folder along with an indication of a number of unread notifications for the first application; and a second selectable option for a second application in the application folder along with an indication of a number unread notifications for the second application 1622 While displaying the first selectable option for the first application and the second selectable option for the second application, receive a new notification for the first application; and in response to receiving the new notification, update the indication of the number unread notifications for the first application 1624 The plurality of applications include an application that does not have any unread notifications, and in response to detecting the first input: in accordance with a determination that the first input meets the menu-presentation criteria, forgo displaying, concurrently with the one or more selectable options for launching corresponding applications that have unread notifications, a selectable option that, when activated, is configured to launch the application that does not have any unread notifications

Figure 16C:
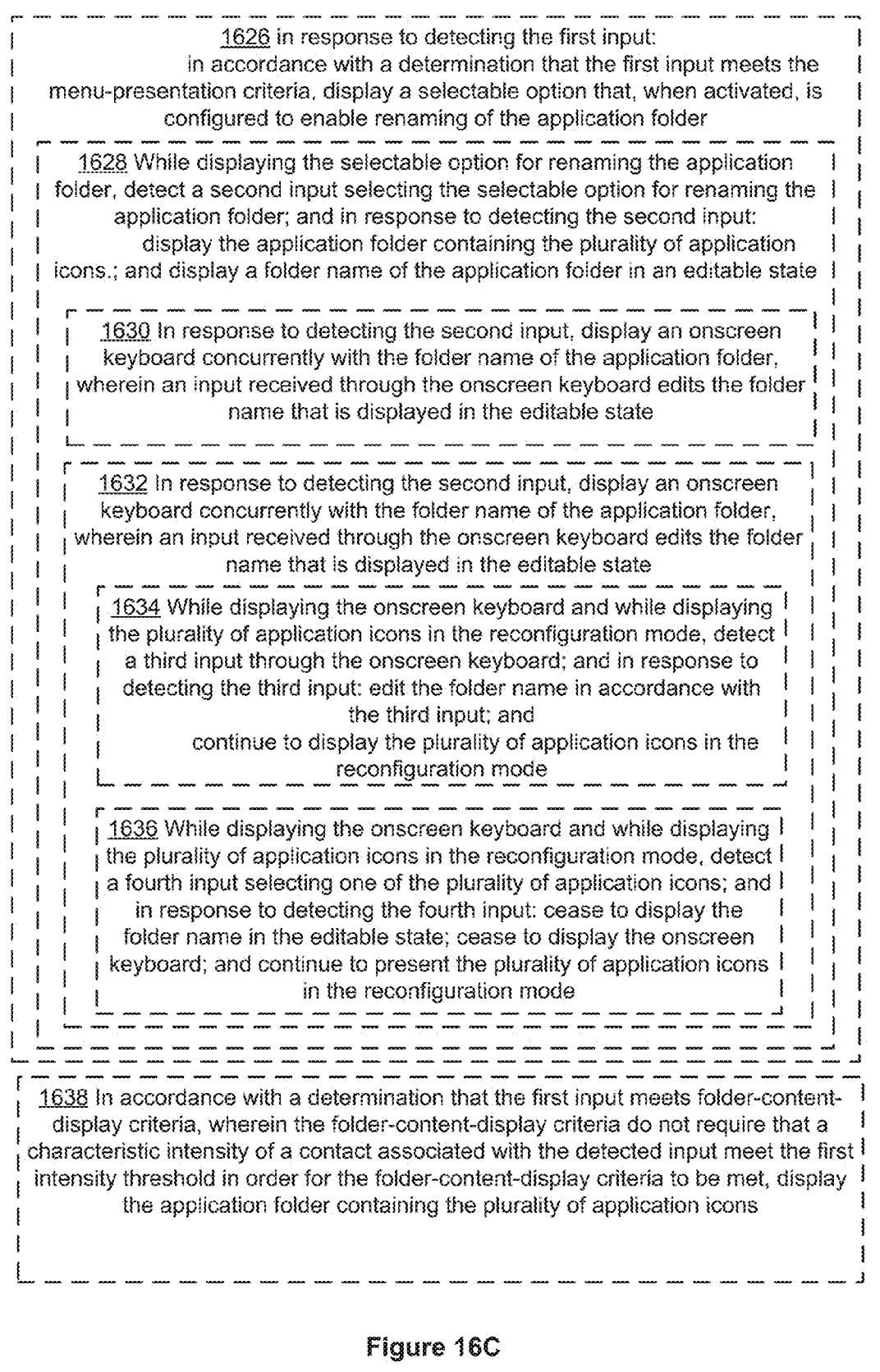

Figure 16B 1626 in response to detecting the first input:
in accordance with a determination that the first input meets the menu-presentation criteria, display a selectable option that, when activated, is configured to enable renaming of the application folder 1628 While displaying the selectable option for renaming the application folder, detect a second input selecting the selectable option for renaming the application folder; and in response to detecting the second input:
display the application folder containing the plurality of application icons.; and display a folder name of the application folder in an editable state 1630 In response to detecting the second input, display an onscreen keyboard concurrently with the folder name of the application folder, wherein an input received through the onscreen keyboard edits the folder name that is displayed in the editable state 1632 In response to detecting the second input, display an onscreen keyboard concurrently with the folder name of the application folder, wherein an input received through the onscreen keyboard edits the folder name that is displayed in the editable state 1634 While displaying the onscreen keyboard and while displaying the plurality of application icons in the reconfiguration mode, detect a third input through the onscreen keyboard; and in response to detecting the third input: edit the folder name in accordance with the third input; and
continue to display the plurality of application icons in the reconfiguration mode 1636 While displaying the onscreen keyboard and while displaying the plurality of application icons in the reconfiguration mode, detect a fourth input selecting one of the plurality of application icons; and in response to detecting the fourth input: cease to display the folder name in the editable state; cease to display the onscreen keyboard; and continue to present the plurality of application icons in the reconfiguration mode 1638 In accordance with a determination that the first input meets folder-content-display criteria, wherein the folder-content-display criteria do not require that a characteristic intensity of a contact associated with the detected input meet the first intensity threshold in order for the folder-content-display criteria to be met, display the application folder containing the plurality of application icons

Figure 18A:
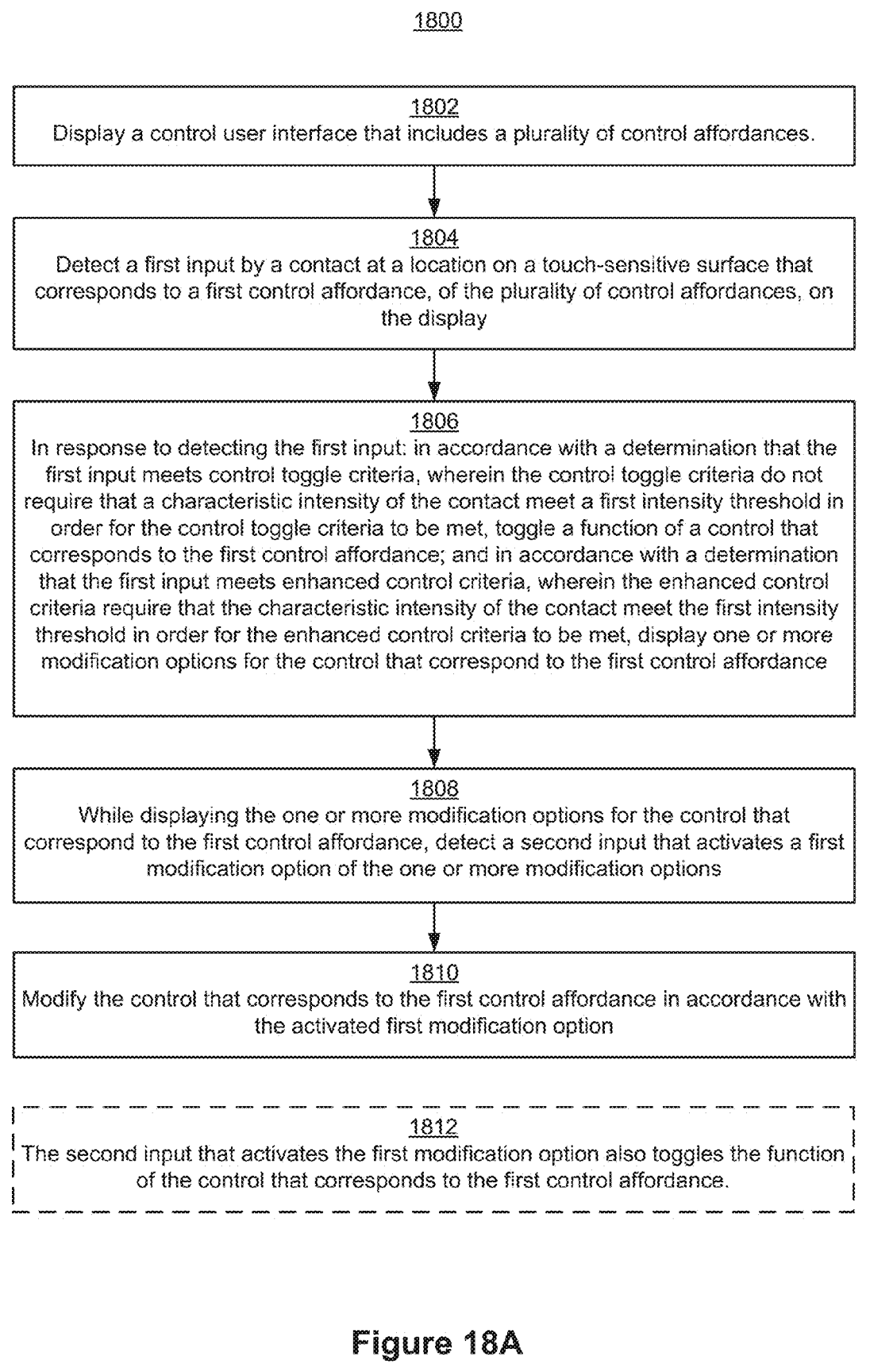

1802
Display a control user interface that includes a plurality of control affordances.

↓

1804
Detect a first input by a contact at a location on a touch-sensitive surface that corresponds to a first control affordance, of the plurality of control affordances, on the display

↓

1806
In response to detecting the first input: in accordance with a determination that the first input meets control toggle criteria, wherein the control toggle criteria do not require that a characteristic intensity of the contact meet a first intensity threshold in order for the control toggle criteria to be met, toggle a function of a control that corresponds to the first control affordance; and in accordance with a determination that the first input meets enhanced control criteria, wherein the enhanced control criteria require that the characteristic intensity of the contact meet the first intensity threshold in order for the enhanced control criteria to be met, display one or more modification options for the control that correspond to the first control affordance

↓

1808
While displaying the one or more modification options for the control that correspond to the first control affordance, detect a second input that activates a first modification option of the one or more modification options

↓

1810
Modify the control that corresponds to the first control affordance in accordance with the activated first modification option 1812
The second input that activates the first modification option also toggles the function of the control that corresponds to the first control affordance.

Figure 18B:
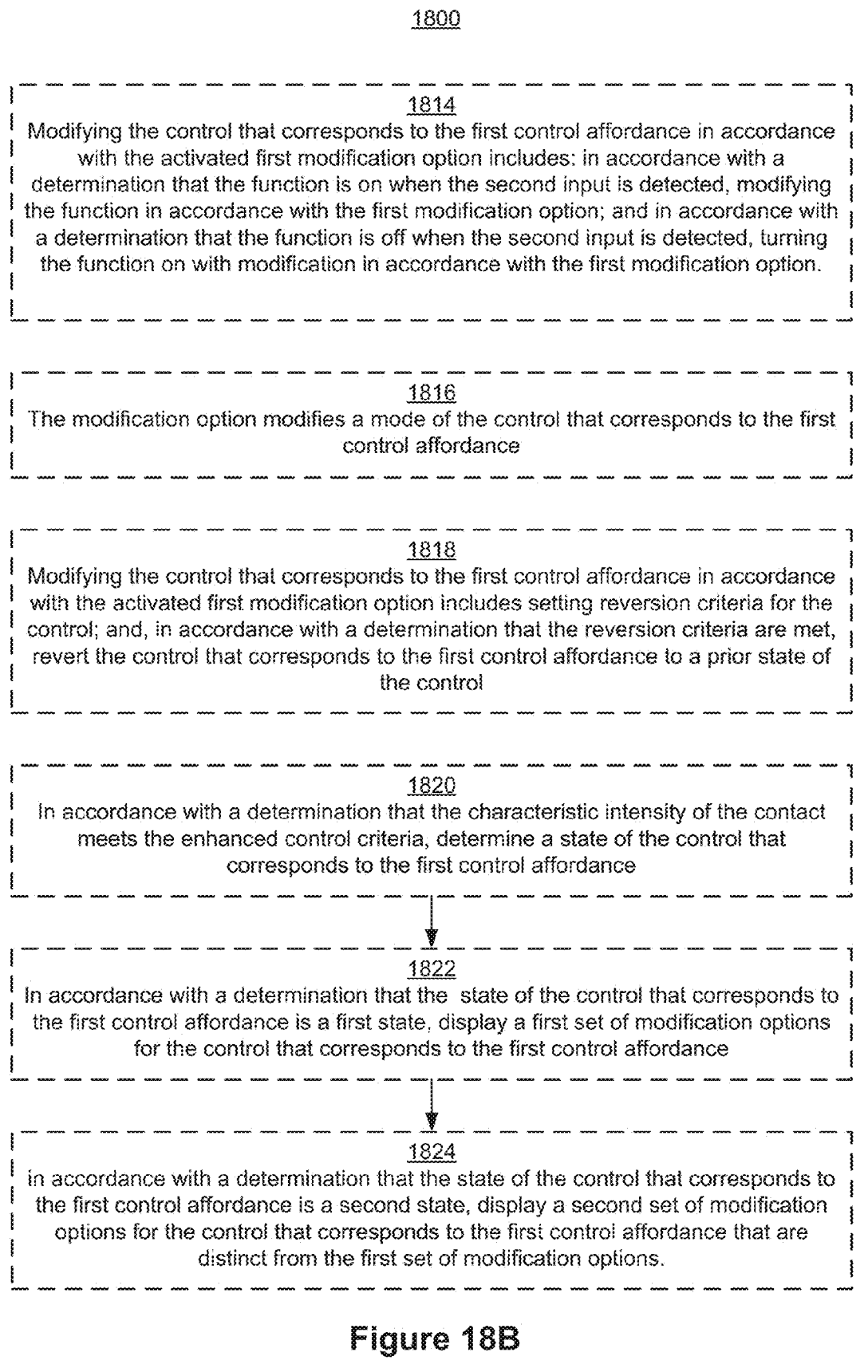

1814
Modifying the control that corresponds to the first control affordance in accordance with the activated first modification option includes: in accordance with a determination that the function is on when the second input is detected, modifying the function in accordance with the first modification option; and in accordance with a determination that the function is off when the second input is detected, turning the function on with modification in accordance with the first modification option.

1816
The modification option modifies a mode of the control that corresponds to the first control affordance 1818
Modifying the control that corresponds to the first control affordance in accordance with the activated first modification option includes setting reversion criteria for the control; and, in accordance with a determination that the reversion criteria are met, revert the control that corresponds to the first control affordance to a prior state of the control 1820
In accordance with a determination that the characteristic intensity of the contact meets the enhanced control criteria, determine a state of the control that corresponds to the first control affordance

↓

1822
In accordance with a determination that the state of the control that corresponds to the first control affordance is a first state, display a first set of modification options for the control that corresponds to the first control affordance

↓

1824
in accordance with a determination that the state of the control that corresponds to the first control affordance is a second state, display a second set of modification options for the control that corresponds to the first control affordance that are distinct from the first set of modification options.

Figure 18C:
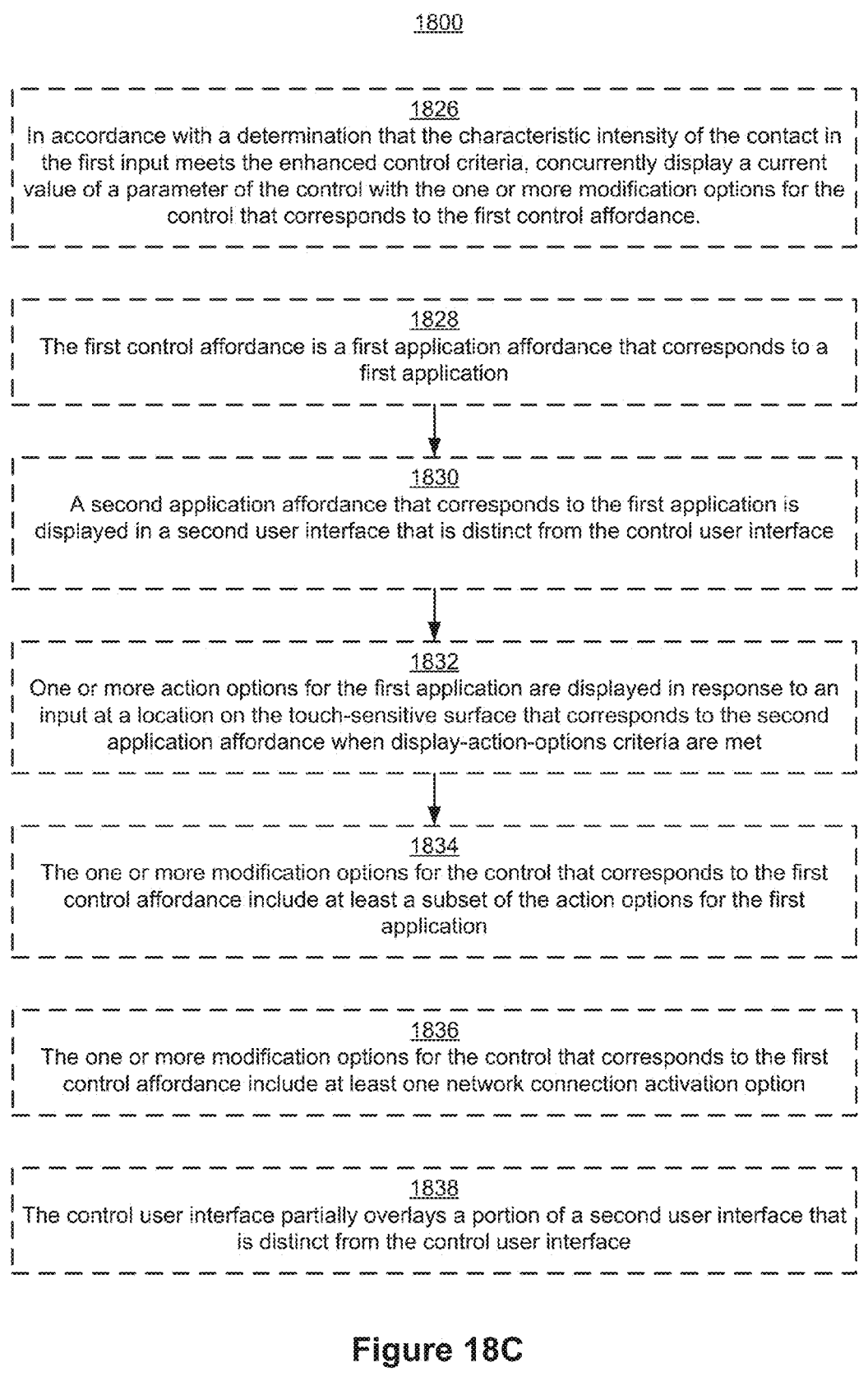

1826
In accordance with a determination that the characteristic intensity of the contact in the first input meets the enhanced control criteria, concurrently display a current value of a parameter of the control with the one or more modification options for the control that corresponds to the first control affordance.

1828
The first control affordance is a first application affordance that corresponds to a first application

↓

1830
A second application affordance that corresponds to the first application is displayed in a second user interface that is distinct from the control user interface

↓

1832
One or more action options for the first application are displayed in response to an input at a location on the touch-sensitive surface that corresponds to the second application affordance when display-action-options criteria are met

↓

1834
The one or more modification options for the control that corresponds to the first control affordance include at least a subset of the action options for the first application 1836
The one or more modification options for the control that corresponds to the first control affordance include at least one network connection activation option 1838
The control user interface partially overlays a portion of a second user interface that is distinct from the control user interface

1840
The control user interface includes a plurality of controls, wherein a respective control of the plurality of control corresponds to a system setting

Figure 20A:
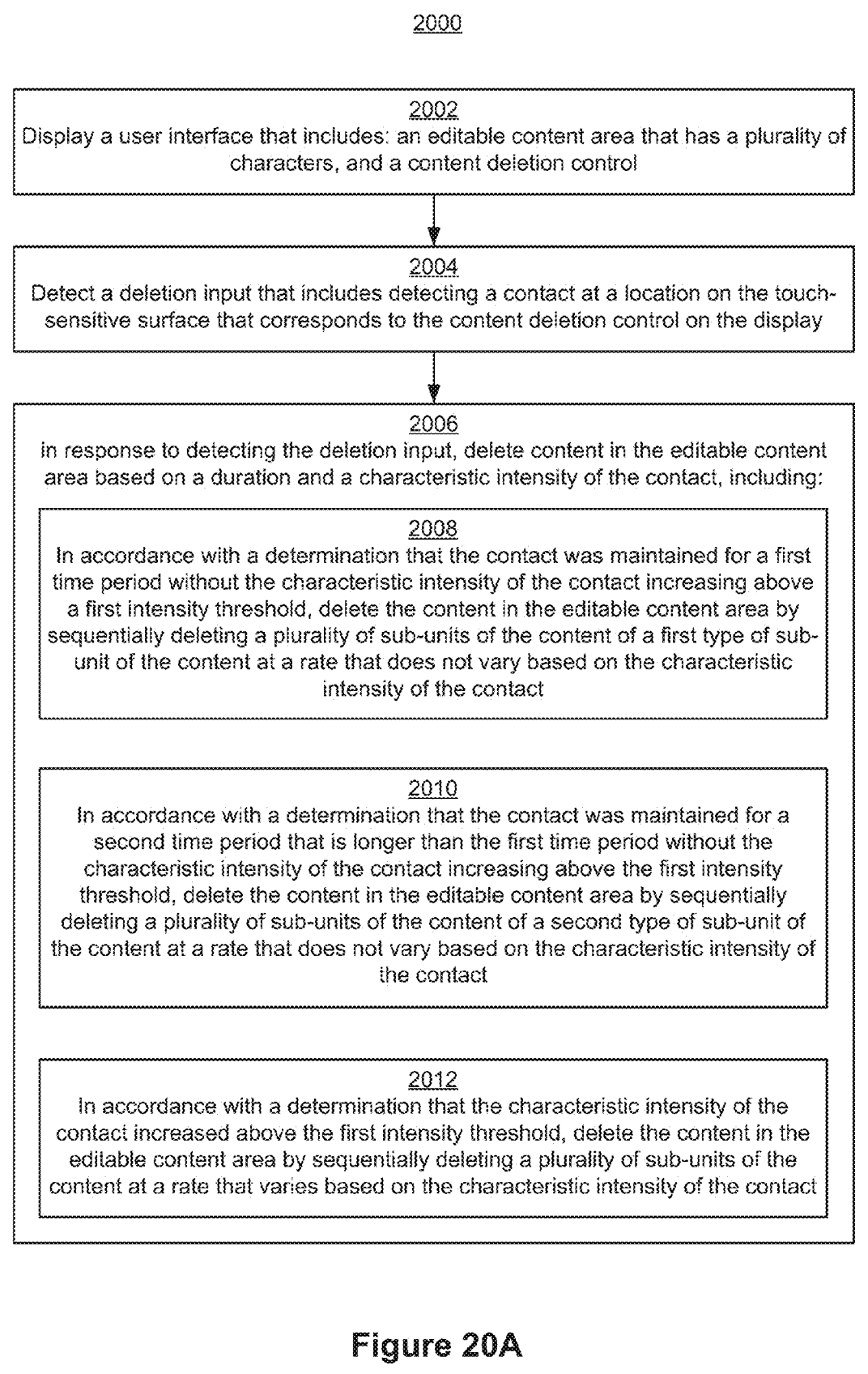

2002
Display a user interface that includes: an editable content area that has a plurality of characters, and a content deletion control

↓

2004
Detect a deletion input that includes detecting a contact at a location on the touch-sensitive surface that corresponds to the content deletion control on the display

↓

2006
in response to detecting the deletion input, delete content in the editable content area based on a duration and a characteristic intensity of the contact, including:

2008
In accordance with a determination that the contact was maintained for a first time period without the characteristic intensity of the contact increasing above a first intensity threshold, delete the content in the editable content area by sequentially deleting a plurality of sub-units of the content of a first type of sub-unit of the content at a rate that does not vary based on the characteristic intensity of the contact 2010
In accordance with a determination that the contact was maintained for a second time period that is longer than the first time period without the characteristic intensity of the contact increasing above the first intensity threshold, delete the content in the editable content area by sequentially deleting a plurality of sub-units of the content of a second type of sub-unit of the content at a rate that does not vary based on the characteristic intensity of the contact 2012
In accordance with a determination that the characteristic intensity of the contact increased above the first intensity threshold, delete the content in the editable content area by sequentially deleting a plurality of sub-units of the content at a rate that varies based on the characteristic intensity of the contact

Figure 20B:
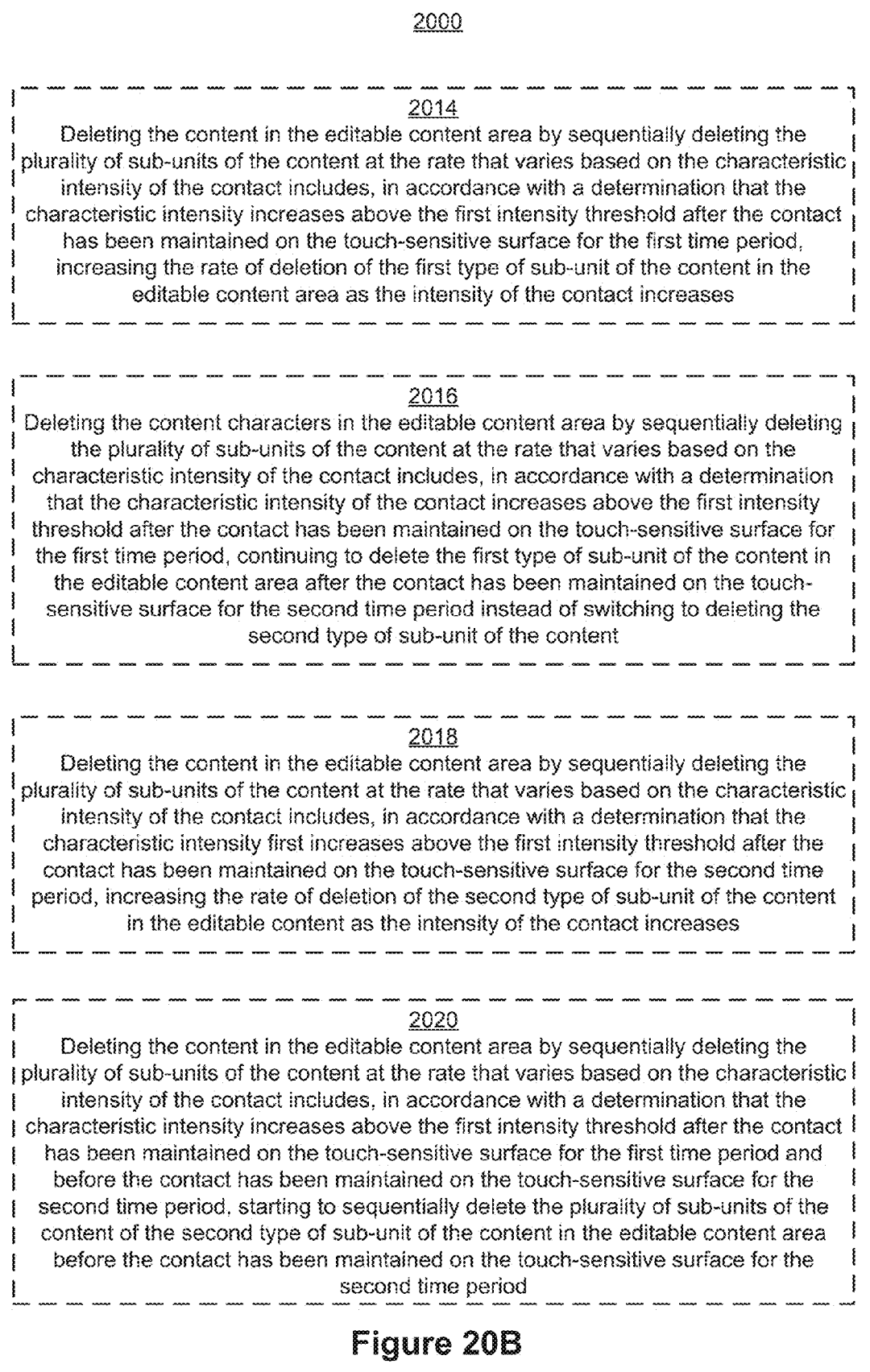

2014
Deleting the content in the editable content area by sequentially deleting the plurality of sub-units of the content at the rate that varies based on the characteristic intensity of the contact includes, in accordance with a determination that the characteristic intensity increases above the first intensity threshold after the contact has been maintained on the touch-sensitive surface for the first time period, increasing the rate of deletion of the first type of sub-unit of the content in the editable content area as the intensity of the contact increases 2016
Deleting the content characters in the editable content area by sequentially deleting the plurality of sub-units of the content at the rate that varies based on the characteristic intensity of the contact includes, in accordance with a determination that the characteristic intensity of the contact increases above the first intensity threshold after the contact has been maintained on the touch-sensitive surface for the first time period, continuing to delete the first type of sub-unit of the content in the editable content area after the contact has been maintained on the touch-sensitive surface for the second time period instead of switching to deleting the second type of sub-unit of the content 2018
Deleting the content in the editable content area by sequentially deleting the plurality of sub-units of the content at the rate that varies based on the characteristic intensity of the contact includes, in accordance with a determination that the characteristic intensity first increases above the first intensity threshold after the contact has been maintained on the touch-sensitive surface for the second time period, increasing the rate of deletion of the second type of sub-unit of the content in the editable content as the intensity of the contact increases 2020
Deleting the content in the editable content area by sequentially deleting the plurality of sub-units of the content at the rate that varies based on the characteristic intensity of the contact includes, in accordance with a determination that the characteristic intensity increases above the first intensity threshold after the contact has been maintained on the touch-sensitive surface for the first time period and before the contact has been maintained on the touch-sensitive surface for the second time period, starting to sequentially delete the plurality of sub-units of the content of the second type of sub-unit of the content in the editable content area before the contact has been maintained on the touch-sensitive surface for the second time period

Figure 20C:
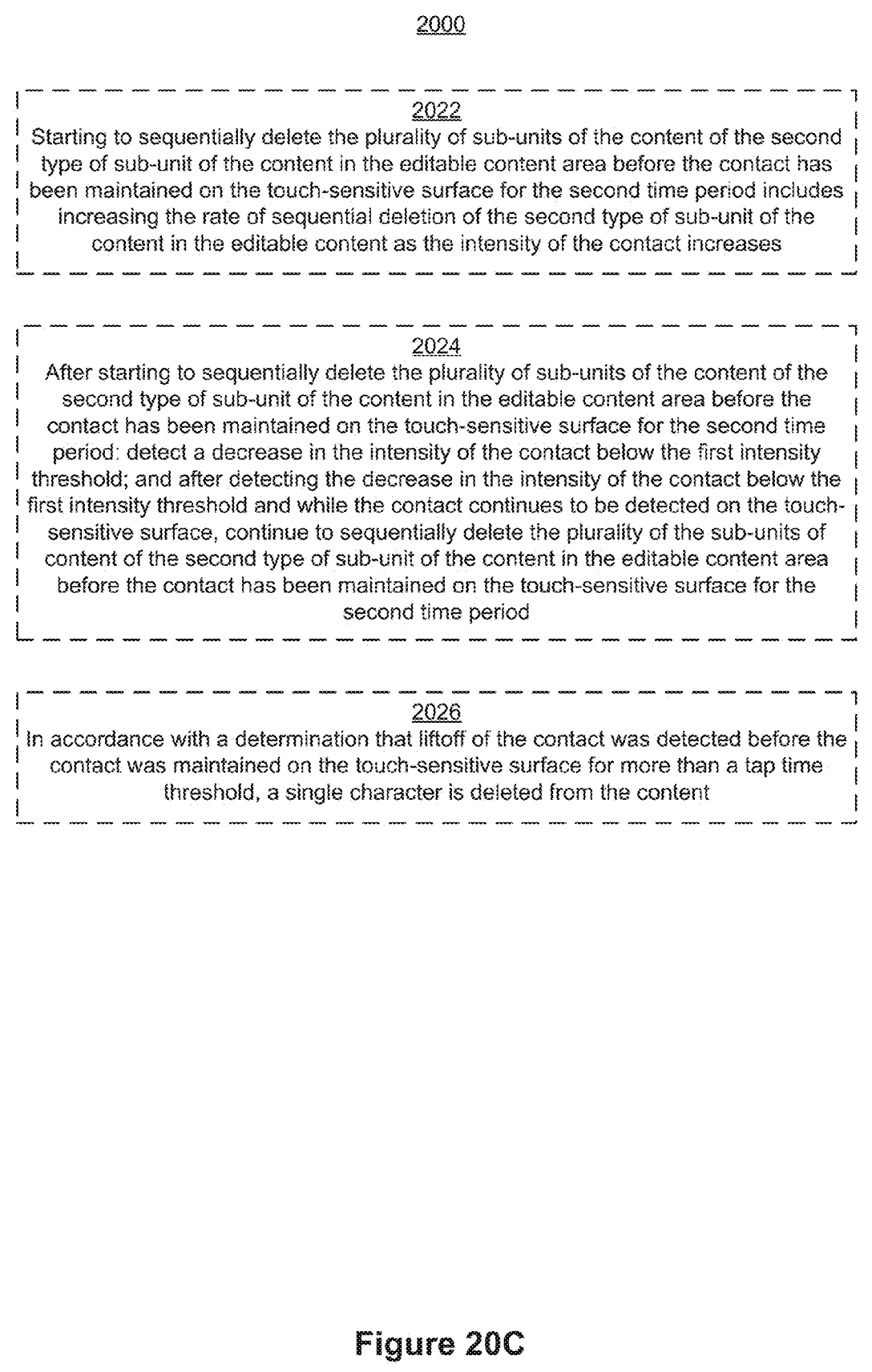

2022
Starting to sequentially delete the plurality of sub-units of the content of the second type of sub-unit of the content in the editable content area before the contact has been maintained on the touch-sensitive surface for the second time period includes increasing the rate of sequential deletion of the second type of sub-unit of the content in the editable content as the intensity of the contact increases 2024
After starting to sequentially delete the plurality of sub-units of the content of the second type of sub-unit of the content in the editable content area before the contact has been maintained on the touch-sensitive surface for the second time period: detect a decrease in the intensity of the contact below the first intensity threshold; and after detecting the decrease in the intensity of the contact below the first intensity threshold and while the contact continues to be detected on the touch-sensitive surface, continue to sequentially delete the plurality of the sub-units of content of the second type of sub-unit of the content in the editable content area before the contact has been maintained on the touch-sensitive surface for the second time period 2026
In accordance with a determination that liftoff of the contact was detected before the contact was maintained on the touch-sensitive surface for more than a tap time threshold, a single character is deleted from the content

Figure 20D1:
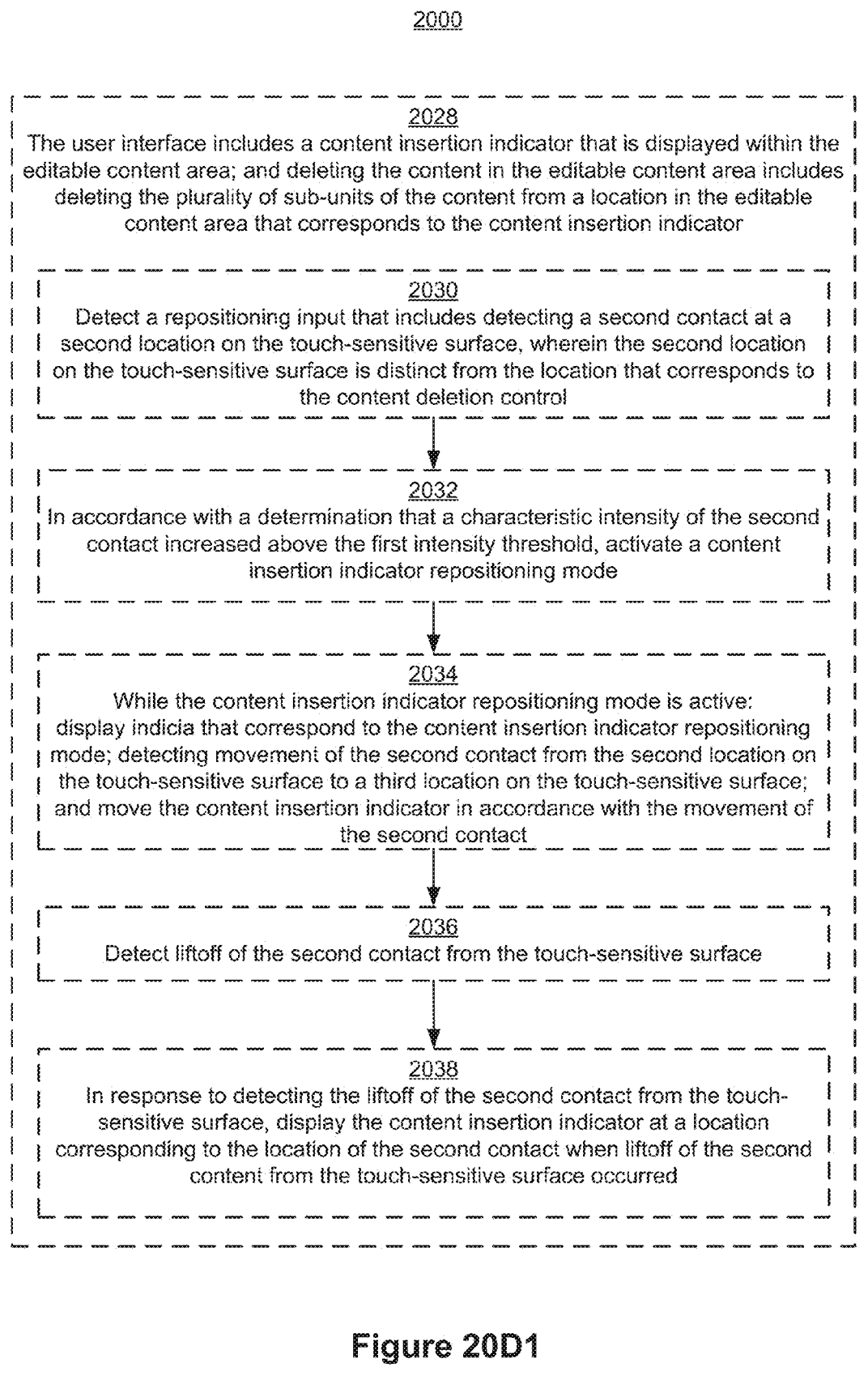

2028
The user interface includes a content insertion indicator that is displayed within the editable content area; and deleting the content in the editable content area includes deleting the plurality of sub-units of the content from a location in the editable content area that corresponds to the content insertion indicator 2030
Detect a repositioning input that includes detecting a second contact at a second location on the touch-sensitive surface, wherein the second location on the touch-sensitive surface is distinct from the location that corresponds to the content deletion control 2032
In accordance with a determination that a characteristic intensity of the second contact increased above the first intensity threshold, activate a content insertion indicator repositioning mode 2034
While the content insertion indicator repositioning mode is active: display indicia that correspond to the content insertion indicator repositioning mode; detecting movement of the second contact from the second location on the touch-sensitive surface to a third location on the touch-sensitive surface; and move the content insertion indicator in accordance with the movement of the second contact 2036
Detect liftoff of the second contact from the touch-sensitive surface 2038
In response to detecting the liftoff of the second contact from the touch-sensitive surface, display the content insertion indicator at a location corresponding to the location of the second contact when liftoff of the second content from the touch-sensitive surface occurred

Figure 20D2:
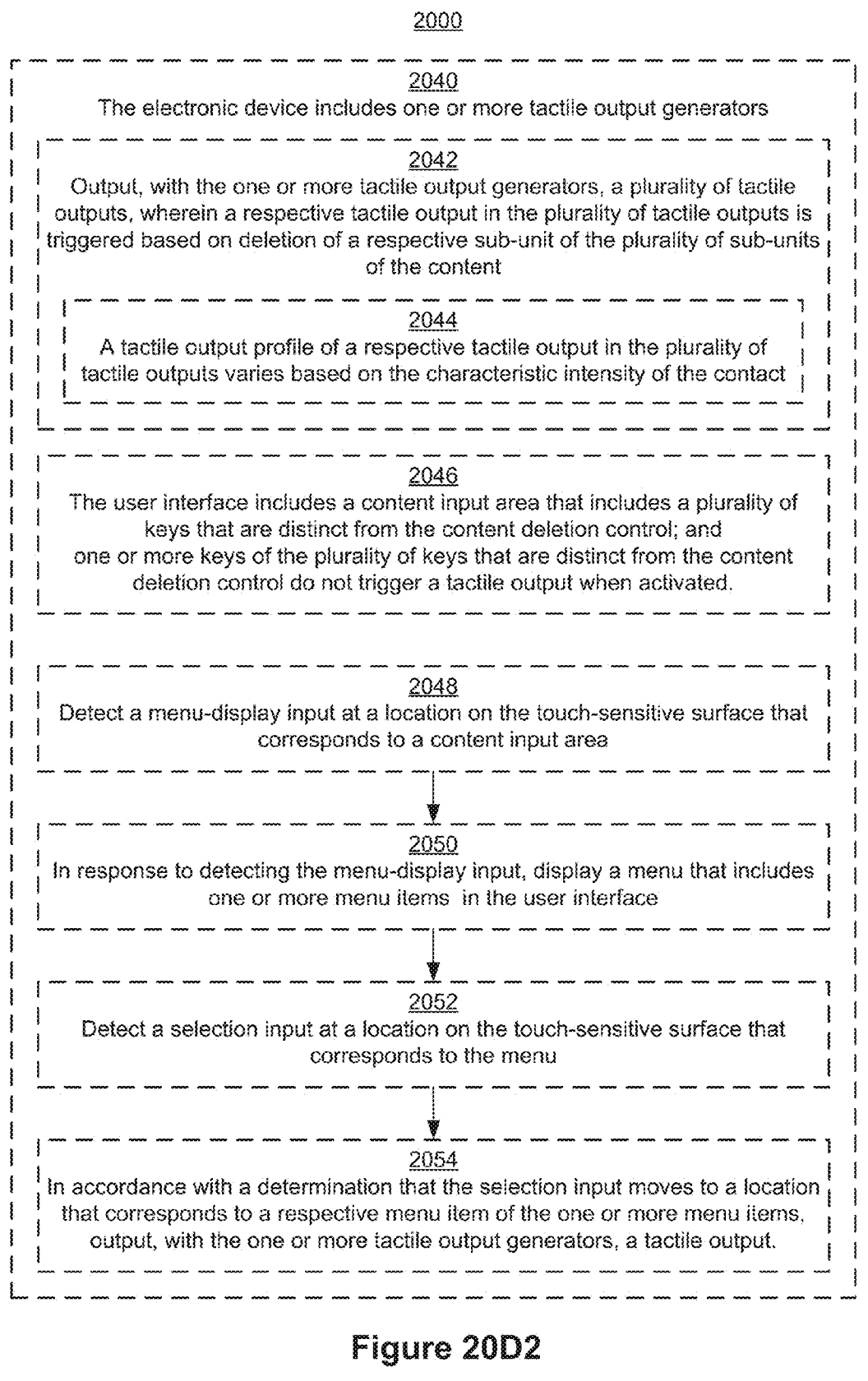

2040
The electronic device includes one or more tactile output generators

2042
Output, with the one or more tactile output generators, a plurality of tactile outputs, wherein a respective tactile output in the plurality of tactile outputs is triggered based on deletion of a respective sub-unit of the plurality of sub-units of the content 2044
A tactile output profile of a respective tactile output in the plurality of tactile outputs varies based on the characteristic intensity of the contact 2046
The user interface includes a content input area that includes a plurality of keys that are distinct from the content deletion control; and
one or more keys of the plurality of keys that are distinct from the content deletion control do not trigger a tactile output when activated.

2048
Detect a menu-display input at a location on the touch-sensitive surface that corresponds to a content input area 2050
In response to detecting the menu-display input, display a menu that includes one or more menu items in the user interface 2052
Detect a selection input at a location on the touch-sensitive surface that corresponds to the menu 2054
In accordance with a determination that the selection input moves to a location that corresponds to a respective menu item of the one or more menu items, output, with the one or more tactile output generators, a tactile output.

Figure 20E:
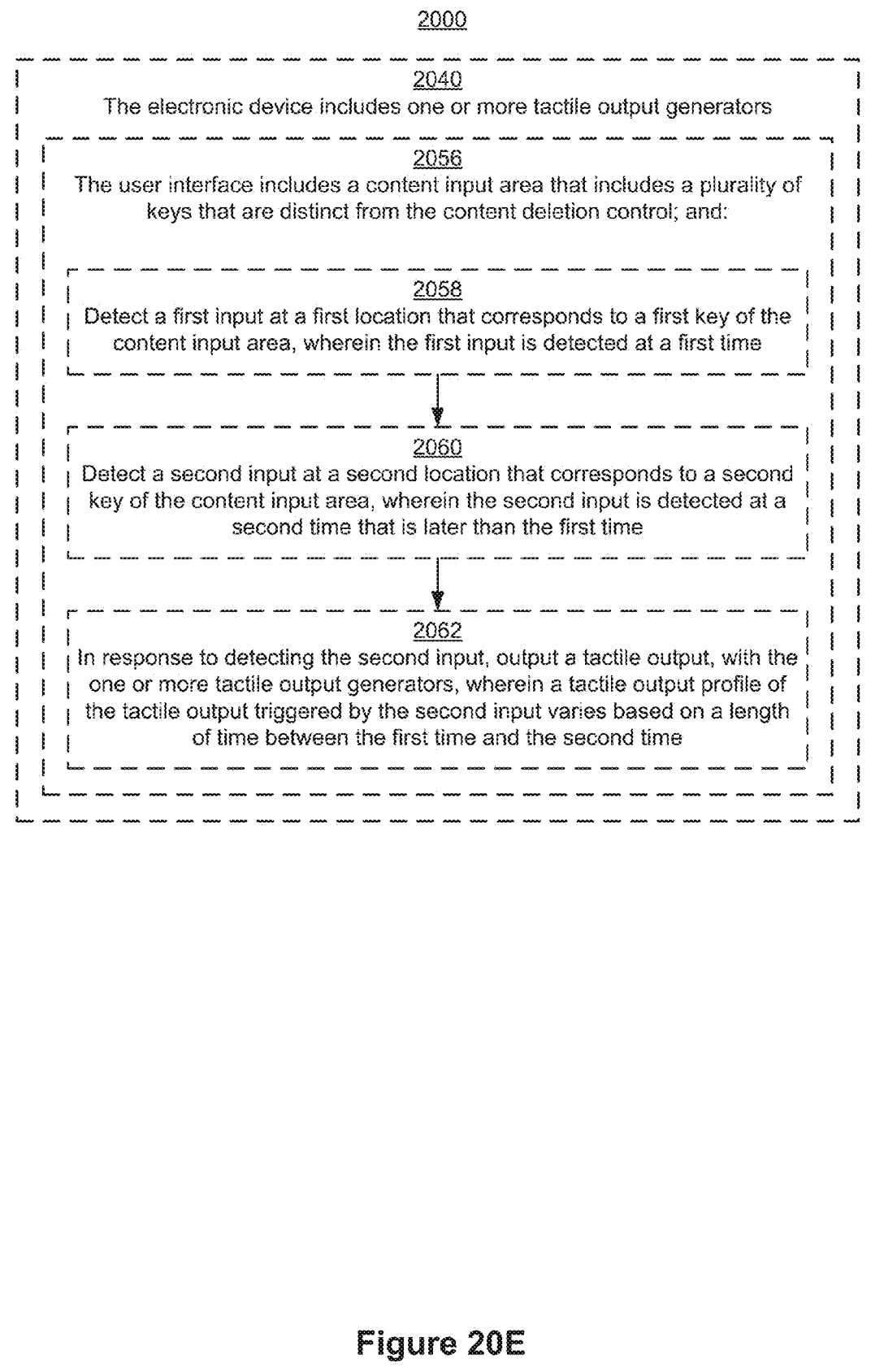

2040
The electronic device includes one or more tactile output generators

2056
The user interface includes a content input area that includes a plurality of keys that are distinct from the content deletion control; and:

2058
Detect a first input at a first location that corresponds to a first key of the content input area, wherein the first input is detected at a first time

↓

2060
Detect a second input at a second location that corresponds to a second key of the content input area, wherein the second input is detected at a second time that is later than the first time

↓

2062
In response to detecting the second input, output a tactile output, with the one or more tactile output generators, wherein a tactile output profile of the tactile output triggered by the second input varies based on a length of time between the first time and the second time

Figure 20G:
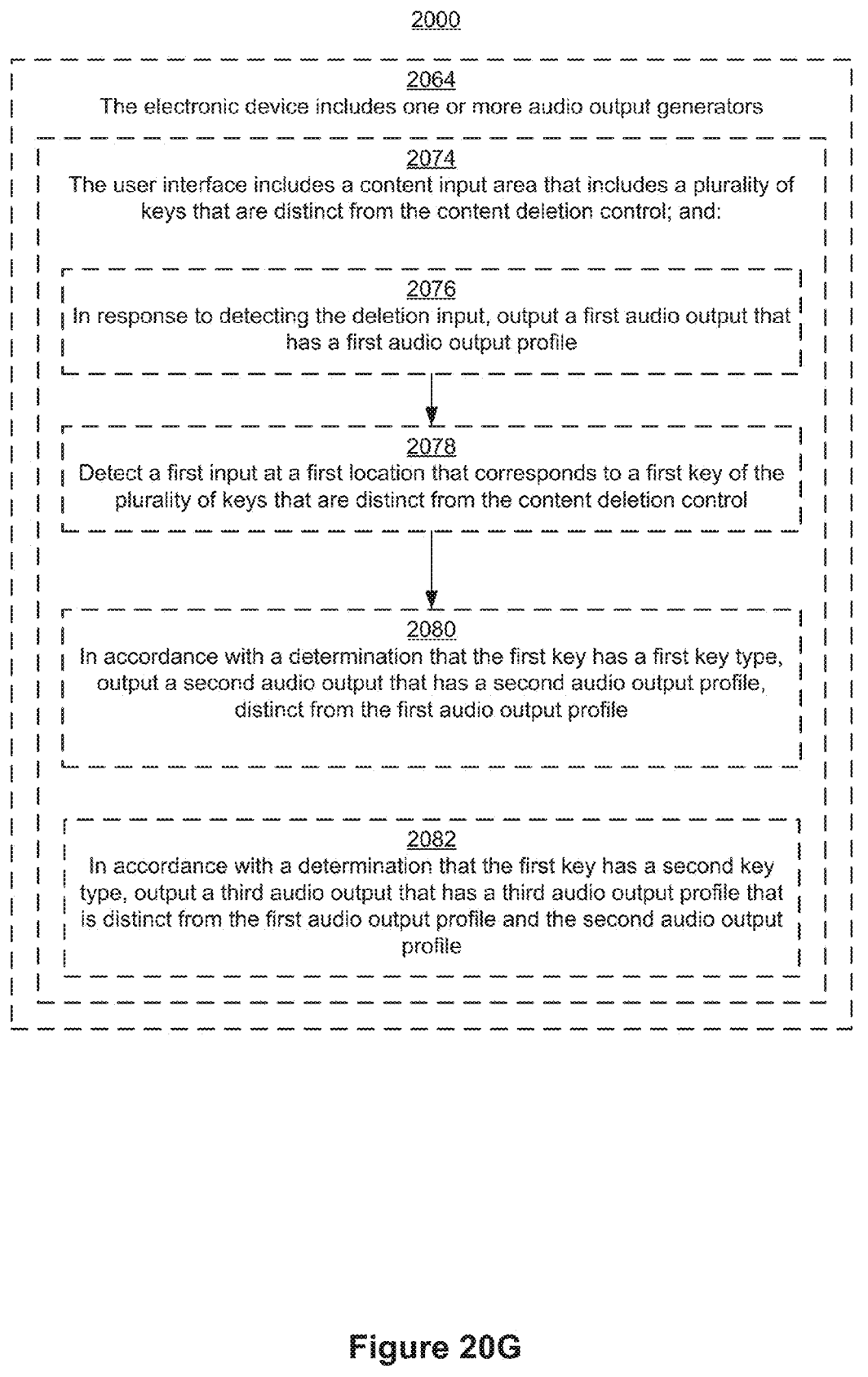

2064
The electronic device includes one or more audio output generators

2074
The user interface includes a content input area that includes a plurality of keys that are distinct from the content deletion control; and:

2076
In response to detecting the deletion input, output a first audio output that has a first audio output profile 2078
Detect a first input at a first location that corresponds to a first key of the plurality of keys that are distinct from the content deletion control 2080
In accordance with a determination that the first key has a first key type, output a second audio output that has a second audio output profile, distinct from the first audio output profile 2082
In accordance with a determination that the first key has a second key type, output a third audio output that has a third audio output profile that is distinct from the first audio output profile and the second audio output profile

Figure 22A:
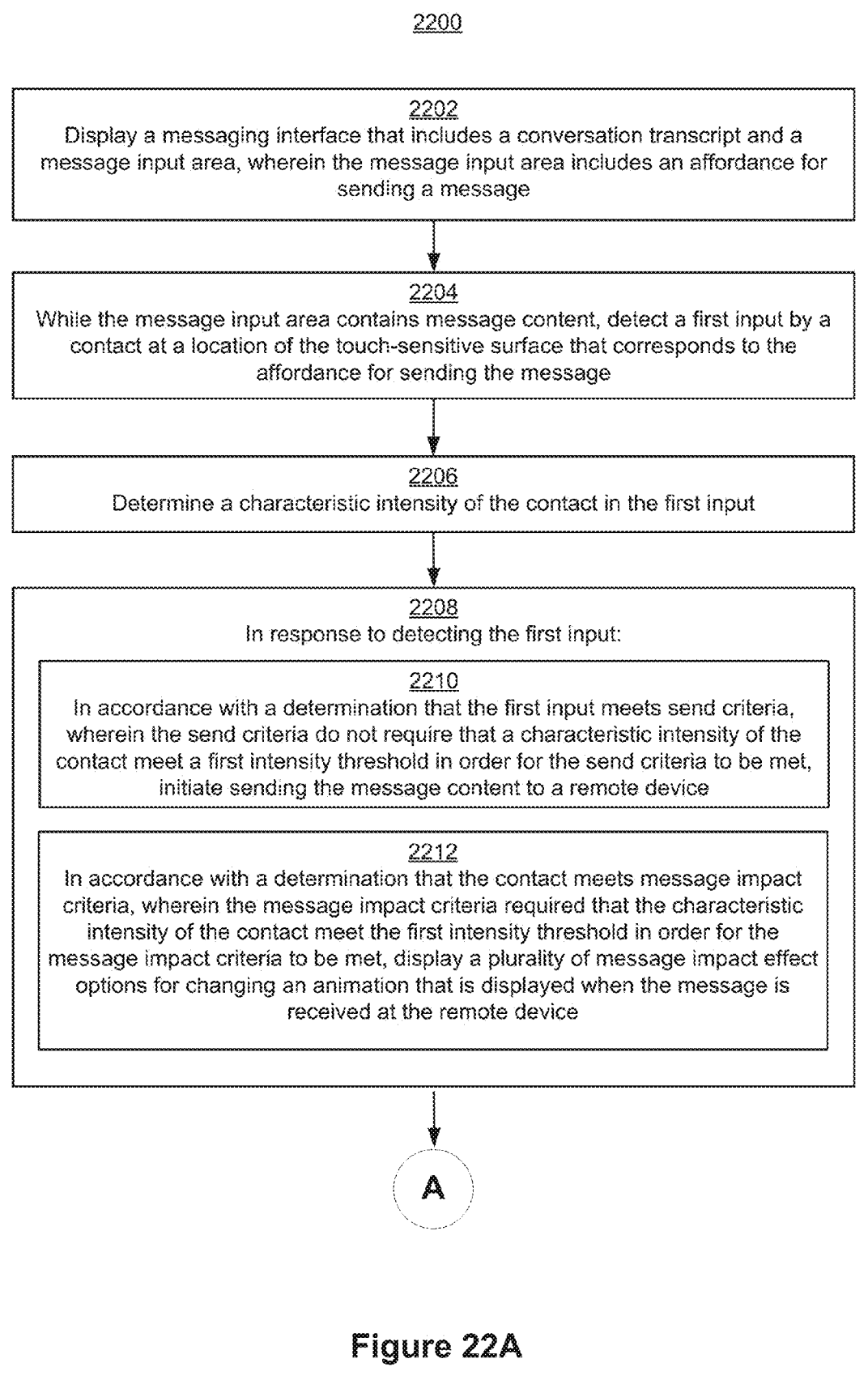

2202
Display a messaging interface that includes a conversation transcript and a message input area, wherein the message input area includes an affordance for sending a message

↓

2204
While the message input area contains message content, detect a first input by a contact at a location of the touch-sensitive surface that corresponds to the affordance for sending the message

↓

2206
Determine a characteristic intensity of the contact in the first input

↓

2208
In response to detecting the first input:

2210
In accordance with a determination that the first input meets send criteria, wherein the send criteria do not require that a characteristic intensity of the contact meet a first intensity threshold in order for the send criteria to be met, initiate sending the message content to a remote device 2212
In accordance with a determination that the contact meets message impact criteria, wherein the message impact criteria required that the characteristic intensity of the contact meet the first intensity threshold in order for the message impact criteria to be met, display a plurality of message impact effect options for changing an animation that is displayed when the message is received at the remote device

Figure 22C:
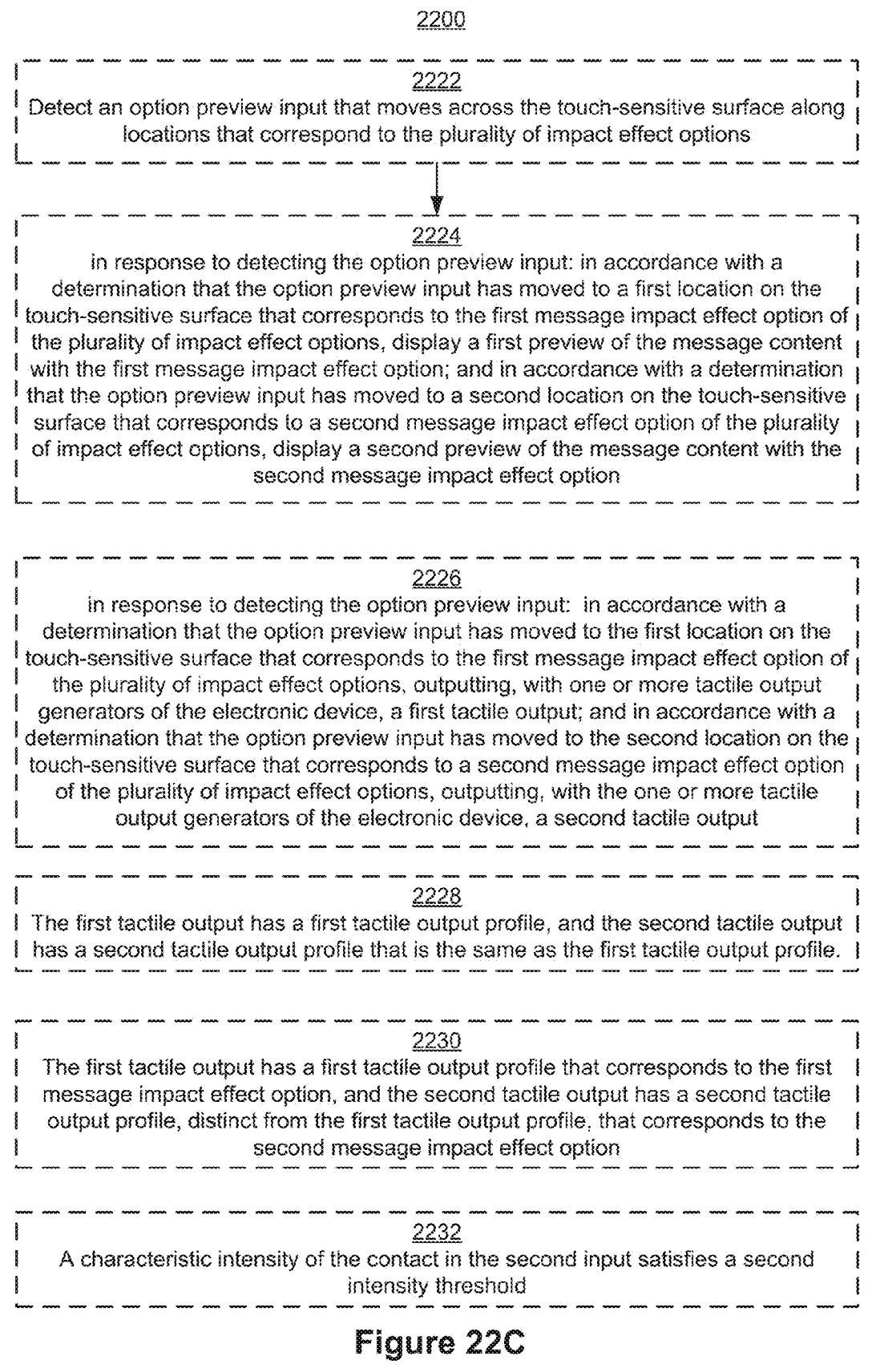

2222
Detect an option preview input that moves across the touch-sensitive surface along locations that correspond to the plurality of impact effect options 2224
in response to detecting the option preview input: in accordance with a determination that the option preview input has moved to a first location on the touch-sensitive surface that corresponds to the first message impact effect option of the plurality of impact effect options, display a first preview of the message content with the first message impact effect option; and in accordance with a determination that the option preview input has moved to a second location on the touch-sensitive surface that corresponds to a second message impact effect option of the plurality of impact effect options, display a second preview of the message content with the second message impact effect option 2226
in response to detecting the option preview input: in accordance with a determination that the option preview input has moved to the first location on the touch-sensitive surface that corresponds to the first message impact effect option of the plurality of impact effect options, outputting, with one or more tactile output generators of the electronic device, a first tactile output; and in accordance with a determination that the option preview input has moved to the second location on the touch-sensitive surface that corresponds to a second message impact effect option of the plurality of impact effect options, outputting, with the one or more tactile output generators of the electronic device, a second tactile output 2228
The first tactile output has a first tactile output profile, and the second tactile output has a second tactile output profile that is the same as the first tactile output profile.

2230
The first tactile output has a first tactile output profile that corresponds to the first message impact effect option, and the second tactile output has a second tactile output profile, distinct from the first tactile output profile, that corresponds to the second message impact effect option 2232
A characteristic intensity of the contact in the second input satisfies a second intensity threshold

Figure 22D:
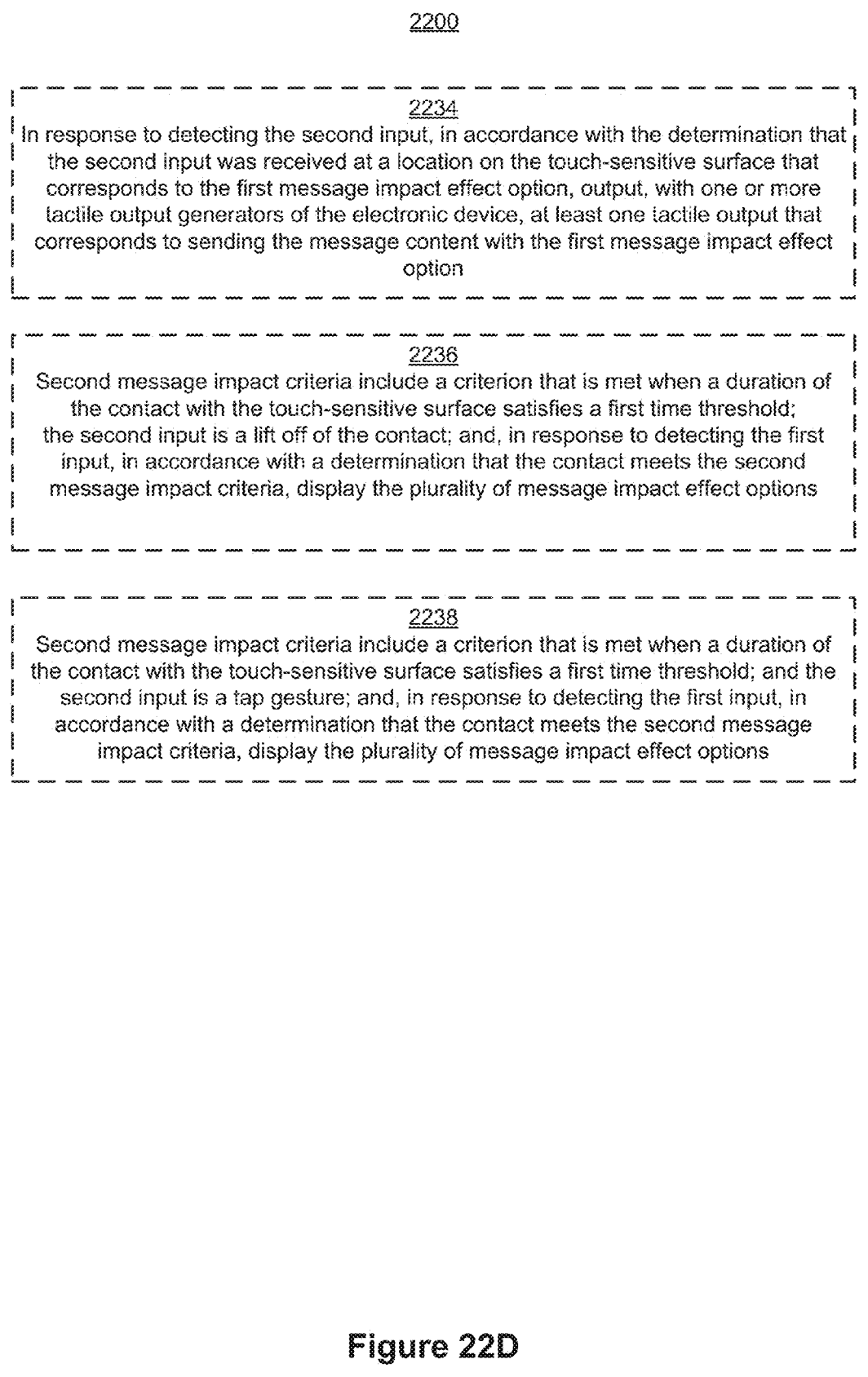

2234
In response to detecting the second input, in accordance with the determination that the second input was received at a location on the touch-sensitive surface that corresponds to the first message impact effect option, output, with one or more tactile output generators of the electronic device, at least one tactile output that corresponds to sending the message content with the first message impact effect option 2236
Second message impact criteria include a criterion that is met when a duration of the contact with the touch-sensitive surface satisfies a first time threshold; the second input is a lift off of the contact; and, in response to detecting the first input, in accordance with a determination that the contact meets the second message impact criteria, display the plurality of message impact effect options 2238
Second message impact criteria include a criterion that is met when a duration of the contact with the touch-sensitive surface satisfies a first time threshold; and the second input is a tap gesture; and, in response to detecting the first input, in accordance with a determination that the contact meets the second message impact criteria, display the plurality of message impact effect options

Figure 22E:
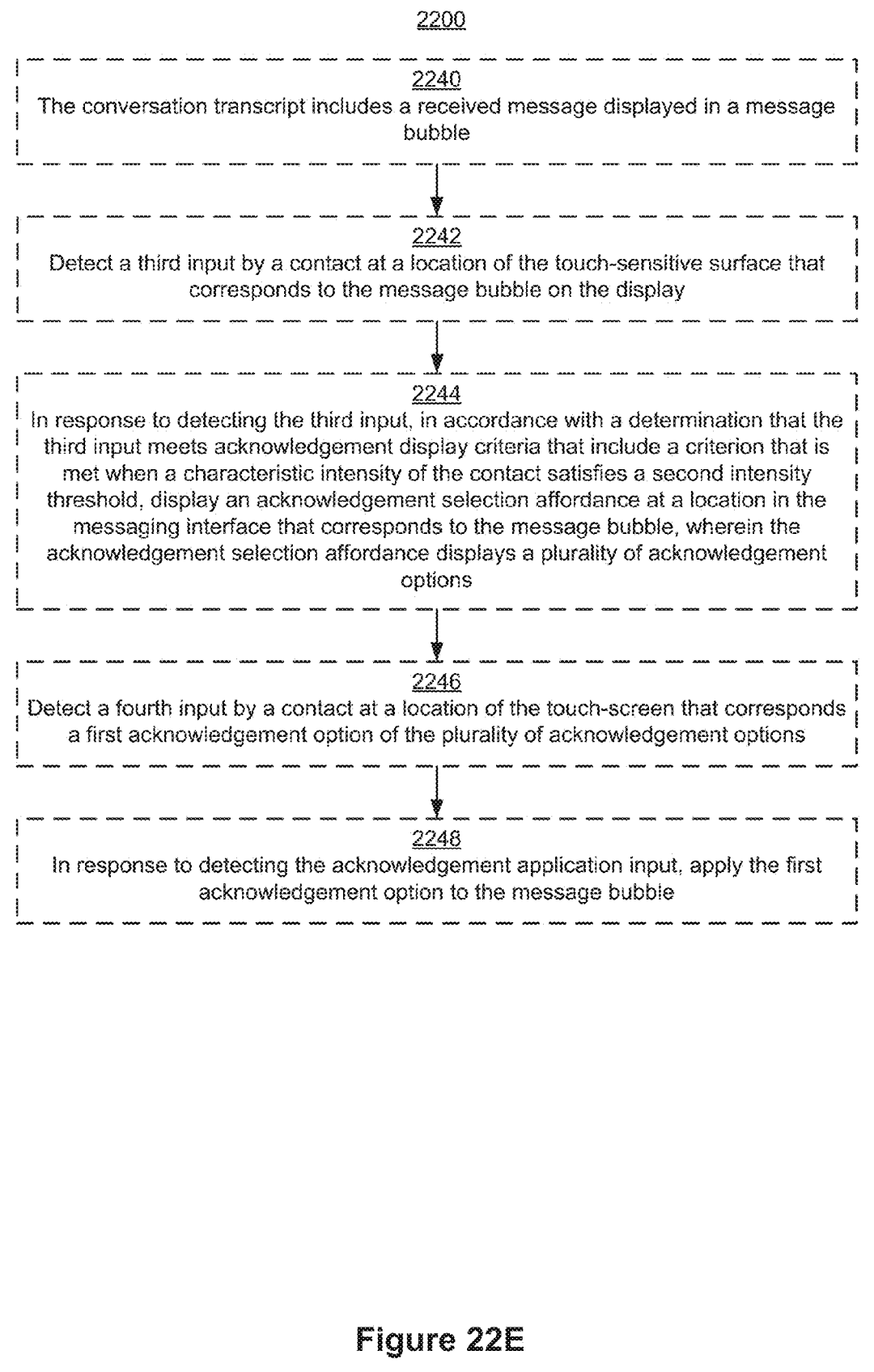

2240
The conversation transcript includes a received message displayed in a message bubble

2242
Detect a third input by a contact at a location of the touch-sensitive surface that corresponds to the message bubble on the display

2244
In response to detecting the third input, in accordance with a determination that the third input meets acknowledgement display criteria that include a criterion that is met when a characteristic intensity of the contact satisfies a second intensity threshold, display an acknowledgement selection affordance at a location in the messaging interface that corresponds to the message bubble, wherein the acknowledgement selection affordance displays a plurality of acknowledgement options

2246
Detect a fourth input by a contact at a location of the touch-screen that corresponds a first acknowledgement option of the plurality of acknowledgement options

2248
In response to detecting the acknowledgement application input, apply the first acknowledgement option to the message bubble

Figure 22F:
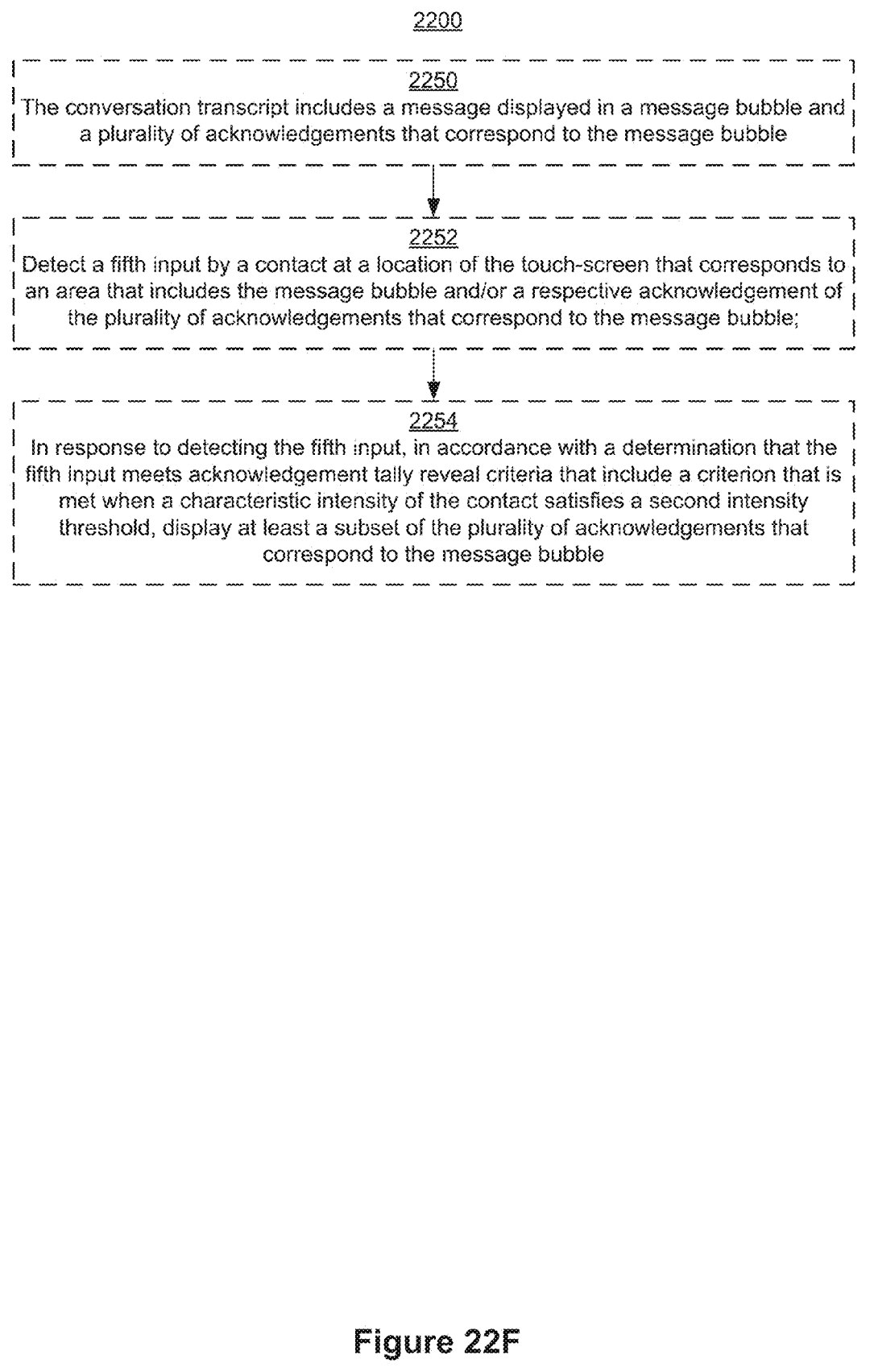

2250
The conversation transcript includes a message displayed in a message bubble and a plurality of acknowledgements that correspond to the message bubble

↓

2252
Detect a fifth input by a contact at a location of the touch-screen that corresponds to an area that includes the message bubble and/or a respective acknowledgement of the plurality of acknowledgements that correspond to the message bubble;

↓

2254
In response to detecting the fifth input, in accordance with a determination that the fifth input meets acknowledgement tally reveal criteria that include a criterion that is met when a characteristic intensity of the contact satisfies a second intensity threshold, display at least a subset of the plurality of acknowledgements that correspond to the message bubble

Figure 22G:
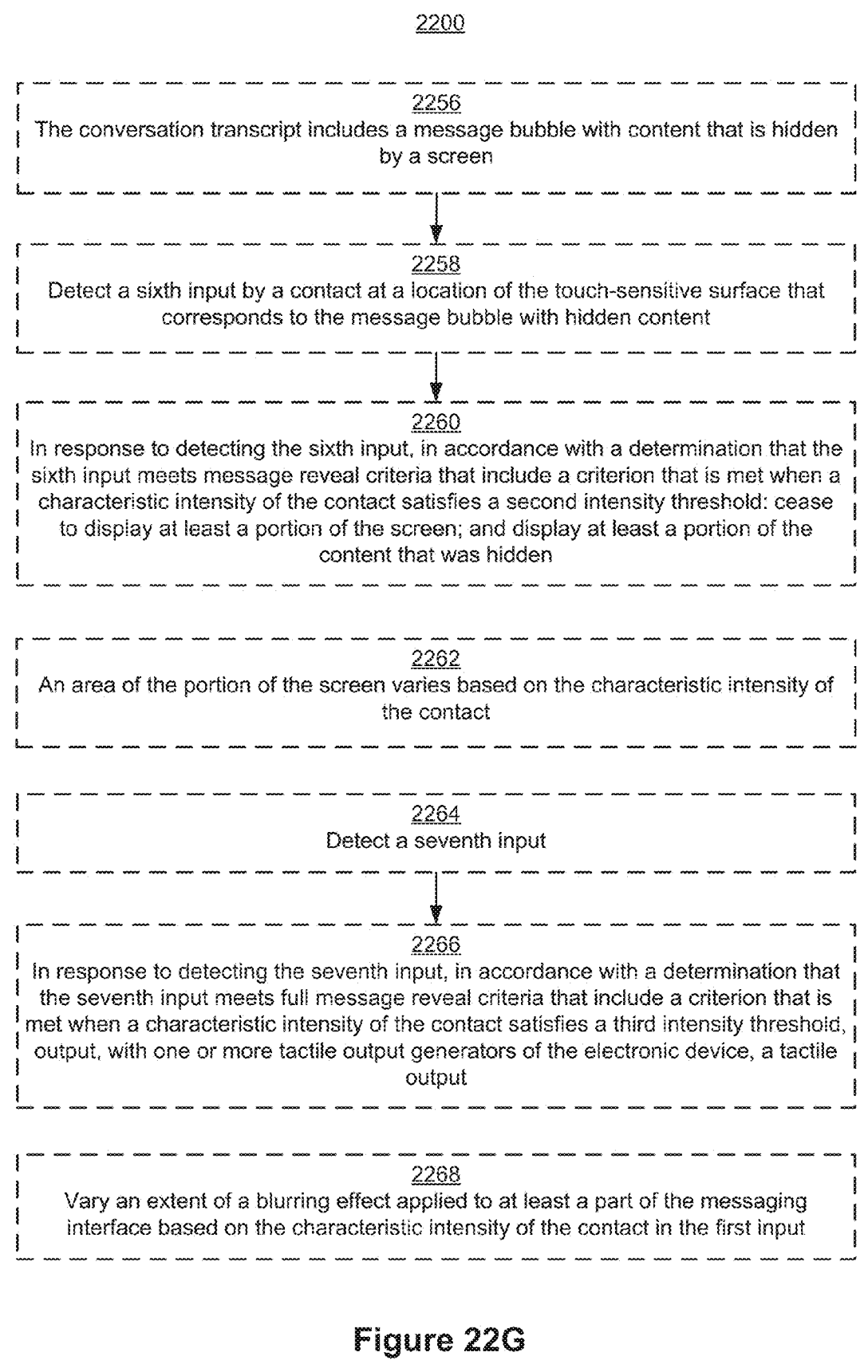

2256
The conversation transcript includes a message bubble with content that is hidden by a screen

↓

2258
Detect a sixth input by a contact at a location of the touch-sensitive surface that corresponds to the message bubble with hidden content

↓

2260
In response to detecting the sixth input, in accordance with a determination that the sixth input meets message reveal criteria that include a criterion that is met when a characteristic intensity of the contact satisfies a second intensity threshold: cease to display at least a portion of the screen; and display at least a portion of the content that was hidden 2262
An area of the portion of the screen varies based on the characteristic intensity of the contact 2264
Detect a seventh input

↓

2266
In response to detecting the seventh input, in accordance with a determination that the seventh input meets full message reveal criteria that include a criterion that is met when a characteristic intensity of the contact satisfies a third intensity threshold, output, with one or more tactile output generators of the electronic device, a tactile output 2268
Vary an extent of a blurring effect applied to at least a part of the messaging interface based on the characteristic intensity of the contact in the first input

Figure 24A1:
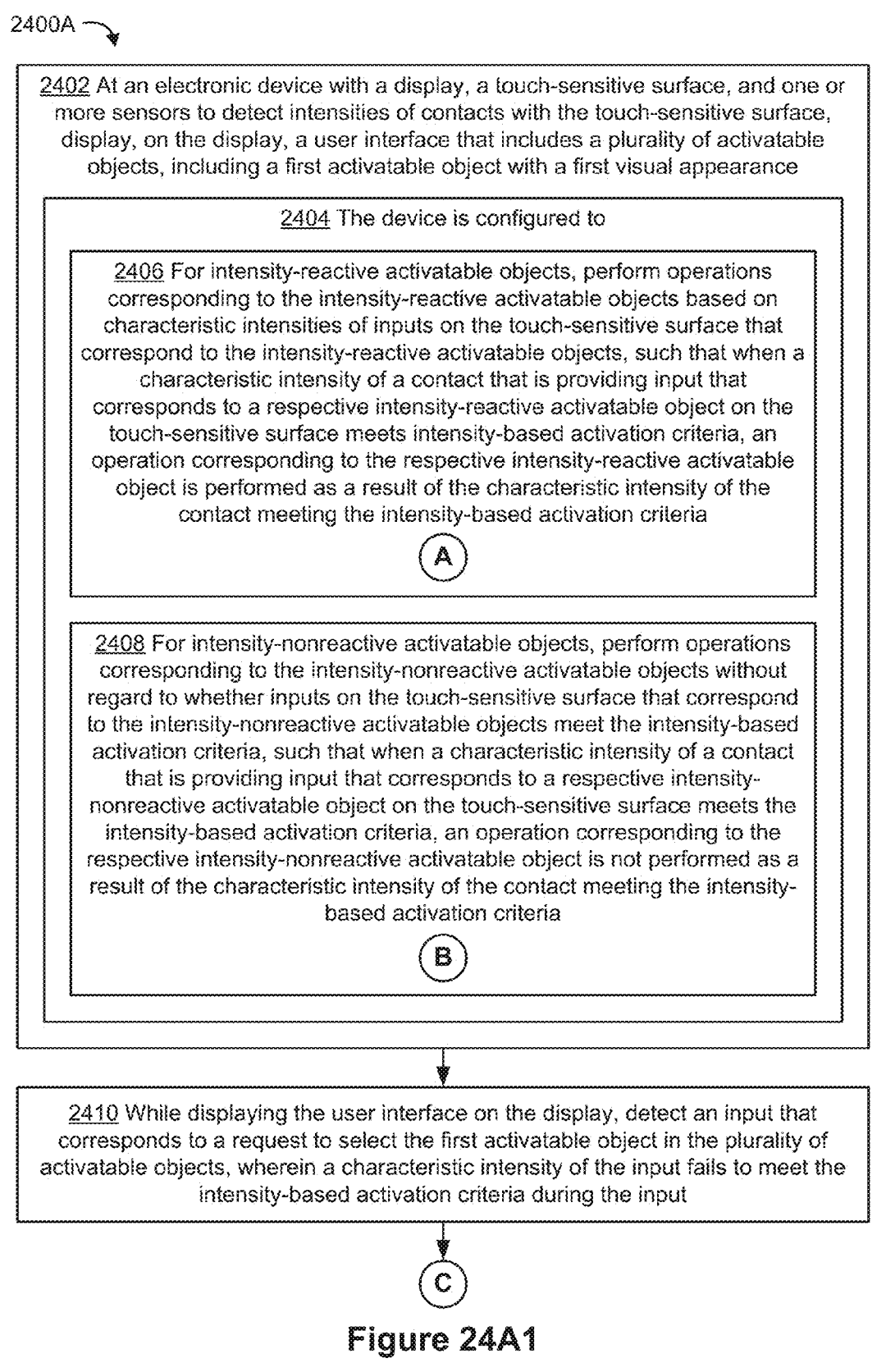

2402 At an electronic device with a display, a touch-sensitive surface, and one or more sensors to detect intensities of contacts with the touch-sensitive surface, display, on the display, a user interface that includes a plurality of activatable objects, including a first activatable object with a first visual appearance 2404 The device is configured to 2406 For intensity-reactive activatable objects, perform operations corresponding to the intensity-reactive activatable objects based on characteristic intensities of inputs on the touch-sensitive surface that correspond to the intensity-reactive activatable objects, such that when a characteristic intensity of a contact that is providing input that corresponds to a respective intensity-reactive activatable object on the touch-sensitive surface meets intensity-based activation criteria, an operation corresponding to the respective intensity-reactive activatable object is performed as a result of the characteristic intensity of the contact meeting the intensity-based activation criteria (A)

2408 For intensity-nonreactive activatable objects, perform operations corresponding to the intensity-nonreactive activatable objects without regard to whether inputs on the touch-sensitive surface that correspond to the intensity-nonreactive activatable objects meet the intensity-based activation criteria, such that when a characteristic intensity of a contact that is providing input that corresponds to a respective intensity-nonreactive activatable object on the touch-sensitive surface meets the intensity-based activation criteria, an operation corresponding to the respective intensity-nonreactive activatable object is not performed as a result of the characteristic intensity of the contact meeting the intensity-based activation criteria (B)

2410 While displaying the user interface on the display, detect an input that corresponds to a request to select the first activatable object in the plurality of activatable objects, wherein a characteristic intensity of the input fails to meet the intensity-based activation criteria during the input (C)

Figure 24A2:
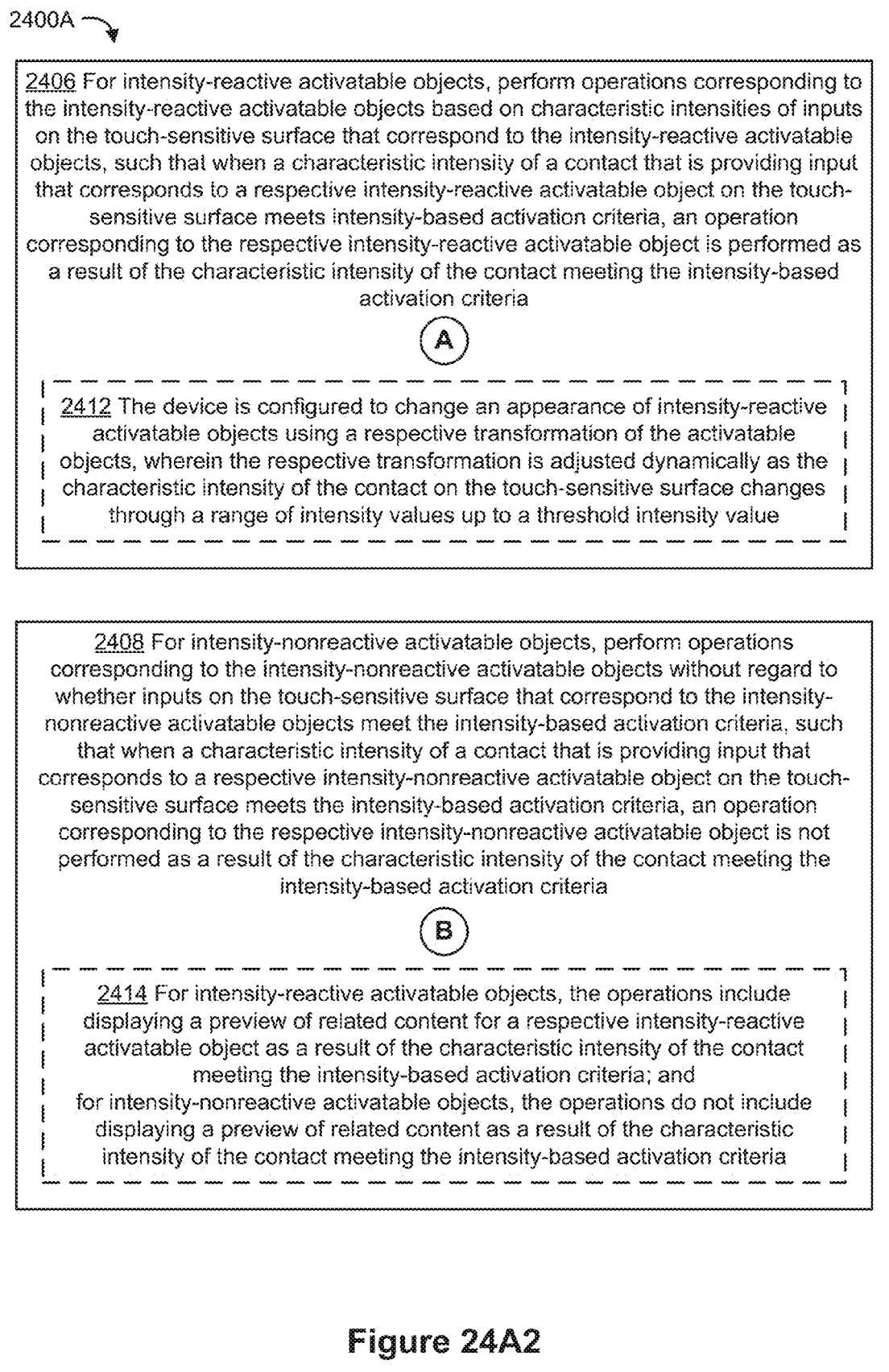

2406 For intensity-reactive activatable objects, perform operations corresponding to the intensity-reactive activatable objects based on characteristic intensities of inputs on the touch-sensitive surface that correspond to the intensity-reactive activatable objects, such that when a characteristic intensity of a contact that is providing input that corresponds to a respective intensity-reactive activatable object on the touch-sensitive surface meets intensity-based activation criteria, an operation corresponding to the respective intensity-reactive activatable object is performed as a result of the characteristic intensity of the contact meeting the intensity-based activation criteria (A)

2412 The device is configured to change an appearance of intensity-reactive activatable objects using a respective transformation of the activatable objects, wherein the respective transformation is adjusted dynamically as the characteristic intensity of the contact on the touch-sensitive surface changes through a range of intensity values up to a threshold intensity value 2408 For intensity-nonreactive activatable objects, perform operations corresponding to the intensity-nonreactive activatable objects without regard to whether inputs on the touch-sensitive surface that correspond to the intensity-nonreactive activatable objects meet the intensity-based activation criteria, such that when a characteristic intensity of a contact that is providing input that corresponds to a respective intensity-nonreactive activatable object on the touch-sensitive surface meets the intensity-based activation criteria, an operation corresponding to the respective intensity-nonreactive activatable object is not performed as a result of the characteristic intensity of the contact meeting the intensity-based activation criteria (B)

2414 For intensity-reactive activatable objects, the operations include displaying a preview of related content for a respective intensity-reactive activatable object as a result of the characteristic intensity of the contact meeting the intensity-based activation criteria; and
for intensity-nonreactive activatable objects, the operations do not include displaying a preview of related content as a result of the characteristic intensity of the contact meeting the intensity-based activation criteria

Figure 24A3:
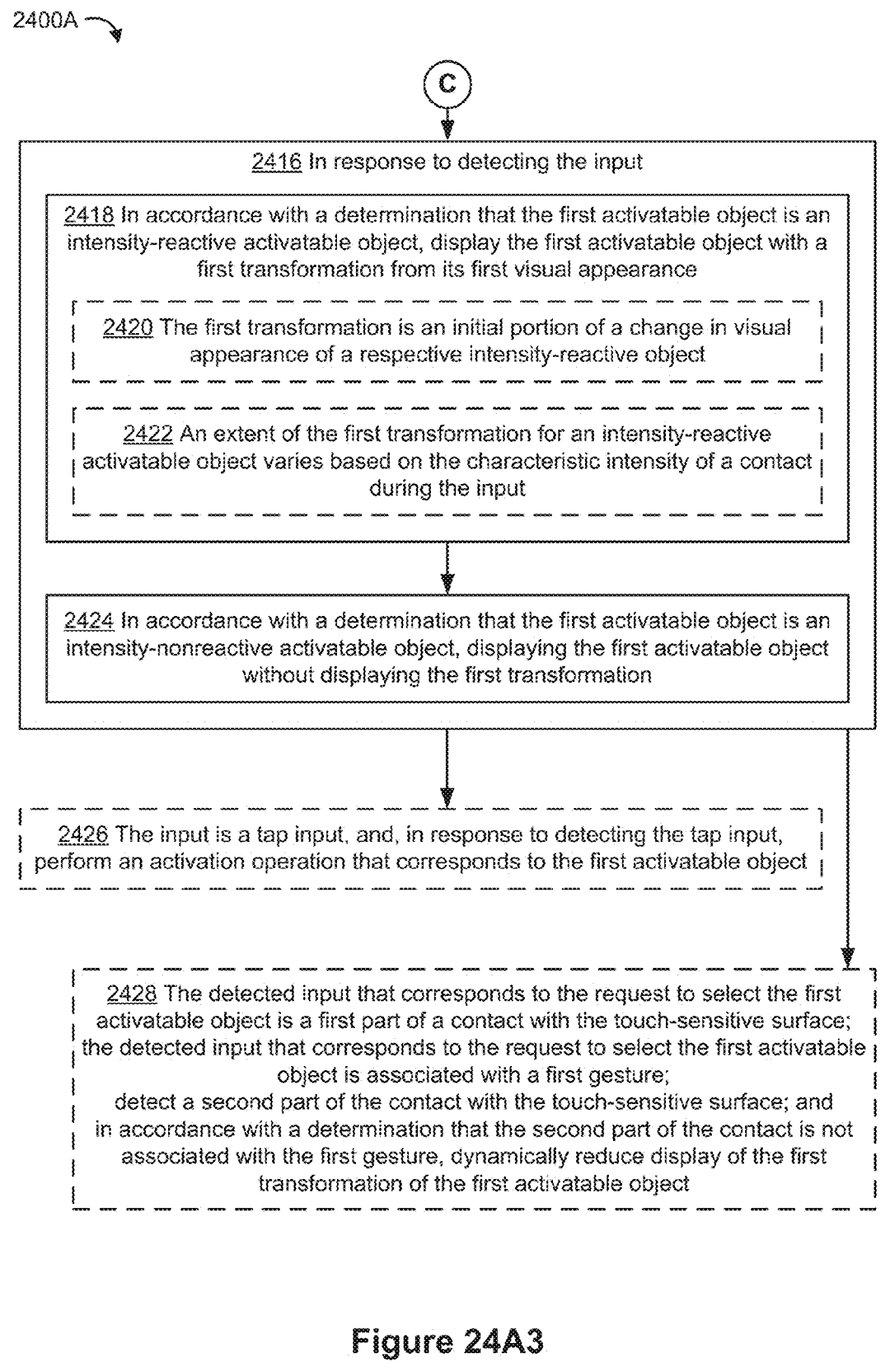

2416 In response to detecting the input

2418 In accordance with a determination that the first activatable object is an intensity-reactive activatable object, display the first activatable object with a first transformation from its first visual appearance 2420 The first transformation is an initial portion of a change in visual appearance of a respective intensity-reactive object 2422 An extent of the first transformation for an intensity-reactive activatable object varies based on the characteristic intensity of a contact during the input 2424 In accordance with a determination that the first activatable object is an intensity-nonreactive activatable object, displaying the first activatable object without displaying the first transformation 2426 The input is a tap input, and, in response to detecting the tap input, perform an activation operation that corresponds to the first activatable object 2428 The detected input that corresponds to the request to select the first activatable object is a first part of a contact with the touch-sensitive surface;
the detected input that corresponds to the request to select the first activatable object is associated with a first gesture;
detect a second part of the contact with the touch-sensitive surface; and
in accordance with a determination that the second part of the contact is not associated with the first gesture, dynamically reduce display of the first transformation of the first activatable object

Figure 24B2:
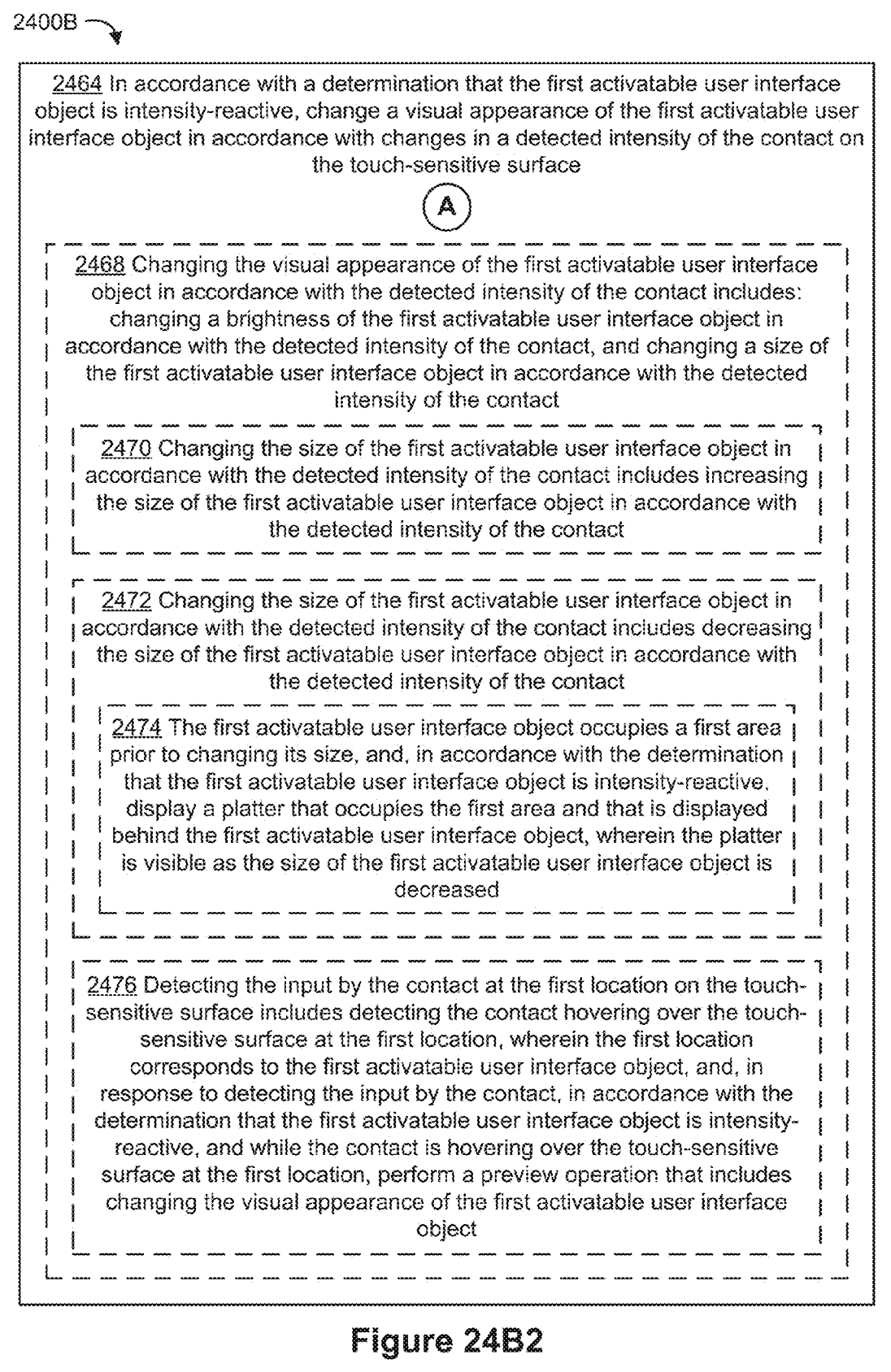

2464 In accordance with a determination that the first activatable user interface object is intensity-reactive, change a visual appearance of the first activatable user interface object in accordance with changes in a detected intensity of the contact on the touch-sensitive surface (A)

2468 Changing the visual appearance of the first activatable user interface object in accordance with the detected intensity of the contact includes: changing a brightness of the first activatable user interface object in accordance with the detected intensity of the contact, and changing a size of the first activatable user interface object in accordance with the detected intensity of the contact 2470 Changing the size of the first activatable user interface object in accordance with the detected intensity of the contact includes increasing the size of the first activatable user interface object in accordance with the detected intensity of the contact 2472 Changing the size of the first activatable user interface object in accordance with the detected intensity of the contact includes decreasing the size of the first activatable user interface object in accordance with the detected intensity of the contact 2474 The first activatable user interface object occupies a first area prior to changing its size, and, in accordance with the determination that the first activatable user interface object is intensity-reactive, display a platter that occupies the first area and that is displayed behind the first activatable user interface object, wherein the platter is visible as the size of the first activatable user interface object is decreased 2476 Detecting the input by the contact at the first location on the touch-sensitive surface includes detecting the contact hovering over the touch-sensitive surface at the first location, wherein the first location corresponds to the first activatable user interface object, and, in response to detecting the input by the contact, in accordance with the determination that the first activatable user interface object is intensity-reactive, and while the contact is hovering over the touch-sensitive surface at the first location, perform a preview operation that includes changing the visual appearance of the first activatable user interface object

Figure 24B3:
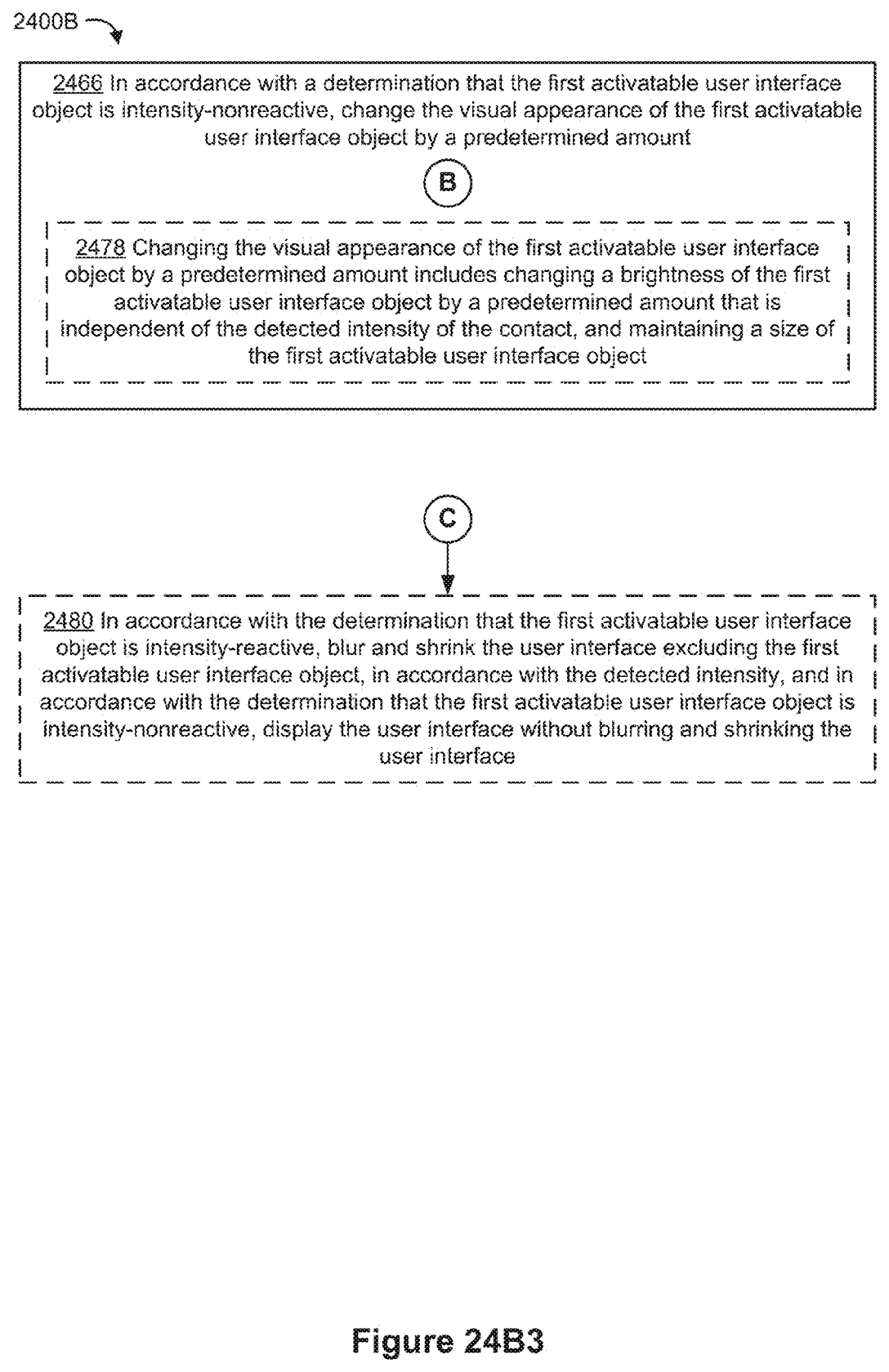

2466 In accordance with a determination that the first activatable user interface object is intensity-nonreactive, change the visual appearance of the first activatable user interface object by a predetermined amount (B)

2478 Changing the visual appearance of the first activatable user interface object by a predetermined amount includes changing a brightness of the first activatable user interface object by a predetermined amount that is independent of the detected intensity of the contact, and maintaining a size of the first activatable user interface object (C)

2480 In accordance with the determination that the first activatable user interface object is intensity-reactive, blur and shrink the user interface excluding the first activatable user interface object, in accordance with the detected intensity, and in accordance with the determination that the first activatable user interface object is intensity-nonreactive, display the user interface without blurring and shrinking the user interface

Figure 27A1:
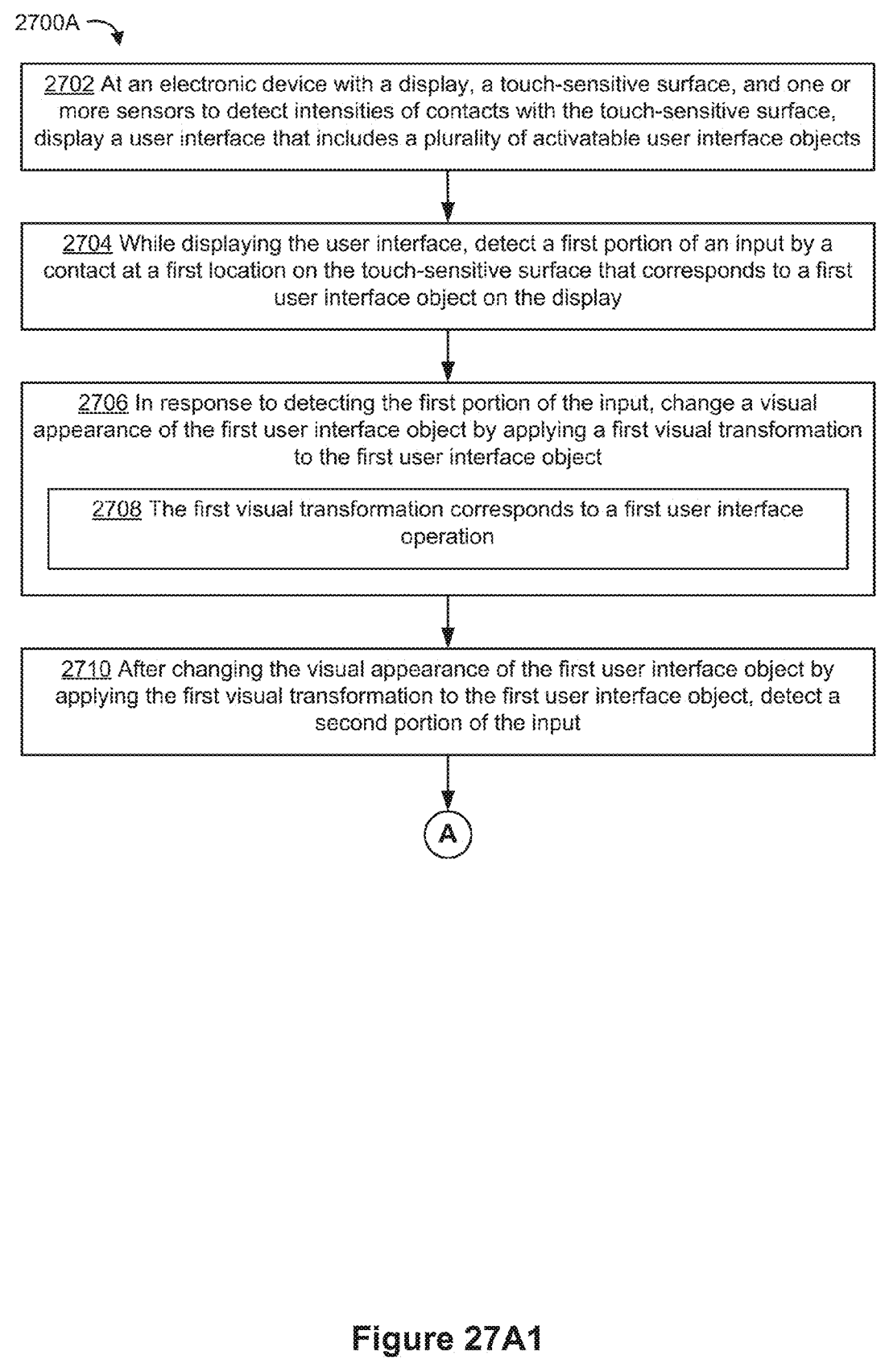

2702 At an electronic device with a display, a touch-sensitive surface, and one or more sensors to detect intensities of contacts with the touch-sensitive surface, display a user interface that includes a plurality of activatable user interface objects 2704 While displaying the user interface, detect a first portion of an input by a contact at a first location on the touch-sensitive surface that corresponds to a first user interface object on the display 2706 In response to detecting the first portion of the input, change a visual appearance of the first user interface object by applying a first visual transformation to the first user interface object 2708 The first visual transformation corresponds to a first user interface operation 2710 After changing the visual appearance of the first user interface object by applying the first visual transformation to the first user interface object, detect a second portion of the input

Figure 27A3:
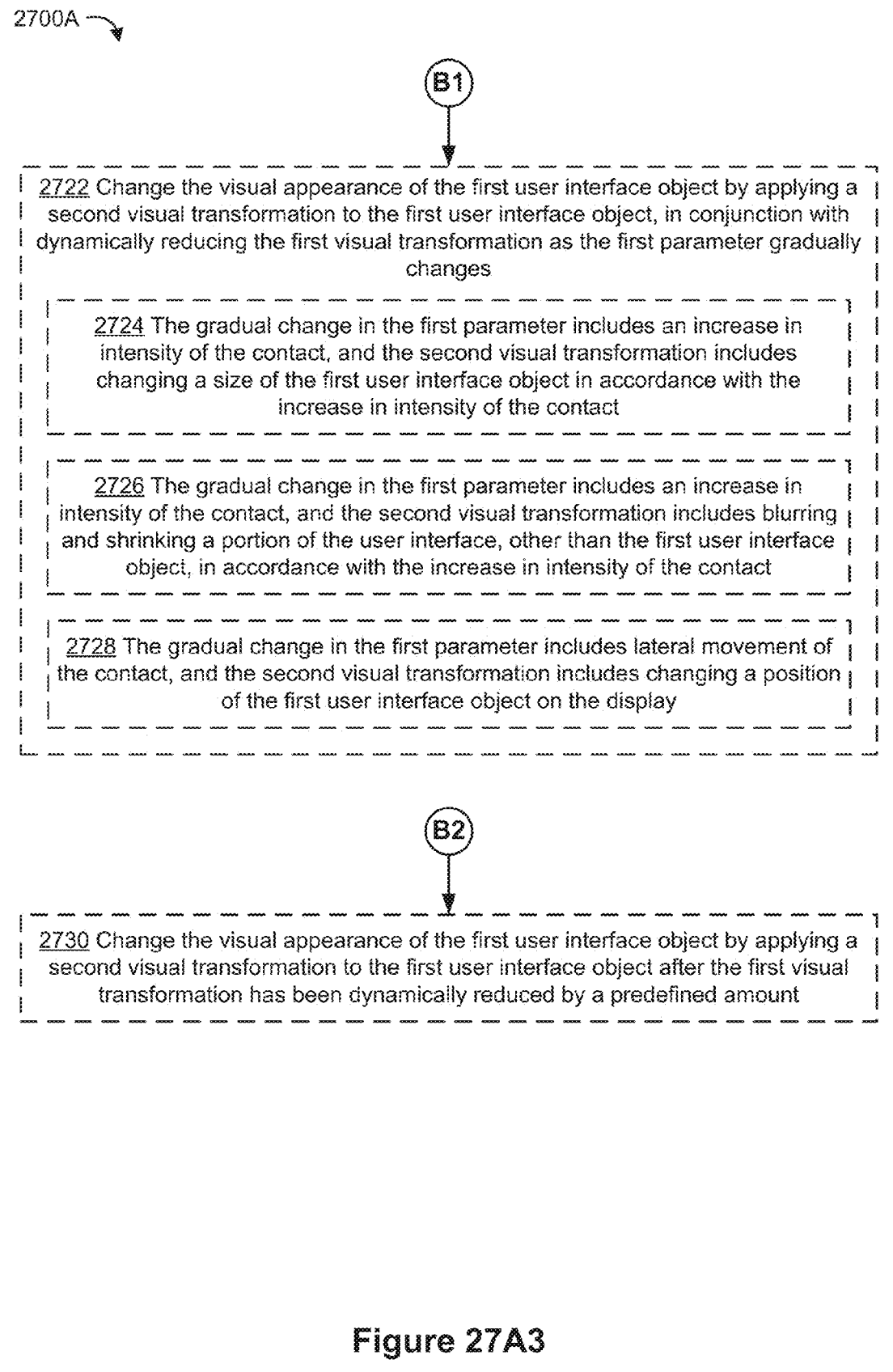

2722 Change the visual appearance of the first user interface object by applying a second visual transformation to the first user interface object, in conjunction with dynamically reducing the first visual transformation as the first parameter gradually changes 2724 The gradual change in the first parameter includes an increase in intensity of the contact, and the second visual transformation includes changing a size of the first user interface object in accordance with the increase in intensity of the contact 2726 The gradual change in the first parameter includes an increase in intensity of the contact, and the second visual transformation includes blurring and shrinking a portion of the user interface, other than the first user interface object, in accordance with the increase in intensity of the contact 2728 The gradual change in the first parameter includes lateral movement of the contact, and the second visual transformation includes changing a position of the first user interface object on the display (B2)

2730 Change the visual appearance of the first user interface object by applying a second visual transformation to the first user interface object after the first visual transformation has been dynamically reduced by a predefined amount

Figure 27A4:
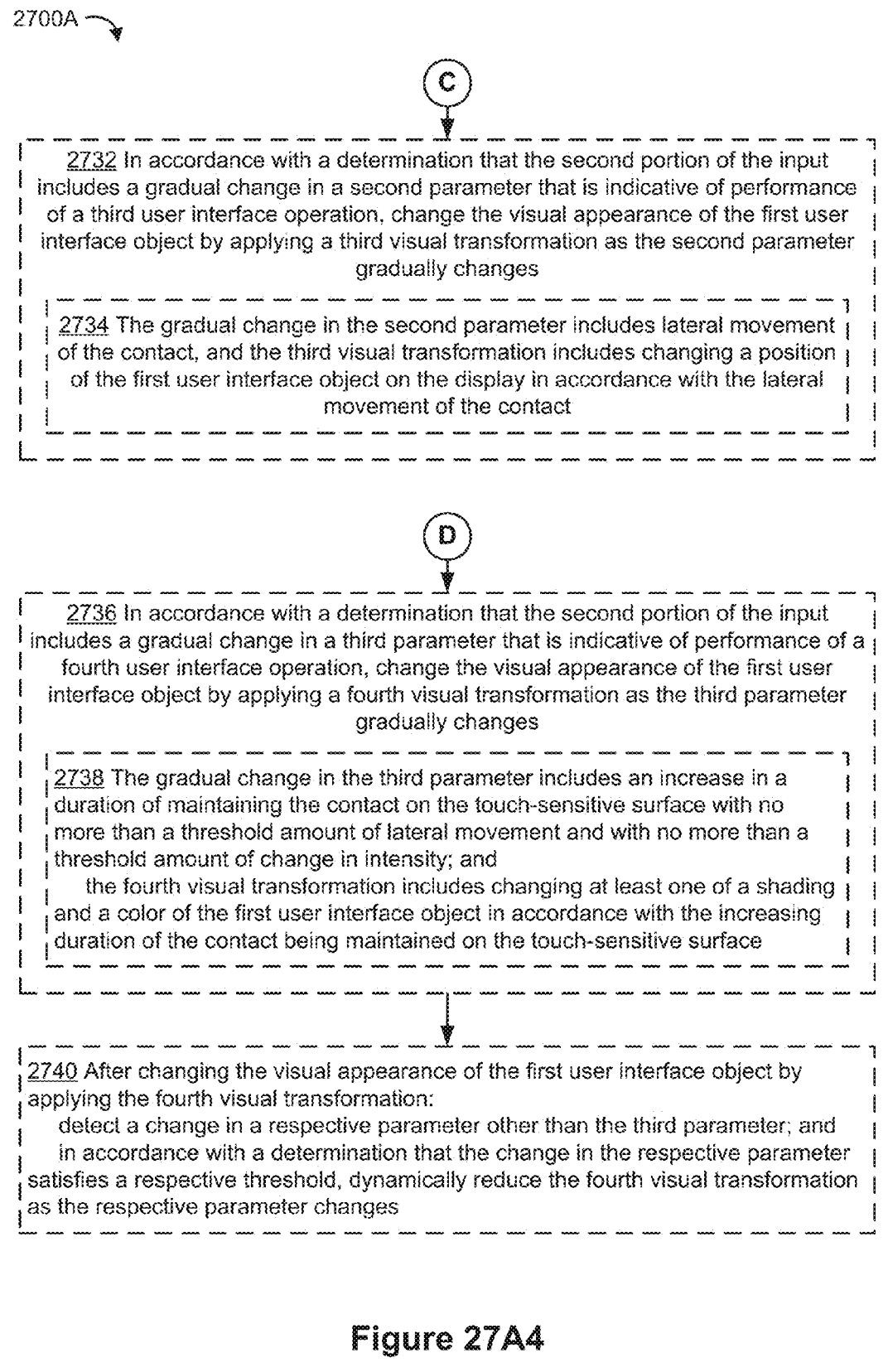

2732 In accordance with a determination that the second portion of the input includes a gradual change in a second parameter that is indicative of performance of a third user interface operation, change the visual appearance of the first user interface object by applying a third visual transformation as the second parameter gradually changes 2734 The gradual change in the second parameter includes lateral movement of the contact, and the third visual transformation includes changing a position of the first user interface object on the display in accordance with the lateral movement of the contact

D

2736 In accordance with a determination that the second portion of the input includes a gradual change in a third parameter that is indicative of performance of a fourth user interface operation, change the visual appearance of the first user interface object by applying a fourth visual transformation as the third parameter gradually changes 2738 The gradual change in the third parameter includes an increase in a duration of maintaining the contact on the touch-sensitive surface with no more than a threshold amount of lateral movement and with no more than a threshold amount of change in intensity; and the fourth visual transformation includes changing at least one of a shading and a color of the first user interface object in accordance with the increasing duration of the contact being maintained on the touch-sensitive surface 2740 After changing the visual appearance of the first user interface object by applying the fourth visual transformation:

detect a change in a respective parameter other than the third parameter; and in accordance with a determination that the change in the respective parameter satisfies a respective threshold, dynamically reduce the fourth visual transformation as the respective parameter changes

Figure 27A5:
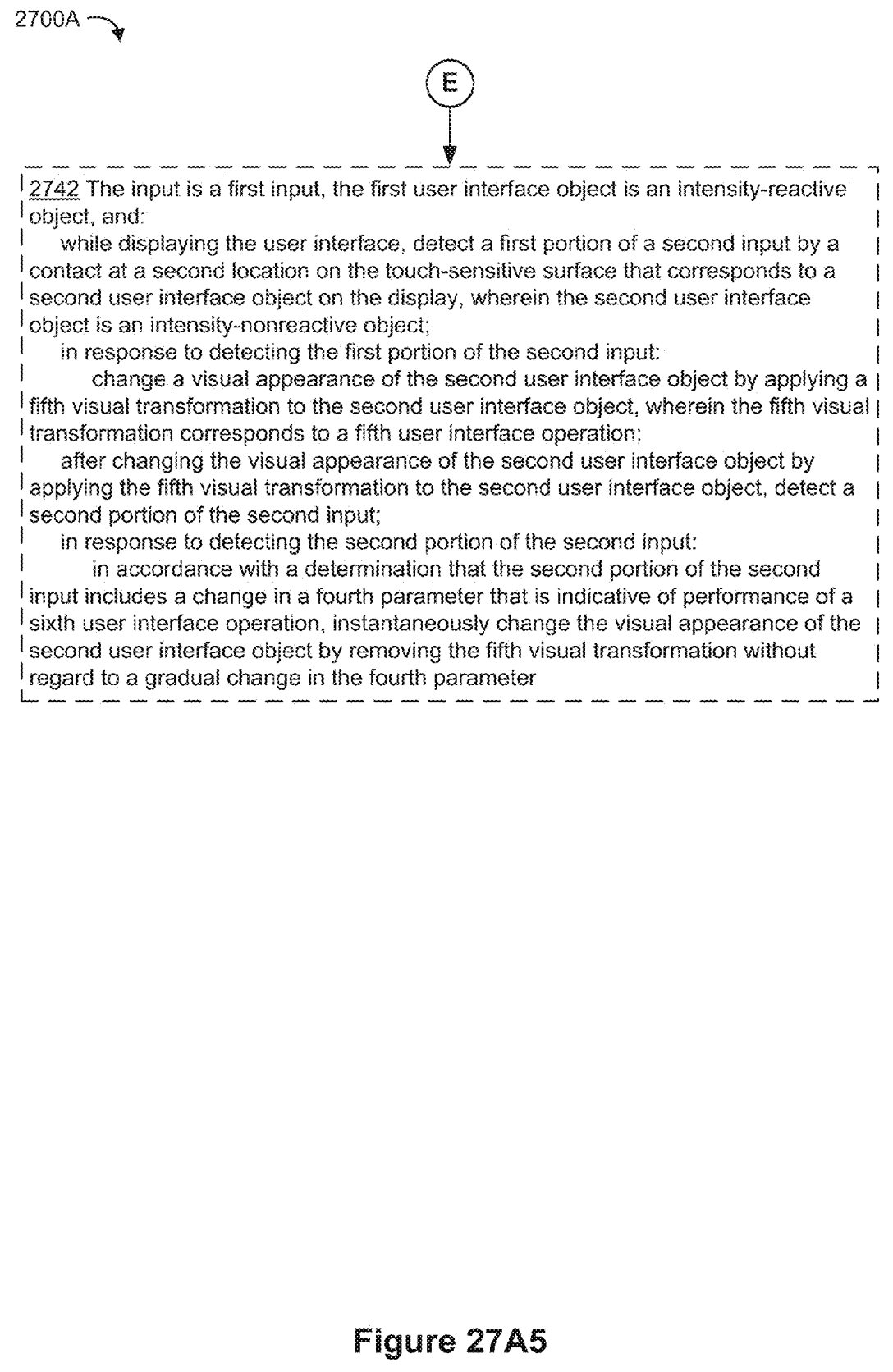

2742 The input is a first input, the first user interface object is an intensity-reactive object, and:

while displaying the user interface, detect a first portion of a second input by a contact at a second location on the touch-sensitive surface that corresponds to a second user interface object on the display, wherein the second user interface object is an intensity-nonreactive object;

in response to detecting the first portion of the second input:

change a visual appearance of the second user interface object by applying a fifth visual transformation to the second user interface object, wherein the fifth visual transformation corresponds to a fifth user interface operation;

after changing the visual appearance of the second user interface object by applying the fifth visual transformation to the second user interface object, detect a second portion of the second input;

in response to detecting the second portion of the second input:

in accordance with a determination that the second portion of the second input includes a change in a fourth parameter that is indicative of performance of a sixth user interface operation, instantaneously change the visual appearance of the second user interface object by removing the fifth visual transformation without regard to a gradual change in the fourth parameter

Figure 27B1:
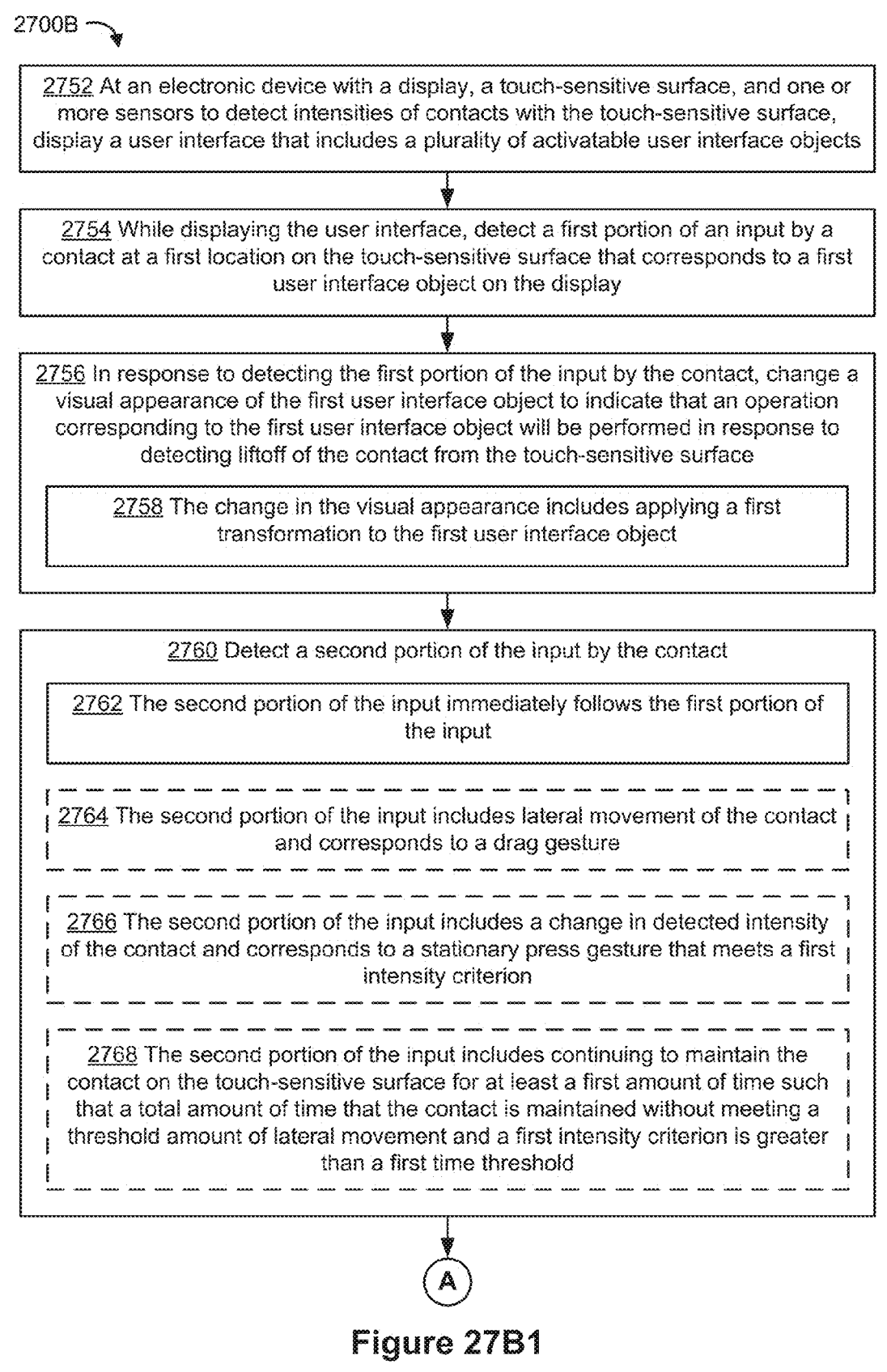

2752 At an electronic device with a display, a touch-sensitive surface, and one or more sensors to detect intensities of contacts with the touch-sensitive surface, display a user interface that includes a plurality of activatable user interface objects

↓

2754 While displaying the user interface, detect a first portion of an input by a contact at a first location on the touch-sensitive surface that corresponds to a first user interface object on the display

↓

2756 In response to detecting the first portion of the input by the contact, change a visual appearance of the first user interface object to indicate that an operation corresponding to the first user interface object will be performed in response to detecting liftoff of the contact from the touch-sensitive surface 2758 The change in the visual appearance includes applying a first transformation to the first user interface object

↓

2760 Detect a second portion of the input by the contact

2762 The second portion of the input immediately follows the first portion of the input 2764 The second portion of the input includes lateral movement of the contact and corresponds to a drag gesture 2766 The second portion of the input includes a change in detected intensity of the contact and corresponds to a stationary press gesture that meets a first intensity criterion 2768 The second portion of the input includes continuing to maintain the contact on the touch-sensitive surface for at least a first amount of time such that a total amount of time that the contact is maintained without meeting a threshold amount of lateral movement and a first intensity criterion is greater than a first time threshold

Figure 27B2:
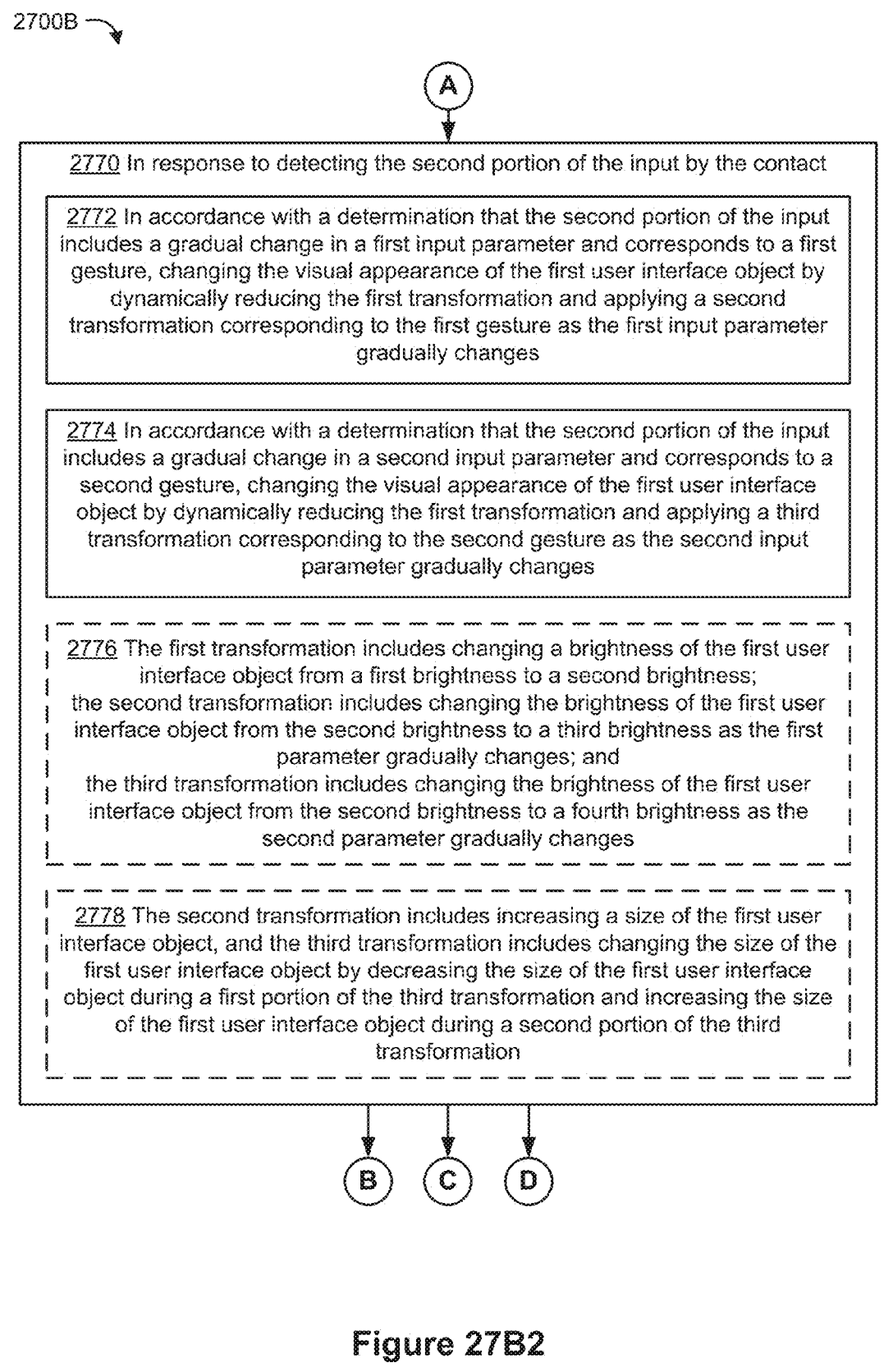

2770 In response to detecting the second portion of the input by the contact

2772 In accordance with a determination that the second portion of the input includes a gradual change in a first input parameter and corresponds to a first gesture, changing the visual appearance of the first user interface object by dynamically reducing the first transformation and applying a second transformation corresponding to the first gesture as the first input parameter gradually changes 2774 In accordance with a determination that the second portion of the input includes a gradual change in a second input parameter and corresponds to a second gesture, changing the visual appearance of the first user interface object by dynamically reducing the first transformation and applying a third transformation corresponding to the second gesture as the second input parameter gradually changes 2776 The first transformation includes changing a brightness of the first user interface object from a first brightness to a second brightness;
the second transformation includes changing the brightness of the first user interface object from the second brightness to a third brightness as the first parameter gradually changes; and
the third transformation includes changing the brightness of the first user interface object from the second brightness to a fourth brightness as the second parameter gradually changes 2778 The second transformation includes increasing a size of the first user interface object, and the third transformation includes changing the size of the first user interface object by decreasing the size of the first user interface object during a first portion of the third transformation and increasing the size of the first user interface object during a second portion of the third transformation (B) (C) (D)

Figure 27B3:
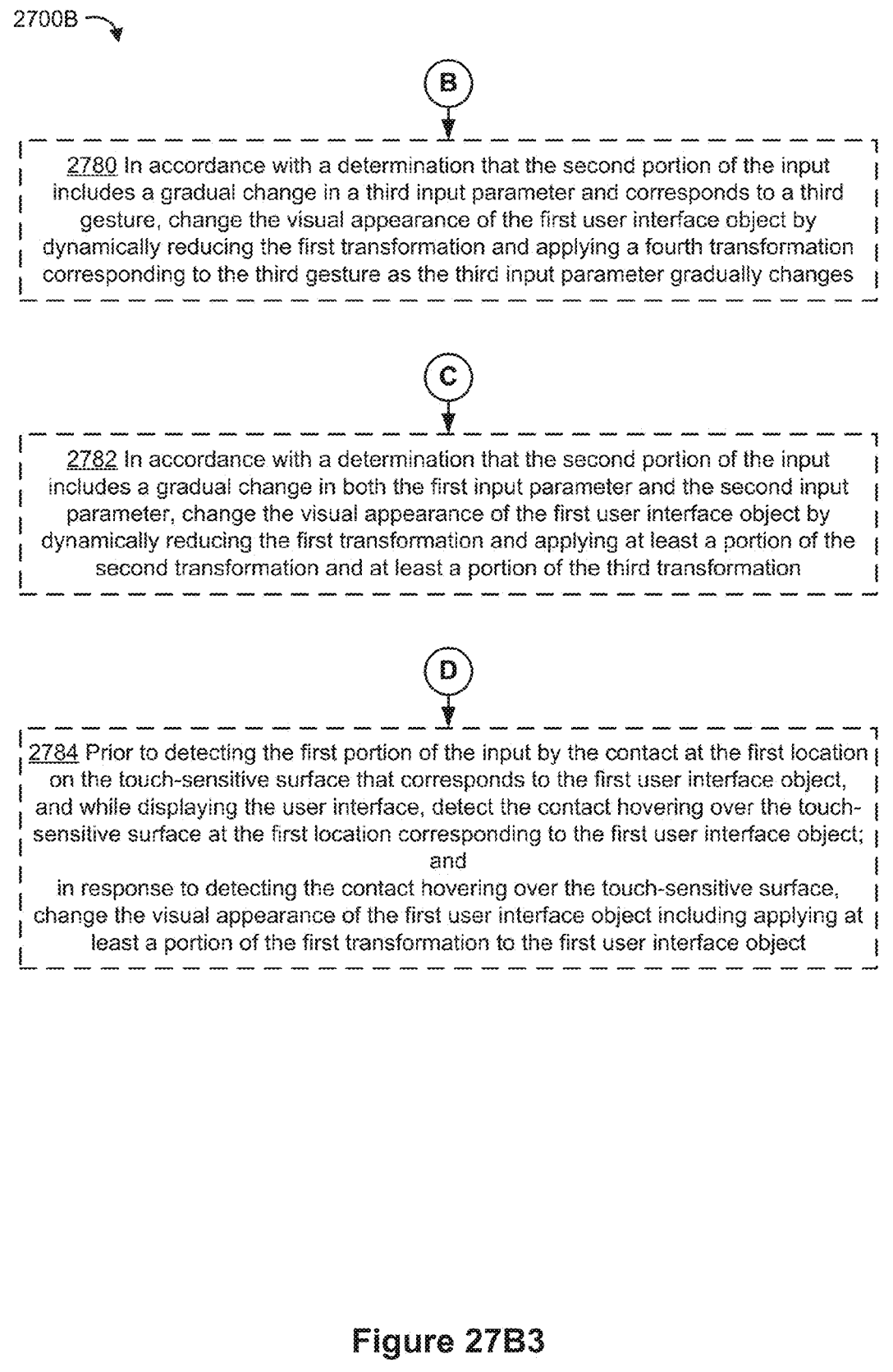

2780 In accordance with a determination that the second portion of the input includes a gradual change in a third input parameter and corresponds to a third gesture, change the visual appearance of the first user interface object by dynamically reducing the first transformation and applying a fourth transformation corresponding to the third gesture as the third input parameter gradually changes

C

2782 In accordance with a determination that the second portion of the input includes a gradual change in both the first input parameter and the second input parameter, change the visual appearance of the first user interface object by dynamically reducing the first transformation and applying at least a portion of the second transformation and at least a portion of the third transformation

D

2784 Prior to detecting the first portion of the input by the contact at the first location on the touch-sensitive surface that corresponds to the first user interface object, and while displaying the user interface, detect the contact hovering over the touch-sensitive surface at the first location corresponding to the first user interface object; and
in response to detecting the contact hovering over the touch-sensitive surface, change the visual appearance of the first user interface object including applying at least a portion of the first transformation to the first user interface object

Figure 30A:
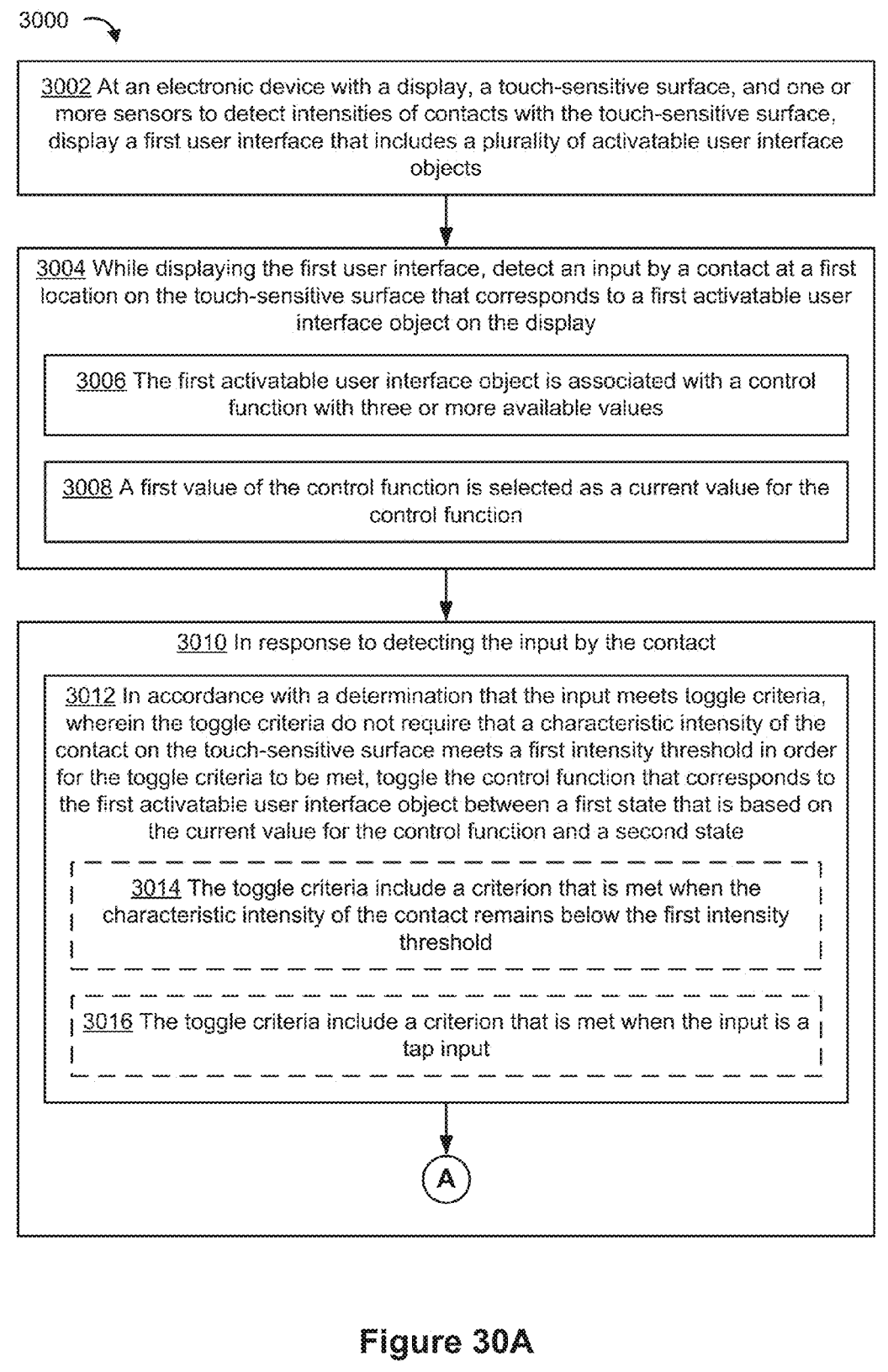

3002 At an electronic device with a display, a touch-sensitive surface, and one or more sensors to detect intensities of contacts with the touch-sensitive surface, display a first user interface that includes a plurality of activatable user interface objects 3004 While displaying the first user interface, detect an input by a contact at a first location on the touch-sensitive surface that corresponds to a first activatable user interface object on the display 3006 The first activatable user interface object is associated with a control function with three or more available values 3008 A first value of the control function is selected as a current value for the control function 3010 In response to detecting the input by the contact 3012 In accordance with a determination that the input meets toggle criteria, wherein the toggle criteria do not require that a characteristic intensity of the contact on the touch-sensitive surface meets a first intensity threshold in order for the toggle criteria to be met, toggle the control function that corresponds to the first activatable user interface object between a first state that is based on the current value for the control function and a second state 3014 The toggle criteria include a criterion that is met when the characteristic intensity of the contact remains below the first intensity threshold 3016 The toggle criteria include a criterion that is met when the input is a tap input

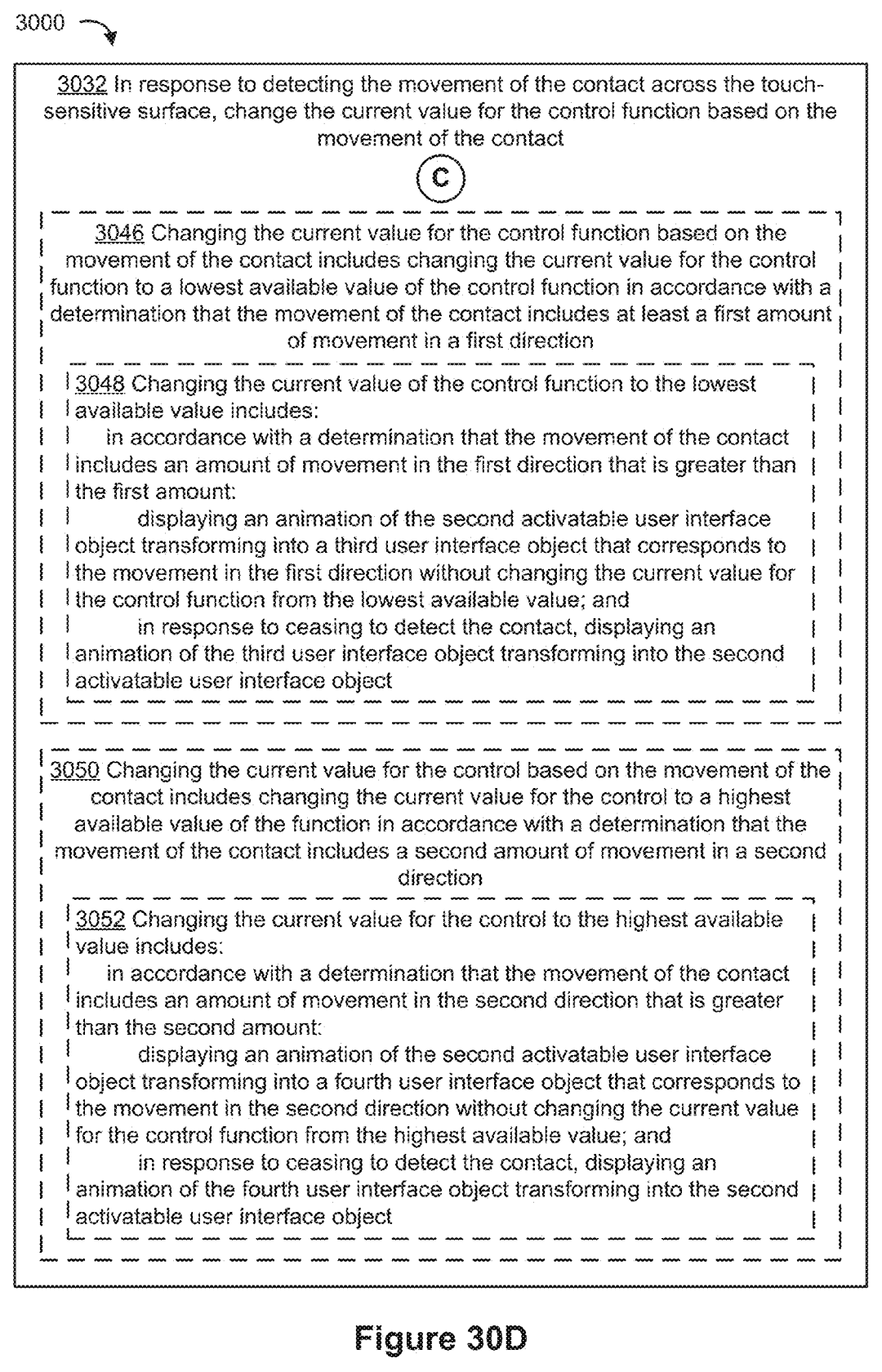

3032 In response to detecting the movement of the contact across the touch-sensitive surface, change the current value for the control function based on the movement of the contact (C)

3046 Changing the current value for the control function based on the movement of the contact includes changing the current value for the control function to a lowest available value of the control function in accordance with a determination that the movement of the contact includes at least a first amount of movement in a first direction 3048 Changing the current value of the control function to the lowest available value includes:
in accordance with a determination that the movement of the contact includes an amount of movement in the first direction that is greater than the first amount:
displaying an animation of the second activatable user interface object transforming into a third user interface object that corresponds to the movement in the first direction without changing the current value for the control function from the lowest available value; and
in response to ceasing to detect the contact, displaying an animation of the third user interface object transforming into the second activatable user interface object 3050 Changing the current value for the control based on the movement of the contact includes changing the current value for the control to a highest available value of the function in accordance with a determination that the movement of the contact includes a second amount of movement in a second direction 3052 Changing the current value for the control to the highest available value includes:
in accordance with a determination that the movement of the contact includes an amount of movement in the second direction that is greater than the second amount:
displaying an animation of the second activatable user interface object transforming into a fourth user interface object that corresponds to the movement in the second direction without changing the current value for the control function from the highest available value; and
in response to ceasing to detect the contact, displaying an animation of the fourth user interface object transforming into the second activatable user interface object

Figure 30D

DEVICES, METHODS, AND GRAPHICAL USER INTERFACES FOR MANIPULATING USER INTERFACE OBJECTS WITH VISUAL AND/OR HAPTIC FEEDBACK

PRIORITY CLAIMS AND RELATED APPLICATIONS

This application is a continuation of U.S. application Ser. No. 15/231,745, filed Aug. 8, 2016, which claims priority to the following: (1) U.S. Provisional Application Ser. No. 62/349,096, filed Jun. 12, 2016; (2) U.S. Provisional Application Ser. No. 62/215,722, filed Sep. 8, 2015; (3) U.S. Provisional Application Ser. No. 62/213,609, filed Sep. 2, 2015; and (4) U.S. Provisional Application Ser. No. 62/203,387, filed Aug. 10, 2015, all of which are incorporated by reference herein in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interfaces on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, and control elements such as buttons and other graphics.

A user will, in some circumstances, need to perform such manipulations on user interface objects in a file management program (e.g., Finder from Apple Inc. of Cupertino, Calif.), a messaging application (e.g., Messages from Apple Inc. of Cupertino, Calif.), an image management application (e.g., Photos from Apple Inc. of Cupertino, Calif.), a camera application (e.g., Camera from Apple Inc. of Cupertino, Calif.), a map application (e.g., Maps from Apple Inc. of Cupertino, Calif.), a note taking application (e.g., Notes from Apple Inc. of Cupertino, Calif.), digital content (e.g., videos and music) management applications (e.g., Music and iTunes from Apple Inc. of Cupertino, Calif.), a news application (e.g., News from Apple Inc. of Cupertino, Calif.), a phone application (e.g., Phone from Apple Inc. of Cupertino, Calif.), an email application (e.g., Mail from Apple Inc. of Cupertino, Calif.), a browser application (e.g., Safari from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a spreadsheet application (e.g., Numbers from Apple Inc. of Cupertino, Calif.), a reader application (e.g., iBooks from Apple Inc. of Cupertino, Calif.), a video making application (e.g., iMovie from Apple Inc. of Cupertino, Calif.), and/or geo location applications (e.g., Find Friends and Find iPhone from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and one or more sensors for detecting intensities of contacts on the touch-sensitive surface. The device concurrently displays, on the display: a background user interface; and a first version of a notification associated with a first application, wherein: the first version of the notification has a first size, the first version of the notification includes first content, and the first version of the notification is overlaid on the background user interface. While displaying the first version of the notification associated with the first application overlaid on the background user interface, the device detects a first portion of a first input that includes detecting a first contact at a location on the touch-sensitive surface that corresponds to the first version of the notification. In response to detecting the first portion of the first input: in accordance with a determination that the first portion of the first input meets application-launching criteria, wherein the application-launching criteria do not require that a characteristic intensity of the first contact on the touch-sensitive surface meet a preview intensity threshold in order for the application-launching criteria to be met, the device initiates a process to launch the first application, wherein launching the first application includes ceasing to display the background user interface and displaying a user interface associated with the first application; and, in accordance with a determination that the first portion of the first input meets notification-expansion criteria, wherein the notification-expansion criteria require that the characteristic intensity of the first contact on the touch-sensitive surface meet the preview intensity threshold in order for the notification-expansion criteria to be met, the device displays a second version of the notification, wherein: the second version of the notification has a second size larger than the first size, the second version of the notification includes expanded notification content that is not displayed in the first version of the notification, and the second version of the notification is overlaid on the background user interface.

In accordance with some embodiments, a method is performed at an electronic device with a display, a touch-sensitive surface, and one or more sensors for detecting intensities of contacts on the touch-sensitive surface. The method includes: displaying, on the display, a user interface that includes a plurality of application icons that correspond to different applications in a plurality of applications; while displaying the user interface that includes the plurality of application icons, detecting a first input that includes detecting a first contact on the touch-sensitive surface at a location on the touch-sensitive surface that corresponds to a first application icon of the plurality of application icons, the first application icon being associated with a first application of the plurality of applications; in response to detecting the first input: in accordance with a determination that the first input meets application-launching criteria, wherein the application-launching criteria do not require that a characteristic intensity of the first contact on the touch-sensitive surface meet a first intensity threshold in order for the application-launching criteria to be met: launching the first application; and replacing display of the user interface that includes the plurality of application icons with a user interface of the first application; and, in accordance with a determination that the first input meets menu-presentation criteria, wherein the menu-presentation criteria require that the characteristic intensity of the first contact on the touch-sensitive surface meet the first intensity threshold in order for the menu-presentation criteria to be met, concurrently displaying a contextual content object and a respective affordance that is associated with the contextual content object, wherein: the contextual content object includes contextually selected content that has been automatically selected from the first application based on a current context of the electronic device; and the respective affordance, when activated, is configured to add the contextual content object to a user interface that includes information for multiple applications.

In accordance with some embodiments, a method is performed at an electronic device with a display, a touch-sensitive surface, and one or more sensors for detecting intensities of contacts on the touch-sensitive surface. The method includes: displaying, on the display, a user interface that includes a plurality of user interface objects that correspond to different applications in a plurality of applications, wherein the plurality of user interface objects include a first user interface object that corresponds a first application that is in a process of being downloaded; while displaying the user interface that includes the plurality of user interface objects, detecting a first input that includes detecting a first contact at a location on the touch-sensitive surface that corresponds to the first user interface object; and in response to detecting the first input: in accordance with a determination that the first user interface object corresponds to an application that has not been fully downloaded and that the first input meets menu-presentation criteria, wherein the menu-presentation criteria require that a characteristic intensity of a contact in a detected input meet a first intensity threshold in order for the menu-presentation criteria to be met, displaying one or more first selectable options that, when activated, are configured to perform actions with respect to downloading of the first application.

In accordance with some embodiments, a method is performed at an electronic device with a display, a touch-sensitive surface, and one or more sensors for detecting intensities of contacts on the touch-sensitive surface. The method includes: displaying a user interface on the display, wherein: the user interface includes a folder icon that corresponds to an application folder containing a plurality of application icons, the plurality of application icons correspond to different applications in a plurality of applications, and the plurality of applications include one or more applications that have one or more unread notifications; while displaying the user interface that includes the folder icon, detecting a first input that includes detecting a first contact at a location on the touch-sensitive surface that corresponds to the folder icon; and in response to detecting the first input: in accordance with a determination that the first input meets menu-presentation criteria, wherein the menu-presentation criteria require that a characteristic intensity of a contact in a detected input meet a first intensity threshold in order for the menu-presentation criteria to be met, displaying one or more selectable options that, when activated, are configured to launch corresponding applications from the plurality of applications in the application folder that have unread notifications.

In accordance with some embodiments, a method is performed at an electronic device with a display, a touch-sensitive surface, and one or more sensors to detect intensities of contacts with the touch-sensitive surface. The method includes: displaying a control user interface that includes a plurality of control affordances; detecting a first input by a contact at a location on the touch-sensitive surface that corresponds to a first control affordance, of the plurality of control affordances, on the display; in response to detecting the first input: in accordance with a determination that the first input meets control toggle criteria, wherein the control toggle criteria do not require that a characteristic intensity of the contact meet a first intensity threshold in order for the control toggle criteria to be met, toggling a function of a control that corresponds to the first control affordance; and, in accordance with a determination that the first input meets enhanced control criteria, wherein the enhanced control criteria require that the characteristic intensity of the contact meet the first intensity threshold in order for the enhanced control criteria to be met, displaying one or more modification options for the control that correspond to the first control affordance; while displaying the one or more modification options for the control that correspond to the first control affordance, detecting a second input that activates a first modification option of the one or more modification options; and modifying the control that corresponds to the first control affordance in accordance with the activated first modification option.

In accordance with some embodiments, a method is performed at an electronic device with a display, a touch-sensitive surface, and one or more sensors to detect intensities of contacts with the touch-sensitive surface. The method includes: displaying a user interface that includes: an editable content area that has a plurality of characters, and a content deletion control; detecting a deletion input that includes detecting a contact at a location on the touch-sensitive surface that corresponds to the content deletion control on the display; and in response to detecting the deletion input, deleting content in the editable content area based on a duration and a characteristic intensity of the contact, including: in accordance with a determination that the contact was maintained for a first time period without the characteristic intensity of the contact increasing above a first intensity threshold, deleting the content in the editable content area by sequentially deleting a plurality of sub-units of the content of a first type of sub-unit of the content at a rate that does not vary based on the characteristic intensity of the contact; in accordance with a determination that the contact was maintained for a second time period that is longer than the first time period without the characteristic intensity of the contact increasing above the first intensity threshold, deleting the content in the editable content area by sequentially deleting a plurality of sub-units of the content of a second type of sub-unit of the content at a rate that does not vary based on the characteristic intensity of the contact; and in accordance with a determination that the characteristic intensity of the contact increased above the first intensity threshold, deleting the content in the editable content area by sequentially deleting a plurality of sub-units of the content at a rate that varies based on the characteristic intensity of the contact.

In accordance with some embodiments, a method is performed at an electronic device with a display, a touch-sensitive surface, and one or more sensors to detect intensities of contacts with the touch-sensitive surface. The method includes: displaying, on the display, a messaging interface that includes a conversation transcript and a message input area, wherein the message input area includes an affordance for sending a message; while the message input area contains message content, detecting a first input by a contact at a location of the touch-sensitive surface that corresponds to the affordance for sending the message; determining a characteristic intensity of the contact in the first input; in response to detecting the first input: in accordance with a determination that the first input meets send criteria, wherein the send criteria do not require that a characteristic intensity of the contact meet a first intensity threshold in order for the send criteria to be met, initiating sending the message content to a remote device; and, in accordance with a determination that the contact meets message impact criteria, wherein the message impact criteria required that the characteristic intensity of the contact meet the first intensity threshold in order for the message impact criteria to be met, displaying a plurality of message impact effect options for changing an animation that is displayed when the message is received at the remote device; while displaying the plurality of message impact effect options, detecting a second input by a contact to send the message content with a selected message impact effect option of the plurality of impact effect options; and in response to detecting the second input, in accordance with a determination that the second input was received at a location on the touch-sensitive surface that corresponds to a first message impact effect option of the plurality of impact effect options, initiating sending, to the remote device, the message content with the first message impact effect option.

In accordance with some embodiments, a method is performed at an electronic device with a display, a touch-sensitive surface, and one or more sensors to detect intensities of contacts with the touch-sensitive surface. The method includes: displaying, on the display, a user interface that includes a plurality of activatable objects, including a first activatable object with a first visual appearance, wherein the device is configured to: for intensity-reactive activatable objects, perform operations corresponding to the intensity-reactive activatable objects based on characteristic intensities of inputs on the touch-sensitive surface that correspond to the intensity-reactive activatable objects, such that when a characteristic intensity of a contact that is providing input that corresponds to a respective intensity-reactive activatable object on the touch-sensitive surface meets intensity-based activation criteria, an operation corresponding to the respective intensity-reactive activatable object is performed as a result of the characteristic intensity of the contact meeting the intensity-based activation criteria; and for intensity-nonreactive activatable objects, perform operations corresponding to the intensity-nonreactive activatable objects without regard to whether inputs on the touch-sensitive surface that correspond to the intensity-nonreactive activatable objects meet the intensity-based activation criteria, such that when a characteristic intensity of a contact that is providing input that corresponds to a respective intensity-nonreactive activatable object on the touch-sensitive surface meets the intensity-based activation criteria, an operation corresponding to the respective intensity-nonreactive activatable object is not performed as a result of the characteristic intensity of the contact meeting the intensity-based activation criteria; while displaying the user interface on the display, detecting an input that corresponds to a request to select the first activatable object in the plurality of activatable objects, wherein a characteristic intensity of the input fails to meet the intensity-based activation criteria during the input; and in response to detecting the input: in accordance with a determination that the first activatable object is an intensity-reactive activatable object, displaying the first activatable object with a first transformation from its first visual appearance; and, in accordance with a determination that the first activatable object is an intensity-nonreactive activatable object, displaying the first activatable object without displaying the first transformation.

In accordance with some embodiments, a method is performed at an electronic device with a display, a touch-sensitive surface, and one or more sensors to detect intensities of contacts with the touch-sensitive surface: while displaying a user interface, detecting an input by a contact at a first location on the touch-sensitive surface that corresponds to a first activatable user interface object on the display; and, in response to detecting the input by the contact: in accordance with a determination that the first activatable user interface object is intensity-reactive, changing a visual appearance of the first activatable user interface object in accordance with changes in a detected intensity of the contact on the touch-sensitive surface; and, in accordance with a determination that the first activatable user interface object is intensity-nonreactive, changing the visual appearance of the first activatable user interface object by a predetermined amount.

In accordance with some embodiments, a method is performed at an electronic device with a display, a touch-sensitive surface, and one or more sensors to detect intensities of contacts with the touch-sensitive surface. The method includes: displaying a user interface that includes a plurality of activatable user interface objects; while displaying the user interface, detecting a first portion of an input by a contact at a first location on the touch-sensitive surface that corresponds to a first user interface object on the display; in response to detecting the first portion of the input: changing a visual appearance of the first user interface object by applying a first visual transformation to the first user interface object, wherein the first visual transformation corresponds to a first user interface operation; after changing the visual appearance of the first user interface object by applying the first visual transformation to the first user interface object, detecting a second portion of the input; and in response to detecting the second portion of the input: in accordance with a determination that the second portion of the input is consistent with the first user interface operation, performing the first user interface operation; and in accordance with a determination that the second portion of the input includes a gradual change in a first parameter that is indicative of performance of a second user interface operation, dynamically reducing the first visual transformation as the first parameter gradually changes without performing the first user interface operation.

In accordance with some embodiments, a method is performed at an electronic device with a display, a touch-sensitive surface, and one or more sensors to detect intensities of contacts with the touch-sensitive surface. The method includes: displaying a user interface that includes a plurality of activatable user interface objects; while displaying the user interface, detecting a first portion of an input by a contact at a first location on the touch-sensitive surface that corresponds to a first user interface object on the display; in response to detecting the first portion of the input by the contact: changing a visual appearance of the first user interface object to indicate that an operation corresponding to the first user interface object will be performed in response to detecting liftoff of the contact from the touch-sensitive surface, wherein the change in the visual appearance includes applying a first transformation to the first user interface object; detecting a second portion of the input by the contact, wherein the second portion of the input immediately follows the first portion of the input; and, in response to detecting the second portion of the input by the contact: in accordance with a determination that the second portion of the input includes a gradual change in a first input parameter and corresponds to a first gesture, changing the visual appearance of the first user interface object by dynamically reducing the first transformation and applying a second transformation corresponding to the first gesture as the first input parameter gradually changes; and, in accordance with a determination that the second portion of the input includes a gradual change in a second input parameter and corresponds to a second gesture, changing the visual appearance of the first user interface object by dynamically reducing the first transformation and applying a third transformation corresponding to the second gesture as the second input parameter gradually changes.

In accordance with some embodiments, a method is performed at an electronic device with a display, a touch-sensitive surface, and one or more sensors to detect intensities of contacts with the touch-sensitive surface. The method includes: displaying a first user interface that includes a plurality of activatable user interface objects; while displaying the first user interface, detecting an input by a contact at a first location on the touch-sensitive surface that corresponds to a first activatable user interface object on the display, wherein: the first activatable user interface object is associated with a control function with three or more available values; and a first value of the control function is selected as a current value for the control function; in response to detecting the input by the contact: in accordance with a determination that the input meets toggle criteria, wherein the toggle criteria do not require that a characteristic intensity of the contact on the touch-sensitive surface meets a first intensity threshold in order for the toggle criteria to be met, toggling the control function that corresponds to the first activatable user interface object between a first state that is based on the current value for the control function and a second state; and, in accordance with a determination that the input meets control adjustment criteria, wherein the control adjustment criteria require that the characteristic intensity of the contact on the touch-sensitive surface meets the first intensity threshold in order for the control adjustment criteria to be met, displaying a second user interface that includes a second activatable user interface object that has three or more state options that correspond to the three or more available values for the control function; and while displaying the second user interface and continuing to detect the contact: detecting movement of the contact across the touch-sensitive surface; ceasing to detect the contact; and, in response to detecting the movement of the contact across the touch-sensitive surface, changing the current value for the control function based on the movement of the contact.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for providing access to content and functions of applications without first launching the application, thereby increasing the effectiveness, efficiency, and user satisfaction with such devices. Such methods and interfaces may complement or replace conventional methods for accessing content and functions of an application.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5I9 illustrate example user interfaces for interacting with a notification associated with a respective application (e.g., to access a subset of functions and/or content of the respective application from the notification without having to first activate the respective application), in accordance with some embodiments.

FIGS. 5J1-5P2 illustrate example user interfaces for displaying a contextual content object (e.g., a mini application object) associated with a respective application (e.g., to provide access to a subset of functions and content of the respective application without having to first activate the respective application), in accordance with some embodiments.

FIGS. 5Q1-5S5 illustrate user interfaces for interacting with a menu of applications that includes an application that is in the process of being downloaded (e.g., providing a menu of options to quickly invoke one of several download-related quick actions with respect to the application that is in the process of being downloaded), in accordance with some embodiments.

FIGS. 5T1-5T15 illustrate user interfaces for interacting with a menu of applications that include a folder of applications (e.g., selectively providing a menu for quickly launching a respective application with unread notifications from the folder containing multiple applications without having to first open the folder), in accordance with some embodiments.

FIGS. 5U1-5W5 illustrate user interfaces for quickly entering a rename and icon reconfiguration mode for an application folder (e.g., without having to first open the folder), in accordance with some embodiments.

FIGS. 9A1-9A25 illustrate exemplary user interfaces for displaying intensity-reactive and intensity-nonreactive user interface objects, in accordance with some embodiments.

FIGS. 9B1-9B10 illustrate exemplary user interfaces for displaying intensity-reactive and intensity-nonreactive user interface objects, in accordance with some embodiments.

FIGS. 9C1-9C19 illustrate exemplary user interfaces for displaying control settings interfaces for control functions for remote devices, in accordance with some embodiments.

FIGS. 10A-10D are flow diagrams illustrating a method for interacting with a notification associated with a respective application (e.g., launching an application from a notification associated with the notification or displaying an expanded version of the notification based on detected user input) in accordance with some embodiments.

FIGS. 12A-12F are flow diagrams illustrating a method for interacting with an application launching icon (e.g., launching an application or displaying a contextual content object associated with the application based on detected user input) in accordance with some embodiments.

FIGS. 14A-14C are flow diagrams illustrating a method for interacting with a menu of applications including an application that is in the process of being downloaded (e.g., presenting menu options with respect to downloading the application based on detected user input) in accordance with some embodiments.

FIG. 15 is a functional block diagram of an electronic device for interacting with a menu of applications including an application that is in the process of being downloaded (e.g., presenting menu options with respect to downloading the application based on detected user input), in accordance with some embodiments.

FIGS. 16A-16C are flow diagrams illustrating a method for interacting with a menu of applications that include a folder of applications (e.g., selectively presenting application launching options for respective applications within a folder (e.g., applications with unread notifications) based on detected user input), in accordance with some embodiments.

FIGS. 18A-18D are flow diagrams illustrating a method of modifying the functionality of a control affordance in accordance with some embodiments.

FIG. 19 is a functional block diagram of an electronic device for modifying the functionality of a control affordance in accordance with some embodiments.

FIGS. 20A-20G are flow diagrams illustrating a method of deleting content in accordance with some embodiments.

FIGS. 22A-22G are flow diagrams illustrating a method of detecting input at a messaging interface in accordance with some embodiments.

FIGS. 24A1-24A3 are flow diagrams illustrating a method of displaying intensity-reactive and intensity-non-reactive user interface objects in accordance with some embodiments.

FIGS. 24B1-24B3 are flow diagrams illustrating a method of displaying intensity-reactive and intensity-nonreactive user interface objects in accordance with some embodiments.

FIG. 25 is a functional block diagram of an electronic device in accordance with some embodiments.

FIGS. 27A1-27A5 are flow diagrams illustrating a method of displaying intensity-reactive and intensity-non-reactive user interface objects in accordance with some embodiments.

FIGS. 27B1-27B3 are flow diagrams illustrating a method of displaying intensity-reactive and intensity-nonreactive user interface objects in accordance with some embodiments.

FIGS. 30A-30E are flow diagrams illustrating a method of displaying control settings interfaces for control functions for remote devices in accordance with some embodiments.

DESCRIPTION OF EMBODIMENTS

Figure 1A:
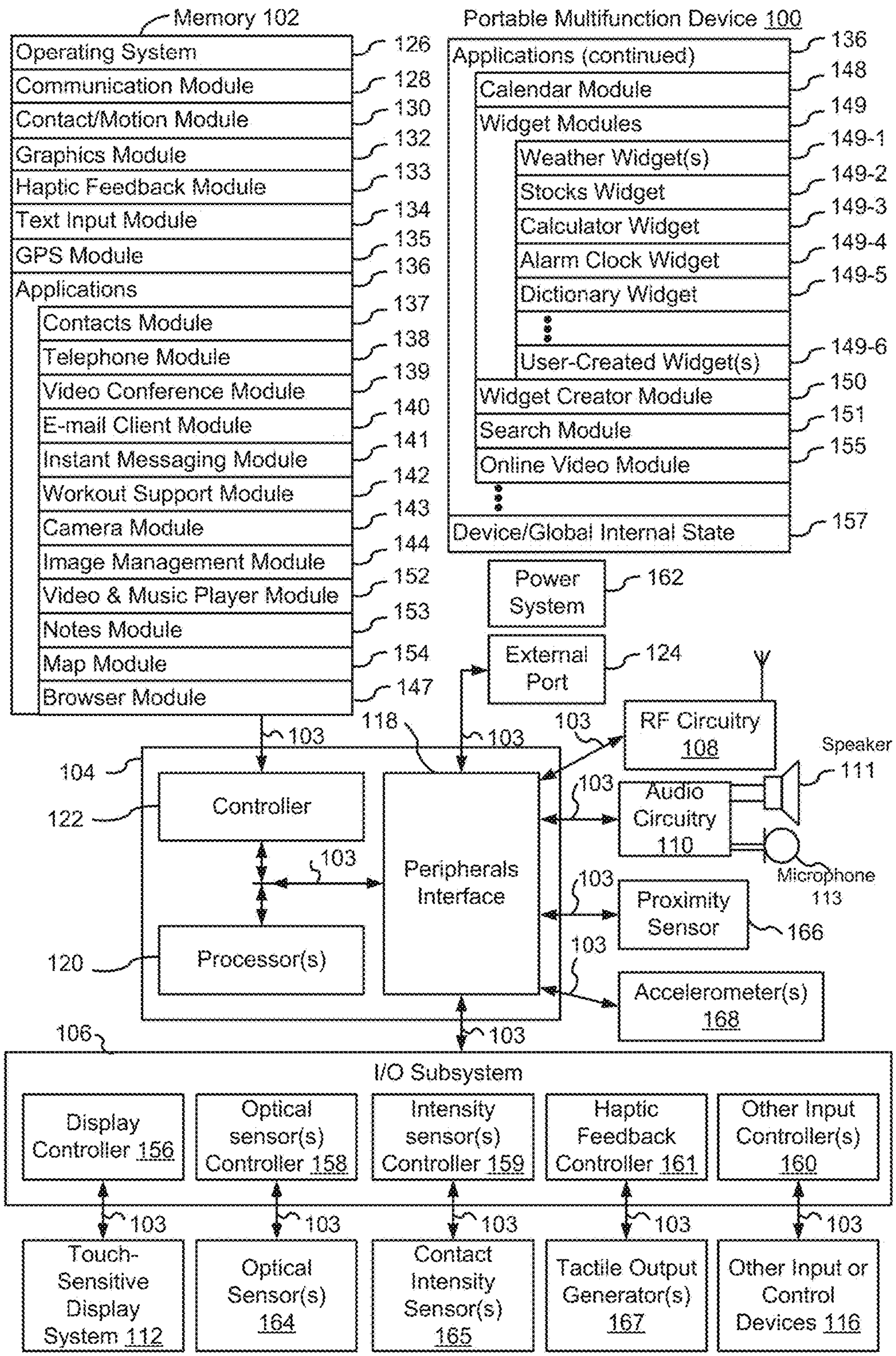
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user.

In some embodiments, in a system where a trackpad or touch-screen display is sensitive to a range of contact intensity that includes more than one or two specific intensity values (e.g., more than a simple on/off, binary intensity determination), the user interface provides responses (e.g., visual and/or tactile cues) that are indicative of the intensity of the contact within the range. This provides a user with a continuous response to the force or pressure of a user's contact, which provides a user with visual and/or haptic feedback that is richer and more intuitive. For example, such continuous force responses give the user the experience of being able to press lightly to preview an operation and/or press deeply to push to a predefined user interface state corresponding to the operation.

In some embodiments, for a device with a touch-sensitive surface that is sensitive to a range of contact intensity, multiple contact intensity thresholds are monitored by the device and different responses are mapped to different contact intensity thresholds.

In some embodiments, for a device with a touch-sensitive surface that is sensitive to a range of contact intensity, the device provides additional functionality by allowing users to perform complex operations with a single continuous contact.

In some embodiments, for a device with a touch-sensitive surface that is sensitive to a range of contact intensity, the device provides additional functionality that complements conventional functionality. For example, additional functions provided by intensity-based inputs (e.g., user interface previews and/or navigation shortcuts provided by light-press and/or deep-press gestures) are seamlessly integrated with conventional functions provided by conventional tap and swipe gestures. A user can continue to use conventional gestures to perform conventional functions (e.g., tapping on an application icon on a home screen to launch the corresponding application), without accidentally activating the additional functions. Yet it is also simple for a user to discover, understand, and use the intensity-based inputs and their added functionality (e.g., pressing on a notification, a contextual content object, a mini application object, a folder icon, a downloading icon, and/or an application icon on a background user interface (e.g., the notification center user interface, the home screen, the widget view, etc.), allows a user to access a subset of content, functionalities, menu options from a corresponding application without having to first launch the corresponding application, and without having to leave the current context (e.g., another application, and/or the background user interface).

A number of different approaches for manipulating user interfaces are described herein. Using one or more of these approaches (optionally in conjunction with each other) helps to provide a user interface that intuitively provides users with additional information and functionality. Using one or more of these approaches (optionally in conjunction with each other) reduces the number, extent, and/or nature of the inputs from a user and provides a more efficient human-machine interface. This enables users to use devices that have touch-sensitive surfaces faster and more efficiently. For battery-operated devices, these improvements conserve power and increase the time between battery charges.

Figure 2:
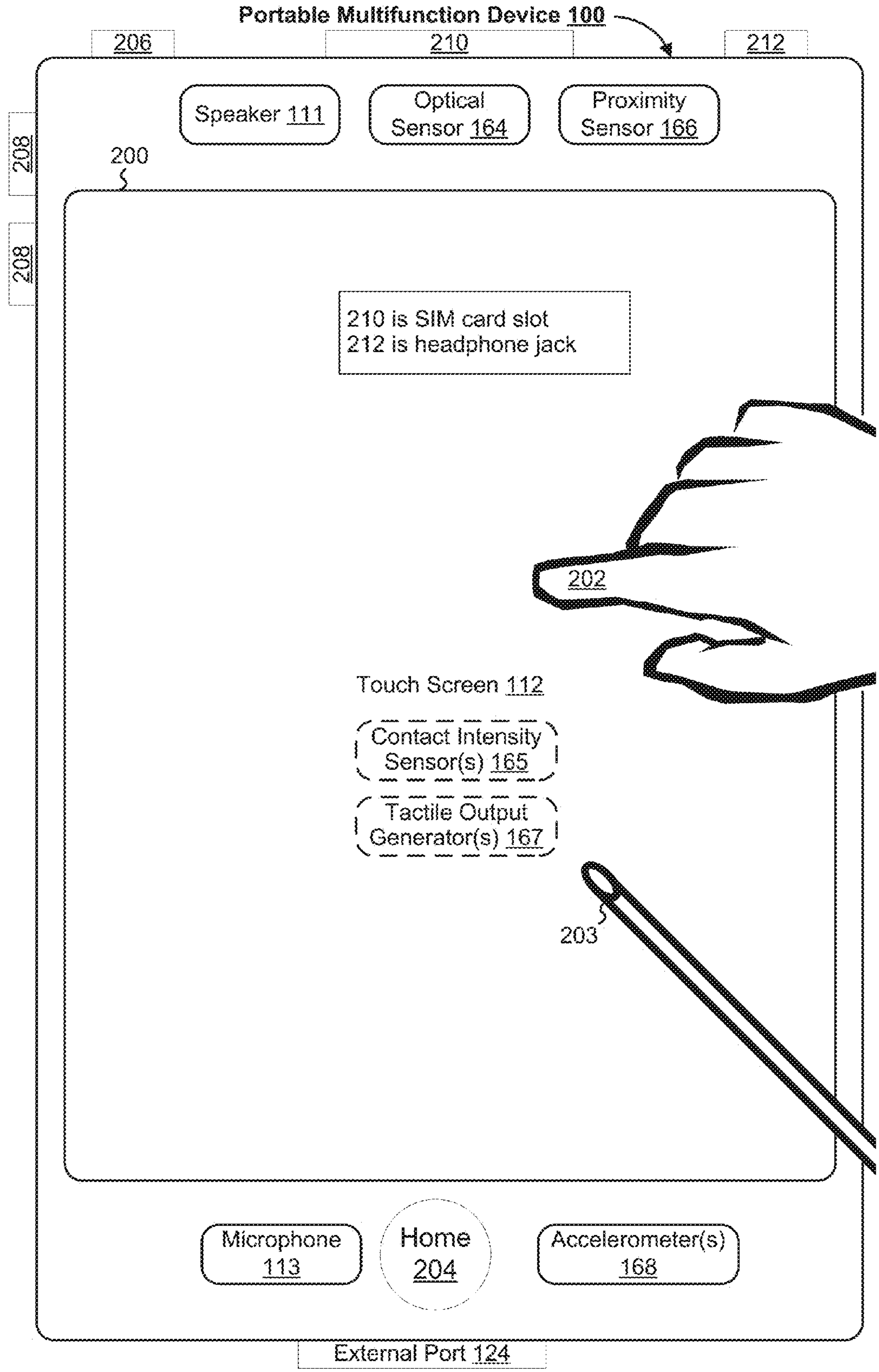
FIG. 2 illustrates a portable multifunction device having a touch screen in accordance with some embodiments.
Figure 3:
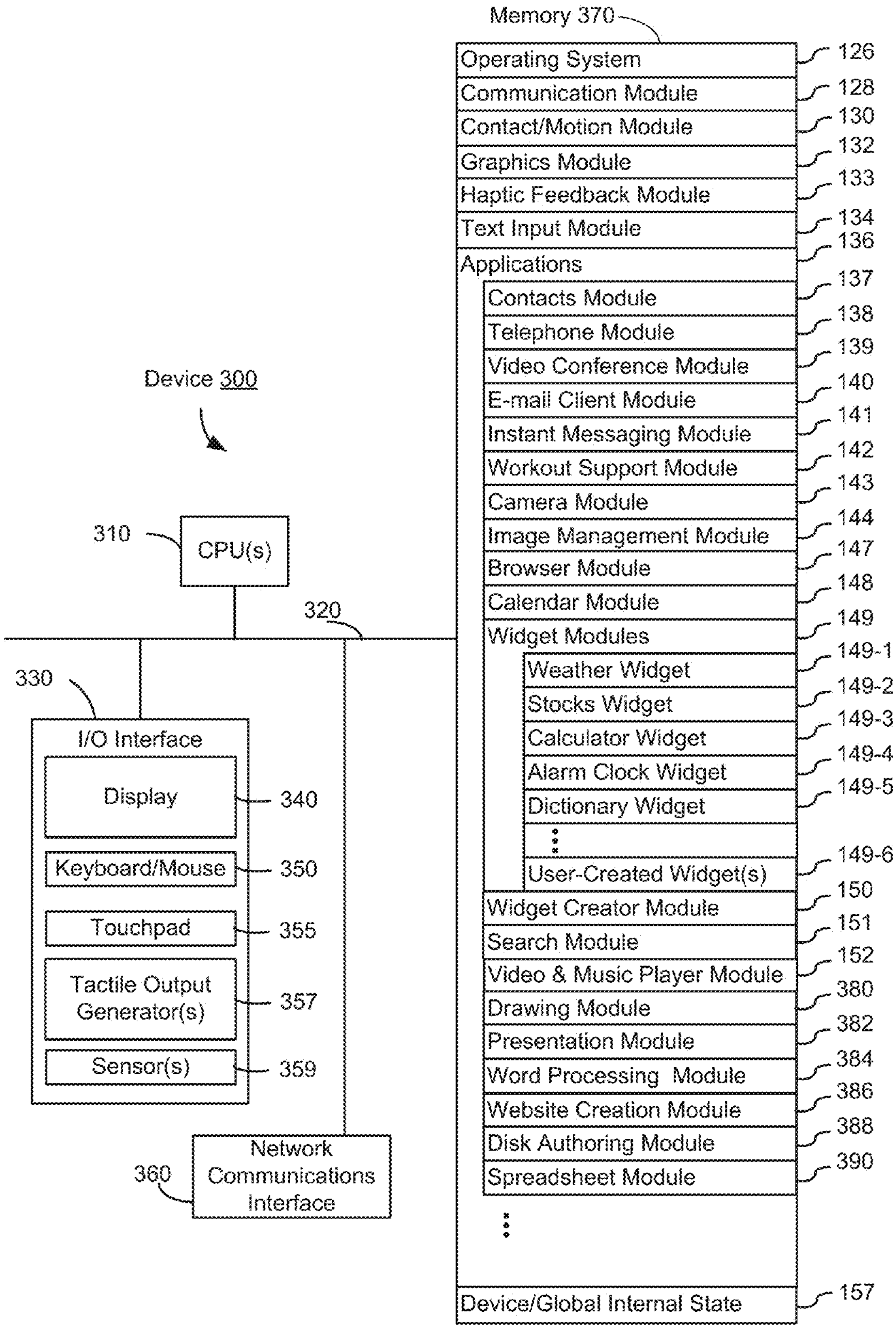
FIG. 3 is a block diagram of an example multifunction device with a display and a touch-sensitive surface in accordance with some embodiments.
Figure 4A:
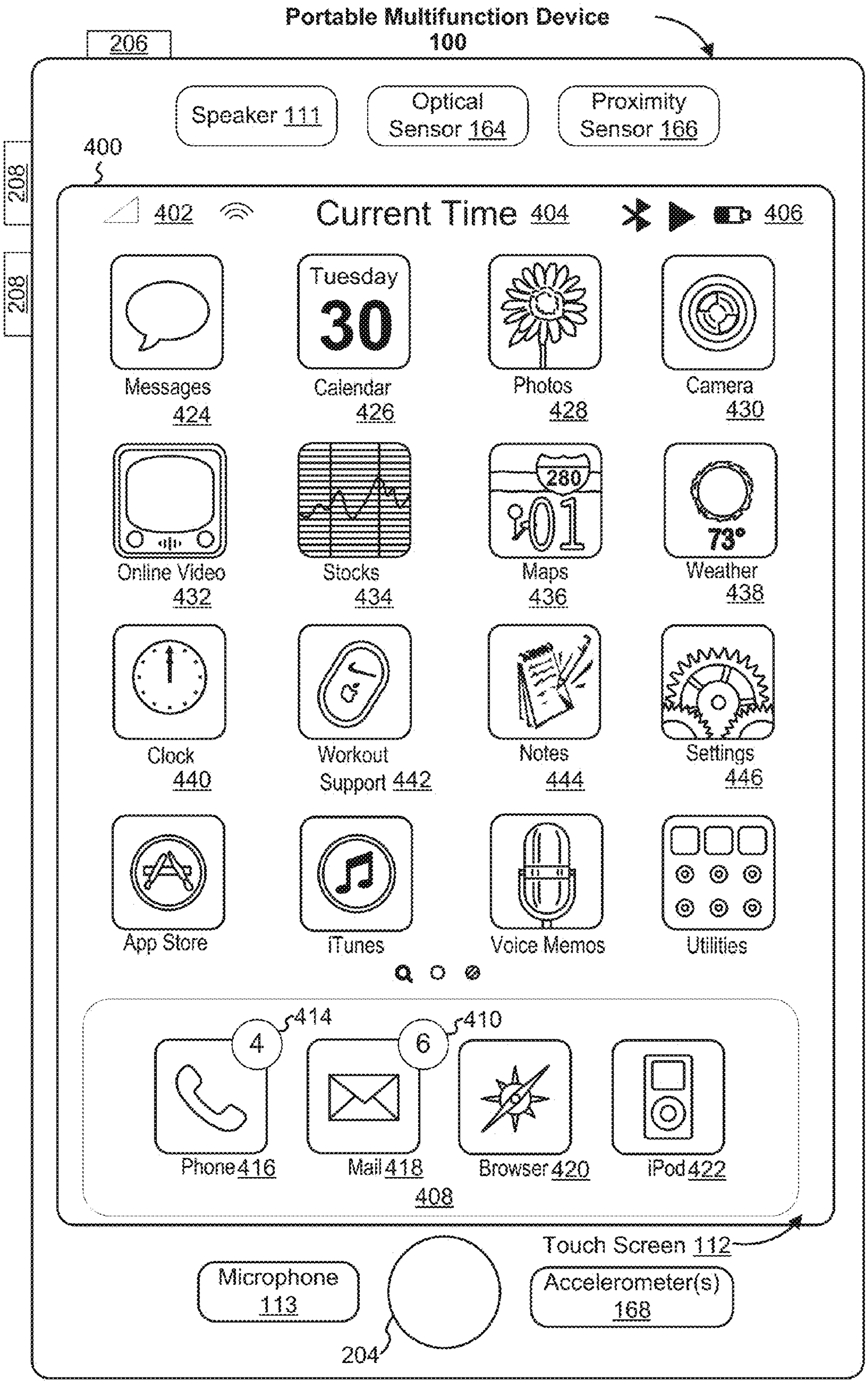
FIG. 4A illustrates an example user interface for a menu of applications on a portable multifunction device in accordance with some embodiments.
Figure 4B:
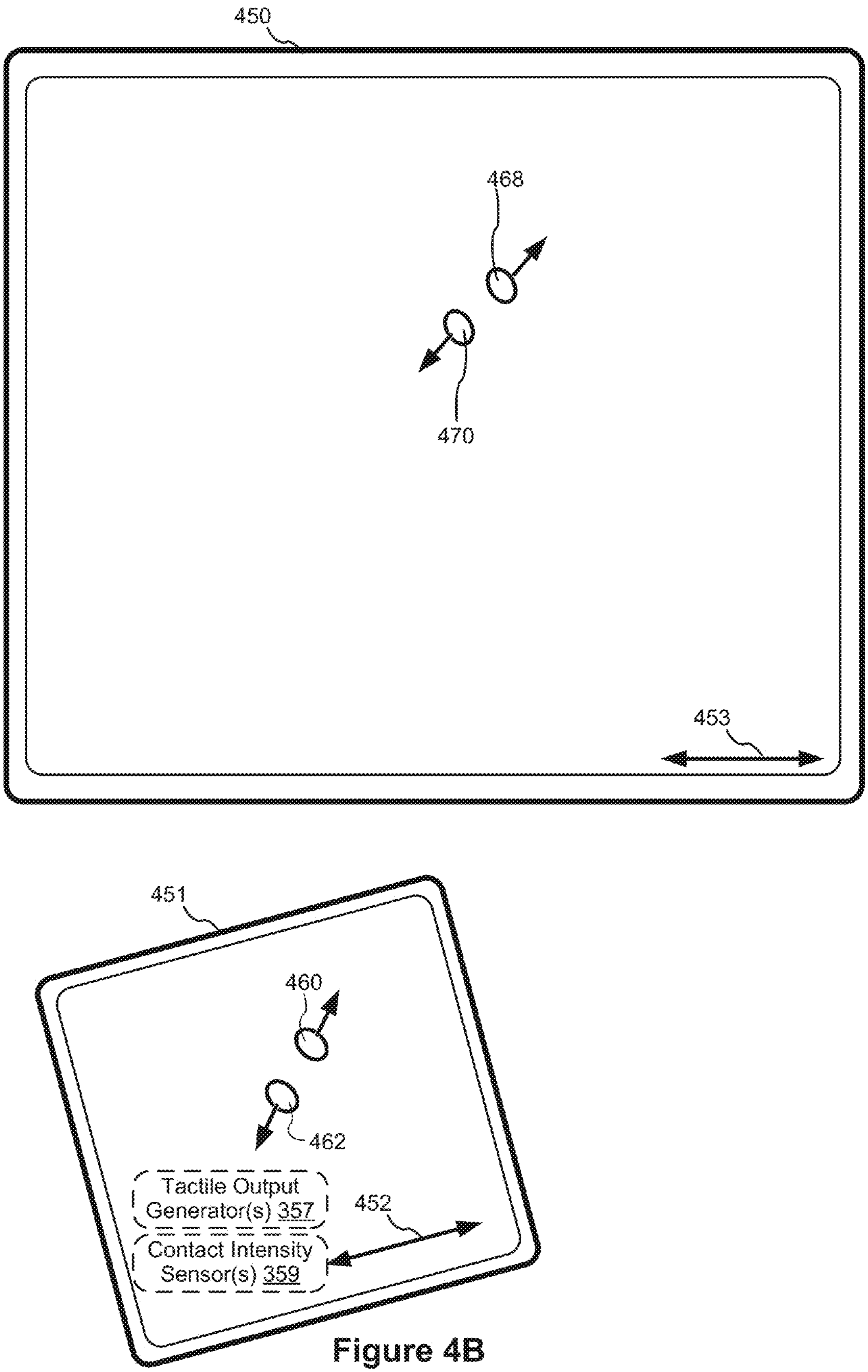
FIG. 4B illustrates an example user interface for a multifunction device with a touch-sensitive surface that is separate from the display in accordance with some embodiments.
Figure 4C:
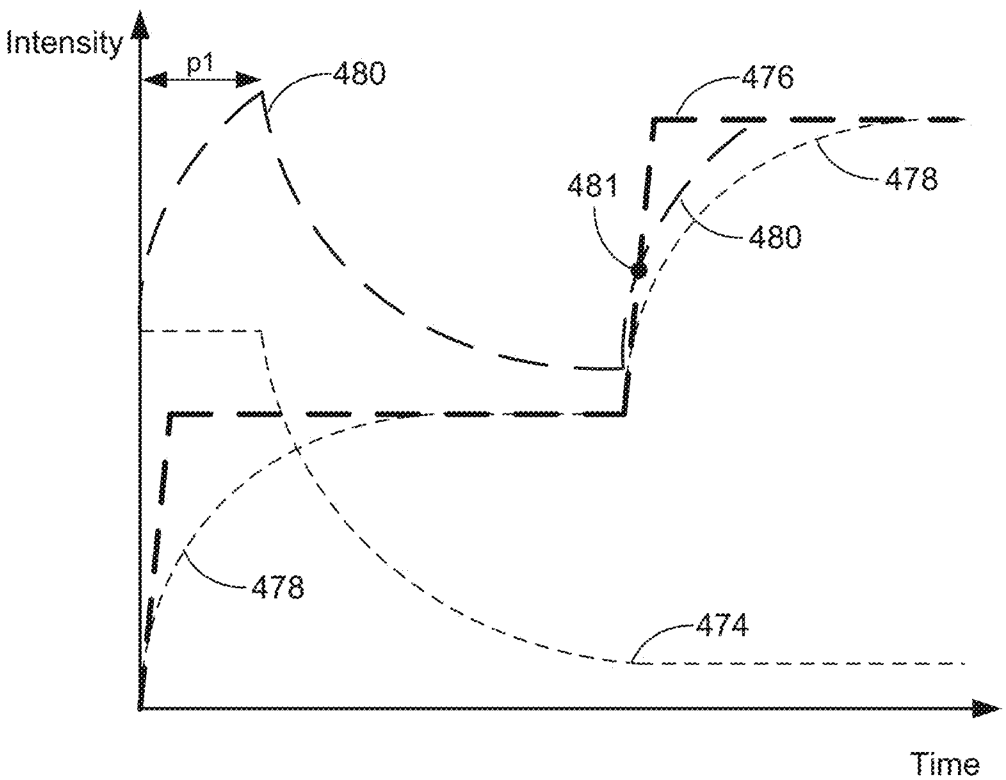
FIGS. 4C-4E illustrate examples of dynamic intensity thresholds in accordance with some embodiments.
Figure 4D:
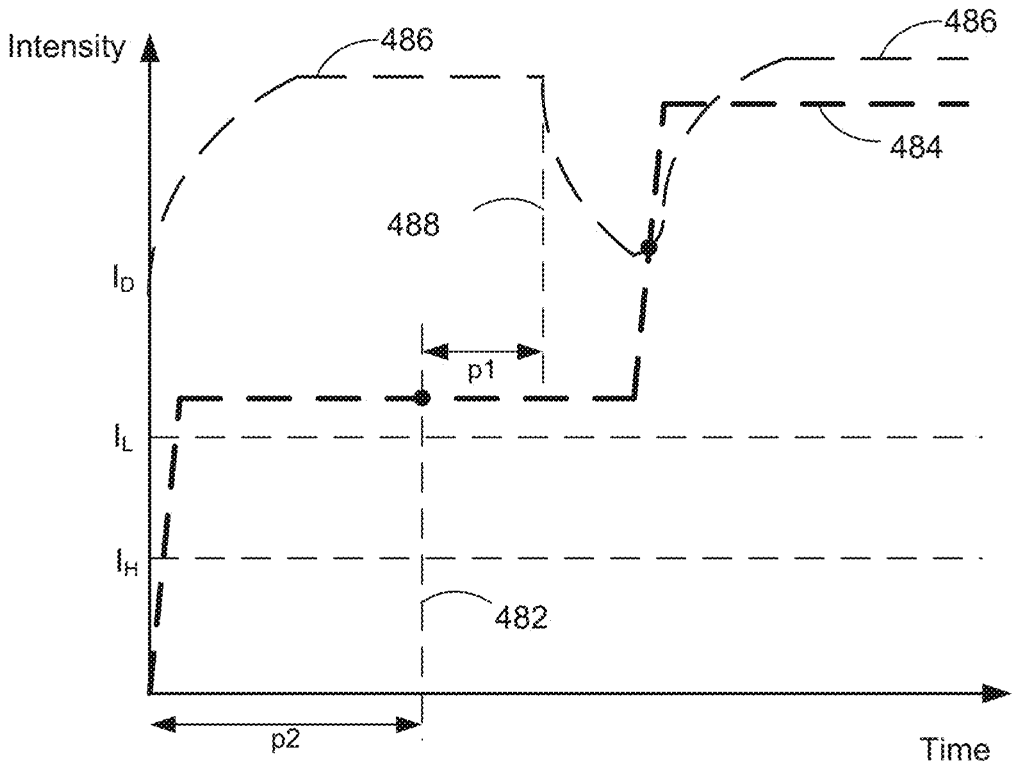
Figure 4E:
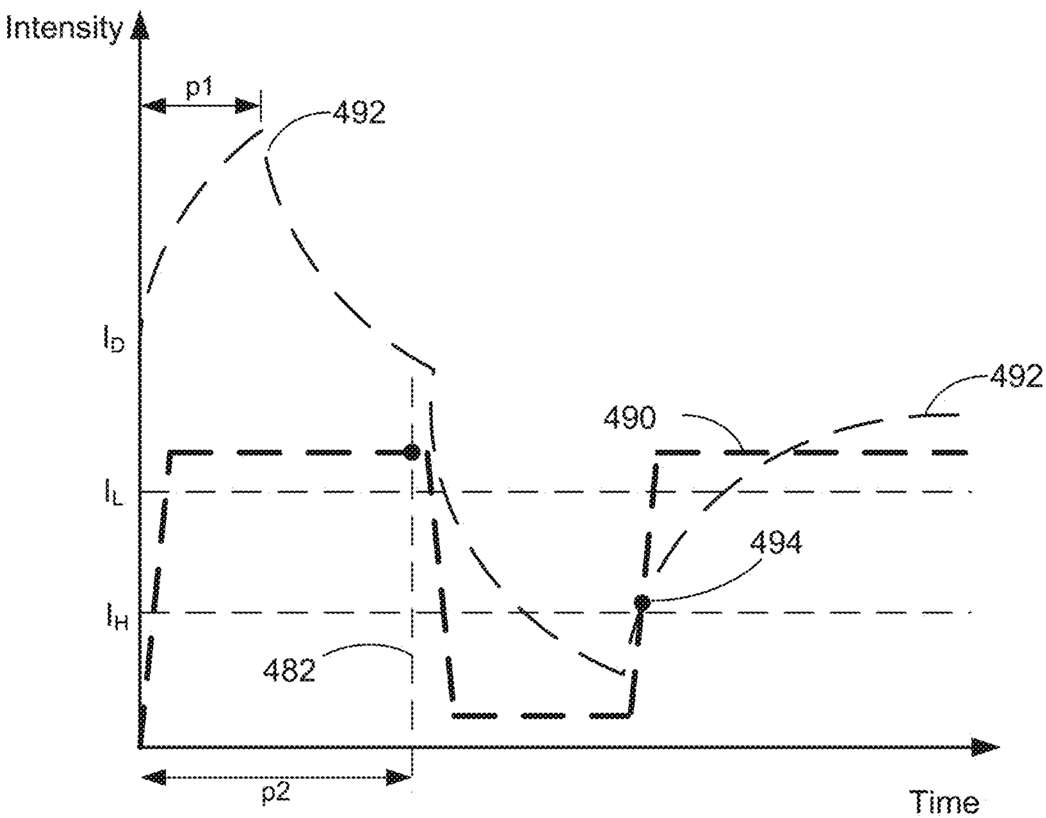

Below, FIGS. 1A-1B, 2, and 3 provide a description of example devices. FIGS. 4A-4B provide a description of example user interfaces on portable multifunction device 100 in accordance with some embodiments. FIGS. 4C-4E illustrate examples of dynamic intensity thresholds in accordance with some embodiments.

FIGS. 5A1-5I9 illustrate example user interfaces for interacting with a notification associated with a respective application (e.g., to access a subset of functions and content of the respective application from the notifications without having to first activate the respective application), in accordance with some embodiments.

FIGS. 5J1-5P2 illustrate example user interfaces for displaying a contextual content object (e.g., a mini application object) associated with a respective application (e.g., to access a subset of functions and content of the respective application from the contextual content object without having to first activate the respective application), in accordance with some embodiments.

FIGS. 5Q1-5S5 illustrate user interfaces for interacting with a menu of applications that include an application that is in the process of being downloaded (e.g., providing a menu of options to quickly invoke one of several download-related quick actions with respect to the application that is in the process of being downloaded), in accordance with some embodiments.

Figure 7A:
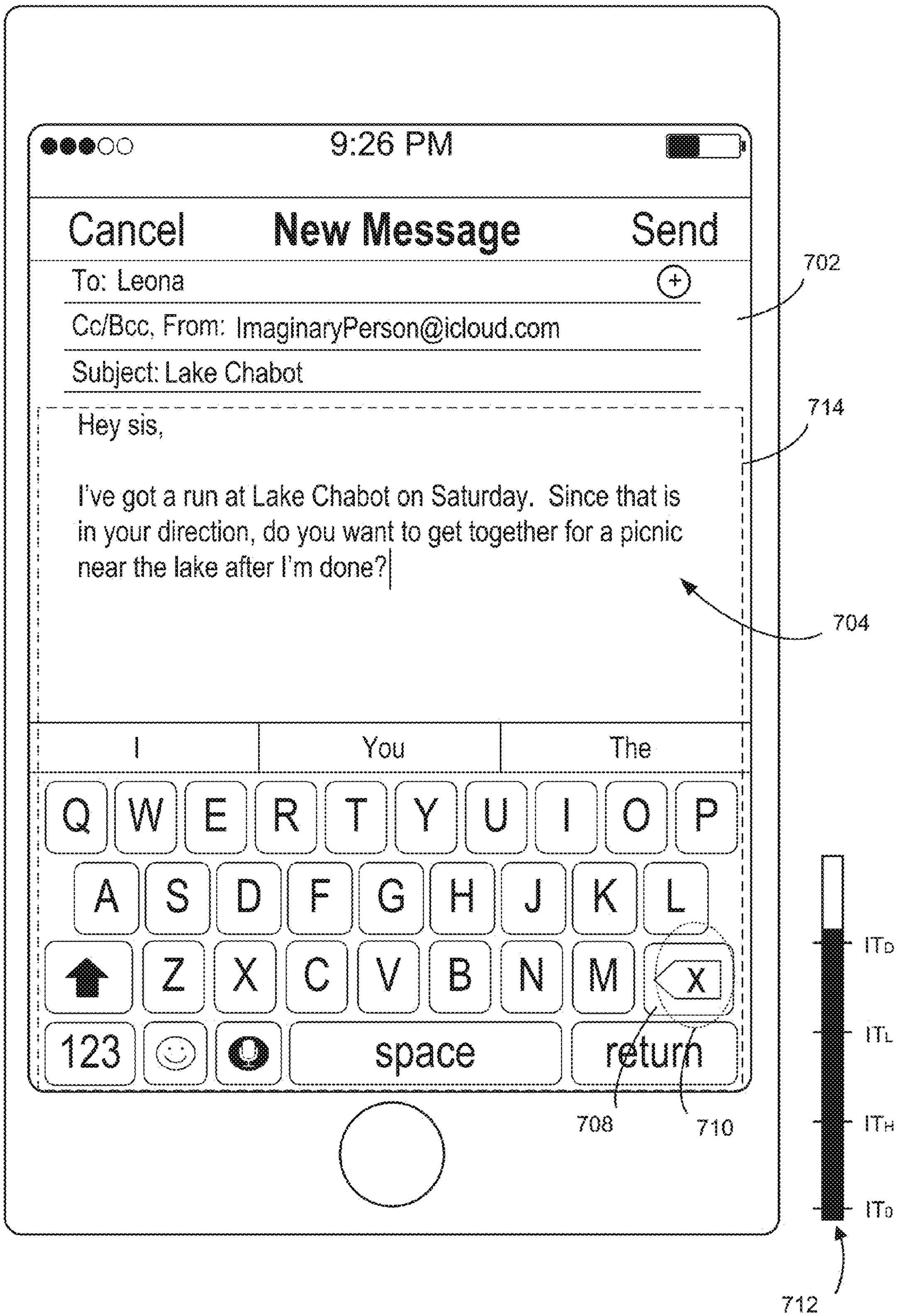
FIGS. 7A-7W illustrate exemplary user interfaces for deleting content in accordance with some embodiments.
Figure 7B:
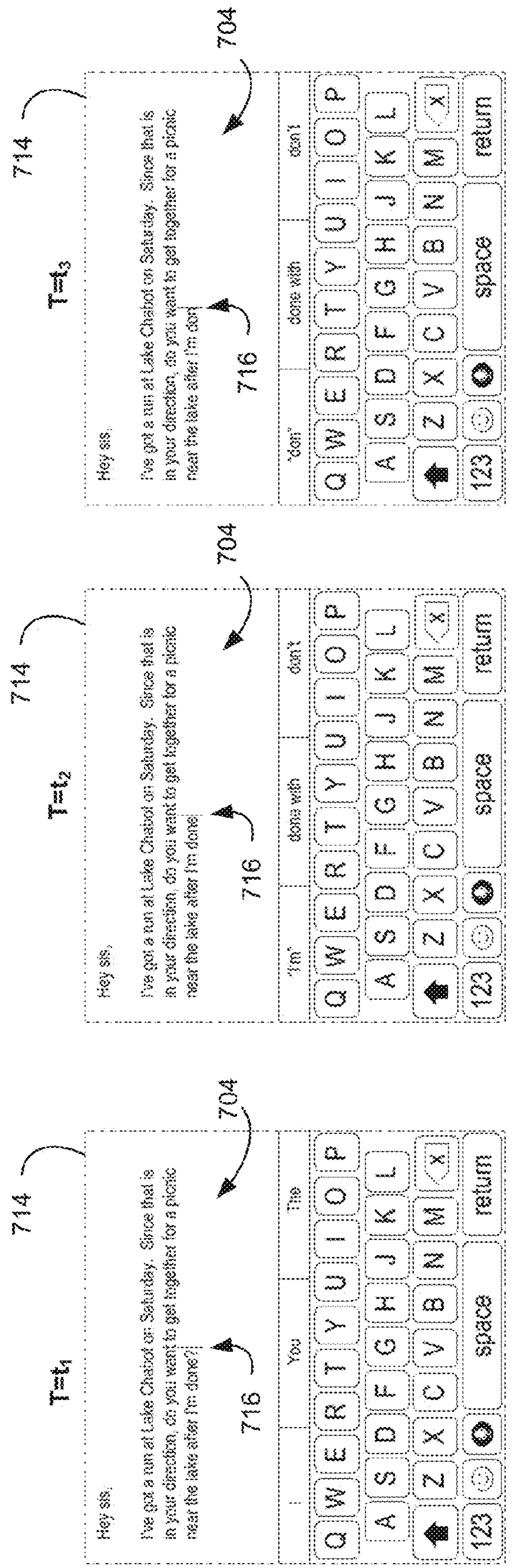
Figure 7C:
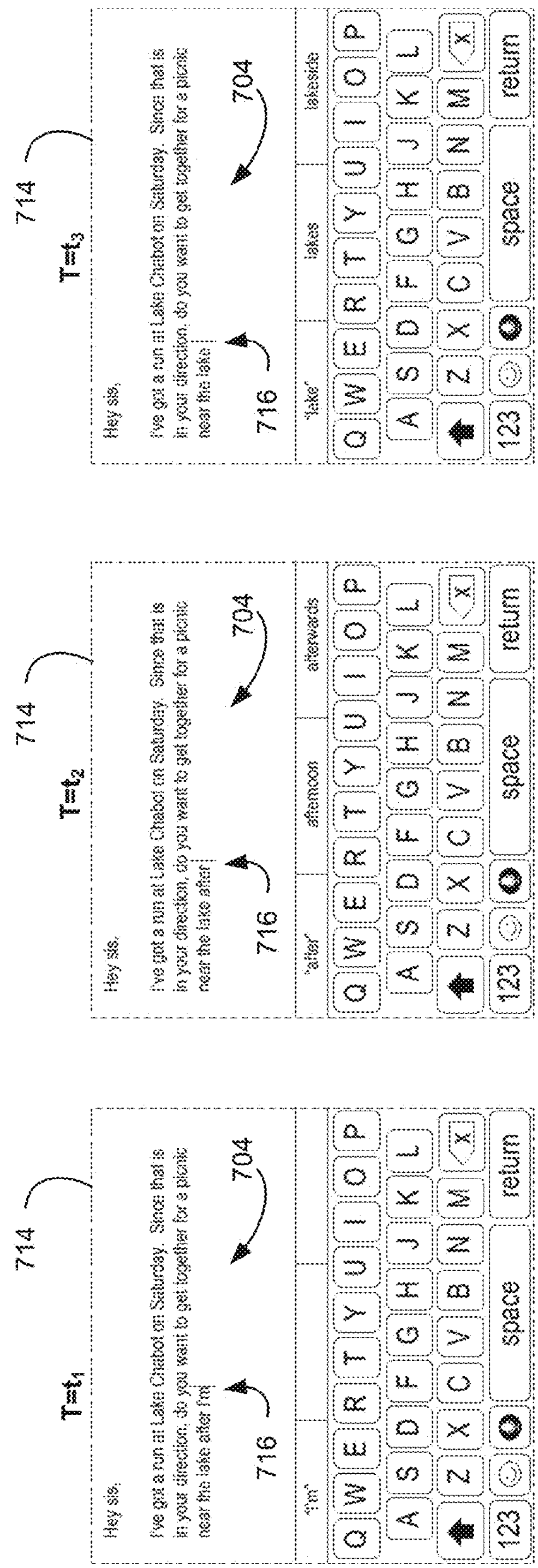
Figure 7D:
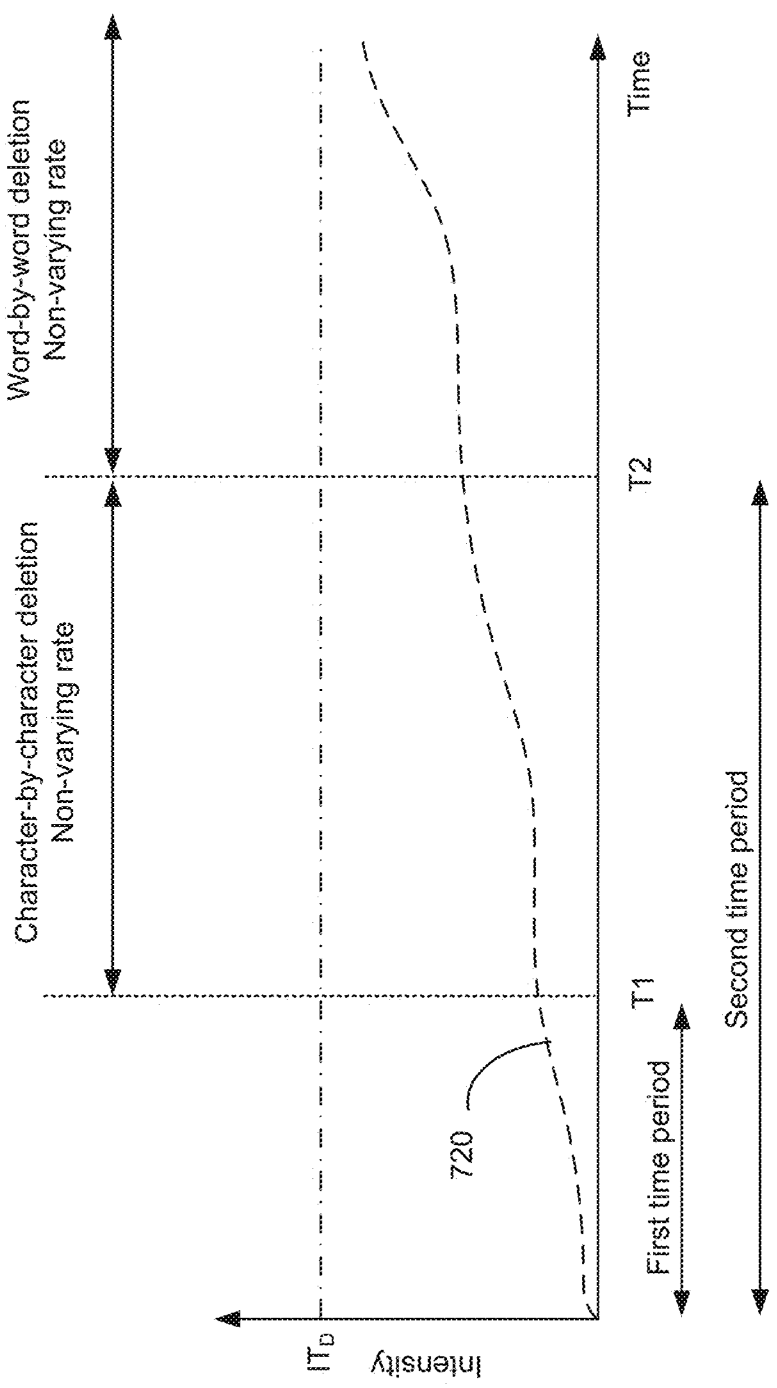
Figure 7E:
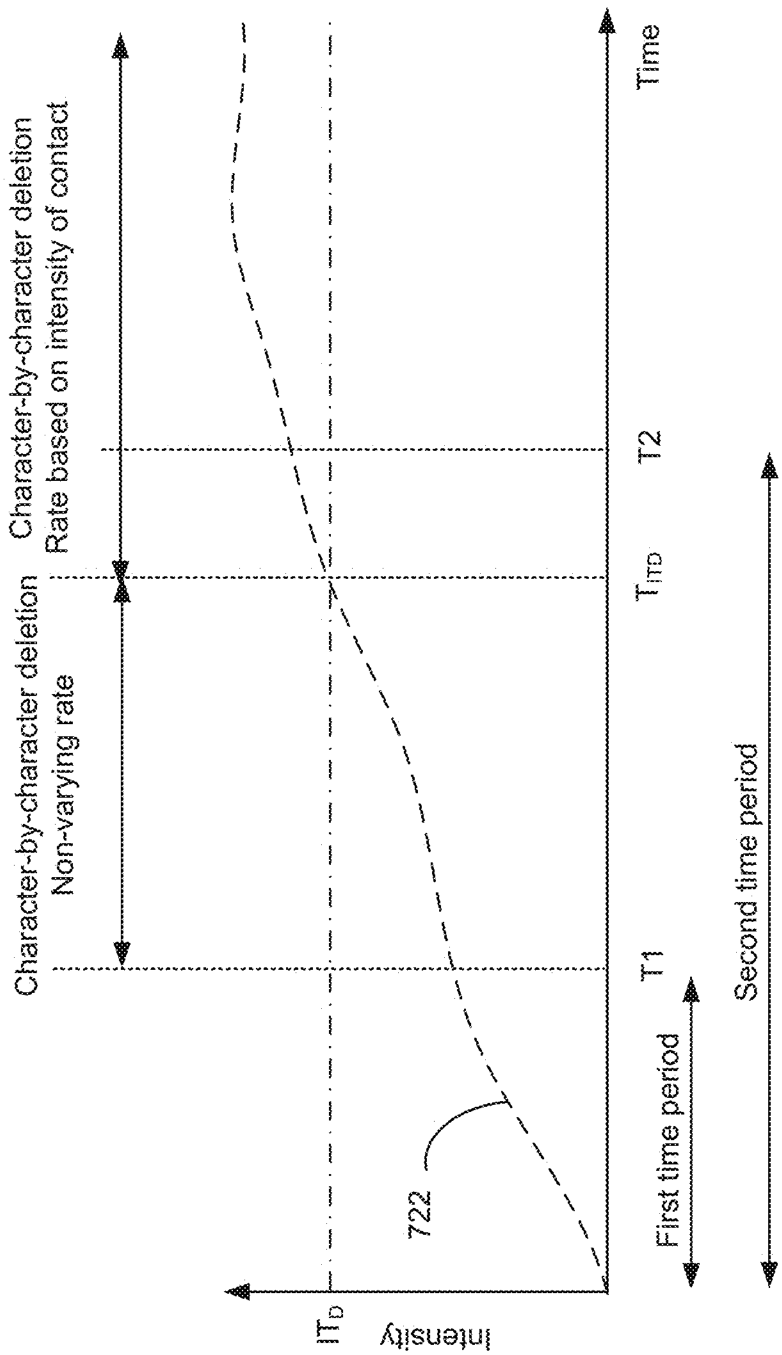
Figure 7F:
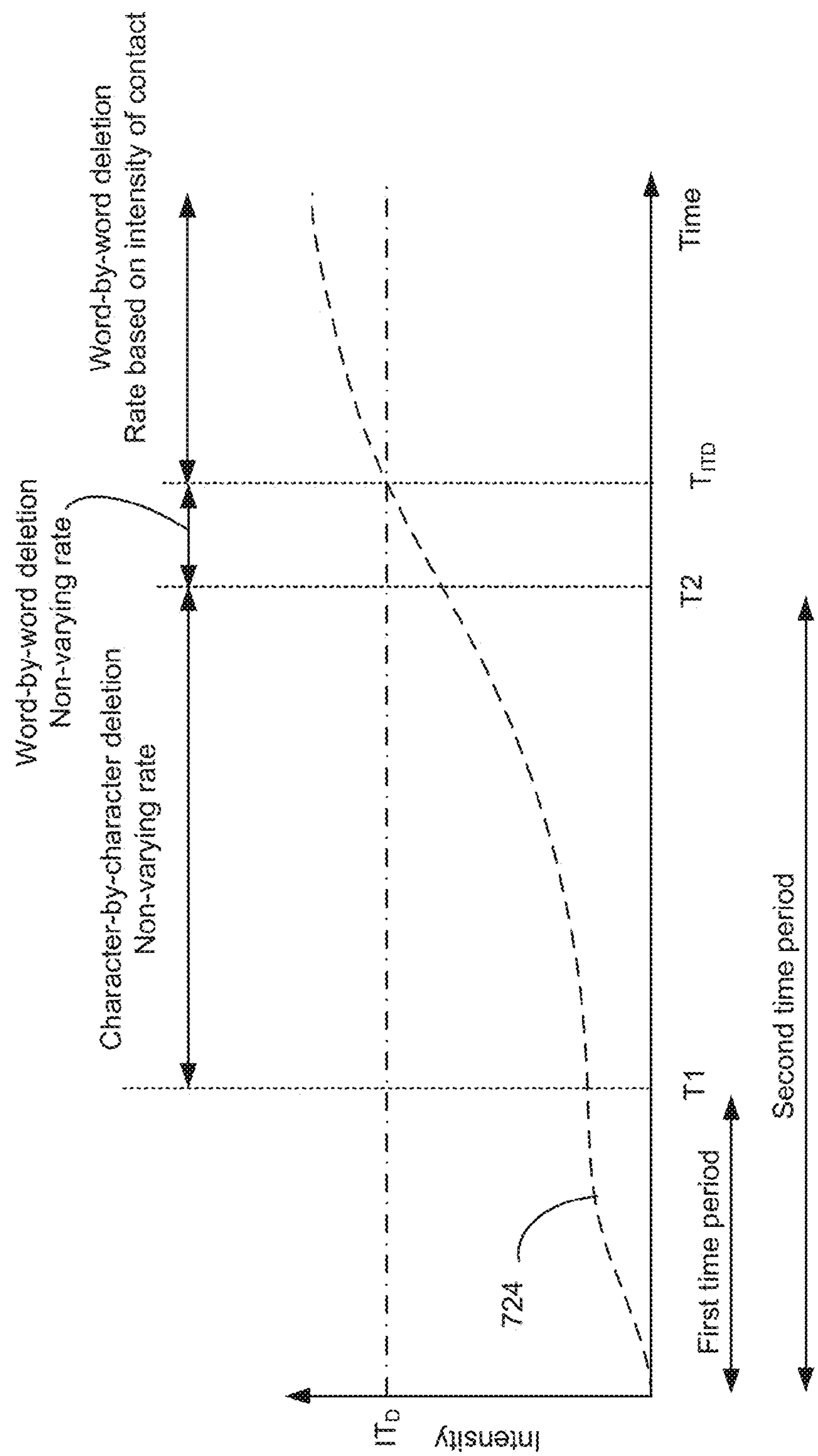
Figure 7G:
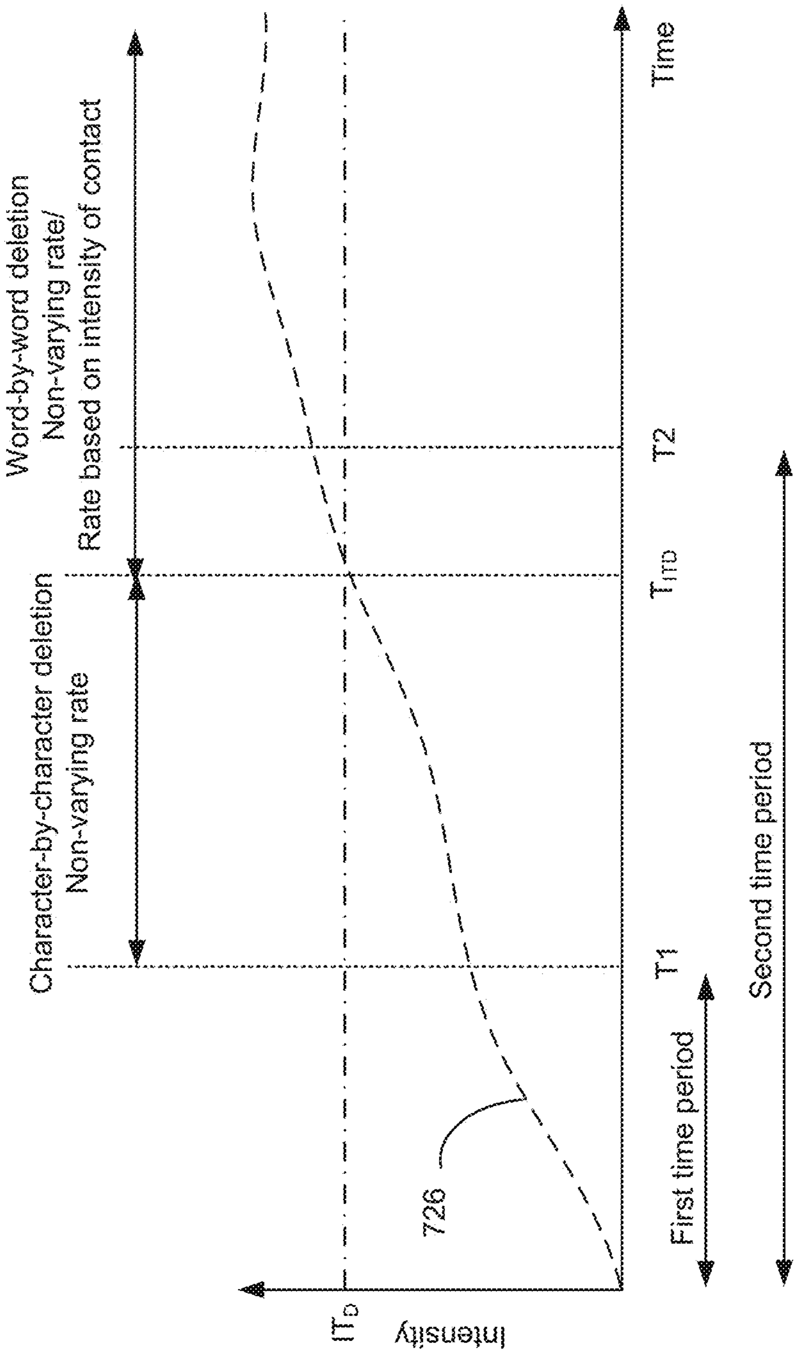
Figure 7H:
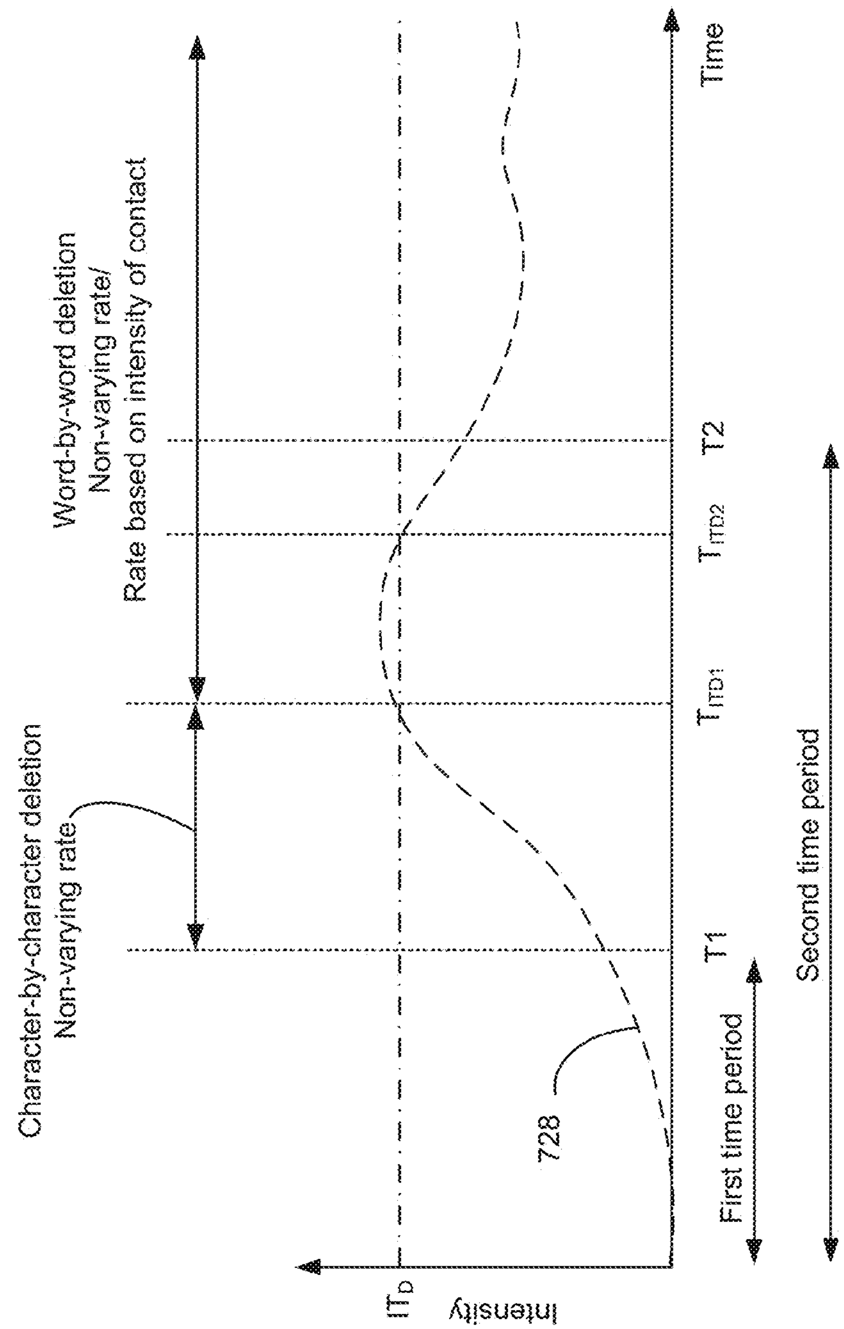
Figure 7I:
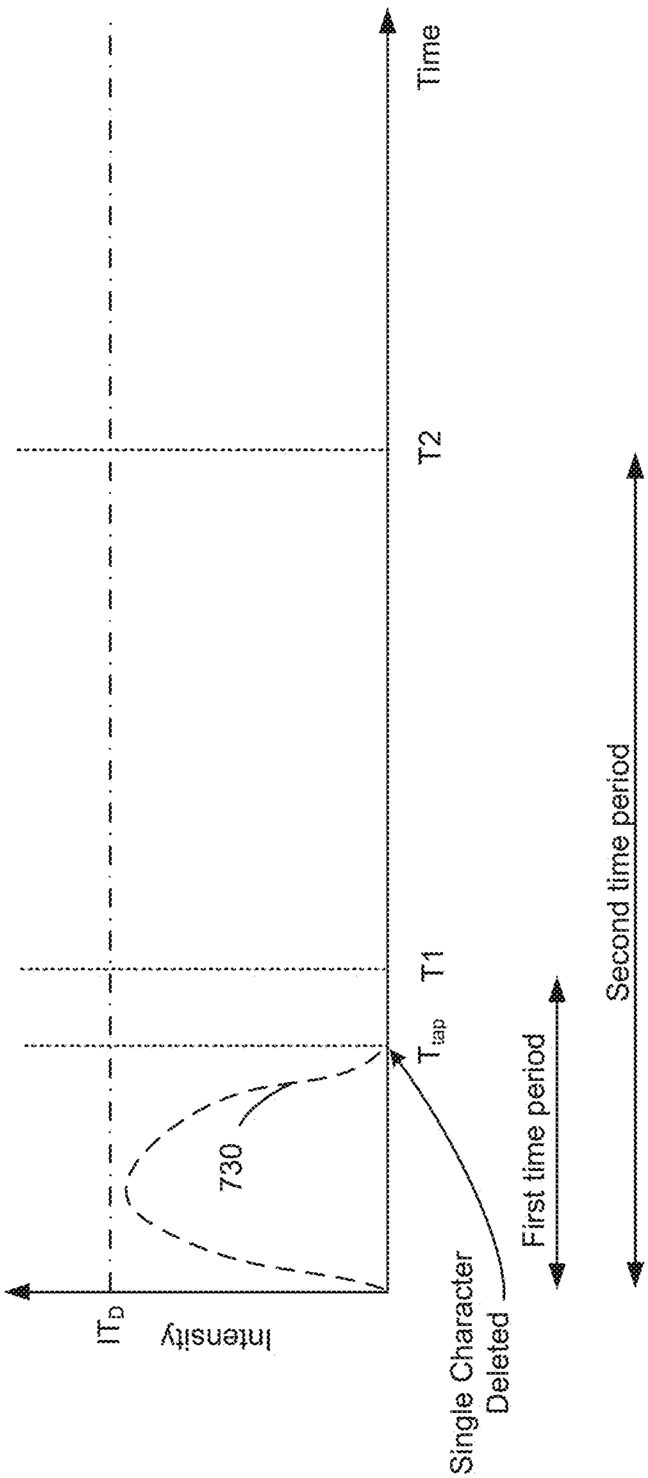
Figure 7J:
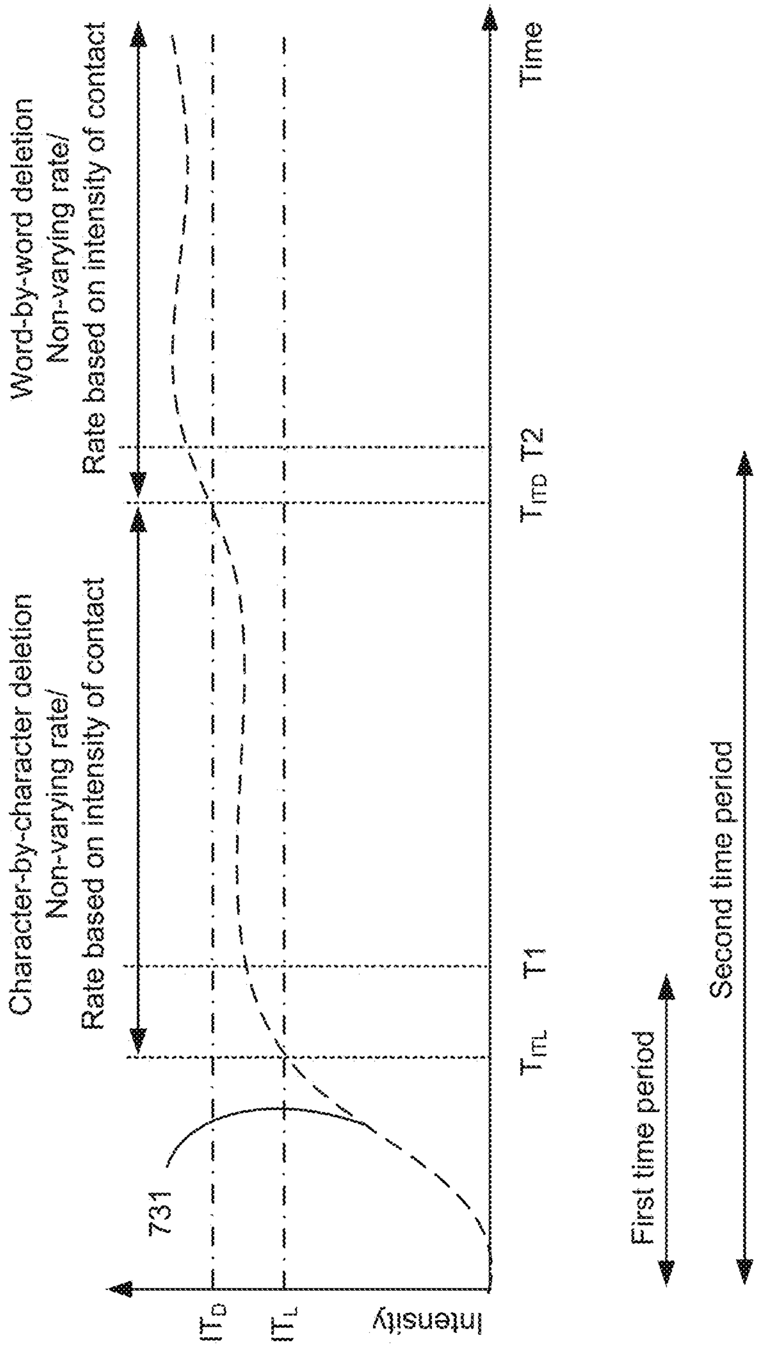
Figure 7K:
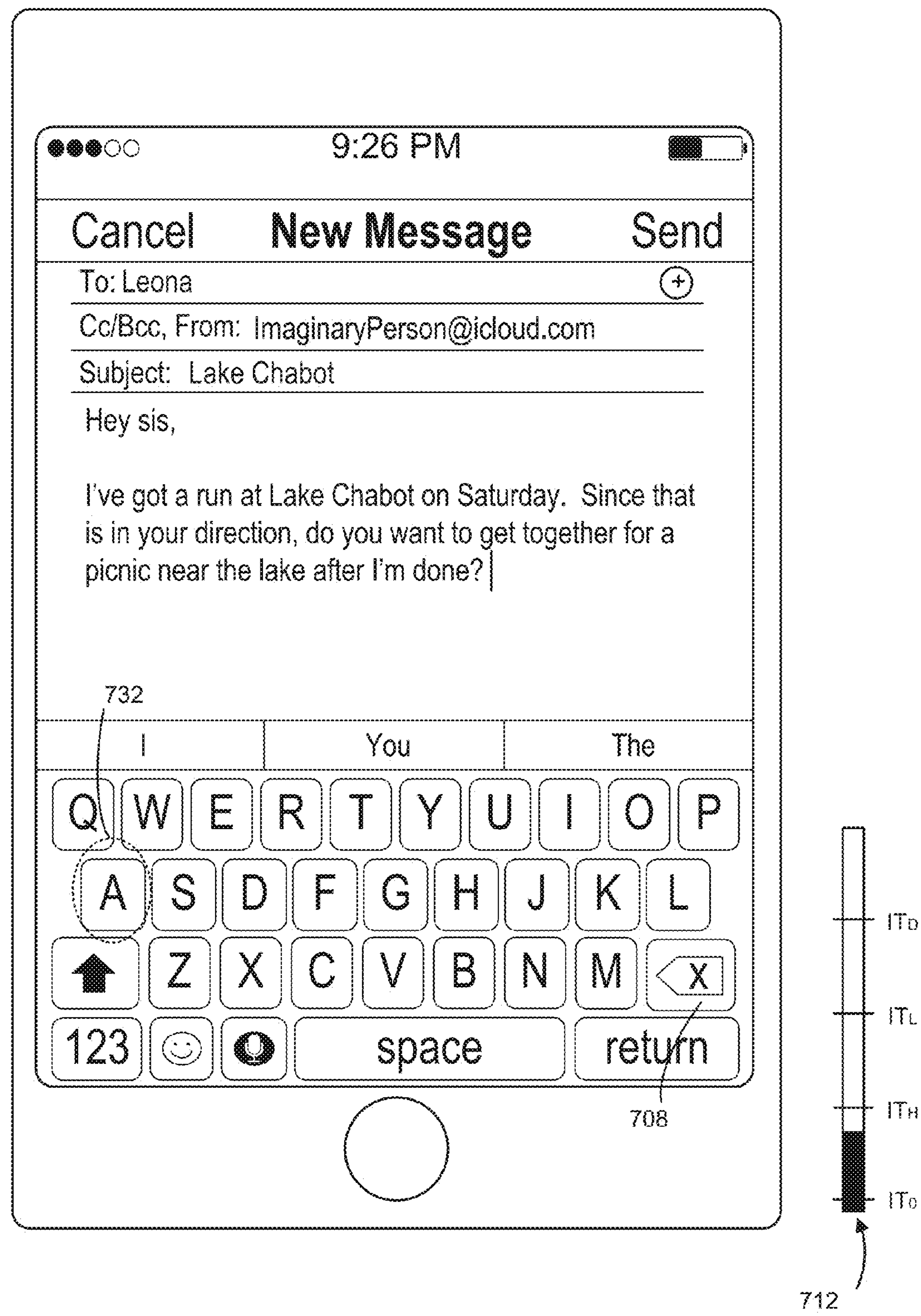
Figure 7L:
Figure 7M:
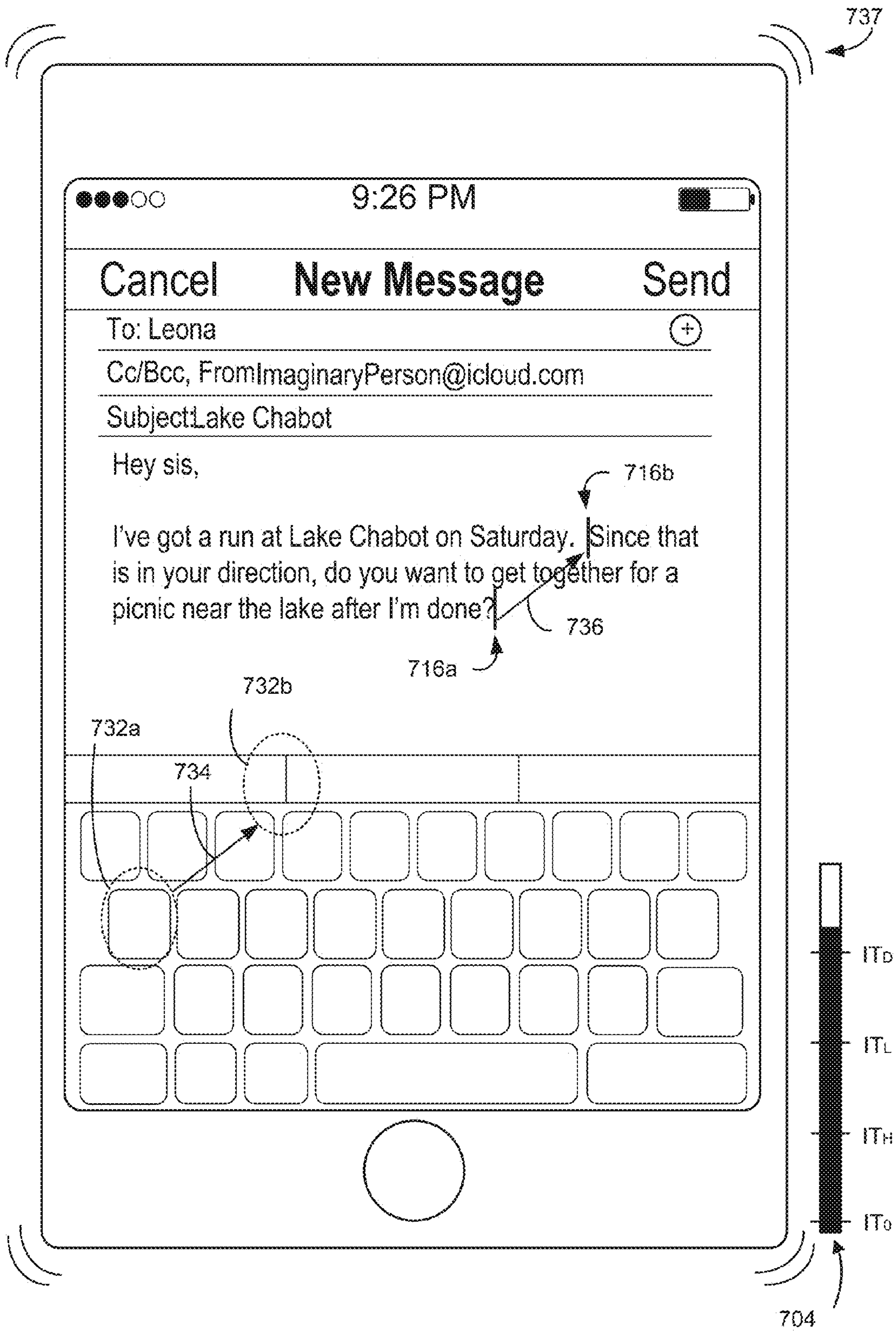
Figure 7N:
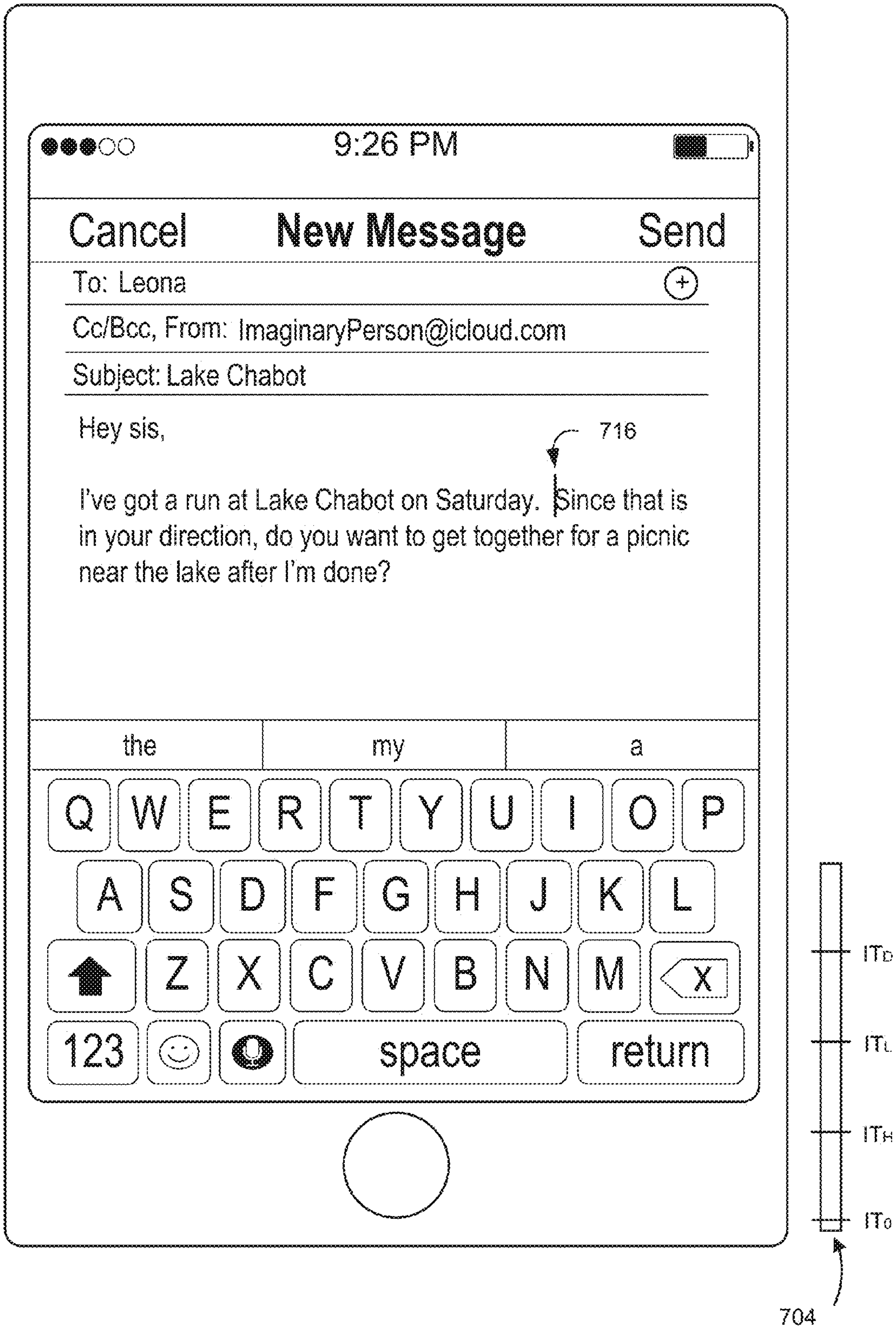
Figures 1, 7O:
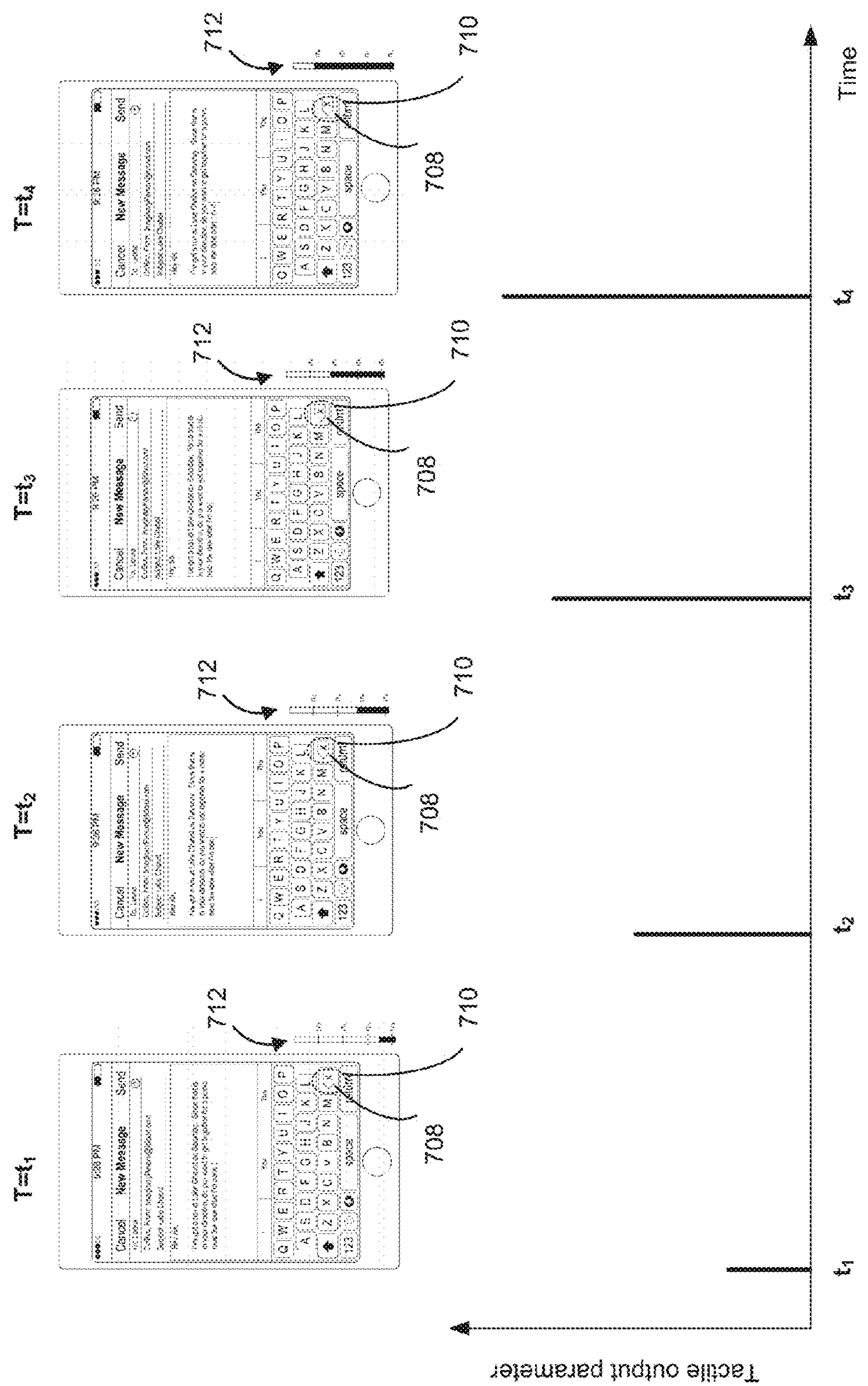
Figures 2, 7O:
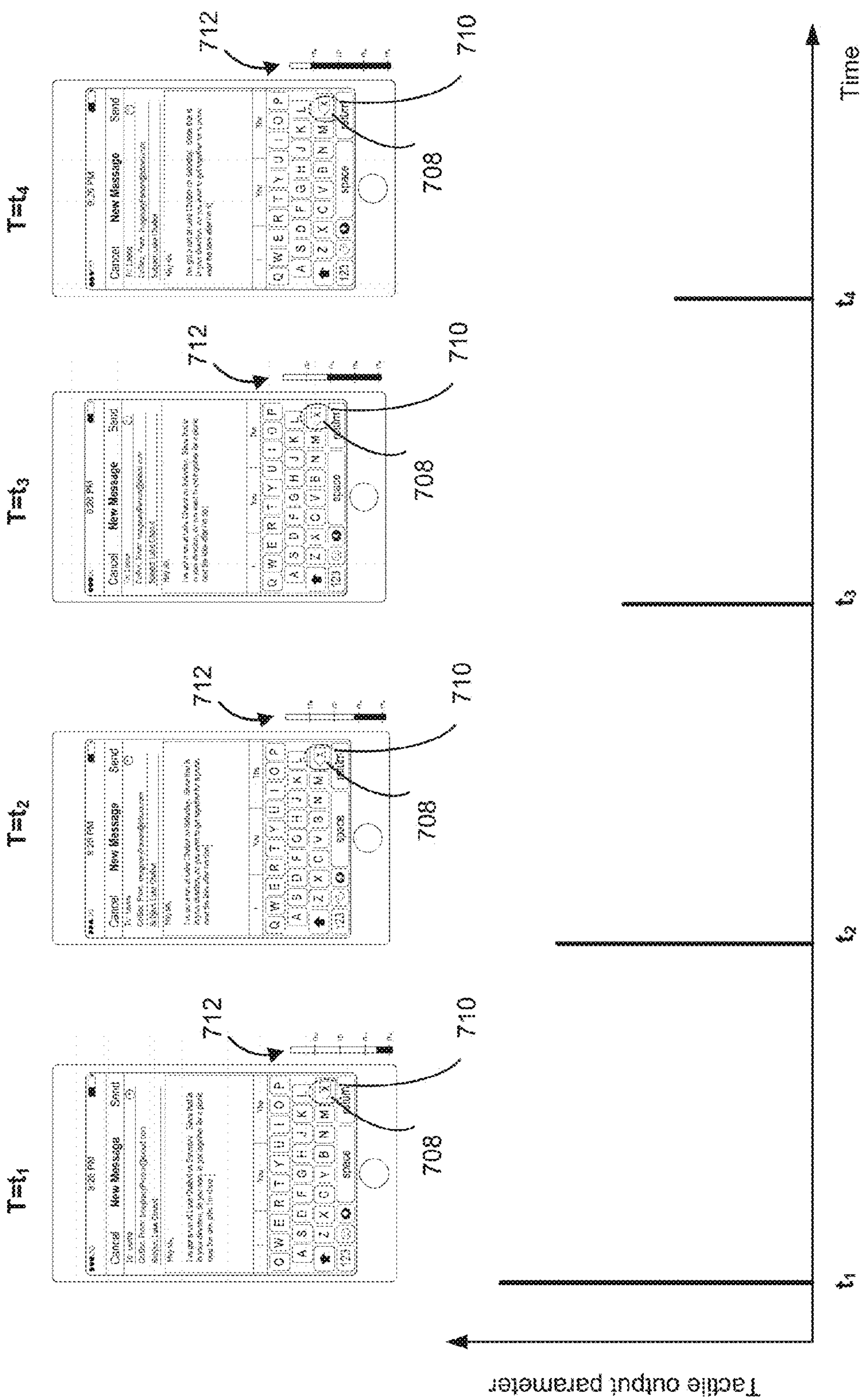
Figure 15:
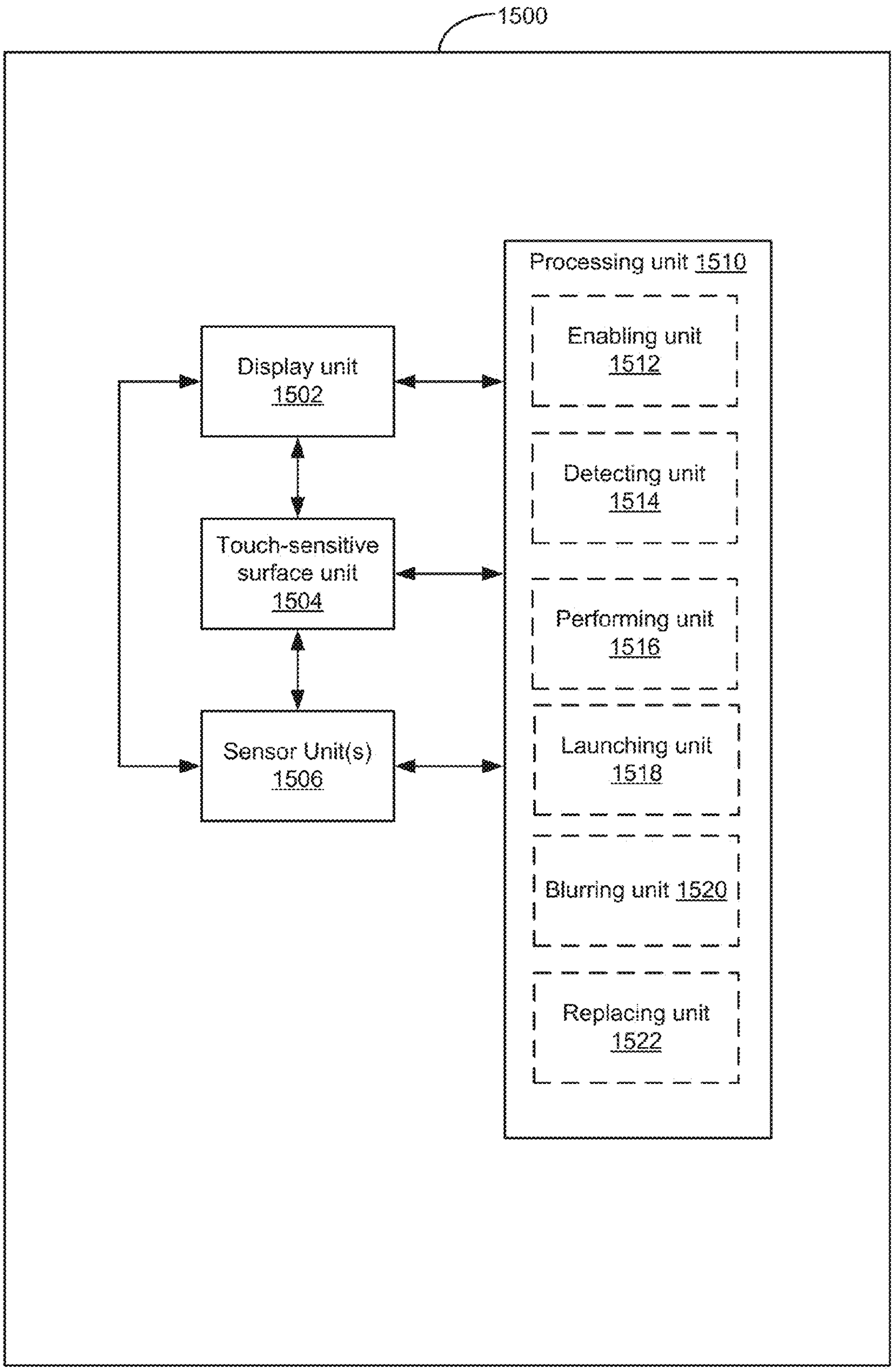

FIGS. 5T1-5T15 illustrate user interfaces for interacting with a menu of applications that includes a folder of applications (e.g., selectively providing a menu for quickly launching a respective application with unread notifications from the folder containing multiple applications without having to first open the folder, in accordance with some embodiments.

FIGS. 5U1-5W5 illustrate user interfaces for quickly entering a rename and reconfiguration mode for an application folder (e.g., without having to first open the folder), in accordance with some embodiments.

FIGS. 10A-10D are flow diagrams illustrating a method of interacting with a notification associated with a respective application (e.g., to launch the respective application or to access expanded notification content), in accordance with some embodiments. FIGS. 12A-12F are flow diagrams illustrating a method of interacting with an application launching icon associated with a respective application (e.g., to launch the respective application or present contextual content (e.g., in a contextual content object) associated with the respective application without first launching the respective application), in accordance with some embodiments. FIGS. 14A-14C are flow diagrams illustrating a method of interacting with a menu of applications (e.g., presenting selectable options for actions for a respective application (e.g., when the respective application is in the process of being downloaded and/or after the download is complete)), in accordance with some embodiments. FIGS. 16A-16C are flow diagrams illustrating a method of interacting with a menu of applications that include a folder of applications (e.g., presenting selectable options for selectively launching applications (e.g., applications with unread notifications) from the folder containing one or more applications), in accordance with some embodiments. The user interfaces in FIGS. 5A1-5W5 are used to illustrate the processes in FIGS. 10A-10D, 12A-12F, 14A-14C, and 16A-16C.

Figure 6A:
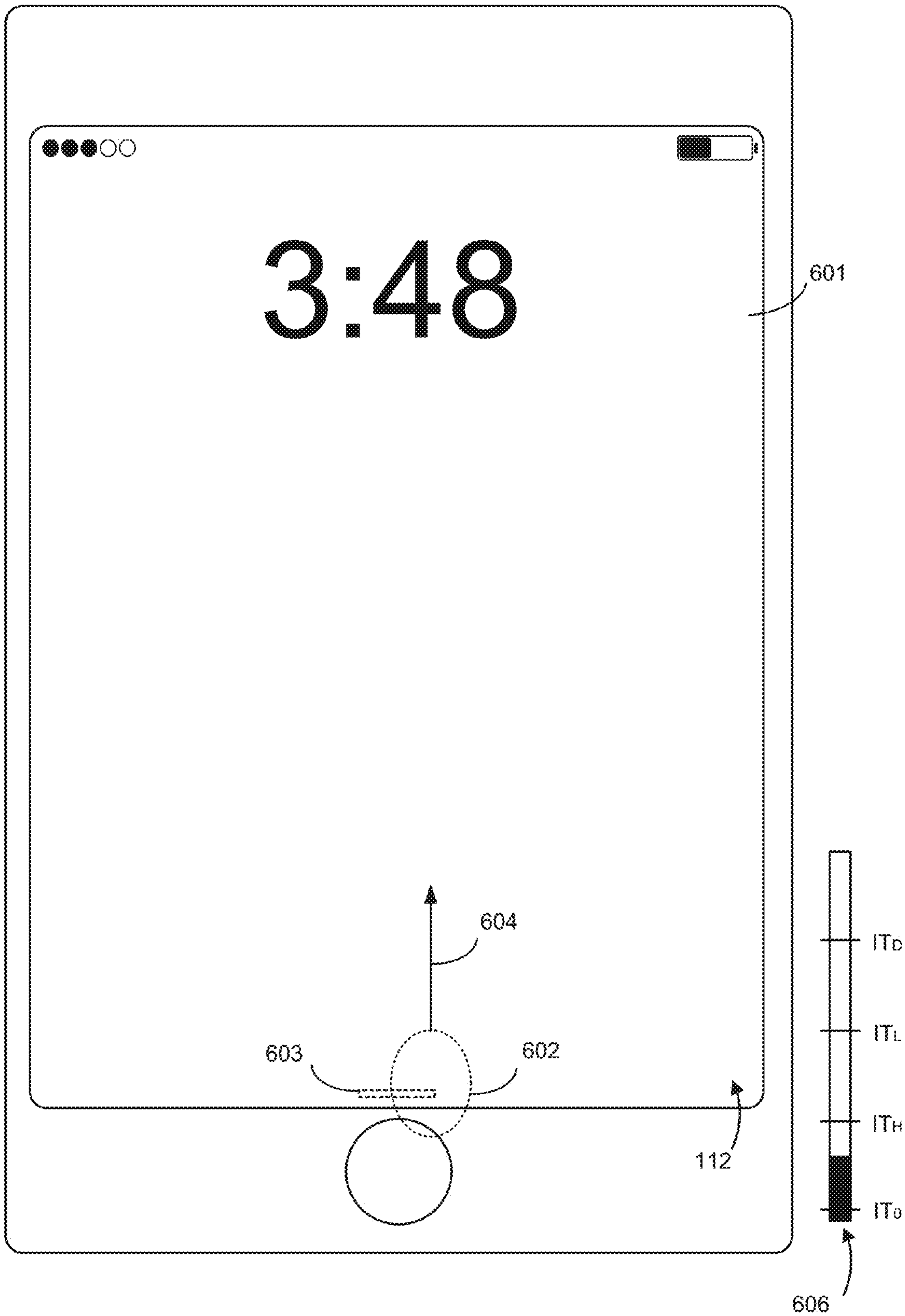
FIGS. 6A-6Y illustrate exemplary user interfaces for modifying the functionality of a control affordance in accordance with some embodiments.
Figure 6B:
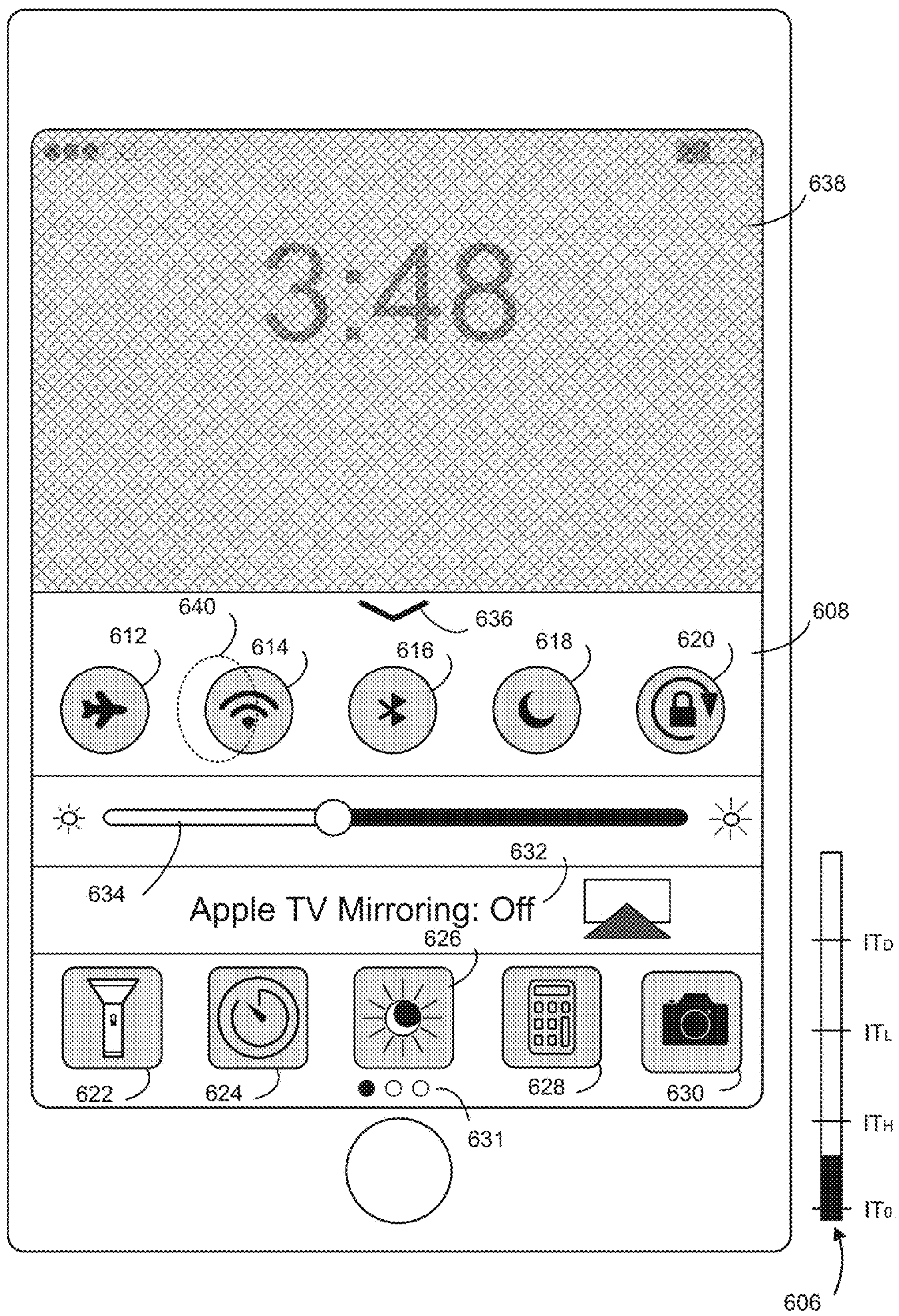
Figure 6C:
Figure 6D:
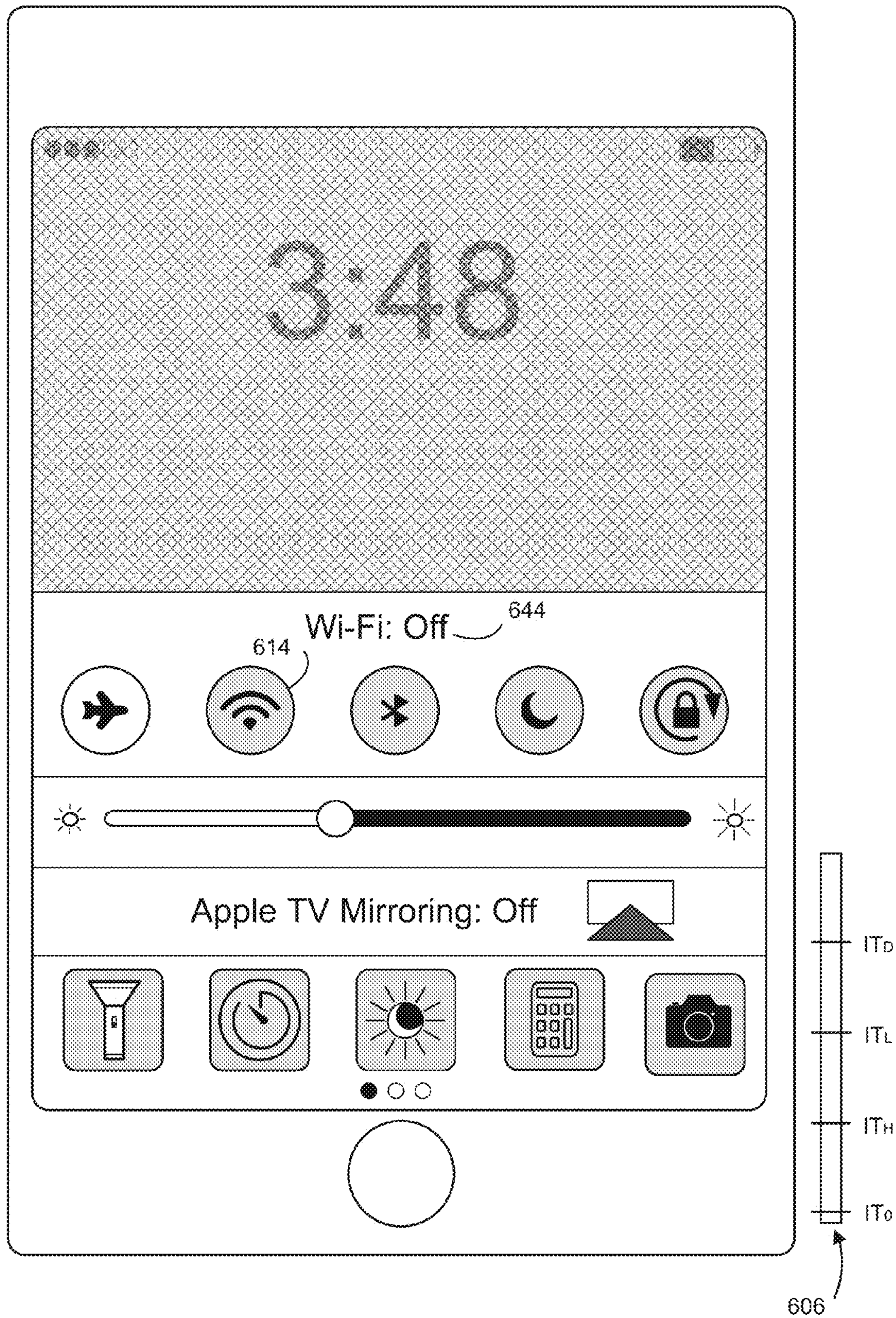
Figure 6E:
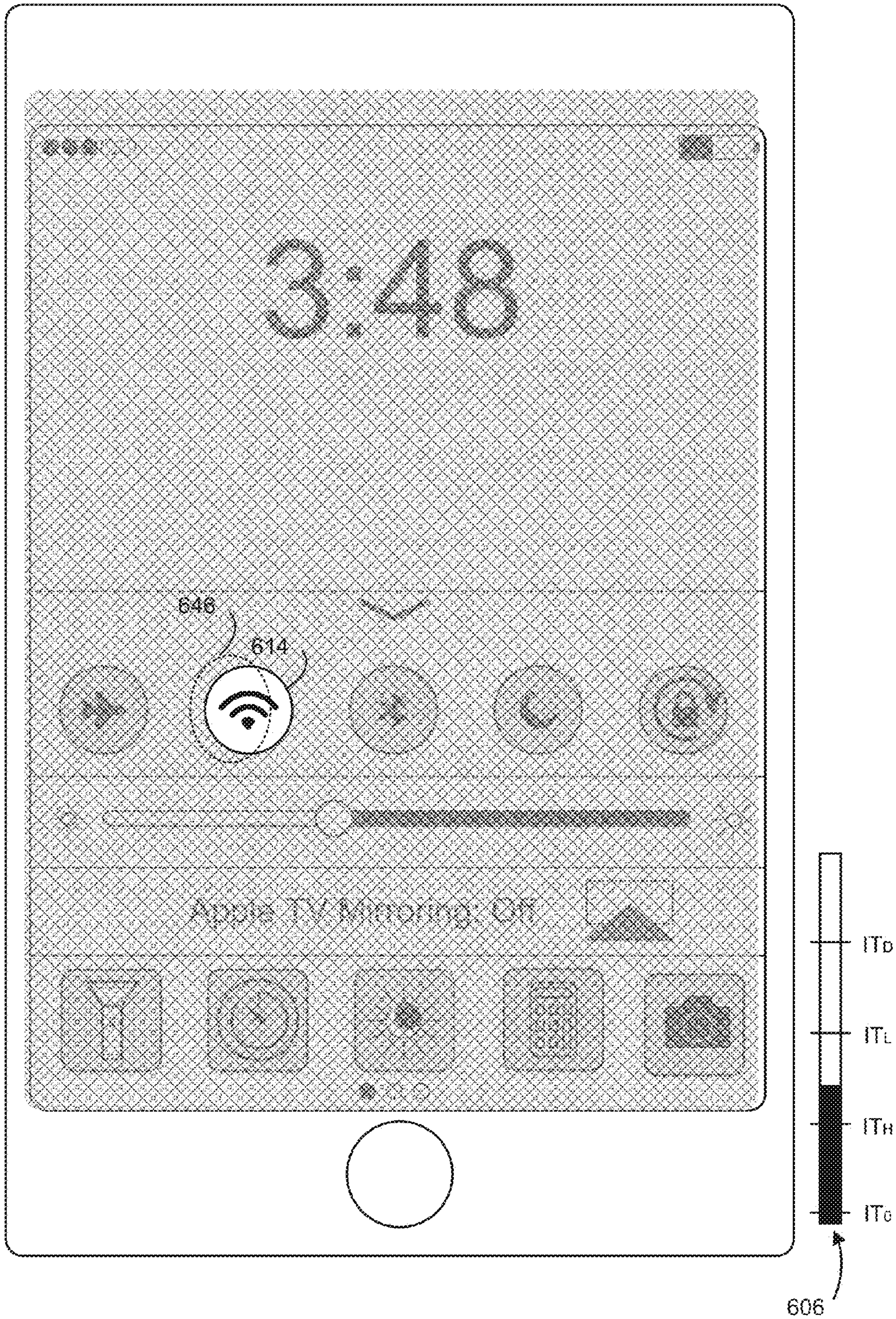
Figure 6F:
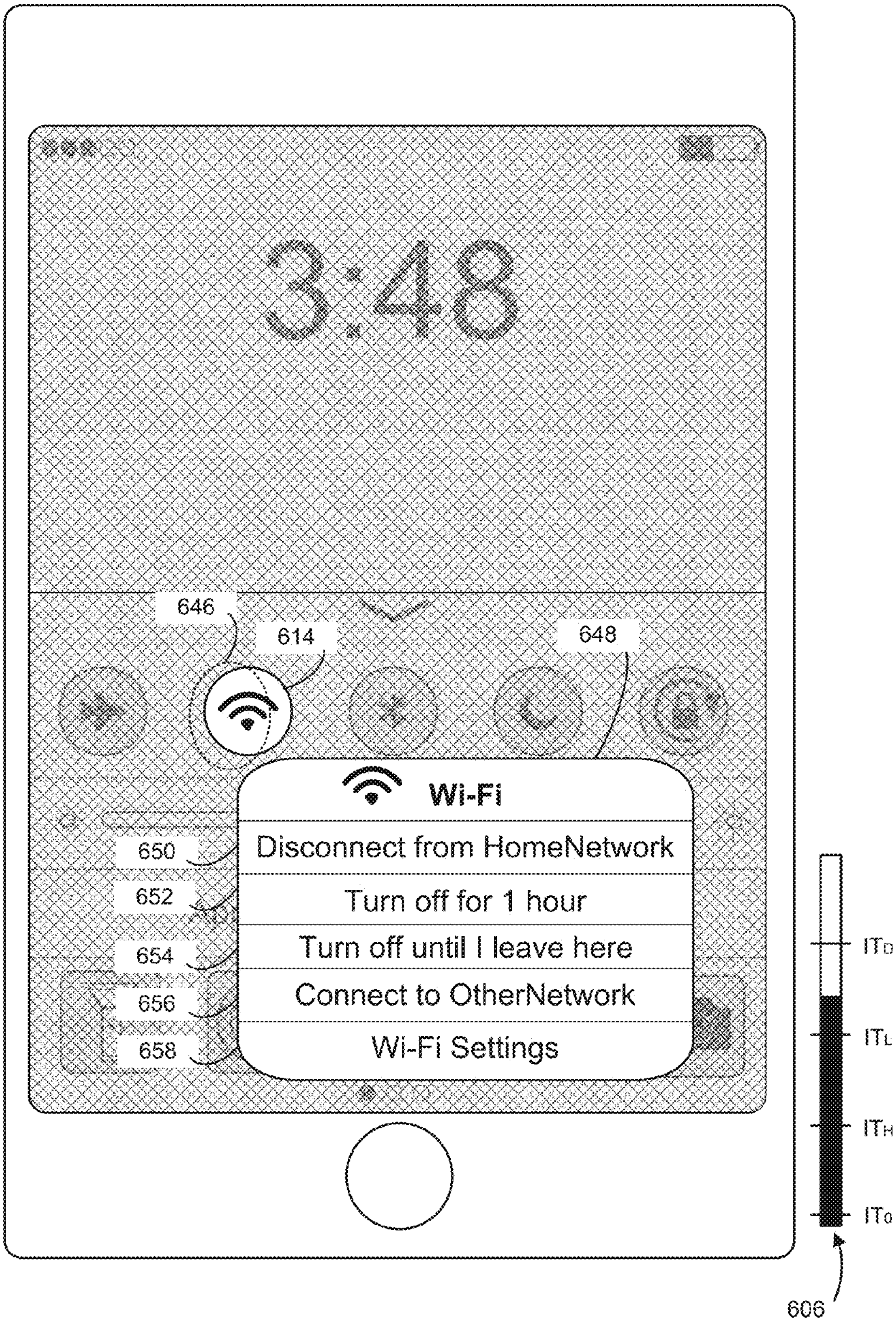
Figure 6G:
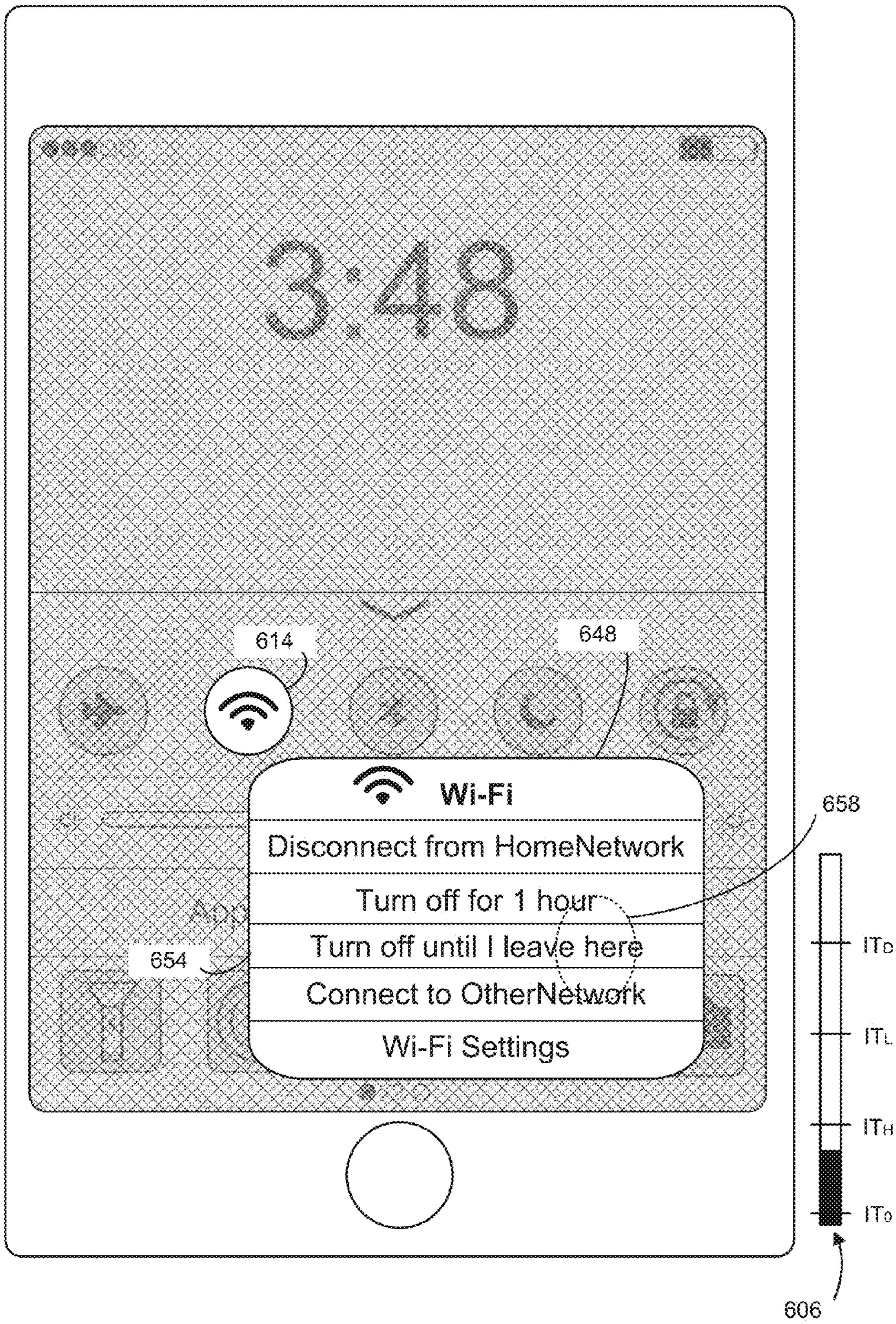
Figure 6H:
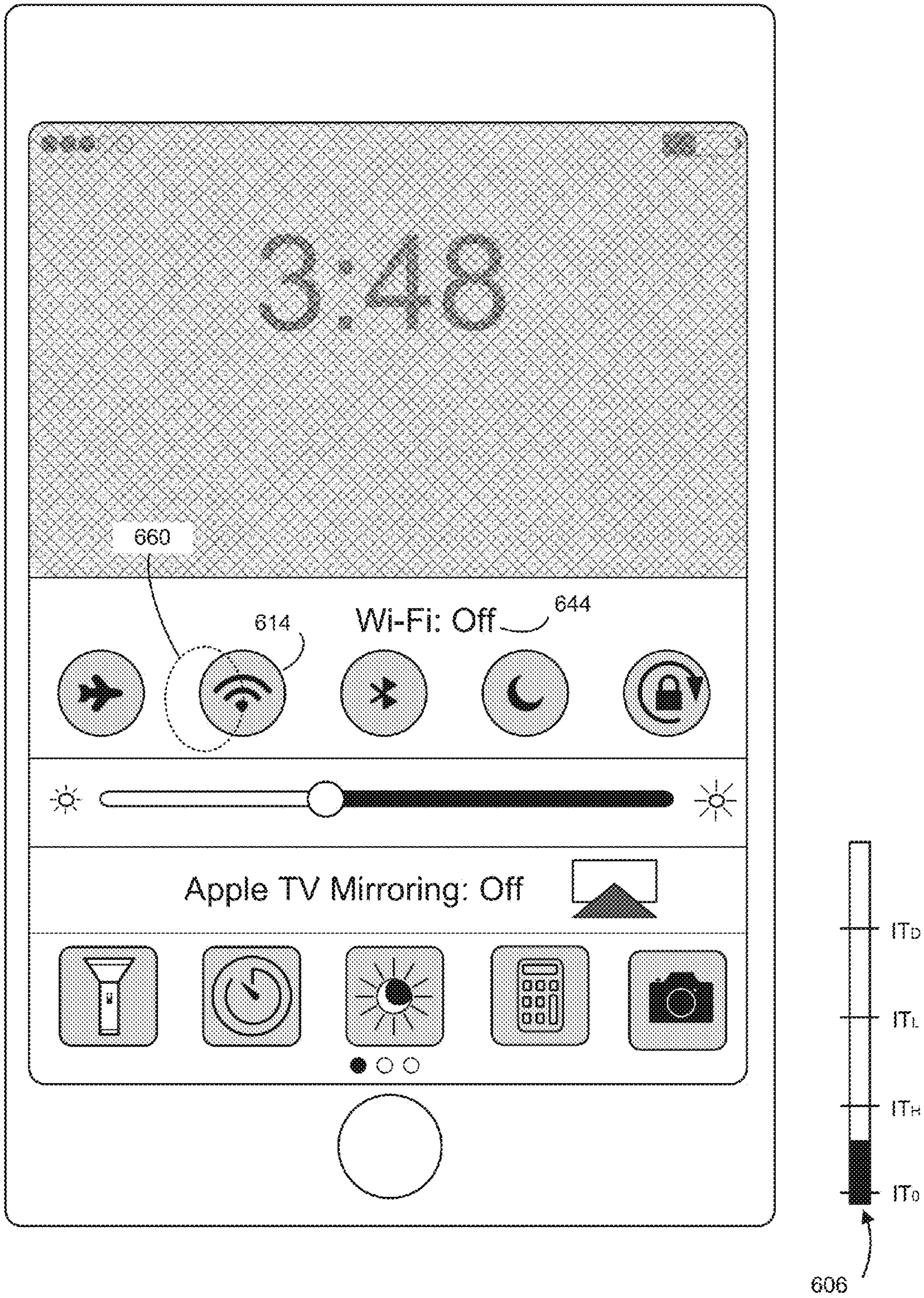
Figure 6I:
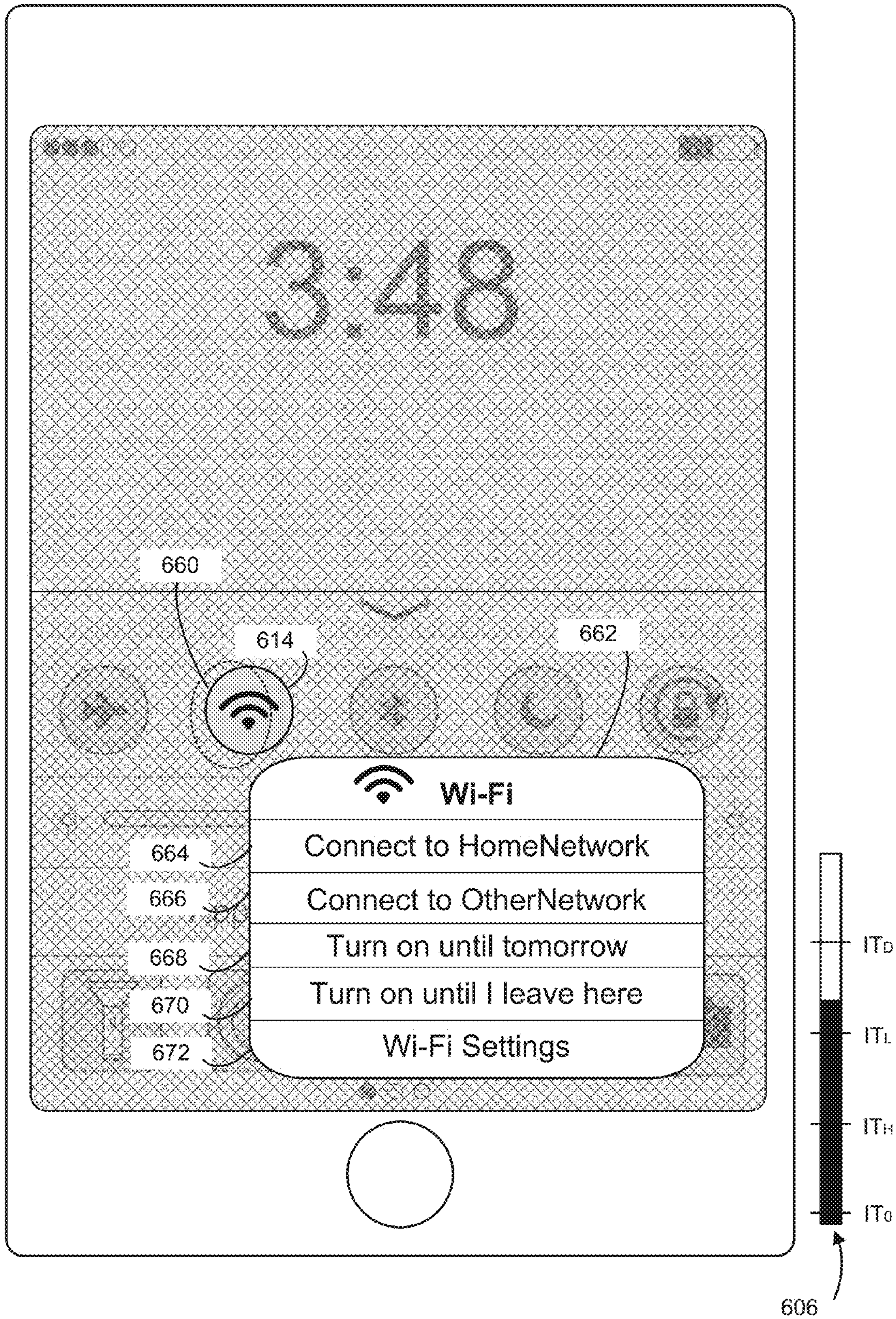
Figure 6J:
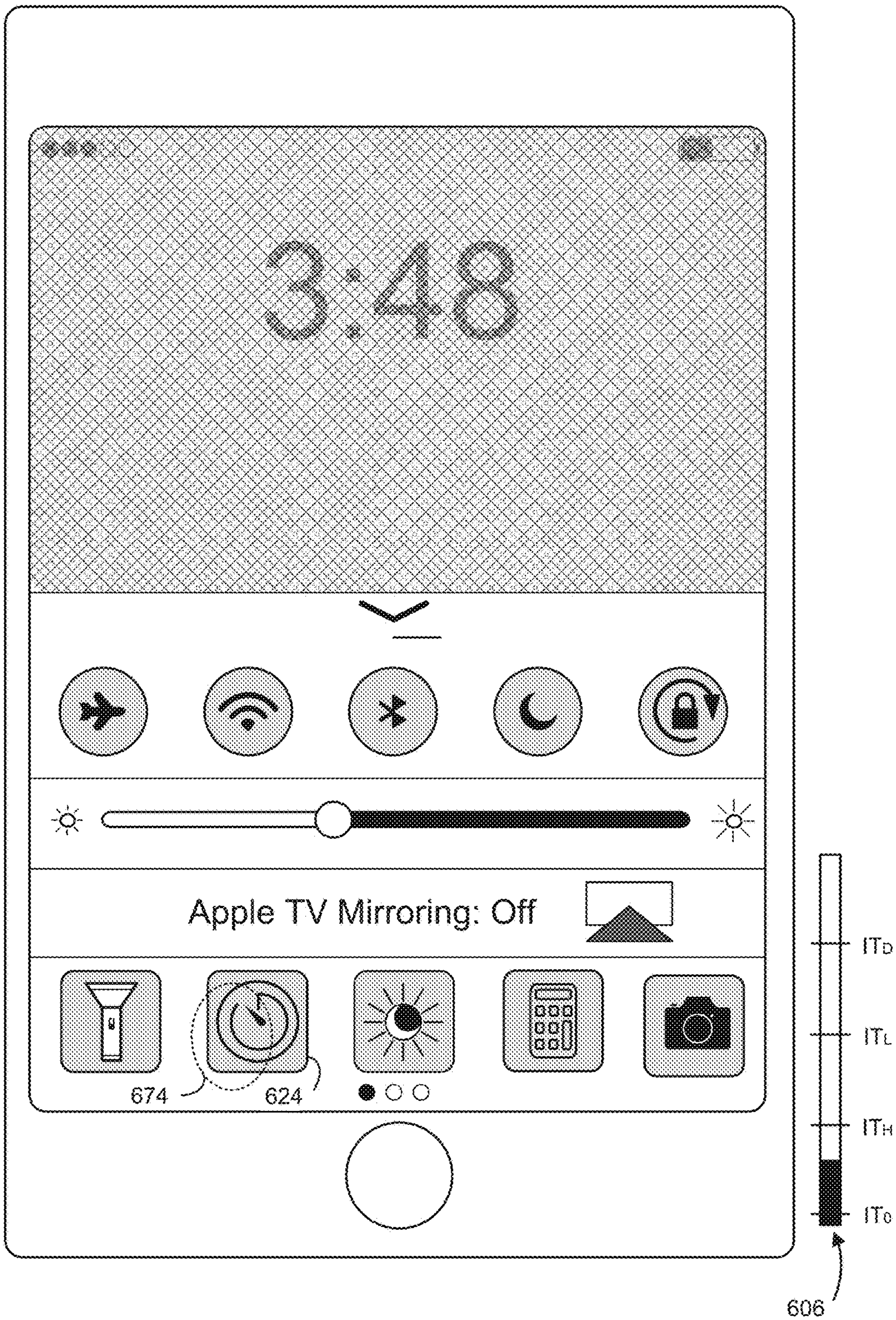
Figure 6K:
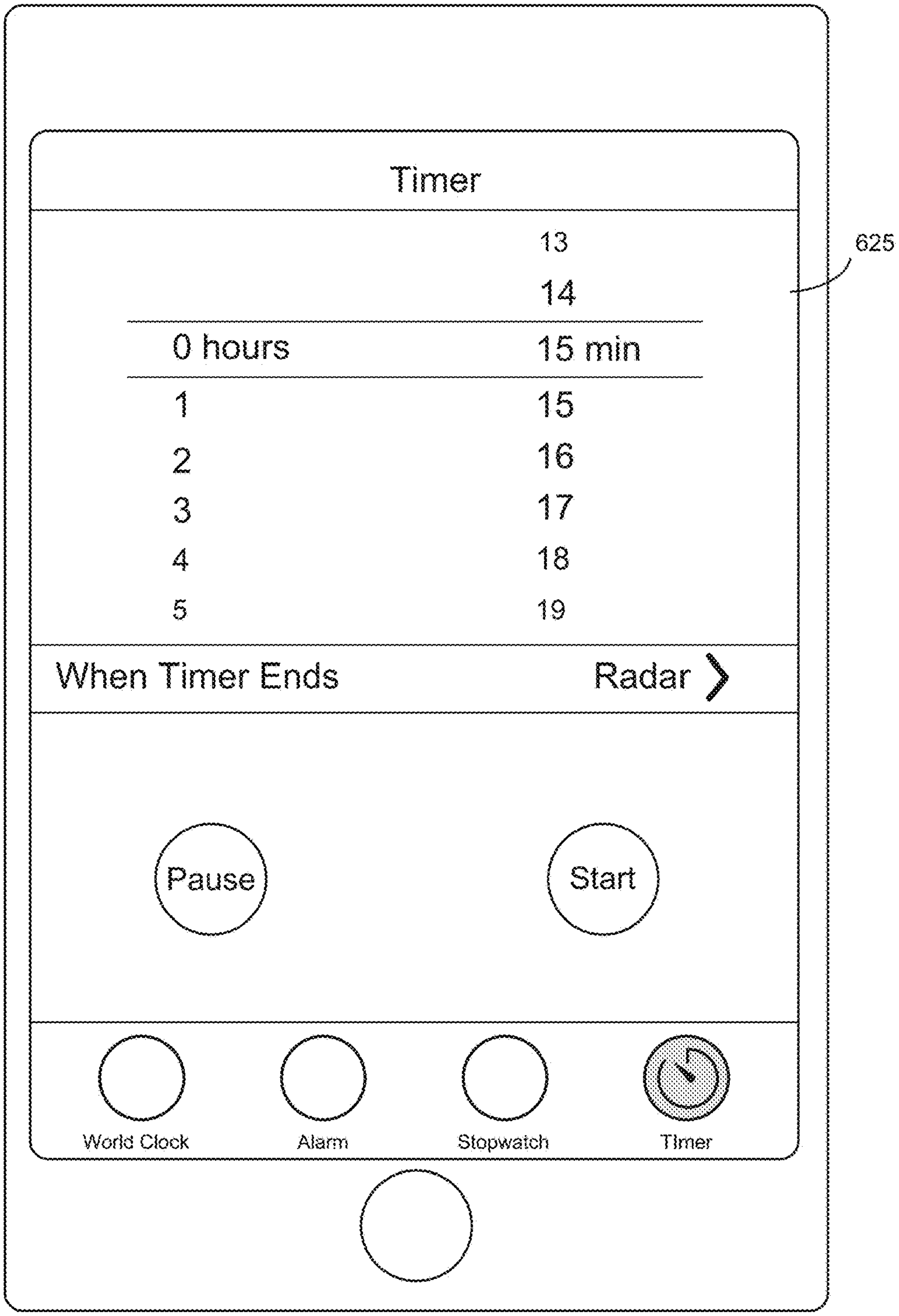
Figure 6L:
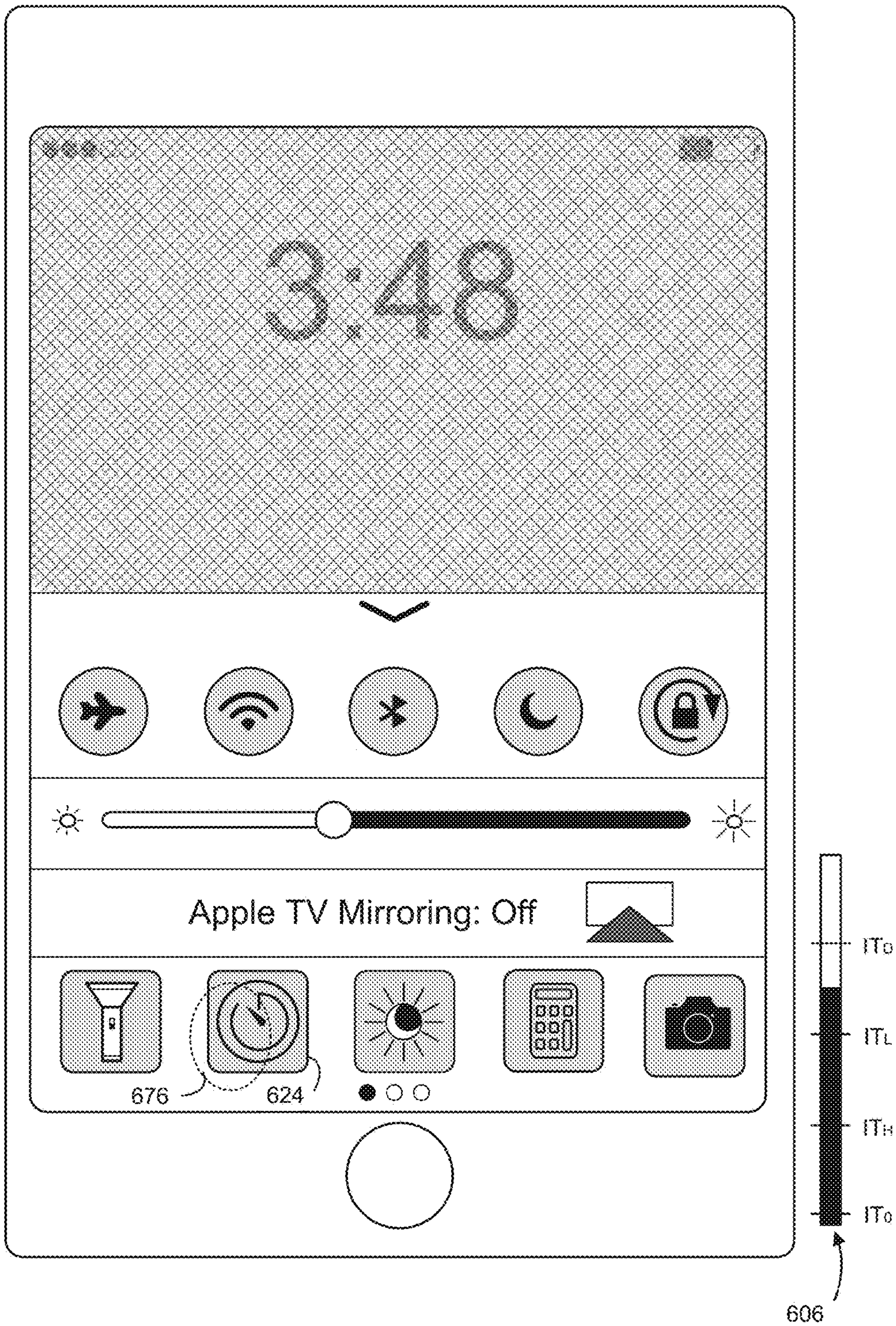
Figure 6M:
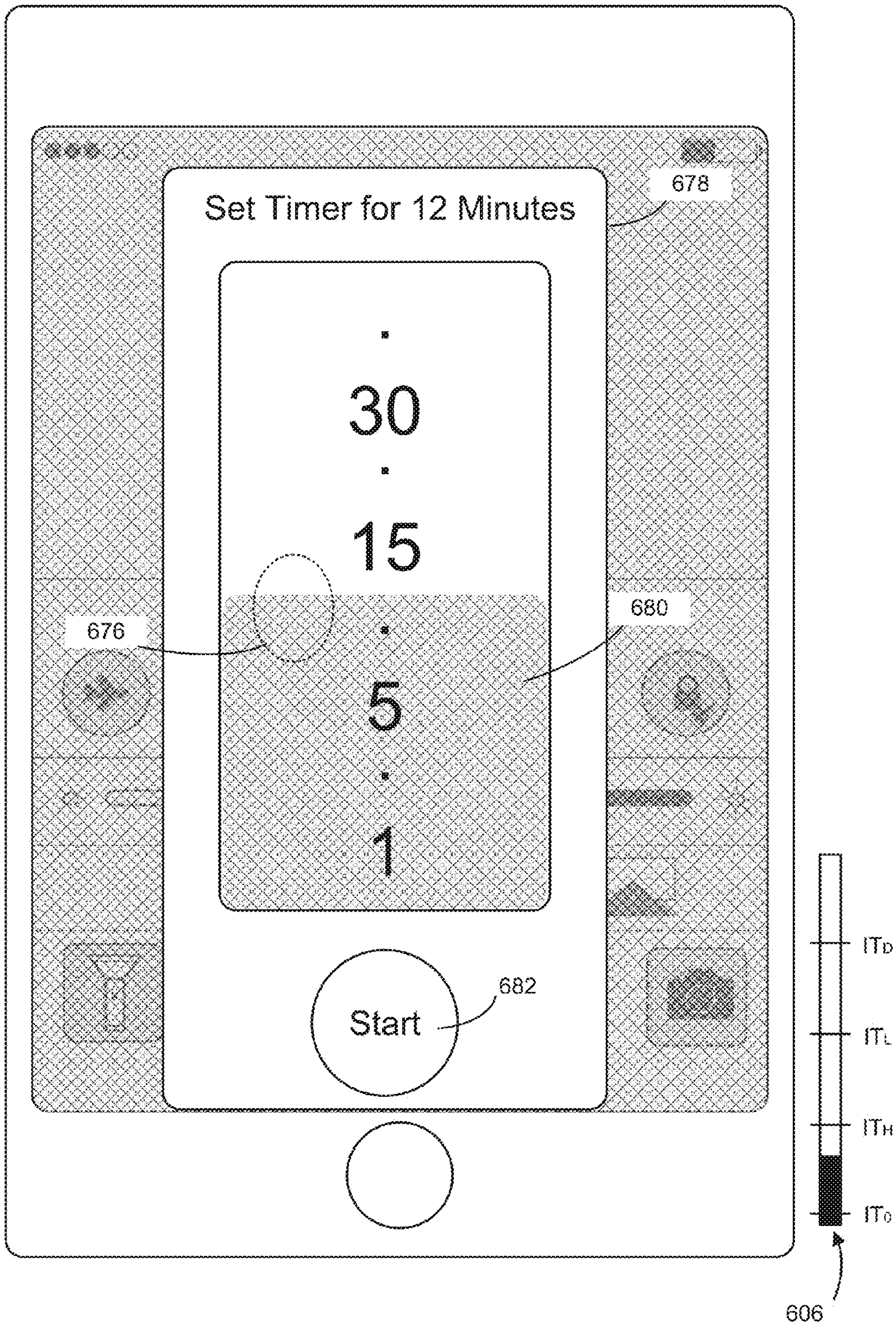
Figure 6N:
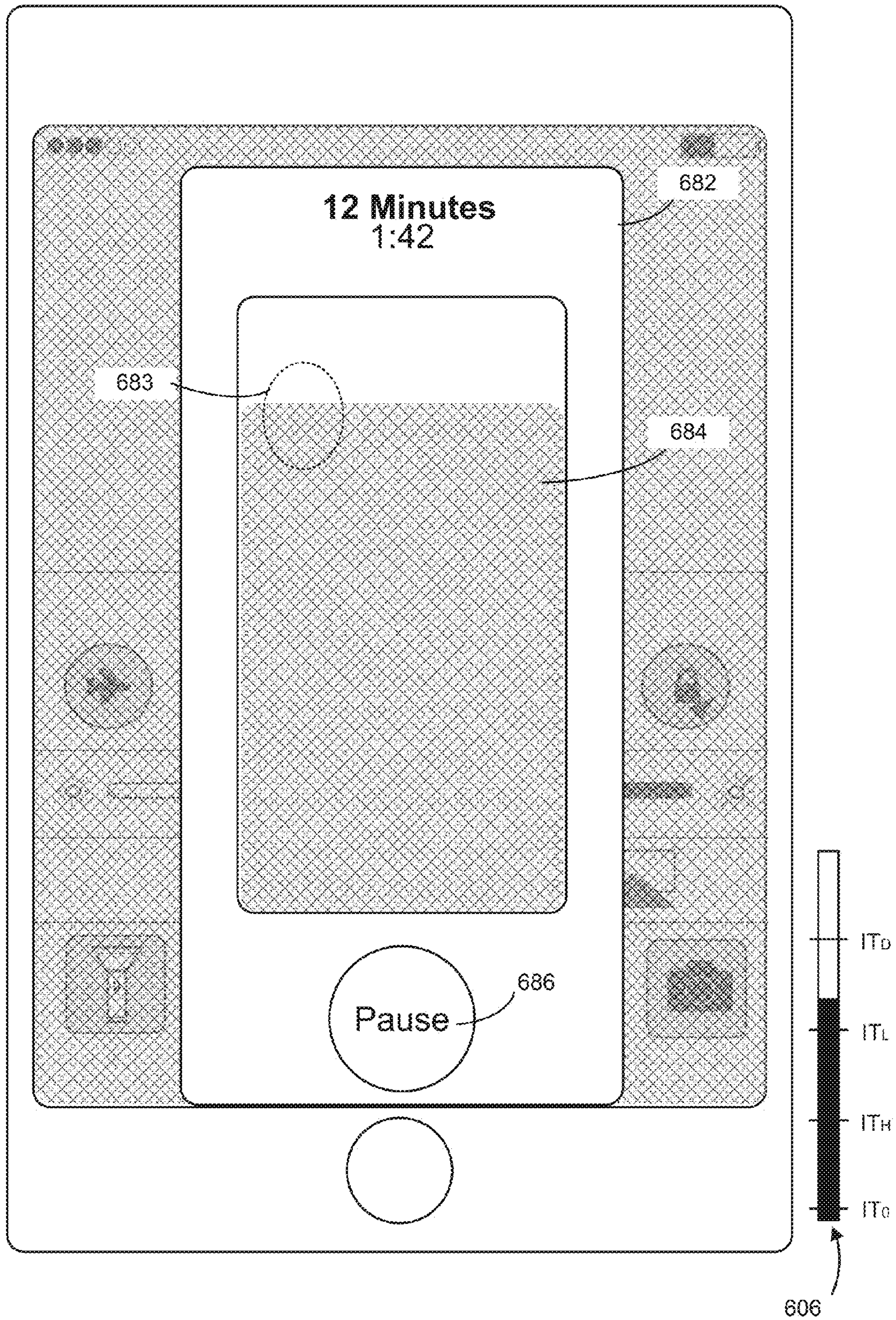
Figure 6O:
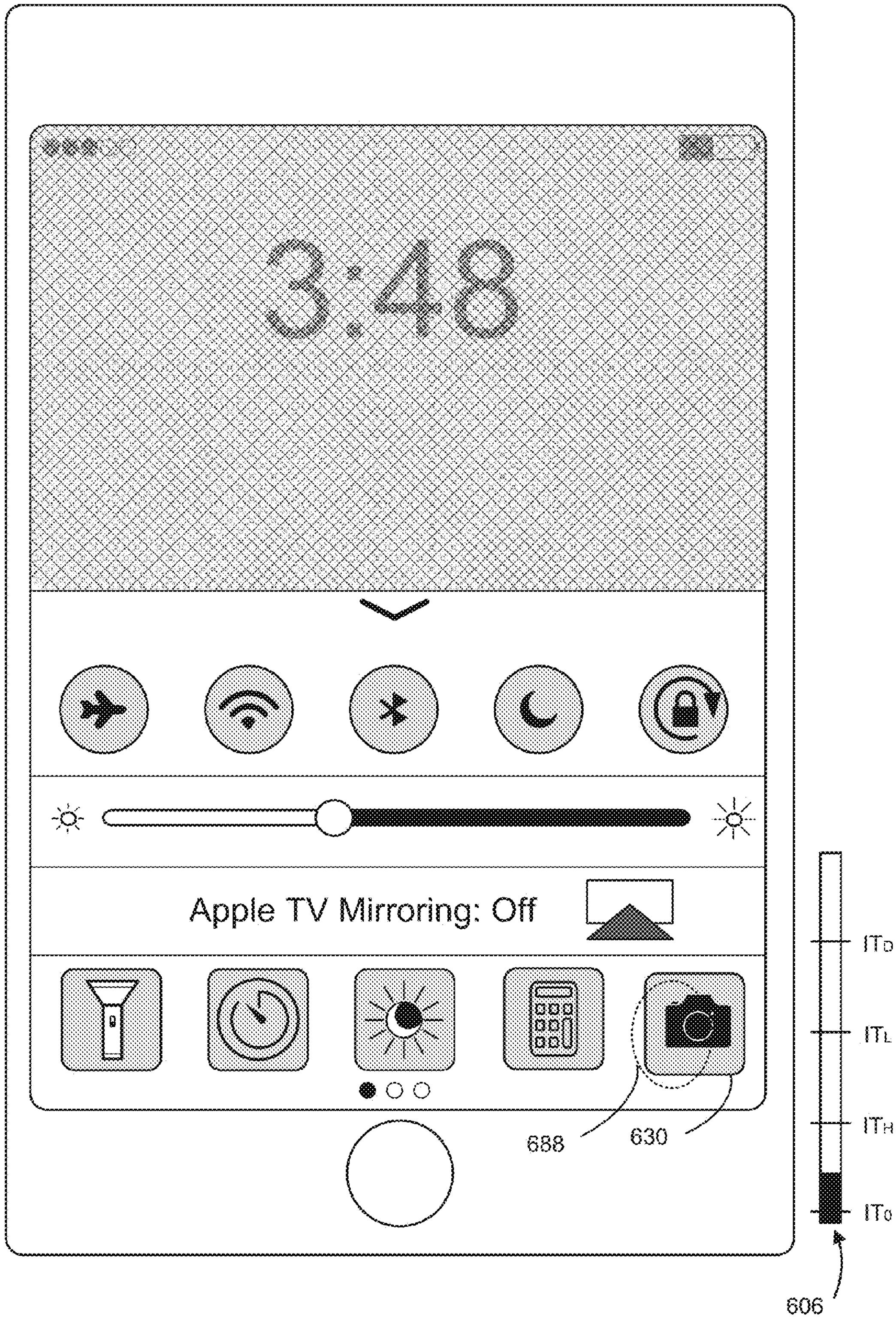
Figure 6P:
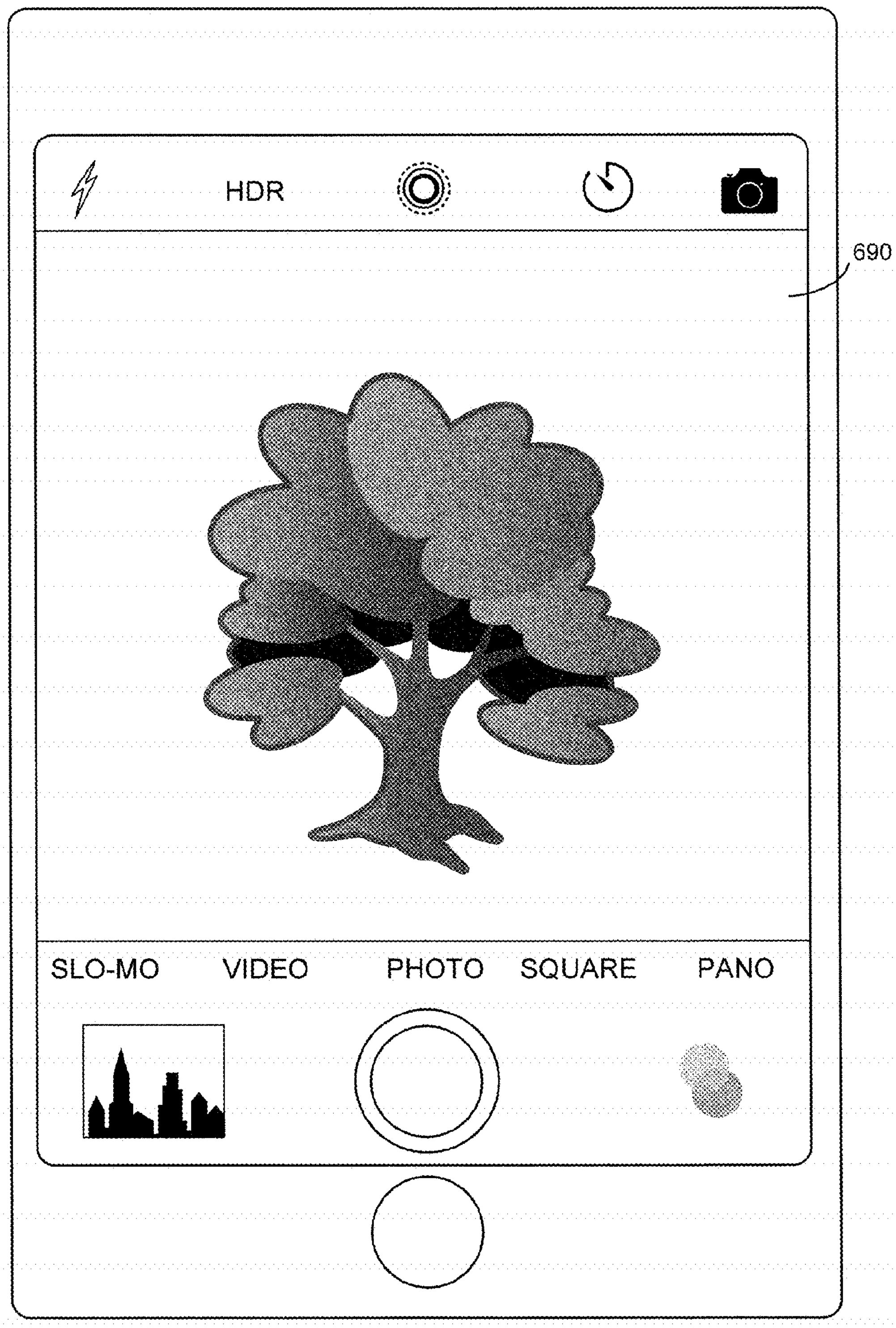
Figure 6Q:
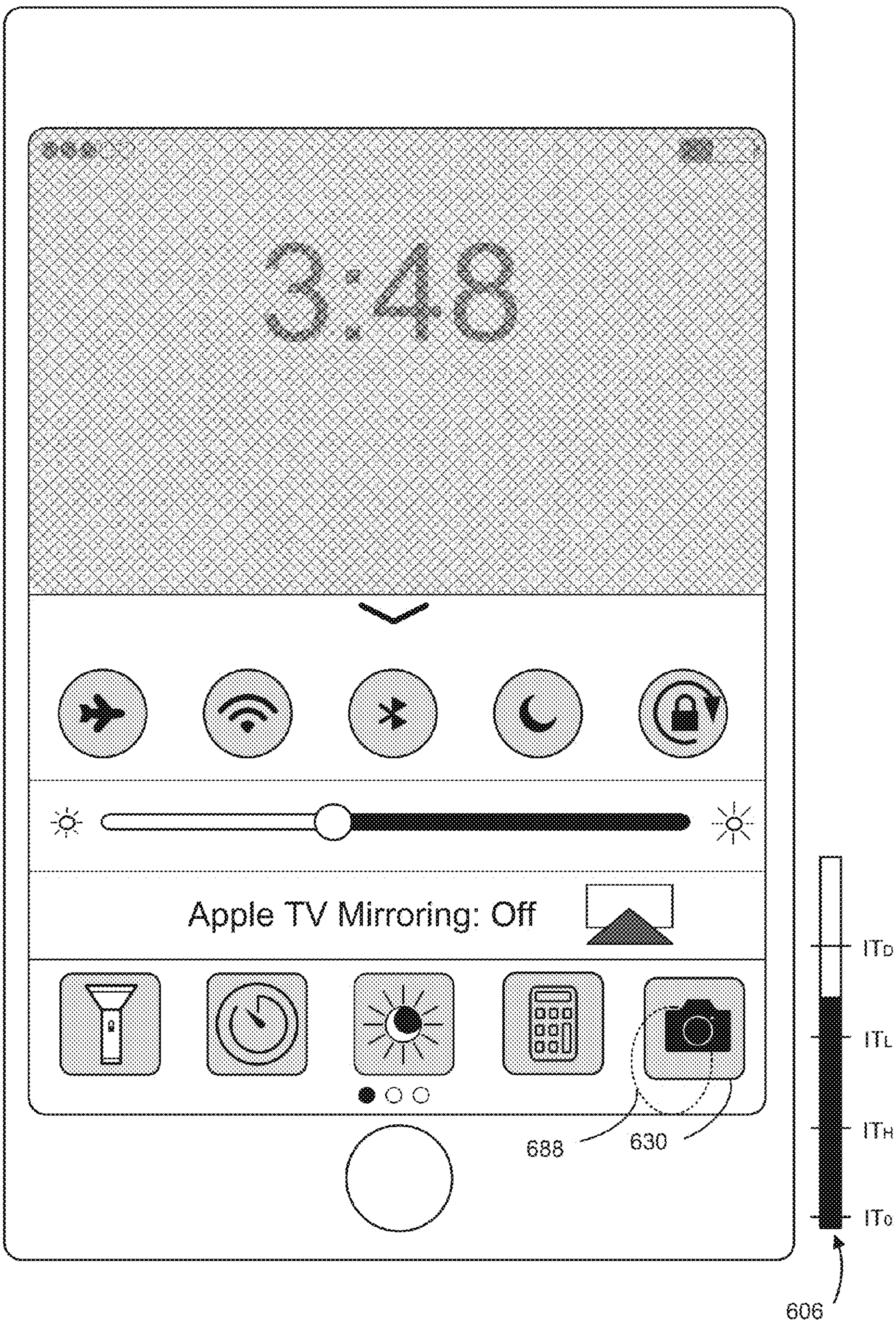
Figure 6R:
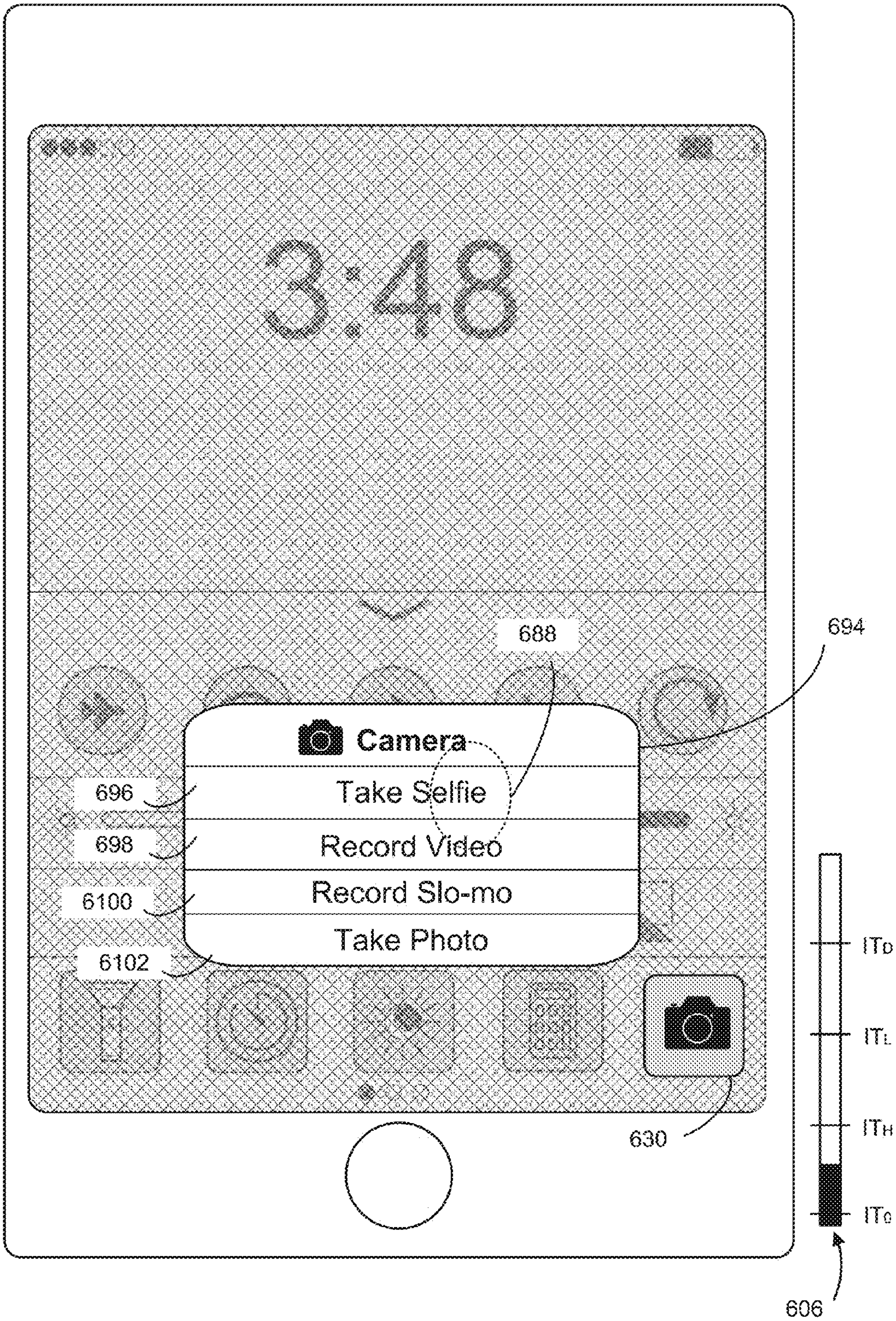
Figure 6S:
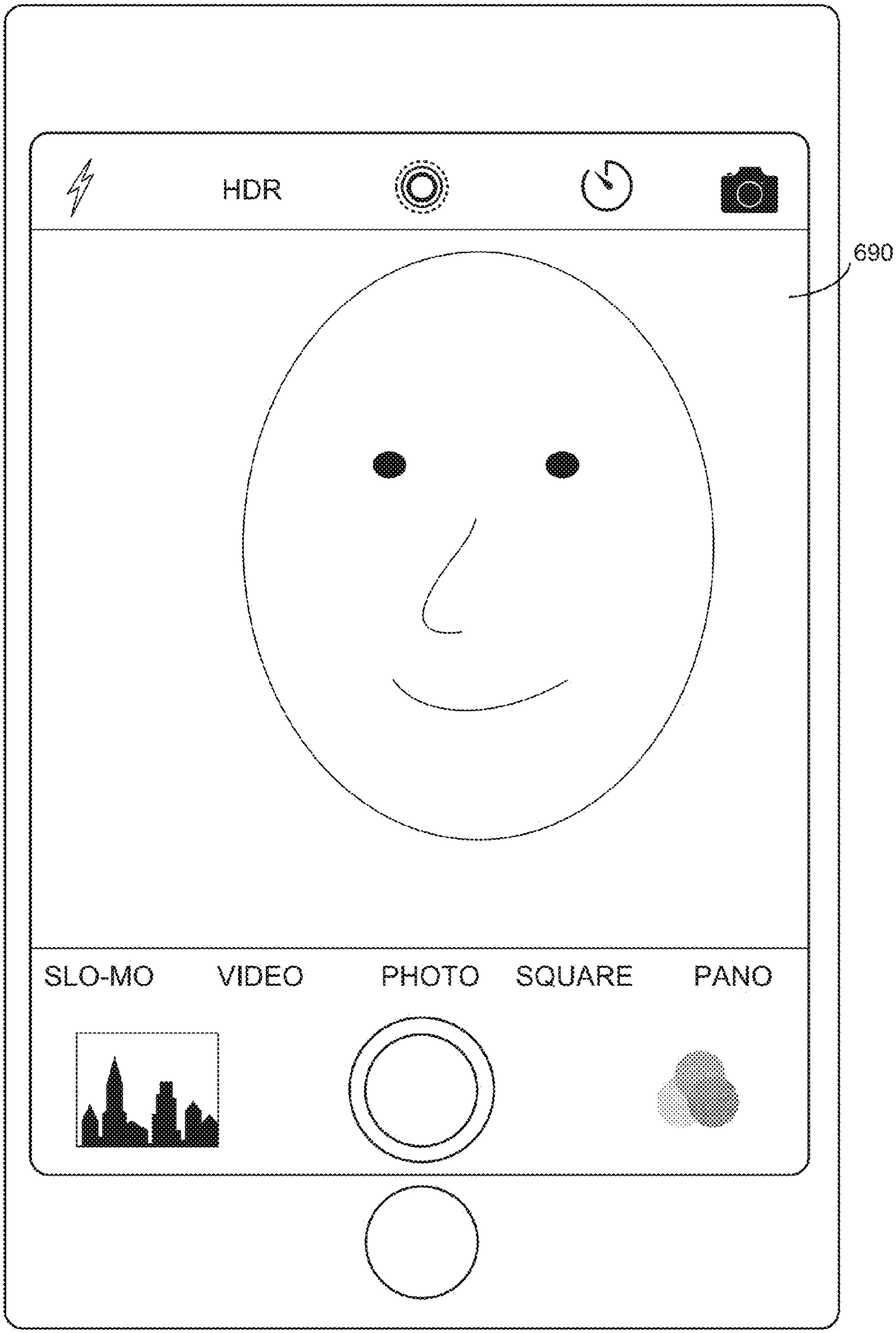
Figure 6T:
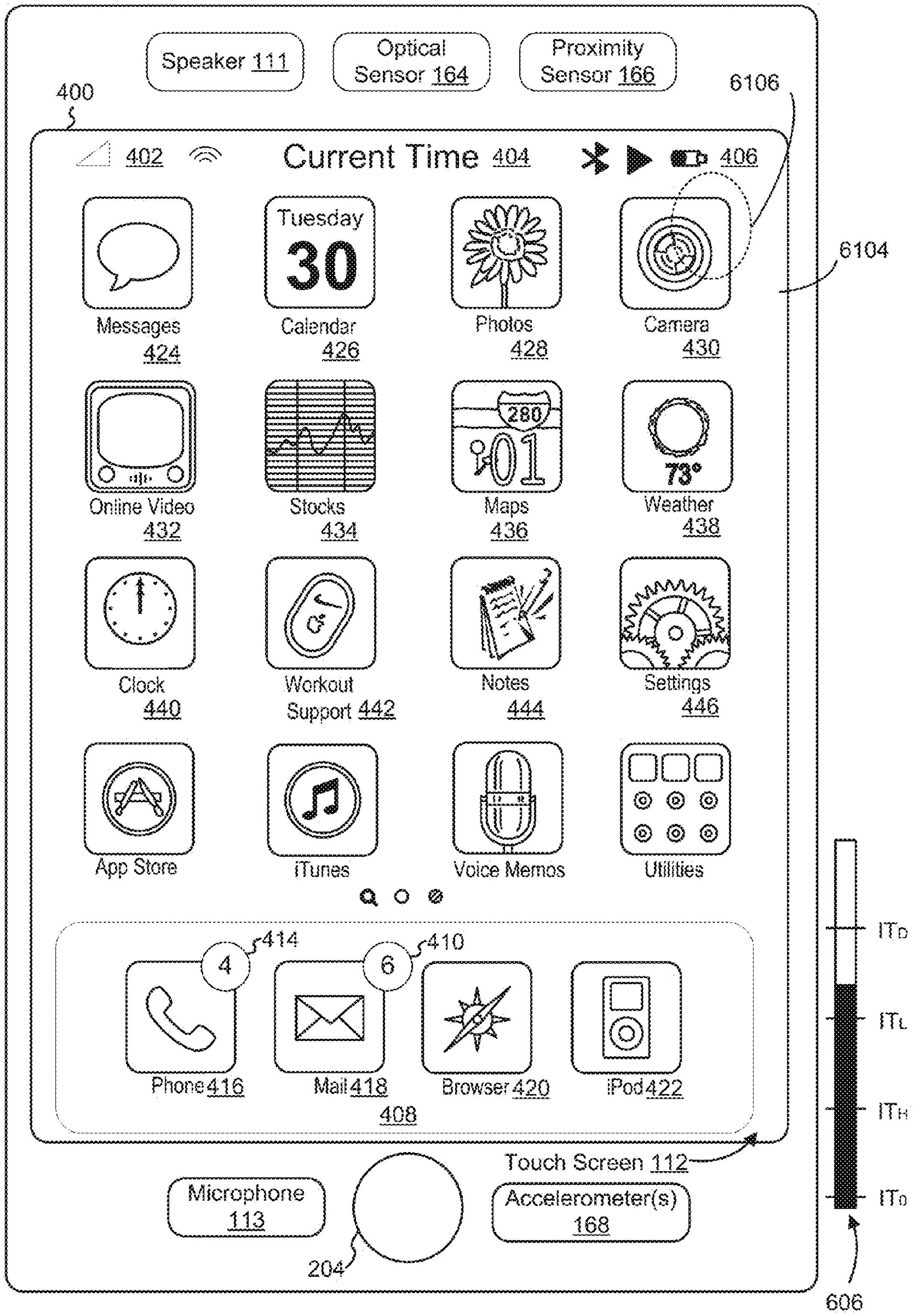
Figure 6U:
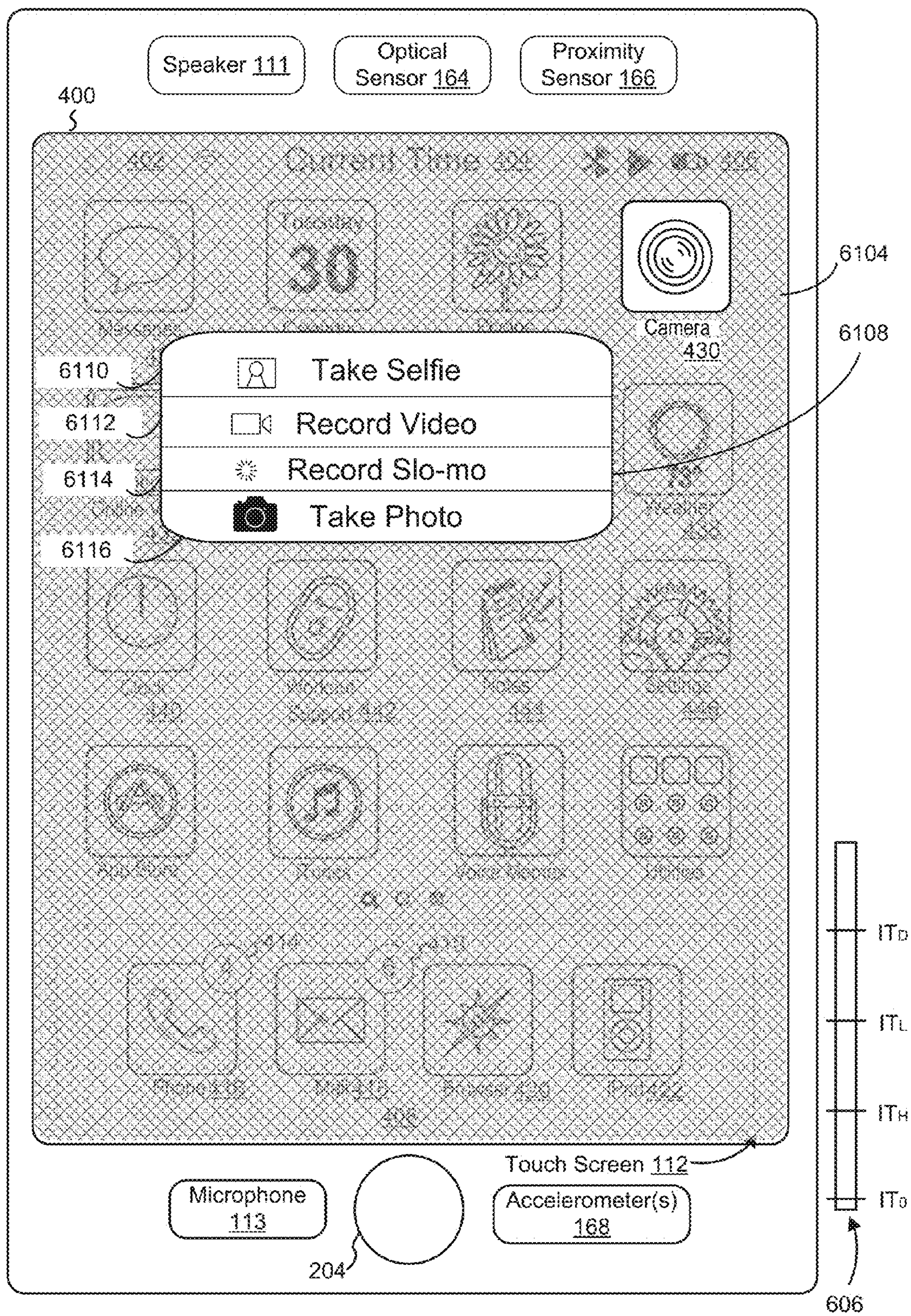
Figure 6V:
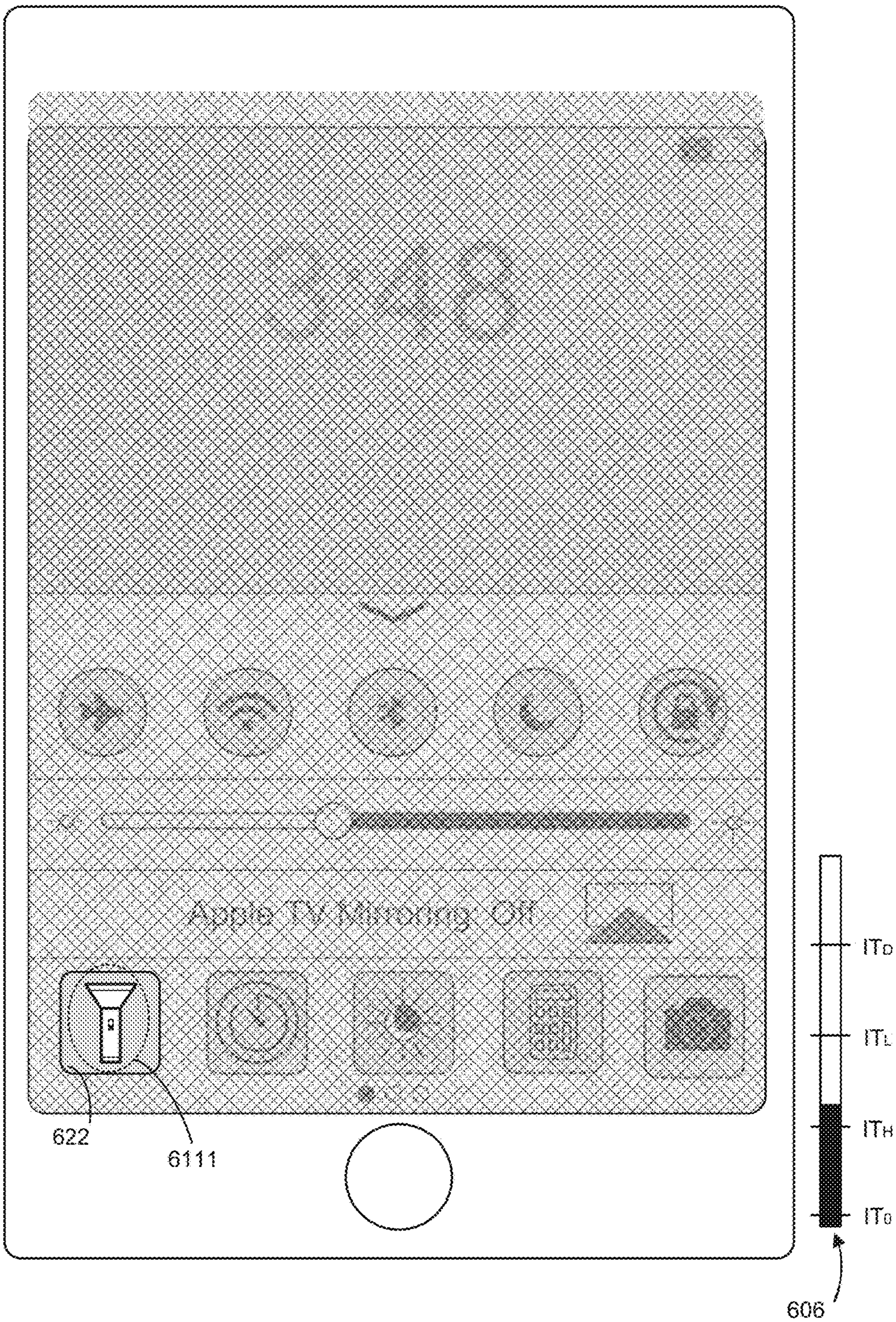
Figure 6W:
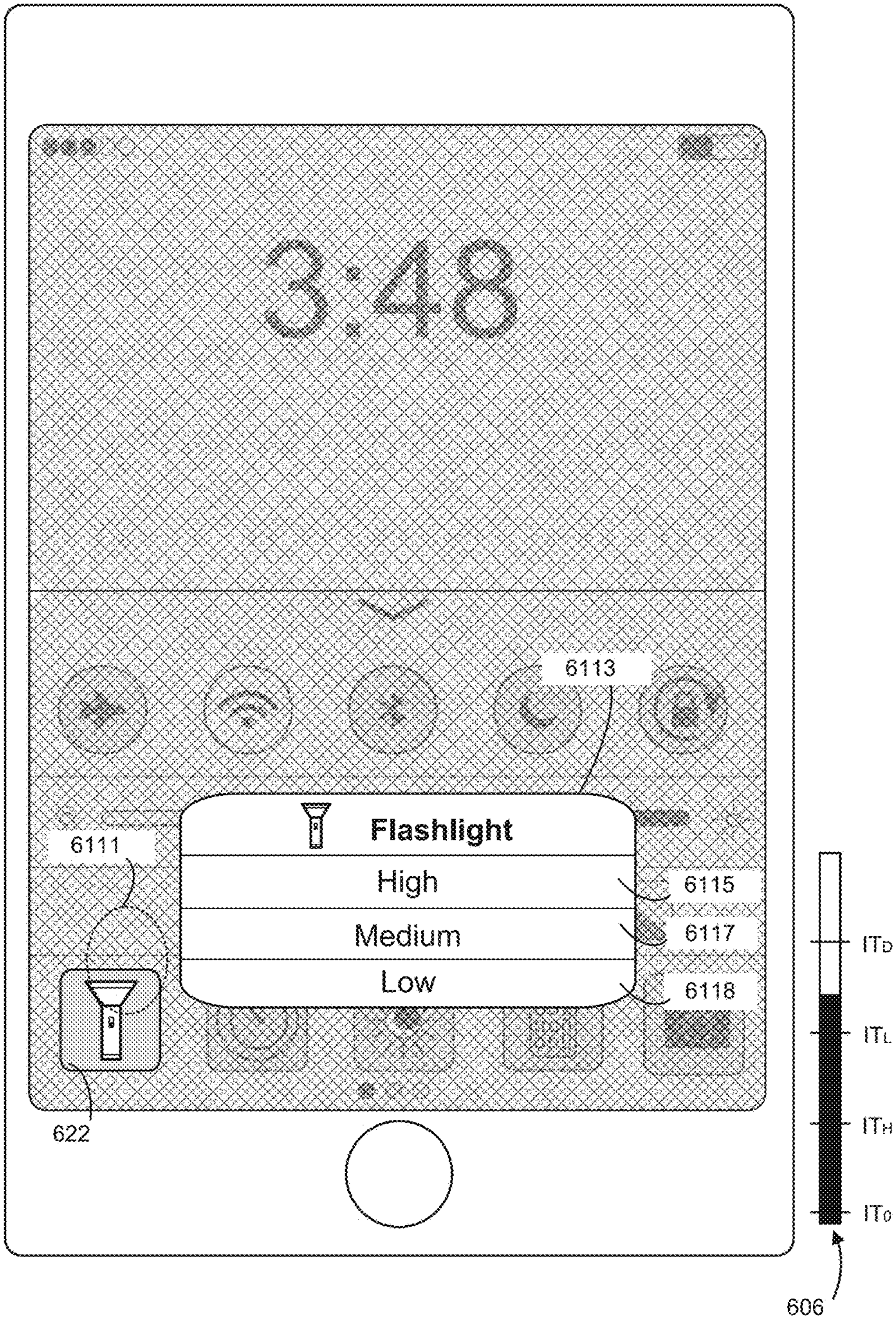
Figure 6X:
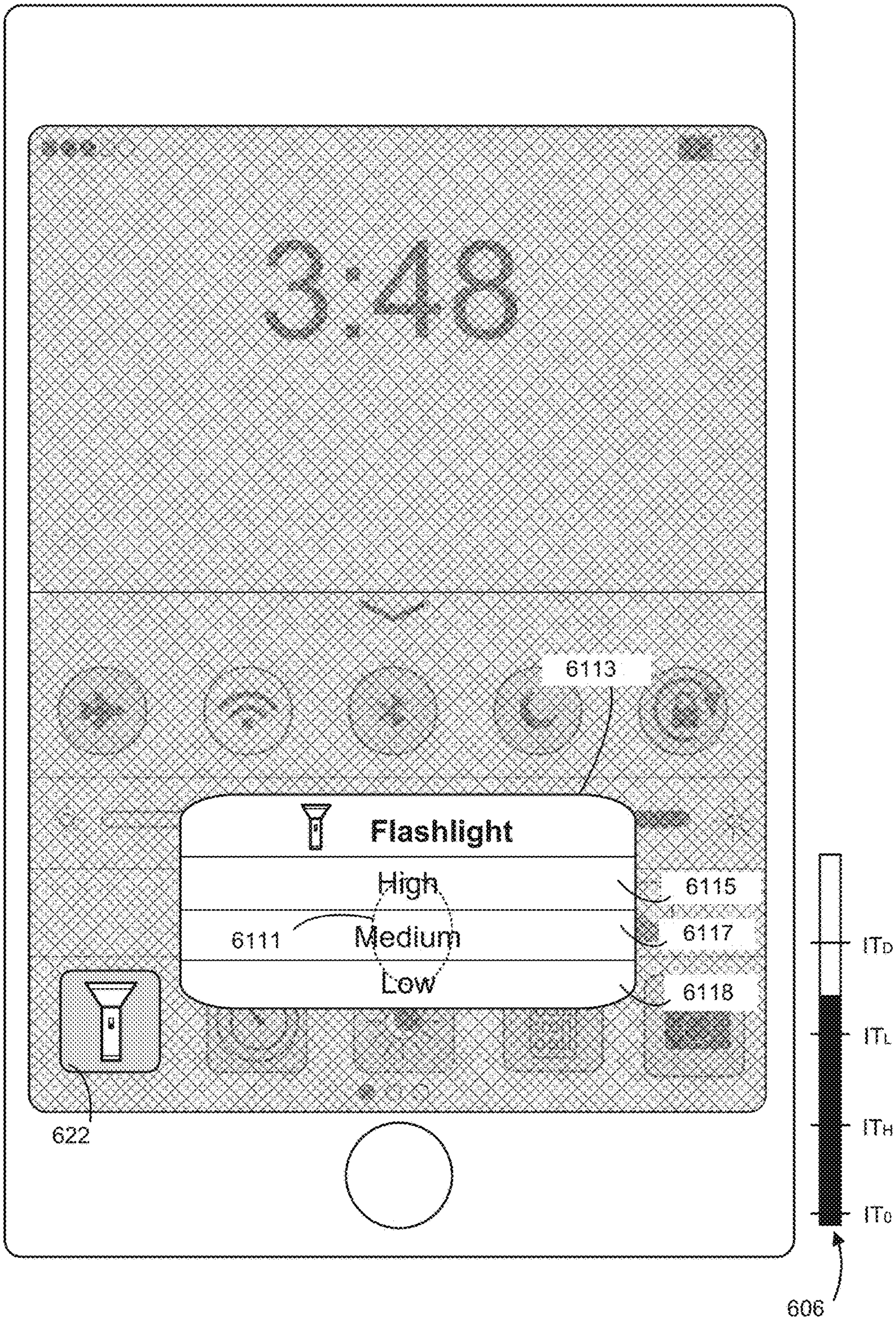
Figure 6Y:
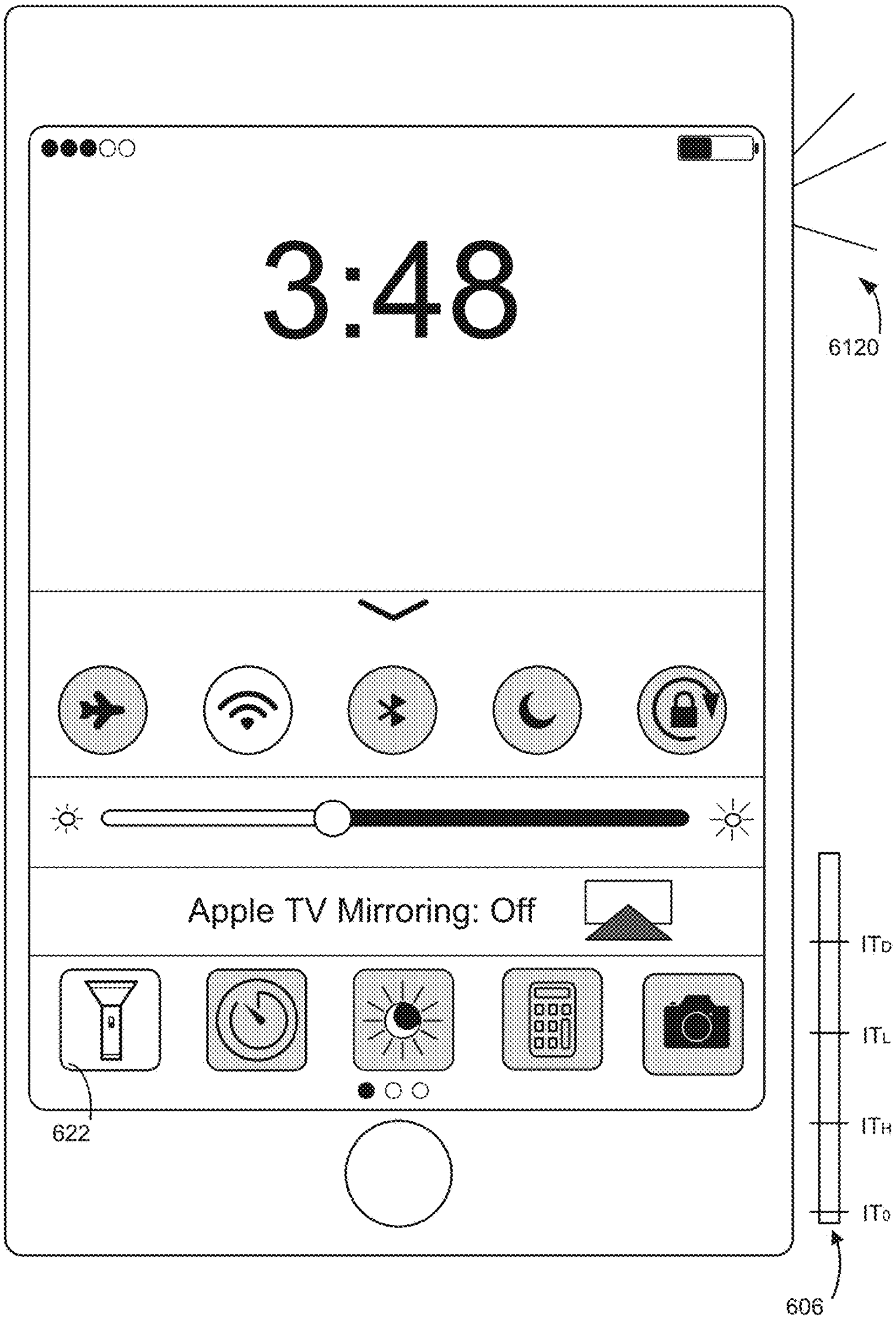

Below, FIGS. 6A-6Y illustrate exemplary user interfaces for modifying the functionality of a control affordance. FIGS. 18A-18D are flow diagrams illustrating a method of modifying the functionality of a control affordance. The user interfaces in FIGS. 6A-6Y are used to illustrate the processes in FIGS. 18A-18D.

Figure 7P:
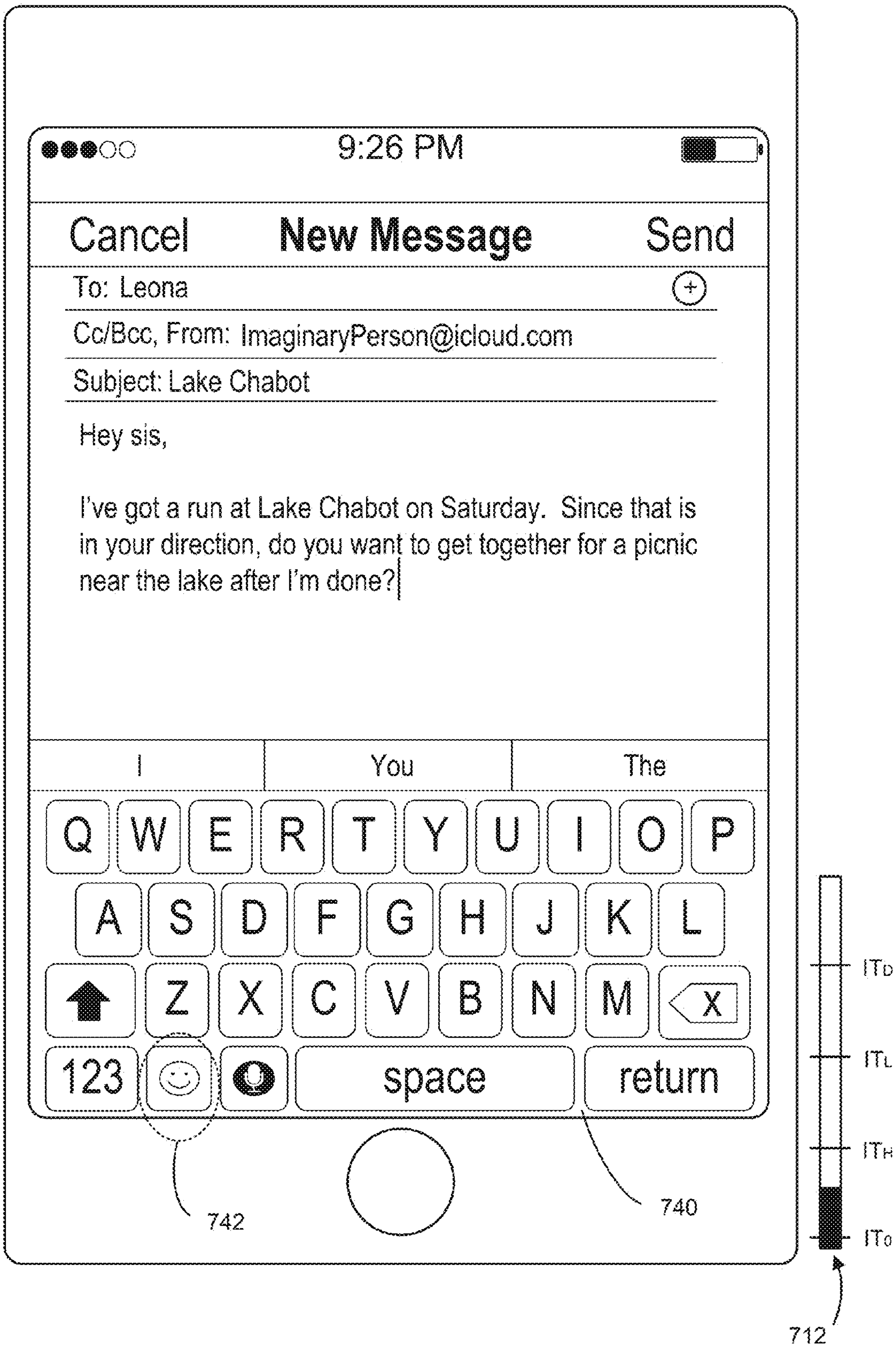
Figure 7Q:
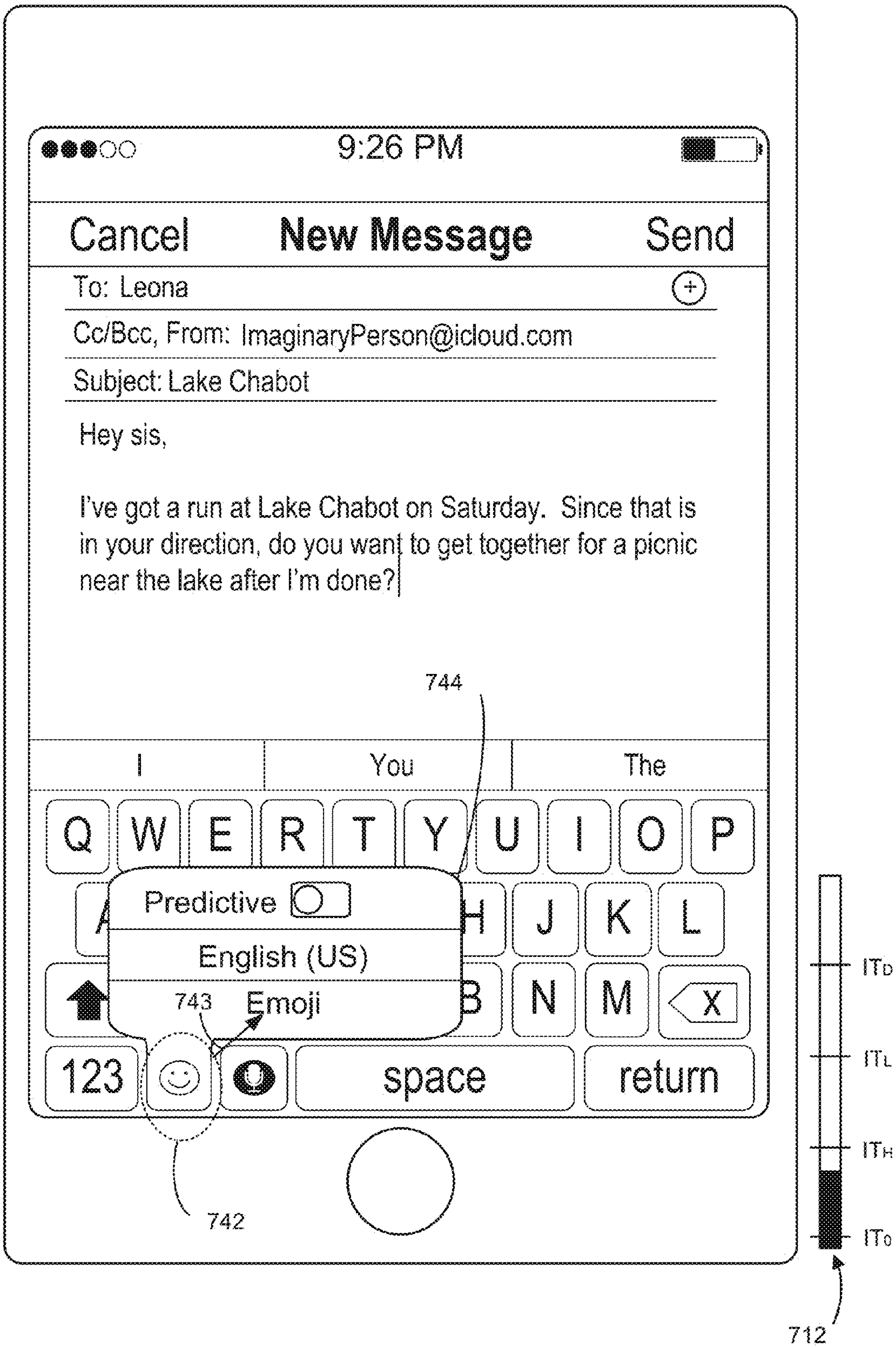
Figure 7R:
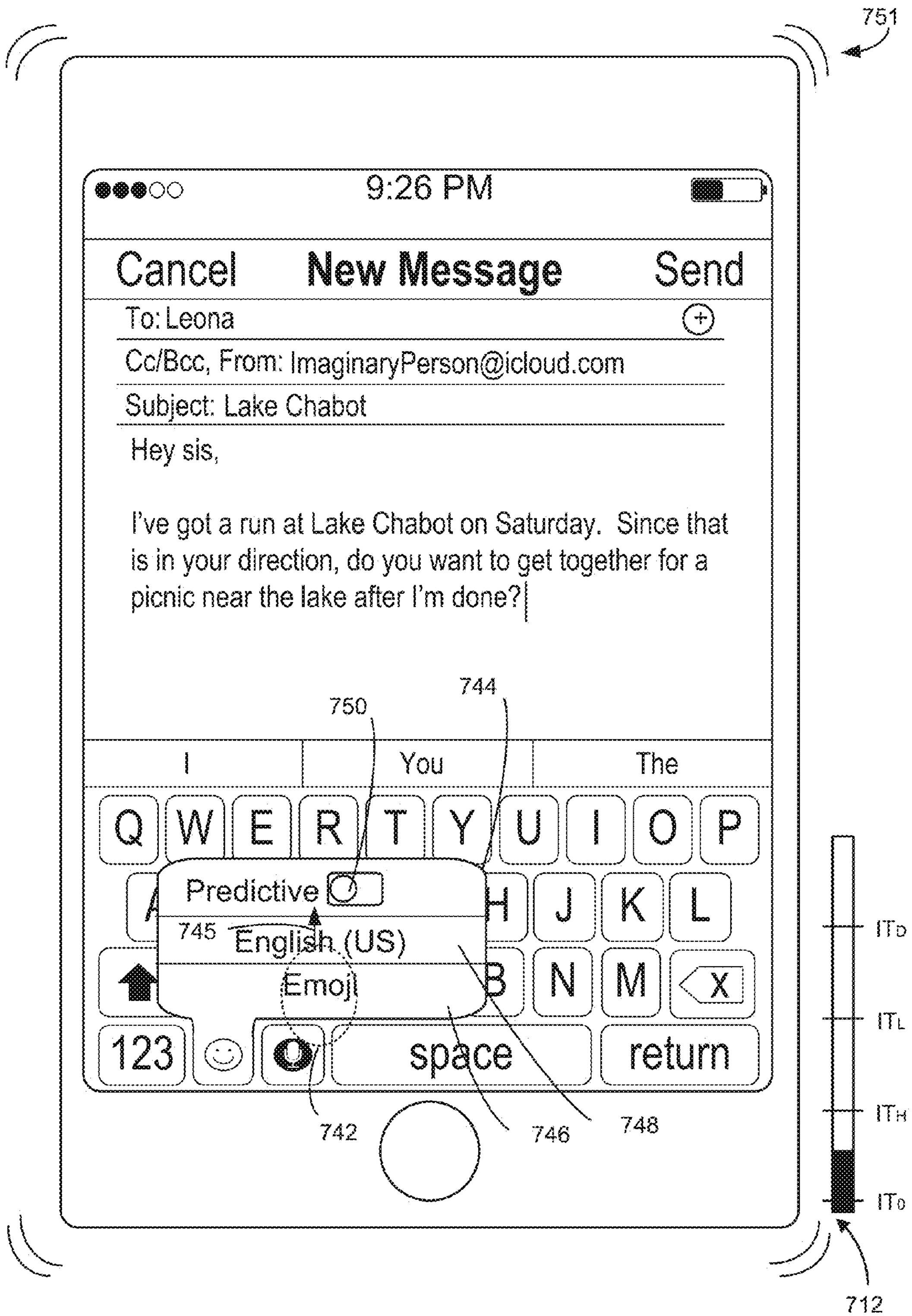
Figure 7S:
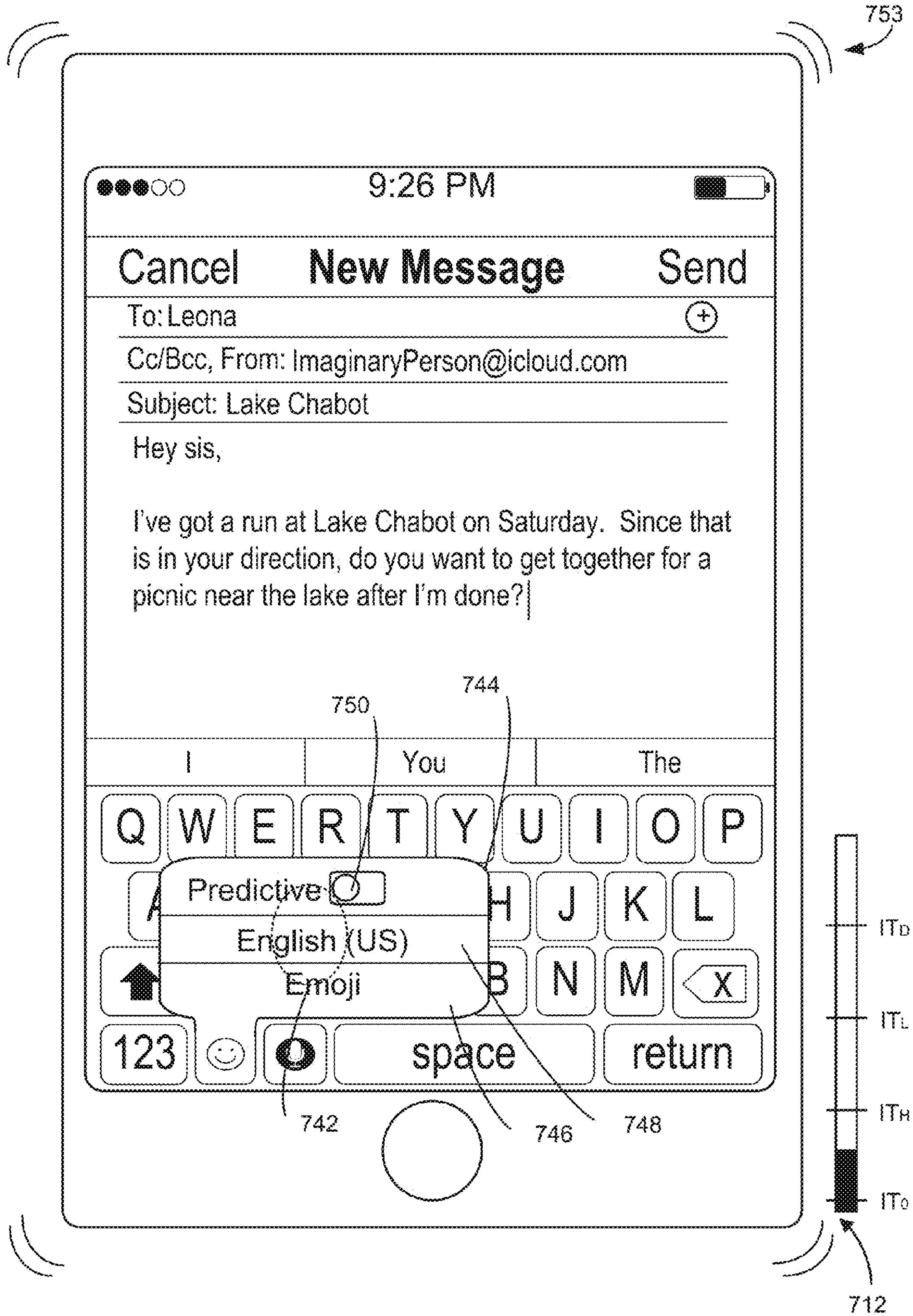
Figure 7T:
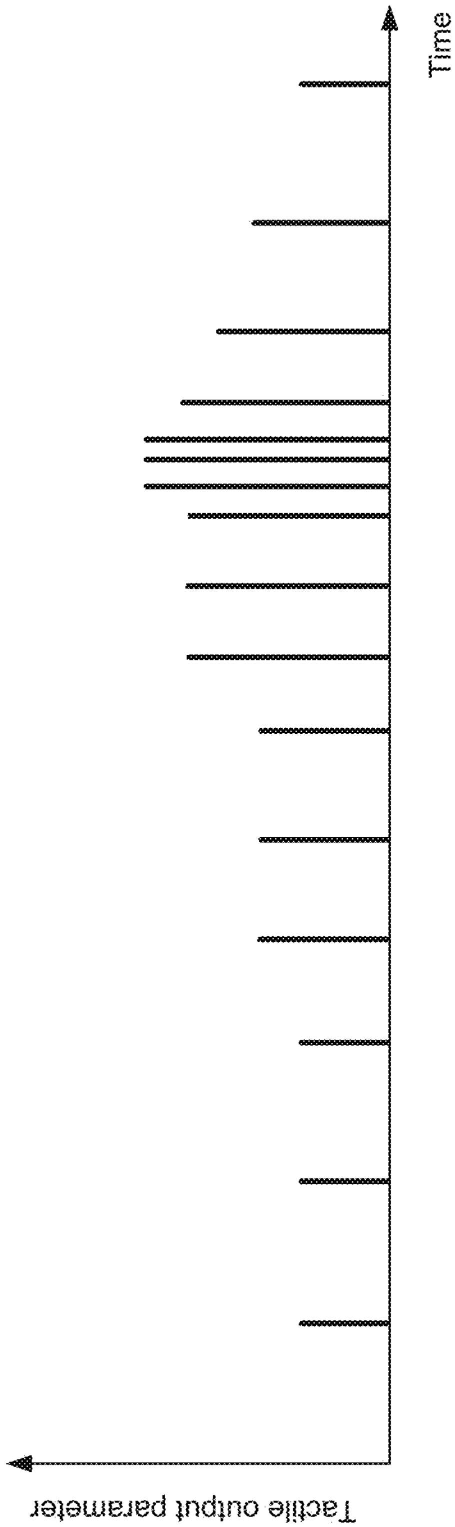
Figure 7U:
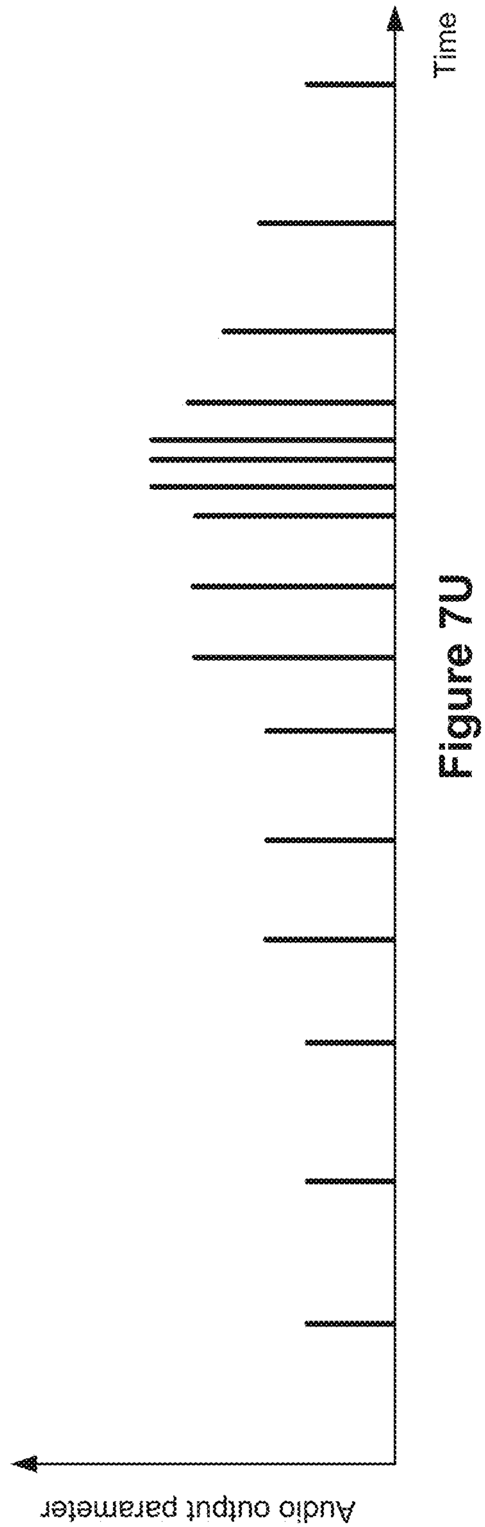
Figure 7V:
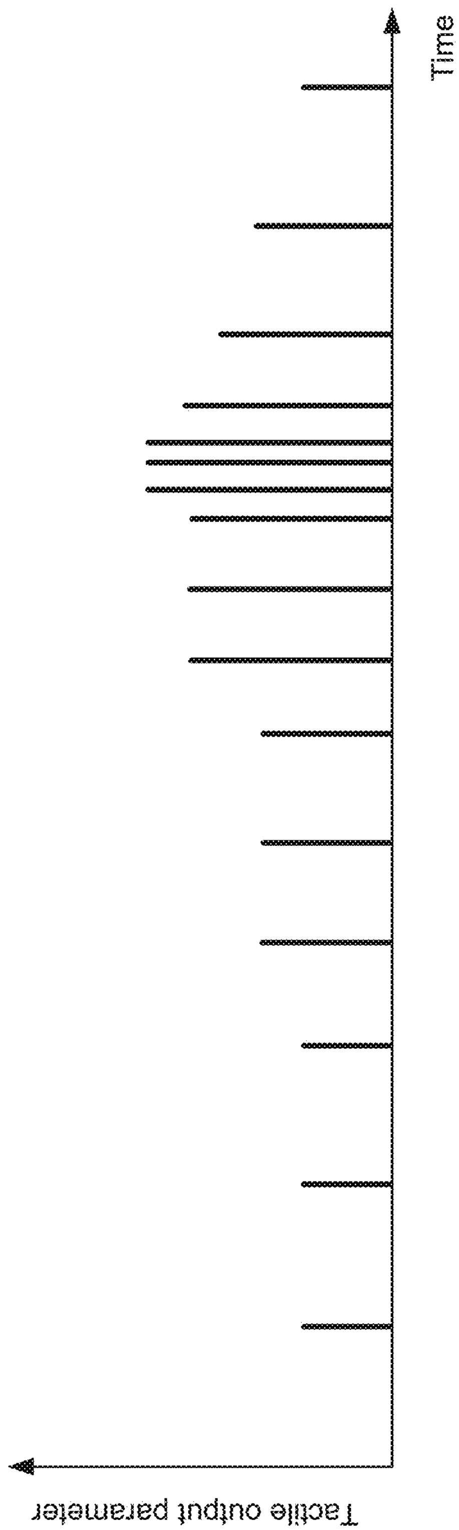
Figure 7W:
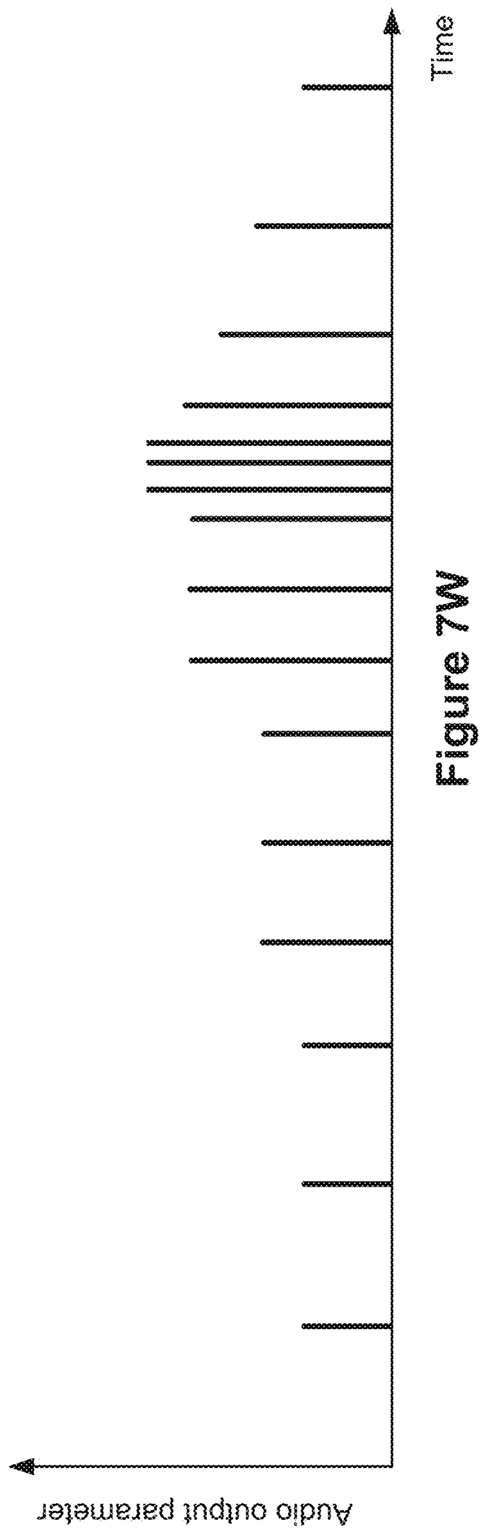

Below, FIGS. 7A-7W illustrate exemplary user interfaces for deleting content. FIGS. 20A-20G are flow diagrams illustrating a method of deleting content. The user interfaces in FIGS. 7A-7W are used to illustrate the processes in FIGS. 20A-20G.

Below, FIGS. 8A-8AI illustrate exemplary user interfaces for detecting input at a messaging interface. FIGS. 22A-22G are flow diagrams illustrating a method of detecting input at a messaging interface. The user interfaces in FIGS. 8A-8AI are used to illustrate the processes in FIGS. 22A-22G.

Figure 24:
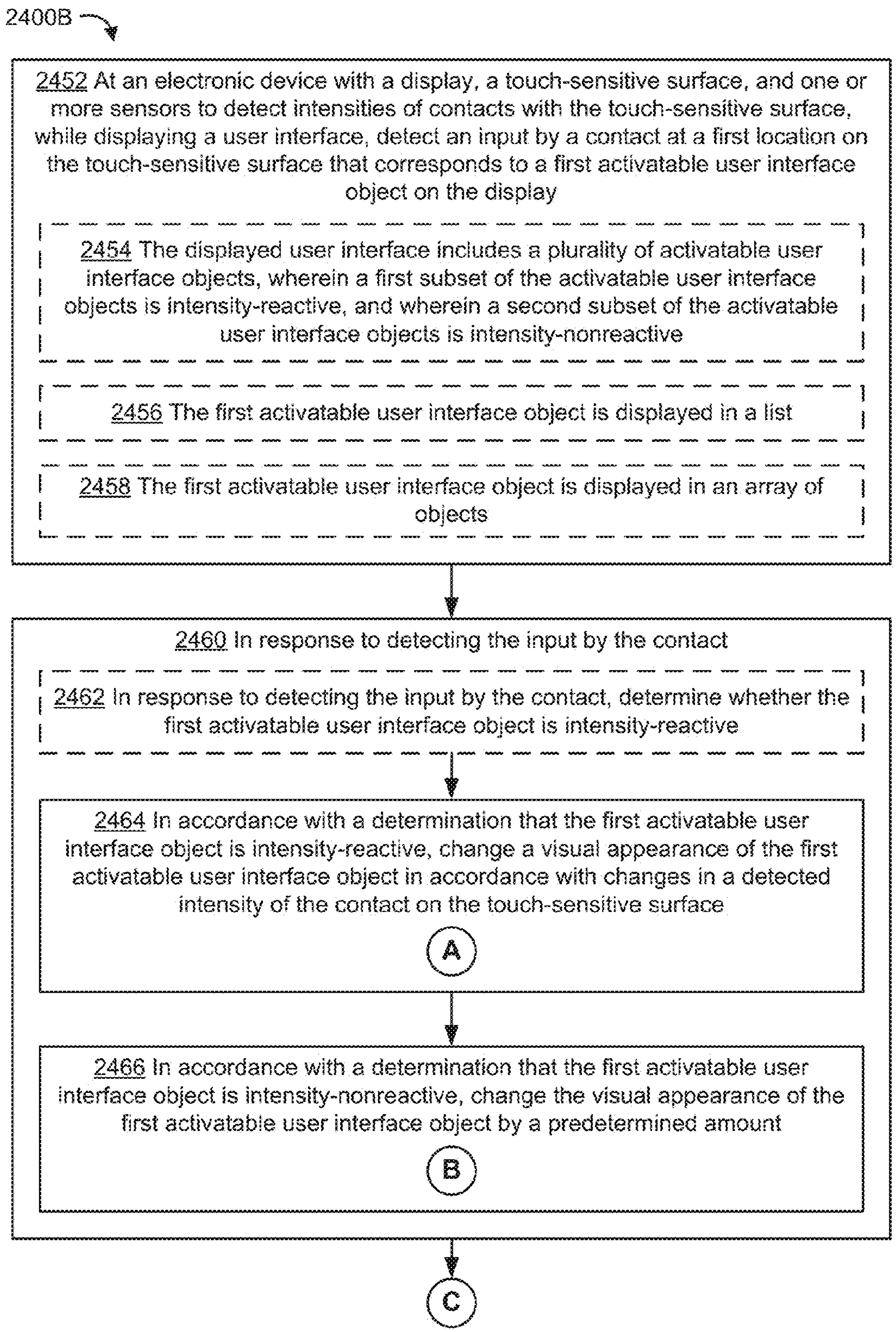
Figure 25:
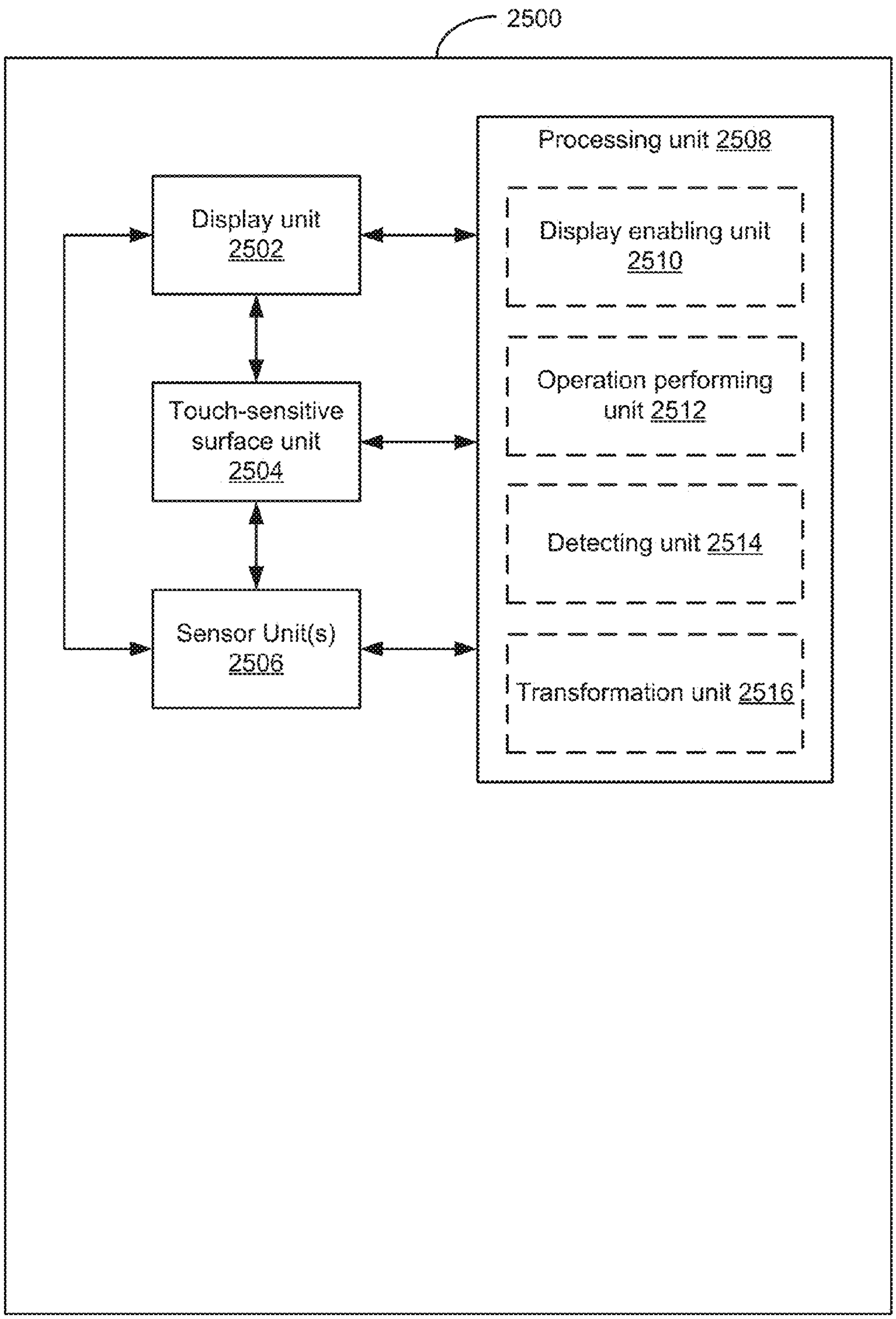

Below FIGS. 9A1-9A25 illustrate exemplary user interfaces for displaying intensity-reactive and intensity-nonreactive user interface objects, in accordance with some embodiments. FIGS. 24A1-24A3 are flow diagrams illustrating a method of displaying intensity-reactive and intensity-nonreactive user interface objects in accordance with some embodiments. FIGS. 24B1-24B3 are flow diagrams illustrating a method of displaying intensity-reactive and intensity-nonreactive user interface objects in accordance with some embodiments. The user interfaces in FIGS. 9A1-9A25 are used to illustrate the processes in FIGS. 24A1-24A3 and 24B1-24B3.

Figure 27:
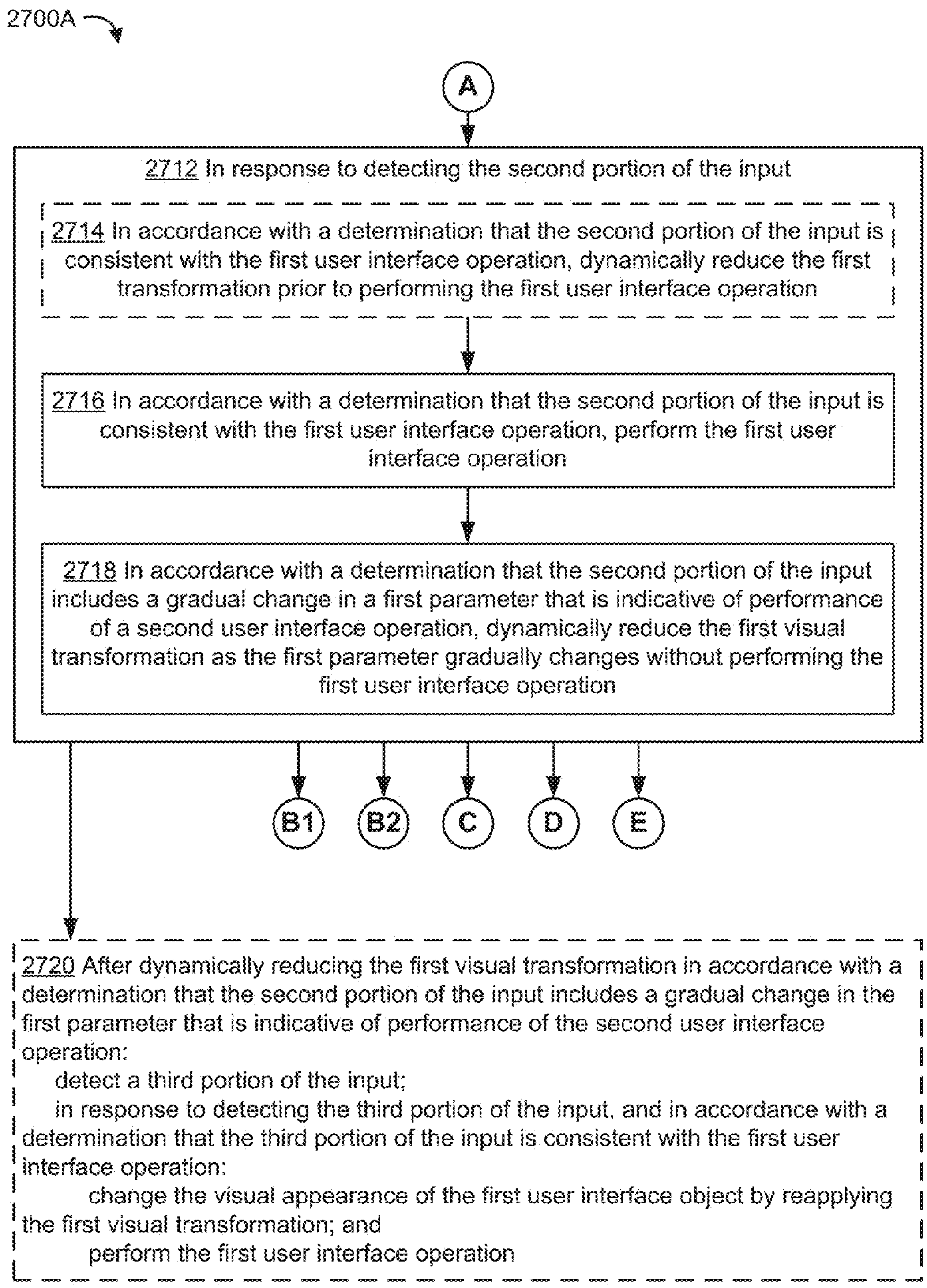

Below FIGS. 9B1-9B10 illustrate exemplary user interfaces for displaying intensity-reactive and intensity-nonreactive user interface objects, in accordance with some embodiments. FIGS. 27A1-27A5 are flow diagrams illustrating a method of displaying intensity-reactive and intensity-nonreactive user interface objects in accordance with some embodiments. FIGS. 27B1-27B3 are flow diagrams illustrating a method of displaying intensity-reactive and intensity-nonreactive user interface objects in accordance with some embodiments. The user interfaces in FIGS. 9B1-9B10 are used to illustrate the processes in FIGS. 27A1-27A5 and 27B1-27B3.

Figure 19:
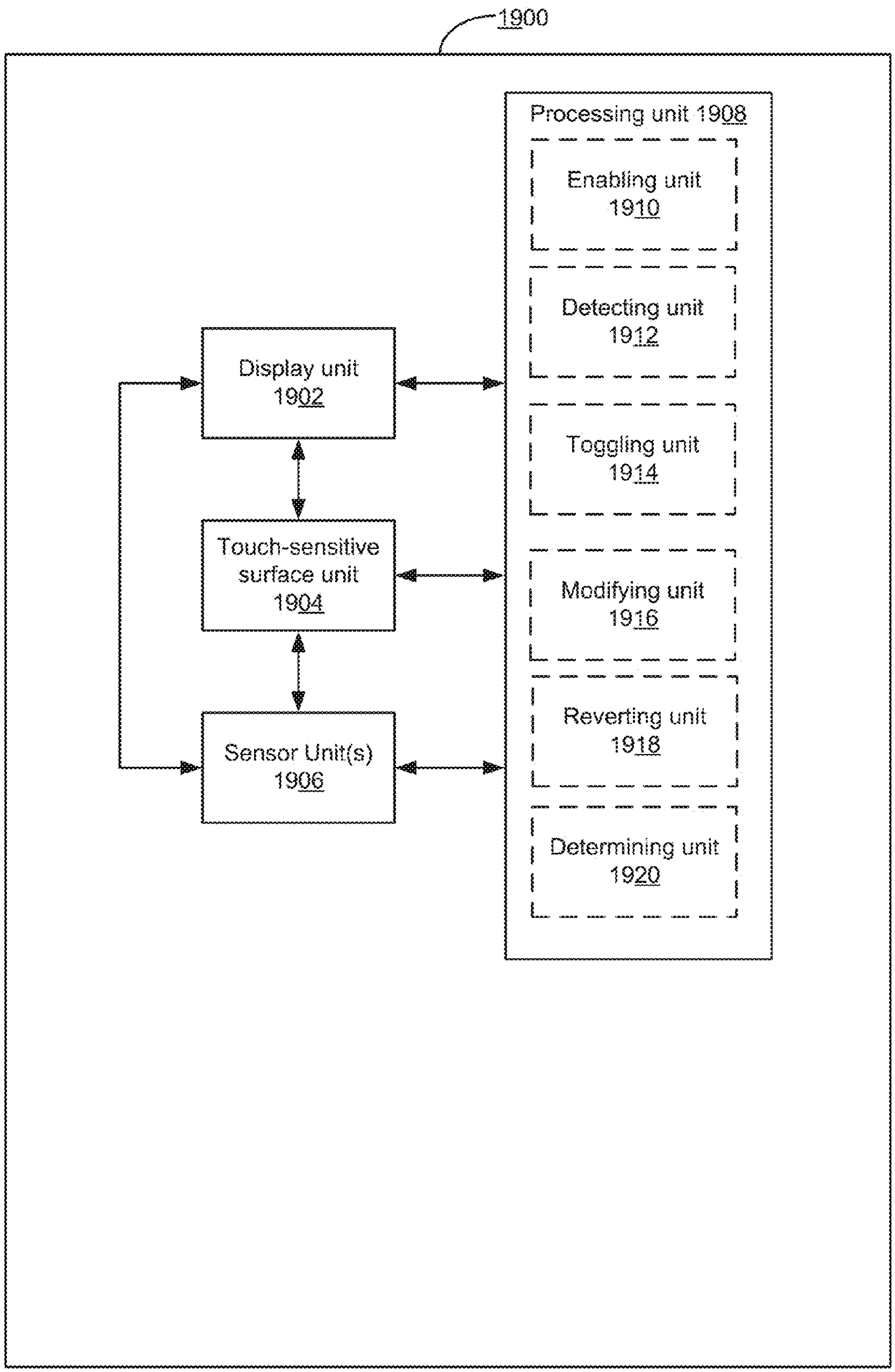
Figure 20F:
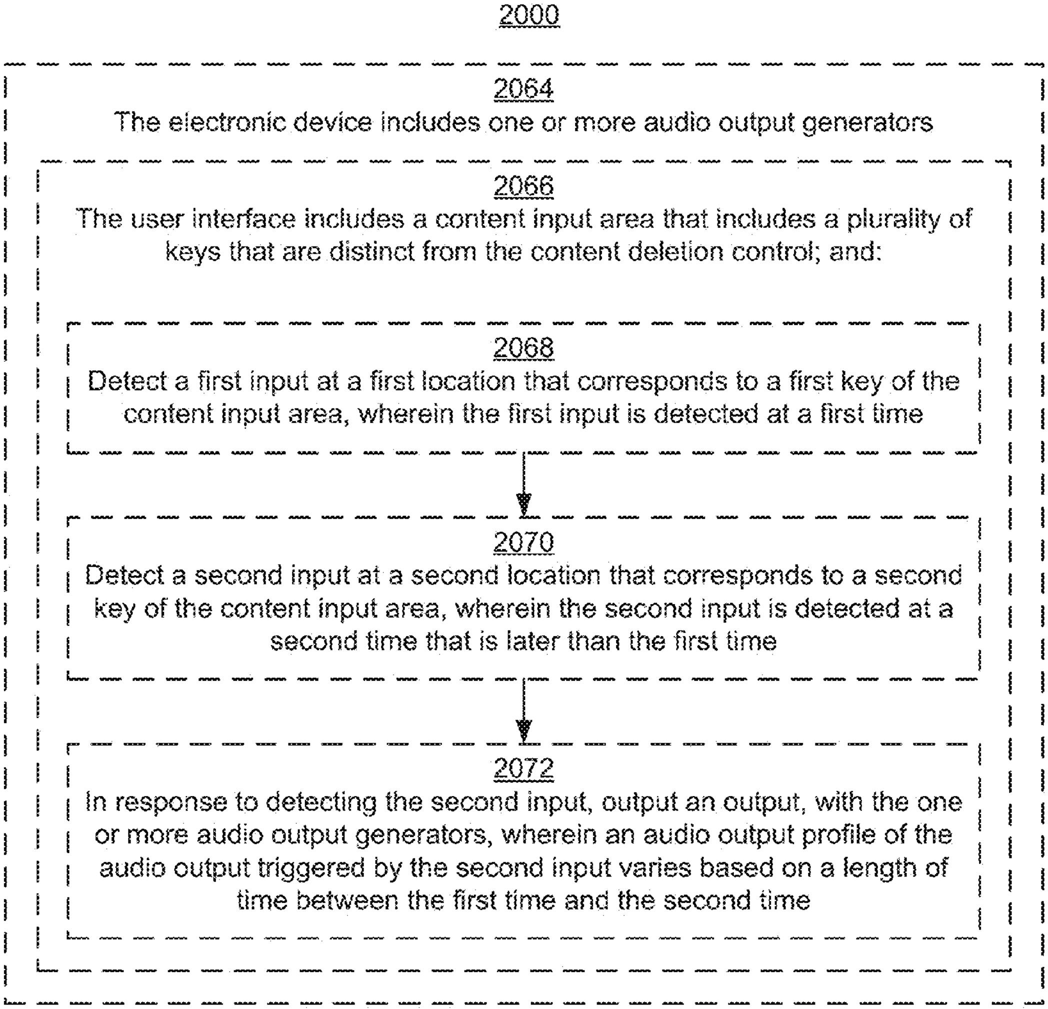

FIGS. 9C1-9C19 illustrate exemplary user interfaces for displaying control settings interfaces for control functions for remote devices, in accordance with some embodiments. FIGS. 30A-30E are flow diagrams illustrating a method of displaying control settings interfaces for control functions for remote devices in accordance with some embodiments. The user interfaces in FIGS. 9C1-9C19 are used to illustrate the processes in FIGS. 30A-30E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy input criteria that are configured to be met even when the characteristic intensity of a contact does not satisfy a given intensity threshold. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is configured to detect a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are independent of intensities of contacts included in the gesture. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that gesture recognition criteria are configured to be met when a contact in a gesture has an intensity below a respective intensity threshold means that the gesture recognition criteria are capable of being satisfied even if the contact(s) in the gesture do not reach the respective intensity threshold. It should be understood, however, that this statement does not preclude the gesture recognition criteria from being satisfied in circumstances where one or more of the contacts in the gesture do reach or exceed the respective intensity threshold. For example, a tap gesture is configured to be detected if the finger-down and finger-up event are detected within a predefined time period, without regard to whether the contact is above or below the respective intensity threshold during the predefined time period, and a swipe gesture is configured to be detected if the contact movement is greater than a predefined magnitude, even if the contact is above the respective intensity threshold at the end of the contact movement.

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria are configured to be met when a contact in a gesture has an intensity below a respective intensity threshold does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which are configured to be met when a gesture has an intensity below a respective intensity threshold—are in competition with second gesture recognition criteria for a second gesture—which are dependent on the gesture reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture are still configured to be met when a contact in the gesture has an intensity below the respective intensity because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that are configured to be met when an intensity of a contact remains below a respective intensity threshold will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MIMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MIMS and/or an Enhanced Messaging Service (EMS). As used herein, "instant messaging" refers to both telephony-based messages (e.g., messages sent using SMS or MIMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
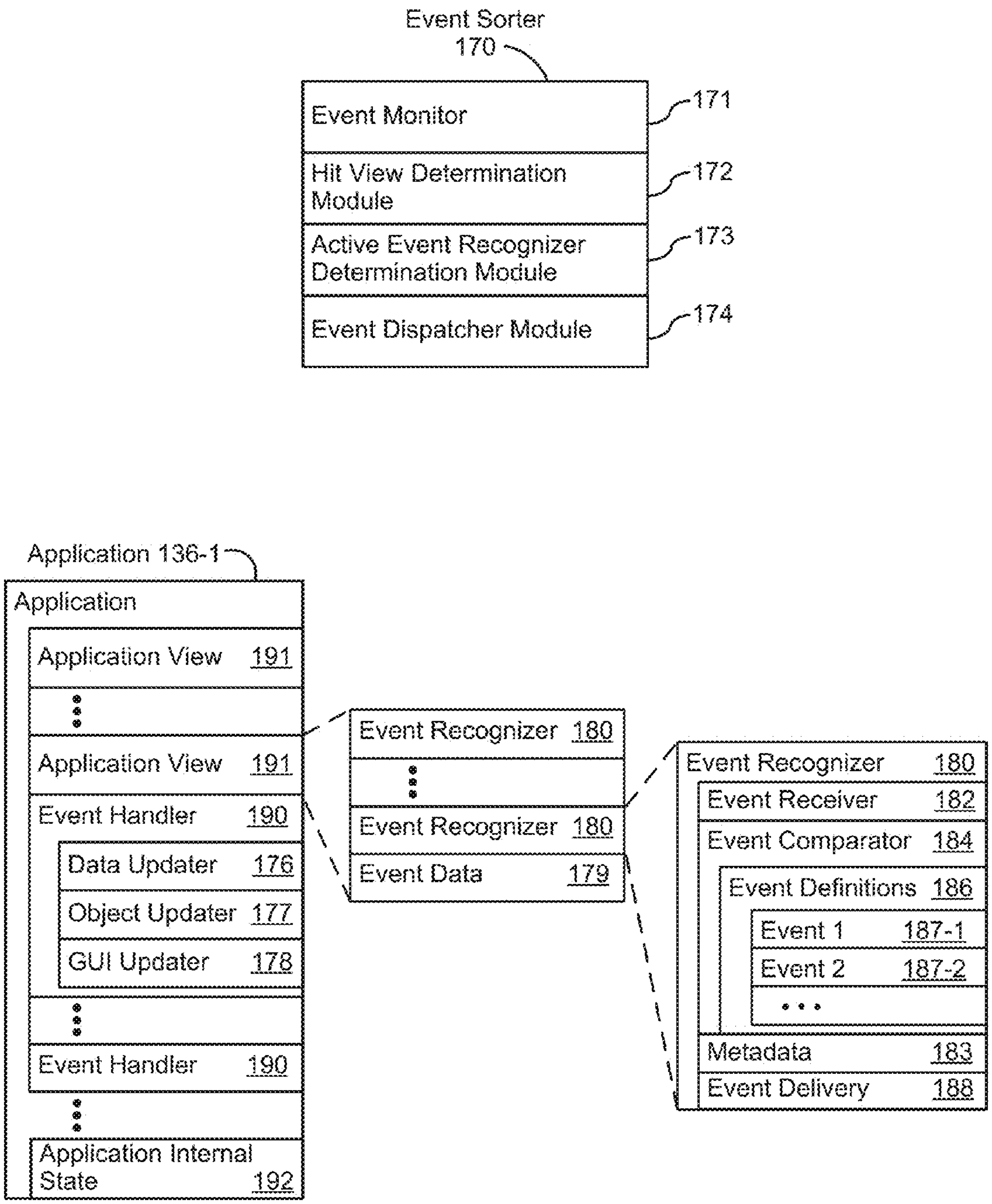
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser," and
  - Icon 422 for video and music player module 152, also referred to as iPod (trademark of Apple Inc.) module 152, labeled "iPod," and
- Icons for other applications, such as:
  - Icon 424 for IM module 141, labeled "Messages,"
  - Icon 426 for calendar module 148, labeled "Calendar,"
  - Icon 428 for image management module 144, labeled "Photos,"
  - Icon 430 for camera module 143, labeled "Camera,"
  - Icon 432 for online video module 155, labeled "Online Video,"
  - Icon 434 for stocks widget 149-2, labeled "Stocks,"
  - Icon 436 for map module 154, labeled "Map,"
  - Icon 438 for weather widget 149-1, labeled "Weather,"
  - Icon 440 for alarm clock widget 149-4, labeled "Clock,"
  - Icon 442 for workout support module 142, labeled "Workout Support,"
  - Icon 444 for notes module 153, labeled "Notes," and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A1-5I9 illustrate example user interfaces for interacting with a notification associated with a respective application (e.g., to access a subset of functions and content of the respective application from the notifications without having to first activate the respective application), in accordance with some embodiments. An input on a notification either launches the respective application associated with the notification or causes an expanded version of the notification to be displayed to provide a subset of content and/or functionality from the respective application to the user without first launching the application, in accordance with some embodiments.

FIGS. 5A1-5A6 illustrate various example user interfaces on which notifications are presented in accordance with some embodiments.

FIG. 5A1 illustrates wake screen user interface 5002 that is displayed when device 100 is activated from a screen-off state (e.g., a sleep state) to a screen-on state (e.g., a wake state) in an unlocked mode (e.g., as indicated by the "unlocked" indicator 5004). A number of notifications (e.g., notification 5006 for a calendar invitation, notification 5008 for a new instant message, and notification 5010 for a voicemail message) are displayed on the wake screen user interface 5002. Each notification includes notification content (e.g., an excerpt from a communication, a summary of an event or communication, etc.) and identifying information that identifies a respective application that corresponds to the notification.

FIG. 5A2 illustrates wake screen user interface 5012 that is displayed when device 100 is activated from a screen-off state (e.g., a sleep state) to a screen-on state (e.g., a wake state) in an locked mode (e.g., as indicated by the "locked" indicator 5014). A number of notifications (e.g., notification 5016 for a calendar invitation, notification 5018 for a new instant message, and notification 5020 for a voicemail message) are displayed on the wake screen user interface 5012. Each notification includes notification content (e.g., an excerpt from a communication, a summary of an event or communication, etc.) and identifying information that identifies a respective application that corresponds to the notification. In some embodiments, device 100 displays a first version of a notification (e.g., notification 5006, or notification 5008) with more notification content when the device is in the unlocked mode (as shown in FIG. 5A1), and displays a second version of the notification (e.g., notification 5016, or notification 5018) with less notification content when the device is in the locked mode (e.g., as shown in FIG. 5A2).

FIG. 5A3 illustrates a notification (e.g., banner 5022 for a new e-mail message) that is displayed over home screen user interface 5024 (e.g., analogous to home screen user interface 400 shown in FIG. 4A).

FIG. 5A4 illustrates notification screen 5026 (e.g., a notification center user interface) displayed while device 100 is in a locked mode (e.g., as indicated by "locked" indicator 5014). A number of notifications (e.g., notifications 5028 and 5030 for two new instant messages, notification 5032 for a new voicemail, and notification 5034 for a new email message) are displayed in a vertical stack on notification screen 5026.

FIG. 5A5 illustrates notification screen 5036 (e.g., a notification center user interface) displayed while device 100 is in an unlocked mode (e.g., as indicated by "unlocked" indicator 5004). A number of notifications (e.g., notifications 5038 and 5040 for two new instant messages, notification 5042 for a new voicemail, and notification 5044 for a new email message) are displayed in a vertical stack on notification screen 5036. Each notification includes notification content (e.g., an excerpt from a communication, a summary of an event or communication, etc.) and identifying information that identifies a respective application that corresponds to the notification. In some embodiments, device 100 displays a first version of a notification (e.g., notification 5028, notification 5030, or notification 5034) with less notification content when the device is in the locked mode (e.g., as shown in FIG. 5A4) and displays a second version of a notification (e.g., notification 5038, notification 5040, or notification 5044) with more notification content when the device is in the unlocked mode (as shown in FIG. 5A5). In FIG. 5A5, notification 5038 for an instant message (displayed while the device is in the unlocked mode) includes a thumbnail image 5046 for an image attachment included in the instant message, in addition to textual content of the instant message.

FIG. 5A6 illustrates a notification (e.g., alert 5048) that is displayed over a user interface of an application (e.g., application user interface 5050). An alert is a type of notification that requests a user to perform an action (e.g., to confirm a ride request, or cancel the ride request). An alert is also used sometimes when user's immediate attention is requested (e.g., when a failure has been detected (e.g., failure to connect to a peripheral device or a server), or when a task requested by a user has not been successfully completed (e.g., failure to send a message)).

FIGS. 5B1-5B4 illustrate a process for launching an application from a notification associated with the application (e.g., in response to a tap input on the notification), in accordance with some embodiments.

FIG. 5B1 illustrates notification screen 5026 displaying a number of notifications (e.g., notifications 5028, 5030, 5032, and 5034) while device 100 is in the locked state.

FIG. 5B2 illustrates that a contact (e.g., contact 5052) is detected on notification 5028; and in response to the detection of the contact, notification 5028 is selected.

FIGS. 5B3-5B4 illustrate that, when a characteristic intensity of contact 5052 (as indicated by the "intensity of contact" in the intensity meter illustrated next to device 100 in the Figures) does not increase above a predetermined threshold intensity (e.g., the hint intensity threshold $IT_H$) before lift-off of the contact is detected, device 100 initiates a process to launch an instant messaging application (e.g., the Messages app) corresponding to notification 5028.

FIG. 5B3 illustrates that, upon detecting lift-off of contact 5052, device 100 darkens notification screen 5026 and displays an authentication user interface (e.g., password user interface 5054) over the darkened notification screen 5026.

FIG. 5B4 illustrates that, upon receiving the correct authentication information from password user interface 5054, device 100 is unlocked. In the unlocked mode, device 100 launches the Messages application and displays a user interface of the Messages application (e.g., conversation screen 5056). The user interface (e.g., conversation screen 5056) includes the content of the notification (e.g., message text (e.g., text of message 5062), sender name "Alice") and additional content (e.g., one or more previous messages between Alice and the user (e.g., message 5060), and an image (e.g., image 5058) that corresponds to an image attachment included in message 5062)).

FIGS. 5C1-5C6 illustrate a process for displaying a second version of a notification with expanded notification content in response to an input (e.g., a press input) on a first version of the notification with standard notification content, in accordance with some embodiments.

FIG. 5C1 shows the same notification screen as FIG. 5B1. In FIG. 5C1, notification screen 5026 displaying a number of notifications (e.g., notifications 5028, 5030, 5032, and 5034) while device 100 is in the locked state.

FIG. 5C2 illustrates that a contact (e.g., contact 5064) is detected on notification 5028, and in response to the detection of the contact, notification 5028 is selected.

FIGS. 5C3 and 5C4 illustrate that, once the characteristic intensity of contact 5064 increases above a predetermined threshold intensity (e.g., a hint intensity threshold $IT_H$), device 100 applies dynamic changes to the user interface in accordance with a current value of the characteristic intensity. For example, device 100 dynamically increases (or decreases) the amount of blurring and darkening applied to notification screen 5026 in accordance with the increase (or decrease) in the characteristic intensity of contact 5064, while notification 5028 is overlaid on top of the blurred and darkened notification screen 5026. As shown in FIGS. 5C3 and 5C4, as contact intensity is increased within the range $IT_H$ and a first higher intensity threshold (e.g., a light press intensity threshold $IT_L$), the amount of blurring and darkening applied to notification screen 5026 is increased accordingly. Before the characteristic intensity of contact 5064 crosses the first higher intensity threshold (e.g., $IT_L$), lift-off of the contact returns the user interface to its original state (e.g., the state shown in FIG. 5C1).

FIG. 5C5 illustrates that, once the characteristic intensity of contact 5064 exceeds the first intensity threshold (e.g., light press intensity threshold $IT_L$), an expanded version of the notification (e.g., notification 5066) is displayed over the blurred and darkened notification screen 5026. In addition, in some embodiments, the appearance of notification screen 5026 is maintained (e.g., does not change in accordance with the current characteristic intensity of contact 5064) once the characteristic intensity has exceeded the first intensity threshold for the first time. As shown in FIG. 5C5, the expanded version of the notification (e.g., notification 5066) includes content from the initially displayed version of the notification (e.g., notification 5028) and additional functions (e.g., selectable options for performing actions with respect to the notification or the application) and/or content that is not included in the initially displayed version of the notification. For example, notification 5066 includes "Reply" button 5068 for launching a "Reply" user interface for composing a reply to the message represented in the notification, and "Delete" button 5070 for deleting the message represented in the notification. Notification 5066 optionally includes a preview of an image attachment from the message represented in the notification.

FIG. 5C6 illustrates that the expanded notification (e.g., notification 5066) remains displayed on the blurred and darkened notification screen after lift-off of contact 5064 is detected. Another input (e.g., a tap input) subsequently detected on the expanded notification (e.g., notification 5066) outside areas occupied by buttons 5068 and 5070 starts a process for launching the Messages application (e.g., as illustrated in FIGS. 5B3 and 5B4).

FIGS. 5D1-5E4 illustrate a process in which movement of the contact beyond a threshold distance cancels the display of expanded notification, in accordance with some embodiments.

FIG. 5D1 shows the same notification screen as FIGS. 5B1 and 5C1. In FIG. 5D1, notification screen 5026 displaying a number of notifications (e.g., notifications 5028, 5030, 5032, and 5034) while device 100 is in the locked state.

FIG. 5D2 illustrates that a contact (e.g., contact 5072) is detected on notification 5028, and in response to the detection of the contact, notification 5028 is selected.

FIGS. 5D3 and 5D4 illustrate that, once the characteristic intensity of contact 5072 increases above a predetermined threshold intensity (e.g., a hint intensity threshold $IT_H$), device 100 applies dynamic changes to the user interface in accordance with a current value of the characteristic intensity. For example, device 100 dynamically increases (or decreases) the amount of blurring and darkening applied to notification screen 5026 in accordance with the increase (or decrease) in the characteristic intensity of contact 5072, while notification 5028 is overlaid on top of the blurred and darkened notification screen 5026. As shown in FIGS. 5D3 and 5D4, as contact intensity is increased within the range $IT_H$ and a first higher intensity threshold (e.g., a light press intensity threshold $IT_L$), the amount of blurring and darkening applied to notification screen 5026 is increased accordingly. Before the characteristic intensity of contact 5072 crosses the first intensity threshold, lift-off of the contact returns the user interface to its original state (e.g., the state shown in FIG. 5D1).

FIG. 5D5 illustrates that, before the characteristic intensity of contact 5072 crosses the first intensity threshold, movement of contact 5072 is detected. When the amount of movement is less than a first movement threshold (e.g., 10 pixels), device 100 continues to dynamically vary the amount of blurring and darkening applied to notification screen 5026 in accordance with a current value of the characteristic intensity of contact 5072. For example, the amount of blurring and darkening is greater in the notification screen 5026 in FIG. 5D5 as compared to the notification screen 5026 in FIG. 5D4.

FIG. 5D6 illustrates that, as soon as the amount of movement made by contact 5072 is more than the first movement threshold, device cancels the hint effects (e.g., the blurring and darkening of notification screen 5026) provided in accordance the current contact intensity, and notification screen 5026 is restored to its original clarity and brightness. In addition, device 100 recognizes the gesture provided by contact 5072 as a drag gesture. Accordingly, device 100 moves notification 5028 in accordance with movement of contact 5072 (e.g., notification 5072 is dragged to the left by contact 5072). As shown in FIG. 5D6, although intensity of contact 5072 is greater than the first intensity threshold (e.g., $IT_L$), an expanded version of the notification is not presented (e.g., in contrast to the case illustrated in FIG. 5C5).

FIG. 5D6 illustrates that, as contact 5072 continues to move, notification 5028 is dragged further to the left and a quick response action affordance (e.g., "Delete" affordance 5074) is revealed from behind notification 5028.

As illustrated in FIGS. 5D6-5D7, once a threshold amount of movement by contact 5072 has been detected, the user interface does not respond to further changes in the characteristic intensity of contact 5072 and/or the characteristic intensity meeting the first intensity threshold.

FIG. 5D8 shows that, after the quick response action affordance ("Delete" affordance 5074) has been revealed, the quick response action affordance, and optionally, notification 5028 along with the rest of notification screen 5026 remains displayed after lift-off of contact 5072 is detected. Selection of "Delete" affordance 5074 by another input (e.g., a tap input) causes deletion of notification 5028 and/or the message represented in notification 5028.

Although not illustrated in FIGS. 5D5-5D8, movement of contact 5072 in the reverse direction (e.g., from left to right) after dragging notification 5028 and revealing "Delete" affordance 5074 returns notification 5028 to its original location and hides "Delete" affordance 5074 again. In addition, although not illustrated in FIGS. 5D5-5D8, movement of contact 5072 in the reverse direction (e.g., from left to right) that is started while notification 5028 is at its original location drags notification 5072 to the right and reveals a different quick response action affordance (e.g., a "Flag" affordance, or a "Reply" affordance).

FIGS. 5E1-5E4 illustrates movement of contact 5072 in a vertical direction. FIG. 5E1 continues from FIG. 5D3 and is the same as FIG. 5D4.

In FIGS. 5E1-5E2, before the characteristic intensity of contact 5072 crosses the first intensity threshold, movement of contact 5072 in the vertical direction is detected (e.g., as shown in FIG. 5E2). When the amount of movement is less than a second movement threshold (e.g., 10 pixels or another threshold number of pixels), device 100 continues to dynamically vary the amount of blurring and darkening of notification screen 5026 in accordance with a current value of the characteristic intensity of contact 5072.

FIG. 5E3 illustrates that, as soon as the amount of movement made by contact 5072 is more than the second movement threshold, device cancels the hint effects (e.g., the blurring and darkening of notification screen 5026) provided in accordance the current contact intensity, and notification screen 5026 is restored to its original clarity and brightness. In addition, device 100 recognizes the gesture provided by contact 5072 as a scroll gesture. Accordingly, device 100 scrolls notification screen 5026 in accordance with movement of contact 5072 (e.g., notification 5028 along with other notifications in notification screen 5026 are scrolled upward by contact 5072). As shown in FIG. 5E3, although intensity of contact 5072 is greater than the first intensity threshold (e.g., $IT_L$), an expanded version of the notification is not presented (e.g., in contrast to the case illustrated in FIG. 5C5).

As illustrated in FIGS. 5E1-5E3, once a threshold amount of movement has been detected, the user interface does not respond to further changes in the characteristic intensity of contact 5072 and/or the characteristic intensity meeting the first intensity threshold.

FIG. 5E4 shows that, after notification screen 5026 has been scrolled, notification screen 5026 remains in the scrolled state after lift-off of contact 5072 is detected.

Although not illustrated in FIGS. 5E1-5E4, movement of contact 5072 in the reverse direction (e.g., in the downward direction) after scrolling the notification screen upward scrolls the notification screen downward again.

In addition, in some embodiments (not shown in FIGS. 5E1-5E4), instead of scrolling the entire notification screen, movement of contact 5072 scrolls the notification content within notification 5028. In some embodiments (not shown in FIGS. 5E1-5E4), scrolling of notification content is prioritized before scrolling of the notification screen. In other words, movement of the contact scrolls the notification content first, and if movement of the contact continues when no more notification content can be scrolled in accordance with the movement of the contact, then scrolling of the notification screen is started.

In some embodiments (not shown in FIGS. 5E1-5E4), when the touch-down location of a contact is within a notification, movement of the contact only scrolls the notification content. In such embodiments, the scrolling of the notification screen occurs when the initial touch-down location of a contact is outside of the content region of a notification (e.g., outside of a notification, on the header portion of a notification, or outside or straddling the boundary of the notification screen) and the contact moves vertically within the notification screen.

Although the examples shown in FIGS. 5D1-5E4 are illustrated with a notification shown when device 100 is in a locked mode, cancelation of the hint states (e.g., the blurring and darkening of the background user interface) and dragging of the notification and/or scrolling of the background user interface in accordance with movement of the contact applies to a notification (e.g., a notification that includes restricted notification content) that is shown when device 100 is in an unlocked mode as well.

FIGS. 5F1-5F7 illustrate a process for displaying a second version of a notification with expanded notification content in response to an input (e.g., a press input) on a first version of the notification with standard notification content, in accordance with some embodiments. In contrast to the process shown in Figures FC1-FC6, here, the device is in an unlocked mode, and restricted functions and restricted notification content are provided in the second version of the notification.

In FIG. 5F1, notification screen 5036 displays a number of notifications (e.g., notifications 5038, 5040, 5042, and 5044) while device 100 is in the unlocked state.

FIG. 5F2 illustrates that a contact (e.g., contact 5076) is detected on notification 5038; and in response to the detection of the contact, notification 5038 is selected.

FIG. 5F3 illustrates that, once the characteristic intensity of contact 5076 increases above a predetermined threshold intensity (e.g., a hint intensity threshold $IT_H$), device 100 applies dynamic changes to the user interface in accordance with a current value of the characteristic intensity. For example, device 100 dynamically increases (or decreases) the amount of blurring and darkening applied to notification screen 5036 in accordance with the increase (or decrease) in the characteristic intensity of contact 5076, while notification 5038 is overlaid on top of the blurred and darkened notification screen 5036. As contact intensity is increased within the range $IT_H$ and a first higher intensity threshold (e.g., a light press intensity threshold $IT_L$), the amount of blurring and darkening applied to notification screen 5036 is increased accordingly. Before the characteristic intensity of contact 5076 crosses the first intensity threshold, lift-off of the contact returns the user interface to its original state (e.g., the state shown in 5F1).

FIG. 5F4 illustrates that, once the characteristic intensity of contact 5076 exceeds the first intensity threshold (e.g., light press intensity threshold $IT_L$), an expanded version of the notification (e.g., notification 5078) is displayed over the blurred and darkened notification screen 5036. In addition, in some embodiments, the appearance of notification screen 5036 is maintained (e.g., does not change in accordance with the current characteristic intensity of contact 5076) once the characteristic intensity has exceeded the first intensity threshold for the first time.

As shown in FIG. 5F4, the expanded version of the notification (e.g., notification 5078) includes content (e.g., message text (e.g., text of message 5062), sender name "Alice") from the initially displayed version of the notification (e.g., notification 5038) and additional functions (e.g., selectable options for performing actions with respect to the notification or the application) and/or content that is not included in the initially displayed version of the notification. For example, notification 5078 includes "Reply" button 5082 for launching a "Reply" user interface for composing a reply to the message represented in the notification. Notification 5078 further includes one or more previous messages between Alice and the user (e.g., message 5060), and an image (e.g., image 5058) that corresponds to thumbnail 5046 included in notification 5028 (image 5058 is an attachment included in message 5062))). Notification 5078 further includes header region 5080 that is distinct from the content region (e.g., the region displaying the conversation log) and the control region (e.g., the region displaying the control affordances (e.g., "Reply" affordance 5082)). Header region 5080 includes information identifying the Messages application (e.g., the application icon and application name) and information identifying the sender of the message (e.g., avatar 5084 of the sender "Alice").

Although not shown in FIGS. 5F1-5F5, the expanded notification (e.g., notification 5078) remains displayed on the blurred and darkened notification screen after lift-off of contact 5076 is detected. Another input (e.g., a tap input) subsequently detected on the expanded notification (e.g., notification 5078) outside areas occupied by affordance 5082 (e.g., a tap input on the notification content region or the header region) launches the Messages application (e.g., as shown in FIG. 5B4).

FIGS. 5F5-5F7 illustrate that, a second press input by the same contact (e.g., contact 5076) before liftoff, on Reply affordance 5082, activates Reply affordance 5082 and causes a reply user interface to be displayed. FIG. 5F5 illustrates that, before lift-off, contact 5078 moves from its original location to a location on Reply affordance 5082. FIG. 5F6 illustrates that, while contact 5078 is at a location on Reply affordance 5082, an increase in the characteristic intensity of contact 5078 is detected, and the characteristic intensity exceeds a respective intensity threshold (e.g., the light press intensity threshold $IT_L$). FIG. 5F5 also illustrates that, before the characteristic intensity of contact 5076 exceeds the respective intensity threshold, the characteristic intensity of contact 5076 was below the respective intensity threshold (e.g., the characteristic intensity of contact 5076 is below $IT_L$ during movement of contact 5076 from its original location to the location on Reply affordance 5082). Contact 5082 does not move by more than a threshold amount (e.g., is substantially stationary) when an increase in intensity above the respective intensity threshold is detected (in other words, the second press input is detected while contact 5076 is substantially stationary).

FIG. 5F7 illustrates that, upon lift-off of contact 5076, Reply affordance 5082 is activated, and a reply user interface (e.g., reply user interface 5090) is displayed. In some embodiments, the reply user interface (e.g., reply user interface 5090) is displayed over the blurred and darkened notification screen 5036. In some embodiments, the reply user interface is updated in real-time (e.g., message bubble 5088 indicates that Alice is composing a message). The reply user interface includes soft keyboard 5092 and message input field for displaying a draft message entered by the user (e.g., "Oh?").

FIGS. 5G1-5G3 illustrate that a tap input detected outside of expanded notification 5078 dismisses notification 5078 (and its shorter version-notification 5038). FIG. 5G1 shows expanded notification 5078 overlaid on blurred and darkened notification screen 5036, e.g., following liftoff of contact 5076 from the state shown in FIG. 5F4.

FIG. 5G2 illustrates that new contact 5096 is detected outside of expanded notification 5078. FIG. 5G3 illustrates that, upon lift-off of contact 5096, notification screen 5036 is restored to its original clarity and brightness. In addition, notification 5038 and expanded notification 5078 are dismissed from the user interface and are no longer displayed. Other notifications (e.g., notifications 5040, 5042, and 5044) that have not been dismissed are displayed in restored notification screen 5036.

FIGS. 5H1-5H2 illustrate that, after the state shown in FIG. 5G1, a tap input detected within expanded notification 5078 (e.g., a tap input detected within the content region of expanded notification 5078) launches the Messages application.

As shown in FIG. 5H1, new contact 5098 is detected within the content region of expanded notification 5078. FIG. 5H2 shows that, upon lift-off of contact 5098, device 100 launches the Messages application, and a user interface of the Messages application (e.g., application user interface 5100) replaces expanded notification 5078 and notification screen 5036 on the touch screen display 112. The tap input on the expanded notification launches the Messages application to a user interface in the Messages application that corresponds to the notification content (e.g., a user interface that includes the conversation log for message communications between the user and the sender "Alice"), rather than a default user interface that is displayed when the Messages application is launched by a tap input on the Messages application icon on the home screen (e.g., to the last user interface that was shown when the user previously exited the Messages application or the user interface that includes an index of conversations the user has with other users).

FIGS. 5I1-5I9 illustrate another example in which an expanded notification is presented in response to a press input detected on a notification for a ride sharing application, and provides a subset of content and functions from the ride sharing application without first launching the ride sharing application.

In FIG. 5I1, a first version of a notification (e.g., banner 5104) is displayed over a background user interface (e.g., email inbox user interface 5102 of an e-mail application).

FIG. 5I2 illustrate that, contact 5106 is detected on the first version of the notification (e.g., banner 5104), and when a characteristic intensity of contact 5106 exceeds a hint threshold $IT_H$, a deemphasizing visual effect (e.g., blurring and darkening of the background user interface (e.g., user interface 5102)) is applied to the background user interface, while notification 5104 is visually lifted off of the background user interface without the deemphasizing visual effect. FIG. 5I3 illustrates that, as the characteristic intensity of contact 5106 increases (or decreases) within the range $IT_H$ and $IT_L$, the amount of deemphasizing visual effect is varied dynamically (e.g., increased (or decreased)) in accordance with the change in the characteristic intensity of contact 5106. By applying the deemphasizing visual effect, the user is provided a hint for the alternative manner by which a subset of content and functions of the application can be accessed without leaving the current context.

FIG. 5I3 illustrates that, when the characteristic intensity of contact 5106 exceeds the first intensity threshold $IT_L$, an expanded version of the notification (e.g., expanded notification 5108) is displayed over the deemphasized background user interface (e.g., application user interface 5102). As shown in FIG. 5I3, expanded notification 5108 includes a header portion 5110 that includes information identifying a corresponding application associated with the notification (e.g., application icon and application name of a ride sharing application "Rides"). Expanded notification 5108 also includes a content region (e.g., content region 5112) that displays notification content (e.g., text and graphics related to the subject matter of the notification). The notification content shown in the expanded version of the notification includes content that is not displayed in the initially displayed version of the notification (e.g., map 5114 and the additional details regarding the ride provider were not included in notification 5104).

In some embodiments, the content included in expanded notification 5108 is dynamically updated. For example, the location of the car icon 5116 in map 5114 indicates the real-time location of the car that has accepted the ride request, and is updated constantly while expanded notification 5108 is displayed on device 100.

In some embodiments, content region 5112 in expanded notification 5108 is scrollable. FIGS. 5I5-5I6 illustrate that one or more scroll inputs (e.g., provided by contacts 5120 and 5126 that are within the content region and moving upward) cause the content region to scroll upward to reveal additional content and a control region including one or more control affordances (e.g., control affordances 5122, 5124, 5128 and 5130).

FIG. 5I7 illustrates that update information regarding arrival of the ride is received, and a pop-up banner alert 5132 is displayed within expanded notification 5108. In addition, car icon 5116 indicates the current location of the driver in map 5114.

FIGS. 5I8 and 5I9 illustrate that a tap input (e.g., by contact 5134) is detected on control affordance 5122 for initiating a call to the driver of the ride (e.g., as shown in FIG. 5I8), and in response to the tap input, device 100 initiates a call to the driver of the ride, and expanded notification 5108 displays a call user interface 5136 during the call. Control affordance 5122 changes its appearance to indicate that a call is in progress once the call is connected.

Although not shown in FIGS. 5I1-5I9, a tap input detected within the content region of expanded notification 5108 (e.g., outside of any of the control affordances) launches the ride sharing application and a user interface of the ride sharing application replaces the display of expanded notification 5108 and the background user interface 5102. In addition, a tap input detected outside of expanded notification 5108 dismisses the notification (e.g., both notification 5104 and expanded notification 5108 are no longer displayed) and the background user interface (e.g., application user interface 5102) is restored to its original brightness and clarity.

FIGS. 5J1-5P2 illustrate example user interfaces for displaying a contextual content object (e.g., a mini application object) associated with a respective application (e.g., to provide access to a subset of functions and content of the respective application from the contextual content object without having to first activate the respective application), in accordance with some embodiments. The contextual content object is provided concurrently with a menu of selectable options for activating one or more functions of the respective application. The contextual content object responds to user inputs for displaying more information or functions from the respective application without launching the application, in accordance with some embodiments.

FIGS. 5J1-5J2 illustrates a process for launching an application by a tap input on an application icon in a menu of applications, in accordance with some embodiments.

In FIG. 5J1, a user interface (e.g., home screen 5202) includes an array of application icons that represent different applications that are installed on device 100. A contact (e.g., contact 5204) is detected on one of the application icons (e.g., application icon 424 associated with the Messages application), and the application icon is selected when the characteristic intensity of contact 5204 is above the detection threshold intensity $IT_0$ and below the hint intensity threshold $IT_H$.

FIG. 5J2 illustrates that, upon lift-off of contact 5204, device 100 launches the Messages application and replaces display of the home screen 5202 with a user interface of the Messages application (e.g., user interface 5208 that displays a listing of the user's contacts with whom the user has had previous conversations in the Messages application (e.g., a listing of conversations the user has had with others in the Messages application)).

FIGS. 5K1-5K4 illustrate a process in which instead of a tap input, a press input is detected on the Messages application icon, and the press input causes a contextual content object and a menu of options to be displayed, instead of launching the Messages application.

In FIG. 5K1, home screen 5202 is displayed. A contact (e.g., contact 5206) is detected on one of the application icons (e.g., application icon 424 associated with the Messages application), and the application icon is selected when the characteristic intensity of contact 5206 is above the detection threshold intensity $IT_0$ and below the hint intensity threshold $IT_H$.

FIG. 5K2-5K3 illustrate that, once the characteristic intensity of contact 5206 increases above a predetermined threshold intensity (e.g., the hint intensity threshold $IT_H$), device 100 applies dynamic changes to the user interface in accordance with a current value of the characteristic intensity. For example, device 100 dynamically increases (or decreases) the amount of blurring and darkening applied to home screen 5202 in accordance with the increase (or decrease) in the characteristic intensity of contact 5206, while application icon 424 is overlaid on top of the blurred and darkened home screen 5202. In addition, a menu platter (e.g., platter 5208) emerges from between application icon 424 and home screen 5202, and the size of the platter changes (e.g., grows or shrinks) in accordance with the changes in the characteristic intensity of contact 5206. As shown in FIGS. 5K2 and 5K3, as contact intensity is increased within the range $IT_H$ and a first higher intensity threshold (e.g., the light press intensity threshold $IT_L$), the amount of blurring and darkening applied to home screen 5202 is increased accordingly, and the size of platter 5208 is also increased accordingly. Before the characteristic intensity of contact 5206 crosses the first intensity threshold, lift-off of the contact returns the user interface to its original state (e.g., the home screen shown in 5K1 without the selection of application icon 424).

FIG. 5K4 illustrates that, once the characteristic intensity of contact 5206 exceeds the first intensity threshold (e.g., the light press intensity threshold $IT_L$), a contextual content object (e.g., mini application object or widget 5210) associated with the Messages application is displayed over the blurred and darkened home screen 5202. The contextual content object includes contextually selected content that has been automatically selected based on a current context of device 100. For example, mini application object 5210 is a widget that includes a grid of several people that are selected based on the number of messages that have been sent between the user and the user's contacts (e.g., mini application object 5210 includes avatars or aliases (e.g., avatars 5224, 5226, 5228, and 5230) of four people with whom the user has had the highest numbers of instant messaging communications during the past week). In some embodiments, a respective avatar or alias also includes a badge (e.g., badge 5232 and 5234) that indicates the number of unread instant messaging communications from the person represented by the respective avatar or alias. For example, badge 5232 indicates that there are eight unread messages from Issac, and badge 5234 indicates that there are four unread messages from Miles. The badges are updated while mini application object 5210 is displayed, when new messages from the people represented in the mini application object 5210 are received at device 100.

In addition to contextually selected content, mini application object 5210 also includes an "add widget" affordance (e.g., affordance 5222) for adding the mini application object 5210 to another user interface (e.g., a mini application object screen or widget screen) that is configured to host a number of mini application objects that are associated with different applications installed on device 100. In some embodiments, affordance 5222 is only displayed if mini application object 5210 does not already exist in the user interface (e.g., a mini application object screen or widget screen) that is configured to host a number of mini application objects that are associated with different applications installed on device 100.

In addition, a menu of selectable options (e.g., menu 5212) is displayed concurrently with the contextual content object (e.g., mini application object 5210). The menu of selectable options includes options (e.g., options 5214, 5216, 5218, 5220) that when activated, are configured to launch the Messages application to a respective user interface of the Messages application for performing a respective function associated with the Messages application. For example, selection of option 5214 causes a new messages user interface to be displayed for the user to compose a new message; and selection of options 5214, 5218 and 5220 respectively causes display of a conversation interface for a messages conversation between the user and the person represented in the option (e.g., S. Ramanuj an, Mom, and G. Hardy, respectively).

In addition, in some embodiments, the appearance of home screen 5202 is maintained (e.g., does not change in accordance with the current characteristic intensity of contact 5206) once the characteristic intensity has exceeded the first intensity threshold for the first time.

As shown in FIG. 5K4, the contextual content object (e.g., mini application object 5210) includes content contextually selected from the Messages application (e.g., the avatars of users, a miniature messages application icon, an application name) and optionally additional functions (e.g., the avatars 5224, 5226, 5228, and 5230 are responsive to tap inputs or deep press inputs for performing various actions with respect to the mini application object 5210 and/or the Messages application). For example, tapping on the avatar 5224 launches the Messages application and displays a conversation user interface for reviewing previous messages and composing a reply to the messages represented in the conversation user interface.

FIGS. 5K5-5K7 illustrate a process for adding the contextual content object to the user interface that is configured to display respective contextual content objects associated with different applications of a plurality of applications installed on device 100.

FIG. 5K5 illustrates that, the contextual content object (e.g., mini application object 5210) remains displayed on the blurred and darkened home screen 5202 after lift-off of contact 5206 is detected. Another input (e.g., a tap input by contact 5236) is subsequently detected on the "add widget" affordance (e.g., affordance 5222) displayed within (or otherwise concurrently with) the contextual content object (e.g., mini application object 5206).

FIG. 5K6 illustrates that, upon lift-off of contact 5236, an animation is presented illustrating that the contextual content object (e.g., mini application object 5210) is being added to the user interface that is configured to display respective contextual content objects associated with different applications of a plurality of applications installed on device 100. For example, a mini application object screen (e.g., mini application object screen or widget screen 5238) is shown to slide in from the left of the display and partially cover home screen 5202, and mini application object 5210 is shown to jump from its original location into a slot in the mini application object screen 5238. As shown in FIG. 5K6, mini application object screen 5238 already includes two mini application objects (e.g., the Up Next mini application object 5240 associated with the Calendar application, and the Calendar mini application object 5242 associated with the Calendar application).

FIG. 5K7 illustrates that once mini application object 5210 has been added to mini application object screen 5238, the mini application object screen 5238 slides back to the left, and disappears. The user interface is restored to the state before the "add widget" affordance is activated (e.g., the state as shown in FIG. 5K4). As shown in FIG. 5K7, once mini application object 5210 has been added to mini application object screen 5238, the "add widget" affordance is no longer displayed with mini application object 5210. Instead, an indicator (e.g., the text "Added" or a checkmark) is displayed to indicate that mini application object 5210 has already been added into the mini application object screen. In some embodiments, the indicator (e.g., the text "Added" or a checkmark) is only displayed briefly right after the addition of mini application object 5210 to mini application object screen 5238. In some embodiments (not shown), when mini application object 5210 is being added to mini application object screen 5238 in response to activation of the "add widget" affordance, device 100 displays mini application object screen 5238 including the newly added mini application object 5238 in lieu of home screen 5202.

FIGS. 5K8-5L3 illustrate that different portions of a contextual content object (e.g., mini application object 5210) have different responses to a press input (e.g., a light press input or a deep press input).

FIGS. 5K8-5K10 illustrate that a light press input (e.g., input by contact 5248 with a characteristic intensity above the light press intensity threshold $IT_L$) on a first portion of mini application object 5210 is detected, causing a first type of additional information to be displayed.

FIG. 5K8 shows that contact 5248 is detected on a portion of mini application object 5210 outside of any of the avatars included in mini application object 5210. FIG. 5K9 illustrates that, when a characteristic intensity of contact 5248 exceeds a respective intensity threshold (e.g., the light press intensity threshold), an additional row of avatars/aliases (e.g., avatars 5252, 5254, 5256, and 5258) is displayed. These additional avatars/aliases are for people that are selected based on the number of messages that have been sent between the user and the user's contacts (e.g., mini application object 5210 now includes additional avatars or aliases (e.g., avatars 5252, 5254, 5256, and 5258) of four people with whom the user has had the next highest numbers of instant messaging communications during the past week). FIG. 5K10 illustrates that, upon lift-off of contact 5248, the additional avatars and aliases (e.g., avatars 5252, 5254, 5256, and 5258) remain displayed in mini application object 5210.

FIGS. 5L1-5L3 illustrate that a light press input (e.g., input by contact 5260 with a characteristic intensity above the light press intensity threshold $IT_L$) on a second portion of mini application object 5210 is detected, causing a second type of additional information to be displayed.

FIG. 5L1 shows that contact 5260 is detected on a portion of mini application object 5210 that displays one of the avatars included in mini application object 5210 (e.g., contact 5260 is detected on avatar 5230). FIG. 5L2 illustrates that, when a characteristic intensity of contact 5260 exceeds a respective intensity threshold (e.g., the light press intensity threshold), the last communication (e.g., message 5262) from the person represented by the selected avatar (e.g., avatar 5230) is displayed in mini application object 5210. FIG. 5L3 illustrates that, upon lift-off of contact 5260, the last communication (e.g., message 5262) is removed from mini application object 5210. The user can press on another avatar to see the last communication from the person represented by that avatar. Although FIG. 5L1 shows that additional avatars are also displayed in response to the press input by contact 5260, this is optional or is not implemented in some embodiments.

FIGS. 5L4-5L5 illustrate that a tap input (e.g., by contact 5264) that is detected outside of mini application object 5210 and menu 5212, dismisses mini application object 5210 and menu 5212 from home screen 5202. Home screen 5202 is restored to its original brightness and clarity.

FIGS. 5L6-5L8 illustrate that a swipe input (e.g., by contact 5266 moving from left to right) on home screen 5202 scrolls home screen 5202 to the right, and brings in mini application object screen 5238 from the left. FIG. 5L8 shows that mini application object screen 5238 now replaces home screen 5202 and occupies the entire display 112.

As shown in FIG. 5L8, mini application object screen 5238 includes a number of mini application objects each associated with a respective application (e.g., mini application object 5268 associated with the Messages application, mini application object 5240 associated with the Calendar application, and mini application object 5242 associated with the Calendar application). In some embodiments, each mini application object includes an affordance for displaying additional information in the mini application object (e.g., a "show more" affordance).

FIGS. 5L9-5M2 illustrate that different portions of a contextual content object (e.g., mini application object 5268) have different responses to an input (e.g., a tap input).

FIGS. 5L9-5L10 illustrate that a tap input (e.g., by contact 5272) detected on a first portion of mini application object 5268 (e.g., a tap input detected on avatar 5230) causes device 100 to launch the Messages application and display a first user interface of the Messages application (e.g., a conversation user interface for a message conversation between the user and a person represented by the selected avatar 5230). In FIG. 5L9, mini application object 5268 is displayed in mini application object screen 5238. Contact 5272 is detected on avatar 5230 in mini application object 5268. A characteristic intensity of contact 5272 does not increase above a light press intensity threshold $IT_L$. FIG. 5L10, upon lift-off of contact 5272, device 100 launches the Messages application, and replaces mini application object screen 5238 with a conversation user interface of the Messages application (e.g., conversation user interface 5274). The conversation user interface (e.g., conversation user interface 5274) displays a message conversation between the user and the person represented by the selected avatar (e.g., avatar 5230). The conversation interface displays one or more previous messages (e.g., messages 5276, 5278, and 5280) sent between the user and the person represented by the selected avatar. The conversation interface also includes a soft keyboard 5282 and a text input field for composing a message to the person represented by the selected avatar.

FIGS. 5M1-5M2 illustrate that a tap input (e.g., by contact 5284) detected on a second portion of mini application object 5268 (e.g., a tap input detected on the header portion) causes device 100 to launch the Messages application and display a second user interface of the Messages application (e.g., a conversation listing user interface for listing message conversations the user had with other users). In FIG. 5M1, mini application object 5268 is displayed in mini application object screen 5238. Contact 5284 is detected on the header portion of mini application object 5268. A characteristic intensity of contact 5284 does not increase above the light press intensity threshold $IT_L$. FIG. 5M2, upon lift-off of contact 5284, device 100 launches the Messages application, and replaces mini application object screen 5238 with a conversation listing user interface of the Messages application (e.g., conversation listing user interface 5286). The conversation listing user interface (e.g., conversation listing user interface 5286) displays a listing of message conversations between the user and other contacts of the user. The user can navigate to the conversation user interface for a respective person by selecting the corresponding listing item in the conversation listing user interface 5286 (e.g., a tap input on the conversation listing item for Genevive will cause the device to display the conversation user interface shown in FIG. 5L10).

FIGS. 5N1-5N4 illustrate a process in which a deep press input is detected on the Contacts application icon, and the deep press input causes a contextual content object and a menu of options for the Contacts application to be displayed over the home screen.

In FIG. 5N1, home screen 5288 is displayed. A contact (e.g., contact 5290) is detected on one of the application icons (e.g., application icon 445 associated with the Contacts application (e.g., also referred to as the Address Book application)), and the application icon is selected when the characteristic intensity of contact 5290 is above the detection threshold intensity $IT_0$ and below the hint intensity threshold $IT_H$.

FIG. 5N2-5N3 illustrate that, once the characteristic intensity of contact 5290 increases above a predetermined threshold intensity (e.g., the hint intensity threshold $IT_H$), device 100 applies dynamic changes to the user interface in accordance with a current value of the characteristic intensity. For example, device 100 dynamically increases (or decreases) the amount of blurring and darkening applied to home screen 5288 in accordance with the increase (or decrease) in the characteristic intensity of contact 5290, while application icon 445 is overlaid on top of the blurred and darkened home screen 5288. In addition, a menu platter (e.g., platter 5292) emerges from between application icon 445 and home screen 5288, and the size of the platter changes (e.g., grows or shrinks) in accordance with the changes in the characteristic intensity of contact 5290. As shown in FIGS. 5N1 and 5N2, as contact intensity is increased within the range $IT_H$ and a first higher intensity threshold (e.g., the light press intensity threshold $IT_L$), the amount of blurring and darkening applied to home screen 5288 is increased accordingly, and the size of platter 5292 is also increased accordingly. Before the characteristic intensity of contact 5290 crosses the first intensity threshold, lift-off of the contact returns the user interface to its original state (e.g., the home screen shown in 5N1 without the selection of application icon 445).

FIG. 5N4 illustrates that, once the characteristic intensity of contact 5290 exceeds the first intensity threshold (e.g., the light press intensity threshold $IT_L$), a contextual content object (e.g., mini application object or widget 5294) associated with the Contacts application is displayed over the blurred and darkened home screen 5288. The contextual content object includes contextually selected content that has been automatically selected based on a current context of device 100. For example, mini application object 5294 is a widget that includes a grid of several people that are selected based on the number of communications (e.g., instant messages, e-mail messages, telephone calls, VoIP calls, etc.) that have occurred between the user and the user's contacts (e.g., mini application object 5294 includes avatars or aliases (e.g., avatars 5296, 5298, 5300, 5302) of four people with whom the user has had the highest numbers of communications (e.g., communications of various types) during the past week). In some embodiments, a respective avatar or alias also includes a badge (e.g., badges 5304*a-d*) that indicates the number of communications that have occurred between the user and the person represented by the respective avatar or alias. For example, badge 5304*a* indicates that there are eight communications between Issac and the user, and badge 5304*c* indicates that there are four communications between Miles and the user in the past week. The badges are updated while mini application object 5294 is displayed, when new communications from the people represented in the mini application object 5294 are received at device 100.

In addition, a menu of selectable options (e.g., menu 5309) is displayed concurrently with the contextual content object (e.g., mini application object 5294). The menu of selectable options include options that when activated, are configured to launch the Contacts application to a respective user interface of the Contacts application for performing a respective function associated with the Contacts application. For example, selection of option "Create New Contact" causes a new contact user interface to be displayed for the user to create a new contact card; and selection of option "Search Addressbook" causes a search interface to be displayed; selection of option Recent communications causes a user interface that displays recent communications of various types to be displayed; and selection of option "Show my info" causes the user's own contact card to be displayed.

As shown in FIG. 5N4, the contextual content object (e.g., mini application object 5294) includes content contextually selected from Contacts application (e.g., the avatars of users, a miniature Contacts application icon, an application name) and optionally additional functions (e.g., the avatars 5296, 5298, 5300, and 5302 are responsive to tap inputs or press inputs for performing various actions with respect to the mini application object 5294 and/or the Contacts application). For example, tapping on the avatar 5296 launches the Contacts application and displays a contact card for reviewing contact information of and initiating various types of communications to the person represented by the selected avatar (e.g., Issac).

In some embodiments, the placement of the mini application object and the menu of options are based on the location of the corresponding application icon on the home screen. For example, if there is more space below the application icon, the mini application object is placed below the application icon, and the menu of options is placed below the mini application object, e.g., as shown in the example in FIG. 5K4. If there is more space above the application icon, the mini application object is placed above the application icon, and the menu of options is placed above the mini application object, e.g., as shown in the example in FIG. 5W5. In some embodiments, as shown in FIG. 5N4, when the combined size of the mini application object and the menu of options to be displayed with the application icon is too large for both the space above the application icon and the space below the application icon, the application icon is shifted slightly upward or downward to accommodate the mini application object and the menu of options when the deep press input is detected on the application icon. For example, as shown in FIG. 5N4, application icon 445 is shifted upward by about half of icon height, and mini application object is displayed below application icon 445. The menu of options 5309 is displayed below mini application object 5294.

FIGS. 5N5 and 5N6 illustrates that while contact 5290 is maintained on the touch screen 112, a movement of contact 5290 is detected. As contact 5290 moves from application icon 445 to an option "Show my info" in the menu of options 5306, haptic feedback is provided when contact 5290 passes each option in the menu of options 5306. FIG. 5N6 illustrates that, when lift-off of contact 5290 is detected when contact is over the option "Show my info", the user's own contact card is displayed (e.g., in contact card user interface 5311). In some embodiments (not shown), contact card user interface 5311 is overlaid on a portion of the blurred and darkened version of home screen 5288. In some embodiments, contact card user interface 5311 replaces home screen 5288 and mini application object 5294 and menu 5309 on the display.

FIGS. 5O1-5P2 illustrate that different portions of a contextual content object (e.g., mini application object 5240) have different responses to a press input (e.g., a light press input or a deep press input).

FIGS. 5O1-5O2 illustrate that a light press input (e.g., input by contact 5308 with a characteristic intensity above the light press intensity threshold $IT_L$) on a first portion of mini application object 5240 is detected, causing a first type of additional information to be displayed.

FIG. 5O1 shows that contact 5308 is detected on a portion of mini application object 5240 that displays details of a calendar event that is coming up next. Mini application object 5240 is displayed in mini application object screen 5238 with one or more other mini application objects associated with other applications.

FIG. 5O2 illustrates that, when a characteristic intensity of contact 5308 exceeds a respective intensity threshold (e.g., the light press intensity threshold), mini application object 5240 is expanded (e.g., shown as expanded mini application object 5310) and displays additional details regarding the calendar event that is coming up next. For example, as shown in FIG. 5O2, a map (e.g., map 5312) is displayed in addition to the textual details of the event. In addition, selectable options (e.g., selectable options 5314, 5216, 5318, and 5320) for activating additional functions of the Calendar application (e.g., option 5314 is for getting directions to the location of the event, option 5316 is for snoozing an alert for the event, option 5318 is for displaying a messaging interface for sending a message to the invitees of the event, and option 5320 is for deleting the event) are also displayed in the expanded mini application object 5310. In some embodiments, these functions are activated from the mini application object without launching the Calendar application. In some embodiments, activating an option in the menu of options causes the Calendar application to be launched and a user interface in the Calendar application that corresponds to the selected option to be displayed as the initial user interface after launching the Calendar application. As shown in FIG. 5O2, expanded mini application object 5312 is overlaid on a blurred and darkened version of mini object screen 5238. In some embodiments, expanded mini application object 5312 is displayed within mini application object screen 5238 and replaces mini application object 5240. In some embodiments, expanded mini application object 5310 is dismissed and mini application object screen is restored (e.g., to the state shown in FIG. 5O1) when lift-off of contact 5308 is detected. In some embodiments, expanded mini application object 5310 remains overlaid on the blurred and darkened version of mini application object screen 5238 when lift-off of contact 5308 is detected. Another input (e.g., a tap outside of expanded mini application object 5310 or a tap on the "close" affordance displayed within expanded mini application object 5310 is detected) can dismiss expanded mini application object 5310 and restore mini application object screen 5238 to its original brightness and clarity. Dismissal of expanded mini application object 5310 does not remove mini application object 5240 from mini application object screen 5238.

FIGS. 5P1-5P2 illustrate that a light press input (e.g., input by contact 5312 with a characteristic intensity above the light press intensity threshold $IT_L$) on a second portion of mini application object 5240 is detected, causing a second type of additional information to be displayed.

FIG. 5P1 shows that contact 5314 is detected on a portion of mini application object 5240 that is not displaying details of the event that is coming up next (e.g., a blank portion or the header portion). FIG. 5P2 illustrates that, when a characteristic intensity of contact 5314 exceeds a respective intensity threshold (e.g., the light press intensity threshold), mini application object 5240 is expanded (e.g., shown as expanded mini application object 5272 in FIG. 5P2) and displays both the originally displayed event and additional events that are coming up next (e.g., event items 5316, 5318, and 5320). For example, as shown in FIG. 5P2, two more events (e.g., "Team meeting" and "Dinner with Mom") are displayed in addition to the event (e.g., "Coffee with Jon") that was displayed in expanded mini application object 5272. As shown in FIG. 5P2, expanded mini application object 5272 is displayed within mini application object screen 5238 and replaces mini application object 5240. In some embodiments, expanded mini application object 5272 is overlaid on a blurred and darkened version of mini object screen 5238. In some embodiments, expanded mini application object 5272 is dismissed and mini application object screen is restored (e.g., to the state shown in FIG. 5P1) when lift-off of contact 5314 is detected. In some embodiments (not shown), expanded mini application object 5272 remains overlaid on the blurred and darkened version of mini application object screen 5238 when lift-off of the contact is detected. Another input (e.g., a tap outside of expanded mini application object 5272 or a tap on a "close" affordance displayed within expanded mini application object 5272 is detected) can dismiss expanded mini application object 5272 and restore mini application object screen 5238 to its original brightness and clarity.

In some embodiments, the mini application object shown in the mini application object screen (e.g., mini application object 5268 in FIG. 5P2) is identical to the mini application object (e.g., mini application object 5210 in FIG. 5K4) displayed concurrently with the application icon (e.g., the Messages application icon 424) and the menu of options (e.g., menu 5212) over the home screen, except for the portion displaying the "add widget" affordance 5222. The mini application object for a given application has the same functions and behaviors in response to user inputs (e.g., a tap input or light press input on various portions of the mini application object) detected on the mini application object, regardless of whether the mini application object is displayed in the mini application object screen or over the home screen, in accordance with some embodiments.

In some embodiments, the mini application object shown over the home screen is a representation of a corresponding mini application object that has been added to the mini application object screen. For example, the mini application object shown over the home screen may provide a subset of functions or content that is shown in the corresponding mini application object that has been added to the mini application object screen. For example, in response to the same input on the mini application object, the amount of additional information that is displayed in the mini application object shown over the home screen may be less than the amount of additional information that is displayed in the corresponding mini application object that has been added to the mini application object screen (e.g., due to space constraint on the home screen). In some embodiments, the mini application object is scrollable to reveal additional content and selectable options for additional functions from the corresponding application when it is displayed in the mini application object screen, but not when it is displayed over a darkened version of the home screen.

Although the examples shown in FIGS. 5J1-5P2 are shown only in one environment at a time (e.g., either in the mini application object screen or overlaid on a deemphasized version of a background user interface (e.g., the home screen or another screen showing application icons)), some or all of the responses and behaviors illustrated in that environment are optionally implemented in other environments that display the mini application object as well. In the interest of brevity, all combinations of environments and behaviors are not exhaustively enumerated herein.

FIGS. 5Q1-5S5 illustrate user interfaces for quickly invoking one of several download-related quick actions with respect to an application that are in the process of being downloaded, in accordance with some embodiments.

FIGS. 5Q1-5Q6 illustrate a process for displaying a menu of options related to downloading of an application, in accordance with some embodiments.

FIG. 5Q1 displays a user interface (e.g., home screen 5402) that includes a plurality of application icons (e.g., application icon 5404 for launching the Messages application and application icon 5406 for launching the Calendar application, etc.) and one or more downloading icons that represent applications that are in the process of being downloaded (e.g., downloading icon 5408 that represents a Game application that is in the process of being downloaded, and downloading icon 5410 that represents a Sketch application that is in the process of being downloaded). As shown in FIG. 5Q1, downloading icon 5408 indicates that the downloading of the Game application is in progress. Also shown in FIG. 5Q1, downloading icon 5410 indicates that downloading of the Sketch application has been paused. Other possible states of the downloading icon include a suspended state (e.g., due to lack of authorization or approval from a server), or a waiting state (e.g., due to lack of downloading bandwidth or unavailability of server, etc.), etc.

FIG. 5Q2 illustrates that a contact (e.g., contact 5412) is detected on downloading icon 5408. FIGS. 5Q2-5Q4 indicate that as the characteristic intensity of contact 5412 changes between the range $IT_H$ and $IT_L$ (e.g., increases within the range $IT_H$) and $IT_L$, device 100 dynamically applies a deemphasizing visual effect (e.g., dynamically applies a blurring and darkening effect) on home screen 5402, including all application icons on home screen 5402, except downloading icon 5408, in accordance with a current value of the characteristic intensity of contact 5412. In addition, when the characteristic intensity of contact 5412 is above the hint intensity threshold, platter 5414 is displayed between downloading icon 5408 and the deemphasized home screen 5402. The size of platter 5414 changes dynamically (e.g., increases dynamically) in accordance with the changes in the characteristic intensity of contact 5412 (e.g., in accordance with the increase in the characteristic intensity of contact 5412).

FIG. 5Q5 illustrates that, when the characteristic intensity of contact 5412 increases above a respective intensity threshold (e.g., the light press intensity threshold $IT_L$), device 100 displays a menu of selectable options (e.g., menu 5416) concurrently with downloading icon 5408 over the deemphasized home screen 5402. In some embodiments, the menu of selectable options includes respective options related to downloading of the application represented by downloading icon 5408. As shown in FIG. 5Q5, menu 5416 includes option 5418 for prioritizing the downloading of the Game application over one or more other applications that are also in the process of being downloaded (e.g., the Sketch application). Menu 5416 also includes option 5420 for pausing the download of the Game application. Menu 5416 also includes option 5422 for canceling the download of the Game application. Menu 5416 also includes option 5424 for sharing the Game application with other users.

FIG. 5Q6 illustrates that, upon lift-off of contact 5412, menu 5416 remains displayed over the deemphasized home screen 5402.

FIGS. 5Q7-5Q8 illustrate that selection and activation of option 5424 (e.g., by a tap input (e.g., by contact 5426) on option 5424) causes device 100 to display a share user interface (e.g., share card 5428). In FIG. 5Q8, share card 5428 is displayed over the deemphasized home screen 5402. In some embodiments, menu 5416 ceases to be displayed when share card 5428 is displayed. The share card includes options to share the Game application via a number of communication methods (e.g., via a wireless connection, an instant message, an email, a reminder, etc.), or in various other manners (e.g., copy link, send as a gift, etc.). In some embodiments, selection of option 5424 causes an application store application (e.g., the App Store application) to be launched, and the page showing the Game application to be displayed in the initial user interface of the application store application.

FIG. 5Q9 illustrates that, after downloading of the Game application is completed, downloading icon 5408 is replaced by application icon 5408' that represents the Game application in home screen 5402. A tap input on application icon 5408' launches the Game application.

Figure 11:
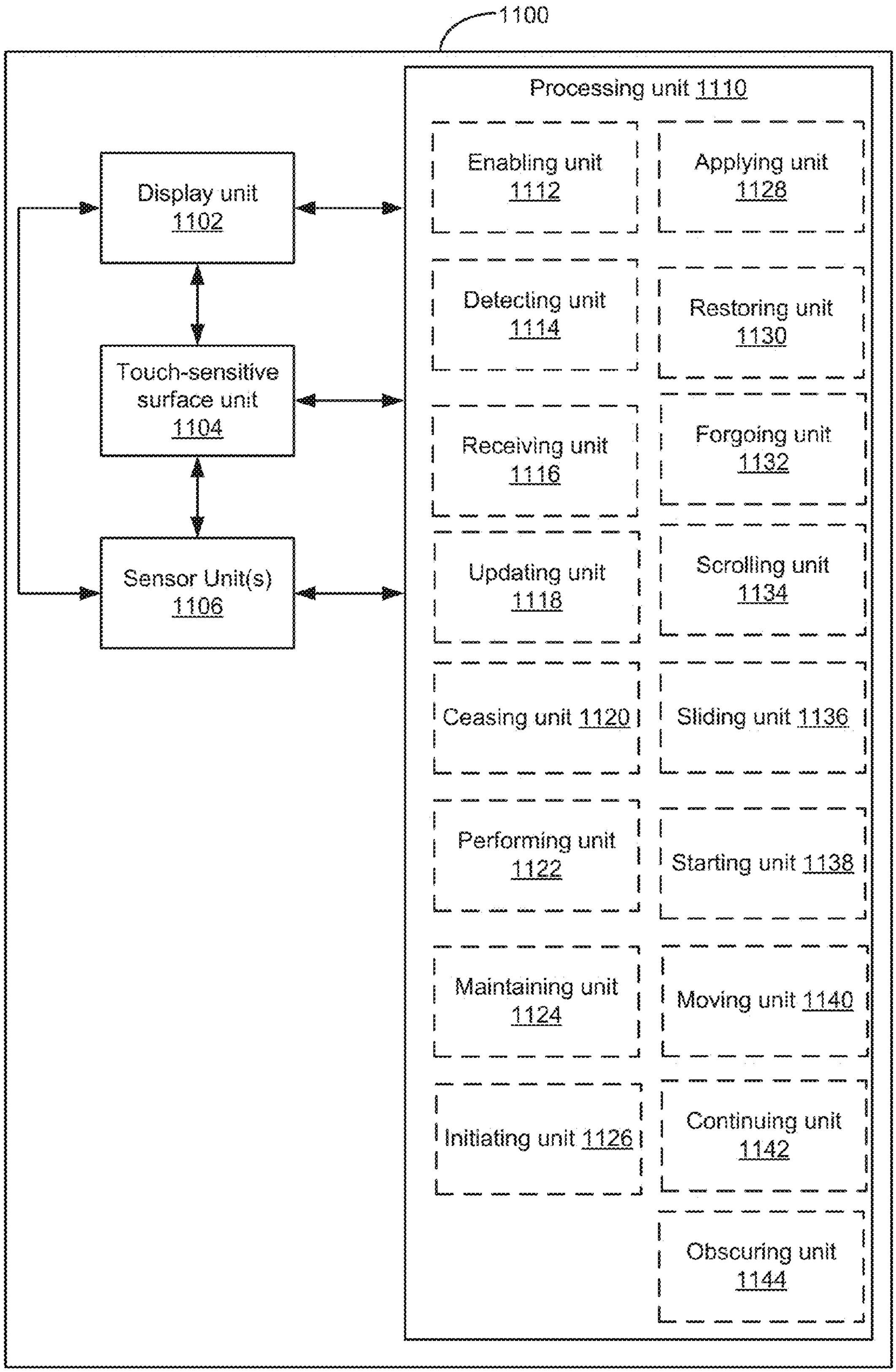
FIG. 11 is a functional block diagram of an electronic device for interacting with a notification associated with a respective application (e.g., launching an application from a notification associated with the notification or displaying an expanded version of the notification based on the user input), in accordance with some embodiments.

FIGS. 5Q9-5Q11 illustrate a press input (e.g., by contact 5432) on downloading icon 5410 causes device 100 to display menu 5434 that include respective options related to downloading of the application represented by downloading icon 5410.

As shown in FIG. 5Q10, when the characteristic intensity of contact 5432 increases above the hint intensity threshold, device 100 applies a deemphasizing visual effect on home screen 5402, except for on downloading icon 5410. The amount of deemphasizing visual effect is dynamically varied in accordance with a current value of the characteristic intensity of contact 5432. Platter 5434 is displayed between downloading icon 5410 and deemphasized home screen 5402. The size of platter 5434 changes dynamically with the characteristic intensity of contact 5432, when the characteristic intensity varies within the range between $IT_H$ and $IT_L$.

FIG. 5Q11 illustrates that when the characteristic intensity of contact 5432 increases above the light press intensity threshold, a menu of selectable options (e.g., menu 5434) is presented with downloading icon 5410 over the deemphasized home screen 5402. As shown in FIG. 5Q11, menu 5434 includes option 5436 for prioritizing the downloading of the Sketch application over one or more other applications that are also in the process of being downloaded. Menu 5434 also includes option 5438 for resuming the download of the Sketch application. Menu 5434 also includes option 5440 for canceling the download of the Sketch application. Menu 5434 also includes option 5442 for sharing the Sketch application with other users. In some embodiments, if the downloading icon represents the only application that is in the process of being downloaded on device 100, the option for prioritizing download (e.g., option 5436) is optionally omitted from menu 5434. In this example, the downloading of the Sketch application was paused before the press input was detected, therefore, the option for pausing the download is replaced with the option for resuming the download.

As shown in FIGS. 5Q7 and 5Q11, the menu of options presented in response to a press input on a downloading icon is a generic menu common to all downloading icons, with the exception that the option of pausing the download and the option for resuming the download are toggled depending on the current state of the downloading for a particular application icon that received the press input.

Figure 13:
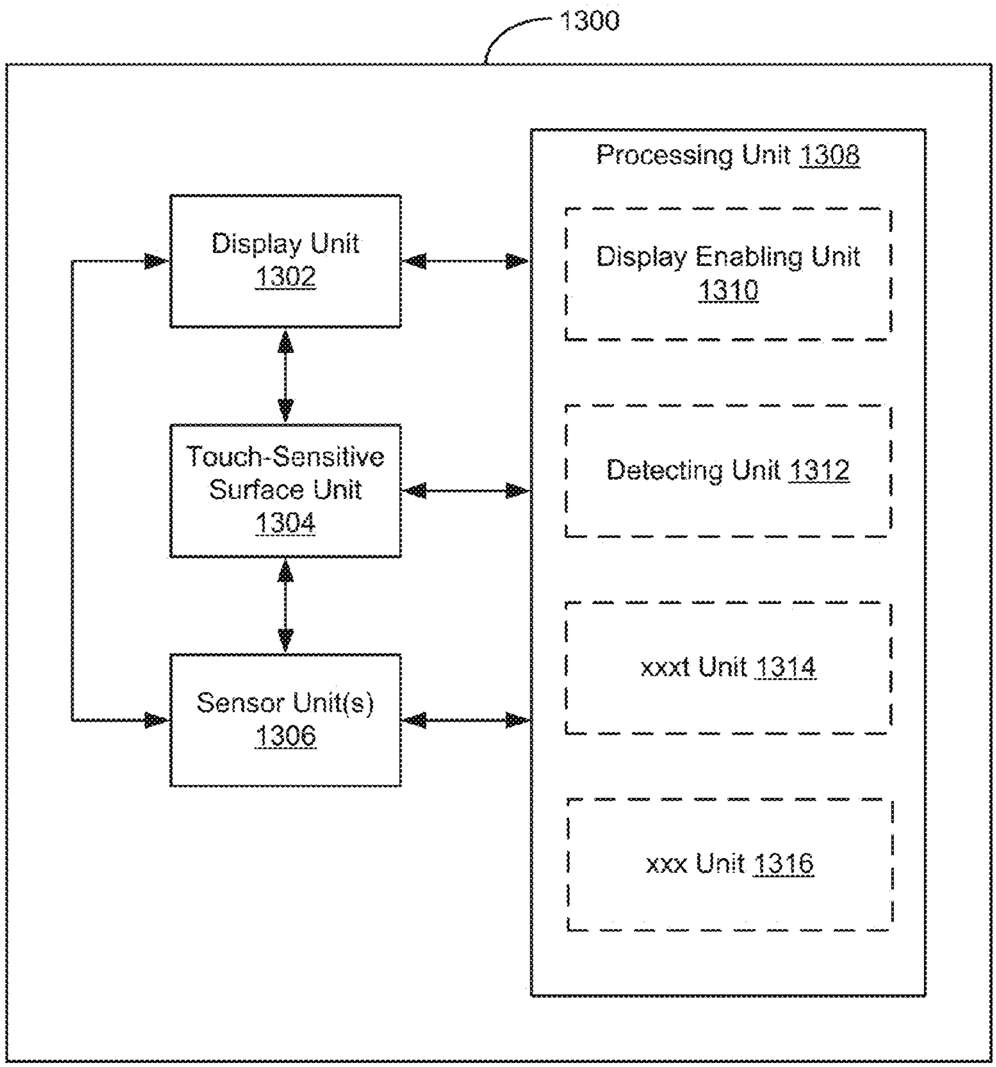
FIG. 13 is a functional block diagram of an electronic device for interacting with an application launching icon (e.g., launching an application or displaying a contextual content object associated with the application based on detected user input), in accordance with some embodiments.

FIG. 5Q12 illustrates that, before lift-off of contact 5432, movement of contact 5432 to option 5438 (e.g., option to resume download) is detected. FIG. 5Q13 illustrates that, when lift-off of contact 5432 is detected, option 5438 (e.g., option to resume download) is activated, and downloading of the Sketch application is resumed. In addition, selection and activation of option 5438 (or any other option) causes dismissal of menu 5434 and restoration of home screen 5402.

Figure Q14 illustrates that when download of the Sketch application is completed, downloading icon 5410 is replaced with application icon 5410'. A tap input on application icon 5410' launches the Sketch application.

Figure 17:
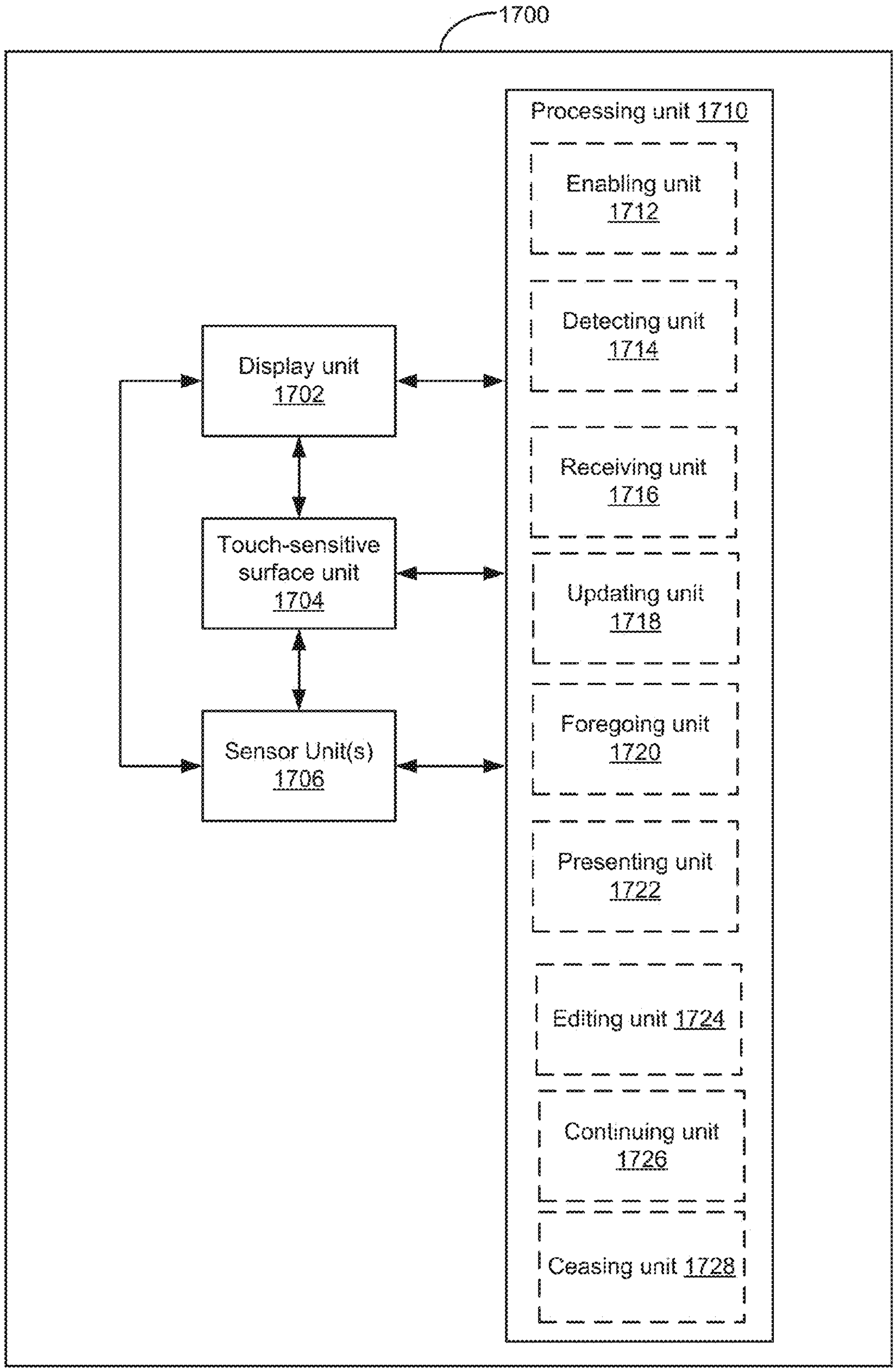
FIG. 17 is a functional block diagram of an electronic device for interacting with a menu of applications that include a folder of applications (e.g., selectively presenting application launching options for respective applications within a folder (e.g., applications with unread notifications) based on the user input), in accordance with some embodiments.

FIGS. 5Q15-5Q17 illustrates that a press input on an application icon for an application causes the display of a contextual content object associated with the application and an application-specific menu of selectable options.

As shown in FIG. 5Q15, a press input (by contact 5446) is detected on application icon 5408' for the Game application. When a characteristic intensity of contact 5446 is between the range $IT_H$ and $IT_L$, device 100 dynamically deemphasizes home screen 5402 except for application icon 5408'. Platter 5444 is displayed between application icon 5408' and deemphasized home screen 5402.

FIG. 5Q16 illustrates that, when the characteristic intensity of contact 5446 exceeds the light press intensity threshold, mini application object 5448 is displayed over deemphasized home screen 5402 concurrently with application icon 5408'. Mini application object 5448 includes avatars of several gaming friends of the user. In some embodiments, a tap input on one of the avatars starts a communication (e.g., an instant messaging communication or a communication supported by the Game application) with the person represented by the avatar. As shown in FIG. 5Q16, a menu of selectable options (e.g., menu 5450) for activating various functions in the Game application is also presented with mini application object 5448. Menu 5450 includes option 5452 for launching a frequently played game in the Game application, option 5454 for displaying a score board with top scores for games played in the Game application, option 5456 for display a list of the user's favorite games or frequently played games, and option 5458 for sharing the Game application. In some embodiments, a selectable option displayed in menu 5450, when activated, launches the Game application and displays a user interface corresponding to the function represented by the option as the initial user interface of the Game application. In some embodiments, a selectable option displayed in menu 5450, when activated, provide access to a function available within the Game application, without launching the Game application and without leaving the current context (e.g., the home screen).

FIG. 5Q17 illustrates that, when lift-off of contact 5446 is detected, mini application object 5448 and menu 5450 remain displayed over the deemphasized home screen 5402. A subsequent input (e.g., a tap input, a light press input, and/or a deep press input) can be used to select a menu option or activate an area in the mini application object to show more information related to the Game application, show more content from the Game application, show more functions from the Game application, or perform one or more functions of the Game application. A tap input outside of mini application object 5448, application icon 5408', and menu 5450, dismisses mini application object 5448 and menu 5450 and restores home screen 5402.

FIGS. 5R1-5R4 illustrate that when an application does not have an associated contextual content object, a press input on an application icon for the application causes the display of an application-specific menu of selectable options, without displaying any contextual content object. In some embodiments, when only a menu of options is displayed, the width of the menu is independent of the width of the contextual content objects (e.g., a standard width that applies to contextual content objects of all applications installed on device 100).

FIG. 5R2 illustrates that, a press input (by contact 5460) is detected on application icon 5410' for the Sketch application. When a characteristic intensity of contact 5460 is between the range $IT_H$ and $IT_L$, device 100 dynamically deemphasizes home screen 5402 except for application icon 5410'. Platter 5408 is displayed between application icon 5410' and deemphasized home screen 5402.

FIG. 5R3 illustrates that, when the characteristic intensity of contact 5460 exceeds the light press intensity threshold, a menu of selectable options (e.g., menu 5462) for activating various functions in the Sketch application is presented with application icon 5410' over the deemphasized home screen 5402. Menu 5462 includes option 5464 for displaying a user interface with a new sketch, option 5466 for displaying the last sketch that was made with the Sketch application, option 5468 for displaying a list of the user's favorite sketches, and option 5470 for sharing the Sketch application. In some embodiments, a selectable option displayed in menu 5462, when activated, launches the Sketch application and displays a user interface corresponding to the function represented by the option as the initial user interface of the Sketch application. In some embodiments, a selectable option displayed in menu 5462, when activated, provides access to a function available within the Sketch application, without launching the Sketch application and without leaving the current context (e.g., the home screen).

FIG. 5R4 illustrates that, when lift-off of contact 5460 is detected, menu 5462 remains displayed over the deemphasized home screen 5402. A subsequent input (e.g., a tap input, a light press input, and/or a deep press input) can be used to select a menu option to perform one or more functions of the Sketch application and launching the Sketch application to respective user interfaces associated with the one or more functions.

FIG. 5R5-5R6 illustrate that, a tap input (e.g., by contact 5472) outside of application icon 5410' and menu 5462 dismisses menu 5462 and restores home screen 5402.

FIGS. 5R6-5R7 illustrate that, a tap input (e.g., by contact 5474) on an application icon (e.g., application icon 5410') displayed in home screen 5402 launches the application represented by the application icon (e.g., the Sketch application). FIG. 5R7 illustrates that, the Sketch application is launched upon lift-off of contact 5474 from application icon 5410'. The initial user interface of the Sketch application is optionally, a user interface for creating a new sketch. In some embodiments, the Sketch application is launched and displays a user interface that represents the last state of the Sketch application when the user last left the Sketch application.

FIGS. 5S1-5S3 illustrate that a tap input (e.g., by contact 5478) on a downloading icon (e.g., downloading icon 5408) in the downloading state (e.g., active downloading of application data is in progress) pauses the download of the application. As shown in FIG. 5S3, downloading icon 5408" represents the Game application in the paused state.

FIGS. 5S3-5S5 illustrate that a tap input (e.g., by contact 5480) on a downloading icon (e.g., downloading icon 5410) in the paused state (e.g., active downloading of application data is paused) resumes the active download of the application data. As shown in FIG. 5S5, downloading icon 5410" represents the Sketch application in the active downloading state.

FIGS. 5T1-5T15 illustrate user interfaces for quickly launching a respective application with unread notifications from a folder containing multiple applications without having to first open the folder, in accordance with some embodiments.

FIGS. 5T1-5T5 illustrate a process for displaying a menu of selectable options in response to a press input detected on an application folder icon.

As shown in FIG. 5T1, home screen 5502 includes a plurality of application icons and one or more application folder icons (e.g., application folder icon 5504). Application folder icon 5504 represents an application folder that includes one or more application icons for launching respective applications installed on device 100. In some embodiments, a badge (e.g., badge 5506) is displayed on the application folder icon (e.g., application folder icon 5504) to indicate a total number of all unread notifications (e.g., nine) associated with applications represented within the application folder (e.g., the "Fav-1" folder).

FIGS. 5T2-5T4 illustrate that a press input (by contact 5508) is detected on application folder icon 5504. When a characteristic intensity of contact 5508 increases above the hint intensity threshold $IT_H$, device 100 dynamically deemphasizes home screen 5502, while providing a platter 5510 between application folder icon 5504 and the deemphasized home screen 5502 (e.g., as shown in FIGS. 5T3-5T4). For example, when the characteristic intensity of contact 5508 varies (e.g., increases) within the range $IT_H$ and $IT_L$, the amount of deemphasizing (e.g., blurring and darkening) applied to home screen 5502 is dynamically varied (e.g., increased) accordingly. If lift-off of contact 5508 is detected before the characteristic intensity of contact 5508 exceeds the light press intensity threshold $IT_L$, device 100 restores home screen 100 to its original state (e.g., original clarity and brightness).

FIG. 5T5 illustrates that when the characteristic intensity of contact 5508 exceeds the light press intensity threshold $IT_L$, device 100 displays a menu of selectable options (e.g., menu 5512) concurrently with application folder icon 5504. As shown in FIG. 5T5, menu 5512 includes selectable options each for launching a respective application represented in the application folder (e.g., folder "Fav-1") that has at least one unread notification. For example, as shown in FIG. 5T5, menu 5512 includes three selectable options for respectively launching three applications that have unread notifications, and an option for renaming the application folder. In the current example, menu 5512 includes a first option (e.g., option 5514) for launching the Messages application in the application folder and the Messages application has five unread notifications. Menu 5512 also includes a second option (e.g., option 5516) for launching the Mail application in the application folder and the Mail application has three unread notifications. Menu 5512 also includes a third option (e.g., option 5518) for launching the Music application in the application folder and the Music application has one unread notification. In this example, the application folder "Fav-1" represented by folder icon 5504 includes several other applications in addition to the three applications represented in menu 5512. However, because these other applications currently do not have any unread notifications, menu 5512 does not include a corresponding option for launching each of these other applications. In some embodiments, in each option for launching a respective application, an identifier for identifying the application (e.g., a miniature application icon and application name) is included, along with a count of unread notification currently associated with the application.

In this example, the maximum number of application launching options that can be displayed in menu 5512 is four. However, since only three applications in the folder have unread notifications at the time when menu 5512 displayed, only three application launching options are displayed in menu 5512. In some embodiments, the application launching options for applications with unread notifications are sorted in menu 5512 in accordance with the number of unready notifications that are associated with each of the applications with unread notifications.

FIG. 5T6 illustrates that, while menu 5512 is displayed, two more notifications are received by applications within the application folder "Fav-1". In response to receiving new notifications, device 100 updates badge 5506 to reflect the updated total number of unread notifications for applications in the application folder. In some embodiments, at shown in FIG. 5T6, if any of the application represented by the application launching options in menu 5512 receives additional new notifications, the count of unread notification displayed in the application launching option is also updated. For example, as shown in FIG. 5T6, the Messages application has received one additional new message, and the total number of unread notifications for the Messages application is increased to six. As a result, option 5514 for launching the Messages application is updated to reflect that the total number of unread notifications for the Messages application is now six. In some embodiments, if, while menu 5512 is displayed, an application that is not represented in menu 5512 receives one or more new notifications, an application launching option for that application is optionally added to menu 5512 in real time. In some embodiments, in order to avoid confusing the user and keeping the user interface stable, the application launching option for that application that is not currently represented in menu 5512 is not added to menu 5512 until menu 5512 is closed and displayed again in response to another press input.

FIG. 5T7-5T8 illustrate that menu 5512 is dismissed when a tap input (e.g., by contact 5522) is detected outside of menu 5512 and application icon 5504 on the deemphasized home screen 5502. Upon lift-off of contact 5522, home screen 5502 is restored to its original state. As shown in FIG. 5T8, the application folder "Fav-1" now has a total of twelve unread notifications.

FIG. 5T9 illustrates that another press input (by contact 5524) is detected on application folder icon 5504. When a characteristic intensity of contact 5524 increases above the hint intensity threshold $IT_H$, device 100 dynamically deemphasizes home screen 5502, while providing platter 5526 between application folder icon 5504 and the deemphasized home screen 5502, as shown in FIGS. 5T10-5T11. For example, when the characteristic intensity of contact 5524 varies (e.g., increases) within the range $IT_H$ and $IT_L$, the amount of deemphasizing (e.g., blurring and darkening) applied to home screen 5502 is dynamically varied (e.g., increased) accordingly. If lift-off of contact 5524 is detected before the characteristic intensity of contact 5524 exceeds the light press intensity threshold $IT_L$, device 100 restores home screen 100 to its original state (e.g., original clarity and brightness).

FIG. 5T12 illustrates that when the characteristic intensity of contact 5524 exceeds the light press intensity threshold $IT_L$, device 100 displays a menu of selectable options (e.g., menu 5528) concurrently with application folder icon 5504. As shown in FIG. 5T12, menu 5528 includes selectable options each for launching a respective application represented in the application folder (e.g., folder "Fav-1") that has at least one unread notification. For example, as shown in FIG. 5T12, menu 5528 includes four selectable options for respectively launching four applications that have unread notifications, and an option for renaming the application folder. In the current example, menu 5528 includes a first option (e.g., option 5530) for launching the App Store application in the application folder and the App Store application has one unread notification which is an alert. Menu 5528 also includes a second option (e.g., option 5532) for launching the Messages application in the application folder and the Messages application has six unread notifications. Menu 5528 also includes a third option (e.g., option 5534) for launching the Mail application in the application folder and the Mail application has three unread notifications. Menu 5528 also includes a fourth option (e.g., option 5536) for launching the Music application in the application folder and the Music application has one unread notification. Menu 5528 also includes a rename option (e.g., option 5538) for renaming the folder.

In this example, the application folder "Fav-1" represented by folder icon 5504 includes several other applications in addition to the four applications represented in menu 5528. In fact, one of the other applications also has one unread notification. However, because the maximum number of application launching options that can be included in menu 5528 is four, the application launching option for one of the five applications with unread notifications is not included in menu 5528. In some embodiments, when prioritizing which application launching options to include in menu 5528, alert is prioritized above regular notifications (e.g., because alert requests a user action); and for the same type of notifications, the application launching options are sorted based on the total count of unread notifications for each application. In some embodiments, for applications with the same number and same types of unread notifications, the application launching options for the applications are sorted according to the timestamps for the latest notifications that have been received for the respective applications.

FIG. 5T13 illustrates that, when lift-off of contact 5524 is detected, menu 5528 remains displayed over deemphasized home screen 5502. FIG. 5T14 illustrates that another tap input (e.g., by contact 5540) is detected on one of the application launching options (e.g., option 5532 for launching the Messages application). FIG. 5T15 illustrates that, upon lift-off of contact 5540, device 100 launching the Messages application, and a user interface of the Messages application (e.g., conversation listing user interface 5542) replaces application icon 5504, menu 5528, and deemphasized home screen 5502 on the touch screen 112.

FIGS. 5U1-5W5 illustrate user interfaces for quickly entering a rename and reconfiguration mode for an application folder without having to first open the folder, in accordance with some embodiments.

FIGS. 5U1-5U7 illustrate a conventional process for editing a folder name and folder content of an application folder.

FIG. 5U1 illustrates home screen 5502 that includes a plurality of application icons and one or more application folder icons (e.g., application folder icon 5504). A tap input (e.g., by contact 5544) is detected on application folder icon 5504. Upon lift-off of contact 5544, application folder 5504 is opened to show its content. FIG. 5U2 shows an intermediate state of folder 5504 (e.g., represented as folder 5504') as it is popping up from its original location and is expanded. FIG. 5U1 illustrates that expanded folder 5546 is displayed over deemphasized home screen 5502. Expanded folder 5546 includes respective application icons for several applications (e.g., application icons 424, 418, 480, 484, and 438).

FIGS. 5U4-5U5 illustrate that a long press input (e.g., by contact 5550) is detected on one of the applications icons (e.g., application icon 438 for the Weather application) in expanded folder 5546. When the time threshold for the long press input is met by contact 5550, icon reconfiguration mode is activated, as shown in FIG. 5U5. In the icon reconfiguration mode, in some embodiments, a deletion affordance (e.g., an "x" sign) is displayed on each application icon, and activation of the deletion affordance on a respective application icon deletes the application that corresponds to the application icon from device 100. FIG. 5U5 further illustrates that folder name 5548 of the application folder (e.g., "Fav-1") is displayed with expanded folder 5546. Folder name 5548 is initially displayed in a non-editable state.

FIGS. 5U6-5U7 illustrate that, another tap input (e.g., by contact 5552) is detected on folder name 5548. In response to detecting the tap input on folder name 5548, device 100 displays folder 5546 in an editable state and displays soft keyboard 5555 with expanded folder 5546 and folder name 5552 over deemphasized home screen 5502.

A subsequent contact (e.g., contact 5554) on a respective application icon in expanded folder 5546 can drag the respective application icon to another location (e.g., to a location outside of expanded folder 5546). In some embodiments, selection of an application icon dismisses soft keyboard 5555 but does not terminate the icon reconfiguration mode.

FIGS. 5V1-5V5 illustrate a process for displaying the menu of options with application launching options for applications with unread notifications and an option for renaming the folder.

As shown in FIG. 5V1, folder "Fav-1" now has a total of three unread notifications (as indicated by badge 5506 on folder icon 5504). FIGS. 5V2-5V4 illustrate that a press input (e.g., by contact 5556) is detected on folder icon 5504 and intermediate hint states are displayed in response to varying characteristic intensities of contact 5556 in the range between $IT_H$ and $IT_L$. FIG. 5V5 illustrates that a menu of selectable options (e.g., menu 5558) is displayed in response to detecting that the characteristic intensity of contact 5556 exceeded the light press intensity threshold $IT_L$. As shown in FIG. 5V5, in this example, only three applications in the folder "Fav-1" currently have unread notifications. Two of the applications each have one alert (e.g., the Mail application and the App Store application each have one alert), and their corresponding application launching options (e.g., options 5560 and 5562) are listed first in menu 5558. The Mail application has an alert that is newer than the alert for the App Store application, therefore, the application launching option for the Mail application is listed before the application launching option for the App Store application. One of the three applications (e.g., the Music application) has a regular notification and the application launching option (e.g., option 5564) is listed last.

As shown in FIG. 5V5, menu 5558 includes an option for renaming the folder (e.g., option 5566). FIGS. 5V6-5V8 illustrate that selection of the renaming option immediately puts the application folder in the reconfiguration mode and the folder name in the editable state.

As shown in FIG. 5V6, a tap input (e.g., by contact 5568) is detected on option 5566 for renaming the folder. FIG. 5V7 illustrates the application folder popping up from deemphasized home screen 5502 and is expanded to reveal its content upon lift-off of contact 5568. FIG. 5V8 illustrates that expanded folder 5546 is displayed over the deemphasized home screen 5502. Expanded folder includes application icons in the reconfiguration mode. In some embodiments, icons outside of expanded folder 5546 (e.g., in the deemphasized home screen 5502) are also in the reconfiguration mode. In other words, the selection of the renaming option puts the home screen (including all the application icons on the home screen) into the reconfiguration mode. An application icon in the reconfiguration mode can be moved and repositioned on home screen 5502. FIG. 5V8 further illustrates that, upon lift-off of contact 5568, folder name 5552 is displayed in an editable state and soft keyboard 5555 is displayed with expanded folder 5546 over deemphasized home screen 5502.

FIGS. 5V9-5V10 illustrate that inputs received through soft keyboard 5555 (e.g., by tap inputs on character keys (e.g., by contact 5570 on the letter "E" on keyboard 5555)) edit the folder name 5552. As shown in FIG. 5V10, the folder name is changed from "Fav-1" to "Fav-ONE". FIG. 5V9-5V10 further illustrate that, when inputs are received from soft keyboard 5555 to edit the folder name, application icons in expanded folder 5546 remain in the reconfiguration mode.

FIG. 5V11 illustrates that, in response to detecting a selection input (e.g., by contact 5572) on a respective application icon in expanded folder 5546, device 100 ceases to display the folder name 5552 in the editable state, and ceases to display soft keyboard 5555. Application icons in expanded folder 5546 are still displayed in the reconfiguration mode.

FIGS. 5V12-5V14 illustrate that an application icon (e.g., application icon 438) is dragged from within expanded folder 5546 to outside of expanded folder 5546 and placed on home screen 5502. Folder icon 5504 is restored on home screen 5502 (now represented by folder icon 5504''') and the folder no longer contains the application icon 438. After the input for dragging application icon 438 to home screen 5502, the application icons on home screen 5502 still remain in the icon reconfiguration mode.

FIGS. 5W1-5W3 illustrate repositioning of another application icon (e.g., application icon 5408' for the Game application) in response to a drag input by contact 5574. After application icon 5408' is repositioned to the bottom of home screen 5502, an input is received (e.g., a press input on home button 204) to exit the icon reconfiguration mode. FIG. 5W3 shows that the home screen has been restored and icon reconfiguration mode has been terminated.

FIGS. 5W4-5W5 illustrate that a press input (e.g., by contact 5576) on the Game application icon 5408' causes display of mini application object 5448 and menu 5578. As shown in FIG. 5W5, because there is more space above application icon 5408', mini application object 5448 is displayed above application icon 5408', and menu 5578 is displayed above mini application object 5448, in contrast to the case shown in FIG. 5Q17.

FIGS. 6A-6Y illustrate exemplary user interfaces for modifying the functionality of a control affordance in accordance with some embodiments. The user interfaces in these figures are used to illustrate the processes described below, including the processes in FIGS. 18A-18D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 6A-6Y will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in FIGS. 6A-6Y on the touch-sensitive surface 451 while displaying the user interfaces shown in FIGS. 6A-6Y on the display 450, along with a focus selector.

FIG. 6A illustrates an initial user interface 601 (e.g., a lock screen and/or wake screen) at which an input to display a control user interface that includes a plurality of control affordances is detected, in accordance with some embodiments. In some embodiments, the control user interface is revealed in response to an input gesture, such as a drag gesture (e.g., a drag gesture that begins at or near an edge of display 100, such as the lower edge of display 100). For example, a contact with touch-sensitive surface 112 is detected at a location indicated by focus selector 602. In some embodiments, an affordance 603 is displayed at or near the edge of the display 100 (e.g., to provide a cue indicating that input received at or near the edge of the display 100 will reveal a control user interface 608). The contact moves along a path indicated by arrow 604. In some embodiments, control user interface 608 is gradually revealed as the contact moves along the path indicated by arrow 604. A characteristic intensity of the contact is indicated by intensity meter 606. As shown by intensity meter 606, the characteristic intensity of the contact is above contact detection intensity threshold $IT_0$, and below hint intensity threshold level $IT_H$, light press intensity threshold $IT_L$, and deep press intensity threshold $IT_D$ when the input to display the control user interface is detected.

FIG. 6B illustrates a control user interface 608, in accordance with some embodiments. Control user interface 608 includes control affordances 612 (Airplane Mode), 614 (Wi-Fi), 616 (Bluetooth), 618 (Do Not Disturb Mode), 620 (Rotation Lock), 622 (Flashlight), 624 (Timer), 626 (Night Shift), 628 (Calculator), 630 (Camera), 632 (Apple TV Mirroring), and/or 634 (Brightness). In some embodiments, control user interface 608 includes a control user interface dismissal affordance 636. When input is detected at a location that corresponds to control user interface dismissal affordance 636, control user interface 608 ceases to be displayed. In some embodiments, control user interface 608 is a multipage control panel user interface and page indicator 631 is used to indicate the page of the multipage control panel that is currently displayed. In some embodiments, control user interface is displayed partially or fully overlaying another user interface (e.g., an initial screen such as a lock screen and/or wake screen, a display including a plurality of application initiation icons, and/or an application user interface) at which input to display the control user interface is detected. In some embodiments, the appearance of a user interface that is partially overlaid by the control user interface 608 is altered, as indicated at 638. For example, the partially overlaid user interface is blurred and/or has reduced brightness compared with a prior appearance of the user interface.

An input by a contact is detected at a location corresponding to Wi-Fi control affordance 614, as indicated by focus selector 640. In some embodiments, the appearance of one or more of the control affordances of control user interface 608 indicates a state of the control affordance. For example, Wi-Fi control affordance 614 is shown shaded to indicate that Wi-Fi is disabled. As indicated by intensity meter 606, the characteristic intensity of the contact is below hint press intensity threshold $IT_H$, light press intensity threshold $IT_L$, and deep press intensity threshold $IT_D$. In accordance with a determination that the characteristic intensity of the contact meets control toggle criteria (e.g., the characteristic intensity of the contact is below hint press intensity threshold $IT_H$), a Wi-Fi control that corresponds to the Wi-Fi control affordance 614 is toggled from a disabled state to an enabled state.

FIG. 6C illustrates control user interface 608 after the Wi-Fi control has been toggled from a disabled state, as indicated in FIG. 6B, to an enabled state. To indicate that the Wi-Fi control has been toggled to an enabled state, the appearance of Wi-Fi control affordance 614 is changed (e.g., from a shaded state to a non-shaded state) and/or a notification 644 (e.g., "Wi-Fi: On") is displayed.

An input by a contact is detected at a location corresponding to Wi-Fi control affordance 614, as indicated by focus selector 642. In accordance with a determination that the characteristic intensity of the contact meets control toggle criteria (e.g., the characteristic intensity of the contact is below hint press intensity threshold $IT_H$), the Wi-Fi control that corresponds to the Wi-Fi control affordance 614 is toggled from an enabled state to a disabled state.

FIG. 6D illustrates control user interface 608 after the Wi-Fi control has been toggled from a disabled state, as indicated in FIG. 6C, to an enabled state. To indicate that the Wi-Fi control has been toggled to an enabled state, the appearance of Wi-Fi control affordance 614 is changed (e.g., from a non-shaded state to a shaded state) and/or a notification 644 (e.g., "Wi-Fi: Off") is displayed.

FIGS. 6E-6F illustrate an input to display modification options for the Wi-Fi control. In FIG. 6E, an input by a contact is detected at a location corresponding to Wi-Fi control affordance 614, as indicated by focus selector 646. As indicated by intensity meter 606, the characteristic intensity of the contact is above hint intensity threshold level $IT_H$. In some embodiments, in accordance with a determination that the characteristic intensity of input has increased above hint intensity threshold level $IT_H$, the display (except for Wi-Fi control affordance 614) is shown blurred and/or shaded, as shown in FIG. 6E. In some embodiments, a level of blurring and/or shading of the display (except for Wi-Fi control affordance 614 and user interface elements corresponding to Wi-Fi control affordance 614) increases as a characteristic intensity of the contact increases.

In FIG. 6F, the characteristic intensity of the contact meets enhanced control criteria (e.g., increases above light press intensity threshold level $IT_L$, as indicated by intensity meter 606). In response to the input, a modification option menu 648 including modification options 650 ("Disconnect from HomeNetwork"), 652 ("Turn off for 1 hour"), 654 ("Turn off until I leave here"), 656 ("Connect to OtherNetwork") and 658 ("Wi-Fi Settings") is displayed.

In FIG. 6G, an input by a contact is detected at a location corresponding to modification option 654 ("Turn off until I leave here"), as indicated by focus selector 658.

In FIG. 6H, in response to the input illustrated in FIG. 6G, the Wi-Fi control is (temporarily) disabled, e.g., as indicated by the shaded state of Wi-Fi control affordance 614 and the notification 644 (e.g., "Wi-Fi: Off"). An input by a contact is detected at a location corresponding to Wi-Fi control affordance 614, as indicated by focus selector 660.

In FIG. 6I, the characteristic intensity of the contact indicated by focus selector 660 meets enhanced control criteria (e.g., increases above light press intensity threshold level $IT_L$, as indicated by intensity meter 606). In response to the input, modification option menu 662 including modification options 664 ("Connect to HomeNetwork"), 666 ("Connect to OtherNetwork"), 668 ("Turn on until tomorrow"), 670 ("Turn on until I leave here") and 672 ("Wi-Fi Settings") is displayed. A tap input (not shown) outside of modification option menu 662 dismisses modification option menu 662 from control user interface 608.

In FIG. 6J, an input by a contact is detected at a location corresponding to timer control affordance 624, as indicated by focus selector 674. The characteristic intensity of the contact meets control toggle criteria (e.g., the characteristic intensity of the contact is below hint press intensity threshold $IT_H$). In response to the input, a timer application 625 is displayed, as indicated in FIG. 6K.

In FIG. 6L, an input by a contact is detected at a location corresponding to timer control affordance 624, as indicated by focus selector 676. The characteristic intensity of the contact meets enhanced control criteria (e.g., increases above light press intensity threshold level $IT_L$, as indicated by intensity meter 606). In accordance with a determination that the timer associated with timer control affordance 624 is not running, a user interface as shown in FIG. 6M is displayed. In accordance with a determination that the timer associated with timer control affordance 624 is running, a user interface as shown in FIG. 6N is displayed.

FIG. 6M is a user interface 678 for setting a timer, in accordance with some embodiments. In some embodiments, user interface 678 for setting a timer is displayed partially overlaying user interface 601. In some embodiments, an input (e.g., by a contact as indicated by focus selector 676) at a location corresponding to adjustable control 680 sets a time duration to a desired timer duration (e.g., by moving focus selector 676 vertically to change the height of adjustable control 680). In some embodiments, the input by a contact detected at a location corresponding to timer control affordance 624, as described with regard to FIG. 6L, and the input detected at the location corresponding to adjustable control 680 are parts of the same continuous contact. In some embodiments, in response to liftoff of the contact detected at the location corresponding to timer control affordance 624 and/or adjustable control 680, user interface 678 ceases to be displayed and/or a timer is set to the current value indicated by adjustable control 680. In some embodiments, lift off of the contact detected at a location corresponding to timer control affordance 624, as described with regard to FIG. 6L, occurs prior to detection of the input at the location corresponding to adjustable control 680. In some embodiments, when the desired timer duration has been set using adjustable control 680, input is provided at start control affordance 682 to start the timer.

FIG. 6N is a user interface 682 that indicates progress of a running timer. For example, user interface 682 indicates (e.g., using a progress bar 684 and/or displayed text) an elapsed time and/or a remaining time of a timer in progress. In some embodiments, an input (e.g., by a contact as indicated by focus selector 683) at a location corresponding to progress bar 684 adjusts a remaining time of a timer (e.g., by moving focus selector 683 vertically to change the height of progress bar 684. In some embodiments, input received at pause control affordance 686 pauses the timer. In some embodiments, the input by a contact detected at a location corresponding to timer control affordance 624, as described with regard to FIG. 6L, and the input of the contact detected at the location corresponding to progress bar 684 are parts of the same continuous contact. In some embodiments, in response to liftoff of the contact detected at the location corresponding to adjustable control 680 and/or the location corresponding to progress bar 684, user interface 678 ceases to be displayed and/or a timer is set to an adjusted value indicated by progress bar 684.

In FIG. 6O, an input by a contact is detected at a location corresponding to camera control affordance 630, as indicated by focus selector 688. The characteristic intensity of the contact meets control toggle criteria (e.g., the characteristic intensity of the contact is below hint press intensity threshold level $IT_H$, as indicated by intensity meter 606). In response to the input, a camera application user interface 690 is displayed.

FIG. 6P illustrates a camera application user interface 690.

In FIG. 6Q, an input by a contact is detected at a location corresponding to camera control affordance 630, as indicated by focus selector 688. The characteristic intensity of the contact meets enhanced control criteria (e.g., the characteristic intensity of the contact increases above light press intensity threshold level $IT_L$, as indicated by intensity meter 606). In response to the input, modification option menu 694 including modification options 696 ("Take Selfie"), 698 ("Record Video"), 6100 ("Record Slo-Mo"), 6102 ("Take Photo") is displayed.

In FIG. 6R, the contact moves to a location corresponding to modification option 696 ("Take Selfie"), indicated by focus selector 688. In response to the input, camera application user interface 690 is displayed in selfie mode, as indicated in FIG. 6S.

FIGS. 6T-6U illustrate input to display one or more action options that correspond to an application icon in a springboard or home screen user interface that includes a plurality of application icons.

In FIG. 6T, an input is received at a location that corresponds to camera application icon 430, as indicated by focus selector 6106. When display-action-options criteria are met (e.g., including criteria that are met when a characteristic intensity of the contact increases above light press threshold $IT_L$), action option menu 6108 that includes action options 6110 ("Take Selfie"), 6112 ("Record Video"), 6114 ("Record Slo-Mo"), 6116 ("Take Photo") is displayed, as indicated at FIG. 6U. In some embodiments, modification options 696-6102 for camera control affordance 630 include at least a subset of action options 6110-6116 for an action menu corresponding to application icon 430.

FIGS. 6V-6X illustrate an input to display modification options for the flashlight control. In FIG. 6V, an input by a contact is detected at a location corresponding to flashlight control affordance 622, as indicated by focus selector 6111. As indicated by intensity meter 606, the characteristic intensity of the contact is above hint intensity threshold level $IT_H$.

In FIG. 6W, the characteristic intensity of the contact meets enhanced control criteria (e.g., increases above light press intensity threshold level $IT_L$, as indicated by intensity meter 606). In response to the input, modification option menu 6113 including modification options 6115 ("High"), 6117 ("Medium"), and 6118 ("Low") that correspond to a high light level, a medium light level, and a low light level, respectively, is displayed.

In FIG. 6X, the contact indicated by focus selector 6111 has moved to a location corresponding to modification option 6117 ("Medium").

In FIG. 6Y, in response to the input illustrated in FIG. 6X, flashlight has been turned on with a medium light level, e.g., as indicated by the non-shaded state of flashlight control affordance 622 and/or light 6120 emitted by a flashlight of the device.

FIGS. 7A-7W illustrate exemplary user interfaces for deleting content in accordance with some embodiments. The user interfaces in these figures are used to illustrate the processes described below, including the processes in FIGS. 20A-20G. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 7A-7W will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in FIGS. 7A-7W on the touch-sensitive surface 451 while displaying the user interfaces shown in FIGS. 7A-7W on the display 450, along with a focus selector.

FIG. 7A illustrates a user interface 702 that includes an editable content area 704 that includes a plurality of characters. User interface 702 also includes content deletion control 708. Detecting a deletion input includes detecting a contact at a location on touch-sensitive surface 112, as indicated by focus selector 710, that corresponds to content deletion control 708. Content deletion control 708 is, e.g., a delete key in a keyboard 709. A characteristic intensity of the contact is indicated by intensity meter 712. In the illustrative example of FIG. 7A, a characteristic intensity of the contact has increased above a deep press intensity threshold ITD, as indicated by intensity meter 712. Region 714 of FIG. 7A is used in FIGS. 7B-7C to illustrate character-by-character deletion and word-by-word deletion.

FIG. 7B illustrates character-by-character deletion. At a first time T=t1, a first character has been deleted from the plurality of characters in editable content area 704 of region 714 at a position corresponding to content insertion indicator 716. At a second time T=t2 that is later than first time t1, a second character has been deleted from the plurality of characters in editable content area 704 at a position corresponding to content insertion indicator 716. At a third time T=t3 that is later than second time t2, a third character has been deleted from the plurality of characters in editable content area 704 at a position corresponding to content insertion indicator 716.

FIG. 7C illustrates word-by-word deletion. At a first time T=t1, a first word has been deleted from the plurality of characters in editable content area 704 of region 714 at a position corresponding to content insertion indicator 716. At a second time T=t2 that is later than first time t1, a second word has been deleted from the plurality of characters in editable content area 704 at a position corresponding to content insertion indicator 716. At a third time T=t3 that is later than second time t2, a third word has been deleted from the plurality of characters in editable content area 704 at a position corresponding to content insertion indicator 716.

FIGS. 7D-7I are graphs that illustrate heuristics for determining content deletion based on characteristic intensity of a contact in relation to an intensity threshold $IT_D$ (e.g., a deep press intensity threshold $IT_D$ as indicated by intensity meter 712 of FIG. 7A) and time thresholds T1 and T2. Time threshold T1 defines a first time period time threshold T2 defines a second time period that is longer than the first time period.

In FIG. 7D, 720 indicates a characteristic intensity of a contact at a location corresponding to content deletion control 708. The contact is maintained for a first time period T1 and continues to be maintained for a second time period T2. The characteristic intensity of the contact does not increase above the deep press intensity threshold level $IT_D$. In accordance with a determination that the contact has been maintained for the first time period T1, content is deleted from editable content area 704 character-by-character (e.g., as illustrated in FIG. 7B) at a rate that does not vary based on the characteristic intensity of the contact. In accordance with a determination that the contact has been maintained for the second time period T2, content is deleted from editable content area 704 word-by-word (e.g., as illustrated in FIG. 7C) at a rate that does not vary based on the characteristic intensity of the contact.

In FIG. 7E, 722 indicates a characteristic intensity of a contact at a location corresponding to content deletion control 708. The characteristic intensity of the contact increases above deep press intensity threshold level $IT_D$ at a time $T_{ITD}$, which occurs between first time threshold T1 and second time threshold T2. In accordance with a determination that the characteristic intensity of the contact increases above intensity threshold level $IT_D$ after the contact has been maintained on the touch-sensitive surface 112 for the first time period T1, content is deleted from editable content area 704 character-by-character (e.g., as illustrated in FIG. 7B) at a rate that varies based on the characteristic intensity of the contact. In some embodiments, in accordance with a determination that the contact has been maintained for second time period T2, instead of switching to deleting content word-by-word, content continues to be deleted character-by-character.

In FIG. 7F, 724 indicates a characteristic intensity of a contact at a location corresponding to content deletion control 708. The characteristic intensity of the contact increases above deep press intensity threshold level $IT_D$ at a time $T_{ITD}$, which occurs after second time period T2. In accordance with a determination that the characteristic intensity of the contact increases above intensity threshold level $IT_D$ after the contact has been maintained on the touch-sensitive surface 112 for the second time period T2, content is deleted from editable content area 704 word-by word (e.g., as illustrated in FIG. 7C) at a rate that varies based on the characteristic intensity of the contact.

In FIG. 7G, 726 indicates a characteristic intensity of a contact at a location corresponding to content deletion control 708. The characteristic intensity of the contact increases above deep press intensity threshold level $IT_D$ at a time $T_{ITD}$, which occurs between first time threshold T1 and second time threshold T2. In accordance with a determination that the characteristic intensity of the contact increases above the intensity threshold level $IT_D$ after the contact has been maintained on the touch-sensitive surface 112 for the first time period T1 and before the contact has been maintained on the touch-sensitive surface 112 for the second time period T2, content is deleted from editable content area 704 word-by word (e.g., as illustrated in FIG. 7C) before second time period T2 has elapsed (e.g., at a rate that varies based on the characteristic intensity of the contact).

In FIG. 7H, 728 indicates a characteristic intensity of a contact at a location corresponding to content deletion control 708. The characteristic intensity of the contact increases above the deep press intensity threshold level $IT_D$ at a time $T_{ITD1}$, and decreases below the deep press intensity threshold level $IT_D$ at a time $T_{ITD2}$. After $T_{ITD2}$, content continues to be deleted from editable content area 704 word-by word (e.g., as illustrated in FIG. 7C) before second time period T2 has elapsed.

In FIG. 7I, 730 indicates a characteristic intensity of a contact at a location corresponding to content deletion control 708. In accordance with a determination that liftoff of the contact occurs before time period $T_{tap}$ (e.g., a tap time threshold) has elapsed, a single character is deleted from editable content area 704.

In FIG. 7J, 731 indicates a characteristic intensity of a contact at a location corresponding to content deletion control 708. The characteristic intensity of the contact increases above a light press intensity threshold level $IT_L$ at a time $T_{ITL}$ and increases above a deep press intensity threshold level $IT_D$ at a time $T_{ITL}$. In some embodiments, in accordance with a determination that the characteristic intensity of the contact increases above the light press intensity threshold $IT_L$, content is deleted character-by-character from editable content area 704 (e.g., at a non-varying rate). In some embodiments, in accordance with a determination that the contact has been maintained on the touch-sensitive surface for a first time period (e.g., while the characteristic intensity of the contact is above the light press intensity threshold $IT_L$), content is sequentially deleted (e.g., character-by-character) at a rate that varies based on the characteristic intensity of the contact. In some embodiments, in accordance with a determination that the characteristic intensity of the contact increases above the deep press intensity threshold $IT_D$, content is deleted word-by-word from editable content area 704 (e.g., at a non-varying rate). In some embodiments, in accordance with a determination that the contact has been maintained on the touch-sensitive surface for a second time period (e.g., while the characteristic intensity of the contact is above the deep press intensity threshold $IT_D$), content is sequentially deleted (e.g., word-by-word) at a rate that varies based on the characteristic intensity of the contact.

FIGS. 7K-7N illustrate a content insertion indicator repositioning mode. In FIG. 7K, a contact detected at a location (indicated by focus selector 732) on touch-sensitive surface 112 that is distinct from the location of content deletion control 708. For example, a contact is detected at a location that corresponds to a key of keyboard 709, such as a character key (e.g., "A"). In response to an input that is detected (e.g., a tap input) and that does not meet content insertion repositioning mode criteria (e.g., the duration is below a threshold duration and/or the characteristic intensity of the contact does not increase above an intensity threshold, such as deep press intensity threshold ITD), a function that corresponds to the key of the keyboard occurs (e.g., a character corresponding to the character key is added to editable content area 704, as shown in FIG. 7L). In accordance with a determination that a characteristic intensity of the contact increases above deep press intensity threshold $IT_D$, a content insertion indicator repositioning mode is activated, as shown in FIG. 7M. In some embodiments, in accordance with a determination that a characteristic intensity of the contact increased above the deep press intensity threshold $IT_D$, the device outputs a tactile output, as indicated at 737. In FIG. 7N, while the content insertion indication repositioning mode is activated, content insertion indicator 716 moves from a first position 716a to a second position 716b along a path indicated by arrow 736, which corresponds (e.g., in length and/or direction) to a path 734 along which focus selector 732 moves from a first position 732a to a second position 732b. In FIG. 7N, content insertion indicator 716 is shown at the position to which it was moved.

FIG. 7O-1 illustrates a tactile output parameter that increases in accordance with a characteristic intensity of the contact. At a time T=t1, a characteristic intensity of a contact, as indicated by focus selector 710, at a location corresponding to content deletion control 708, is above a contact detection intensity threshold $IT_0$, as indicated by intensity meter 712. A tactile output that is output at t1 has a first tactile output parameter (e.g., a first amplitude). At a time T=t2, a characteristic intensity of a contact at a location corresponding to content deletion control 708 is above a hint intensity threshold $IT_H$. A tactile output that is output at t2 has a second tactile output parameter that is larger than the first tactile output parameter (e.g., a second amplitude that is greater than the first amplitude). At a time T=t3, a characteristic intensity of a contact at a location corresponding to content deletion control 708 is above a light press intensity threshold $IT_L$. A tactile output that is output at t3 has a third tactile output parameter that is larger than the second tactile output parameter (e.g., a third amplitude that is greater than the second amplitude). At a time T=t4, a characteristic intensity of a contact at a location corresponding to content deletion control 708 is above a deep press intensity threshold $IT_D$. A tactile output that is output at t4 has a fourth tactile output parameter that is larger than the third tactile output parameter (e.g., a fourth amplitude that is greater than the third amplitude). In some embodiments, the contacts described with regard to times t1, t2, t3, and/or t4 are parts of a single continuous contact.

In some embodiments, one or more keys of content input area 740 do not trigger a tactile output when activated. For example, in response to an input detected by a contact at a location corresponding to a character 742 (the letter "a"), no tactile output occurs in accordance with a determination that a characteristic intensity of the contact is above a deep press intensity threshold $IT_D$. No tactile output occurs at t5.

FIG. 7O-2 illustrates a tactile output parameter that decreases in accordance with a characteristic intensity of a contact. At a time T=t1, a characteristic intensity of a contact, as indicated by focus selector 710, at a location corresponding to content deletion control 708, is above a contact detection intensity threshold $IT_0$, as indicated by intensity meter 712. A tactile output that is output at t1 has a first tactile output parameter (e.g., a first amplitude). At a time T=t2, a characteristic intensity of a contact at a location corresponding to content deletion control 708 is above a hint intensity threshold $IT_H$. A tactile output that is output at t2 has a second tactile output parameter that is smaller than the first tactile output parameter (e.g., a second amplitude that is lower than the first amplitude). At a time T=t3, a characteristic intensity of a contact at a location corresponding to content deletion control 708 is above a light press intensity threshold $IT_L$. A tactile output that is output at t3 has a third tactile output parameter that is smaller than the second tactile output parameter (e.g., a third amplitude that is lower than the second amplitude). At a time T=t4, a characteristic intensity of a contact at a location corresponding to content deletion control 708 is above a deep press intensity threshold $IT_D$. A tactile output that is output at t4 has a fourth tactile output parameter that is smaller than the third tactile output parameter (e.g., a fourth amplitude that is lower than the third amplitude). In some embodiments, the contacts described with regard to times t1, t2, t3, and/or t4 are parts of a single continuous contact.

FIGS. 7P-7S illustrate tactile outputs generated when a contact moves across menu items. In FIG. 7P, a menu-display input is detected that includes a contact at a location (e.g., a location indicated by focus selector 742) on touch-sensitive surface 112 that corresponds to content input area (e.g., a keyboard) 740. In response to detecting the menu-display input (e.g., a long press input), a menu 744 is displayed, as shown in FIG. 7Q. The focus selector 742 moves along a path indicated by arrow 743 to a location that corresponds to menu item 746 of menu 744, as shown in FIG. 7R. In some embodiments, in accordance with a determination that the focus selector 742 moved to the location of menu item 746, the device outputs a tactile output, as illustrated at 751. The focus selector 742 moves along a path indicated by arrow 745 to a location that corresponds to menu item 748 of menu 744, as shown in FIG. 7S. In some embodiments, in accordance with a determination that the focus selector 742 moved to the location of menu item 748, the device outputs a tactile output, as illustrated at 753.

FIG. 7T illustrates tactile outputs with a tactile output parameter that increases as the speed of typing increases. In some embodiments, in response to input detected at keys of the device (e.g., keys of content input area 740), the device outputs tactile output that varies based on the time between subsequent inputs. In FIG. 7T, each line represents a tactile output that is output in response to an input detected at a key. A tactile output parameter (e.g., tactile output amplitude) increases as time between a line and the immediately preceding line decreases.

FIG. 7U illustrates audio outputs with an audio output parameter that increases as the speed of typing increases. In some embodiments, in response to input detected at keys of the device (e.g., keys of content input area 740), the device outputs audio output that varies based on the time between subsequent inputs. In FIG. 7U, each line represents an audio output that is output in response to an input detected at a key. An audio output parameter (e.g., audio output amplitude) increases as time between a line and the immediately preceding line decreases.

FIG. 7V illustrates tactile outputs with a tactile output parameter that decreases as the speed of typing increases. In FIG. 7V, each line represents a tactile output that is output in response to an input detected at a key. A tactile output parameter (e.g., tactile output amplitude) decreases as time between a line and the immediately preceding line decreases.

FIG. 7W illustrates audio outputs with an audio output parameter that decreases as the speed of typing increases. In FIG. 7U, each line represents an audio output that is output in response to an input detected at a key. An audio output parameter (e.g., audio output amplitude) decreases as time between a line and the immediately preceding line decreases.

In some embodiments, as the speed of typing increases, both a tactile output parameter of tactile outputs and an audio output parameter of audio outputs increases. In some embodiments, as the speed of typing increases, both a tactile output parameter of tactile outputs and an audio output parameter of audio outputs decreases. In some embodiments, as the speed of typing increases, a tactile output parameter of tactile outputs increases and an audio output parameter of audio outputs decreases. In some embodiments, as the speed of typing increases, a tactile output parameter of tactile outputs decreases and an audio output parameter of audio outputs increases.

Figure 8A:
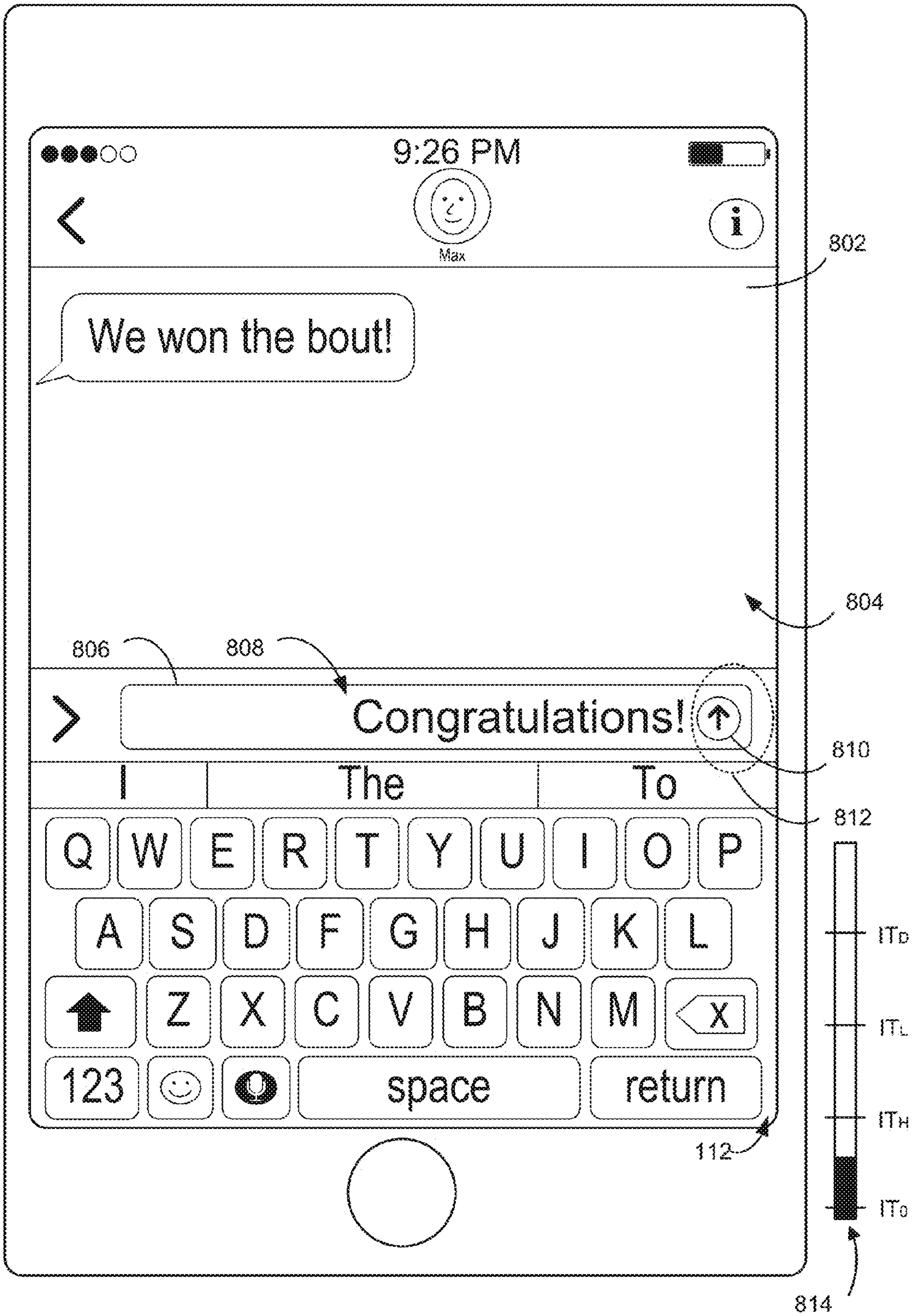
FIGS. 8A-8AI illustrate exemplary user interfaces for detecting input at a messaging interface in accordance with some embodiments.

FIGS. 8A-8AI illustrate exemplary user interfaces for detecting input at a messaging interface in accordance with some embodiments. The user interfaces in these figures are used to illustrate the processes described below, including the processes in FIGS. 22A-22G. Although some of the examples which follow will be given with reference to inputs on a touch-sensitive surface display (where the touch-sensitive surface and the display are combined), in some embodiments, the device detects inputs on a touch-sensitive surface 451 that is separate from the display 450, as shown in FIG. 4B.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 8A-8AI will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts described in FIGS. 8A-8AI on the touch-sensitive surface 451 while displaying the user interfaces shown in FIGS. 8A-8AI on the display 450, along with a focus selector.

FIG. 8A illustrates a messaging interface 802 that includes a conversation transcript 804 and a message input area 806. The message input area includes message content 808 ("Congratulations!") and affordance 810 for sending a message. A contact with touch-sensitive surface 112 occurs at a location that corresponds to affordance 810 for sending a message ("send affordance 810"), as indicated by focus selector 812. A characteristic intensity of the contact is indicated by intensity meter 814.

Figure 8B:
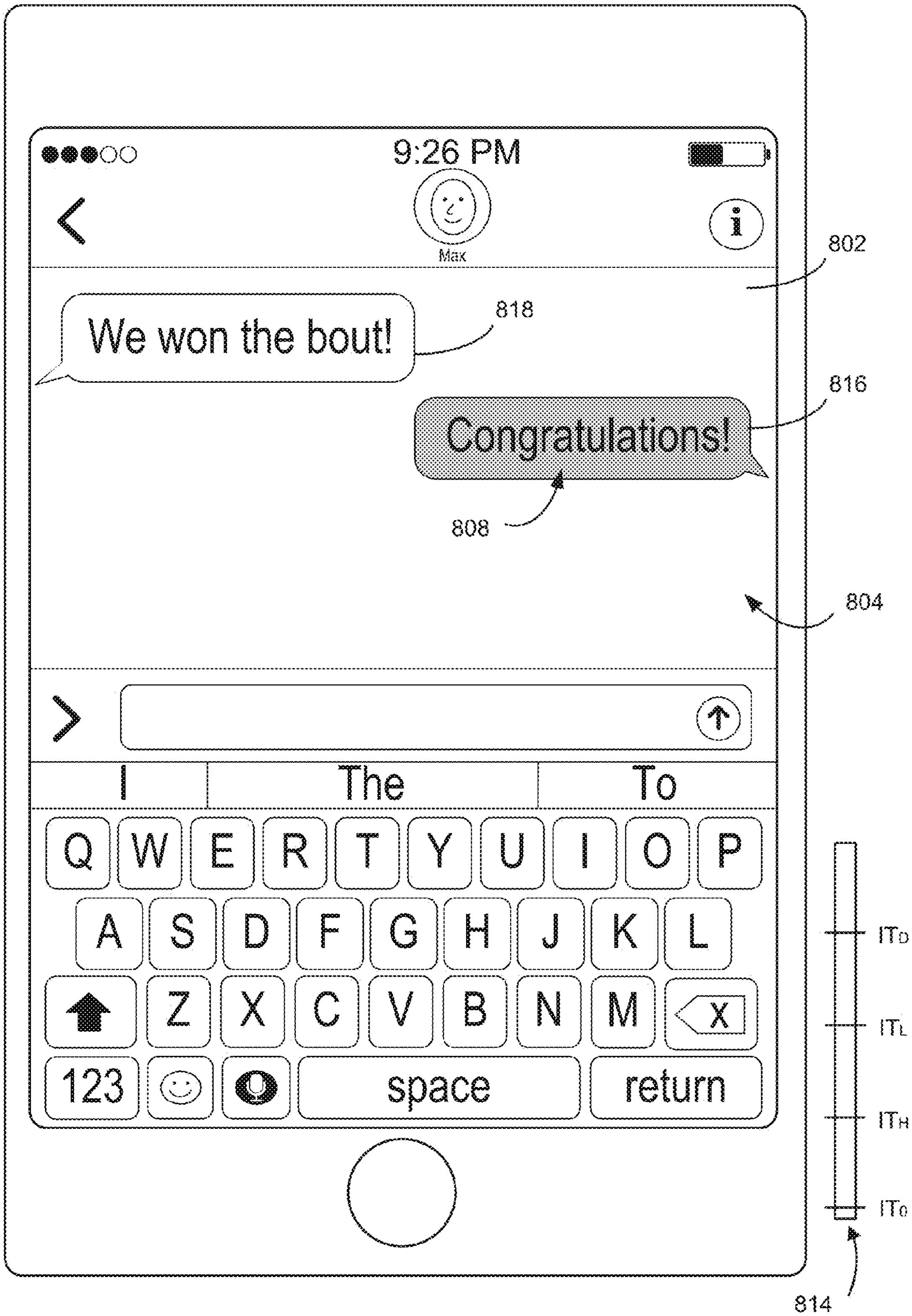

FIG. 8B illustrates messaging interface 802 after a message including message content 808 is sent to a remote device (e.g., in response to a tap gesture received at send affordance 810). Message content 808 is displayed in a message region 816 in the conversation transcript 804 of messaging interface 802. A message region is a message bubble, platter, or other container for a message in a conversation transcript of a messaging session. In some embodiments, message regions of sent messages are visually distinguished from message regions of received messages in conversation transcript 804. For example, message region 816 of the sent message including message content 808 has a first region color and/or a first region orientation (indicated by the direction of a stem of the region) and message region 817 of a received message in conversation transcript 804 has a second region color that is different from the first region color and/or a second orientation that is different from the first orientation.

Figure 8C:

FIG. 8C illustrates a messaging interface 818 of a remote device 820 that received a message including message content 808.

Figure 8D:

FIG. 8D illustrates messaging interface 802 of device 100 while an input including a contact with touch-sensitive surface 112 that has a characteristic intensity above a hint intensity threshold $IT_H$, as indicated by intensity meter 814, is detected at a location corresponding to send affordance 810. The location of the contact is indicated by focus selector 812. In some embodiments, in accordance with a determination that the contact at the location corresponding send affordance 810 has increased above the hint intensity threshold $IT_H$, at least a portion of the messaging user interface 802 is blurred. In some embodiments, the extent of the blurring varies in proportion to the characteristic intensity of the contact, as indicated in FIG. 8E.

Figure 8E:
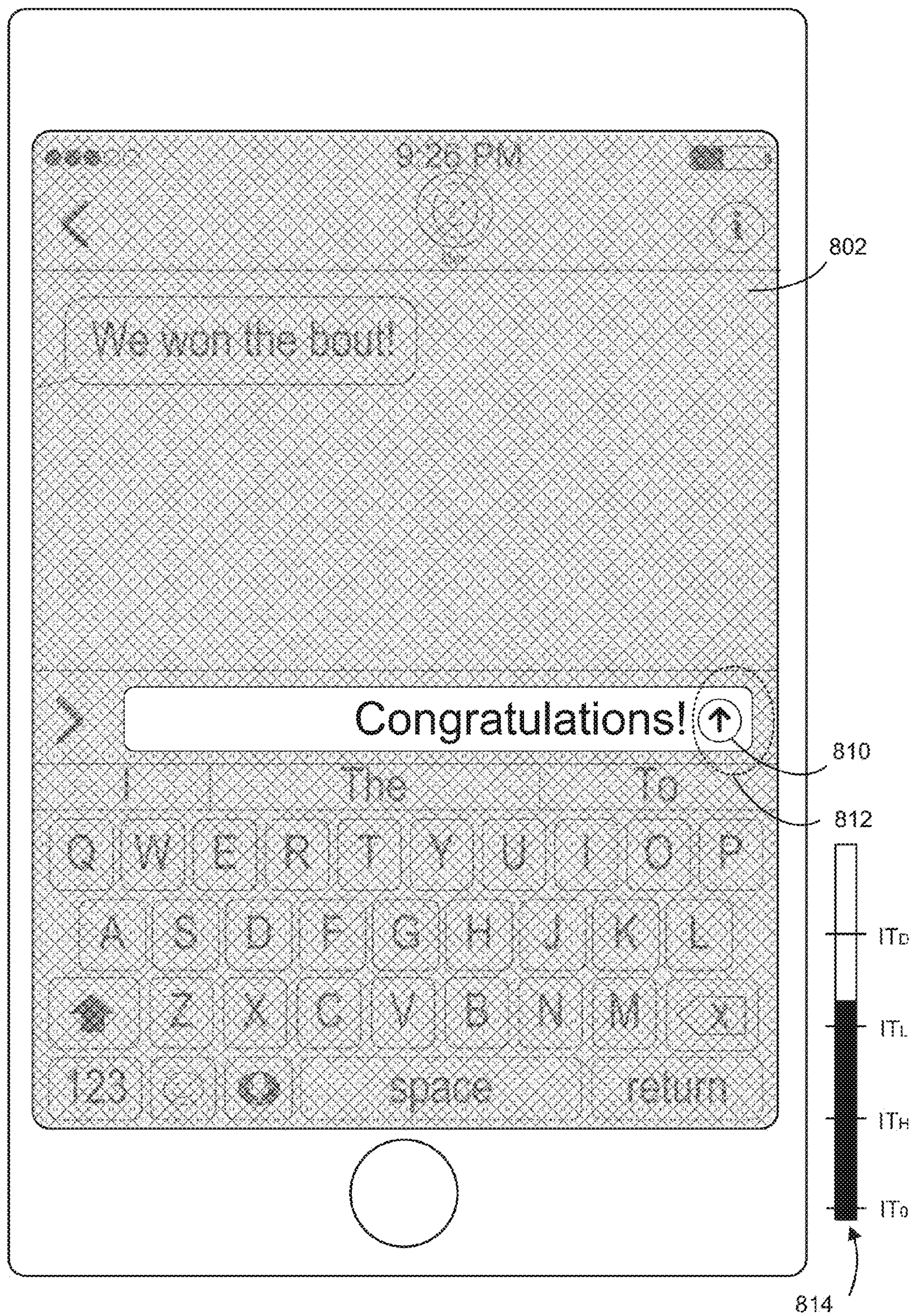

FIG. 8E illustrates messaging interface 802 of device 100 while an input including a contact that has a characteristic intensity above a light press intensity threshold $IT_L$, as indicated by intensity meter 814, is detected at a location corresponding to send affordance 810. The location of the contact is indicated by focus selector 812.

Figure 8F:
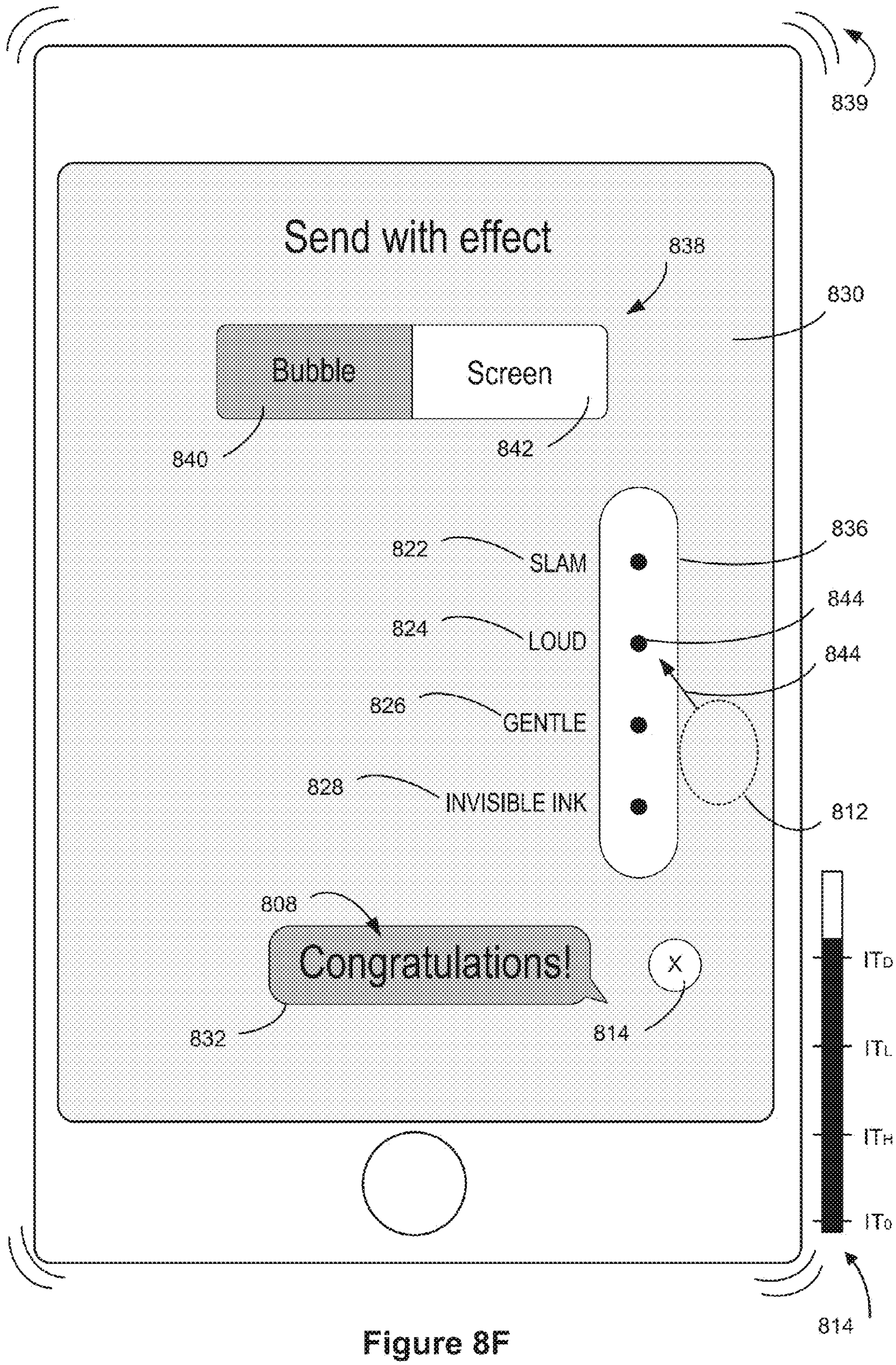

In accordance with a determination that the characteristic intensity of the contact detected at a location corresponding to send affordance 810 increases above a deep press intensity threshold $IT_D$, a plurality of message impact effect options are displayed, as indicated in FIG. 8F. The plurality of message impact effect options include, e.g., 822 ("Slam"), 824 ("Loud"), 826 ("Gentle"), and 828 ("Invisible Ink"). In some embodiments, the plurality of message impact effect options are displayed in a message impact effect options interface 830 that includes message content 808 displayed in a message region 832 (e.g., a default message region), a dismiss affordance 834 (e.g., for returning to messaging interface 802), a message impact effect option selection control 836 (e.g., for selection an impact effect option from the plurality of message impact effect options), and/or an enhanced message type selection control 838. In some embodiments, enhanced message type selection control 838 is a toggle control that includes an affordance 840 ("Bubble") for displaying a plurality of message impact effect options (e.g., options that effect a message region, such as a message bubble) and an affordance 842 ("Screen") for displaying one or more enhanced message options that are distinct from the plurality of message impact effect options (e.g., for displaying full screen animation options). In some embodiments, in accordance with the determination that the characteristic intensity of the contact detected at a location corresponding to send affordance 810 increases above the deep press intensity threshold $IT_D$, the device outputs a tactile output as indicated at 839.

While the plurality of message impact effect options are displayed, the contact moves along a path indicated by arrow 844 to a position corresponding to "Loud" message impact effect option 824. In some embodiments, message impact effect option selection control 836 includes affordances that correspond to respective message impact effect options, such as affordance 845 that corresponds to "Loud" message impact effect option 824. In some embodiments, when a contact moves across touch-sensitive surface 112 to a position that corresponds to affordance 845, the affordance morphs into an affordance 847 for sending message content 808 with a selected message impact effect option.

Figure 8G:
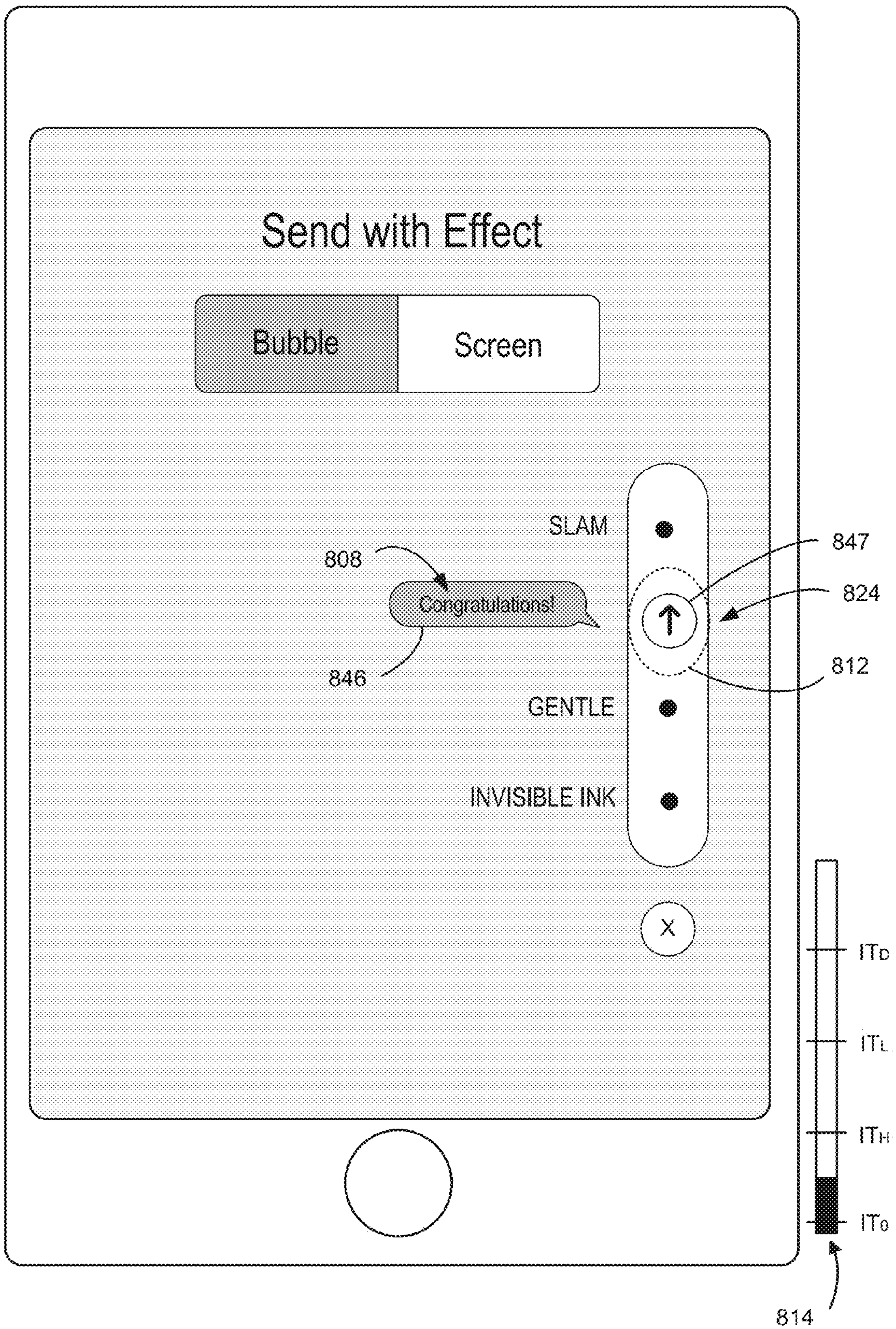
Figure 8H:
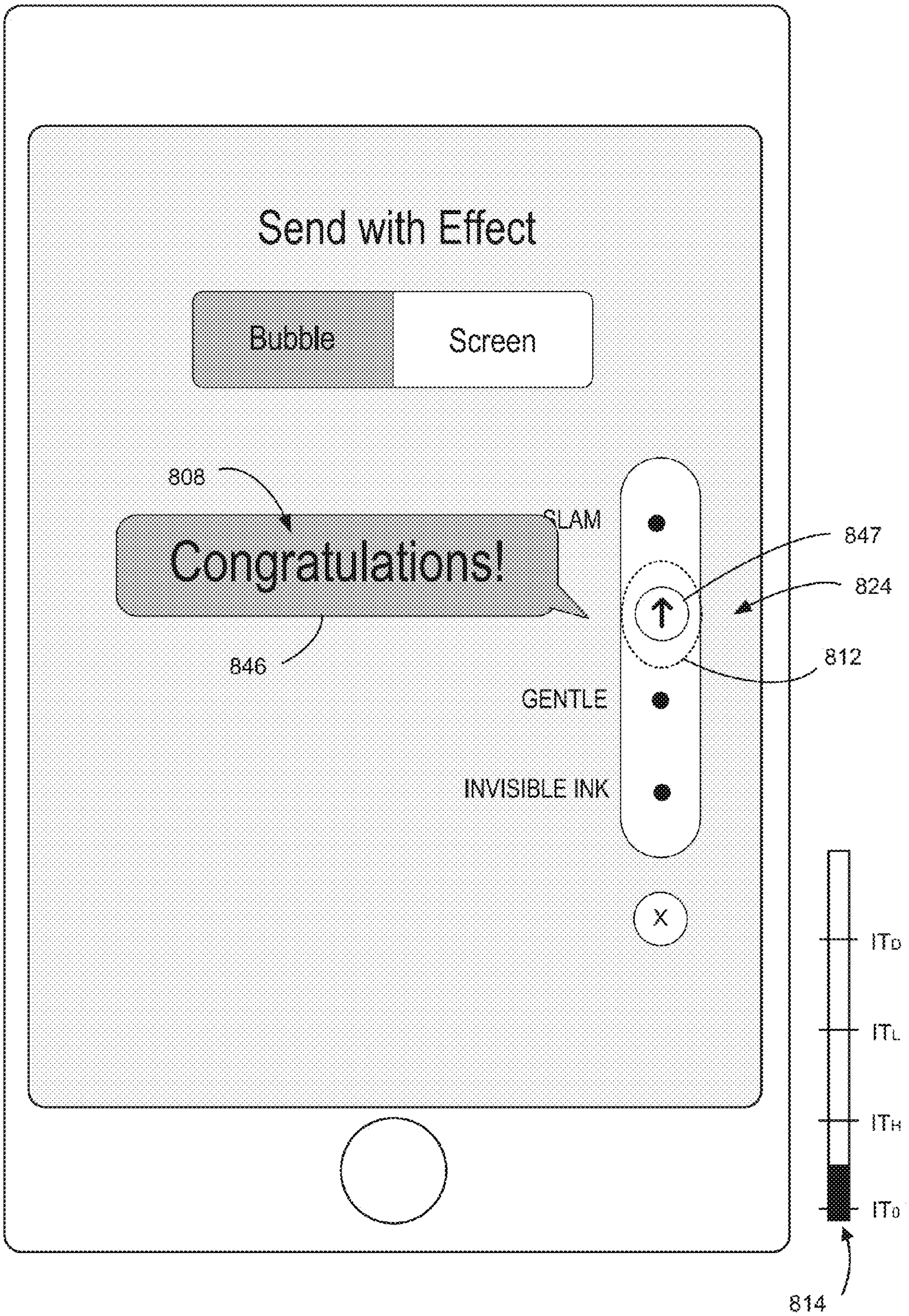
Figure 8I:
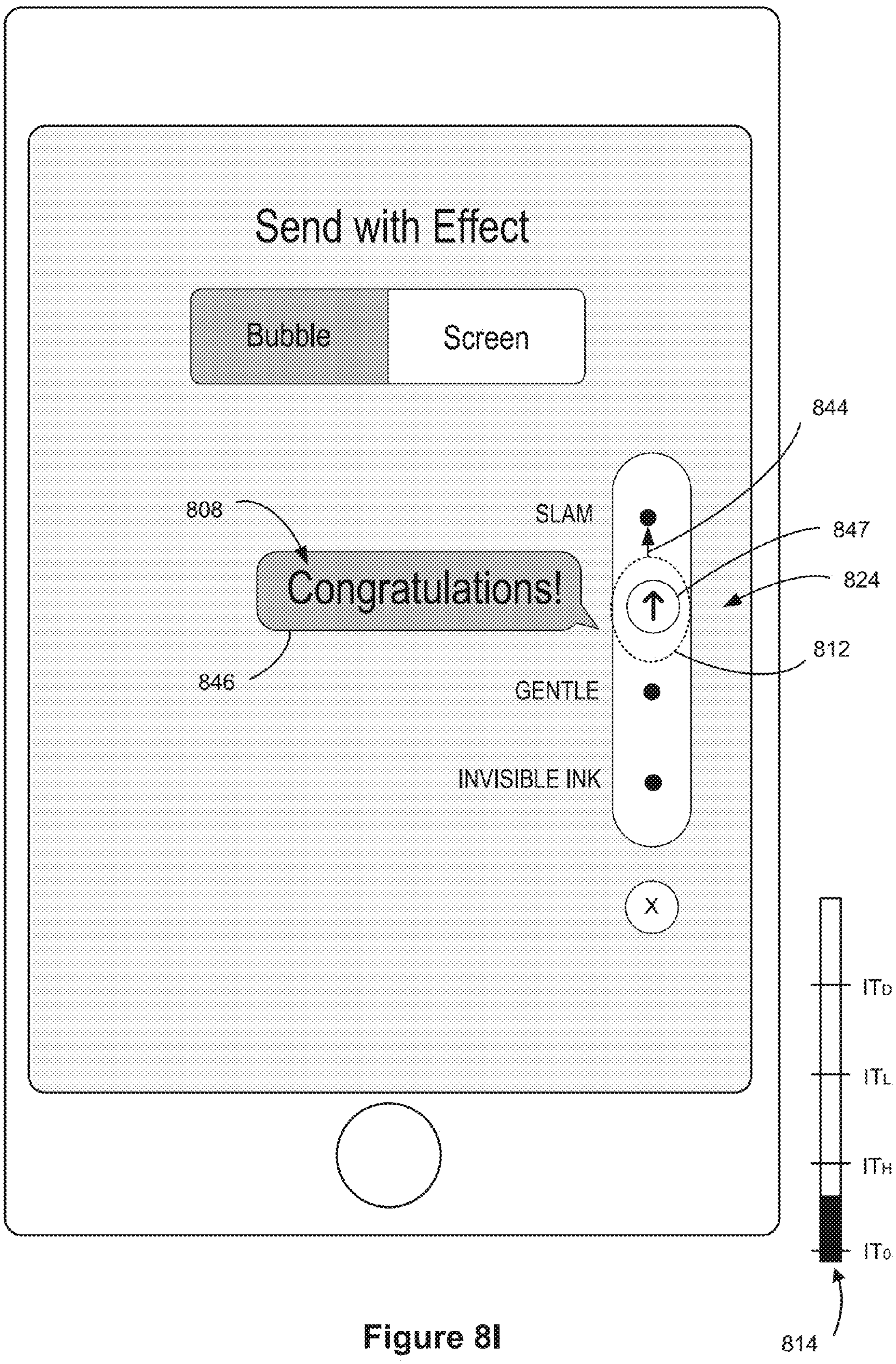

In FIG. 8G, the contact, as indicated by focus selector 812, is at a location on message impact effect option selection control 836 that corresponds to "Loud" message impact effect option 824. In accordance with a determination that the contact is at the location corresponding to the "Loud" message impact effect option 824, a preview of the "Loud" message impact effect option 824 occurs. For example, a preview of an animation for the "Loud" message impact effect option 824 is displayed, as illustrated in FIGS. 8G-8I. In FIG. 8G, message content 808 is displayed in a first altered message region 846. In a first part of a preview of the "Loud" message impact effect option 824, first altered message region 846 is smaller than a default message region for message content 808 (e.g., message region 816 of FIG. 8B) and text of message content 808 is smaller than the default message text (e.g., as shown in FIG. 8B).

In FIG. 8H, a second part of the preview of the "Loud" message impact effect option 824 is shown. In the second part of the preview of the "Loud" message impact effect option 824, first altered message region 846 is larger than a default message region for message content 808 (e.g., message region 816 of FIG. 8B) and text of message content 808 is larger than the default message text (e.g., as shown in FIG. 8B).

In FIG. 8I, a third part of the preview of the "Loud" message impact effect option 824 is shown. In the third part of a preview of the "Loud" message impact effect option 824, first altered message region 846 has a size that is the same as the default message region size (e.g., message region 816 of FIG. 8B) and the size of the text of message content 808 is the default message text size (e.g., as shown in FIG. 8B).

The contact moves along a path indicated by arrow 849 to a position corresponding to "Slam" message impact effect option 822.

Figure 8J:
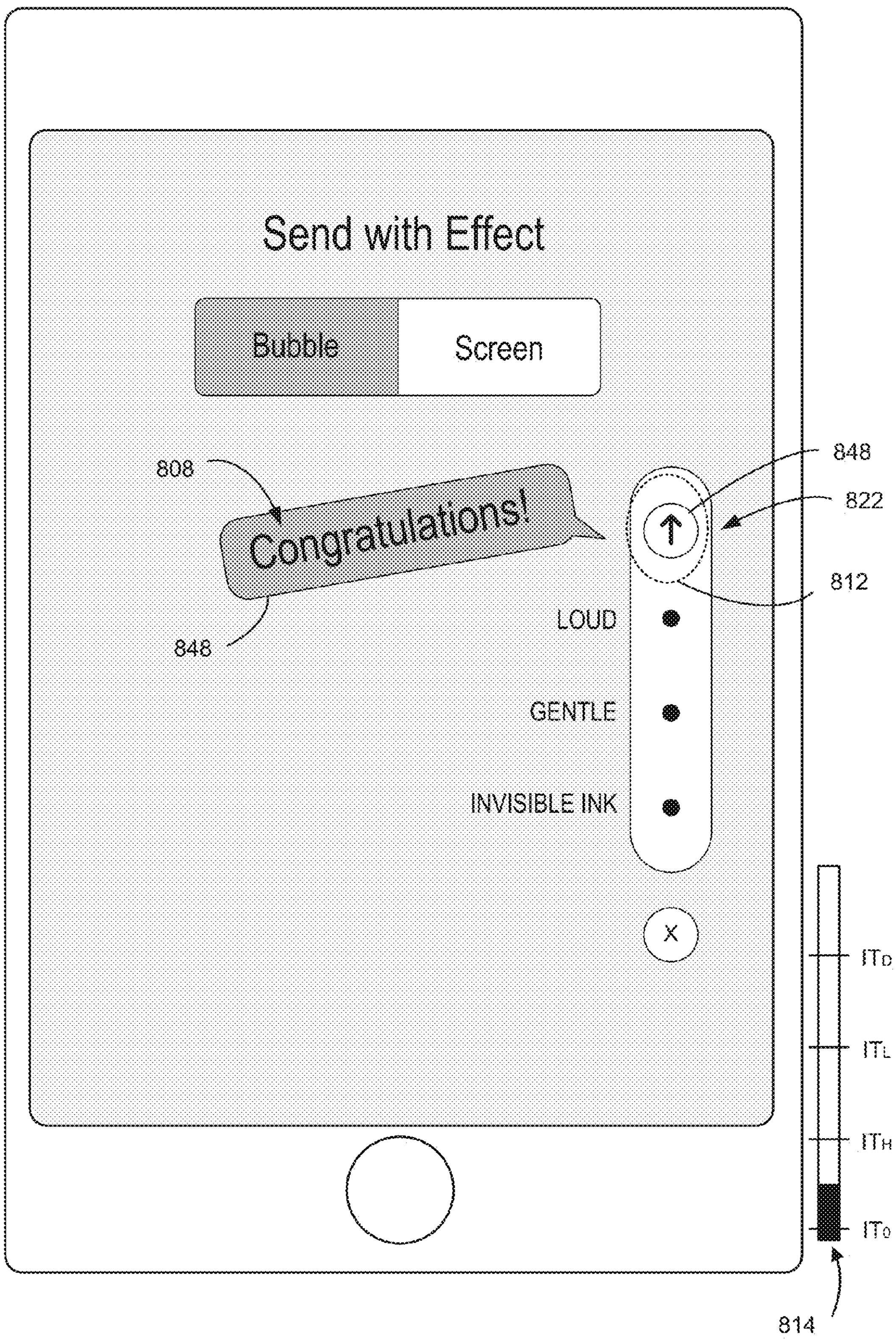
Figure 8K:
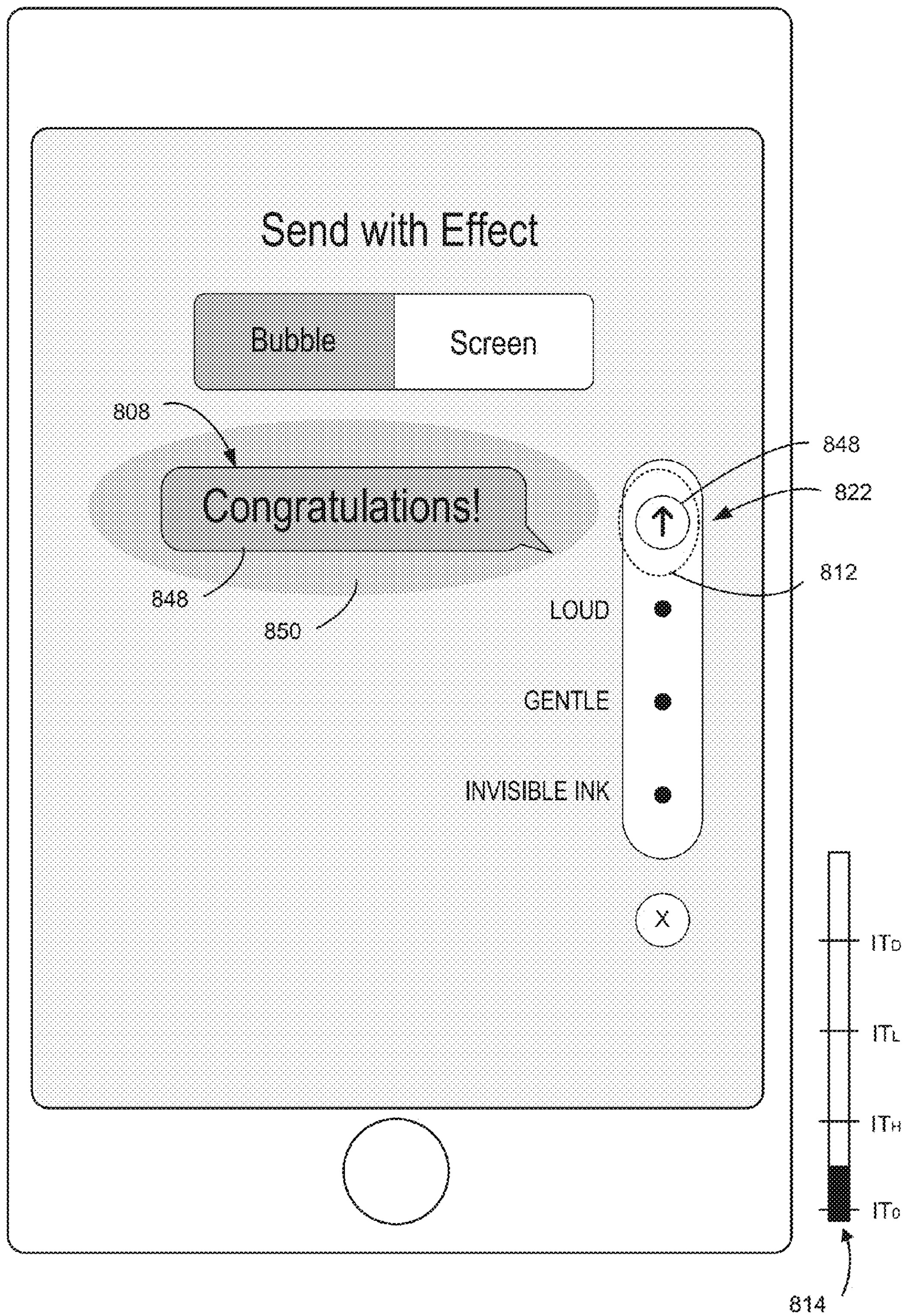
Figure 8L:
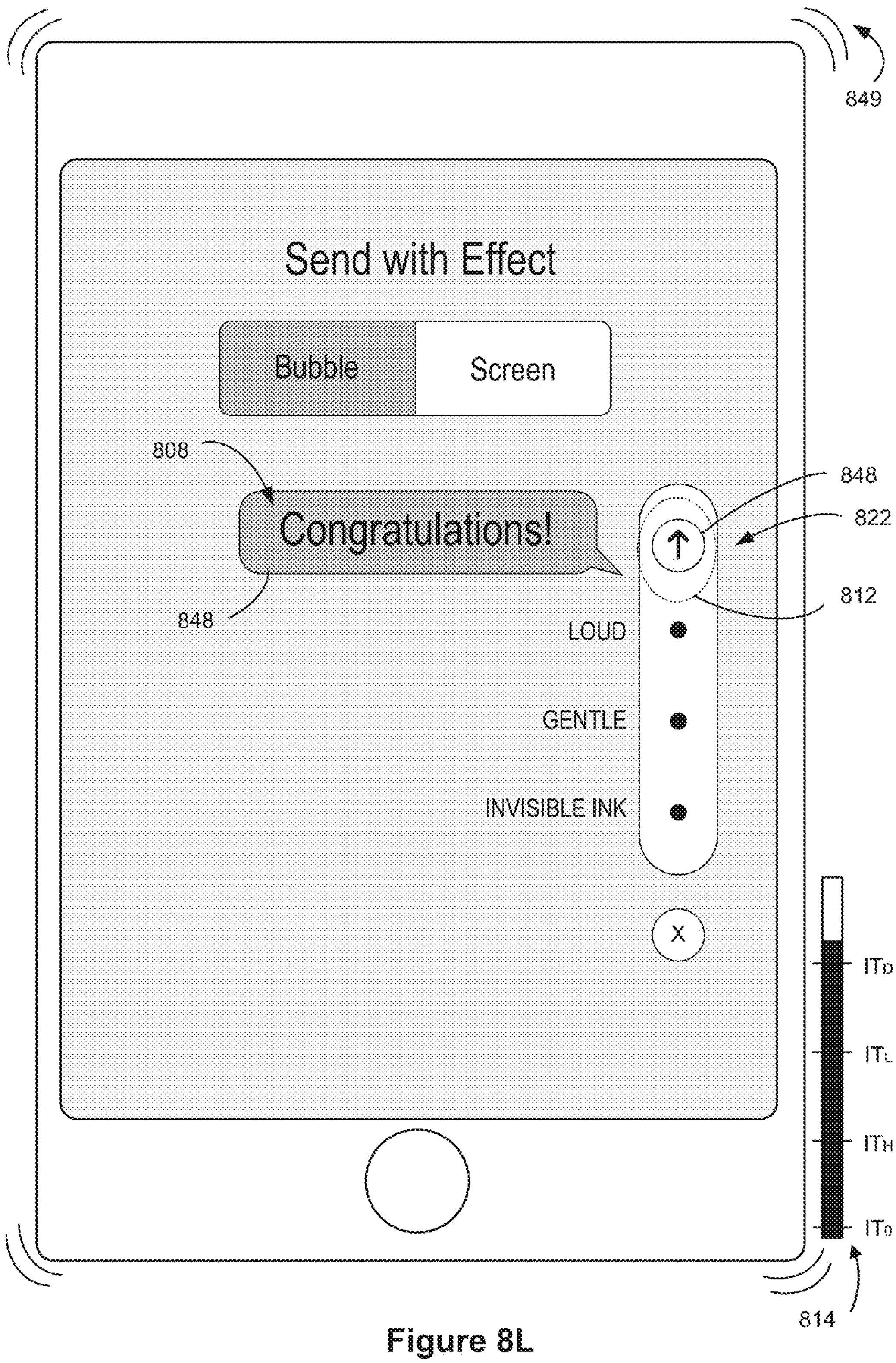

In FIG. 8J, the contact, as indicated by focus selector 812, is at a location on message impact effect option selection control 836 that corresponds to "Slam" message impact effect option 822 (e.g., in accordance with a determination that the contact is at the location corresponding to the "Slam" message impact effect option 822, a preview of the "Slam" message impact effect option 822 occurs. For example, a preview of an animation for the "Slam" message impact effect option 822 is displayed, as illustrated in FIGS. 8J-8L. In FIG. 8J, message content 808 is displayed in a second altered message region 848. In a first part of a preview of the "Slam" message impact effect option 824, second altered message region 848 has a different orientation from the default message region for message content 808 (e.g., message region 816 of FIG. 8B).

In FIG. 8K, a second part of the preview of the "Slam" message impact effect option 822 is shown. In the second part of the preview of the "Slam" message impact effect option 822, an impact cloud 850 is displayed behind second altered message region 848 (e.g., illustrating dust scattered as the message lands with a thud).

In FIG. 8L, a third part of the preview of the "Slam" message impact effect option 822 is shown. In the third part of a preview of the "Slam" message impact effect option 822, second altered message region 848 has an orientation that is the same as the orientation of a default message region (e.g., message region 816 of FIG. 8B) and the impact cloud 850 has disappeared.

FIG. 8L illustrates an input to send a message with a selected message impact effect option. A characteristic intensity of the contact indicated by focus selector 812 increases above deep press intensity threshold $IT_D$, as indicated by intensity meter 814, while the contact is at a location on touch-sensitive surface 112 corresponding to affordance 847 for sending message content 808 with a selected message impact effect option. Because the "Slam" message impact effect option 822 is selected, in accordance with a determination that the characteristic intensity of the contact increases above $IT_D$, message content 808 is sent to a remote device with the "Slam" message impact effect option 822. In some embodiments, in accordance with a determination that an input to send message content 808 with "Slam" message impact effect option 828 have been detected (e.g., above deep press intensity threshold $IT_D$, as indicated by intensity meter 814), the device outputs a tactile output as indicated at 849.

Figure 8M:
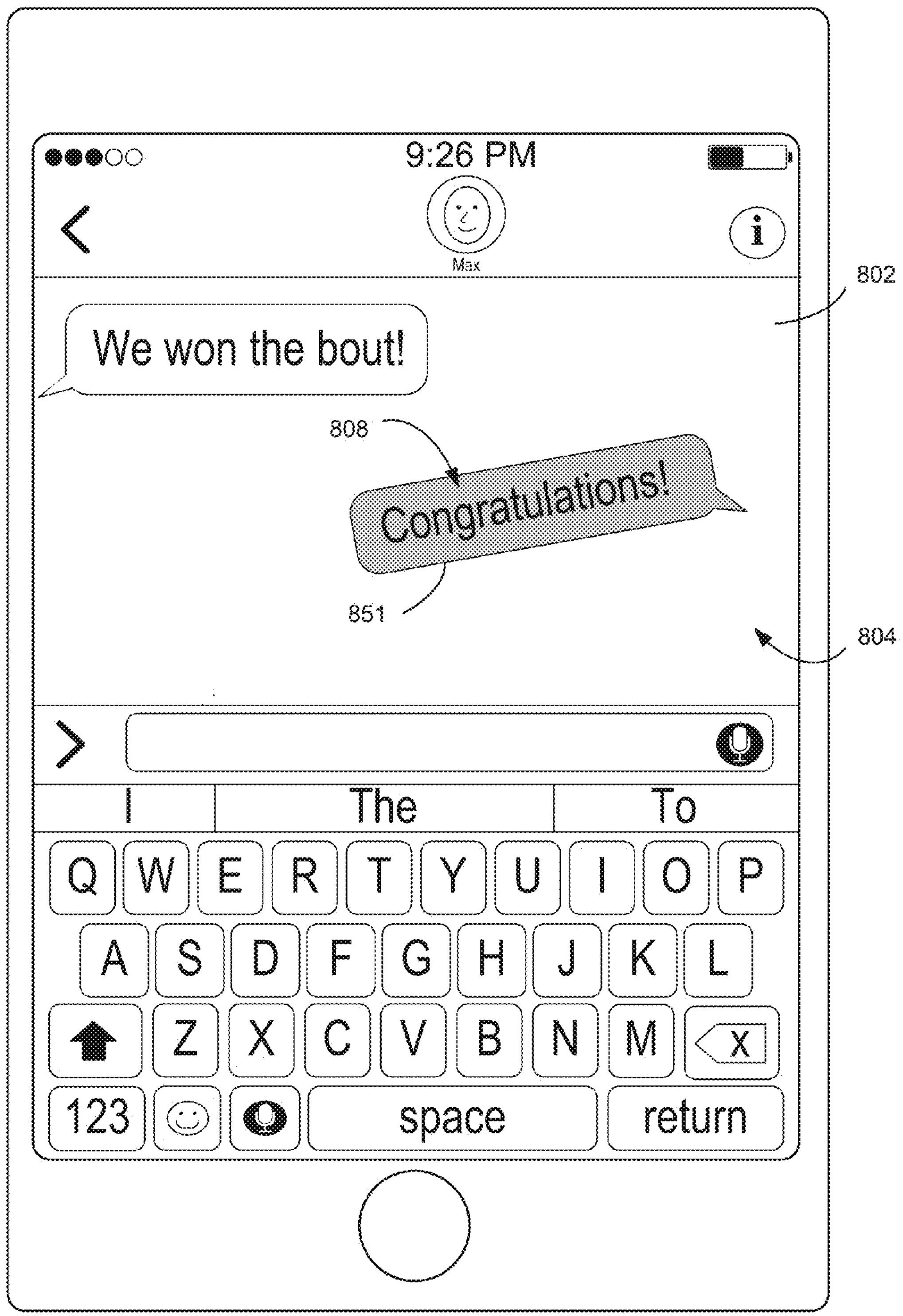

FIG. 8M illustrates a messaging interface 802 after message content 808 is sent to a remote device with the "Slam" message impact effect option 822. Message content 808 is displayed in an altered message region 851 in the conversation transcript 804 of messaging interface 802. A first part of an animation corresponding to the "Slam" message impact effect option, in which the orientation second altered message region 851 is different from the default message region for message content 808, is illustrated.

Figure 8N:
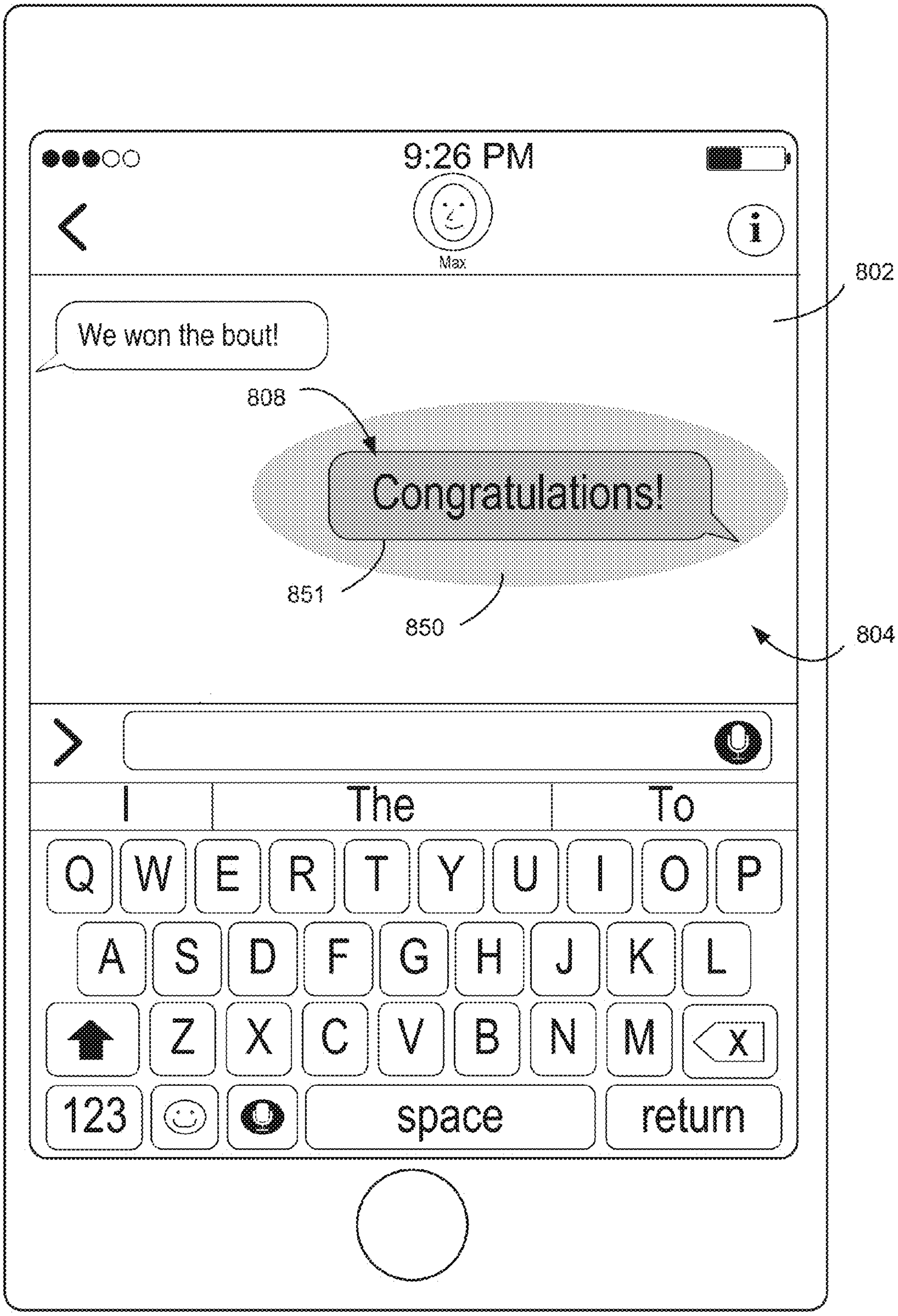

FIG. 8N illustrates a second part of an animation corresponding to the "Slam" message impact effect option 822 displayed in the conversation transcript 804 of messaging interface 802. In the second part of the animation corresponding to the "Slam" message impact effect option, impact cloud 850 is displayed behind second altered message region 851.

Figure 8O:

FIG. 8O illustrates the third part of the animation corresponding to the "Slam" message impact effect option 822, in which second altered message region 851 has transformed into default message region 816.

Figure 8P:
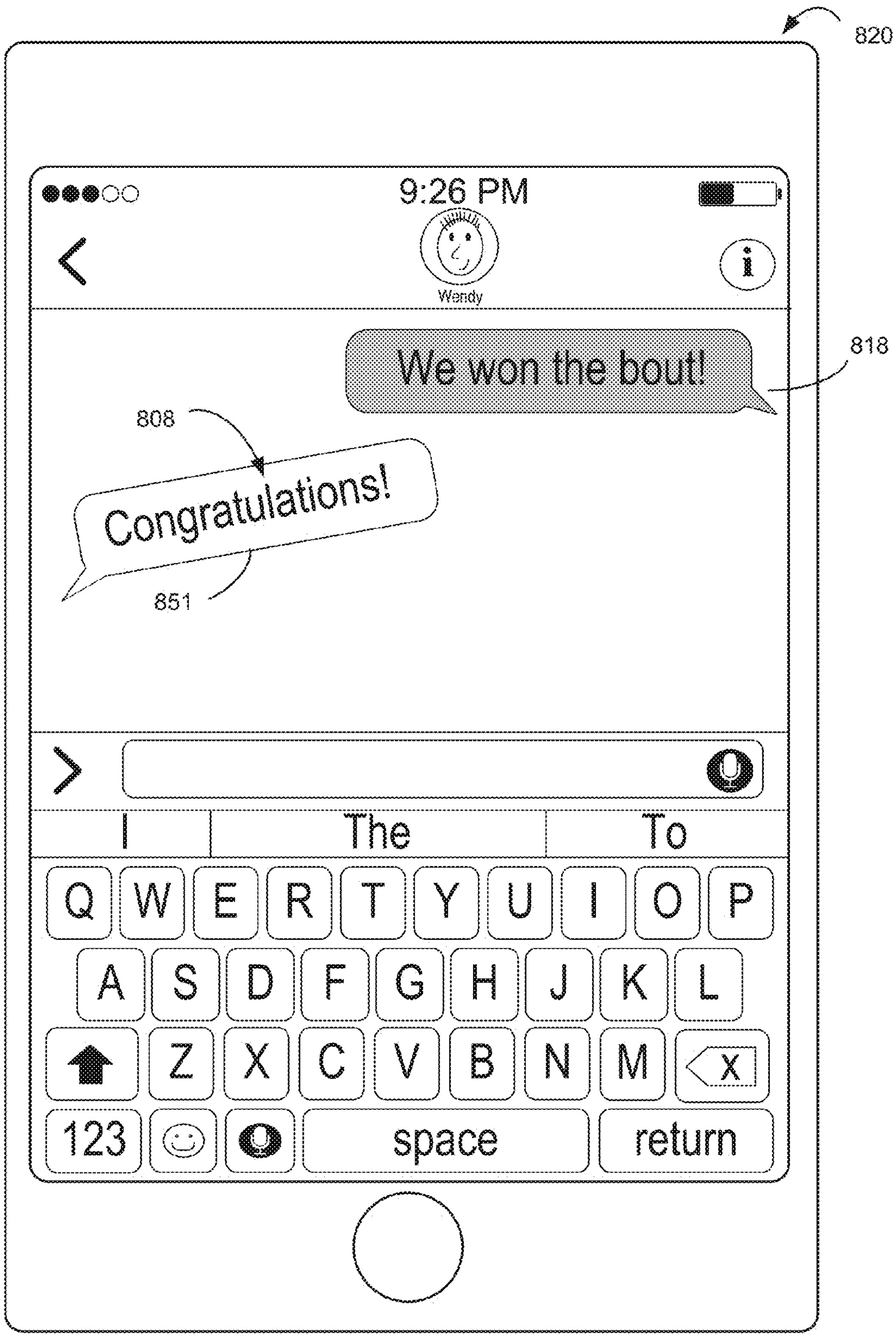
Figure 8Q:
Figure 8R:

FIGS. 8P, 8Q, and 8R illustrate the first part, second part, and third part, respectively, of the animation corresponding to the "Slam" message impact effect option as displayed in messaging interface 818 of a remote device 820.

Figure 8S:
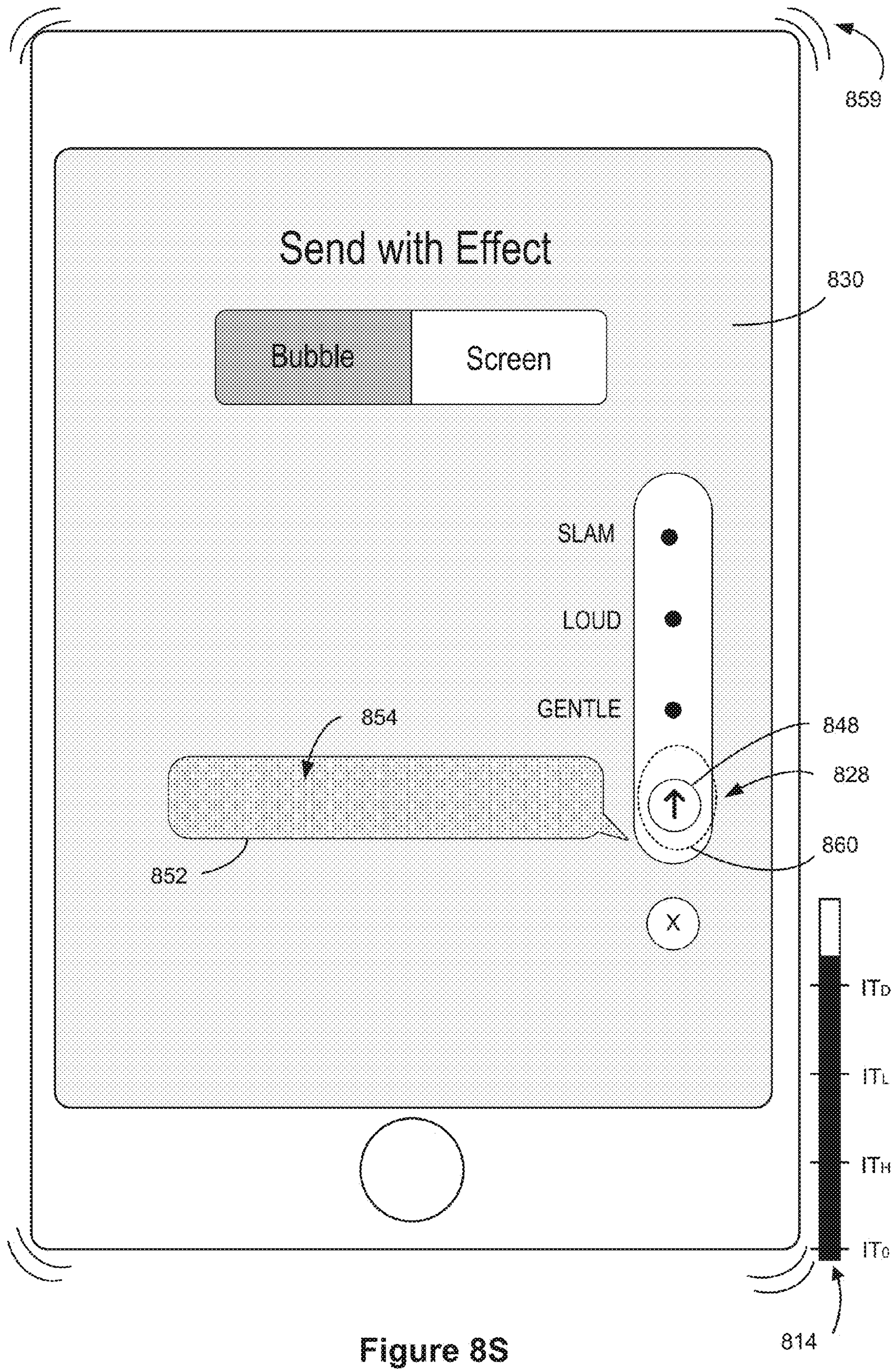

FIG. 8S illustrates a message impact effect options interface 830 in which a contact with touch-sensitive surface 112, as indicated by focus selector 860, is at a location that corresponds affordance 856 for selecting "Invisible Ink" message impact effect option 828. A preview of the "Invisible Ink" message impact effect option 828 is displayed. In the preview of the "Invisible Ink" message impact effect option 828, during at least part of the preview, at least part of message content 808 is hidden by a screen 854 in a third altered message region 852. In some embodiments, in accordance with a determination that an input to send message content 808 with "Invisible Ink" message impact effect option 828 have been detected (e.g., above a deep press intensity threshold $IT_D$, as indicated by intensity meter 814), the device outputs a tactile output as indicated at 859.

Figure 8T:
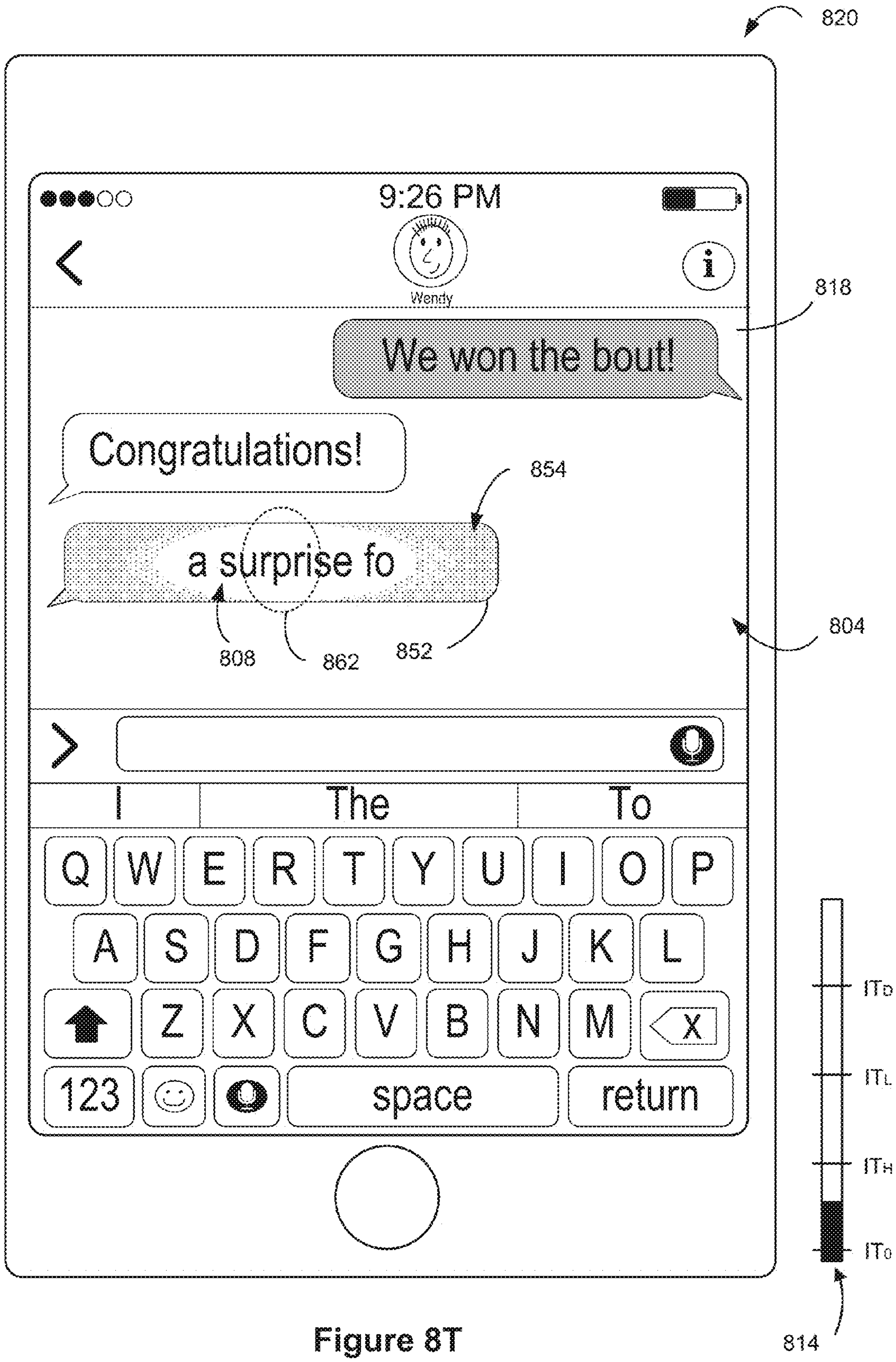

FIG. 8T illustrates a messaging interface 818 of a remote device 820 after message content 808 is sent to remote device 820 with the "Invisible Ink" message impact effect option 828. The contact indicated by focus selector 862, is detected at a location that corresponds to third altered message region 852.

Screen 854 is gradually removed from third altered message region 852 and message content 808 is gradually revealed as a characteristic intensity of the contact increases.

In FIG. 8T, in accordance with a determination that the characteristic intensity of the contact has increased by a first amount (e.g., above contact detection intensity threshold level $IT_0$), a first portion of message content 808 is revealed.

Figure 8U:

In FIG. 8U, in accordance with a determination that the characteristic intensity of the contact has increased by a second amount (e.g., above hint intensity threshold $IT_H$) that is greater than the first amount, a second portion of message content 808, greater than the first portion, is revealed.

Figure 8V:

In FIG. 8V, in accordance with a determination that the characteristic intensity of the contact has increased by a third amount (e.g., above a light press intensity threshold $IT_L$) that is greater than the first amount, a third portion of message content 808, greater than the second portion, is revealed.

Figure 8W:
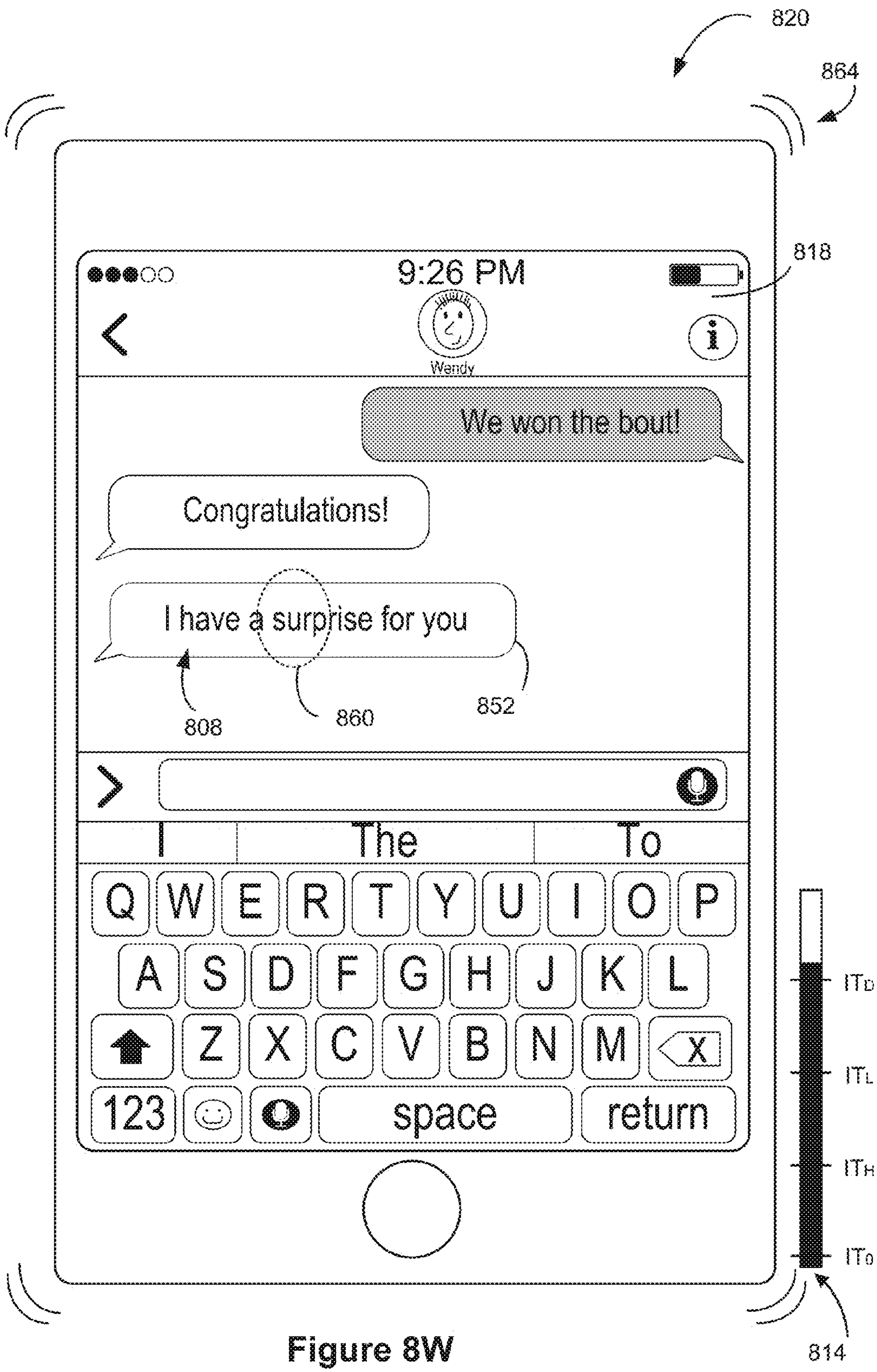

In FIG. 8W, in accordance with a determination that the characteristic intensity of the contact has increased by a fourth amount that is above a threshold intensity level (e.g., above a deep press intensity threshold $IT_D$), screen 852 ceases to be displayed and message content 808 is fully revealed. In some embodiments, in accordance with a determination that the characteristic intensity of the contact has increased above the threshold intensity level (e.g., above the deep press intensity threshold $IT_D$), the device outputs a tactile output as indicated at 864.

Figure 8X:
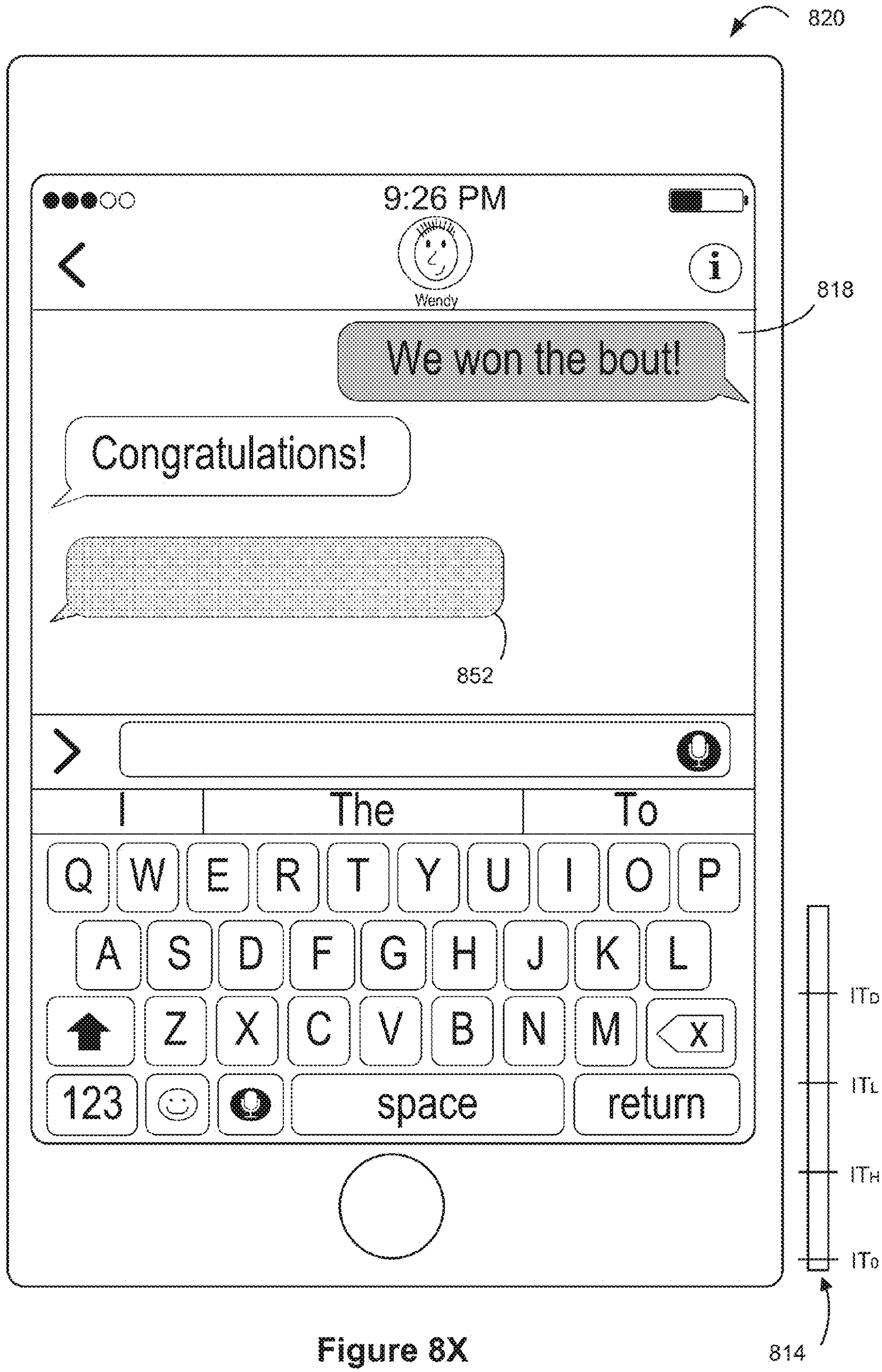

In FIG. 8X, in accordance with a determination that the contact has lifted off from touch-sensitive surface 112, screen 852 is displayed and message content 808 is hidden (e.g., fully hidden) by screen 852.

Figure 8Y:
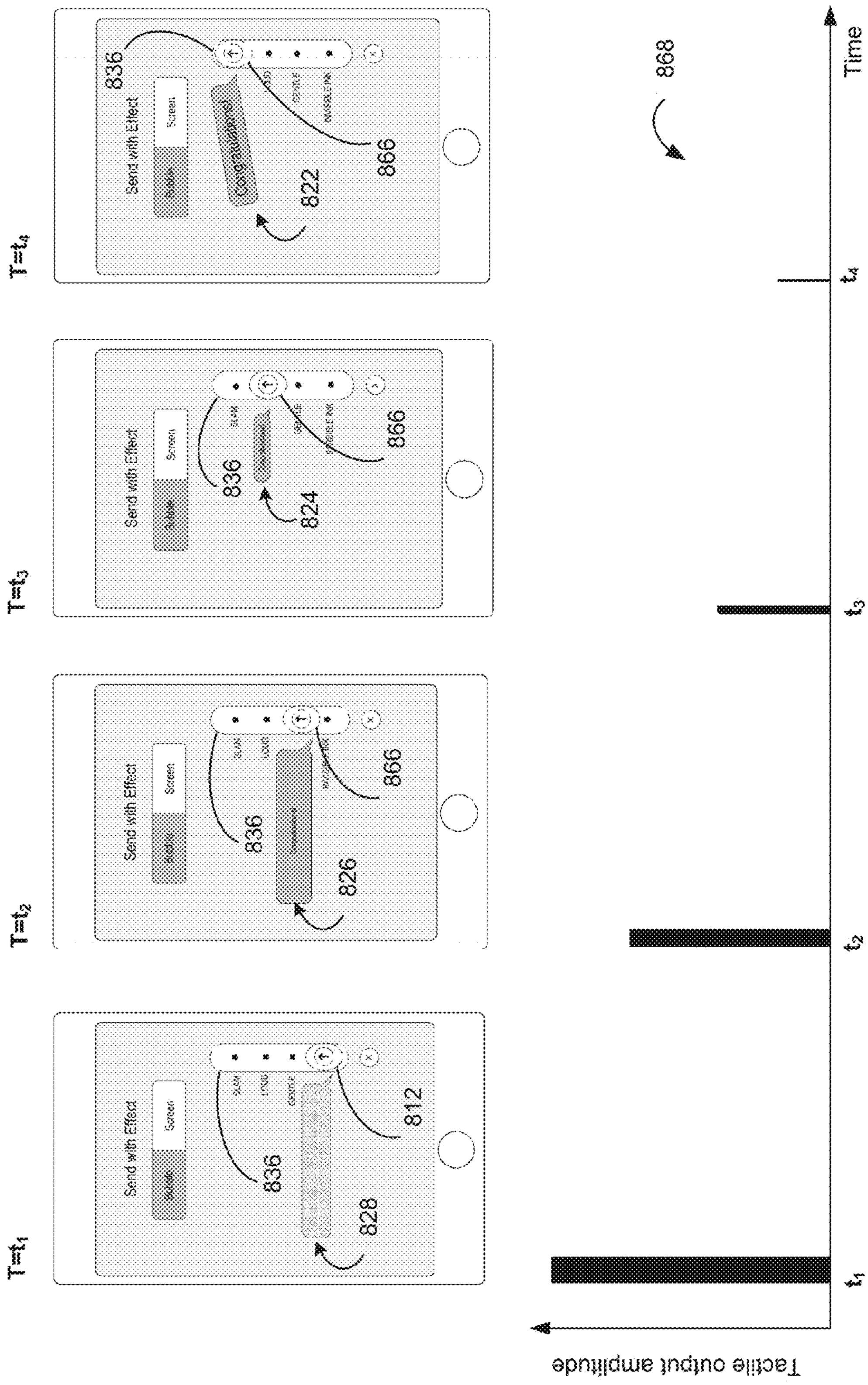

FIG. 8Y illustrates tactile output that occurs in accordance with a determination that a contact, as illustrated by focus selector 866, has moved across touch-sensitive surface 112 to a location of message impact effect option selection control 836 that corresponds to a message impact effect option. At time T=t1, the focus selector 866 is at a location that corresponds to "Invisible Ink" message impact effect option 828. As indicated in tactile output graph 868, a tactile output that has a first amplitude and a first duration is output at time t1. At time T=t2, the focus selector 866 is at a location that corresponds to "Gentle" message impact effect option 826. A tactile output that has a second amplitude that is lower than the first amplitude and a second duration that is shorter than the first duration is output at time t2. At time T=t3, the focus selector 866 is at a location that corresponds to "Loud" message impact effect option 824. A tactile output that has a third amplitude that is lower than the second amplitude and a third duration that is shorter than the second duration is output at time t3. At time T=t4, the focus selector 866 is at a location that corresponds to "Slam" message impact effect option 822. A tactile output that has a fourth amplitude that is lower than the third amplitude and a fourth duration that is shorter than the third duration is output at time t4.

Figure 8Z:
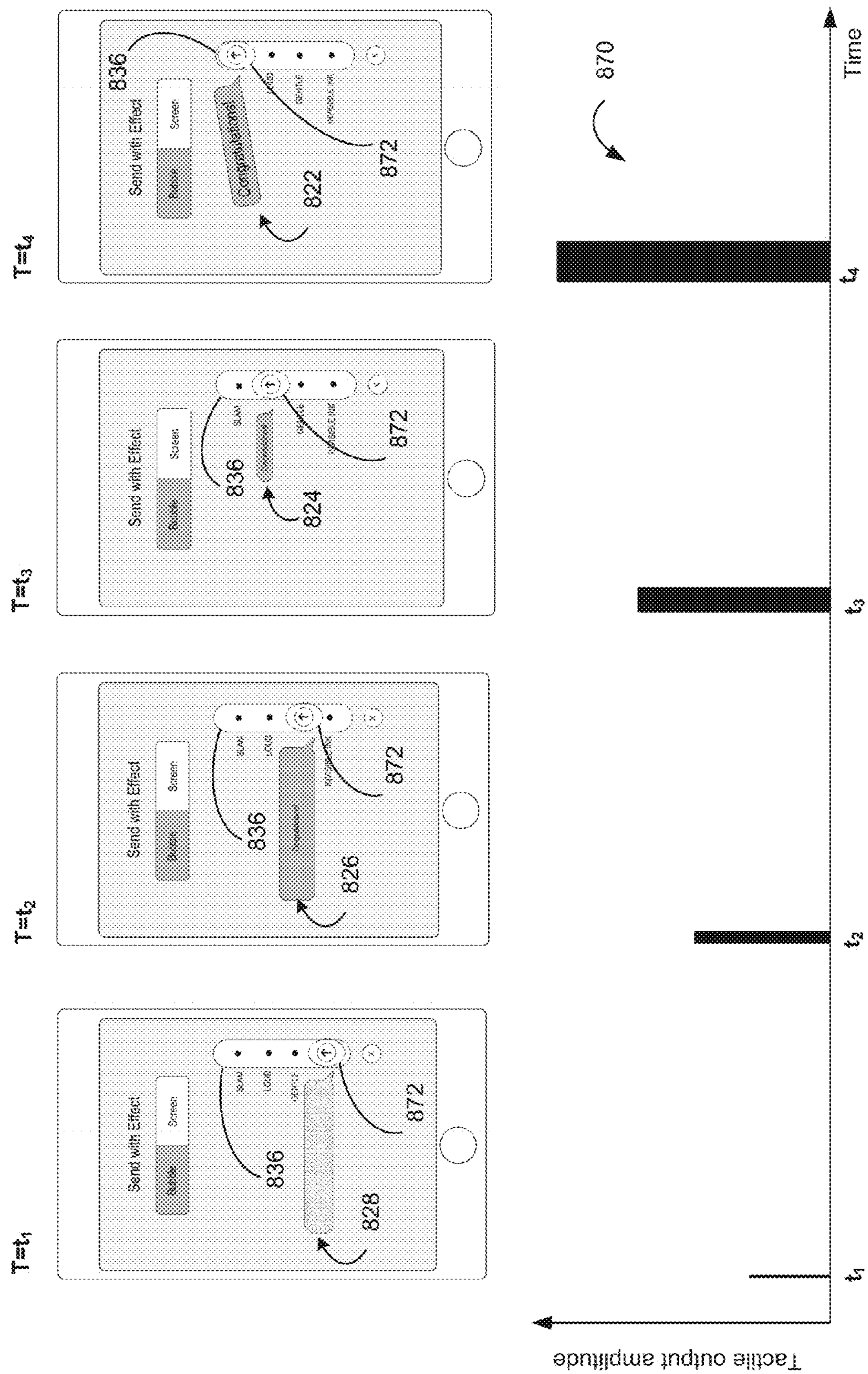
Figure 8A:
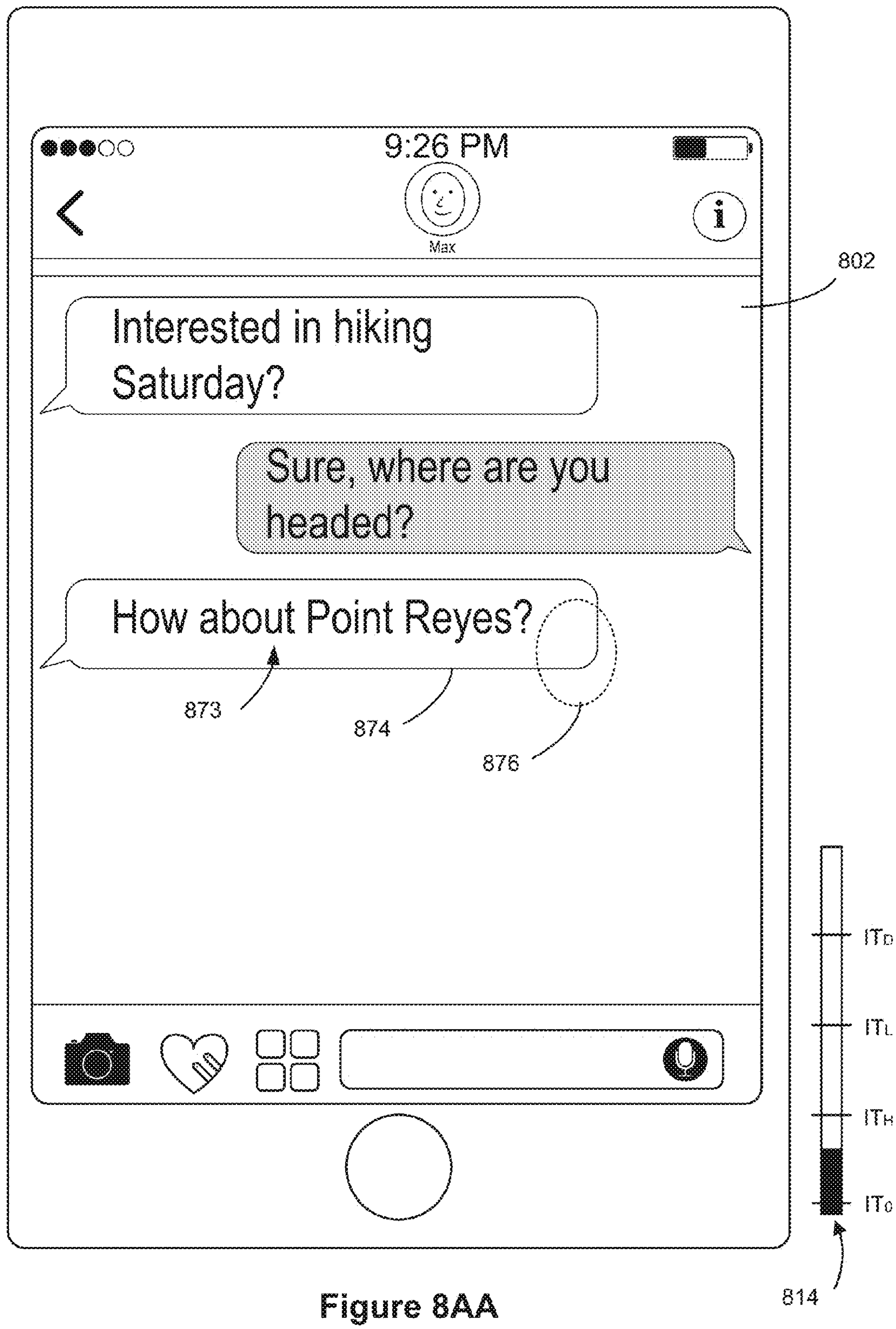
Figure 8A:
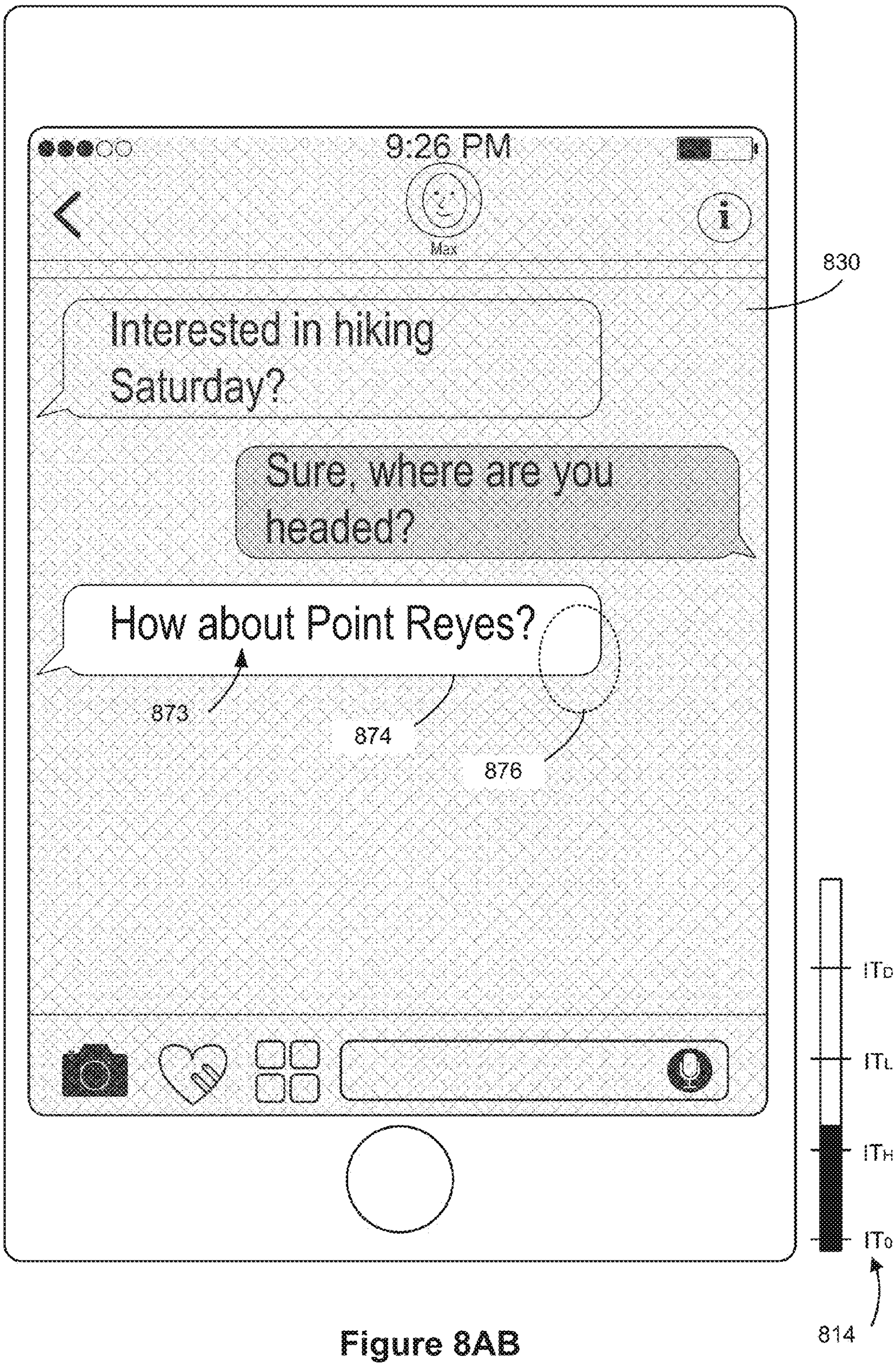
Figure 8A:
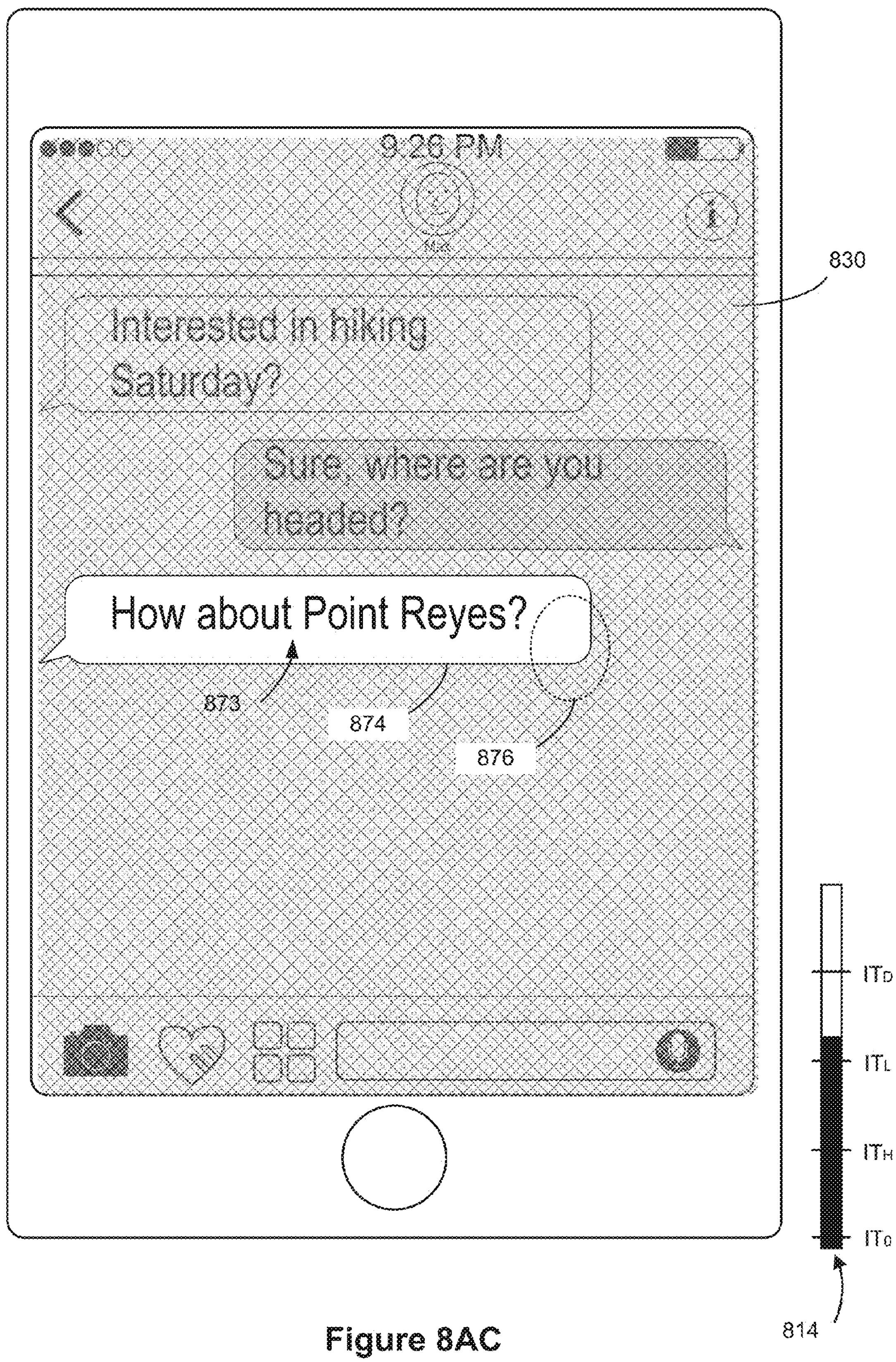
Figure 8A:
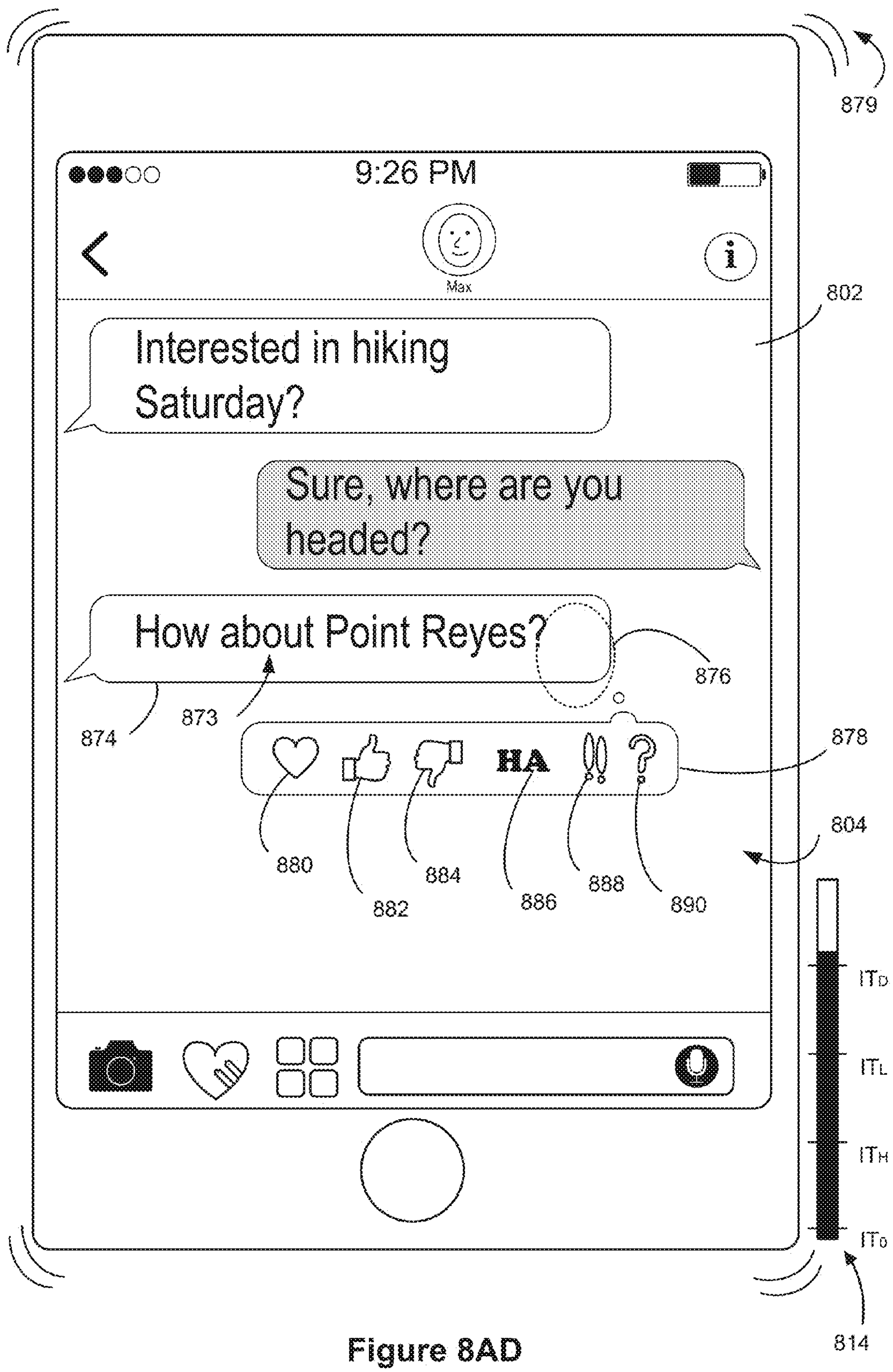
Figure 8A:
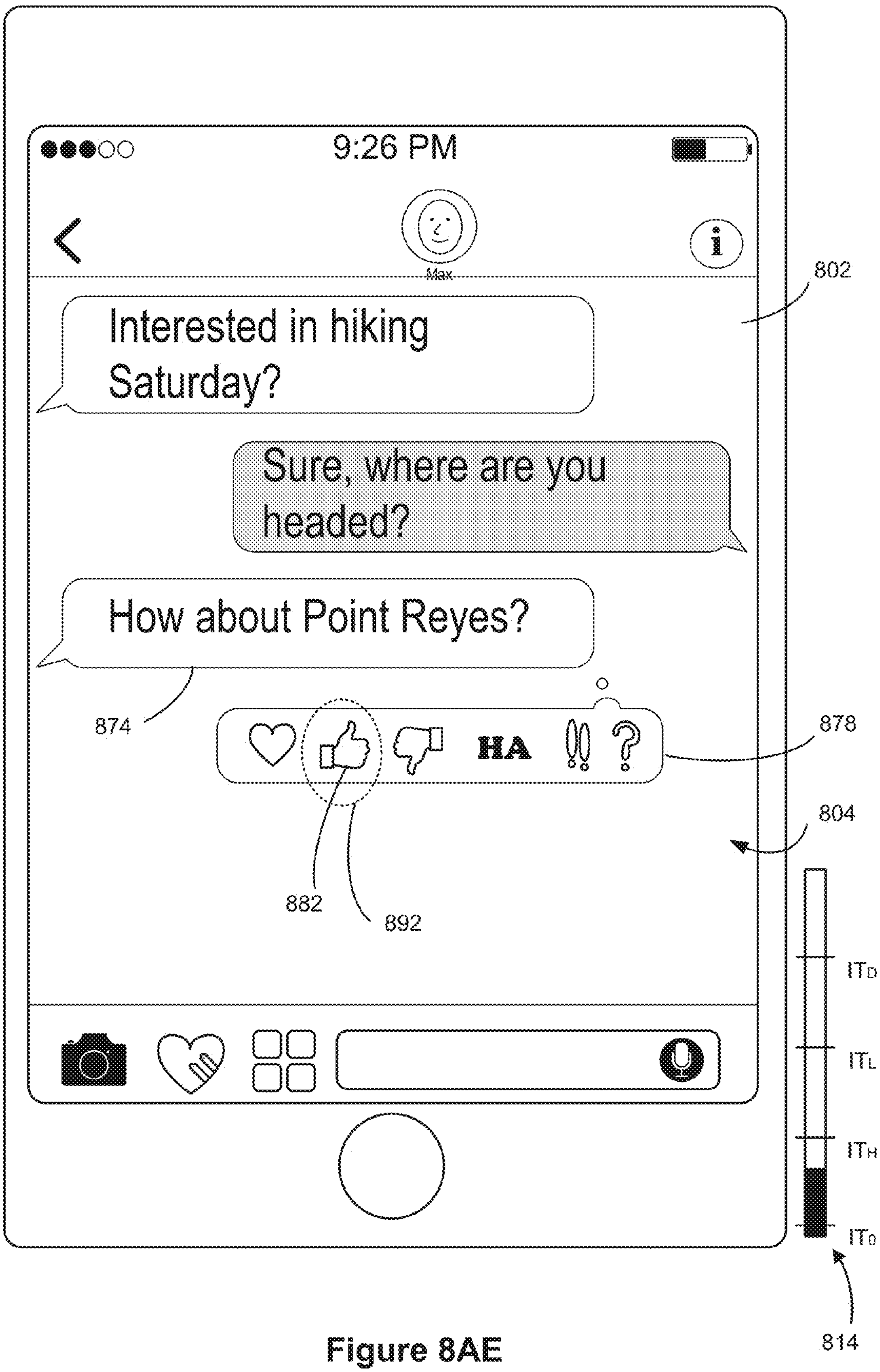
Figure 8A:
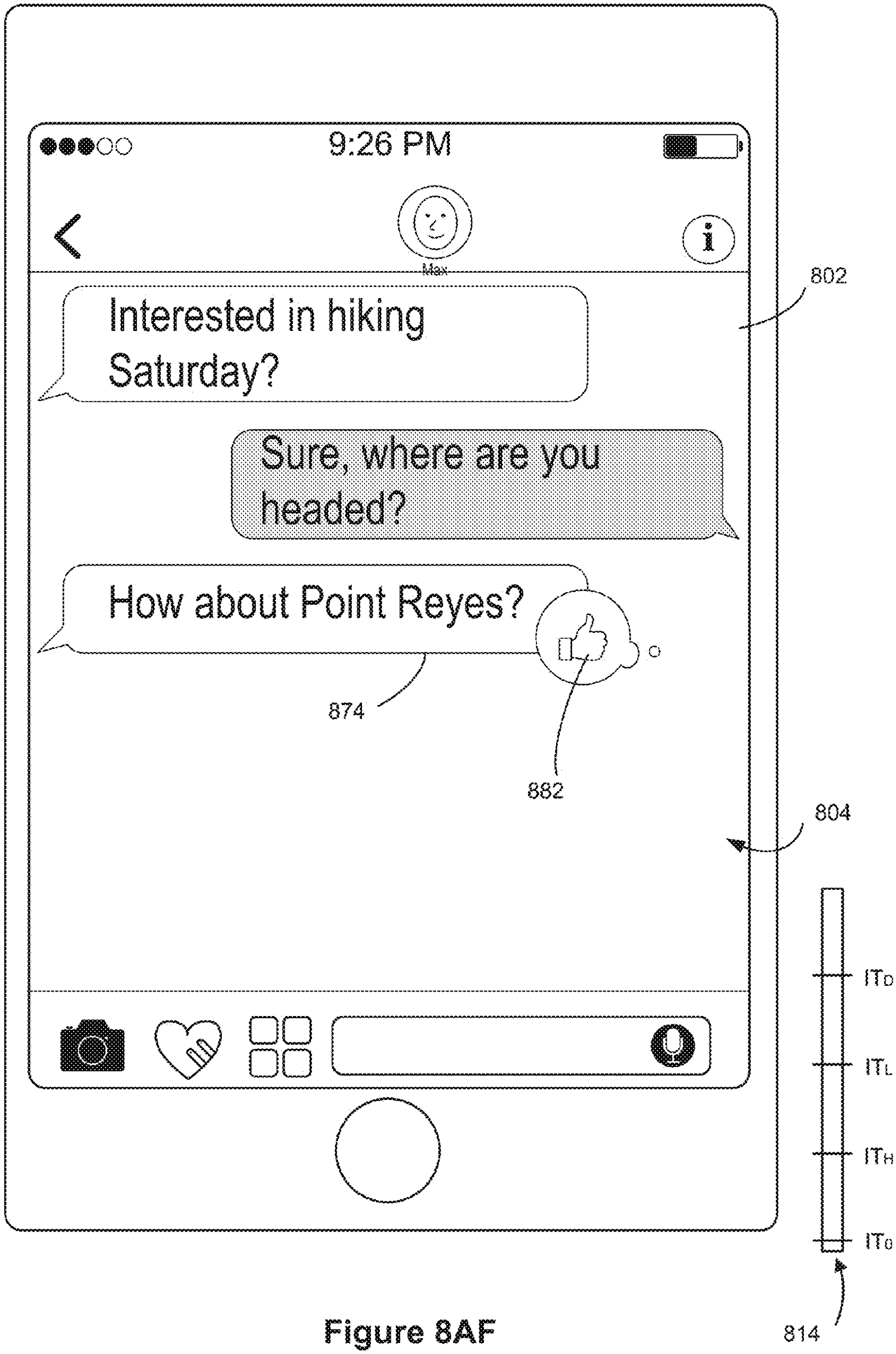
Figure 8A:
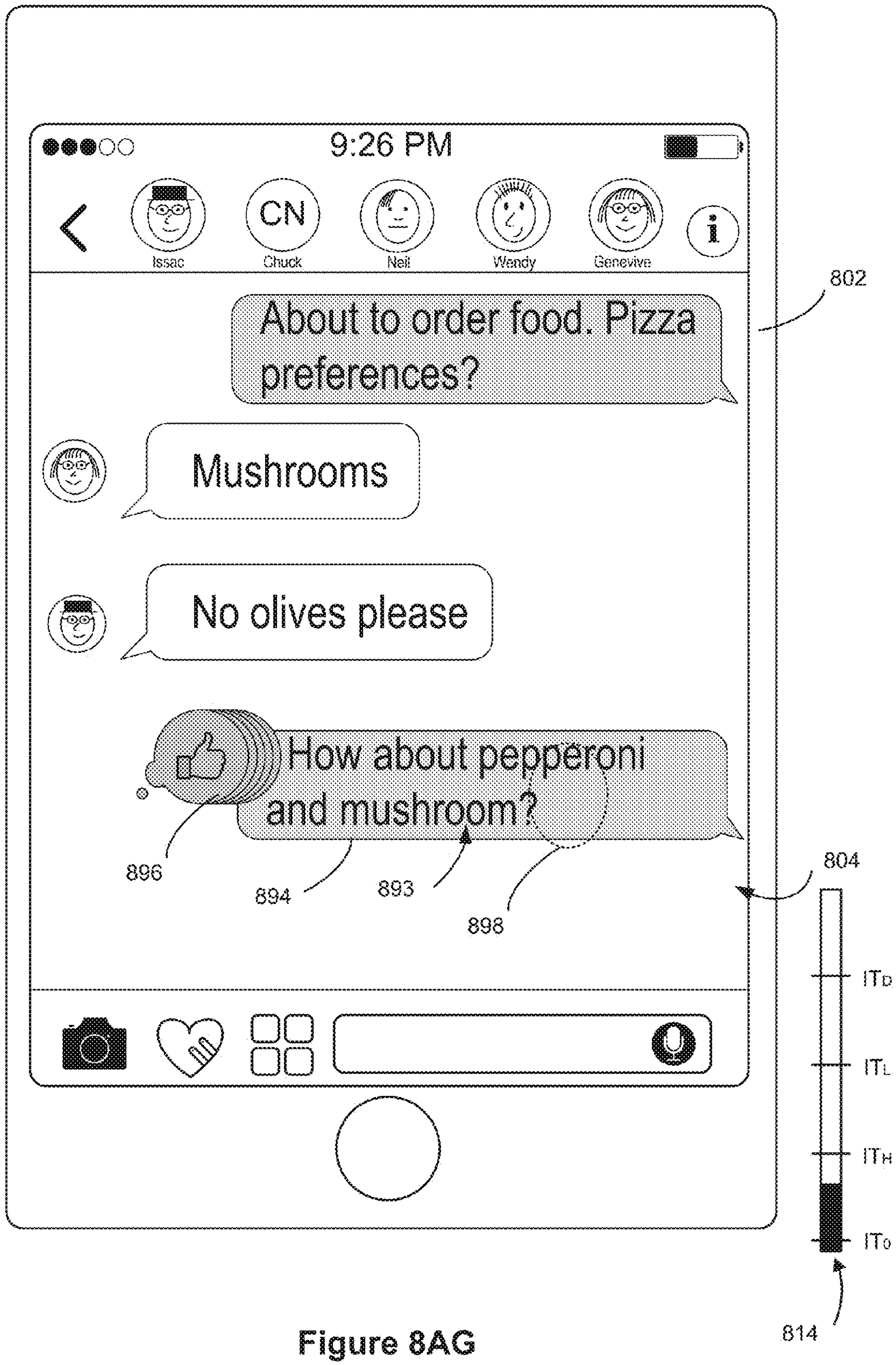
Figure 8A:
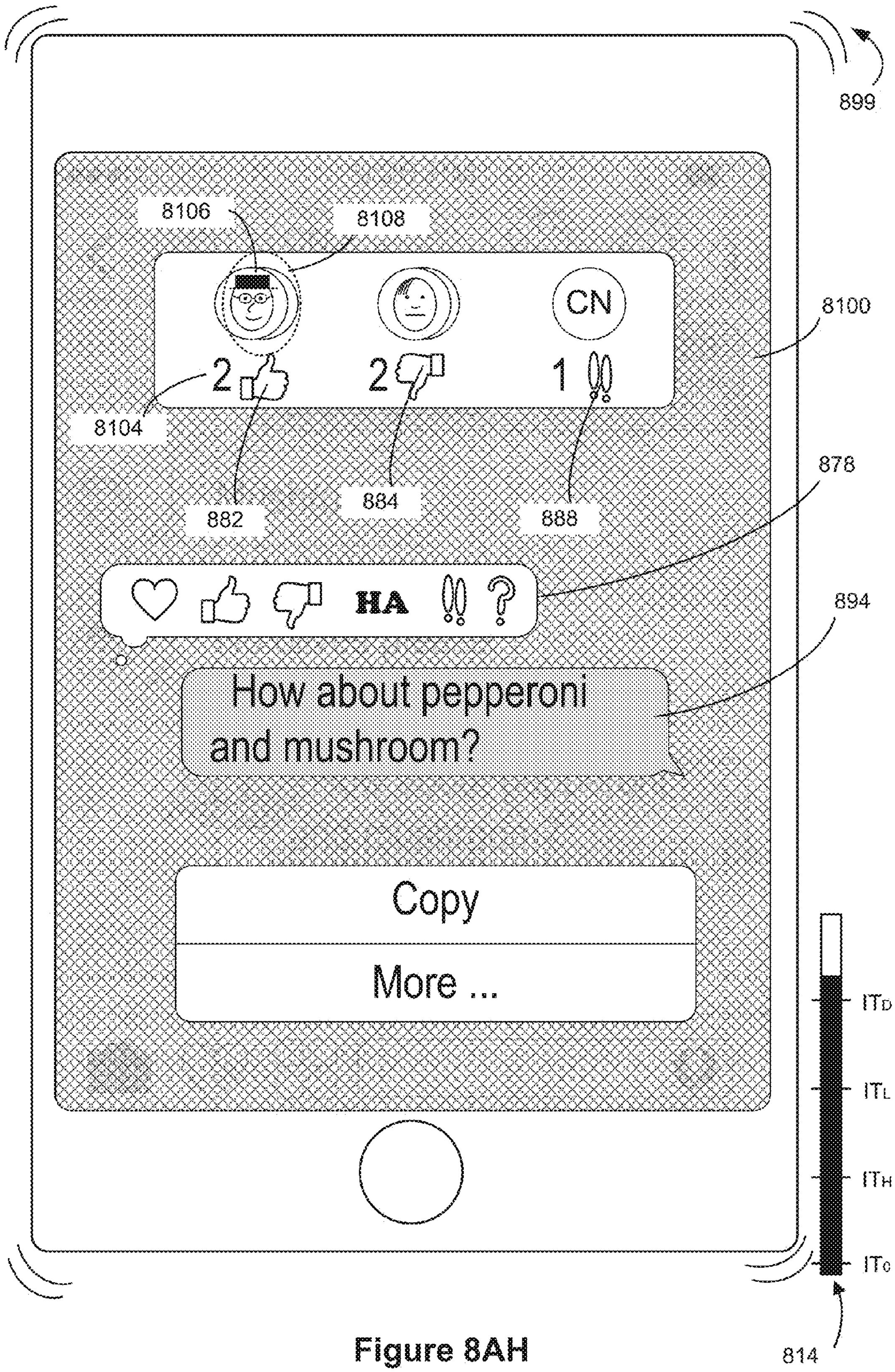
Figure 8A:
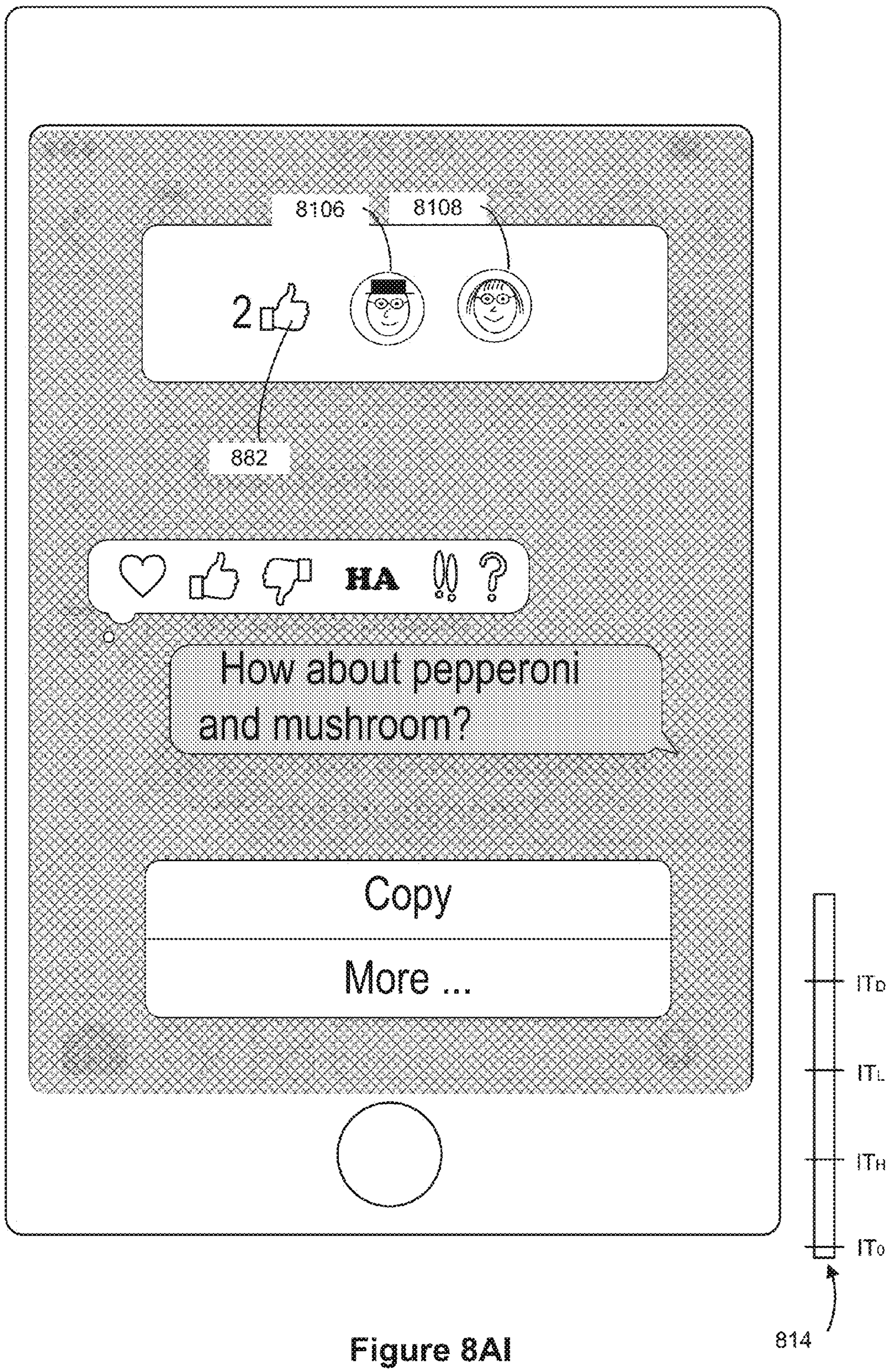

FIG. 8Z illustrates tactile output that occurs in accordance with a determination that a contact with touch-sensitive surface 112, as illustrated by focus selector 872, has moved to a location of message impact effect option selection control 836 that corresponds to a message impact effect option. At time T=t1, the focus selector 872 is at a location that corresponds to "Invisible Ink" message impact effect option 828. As indicated in tactile output graph 870, a tactile output that has a first amplitude and a first duration is output at time t1. At time T=t2, the focus selector 872 is at a location that corresponds to "Gentle" message impact effect option 826. A tactile output that has a second tactile output parameter (e.g., a second amplitude that is greater than the first amplitude) is output at time t2. At time T=t3, the focus selector 872 is at a location that corresponds to "Loud" message impact effect option 824. A tactile output that has a third tactile output parameter (e.g., a third amplitude that is greater than the second amplitude) is output at time t3. At time T=t4, the focus selector 872 is at a location that corresponds to "Slam" message impact effect option 822. A tactile output that has a fourth tactile output parameter (e.g., a fourth amplitude that is greater than the third amplitude) is output at time t3.

FIGS. 8AA-8AI illustrate message acknowledgements.

In FIG. 8AA, contact with touch-sensitive surface 112, as indicated by focus selector 876, is detected at a location that corresponds to message region 874 of a received message 873. In FIG. 8AB, the characteristic intensity of the contact increases above hint intensity threshold $IT_H$, as indicated by intensity meter 814. In FIG. 8AC, the characteristic intensity of the contact increases above light press intensity threshold $IT_L$, as indicated by intensity meter 814. In some embodiments, as the characteristic intensity of the contact increases, at least a portion of the messaging user interface 802 is blurred. In some embodiments, the extent of the blurring varies in proportion to the characteristic intensity of the contact, e.g., as illustrated by the increasing level of blur from FIG. 8AA-8AC.

In some embodiments, in accordance with a determination that the characteristic intensity of the contact detected at a location corresponding to message region 874 increases above deep press intensity threshold $IT_D$, an acknowledgement selection affordance 878 is displayed, as indicated in FIG. 8AD. Acknowledgement selection affordance 878 displays a plurality of acknowledgement options (e.g., heart 880, thumbs up 882, thumbs down 884, "HA," 886, exclamation points 888, and/or question mark 890). In some embodiments, in accordance with the determination that the characteristic intensity of the contact detected at a location corresponding to message region 874 increases above the deep press intensity threshold $IT_D$, the device outputs a tactile output as indicated at 879.

In FIG. 8AE, a contact with touch-sensitive surface 112, as indicated by focus selector 892, is detected at a location that corresponds to thumbs up acknowledgement option 882. In response detecting an acknowledgement application input (e.g., a tap input at a location corresponding to acknowledgement option 882), an indicator corresponding to the thumbs up acknowledgement option 882 is applied to message region 874, as indicated in FIG. 8AF.

FIG. 8AG illustrates an input detected at a message region 894 that has received multiple acknowledgements 896. A contact with touch-sensitive surface 112, as indicated by focus selector 898, is detected at a location that corresponds to the multiple acknowledgements 896 (or a location that corresponds to the message region 894). In accordance with a determination that a characteristic intensity of the contact increases above the deep press intensity threshold $IT_D$, an acknowledgement tally user interface 8100 is displayed, as shown in FIG. 8AH. In some embodiments, in accordance with a determination that a characteristic intensity of the contact increases above the deep press intensity threshold $IT_D$, a tactile output occurs as indicated at 899. In some embodiments, the acknowledgement tally user interface 8100 includes, e.g., for each acknowledgement option (e.g., that has been applied to the message that corresponds to message region 894) an indication of a number 8104 of conversation participants that applied the acknowledgement option, identifying information for conversation participants (e.g., avatar 8106) that applied the acknowledgement option, and/or an indication of the acknowledgment option. For example, for thumbs up acknowledgement option 882, the number of conversation participants that applied the thumbs up acknowledgement option 882 to the message (e.g., "2")), two avatars 8106 that correspond to conversation participants that applied the thumbs up acknowledgement option 882 to the message, and an icon that corresponds to thumbs up acknowledgement option 882 are displayed.

In some embodiments, e.g., when a number of avatars exceeds a threshold number of avatars, multiple avatars are displayed in a stacked configuration (e.g., such that one or more avatars are at least partially hidden behind another avatar). In some embodiments, an input detected at a location that corresponds to the stack of avatars (e.g., a tap by a contact indicated by focus selector 8108 in FIG. 8AH) expands the stack of avatars. An expanded stack of avatars is shown in FIG. 8AI.

FIGS. 9A1-9A25 illustrate exemplary user interfaces for displaying intensity-reactive and intensity-nonreactive user interface objects, in accordance with some embodiments.

FIG. 9A1 illustrates a user interface 900 on display 950; user interface 900, in the example shown in FIGS. 9A1-9A25, includes a user interface of a menu of applications represented by a plurality of activatable user interface objects (e.g., multiple application icons) arranged in an array, including activatable objects 902 and 904 (e.g., the application icon for launching the Messages application, and the application icon for launching the Weather application).

As shown in FIG. 9A1, user input intensity graph 906 and user input lateral displacement graph 908 indicate that no contact by a user input that corresponds to a request to select an activatable object in user interface 900 has been detected.

FIG. 9A2 illustrates a transition of user interface 900 from the state of that user interface in FIG. 9A1. In particular, FIG. 9A2 shows the position of user input 910 positioned over intensity-nonreactive activatable object 904 in user interface 900. In the example shown in FIG. 9A2, user input 910 corresponds to an input object (e.g., a finger or stylus) detected hovering over a touch-sensitive surface (e.g., touch-sensitive surface 451 or a touch-sensitive surface of touch-screen display 450, FIG. 4B) at a location corresponding to activatable object 904 prior to contacting the touch-sensitive surface, and thus user input intensity graph 906 and user input lateral displacement graph 908 indicate that the detected user input has zero detected intensity and zero lateral displacement. In response to detecting hovering user input 910, the visual appearance of intensity-nonreactive activatable object 904 is not changed.

FIG. 9A3 illustrates a transition of user interface 900 from the state of that user interface in either of FIGS. 9A1-9A2. In particular, FIG. 9A3 shows the state of user interface 900 at a current time tc, indicating detection of a contact by user input 910 on the touch-sensitive surface that corresponds to a request to select intensity-nonreactive activatable object 904. As shown in user input intensity graph 906, the intensity (also called contact intensity) of user input 910 is initially below a first intensity threshold $IT_H$. As shown in user input lateral displacement graph 908, the lateral displacement (e.g., the displacement from an initial contact position of the user input) of the user input is zero.

In response to detecting the contact by user input 910 corresponding to intensity-nonreactive activatable object 904, the visual appearance of activatable object 904 is changed by a predetermined amount from that shown in FIGS. 9A1-9A2 (e.g., activatable object 904 is dimmed or darkened, as shown in FIG. 9A3), independent of the contact intensity of user input 910. For example, FIGS. 9A4-9A6 show that although the contact intensity of user input 910 has increased from its value as shown in FIG. 9A3 to values above the first intensity threshold $IT_H$, above the second intensity threshold $IT_L$, and above the third intensity threshold $IT_D$, respectively, the visual appearance of activatable object 904 is maintained at the predetermined amount of change as shown in FIG. 9A3, and is unaffected by the increase in contact intensity of user input 910.

FIG. 9A7 illustrates a transition of user interface 900 from the state of that user interface in FIG. 9A6. In particular, FIG. 9A7 shows the state of user interface 900 at a current time tc upon ceasing to detect the contact by user input 910 (e.g., due to liftoff of the contact) corresponding to activatable object 904. As shown in user input intensity graph 906, the contact intensity of user input 910 has decreased from its intensity as shown in FIG. 9A6 to zero, in accordance with ceasing to detect the contact by user input 910.

In response to ceasing to detect the contact by user input 910 corresponding to intensity-nonreactive activatable object 904 (e.g., in accordance with a determination that user input 910 is a tap gesture), an activation operation corresponding to activatable object 904 is performed. In the example shown in FIG. 9A3, in response to ceasing to detected the contact by user input 910 corresponding to activatable object 904, an application associated with activatable object 904 (e.g., a weather application) is launched and displayed on user interface 900.

FIG. 9A8 is similar to FIG. 9A3 and illustrates a transition of user interface 900 from the state of that user interface in either of FIGS. 9A1-9A2. In particular, FIG. 9A8 shows, at current time tc, the position of user input 911 corresponding to intensity-nonreactive activatable object 904, whose visual appearance is changed by a predetermined amount (e.g., dimmed or darkened) from that shown in FIGS. 9A1-9A2. As shown in user input intensity graph 906, the intensity of user input 911 is initially below intensity threshold $IT_H$, and as shown in user input lateral displacement graph 908, the lateral displacement of the user input from the initial contact position is initially below a lateral displacement threshold Dt.

FIG. 9A9 illustrates a transition of user interface 900 from the state of that user interface in FIG. 9A8. In particular, FIG. 9A9 shows continued lateral movement of user input 911 with respect to user interface 900 (e.g., corresponding to lateral movement of the contact corresponding to user input 911 as the contact is maintained on the touch-sensitive surface, such as a drag gesture). As shown in user input lateral displacement graph 908, the lateral displacement of the user input has increased from that shown in FIG. 9A8 and satisfies (and exceeds) lateral displacement threshold Dt. In accordance with a determination that the lateral displacement of the user input satisfies displacement criteria (e.g., including satisfying lateral displacement threshold Dt), at least a portion of user interface 900 is scrolled in accordance with the lateral movement of the user input.

In the example shown in FIG. 9A9, in response to detecting lateral displacement of user input 911 that satisfies displacement criteria, the visual appearance of intensity-nonreactive activatable object 904 is changed by the predetermined amount back to its initial or previous appearance prior to detecting the contact by user input 911. More specifically, the visual appearance of intensity-nonreactive activatable object 904 is changed instantaneously rather than gradually (e.g., activatable object 904 is undimmed or brightened) back to its previous appearance (e.g., as shown in FIG. 9A1) upon scrolling user interface 900. Moreover, although the contact intensity of user input 911 has increased, as shown in user input intensity graph 906, the change in visual appearance of intensity-nonreactive activatable object 904 is independent of the contact intensity of the user input.

FIG. 9A10 illustrates a transition of user interface 900 from the state of that user interface in FIG. 9A9. In particular, FIG. 9A10 shows the state of user interface 900 at current time tc in accordance with continued lateral movement of user input 911 corresponding to a further increase in lateral displacement. As shown in user input lateral displacement graph 908, the lateral displacement of user input 911 has increased from that shown in FIG. 9A9. As shown in user input intensity graph 906, the contact intensity of user input 911 has increased from that shown in FIG. 9A9 and satisfies (and exceeds) first intensity threshold $IT_H$. However, as discussed above with respect to FIG. 9A9, in response to detecting the lateral displacement of user input 911 that satisfied displacement criteria, the visual appearance of intensity-nonreactive activatable object 904 was changed instantaneously by the predetermined amount back to its initial appearance. Thus, as shown in FIG. 9A10, the visual appearance of intensity-nonreactive activatable object 904 is independent of and not further changed in response to the further increase in lateral displacement or the further increase in contact intensity of user input 911.

FIG. 9A11 illustrates an alternate transition of user interface 900 from the state of that user interface in FIG. 9A1. In particular, FIG. 9A11 shows the position of user input 912 positioned over intensity-reactive activatable object 902 in user interface 900. In the example shown in FIG. 9A11, user input 912 corresponds to an input object (e.g., a finger or stylus) detected hovering over a touch-sensitive surface (e.g., touch-sensitive surface 451 or a touch-sensitive surface of touch-screen display 450, FIG. 4B) at a location corresponding to activatable object 902 prior to contacting the touch-sensitive surface, and thus user input intensity graph 906 and user input lateral displacement graph 908 indicate that the detected user input has zero detected intensity and zero lateral displacement. In response to detecting hovering user input 912, the visual appearance of intensity-reactive activatable object 902 is changed using a first extent of a first transformation (e.g., FIG. 9A11 shows that a size of activatable object 902 is decreased from that shown in FIG. 9A1, and a platter is displayed behind activatable object 902 in the area previously occupied by activatable object 902 prior to its size being decreased).

FIG. 9A12 illustrates a transition of user interface 900 from the state of that user interface in FIG. 9A11. In particular, FIG. 9A12 shows the state of user interface 900 at a current time tc, indicating detection of a contact by user input 912 on the touch-sensitive surface that corresponds to a request to select intensity-reactive activatable object 902. As shown in user input intensity graph 906, the contact intensity of user input 912 is initially below a first intensity threshold $IT_H$. As shown in user input lateral displacement graph 908, the lateral displacement (e.g., the displacement from an initial contact position of the user input) of the user input is zero.

In response to detecting the contact by user input 912 corresponding to intensity-reactive activatable object 902 with an intensity below the first intensity threshold ITH, the visual appearance of activatable object 902 is changed using a second extent of the first transformation (e.g., greater than the first extent). In the example shown in FIG. 9A12, the size of activatable object 902 is decreased from that shown in FIG. 9A11, and a greater amount of the platter displayed behind activatable object 902 is visible as compared to FIG. 9A11.

FIG. 9A13 illustrates a transition of user interface 900 from the state of that user interface in FIG. 9A12. In particular, FIG. 9A13 shows the state of user interface 900 at current time tc in accordance with an increase in the contact intensity of user input 912, such that the contact intensity of user input 912 satisfies the first intensity threshold ITH, as shown in user input intensity graph 906.

In response to detecting the contact by user input 912 corresponding to intensity-reactive activatable object 902 with a contact intensity that satisfies the first intensity threshold $IT_H$, the visual appearance of activatable object 902 is changed using a second transformation in accordance with changes in the detected intensity of the contact on the touch-sensitive surface (e.g., as compared to FIG. 9A12, the size of activatable object 902 is further decreased, and a greater amount of the platter displayed behind activatable object 902 is visible, in accordance with changes in the detected intensity of the contact). In addition, the visual appearance of user interface 900, other than activatable object 902, is changed to include blurring, and optionally shrinking (not shown), of user interface 900, in accordance with changes in the detected intensity of the contact.

FIG. 9A14 illustrates a transition of user interface 900 from the state of that user interface in FIG. 9A13. In particular, FIG. 9A14 shows a greater extent of the changes in the visual appearances of intensity-reactive activatable object 902 and user interface 900 in accordance with a further increase in the contact intensity of user input 912. As the contact intensity of user input 912 increases above the first intensity threshold $IT_H$, but remains below a second intensity threshold $IT_L$, as shown in user input intensity graph 906, the visual appearance of intensity-reactive activatable object 902 is further changed using a greater extent of the second transformation (e.g., as compared to FIG. 9A13, the size of activatable object 902 is even further decreased, and an even greater amount of the platter displayed behind activatable object 902 is visible). In addition, the visual appearance of user interface 900, excluding activatable object 902, includes a greater degree of blurring, and optionally a greater degree of shrinking (not shown).

FIG. 9A15 illustrates a transition of user interface 900 from the state of that user interface in FIG. 9A14. In particular, FIG. 9A14 shows the state of user interface 900 at a current time tc in accordance with an increase in the contact intensity of user input 912 corresponding to intensity-reactive activatable object 902. As shown in user input intensity graph 906, the contact intensity of user input 912 satisfies the second intensity threshold $IT_L$. In accordance with the contact intensity of user input 912 satisfying the second intensity threshold $IT_L$, a preview of related content (e.g., a quick actions menu) associated with intensity-reactive activatable object 902 is displayed as activatable object 914 and, optionally, a tactile output 916 is generated.

FIG. 9A16 illustrates an alternate transition of user interface 900 from the state of that user interface in FIG. 9A1. In particular, FIG. 9A16 shows the state of user interface 900 at a current time tc, indicating detection of a contact by user input 912 on the touch-sensitive surface that corresponds to a request to select intensity-reactive activatable object 902. As shown in user input intensity graph 906, the contact intensity of user input 912 is initially below a first intensity threshold $IT_H$. As shown in user input lateral displacement graph 908, the lateral displacement (e.g., the displacement from an initial contact position of the user input) of the user input is below a lateral displacement threshold Dt.

In response to detecting the contact by user input 912 corresponding to intensity-reactive activatable object 902 with an intensity below the first intensity threshold $IT_H$, the visual appearance of activatable object 902 is changed using the first transformation. In the example shown in FIG. 9A16, the size of activatable object 902 is decreased from that shown in FIG. 9A1, for example, and a platter is displayed behind activatable object 902 in the area previously occupied by activatable object 902 prior to its size being decreased).

FIG. 9A17 illustrates a transition of user interface 900 from the state of that user interface in FIG. 9A16. In particular, FIG. 9A17 shows the state of user interface 900 at current time tc in accordance with continued lateral movement of user input 912 with respect to user interface 900. As shown in user input lateral displacement graph 908, the lateral displacement of the user input has increased from that shown in FIG. 9A16 and satisfies (and exceeds) lateral displacement threshold Dt. In accordance with a determination that the lateral displacement of user input 912 satisfies displacement criteria (e.g., including satisfying lateral displacement threshold Dt), a third transformation is applied to at least a portion of user interface 900 including activatable object 902 such that the portion of user interface 900 is scrolled in accordance with the lateral displacement of user input 912.

In the example shown in FIG. 9A17, the third transformation is applied such that at least a portion of user interface 900 is scrolled in a first direction in accordance with the lateral displacement of user input 912 and a position of activatable object 902 is changed accordingly. Furthermore, the change in the visual appearance of intensity-reactive activatable object 902 using the first transformation is gradually and dynamically reduced from that shown in FIG. 9A16 in accordance with the lateral movement of user input 912, such that the visual appearance of activatable object 902 (other than its position) is gradually changed back to its initial or previous appearance prior to detecting user input 912. More specifically, FIG. 9A17 shows that the size of activatable object 902 is increased from that shown in FIG. 9A16, and a lesser amount of the platter displayed behind activatable object 902 is visible, upon scrolling user interface 900 in accordance with the lateral movement of user input 912.

FIG. 9A18 illustrates a transition of user interface 900 from the state of that user interface in FIG. 9A17. In particular, FIG. 9A18 shows a greater extent of the changes in the visual appearances of activatable object 902 and user interface 900 at current time tc in accordance with continued lateral movement of user input 912 with respect to user interface 900 corresponding to an increase in the lateral displacement of user input 912. As the lateral displacement of user input 912 is further increased from that shown in FIG. 9A17, as shown in user input lateral displacement graph 908, a greater extent of the third transformation is applied such that the portion of user interface 900 including activatable object 902 is further scrolled in the first direction, and the change in the visual appearance of intensity-reactive activatable object 902 due to the first transformation is gradually and dynamically reduced even further. More specifically, FIG. 9A18 shows that the size of intensity-reactive activatable object 902 is increased to its original size as shown in FIG. 9A1, for example, and the platter is no longer visible, in accordance with the further increase in lateral displacement of user input 912. In some embodiments, the application of the first transformation to activatable object 902 is completely reduced in accordance with a determination that the lateral displacement of user input 912 includes a predefined threshold amount of lateral displacement (e.g., if the lateral displacement of the user input satisfies a second lateral displacement threshold, not shown in FIG. 9A18).

FIG. 9A19 illustrates a transition of user interface 900 from the state of that user interface in FIG. 9A18. In particular, FIG. 9A19 shows the changes in the visual appearances of activatable object 902 and user interface 900 in accordance with continued lateral movement of user input 912 corresponding to a decrease in the lateral displacement of user input 912 as the contact is maintained on the touch-sensitive surface. As shown in user input lateral displacement graph 908, the lateral displacement of user input 912 has decreased from that shown in FIG. 9A18 but remains above lateral displacement threshold Dt. In accordance with the decrease in lateral displacement, the visual appearance of intensity-reactive activatable object 902 is changed by gradually reapplying the first transformation (e.g., FIG. 9A19 shows that the size of activatable object 902 is again decreased, and the platter is again displayed behind activatable object 902 in the area previously occupied by activatable object 902 prior to its size being decreased). Furthermore, in accordance with the decrease in lateral displacement of user input 912, the third transformation is gradually reduced such that the scrolling of the portion of user interface 900 including activatable object 902 in the first direction is reversed (i.e., scrolled in a second direction opposite the first direction).

FIG. 9A20 illustrates a transition of user interface 900 from the state of that user interface in FIG. 9A19. In particular, FIG. 9A20 shows the changes in the visual appearances of activatable object 902 and user interface 900 in accordance with continued lateral movement of user input 912 corresponding to a further decrease in lateral displacement as the contact is maintained on the touch-sensitive surface. As shown in user input lateral displacement graph 908, the lateral displacement of user input 912 has decreased from that shown in FIG. 9A19 and is below lateral displacement threshold Dt. In accordance with the decrease in lateral displacement, the visual appearance of intensity-reactive activatable object 902 is further changed by continuing to gradually reapply the first transformation (e.g., FIG. 9A20 shows that the size of activatable object 902 is further decreased, and a greater amount of the platter displayed behind activatable object 902 is again visible). Furthermore, in accordance with the further reduction in lateral displacement of user input 912, the third transformation is further reduced such that the scrolling of the portion of user interface 900 including activatable object 902 in the first direction is further reversed (i.e., scrolled in the second direction opposite the first direction back to the initial position as shown in FIG. 9A16).

It is noted that FIGS. 9A19-9A20 illustrate both that the portion of user interface 900 is scrolled in the second direction back to its initial position and that the first transformation is reapplied to intensity-reactive activatable object 902 as the lateral displacement of user input 912 decreases while the contact is maintained on the touch-sensitive surface. However, in some embodiments, the portion of user interface 900 is scrolled in the second direction back to its initial position without the first transformation being reapplied to intensity-reactive activatable object 902, such that the visual appearance of activatable object 902 (other than its position) is maintained as shown in FIG. 9A18.

Figure 21:
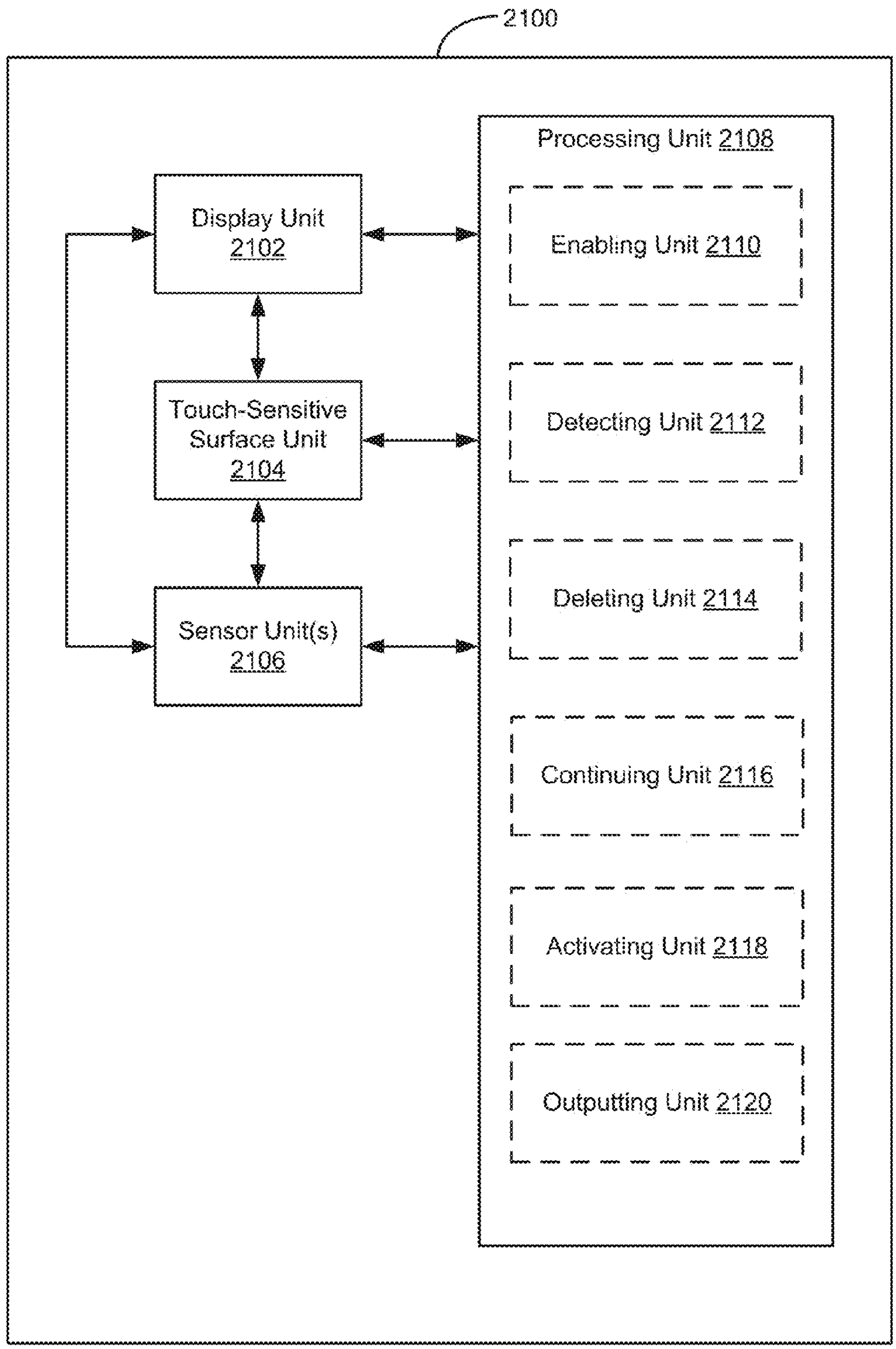
FIG. 21 is a functional block diagram of an electronic device in accordance with some embodiments.
Figure 22B:
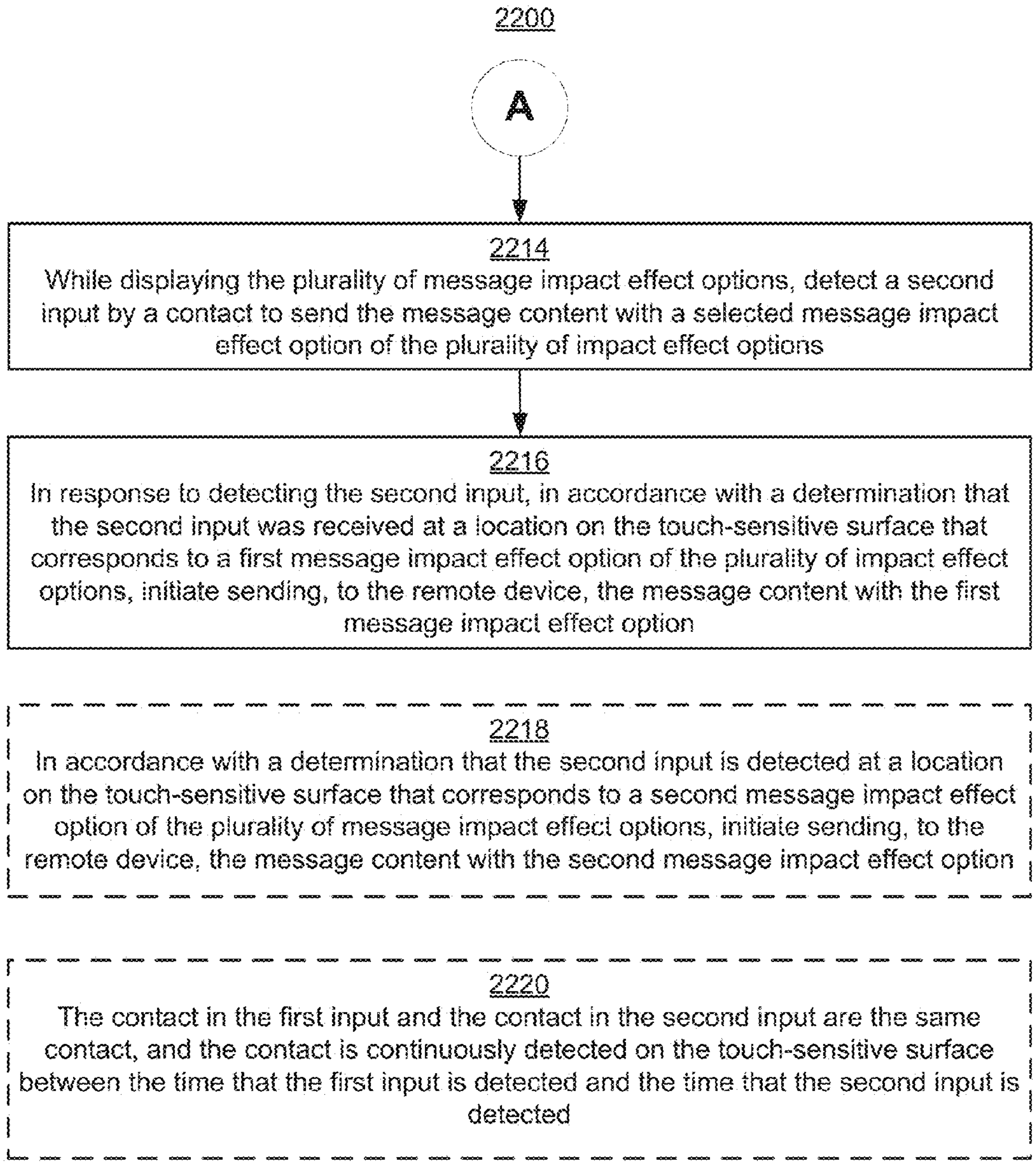

FIGS. 9A21-9A22 illustrate a series of transitions of user interface 900 from the state of that user interface in FIG. 9A20. In particular, FIGS. 9A21-9A22 show the changes in the visual appearances of activatable object 902 in response to ceasing to detect the contact corresponding to user input 912. As shown in user input intensity graph 906, the contact intensity of user input 912 has decreased from its intensity as shown in FIG. 9A20 to zero, in accordance with ceasing to detect the contact (e.g., due to liftoff of the contact from the touch-sensitive surface).

In FIGS. 9A21-9A22, in response to ceasing to detect the contact, the change in the visual appearance of intensity-reactive activatable object 902 due to the first transformation is gradually and dynamically reduced, such that the visual appearance of intensity-reactive activatable object 902 is gradually changed back to its initial or previous appearance prior to detecting the contact by user input 912. More specifically, FIG. 9A21 shows that the size of activatable object 902 is increased from that shown in FIG. 9A20, and a lesser amount of the platter displayed behind activatable object 902 is visible, and FIG. 9A22 shows that the size of activatable object 902 is subsequently increased to its original size as shown in FIG. 9A1, for example, and the platter is no longer visible, in response to ceasing to detect the contact.

In some embodiments, in response to ceasing to detect the contact by user input 912, and in accordance with a determination that user input 912 corresponds to a tap gesture, an activation operation corresponding to activatable object 902 is performed (e.g., the application, such as a messaging application, associated with activatable object 902 is launched) in conjunction with changing the visual appearance of activatable object 902 by gradually reducing the first transformation.

Figure 23:
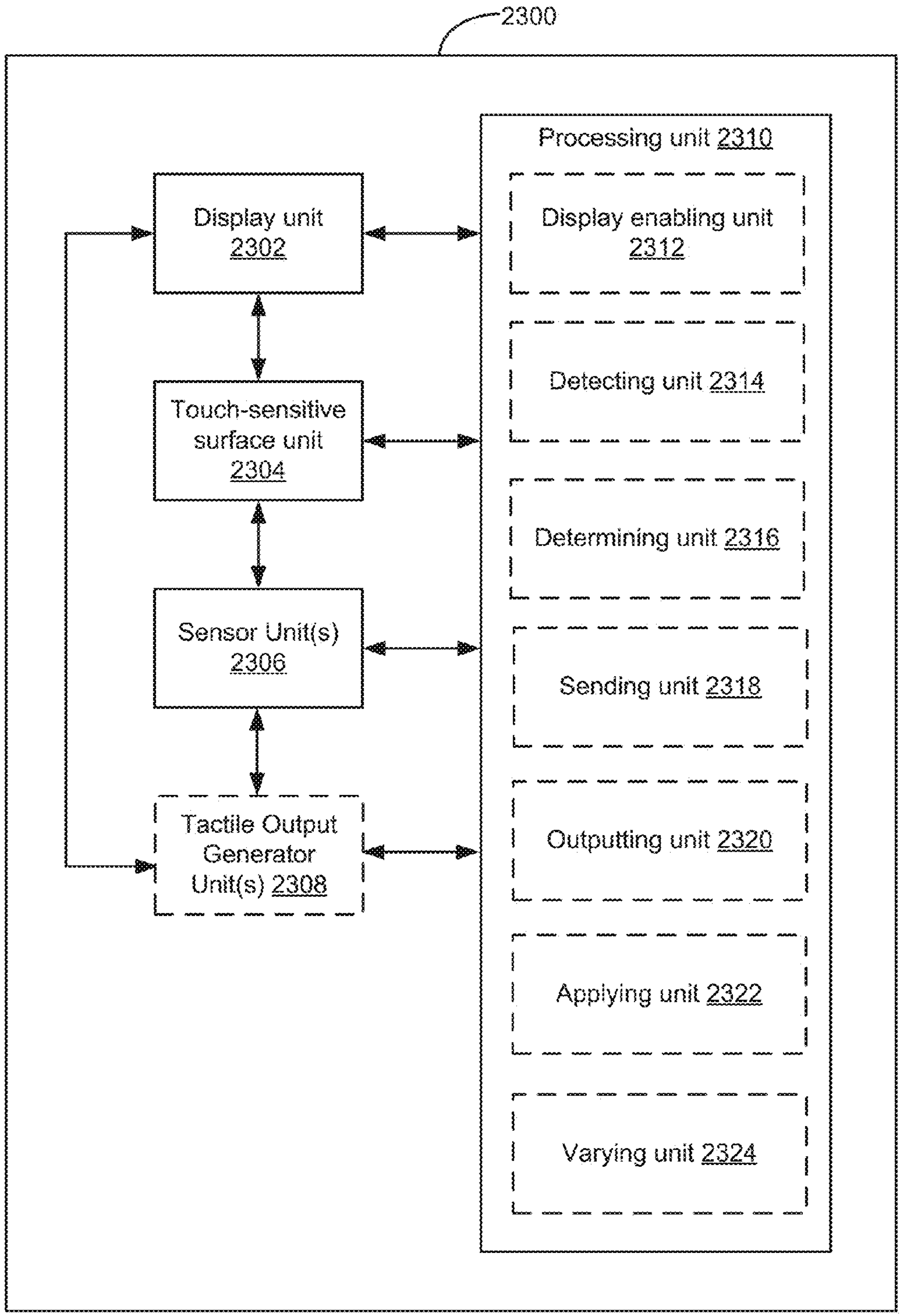
FIG. 23 is a functional block diagram of an electronic device in accordance with some embodiments.

FIG. 9A23 illustrates an alternate transition of user interface 900 from the state of that user interface in FIG. 9A1. In particular, FIG. 9A23 shows the state of user interface 900 at a current time tc, indicating detection of a contact by user input 913 on the touch-sensitive surface that corresponds to a request to select intensity-reactive activatable object 902. As shown in user input intensity graph 906, the contact intensity of user input 913 is initially below a first intensity threshold $IT_H$. In addition, the total amount of time that the contact by user input 913 has been maintained on the touch-sensitive surface is below a first time threshold $T_H$. Also, as shown in user input lateral displacement graph 908, the lateral displacement (e.g., the displacement from an initial contact position of the user input) of the user input is zero. In response to detecting the contact by user input 913 corresponding to activatable object 902, the visual appearance of activatable object 902 is changed using the first transformation (e.g., FIG. 9A23 shows that the size of activatable object 902 is decreased from that shown in FIG. 9A1, for example, and a platter is displayed behind activatable object 902 in the area previously occupied by activatable object 902 prior to its size being decreased).

FIG. 9A24 illustrates a transition of user interface 900 from the state of that user interface in FIG. 9A23. In particular, FIG. 9A24 shows that, at time tc, the contact corresponding to user input 913 is maintained on the touch-sensitive display for an additional amount of time since that shown in FIG. 9A23. As shown in user input intensity graph 906, the intensity of user input 913 remains below the first intensity threshold $IT_H$, and the total amount of time that the contact by user input 913 has been maintained on the touch-sensitive surface satisfies the first time threshold $T_H$ (e.g., a time-dependent long press hint threshold) but does not satisfy a second time threshold $T_{LP}$ (e.g., a time-dependent long press transformation threshold).

In accordance with the contact being maintained on the touch-sensitive surface such that the total amount of time that the contact is maintained satisfies the first time threshold $T_H$ without the contact meeting the first intensity threshold $L_H$ or the lateral displacement threshold Dt, the visual appearance of intensity-reactive activatable object 902 is changed using a fourth transformation. In the example shown in FIG. 9A24, the brightness of activatable object 902 is decreased such that activatable object 902 is dimmed or darkened as compared to FIG. 9A23. The platter displayed behind activatable object 902 remains visible to the same extent.

FIG. 9A25 illustrates a transition of user interface 900 from the state of that user interface in FIG. 9A24. In particular, FIG. 9A25 shows the state of user interface 900 at current time tc in accordance with an increase in the contact intensity of user input 913. As shown in user input intensity graph 906, the intensity of user input 79 has increased from that shown in FIG. 9A24 to above the first intensity threshold $IT_H$. In accordance with detecting the increase in contact intensity, and in accordance with a determination that the contact intensity satisfies the first intensity threshold $IT_H$, the fourth transformation is dynamically reduced as the contact intensity increases (e.g., as shown in FIG. 9A25, the decrease in brightness of activatable object 902 is reversed such that activatable object 902 is undimmed in accordance with the increase in the contact intensity of user input 913 to above the first intensity threshold $IT_H$).

FIGS. 9B1-9B10 illustrate exemplary user interfaces for displaying intensity-reactive and intensity-nonreactive user interface objects, in accordance with some embodiments.

FIG. 9B1 illustrates a user interface 901 on display 950; in the example shown in FIGS. 9B1-9B10, user interface 901 includes a user interface of a mail application (e.g., e-mail client module 140, FIG. 1A). A plurality of activatable user interface objects (e.g., respective items representing multiple e-mail messages) are arranged in a list, including activatable object 930.

As shown in FIG. 9B1, user input intensity graph 906 and user input lateral displacement graph 908 indicate that no user input that corresponds to a request to select an activatable object in user interface 900 has been detected.

FIG. 9B2 illustrates a transition of user interface 901 from the state of that user interface in FIG. 9B1. In particular, FIG. 9B2 shows the state of user interface 900 at a current time tc, indicating detection of a contact by user input 915 on the touch-sensitive surface that corresponds to a request to select intensity-reactive activatable object 930. As shown in user input intensity graph 906, the contact intensity of user input 915 is initially below the first intensity threshold $IT_H$. As shown in user input lateral displacement graph 908, the lateral displacement of the user input is initially below lateral displacement threshold Dt.

In response to detecting the contact by user input 915 corresponding to intensity-reactive activatable object 930, the visual appearance of activatable object 930 is changed using a first transformation. In the example shown in FIG. 9B2, the size of activatable object 930 is decreased (e.g., displaying movement of activatable object 930 downwards in a virtual z direction) and activatable object 930 is dimmed or darkened, as compared to its visual appearance as shown in FIG. 9B1. Alternatively, in some embodiments, the size of activatable object 930 is increased (e.g., displaying movement of activatable object 930 upwards in a virtual z direction) rather than decreased.

FIG. 9B3 illustrates a transition of user interface 901 from the state of that user interface in FIG. 9B2. In particular, FIG. 9B3 shows the state of user interface 901 at current time tc in accordance with an increase in the contact intensity of user input 915 (e.g., consistent with a light press gesture), such that the contact intensity of user input 915 satisfies the first intensity threshold $IT_H$, as shown in user input intensity graph 906, while the lateral displacement of user input 915, as shown in user input lateral displacement graph 908, remains below lateral displacement threshold Dt.

In accordance with a determination that the contact intensity of user input 915 satisfies the first intensity threshold $IT_H$, the visual appearance of activatable object 930 is changed using a second transformation in accordance with changes in the detected intensity of the contact on the touch-sensitive surface (e.g., as compared to FIG. 9B2, the size of activatable object 930 is increased, such as to indicate movement of activatable object upwards in a virtual z direction, and the brightness of activatable object 930 is increased). In addition, the visual appearance of user interface 901, other than activatable object 930, is changed to include blurring, and optionally shrinking (not shown), of user interface 901 excluding activatable object 930.

FIG. 9B4 illustrates a transition of user interface 901 from the state of that user interface in FIG. 9B3. In particular, FIG. 9B4 shows a greater extent of the changes in the visual appearances of intensity-reactive activatable object 930 and user interface 901 in accordance with a further increase in the contact intensity of user input 915 (e.g., further consistent with a light press input). As shown in user input lateral displacement graph 908, the lateral displacement of user input 915 remains below lateral displacement threshold Dt. As the contact intensity of user input 915 increases above the first intensity threshold $IT_H$, but remains below a second intensity threshold $IT_L$, as shown in user input intensity graph 906, the visual appearance of intensity-reactive activatable object 930 is further changed using a greater extent of the second transformation (e.g., as compared to FIG. 9B3, the brightness and size of activatable object 930 are further increased). In addition, the visual appearance of user interface 901, excluding activatable object 930, includes a greater degree of blurring, and optionally a greater degree of shrinking (not shown).

FIG. 9B5 illustrates a transition of user interface 901 from the state of that user interface in FIG. 9B4. In particular, FIG. 9B5 shows the state of user interface 901 at a current time tc in accordance with an increase in the contact intensity of user input 915 corresponding to intensity-reactive activatable object 930. As shown in user input intensity graph 906, the contact intensity of user input 915 satisfies the second intensity threshold $IT_L$, while the lateral displacement of user input 915 remains below lateral displacement threshold Dt, as shown in user input lateral displacement graph 908. In accordance with the contact intensity of user input 915 satisfying the second intensity threshold $IT_L$ (e.g., corresponding to a light press gesture), a preview of related content (e.g., a portion of an electronic mail message) associated with intensity-reactive activatable object 930 is displayed as user interface object 931 and, optionally, a tactile output 917 is performed.

FIG. 9B6 illustrates a transition of user interface 901 from the state of that user interface in FIG. 9B5. In particular, FIG. 9B6 shows the state of user interface 901 at a current time tc in accordance with a further increase in the contact intensity of user input 915 corresponding to intensity-reactive activatable object 930, FIG. 9B4, and user interface object 931, FIG. 9B5. As shown in user input intensity graph 906, the contact intensity of user input 915 satisfies the third intensity threshold $IT_D$, while the lateral displacement of user input 915 remains below lateral displacement threshold Dt, as shown in user input lateral displacement graph 908. In accordance with the contact intensity of user input 915 satisfying the third intensity threshold $IT_D$ (e.g., corresponding to a deep press input), the related content (e.g., the electronic mail message) associated with intensity-reactive activatable object 930 is displayed as user interface object 931 and, optionally, a tactile output 918 is generated.

FIG. 9B7 illustrates an alternate transition of user interface 901 from the state of that user interface in FIG. 9B4. In particular, FIG. 9B7 shows the state of user interface 901 at current time tc in accordance with resumed lateral movement of user input 915 with respect to user interface 901 and a decrease in the contact intensity of user input 915. As shown in user input lateral displacement graph 908, the lateral displacement of user input 915 has increased from that shown in FIG. 9B4 to above lateral displacement threshold Dt (e.g., consistent with a scroll input). In accordance with a determination that the lateral displacement of user input 915 satisfies displacement criteria (e.g., including satisfying lateral displacement threshold Dt), a third transformation is applied to at least a portion of user interface 901 including activatable object 930 such that the portion of user interface 901 is scrolled in accordance with the lateral displacement of user input 915.

Moreover, in accordance with the increase in the lateral displacement of user input 915 and with the decrease in the contact intensity of user input 915, as shown in user input intensity graph 906, the change in visual appearance of activatable object 930 using the second transformation is dynamically reduced (e.g., the brightness and size of activatable object 930 are decreased). In addition, the visual appearance of user interface 901 is changed to include a lesser degree of blurring, and optionally a lesser degree of shrinking (not shown), than in FIG. 9B4.

FIG. 9B8 illustrates a transition of user interface 901 from the state of that user interface in FIG. 9B7. In particular, FIG. 9B8 shows a greater extent of the changes in the visual appearances of activatable object 930 and user interface 901 in accordance with an increase in the contact intensity of user input 915 (e.g., again consistent with a light press gesture). As shown in user input intensity graph 906, the contact intensity of user input 915 continues to satisfy the first intensity threshold $IT_H$ (while remaining below the second intensity threshold $IT_L$). As shown in user input lateral displacement graph 908, the lateral displacement of user input 915 has not changed from that shown in FIG. 9B7, although the lateral displacement continues to satisfy lateral displacement threshold Dt.

In accordance with the increase in contact intensity of user input 915 above the first intensity threshold $IT_H$ (but below the second intensity threshold $IT_L$), the visual appearance of intensity-reactive activatable object 930 is changed using a greater extent of the second transformation (e.g., as compared to FIG. 9B7, the brightness and size of activatable object 930 are increased). In addition, the visual appearance of user interface 901, excluding activatable object 930, includes a greater degree of blurring, and optionally a greater degree of shrinking (not shown).

FIG. 9B9 illustrates a transition of user interface 901 from the state of that user interface in FIG. 9B8. In particular, FIG. 9B9 shows the state of user interface 901 at current time tc in accordance with resumed lateral movement of user input 915 with respect to user interface 901 and a decrease in the contact intensity of user input 915. In accordance with the decrease in the contact intensity of user input 915, as shown in user input intensity graph 906, the change in visual appearance of activatable object 930 using the second transformation is dynamically reduced (e.g., the brightness and size of activatable object 930 are decreased). In addition, the visual appearance of user interface 900 is changed to include a lesser degree of blurring, and optionally a lesser degree of shrinking (not shown), than in FIG. 9B8.

Also, as shown in user input lateral displacement graph 908, the lateral displacement of user input 915 has increased from that shown in FIG. 9B8, while continuing to satisfy lateral displacement threshold Dt (e.g., consistent with a scroll gesture). In accordance with a determination that the lateral displacement of user input 915 satisfies displacement criteria (e.g., including satisfying lateral displacement threshold Dt), the third transformation is reapplied such that the portion of user interface 901 including activatable object 930 is scrolled in accordance with the lateral displacement of user input 915.

FIG. 9B10 illustrates a transition of user interface 901 from the state of that user interface in FIG. 9B9. In particular, FIG. 9B10 shows the state of user interface 901 at current time tc in accordance with a further increase in lateral displacement of user input 915 and a further decrease in contact intensity of user input 915. As shown in user input lateral displacement graph 908, the lateral displacement of user input 915 has increased further from that shown in FIG. 9B9 (e.g., further consistent with a scroll gesture). In accordance with the further increase in the lateral displacement of user input 915, a greater extent of the third transformation is applied such that the portion of user interface 901 including activatable object 930 is further scrolled.

Moreover, in accordance with the further increase in the lateral displacement of user input 915 and with the further decrease in the contact intensity of user input 915 to below the first intensity threshold $IT_H$, as shown in user input intensity graph 906, the second transformation of activatable object 930 is completely reduced such that the brightness and size of activatable object 930 are restored to their initial appearance prior to detecting user input 915. In addition, the blurring of user interface 901 is completely reduced. In some embodiments, the application of the second transformation to activatable object 930 and the blurring of user interface 901 are completely reduced in accordance with a determination that the lateral displacement of user input 915 includes a predefined threshold amount of lateral displacement (e.g., if the lateral displacement of the user input satisfies a second lateral displacement threshold, not shown in FIG. 9B10).

FIGS. 9C1-9C19 illustrate exemplary user interfaces for displaying control settings interfaces for control functions for remote devices (e.g., another device that is in wireless communication with, and is controlled by the electronic device that is displaying the user interfaces), in accordance with some embodiments.

FIG. 9C1 illustrates a first user interface 900 including one or more activatable objects 962-1 through 962-8. In FIG. 9C1, activatable objects 962-1 through 962-8 are associated with control functions including, for example, a temperature or thermostat icon 962-1 for controlling temperature settings of a remote temperature control, a fan icon 962-2 for controlling fan settings for a remote fan, shades icon 962-3 for controlling window shade or blinds settings for a remote window shade or blinds, lights icon 962-4 for controlling lights settings (e.g., brightness or color) for a remote light, doors icon 962-5 for controlling door settings (e.g. locking or unlocking) of a remote door lock, camera icon 962-6 for controlling or viewing security camera feeds of a remote security camera, smoke alarm icon 962-7 for controlling or viewing smoke detector statuses of a remote smoke detector, and sleep icon 962-8 for setting one or more control functions for a set of associated remote devices to a sleep or low power state.

FIG. 9C2 is similar to FIG. 9C1 except that FIG. 9C2 shows the state of user interface 901 at a current time tc, indicating detection of a contact by user input 954 on a touch-sensitive surface (e.g., touch-sensitive surface 451 or a touch-sensitive surface of touch-screen display 450, FIG. 4B) corresponding to a request to select a first activatable user interface object. In particular, FIG. 9C2 shows the position of user input 954 positioned over the first activatable object, lights icon 962-4, in first user interface 901. As shown in user input intensity graph 906, the contact intensity of user input 954 is initially below a first intensity threshold $IT_H$.

FIG. 9C3 illustrates a transition of first user interface 901 from the state of that user interface in FIG. 9C2. In particular, FIG. 9C3 shows the state of user interface 901 at current time tc in accordance with an increase in the contact intensity of user input 954, such that the contact intensity of user input 954 satisfies the first intensity threshold $IT_H$, as shown in user input intensity graph 906.

In response to detecting the contact by user input 954 corresponding to lights icon 962-4 with a contact intensity that satisfies the first intensity threshold $IT_H$, the visual appearance of lights icon 952-4 is changed (e.g., as compared to FIG. 9C2, the size of lights icon 952-4 is decreased, and a platter is displayed behind lights icon 952-4 in the area previously occupied by lights icon 952-4 prior to its size being decreased), in accordance with changes in the detected intensity of the contact. In addition, the visual appearance of user interface 901, other than lights icon 952-4, is changed to include blurring, and optionally shrinking (not shown), of user interface 901, in accordance with changes in the detected intensity of the contact.

FIG. 9C4 illustrates a second user interface 951, displayed at current time tc in accordance with a further increase in the contact intensity of user input 954 such that the contact intensity satisfies a second intensity threshold $IT_L$. In addition, in accordance with the contact intensity of user input 954 satisfying the second intensity threshold $IT_L$, a tactile output 920 is optionally output. The second user interface 951 includes a second activatable user interface object 958 that has seven state options (e.g., state options 958-0 through 958-6) that correspond to available values for a control function that controls a setting corresponding to lights icon 962-4, FIG. 9C2. In the example shown in FIG. 9C4, the lowest value 958-0 corresponds to an off state of the control function, whereas the values 958-1 through 958-6 correspond to varying degrees of an on state of the control function. Also, as shown in FIG. 9C4, a first value 958-3 is selected as a current value for the control function.

In some embodiments, when second user interface 951 is displayed, if the contact by user input 954 lifts off without moving across the touch-sensitive surface, second user interface 951 continues to be displayed so that a user can make a second input on the second user interface to adjust the setting of the control function, as described in further detail herein.

Moreover, in some embodiments, as shown in the example illustrated in FIG. 9C4, second user interface 951 is displayed over a portion of first user interface 901 (e.g., second user interface 951 may be displayed as a platter over first user interface 901). The visual appearance of first user interface 901, as shown in FIG. 9C4, is optionally changed to include blurring.

FIG. 9C5 is similar to FIG. 9C4, except that FIG. 9C5 does not show first user interface 901 displayed behind second user interface 951. For ease of discussion, FIG. 9C5 and subsequent illustrations show second user interface 952 displayed on display 950 without showing any portion of first user interface 901.

FIG. 9C6 illustrates a transition of second user interface 952 from the state of that user interface in FIG. 9C5. In particular, FIG. 9C6 shows the state of user interface 952 in accordance with lateral movement of user input 954. In some embodiments, including the example shown in FIG. 9C6, the lateral movement of user input 954 as shown in FIG. 9C6 is a continuation of the contact by user input 954, FIG. 9C2, while maintaining a contact intensity that satisfies the second intensity threshold $IT_L$.

In accordance with the lateral movement of user input 954 corresponding to a first amount of lateral displacement of the contact in a first direction (e.g., upward) from an initial contact position, the current value for the control function as shown by activatable user interface object 958 is increased from the first value 958-3 to a second value 958-4. In addition, the visual appearance of control icon 907 representing the state of the control function is changed accordingly to indicate that the current value for the control function has been increased (e.g., that the brightness of a corresponding light bulb has been increased).

FIG. 9C7 illustrates a transition of second user interface 952 from the state of that user interface in FIGS. 9C5-9C6. In particular, FIG. 9C7 shows further lateral movement of user input 954 corresponding to a second amount (e.g., greater than the first amount) of lateral displacement of the contact in the first direction (e.g., upward). In accordance with the additional lateral displacement of user input 954 in the first direction, the current value for the control function as shown by activatable user interface object 958 is further increased to a third value 958-5. In addition, the visual appearance of control icon 907 representing the state of the control function is changed accordingly to indicate that the current value for the control function has been further increased (e.g., that the brightness of the light bulb has been further increased).

FIG. 9C8 illustrates a transition of second user interface 952 from the state of that user interface in FIGS. 9C5-9C7. In particular, FIG. 9C8 shows even further lateral movement of user input 954 corresponding to a third amount (e.g., greater than the first and second amounts) of lateral displacement of the contact in the first direction (e.g., upward). In accordance with the additional lateral displacement of user input 954 in the first direction, the current value for the control function as shown by activatable user interface object 958 is even further increased to a fourth and maximum value 958-6. In addition, the visual appearance of control icon 907 representing the state of the control function is changed accordingly to indicate that the current value for the control function has been further increased (e.g., that the brightness of the light bulb has been further increased to the maximum value).

FIG. 9C9 illustrates a transition of second user interface 952 from the state of that user interface in FIGS. 9C5-9C8. In particular, FIG. 9C9 shows further lateral movement of user input 954 corresponding to a fourth amount of lateral displacement of the contact in the first direction, where the fourth amount is greater than the third amount. As shown in FIG. 9C9, the current value for the control function is maintained at the maximum value, and the visual appearance of control icon 907 is maintained accordingly. In addition, in accordance with the additional lateral displacement of user input 954 in the first direction, an animation of activatable user interface object 958 is displayed to show activatable user interface object 958 elongating (e.g., transforming into a third activatable user interface object that is an elongated form of activatable user interface object 958). Optionally, a tactile output 921 is output in conjunction with displaying the animation of activatable user interface object 958 elongating.

FIG. 9C10 illustrates a transition of second user interface 952 from the state of that user interface in FIG. 9C9. FIG. 9C10 shows a state of second user interface 952 in accordance with subsequently ceasing to detect the contact by user input 954 (e.g., by detecting liftoff of the contact by user input 954) at the position corresponding to the fourth amount of lateral displacement of the contact in the second direction. In accordance with ceasing to detect the contact, an animation of activatable user interface object 958 is displayed to show the elongated form of activatable user interface object 958 (as shown in FIG. 9C9) contracting and returning to its previous size (e.g., an animation of the third activatable user interface object that is an elongated form of activatable user interface object 958 transforming back into activatable user interface object 958). Optionally, a tactile output 922 is output in conjunction with ceasing to detect the contact and/or in conjunction with displaying the animation of activatable user interface object 958. In some embodiments, tactile output 922 is output as an alternative to outputting tactile output 921 as illustrated in FIG. 9C9.

FIG. 9C11 is similar to FIG. 9C6, except that FIG. 9C11 illustrates lateral movement of user input 954 corresponding to the first amount of lateral displacement of the contact in a second direction (e.g., downward) from the initial contact position. In accordance with the lateral displacement of user input 954 by the first amount in the second direction, the current value for the control function as shown by activatable user interface object 958 is decreased to from the first value 958-3 to a fifth value 958-2. In addition, the visual appearance of control icon 907 representing the state of the control function is changed accordingly to indicate that the current value for the control function has been decreased (e.g., that the brightness of the light bulb has been decreased).

FIG. 9C12 illustrates a transition of second user interface 952 from the state of that user interface in FIGS. 9C6 and 9C11. In particular, FIG. 9C12 shows further lateral movement of user input 954 corresponding to the second amount of lateral displacement of the contact in the second direction (e.g., downward). In accordance with the additional lateral displacement of user input 954 in the second direction, the current value for the control function as shown by activatable user interface object 958 is further decreased to a sixth value 958-1. In addition, the visual appearance of control icon 907 representing the state of the control function is changed accordingly to indicate that the current value for the control function has been further decreased (e.g., that the brightness of the light bulb has been further decreased).

FIG. 9C13 illustrates a transition of second user interface 952 from the state of that user interface in FIGS. 9C6 and 9C11-9C12. In particular, FIG. 9C13 shows even further lateral movement of user input 954 corresponding to the third amount of lateral displacement of the contact in the second direction (e.g., downward). In accordance with the additional lateral displacement of user input 954 in the second direction, the current value for the control function as shown by activatable user interface object 958 is even further decreased to a seventh and minimum value 958-0, corresponding to an off state of the control function. In addition, the visual appearance of control icon 907 representing the state of the control function is changed accordingly to indicate that the current value for the control function has been even further decreased to the minimum value (e.g., that the light bulb has been turned off).

FIG. 9C14 illustrates a transition of second user interface 952 from the state of that user interface in FIG. 9C13. In particular, FIG. 9C14 shows further lateral movement of user input 954 corresponding to a fifth amount of lateral displacement of the contact in the second direction, where the fifth amount is greater than the third amount. As shown in FIG. 9C14, the current value for the control function is maintained at the minimum value, and the visual appearance of control icon 907 is maintained accordingly. In addition, in accordance with the additional lateral displacement of user input 954 in the second direction, an animation of activatable user interface object 958 is displayed to show activatable user interface object 958 elongating (e.g., transforming into a third activatable user interface object that is an elongated form of activatable user interface object 958). Optionally, a tactile output 923 is output in conjunction with displaying the animation of activatable user interface object 958 elongating.

FIG. 9C15 illustrates a transition of second user interface 952 from the state of that user interface in FIG. 9C14. As noted above, in some embodiments, FIG. 9C6 and subsequent FIGS. 9C11-9C14 correspond to lateral movement of user input 954 being detected while the contact by user input 954 continues to be maintained on the touch-sensitive surface. FIG. 9C15 shows a state of second user interface 952 in accordance with subsequently ceasing to detect the contact by user input 954 (e.g., by detecting liftoff of the contact by user input 954) at the position corresponding to the fifth amount of lateral displacement of the contact in the second direction. In accordance with ceasing to detect the contact, an animation of activatable user interface object 958 is displayed to show the elongated form of activatable user interface object 958 (as shown in FIG. 9C14) contracting and returning to its previous size (e.g., an animation of the third activatable user interface object that is an elongated form of activatable user interface object 958 transforming back into activatable user interface object 958). Optionally, a tactile output 924 is output in conjunction with ceasing to detect the contact and/or in conjunction with displaying the animation of activatable user interface object 908. In some embodiments, tactile output 924 is output as an alternative to outputting tactile output 923 as illustrated in FIG. 9C14.

FIG. 9C16 illustrates a further transition of second user interface 952 from the state of that user interface in FIG. 9C15. In particular, subsequent to ceasing to detect the contact by user input 954 (e.g., by detecting liftoff of the contact by user input 954) and displaying the animation of activatable user interface 958, second user interface 952 ceases to be displayed, and first user interface 901 is displayed instead. In some embodiments, an animation is displayed of the activatable user interface object 958 transforming into lights icon 962-4. In addition, in accordance with ceasing to detect the contact while the current value for the control function is set to the minimum value corresponding to an off state of the control function, first user interface 901 indicates that the control function corresponding to lights icon 962-4 has been set to the off state.

FIGS. 9C17-9C19 illustrate exemplary user interfaces for displaying a secondary settings interface, in accordance with some embodiments.

FIG. 9C17 illustrates an alternate transition of second user interface 952 from the state of that user interface in FIG. 9C5. In particular, FIG. 9C17 shows a second user interface 952 displayed at current time tc in accordance with ceasing to detect the contact by user input 954 prior to detecting movement of the contact across the touch-sensitive surface. As noted above, in some embodiments, when the second user interface is displayed, ceasing to detect the contact by the user input prior to detecting movement of the contact across the touch-sensitive surface results in the second user interface continuing to be displayed so that a user can make a second input on the second user interface to adjust the setting of the control function. Accordingly, FIG. 9C17 illustrates that second user interface 952 continues to be displayed subsequent to ceasing to detect the contact by user input 954 prior to detecting lateral movement of the contact.

FIG. 9C18 illustrates a transition of second user interface 952 from the state of that user interface in FIG. 9C17. In particular, FIG. 9C18 shows the position of a contact by a second user input 955 with respect to second user interface 952. In addition, indicia 909 (e.g., pagination indicia or dots) indicate that second user interface 952 corresponds to a first page of settings interfaces.

FIG. 9C19 illustrates a transition from second user interface 952 as shown in FIG. 9C18 to a third user interface 953 in accordance with lateral movement of user input 955 in a third direction (e.g., toward the left). In particular, FIG. 9C19 shows third user interface 953 including additional activatable user interface objects 960-1 through 960-7 that correspond to available values for a secondary setting of the control function (e.g., for selecting a color of the light bulb). FIG. 9C19 shows, for example, that the currently selected color for the light bulb is that of activatable object 960-1. In addition, indicia 909 indicate that third user interface 953 corresponds to a second page of settings interfaces.

FIGS. 10A-10D are flow diagrams illustrating a method 1000 for interacting with a notification associated with a respective application (e.g., launching an application from a notification associated with the notification or displaying an expanded version of the notification based on detected user input) in accordance with some embodiments. The method 800 is performed at an electronic device (e.g., device 300, FIG. 3, or portable multifunction device 100, FIG. 1A) with a display, a touch-sensitive surface, and one or more sensors for detecting intensities of contacts on the touch-sensitive surface. In some embodiments, the display is a touch screen display and the touch-sensitive surface is on or integrated with the display (also called simply a touch-sensitive display). In some embodiments, the display is separate from the touch-sensitive surface.

As described below, the method provides (1000) an intuitive way to interact with an application launching icon, allowing the user to choose to launch the application or accessing a subset of functions or content from the application without launching the application using a single touch input (e.g., by controlling an intensity of a contact before terminating the contact). The method reduces the number, extent, and/or nature of the inputs from a user to interact with an electronic device, and avoids fully launching an application when not necessary, thereby creating a more efficient human-machine interface. For battery-operated electronic devices, enabling a user to enter inputs faster and more efficiently conserves power and increases the time between battery charges.

The device concurrently displays (1002), on the display: a background user interface (e.g., the user interface is the notification center interfaces (e.g., 5026, 5036), the lock screen (e.g., 5012), the wake screen (e.g., 5002), the user interface of another application (e.g., 5050), the home screen (e.g., 5024), etc.); and a first version of a notification (e.g., a short version of the notification or a standard version of the notification) associated with a first application (e.g., notification 5028, notification 5038, notification 5104), wherein: the first version of the notification has a first size, the first version of the notification includes first content, and the first version of the notification is overlaid on the background user interface. This is illustrated in FIGS. 5A1-5A6 with notifications (e.g., 5028, 5038, 5104) overlaid on various types of background user interfaces (e.g., 5002, 5012, 5024, 5026, 5036, and 5050). In some embodiments, the background user interface is deemphasized (e.g., blurred or darkened) when the first version of the notification is overlaid on top of the background user interface.

While displaying the first version of the notification associated with the first application overlaid on the background user interface, the device detects (1004) a first portion of a first input that includes detecting a first contact at a location on the touch-sensitive surface that corresponds to the first version of the notification (e.g., contact 5052 on notification 5028 in FIG. 5B2, contact 5064 on notification 5028 in FIG. 5C2, contact 5076 on notification 5038 in FIG. 5F2, contact 5106 on notification 5104 in FIG. 5I2).

In response (1006) to detecting the first portion of the first input: in accordance with a determination that the first portion of the first input meets application-launching criteria, wherein the application-launching criteria do not require that a characteristic intensity of the first contact on the touch-sensitive surface meet a preview intensity threshold in order for the application-launching criteria to be met (e.g., in some embodiments, the application-launching criteria are met when the first input is a tap input), the device initiates (1008) a process to launch the first application, wherein launching the first application includes ceasing to display the background user interface and displaying a user interface associated with the first application (e.g., launching the first application if the phone is unlocked, and displaying an "unlock your phone" notification or an authentication interface if the phone is locked and launching the first application once correct authentication information is received). This is illustrated in FIGS. 5B2-5B4, for example. In some embodiments, the application-launching criteria are met when the device detects a tap input with a duration that is below a threshold duration without regard to whether or not the characteristic intensity of the contact exceeded the preview intensity threshold. In some embodiments, the application-launching criteria are met when the device detects liftoff of the contact without the characteristic intensity of the contact having reached the preview intensity threshold since touch-down of the contact. In some embodiments, the application-launching criteria are met when the device detects liftoff of the contact without the characteristic intensity of the contact having exceeded the first intensity for at least a predetermined amount of time before liftoff of the contact was detected. In some embodiments, a combination of two or more of the heuristics described above is used to determine whether an input meets the application-launching criteria. In some embodiments, when the first application is launched in response to an input at a location corresponding to the first version of the notification that meets the application-launching criteria, the application is launched to a view that shows additional information related to the notification (e.g., a view of the corresponding email, messaging, or voice message, or a view of an application that describes the purpose of the alert).

In accordance with a determination that the first portion of the first input meets notification-expansion criteria, wherein the notification-expansion criteria require that the characteristic intensity of the first contact on the touch-sensitive surface meet the preview intensity threshold in order for the notification-expansion criteria to be met (e.g., the preview intensity threshold is the deep press intensity threshold and the first portion of the first input is a deep press input), the device displays (1010) a second version of the notification (e.g., a long or expanded version of the notification) (e.g., expanded notifications 5066 in FIG. 5C5, expanded notification 5078 shown in FIG. 5F4, expanded notification 5108 shown in FIG. 5I4), wherein: the second version of the notification has a second size larger than the first size, the second version of the notification includes expanded notification content that is not displayed in the first version of the notification (e.g., the second version of the notification includes the first content and additional content, or the second version of the notification includes part of the first content and additional content, or the second version of the notification includes a more complete version of the first content), and the second version of the notification is overlaid on the background user interface (e.g., the second version of the notification replaces the first version of the notification, or the second version of the notification is an expansion of the first version of the notification). This is illustrated in FIGS. 5C1-5C6 (e.g., expanded notification 5066 is displayed in response to a press input by contact 5064), for example. This is further illustrated in FIGS. 5F1-5F4 (e.g., expanded notification 5078 is displayed in response to a press input by contact 5076), for example. This is illustrated in FIGS. 5I1-5I4 (e.g., expanded notification 5108 is displayed in response to a press input by contact 5106), for example. In some embodiments, authentication is required before the second version of the notification is displayed. For example, in some embodiments, when the background user interface is the lock screen or wake screen, an authentication interface (e.g., an alert asking for a fingerprint input, or a user interface for entering a password) is presented in accordance with a determination that the first portion of the first input meets the notification-expansion criteria. Once correct authentication information is received through the authentication interface, the second version of the notification is displayed overlaid on the background user interface. The second version of the notification is distinct from the user interface of the first application, and typically, provides access to fewer functionalities and content than the user interface of the first application).

In some embodiments, the second version of the notification includes (1012) the first content. For example, in some embodiments, the notification is for an instant message that includes both text and an image, the first version of the notification includes the text of the instant message, but not the image (e.g., the first version of the notification may optionally include only the text or include the text and a thumbnail of the image, e.g., as shown in FIG. 5B1 or FIG. 5F1), and the second version of the notification includes both the text and the image in the instant message (e.g., the second version of the notification includes the text below the image, e.g., as shown in FIG. 5F4).

In some embodiments, the expanded-notification content includes (1014) one or more of an image (e.g., image 5058 in FIG. 5F4), an audio clip, a video clip, a custom view, and interactive content (e.g., interactive map 5114 in FIG. 5I4), that are not included in the first version of the notification.

In some embodiments, while displaying the second version of the notification, the device receives (1016) an information update relevant to the notification. In response to receiving the information update relevant to the notification, the device updates the second version of the notification (e.g., expanded notification 5078 in FIGS. 5F5 and 5F7 showing new messages 5086, 5088; expanded notification 5108 in FIGS. 5I5-5I7 showing live map and "Arrival" alert) to reflect the information update relevant to the notification. For example, suppose that the first application is an instant messaging app, and the notification is for a first instant message from a social network contact of the user. The first version of the notification includes a textual excerpt from the first instant message (or a textual summary of the first instant message) and the name and avatar of the social network contact. The second version of the notification includes a conversation log or a portion thereof that includes the first instant message (e.g., including the full content (e.g., text and an image) of the first instant message) and optionally, one or more earlier messages in the conversation between the user and the social network contact. While the second version of the notification is displayed, suppose that a new instant message is received from the social network contact. In response to receiving the new instant message from the social network contact, the device updates the second version of the notification to include the new instant message as part of the conversation log that is displayed in the second version of the notification. This is illustrated in FIGS. 5F1-5F7, for example. In some embodiments, when annotation of an earlier instant message is permitted in the instant messaging app, if the social network contact starts to annotate an image included in the first instant message while the user is viewing the image displayed within the second version of the notification, the image displayed within the second version of the notification is updated in real-time to show the annotations as they are entered by the social network contact of the user. In another example, suppose that the first application is a ridesharing or taxi service app, and the notification is generated in response to a driver's acceptance of a ride pickup request made earlier by the user. The first version of the notification includes text identifying the driver and notifying the user of the driver's acceptance of the pickup request. The second version of the notification includes a live map showing the current location of the driver. The current location of the driver is updated in real-time on the map included in the second version of the notification, while the second version of the notification is displayed on the user's device. This is illustrated in FIGS. 5I1-5I7, for example.

In some embodiments, the second version of the notification includes 1018 a content region and an action region, the content region includes the expanded content (e.g., the content region includes the first content and the additional content). For example, in some embodiments, the first version of the notification includes text of an instant message, and the second version of the notification includes a content region (e.g., a conversation log) that displays the instant message and one or more earlier messages in the same conversation, e.g., as shown in expanded notification 5078 in FIG. 5F4-5F7. In another example, the first version of the notification includes an alert for a new voicemail, and the second version of the notification includes a content region that includes an audio clip for the voicemail, and a textual transcription of the voicemail, and the action region includes one or more selectable options that, when activated, are configured to perform actions with respect to the notification. For example, in some embodiments, the action region is a menu that includes menu options to dismiss the notification, reply to a communication, save the communication, etc. This is illustrated in FIG. 5F6 (e.g., Reply affordance 5082), for example. In some embodiments, the action region includes an input field (e.g., a text input field for entering a reply message), a soft keyboard, one or more affordances for entering a selection (e.g., check boxes, radio buttons, etc.), controlling various aspects of a selected action (e.g., audio or video playback controls), etc. In some embodiments, the action region is scrollable (e.g., the menu options in expanded notification 5108 in FIGS. 5I5-5I6 are scrollable). In some embodiments, the action region is only visible upon detection of a scroll input (e.g., upward movement of the first contact) on the content region (e.g., as illustrated in FIGS. 5I4-5I5, menu options 5122 and 5124 become visible in response to a scroll input by contact 5120). In some embodiments, some of the menu options are visible and some of the menu options are outside of the viewable area of the display when the second version of the notification is initially displayed. A scroll input (e.g., an upward swipe gesture) can be used to scroll the action region to reveal the menu options that are outside of the view area of the display. In some embodiments, the action region and the content region of the notification are displayed in two separate layers, and when the action region is scrolled, the content region remains unchanged (e.g., the menu options scrolls up and down in a layer underneath the content region of the notification). In some embodiments, the second version of the notification includes a header region (e.g., the header region in a notification for an instant message or email includes an icon for the application (e.g., the Messages app, or the email app) (e.g., header 5080 in FIG. 5F4) and an avatar of the sender (e.g., avatar 5084 in FIG. 5F4)). In some embodiments, the content region of the notification and the action region of the notification are scrollable on a layer underneath the header region, while the header region remains unchanged (e.g., as shown in FIGS. 5I4-5I5, content 5112 is scrollable underneath header 5110 in expanded notification 5108). In some embodiments, options for performing application-specific actions are included in the second version of the notification (e.g., options 5122, 5124, 5128, 5130 in expanded notification 5108 in FIG. 5I8). For example, for an instant messaging app, the menu options displayed in a notification for a new instant message include an option for "reply" (e.g., Reply affordance 5082 in expanded notification 5078 in FIG. 5F4); for a telephony app, the menu options displayed in a notification for a missed call include an option for "call back"; and for a voicemail app (or the voicemail function in the telephony app), the menu option displayed in a notification for a voicemail include an option for "play voicemail" and/or an option for "delete".

In some embodiments, while displaying the second version of the notification, the device detects (1020) a second portion of the first input. In response to detecting the second portion of the first input: in accordance with a determination that the second portion of the first input meets option-activation criteria, the option-activation criteria configured to be met when the characteristic intensity of the first contact increases above the preview intensity threshold (e.g., the deep press intensity threshold) after the characteristic intensity of the first contact decreases below the preview intensity threshold (e.g., the first contact is maintained at the same location on the touch-sensitive surface after the first deep press input on the first version of the notification causes the display of the second version of the notification, and the first contact provides a second deep press on the second version of the notification), the device ceases to display the second version of the notification; and the device performs an action that corresponds to one of the one or more selectable options. This is illustrated in FIGS. 5F5-5F7 (e.g., by contact 5076 activating Reply affordance 5082). In some embodiments, the option-activation criteria are satisfied by a separate input (e.g., a second input with a second contact that is distinct from the first input with the first contact). In some embodiments, the threshold intensity used in the option-activation criteria is lower than the preview intensity threshold. In some embodiments, the option-activation criteria are met when the device detects a decrease in contact intensity followed by an increase in contact intensity above a second intensity threshold (e.g., a reduced deep press intensity threshold). It is to be noted that, in some embodiments, the option-activation criteria are met without requiring the location of the first contact to correspond to the option that is activated. In other words, the first contact may remain in the content region (e.g., in a portion of the content region that does not otherwise responds to a deep press input) when an option (e.g., a default option or the only option) in the action region is activated in response to the second deep press input provided by the first contact. In some embodiments, performing the action that corresponds to one of the one or more selectable options includes performing an action that corresponds to a default option among the one or more selectable options. If there is only one option, the action that corresponds to the option is performed. In some embodiments, the notification is for a communication, and the second version of the notification includes a "reply" option for replying to the communication. When a second press input is detected on the second version of the notification (e.g., while the first contact remains at its touch-down location on the touch-sensitive surface, and the characteristic intensity of the first contact increases above the preview intensity threshold for a second time after decreasing below the preview intensity threshold), the action for replying to the communication is activated, and a reply user interface is displayed in lieu of the second version of the notification (or the second version of the notification is further expanded to become the reply user interface including text input field and a soft keyboard). In some embodiments, a soft keyboard and a reply field (or an empty or partially prepared reply message) is automatically displayed in the reply user interface. In some embodiments, the notification is for a ride sharing request, and a first press input causes the notification to expand to display a live map and an "accept" button. A second press input accepts the ride sharing request and send the acceptance to the user that is offering the ride share.

In some embodiments, while displaying the second version of the notification, the device detects (1022) termination of the first input (e.g., detecting lift-off of the first contact). In response to detecting the termination of the first input, the device maintains display of the second version of the notification overlaid on the background user interface (e.g., expanded notification 5078 remains displayed after lift-off of contact 5076 in FIG. 5G1 following FIG. 5F4; expanded notification 5108 remains displayed after lift-off of contact 5106 in FIG. 5I5 following 5I4).

In some embodiments, while displaying the second version of the notification overlaid on the background user interface (e.g., the second version of the notification remains overlaid on the background user interface after liftoff of the first contact is detected), the device detects (1024) a second input that includes detecting a second contact on the touch-sensitive surface. In response to detecting the second input (e.g., the second input is a tap input): in accordance with a determination that the second contact is detected at a location on the touch-sensitive surface that corresponds to a portion of the background user interface surrounding the second version of the notification: the device ceases to display the second version of the notification; and the device maintains display of the background user interface (e.g., the background user interface includes the first version of the notification and respective first versions of one or more other notifications that have not been dismissed from the background user interface). In some embodiments, if the background user interface has been deemphasized (e.g., blurred or darkened) in response to the first input, the background user interface is restored to its original clarity and brightness when the second version of the notification ceases to be displayed. In some embodiments, after displaying the second version of the notification, the notification is considered read, and is removed from the background user interface when the background user interface is restored (e.g., only displaying the short versions of notifications that have not yet been viewed, if there is any). This is illustrated in FIGS. 5G1-5G3 (a tap input by contact 5096 dismisses notification 5078), for example. In some embodiments, the second version of the notification can also be dismissed by a tap input detected on a "dismiss" button or affordance (e.g., a button with a cross "x" on it) included in the second version of the notification.

In some embodiments, in response to detecting the second input (e.g., the second input is a tap input): in accordance with a determination that the second contact is detected at a location on the touch-sensitive surface that corresponds to a content region in the second version of the notification (e.g., the content region is distinct from the action region and the header region of the second version of the notification): the device ceases (1026) to display the second version of the notification; the device ceases to display the background user interface; and the device initiates a process to launch the first application (e.g., displaying a user interface of the first application, or displaying an authentication interface is authentication is required before the first application can be launched). This is illustrated in FIGS. 5H1-5H2, for example. In some embodiments, a tap input detected at a location on the touch-sensitive surface that corresponds to the first version of the notification also initiates the process to launch the first application, and replacement of the first version of the notification and the background user interface by the authentication interface or the user interface of the first application.

In some embodiments, in response to detecting the first portion of the first input: in accordance with a determination that the first input meets background-deemphasizing criteria, wherein the background-deemphasizing criteria require that the characteristic intensity of the first contact on the touch-sensitive surface meet a hint intensity threshold (e.g., a light press intensity threshold, or an intensity threshold that is lower than the preview intensity threshold) that is lower than the preview intensity threshold in order for the background-deemphasizing criteria to be met, the device applies (1028) a visual effect to deemphasize the background user interface (e.g., blur or darken the background user interface) before displaying the second version of the notification (e.g., as shown in FIGS. 5C3-5C4, background user interface 5026 is deemphasized before expanded notification 5066 is displayed in FIG. 5C5; as shown in FIGS. 5F2-5F3, background user interface 5036 is deemphasized before expanded notification 5078 is displayed in FIG. 5F4; and as shown in FIGS. 5I2-5I3, background user interface 5102 is deemphasized before expanded notification 5108 is displayed in FIG. 5I4;). In some embodiments, the second version of the notification is overlaid on a blurred version of the background user interface (e.g., as shown in FIGS. 5C5, 5F4, and 5I4). In some embodiments, the amount of blurring is dynamically varied in accordance with a current value of the characteristic intensity of the first contact in the first input (e.g., as shown in FIGS. 5C3-5C5, 5F2-5F3, and 5I2-5I4).

In some embodiments, in response to detecting the first portion of the first input: in accordance with a determination that the first portion of the first input includes a movement of the first contact that exceeds a movement threshold (e.g., the first contact moves away from its touchdown location by more than a threshold number of pixels (e.g., ten pixels)) (e.g., the movement is in any direction): the device restores (1030) the background user interface (e.g., restoring the clarity and brightness of the background user interface after the background user interface has been blurred and darkened in response to the characteristic intensity of the first contact increases above the hint intensity threshold) (e.g., in FIG. 5D6, user interface 5026 is restored when contact 5072 moves for more than a threshold amount); and the device forgoes displaying the second version of the notification when the first portion of the first input meets the notification-expansion criteria (e.g., the display of the second version of the notification is canceled when sufficient amount of movement had been detected when the characteristic intensity of the first contact exceeded the deep press intensity threshold, e.g., as shown in FIG. 5D6). The notification-expansion criteria are not met if the movement of the first contact exceeds the movement threshold, even though the criterion associated with the preview intensity threshold has been met. This is illustrated in FIGS. 5D4-5E4, for example.

In some embodiments, in response to detecting the first portion of the first input: in accordance with a determination that the first portion of the first input includes a movement of the first contact that exceeds a movement threshold (e.g., the first contact moves away from its touchdown location by more than a threshold number of pixels (e.g., ten pixels)) (e.g., the movement is in the vertical direction), the device scrolls (1032) the background user interface (and any notifications overlaid on the background user interface) in accordance with the movement of the first contact (e.g., if multiple notifications are displayed on the background user interface in a list, and the movement is in a vertical direction, the first input scrolls the list of notifications on the background user interface). The notification-expansion criteria are not met if the movement of the first contact exceeds the movement threshold, even though the criterion associated with the preview intensity threshold has been met. In some embodiments, the notification-scrolling criteria are met when the movement is in the vertical direction and exceeds the movement threshold. This is illustrated in FIGS. 5E1-5E4, for example.

In some embodiments, in response to detecting the first portion of the first input: in accordance with a determination that the first portion of the first input includes a movement of the first contact that exceeds a movement threshold (e.g., the first contact moves away from its touchdown location by more than a threshold number of pixels) (e.g., the movement is in the horizontal direction): the device slides (1034) the first version of the notification in accordance with the movement of the first contact; and (e.g., without sliding other notifications) the device displays one or more selectable actions adjacent to the first version of the notification (e.g., respective affordances for one or more quick response actions are displayed in the space that is vacated by the first version of the notification when the first version of the notification is moved horizontally in accordance with the movement of the first contact). In some embodiments, as the first version of the notification is moved horizontally, the respective affordances for the one or more quick response actions are revealed from behind the first version of the notification. The notification-expansion criteria are not met if the movement of the first contact exceeds the movement threshold, even though the criterion associated with the preview intensity threshold has been met. In some embodiments, option-revealing criteria are met when the movement is in the horizontal direction and exceeds the movement threshold. This is illustrated in FIGS. 5D4-5D8 (e.g., sliding notification 5028 to reveal option 5074 in accordance with movement of contact 5072), for example.

In some embodiments, prior to displaying the second version of the notification, in response to detecting an increase in the characteristic intensity of the first contact on the touch-sensitive surface, the device starts (1036) to adjust an appearance of the user interface dynamically based on the characteristic intensity of the first contact (e.g., to indicate that a preview operation will be performed if the intensity of the contact continues to increase), as shown by the blurring of the user interfaces in FIGS. 5C2-5C4, 5F2-5F4, and 5I2-5I4. In some embodiments, the content on the display other than the representation of the first version of the notification is obscured dynamically so that the magnitude of the obscuring changes based on the changes in the characteristic intensity of the contact. Examples of how the appearance of the user interface may be dynamically adjusted are described in U.S. patent application Ser. No. 14/869,899, filed on Sep. 29, 2015, titled "Devices, Methods, and Graphical User Interfaces for Manipulating User Interface Objects with Visual and/or Haptic Feedback", which is incorporated by reference herein in its entirety. After starting to dynamically adjust the appearance of the user interface based on the characteristic intensity of the first contact (and before displaying the second version of the notification), the device detects movement of the first contact on the touch-sensitive surface; and in some embodiments, the appearance of the user interface is dynamically adjusted based on the intensity of the contact to indicate that a preview operation will be performed if the characteristic intensity of the contact continues to increase. In response to detecting the movement of the first contact on the touch-sensitive surface: in accordance with a determination that the movement of the first contact meets preview-cancellation criteria (e.g., the movement exceeds a movement threshold (e.g., more than ten pixels)), the device moves the first version of the notification based on the movement of the first contact and the device ceases to dynamically adjust the appearance of the user interface based on the characteristic intensity of the first contact (e.g., moving the first version of the notification to the side and showing options for interacting with the first notification for a leftward swipe input, or scrolling a plurality of notifications including the first version of the notification for an upward or downward swipe input). In some embodiments, if the movement meets preview-cancellation criteria, the device ignores further changes in the characteristic intensity of the contact until the contact ceases to be detected on the display and forgoes displaying the second version of the notification (e.g., even if the contact would otherwise meet the notification-expansion criteria). In some embodiments, the preview cancellation criteria are based on one or more of a total distance moved by the contact, movement of the contact away from a point of at which the contact exceeded a hint intensity threshold that is lower than the preview intensity threshold, movement of the contact in an x direction (e.g., from a point of at which the contact exceeded the hint intensity threshold), movement of the contact in a y direction (e.g., from a point of at which the contact exceeded the hint intensity threshold). In accordance with a determination that the movement does not meet the preview-cancellation criteria, the device continues to dynamically adjust the appearance of the user interface based on the characteristic intensity of the first contact (e.g., without moving the first version of the notification based on the movement of the contact). In some embodiments, if the movement does not meet the preview-cancellation criteria, the device continues to respond to changes in the characteristic intensity of the contact (e.g., displaying the second version of the notification if the contact meets the notification-expansion criteria).

In some embodiments, prior to displaying the second version of the notification, in response to detecting an increase in the characteristic intensity of the first contact on the touch-sensitive surface, the device obscures (1038) (e.g., blurs and/or darkens) content on the display other than a representation of the first version of the notification (e.g., as shown by the blurring of the user interfaces in FIGS. 5C2-5C4, 5F2-5F4, and 5I2-5I4)). In some embodiments, the content on the display other than the representation of the first version of the notification is obscured dynamically so that the magnitude of the obscuring changes based on the changes in the characteristic intensity of the first contact. In some embodiments, the content on the display dynamic changes to the appearance of the first version of the notification is also applied. After obscuring the content on the display other than a representation of the first version of the notification in response to the increase in the characteristic intensity of the first contact (and before displaying the second version of the notification), the device detects movement of the first contact on the touch-sensitive surface. In response to detecting movement of the first contact on the touch-sensitive surface: in accordance with a determination that the movement of the first contact meets preview-cancellation criteria, the device ceases to obscure the content on the display other than a representation of the first version of the notification and moving the first version of the notification based on the movement of the first contact (e.g., moving the first version of the notification to the side and showing options for interacting with the first notification for a leftward swipe input, or scrolling a plurality of notifications including the first version of the notification for an upward or downward swipe input). In some embodiments, if the movement meets preview-cancellation criteria, the device ignores further changes in the characteristic intensity of the contact until the contact ceases to be detected on the display and forgoes displaying the second version of the notification (e.g., even if the contact would otherwise meet the notification-expansion criteria). In some embodiments, the preview cancellation criteria are based on one or more of a total distance moved by the contact, movement of the contact away from a point of at which the contact exceeded a hint intensity threshold that is lower than the preview intensity threshold, movement of the contact in an x direction (e.g., from a point of at which the contact exceeded the hint intensity threshold), movement of the contact in a y direction (e.g., from a point of at which the contact exceeded the hint intensity threshold). In accordance with a determination that the movement of the first contact does not meet the preview-cancellation criteria, the device continues to obscure content on the display other than a representation of the first version of the notification (e.g., dynamically obscuring the content in accordance with the characteristic intensity of the first contact) (e.g., without moving the first version of the notification based on the movement of the contact). In some embodiments, if the movement does not meet the preview-cancellation criteria, the device continues to respond to changes in the characteristic intensity of the contact (e.g., displaying the second version of the notification if the contact meets the notification-expansion criteria).

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface; a touch-sensitive surface unit 1104 configured to receive user contacts; one or more sensor units 1106 configured to detect intensity of contacts with the touch-sensitive surface unit 1104; and a processing unit 1110 coupled to the display unit 1102 the touch-sensitive surface unit 1104, and the one or more sensor units 1106. The processing unit 1110 including an enabling unit 1112, a detecting unit 1114, a receiving unit 1116, an updating unit 1118, a ceasing unit 1120, a performing unit 1122, a maintaining unit 1124, an initiating unit 1126, an applying unit 1128, a restoring unit 1130, a forgoing unit 1132, a scrolling unit 1134, a sliding unit 1136, a starting unit 1138, a moving unit 1140, a continuing unit 1142 and an obscuring unit 1144. The processing unit 1110 is configured to: concurrently enable display of (e.g., with enabling unit 1112), on the display unit 1102: a background user interface; and a first version of a notification associated with a first application, wherein: the first version of the notification has a first size, the first version of the notification includes first content, and the first version of the notification is overlaid on the background user interface. While displaying the first version of the notification associated with the first application overlaid on the background user interface, the processing unit 1110 is configured to detect (e.g., with detecting unit 1114) a first portion of a first input that includes detecting a first contact at a location on the touch-sensitive surface unit 1104 that corresponds to the first version of the notification. In response to detecting the first portion of the first input: in accordance with a determination that the first portion of the first input meets application-launching criteria, wherein the application-launching criteria do not require that a characteristic intensity of the first contact on the touch-sensitive surface meet a preview intensity threshold in order for the application-launching criteria to be met, the processing unit 1110 is configured to initiate a process to launch the first application, wherein launching the first application includes ceasing to display the background user interface and displaying a user interface associated with the first application. In accordance with a determination that the first portion of the first input meets notification-expansion criteria, wherein the notification-expansion criteria require that the characteristic intensity of the first contact on the touch-sensitive surface meet the preview intensity threshold in order for the notification-expansion criteria to be met, the processing unit 1110 is configured to enable display of (e.g., with enabling unit 1112) a second version of the notification, wherein: the second version of the notification has a second size larger than the first size, the second version of the notification includes expanded notification content that is not displayed in the first version of the notification, and the second version of the notification is overlaid on the background user interface.

FIGS. 12A-12F are flow diagrams illustrating a method 1200 of interacting with an application launching icon (e.g., launching an application or displaying a contextual content object associated with the application based on detected user input) in accordance with some embodiments. The method 1200 is performed at an electronic device (e.g., device 300, FIG. 3, or portable multifunction device 100, FIG. 1A) with a display, a touch-sensitive surface, and one or more sensors for detecting intensities of contacts on the touch-sensitive surface. In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

As described below, the method 1200 provides an intuitive way to access contextual content associated with an application without first launching the application. The method reduces the number, extent, and/or nature of the inputs from a user when accessing a subset of content and/or functions of the application, thereby creating a more efficient human-machine interface. For battery-operated electronic devices, enabling a user to access desired content and function faster and more efficiently conserves power and increases the time between battery charges. Furthermore, in some embodiments, the contextual content object is presented with menu of options that, when activated, trigger different sub-functions of the application. Thus, a single input with a single contact on the same application icon can be used to arrive at different levels of functionality and content of the corresponding application, further improving the efficiency of the user interface.

The device displays (1202), on the display, a user interface that includes a plurality of application icons that correspond to different applications in a plurality of applications (e.g., a desktop or home screen user interface generated by an operating system of the device that includes an array of application launch icons). In some embodiments, the application icons are displayed in an arrangement on the user interface (e.g., in a grid pattern, or in a row or column) (e.g., home screen 5202 in FIG. 5K1, home screen 5288 in 5N1).

The device, while displaying the user interface that includes the plurality of application icons, detects (1204) a first input that includes detecting a first contact on the touch-sensitive surface at a location on the touch-sensitive surface that corresponds to a first application icon of the plurality of application icons, the first application icon being associated with a first application of the plurality of applications (e.g., contact 5206 on icon 524 in FIG. 5K1, contact 5290 on icon 445 in FIG. 5N1).

The device, in response to detecting the first input (1206), performs a number of operations. In response to detecting the first input, in accordance with a determination that the first input meets application-launching criteria, wherein the application-launching criteria do not require that a characteristic intensity of the first contact on the touch-sensitive surface meet a first intensity threshold in order for the application-launching criteria to be met (e.g., a deep press intensity threshold) (e.g., in some embodiments, the application-launching criteria are met when the first input is a tap input): the device launches the first application, and the device replaces display of the user interface that includes the plurality of application icons with a user interface of the first application. This is illustrated in FIGS. 5J1-5J2 (e.g., a tap input by contact 5204 on icon 424 launches the Messages application), for example. In some embodiments, the application-launching criteria are met when the device detects a tap input with a duration that is below a threshold duration without regard to whether or not the characteristic intensity of the contact exceeded the first intensity threshold. In some embodiments, the application-launching criteria are met when the device detects liftoff of the contact without the characteristic intensity of the contact having reached the first intensity threshold since touchdown of the contact. In some embodiments, the application-launching criteria are met when the device detects liftoff of the contact without the characteristic intensity of the contact having exceeded the first intensity for at least a predetermined amount of time before liftoff of the contact was detected. In some embodiments, a combination of two or more of the heuristics described above is used to determine whether an input meets the application launching criteria.

In response to detecting the first input, in accordance with a determination that the first input meets menu-presentation criteria, wherein the menu-presentation criteria require that the characteristic intensity of the first contact on the touch-sensitive surface meet the first intensity threshold in order for the menu-presentation criteria to be met (e.g., in some embodiments, the menu-presentation criteria are met when the first input is a deep press), the device concurrently displays a contextual content object (e.g., a widget or interactive mini-application object that is associated with the first application, or a preview of the widget or mini-application object, or interactive and/or graphical representation of the widget or mini-application object) and a respective affordance that is associated with the contextual content object (e.g., an "add to widget view" button or link overlaid on the widget, mini-application object, or preview of the widget or mini-application object). This is illustrated in FIGS. 5K1-5K6 (e.g., contextual content object 5210 is displayed in response to a press input by contact 5206 on application icon 424 for the Messages application, and the contextual content object 5210 includes an "add widget" affordance 5222), for example. In some embodiments, the contextual content object (e.g., a widget or mini-application object) is displayed while maintaining display of a representation of at least a portion of the user interface that includes the plurality of application icons (e.g., the widget or mini-application object is overlaid on at least a portion of the user interface that includes the plurality of application icons (e.g., a blurred or darkened version of a home screen or desktop user interface)). In some embodiments, the contextual content object is displayed on top of and obscuring the application icon of the first application to which the contextual content object corresponds. In some embodiments, the display location of the contextual content object is adjusted so as to avoid obscuring the application icon of the first application. In some embodiments, the contextual content object includes contextually selected content that has been automatically selected from the first application (e.g., by the first application or by the electronic device) based on a current context of the electronic device (e.g., the contextual content object is a widget or mini-application object, or a preview of the widget or mini-application object with information and/or action affordances that are selected based on the current context (e.g., time, location, recently contacted users, recent activities within the app, etc.)). In some embodiments, the respective affordance, when activated, is configured to add the contextual content object (or a widget or mini-application object represented by the contextual content object) to a user interface that includes information for multiple applications (e.g., a contextual content object view that includes an array of contextual content objects associated with different applications of two or more of the plurality of applications).

In some embodiments, the user interface that includes information for multiple applications includes (1208) a contextual content object view (e.g., in the widget screen, a widget portion of a home screen or another screen, etc.) that is configured to concurrently display respective contextual content objects (e.g., widgets or mini-application objects) associated with different applications selected from the plurality of applications (e.g., the widget view hosts respective widgets with contextually selected content from any number of different applications, e.g., as shown in user interface 5238 in FIGS. 5L8, 5O1, 5P1).

In some embodiments, while displaying the contextual content object (e.g., overlaid on at least a portion of the user interface that includes the plurality of application icons (e.g., a blurred or darkened version of a home screen or desktop user interface)), the device detects (1210) a second input that includes detecting a second contact on the touch-sensitive surface at a location on the touch-sensitive surface that corresponds to the contextual content object (e.g., the second input can be detected after termination of the first input, and while the display of the contextual content object is maintained). In response to detecting the second input: in accordance with a determination that the second input meets the application-launching criteria, wherein the application-launching criteria do not require the characteristic intensity of the second contact to meet the first intensity threshold (e.g., before detecting lift-off of the second contact) in order for the application-launching criteria to be met (e.g., the application-launching criteria are satisfied when the second input is a tap input): the device launches the first application, and the device replaces display of the contextual content object (and the blurred user interface that includes the plurality of application icons) with a user interface of the first application. This is illustrated in FIGS. 5L9-5L10 (e.g., a tap input by contact 5272 on contextual content object 5268 launches the Messages application) and FIGS. 5M1-5M2 (e.g., a tap input by contact 5284 on contextual content object 5268 launches the Messages application), for example.

In some embodiments, replacing display of the contextual content object with a user interface of the first application includes (1212): in accordance with a determination that the second contact is detected at a first location on the touch-sensitive surface that corresponds to a first portion of the contextual content object, displaying a first user interface from the first application; and in accordance with a determination that the second contact is detected at a second location on the touch-sensitive surface that corresponds to a second portion of the contextual content object, displaying a second user interface from the first application that is distinct from the first user interface from the first application. This is illustrated in FIGS. 5L9-5M2, for example. For example, the people widget (e.g., a mini-application object associated with the Contacts application) includes a grid of frequently contacted people (e.g., a list of favorite social contacts of the user) that are represented by respective avatars/photos/monograms and respective names of those people. A tap input detected on one portion of the people widget (e.g., a tap input on an avatar/photo/monogram of a person in the grid) initiates a communication with a user (e.g., launching a messages user interface for composing a message to the selected user, e.g., as shown in FIGS. 5L9-5L10) and a tap input detected on another portion of the people widget (e.g., a tap input detected on a person's name) causes display of the contact card for the selected user, and a tap input detected on yet another portion of the people widget (e.g., a tap input detected on the header portion of the people widget) launches a user interface that lists the conversations in the Messages application (e.g., as shown in FIGS. 5M1-5M2).

In some embodiments, while displaying the contextual content object, the device displays (1214) representation (e.g., a blurred or darkened representation) of at least a portion of the user interface that includes the plurality of application icons (e.g., the contextual content object is overlaid on at least a portion of the user interface that includes the plurality of application icons (e.g., a blurred or darkened version of a home screen or desktop user interface, as shown in FIGS. 5K1 and 5N4).

In some embodiments, in response to detecting the first input: in accordance with the determination that the first input meets the menu-presentation criteria, the device displays (1216) one or more selectable options concurrently with the contextual content object, wherein the one or more selectable options, when activated, are configured to perform respective functions associated with the first application (e.g., the contextual content object is presented with a quick action menu associated with the first application). This is illustrated in FIGS. 5K4 (e.g., menu 5212 is presented with mini application object 5210), and FIGS. 5N4 (e.g., menu 5309 is presented with mini application object 5294) for example. In some embodiments, the quick action menu includes one or more menu options that, when activated, are configured to perform respective functions provided by the first application. In some embodiments, the contextual content object is presented in the same background container (e.g., a menu platter) as the menu options. In some embodiments, the contextual content object is presented in a separate display region from the quick action menu (e.g., the widget is presented above the quick action menu, and both are presented next to the first application icon and over the blurred home screen). In some embodiments, a haptic signal is provided when the menu-presentation criteria are met, and the menu of options are presented. In some embodiments, if an application does not have a corresponding contextual content object and selectable options, nothing is displayed when the menu-presentation criteria are met by a press input on an application icon corresponding to the application. In such a situation, the device provides a haptic signal to indicate the failure to present a contextual content object and menu options for the application.

In some embodiments, the device detects (1218) termination of the first input that includes detecting liftoff of the first contact. In response to detecting the termination of the first input, the device maintains concurrent display of the contextual content object and the one or more selectable options (e.g., overlaid on a blurred or darkened version of the home screen). While the concurrent display of the contextual content object and the one or more selectable options is maintained, the device detects a selection input that selects a first option of the one or more selectable options (e.g., a tap input on a first option of the selectable options in the quick action menu, or a press input by the same continuous contact on a first option of the selectable options in the quick action menu). In response to detecting the selection input, the device starts to perform a first function of the first application that corresponds to the selected first option (e.g., the first option is for sending a message to a first social contact of the user, and a tap input on the first option causes the first application to launch and the first application displays an initial user interface for composing a message to the first social contact of the user; or the first option is for showing a contact card of the user, a press input by the same continuous contact (e.g., contact 5209 in FIG. 5N5) displays the contact card of the user). In some embodiments, a selection input on the contextual content object launches the app to a first location (e.g., a selection input on the favorite people widget leads to the user interface that lists the users' favorite contacts), while a selection input on one of the menu items launches the app to a different location (e.g., a selection input on the "show my info" option leads to the user interface that displays the user's contact card).

In some embodiments, while concurrently displaying the contextual content object and the one or more selectable options, the device detects (1220) movement of the first contact to a location on the touch-sensitive surface that corresponds to a second option of the one or more selectable options. In response to detecting the movement of the first contact to the location on the touch-sensitive surface that corresponds to the second option of the one or more selectable options, in accordance with a determination that the first input meets selection criteria (e.g., the selection criteria requires that the first contact remains at the location that corresponds to the second option for more than a threshold amount of time, and/or requires that the characteristic intensity of the first contact meet a respective threshold intensity (e.g., a light press intensity threshold or a deep press intensity threshold) while the first contact remains at the location that corresponds to the second option, in order for the selection criteria to be met), the device starts to perform a second function of the first application that corresponds to the selected second option (e.g., suppose that the second option is for composing a new message to an unspecified recipient; and by sliding the first contact to the second option and maintaining the first contact on the second option until selection criteria are met by the first input, the user causes the first application to launch and the first application displays an initial user interface for composing a new message to a recipient that is yet to be specified by the user).

In some embodiments, the device provides (1222) a first haptic signal when the first contact moves past each selectable option of the one or more selectable options.

In some embodiments, the contextual content object is (1224) a first mini-application object that corresponds to the first application (e.g., a mini-application object is an interactive object that is associated with an application, and provides a subset of the content and/or functions of the application. In some embodiments, the mini-application object is referred to as a widget. In some embodiments, the mini-application object exists and functions without requiring the corresponding application to be running or active. In some embodiments, the mini-application object is operated by the operating system and is configured to retrieve content of the corresponding application without requiring the corresponding application to be running or active. In some embodiments, the contextual content object is a representation of a first mini-application object associated with the first application (e.g., the contextual information is a preview of a widget or mini-application object that is associated with the first application). For example, the preview includes substantially the same information and/or functions as the widget or mini-application itself, but not all the information and/or functions. In some embodiments, the preview also visually looks similar to the widget or mini-application object to which it corresponds, but is simplified to conform to the size and unified look and feel requirements of all contextual content objects on the home screen.

In some embodiments, while concurrently displaying the contextual content object and the respective affordance, the device detects (1226) an input activating the respective affordance (e.g., a tap input on the add-widget affordance). In response to detecting the input activating the respective affordance, the device adds the contextual content object (or a widget or mini-application object represented by the contextual content object, if the contextual content object is a preview or representation of the actual widget or mini-application object) to the user interface that includes information for multiple applications (e.g., the contextual content object view or widget view). This is illustrated in 5K5-5K6, for example. In some embodiments, the contextual content object view or widget view is a user interface that is configured to concurrently display respective contextual content objects (e.g., widgets or mini-application objects) associated with different applications selected from the plurality of applications. In some embodiments, the device displays an animation showing the contextual content object jumping from its original location to the widget screen (e.g., the screen showing a list of existing widgets that have already been added to the widget view previously by the user, and optionally, in addition to one or more default widgets already included in the widget view by the operating system). In some embodiments, the widget screen is presented briefly on the display (e.g., sliding in from the left to cover part of the home screen) to show that the widget has been added to the widget view in response to the user's input activating the add-widget affordance, and then the display is restored (e.g., the widget screen slides back to the left) to display the home screen again. In some embodiments, once the widget has been added to the widget view, the add-widget affordance is no longer displayed with the widget.

In some embodiments, in response to adding the contextual content object to the user interface that includes information for a plurality of applications (e.g., the contextual content object view or widget view), the device ceases (1228) to concurrently display the respective affordance with the contextual content object, e.g., as shown in FIG. 5K7 ("add widget" affordance is no longer displayed after it has been invoked). In some embodiments, once the contextual content object is added to the widget view, the add-widget affordance is replaced by an indicator that indicates the current inclusion of the contextual content object in the widget view (e.g., the "added" indicator 5244 in FIG. 5K7). In some embodiments, the indicator is displayed with the widget each time the widget is shown in response to subsequent inputs that meet the menu-presentation criteria. In some embodiments, the indicator is only displayed briefly immediately after the activation of the add-widget affordance and the addition of the contextual content object into the widget view. After the brief display of the indicator, the indicator is no longer displayed during subsequent times when the contextual content object is called up again in response to inputs that meet the menu-presentation criteria.

In some embodiments, after adding the contextual content object to the user interface that includes information for a plurality of applications (e.g., the contextual content object view or widget view), while displaying the user interface that includes the plurality of application icons, the device detects (1230) a navigation input (e.g., a swipe gesture in the horizontal direction (e.g., from left to right)) for navigating to the user interface that includes information for a plurality of applications (e.g., the contextual content object view or widget view). In response to detecting the navigation input, the device replaces display of the user interface that includes the plurality of application icons with the user interface that includes information for a plurality of applications (e.g., the contextual content object view or widget view), wherein the user interface that includes information for a plurality of applications (e.g., the contextual content object view or widget view) includes the contextual content object associated with the first application (and one or more additional contextual content objects that are associated with one or more other applications in the plurality of applications). This is illustrated in FIGS. 5L5-5L8, for example.

While displaying the user interface that includes information for a plurality of applications (e.g., the contextual content object view or widget view) including the contextual content object associated with the first application, the device detects a third input that includes detecting a third contact on the touch-sensitive surface at a location that corresponds to the contextual content object in the user interface that includes information for a plurality of applications (e.g., the contextual content object view or widget view). In response to detecting the third input: in accordance with a determination that the third input meets content expansion criteria, wherein the content expansion criteria require that a characteristic intensity of the third contact on the touch-sensitive surface meet the first intensity threshold (e.g., in some embodiments, the content expansion criteria are met when the third input is a deep press input), the device expands the contextual content object to display the contextually selected content (e.g., the stock widget includes stocks that the user has previously viewed, the weather widget includes the weather forecast for the city that the user is currently in, etc.) and additional content (e.g., additional rows of stocks in the stock widget, or additional weather forecasts in the weather widget, etc.). This is illustrated in FIGS. 5O1-5O2 (e.g., a deep press input by contact 5308 causes expansion of contextual content object 5240 into expanded contextual content object 5310), and FIGS. 5P1-5P2 (e.g., a deep press input by contact 5314 causes expansion of contextual content object 5240 into expanded contextual content object 5272), for example.

In some embodiments, expanding the contextual content object to display the contextually selected content and the additional content includes (1232): in accordance with a determination that the third contact is detected at a third location on the touch-sensitive surface that corresponds to a third portion of the contextual content object (e.g., the third portion of the contextual content object includes areas outside of a content item (e.g., a stock, an avatar, etc., a weather forecast)), displaying first additional content with the contextually selected content; and in accordance with a determination that the third contact is detected at a fourth location on the touch-sensitive surface that corresponds to a fourth portion of the contextual content object (e.g., the fourth portion of the contextual content object includes areas of a specific content item (e.g., a stock, an avatar, etc., a weather forecast)), displaying second additional content that is distinct from the first additional content. This is illustrated in FIGS. 5O1-5P2 (e.g., a deep press input by contact 5308 on a textual portion of contextual content object 5240 causes more details of the information represented in contextual content object 5240 to be displayed in expanded contextual content object 5310, while a deep press input by contact 5314 on a blank portion of contextual content object 5240 causes more information of the same type as the information represented in contextual content object 5240 to be displayed in expanded contextual content object 5272), for example. This is also illustrated in FIGS. 5K8-5L2 (e.g., a deep press input by contact 5248 on one portion of contextual content object 5210 causes display of one type of additional information, while a deep press input by contact 5260 causes display of another type of additional information).

In some embodiments, the contextual content object includes (1234) a first content item of a first content item type, and wherein the first additional content includes additional content items of the first content item type. This is illustrated in FIGS. 5K8-5K9 (e.g., more favorite people's avatars are displayed in response to press input by contact 5248), and FIGS. 5P1-5P2 (e.g., more events are displayed in response to press input by contact 5214), for example. For example, the stock widget includes two default stock items, and the expanded stock widget includes one or more additional stock items. In another example, the weather widget includes the current weather forecast for a first city, and the expanded weather widget includes the current weather forecasts for one or more additional cities (e.g., cities near the first city).

In some embodiments, the contextual content object includes (1236) a first content item, and wherein the second additional content includes additional information associated with the first content item. This is illustrated, for example, in FIGS. 5L1-5L2 (e.g., last message 5262 from Genevive is displayed in response to a press input by contact 5260 on Genevive's avatar), and FIGS. 5O1-5O2 (e.g., more event details are displayed in response to a press input by contact 5308 on the textual portion of Up Next object 5240). For example, the stock widget includes a first stock item and basic information (e.g., current price and change) associated with the first stock item, and the expanded stock widget includes additional information (e.g., highest price, lowest price, open price, market cap, yield, etc.) associated with the first stock items. In another example, the weather widget includes the current weather forecast for a first city, and the expanded weather widget includes the five day forecast for the first city, or the hour by hour forecast for the first city.

In some embodiments, the device detects (1238) termination of the third input that includes detecting liftoff of the third contact. In response to detecting the termination of the third input, the device maintains display of the contextually selected content and the additional content (e.g., as shown in FIGS. 5K8-5K10).

In some embodiments, the device detects (1240) termination of the third input that includes detecting liftoff of the third contact. In response to detecting the termination of the third input: the device maintains display of the contextually selected content, and the device ceases to display the additional content (e.g., as shown in FIG. 5L1-5L3, additional content 5262 is no longer displayed after termination of the press input by contact 5260).

In some embodiments, the contextual content object includes (1242) a first interactive object (e.g., an interactive control for a light bulb or a thermostat) from the first application (e.g., a home control application). In some embodiments, activating the first interactive object causes a change in functionality controlled by the application (e.g., turning on/off an appliance). In some embodiments, the contextual content object includes a plurality of interactive objects.

In some embodiments, the contextual content object includes (1244) representations of one or more social contacts associated with a user of the device (e.g., avatars/photos/monograms and names/aliases of the users' favorite contacts arranged in a grid (e.g., a two by four grid)), e.g., avatars 5224, 5226, 5228, 5230, 5252, 5254, 5256, 5258 in FIG. 5K9. In some embodiments, the representations of users include graphical indications of recent communications received from the users (e.g., a badge associated with a contact that represents the number of new/unread/unviewed communications received from the contact, e.g., badges 5232, 5234, 5246 in FIG. 5K8).

In some embodiments, in response to detecting the first input, in accordance with the determination that the first input meets the menu-presentation criteria, the device provides (1246) a second haptic signal when displaying the contextual content object.

In some embodiments, displaying the contextual content object includes (1248) displaying the contextual content object at a location on the display that corresponds to the location of the first contact on the touch-sensitive surface (e.g., the contextual content object is overlaid on a portion of the user interface that previously displayed the first application icon). In some embodiments, the first application icon is not obscured by the contextual content object. In such embodiments, the contextual content object and the quick action menu are positioned on the display to keep the first application icon unobscured (while other portions of the user interface are blurred or darkened).

In some embodiments, displaying the contextual content object includes (1250) maintaining display of the first application icon at its original location and displaying the contextual content object in proximity to the first application icon (e.g., the contextual content object is displayed between the first application icon and the quick action menu (e.g., the one or more selectable options)). In such embodiments, the contextual content object and the quick action menu are positioned on the display to keep the first application icon unobscured (while other portions of the user interface are blurred or darkened), e.g., as shown in FIGS. 5K4 and 5N4.

In some embodiments, displaying the contextual content object includes (1252) maintaining display of the first application icon at a location offset from its original location and displaying the contextual content object in proximity to the first application icon (e.g., the contextual content object is displayed between the first application icon and the quick action menu (e.g., the one or more selectable options)). In such embodiments, the contextual content object and the quick action menu are positioned on the display to keep the first application icon unobscured (while other portions of the user interface are blurred or darkened). The first application icon is slightly offset from its original location (e.g., moved up or down) by a small amount to accommodate the contextual content object and the one or more selectable options on the display, e.g., as shown in FIG. 5N4.

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, a touch-sensitive surface unit 1304 configured to receive contacts, one or more sensor units 1306 configured to detect intensity of contacts with the touch-sensitive surface unit 1304, and a processing unit 1310 coupled with the display unit 1302, the touch-sensitive surface unit 1304 and the one or more sensor units 1306. In some embodiments, the processing unit 1308 includes: an enabling unit 1310, a detecting unit 1312, a launching unit 1314, a replacing unit 1316, a starting unit 1318, a providing unit 1320, an adding unit 1322, a ceasing unit 1324, an expanding unit 1326, and a maintaining unit 1328.

The processing unit 1308 is configured to enable display of (e.g., with enabling unit 1310), on the display unit, a user interface that includes a plurality of application icons that correspond to different applications in a plurality of applications. While displaying the user interface that includes the plurality of application icons, the processing unit 1308 is configured to detect (e.g., with detecting unit 1312) a first input that includes detecting a first contact on the touch-sensitive surface unit at a location on the touch-sensitive surface unit that corresponds to a first application icon of the plurality of application icons, the first application icon being associated with a first application of the plurality of applications. In response to detecting the first input: in accordance with a determination that the first input meets application-launching criteria, wherein the application-launching criteria do not require that a characteristic intensity of the first contact on the touch-sensitive surface meet a first intensity threshold in order for the application-launching criteria to be met: the processing unit 1308 is configured to launch (e.g., with launching unit 1314) the first application; and replace (e.g., with replacing unit 1316) display of the user interface that includes the plurality of application icons with a user interface of the first application.

In accordance with a determination that the first input meets menu-presentation criteria, wherein the menu-presentation criteria require that the characteristic intensity of the first contact on the touch-sensitive surface meet the first intensity threshold in order for the menu-presentation criteria to be met, the processing unit 1308 is configured to concurrently enable display of (e.g., with enabling unit 1310) a contextual content object and a respective affordance that is associated with the contextual content object, wherein: the contextual content object includes contextually selected content that has been automatically selected from the first application based on a current context of the electronic device; and the respective affordance, when activated, is configured to add the contextual content object to a user interface that includes information for multiple applications.

FIGS. 14A-14C are flow diagrams illustrating a method 1400 for interacting with a menu of applications including an application that is in the process of being downloaded (e.g., presenting menu options with respect to downloading the application based on the user input) in accordance with some embodiments. The method 1400 is performed at an electronic device (e.g., device 300, FIG. 3, or portable multifunction device 100, FIG. 1A) with a display, a touch-sensitive surface, and one or more sensors for detecting intensities of contacts on the touch-sensitive surface. In some embodiments, the display is a touch-screen display and the touch-sensitive surface is on or integrated with the display. In some embodiments, the display is separate from the touch-sensitive surface. Some operations in method 1400 are, optionally, combined and/or the order of some operations is, optionally, changed.

As described below, in some embodiments, an input by a single contact can be used to toggle between pausing download and resume download, or to present a menu with multiple download related options and select one of the multiple options, depending on the intensity, duration, and/or movement of the contact. This allows the user to activate the desired function related to downloading applications with fewer steps, and thus improving the efficiency of the user interface while avoiding over-cluttering the user interface.

At an electronic device with a display, a touch-sensitive surface, and one or more sensors for detecting intensities of contacts on the touch-sensitive surface, the device displays (1402), on the display, a user interface that includes a plurality of user interface objects (e.g., application icons and, optionally, placeholder icons that represent downloading apps) that correspond to different applications in a plurality of applications (e.g., the user interface is a home screen or an application springboard that includes application icons and optionally placeholder icons that represent applications that have not been completely downloaded), wherein the plurality of user interface objects include a first user interface object (e.g., a first application icon, or a first placeholder icon that temporarily represent an application while it is being downloaded) that corresponds a first application that is in a process of being downloaded (e.g., downloading icons 5408, 5410 in user interface 5402, FIG. 5S1). In some embodiments, the first application is in the process of being downloaded when the first application is waiting in a queue to start download. In some embodiments, the first application is in the process of being downloaded when the first application has already started to download, but the downloading has been paused before completion. In some embodiments, the first application is in the process of being downloaded when the first application is currently being downloaded (e.g., data transfer is in progress). In some embodiments, the first application is in the process of being downloaded when the first application is in any of the above mentioned states. In some embodiments, when the first application is in the process of being downloaded, the first application icon or first placeholder icon takes on an appearance that indicates the current state of the first application. For example, when the first application is waiting in a queue to start download, the caption text in the application name portion of the first application icon or the first placeholder icon is changed to "waiting . . . ", and the first application icon or placeholder icon is darkened or grayed out. In some embodiments, when the downloading of the first application is in progress, an overlay (e.g., a circular progress indicator) on the first application icon or placeholder icon is continuously updated to show the current progress of the download. When the downloading of the first application is paused, an overlay (e.g., a circular progress indicator) on the first application icon or placeholder icon displays the amount of download that has been completed, and the caption text of the first application icon or placeholder indicates that the downloading of the first application has been paused. In some embodiments, if a placeholder icon is used to represent an application that is in the process of being downloaded, when downloading of the application is completed, the placeholder icon is replaced by the application icon that corresponds to the application.

While displaying the user interface that includes the plurality of user interface objects, the device detects (1404) a first input that includes detecting a first contact at a location on the touch-sensitive surface that corresponds to the first user interface object (e.g., the first application icon or the first placeholder icon) (e.g., contact 5412 on downloading icon 5408, contact 5432 on downloading icon 5410, contact 5478 on downloading icon 5408, contact 5480 on downloading icon 5410).

In response to detecting the first input: in accordance with a determination that the first user interface object corresponds to an application that has not been fully downloaded and that the first input meets menu-presentation criteria, wherein the menu-presentation criteria require that a characteristic intensity of a contact in a detected input meet a first intensity threshold in order for the menu-presentation criteria to be met, the device displays (1406) one or more (in some embodiments, a plurality of) first selectable options that, when activated, are configured to perform actions with respect to downloading of the first application. For clarity, the menu-presentation criteria include a criterion that is met when a characteristic intensity of a respective contact in a respective input exceeds a first intensity threshold. For clarity, the menu-presentation criteria require that a characteristic intensity of a respective contact in a respective input meet a first intensity threshold in order for the menu-presentation criteria to be met. For example, the one or more menu-presentation criteria require that a characteristic intensity of a first contact in a first input meet the first intensity threshold in order for the menu-presentation criteria to be met; the menu-presentation criteria require that a characteristic intensity of a second contact in a second input, distinct from the first input, meet the first intensity threshold in order for the menu-presentation criteria to be met; and so on. In some embodiments, the selectable options for a downloading application are the same for different applications while they are being downloaded, even if those applications have different selectable options once they have completed downloading. This is illustrated in FIGS. 5Q1-5Q5, and 5Q9-5Q13, for example.

In some embodiments, in response to detecting the first input: in accordance with a determination that the first user interface object corresponds to an application that has been installed on the device and that the first input meets the menu-presentation criteria, the device displays (1408) one or more (in some embodiments, a plurality of) second selectable options that, when activated, are configured to perform application-specific actions (e.g., launch the application to a non-default portion of the application, create a new document or communication, initiate a function of the application, or initiate a function of the device that is controlled by the application). This is illustrated in FIGS. 5Q14-5Q16, and 5R1-5R4, for example. In some embodiments, the menu for both the downloading app and the installed app display with a same animation (e.g., with a surface of the menu sliding out from behind the user interface object and displaying above or below the user interface object).

In some embodiments, in response to detecting the first input: in accordance with a determination that the first user interface object corresponds to an application that has not been fully downloaded and that the first input meets action-performing criteria, wherein the action-performing criteria do not require that a characteristic intensity of a contact (e.g., the first contact) in the detected input (e.g., the first input) on the touch-sensitive surface meet the first intensity threshold in order for the action-performing criteria to be met (e.g., in some embodiments, the action-performing criteria are met when the detected first input is a tap input), the device performs (1410) a first action with respect to the downloading of the first application (e.g., pausing the downloading of the first application if the downloading of the first application is already in progress, resuming the downloading of the first application if the downloading of the first application is in a suspended or paused state, and/or starting the downloading of the first application (e.g., prioritizing the downloading of the first application ahead of one or more other applications that are in processes of being downloaded) if the first application is in a waiting state in a queue). This is illustrated in FIGS. 5S1-5S5, for example.

In some embodiments, in response to detecting the first input: in accordance with a determination that the first user interface object corresponds to an application that has been installed on the device and that first input meets action-performing criteria, wherein the action-performing criteria do not require that a characteristic intensity of a contact (e.g., the first contact) in the detected input (e.g., the first input) meet the first intensity threshold in order for the action-performing criteria to be met (e.g., in some embodiments, the action-performing criteria are met when the detected first input is a tap input), the device launches (1412) the first application (e.g., replaces display of the home screen with a default user interface of the first application). This is illustrated in FIGS. 5R6-5R7, for example.

In some embodiments, the one or more first selectable options include (1414) an option that, when activated, is configured to prioritize the downloading of the first application versus one or more other applications that are in processes of being downloaded (e.g., so that the first application is downloaded before the one or more other applications) (e.g., option 5418 in FIG. 5Q5).

In some embodiments, the one or more first selectable options include (1416) an option that, when activated, is configured to pause the downloading of the first application (e.g., so that the device stops downloading the first application) (e.g., option 5420 in FIG. 5Q5).

In some embodiments, the one or more first selectable options include (1418) an option that, when activated, is configured to cancel the downloading of the first application (e.g., so that the device stops downloading the first application, removes the first user interface object from the display and, optionally, deletes any downloaded data for the first application) (e.g., option 5422 in FIG. 5Q5).

In some embodiments, the one or more first selectable options include (1420) an option that, when activated, is configured to resume the downloading of the first application (e.g., option 5438 in FIG. 5Q11). In some embodiments, the option for resuming downloading is displayed only when the downloading of the first application is currently in a paused or suspended state. When the downloading is not in a paused or suspended state, the option for resuming downloading is replaced with an option for pausing the downloading of the first application.

In some embodiments, in accordance with the determination that the first input meets the menu-presentation criteria, the device displays (1422) a second selectable option that, when activated, is configured to display a menu of sharing options for sharing the first application (e.g., option 5424 in FIG. 5Q5). In some embodiments, when an input selecting the option for sharing the first application is detected, a menu of sharing options is presented on or overlaid on the user interface. The menu includes options for, e.g., sharing the first application (e.g., a link to the first application in an app store) via an instant message, an email, one or more social networking applications, and/or one or more wireless connections (e.g., WiFi, Bluetooth connections), and/or copying information (e.g., a link or address of the first application in an app store) associated with the first application. In some embodiments, the share option is also displayed in the menu that is displayed in response to an input that meets the menu-presentation criteria, after the application has been downloaded and installed (e.g., share card 5428 in FIG. 5Q8).

In some embodiments, the device dynamically blurs (1424) the user interface in accordance with a current intensity of the first contact, wherein displaying one or more first selectable options for performing actions with respect to downloading of the first application includes displaying a menu that includes the one or more first selectable options over a blurred version of the user interface. In some embodiments, the menu is displayed over a blurred version of the user interface that is of the same dimensions and scales as the user interface before the blurring. In other words, the menu "pops up" from the first application icon, and is overlaid on top of the blurred user interface. This is illustrated in FIG. 5Q6. In some embodiments, the first application icon is not blurred with the rest of the user interface, the menu occupies less than the full width of the user interface, and the menu is positioned so as not to obscure the first application icon, e.g., as shown in FIG. 5Q6. In some embodiments, the first application icon is blurred with the rest of the user interface, the menu occupies substantially the full width of the user interface, and the menu is positioned without regard to whether it obscure the blurred first application icon, e.g., as shown in FIG. 5Q17.

In some embodiments, the plurality of user interface objects include a second user interface object that corresponds a second application that is in a process of being downloaded; and wherein while displaying the user interface that includes the plurality of user interface objects and before the downloading of the second application is completed, the device detects (1426) a second input that includes detecting a second contact at a location on the touch-sensitive surface that corresponds to the second user interface object. In response to detecting the second input: in accordance with a determination that the second input meets the menu-presentation criteria, the device displays the one or more first selectable options. In some embodiments, the plurality of user interface objects includes multiple application icons (or placeholder icons) that each correspond to a respective application that is in a process of being downloaded; and when a respective input meeting the menu-presentation criteria is detected on each of the multiple application icons (or placeholder icons) (at different time, rather than simultaneously), the device displays an identical menu that includes the one or more first selectable options. This is illustrated in FIGS. 5Q6 and 5Q12 (menu 5416 and menu 5434 have the same set of options (pause and resume download is a toggled option that have two different states that are displayed depending on the current state of the downloading) across the downloading icons for different applications).

In some embodiments, while displaying the user interface that includes the plurality of user interface objects and after the downloading of the first application is completed, the device detects (1428) a third input that includes detecting a third contact at a location on the touch-sensitive surface that corresponds to the first user interface object (e.g., the location of the first application icon). In response to detecting the third input: in accordance with a determination that the third input meets the menu-presentation criteria, the device displays one or more third selectable options that, when activated, are configured to perform application-specific actions associated with the first application. This is illustrated in FIGS. 5Q14-5Q17 (e.g., menu 5450) and 5R1-5R4 (menu 5462), for example.

In some embodiments, in response to detecting the third input: in accordance with a determination that the third input meets application-launching criteria, wherein the application-launching criteria do not require that a characteristic intensity of a contact (e.g., the third contact) in a detected input (e.g., the third input) meet the first intensity threshold in order for the application-launching criteria to be met (e.g., in some embodiments, the application launching criteria are met when the detected third input is a tap input), the device launches (1430) the first application; and, the device replaces the user interface that includes the plurality of user interface objects with a user interface of the first application (e.g., as shown in FIGS. 5R6-5R7). In some embodiments, the application-launching criteria and the action-performing criteria are the same criteria, and the application-launching criteria are used when the application download has been completed, and the action-performing criteria are used when the application download is not yet completed. In some embodiments, in response to detecting a long press can (e.g., a touch input that moves by less than a threshold amount for more than a threshold amount of time), the user interface objects enter a reconfiguration mode in which movements on the touch-sensitive surface at locations that correspond to the user interface objects cause the user interface objects (e.g., application icons for installed applications and representations of downloading applications (e.g., placeholder icons)) can be moved around the user interface (e.g., the application launch user interface, the home screen, etc.).

FIG. 15 is a functional block diagram of an electronic device for presenting menu options with respect to downloading an application based on the user input, in accordance with some embodiments.

In accordance with some embodiments, FIG. 15 shows a functional block diagram of an electronic device 1500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 includes a display unit 1502 configured to display a user interface; a touch-sensitive surface unit 1504 configured to receive user contacts; one or more sensor units 1506 configured to detect intensity of contacts with the touch-sensitive surface unit 1504; and a processing unit 1510 coupled to the display unit 1502 the touch-sensitive surface unit 1504, and the one or more sensor units 1506. The processing unit 1510 including an enabling unit 1512, detecting unit 1514, performing unit 1516, launching unit 1518, blurring unit 1520 and replacing unit 1522.

The processing unit 1510 is configured to enable display of (e.g., with enabling unit 1512), on the display, a user interface that includes a plurality of user interface objects that correspond to different applications in a plurality of applications, wherein the plurality of user interface objects include a first user interface object that corresponds a first application that is in a process of being downloaded.

While displaying the user interface that includes the plurality of user interface objects, the processing unit 1510 is configured to detect (e.g., with detecting unit 1514) a first input that includes detecting a first contact at a location on the touch-sensitive surface that corresponds to the first user interface object.

In response to detecting the first input: in accordance with a determination that the first user interface object corresponds to an application that has not been fully downloaded and that the first input meets menu-presentation criteria, wherein the menu-presentation criteria require that a characteristic intensity of a contact in a detected input meet a first intensity threshold in order for the menu-presentation criteria to be met, the processing unit 1510 is configured to enable display of (e.g., with enabling unit 1512) one or more first selectable options that, when activated, are configured to perform actions with respect to downloading of the first application.

FIGS. 16A-16C are flow diagrams illustrating a method 1600 for interacting with a menu of applications that include a folder of applications (e.g., presenting options corresponding to launching an application based on the user input) in accordance with some embodiments. The method 1600 is performed at an electronic device (e.g., device 300, FIG. 3, or portable multifunction device 100, FIG. 1A) with a display, a touch-sensitive surface, and one or more sensors for detecting intensities of contacts on the touch-sensitive surface. In some embodiments, the display is a touch-screen display and the touch-sensitive surface is on or integrated with the display. In some embodiments, the display is separate from the touch-sensitive surface. Some operations in method 1600 are, optionally, combined and/or the order of some operations is, optionally, changed.

As described below, in some embodiments, when a press input is detected on a folder icon, a menu of selected application launching icons are displayed, where the selected application launching icons correspond to applications that have unread notifications, thus the user can quickly select a desired application to access its functions. Each time the menu is displayed, it may display different application icons selected from the folder, depending on which applications have the most recent or more urgent notifications. The method 1600 reduces the number, extent, and/or nature of the inputs from a user when accessing applications within a folder, thereby conserving power and increasing the time between battery charges.

As described below, in some embodiments, when a press input is detected on a folder icon, a menu is displayed to shown an option to rename a folder. The option provides access to multiple folder reconfiguration functions (e.g., icon reconfiguration and folder renaming) with fewer inputs, thereby creating a more efficient human-machine interface. For battery-operated electronic devices, enabling a user to access desired functions faster and more efficiently conserves power and increases the time between battery charges.

As described below, the method 1600 reduces the number, extent, and/or nature of the inputs from a user when accessing folder reconfiguration functions (e.g., icon reconfiguration and folder renaming), thereby creating a more efficient human-machine interface. For battery-operated electronic devices, enabling a user to access desired content and function faster and more efficiently conserves power and increases the time between battery charges.

At an electronic device with a display, a touch-sensitive surface, and one or more sensors for detecting intensities of contacts on the touch-sensitive surface, the device displays (1602) a user interface (e.g., a home screen, or an application springboard, etc.) on the display, wherein: the user interface includes a folder icon (e.g., as one of a grid of multiple icons, including application icons and/or other folder icons, on a home screen, an application springboard, or a quick access bar) that corresponds to an application folder containing a plurality of application icons (e.g., an "EXTRAS" folder icon that corresponds to an application folder that contains respective application icons for several accessory apps), the plurality of application icons correspond to different applications in a plurality of applications, and the plurality of applications include one or more applications that have one or more unread notifications For example, suppose that, at the time the folder icon is displayed, the application folder includes three application icons that correspond to three different applications, respectively; and two of the three applications each have at least one unread notifications (e.g., one app has twenty unread notifications, and the other app has five unread notifications) and the third application does not have any unread notifications at the present time. In some embodiments, unread notifications correspond to incoming communications that have not been reviewed by the user. In some embodiments, unread notifications correspond to events that have occurred within applications (e.g., applications ready for update, new media ready for download, etc.) but the user has not yet responded to. In some embodiments, unread notifications correspond to alerts that have been generated by applications (e.g., a reminder for a calendar event, an alert for a failure to complete a task (e.g., failure to send a communication, failure to connect to a server, etc.), a request for user input to complete a task (e.g., a request for consent for downloading an application update, making a wireless connection, activating location services, etc.), etc.). FIG. 5T1 illustrates a folder icon 5504 that include multiple applications, some of which have unread notifications (e.g., as indicated by badge 5506 that shows the total number of unread notifications for applications in the folder).

While displaying the user interface that includes the folder icon, the device detects (1604) a first input that includes detecting a first contact at a location on the touch-sensitive surface that corresponds to the folder icon (e.g., contact 5508 on folder icon 5504 in FIG. 5T2).

In response to detecting the first input: in accordance with a determination that the first input meets menu-presentation criteria, wherein the menu-presentation criteria require that a characteristic intensity of a contact (e.g., the first contact) in a detected input (e.g., the first input) meet a first intensity threshold (e.g., a deep press intensity threshold) in order for the menu-presentation criteria to be met, the device displays (1606) one or more selectable options (e.g., a respective menu option in a quick action menu for each of the one or more applications with unread notifications) that, when activated, are configured to launch corresponding applications from the plurality of applications in the application folder that have unread notifications. This is illustrated in FIGS. 5T1-5T5 (e.g., menu 5512 includes three options for launching three applications that have unread notifications, in FIG. 5T5; and menu 5528 include four options for launching four applications that have unread notifications), for example. For example, when two of the three applications each have at least one unread notifications and the remaining one application does not have any unread notifications at the present time, respective menu options for launching the two applications are displayed in the quick action menu, and no menu option is displayed for launching the remaining application that does not currently have any unread notifications. If at a later time, a notification arrives and the remaining application now also has at least one unread notification, when the quick action menu is presented again (e.g., in response to another deep press input on the folder icon), a menu option for launching that remaining application is also presented (e.g., option 5530 is displayed in menu 5528 in FIG. 5T12, but not in menu 5512 in FIG. 5T5). If at a later time, all of the notifications associated with one of the applications are flagged as read or are dismissed, when the quick action menu is presented again (e.g., in response to another deep press input on the folder icon), the menu option for launching that application which no longer has any unread notification is no longer displayed, while the menu options for launching the other two applications that still have unread notifications are displayed in the quick action menu.). In some embodiments, applications are considered to be "in a folder" if icons corresponding to those applications are displayed within the folder.

In some embodiments, the plurality of applications in the application folder include (1608) a first application with one or more unread notifications and a second application with one or more unread notifications; and the one or more selectable options include a first selectable option for launching the first application and a second selectable option for launching the second application. In some embodiments, the respective options for launching the one or more applications with unread notifications each include a respective application icon for a corresponding application, a name of the corresponding application, and an indicator of the type and count of the unread notifications for the corresponding application (e.g., as shown in FIGS. 5T5 and 5T12, respectively).

In some embodiments, the one or more selectable options are (1610) displayed within a menu that is limited to containing no more than a predetermined number of selectable options for launching applications (e.g., limited to four menu options, as shown in FIG. 5T12, four application launching options are displayed when five applications in the folder have unread notifications). Displaying one or more selectable options includes: in accordance with a determination that a first number of applications that correspond to application icons in the folder, less than (or equal to) the predetermined number, have unread notifications (e.g., three (i.e., less than four) applications have unread notifications), the device displays the first number of selectable options corresponding to the first number of applications in the menu (e.g., displaying three selectable options, each option for launching a corresponding one of the three applications that have unread notifications, as shown in FIG. 5T5). In accordance with a determination that a second number of applications that correspond to application icons in the folder, greater than the predetermined number, have unread notifications (e.g., five (i.e., greater than four) applications have unread notifications), the device displays, in the menu, the predetermined number of selectable options corresponding to less than all of the second number of applications (e.g., displaying four selectable options, each option for launching a corresponding one of four out of the five applications that have unread notifications, e.g., as shown in FIG. 5T12).

In some embodiments, displaying, in the menu, the predetermined number of selectable options corresponding to less than all of the second number of applications includes (1612) selecting applications to represent with selectable options in the menu so that applications with more recently received notifications are prioritized over applications with less recently received notifications (e.g., excluding the display of a selectable option for an application for which the most recently received notification was received later than the notifications of the other applications that are represented by application icons in the folder).

In some embodiments, displaying the one or more selectable options includes (1614): when ordering the one or more selectable options for display, prioritizing the selectable options for applications with a first type of unread notifications (e.g., applications with alerts) over the selectable options for applications with a second type of unread notifications (e.g., applications with regular notifications). For example, in some embodiments, when ordering the selectable options in the menu, the options for launching applications with unread alerts are listed before the options for launching applications with unread notifications that are not alerts, e.g., as shown in FIG. 5T12, option 5530 is listed before other options in menu 5528. If the number of applications with alerts is greater than the predetermined number of options set for the menu, then none of the options for launching those applications without any alerts is displayed in the menu.

In some embodiments, displaying the one or more selectable options includes (1616): when ordering the one or more selectable options for display, prioritizing an application with a greater number of unread notifications over an application with a smaller number of unread notifications (e.g., as shown in FIG. 5T5). For example, in some embodiments, when ordering the selectable options in the menu, within a group of applications with the same type of unread notifications (e.g., alerts or non-alert notifications), the options are sorted based on the count of unread notifications for each of the applications in the group. For example, the option for launching an application with three alerts is listed before the option for launching an application with one alert, and after the options for applications with alerts are all listed, the option for launching an application with five notifications is listed before the option for launching an application with three notifications. In some embodiments, after the options are sorted based on notification type and notification count, the options are optionally sorted alphabetically or based on the receipt time of the last notification for each application.

In some embodiments, the device displays (1618), concurrently with the application folder, an indicator (e.g., a badge) specifying an aggregated number of unread notifications for the one or more applications in the application folder with unread notifications. This is illustrated in FIG. 5T5 (e.g., badge 5506 shows that the total number of unread notifications for the applications in folder 5504 is nine), for example. For example, if, at the time the folder icon is displayed, the application folder includes three application icons that correspond to three different applications, respectively; and two of the three applications each have at least one unread notifications (e.g., one app has twenty unread notifications, and the other has five unread notifications) and the remaining one application does not have any unread notifications at the present time), the badge on the folder icon shows "twenty five" which is the sum of twenty and five. In some embodiments, if, while the application folder is displayed, a new notification arrives for one of the three applications (e.g., one of the two applications now has six unread notifications, or the remaining one application now has one unread notification), the badge is automatically updated in real time to show the number "twenty six".

In some embodiments, displaying the one or more selectable options includes (1620) concurrently displaying: a first selectable option for a first application in the application folder along with an indication of a number of unread notifications for the first application; and a second selectable option for a second application in the application folder along with an indication of a number of unread notifications for the second application. In other words, the device displays, concurrently with the respective selectable options for launching corresponding applications with unread notifications, respective counts of the unread notifications for the corresponding applications. For example, the respective selectable option for launching one of the two applications, e.g., the "Mail" app, includes the Mail app icon, the name of the Mail app, and text specifying that there are twenty unread notifications for the Mail app; and similarly, the respective selectable option for launching the other one of the two applications, e.g., the "Messages" app, includes the Messages app icon, the name of the Messages app, and text specifying that there are five unread notifications for the Messages app. For example, FIG. 5T5 shows that each option (e.g., options 5514, 5516, 5518) displays the number of unread notifications (e.g., 5, 3, and 1) for the application represented in the option.

In some embodiments, while displaying the first selectable option for the first application and the second selectable option for the second application, the device receives (1622) a new notification for the first application; and in response to receiving the new notification, the device updates the indication of the number of unread notifications for the first application (e.g., as shown in FIGS. 5T5 and 5T6, option 5514 is updated (e.g., from showing five unread notifications to showing six unread notifications) when a new notification is received for the Messages application, while menu 5512 is displayed). For example, while the menu displays an option for launching the Mail app with a count indicator "five" for five unread mail messages, and an option for launching the Messages app with a count indicator "three" for three unread instant messages, suppose that a new message is received for the Messages app and a new notification is generated for the new message. The device updates the menu by changing the count indicator for the Messages app to show that the Messages app now has four unread notifications.

In some embodiments, the plurality of applications include (1624) an application that does not have any unread notifications. In response to detecting the first input: in accordance with a determination that the first input meets the menu-presentation criteria, the device foregoes displaying, concurrently with the one or more selectable options for launching corresponding applications that have unread notifications, a selectable option that, when activated, is configured to launch the application that does not have any unread notifications. For example, in some embodiments, if, at the time the quick action menu is displayed (e.g., in response to a deep press input on the folder icon), only the Messages app has five unread notifications, and the Mail app and the Call app do not have any unread notifications, then, only a menu option for launching the Messages app is displayed in the quick action menu, and menu options for launching the Mail app and the Call app are not displayed in the quick action menu. Additionally, if the unread messages from the Messages app become read at a later point in time, then a subsequent menu-display input on the folder icon will cause the device to display a menu that does not have a menu option for launching the Messages app. Similarly, if an app receives a notification, then a subsequent menu-display input on the folder will cause the device to display a menu that has a menu option for launching the app.

In some embodiments, in response to detecting the first input: in accordance with a determination that the first input meets the menu-presentation criteria, the device displays (1626) a selectable option that, when activated, is configured to enable renaming of the application folder (e.g., the menu option for renaming the folder is displayed concurrently with the menu options for launching the application(s) that have unread notifications in the quick action menu) (e.g., option 5520 in FIG. 5T5). In some embodiments, the selectable option for renaming the folder is displayed without regard to whether or not there are any applications with unread notifications in the folder (e.g., a menu-presentation input on a folder that does not contain any applications with unread notifications will cause the device to display a menu that includes a selectable option that, when activated, is configured to enable renaming of the application folder. In some embodiments, enabling renaming of a folder includes transitioning from a mode in which the folder cannot be renamed into a mode in which the folder can be renamed. In some embodiments, the option for renaming the folder is displayed in response to a menu presentation input, without regard to the status of notifications for the applications in the folder.

In some embodiments, while displaying the selectable option for renaming the application folder, the device detects (1628) a second input selecting the selectable option for renaming the application folder (e.g., as shown in FIG. 5V6). In response to detecting the second input: the device displays the application folder containing the plurality of application icons (e.g., displaying a zoomed view of the application icon (e.g., over a blurred version of the user interface (e.g., the home screen))) to show application icons within the application folder in their regular sizes) (e.g., as shown in FIG. 5V8). In some embodiments, the application folder is displayed over a blurred version of the user interface that is of the same dimensions and scales as the user interface before the blurring. In other words, the application folder "pops up" from the folder icon, and is overlaid on top of the blurred user interface. In some embodiments, the folder icon is not blurred with the rest of the user interface, and the view port on the screen zooms into toward the folder icon, with the rest of the user interface expanding away from the folder icon, until the folder icon is expanded into the application icon containing the application icons. In response to detecting the second input, the device displays a folder name of the application folder in an editable state (e.g., by placing a text cursor within the text of the folder name). In some embodiments, when an option in the quick action menu is selected, the menu ceases to be displayed over the blurred user interface. This is illustrated in FIGS. 5V6-5V8, for example.

In some embodiments, in response to detecting the second input, the device displays (1630) an onscreen keyboard concurrently with the folder name of the application folder (e.g., the onscreen keyboard is automatically displayed as soon as the "Rename" option is selected from the quick action menu), wherein an input received through the onscreen keyboard edits the folder name that is displayed in the editable state, e.g., as illustrated in FIG. 5V6.

In some embodiments, in response to detecting the second input, the device presents (1632) the plurality of application icons in a reconfiguration mode within the application folder (e.g., the plurality of application icons are presented in an "jiggling" state, and a user can drag each application icon to a different location within or outside of the application folder, or select an affordance presented on the application icon to delete the application corresponding to the application icon) (e.g., as shown in FIG. 5V6). In some embodiments, other application icons outside of the application folder are also placed in the reconfiguration mode. In some embodiments, when the icons are not presented in a reconfiguration mode, a touch input at a location that corresponds to an application icon and includes movement across the touch-sensitive surface will cause a different page of icons to be displayed.

In some embodiments, while displaying the onscreen keyboard and while displaying the plurality of application icons in the reconfiguration mode, the device detects (1634) a third input through the onscreen keyboard. In response to detecting the third input: the device edits the folder name in accordance with the third input; and continues to display the plurality of application icons in the reconfiguration mode. This is illustrated in FIGS. 5V8-5V10, for example.

In some embodiments, while displaying the onscreen keyboard and while displaying the plurality of application icons in the reconfiguration mode, the device detects (1636) a fourth input selecting one of the plurality of application icons. In response to detecting the fourth input: the device ceases to display the folder name in the editable state; the device ceases to display the onscreen keyboard; and the device continues to present the plurality of application icons in the reconfiguration mode. This is illustrated in FIGS. 5V10-5V11, for example.

In some embodiments, in response to detecting the first input: in accordance with a determination that the first input meets folder-content-display criteria, wherein the folder-content-display criteria do not require that a characteristic intensity of a contact (e.g., the first contact) associated with the detected input (e.g., the first input) meet the first intensity threshold in order for the folder-content-display criteria to be met (e.g., in some embodiments, the folder-content-display criteria are met when the first input is a tap input), the device displays (1638) the application folder containing the plurality of application icons (e.g., without placing the folder name in the editable state and without placing the plurality of application icons in the reconfiguration mode) (e.g., as shown in FIGS. 5U1-5U3). In some embodiments, displaying the application folder includes displaying a zoomed view of the application icon (e.g., over a blurred version of the user interface (e.g., the home screen))) to show application icons within the application folder in their regular sizes. In some embodiments, an animation showing a process of zooming in onto the folder icon is displayed, which results in the zoomed view of the folder icon (and the regular view of the application folder) on the screen. In some embodiments, an animation showing the folder icon popping up from its original location, and morphs into the application folder overlaid on the blurred user interface.

FIG. 17 is a functional block diagram of an electronic device for presenting options corresponding to launching an application based on the user input, in accordance with some embodiments.

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes a display unit 1702 configured to display a user interface; a touch-sensitive surface unit 1704 configured to receive user contacts; one or more sensor units 1706 configured to detect intensity of contacts with the touch-sensitive surface unit 1704; and a processing unit 1710 coupled to the display unit 1702 the touch-sensitive surface unit 1704, and the one or more sensor units 1706. The processing unit 1710 including an enabling unit 1712, detecting unit 1714, receiving unit 1716, updating unit 1718, foregoing unit 1720, presenting unit 1722, editing unit 1724, continuing unit 1726, and ceasing unit 1728.

The processing unit 1710 is configured to enable display of (e.g., with enabling unit 1712) a user interface on the display unit 1702, wherein: the user interface includes a folder icon that corresponds to an application folder containing a plurality of application icons, the plurality of application icons correspond to different applications in a plurality of applications, and the plurality of applications include one or more applications that have one or more unread notifications.

While displaying the user interface that includes the folder icon, the processing unit 1710 is configured to detect (e.g., with detecting unit 1714) a first input that includes detecting a first contact at a location on the touch-sensitive surface unit 1704 that corresponds to the folder icon.

In response to detecting the first input: in accordance with a determination that the first input meets menu-presentation criteria, wherein the menu-presentation criteria require that a characteristic intensity of a contact in a detected input meet a first intensity threshold in order for the menu-presentation criteria to be met, the processing unit 1710 is configured to enable display of (e.g., with enabling unit 1712) one or more selectable options that, when activated, are configured to launch corresponding applications from the plurality of applications in the application folder that have unread notifications.

FIGS. 18A-18D are flow diagrams illustrating a method 1800 of modifying the functionality of a control affordance in accordance with some embodiments. The method 1800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 1800 are, optionally, combined and/or the order of some operations is, optionally, changed.

As described below, the method 1800 provides an intuitive way to modify the functionality of a control affordance. The method allows the user to choose between a simplified toggle switch versus a more fine-grained control based on characteristic of a single input (e.g., an intensity of a single contact) on the control affordance. Thus, the method reduces the cognitive burden on a user when modifying the functionality of a control affordance, thereby creating a more efficient human-machine interface. For battery-operated electronic devices, enabling a user to modify the functionality of a control affordance faster and more efficiently conserves power and increases the time between battery charges.

The device displays (1802) a control user interface 608 that includes a plurality of control affordances (e.g., control affordances 612-634 as shown in FIG. 6B).

The device detects (1804) a first input by a contact at a location on a touch-sensitive surface 112 that corresponds to a first control affordance, of the plurality of control affordances. For example, the first input is a contact at a location of Wi-Fi control affordance 614, as indicated by focus selector 640 in FIG. 6B.

In response to detecting the first input (1806): in accordance with a determination that the first input meets control toggle criteria, wherein the control toggle criteria do not require that a characteristic intensity of the contact meet a first intensity threshold in order for the control toggle criteria to be met (e.g., in some embodiments, the control toggle criteria are met when the characteristic intensity of the contact is below a hint press intensity threshold $IT_H$, a light press intensity threshold $IT_L$ or a deep press intensity threshold $IT_D$) (e.g., in some embodiments, the control toggle criteria are met when the first input is a tap input), the device toggles a function of a control that corresponds to the first control affordance; and in accordance with a determination that the first input meets enhanced control criteria, the enhanced control criteria require that the characteristic intensity of the contact meet the first intensity threshold in order for the enhanced control criteria to be met, the device displays one or more modification options for the control that correspond to the first control affordance. For example, as discussed with regard to FIGS. 6B-6D, an input received at Wi-Fi control affordance 614 that meets control toggle criteria (e.g., an input at a location indicated by focus selector 640 of FIG. 6B and/or 642 of FIG. 6C that does not increase above hint press intensity threshold $IT_H$) toggles a Wi-Fi function that corresponds to Wi-Fi control affordance 614 from an disabled state (FIG. 6B) to a enabled state (FIG. 6C) and from an enabled state (FIG. 6C) to a disabled state (FIG. 6D). As discussed with regard to FIGS. 6E-6I, an input received at Wi-Fi control affordance 614 that meets enhanced control criteria causes modification options to be displayed for the Wi-Fi function. For example, in response to an input at a location indicated by focus selector 646 of FIG. 6F that increases above light press intensity threshold $IT_L$, the device displays modification options 650-658. In response to an input at a location indicated by focus selector 660 of FIG. 6I that increases above light press intensity threshold $IT_L$, the device displays modification options 664-672. In some embodiments, the modification options are displayed in a menu. For example, modification option menu 648, as shown in FIG. 6F, includes modification options 650-658; and modification option menu 662, as shown in FIG. 6I, includes modification options 664-672.

While displaying the one or more modification options for the control that correspond to the first control affordance, the device detects (1808) a second input that activates a first modification option of the one or more modification options. For example, an input at a location of modification option 654, as indicated by focus selector 658 of FIG. 6G, activates modification option 654 ("Turn off until I leave here"). In some embodiments, the second input is a continuation of the first input by the contact. In some embodiments, the second input is a separate tap input on a modification option.

The device modifies (1810) the control that corresponds to the first control affordance in accordance with the activated first modification option. For example, in response to the input by a contact at a location indicated by focus selector 658 in FIG. 6G at modification option 654 ("Turn off until I leave here"), the device disables Wi-Fi communications until the device is determined to be, e.g., beyond a threshold distance from a current device location, and/or in a different defined area from a current device location.

By providing different responses to inputs that meet different criteria, a single input affordance is usable to adjust a wider variety of functionality. The navigation required to access device features (such as changing a Wi-Fi network to which the device is connected, temporarily disabling a Wi-Fi network, or other features describe below in Table 1) is reduced, conserving device battery life.

Table 1 is a listing of toggle/control functions and modification options that correspond to device controls, in accordance with some embodiments.

TABLE 1

Toggle/Control Functions and Modification Options for Controls

| Control | Toggle/Control Function(s) | Modification Options |
|---|---|---|
| Airplane Mode | Activate Airplane Mode/ Deactivate Airplane Mode | Activate until end of this flight (e.g., based ticketing data stored by device application (e.g., ticket and/or payment management application, calendar application, and/or e-mail) or as determined using data available from carrier, e.g., via in-flight Wi-Fi.)<br>Activate for 2 hours from the time at which the option is selected<br>Activate for 5 hours from the time at which the option is selected<br>Activate for 12 hours from the time at which the option is selected |
| Wi-Fi | Activate Wi-Fi/ Deactivate Wi-Fi | Wi-Fi state: on<br>Disconnect from [name of current network connection]<br>Connect to [name of other detected network]<br>Turn off Wi-Fi for 1 hour from the time at which the option is selected<br>Turn off Wi-Fi until tomorrow (e.g., until midnight, until another predefined time, and/or 24 hours from the time at which the option is selected) |

TABLE 1-continued

Toggle/Control Functions and Modification Options for Controls

| Control | Toggle/Control Function(s) | Modification Options |
|---|---|---|
| | | Turn off Wi-Fi until I leave here(e.g., determined based whether the device moves more than a threshold distance from a current device location at the time that the option is selected, whether the device moves beyond a boundary of a defined area (such as a geofence, address, neighborhood, and/or city) and/or whether more than a threshold amount of movement of the device is detected based on one or more sensors (such as GPS, accelerometer, light sensor and/or sound sensor) of the device or other location detection process)<br>Wi-Fi Settings<br>Wi-Fi state: off<br>Connect to [name of most recent (and currently detected) network connection]<br>Connect to [name of other detected network]<br>Turn on Wi-Fi for 1 hour (e.g., 1 hour from the time at which the option is selected)<br>Turn on Wi-Fi until tomorrow (e.g., until midnight, until another predefined time, and/or 24 hours from the time at which the option is selected)<br>Turn on Wi-Fi until I leave here (e.g., determined based whether the device moves more than a threshold distance from a current device location at the time that the option is selected, whether the device moves beyond a boundary of a defined area (such as a geofence, address, neighborhood, and/or city) and/or whether more than a threshold amount of movement of the device is detected based on one or more sensors (such as GPS, accelerometer, light sensor and/or sound sensor) of the device or other location detection process)<br>Turn on Wi-Fi until network [name of most recent (and currently detected) network connection] signal no longer detected<br>Wi-Fi Settings |
| Bluetooth | Enable Bluetooth/ Disable Bluetooth | Bluetooth state: enabled<br>Disconnect from [name of currently connected device 1]<br>Disconnect from [name of currently connected device X]<br>Connect to [name of other detected device]<br>Turn off Bluetooth for 1 hour from the time at which the option is selected<br>Turn off Bluetooth until tomorrow (see “until tomorrow” determination description above under Wi-Fi)<br>Turn off Bluetooth until I leave here (see “until I leave here” determination description above under Wi-Fi)<br>Bluetooth Settings<br>Bluetooth state: disabled<br>Connect to [name of most recent (and currently detected) connected device]<br>Connect to [name of other detected device]<br>Turn on Bluetooth for 1 hour from the time at which the option is selected<br>Turn on Bluetooth until tomorrow (see “until tomorrow” determination description above under Wi-Fi)<br>Turn on Bluetooth until I leave here (see “until I leave here” determination |

TABLE 1-continued

| Toggle/Control Functions and Modification Options for Controls | | |
|---|---|---|
| Control | Toggle/Control Function(s) | Modification Options |
| | | description above under Wi-Fi)<br>Turn on Bluetooth until device [name] signal no longer detected<br>Bluetooth Settings |
| Do Not Disturb | Activate Do Not Disturb Mode/Deactivate Do Not Disturb Mode | Do Not Disturb State: Activated<br>End Do Not Disturb<br>End at sunset (e.g., as determined from data stored by the device, via internet connection and/or using light sensor)<br>End after 1 hour from the time at which the option is selected<br>End tomorrow (e.g., default time, user-specified time, time for which alarm is set, 8 hours from time at which the option is selected)<br>Do Not Disturb State: Deactivated:<br>Set Do Not Disturb<br>Turn on until sunrise<br>(e.g., as determined from data stored by the device, via internet connection and/or using light sensor)<br>Turn on for 1 hour from the time at which the option is selected<br>Turn on for 8 hours from the time at which the option is selected<br>Turn on until tomorrow |
| Rotation Lock | Activate Rotation Lock/ Deactivate Rotation Lock | Rotation Lock Activated:<br>Unlock<br>Rotation Lock Deactivated:<br>Lock<br>Lock except for full screen video |
| Flashlight | Flashlight On/ Flashlight Off | High<br>Medium ("Warm light")<br>Low<br>Flashing |
| Timer | Display Timer Application User Interface | Timer Running:<br>Pause timer<br>Alter remaining time<br>Timer Not Set:<br>1 minute<br>5 minute<br>15 minutes<br>30 minutes<br>or<br>Time duration slider<br>Start button |
| Night Shift | Night Shift Mode Activated/ Night Shift Mode Deactivated | Night Shift State: Activated<br>End Night Shift<br>End at sunrise (e.g., as determined from data stored by the device, via internet connection and/or using light sensor)<br>End after 8 hours from the time at which the option is selected<br>End tomorrow (e.g., default time, user-specified time, time for which alarm is set)<br>Night Shift State: Deactivated:<br>Set Night Shift<br>Turn on until sunrise (e.g., as determined from data stored by the device, via interne connection and/or using light sensor)<br>Turn on for 1 hour<br>Turn on for 8 hours<br>Turn on until tomorrow (e.g., default time, user-specified time, time for which alarm is set) |
| Calculator | Display Calculator Application User Interface | Copy last result |
| Camera | Display Camera Application User Interface | Take Selfie<br>Record Video<br>Record Slo-mo<br>Take Photo |

In some embodiments, the second input that activates the first modification option also toggles (1812) the function of the control that corresponds to the first control affordance. For example, the second input activates a modification option (e.g., selects a Wi-Fi network) and also toggles the control (e.g., turns Wi-Fi on with the selected network). In another example, the second input turns on a flashlight with a selected flashlight mode. For example, in response to the input by a contact at a location indicated by focus selector 658 in FIG. 6G at modification option 654 ("Turn off until I leave here"), the device Wi-Fi toggles from an enabled state, as indicated in FIG. 6F, to a disabled state, as indicated in FIG. 6I.

In some embodiments, modifying the control that corresponds to the first control affordance in accordance with the activated first modification option includes (1814): in accordance with a determination that the function is on when the second input is detected, modifying the function in accordance with the first modification option; (e.g., turning a brightness of a flashlight from a low setting to a high setting if the high setting is selected) and, in accordance with a determination that the function is off when the second input is detected, turning the function on with modification in accordance with the first modification option (e.g., turning the flashlight from off to on at a high setting if the high setting is selected). For example, a second input is an input that adjusts an adjustable control 680 as shown in FIG. 6M, an input provided at start control affordance 682 as shown in FIG. 6M, an input that adjusts a timer progress bar 684 as shown in FIG. 6N, and/or an input received at pause control affordance 686 as shown in FIG. 6N. In accordance with a determination that the function is on (e.g., the timer is running) when the second input is detected, the timer is modified in accordance with the modification made by the input (e.g., the timer progress is adjusted in accordance with an adjustment to timer progress bar 684 and/or the timer is paused by pause control affordance 686, as described with regard to FIG. 6N). In accordance with a determination that the function is off (e.g., the timer is not running) when the second input is detected, the timer is started in accordance with the modification made by the input (e.g., the timer duration is adjusted in accordance with an adjustment to adjustable control 680 and/or the timer is started by timer start control affordance 682).

In some embodiments, the modification option modifies (1816) a mode (e.g., a flashlight level, such as high, warm light and/or low) of the control that corresponds to the first control affordance. For example, modification options 696, 698, 6100, and 6102 listed in modification option menu 694 of FIG. 6R modify a mode of the camera control that corresponds to camera control affordance 630.

In some embodiments, modifying the control that corresponds to the first control affordance in accordance with the activated first modification option includes (1818) setting reversion criteria for the control. Reversion criteria include, e.g., criteria that are met when a time duration has passed, criteria that are met when a device arrives at a location (e.g., a geofence, city, and/or address), criteria that are met when a device departs from a location; and/or criteria that are met at a future point in time. In accordance with a determination that the reversion criteria are met, the device reverts the control that corresponds to the first control affordance to a prior state of the control (e.g., the previous state and/or default state). For example, the selected modification option enables/disables Wi-Fi in accordance with the reversion criteria (e.g., when the device leaves a designated area, as indicated by modification option 654 in FIG. 6F), enables/disables a do not disturb mode in accordance with the reversion criteria (e.g., for a designated number of hours), and/or enables/disables airplane mode in accordance with the reversion criteria (e.g., until a determined end of a flight).

In some embodiments, in accordance with a determination that the characteristic intensity of the contact meets the enhanced control criteria, the device determines (1820) a (current) state of the control that corresponds to the first control affordance. For example, the device determines a state of a timer (e.g., running, not running) that corresponds to timer control affordance 624 in FIG. 6B. In accordance with a determination that the (current) state of the control that corresponds to the first control affordance is a first state (e.g., timer is running), the device displays (1822) a first set of modification options for the control that corresponds to the first control affordance (e.g. duration options for the timer, e.g., as indicated at adjustable control 680 of FIG. 6M). In accordance with a determination that the (current) state of the control that corresponds to the first control affordance is a second state (e.g., timer is not running), the device displays (1824) a second set of modification options for the control that corresponds to the first control affordance that are distinct from the first set of modification options. For example, the device displays timer progress bar 684 for controlling progress through a timer (e.g., using a timer duration slider control) and/or an option to pause (e.g. pause control affordance 686).

In accordance with a determination that the characteristic intensity of the contact in the first input meets the enhanced control criteria (1826), the device concurrently displays a current value of a parameter of the control (e.g., a current time status of a timer) with the one or more modification options for the control that corresponds to the first control affordance. For example, user interface 678 for setting a timer includes a timer duration (e.g., a default timer duration and/or a previously set timer duration, such as the text that indicates "12 minutes" and the position of the adjustable control 680), and user interface 682 that indicates progress of a running timer includes a timer progress indication (e.g., the text that indicates "1:42" and the position of the progress indicator in progress bar 684). In some embodiments, the current value of the parameter of the control is displayed instead of the one or more modification options for the control (e.g., when the control was previously set and activated).

In some embodiments, the first control affordance is (1828) a first application affordance (e.g., an application icon, such as camera control affordance 630) that corresponds to a first application (e.g., a camera application). A second application affordance (e.g., camera application icon 430 in FIG. 6T) that corresponds to the first application is displayed (1830) in a second user interface that is distinct from the control user interface (e.g., a springboard user interface 6104 (FIG. 6T) that includes a plurality of application icons, including camera application icon 430, as shown in FIG. 6T). One or more action options (e.g., options 6110-6116 in FIG. 6U) for the first application are displayed (1832) in response to an input at a location on the touch-sensitive surface that corresponds to the second application affordance when display-action-options criteria are met (e.g., including criteria that are met when a characteristic intensity of the contact increases above light press threshold $IT_L$ or deep press threshold $IT_D$). In some embodiments, the enhanced control criteria and the display-action-options criteria have the same intensity-based criteria. In some embodiments, the one or more modification options (e.g., 696-6102, as illustrated in FIG. 6R) for the control that corresponds to the first control affordance include (1834) at least a subset of the action options (e.g., 6110-6116 in FIG. 6U) for the first application, such as quick action menu items for the first application that are displayed when an input that has a characteristic intensity above the first intensity threshold is received at a location that corresponds to the second application affordance. In some embodiments, the menu (e.g., modification option menu 694 in FIG. 6R) of (modification) options (e.g., modification options 696-6102 in FIG. 6R) that is displayed for an application icon in the control user interface is the same as the menu (e.g., action option menu 6108 in FIG. 6U) of options (e.g., 6110-6116 in FIG. 6U) that is displayed for the corresponding application icon in an application springboard.

In some embodiments, the one or more modification options for the control that corresponds to the first control affordance include (1836) at least one network connection activation option (e.g., Wi-Fi network pairing options such as 656, 664, and/or 666 in FIGS. 6F and 6I) and/or Bluetooth pairing options).

In some embodiments, the control user interface partially overlays (1838) a portion of a second user interface that is distinct from the control user interface (e.g., a springboard, lock screen, or application user interface). For example, as shown in FIG. 6B, control user interface 608 partially overlays a portion of an initial user interface 601 (e.g., a lock screen interface and/or a wake screen interface) shown in FIG. 6A. In some embodiments, the control user interface 608 is displayed in response to an input gesture detected while the second user interface 601 is displayed (e.g., a swipe gesture from an edge of the display, such as an upward swipe gesture).

In some embodiments, the control user interface 608 includes (1840) a plurality of controls (e.g., control affordances 612-634, as shown in FIG. 6B), wherein a respective control of the plurality of control corresponds to a system setting. For example, the first control user interface 608 and the initial user interface 601 are simultaneously displayed, and a portion of the initial user interface 601 is visually obscured by the first control user interface 608. In some embodiments, the first control user interface is semitransparent, and the portion of the initial user interface 601 that exists behind the first control user interface 608 is partially visible through the first control user interface.

It should be understood that the particular order in which the operations in FIGS. 18A-18D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 1800 described above with respect to FIGS. 18A-18D. For example, the contacts, gestures, user interface objects, intensity thresholds, and focus selectors described above with reference to method xxx optionally have one or more of the characteristics of the contacts, gestures, user interface objects, intensity thresholds, and focus selectors described herein with reference to other methods described herein. For brevity, these details are not repeated here.

In accordance with some embodiments, FIG. 19 shows a functional block diagram of an electronic device 1900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display a user interface, a touch-sensitive surface unit 1904 configured to receive contacts, one or more sensor units 1906 configured to detect intensity of contacts with the touch-sensitive surface unit 1904; and a processing unit 1908 coupled with the display unit 1902, the touch-sensitive surface unit 1904 and the one or more sensor units 1906. In some embodiments, the processing unit 1908 includes an enabling unit 1910, a detecting unit 1912, a toggling unit 1914, a modifying unit 1916, a reverting unit 1918, and a determining unit 1920.

The processing unit 1908 is configured to enable display (e.g., with enabling unit 1910) of a control user interface that includes a plurality of control affordances. The processing unit 1908 is configured to detect (e.g., with detecting unit 1912) a first input by a contact at a location on the touch-sensitive surface unit that corresponds to a first control affordance, of the plurality of control affordances, on the display unit. In response to detecting the first input: in accordance with a determination that the first input meets control toggle criteria, wherein the control toggle criteria do not require that the characteristic intensity of the contact meet a first intensity threshold in order for the control toggle criteria to be met, the processing unit 1908 is configured to toggle (e.g., with toggling unit 1914) a function of a control that corresponds to the first control affordance. In accordance with a determination that the first input meets enhanced control criteria, wherein the enhanced control criteria require that the characteristic intensity of the contact meet the first intensity threshold in order for the enhanced control criteria to be met, the processing unit 1908 is configured to enable display (e.g., with enabling unit 1910) of one or more modification options for the control that correspond to the first control affordance. While displaying the one or more modification options for the control that correspond to the first control affordance, the processing unit 1908 is configured to detect (e.g., with detecting unit 1912) a second input that activates a first modification option of the one or more modification options. The processing unit 1908 is configured to modify (e.g., with modifying unit 1916) the control that corresponds to the first control affordance in accordance with the activated first modification option.

The operations in the information processing methods described above are, optionally implemented by running one or more functional modules in information processing apparatus such as general purpose processors (e.g., as described above with respect to FIGS. 1A and 3) or application specific chips.

FIGS. 20A-20G are flow diagrams illustrating a method 2000 of deleting content in accordance with some embodiments. The method 2000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 2000 are, optionally, combined and/or the order of some operations is, optionally, changed.

As described below, the method 2000 provides an intuitive and effective way to delete content. The method reduces the tedious repetitions of a deletion input required of a user when deleting content, thereby creating a more efficient human-machine interface. For battery-operated electronic devices, enabling a user to delete content faster and more efficiently conserves power and increases the time between battery charges.

The device displays (2002) a user interface (e.g., 702) that includes: an editable content area (e.g., 704) that has a plurality of characters, and a content deletion control (e.g., 708 (e.g., a delete key in a content input area such as a keyboard 709), e.g., as shown in FIG. 7A).

The device detects (2004) a deletion input that includes detecting a contact (e.g., as indicated by focus selector 710) at a location on the touch-sensitive surface that corresponds to the content deletion control (e.g., 708) on the display.

In response to detecting the deletion input, the device deletes (2006) content (e.g., one or more characters) in the editable content area (e.g., 704) based on a duration and a characteristic intensity of the contact.

In accordance with a determination that the contact was maintained for a first time period without the characteristic intensity of the contact increasing above a first intensity threshold (e.g., the characteristic intensity of the contact remains below a light press intensity threshold $IT_L$ or a deep press intensity threshold $IT_D$), the device deletes (2008) the content in the editable content area (e.g., 704) by sequentially deleting a plurality of sub-units of the content of a first type of sub-unit of the content (e.g., deleting text character-by-character, as illustrated at FIG. 7B) at a rate that does not vary based on the characteristic intensity of the contact. For example, in FIG. 7D, dashed line 720 represents a characteristic intensity of a contact (e.g., the contact at the location corresponding to deletion control 708 as indicated by focus selector 710 in FIG. 7A) over time. The characteristic intensity of the contact is maintained for a first time period (e.g., a time period from 0 until time T1, as indicated on the time axis of FIG. 7D) without the characteristic intensity of the contact increasing above deep press intensity threshold $IT_D$, as indicated on the intensity axis of FIG. 7D. As indicated in FIG. 7D, at time T1, the device begins character-by-character deletion at a non-varying rate.

In accordance with a determination that the contact was maintained for a second time period that is longer than the first time period, without the characteristic intensity of the contact increasing above the first intensity threshold, the device deletes (2010) the content in the editable content area (e.g., 704) by sequentially deleting a plurality of sub-units of the content of a second type of sub-unit of the content (e.g., deleting text word-by-word, as illustrated at FIG. 7C) at a rate that does not vary based on the characteristic intensity of the contact. For example, in FIG. 7D, the characteristic intensity of a contact over time, as indicated by dashed line 720, is maintained for a first time period (e.g., a time period from 0 until time T2, as indicated on the time axis of FIG. 7D) without the characteristic intensity of the contact increasing above deep press intensity threshold $IT_D$, as indicated on the intensity axis of FIG. 7D. As indicated in FIG. 7D, at time T2, the device begins word-by-word deletion at a non-varying rate.

In some embodiments, in accordance with a determination that the characteristic intensity of the contact increased above the first intensity threshold, the device deletes (2012) the content in the editable content area (e.g., 704) by sequentially deleting a plurality of sub-units of the content at a rate that varies based on the characteristic intensity of the contact. For example, in FIGS. 7E and 7F, when the characteristic intensity of a contact (as indicated by dashed lines 722 and 724, respectively) increases above deep press intensity threshold $IT_D$, deletion at a rate that varies based on the intensity of the contact begins. In this way, a user is able to bypass waiting for a period of time to elapse in order to start deleting character-by-character at a rate that varies based on intensity of a contact. By increasing the intensity of the contact, the user immediately begins deleting content at a variable rate. In some embodiments, the variance of the rate is also based on whether the device was sequentially deleting the first type of sub-unit of content (e.g., character-by-character) or deleting the second type of sub-unit of the content (e.g., word-by-word) when the characteristic intensity of the contact increased above the first intensity threshold. In some embodiments, a long press (e.g., a touch input that is maintained for more than the first time period) on a character key that has alternative characters causes display of alternative characters for that character key.

In some embodiments, deleting the content in the editable content area (e.g., 704) by sequentially deleting the plurality of sub-units of the content at the rate that varies based on the characteristic intensity of the contact includes (2014), in accordance with a determination that the characteristic intensity increases above the first intensity threshold after the contact has been maintained on the touch-sensitive surface for the first time period, increasing the rate of deletion of the first type of sub-unit of the content (e.g., deleting text character-by-character) in the editable content area as the intensity of the contact increases. For example, in FIG. 7E, the characteristic intensity of a contact over time, as indicated by dashed line 722, increases above deep press intensity threshold $IT_D$ at time $T_{ITD}$ that is after time T1. At time $T_{ITD}$, character-by-character deletion at a rate that varies based on the intensity of the contact begins.

In some embodiments, deleting the content characters in the editable content area by sequentially deleting the plurality of sub-units of the content at the rate that varies based on the characteristic intensity of the contact includes (2016), in accordance with a determination that the characteristic intensity of the contact increases above the first intensity threshold after the contact has been maintained on the touch-sensitive surface for the first time period, continuing to delete the first type of sub-unit of the content (e.g., deleting text character-by-character) in the editable content area after the contact has been maintained on the touch-sensitive surface for the second time period instead of switching to deleting the second type of sub-unit of the content (e.g., deleting text word-by-word). For example, in FIG. 7E, character-by-character deletion at a rate that varies based on the intensity of the contact continues after time T2 (word-by-word deletion does not occur at time T2). In contrast, in some embodiments, if the increase in the characteristic intensity of the contact is detected after the contact has been maintained on the touch-sensitive surface for the second time period, the device switches to deleting the second type of sub-unit of content, which can then be accelerated if the characteristic intensity of the contact increases after the contact has been maintained for the second time period.

In some embodiments, deleting the content in the editable content area (e.g., 704) by sequentially deleting the plurality of sub-units of the content at the rate that varies based on the characteristic intensity of the contact includes (2018), in accordance with a determination that the characteristic intensity first increases above the first intensity threshold after the contact has been maintained on the touch-sensitive surface for the second time period, increasing the rate of deletion of the second type of sub-unit of the content (e.g., deleting text word-by-word, as illustrated at FIG. 7C) in the editable content as the intensity of the contact increases. For example, in FIG. 7F, the characteristic intensity of a contact over time, as indicated by dashed line 724, increases above deep press intensity threshold $IT_D$ at time $T_{ITD}$ that is after time T2. At time $T_{ITD}$, word-by-word deletion at a rate that varies based on the intensity of the contact begins.

In some embodiments, deleting the content in the editable content area (e.g., 704) by sequentially deleting the plurality of sub-units of the content at the rate that varies based on the characteristic intensity of the contact includes (2020), in accordance with a determination that the characteristic intensity increases above the first intensity threshold after the contact has been maintained on the touch-sensitive surface for the first time period and before the contact has been maintained on the touch-sensitive surface for the second time period, starting to sequentially delete the plurality of sub-units of the content of the second type of sub-unit of the content (e.g., deleting text word-by-word, as illustrated at FIG. 7C) in the editable content area 704 before the contact has been maintained on the touch-sensitive surface for the second time period. For example, in FIG. 7G, the characteristic intensity of a contact over time, as indicated by dashed line 726, increases above deep press intensity threshold $IT_D$ at time $T_{ITD}$ that is after time T1 and before time T2. At time $T_{ITD}$, word-by-word deletion begins.

In some embodiments, starting to sequentially delete the plurality of sub-units of the content of the second type of sub-unit of the content (e.g., deleting text word-by-word, as illustrated at FIG. 7C) in the editable content area (e.g., 704) before the contact has been maintained on the touch-sensitive surface for the second time period includes (2022) increasing the rate of sequential deletion of the second type of sub-unit of the content (e.g., deleting text word-by-word) in the editable content as the intensity of the contact increases.

In some embodiments, after starting to sequentially delete the plurality of sub-units of the content of the second type of sub-unit of the content (e.g., deleting text word-by-word, as illustrated at FIG. 7C) in the editable content area (e.g., 704) before the contact has been maintained on the touch-sensitive surface for the second time period, the device detects (2024) a decrease in the intensity of the contact below the first intensity threshold; and after detecting the decrease in the intensity of the contact below the first intensity threshold and while the contact continues to be detected on the touch-sensitive surface, the device continues to sequentially delete the plurality of the sub-units of content of the second type of sub-unit of the content (e.g., deleting text word-by-word) in the editable content area before the contact has been maintained on the touch-sensitive surface for the second time period. For example, in FIG. 7H, the characteristic intensity of a contact over time, as indicated by dashed line 728, increases above deep press intensity threshold $IT_D$ at time $T_{ITD1}$ and decreases below deep press intensity threshold $IT_D$ at time $T_{ITD1}$ that occurs after time $T_{ITD1}$. At time $T_{ITD1}$, word-by-word deletion begins. At time $T_{ITD2}$, which occurs before time T2, word-by-word deletion continues.

In some embodiments, in accordance with a determination that liftoff of the contact was detected before the contact was maintained on the touch-sensitive surface for more than a tap time threshold, a single character is deleted (2026) from the content. For example, in FIG. 7I, a contact having a characteristic intensity that varies over time, as indicated by dashed line 730, is lifted off before tap time threshold $T_{tap}$ occurs, and a single character is deleted. In some embodiments, tap time threshold $T_{tap}$ occurs before T1, as shown in FIG. 7I. In some embodiments, tap time threshold $T_{tap}$ is the same as T1.

In some embodiments, the user interface (e.g., 702) includes (2028) a content insertion indicator (e.g., 716) (e.g., text cursor) that is displayed within the editable content area (e.g., 704); and deleting the content in the editable content area includes deleting the plurality of sub-units of the content from a location in the editable content area that corresponds to the content insertion indicator. For example, as illustrated at FIGS. 7B and 7C, text is deleted from a position indicated by content insertion indicator 716.

In some embodiments, the device detects (2030) a repositioning input that includes detecting a second contact at a second location (e.g., as indicated by focus selector 732*a*) on the touch-sensitive surface, wherein the second location on the touch-sensitive surface is distinct from the location that corresponds to the content deletion control (e.g., 708). In accordance with a determination that a characteristic intensity of the second contact increased above the first intensity threshold (e.g., a light press intensity threshold $IT_L$ or a deep press intensity threshold $IT_D$, as indicated by intensity meter 712) the device activates (2032) a content insertion indicator repositioning mode. While the content insertion indicator repositioning mode is active, the device (2034): displays indicia (e.g., replacing autocorrect text and/or text on the keys of the keyboard with blank space, as illustrated at FIG. 7M) that correspond to the content insertion indicator repositioning mode; detects movement of the second contact from the second location (e.g., as indicated by focus selector 732*a*) on the touch-sensitive surface to a third location (e.g., as indicated by focus selector 732*b*) on the touch-sensitive surface (e.g., along a path indicated by arrow 734); and moves the content insertion indicator (e.g., 716) (e.g., in accordance with the movement of the second contact). For example, as the second contact moves from the second location 732*a* to the third location 732*b* along the path indicated by arrow 734, content insertion indicator 716 moves from a first location 716*a* to a second location 716*b* along a path indicated by arrow 736. The device detects (2036) liftoff of the second contact from the touch-sensitive surface. In response to detecting the liftoff of the second contact from the touch-sensitive surface, the device displays (2038) the content insertion indicator 716 at a location (e.g., 716*b*) corresponding to the location of the content insertion indicator 716 when liftoff of the second content from the touch-sensitive surface occurred (e.g., as shown in FIG. 7N).

In some embodiments, the device includes (2040) one or more tactile output generators.

In some embodiments, the device outputs (2042), with the one or more tactile output generators, a plurality of tactile outputs, wherein a respective tactile output in the plurality of tactile outputs is triggered based on deletion of a respective sub-unit of the plurality of sub-units of the content. For example, as shown in FIGS. 7O-1 and 7O-2, a deletion of a sub-unit (e.g., a character) occurs at times t1, t2, t3, and t4, and a tactile output that corresponds to deletion of a sub-unit occurs at times t1, t2, t3, and t4.

In some embodiments, a tactile output profile (e.g., including one or more parameters such as amplitude, duration, damping, and/or frequency) of a respective tactile output in the plurality of tactile outputs varies (2044) based on the characteristic intensity of the contact. For example, as shown in FIG. 7O-1, harder tactile outputs occur as the characteristic intensity of the contact increases. As another example, as shown in FIG. 7O-2, softer tactile outputs occur as the characteristic intensity of the contact increases (and the speed of deletion of the sub-units increases).

In some embodiments, the user interface includes (2046) a content input area (e.g., 740) (e.g., of which the content deletion control 708 is a part) that includes a plurality of keys that are distinct from the content deletion control; and one or more keys of the plurality of keys that are distinct from the content deletion control (e.g., 708) (e.g., one or more character keys) do not trigger a tactile output when activated. In some embodiments, other keys (e.g., a keyboard switching key (for switching between different language keyboards), a keyboard mode-switching key (for switching between a letter keyboard and a number keyboard), and/or a shift key) that are non-character keys do trigger tactile outputs.

In some embodiments, the device detects (2048) a menu-display input at a location on the touch-sensitive surface that corresponds to a content input area (e.g., 740). In response to detecting the menu-display input, the device displays (2050) a menu that includes one or more menu items (e.g., an alternate letter selection menu and/or an alternate keyboard menu) in the user interface. For example, as shown in FIG. 7Q, menu 744 is displayed in response to a menu-display input at a location indicated by focus selector 742. The device detects (2052) a selection input (e.g., a continuation of the menu-display input or a separate input) at a location on the touch-sensitive surface that corresponds to the menu. In accordance with a determination that the selection input moves to a location that corresponds to a respective menu item of the one or more menu items, the device outputs (2054), with the one or more tactile output generators, a tactile output. For example, in FIG. 7R, a contact moves to a location indicated by focus selector 742 that corresponds to menu item 746 ("Emoji"), and a tactile output occurs, as indicated at 751. In FIG. 7S, a contact moves to a location indicated by focus selector 742 that corresponds to menu item 748 ("English (US)"), and a tactile output occurs, as indicated at 753.

In some embodiments, the user interface includes (2056) a content input area (e.g., 740) (e.g., of which the content deletion control is a part) that includes a plurality of keys that are distinct from the content deletion control (e.g., 708). The device detects (2058) a first input at a first location that corresponds to a first key of the content input area (e.g., an input at a location that corresponds to the "A" key as indicated by focus selector 732 of FIG. 7K), wherein the first input is detected at a first time. The device detects (2060) a second input at a second location (e.g., the same location as the first location or a different location from the first location) that corresponds to a second key (e.g., the same key as the first key or a different key from the first key) of the content input area (e.g., 740), wherein the second input is detected at a second time that is later than the first time. In response to detecting the second input, the device outputs (2062) a tactile output, with the one or more tactile output generators, wherein a tactile output profile (e.g., including one or more parameters such as amplitude, duration, damping, and/or frequency) of the tactile output triggered by the second input varies based on a length of time between the first time and the second time. For example, the tactile outputs illustrated in FIGS. 7T and 7V vary based on a length of time between an input and a previous input.

In some embodiments, the electronic device includes (2064) one or more audio output generators.

In some embodiments, the user interface includes (2066) a content input area (e.g., 740) (e.g., of which the content deletion control 708 is a part) that includes a plurality of keys that are distinct from the content deletion control (e.g., 708). The device detects (2068) a first input at a first location that corresponds to a first key of the content input area (e.g., an input at a location that corresponds to the "A" key as indicated by focus selector 732 of FIG. 7K), wherein the first input is detected at a first time. The device detects (2070) a second input at a second location (e.g., the same location as the first location or a different location from the first location) that corresponds to a second key (e.g., the same key as the first key or a different key from the first key) of the content input area (e.g., 740), wherein the second input is detected at a second time that is later than the first time. In response to detecting the second input, the device outputs (2072) an audio output, with the one or more audio output generators, wherein an audio output profile (e.g., including one or more parameters such as amplitude, duration, damping, and/or frequency) of the audio output triggered by the second input varies based on a length of time between the first time and the second time. For example, the audio outputs illustrated in FIGS. 7U and 7W vary based on a length of time between an input and a previous input.

In some embodiments, the user interface includes (2074) a content input area (e.g., 740) (e.g., of which the content deletion control 708 is a part) that includes a plurality of keys that are distinct from the content deletion control (e.g., 708). In response to detecting the deletion input, the device outputs (2076) a first audio output that has a first audio output profile. The device detects (2078) a first input at a first location that corresponds to a first key of the plurality of keys that are distinct from the content deletion control (e.g., 708). In accordance with a determination that the first key has a first key type (e.g., a letter key), the device outputs (2080) a second audio output that has a second audio output profile, distinct from the first audio output profile. In some embodiments, when audio output for keys is varied based on typing speed that variation is variation in a parameter that is different from the parameter(s) that differentiate the audio output for the delete key from the audio output for keys of the first type (e.g., character keys), so that even when the audio output of the keys is varied based on typing speed the sound output for the first type of keys is different from the sound output for the delete key.

In some embodiments, in accordance with a determination that the first key has a second key type (e.g., a space key, a shift key, and/or a keyboard switching key), the device outputs (2082) a third audio output that has a third audio output profile that is distinct from the first audio output profile and the second audio output profile. In some embodiments, when audio output for keys is varied based on typing speed that variation is variation in a parameter that is different from the parameter(s) that differentiate the audio output for the delete key from the audio output for keys of the first type (e.g., character keys) and the second type (e.g., a space key, a shift key, and/or a keyboard switching key), so that even when the audio output of the keys is varied based on typing speed the sound output for the first type of keys is different from the sound output for the delete key and the sound output from the second type of keys.

It should be understood that the particular order in which the operations in FIGS. 20A-20G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2000 described above with respect to FIGS. 20A-20G. For example, the contacts, gestures, user interface objects, tactile outputs, audio outputs, intensity thresholds, and focus selectors described above with reference to method 700 optionally have one or more of the characteristics of the contacts, gestures, user interface objects, tactile outputs, audio outputs, intensity thresholds, and focus selectors described herein with reference to other methods described herein. For brevity, these details are not repeated here.

In accordance with some embodiments, FIG. 21 shows a functional block diagram of an electronic device 2100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, an electronic device 2100 includes a display unit 2102 configured to display a user interface, a touch-sensitive surface unit 2104 configured to receive contacts, one or more sensor units 2106 configured to detect intensity of contacts with the touch-sensitive surface unit 2104; and a processing unit 2108 coupled with the display unit 2102, the touch-sensitive surface unit 2104 and the one or more sensor units 2106. In some embodiments, the processing unit 2108 includes an enabling unit 2110, detecting unit 2112, deleting unit 2114, a continuing unit 2116, activating unit 2118, and an outputting unit 2120.

The processing unit 2108 is configured to: enable display of (e.g., with enabling unit 2110) a user interface that includes: an editable content area that has a plurality of characters, and a content deletion control. The processing unit 2108 is configured to detect (e.g., with detecting unit 2112) a deletion input that includes detecting a contact at a location on the touch-sensitive surface unit 2104 that corresponds to the content deletion control on the display unit 2102. In response to detecting the deletion input, the processing unit 2108 is configured to delete (e.g., with deleting unit 2114) content in the editable content area based on a duration and a characteristic intensity of the contact. In accordance with a determination that the contact was maintained for a first time period without the characteristic intensity of the contact increasing above a first intensity threshold, the processing unit 2108 is configured to delete (e.g., with deleting unit 2114) the content in the editable content area by sequentially deleting a plurality of sub-units of the content of a first type of sub-unit of the content at a rate that does not vary based on the characteristic intensity of the contact. In accordance with a determination that the contact was maintained for a second time period that is longer than the first time period without the characteristic intensity of the contact increasing above the first intensity threshold, the processing unit 2108 is configured to delete (e.g., with deleting unit 2114) the content in the editable content area by sequentially deleting a plurality of sub-units of the content of a second type of sub-unit of the content at a rate that does not vary based on the characteristic intensity of the contact. In accordance with a determination that the characteristic intensity of the contact increased above the first intensity threshold, the processing unit 2108 is configured to delete (e.g., with deleting unit 2114) the content in the editable content area by sequentially deleting a plurality of sub-units of the content at a rate that varies based on the characteristic intensity of the contact.

FIGS. 22A-22G are flow diagrams illustrating a method 2200 of detecting input at a messaging interface and presenting special effect options for a message in accordance with the detected input, in accordance with some embodiments. The method 2200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 2200 are, optionally, combined and/or the order of some operations is, optionally, changed.

As described below, the method 2200 provides an intuitive way to present special effect options for a message in a messaging interface. The method reduces the cognitive burden on a user when preparing a message to be sent with special effects, thereby creating a more efficient human-machine interface. For battery-operated electronic devices, enabling a user to detecting input at a messaging interface faster and more efficiently conserves power and increases the time between battery charges.

The device displays (2202) a messaging interface (e.g., 802) that includes a conversation transcript (e.g., 804) and a message input area (e.g., 806). Message input area (e.g., 806) includes an affordance (e.g., 810) for sending a message. While message input area (e.g., 806) contains message content (e.g., 808), the device detects (2204) a first input by a contact (e.g., as indicated by focus selector 812, as shown in FIG. 8A) at a location of the touch-sensitive surface (e.g., 112) that corresponds to the affordance (e.g., 810) for sending the message.

The device determines (2206) a characteristic intensity of the contact in the first input. For example, the characteristic intensity of the contact indicated by focus selector 812 is indicated by intensity meter 814.

In response to detecting the first input (2208), in accordance with a determination that the first input meets send criteria (e.g., a tap gesture), wherein the send criteria do not require that a characteristic intensity of the contact meet a first intensity threshold in order for the send criteria to be met, the device initiates (2210) sending the message content to a remote device (e.g., with a default animation to be displayed when the message is received at the remote device). For example, when the first input meets send criteria, the message is sent to remote device 820 and the message content 808 is displayed by remote device 820 as shown in FIG. 8C. In some embodiments, the tap gesture is detected if detection of the contact is followed by liftoff of the contact from touch-sensitive surface 112 either within a predefined time period without regard to the intensity of the contact, or without detecting an increase in intensity of the contact above the first intensity threshold.

In response to detecting the first input (2208), in accordance with a determination that the contact meets (first) message impact criteria, wherein the (first) message impact criteria require that the characteristic intensity of the contact meet the first intensity threshold in order for the (first) message impact criteria to be met (e.g., in some embodiments, the message impact criteria are met when the characteristic intensity of the contact meets a light press intensity threshold $IT_L$ or a deep press intensity threshold $IT_D$), the device displays (2212) a plurality of message impact effect options (e.g., 822 ("Slam"), 824 ("Loud"), 826 ("Gentle"), and/or 828 ("Invisible Ink") as shown in FIG. 8F) for changing an animation that is displayed when the message is received at the remote device 820. For example, when the first input increases above deep press intensity threshold $IT_D$, as indicated by intensity meter 814, message impact effect options interface 830 is displayed, as shown in FIGS. 8D-8F.

While displaying the plurality of message impact effect options (e.g., in message impact effect options interface 830 as shown in FIG. 8F), the device detects (2214) a second input by a contact (e.g., a deep press, a tap gesture, or a lift off of the contact from touch-sensitive surface 112) to send the message content (e.g., 808) with a selected message impact effect option of the plurality of impact effect options. For example, as illustrated in FIG. 8L, a characteristic intensity of the contact indicated by focus selector 812 increases above deep press intensity threshold $IT_D$ as indicated by intensity meter 814 to send message content 808 with selected message impact effect option 822.

In response to detecting the second input, in accordance with a determination that the second input was received at a location on the touch-sensitive surface that corresponds to a first message impact effect option of the plurality of impact effect options (e.g., at affordance 847 for sending message content 808 with a "Loud" message impact effect option), the device initiates sending (2216), to the remote device (e.g., 820), the message content (e.g., 808) with the first message impact effect option (e.g., "Loud" message impact effect option 824). In some embodiments, the first message impact effect option includes an animation to be displayed when the message is received at the remote device (e.g., 820) that is different from the default animation with which the message is displayed when it is sent via a tap input on the send affordance.

In accordance with a determination that the second input is detected at a location on the touch-sensitive surface that corresponds to a second message impact effect option of the plurality of message impact effect options (e.g., at affordance 848 for sending message content 808 with a "Slam" message impact effect option 822), the device initiates sending (2218) to the remote device (e.g., 820), the message content with the second message impact effect option (e.g., with an impact animation that is different from an impact animation that corresponds to the first message impact effect option, such an animation illustrated at FIGS. 8P-8R).

In some embodiments, the contact in the first input and the contact in the second input are the same contact (e.g., as indicated by focus selector 812), and the contact is continuously detected (2220) on the touch-sensitive surface (e.g., 112) between the time that the first input is detected and the time that the second input is detected. For example, a single contact makes a first press input on the send icon 810 (e.g., a contact at a location that corresponds to send icon 810 with a characteristic intensity that increases above a deep press intensity threshold $IT_D$ or a light press intensity threshold $IT_L$) to bring up a menu of message impact effect options (e.g., message impact effect options 822-828); then, the same contact slides to a respective message impact effect in the menu to select the respective message impact effect option; and finally the same contact presses on the respective message impact effect option (or, in some embodiments, lifts off from the respective message impact effect option) to initiate sending the message with the respective message impact effect option.

Alternatively, in some embodiments, the contact in the first input and the contact in the second input are different contacts that are not continuously detected on the touch-sensitive surface (e.g., 112) between the time that the first input is detected and the time that the second input is detected. For example, a first contact makes a first input on the send affordance 810 (e.g., a contact at a location that corresponds to send icon 810 with a characteristic intensity that increases above a deep press intensity threshold $IT_D$ or a light press intensity threshold $IT_L$) to bring up a menu of message impact effect options (e.g., message impact effect options 822-828). Then, the first contact lifts off the touch-sensitive surface, ending the contact with the touch-sensitive surface. After lift-off of the first contact, and while the menu of message impact effect options is still displayed, a second contact is detected touching down on the touch-sensitive surface (e.g., 112) as part of an input at a location that corresponds to the respective message impact effect option (e.g., as part of a tap gesture or deep press on the respective message impact effect option). Then, in response to the input by the second contact, the electronic device initiates sending the message with the respective message impact effect option. In this example, the same finger may be used to make the contact in the first input and the contact in the second input.

In some embodiments, the device detects (2222) an option preview input (e.g., that is detected while the contact is continuously detected on the touch-sensitive surface 112) that moves across the touch-sensitive surface (e.g., 112) along locations (e.g., locations on message impact effect option selection control 836) that correspond to the plurality of impact effect options. In response to detecting the option preview input (2224): in accordance with a determination that the option preview input has moved to a first location on the touch-sensitive surface that corresponds to the first message impact effect option of the plurality of impact effect options (e.g., at affordance 847 for sending message content 808 with a "Loud" message impact effect option 824), the device displays a first preview of the message content (e.g., 808) with the first message impact effect option (e.g., as illustrated at FIGS. 8G-8I). In accordance with a determination that the option preview input has moved to a second location on the touch-sensitive surface that corresponds to a second message impact effect option of the plurality of impact effect options (e.g., at affordance 848 for sending message content 808 with a "Slam" message impact effect option 822), the device displays a second preview of the message content 808 with the second message impact effect option (e.g., as illustrated at FIGS. 8J-8L).

In some embodiments, in response to detecting the option preview input (2226): in accordance with a determination that the option preview input has moved to the first location on the touch-sensitive surface that corresponds to the first message impact effect option of the plurality of impact effect options (e.g., at affordance 847 for sending message content 808 with a "Loud" message impact effect option 824), the device outputs, with one or more tactile output generators, a first tactile output; and in accordance with a determination that the option preview input has moved to the second location on the touch-sensitive surface that corresponds to a second message impact effect option of the plurality of impact effect options (e.g., at affordance 847 for sending message content 808 with a "Slam" message impact effect option 822), the device outputs, with the one or more tactile output generators, a second tactile output. For example, FIGS. 8Y-8Z illustrate tactile outputs that occur as the option preview input moves to locations that correspond to message impact effect options 822-828.

In some embodiments (2228), the first tactile output has a first tactile output profile, and the second tactile output has a second tactile output profile that is the same as the first tactile output profile. A tactile output profile includes, e.g., one or more parameters such as amplitude, duration, damping, and/or frequency. For example, in FIG. 8Y a tactile output that occurs at a time t3 when option preview input has moved to a location that corresponds to "Loud" message impact effect option 824 has a higher amplitude than a tactile output that occurs at a time t4 when option preview input has moved to a location that corresponds to "Slam" message impact effect option 822.

In some embodiments (2230), the first tactile output has a first tactile output profile that corresponds to the first message impact effect option, and the second tactile output has a second tactile output profile, distinct from the first tactile output profile, that corresponds to the second message impact effect option. For example, for a more emphatic message impact effect option, the tactile output has a higher peak amplitude and/or longer duration, while for a less emphatic message impact effect option the tactile output has a lower peak amplitude and/or shorter duration.

In some embodiments, a characteristic intensity of the contact in the second input satisfies (2232) a second intensity threshold. In some embodiments, the second intensity threshold is the same as the first intensity threshold. In some embodiments, the second intensity threshold is different from the first intensity threshold. In some embodiments, a press input by a contact on a respective message impact effect option that satisfies an intensity threshold (e.g., a characteristic intensity of the contact that increases above a light press intensity threshold $IT_L$ or a deep press intensity threshold $IT_D$) is needed to initiate sending the message content with the respective message impact effect.

In some embodiments (2234), in response to detecting the second input, in accordance with the determination that the second input was received at a location on the touch-sensitive surface that corresponds to the first message impact effect option (e.g., at affordance 847 for sending message content 808 with a "Loud" message impact effect option 824), outputting, with one or more tactile output generators of the electronic device, at least one tactile output that corresponds to sending the message content with the first message impact effect option. In some embodiments, tactile output is provided when the second input is a deep press gesture (e.g., when the input includes a contact with a characteristic intensity that increases above deep press intensity threshold $IT_D$, as indicated by intensity meter 814). In some embodiments, tactile output is not provided when the second input is a tap gesture. In some embodiments, tactile output is not provided when the second input is a lift off of the contact.

In some embodiments (2236), second message impact criteria include a criterion that is met when a duration of the contact with the touch-sensitive surface satisfies a first time threshold (e.g., a long press time threshold), the second input is a lift off of the contact, and: in response to detecting the first input, in accordance with a determination that the contact meets the second message impact criteria, the device displays the plurality of message impact effect options (e.g., message impact effect options 822-828). In some embodiments, in accordance with a determination that the contact does not meet the second message impact criteria, the device forgoes displaying the plurality of message impact effect options.

In some embodiments (2238), second message impact criteria include a criterion that is met when a duration of the contact with the touch-sensitive surface satisfies a first time threshold (e.g., a long press time threshold); and the second input is a tap gesture; and in response to detecting the first input, in accordance with a determination that the contact meets the second message impact criteria, the device displays the plurality of message impact effect options (e.g., message impact effect options 822-828). In some embodiments, in accordance with a determination that the contact does not meet the second message impact criteria, the device forgoes displaying the plurality of message impact effect options.

In some embodiments, the conversation transcript (e.g., 804) includes (2240) a received message (e.g., 873) displayed in a message region (e.g., 874) (e.g., as shown in FIG. 8AA). The device detects (2242) a third input by a contact (e.g., as indicated by focus selector 876) at a location of the touch-sensitive surface (e.g., 112) that corresponds to the message region (e.g., 874) on the display. In response to detecting the third input, in accordance with a determination that the third input meets acknowledgement display criteria that include a criterion that is met when a characteristic intensity of the contact satisfies a second intensity threshold (e.g., the characteristic intensity of the contact meets a light press intensity threshold $IT_L$ or a deep press intensity threshold $IT_D$), the device displays (2244) an acknowledgement selection affordance (e.g., 878) at a location in the messaging interface (e.g., 802) that corresponds to the message region (e.g., 874), wherein the acknowledgement selection affordance displays a plurality of acknowledgement options (e.g., acknowledgement options 880-890, as shown in FIG. 8AD). In some embodiments, the second intensity threshold is the same as the first intensity threshold. In some embodiments, the second intensity threshold is different from the first intensity threshold. In some embodiments, in accordance with a determination that the third input does not meet the acknowledgement display criteria, the device maintains display of the received message displayed in the message region without displaying the acknowledgement selection affordance 878 with the plurality of acknowledgement options. The device detects (2246) a fourth input by a contact (e.g., as indicated by focus selector 892) at a location of the touch-sensitive surface (e.g., 112) that corresponds a first acknowledgement option (e.g., thumbs up acknowledgement option 882) of the plurality of acknowledgement options. In response to detecting the acknowledgement application input, the device applies (2248) the first acknowledgement option to the message region (e.g., as shown in FIG. 8AF). In some embodiments, a tap input (e.g., an input that is configured to be detected without a contact reaching the second intensity threshold) on the message region has another effect (e.g., playing video or audio media in the message region, or expanding content in the region such as displaying a full screen version of a photo).

In some embodiments, the conversation transcript includes (2250) a message (e.g., 893) displayed in a message region (e.g., 894) (e.g., a received message or a sent message) and a plurality of acknowledgements (e.g., 896) that correspond to the message region (e.g., 894) (e.g., as shown in FIG. 8AG). The device detects (2252) a fifth input by a contact (e.g., as indicated by focus selector 898) at a location of the touch-sensitive surface (e.g., 112) that corresponds to an area that includes the message region (e.g., 894) and/or a respective acknowledgement of the plurality of acknowledgements (e.g., 896) that correspond to the message region (e.g., 894). In response to detecting the fifth input, in accordance with a determination that the fifth input meets acknowledgement tally reveal criteria that include a criterion that is met when a characteristic intensity of the contact satisfies a second intensity threshold (e.g., the characteristic intensity of the contact meets a light press intensity threshold $IT_L$ or a deep press intensity threshold $IT_D$), the device displays (2254) at least a subset of the plurality of acknowledgements (e.g., acknowledgement options 882, 884, and 888, as shown in FIG. 9AH) that correspond to the message region (e.g., 894). In some embodiments, the second intensity threshold is the same as the first intensity threshold. In some embodiments, the second intensity threshold is different from the first intensity threshold. In some embodiments, all of the acknowledgements of the plurality of acknowledgements (e.g., 894) (e.g., acknowledgement options 882, 884, and 888, as shown in FIG. 9AH) and/or all of the acknowledgement options (e.g., 880-890) are shown. In some embodiments, a respective acknowledgement option that has been applied as an acknowledgement to the message region is displayed with information pertaining to the acknowledgement option, such as identifying information (e.g., avatar 8106) for a conversation participant who selected the respective acknowledgement option and/or a number (e.g., 8104) that indicates the number of conversation participants who applied the respective acknowledgement option (e.g., 882). In some embodiments, multiple such respective acknowledgement options are displayed simultaneously (e.g., acknowledgement options 882, 884, and 888 are displayed simultaneously, as shown in FIG. 9AH). In some embodiments, in response to input received at a respective acknowledgement option (e.g., an input gesture, such as a tap input, by a contact as indicated by focus selector 8108, at a location that corresponds to the respective acknowledgement option 882), identifying information associated with at least a subset of the conversation participants (e.g., avatars 8016 and 8108) who selected the respective acknowledgement option (e.g., 882) are displayed (e.g., as shown in FIG. 8AI). In some embodiments, in accordance with a determination that the fifth input does not meet the acknowledgement tally reveal criteria, maintaining display of the message region and the plurality of acknowledgements without displaying the subset of the plurality of acknowledgements that correspond to the message region.

In some embodiments, the conversation transcript (e.g., 804) includes (2256) a message region (e.g., 852) with content (e.g., 808) that is hidden by a screen (e.g., 852), e.g., as illustrated in FIGS. 8S-8X. In some embodiments, the screen (e.g., 852) indicates that the message region (e.g., 852) contains a hidden message (e.g., 808). The device detects (2258) a sixth input by a contact (e.g., as indicated by focus selector 860) at a location of the touch-sensitive surface that corresponds to the message region (e.g., 852) with hidden content. In response to detecting the sixth input, in accordance with a determination that the sixth input meets message reveal criteria that include a criterion that is met when a characteristic intensity of the contact satisfies a second intensity threshold (e.g., contact detection intensity threshold $IT_0$ or light press intensity threshold $IT_L$), the device (2260): ceases to display at least a portion of the screen (e.g., as indicated in FIG. 8T) and displays (in the message region 852) at least a portion of the content 808 that was hidden. In some embodiments, in accordance with a determination that the sixth input does not meet the message reveal criteria, the device forgoes display of the portion of the content that was hidden.

In some embodiments, an area of the portion of the screen varies (2262) based on the characteristic intensity of the contact (e.g., the area of the screen 854 diminishes as the characteristic intensity of the contact increases, as illustrated at FIG. 8T-8W). In some embodiments, the screen (e.g., 854) diminishes in a location that corresponds to a location of the contact (e.g., as indicated by focus selector 860) with the touch-sensitive surface (e.g., 112). In some embodiments, the sixth input includes movement of the contact along a path from a first location in the message region to a second location in the message region, and the screen includes virtual particles which disperse from the path.

In some embodiments, the device detects (2264) a seventh input (e.g., a continuation of the sixth input); and in response to detecting the seventh input, in accordance with a determination that the seventh input meets full message reveal criteria that include a criterion that is met when a characteristic intensity of the contact (e.g., as indicated by focus selector 860) satisfies a third intensity threshold (e.g., a threshold that is distinct from the second intensity threshold, such as a deep press intensity threshold $IT_D$, as indicated by intensity meter 814 of FIG. 8W), the device (2266): outputs, with one or more tactile output generators of the electronic device, a tactile output, e.g., as indicated at 864. In some embodiments, the full message is displayed and/or the screen is fully removed (e.g., as shown in FIG. 8W). In some embodiments, in accordance with a determination that the seventh input does not meet the full message reveal criteria, the device forgoes outputting the tactile output that corresponds to the seventh input.

In some embodiments, the device varies (2268) an extent of a blurring effect applied to at least a part of the messaging interface (e.g., 802) (e.g., blurring the display except for the affordance for sending the message 810, the message input area 806, and/or the plurality of message impact effect options, e.g., as indicated at FIGS. 8D-8E) based on the characteristic intensity of the contact in the first input (e.g., elements of the user interface other than the draft message and the send affordance are blurred or otherwise obscured dynamically such that the amount of blurring or obscuring increases gradually as the characteristic intensity of the contact increases and the amount of blurring or obscuring decreases gradually as the characteristic intensity of the contact decreases).

It should be understood that the particular order in which the operations in FIGS. 22A-22G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2200 described above with respect to FIGS. 22A-22G. For example, the contacts, gestures, user interface objects, tactile outputs, intensity thresholds, focus selectors, and animations described above with reference to method xxx optionally have one or more of the characteristics of the contacts, gestures, user interface objects, tactile outputs, intensity thresholds, focus selectors, and animations described herein with reference to other methods described herein. For brevity, these details are not repeated here.

In accordance with some embodiments, FIG. 23 shows a functional block diagram of an electronic device 2300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 23 are, optionally, combined or separated into sub-blocks to implement the principles of the various described embodiments. Therefore, the description herein optionally supports any possible combination or separation or further definition of the functional blocks described herein.

As shown in FIG. 23, an electronic device 2300 includes a display unit 2302, a touch-sensitive surface unit 2304, one or more sensor units 2306; and a processing unit 2310 coupled with the display unit 2302, the touch-sensitive surface unit 2304 and the one or more sensor units 2306. In some embodiments, the electronic device includes one or more tactile output generator units 2308 and the processing unit 2310 is coupled with the display unit 2302, the touch-sensitive surface unit 2304, the one or more sensor units 2306 and the one or more tactile output generator units 2308. In some embodiments, the processing unit 2310 includes: a display enabling unit 2312, a detecting unit 2314, a determining unit 2316, a sending unit 2318, an outputting unit 2320, an applying unit 2322, and a varying unit 2324.

The processing unit 2310 is configured to enable display (e.g., with the display enabling unit 2312) of, on the display unit 2302, a messaging interface that includes a conversation transcript and a message input area, where the message input area includes an affordance for sending a message. While the message input area contains message content, the processing unit 2310 is configured to detect (e.g., with the detecting unit 2314) a first input by a contact at a location of the touch-sensitive surface unit 2304 that corresponds to the affordance for sending the message. The processing unit 2310 is configured to determine (e.g., with the determining unit 2316) a characteristic intensity of the contact in the first input. In response to detecting the first input, the processing unit 2310 is configured to: in accordance with a determination that the first input meets send criteria, wherein the send criteria do not require that a characteristic intensity of the contact meet a first intensity threshold in order for the send criteria to be met, initiate sending the message content to a remote device (e.g., with sending unit 2318); and, in accordance with a determination that the contact meets message impact criteria, wherein the message impact criteria required that the characteristic intensity of the contact meet the first intensity threshold in order for the message impact criteria to be met, enable display (e.g., with the display enabling unit 2312) of a plurality of message impact effect options for changing an animation that is displayed when the message is received at the remote device. While displaying the plurality of message impact effect options, the processing unit 2310 is configured to detect (e.g., with the detecting unit 2314) a second input by a contact to send the message content with a selected message impact effect option of the plurality of impact effect options. In response to detecting the second input, in accordance with a determination that the second input was received at a location on the touch-sensitive surface unit 2304 that corresponds to a first message impact effect option of the plurality of impact effect options, the processing unit is configured to initiate sending (e.g., with the sending unit 2318), to the remote device, the message content with the first message impact effect option.

FIGS. 24A1-24A3 are flow diagrams illustrating a method 2400A of displaying intensity-reactive and intensity-nonreactive user interface objects in accordance with some embodiments. The method 2400A is performed (2402) at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2400A are, optionally, combined and/or the order of some operations is, optionally, changed.

The device displays (2402), on the display, a user interface (e.g., user interface 900, FIG. 9A1, or user interface 902, FIG. 9B1) that includes a plurality of activatable objects, including a first activatable object with a first visual appearance (e.g., messages icon 902, FIG. 9A1, or e-mail message 930, FIG. 9B1).

The device is configured to (2404), for intensity-reactive activatable objects (e.g., messages icon 902, FIG. 9A1, or electronic mail object 930, FIG. 9B1), perform (2406) operations corresponding to the intensity-reactive activatable objects based on characteristic intensities of inputs on the touch-sensitive surface that correspond to the intensity-reactive activatable objects, such that when a characteristic intensity of a contact that is providing input that corresponds to a respective intensity-reactive activatable object on the touch-sensitive surface meets intensity-based activation criteria (e.g., an intensity threshold such as $IT_L$, FIGS. 9A15 and 9B5), an operation corresponding to the respective intensity-reactive activatable object is performed as a result of the characteristic intensity of the contact meeting the intensity-based activation criteria (e.g., a quick actions menu 914, FIG. 9A15, or a preview of e-mail message 930, FIG. 9B5, is displayed).

In some embodiments, the intensity-reactive activatable objects cause operations driven based on the intensity of the contact, such as the display of a hint animation, a quick action menu, or a peek platter (e.g., quick actions menu 914, FIG. 9A15, or peek platter of e-mail message 930, FIG. 9B5). In some embodiments, when a characteristic intensity of a contact that is providing input that corresponds to a respective intensity-reactive activatable object on the touch-sensitive surface meets intensity-based activation criteria, an appearance of the respective intensity-reactive activatable object is transformed based on the change in characteristic intensity of the contact.

The device is configured to (2404), for intensity-nonreactive activatable objects (2408), perform operations corresponding to the intensity-nonreactive activatable objects without regard to whether inputs on the touch-sensitive surface that correspond to the intensity-nonreactive activatable objects meet the intensity-based activation criteria, such that when a characteristic intensity of a contact that is providing input that corresponds to a respective intensity-nonreactive activatable object on the touch-sensitive surface meets the intensity-based activation criteria, an operation corresponding to the respective intensity-nonreactive activatable object is not performed as a result of the characteristic intensity of the contact meeting the intensity-based activation criteria. For example, as shown in FIG. 9A2-9A7, for intensity-nonreactive weather icon 904, displaying the weather application, FIG. 9A7, is performed upon liftoff of user input 910 without regard to whether user input 910 meets one or more intensity thresholds $IT_H$, $IT_L$, or $IT_D$.

For example, in some embodiments, the satisfaction of the intensity-based activation criteria is ignored when determining whether or not to perform an operation corresponding to the intensity-nonreactive activatable object, and other activation criteria are used instead, such as whether liftoff of the contact was detected without more than a threshold amount of movement, and/or whether liftoff of the contact was detected within a threshold amount of time from detecting touchdown of the contact. In some embodiments, intensity-nonreactive activatable objects do not cause operations driven based on the intensity of the contact, such as the display of a hint animation, a quick action menu, or a peek platter. In some embodiments, when a characteristic intensity of a contact that is providing input that corresponds to a respective intensity-nonreactive activatable object on the touch-sensitive surface meets the intensity-based activation criteria, an appearance of the respective intensity-nonreactive activatable object is not transformed based on the change in the characteristic intensity of the contact.

While displaying the user interface on the display, the device detects (2410) an input (e.g., user input 912, FIG. 9A12, or user input 915, FIG. 9B2) that corresponds to a request to select the first activatable object (e.g., messages icon 902, FIG. 9A12, or e-mail message 930, FIG. 9B2) in the plurality of activatable objects, wherein a characteristic intensity of the input (e.g., as shown in user input intensity graph 906, FIG. 9A12, or user input intensity graph 906, FIG. 9B2) fails to meet the intensity-based activation criteria during the input (e.g., the contact that performed the input maintains an intensity that is below the respective intensity threshold, e.g., $IT_H$, during the input).

In some embodiments, the device is configured (2412) to change an appearance of intensity-reactive activatable objects using a respective transformation (e.g., a first portion of a hint state) of the activatable objects, wherein the respective transformation is adjusted dynamically as the characteristic intensity of the contact on the touch-sensitive surface changes through a range of intensity values up to a threshold intensity value (e.g., a "hint" threshold (e.g., $IT_H$)).

In some embodiments, for intensity-reactive activatable objects (e.g., messages icon 902, FIG. 9A12, or e-mail message 930, FIG. 9B2), the operations include (2414) displaying a preview of related content (e.g., quick actions menu 914, FIG. 9A15, or peek platter of e-mail message 930, FIG. 9B5) for a respective intensity-reactive activatable object as a result of the characteristic intensity of the contact meeting the intensity-based activation criteria (e.g., a "hint" threshold such as $IT_H$); and for intensity-nonreactive activatable objects, the operations do not include displaying a preview of related content as a result of the characteristic intensity of the contact meeting the intensity-based activation criteria.

In response to detecting the input (e.g., user input 912, FIG. 9A12, or user input 915, FIG. 9B2) (2416), in accordance with a determination that the first activatable object is an intensity-reactive activatable object, the device displays (2418) the first activatable object with a first transformation from its first visual appearance (e.g., increasing a size of the first activatable object from its initial size, or decreasing a size of the first activatable object from its initial size, as shown in FIG. 9A12 or FIG. 9B2). Changing the appearance of intensity-reactive activatable objects by applying a first transformation provides the user with feedback about the level of intensity that is being detected by the device and provides visual feedback to the user indicating that the activatable object is intensity-reactive, and that pressing harder will cause the device to perform one or more operations associated with intensity-reactive objects. Providing improved visual feedback to the user enhances the operability of the device and makes the user-device interface more efficient (e.g., by helping the user to provide proper inputs and reducing user mistakes when operating/interacting with the device).

In some embodiments, the first transformation is (2420) an initial portion of a change in visual appearance of a respective intensity-reactive object (e.g., a hint state).

In some embodiments, an extent of the first transformation for an intensity-reactive activatable object varies (2422) based on the characteristic intensity of a contact during the input (e.g., a larger size increase or decrease for a hard tap than for a light tap and/or a larger movement in a virtual z direction for a hard tap than for a light tap).

In accordance with a determination that the first activatable object is an intensity-nonreactive activatable object, the device displays (2424) the first activatable object without displaying the first transformation (e.g., darkening the first activatable object without increasing the size of the first activatable object from its initial size, such as for weather icon 904, FIGS. 9A3-9A6).

In some embodiments, the input is (2426) a tap input (e.g., an input that meets activation criteria for the first activatable object that are capable of being met without the contact having an intensity above an intensity threshold that is part of the intensity-based activation criteria), and, in response to detecting the tap input, the device performs an activation operation that corresponds to the first activatable object (e.g., without regard to whether the object is an intensity-reactive object or an intensity-nonreactive object, such as launching weather application corresponding to weather icon 904, FIG. 9A7).

In some embodiments, the detected input that corresponds to the request to select the first activatable object is (2428) a first part of a contact with the touch-sensitive surface; the detected input that corresponds to the request to select the first activatable object is associated with a first gesture; the device detects a second part of the contact with the touch-sensitive surface (e.g., subsequent to the first part); and, in accordance with a determination that the second part of the contact is not associated with the first gesture, the device dynamically reduces display of the first transformation of the first activatable object (e.g., a first part of the contact by user input 912 is associated with a tap gesture, FIG. 9A16, a second part of the contact by user input 912 is associated with a scroll gesture, FIG. 9A17, and the first transformation of messages icon 902 is dynamically reduced from FIG. 9A16 to FIG. 9A17).

FIGS. 24B1-24B3 are flow diagrams illustrating a method 2400B of displaying intensity-reactive and intensity-nonreactive user interface objects in accordance with some embodiments. The method 2400B is performed (2452) at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2400B are, optionally, combined and/or the order of some operations is, optionally, changed.

While displaying a user interface, the device detects (2452) an input by a contact (e.g., a finger or stylus contact, such as user input 912, FIG. 9A12, or user input 915, FIG. 9B2) at a first location on the touch-sensitive surface that corresponds to a first activatable user interface object (e.g., messages icon 902, FIG. 9A12, or e-mail message 930, FIG. 9B2) on the display (e.g., display 950, Figures FIGS. 9A12 and 9B2).

In some embodiments, the displayed user interface includes (2454) a plurality of activatable user interface objects, wherein a first subset of the activatable user interface objects is intensity-reactive, and wherein a second subset of the activatable user interface objects is intensity-nonreactive.

In some embodiments, the first activatable user interface object is (2456) displayed in a list (e.g., as shown in FIG. 9B1). In some embodiments, the first activatable user interface object is (2458) displayed in an array of objects (e.g., a multi column, multi row array such as an application launch screen of a phone or tablet, as shown in FIG. 9A1).

In some embodiments, in response to detecting the input by the contact (2460), the device determines (2462) whether the first activatable user interface object is intensity-reactive.

In response to detecting the input by the contact (2460), in accordance with a determination that the first activatable user interface object is intensity-reactive (2464), the device changes a visual appearance of the first activatable user interface object (e.g., message icon 902, FIG. 9A12, or e-mail message 930, FIG. 9B2) in accordance with changes in a detected intensity of the contact on the touch-sensitive surface. In accordance with a determination that the first activatable user interface object is intensity-nonreactive, the device changes (2466) the visual appearance of the first activatable user interface object (e.g., weather icon 904, FIG. 9A3) by a predetermined amount. Changing the visual appearance of intensity-reactive activatable user interface objects in accordance with changes in a detected intensity of the contact on the touch-sensitive surface provides the user with feedback about the level of intensity that is being detected by the device and provides visual feedback to the user indicating that the activatable object is intensity-reactive, and that pressing harder will cause the device to perform one or more operations associated with intensity-reactive objects. Changing the visual appearance of intensity nonreactive activatable user interface objects by a predetermined amount provides visual feedback to the user indicating that the activable object is intensity-nonreactive, and that pressing harder will not cause the device to perform operations associated with intensity-reactive objects. Providing improved visual feedback to the user enhances the operability of the device and makes the user-device interface more efficient (e.g., by helping the user to provide proper inputs and reducing user mistakes when operating/interacting with the device).

In some embodiments, changing the visual appearance of the first activatable user interface object in accordance with the detected intensity of the contact includes (2468) changing a brightness of the first activatable user interface object in accordance with the detected intensity of the contact; and changing a size of the first activatable user interface object in accordance with the detected intensity of the contact (e.g., e-mail message 930, FIG. 9B2).

In some embodiments, changing the size of the first activatable user interface object in accordance with the detected intensity of the contact includes (2470) increasing the size of the first activatable user interface object (e.g., displaying movement of the first activatable user interface object upwards in a virtual z direction) in accordance with the detected intensity of the contact.

In some embodiments, changing the size of the first activatable user interface object in accordance with the detected intensity of the contact includes (2472) decreasing the size of the first activatable user interface object (e.g., displaying movement of the first activatable user interface object downwards in a virtual z direction) in accordance with the detected intensity of the contact (e.g., messages icon 902, FIG. 9A12, or e-mail message 930, FIG. 9B2).

In some embodiments, the first activatable user interface object occupies (2474) a first area prior to changing its size, and, in accordance with the determination that the first activatable user interface object is intensity-reactive, the device displays a platter that occupies the first area and that is displayed behind the first activatable user interface object, wherein the platter is visible as the size of the first activatable user interface object is decreased (e.g., as shown with respect to messages icon 902, FIG. 9A12).

In some embodiments, detecting the input by the contact at the first location on the touch-sensitive surface includes (2476) detecting the contact hovering over the touch-sensitive surface at the first location (e.g., user input 912, FIG. 9A11), wherein the first location corresponds to the first activatable user interface object, and, in response to detecting the input by the contact, in accordance with the determination that the first activatable user interface object is intensity-reactive, and while the contact is hovering over the touch-sensitive surface at the first location, the device performs a preview operation that includes changing the visual appearance of the first activatable user interface object (e.g., displays a beginning of a tap animation before touchdown, as shown in FIG. 9A11 with respect to messages icon 902).

In some embodiments, changing the visual appearance of the first activatable user interface object by a predetermined amount includes (2478) changing a brightness of the first activatable user interface object by a predetermined amount that is independent of the detected intensity of the contact; and maintaining a size of the first activatable user interface object (e.g., weather icon 904, FIGS. 9A3-9A6).

In some embodiments, in accordance with the determination that the first activatable user interface object is intensity-reactive (2480), the device blurs and shrinks the user interface excluding the first activatable user interface object, in accordance with the detected intensity (e.g., FIGS. 9A13-9A15 illustrate increasing degrees of blurring of user interface 900 excluding intensity-reactive messages icon 902), and in accordance with the determination that the first activatable user interface object is intensity-nonreactive, the device displays the user interface without blurring and shrinking the user interface (e.g., FIGS. 9A3-9A6 illustrate that user interface 900 is not blurred with respect to intensity-nonreactive weather icon 904).

In accordance with some embodiments, FIG. 25 shows a functional block diagram of an electronic device 2500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 2500 may be combined or separated into sub-blocks to implement the principles of the invention as described above. Therefore, the description herein may support any possible combination or separation or further definition of the functional blocks described herein.

As shown in FIG. 25, an electronic device 2500 includes a display unit 2502 configured to display a user interface; a touch-sensitive surface unit 2504 configured to receive user inputs; one or more sensor units 2506 configured to detect intensities of contacts with the touch-sensitive surface unit; and a processing unit 2508 coupled to the display unit, the touch-sensitive surface unit and the one or more sensor units. In some embodiments, the processing unit 2508 includes a display enabling unit 2510, an operation performing unit 2512, a detecting unit 2514, and a transformation unit 2516.

The processing unit is configured to: enable display, on the display unit 2502, of a user interface that includes a plurality of activatable objects (e.g., with the display enabling unit 2510), including a first activatable object with a first visual appearance, wherein the processing unit is configured to: for intensity-reactive activatable objects, perform operations corresponding to the intensity-reactive activatable objects based on characteristic intensities of inputs on the touch-sensitive surface unit that correspond to the intensity-reactive activatable objects (e.g., with the operation performing unit 2512), such that when a characteristic intensity of a contact that is providing input that corresponds to a respective intensity-reactive activatable object on the touch-sensitive surface unit meets intensity-based activation criteria, an operation corresponding to the respective intensity-reactive activatable object is performed as a result of the characteristic intensity of the contact meeting the intensity-based activation criteria; and for intensity-nonreactive activatable objects, perform operations corresponding to the intensity-nonreactive activatable objects without regard to whether inputs on the touch-sensitive surface unit that correspond to the intensity-nonreactive activatable objects meet the intensity-based activation criteria (e.g., with the operation performing unit 2512), such that when a characteristic intensity of a contact that is providing input that corresponds to a respective intensity-nonreactive activatable object on the touch-sensitive surface unit meets the intensity-based activation criteria, an operation corresponding to the respective intensity-nonreactive activatable object is not performed as a result of the characteristic intensity of the contact meeting the intensity-based activation criteria; while the user interface is displayed on the display unit, detect an input that corresponds to a request to select the first activatable object in the plurality of activatable objects (e.g., with the detecting unit 2514), wherein a characteristic intensity of the input fails to meet the intensity-based activation criteria during the input; and, in response to detecting the input: in accordance with a determination that the first activatable object is an intensity-reactive activatable object, enable display of the first activatable object (e.g., with the display enabling unit 2510) with a first transformation from its first visual appearance (e.g., with the transformation unit 2516); and, in accordance with a determination that the first activatable object is an intensity-nonreactive activatable object, enable display of the first activatable object without displaying the first transformation (e.g., with the display enabling unit 2510).

Figure 26:
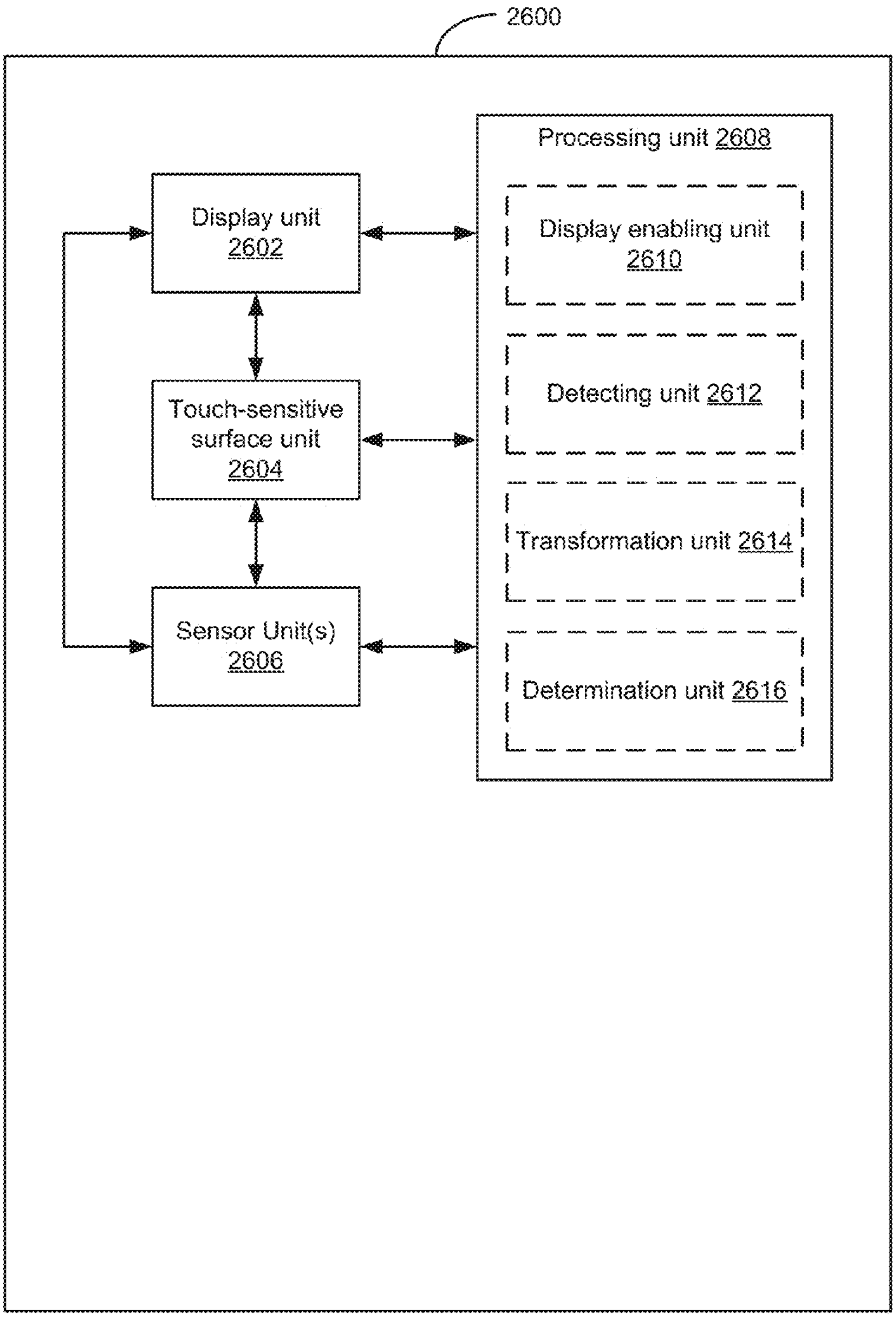
FIG. 26 is a functional block diagram of an electronic device in accordance with some embodiments.

In accordance with some embodiments, FIG. 26 shows a functional block diagram of an electronic device 2600 configured in accordance with the principles of the invention as described above. The functional blocks of the device may be implemented by hardware, software, or a combination of hardware and software to carry out the principles of the invention. It is understood by persons of skill in the art that the functional blocks described in FIG. 2600 may be combined or separated into sub-blocks to implement the principles of the invention as described above. Therefore, the description herein may support any possible combination or separation or further definition of the functional blocks described herein.

As shown in FIG. 26, an electronic device 2600 includes a display unit 2602 configured to display a user interface; a touch-sensitive surface unit 2604 configured to receive user inputs; one or more sensor units 2606 configured to detect intensities of contacts with the touch-sensitive surface unit; and a processing unit 2608 coupled to the display unit, the touch-sensitive surface unit and the one or more sensor units. In some embodiments, the processing unit 2608 includes a display enabling unit 2610, a detecting unit 2612, a transformation unit 2614, and a determination unit 2616.

The processing unit is configured to: while a user interface is displayed, detect an input by a contact at a first location on the touch-sensitive surface unit that corresponds to a first activatable user interface object on the display unit (e.g., with the detecting unit 2612); and, in response to detecting the input by the contact: in accordance with a determination that the first activatable user interface object is intensity-reactive, change a visual appearance of the first activatable user interface object in accordance with changes in a detected intensity of the contact on the touch-sensitive surface unit (e.g., with the transformation unit 2614); and, in accordance with a determination that the first activatable user interface object is intensity-nonreactive, change the visual appearance of the first activatable user interface object by a predetermined amount (e.g., with the transformation unit 2614).

FIGS. 27A1-27A5 are flow diagrams illustrating a method 2700A of displaying intensity-reactive and intensity-nonreactive user interface objects in accordance with some embodiments. The method 2700A is performed (2702) at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2700A are, optionally, combined and/or the order of some operations is, optionally, changed.

The device displays (2702) a user interface that includes a plurality of activatable user interface objects.

While displaying the user interface, the device detects (2704) a first portion of an input by a contact (e.g., user input 912, FIG. 9A12, or user input 915, FIG. 9B2) at a first location on the touch-sensitive surface that corresponds to a first user interface object on the display (e.g., messages icon 902, FIG. 9A12, or e-mail message 930, FIG. 9B2).

In response to detecting the first portion of the input, the device changes (2706) a visual appearance of the first user interface object by applying a first visual transformation to the first user interface object (e.g., darkening the first user interface object to provide an indication that a selection and/or activation operation corresponding to the first user interface object will be performed in response to detecting liftoff of the contact from the touch-sensitive surface if no other gesture performed with the contact is detected prior to detecting liftoff of the contact from the touch sensitive surface, as shown with respect to e-mail message 930, FIG. 9B2, or shrinking the first user interface object as shown with respect to messages icon 902, FIG. 9A12). The first visual transformation corresponds (2708) to a first user interface operation (e.g., a tap to select and/or activate the first user interface object). Changing the visual appearance of user interface objects using the first visual transformation corresponding to a first user interface operation provides the user with feedback regarding which user interface operation will be performed if the remainder of the input is consistent with the first user interface operation. Providing improved visual feedback to the user enhances the operability of the device and makes the user-device interface more efficient (e.g., by helping the user to provide proper inputs and reducing user mistakes when operating/interacting with the device).

After changing the visual appearance of the first user interface object by applying the first visual transformation to the first user interface object, the device detects (2710) a second portion of the input (e.g., a continuation of the input that includes a change in one or more parameters of a contact that performed the first input while the contact is continuously detected on the touch-sensitive surface).

In response to detecting the second portion of the input (2712), in some embodiments, in accordance with a determination that the second portion of the input is consistent with the first user interface operation (2714), the device dynamically reduces the first transformation prior to performing the first user interface operation (e.g., FIGS. 9A21-9A22 illustrate that the first transformation of messages icon 902 is dynamically reduced upon liftoff of the contact by user input 912).

In accordance with a determination that the second portion of the input is consistent with the first user interface operation, the device performs (2716) the first user interface operation (e.g., in response to liftoff of the contact). For example, in some embodiments, for a tap input, the device selects and/or activates the object, typically without dynamically reducing the first visual transformation as a first parameter gradually changes.

In accordance with a determination that the second portion of the input includes a gradual change in a first parameter (e.g., a dynamic change in the intensity of a contact in the input through a plurality of intensity values or a dynamic change in the location of a contact in the input through a plurality of positions across the touch-sensitive surface, as shown for example in FIGS. 9B3-9B4) that is indicative of performance of a second user interface operation (e.g., a press harder to peek, FIGS. 9B3-9B4, or a drag gesture to scroll), the device dynamically reduces (2718) the first visual transformation (e.g., as shown for e-mail message 930, FIG. 9B2) as the first parameter gradually changes (e.g., by gradually increasing or decreasing the shading of the user interface object as the intensity of the contact on the touch-sensitive surface increases or as the location of the contact on the touch-sensitive surface changes) without performing the first user interface operation. For example, FIGS. 9B3-9B4 illustrate that the shading of e-mail message 930 is gradually decreased as the intensity of the contact by user input 915 increases as shown in user input intensity graph 906. Dynamically reducing the first transformation without performing the first user interface operation if the second portion of the input includes a gradual change in the first parameter that is indicative of performance of a second user interface operation allows a user input to transition between possible operations to be performed in accordance with changes in the input and provides the user with feedback that a different user interface operation may performed in accordance with further changes in the input. Providing the ability to transition between possible operations to be performed and providing improved visual feedback to the user enhances the operability of the device and makes the user-device interface more efficient (e.g., by helping the user to provide proper inputs and reducing user mistakes when operating/interacting with the device).

In some embodiments, after dynamically reducing the first visual transformation in accordance with a determination that the second portion of the input includes a gradual change in the first parameter that is indicative of performance of the second user interface operation, the device detects (2720) a third portion of the input; in response to detecting the third portion of the input, and in accordance with a determination that the third portion of the input is consistent with the first user interface operation, the device changes the visual appearance of the first user interface object by reapplying the first visual transformation (and, in some embodiments, dynamically reduces the second visual transformation) and performs the first user interface operation (e.g., in response to liftoff of the contact). For example, FIGS. 9A16-9A18 illustrate dynamically reducing the first visual transformation in accordance with a determination that the second portion of user input 912 includes a gradual change in lateral displacement that is indicative of scrolling, and FIGS. 9A18-9A20 illustrate that, in response to detecting a third portion of user input 912, and in accordance with a determination that the third portion of user input 912 is consistent with an activation operation, the first visual transformation is reapplied and the second visual transformation is dynamically reduced. Dynamically reapplying the first transformation and optionally dynamically reducing the second transformation in accordance with the third portion of the input being consistent with the activation operation allows a user input to transition between possible operations to be performed in accordance with changes in the input and provides the user with feedback regarding which operation may performed in accordance with changes in the input. Providing the ability to transition between possible operations to be performed and providing improved visual feedback to the user enhances the operability of the device and makes the user-device interface more efficient (e.g., by helping the user to provide proper inputs and reducing user mistakes when operating/interacting with the device).

In some embodiments, the device changes (2722) the visual appearance of the first user interface object by applying a second visual transformation to the first user interface object, in conjunction with dynamically reducing the first visual transformation as the first parameter gradually changes.

In some embodiments, the gradual change in the first parameter includes (2724) an increase in intensity of the contact, and the second visual transformation includes changing a size of the first user interface object in accordance with the increase in intensity of the contact (e.g., messages icon 902, FIGS. 9A13-9A14, or e-mail message 930, FIG. 9B3-9B4).

In some embodiments, the gradual change in the first parameter includes (2726) an increase in intensity of the contact, and the second visual transformation includes blurring and shrinking a portion of the user interface, other than the first user interface object, in accordance with the increase in intensity of the contact (e.g., user interface 900, FIGS. 9A13-9A14, or user interface 900, FIG. 9B3-9B4).

In some embodiments, the gradual change in the first parameter includes (2728) lateral movement of the contact, and the second visual transformation includes changing a position of the first user interface object on the display (e.g., scrolling the first user interface object and other user interface objects on the display when the second portion of the input is a drag or swipe gesture, as shown in FIGS. 9A17-9A18 with respect to messages icon 902).

In some embodiments, the device changes (2730) the visual appearance of the first user interface object by applying a second visual transformation to the first user interface object after the first visual transformation has been dynamically reduced by a predefined amount.

In some embodiments, in accordance with a determination that the second portion of the input includes a gradual change in a second parameter (e.g., through a plurality of values) that is indicative of performance of a third user interface operation (e.g., pan to scroll content), the device changes (2732) the visual appearance of the first user interface object by applying a third visual transformation as the second parameter gradually changes (e.g., by gradually increasing or decreasing a size of the user interface object as the amount of movement of the contact on the touch-sensitive surface changes).

In some embodiments, the gradual change in the second parameter includes (2734) lateral movement of the contact, and the third visual transformation includes changing a position of the first user interface object on the display in accordance with the lateral movement of the contact (e.g., as shown in FIGS. 9A17-9A18 with respect to messages icon 902.

In some embodiments, in accordance with a determination that the second portion of the input includes a gradual change in a third parameter (e.g., through a plurality of values) that is indicative of performance of a fourth user interface operation (e.g., press longer to enter an icon reconfiguration mode), the device changes (2736) the visual appearance of the first user interface object by applying a fourth visual transformation as the third parameter gradually changes (e.g., by gradually darkening the user interface object the longer the contact is maintained without changing the pressure or scrolling, as shown in FIG. 9A24 with respect to messages icon 902).

In some embodiments, the gradual change in the third parameter includes (2738) an increase in a duration of maintaining the contact on the touch-sensitive surface (e.g., satisfying time threshold $T_H$ but not time threshold $T_{LP}$ as shown in user input intensity graph 906, FIG. 9A24) with no more than a threshold amount of lateral movement (e.g., $D_t$ as shown in user input lateral displacement graph 908, FIG. 9A24) and with no more than a threshold amount of change in intensity (e.g., $IT_H$ as shown in user input intensity graph 906, FIG. 9A24), and the fourth visual transformation includes changing at least one of a shading and a color of the first user interface object in accordance with the increasing duration of the contact being maintained on the touch-sensitive surface (e.g., as shown in FIG. 9A24 with respect to messages icon 902).

In some embodiments, after changing the visual appearance of the first user interface object by applying the fourth visual transformation (2740), the device detects a change in a respective parameter other than the third parameter (e.g., either the first parameter or the second parameter), and, in accordance with a determination that the change in the respective parameter satisfies a respective threshold, dynamically reduces the fourth visual transformation as the respective parameter changes. For example, FIG. 9A25 illustrates detecting a change in contact intensity of user input 913, as shown in user input intensity graph 906, and, in accordance with a determination that the change in the contact intensity of user input 913 satisfies the first intensity threshold $IT_H$, the fourth visual transformation (e.g., darkening of messages icon 902) is dynamically reduced as the contact intensity changes.

In some embodiments, the input is a first input (2742), the first user interface object is an intensity-reactive object, and, while displaying the user interface, the device detects a first portion of a second input by a contact at a second location (e.g., user input 911, FIG. 9A8) on the touch-sensitive surface that corresponds to a second user interface object (e.g., weather icon 904, FIG. 9A8) on the display (e.g., display 950, FIG. 9A8), wherein the second user interface object is an intensity-nonreactive object. In some embodiments, in response to detecting the first portion of the second input, the device changes a visual appearance of the second user interface object by applying a fifth visual transformation to the second user interface object (e.g., darkening weather icon 904, FIG. 9A8), wherein the fifth visual transformation corresponds to a fifth user interface operation (e.g., the fifth user interface operation is the same as the first operation and is a tap to select). In some embodiments, after changing the visual appearance of the second user interface object by applying the fifth visual transformation to the second user interface object, the device detects a second portion of the second input (e.g., user input 911 as shown in FIG. 9A9). In some embodiments, in response to detecting the second portion of the second input, in accordance with a determination that the second portion of the second input includes a change in a fourth parameter (e.g., lateral displacement of user input 911, FIG. 9A9) that is indicative of performance of a sixth user interface operation, the device instantaneously changes the visual appearance of the second user interface object by removing the fifth visual transformation without regard to a gradual change in the fourth parameter (e.g., the darkening of weather icon 904 is removed, FIG. 9A9).

FIGS. 27B1-27B3 are flow diagrams illustrating a method 2700B of displaying intensity-reactive and intensity-nonreactive user interface objects in accordance with some embodiments. The method 2700B is performed (2752) at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2700B are, optionally, combined and/or the order of some operations is, optionally, changed.

The device displays (2752) a user interface (e.g., user interface 900, FIG. A1, or user interface 901, FIG. 9B1) that includes a plurality of activatable user interface objects (e.g., messages icon 902 or weather icon 904, FIG. 9A1, or e-mail message 930, FIG. 9B1).

While displaying the user interface, the device detects (2754) a first portion of an input by a contact (e.g., a finger or stylus contact, such as user input 912, FIG. 9A12, or user input 915, FIG. 9B2) at a first location on the touch-sensitive surface that corresponds to a first user interface object (e.g., messages icon 902, FIG. 9A12, or e-mail message 930, FIG. 9B2) on the display.

In response to detecting the first portion of the input by the contact (2756), the device changes a visual appearance of the first user interface object to indicate that an operation corresponding to the first user interface object will be performed in response to detecting liftoff of the contact from the touch-sensitive surface. The change in the visual appearance includes (2758) applying a first transformation to the first user interface object (e.g., the first transformation includes changing a brightness of the first user interface object from a first brightness to a second brightness, as shown in FIG. 9B2 with respect to e-mail message 930). Changing the visual appearance of user interface objects using the first transformation provides the user with feedback indicating that an operation will be performed in response to liftoff of the contact. Providing improved visual feedback to the user enhances the operability of the device and makes the user-device interface more efficient (e.g., by helping the user to provide proper inputs and reducing user mistakes when operating/interacting with the device).

The device detects (2760) a second portion of the input by the contact. The second portion of the input immediately follows (2762) the first portion of the input.

In some embodiments, the second portion of the input includes (2764) lateral movement of the contact and corresponds to a drag (e.g., scroll) gesture.

In some embodiments, the second portion of the input includes (2766) a change in detected intensity of the contact and corresponds to a stationary press gesture that meets a first intensity criterion.

In some embodiments, the second portion of the input includes (2768) continuing to maintain the contact on the touch-sensitive surface for at least a first amount of time such that a total amount of time that the contact is maintained without meeting a threshold amount of lateral movement and a first intensity criterion is greater than a first time threshold (e.g., time threshold TH as shown in user input intensity graph 906, FIG. 9A24).

In response to detecting the second portion of the input by the contact (2770), in accordance with a determination that the second portion of the input includes a gradual change in a first input parameter and corresponds to a first gesture (e.g., a drag or scroll), the device changes (2772) the visual appearance of the first user interface object by dynamically reducing the first transformation and applying a second transformation corresponding to the first gesture as the first input parameter gradually changes. For example, in some embodiments, the first input parameter includes lateral movement of the contact and corresponds to a scroll gesture, and the second transformation includes gradually changing the brightness of the first user interface object from the second brightness back to the first brightness in accordance with the lateral movement of the contact, and scrolling at least a subset of the activatable user interface objects on the display in accordance with the lateral movement of the contact with respect to the first location on the touch-sensitive surface (e.g., as shown in FIGS. 9A16-9A18 with respect to messages icon 902 and user interface 900). Dynamically reducing the first transformation and applying the second transformation corresponding to the first gesture as the first input parameter gradually changes provides the user with feedback indicating that a different operation will be performed in accordance with a different gesture being detected, and allows the user input to transition between possible operations to be performed in accordance with changes in the input. Providing improved visual feedback to the user enhances the operability of the device and makes the user-device interface more efficient (e.g., by helping the user to provide proper inputs and reducing user mistakes when operating/interacting with the device).

In accordance with a determination that the second portion of the input includes a gradual change in a second input parameter and corresponds to a second gesture (e.g., a deep press), the device changes (2774) the visual appearance of the first user interface object by dynamically reducing the first transformation and applying a third transformation corresponding to the second gesture as the second input parameter gradually changes. For example, in some embodiments, the second input parameter includes a change (e.g., increase) in intensity of the contact and corresponds to a stationary press that meets a first intensity criterion, and the third transformation includes gradually changing the brightness of the first user interface object from the second brightness to a third brightness in accordance with the detected intensity of the contact during the second portion of the input, and changing a size of the first user interface object in accordance with the detected intensity of the contact during the second portion of the input (e.g., the brightness and size of e-mail message 930 is gradually increased in accordance with the increase in contact intensity of user input 915, FIGS. 9B2-9B4). Dynamically reducing the first transformation and applying the third transformation corresponding to the second gesture as the second input parameter gradually changes provides the user with feedback indicating that a different operation will be performed in accordance with a different gesture being detected, and allows the user input to transition between possible operations to be performed in accordance with changes in the input. Providing improved visual feedback to the user enhances the operability of the device and makes the user-device interface more efficient (e.g., by helping the user to provide proper inputs and reducing user mistakes when operating/interacting with the device).

In some embodiments, the first transformation includes (2776) changing a brightness (and/or color) of the first user interface object from a first brightness to a second brightness (e.g., the second brightness (for a tap selection state) is darker or dimmer than the first brightness); the second transformation includes changing the brightness of the first user interface object from the second brightness to a third brightness (e.g., the third brightness is brighter or lighter than the second brightness, and could be the same as the first brightness) as the first parameter gradually changes (e.g., lighter for swipe or deep press); and the third transformation includes changing the brightness of the first user interface object from the second brightness to a fourth brightness (e.g., distinct from the first, second, and third brightnesses, and darker or dimmer than all the others) as the second parameter gradually changes (e.g., darker for long press).

In some embodiments, the second transformation includes (2778) increasing a size of the first user interface object (e.g., larger for swipe or long press), and the third transformation includes changing the size of the first user interface object by decreasing the size of the first user interface object during a first portion of the third transformation and increasing the size of the first user interface object during a second portion of the third transformation (e.g., smaller, then larger for a deep press). For example, in some embodiments, the second portion of the third transformation is a continuation of the third transformation subsequent to and immediately following the first portion.

In some embodiments, in accordance with a determination that the second portion of the input includes a gradual change in a third input parameter and corresponds to a third gesture (e.g., a long press), the device changes (2780) the visual appearance of the first user interface object by dynamically reducing the first transformation and applying a fourth transformation corresponding to the third gesture as the third input parameter gradually changes. For example, in some embodiments, the third input parameter includes an increase in a time duration of maintaining the contact on the touch-sensitive surface with no more than a threshold amount of lateral movement and with no more than a threshold amount of change in detected intensity, and corresponds to a stationary press gesture that does not meet the first intensity criterion, and the fourth transformation includes decreased brightness of the first user interface object (e.g., decreasing the brightness of messages icon 902, FIG. 9A24).

In some embodiments, in accordance with a determination that the second portion of the input includes a gradual change in both the first input parameter and the second input parameter, the device changes (2782) the visual appearance of the first user interface object by dynamically reducing the first transformation and applying at least a portion of the second transformation and at least a portion of the third transformation. For example, in some embodiments, a change in size for a deep press and a change in color for a long press (e.g., for a home screen) are applied (e.g., messages icon 902, FIG. 9A24). As another example, in some embodiments, a change in location for a drag gesture and a change in size for a deep press (e.g., for a table view such as in a mail application) are applied (e.g., e-mail message 930, FIG. 9B7).

Figure 28:
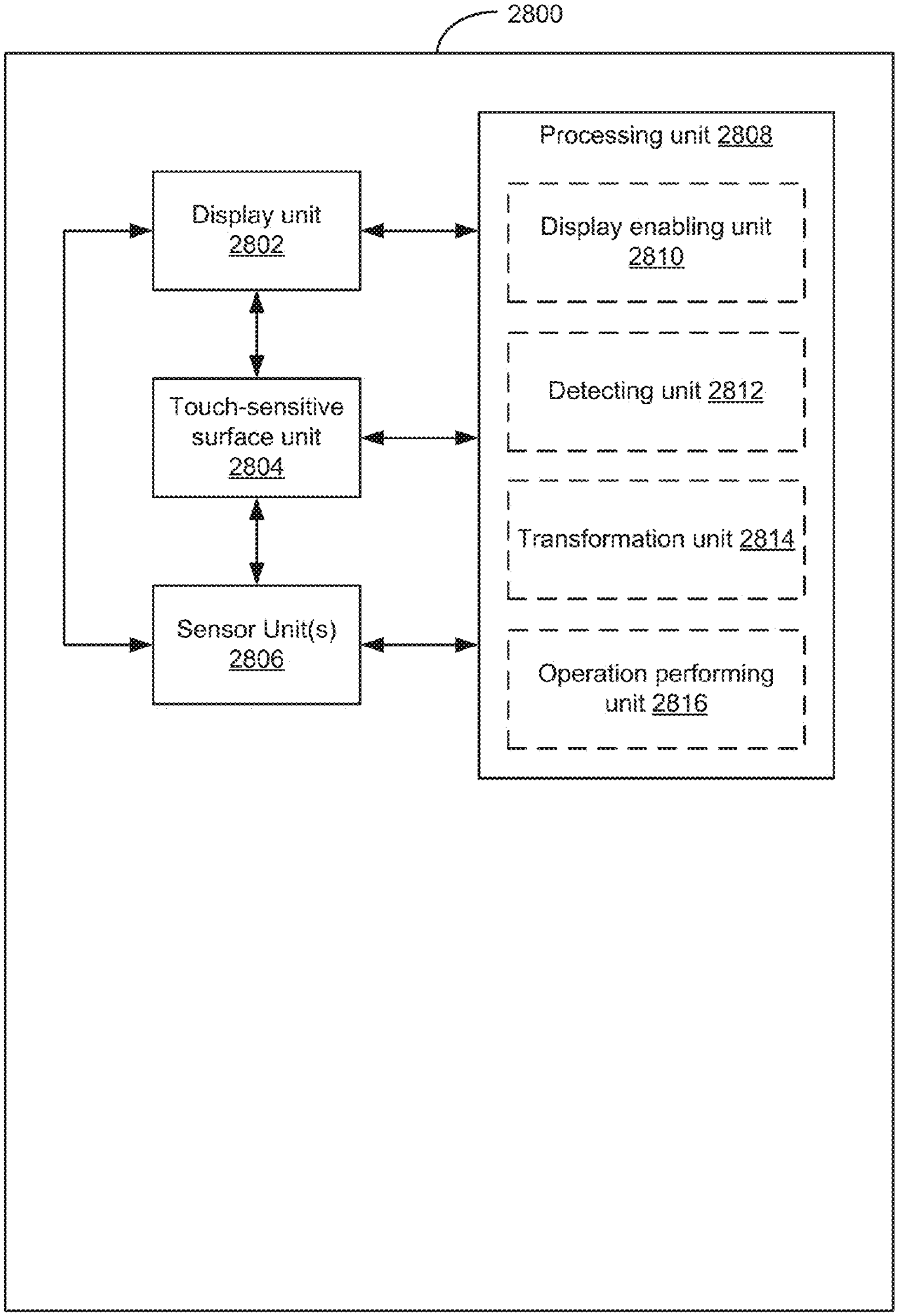
FIG. 28 is a functional block diagram of an electronic device in accordance with some embodiments.

In accordance with some embodiments, FIG. 28 shows a functional block diagram of an electronic device 2800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 2800 may be combined or separated into sub-blocks to implement the principles of the invention as described above. Therefore, the description herein may support any possible combination or separation or further definition of the functional blocks described herein.

As shown in FIG. 28, an electronic device 2800 includes a display unit 2802 configured to display a user interface that includes a plurality of activatable user interface objects; a touch-sensitive surface unit 2804 configured to receive user inputs; one or more sensor units 2806 configured to detect intensities of contacts with the touch-sensitive surface unit; and a processing unit 2808 coupled to the display unit, the touch-sensitive surface unit and the one or more sensor units. In some embodiments, the processing unit 2808 includes a display enabling unit 2810, a detecting unit 2812, a transformation unit 2814, and an operation performing unit 2816.

The processing unit is configured to: enable display of a user interface that includes a plurality of activatable user interface objects (e.g., with the display enabling unit 2810); while the user interface is displayed, detect a first portion of an input by a contact at a first location on the touch-sensitive surface unit that corresponds to a first user interface object on the display unit (e.g., with the detecting unit 2812); in response to detecting the first portion of the input: change a visual appearance of the first user interface object by applying a first visual transformation to the first user interface object (e.g., with the transformation unit 2814), wherein the first visual transformation corresponds to a first user interface operation; after changing the visual appearance of the first user interface object by applying the first visual transformation to the first user interface object, detect a second portion of the input (e.g., with the detecting unit 2812); in response to detecting the second portion of the input: in accordance with a determination that the second portion of the input is consistent with the first user interface operation, perform the first user interface operation (e.g., with the operation performing unit 2816); and in accordance with a determination that the second portion of the input includes a gradual change in a first parameter that is indicative of performance of a second user interface operation, dynamically reduce the first visual transformation as the first parameter gradually changes without performing the first user interface operation (e.g., with the transformation unit 2814).

Figure 29:
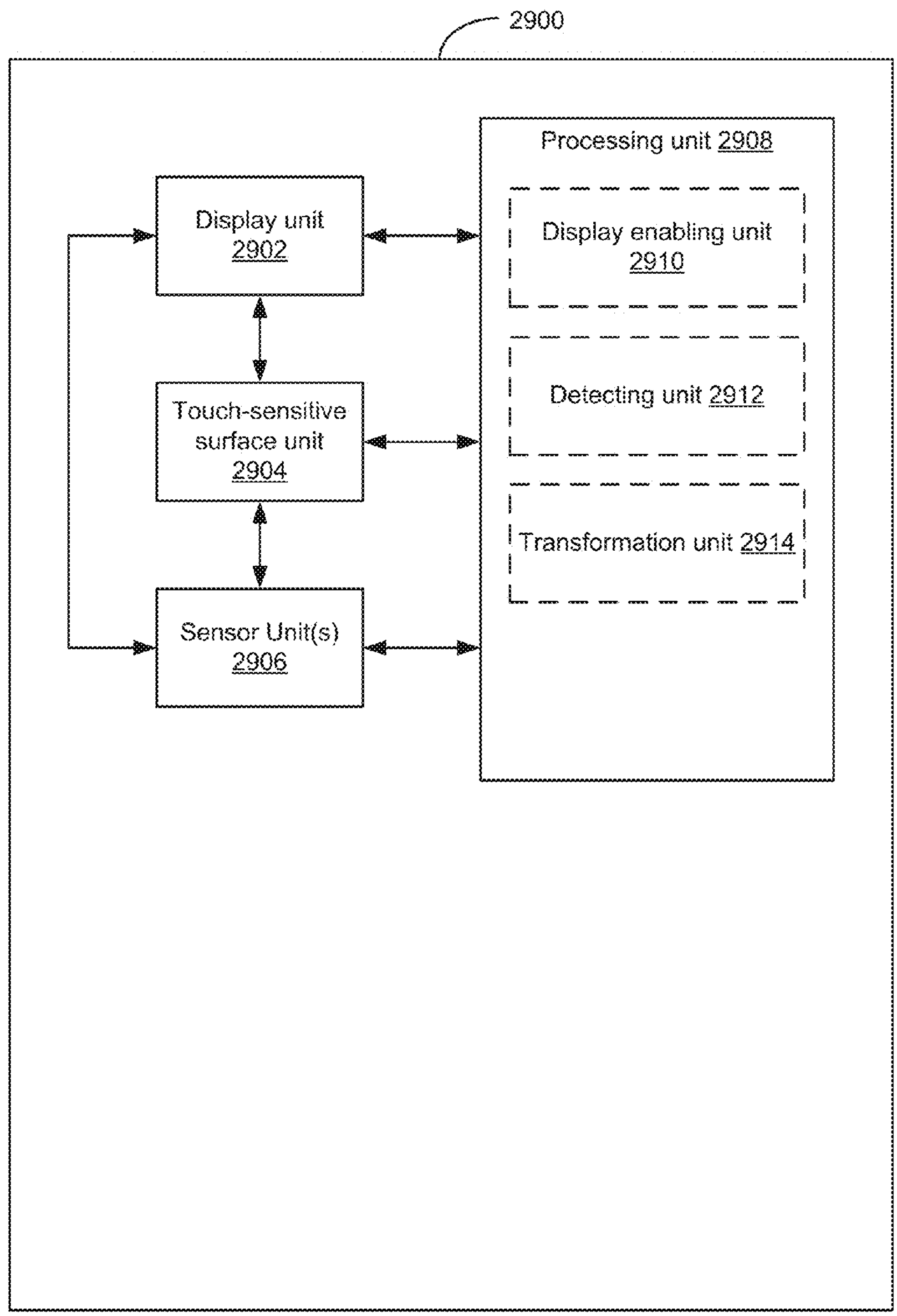
FIG. 29 is a functional block diagram of an electronic device in accordance with some embodiments.
Figure 30B:
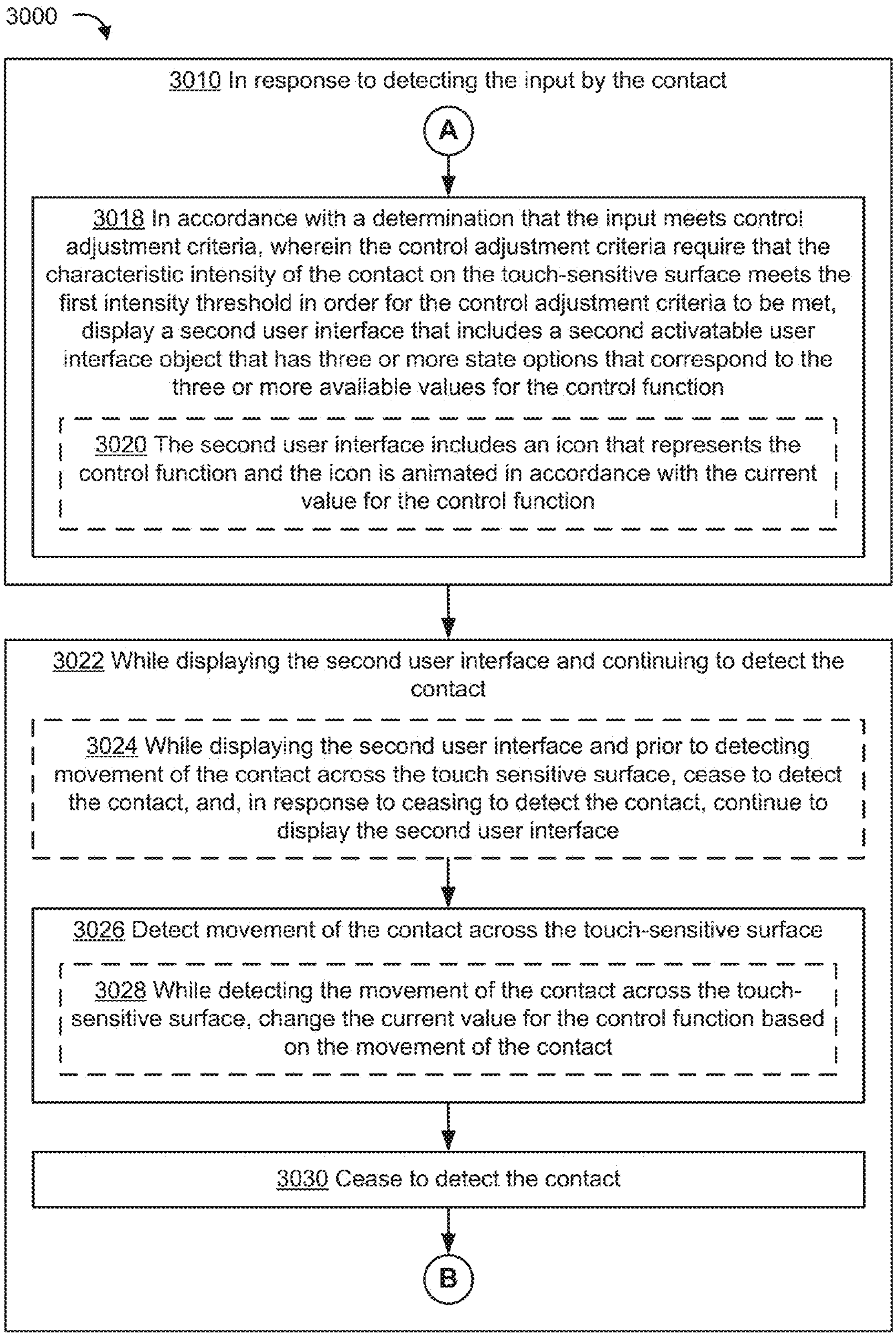
Figure 30C:
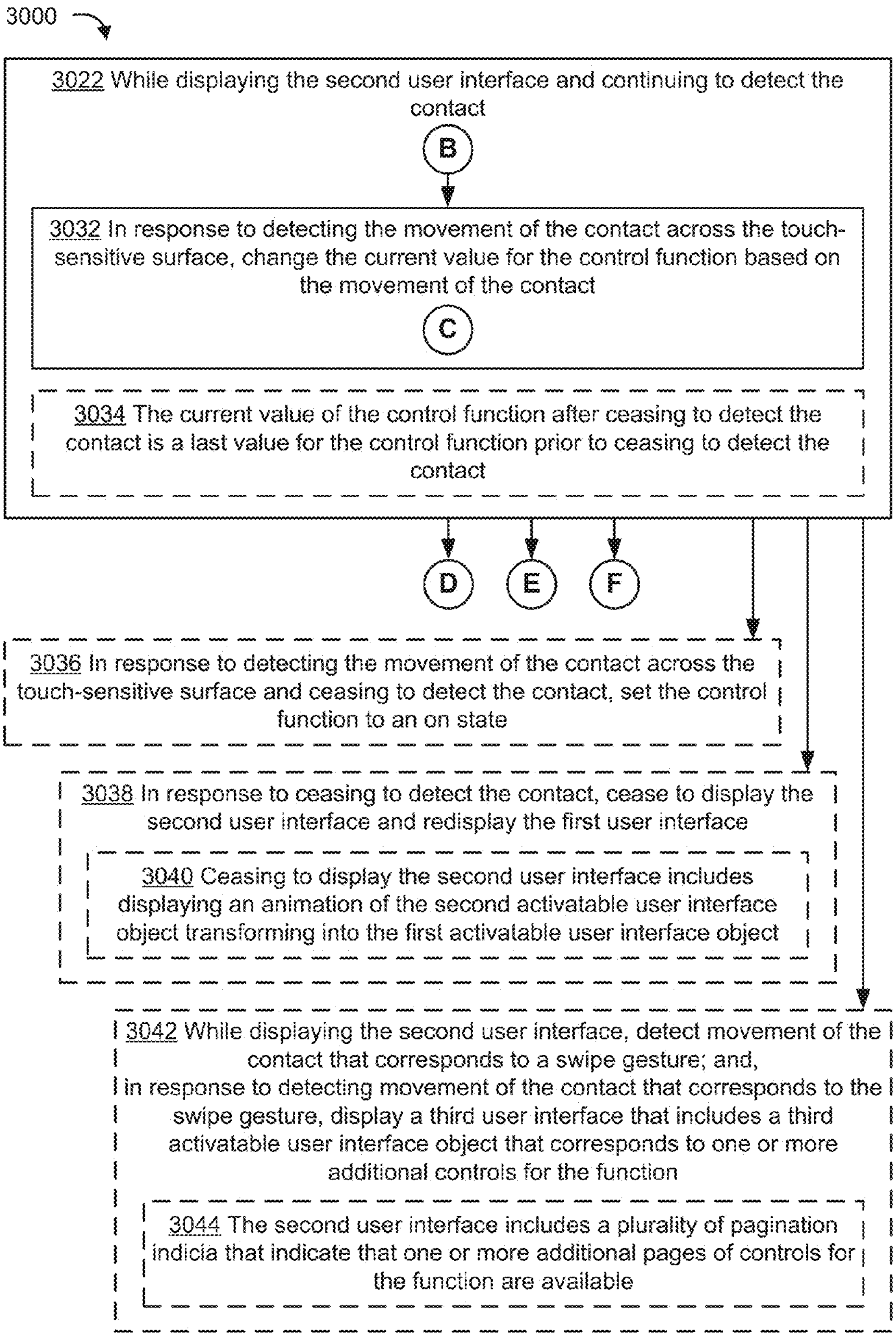
Figure 30E:
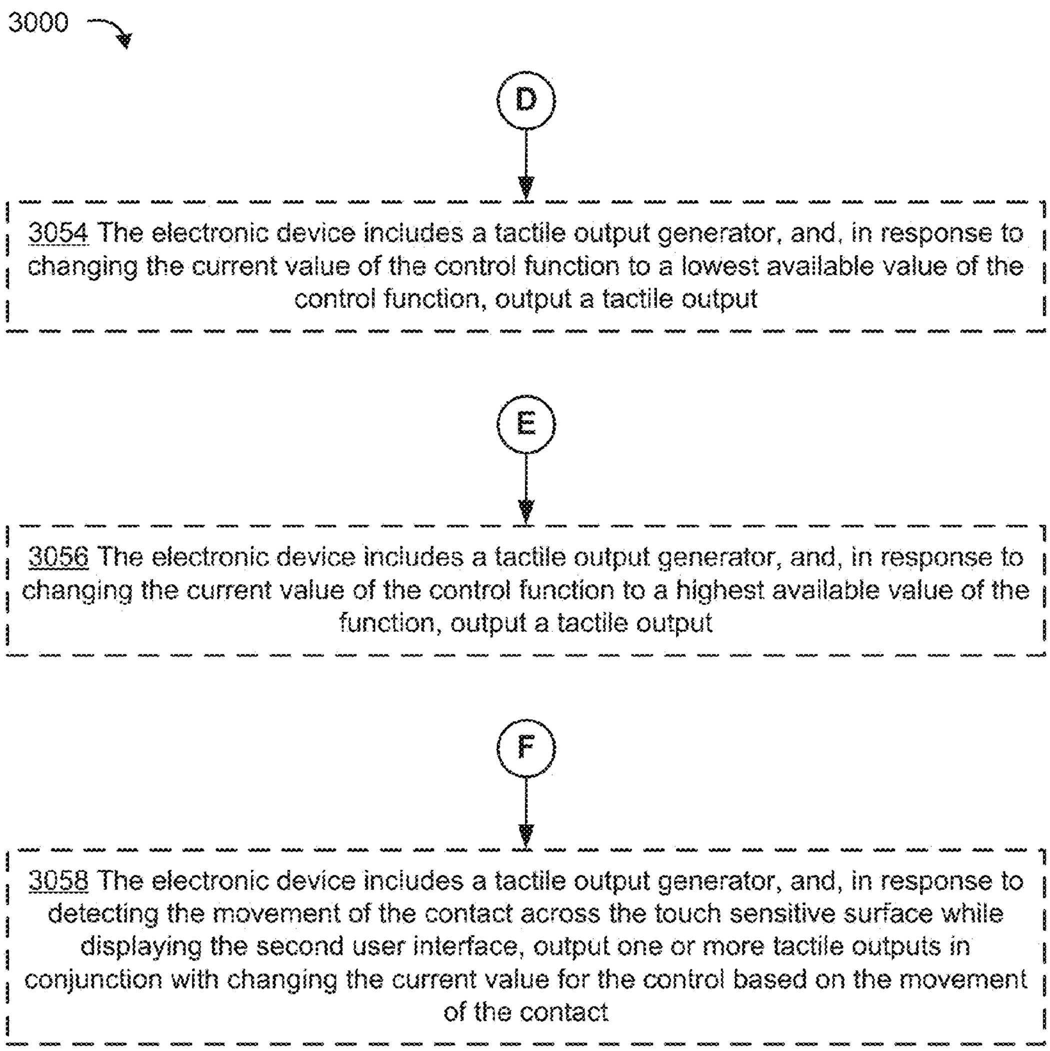

As shown in FIG. 29, an electronic device 2900 includes a display unit 2902 configured to display a user interface that includes a plurality of activatable user interface objects; a touch-sensitive surface unit 2904 configured to receive user inputs; one or more sensor units 2906 configured to detect intensities of contacts with the touch-sensitive surface unit; and a processing unit 2908 coupled to the display unit, the touch-sensitive surface unit and the one or more sensor units. In some embodiments, the processing unit 2908 includes a display enabling unit 2910, a detecting unit 2912, and a transformation unit 2914.

The processing unit is configured to: enable display of a user interface that includes a plurality of activatable user interface objects (e.g., with the display enabling unit 2910); while the user interface is displayed, detect a first portion of an input by a contact at a first location on the touch-sensitive surface unit that corresponds to a first user interface object on the display unit (e.g., with the detecting unit 2912); in response to detecting the first portion of the input by the contact: change a visual appearance of the first user interface object to indicate that an operation corresponding to the first user interface object will be performed in response to detecting liftoff of the contact from the touch-sensitive surface unit, wherein the change in the visual appearance includes applying a first transformation to the first user interface object (e.g., with the transformation unit 2914); detect a second portion of the input by the contact, wherein the second portion of the input immediately follows the first portion of the input (e.g., with the detecting unit 2912); and, in response to detecting the second portion of the input by the contact: in accordance with a determination that the second portion of the input includes a gradual change in a first input parameter and corresponds to a first gesture, change the visual appearance of the first user interface object by dynamically reducing the first transformation and applying a second transformation corresponding to the first gesture as the first input parameter gradually changes (e.g., with the transformation unit 2914); and, in accordance with a determination that the second portion of the input includes a gradual change in a second input parameter and corresponds to a second gesture, change the visual appearance of the first user interface object by dynamically reducing the first transformation and applying a third transformation corresponding to the second gesture as the second input parameter gradually changes (e.g., with the transformation unit 2914).

FIGS. 30A-30E are flow diagrams illustrating a method 3000 of displaying control settings interfaces for control functions for remote devices in accordance with some embodiments. The method 3000 is performed (3002) at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 3000 are, optionally, combined and/or the order of some operations is, optionally, changed.

The device displays (3002) a first user interface (e.g., user interface 901, FIG. 9C1) that includes a plurality of activatable user interface objects (e.g., including a plurality of virtual controls, such as remote device control affordances, for example icons 962-1 through 962-8).

While displaying the first user interface, the device detects (3004) an input by a contact at a first location (e.g., user input 954) on the touch-sensitive surface that corresponds to a first activatable user interface object on the display (e.g., a first remote device control affordance, such as lights icon 962-4, FIG. 9C2). The first activatable user interface object is (3006) associated with a control function with three or more available values. Also, a first value of the control function is (3008) selected as a current value for the control function (e.g., a temperature setting, a volume setting, a brightness setting, etc.).

In response to detecting the input by the contact (3010), in accordance with a determination that the input meets toggle criteria (3012), wherein the toggle criteria do not require that a characteristic intensity of the contact on the touch-sensitive surface meets a first intensity threshold in order for the toggle criteria to be met (e.g., the characteristic intensity of the contact remains below a light press intensity threshold $IT_L$, such as for a contact in a tap gesture), the device toggles the control function that corresponds to the first activatable user interface object between a first state that is based on the current value for the control function and a second state (e.g., by turning the control function on with the current value for a setting or turning the control function off).

In some embodiments, the toggle criteria include (3014) a criterion that is met when the characteristic intensity of the contact remains below the first intensity threshold (e.g., IT=as shown in user input intensity graph 956, FIG. 9C2). In some embodiments, the toggle criteria include (3016) a criterion that is met when the input is a tap input.

In response to detecting the input by the contact (3010), in accordance with a determination that the input meets control adjustment criteria (3018), wherein the control adjustment criteria require that the characteristic intensity of the contact on the touch-sensitive surface meets the first intensity threshold in order for the control adjustment criteria to be met (e.g., the characteristic intensity of the contact is above a light press intensity threshold $IT_L$ as shown in user input intensity graph 906, FIGS. 9C4-9C5), the device displays a second user interface (e.g., user interface 951, FIG. 9C4 or user interface 952, FIG. 9C5) that includes a second activatable user interface object (e.g., activatable object 958, FIGS. 9C4-9C5) that has three or more state options that correspond to the three or more available values for the control function (e.g., state options 958-1 through 958-6, FIGS. 9C4-9C5). Displaying a second user interface that includes an activatable user interface object for controlling the control function in accordance with the input meeting control adjustment criteria provides the user with an efficient means of controlling remote devices, thereby enhancing the operability of the device and makes the user-device interface more efficient (e.g., by helping the user to provide proper inputs and reducing user mistakes when operating/interacting with the device).

In some embodiments, the second user interface includes (3020) an icon that represents the control function (e.g., icon 907, FIGS. 9C4-9C15) and the icon is animated in accordance with the current value for the control function. For example, for a temperature setting, the icon may include a thermometer icon and change color in accordance with the current temperature setting; for a brightness setting, the icon may include a light bulb icon and be animated to show the light bulb becoming brighter or dimmer; for a fan setting, the icon may include a fan icon and be animated to show the fan speed increasing or decreasing, etc.

While displaying the second user interface and continuing to detect the contact (3022), in some embodiments, while displaying the second user interface and prior to detecting movement of the contact across the touch sensitive surface (3024), the device ceases to detect the contact, and, in response to ceasing to detect the contact, continues to display the second user interface (e.g., ceasing to detect user input 954 and continuing to display second user interface 952, as shown in FIG. 9C17). In some embodiments, when the second user interface is displayed (to enable adjusting the setting of a control), if the contact lifts off without moving across the touch sensitive surface, display of the second user interface is maintained so that a user can make a second input (e.g., user input 955, FIG. 9C18) on the second user interface to adjust the setting of a control. Conversely, in some embodiments, if the contact by the first input moves across the touch-sensitive surface while the second user interface is displayed (e.g., user input 954 moves as shown in FIG. 9C14) and then lifts off (e.g., user input 954 lifts off, FIG. 9C15), then the setting of the control is adjusted based on the movement of the contact and the second user interface ceases to be displayed when the contact lifts off (e.g., the setting of the control is adjusted to the minimum value 958-0 and user input 954 ceases to be detected, FIG. 9C15, and second user interface 952 ceases to be displayed such that first user interface 901 is redisplayed, FIG. 9C16). Thus, adjusting the setting of the control can be performed with either (a) an input by a single continuous contact or (b) two inputs by two separate contacts with the touch sensitive surface (where the same finger may make the two separate contacts).

While displaying the second user interface and continuing to detect the contact (3022), the device detects (3026) movement of the contact across the touch-sensitive surface (e.g., movement of user input 954 is detected, FIGS. 9C6-9C9, or alternatively FIGS. 9C11-9C14). In some embodiments, while detecting the movement of the contact across the touch-sensitive surface, the device changes (3028) the current value for the control function based on the movement of the contact.

Next, while displaying the second user interface and continuing to detect the contact (3022), the device ceases (3030) to detect the contact (e.g., the device detects liftoff of the contact, such as user input 954, FIG. 9C10, or user input 954, FIG. 9C15) from the touch-sensitive surface).

In response to detecting the movement of the contact across the touch-sensitive surface, the device changes (3032) the current value for the control function based on the movement of the contact (e.g., by changing the current value to a second value if the movement is a first amount of movement in a first direction or changing the current value to a third value if the movement is the first amount of movement in a second direction, or changing the current value to a fourth value if the movement is a second amount of movement in the second direction). For example, the current value is changed to a second value 958-4 when the movement is a first amount of movement upwards, FIG. 9C6, and to a third value 958-2 when the movement is the first amount of movement downwards, FIG. 9C11. Or, the current value is changed to a fourth value 958-1 if the movement is a second amount of movement downwards, FIG. 9C12. Changing the current value for the control function based on the movement of the contact while displaying the second user interface provides the user with an efficient means of changing settings for controlling remote devices, thereby enhancing the operability of the device and makes the user-device interface more efficient (e.g., by helping the user to provide proper inputs and reducing user mistakes when operating/interacting with the device).

In some embodiments, the current value of the control function after ceasing to detect the contact is (3034) a last value for the control function prior to ceasing to detect the contact (e.g., the last value for the control function prior to ceasing to detect user input 904 was the minimum value 958-0 corresponding to an off state of the function, as shown in FIGS. 9C14-9C15, and the current value of the control function as shown in FIG. 9C16 is the minimum value such that the function is in an off state).

In some embodiments, in response to detecting the movement of the contact across the touch-sensitive surface and ceasing to detect the contact, the device sets (3036) the control function to an on state.

In some embodiments, in response to ceasing to detect the contact, the device ceases (3038) to display the second user interface and redisplays the first user interface (e.g., in response to ceasing to detect user input 954, second user interface 952 as shown in FIG. 9C15 ceases to be displayed, and first user interface 901 is redisplayed as shown in FIG. 9C16). In some embodiments, ceasing to display the second user interface includes (3040) displaying an animation of the second activatable user interface object (e.g., second activatable user interface object 958, FIG. 9C15) transforming into the first activatable user interface object (e.g., lights icon 962-4, FIG. 9C16).

In some embodiments, while displaying the second user interface, the device detects (3042) movement of the contact that corresponds to a swipe gesture (e.g., a left swipe, as indicated by user input 955, FIG. 9C19, or a right swipe), and, in response to detecting movement of the contact that corresponds to the swipe gesture, the device displays a third user interface (e.g., third user interface 953, FIG. 9C19) that includes a third activatable user interface object (e.g., as illustrated in FIG. 9C19, the third activatable user interface object is made up of activatable user interface objects 960-1 through 960-7) that corresponds to one or more additional controls for the function. In some embodiments, the second user interface includes (3044) a plurality of pagination indicia (e.g., dots, such as pagination dots 909, FIGS. 9C18-9C19) that indicate that one or more additional pages of controls for the function are available.

In some embodiments, changing the current value for the control function based on the movement of the contact includes (3046) changing the current value for the control function to a lowest available value of the control function (e.g., minimum value 958-0, FIG. 9C13, corresponding to an off state of the function) in accordance with a determination that the movement of the contact includes at least a first amount of movement in a first direction (e.g., a long, downward swipe turns off the function).

In some embodiments, changing the current value of the control function to the lowest available value includes (3048), in accordance with a determination that the movement of the contact includes an amount of movement in the first direction that is greater than the first amount (e.g., as indicated by user input 954, FIG. 9C14), displaying an animation of the second activatable user interface object transforming into a third user interface object (e.g., a stretched form of the second activatable user interface object, as shown in FIG. 9C14) that corresponds to the movement in the first direction without changing the current value for the control function from the lowest available value (e.g., the current value for the control function is still the minimum value 958-0, FIG. 9C14), and in response to ceasing to detect the contact, displaying an animation of the third user interface object transforming into the second activatable user interface object (e.g., displaying an animation of activatable user interface object 958 contracting, as indicated in FIG. 9C15).

For example, in some embodiments, the third user interface object is an elongated or stretched form of the second activatable user interface object, optionally showing selection of a value lower than the lowest available value, the animation of the second activatable user interface object transforming into the third user interface object includes the second activatable user interface object stretching in accordance with continued movement of the contact in the first direction, and the animation of the third user interface object transforming (back) into the second activatable user interface object includes the third user interface object snapping or springing back into the second activatable user interface object, typically showing selection of the lowest available value.

In some embodiments, changing the current value for the control based on the movement of the contact includes (3050) changing the current value for the control to a highest available value of the function (e.g., maximum value 958-6, FIG. 9C8) in accordance with a determination that the movement of the contact includes a second amount of movement in a second direction (e.g., a long, upward swipe increases the function to its maximum value).

In some embodiments, changing the current value for the control to the highest available value includes (3052), in accordance with a determination that the movement of the contact includes an amount of movement in the second direction that is greater than the second amount (e.g., as indicated by user input 954, FIG. 9C9), displaying an animation of the second activatable user interface object transforming into a fourth user interface object (e.g., a stretched form of the second activatable user interface object, as shown in FIG. 9C9) that corresponds to the movement in the second direction without changing the current value for the control function from the highest available value (e.g., the current value for the control function is still the maximum value 958-6, FIG. 9C9), and, in response to ceasing to detect the contact, displaying an animation of the fourth user interface object transforming into the second activatable user interface object (e.g., displaying an animation of activatable user interface object 958 contracting, as indicated in FIG. 9C10).

For example, in some embodiments the fourth user interface object is an elongated or stretched form of the second activatable user interface object, optionally showing selection of a value higher than the highest available value, the animation of the second activatable user interface object transforming into the fourth user interface object includes the second activatable user interface object stretching in accordance with continued movement of the contact in the second direction, and the animation of the fourth user interface object transforming (back) into the second activatable user interface object includes the fourth user interface object snapping or springing back into the second activatable user interface object, typically showing selection of the highest available value.

In some embodiments, the electronic device includes (3054) a tactile output generator, and, in response to changing the current value of the control function to a lowest available value of the control function (e.g., an off state of the function such as 0%), the device outputs a tactile output. In some embodiments, the tactile output is generated in response to a request to decrease the current value of the control function beyond the lowest available value (e.g., as indicated by tactile output 923, FIG. 9C14) and/or in response to snapping back to the lowest available value after receiving a request to increase the current value of the control function beyond the lowest available value (e.g., as indicated by tactile output 924, FIG. 9C15).

In some embodiments, the electronic device includes (3056) a tactile output generator, and, in response to changing the current value of the control function to a highest available value of the function (e.g., a maximum value such as 100%), the device outputs a tactile output. In some embodiments, the tactile output is generated in response to a request to increase the current value of the control function beyond the highest available value (e.g., as indicated by tactile output 921, FIG. 9C9) and/or in response to snapping back to the highest available value after receiving a request to increase the current value of the control function beyond the highest available value (e.g., as indicated by tactile output 922, FIG. 9C10).

In some embodiments, the electronic device includes (3058) a tactile output generator, and, in response to detecting the movement of the contact across the touch sensitive surface while displaying the second user interface, the device outputs one or more tactile outputs in conjunction with changing the current value for the control based on the movement of the contact.

Figure 31:
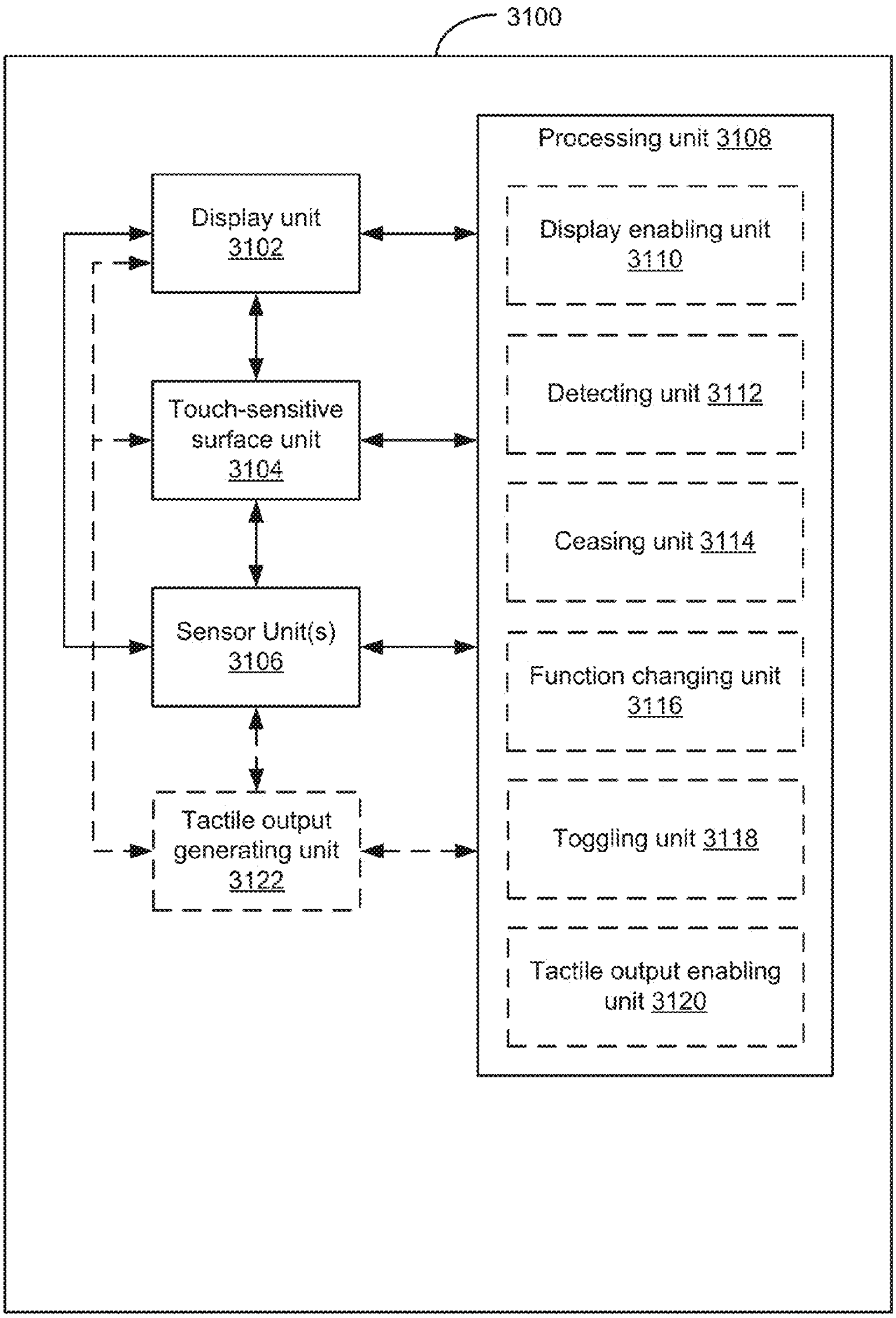
FIG. 31 is a functional block diagram of an electronic device in accordance with some embodiments.

In accordance with some embodiments, FIG. 31 shows a functional block diagram of an electronic device 3100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 3100 may be combined or separated into sub-blocks to implement the principles of the invention as described above. Therefore, the description herein may support any possible combination or separation or further definition of the functional blocks described herein.

As shown in FIG. 31, an electronic device 3100 includes a display unit 3102 configured to display a first user interface that includes a plurality of activatable user interface objects; a touch-sensitive surface unit 3104 configured to receive user inputs; one or more sensor units 3106 configured to detect intensities of contacts with the touch-sensitive surface unit; and a processing unit 3108 coupled to the display unit, the touch-sensitive surface unit and the one or more sensor units. In some embodiments, the processing unit 3108 includes a display enabling unit 3110, a detecting unit 3112, a ceasing unit 3114, a function changing unit 3116, a toggling unit 3118, and a tactile output enabling unit 3120.

The processing unit is configured to: enable display of a first user interface that includes a plurality of activatable user interface objects (e.g., with the display enabling unit 3110); while the first user interface is displayed, detect an input by a contact at a first location on the touch-sensitive surface unit that corresponds to a first activatable user interface object on the display unit (e.g., with the detecting unit 3112), wherein: the first activatable user interface object is associated with a control function with three or more available values; and a first value of the control function is selected as a current value for the control function; in response to detecting the input by the contact: in accordance with a determination that the input meets toggle criteria, wherein the toggle criteria do not require that a characteristic intensity of the contact on the touch-sensitive surface unit meets a first intensity threshold in order for the toggle criteria to be met, toggle the control function that corresponds to the first activatable user interface object between a first state that is based on the current value for the control function and a second state (e.g., with the toggling unit 3118); and, in accordance with a determination that the input meets control adjustment criteria, wherein the control adjustment criteria require that the characteristic intensity of the contact on the touch-sensitive surface unit meets the first intensity threshold in order for the control adjustment criteria to be met, enable display of a second user interface that includes a second activatable user interface object that has three or more state options that correspond to the three or more available values for the control function (e.g., with the display enabling unit 3110); and while the second user interface is displayed and while continuing to detect the contact: detect movement of the contact across the touch-sensitive surface unit (e.g., with the detecting unit 3112); cease to detect the contact (e.g., with the ceasing unit 3114); and, in response to detecting the movement of the contact across the touch-sensitive surface unit, change the current value for the control function based on the movement of the contact (e.g., with the function changing unit 3116).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a display, a touch-sensitive surface, and one or more sensors for detecting intensities of contacts on the touch-sensitive surface:

displaying, on the display, a user interface that includes a plurality of application icons that correspond to different applications in a plurality of applications;

while displaying the user interface that includes the plurality of application icons, detecting a first input that includes detecting a first contact on the touch-sensitive surface at a location on the touch-sensitive surface that corresponds to a first application icon of the plurality of application icons, the first application icon being associated with a first application of the plurality of applications;

in response to detecting the first input:

in accordance with a determination that the first input meets application-launching criteria, wherein the application-launching criteria do not require that a characteristic intensity of the first contact on the touch-sensitive surface meet a first intensity threshold in order for the application-launching criteria to be met:

launching the first application; and replacing display of the user interface that includes the plurality of application icons with a user interface of the first application; and, in accordance with a determination that the first input meets menu-presentation criteria, wherein the menu-presentation criteria require that the characteristic intensity of the first contact on the touch-sensitive surface meet the first intensity threshold in order for the menu-presentation criteria to be met, concurrently displaying a contextual content object and a respective affordance that is associated with the contextual content object, wherein:

the contextual content object includes contextually selected content that has been automatically selected from the first application based on a current context of the electronic device; and the respective affordance, when activated, is configured to add the contextual content object to a user interface that includes information for multiple applications.

2. The method of claim 1, wherein the user interface that includes information for multiple applications includes a contextual content object view that is configured to concurrently display respective contextual content objects associated with different applications selected from the plurality of applications.

3. The method of claim 1, including:

while displaying the contextual content object, detecting a second input that includes detecting a second contact on the touch-sensitive surface at a location on the touch-sensitive surface that corresponds to the contextual content object; and in response to detecting the second input:

in accordance with a determination that the second input meets the application-launching criteria, wherein the application-launching criteria do not require the characteristic intensity of the second contact to meet the first intensity threshold in order for the application-launching criteria to be met:

launching the first application; and replacing display of the contextual content object with a user interface of the first application.

4. The method of claim 3, wherein replacing display of the contextual content object with a user interface of the first application includes:

in accordance with a determination that the second contact is detected at a first location on the touch-sensitive surface that corresponds to a first portion of the contextual content object, displaying a first user interface from the first application; and in accordance with a determination that the second contact is detected at a second location on the touch-sensitive surface that corresponds to a second portion of the contextual content object, displaying a second user interface from the first application that is distinct from the first user interface from the first application.

5. The method of claim 1, including:

while displaying the contextual content object, displaying a representation of at least a portion of the user interface that includes the plurality of application icons.

6. The method of claim 1, including:

in response to detecting the first input:

in accordance with the determination that the first input meets the menu-presentation criteria, displaying one or more selectable options concurrently with the contextual content object, wherein the one or more selectable options, when activated, are configured to perform respective functions associated with the first application.

7. The method of claim 6, including:

detecting termination of the first input that includes detecting liftoff of the first contact;

in response to detecting the termination of the first input, maintaining concurrent display of the contextual content object and the one or more selectable options;

while the concurrent display of the contextual content object and the one or more selectable options is maintained, detecting a selection input that selects a first option of the one or more selectable options; and in response to detecting the selection input, starting to perform a first function of the first application that corresponds to the selected first option.

8. The method of claim 6, including:

while concurrently displaying the contextual content object and the one or more selectable options, detecting movement of the first contact to a location on the touch-sensitive surface that corresponds to a second option of the one or more selectable options; and in response to detecting the movement of the first contact to the location on the touch-sensitive surface that corresponds to the second option of the one or more selectable options, in accordance with a determination that the first input meets selection criteria, starting to perform a second function of the first application that corresponds to the selected second option.

9. The method of claim 6, including:

providing a first haptic signal when the first contact moves past each selectable option of the one or more selectable options.

10. The method of claim 1, wherein the contextual content object is a first mini-application object that corresponds to the first application.

11. The method of claim 1, including:

while concurrently displaying the contextual content object and the respective affordance, detecting an input activating the respective affordance; and in response to detecting the input activating the respective affordance, adding the contextual content object to the user interface that includes information for multiple applications.

12. The method of claim 11, including:

in response to adding the contextual content object to the user interface that includes information for a plurality of applications, ceasing to concurrently display the respective affordance with the contextual content object.

13. The method of claim 11, including:

after adding the contextual content object to the user interface that includes information for a plurality of applications, while displaying the user interface that includes the plurality of application icons, detecting a navigation input for navigating to the user interface that includes information for a plurality of applications;

in response to detecting the navigation input, replacing display of the user interface that includes the plurality of application icons with the user interface that includes information for a plurality of applications, wherein the user interface that includes information for a plurality of applications includes the contextual content object associated with the first application;

while displaying the user interface that includes information for a plurality of applications including the contextual content object associated with the first application, detecting a third input that includes detecting a third contact on the touch-sensitive surface at a location that corresponds to the contextual content object in the user interface that includes information for a plurality of applications; and in response to detecting the third input:

in accordance with a determination that the third input meets content expansion criteria, wherein the content expansion criteria require that a characteristic intensity of the third contact on the touch-sensitive surface meet the first intensity threshold, expanding the contextual content object to display the contextually selected content and additional content.

14. The method of claim 13, wherein expanding the contextual content object to display the contextually selected content and the additional content includes:

in accordance with a determination that the third contact is detected at a third location on the touch-sensitive surface that corresponds to a third portion of the contextual content object, displaying first additional content with the contextually selected content; and in accordance with a determination that the third contact is detected at a fourth location on the touch-sensitive surface that corresponds to a fourth portion of the contextual content object, displaying second additional content that is distinct from the first additional content.

15. The method of claim 14, wherein the contextual content object includes a first content item of a first content item type, and wherein the first additional content includes additional content items of the first content item type.

16. The method of claim 14, wherein the contextual content object includes a first content item, and wherein the second additional content includes additional information associated with the first content item.

17. The method of claim 13, including:

detecting termination of the third input that includes detecting liftoff of the third contact; and in response to detecting the termination of the third input, maintaining display of the contextually selected content and the additional content.

18. The method of claim 13, including:

detecting termination of the third input that includes detecting liftoff of the third contact;

in response to detecting the termination of the third input: maintaining display of the contextually selected content; and ceasing to display the additional content.

19. The method of claim 1, wherein the contextual content object includes a first interactive object from the first application.

20. The method of claim 1, wherein the contextual content object includes representations of one or more social contacts associated with a user of the device.

21. The method of claim 1, including:

in response to detecting the first input, in accordance with the determination that the first input meets the menu-presentation criteria, providing a second haptic signal when displaying the contextual content object.

22. The method of claim 1, wherein displaying the contextual content object includes displaying the contextual content object at a location on the display that corresponds to the location of the first contact on the touch-sensitive surface.

23. The method of claim 1, wherein displaying the contextual content object includes maintaining display of the first application icon at its original location and displaying the contextual content object in proximity to the first application icon.

24. The method of claim 1, wherein displaying the contextual content object includes maintaining display of the first application icon at a location offset from its original location and displaying the contextual content object in proximity to the first application icon.

25. An electronic device, comprising:

a display;

a touch-sensitive surface;

one or more sensors for detecting intensities of contacts on the touch-sensitive surface;

one or more processors;

memory; and one or more programs, wherein the one or more programs are stored in the memory and configured to be executed by the one or more processors, the one or more programs including instructions for:

displaying, on the display, a user interface that includes a plurality of application icons that correspond to different applications in a plurality of applications;

while displaying the user interface that includes the plurality of application icons, detecting a first input that includes detecting a first contact on the touch-sensitive surface at a location on the touch-sensitive surface that corresponds to a first application icon of the plurality of application icons, the first application icon being associated with a first application of the plurality of applications;

in response to detecting the first input:

in accordance with a determination that the first input meets application-launching criteria, wherein the application-launching criteria do not require that a characteristic intensity of the first contact on the touch-sensitive surface meet a first intensity threshold in order for the application-launching criteria to be met:

launching the first application; and replacing display of the user interface that includes the plurality of application icons with a user interface of the first application; and, in accordance with a determination that the first input meets menu-presentation criteria, wherein the menu-presentation criteria require that the characteristic intensity of the first contact on the touch-sensitive surface meet the first intensity threshold in order for the menu-presentation criteria to be met, concurrently displaying a contextual content object and a respective affordance that is associated with the contextual content object, wherein:

the contextual content object includes contextually selected content that has been automatically selected from the first application based on a current context of the electronic device; and the respective affordance, when activated, is configured to add the contextual content object to a user interface that includes information for multiple applications.

26. The electronic device of claim 25, wherein the user interface that includes information for multiple applications includes a contextual content object view that is configured to concurrently display respective contextual content objects associated with different applications selected from the plurality of applications.

27. The electronic device of claim 25, wherein the one or more programs include instructions for:

while displaying the contextual content object, detecting a second input that includes detecting a second contact on the touch-sensitive surface at a location on the touch-sensitive surface that corresponds to the contextual content object; and in response to detecting the second input:

in accordance with a determination that the second input meets the application-launching criteria, wherein the application-launching criteria do not require the characteristic intensity of the second contact to meet the first intensity threshold in order for the application-launching criteria to be met:

launching the first application; and replacing display of the contextual content object with a user interface of the first application.

28. The electronic device of claim 26, wherein replacing display of the contextual content object with a user interface of the first application includes:

in accordance with a determination that the second contact is detected at a first location on the touch-sensitive surface that corresponds to a first portion of the contextual content object, displaying a first user interface from the first application; and in accordance with a determination that the second contact is detected at a second location on the touch-sensitive surface that corresponds to a second portion of the contextual content object, displaying a second user interface from the first application that is distinct from the first user interface from the first application.

29. The electronic device of claim 25, wherein the one or more programs include instructions for:

while displaying the contextual content object, displaying a representation of at least a portion of the user interface that includes the plurality of application icons.

30. The electronic device of claim 25, wherein the one or more programs include instructions for:

in response to detecting the first input:

in accordance with the determination that the first input meets the menu-presentation criteria, displaying one or more selectable options concurrently with the contextual content object, wherein the one or more selectable options, when activated, are configured to perform respective functions associated with the first application.

31. The electronic device of claim 30, wherein the one or more programs include instructions for:

detecting termination of the first input that includes detecting liftoff of the first contact;

in response to detecting the termination of the first input, maintaining concurrent display of the contextual content object and the one or more selectable options;

while the concurrent display of the contextual content object and the one or more selectable options is maintained, detecting a selection input that selects a first option of the one or more selectable options; and in response to detecting the selection input, starting to perform a first function of the first application that corresponds to the selected first option.

32. The electronic device of claim 30, wherein the one or more programs include instructions for:

while concurrently displaying the contextual content object and the one or more selectable options, detecting movement of the first contact to a location on the touch-sensitive surface that corresponds to a second option of the one or more selectable options; and in response to detecting the movement of the first contact to the location on the touch-sensitive surface that corresponds to the second option of the one or more selectable options, in accordance with a determination that the first input meets selection criteria, starting to perform a second function of the first application that corresponds to the selected second option.

33. The electronic device of claim 30, wherein the one or more programs include instructions for:

providing a first haptic signal when the first contact moves past each selectable option of the one or more selectable options.

34. The electronic device of claim 25, wherein the contextual content object is a first mini-application object that corresponds to the first application.

35. The electronic device of claim 25, wherein the one or more programs include instructions for:

while concurrently displaying the contextual content object and the respective affordance, detecting an input activating the respective affordance; and in response to detecting the input activating the respective affordance, adding the contextual content object to the user interface that includes information for multiple applications.

36. The electronic device of claim 35, wherein the one or more programs include instructions for:

in response to adding the contextual content object to the user interface that includes information for a plurality of applications, ceasing to concurrently display the respective affordance with the contextual content object.

37. The electronic device of claim 35, wherein the one or more programs include instructions for:

after adding the contextual content object to the user interface that includes information for a plurality of applications, while displaying the user interface that includes the plurality of application icons, detecting a navigation input for navigating to the user interface that includes information for a plurality of applications;

in response to detecting the navigation input, replacing display of the user interface that includes the plurality of application icons with the user interface that includes information for a plurality of applications, wherein the user interface that includes information for a plurality of applications includes the contextual content object associated with the first application;

while displaying the user interface that includes information for a plurality of applications including the contextual content object associated with the first application, detecting a third input that includes detecting a third contact on the touch-sensitive surface at a location that corresponds to the contextual content object in the user interface that includes information for a plurality of applications; and in response to detecting the third input:

in accordance with a determination that the third input meets content expansion criteria, wherein the content expansion criteria require that a characteristic intensity of the third contact on the touch-sensitive surface meet the first intensity threshold, expanding the contextual content object to display the contextually selected content and additional content.

38. The electronic device of claim 37, wherein expanding the contextual content object to display the contextually selected content and the additional content includes:

in accordance with a determination that the third contact is detected at a third location on the touch-sensitive surface that corresponds to a third portion of the contextual content object, displaying first additional content with the contextually selected content; and in accordance with a determination that the third contact is detected at a fourth location on the touch-sensitive surface that corresponds to a fourth portion of the contextual content object, displaying second additional content that is distinct from the first additional content.

39. The electronic device of claim 38, wherein the contextual content object includes a first content item of a first content item type, and wherein the first additional content includes additional content items of the first content item type.

40. The electronic device of claim 38, wherein the contextual content object includes a first content item, and wherein the second additional content includes additional information associated with the first content item.

41. The electronic device of claim 37, wherein the one or more programs include instructions for:

detecting termination of the third input that includes detecting liftoff of the third contact; and in response to detecting the termination of the third input, maintaining display of the contextually selected content and the additional content.

42. The electronic device of claim 37, wherein the one or more programs include instructions for:

detecting termination of the third input that includes detecting liftoff of the third contact;

in response to detecting the termination of the third input: maintaining display of the contextually selected content; and ceasing to display the additional content.

43. The electronic device of claim 25, wherein the contextual content object includes a first interactive object from the first application.

44. The electronic device of claim 25, wherein the contextual content object includes representations of one or more social contacts associated with a user of the device.

45. The electronic device of claim 25, wherein the one or more programs include instructions for:

in response to detecting the first input, in accordance with the determination that the first input meets the menu-presentation criteria, providing a second haptic signal when displaying the contextual content object.

46. The electronic device of claim 25, wherein displaying the contextual content object includes displaying the contextual content object at a location on the display that corresponds to the location of the first contact on the touch-sensitive surface.

47. The electronic device of claim 25, wherein displaying the contextual content object includes maintaining display of the first application icon at its original location and displaying the contextual content object in proximity to the first application icon.

48. The electronic device of claim 25, wherein displaying the contextual content object includes maintaining display of the first application icon at a location offset from its original location and displaying the contextual content object in proximity to the first application icon.

49. A non-transitory computer readable storage medium storing one or more programs, the one or more programs comprising instructions, which when executed by an electronic device with a display, a touch-sensitive surface, and one or more sensors for detecting intensities of contacts on the touch-sensitive surface, cause the device to:

display, on the display, a user interface that includes a plurality of application icons that correspond to different applications in a plurality of applications;

while displaying the user interface that includes the plurality of application icons, detect a first input that includes detecting a first contact on the touch-sensitive surface at a location on the touch-sensitive surface that corresponds to a first application icon of the plurality of application icons, the first application icon being associated with a first application of the plurality of applications;

in response to detecting the first input:

in accordance with a determination that the first input meets application-launching criteria, wherein the application-launching criteria do not require that a characteristic intensity of the first contact on the touch-sensitive surface meet a first intensity threshold in order for the application-launching criteria to be met:

launch the first application; and replace display of the user interface that includes the plurality of application icons with a user interface of the first application; and, in accordance with a determination that the first input meets menu-presentation criteria, wherein the menu-presentation criteria require that the characteristic intensity of the first contact on the touch-sensitive surface meet the first intensity threshold in order for the menu-presentation criteria to be met, concurrently display a contextual content object and a respective affordance that is associated with the contextual content object, wherein:

the contextual content object includes contextually selected content that has been automatically selected from the first application based on a current context of the electronic device; and the respective affordance, when activated, is configured to add the contextual content object to a user interface that includes information for multiple applications.

50. The non-transitory computer-readable storage medium of claim 49, wherein the user interface that includes information for multiple applications includes a contextual content object view that is configured to concurrently display respective contextual content objects associated with different applications selected from the plurality of applications.

51. The non-transitory computer-readable storage medium of claim 49, wherein the one or more programs include instructions for:

while displaying the contextual content object, detecting a second input that includes detecting a second contact on the touch-sensitive surface at a location on the touch-sensitive surface that corresponds to the contextual content object; and in response to detecting the second input:

in accordance with a determination that the second input meets the application-launching criteria, wherein the application-launching criteria do not require the characteristic intensity of the second contact to meet the first intensity threshold in order for the application-launching criteria to be met:

launching the first application; and replacing display of the contextual content object with a user interface of the first application.

52. The non-transitory computer-readable storage medium of claim 51, wherein replacing display of the contextual content object with a user interface of the first application includes:

in accordance with a determination that the second contact is detected at a first location on the touch-sensitive surface that corresponds to a first portion of the contextual content object, displaying a first user interface from the first application; and in accordance with a determination that the second contact is detected at a second location on the touch-sensitive surface that corresponds to a second portion of the contextual content object, displaying a second user interface from the first application that is distinct from the first user interface from the first application.

53. The non-transitory computer-readable storage medium of claim 49, wherein the one or more programs include instructions for:

while displaying the contextual content object, displaying a representation of at least a portion of the user interface that includes the plurality of application icons.

54. The non-transitory computer-readable storage medium of claim 49, wherein the one or more programs include instructions for:

in response to detecting the first input:

in accordance with the determination that the first input meets the menu-presentation criteria, displaying one or more selectable options concurrently with the contextual content object, wherein the one or more selectable options, when activated, are configured to perform respective functions associated with the first application.

55. The non-transitory computer-readable storage medium of claim 54, wherein the one or more programs include instructions for:

detecting termination of the first input that includes detecting liftoff of the first contact;

in response to detecting the termination of the first input, maintaining concurrent display of the contextual content object and the one or more selectable options;

while the concurrent display of the contextual content object and the one or more selectable options is maintained, detecting a selection input that selects a first option of the one or more selectable options; and in response to detecting the selection input, starting to perform a first function of the first application that corresponds to the selected first option.

56. The non-transitory computer-readable storage medium of claim 54, wherein the one or more programs include instructions for:

while concurrently displaying the contextual content object and the one or more selectable options, detecting movement of the first contact to a location on the touch-sensitive surface that corresponds to a second option of the one or more selectable options; and in response to detecting the movement of the first contact to the location on the touch-sensitive surface that corresponds to the second option of the one or more selectable options, in accordance with a determination that the first input meets selection criteria, starting to perform a second function of the first application that corresponds to the selected second option.

57. The non-transitory computer-readable storage medium of claim 54, wherein the one or more programs include instructions for:

providing a first haptic signal when the first contact moves past each selectable option of the one or more selectable options.

58. The non-transitory computer-readable storage medium of claim 49, wherein the contextual content object is a first mini-application object that corresponds to the first application.

59. The non-transitory computer-readable storage medium of claim 49, wherein the one or more programs include instructions for:

while concurrently displaying the contextual content object and the respective affordance, detecting an input activating the respective affordance; and in response to detecting the input activating the respective affordance, adding the contextual content object to the user interface that includes information for multiple applications.

60. The non-transitory computer-readable storage medium of claim 59, wherein the one or more programs include instructions for:

in response to adding the contextual content object to the user interface that includes information for a plurality of applications, ceasing to concurrently display the respective affordance with the contextual content object.

61. The non-transitory computer-readable storage medium of claim 59, wherein the one or more programs include instructions for:

after adding the contextual content object to the user interface that includes information for a plurality of applications, while displaying the user interface that includes the plurality of application icons, detecting a navigation input for navigating to the user interface that includes information for a plurality of applications;

in response to detecting the navigation input, replacing display of the user interface that includes the plurality of application icons with the user interface that includes information for a plurality of applications, wherein the user interface that includes information for a plurality of applications includes the contextual content object associated with the first application;

while displaying the user interface that includes information for a plurality of applications including the contextual content object associated with the first application, detecting a third input that includes detecting a third contact on the touch-sensitive surface at a location that corresponds to the contextual content object in the user interface that includes information for a plurality of applications; and in response to detecting the third input:

in accordance with a determination that the third input meets content expansion criteria, wherein the content expansion criteria require that a characteristic intensity of the third contact on the touch-sensitive surface meet the first intensity threshold, expanding the contextual content object to display the contextually selected content and additional content.

62. The non-transitory computer-readable storage medium of claim 61, wherein expanding the contextual content object to display the contextually selected content and the additional content includes:

in accordance with a determination that the third contact is detected at a third location on the touch-sensitive surface that corresponds to a third portion of the contextual content object, displaying first additional content with the contextually selected content; and in accordance with a determination that the third contact is detected at a fourth location on the touch-sensitive surface that corresponds to a fourth portion of the contextual content object, displaying second additional content that is distinct from the first additional content.

63. The non-transitory computer-readable storage medium of claim 62, wherein the contextual content object includes a first content item of a first content item type, and wherein the first additional content includes additional content items of the first content item type.

64. The non-transitory computer-readable storage medium of claim 62, wherein the contextual content object includes a first content item, and wherein the second additional content includes additional information associated with the first content item.

65. The non-transitory computer-readable storage medium of claim 61, wherein the one or more programs include instructions for:

detecting termination of the third input that includes detecting liftoff of the third contact; and in response to detecting the termination of the third input, maintaining display of the contextually selected content and the additional content.

66. The non-transitory computer-readable storage medium of claim 61, wherein the one or more programs include instructions for:

detecting termination of the third input that includes detecting liftoff of the third contact;

in response to detecting the termination of the third input:

maintaining display of the contextually selected content; and ceasing to display the additional content.

67. The non-transitory computer-readable storage medium of claim 49, wherein the contextual content object includes a first interactive object from the first application.

68. The non-transitory computer-readable storage medium of claim 49, wherein the contextual content object includes representations of one or more social contacts associated with a user of the device.

69. The non-transitory computer-readable storage medium of claim 49, wherein the one or more programs include instructions for:

in response to detecting the first input, in accordance with the determination that the first input meets the menu-presentation criteria, providing a second haptic signal when displaying the contextual content object.

70. The non-transitory computer-readable storage medium of claim 49, wherein displaying the contextual content object includes displaying the contextual content object at a location on the display that corresponds to the location of the first contact on the touch-sensitive surface.

71. The non-transitory computer-readable storage medium of claim 49, wherein displaying the contextual content object includes maintaining display of the first application icon at its original location and displaying the contextual content object in proximity to the first application icon.

72. The non-transitory computer-readable storage medium of claim 49, wherein displaying the contextual content object includes maintaining display of the first application icon at a location offset from its original location and displaying the contextual content object in proximity to the first application icon.

* * * * *